US009871587B2

(12) United States Patent
Aoyama et al.

(10) Patent No.: US 9,871,587 B2
(45) Date of Patent: Jan. 16, 2018

(54) INFORMATION PROCESSING METHOD FOR GENERATING ENCODED SIGNAL FOR VISIBLE LIGHT COMMUNICATION

(71) Applicant: Panasonic Intellectual Property Corporation of America, Torrance, CA (US)

(72) Inventors: Hideki Aoyama, Osaka (JP); Mitsuaki Oshima, Kyoto (JP); Koji Nakanishi, Kanagawa (JP); Toshiyuki Maeda, Kanagawa (JP); Akihiro Ueki, Kanagawa (JP); Kengo Miyoshi, Kanagawa (JP); Tsutomu Mukai, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/063,896

(22) Filed: Mar. 8, 2016

(65) Prior Publication Data

US 2016/0191159 A1 Jun. 30, 2016

Related U.S. Application Data

(63) Continuation of application No. PCT/JP2014/005845, filed on Nov. 20, 2014.

(Continued)

(30) Foreign Application Priority Data

Nov. 22, 2013 (JP) ................................ 2013-242407
Jun. 13, 2014 (JP) ................................ 2014-122783

(Continued)

(51) Int. Cl.
*H04B 10/116* (2013.01)
*H04N 21/436* (2011.01)

(52) U.S. Cl.
CPC ......... *H04B 10/116* (2013.01); *H04N 21/436* (2013.01)

(58) Field of Classification Search
CPC ............................ H04B 10/116; H04N 21/436

(Continued)

(56) References Cited

U.S. PATENT DOCUMENTS 8,256,673 B1 9/2012 Kim
8,334,901 B1 12/2012 Ganick et al.

(Continued)

FOREIGN PATENT DOCUMENTS

CL 2015-01829 9/2015
CL 2015-01828 10/2015

(Continued)

OTHER PUBLICATIONS

Singapore Search Report dated Jun. 29, 2016 for the related Singapore Patent Application No. 11201504980T.

(Continued)

*Primary Examiner* — Leslie Pascal
(74) *Attorney, Agent, or Firm* — Greenblum & Bernstein, P.L.C.

(57) ABSTRACT

An information processing program causes a computer to execute: encoding information to be transmitted, to determine a luminance change frequency; and outputting a signal of the determined luminance change frequency to cause a light emitter to change in luminance according to the determined luminance change frequency to transmit the information. In the encoding, each of a first frequency and a second frequency different from the first frequency is determined as the luminance change frequency. In the outputting, each of (Continued)

a signal of the first frequency and a signal of the second frequency is output as the signal of the determined luminance change frequency, to cause the light emitter to change in luminance according to the first frequency during a first time and change in luminance according to the second frequency during a second time different from the first time after the first time elapses.

14 Claims, 419 Drawing Sheets

Related U.S. Application Data

(60) Provisional application No. 61/973,958, filed on Apr. 2, 2014, provisional application No. 61/993,418, filed on May 15, 2014, provisional application No. 62/079,202, filed on Nov. 13, 2014.

(30) Foreign Application Priority Data

Sep. 19, 2014 (JP) ................................ 2014-192030
Sep. 19, 2014 (JP) ................................ 2014-192031

(58) Field of Classification Search
USPC ........................................................ 398/172
See application file for complete search history.

(56) References Cited

U.S. PATENT DOCUMENTS

| | | | |
|---|---|---|---|
| 2002/0167701 | A1 | 11/2002 | Hirata |
| 2003/0076338 | A1 | 4/2003 | Hashimoto |
| 2005/0162584 | A1 | 7/2005 | Yamamoto et al. |
| 2005/0169643 | A1 | 8/2005 | Franklin |
| 2006/0242908 | A1 | 11/2006 | McKinney |
| 2007/0046789 | A1 | 3/2007 | Kirisawa |
| 2007/0222743 | A1 | 9/2007 | Hirakata |
| 2008/0055041 | A1 | 3/2008 | Takene et al. |
| 2008/0122994 | A1 | 5/2008 | Cernasov |
| 2008/0205848 | A1 | 8/2008 | Kobayashi |
| 2008/0290988 | A1 | 11/2008 | Crawford |
| 2008/0297615 | A1 | 12/2008 | Kagawa et al. |
| 2009/0002265 | A1 | 1/2009 | Kitaoka et al. |
| 2009/0066689 | A1 | 3/2009 | Yamaguchi et al. |
| 2010/0020970 | A1 | 1/2010 | Liu et al. |
| 2010/0034540 | A1 | 2/2010 | Togashi |
| 2010/0189092 | A1 | 7/2010 | Seki |
| 2011/0007160 | A1 | 1/2011 | Okumura |
| 2011/0007171 | A1 | 1/2011 | Okumura et al. |
| 2011/0025730 | A1 | 2/2011 | Ajichi |
| 2011/0063510 | A1 | 3/2011 | Lee et al. |
| 2011/0069971 | A1 | 3/2011 | Kim et al. |
| 2011/0128384 | A1 | 6/2011 | Tiscareno et al. |
| 2011/0216049 | A1 | 9/2011 | Jun et al. |
| 2011/0229147 | A1 | 9/2011 | Yokoi |
| 2012/0155889 | A1 | 6/2012 | Kim et al. |
| 2012/0188442 | A1 | 7/2012 | Kennedy |
| 2012/0206648 | A1 | 8/2012 | Casagrande et al. |
| 2013/0271631 | A1 | 10/2013 | Tatsuzawa et al. |
| 2013/0329440 | A1 | 12/2013 | Tsutsumi et al. |
| 2013/0330088 | A1 | 12/2013 | Oshima et al. |
| 2014/0186049 | A1 | 7/2014 | Oshima et al. |
| 2014/0186052 | A1 | 7/2014 | Oshima et al. |
| 2014/0204129 | A1 | 7/2014 | Oshima et al. |
| 2014/0205136 | A1 | 7/2014 | Oshima et al. |
| 2014/0207517 | A1 | 7/2014 | Oshima et al. |
| 2014/0286644 | A1 | 9/2014 | Oshima et al. |
| 2015/0139552 | A1 | 5/2015 | Xiao et al. |

FOREIGN PATENT DOCUMENTS

| | | | |
|---|---|---|---|
| CN | 101009760 | A | 8/2007 |
| CN | 100340903 | C | 10/2007 |
| CN | 101135208 | A | 3/2008 |
| CN | 105637783 | A | 6/2016 |
| EP | 2503852 | | 9/2012 |
| EP | 2858269 | A1 | 4/2015 |
| EP | 3089381 | A1 | 11/2016 |
| JP | 7-107036 | | 4/1995 |
| JP | 2002-290335 | | 10/2002 |
| JP | 2007-189341 | | 7/2007 |
| JP | 2008-252570 | A | 10/2008 |
| JP | 2009-111776 | | 5/2009 |
| JP | 2009-212768 | | 9/2009 |
| JP | 2009-290359 | | 12/2009 |
| JP | 2010-226172 | A | 10/2010 |
| JP | 2010-278573 | | 12/2010 |
| JP | 2011-085865 | | 4/2011 |
| JP | 2012-169189 | A | 9/2012 |
| JP | 2013-506226 | A | 2/2013 |
| JP | 2013-210974 | A | 10/2013 |
| JP | 2013-223043 | | 10/2013 |
| JP | 5606653 | B | 10/2014 |
| JP | 2015-097373 | | 5/2015 |
| JP | 2015-524103 | A | 8/2015 |
| WO | 1994/026063 | A1 | 11/1994 |
| WO | 2009/001465 | | 12/2008 |
| WO | 2009/144853 | A1 | 12/2009 |
| WO | 2011/041466 | A1 | 4/2011 |
| WO | 2013/175803 | | 11/2013 |
| WO | 2013/175803 | A1 | 11/2013 |
| WO | 2014/103155 | | 7/2014 |
| WO | 2015/098108 | A1 | 7/2015 |
| WO | 2015/145544 | A1 | 10/2015 |

OTHER PUBLICATIONS

Singapore Search Report dated Jul. 8, 2016 for the related Singapore Patent Application No. 11201504985W.

International Search Report of PCT application No. PCT/JP2014/005845 dated Feb. 3, 2015.

Singapore Search Report, dated Feb. 8, 2017, for the related Singapore Patent Application No. 11201603241T.

International Search Report of PCT application No. PCT/JP2016/004865, dated Feb. 14, 2017.

English Translation of Chinese Search Report, dated Feb. 16, 2017, for the related Chinese Patent Application No. 201380067923.2.

English Translation of Chinese Search Report, dated Feb. 4, 2017, for the related Chinese Patent Application No. 201380067173.9.

Extended European Search Report, dated Sep. 14, 2016, for the related European Patent Application No. 14848998.2.

Extended European Search Report, dated Aug. 10, 2016, from the European Patent Office for the related European Patent Application No. 14842457.5.

International Search Report of PCT Application No. PCT/JP2015/005672, dated Dec. 15, 2015.

Singapore Search Report and Written Opinion, dated Apr. 20, 2016, for the related Singapore Patent Application No. 11201505027U.

Danakis et al., "Using a CMOS Camera Sensor for Visible Light Communication", 3rd IEEE Workshop on Optical Wireless Communications (OWC '12), Dec. 3-7, 2012, pp. 1244-1248.

The Extended European Search Report dated Dec. 16, 2016 for the related European Patent Application No. 14874981.5.

English Translation of Chinese Search Report dated Nov. 30, 2016 for the related Chinese Patent Application No. 201380067422.4.

English Translation of Chinese Search Report dated Dec. 26, 2016 for the related Chinese Patent Application No. 201380066377.0.

English Translation of Chinese Search Report dated Jan. 4, 2017 for the related Chinese Patent Application No. 201380066360.5.

English Translation of Chinese Search Report dated Jan. 18, 2017 for the related Chinese Patent Application No. 201380067417.3.

English Translation of Chinese Search Report dated Jan. 25, 2017 for the related Chinese Patent Application No. 201380067090.X.

English Translation of Chinese Search Report, dated Nov. 8, 2016, for the related Chinese Patent Application No. 1201380002141.0.

The Extended European Search Report from the European Patent Office, dated May 19, 2016, for the related European Patent Application No. 13868645.6.

(56) References Cited

OTHER PUBLICATIONS

International Search Report, dated Mar. 21, 2017, in International Application No. PCT/JP2016/087072.
English Language Translation of Chinese Search Report, dated Jun. 19, 2017, for the related Chinese Patent Application No. 201380066377.0.
Christos Danakis et al., "Using a CMOS Camera Sensor for Visible Light Communication", 3rd IEEE Workshop on Optical Wireless Communications (OWC'12), pp. 1244-1248, Dec. 7, 2012.
English Translation of Chinese Search Report, dated Oct. 31, 2017, for the related Chinese Patent Application No. 201380067922.8.

When $t_{HT}$ = 20 microseconds

Alignment of display position and imaging position

Transmitter receives signal from other transmitter, and changes transmission protocol or transmits signal in period during which other transmitter is not transmitting signal, to prevent its transmission signal from interfering with transmission signal from other transmitter In the case where signal control is only partially possible and receivable range needs to be widened, edge part is controlled Provide uniform light emitting portion in part of sign to facilitate reception Arrange uniform light emitting portion so that uniform light emitting portion is present in large size in whichever direction image is captured FIG. 77
| Signal | Rise position | Brightness | | |
|---|---|---|---|---|
| | | 75 % (Basic) | 99 % | 1 % |
| 00 | Position of 25% | 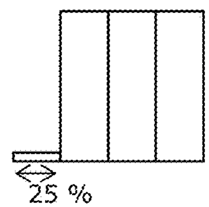 | 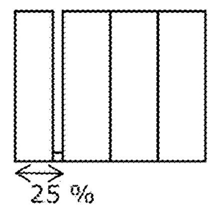 | 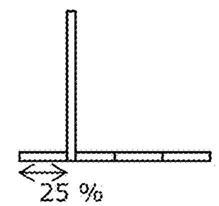 |
| 01 | Position of 50% | 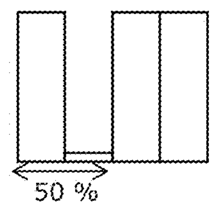 | 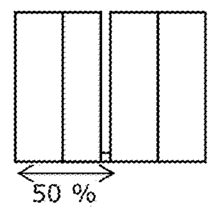 | 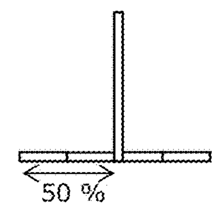 |
| 10 | Position of 75% | 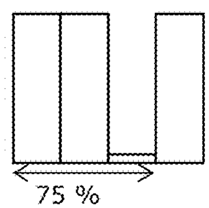 | 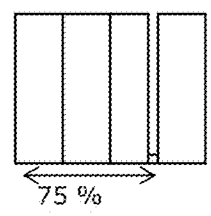 | 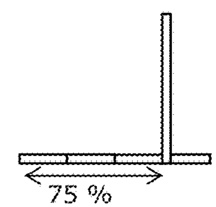 |
| 11 | None | 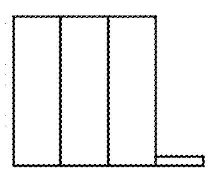 | 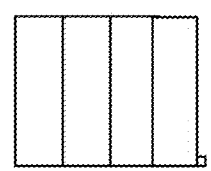 | 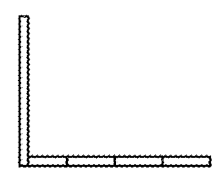 |

FIG. 78
| Signal | Rise position | Brightness | | |
|---|---|---|---|---|
| | | 75 % | 99 % | 1 % |
| 00 | Position of 25% | 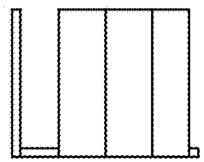 | 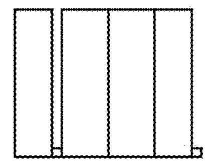 | 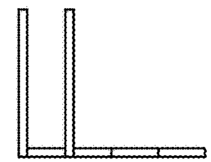 |
| 01 | Position of 50% | 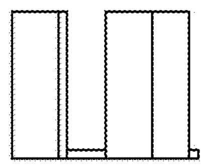 | 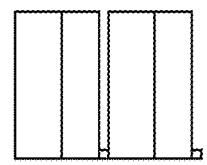 | 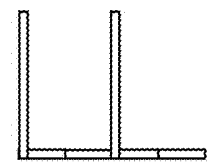 |
| 10 | Position of 75% | 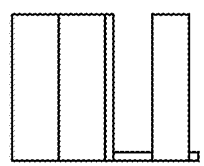 | 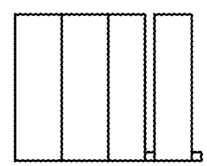 | 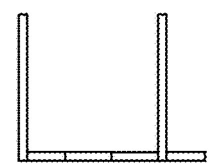 |
| 11 | None | 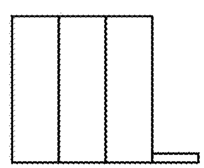 | 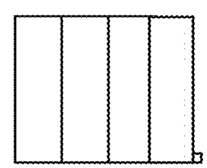 | 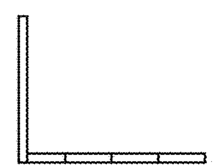 |

FIG. 116

| | | |
|---|---|---|
| ID | 100 | 110 |
| Frequency | 2 kHz | 1 kHz |
| Signal | 1002 | 1101 |

FIG. 139

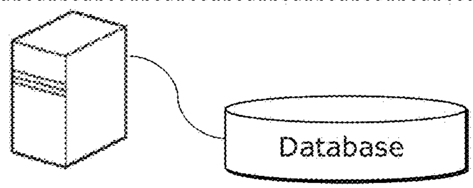

| ID | Data | Condition | Number of accesses | Number of successful accesses |
|---|---|---|---|---|
| 1000 | http://~~~ | From 2013/10/10 09:00 to 2013/10/25 20:00 | 1234 | 567 |
| 2000 | "Hello world" | Number of successful accesses is less than or equal to 100 | 153 | 100 |
| 3000 | 10% off | Female only | 9999 | 666 |
| 4000 | Position data (east longitude, north latitude, altitude, floor number, room number, etc.) | None | 2 | 2 |

(a)ID-data table

| ID | User ID | Time | Ancillary information | Whether or not data is provided |
|---|---|---|---|---|
| 1000 | 35393 | 2013/10/25 19:11 | Male, age 20, student ... | ○ / http://~~~ |
| 1000 | 49282 | 2013/10/25 19:57 | Female, age 30, housewife ... | ○ / http://~~~ |
| 1000 | 222 | 2013/10/25 20:15 | Male, age 40, civil servant ... | × / "Error" |
| 2000 | 30455 | 2013/10/27 12:12 | Female, age 50, unemployed ... | ○ / "Hello world" |

(b) Access log table

FIG. 169
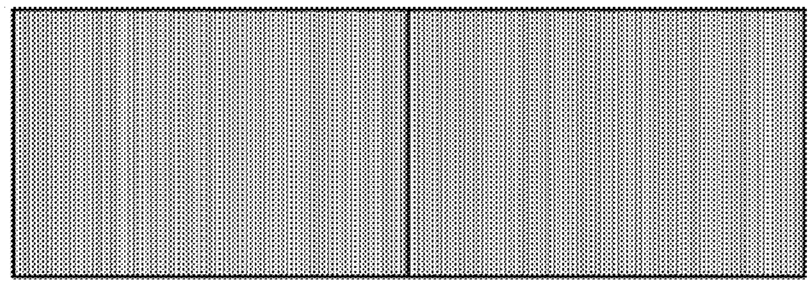
(a)When transmitting same data
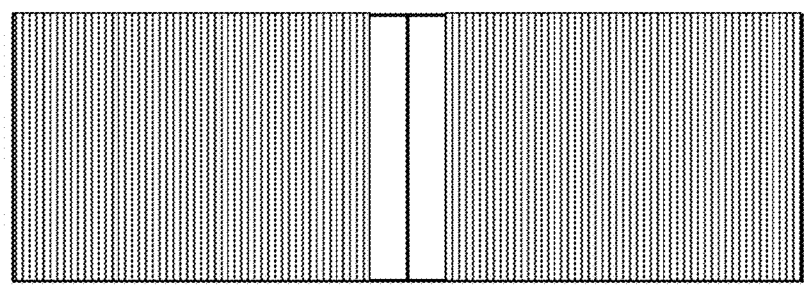
(b)When transmitting different data

FIG. 174

| Membership number | Store ID | Time | Position information |
|---|---|---|---|
| User preference information | | User biological information | |
| User search history | | User behavior history | |

FIG. 177

| Membership number | Store ID | Time | Store map DB |
| --- | --- | --- | --- |
| Coupon information<br>Store product information | | User membership information (points, expiration date, etc.) | |

CPRM can be cleared in predetermined time after light reception

FIG. 235

| TYPE definition | TYPEBIT | BODY length | ADDR length | DATA length | Concatenation number | Effective DATA length | CRC type |
|---|---|---|---|---|---|---|---|
| TYPE1 | 000 | 20 SLOT | 2 BIT | 5 BIT | 4 | 16 BIT | CRC-4 |
| TYPE2 | 001 | 24 SLOT | 4 BIT | 5 BIT | 8 | 32 BIT | CRC-8 |
| TYPE3 | 010 | 24 SLOT | 5 BIT | 4 BIT | 19 | 64 BIT | CRC-12 |
| TYPE4 | 011 | 28 SLOT | 5 BIT | 6 BIT | 24 | 128 BIT | CRC-16 |

FIG. 278

| Header | Body (4PPM) |
|---|---|

| | Header pattern | Required number of slots for identification | Greatest number of continuous 0 slots |
|---|---|---|---|
| (a) | 111111111000 | 4 | 4 |
| (b) | 111111110001 | 5 | 3 |
| (c) | 111111101001 | 6 | 2 |
| (d) | 111111100101 | 6 | 2 |

(a) Flow in receiver 10133a (b) Flow in electronic device A (transmitter 10133c)

(c) Flow in electronic device B (10133e)

INFORMATION PROCESSING METHOD FOR GENERATING ENCODED SIGNAL FOR VISIBLE LIGHT COMMUNICATION

BACKGROUND

1. Technical Field

The present disclosure relates to a method of communication between a mobile terminal such as a smartphone, a tablet terminal, or a mobile phone and a home electric appliance such as an air conditioner, a lighting device, or a rice cooker.

2. Description of the Related Art

In recent years, a home-electric-appliance cooperation function has been introduced for a home network, with which various home electric appliances are connected to a network by a home energy management system (HEMS) having a function of managing power usage for addressing an environmental issue, turning power on/off from outside a house, and the like, in addition to cooperation of AV home electric appliances by internet protocol (IP) connection using Ethernet® or wireless local area network (LAN). However, there are home electric appliances whose computational performance is insufficient to have a communication function, and home electric appliances which do not have a communication function due to a matter of cost.

In order to solve such a problem, Japanese Unexamined Patent Application Publication No. 2002-290335 discloses a technique of efficiently establishing communication between devices among limited optical spatial transmission devices which transmit information to a free space using light, by performing communication using plural single color light sources of illumination light.

However, the conventional method is limited to a case in which a device to which the method is applied has three color light sources such as an illuminator.

SUMMARY

One non-limiting and exemplary embodiment provides a non-transitory computer-readable recording medium storing an information processing program or a reception program that solves this problem and enables communication between various devices including a device with low computational performance.

In one general aspect, the techniques disclosed here feature a non-transitory computer-readable recording medium storing an information processing program for causing a computer to process transmission information to be transmitted so that the transmission information is transmitted by changing luminance. The information processing program includes instructions that, when executed, cause the computer to perform operations including encoding the transmission information to generate an encoded signal; dividing the generated encoded signal into four signal parts in a case where the encoded signal has a number of bits within a range of 24 bits to 64 bits; and sequentially outputting the four signal parts.

According to an embodiment of the present disclosure, a non-transitory computer-readable recording medium storing an information processing program or a reception program that solves this problem and enables communication between various devices including a device with low computational performance may be achieved.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 77 is a diagram illustrating an example of a PPM modulation scheme by a transmitter in Embodiment 3;

FIG. 78 is a diagram illustrating an example of a PPM modulation scheme by a transmitter in Embodiment 3;

FIG. 97 is a diagram illustrating an example of next operation of a receiver in a store search situation in Embodiment 4;

FIG. 98 is a diagram illustrating an example of operation of a receiver in a movie advertisement situation in Embodiment 4;

FIG. 99 is a diagram illustrating an example of next operation of a receiver in a movie advertisement situation in Embodiment 4;

FIG. 100 is a diagram illustrating an example of next operation of a receiver in a movie advertisement situation in Embodiment 4;

FIG. 101 is a diagram illustrating an example of next operation of a receiver in a movie advertisement situation in Embodiment 4;

FIG. 102 is a diagram illustrating an example of operation of a receiver in a museum situation in Embodiment 4;

FIG. 103 is a diagram illustrating an example of next operation of a receiver in a museum situation in Embodiment 4;

FIG. 104 is a diagram illustrating an example of next operation of a receiver in a museum situation in Embodiment 4;

FIG. 105 is a diagram illustrating an example of next operation of a receiver in a museum situation in Embodiment 4;

FIG. 106 is a diagram illustrating an example of next operation of a receiver in a museum situation in Embodiment 4;

FIG. 107 is a diagram illustrating an example of next operation of a receiver in a museum situation in Embodiment 4;

FIG. 108 is a diagram illustrating an example of operation of a receiver in a bus stop situation in Embodiment 4;

Figure 109:
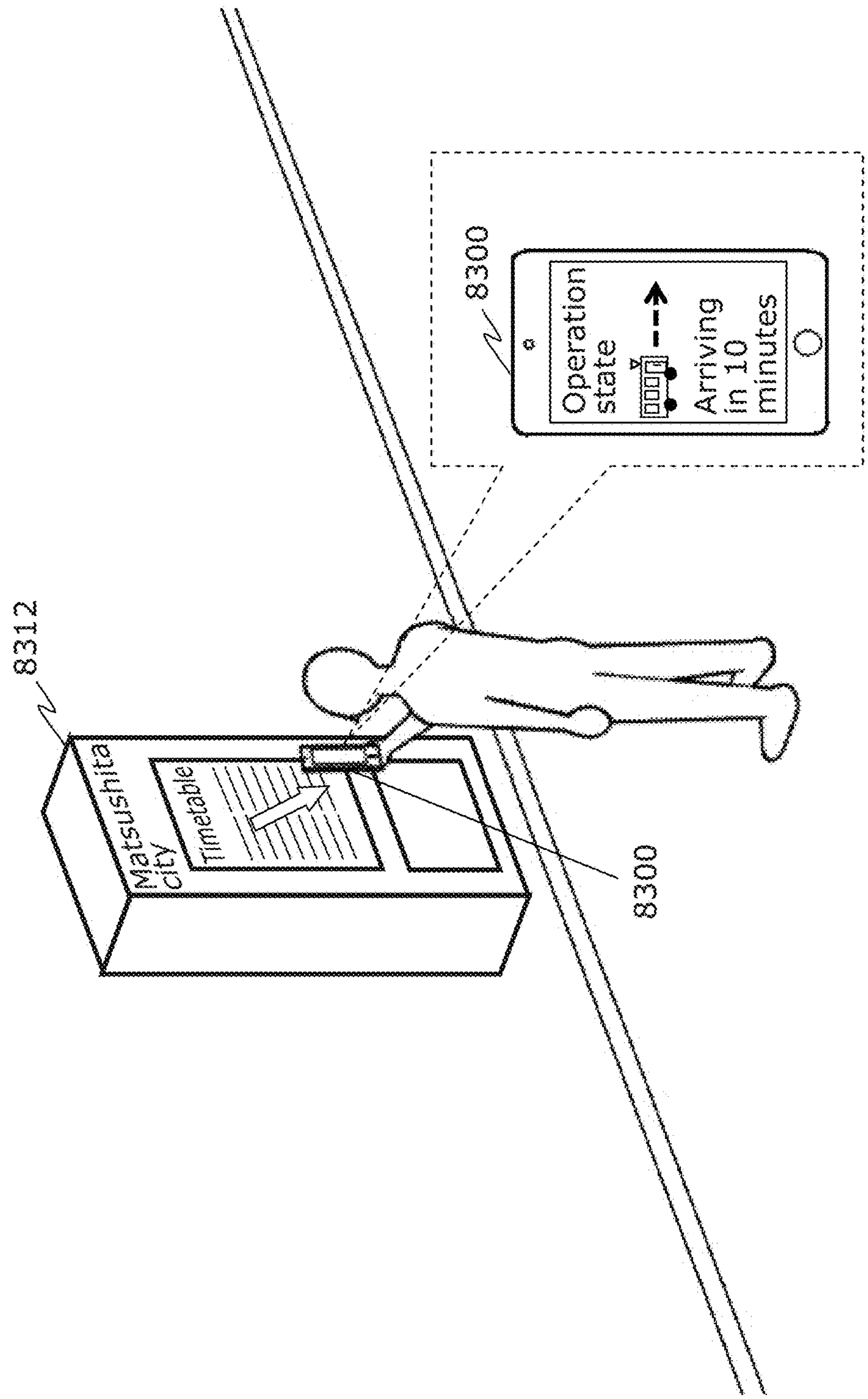
Figure 110:
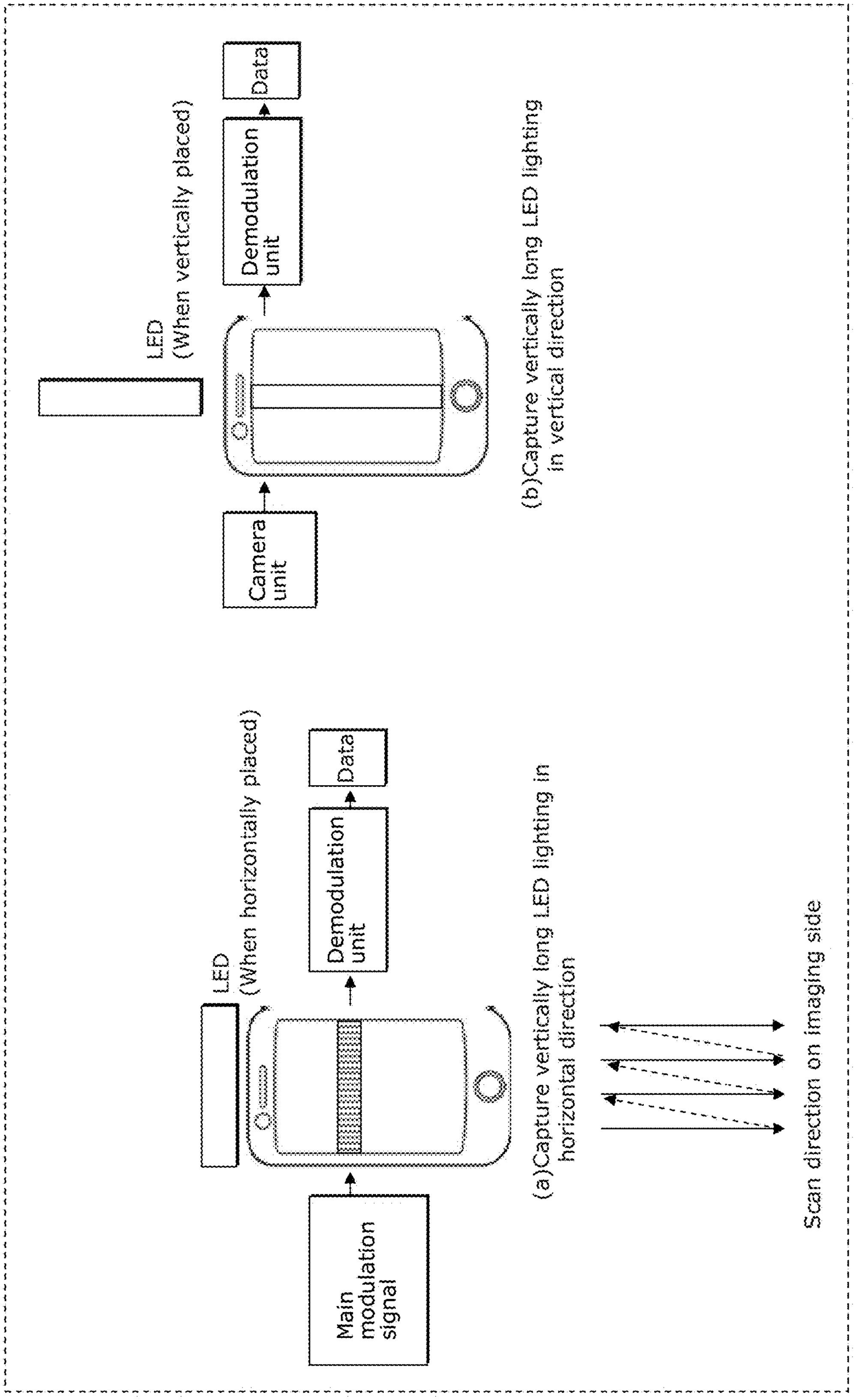
Figure 111:
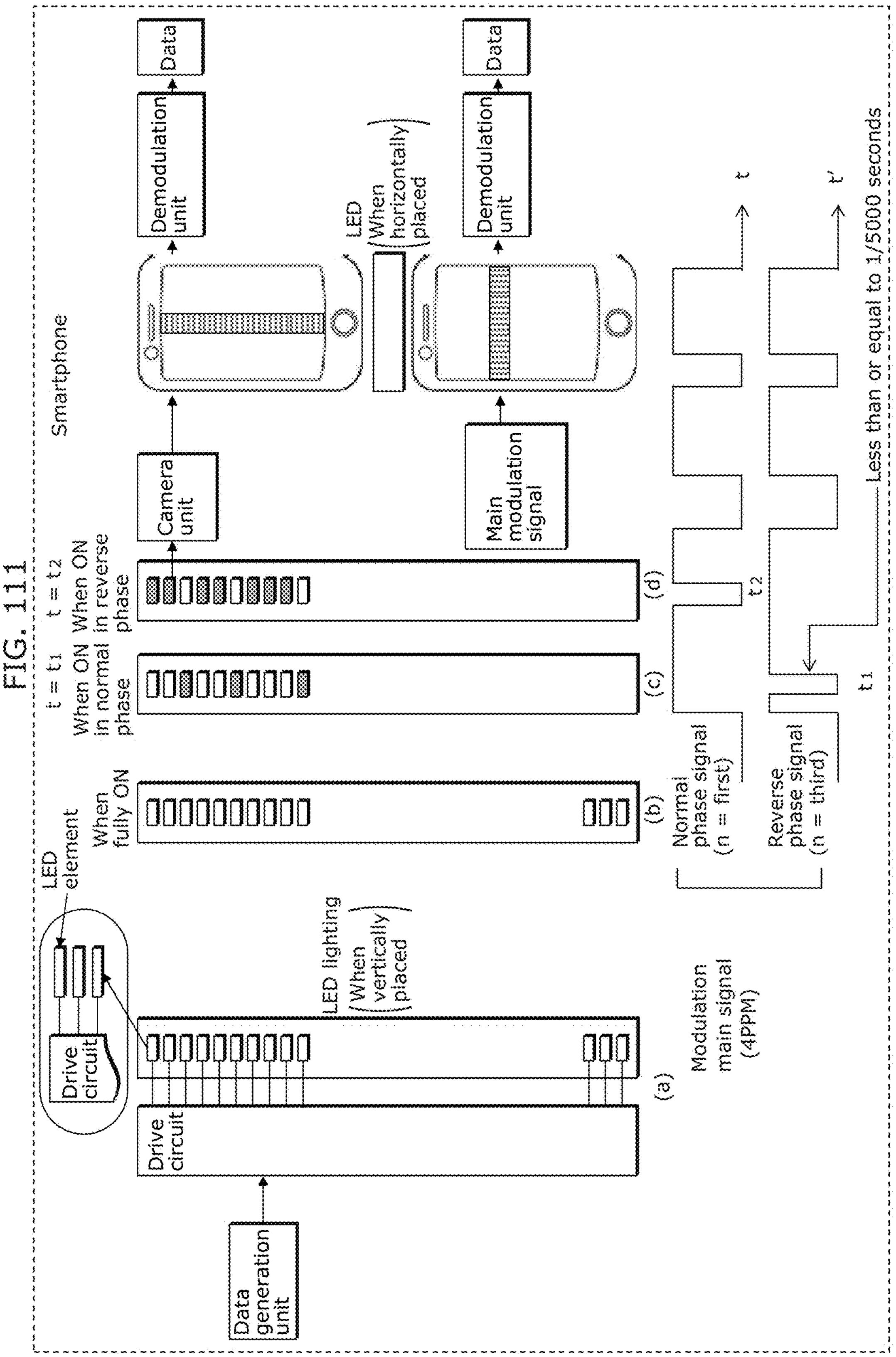
Figure 112:
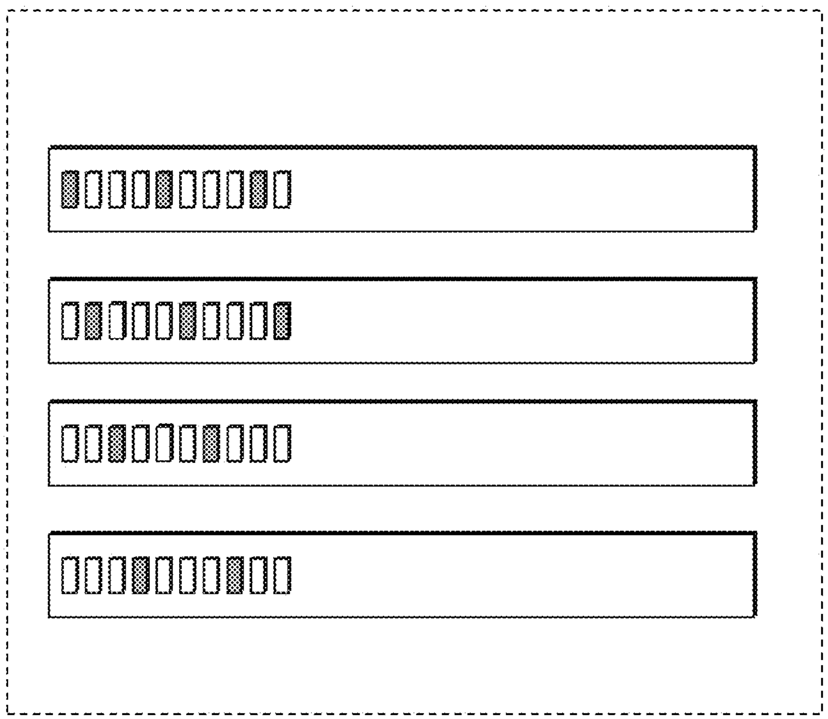
Figure 113:
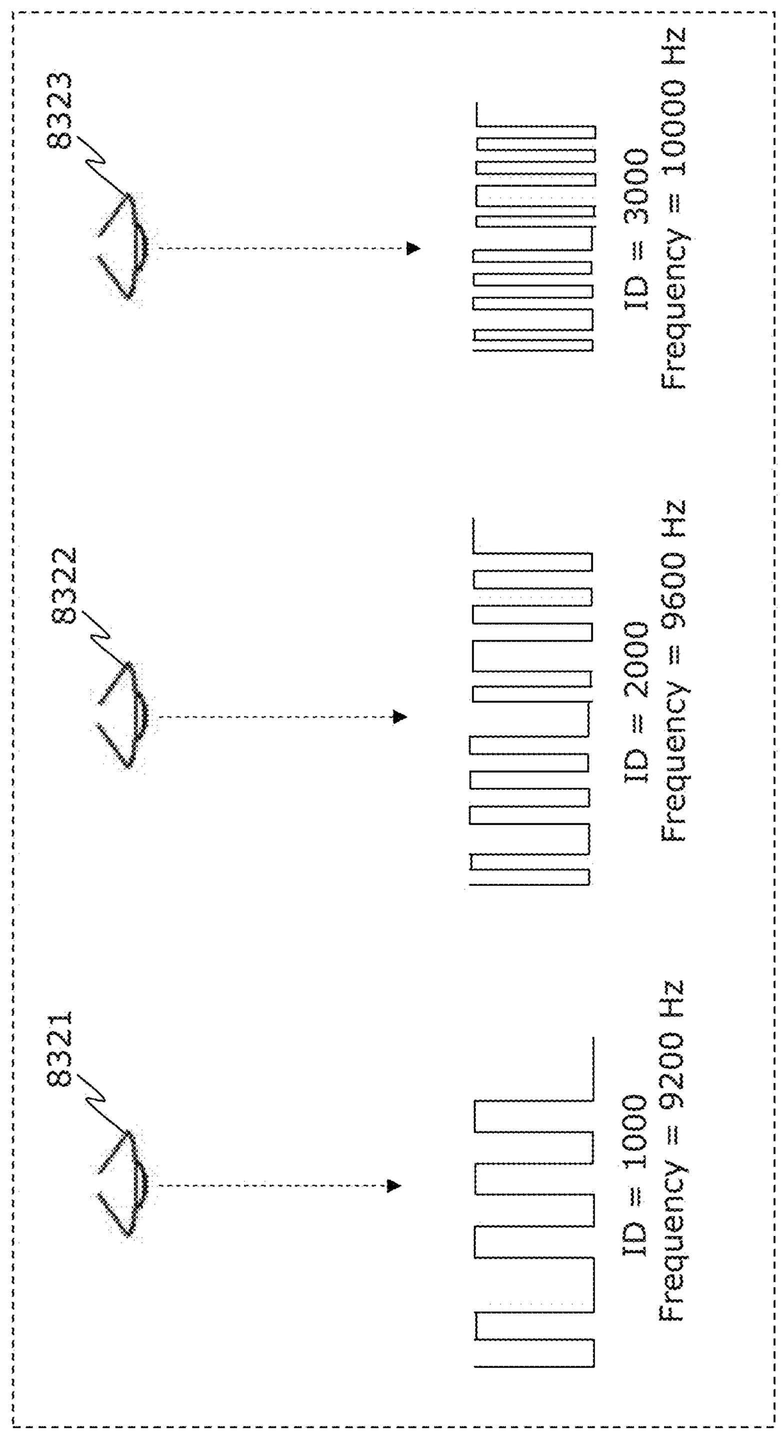
Figure 114:
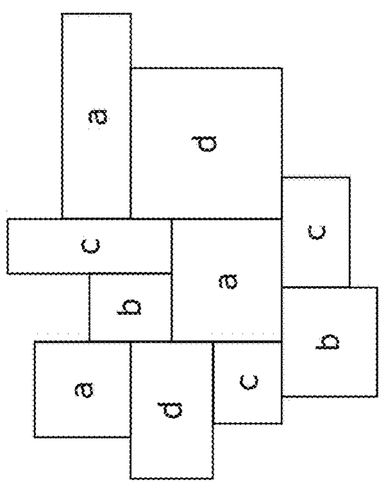
Figure 115:
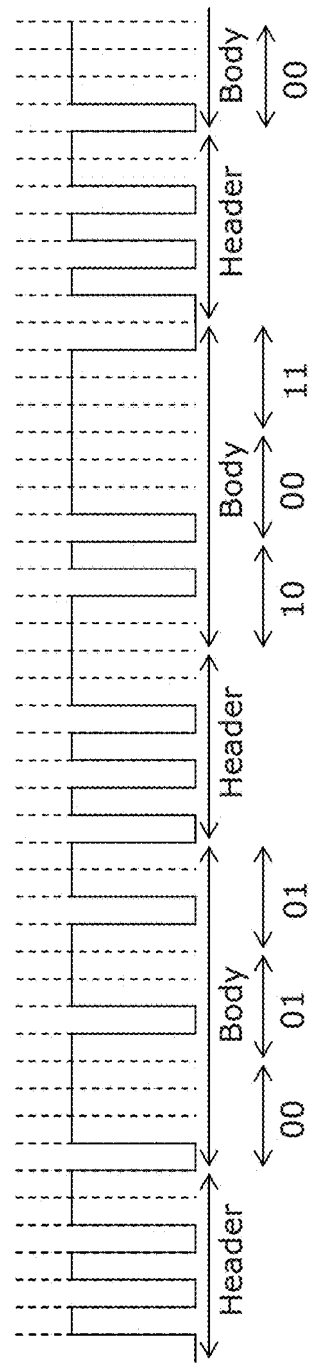
Figure 117:
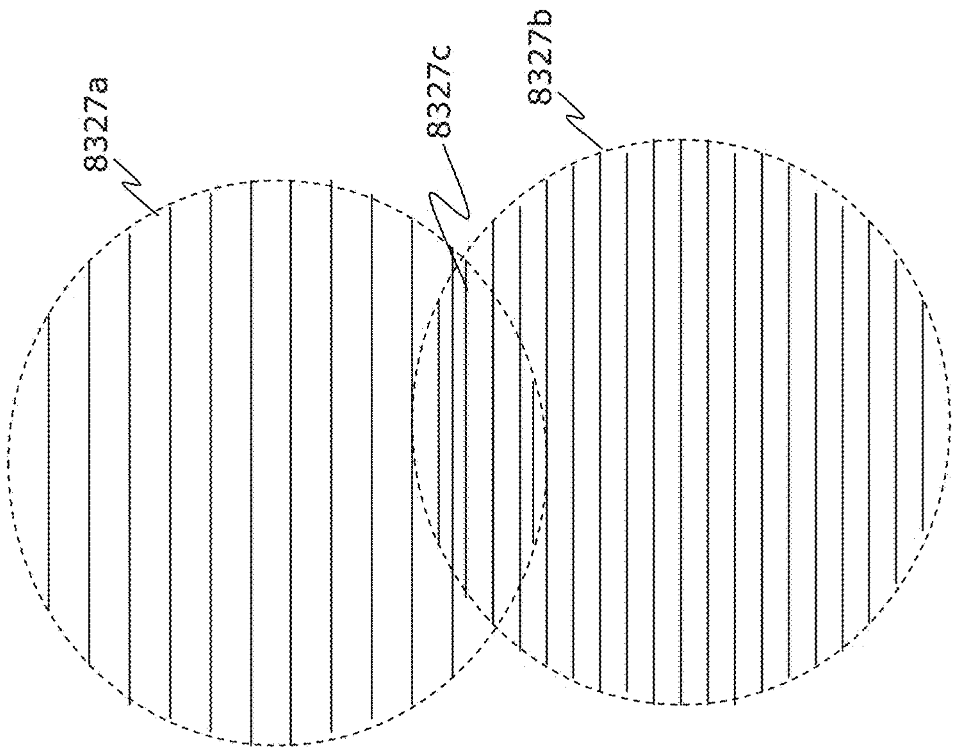
Figure 118:
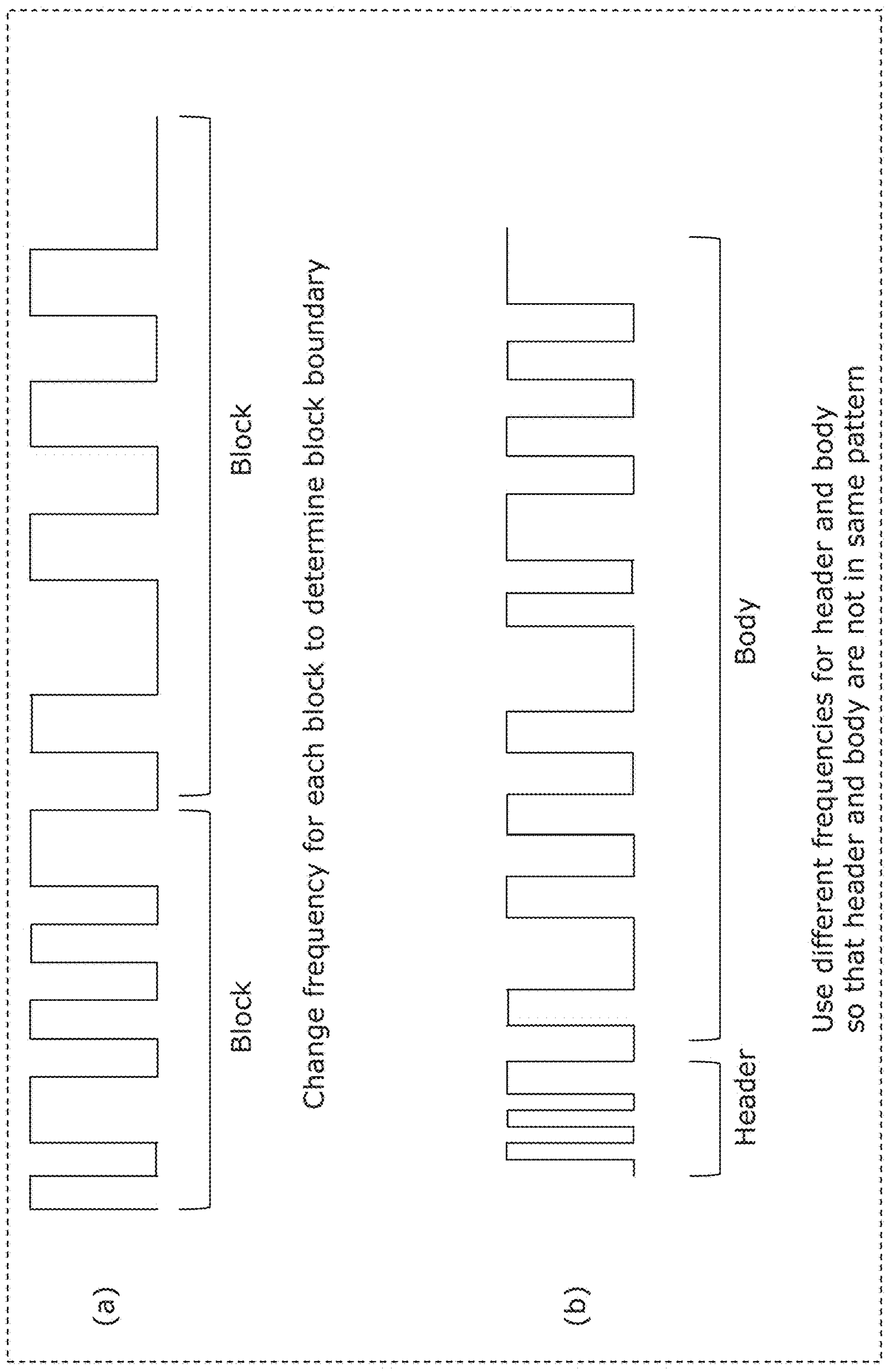
Figure 119:
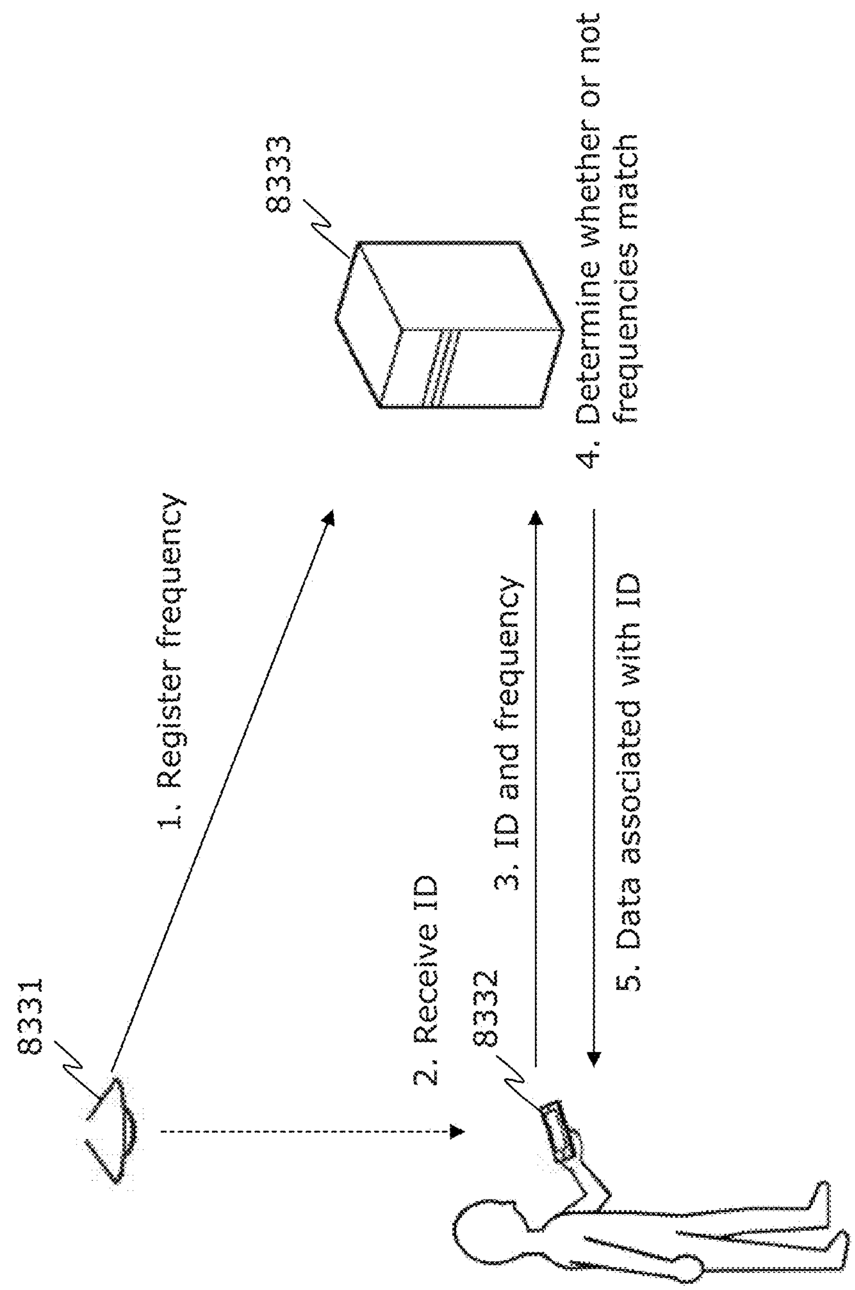
Figure 120:
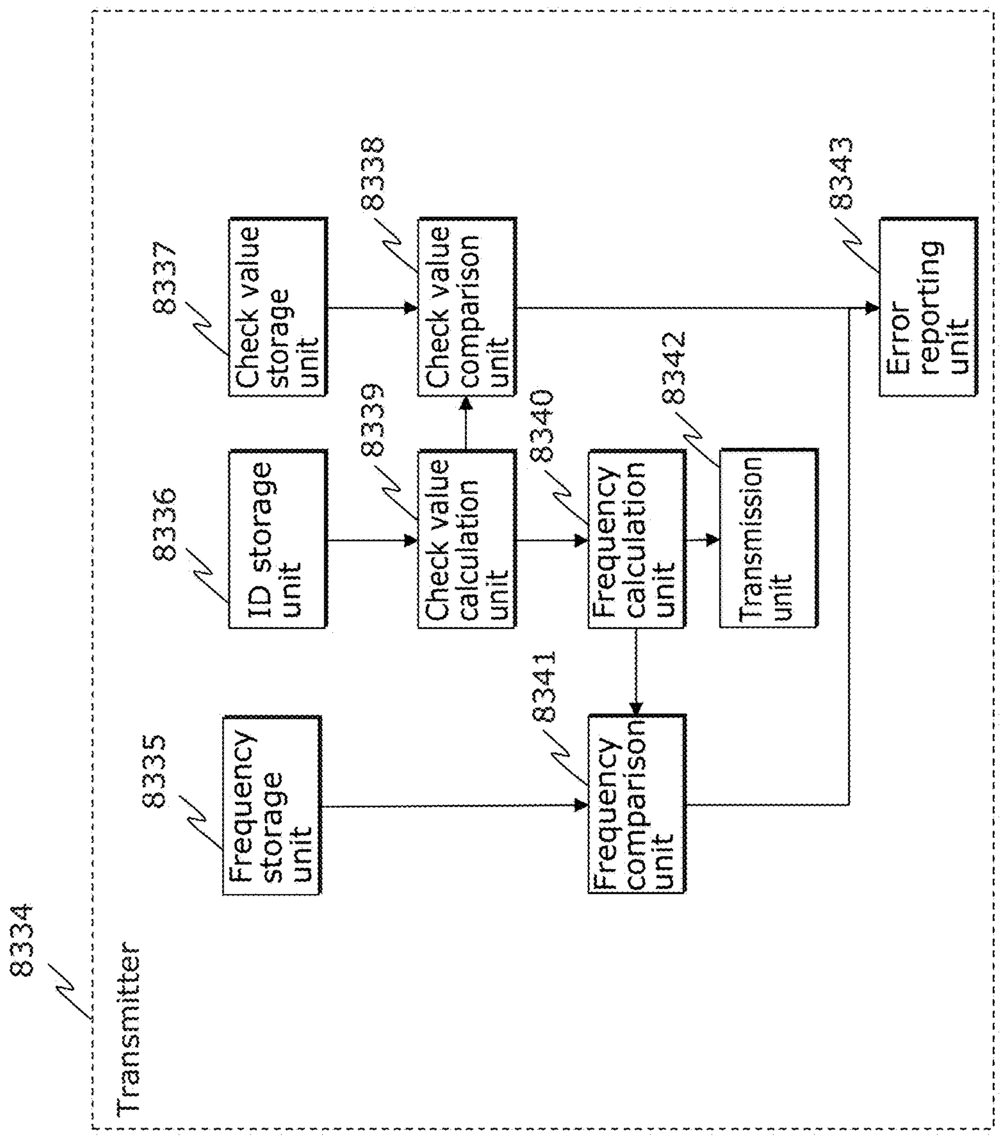
Figure 121:
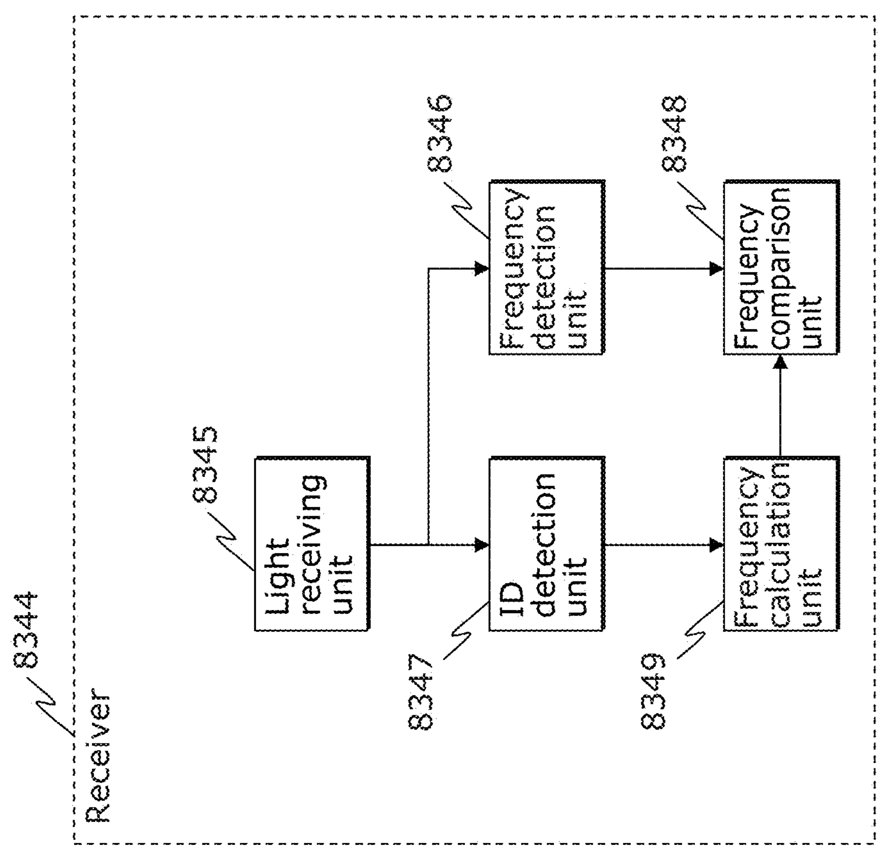
Figure 122:
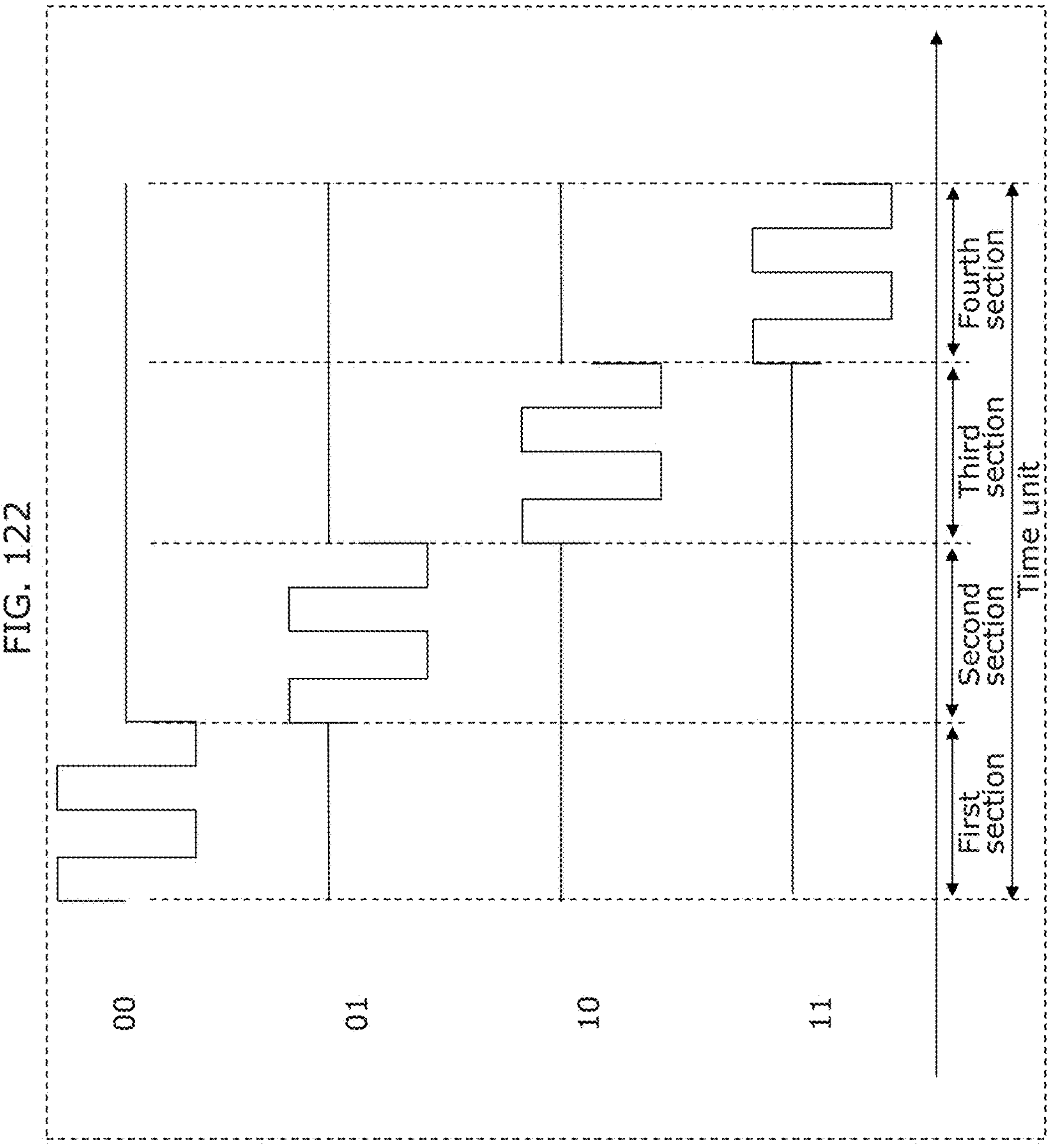
Figure 124:
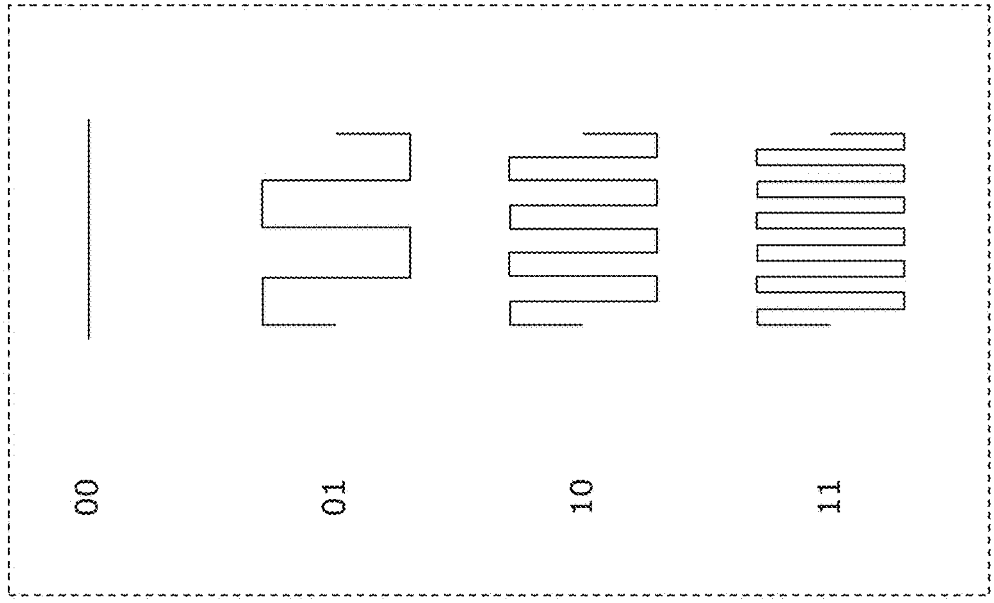
Figure 123:
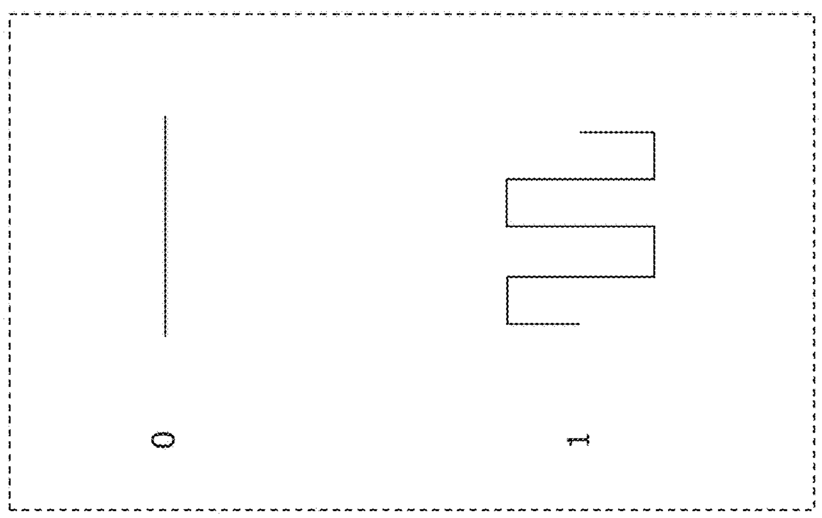
Figure 125:
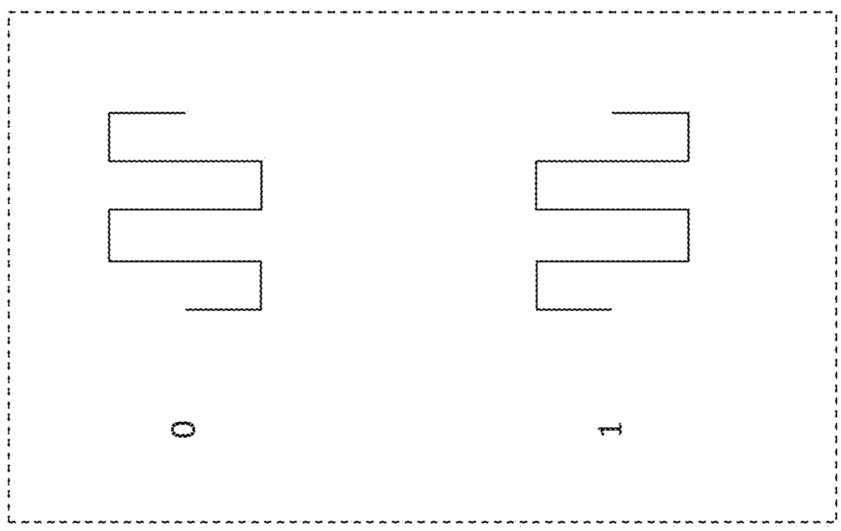
Figure 126:
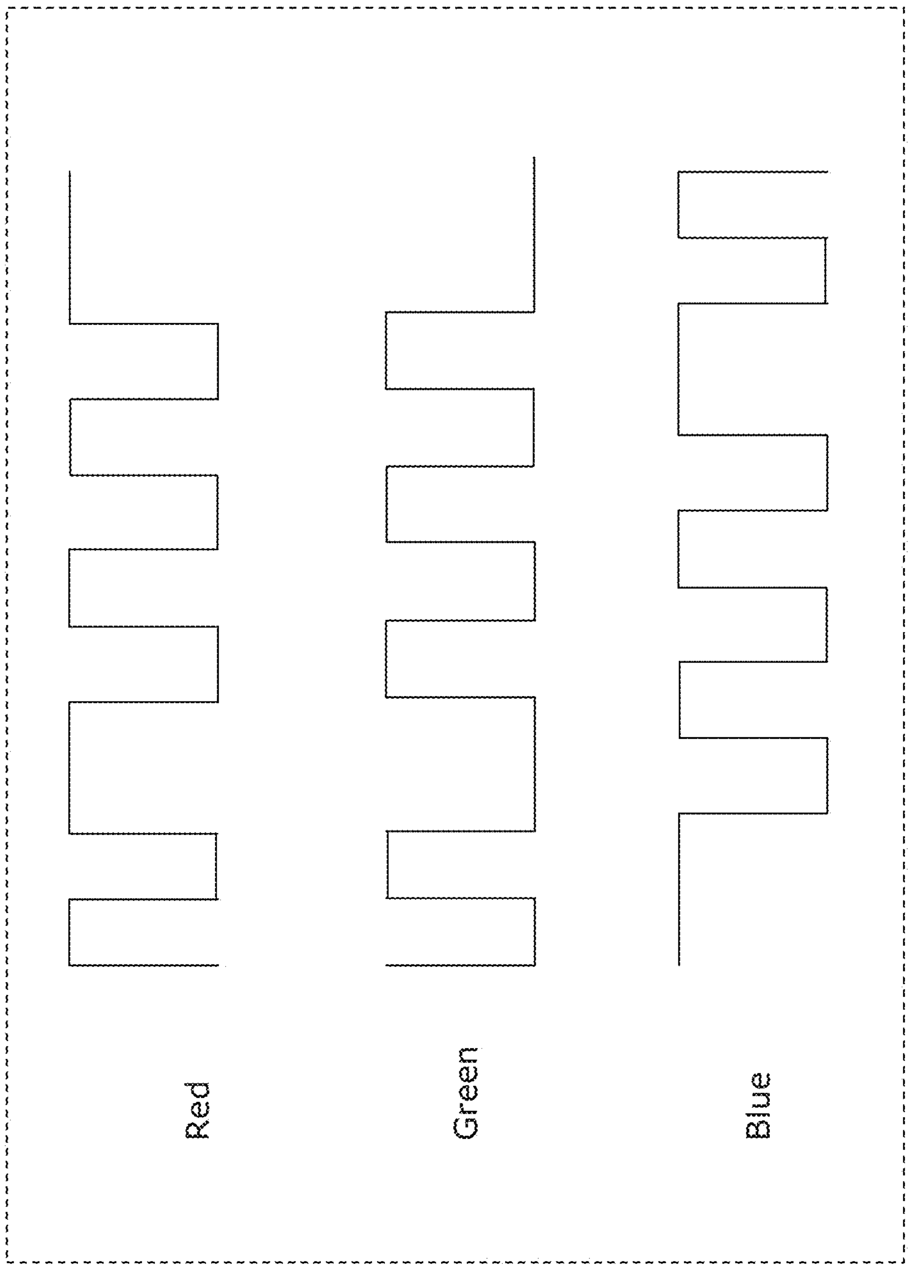
Figure 127:
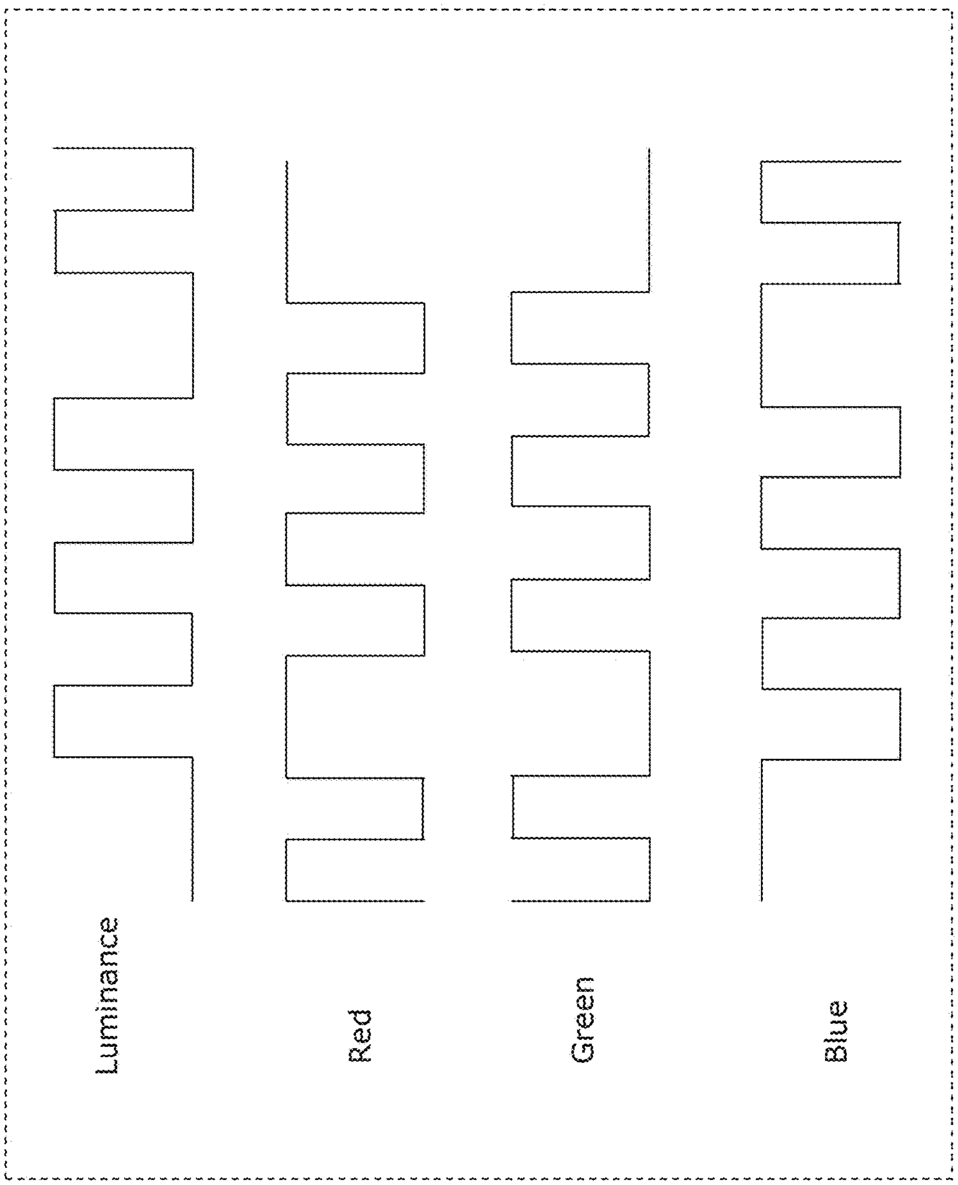
Figure 128:
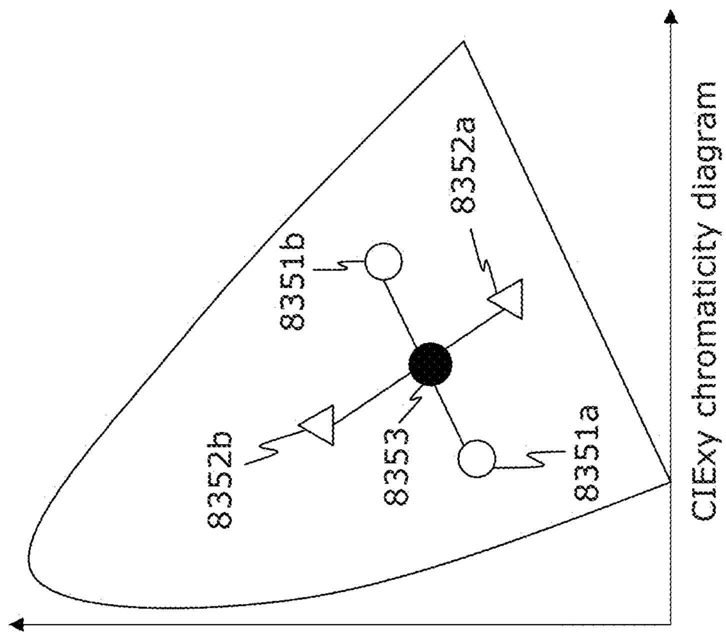
Figure 129:
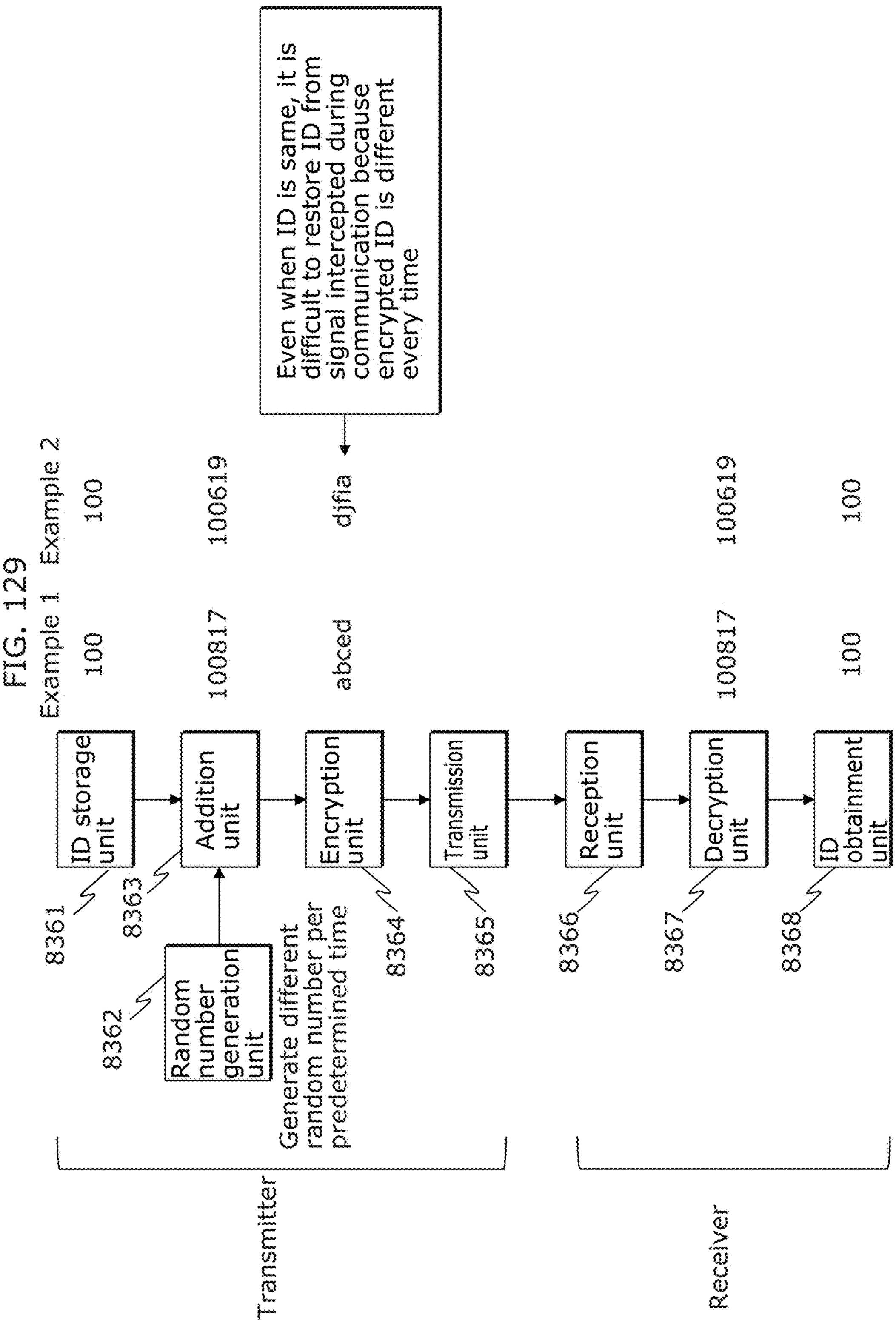
Figure 130:
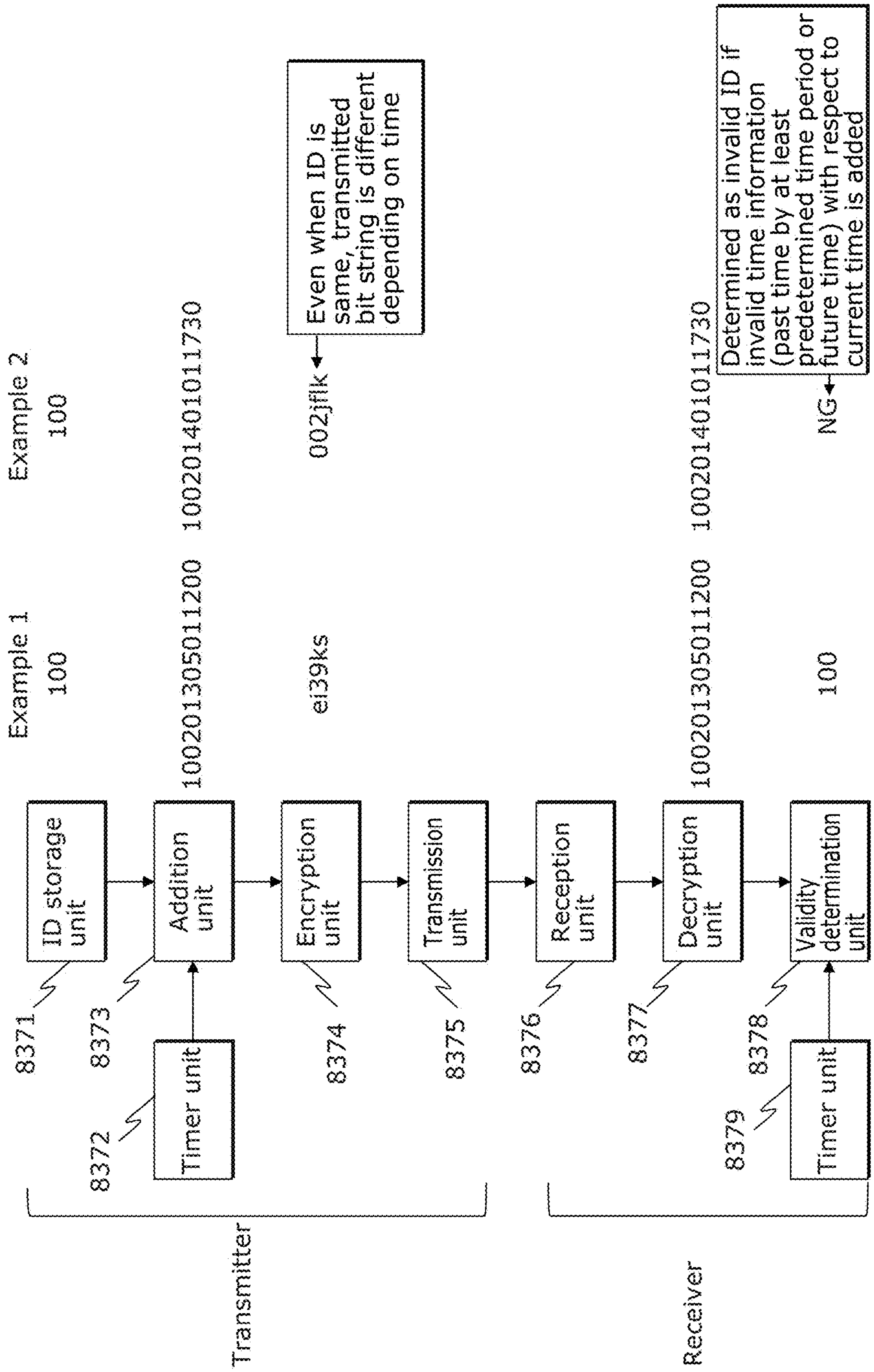
Figure 131:
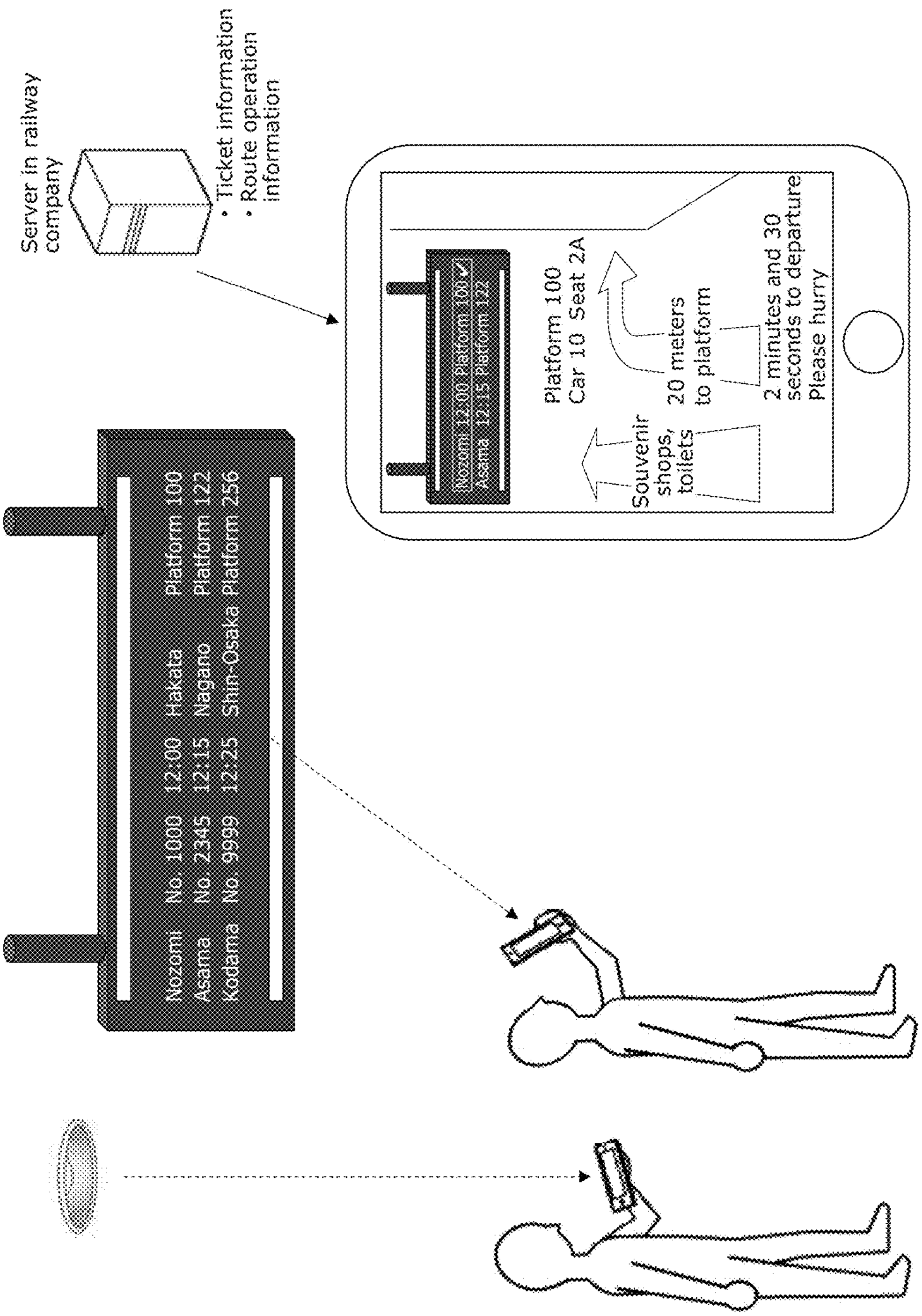
Figure 132:
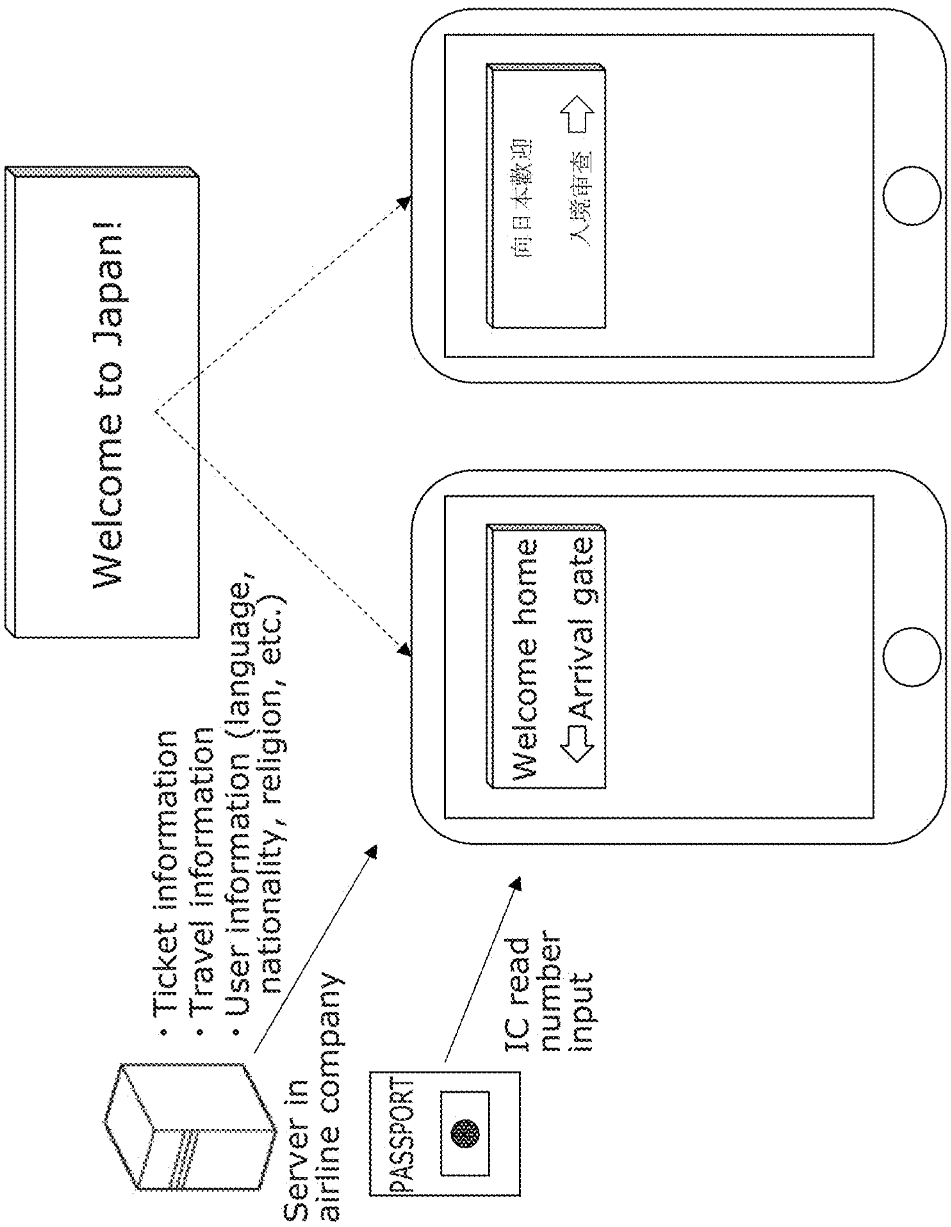
Figure 133:
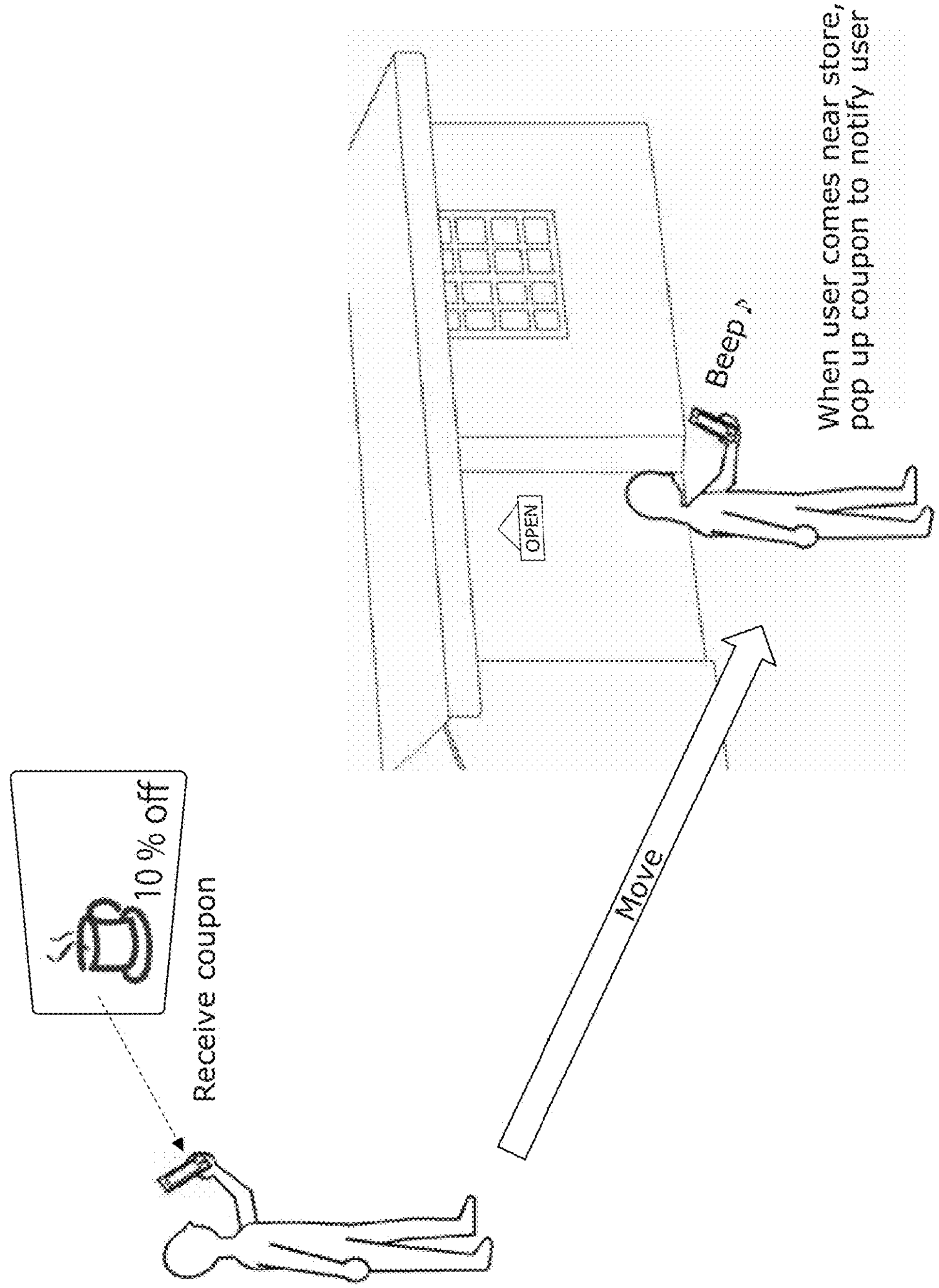
Figure 134:
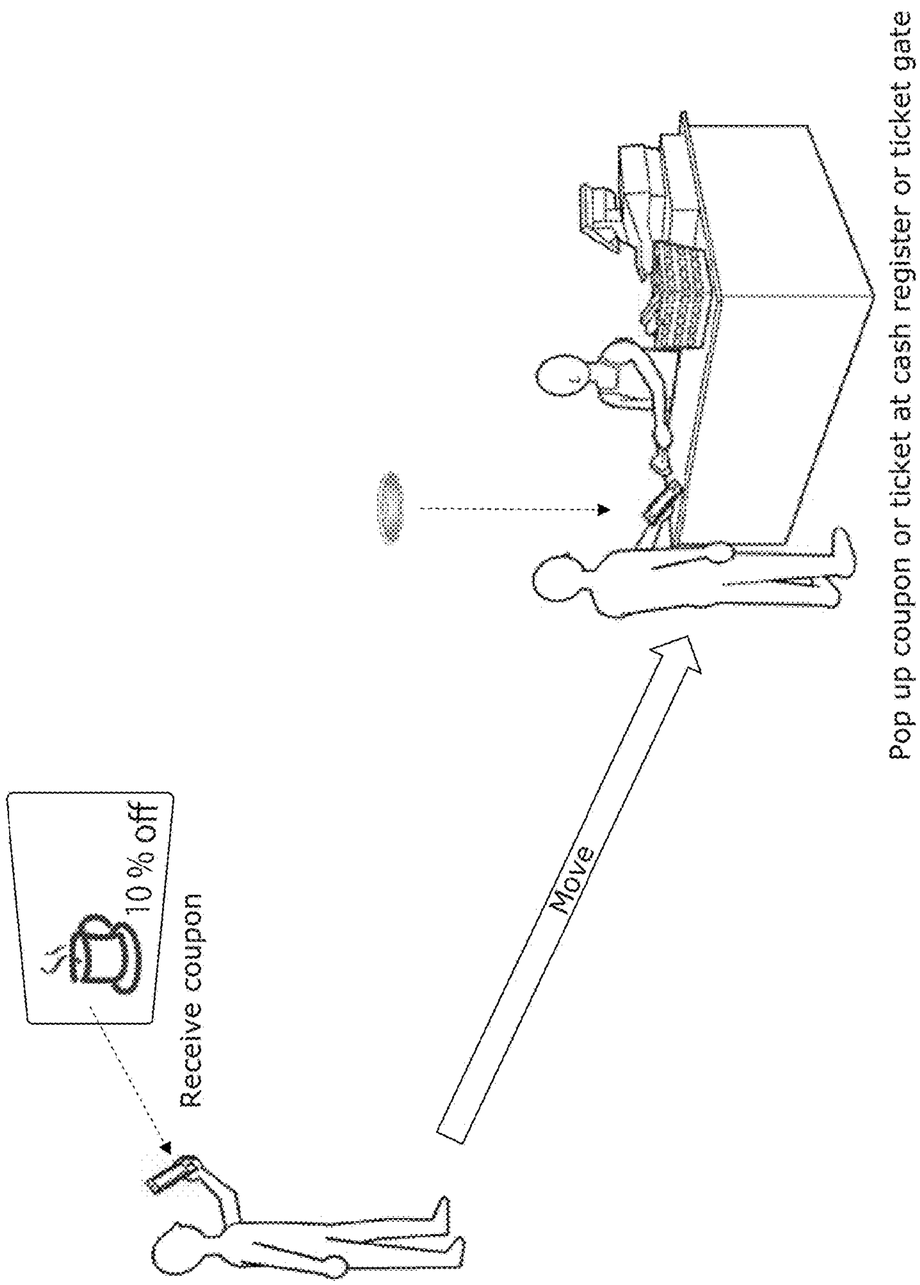
Figure 135:
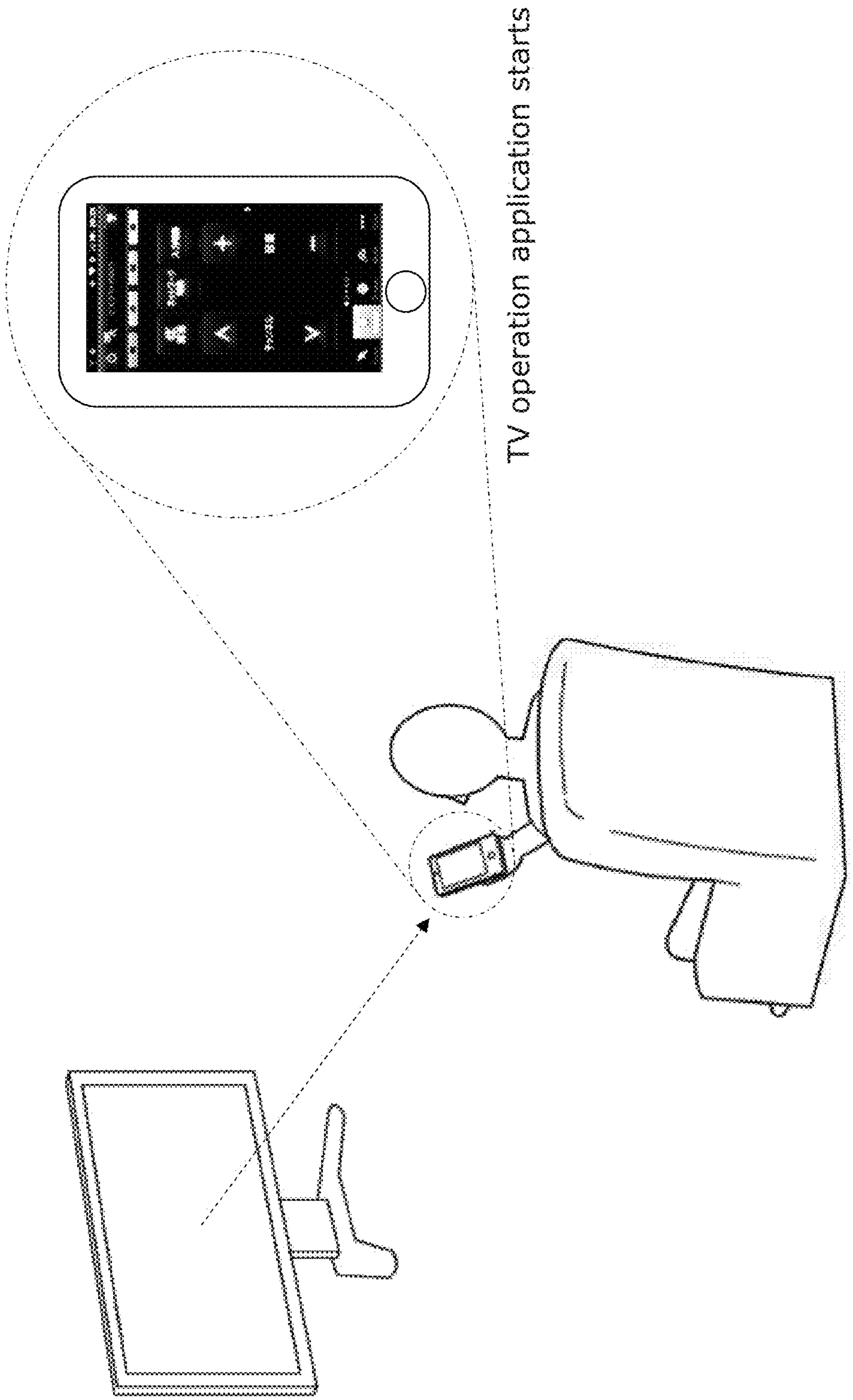
Figure 136:
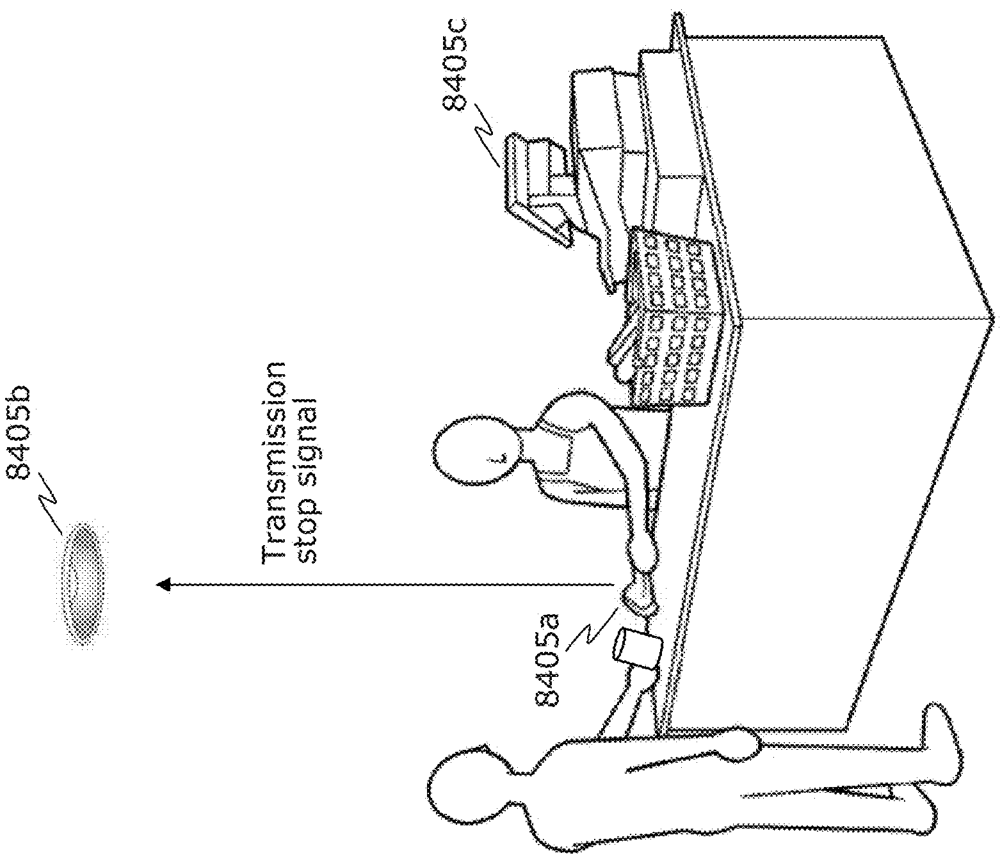
Figure 137:
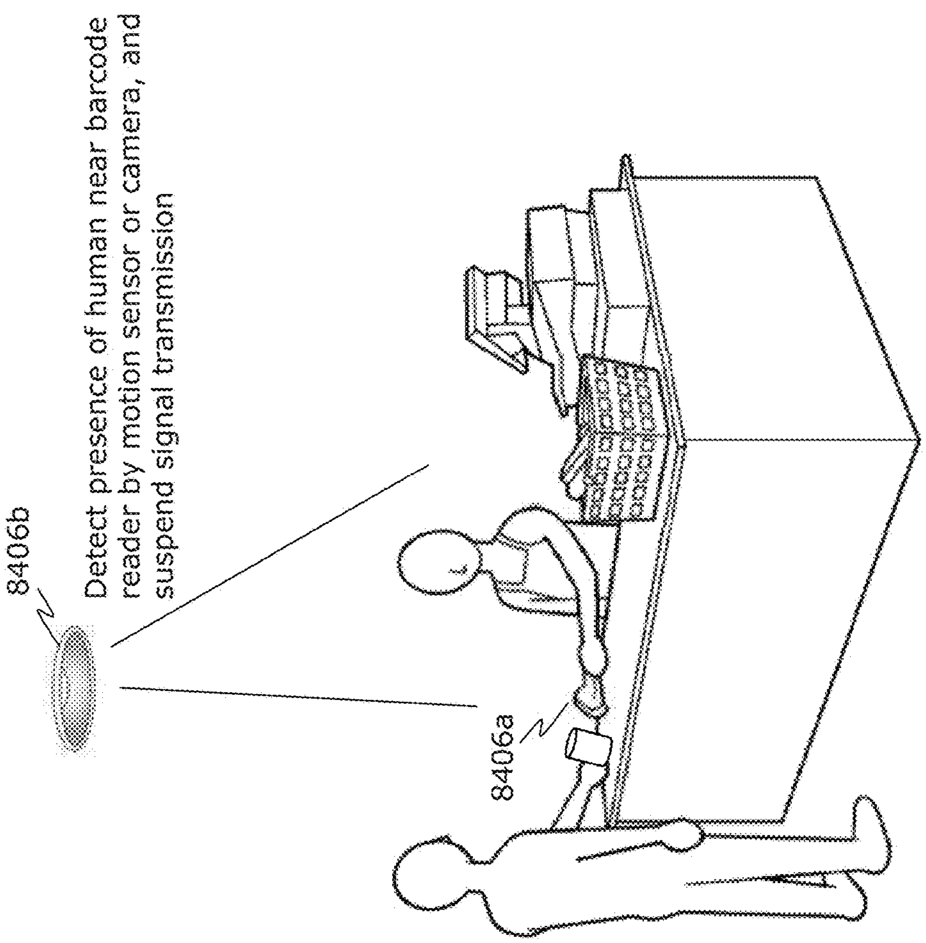
Figure 138:
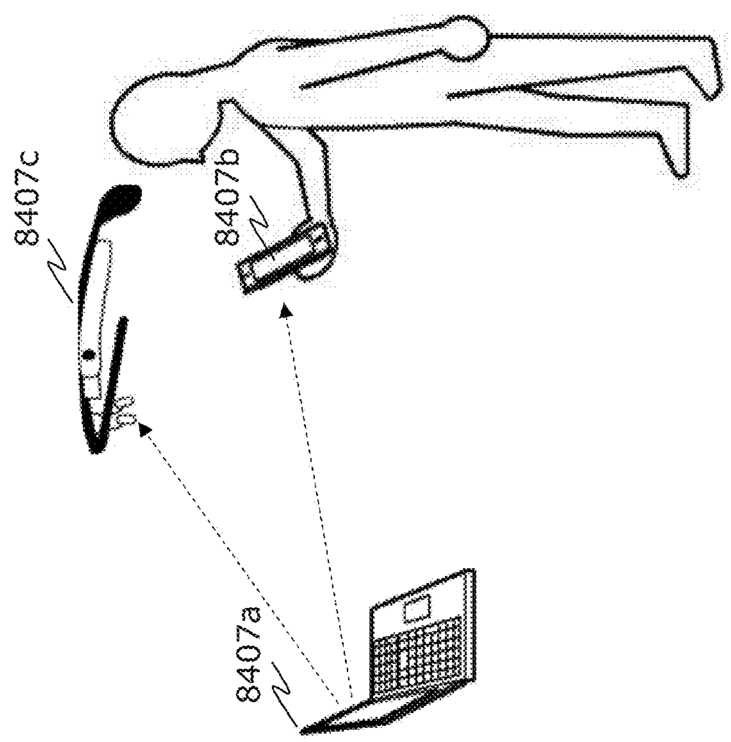
Figure 140:
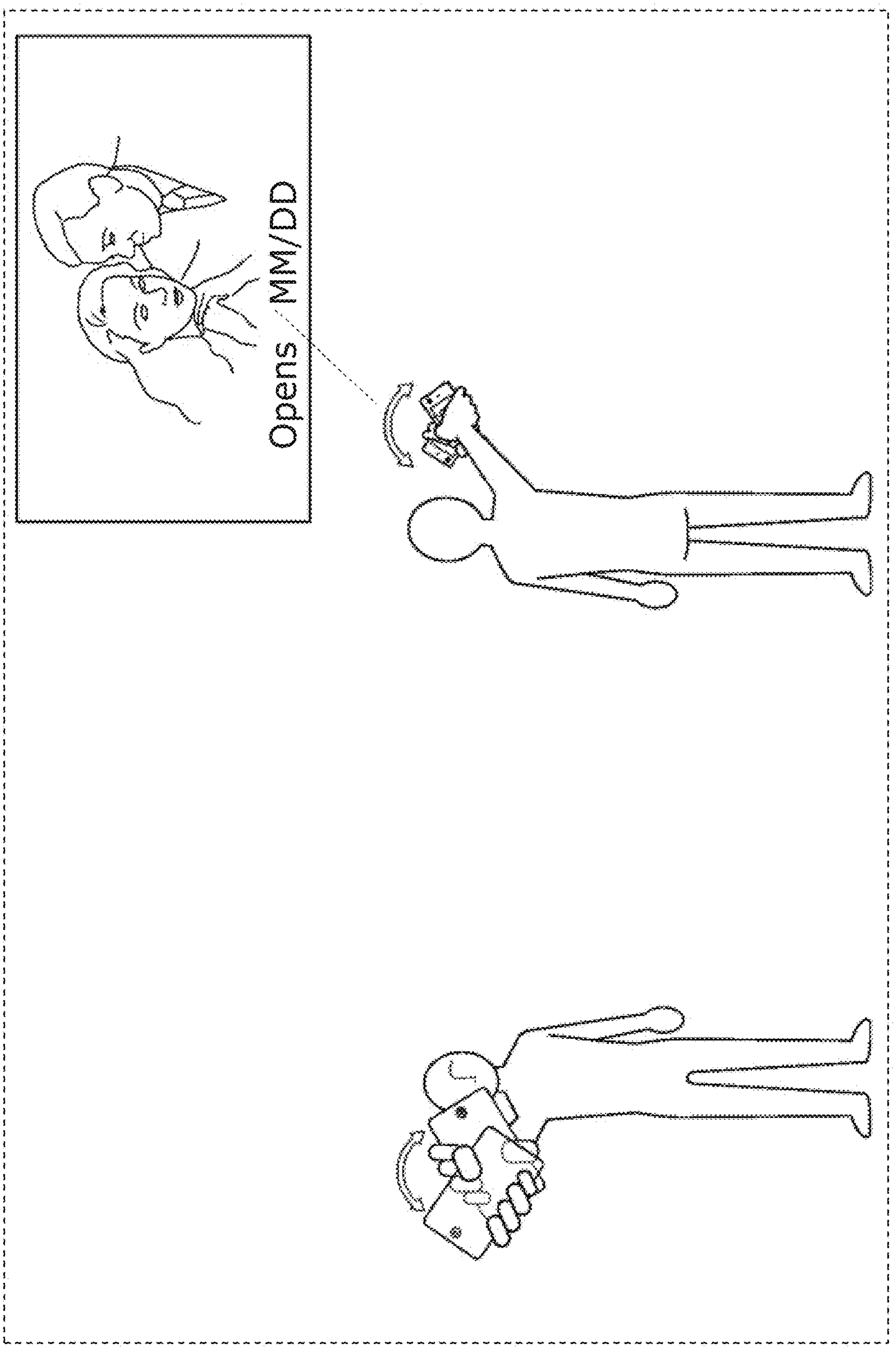
Figure 141:
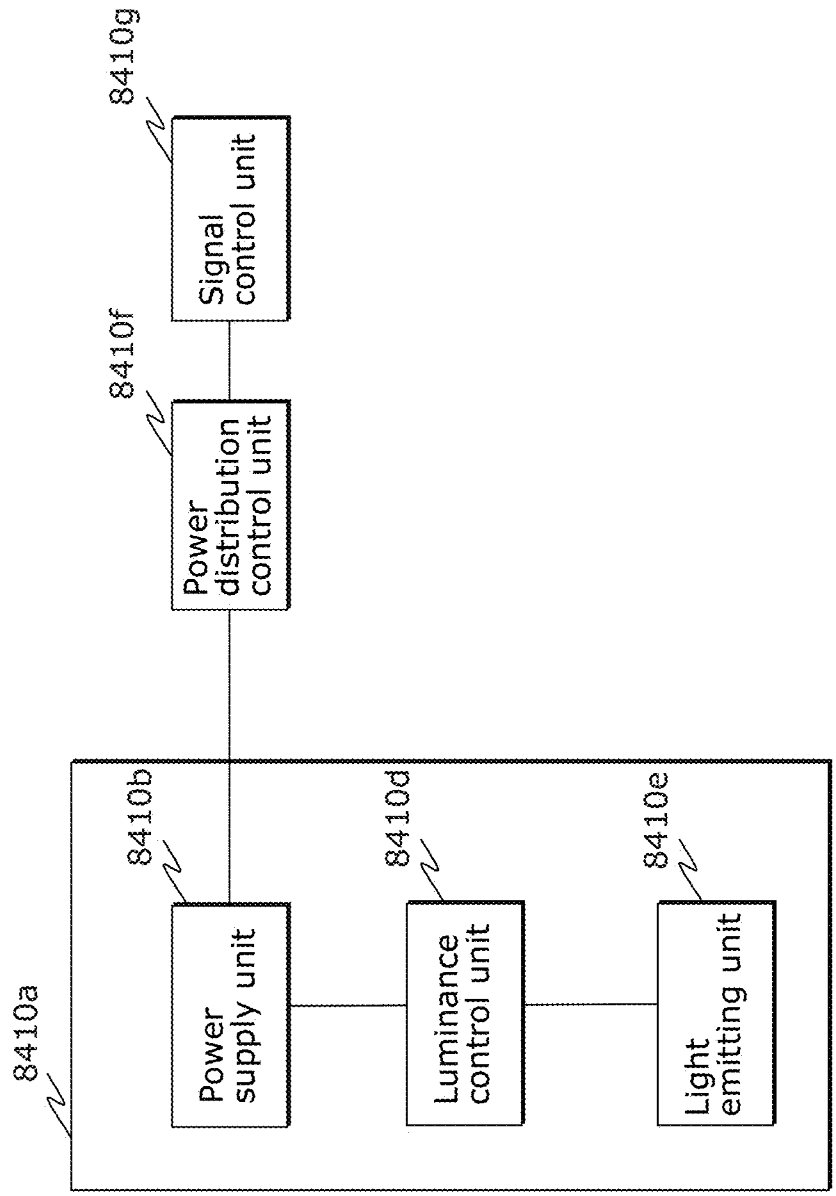
Figure 142:
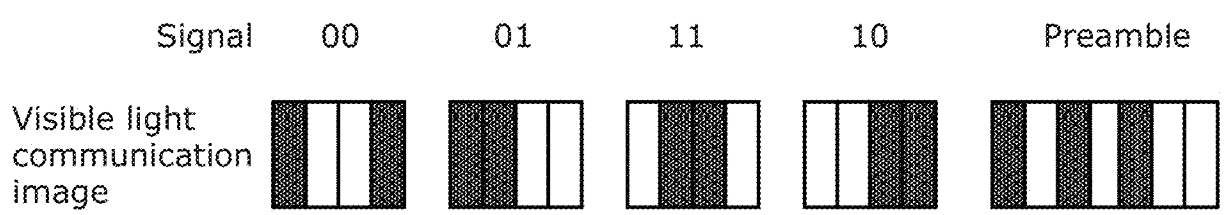
Figure 143:
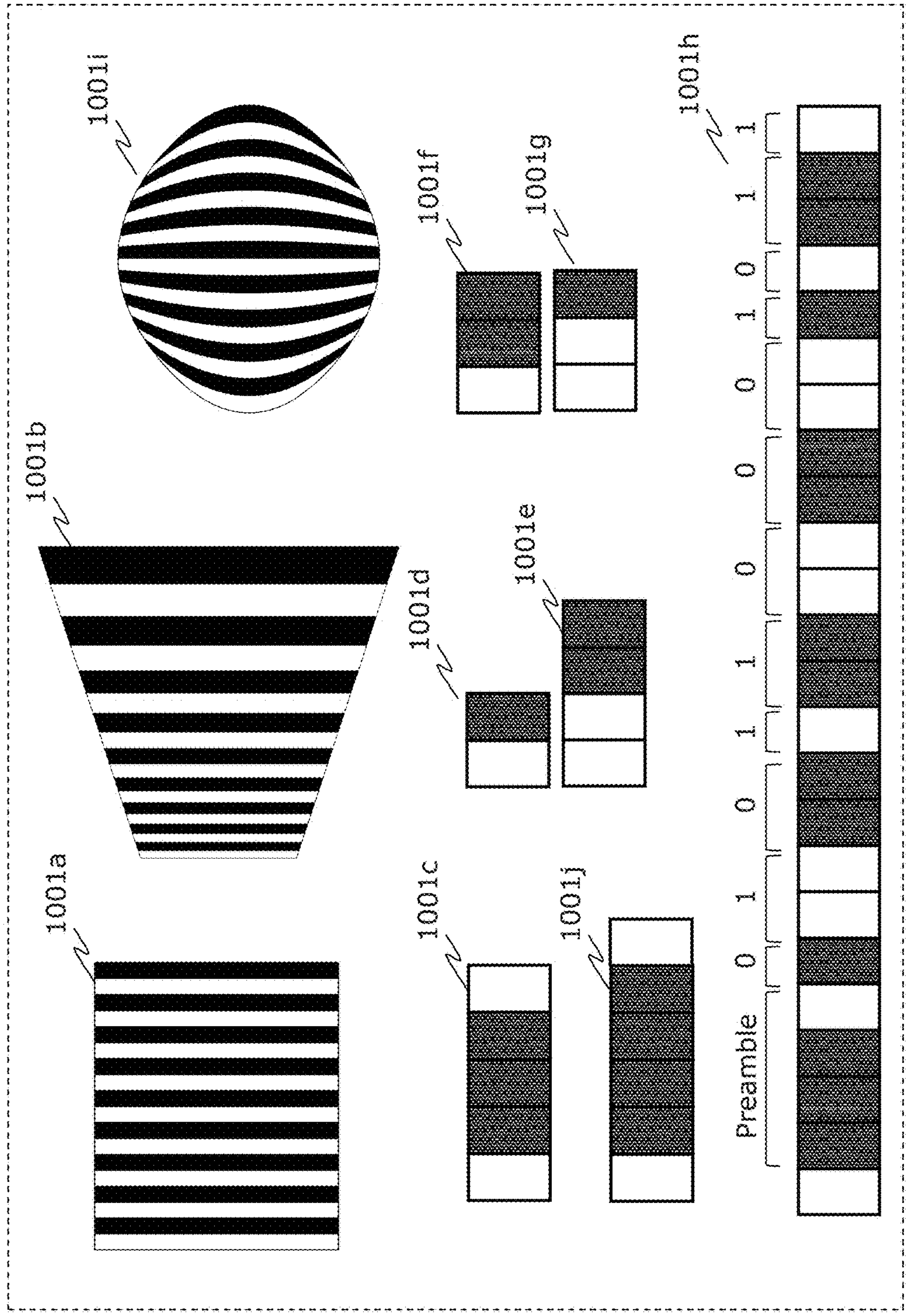
Figure 144:
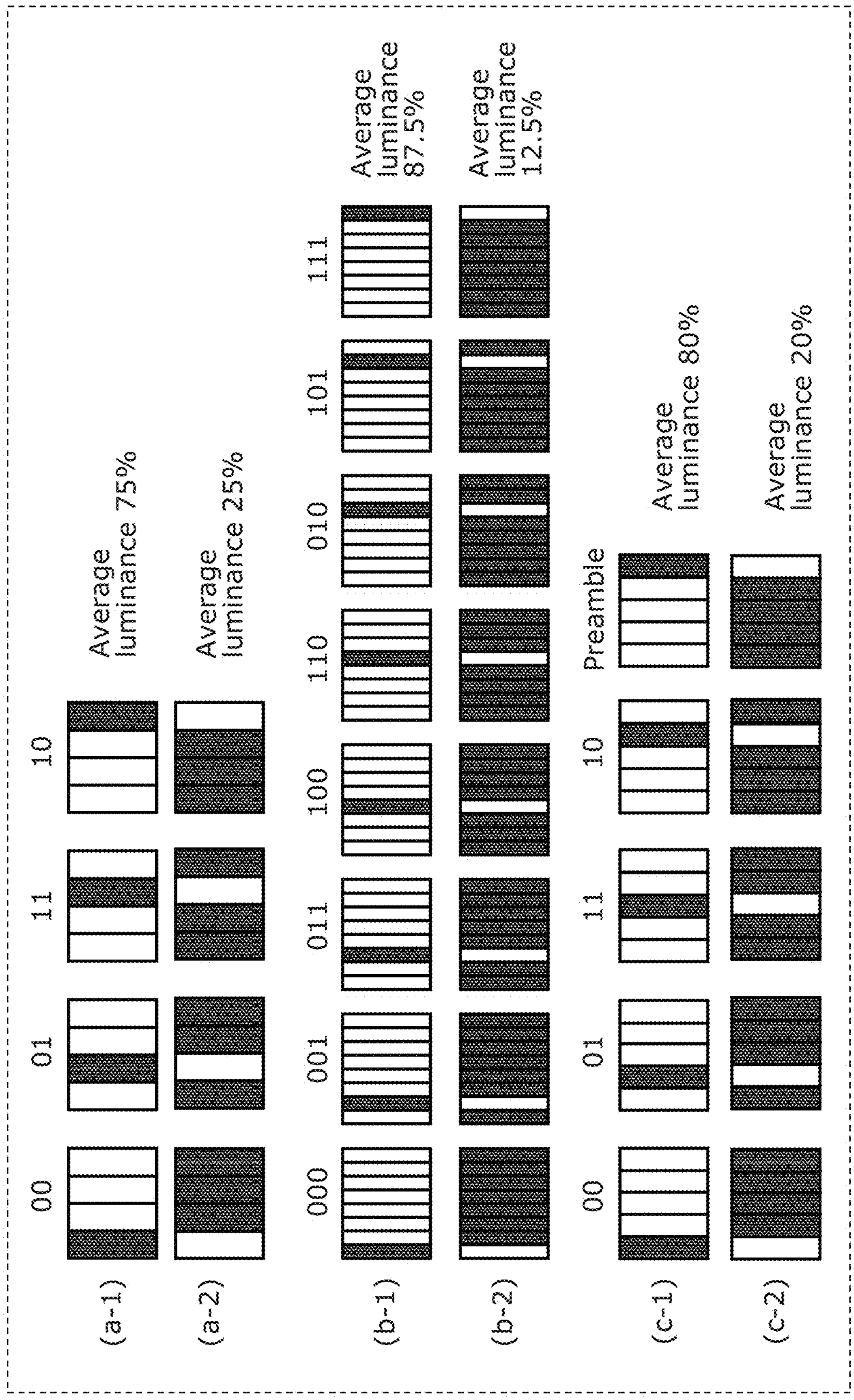
Figure 145:
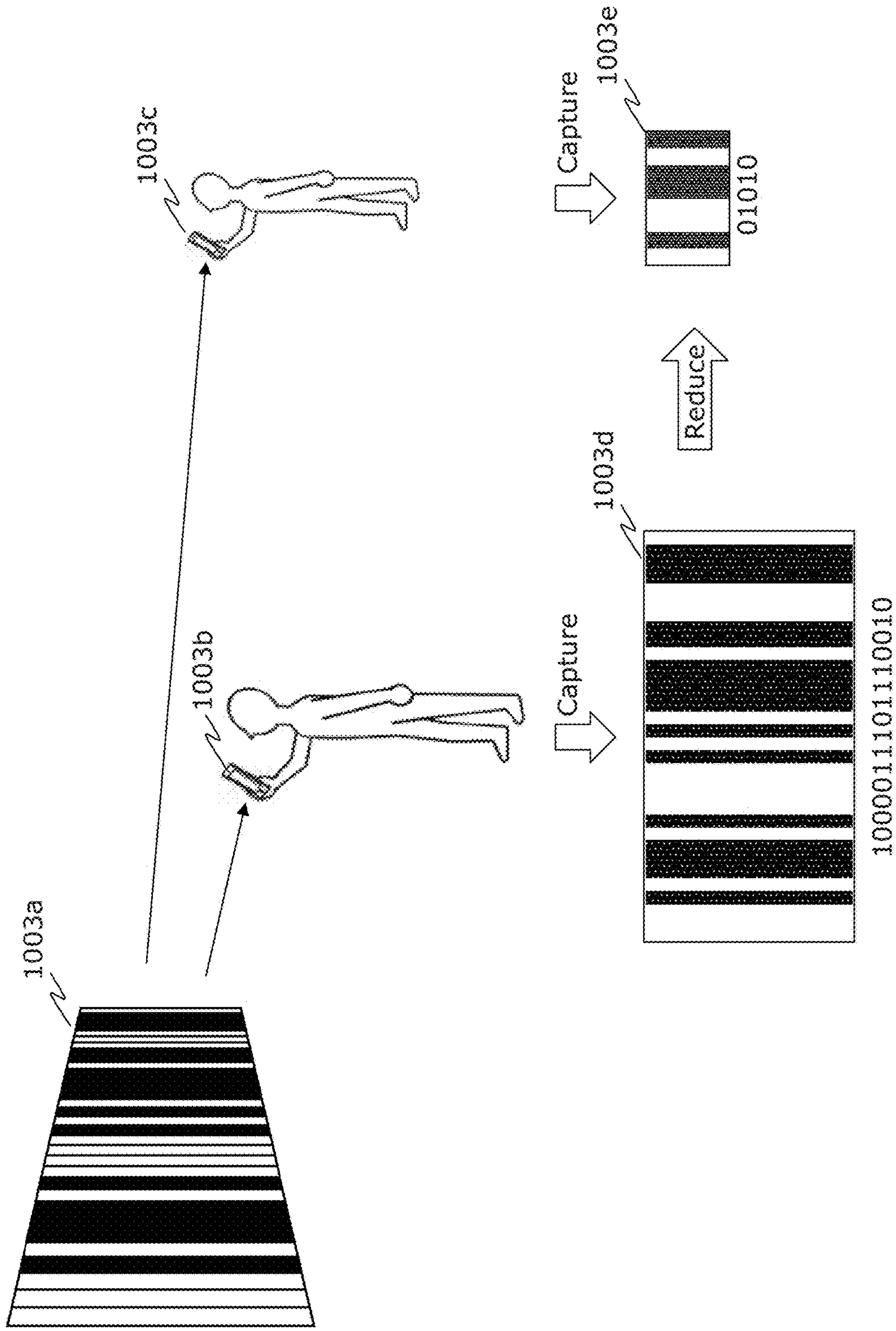
Figure 146:
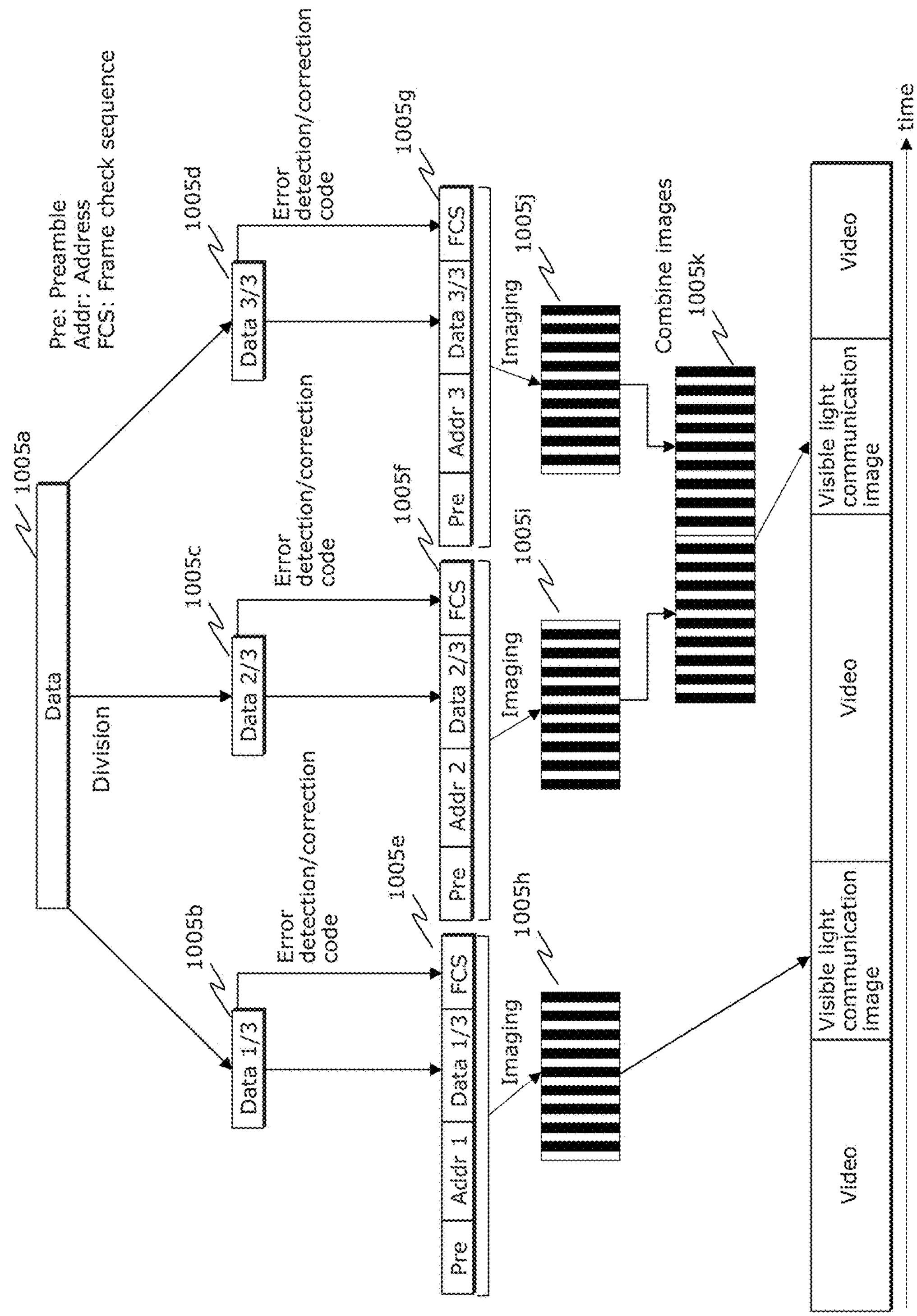
Figure 147:
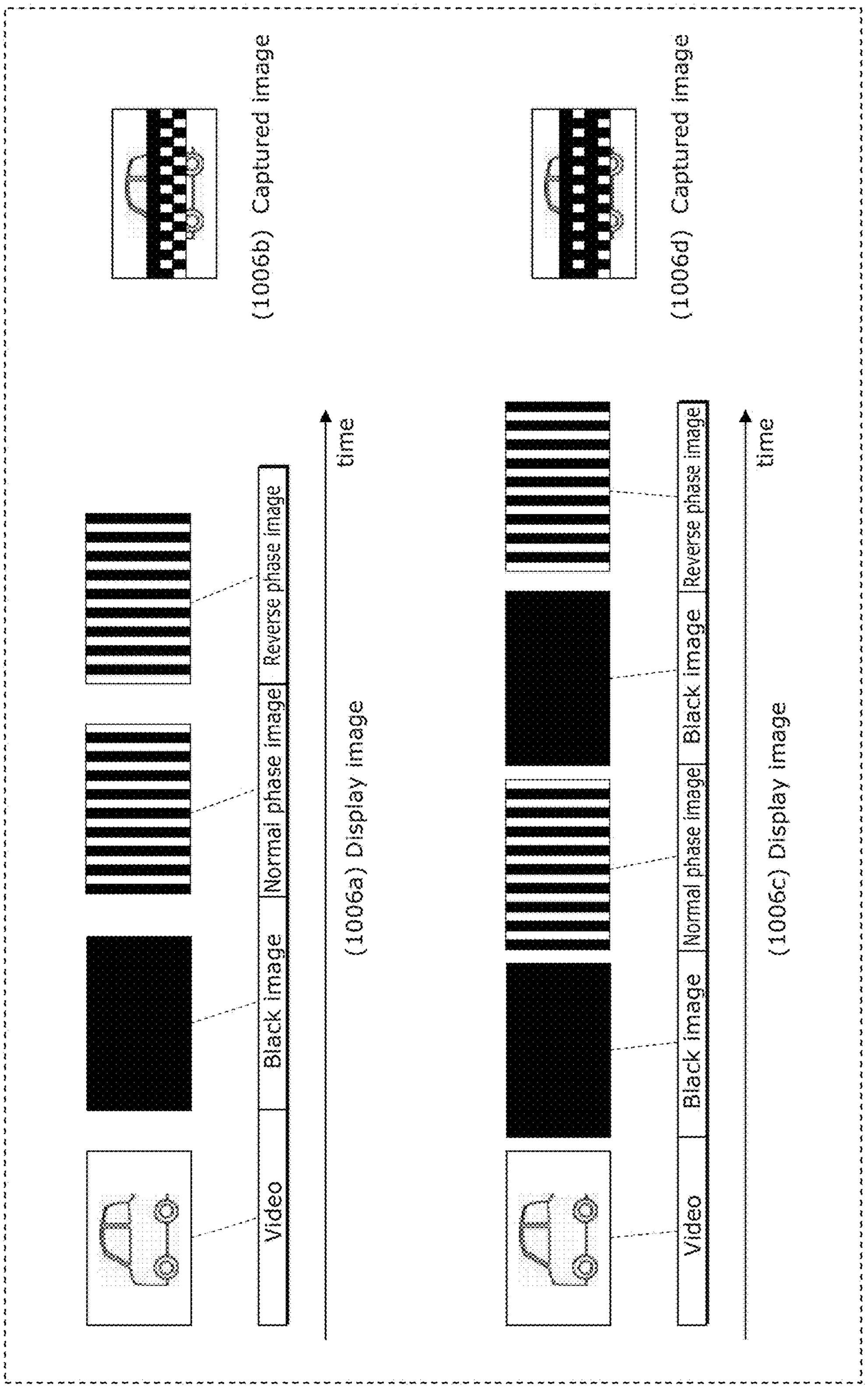
Figure 148:
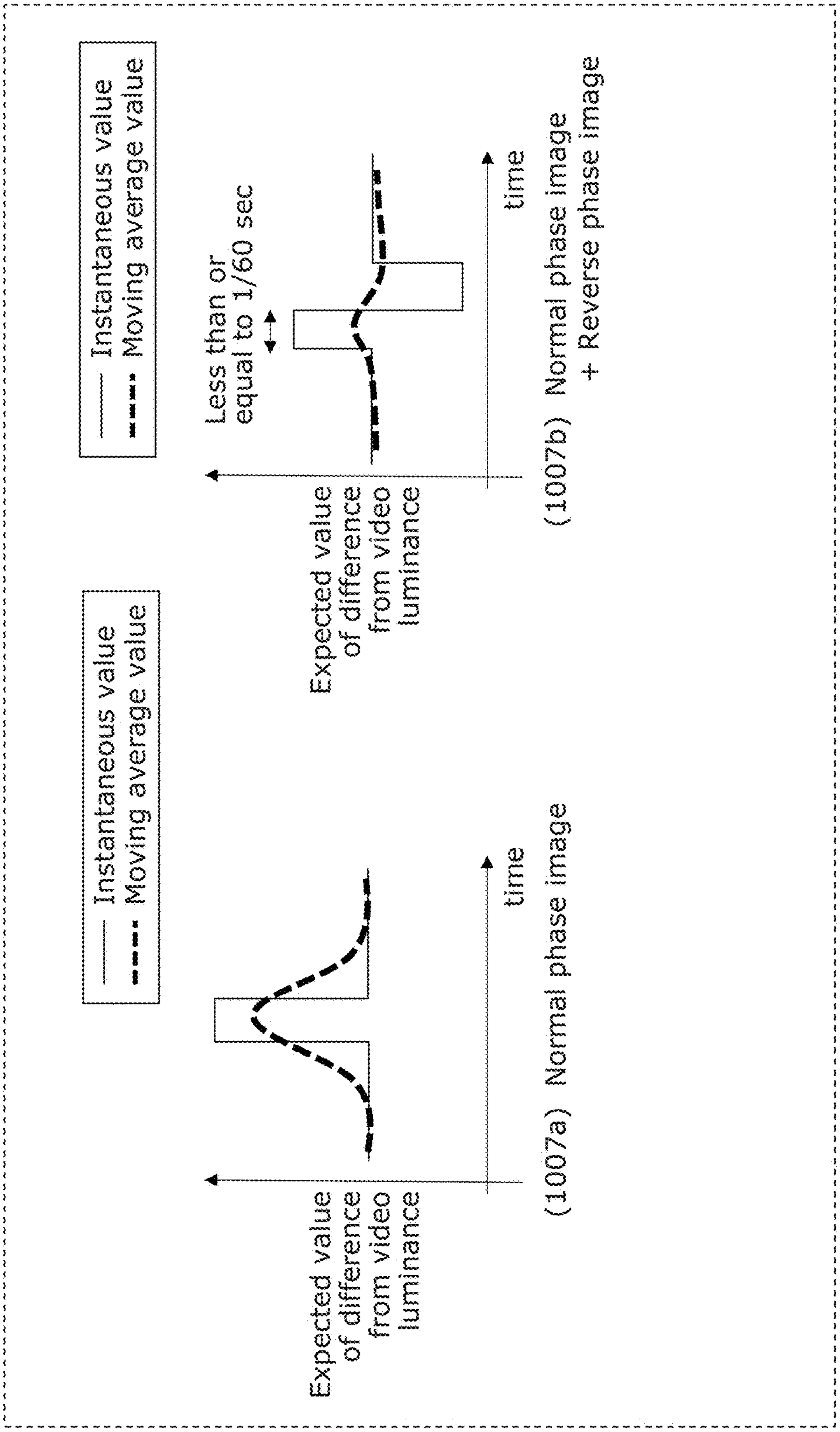

FIG. 109 is a diagram illustrating an example of next operation of a receiver in a bus stop situation in Embodiment 4;

FIG. 110 is a diagram for describing imaging in Embodiment 4;

FIG. 111 is a diagram for describing transmission and imaging in Embodiment 4;

FIG. 112 is a diagram for describing transmission in Embodiment 4;

FIG. 113 is a diagram illustrating an example of operation of a transmitter in Embodiment 5;

FIG. 114 is a diagram illustrating an example of operation of a transmitter in Embodiment 5;

FIG. 115 is a diagram illustrating an example of operation of a transmitter in Embodiment 5;

FIG. 116 is a diagram illustrating an example of operation of a transmitter and a receiver in Embodiment 5;

FIG. 117 is a diagram illustrating an example of operation of a receiver in Embodiment 5;

FIG. 118 is a diagram illustrating an example of operation of a receiver in Embodiment 5;

FIG. 119 is a diagram illustrating an example of operation of a system including a transmitter, a receiver, and a server in Embodiment 5;

FIG. 120 is a block diagram illustrating a structure of a transmitter in Embodiment 5;

FIG. 121 is a block diagram illustrating a structure of a receiver in Embodiment 5;

FIG. 122 is a diagram illustrating an example of operation of a transmitter in Embodiment 5;

FIG. 123 is a diagram illustrating an example of operation of a transmitter in Embodiment 5;

FIG. 124 is a diagram illustrating an example of operation of a transmitter in Embodiment 5;

FIG. 125 is a diagram illustrating an example of operation of a transmitter in Embodiment 5;

FIG. 126 is a diagram illustrating an example of operation of a transmitter in Embodiment 5;

FIG. 127 is a diagram illustrating an example of operation of a transmitter in Embodiment 5;

FIG. 128 is a diagram illustrating an example of operation of a transmitter in Embodiment 5;

FIG. 129 is a diagram illustrating an example of operation of a transmitter and a receiver in Embodiment 5;

FIG. 130 is a diagram illustrating an example of operation of a transmitter and a receiver in Embodiment 5;

FIG. 131 is a diagram illustrating an example of operation of a transmitter and a receiver in Embodiment 5;

FIG. 132 is a diagram illustrating an example of operation of a transmitter and a receiver in Embodiment 5;

FIG. 133 is a diagram illustrating an example of operation of a transmitter and a receiver in Embodiment 5;

FIG. 134 is a diagram illustrating an example of operation of a transmitter and a receiver in Embodiment 5;

FIG. 135 is a diagram illustrating an example of operation of a transmitter and a receiver in Embodiment 5;

FIG. 136 is a diagram illustrating an example of operation of a transmitter and a receiver in Embodiment 5;

FIG. 137 is a diagram illustrating an example of operation of a transmitter and a receiver in Embodiment 5;

FIG. 138 is a diagram illustrating an example of operation of a transmitter and a receiver in Embodiment 5;

FIG. 139 is a diagram illustrating an example of operation of a transmitter and a receiver in Embodiment 5;

FIG. 140 is a diagram illustrating an example of operation of a transmitter and a receiver in Embodiment 5;

FIG. 141 is a diagram illustrating an example of operation of a transmitter and a receiver in Embodiment 5;

FIG. 142 is a diagram illustrating a coding scheme in Embodiment 5;

FIG. 143 is a diagram illustrating a coding scheme that can receive light even in the case of capturing an image in an oblique direction in Embodiment 5;

FIG. 144 is a diagram illustrating a coding scheme that differs in information amount depending on distance in Embodiment 5;

FIG. 145 is a diagram illustrating a coding scheme that differs in information amount depending on distance in Embodiment 5;

FIG. 146 is a diagram illustrating a coding scheme that divides data in Embodiment 5;

FIG. 147 is a diagram illustrating an opposite-phase image insertion effect in Embodiment 5;

FIG. 148 is a diagram illustrating an opposite-phase image insertion effect in Embodiment 5.

Figure 149:
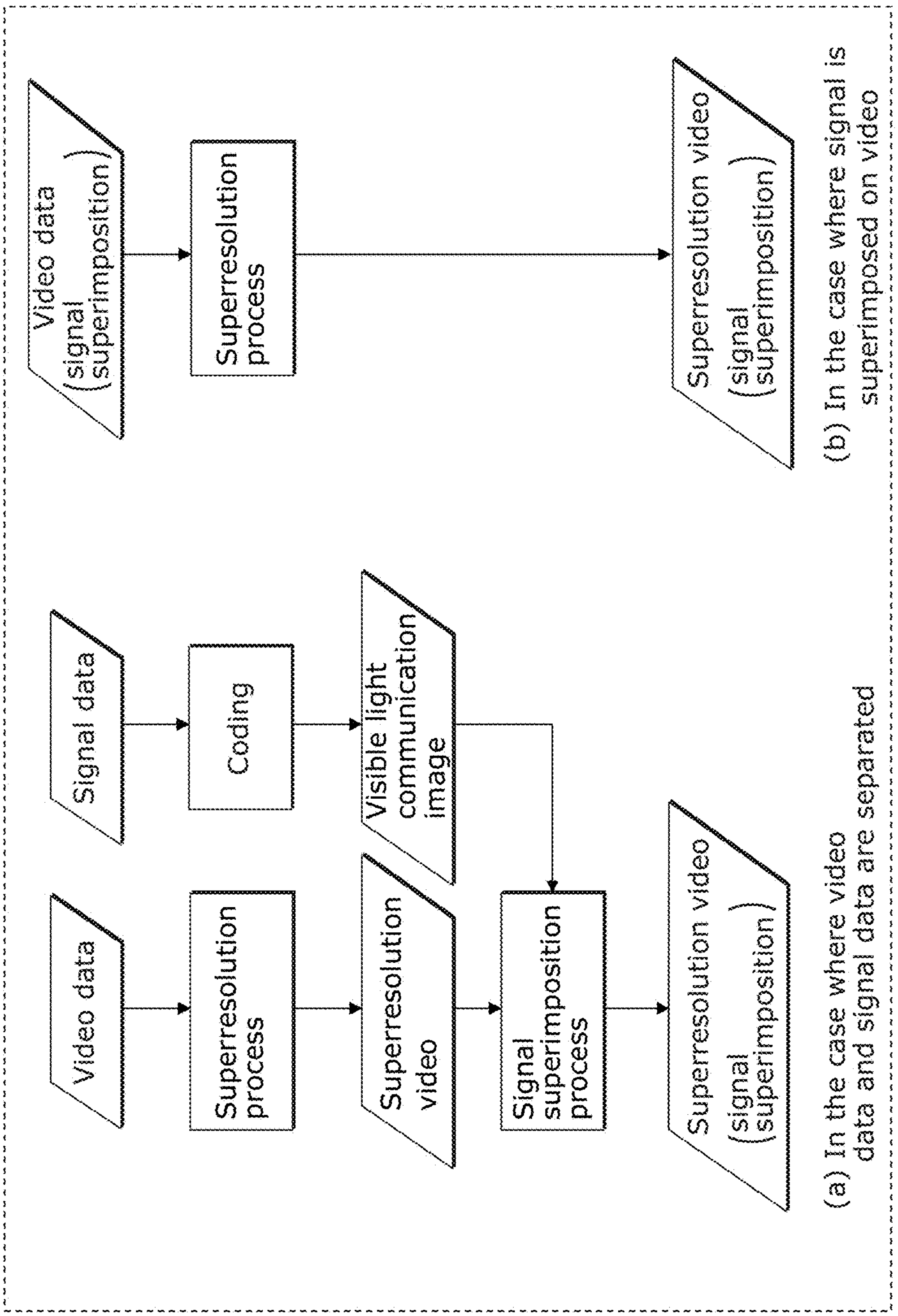
Figure 150:
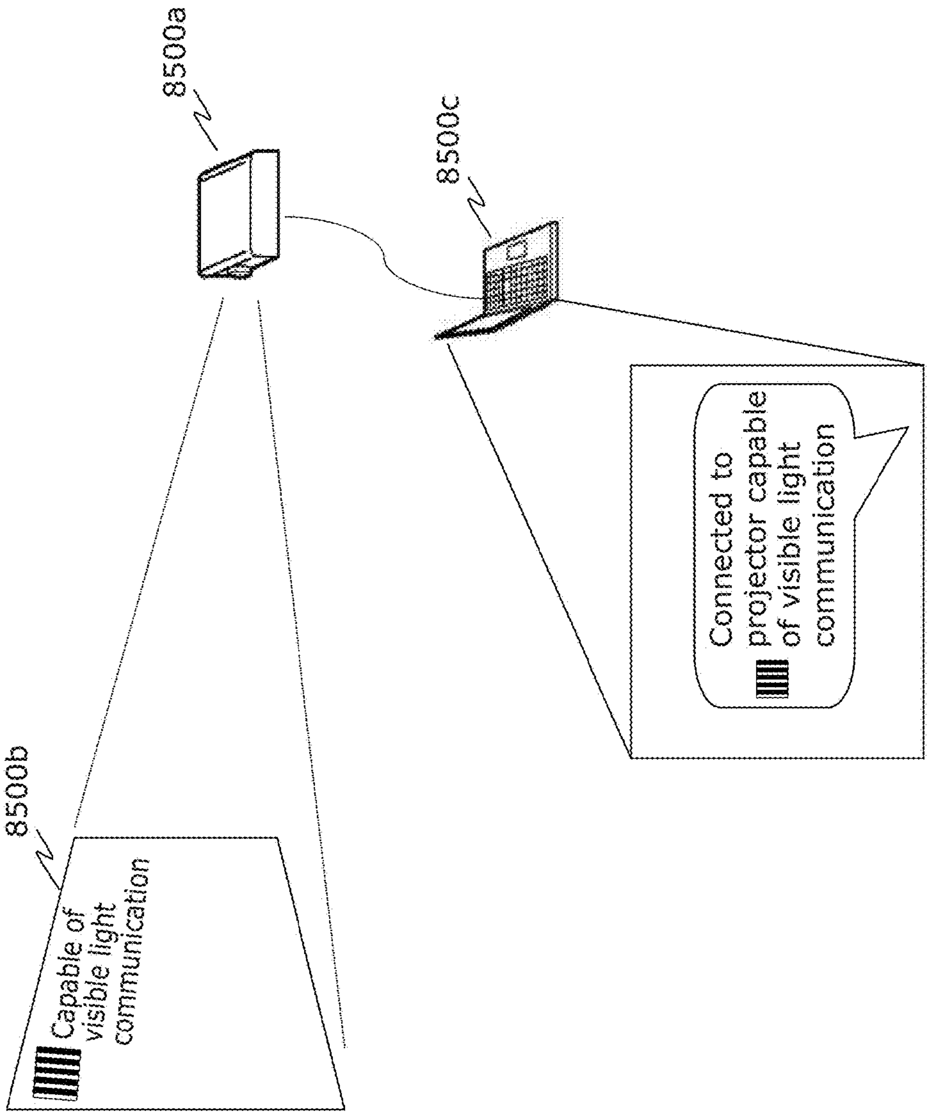
Figure 151:
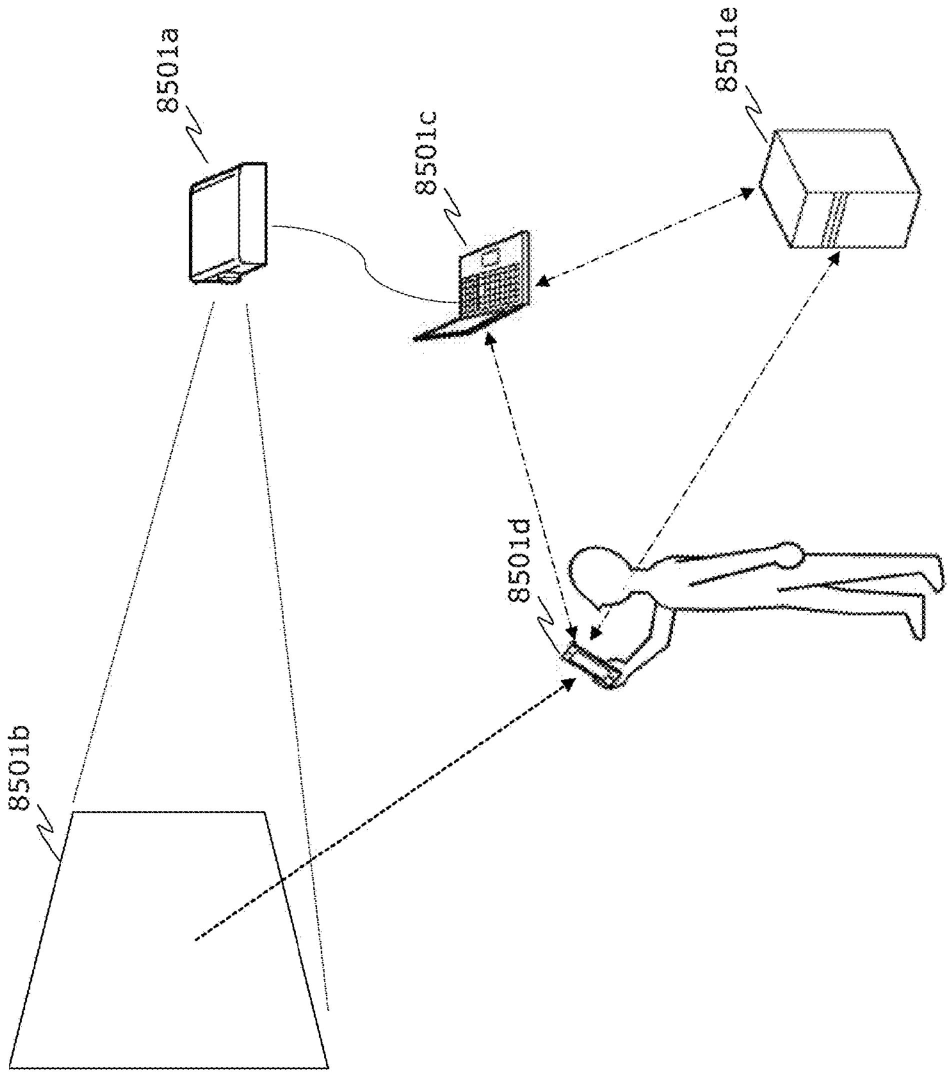
Figure 152:
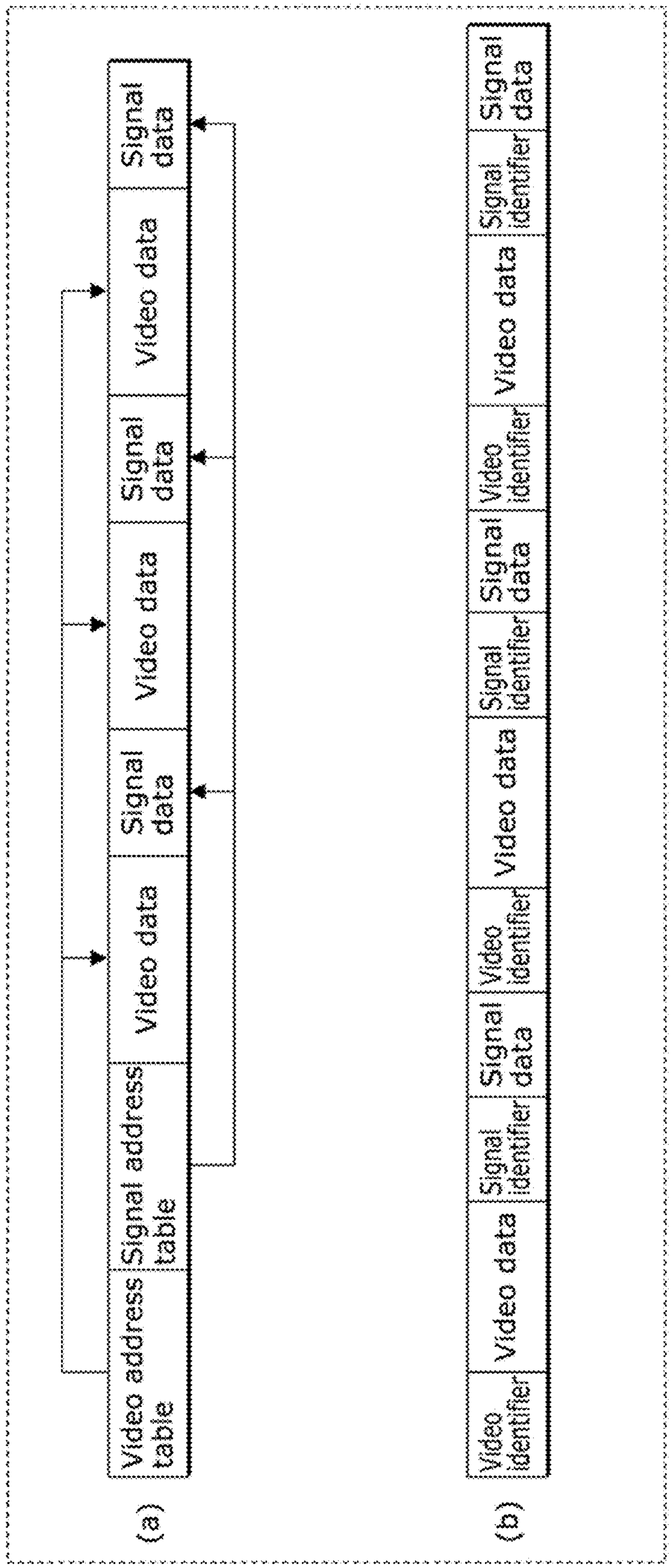
Figure 153:
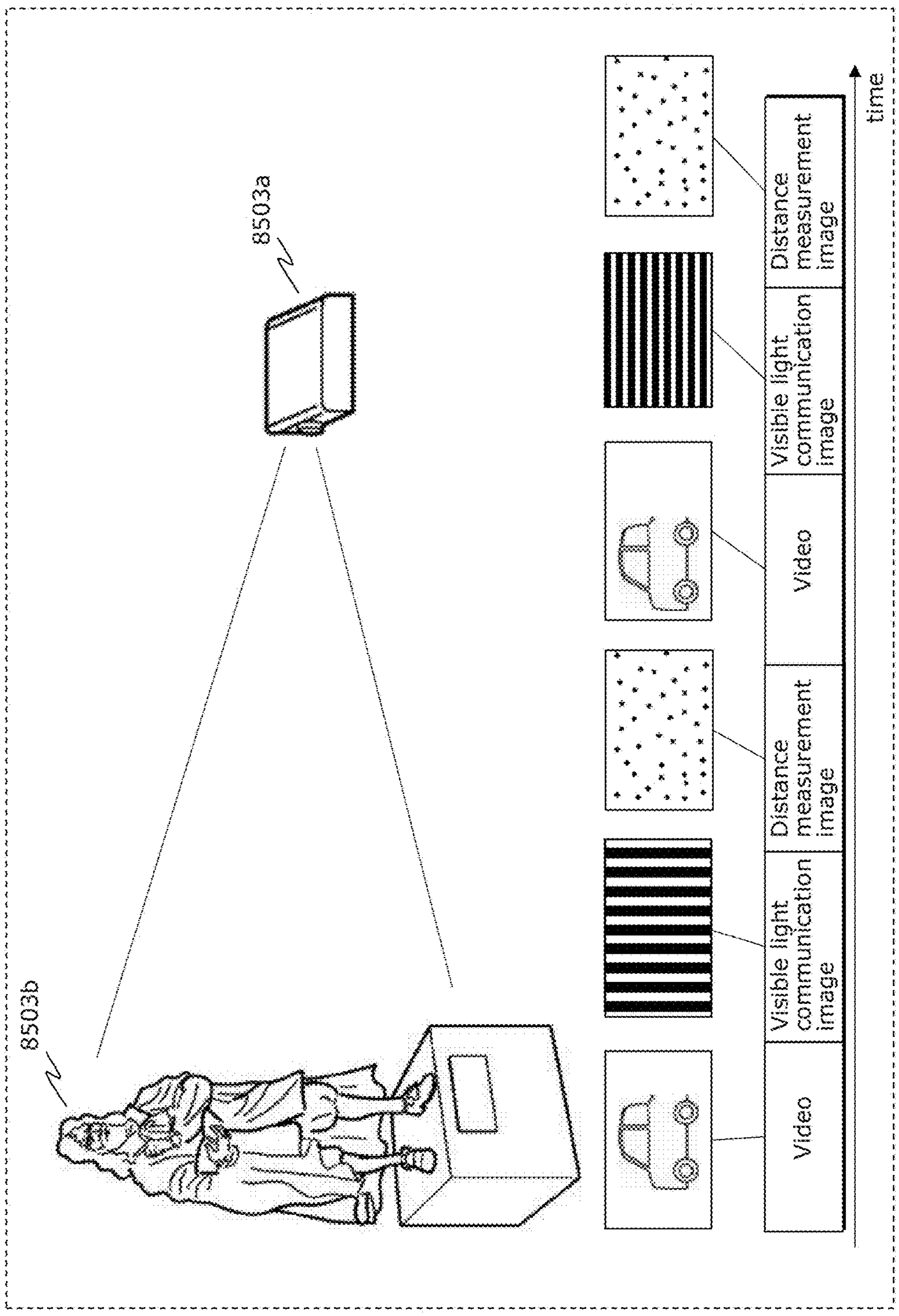
Figure 154:
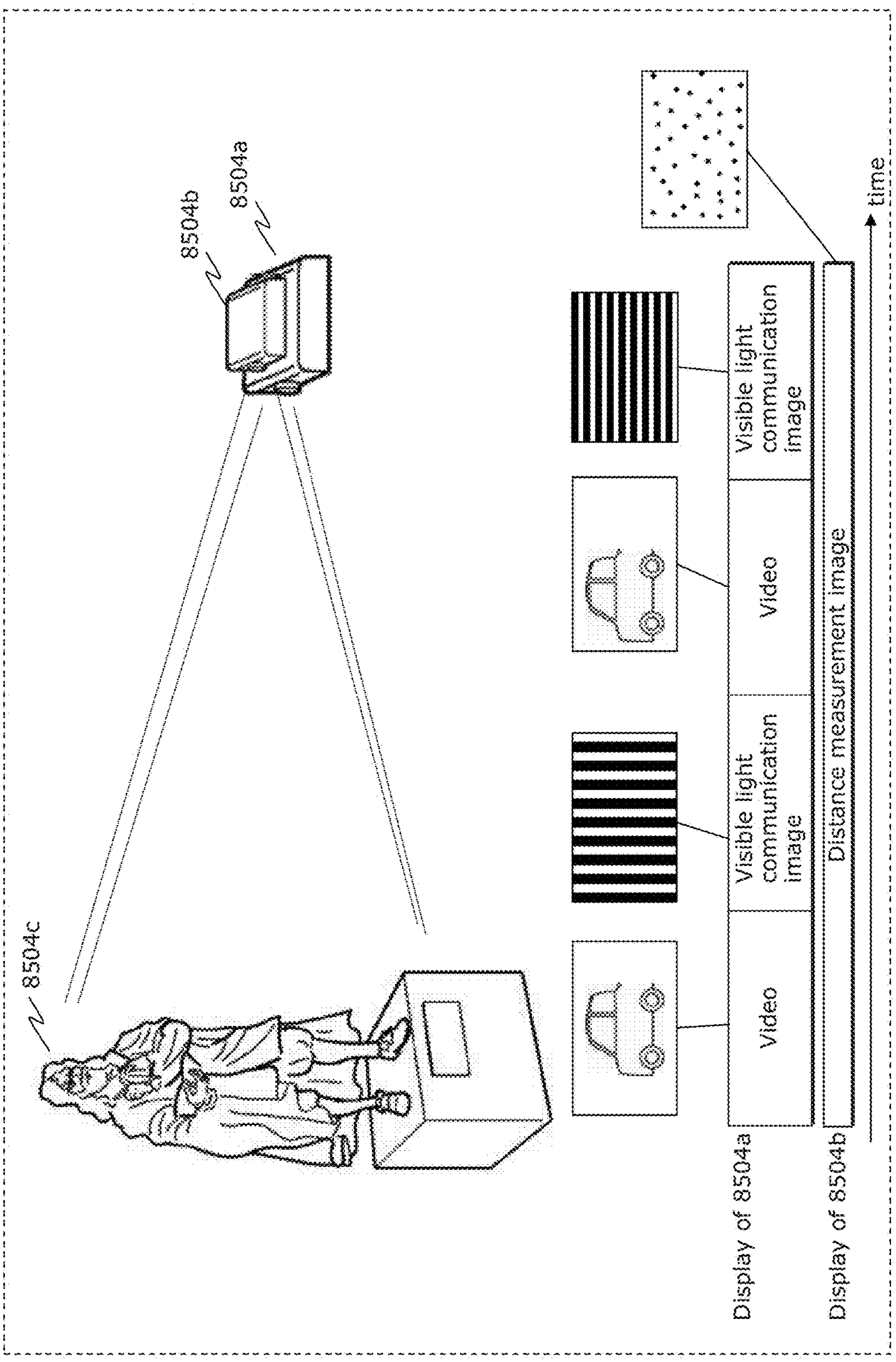
Figure 155:
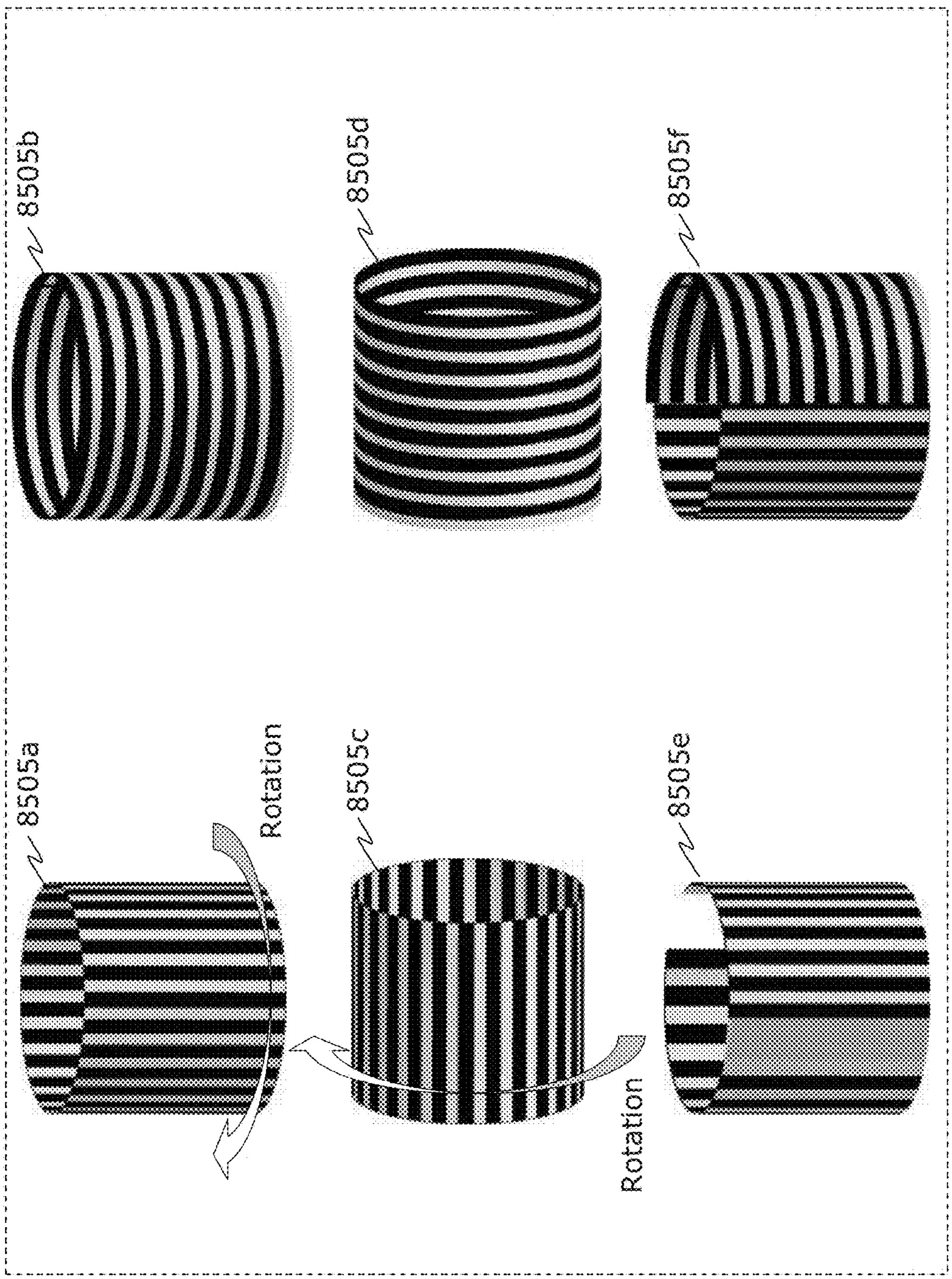
Figure 156:
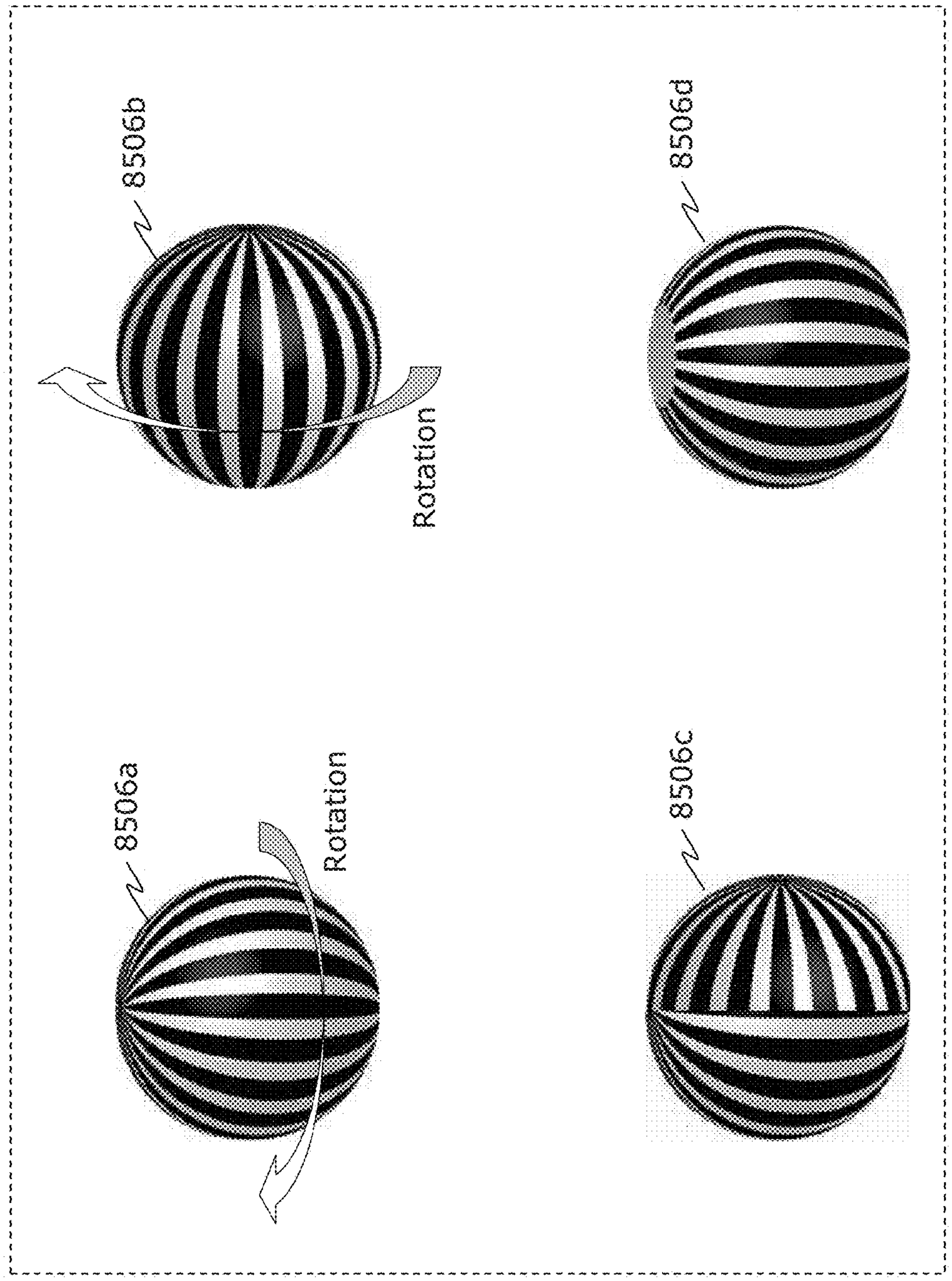
Figure 157:
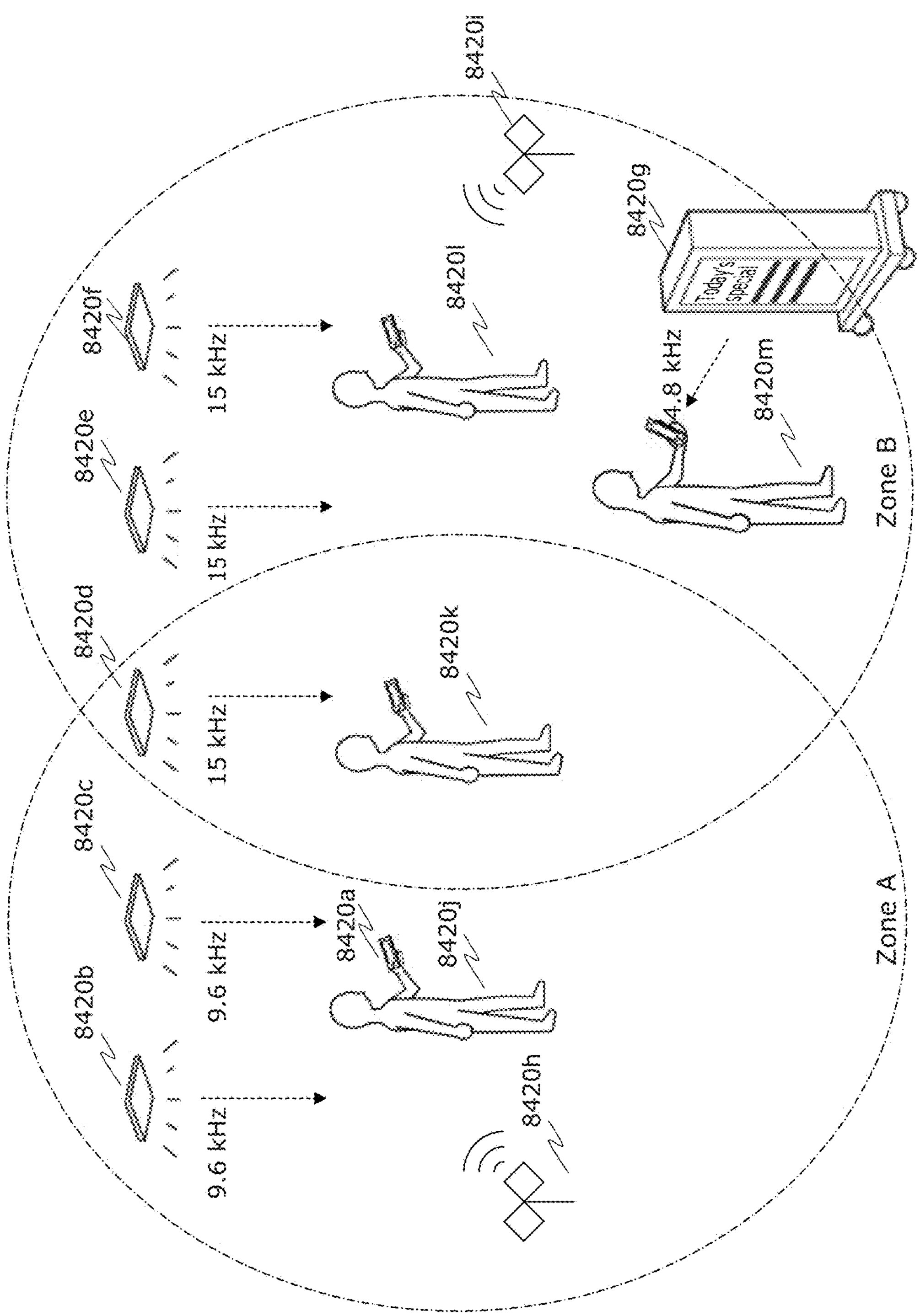
Figure 158:
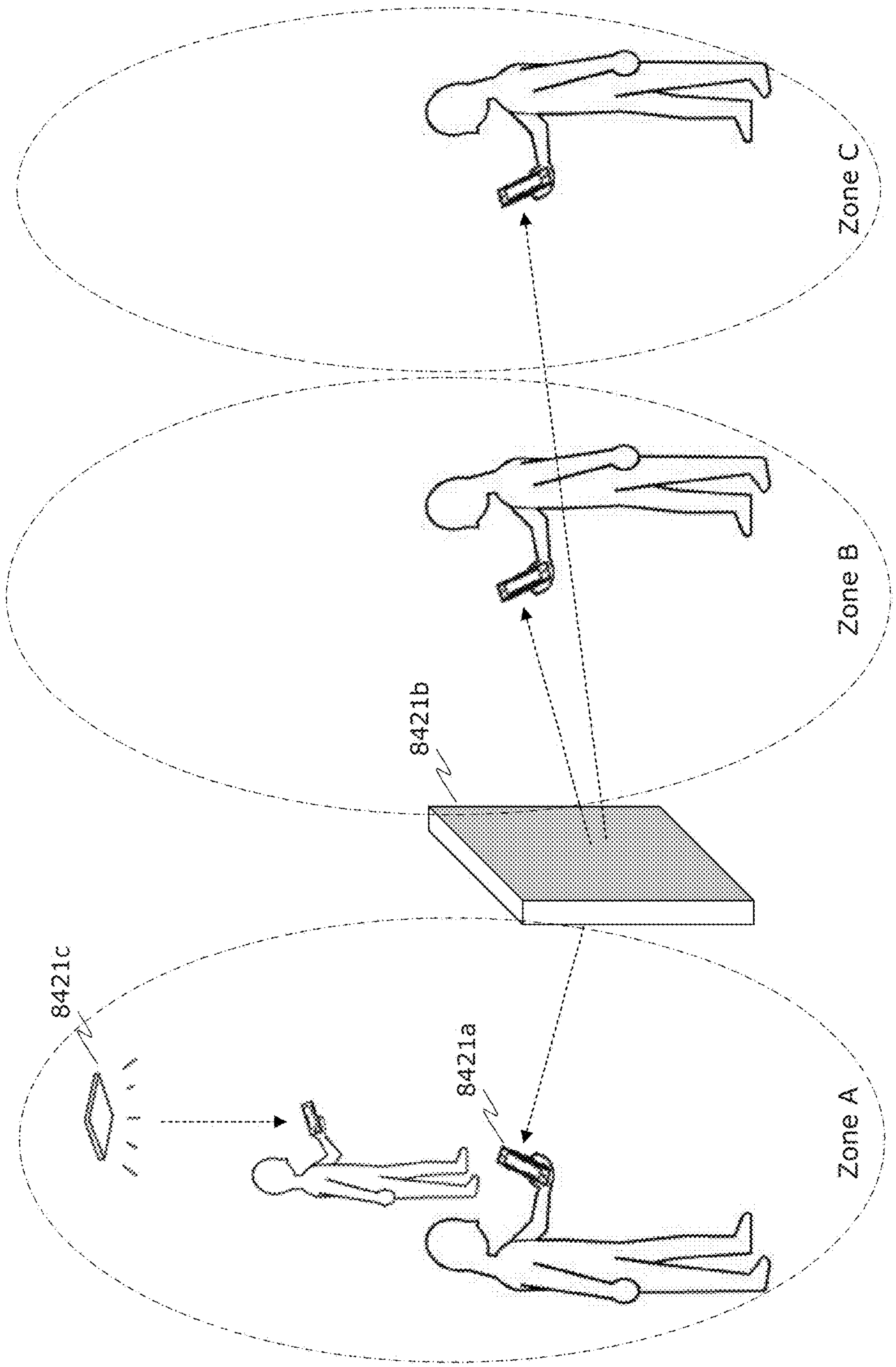
Figure 159:
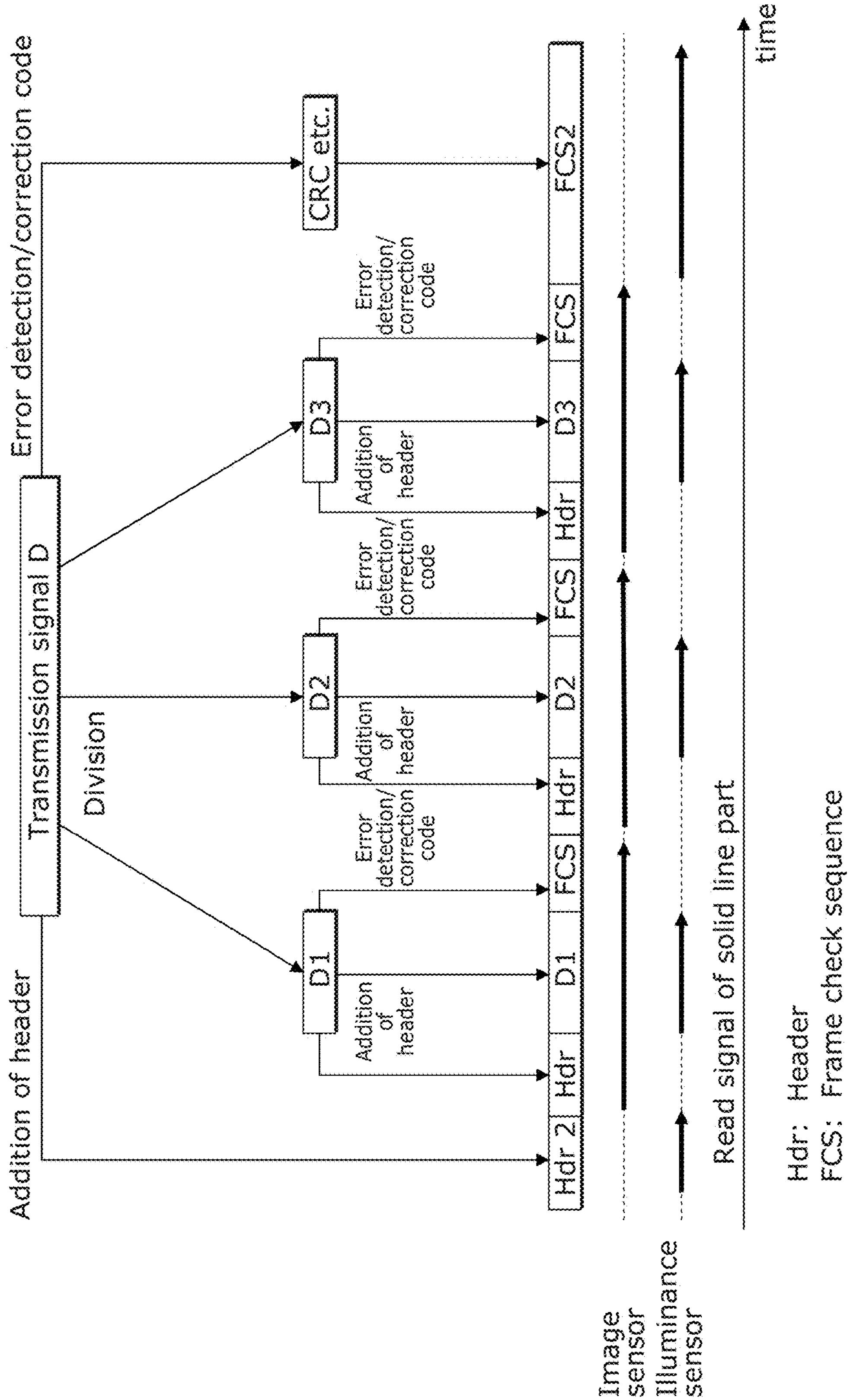
Figure 160:
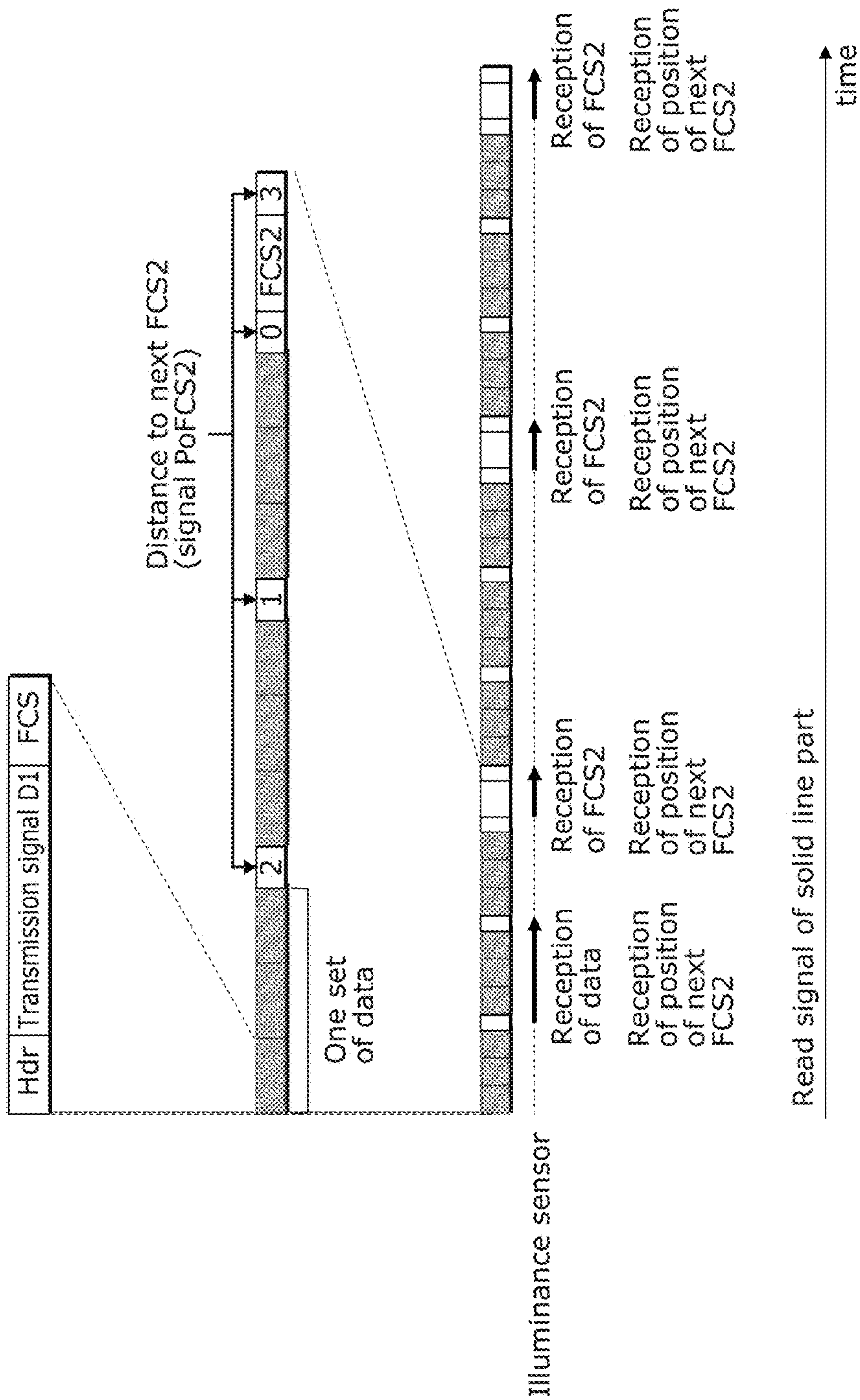
Figure 161B:
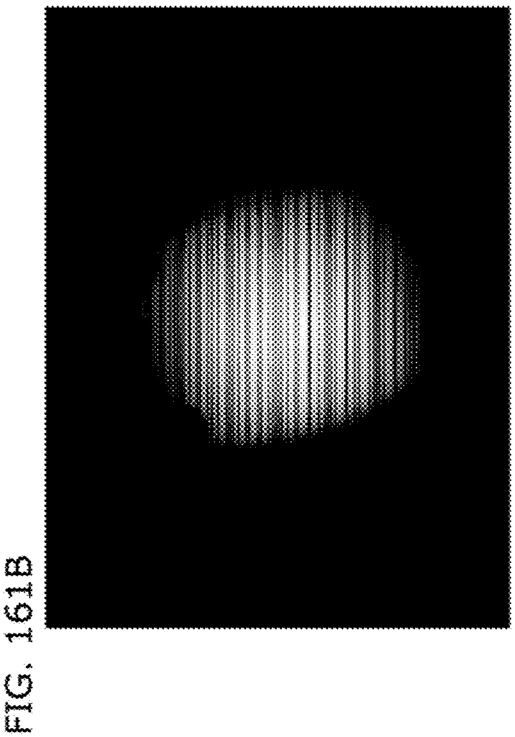
Figure 161A:
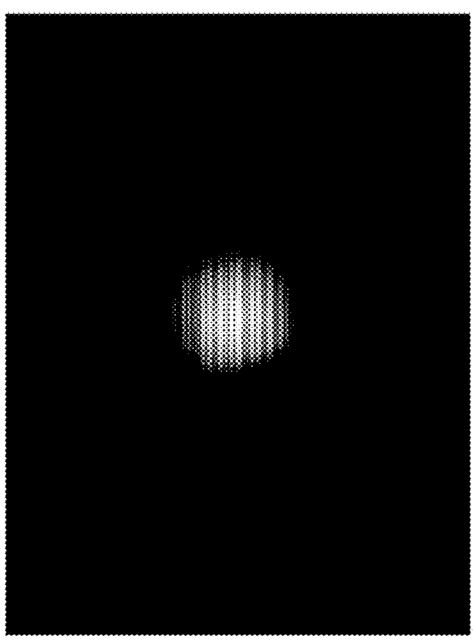
Figure 161C:
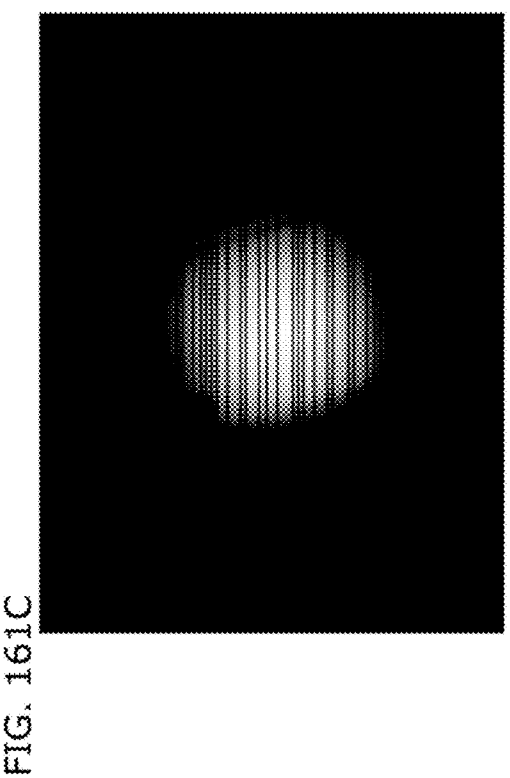
Figure 162B:
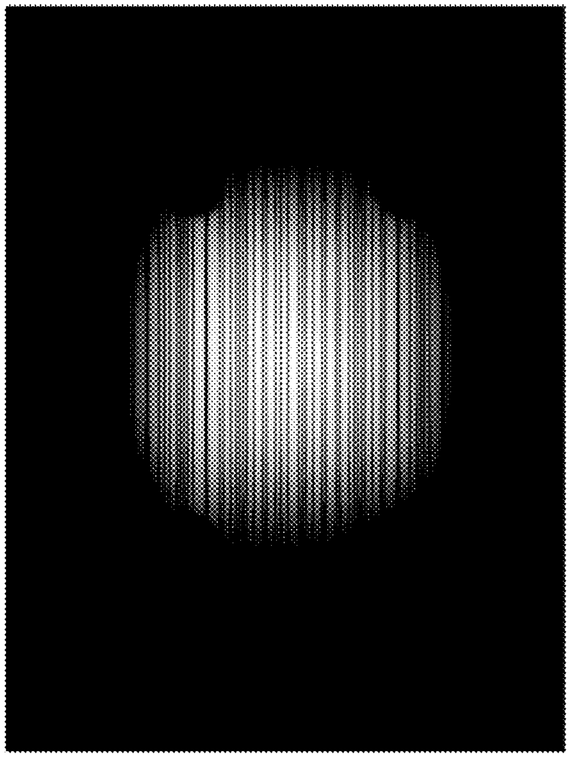
Figure 162A:
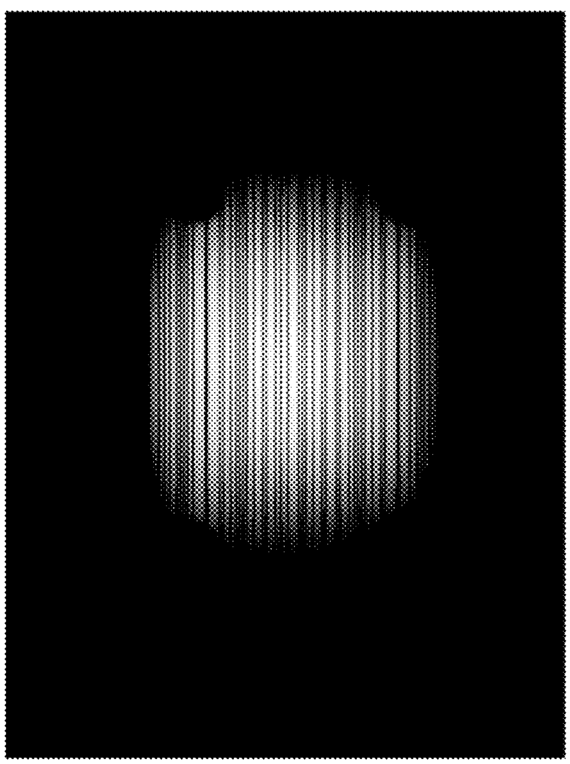
Figure 163A:
Figure 163B:
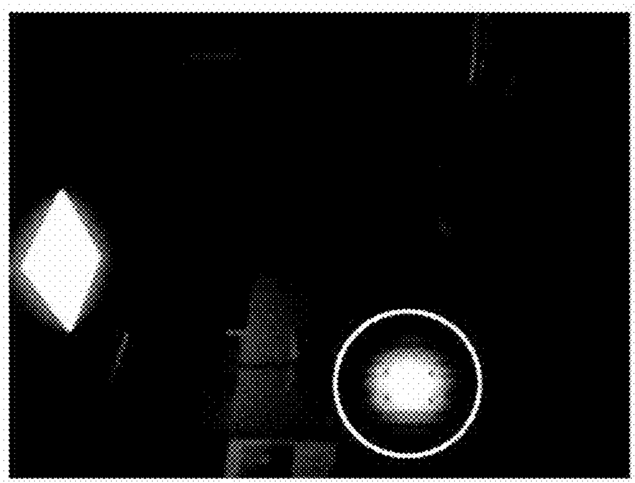
Figure 163C:
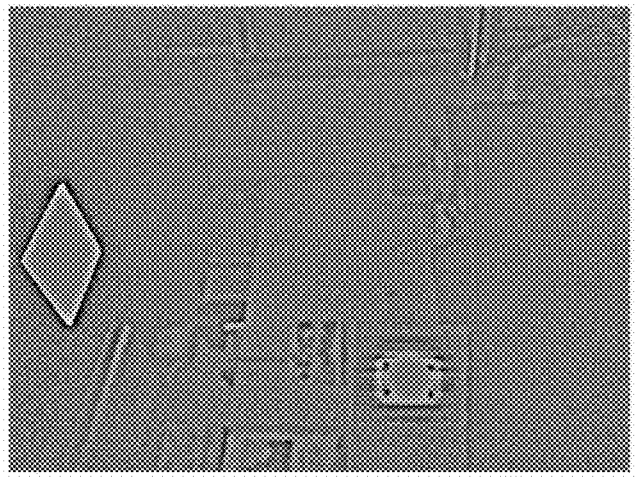
Figure 164:
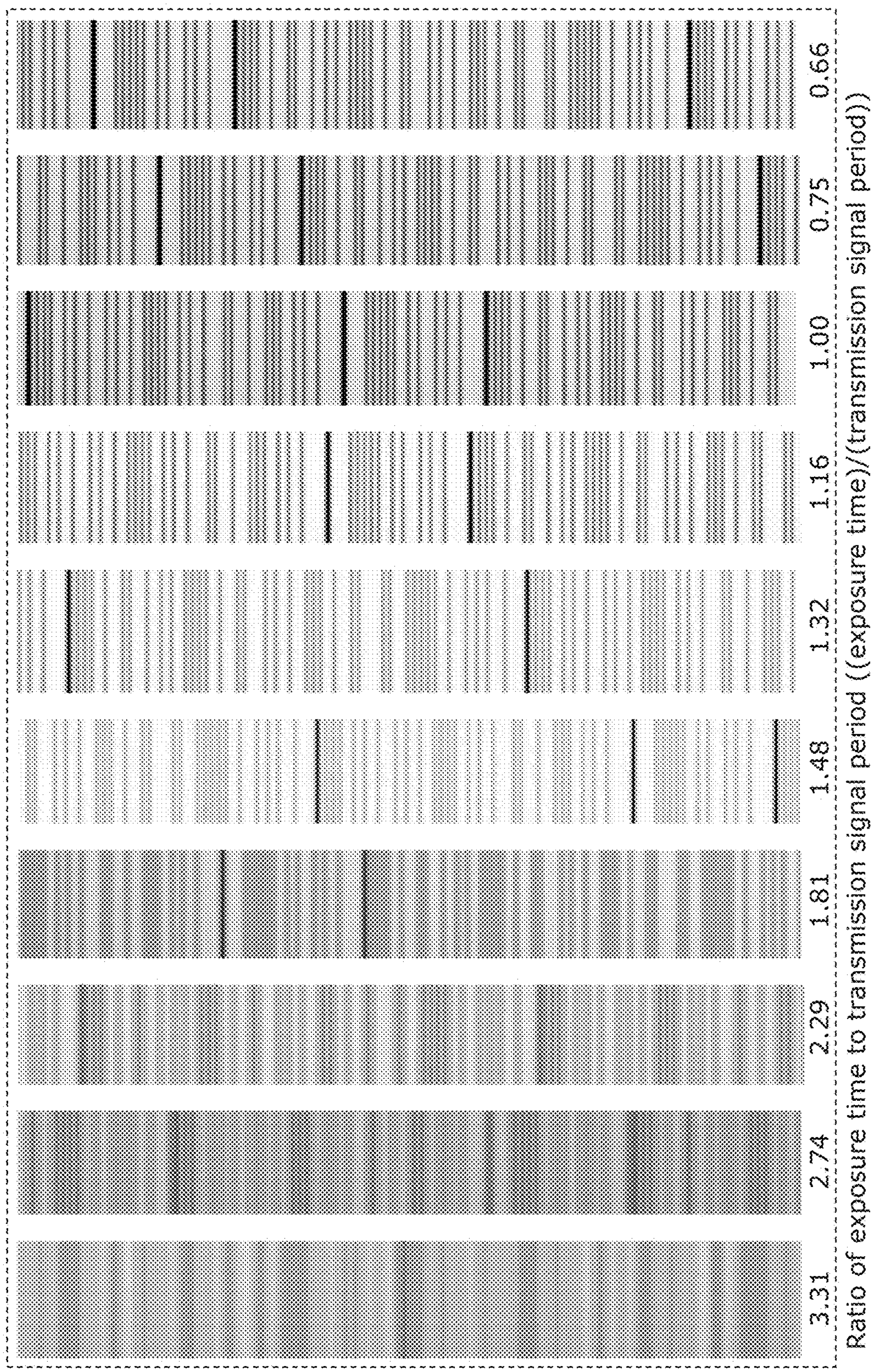
Figure 165:
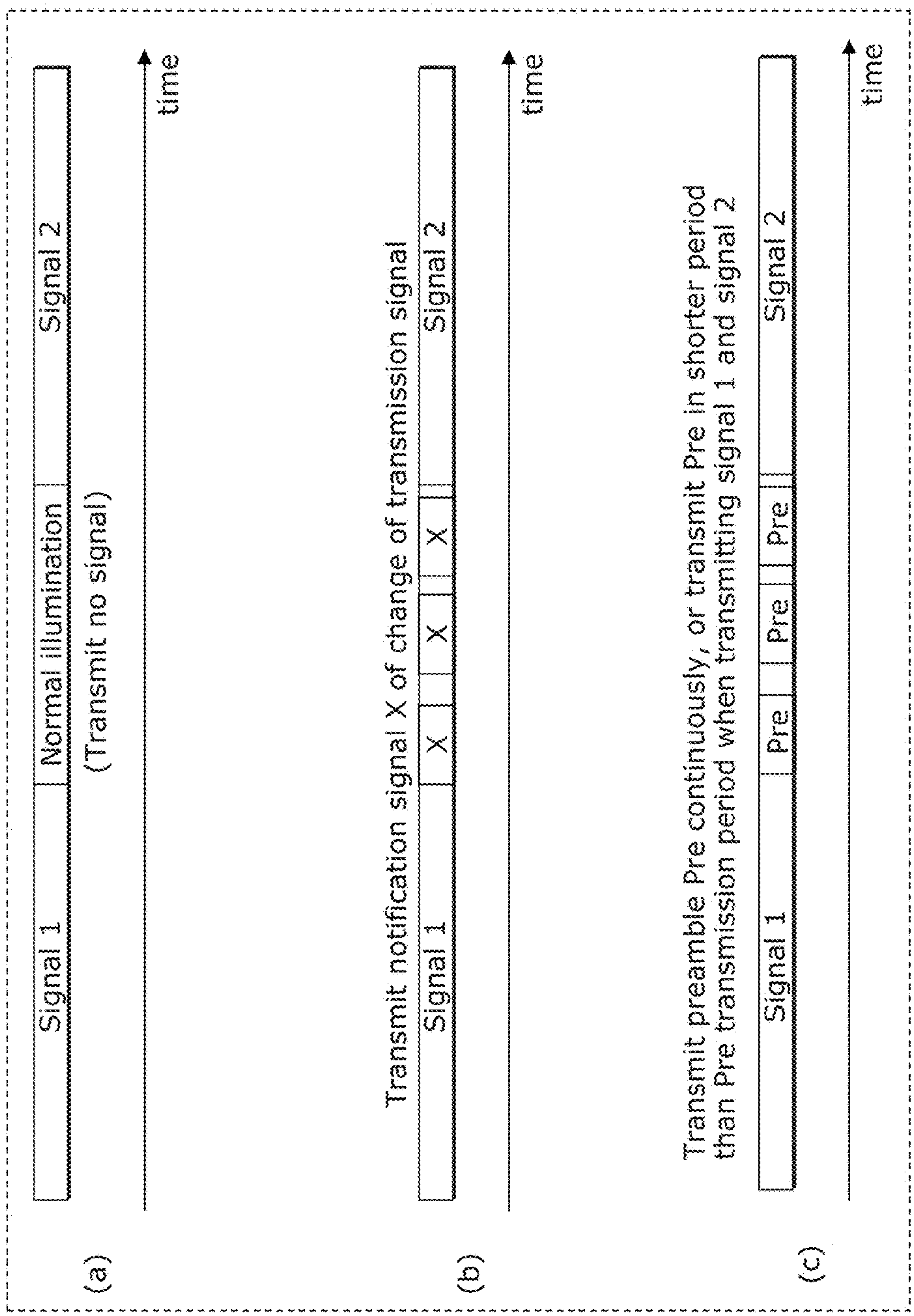
Figure 166:
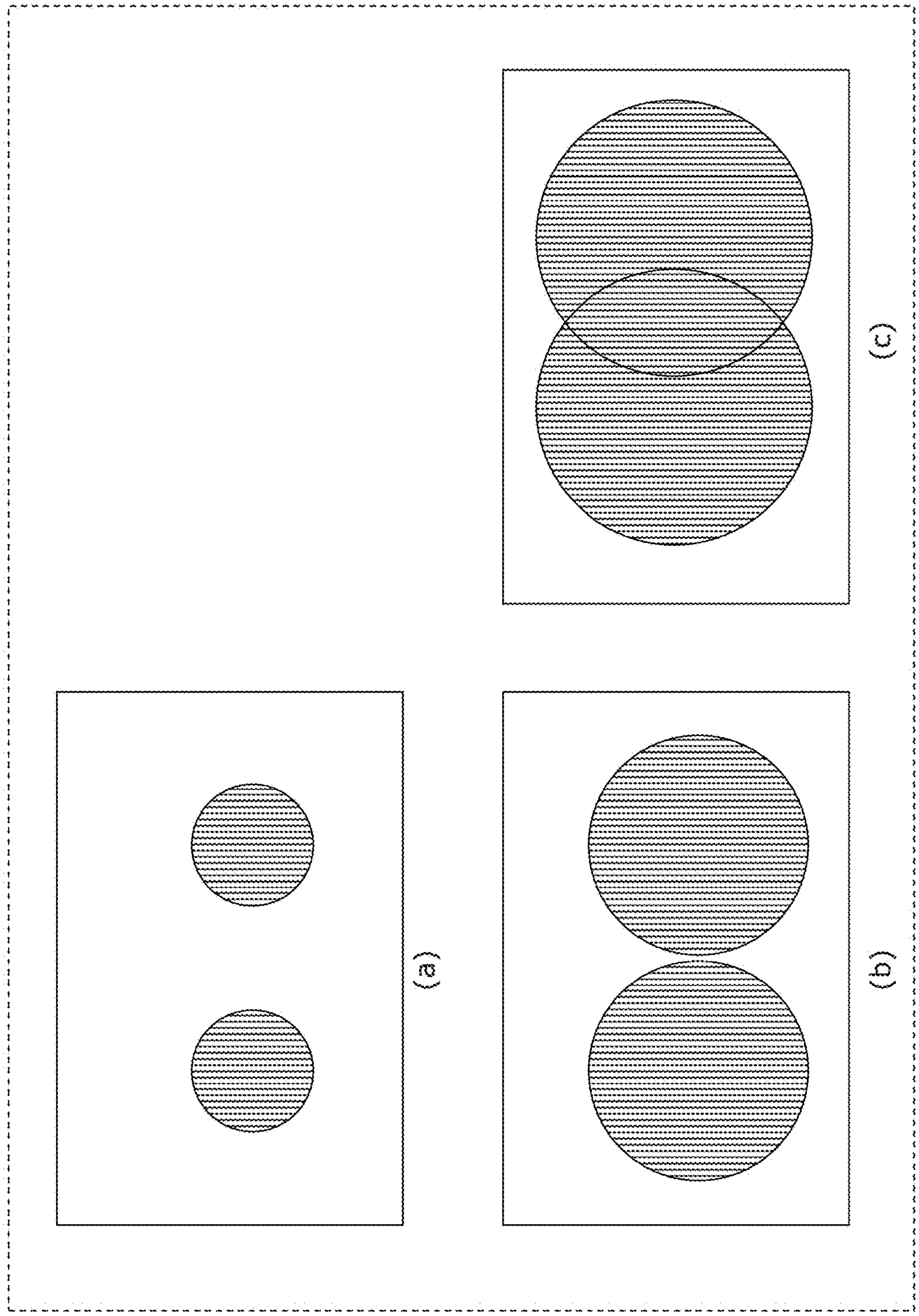
Figure 167:
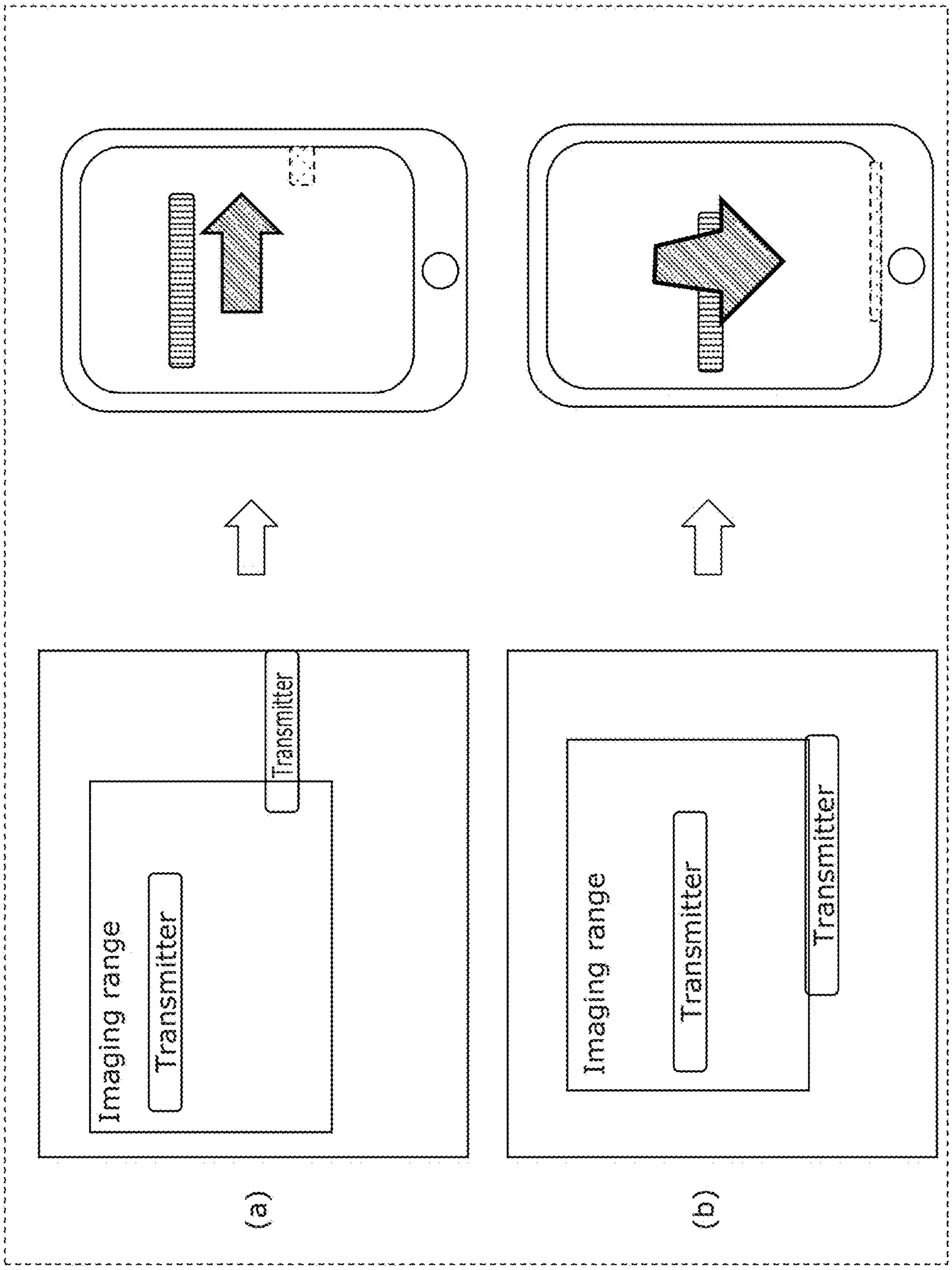
Figure 168:
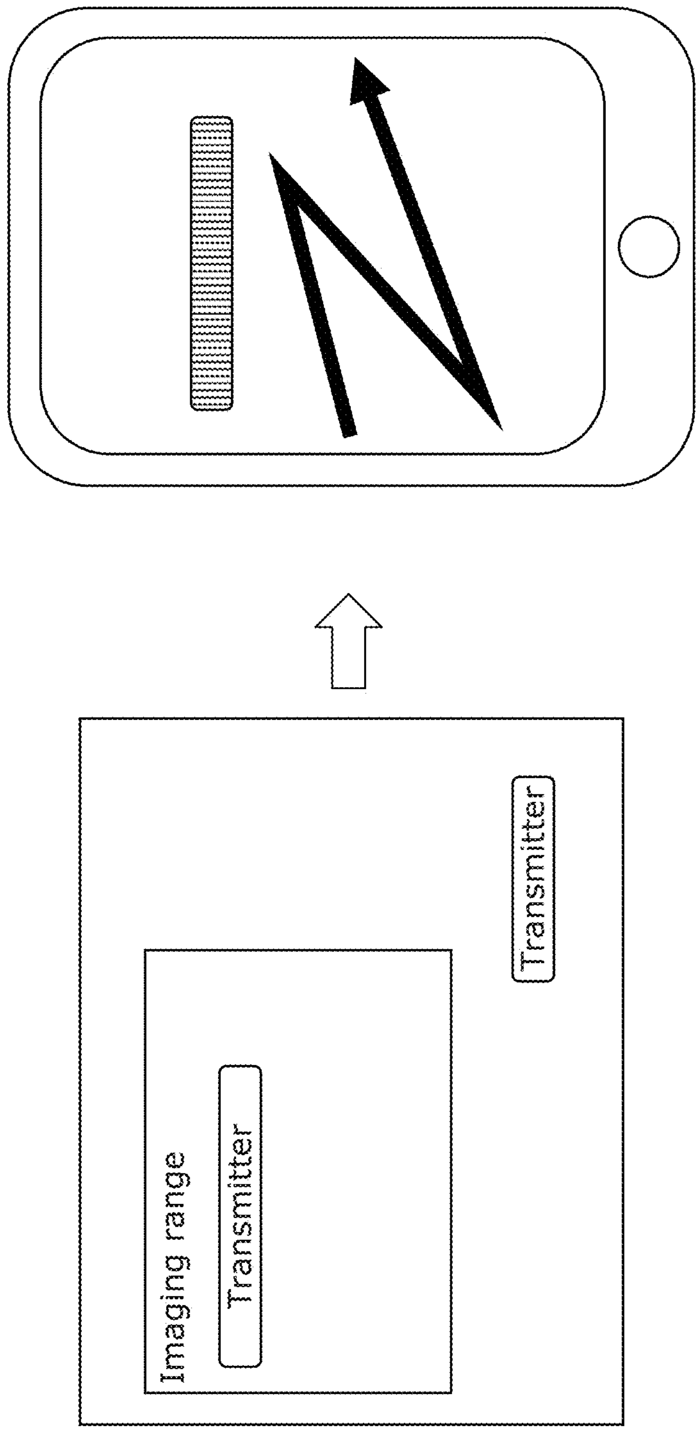
Figure 170:
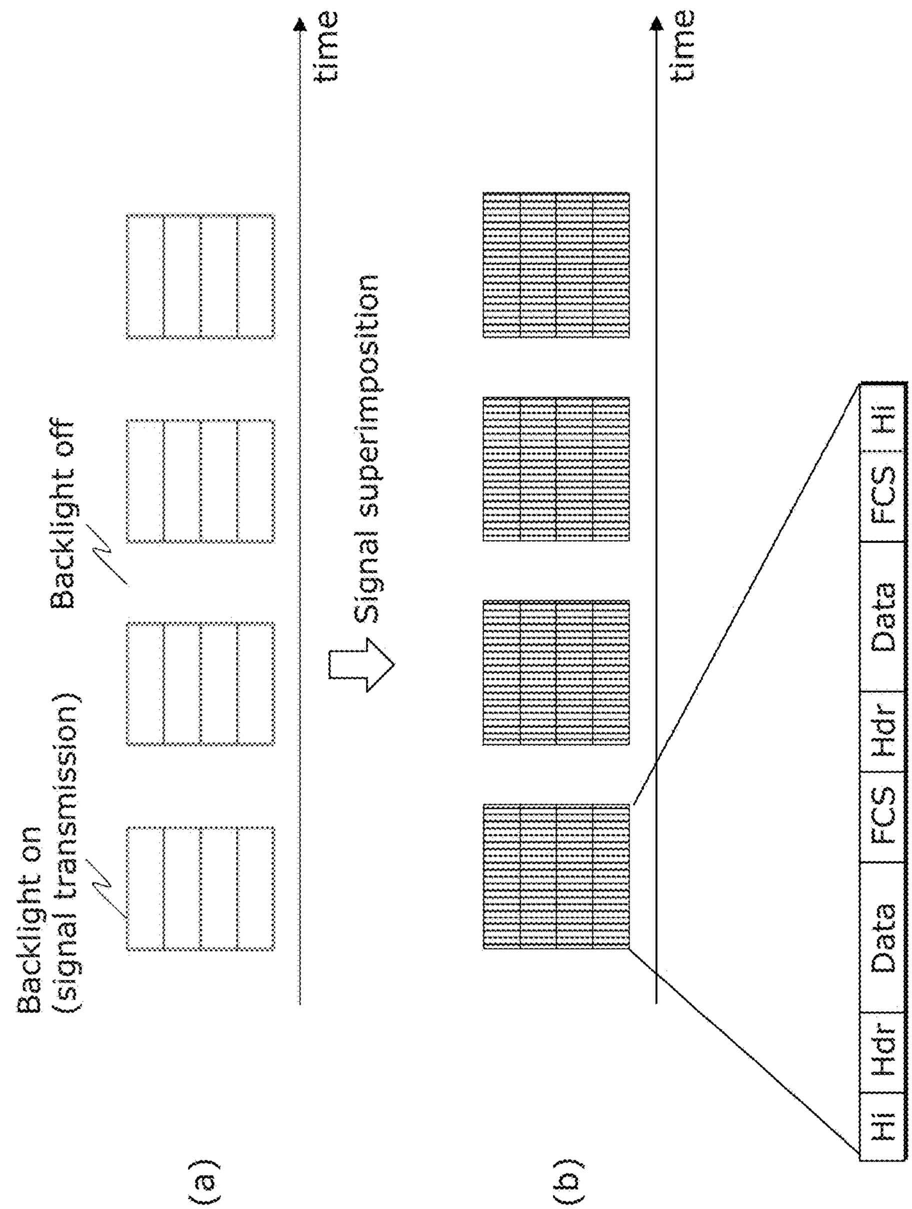
Figure 171:
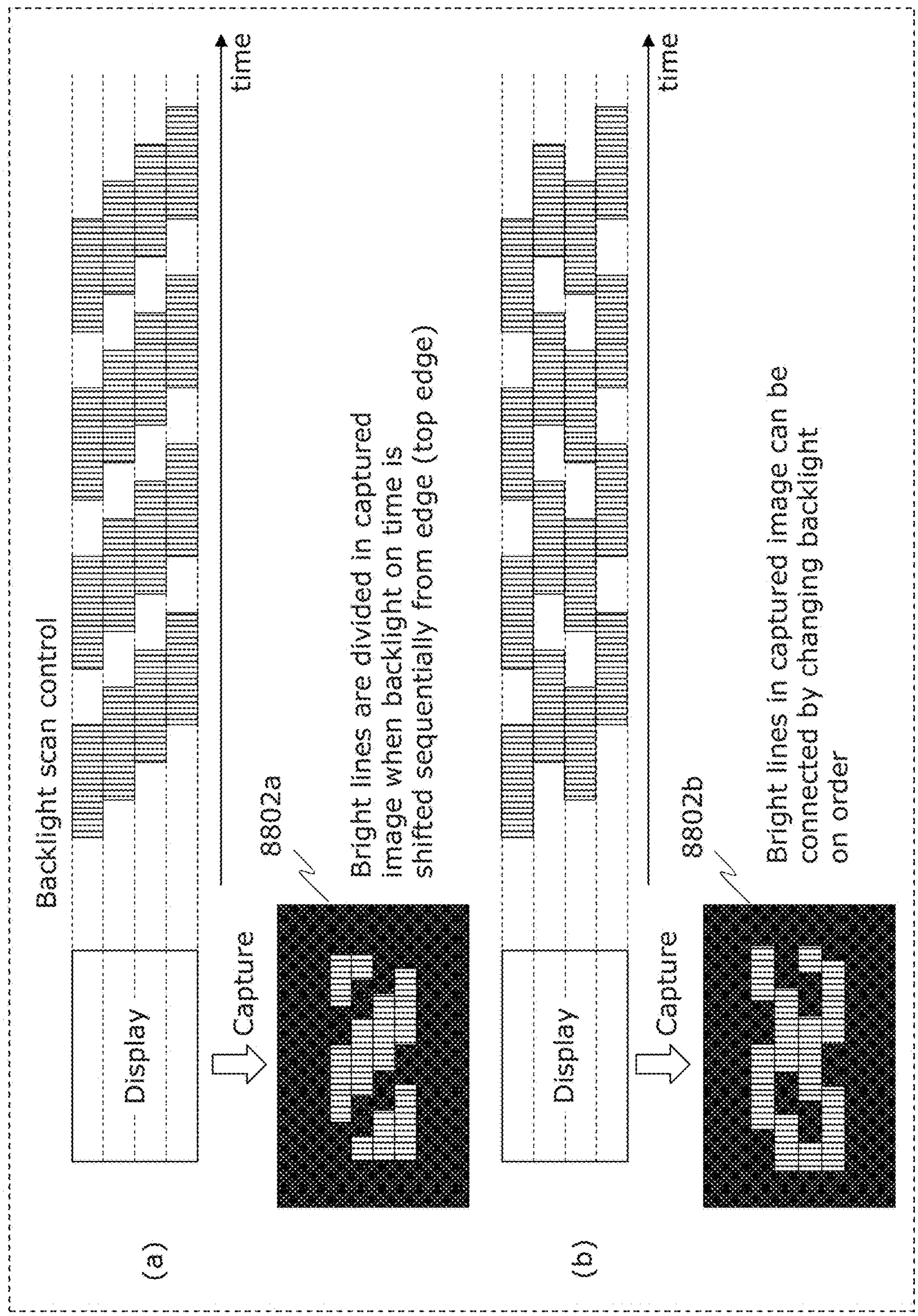

FIG. 149 is a diagram illustrating a superresolution process in Embodiment 5;

FIG. 150 is a diagram illustrating a display indicating visible light communication capability in Embodiment 5;

FIG. 151 is a diagram illustrating information obtainment using a visible light communication signal in Embodiment 5;

FIG. 152 is a diagram illustrating a data format in Embodiment 5;

FIG. 153 is a diagram illustrating reception by estimating a stereoscopic shape in Embodiment 5;

FIG. 154 is a diagram illustrating reception by estimating a stereoscopic shape in Embodiment 5;

FIG. 155 is a diagram illustrating stereoscopic projection in Embodiment 5;

FIG. 156 is a diagram illustrating stereoscopic projection in Embodiment 5;

FIG. 157 is a diagram illustrating an example of operation of a transmitter and a receiver in Embodiment 5;

FIG. 158 is a diagram illustrating an example of operation of a transmitter and a receiver in Embodiment 5;

FIG. 159 is a diagram illustrating an example of a transmission signal in Embodiment 6;

FIG. 160 is a diagram illustrating an example of a transmission signal in Embodiment 6;

FIG. 161A is a diagram illustrating an example of an image (bright line image) captured by a receiver in Embodiment 6;

FIG. 161B is a diagram illustrating an example of an image (bright line image) captured by a receiver in Embodiment 6;

FIG. 161C is a diagram illustrating an example of an image (bright line image) captured by a receiver in Embodiment 6;

FIG. 162A is a diagram illustrating an example of an image (bright line image) captured by a receiver in Embodiment 6;

FIG. 162B is a diagram illustrating an example of an image (bright line image) captured by a receiver in Embodiment 6;

FIG. 163A is a diagram illustrating an example of an image (bright line image) captured by a receiver in Embodiment 6;

FIG. 163B is a diagram illustrating an example of an image (bright line image) captured by a receiver in Embodiment 6;

FIG. 163C is a diagram illustrating an example of an image (bright line image) captured by a receiver in Embodiment 6;

FIG. 164 is a diagram illustrating an example of an image (bright line image) captured by a receiver in Embodiment 6;

FIG. 165 is a diagram illustrating an example of a transmission signal in Embodiment 6;

FIG. 166 is a diagram illustrating an example of operation of a receiver in Embodiment 6;

FIG. 167 is a diagram illustrating an example of an instruction to a user displayed on a screen of a receiver in Embodiment 6;

FIG. 168 is a diagram illustrating an example of an instruction to a user displayed on a screen of a receiver in Embodiment 6;

FIG. 169 is a diagram illustrating an example of a signal transmission method in Embodiment 6;

FIG. 170 is a diagram illustrating an example of a signal transmission method in Embodiment 6;

FIG. 171 is a diagram illustrating an example of a signal transmission method in Embodiment 6.

Figure 172:
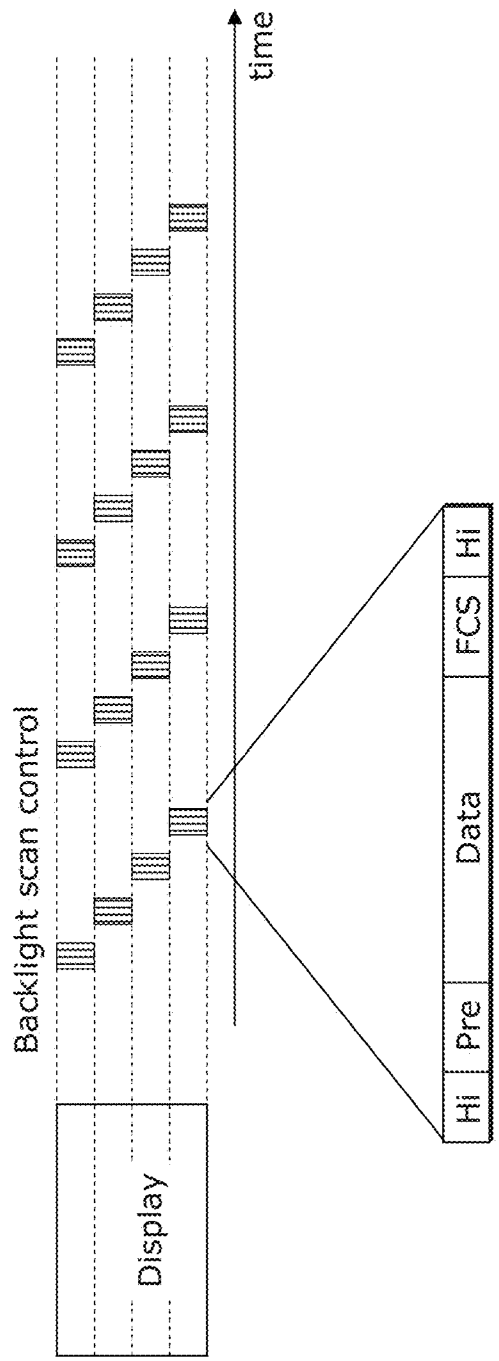
Figure 173:
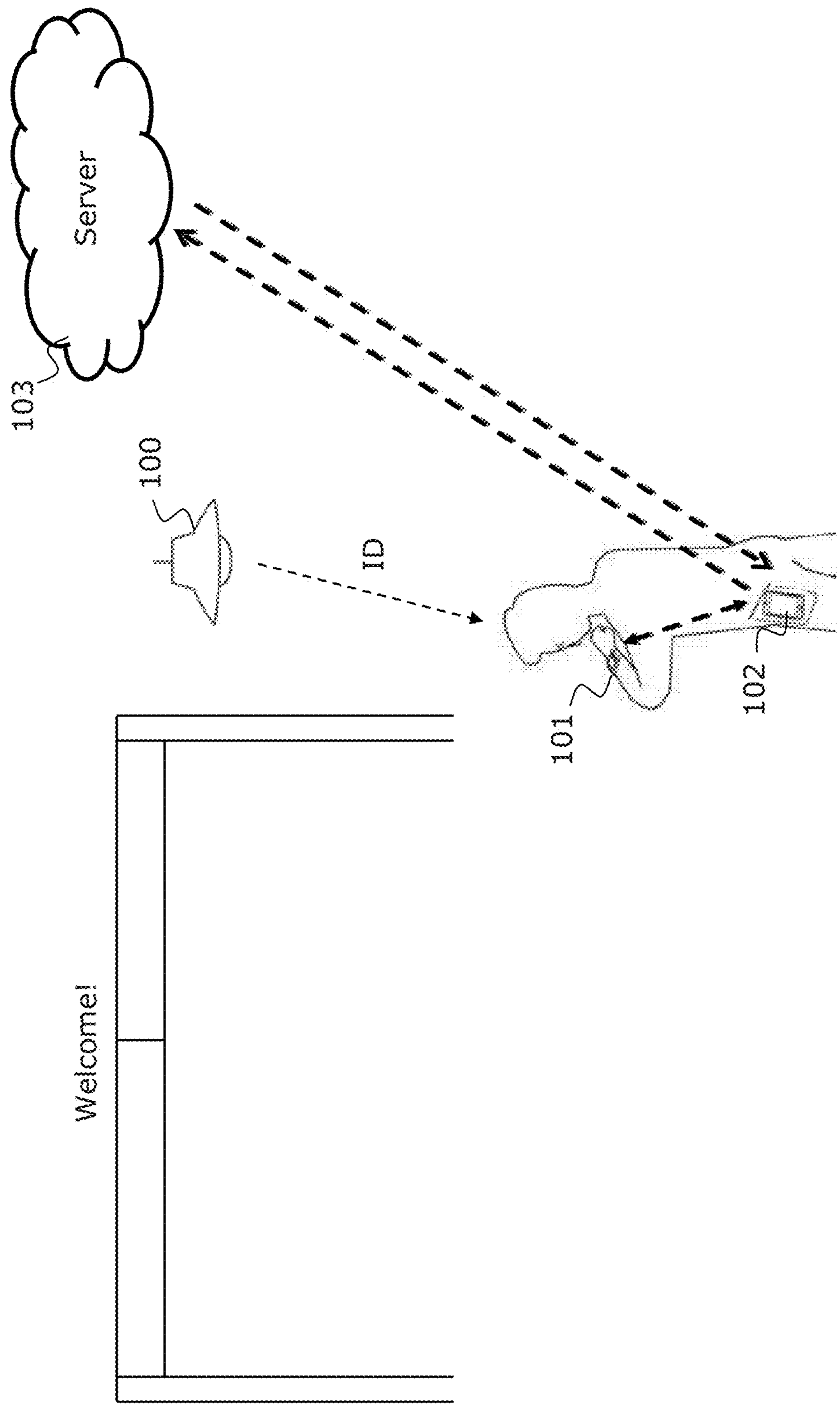
Figure 175:
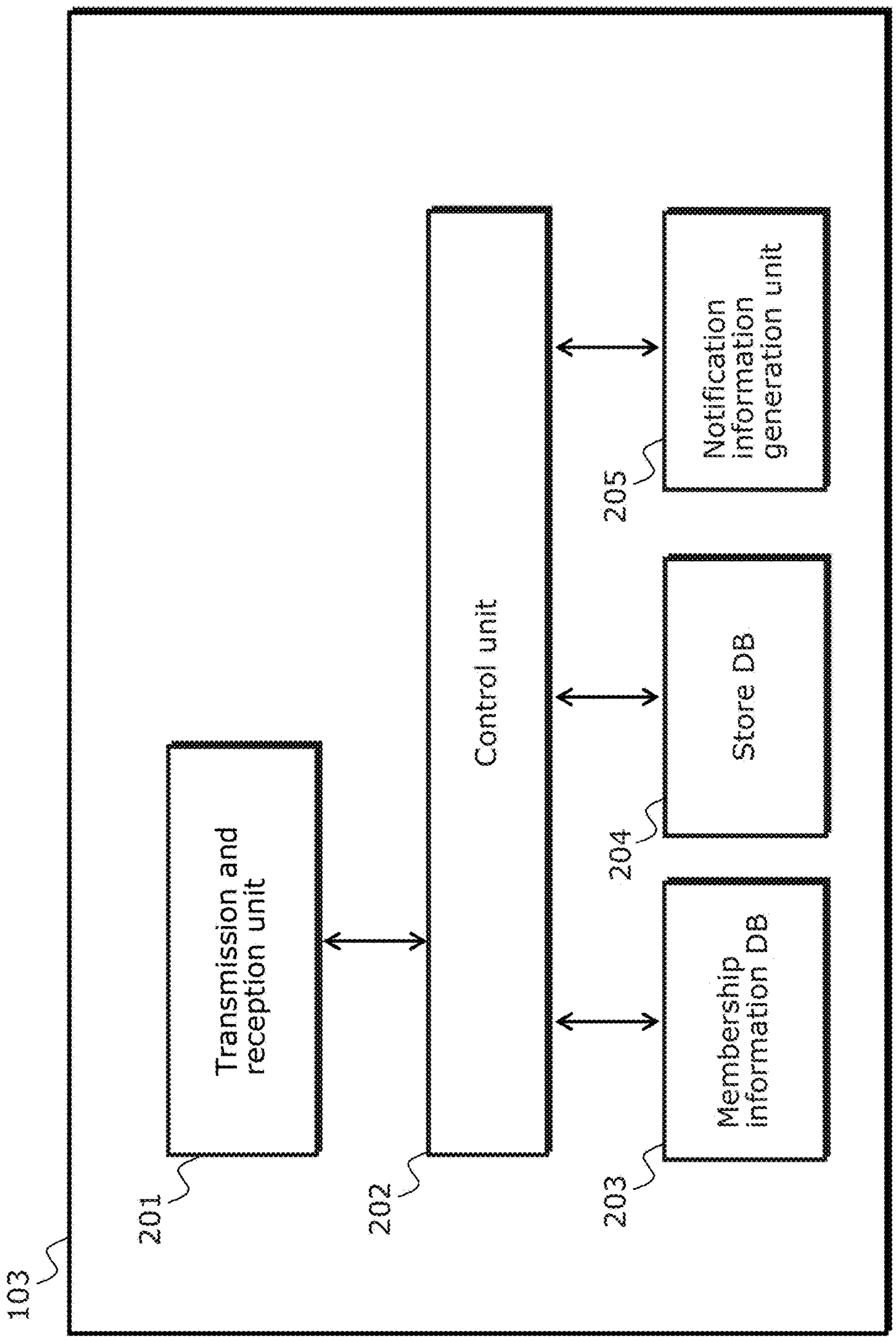
Figure 176:
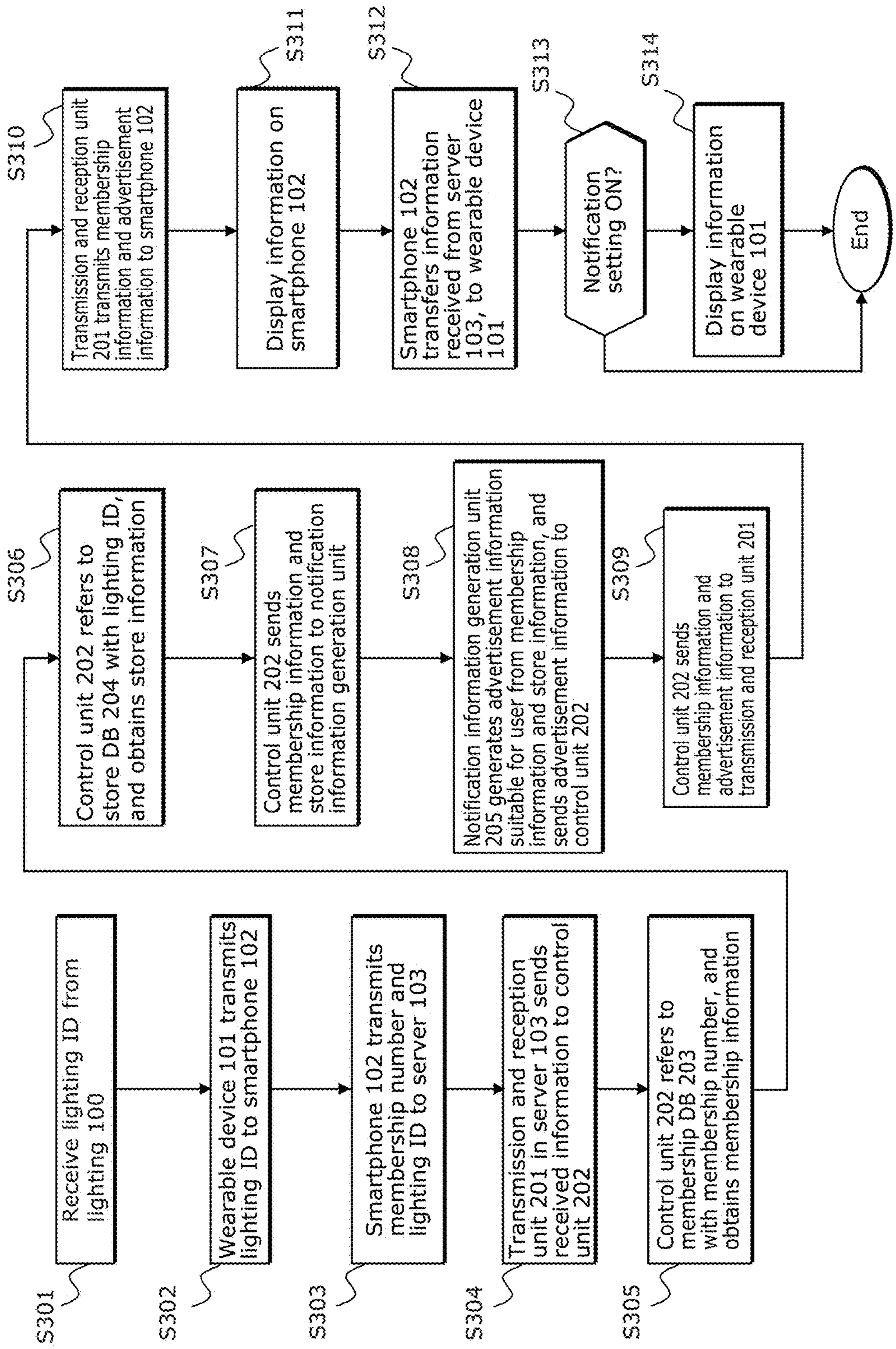
Figure 178:
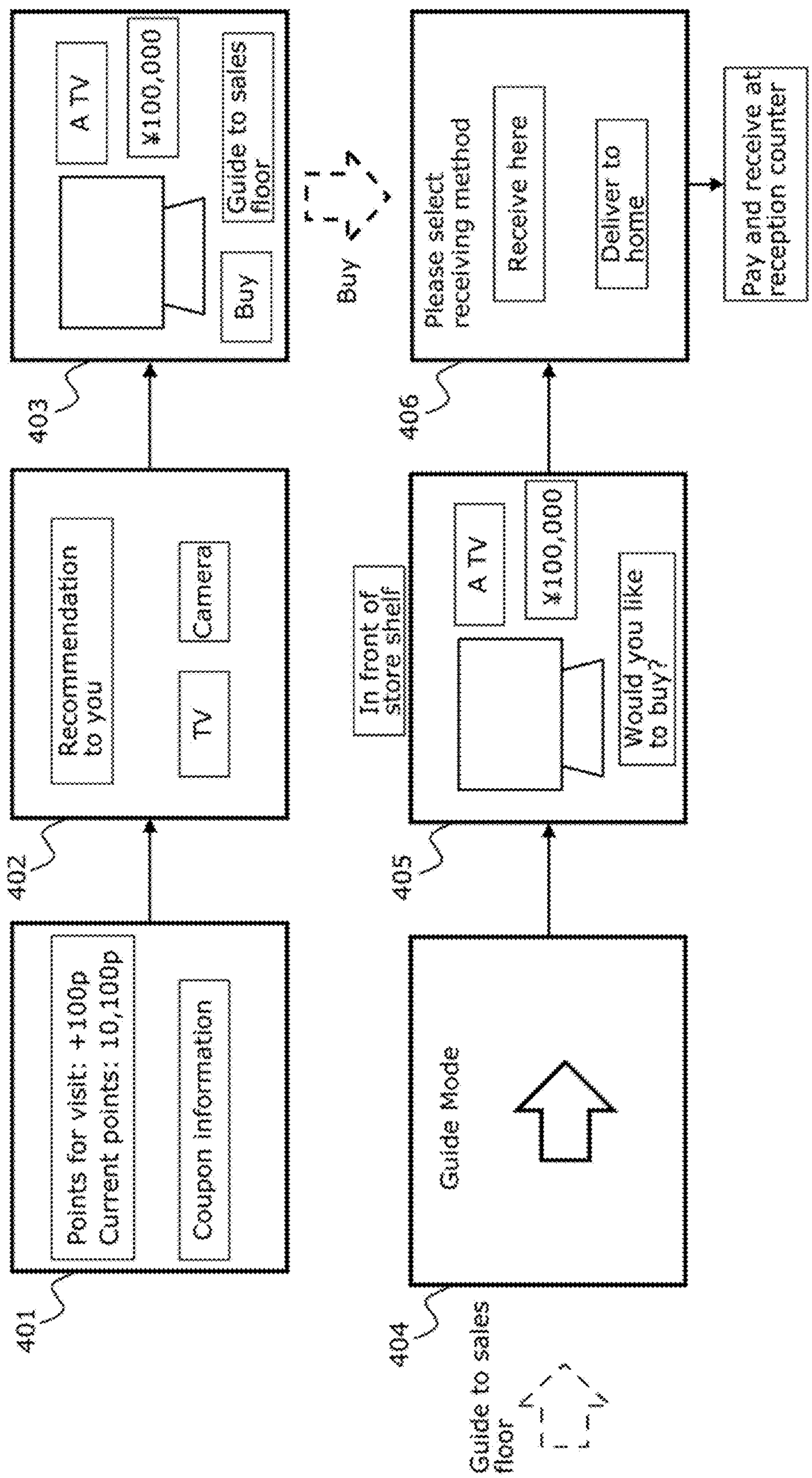
Figure 179:
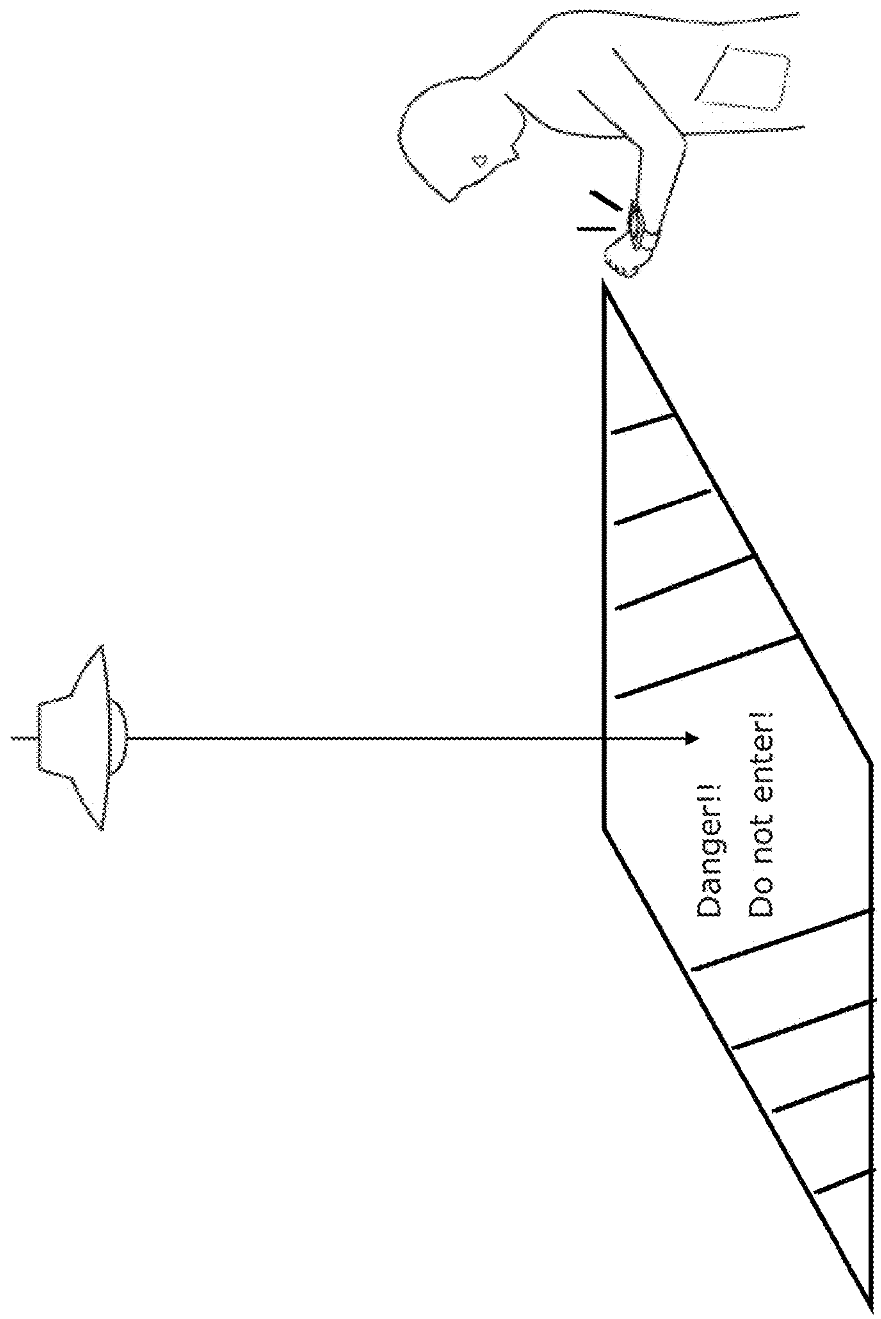
Figure 180:
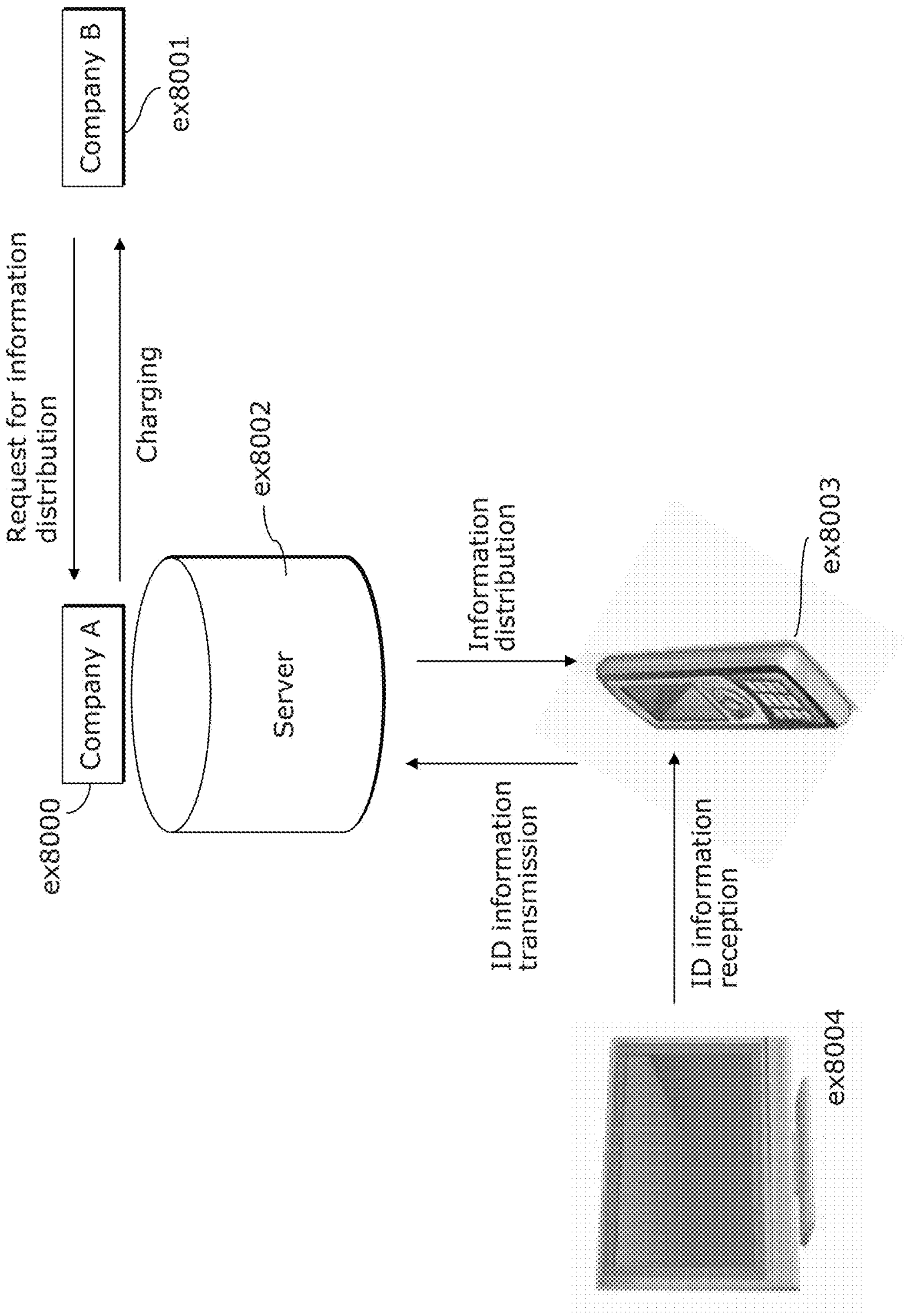
Figure 181:
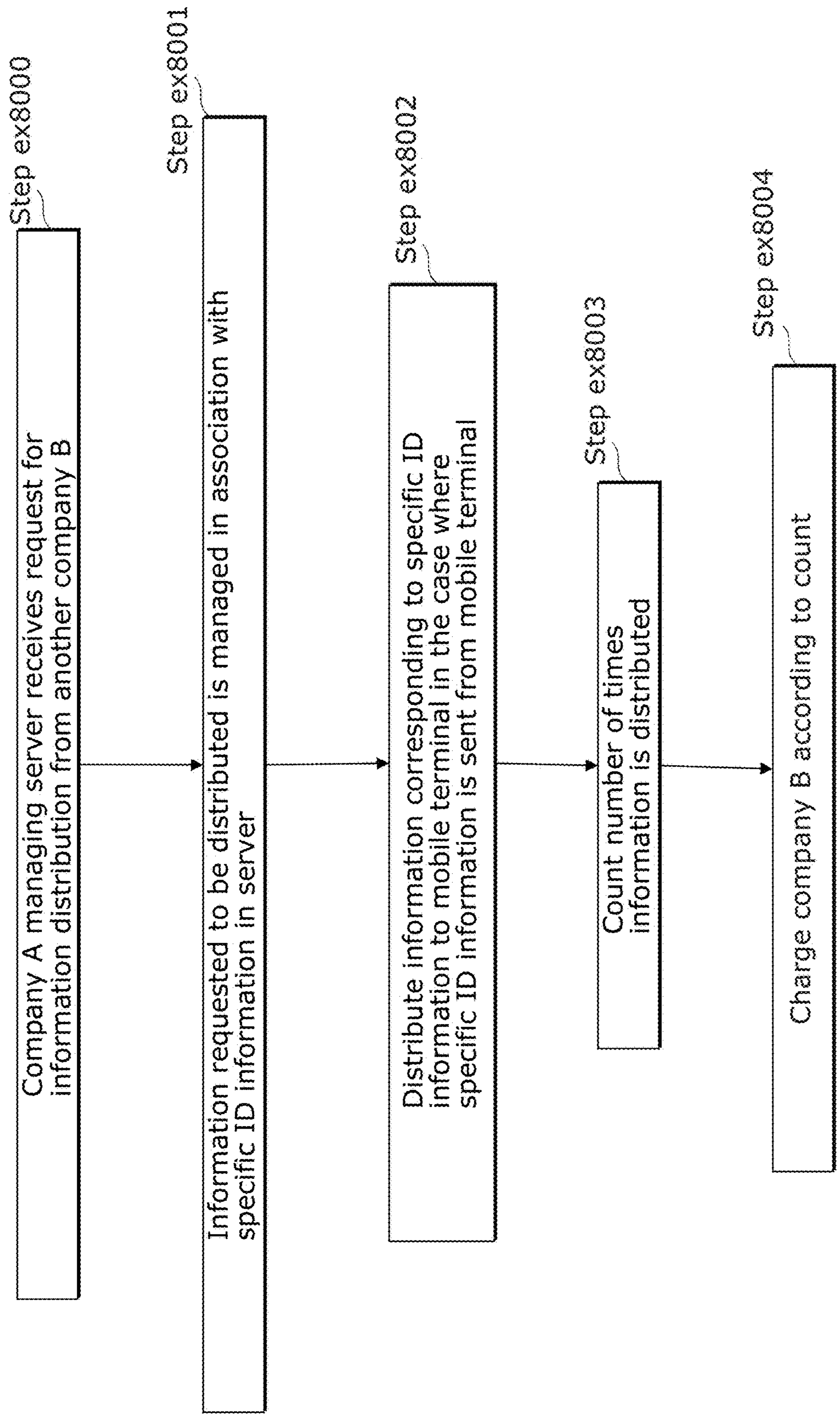
Figure 182:
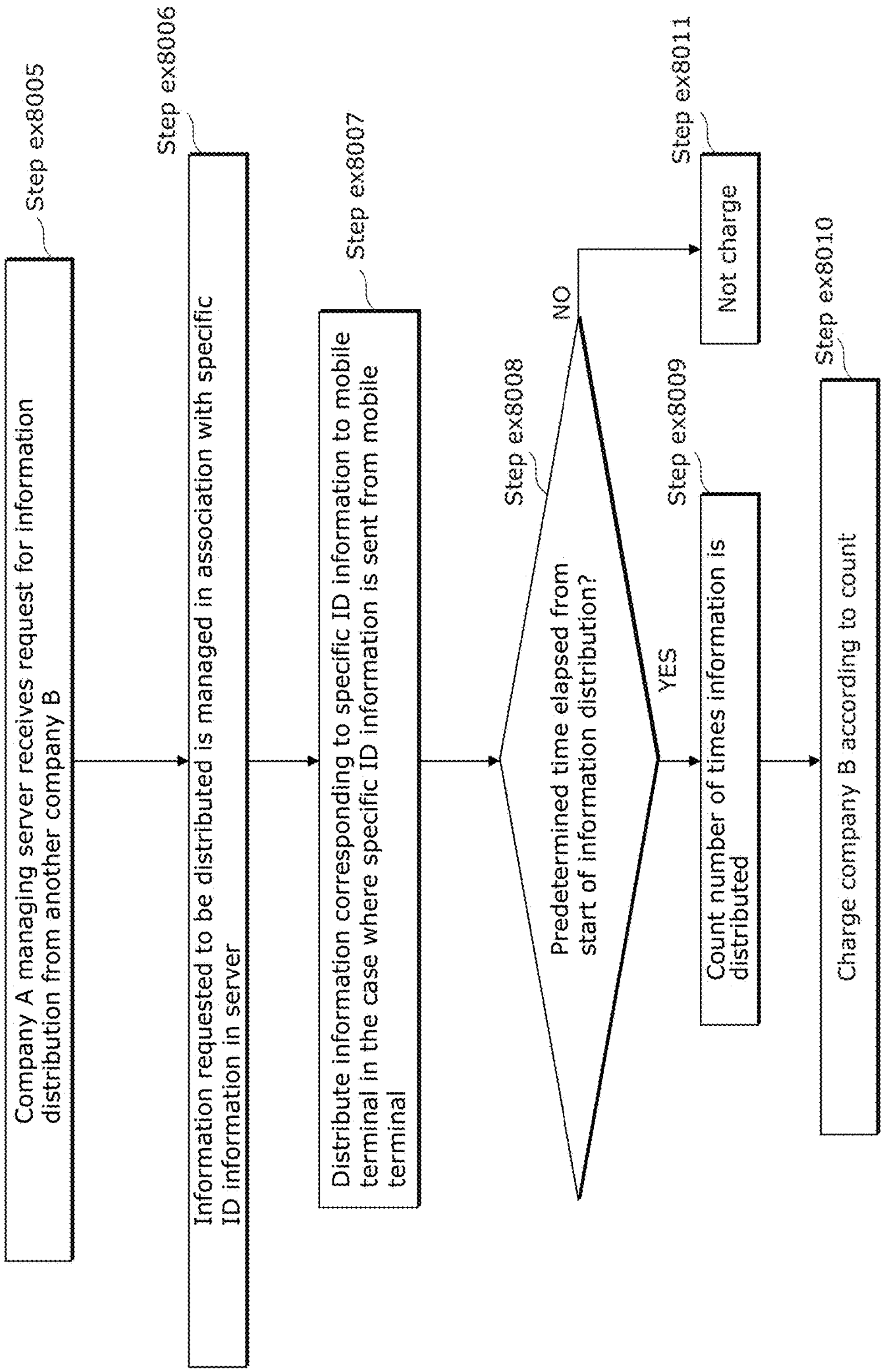
Figure 183:
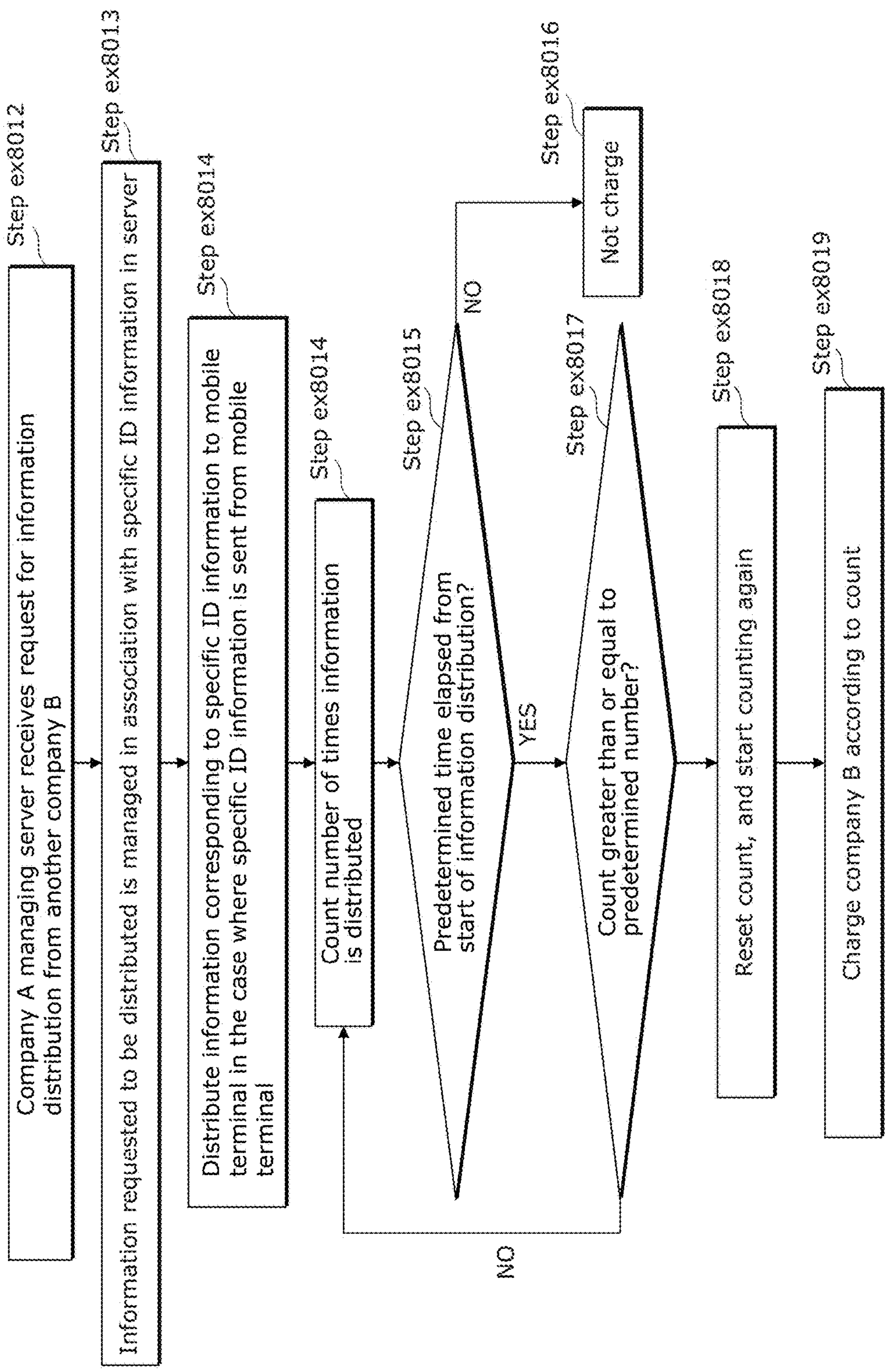
Figure 184A:
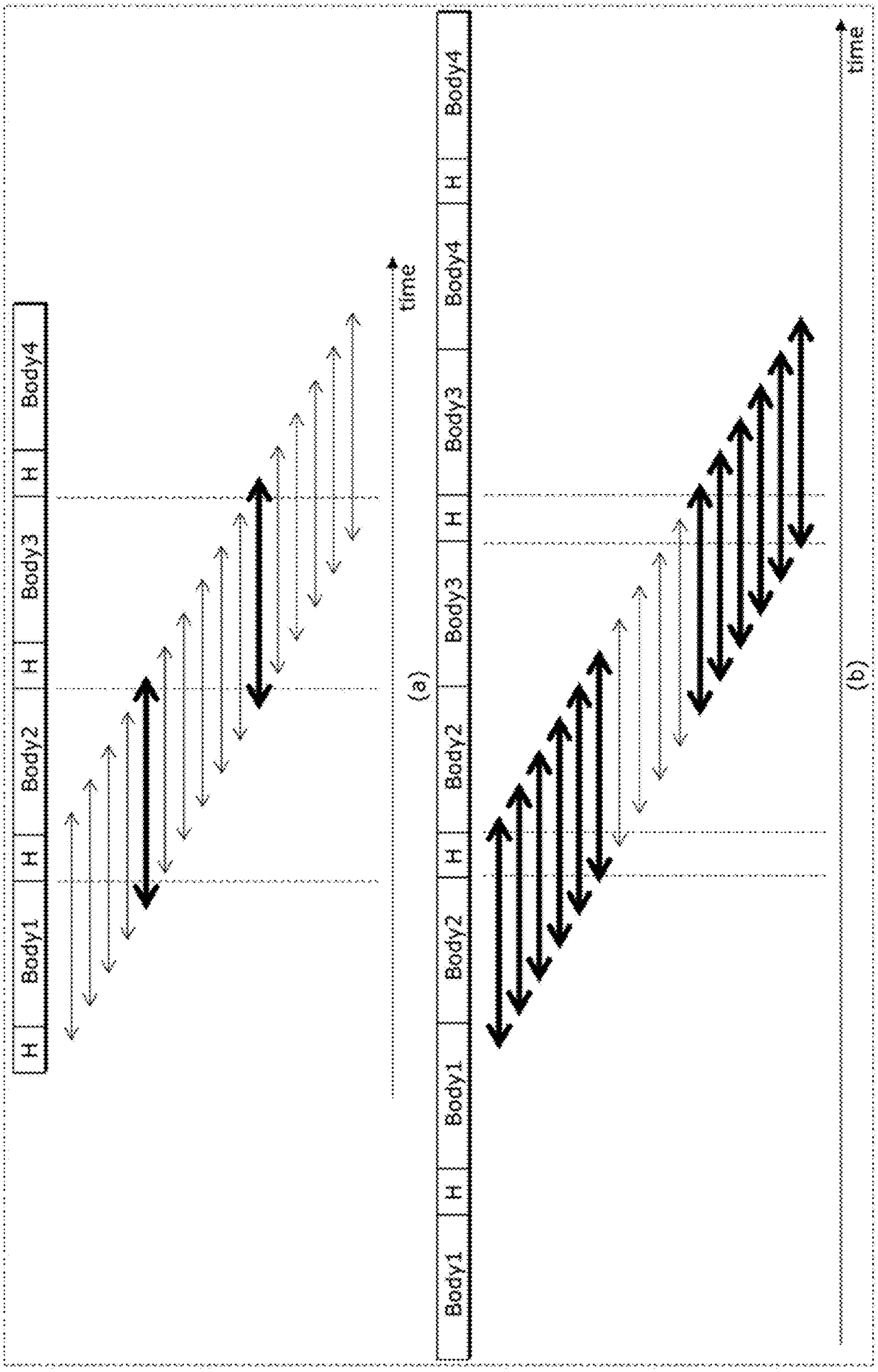
Figure 184B:
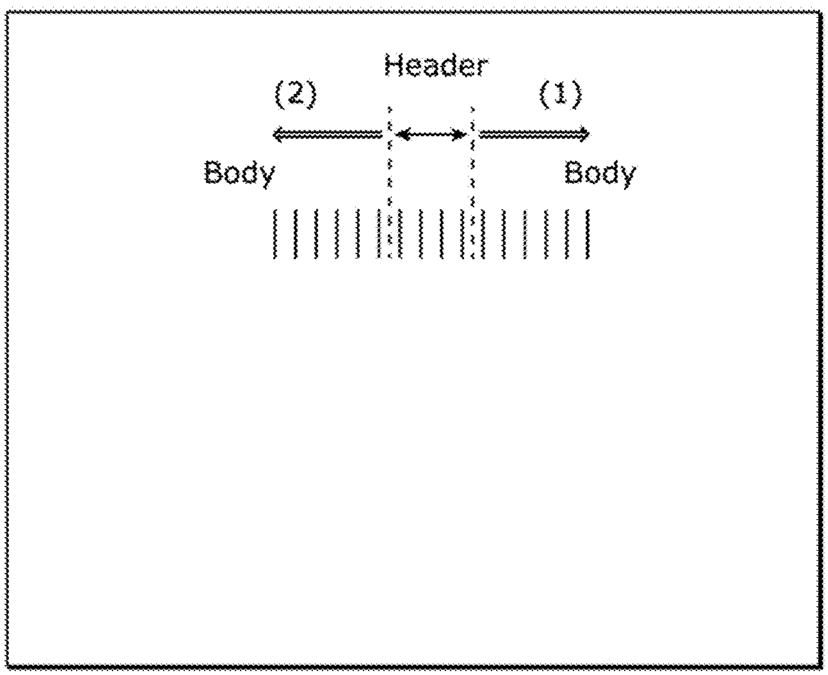
Figure 185:
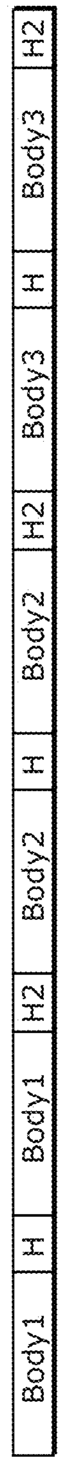
Figure 186:
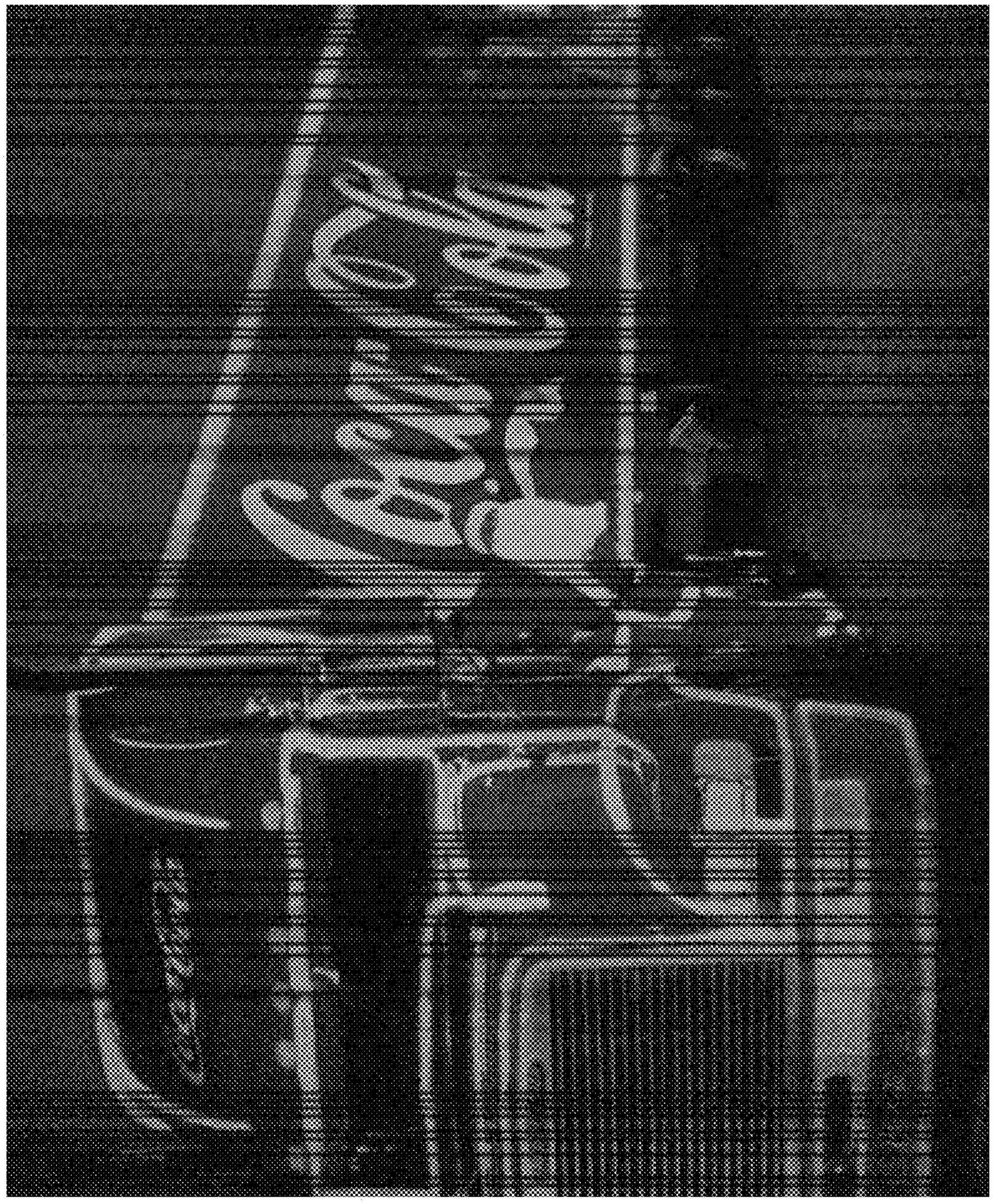
Figure 187A:
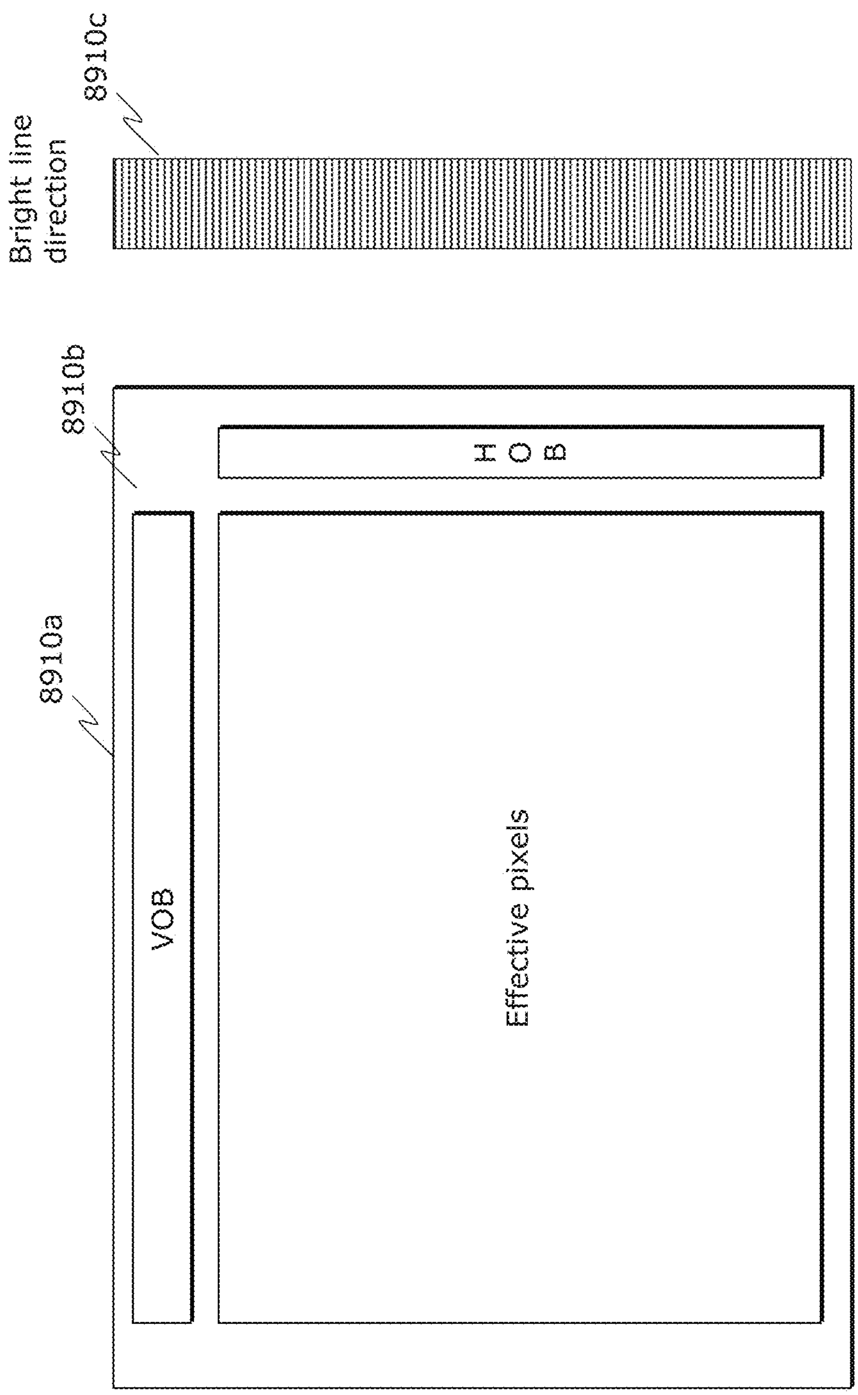
Figure 187B:
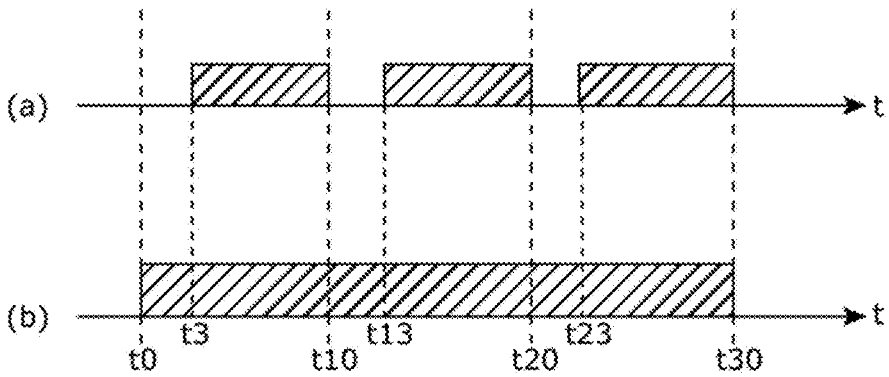
Figure 187C:
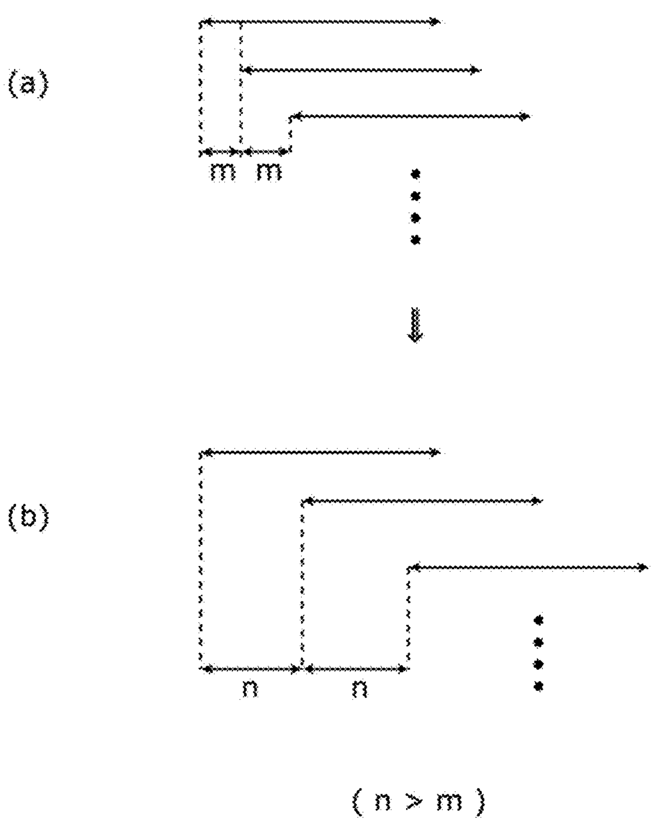
Figure 187D:
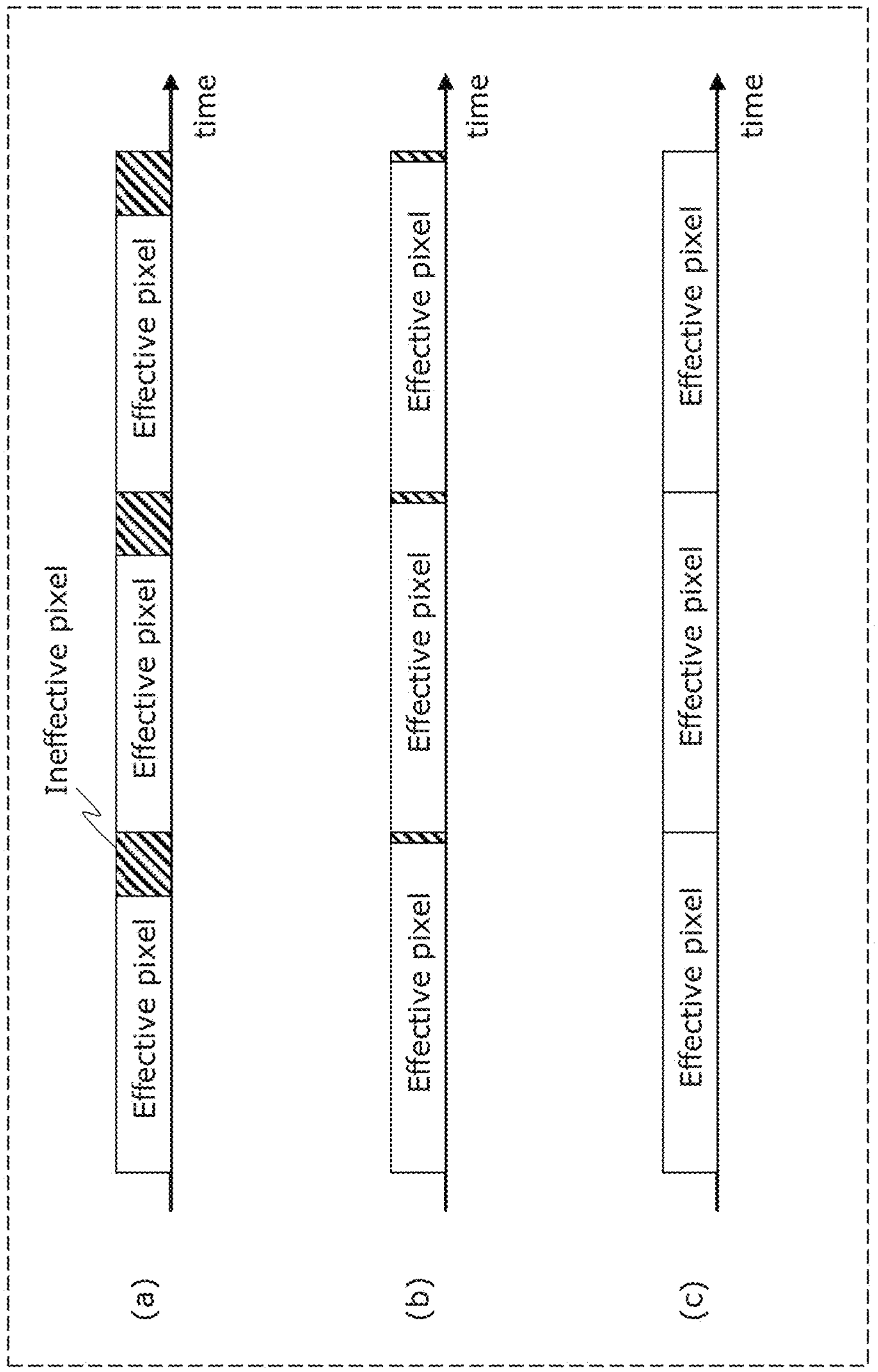
Figure 187E:
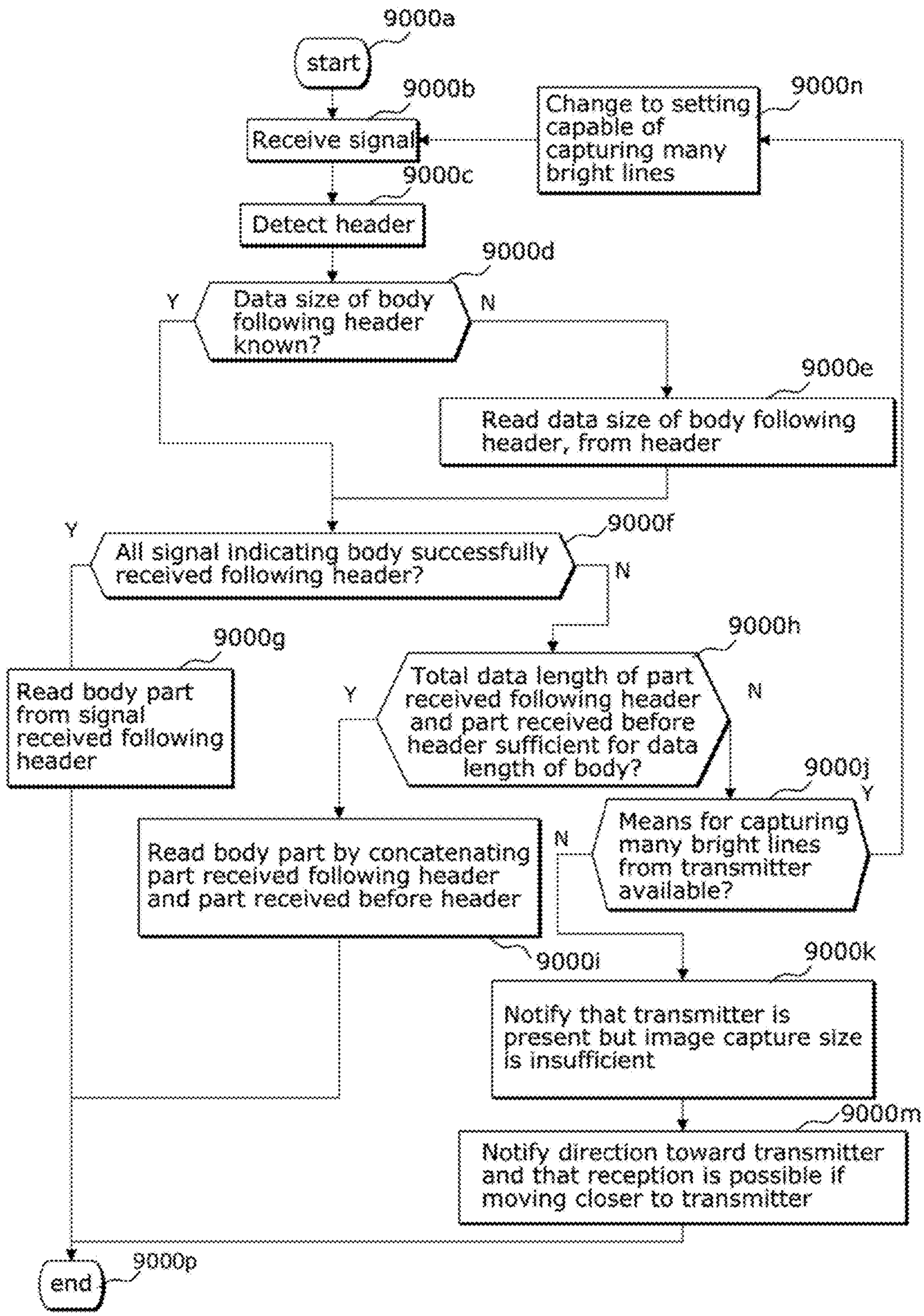
Figure 188:
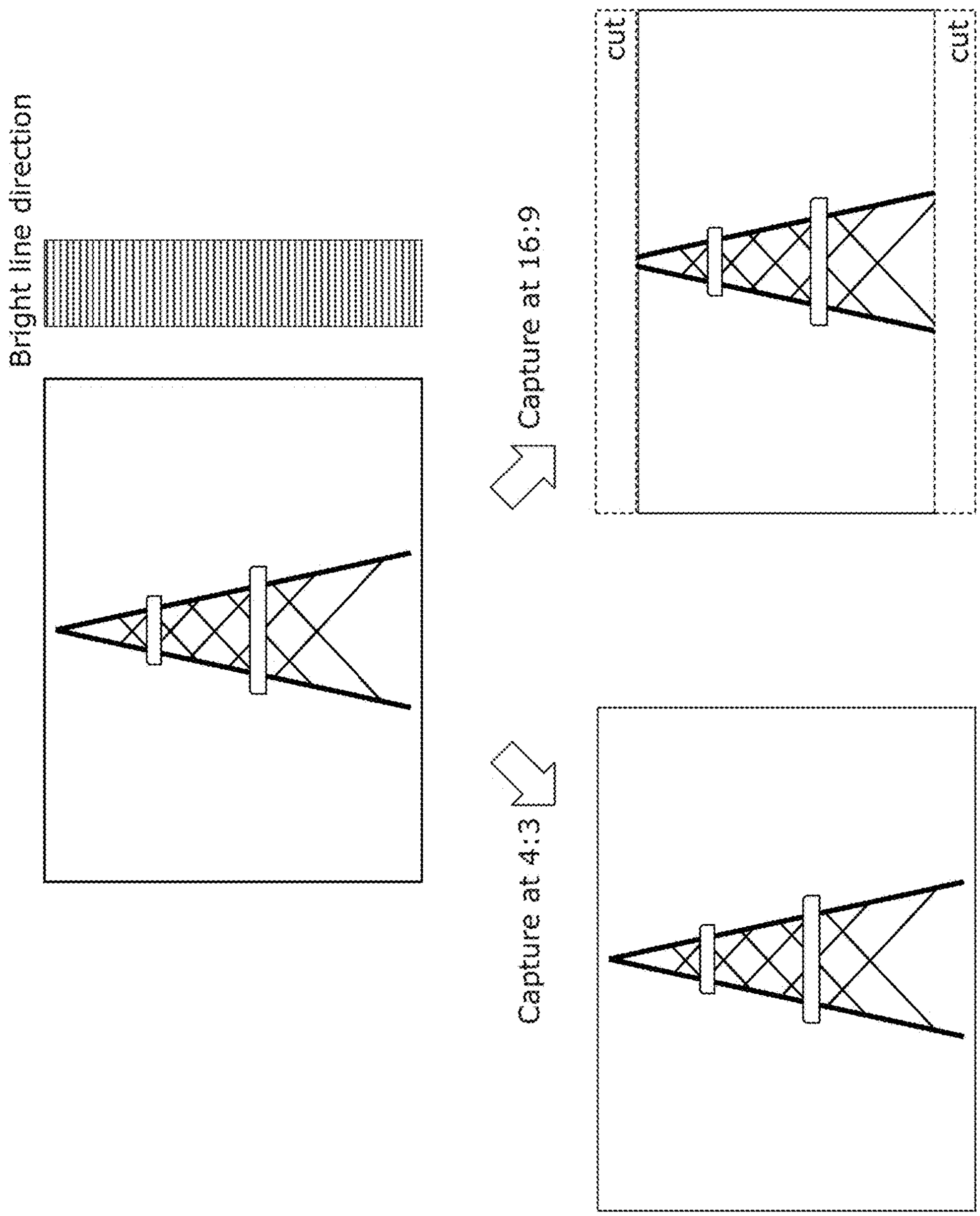
Figure 189A:
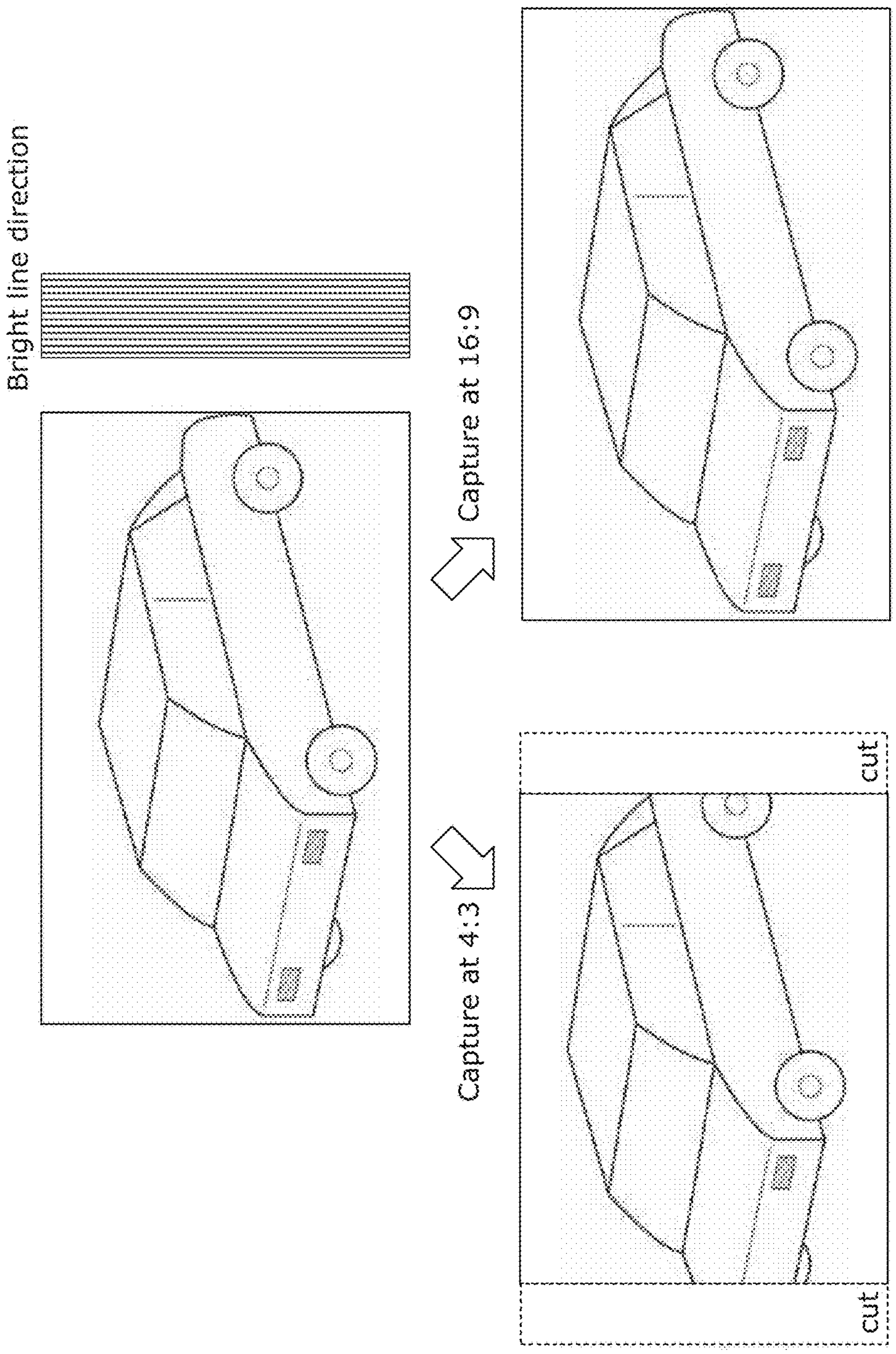
Figure 189B:
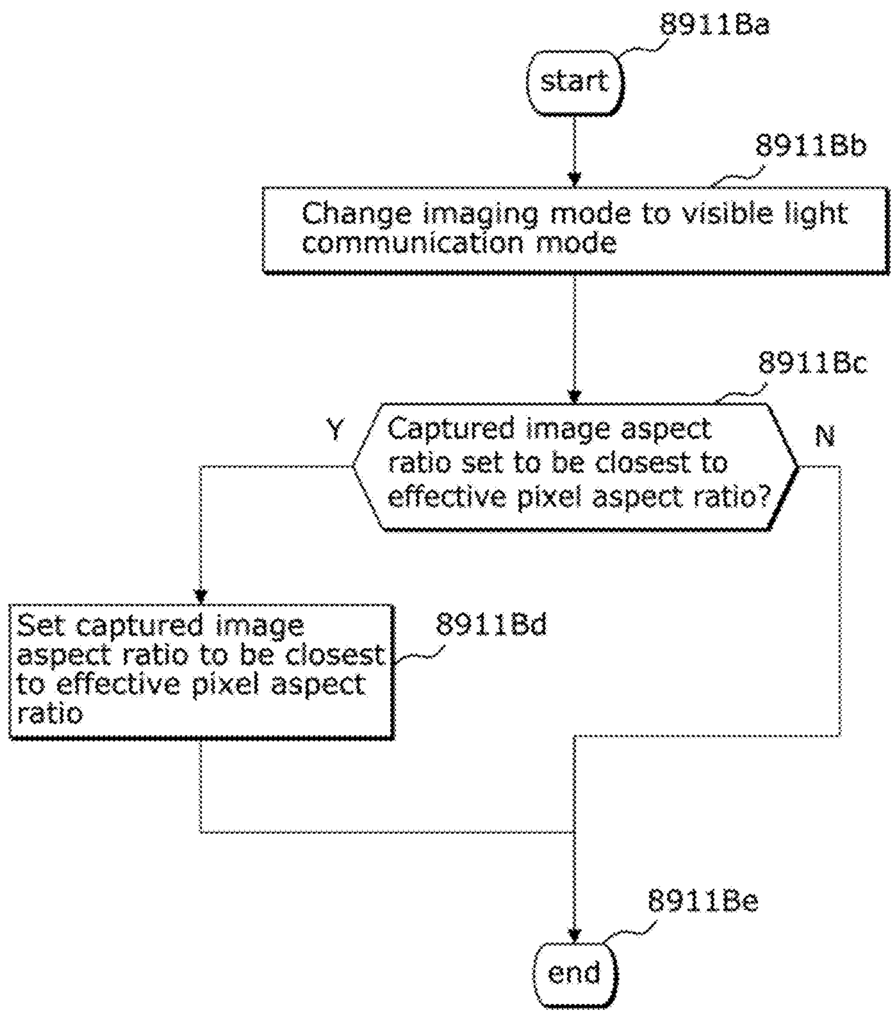
Figure 189C:
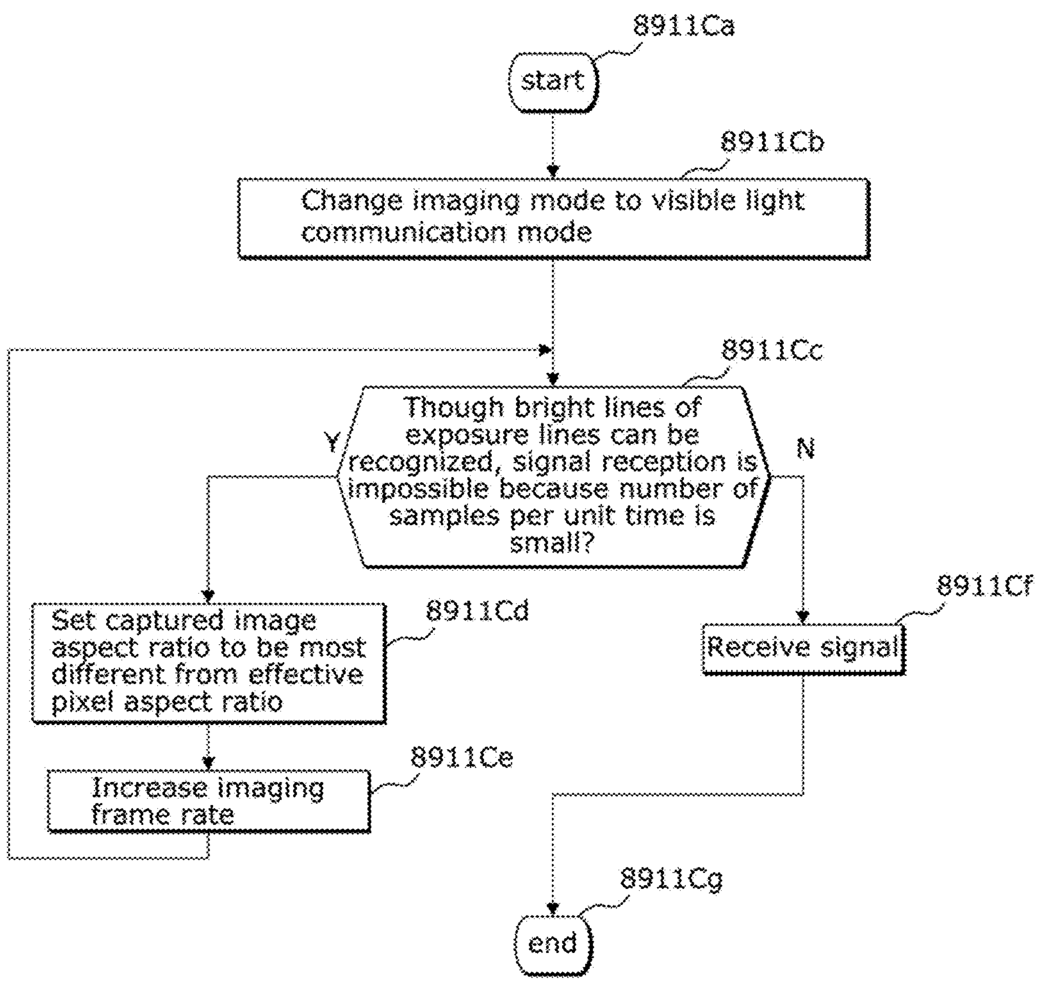
Figure 190:
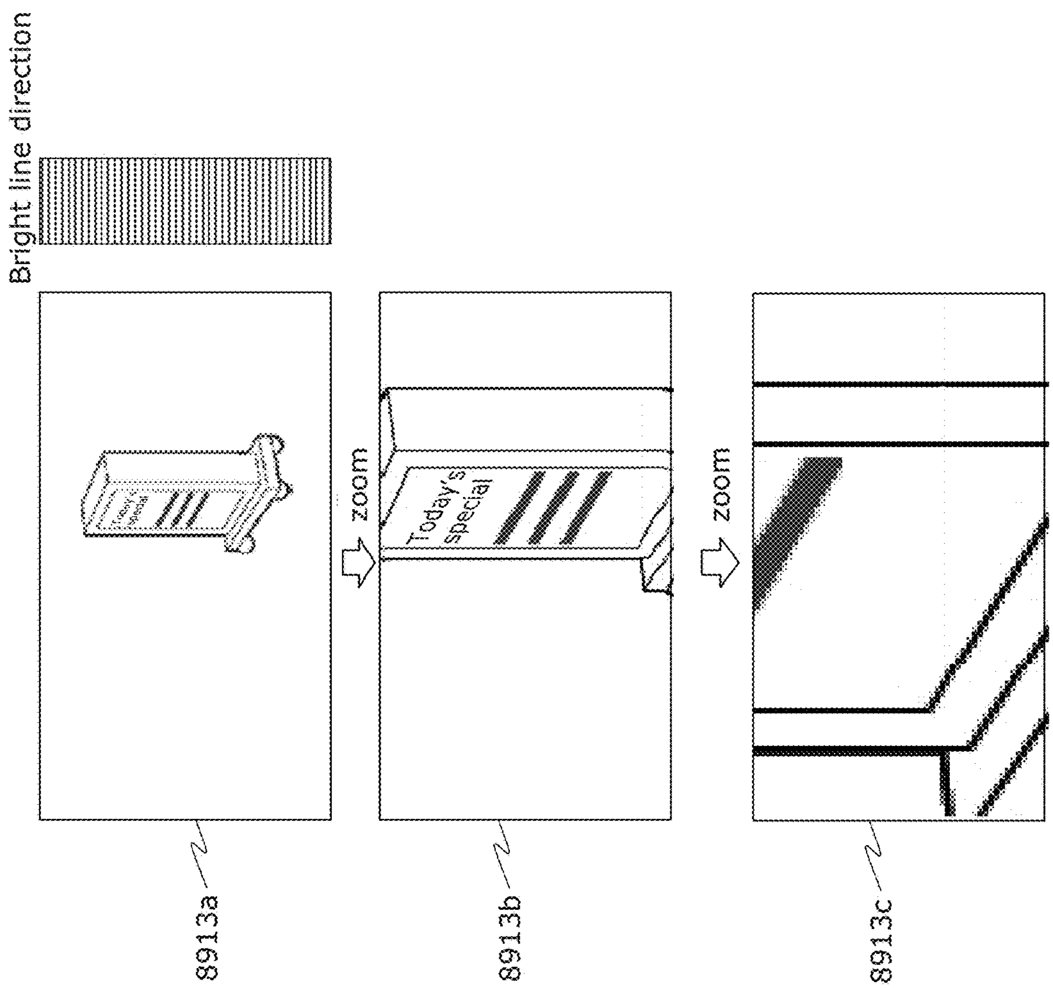
Figure 191:
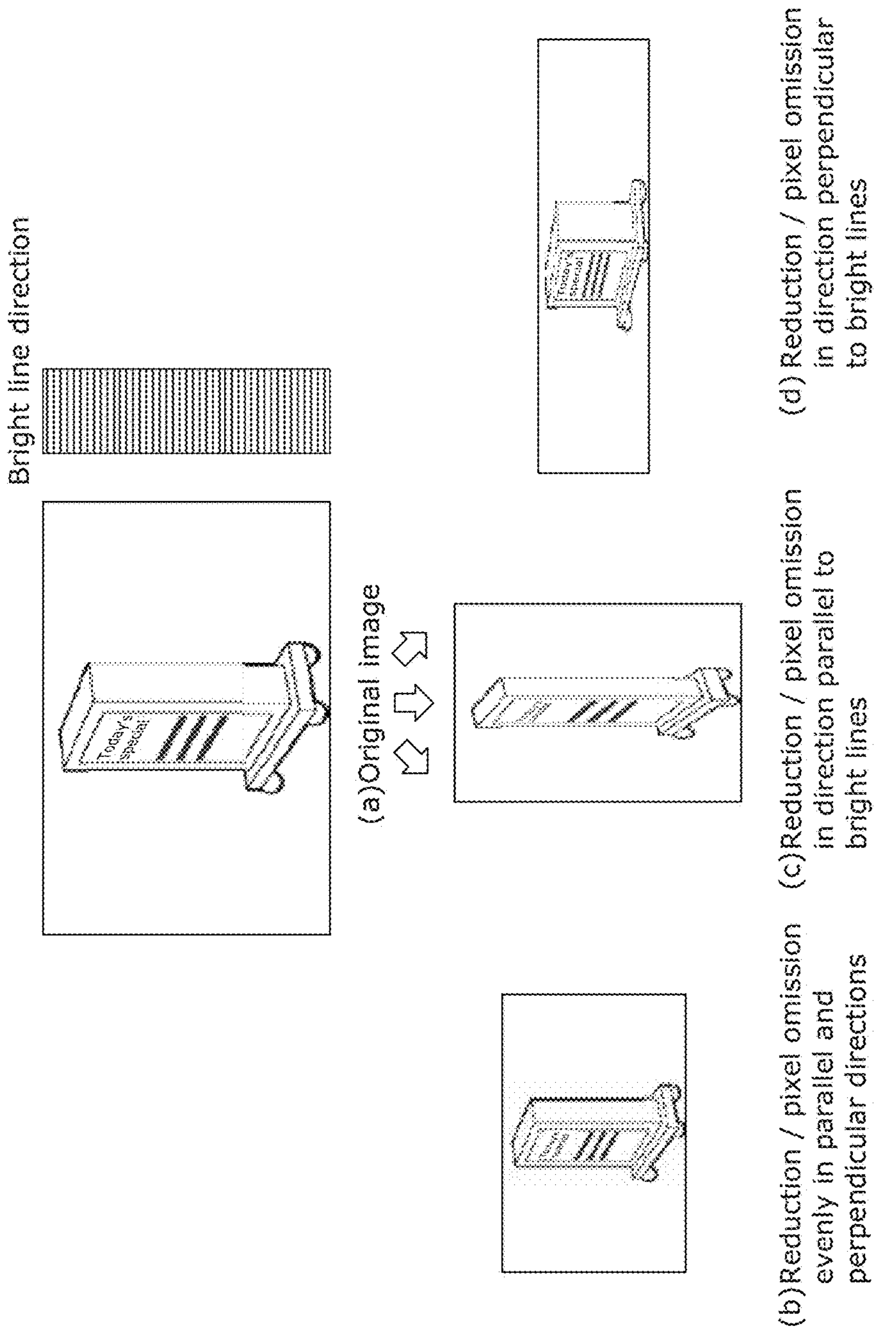
Figure 192:
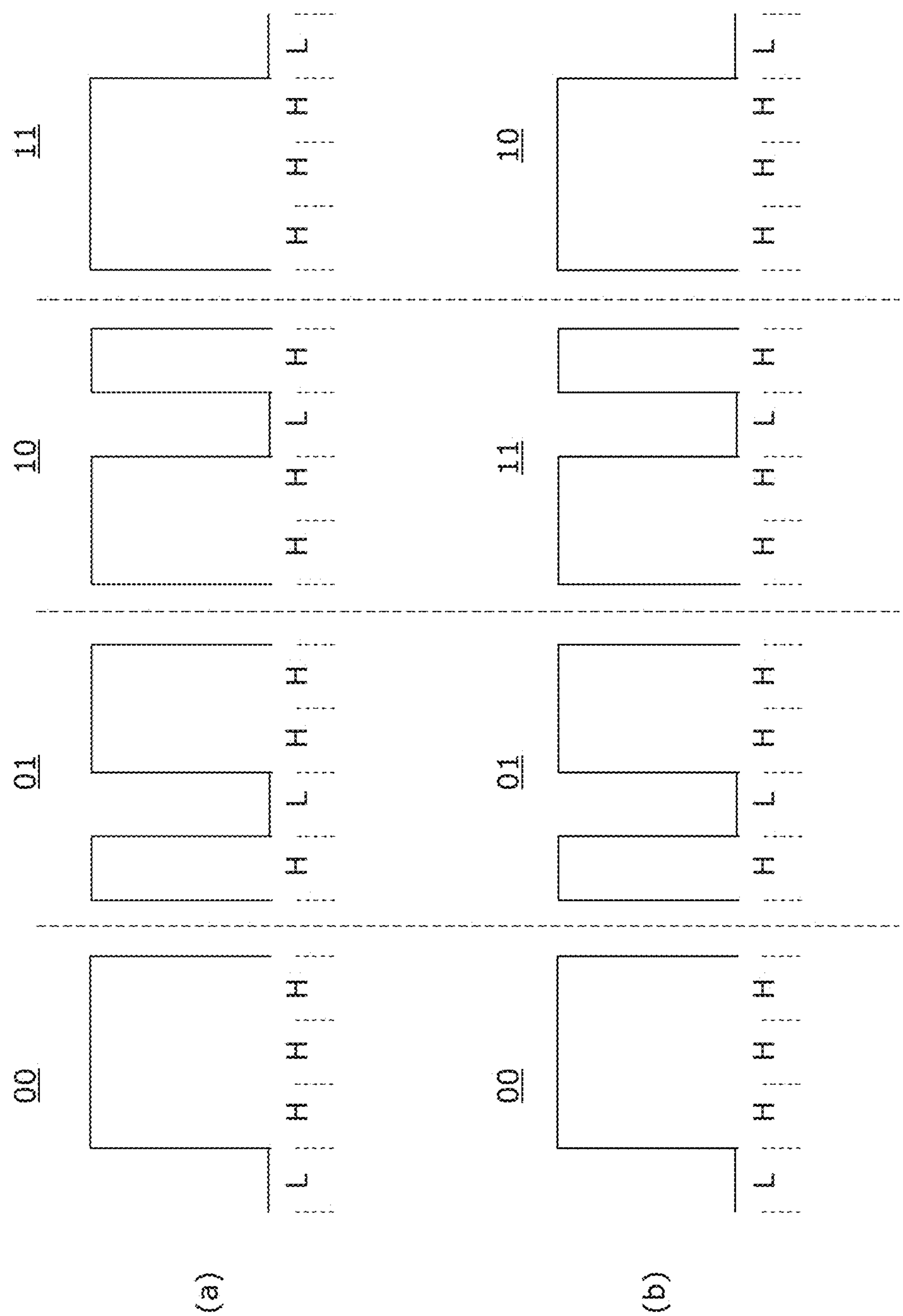
Figure 193:
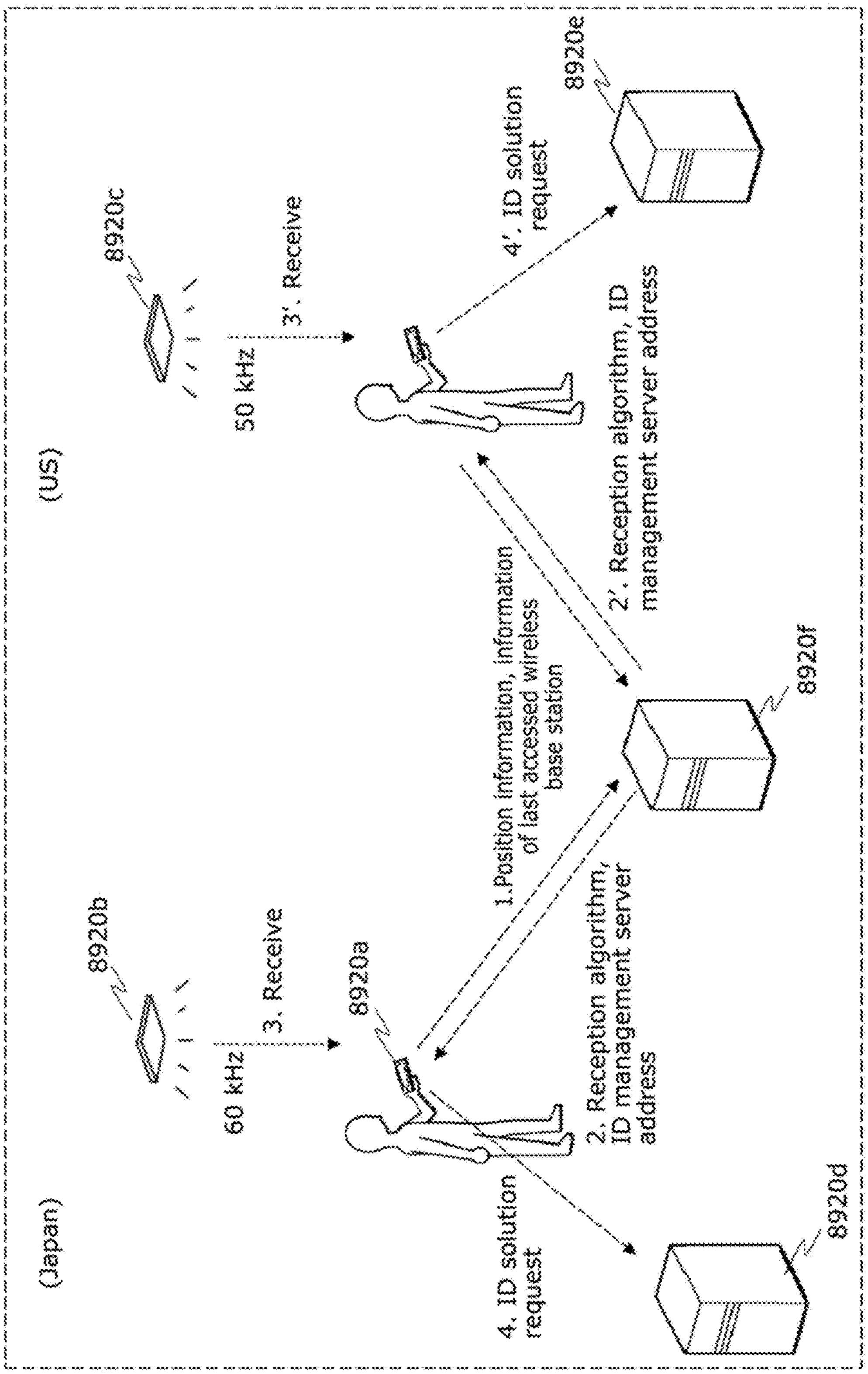
Figure 194:
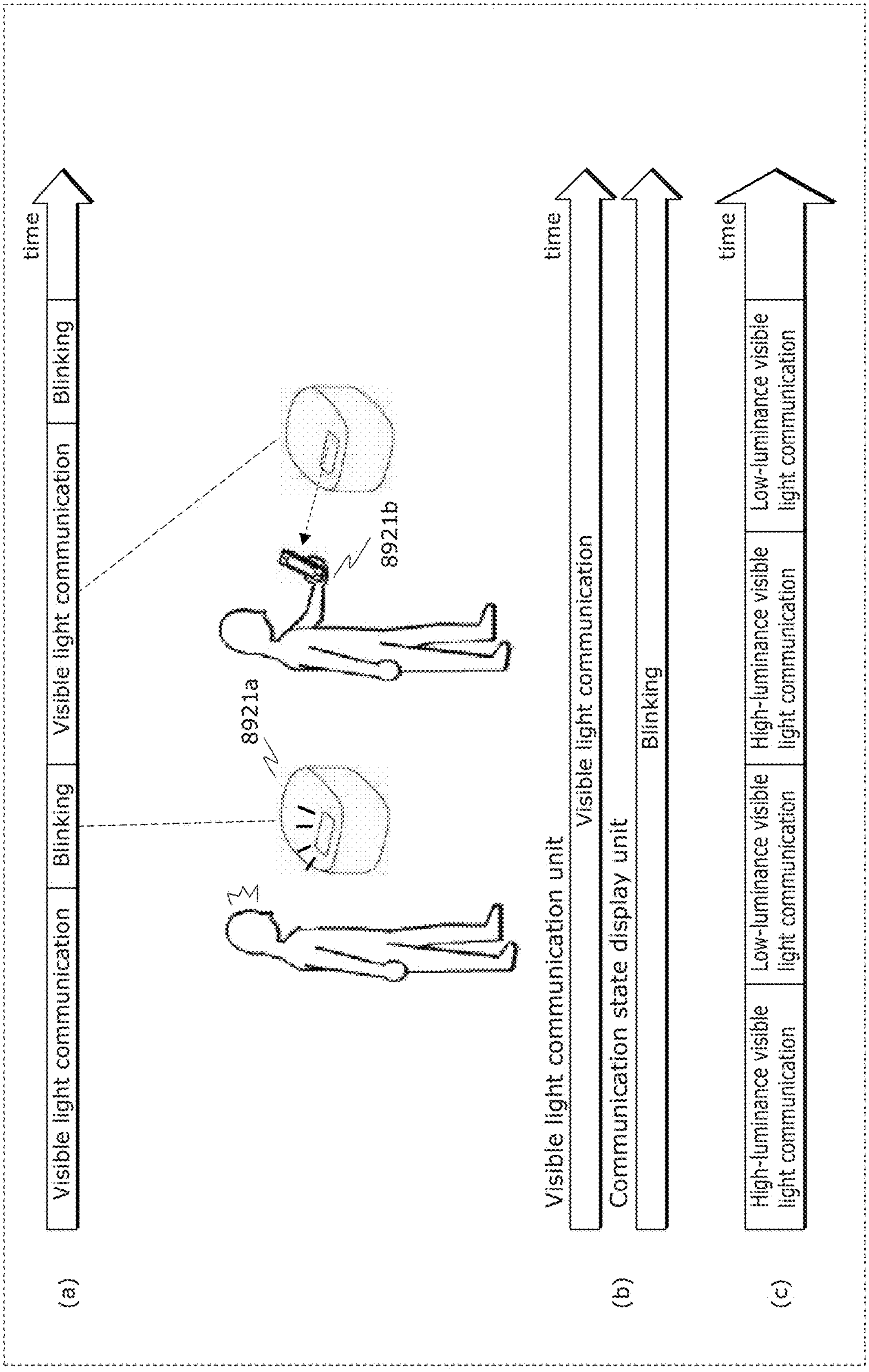
Figure 195:
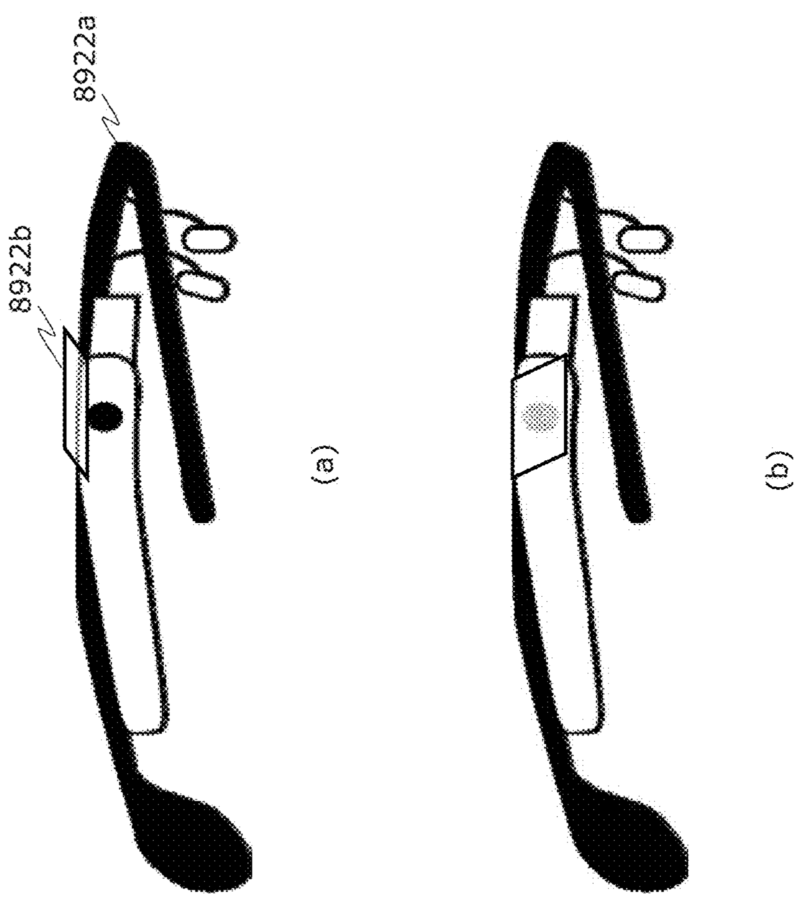
Figure 196:
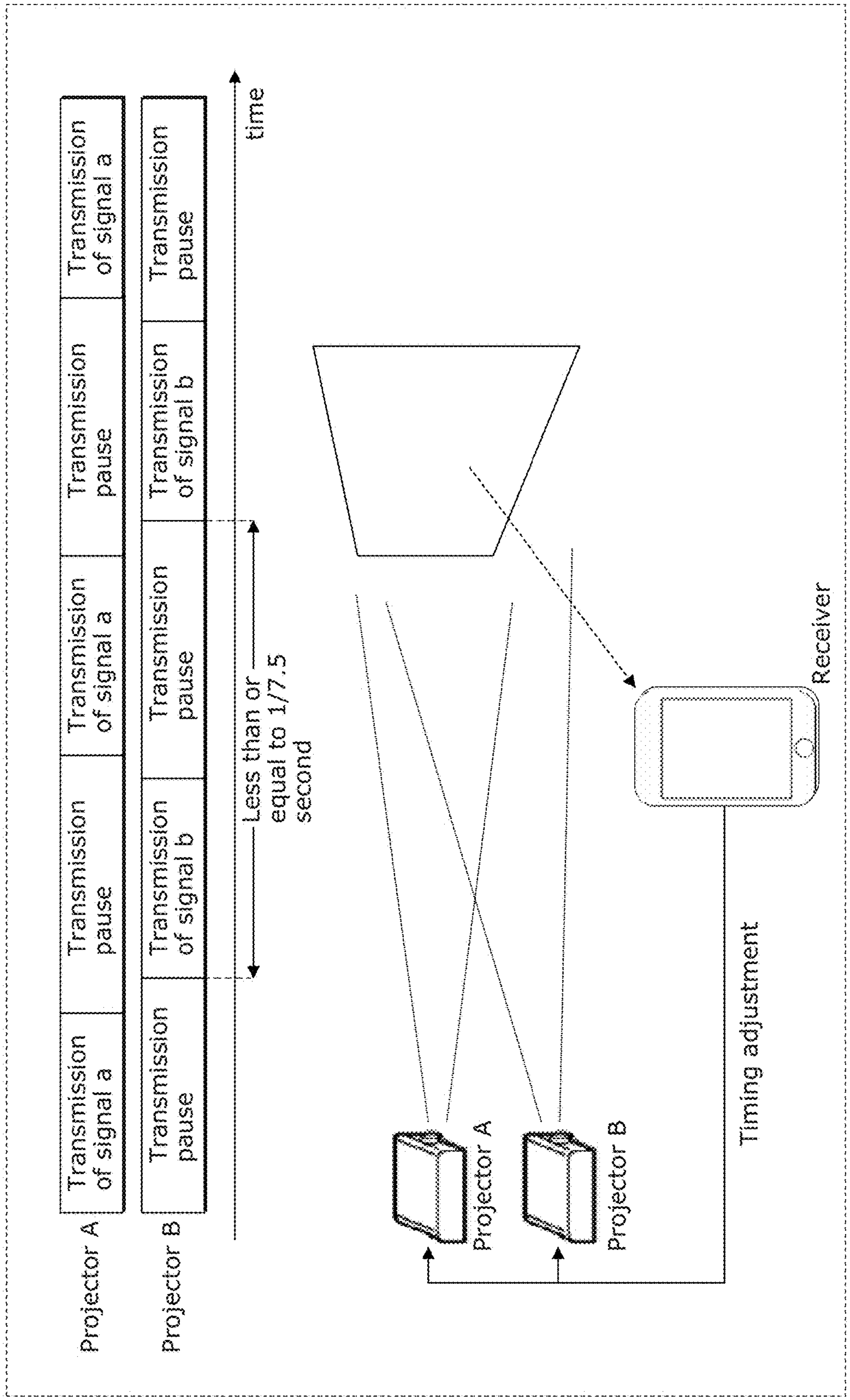
Figure 197:
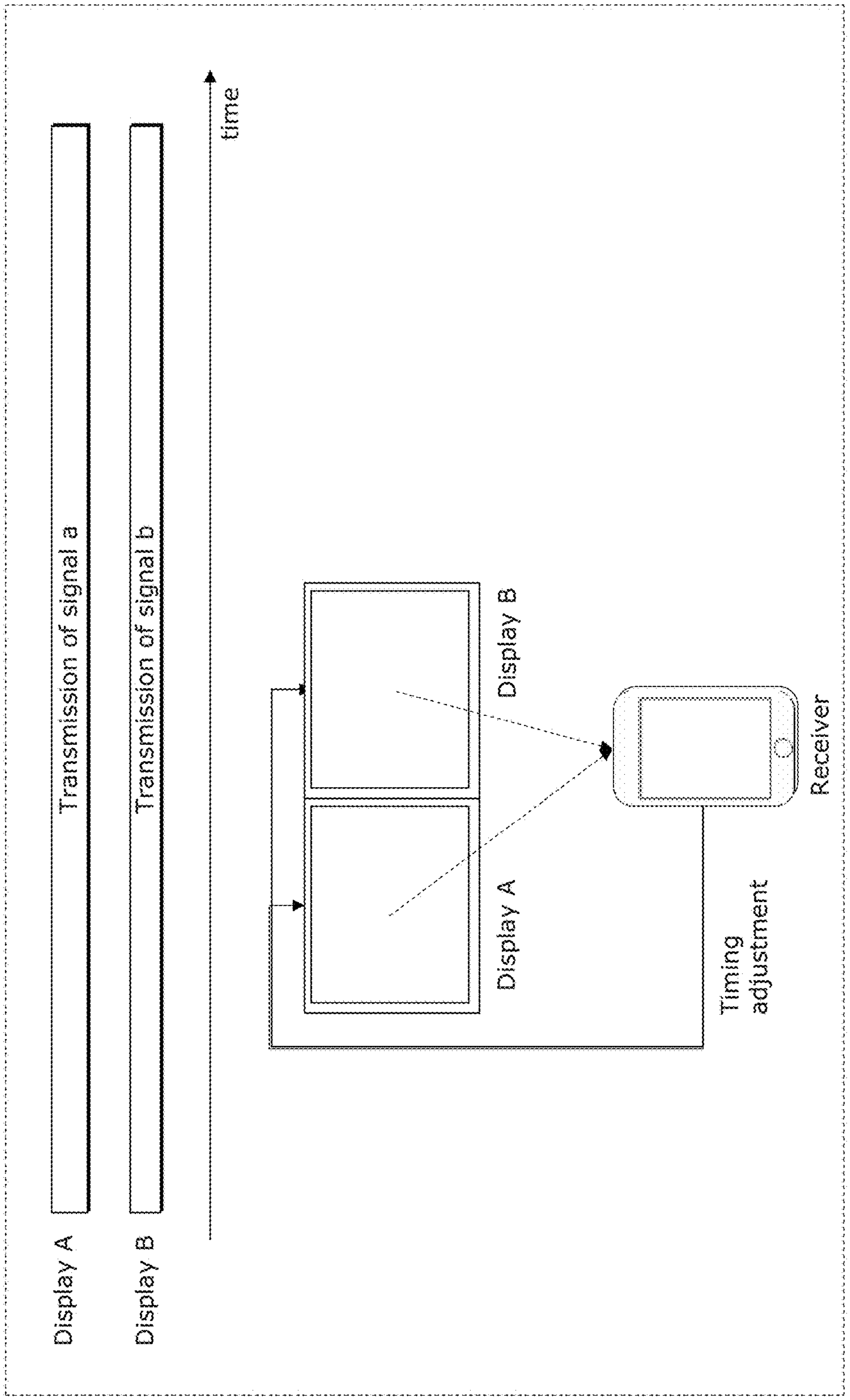
Figure 198:
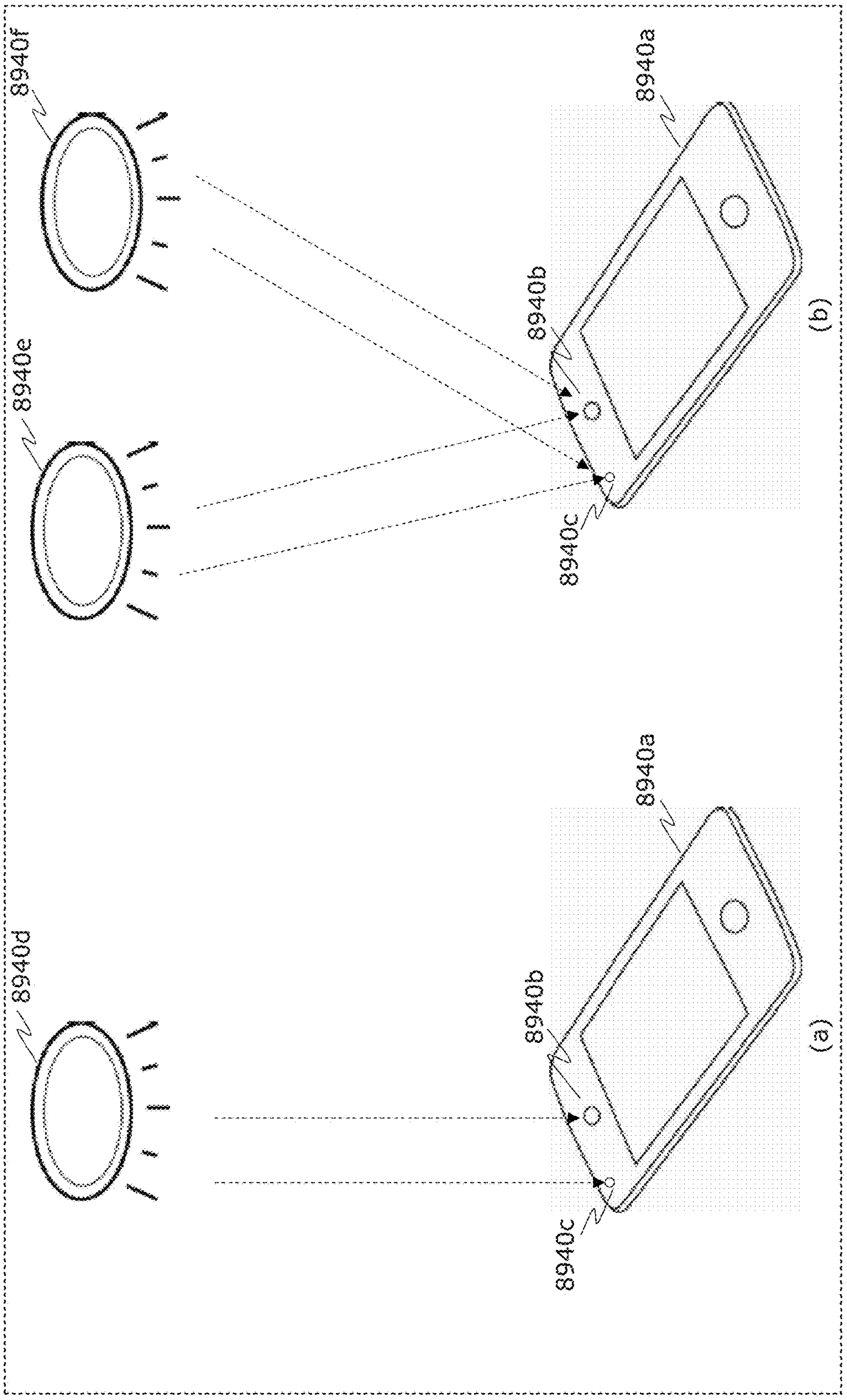
Figure 199:
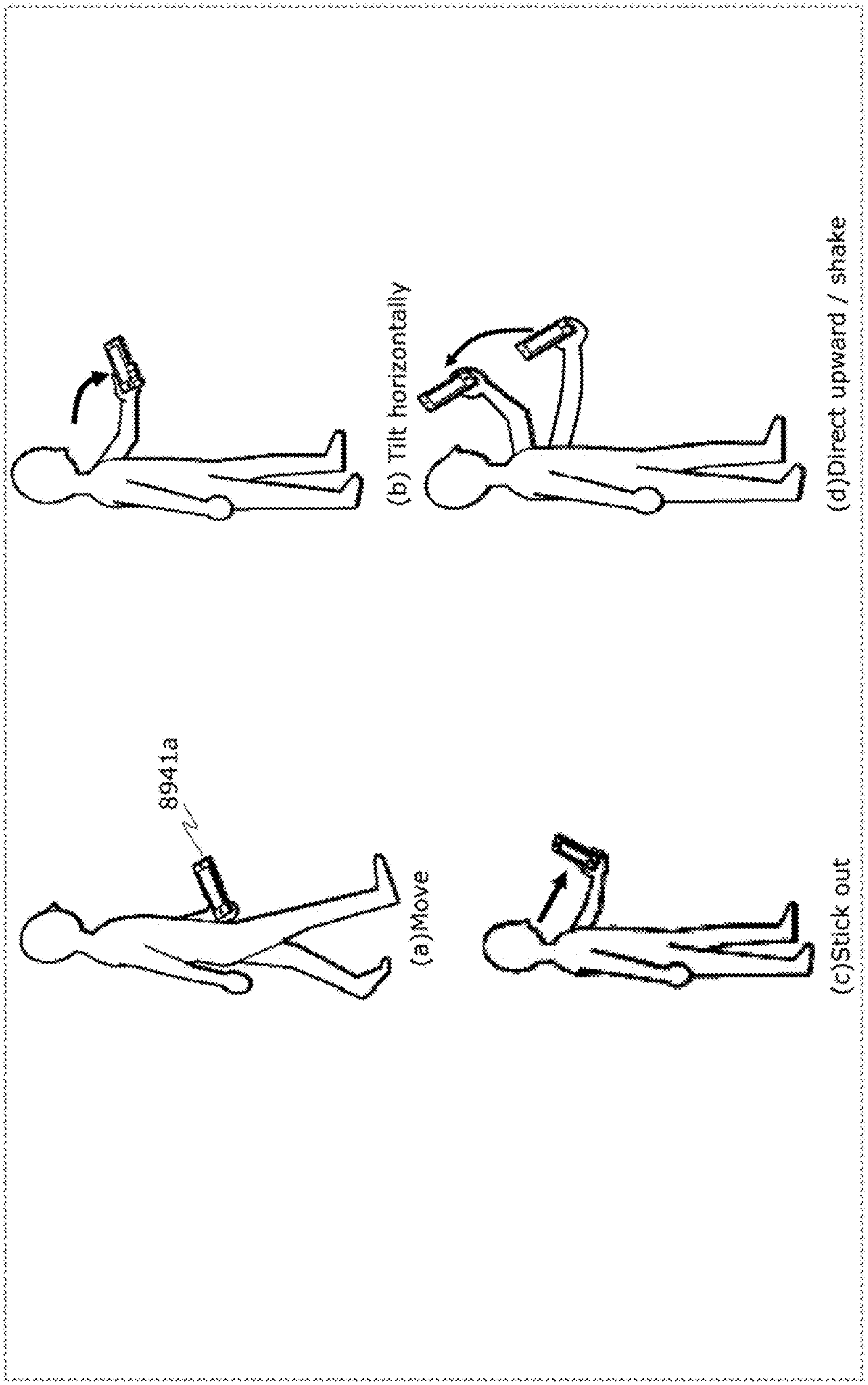
Figure 200:
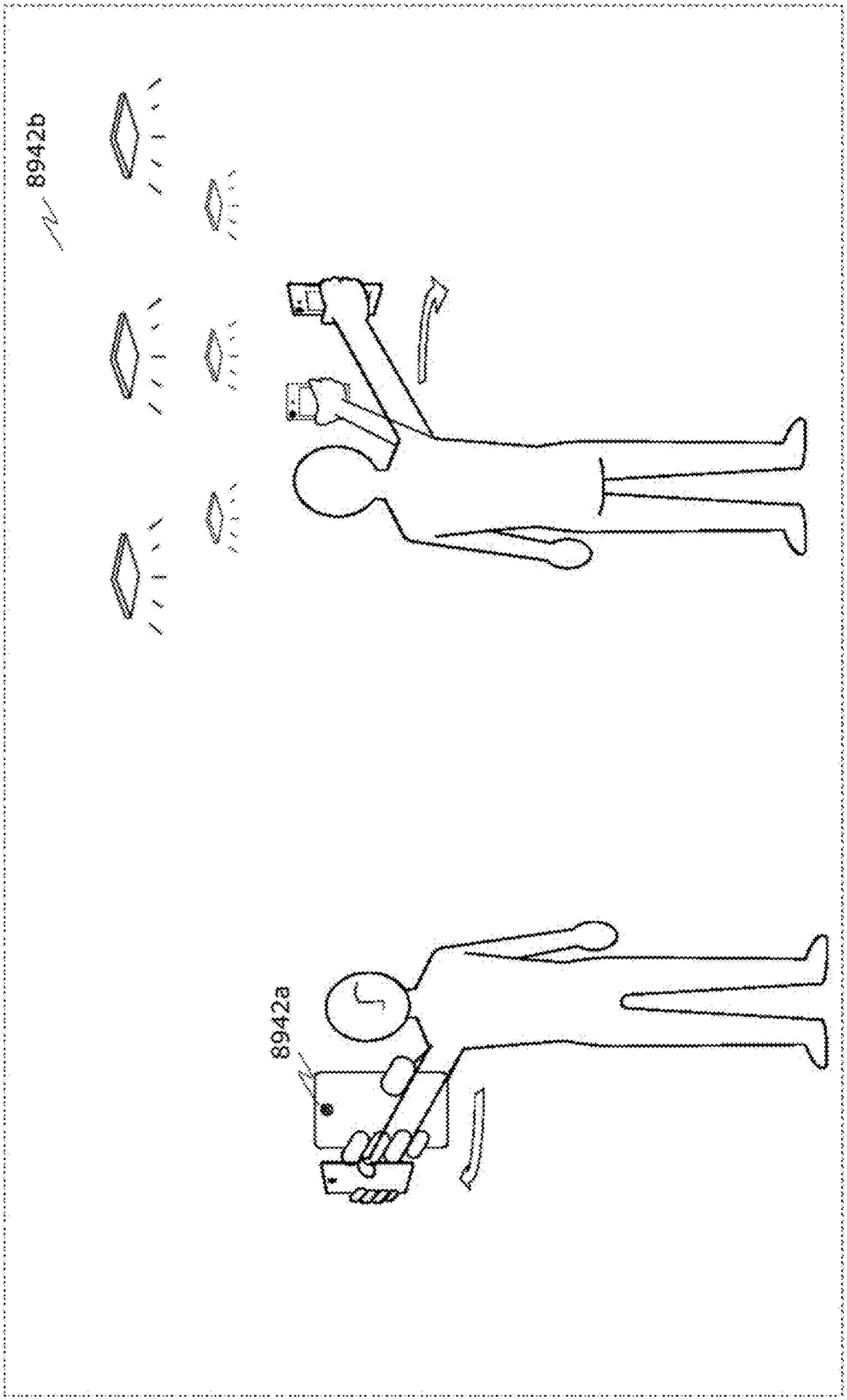
Figure 201:
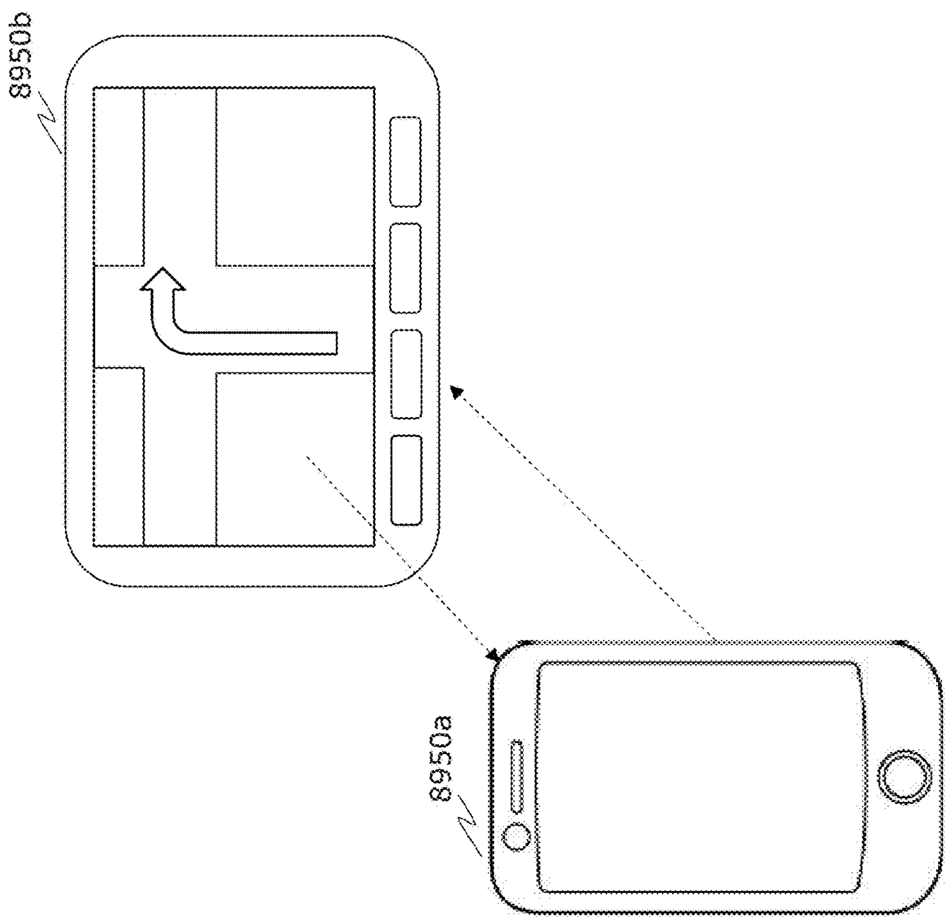
Figure 202:
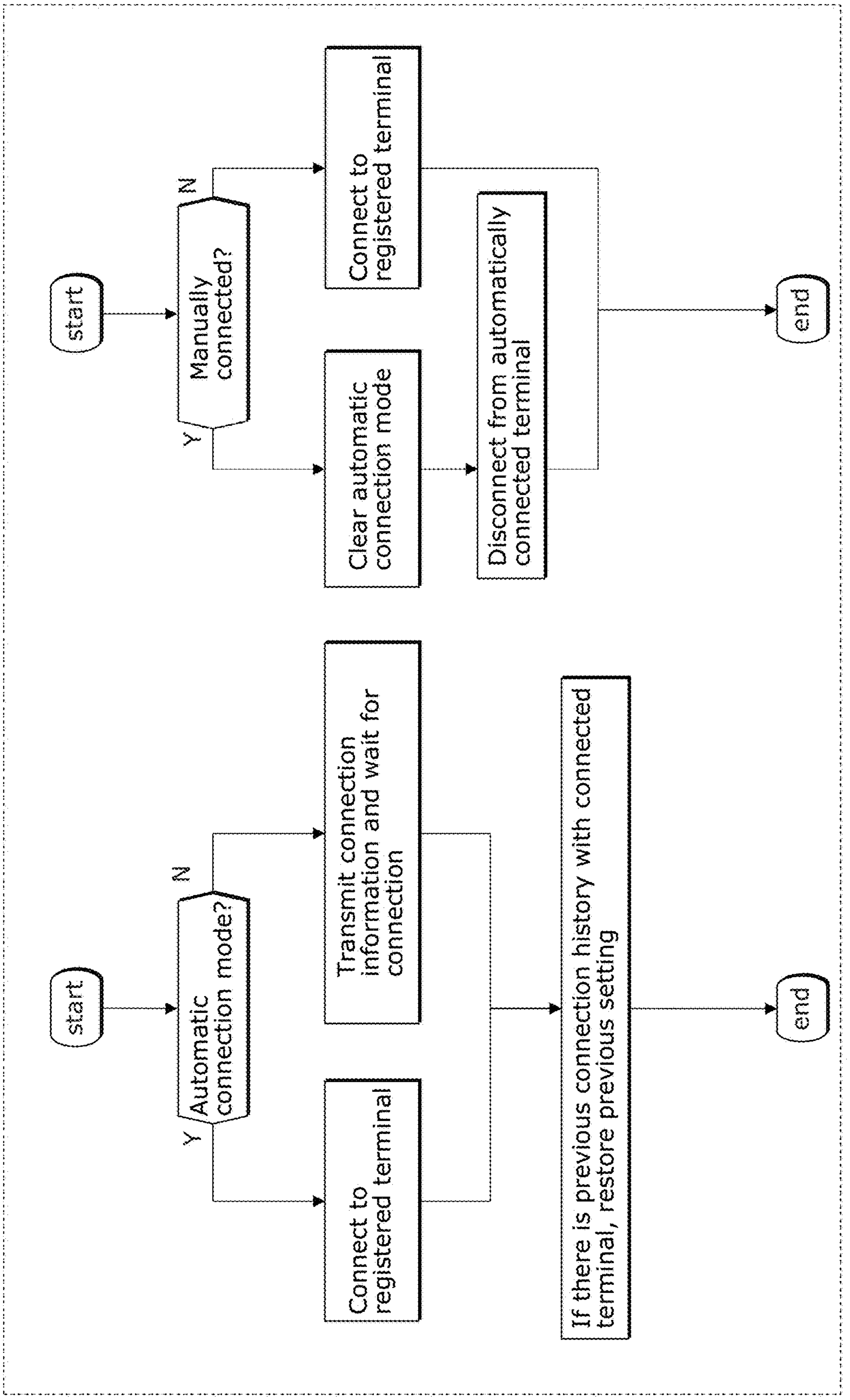
Figure 203:
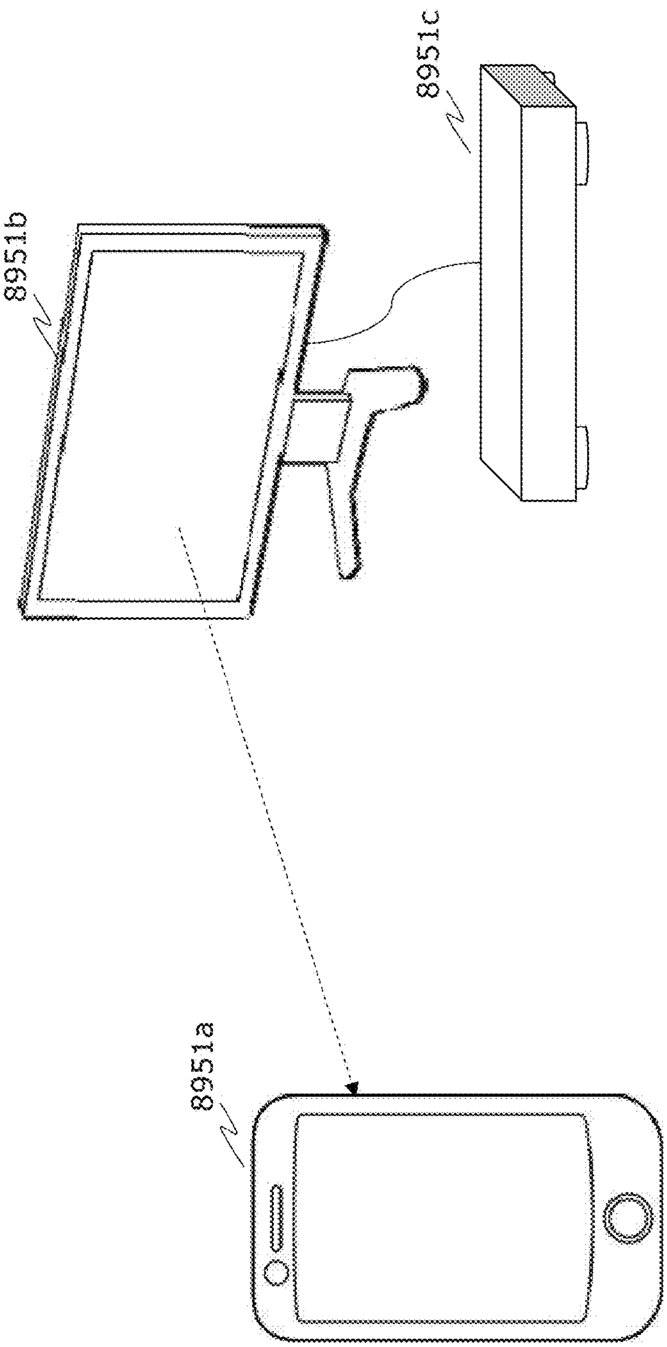
Figure 204A:
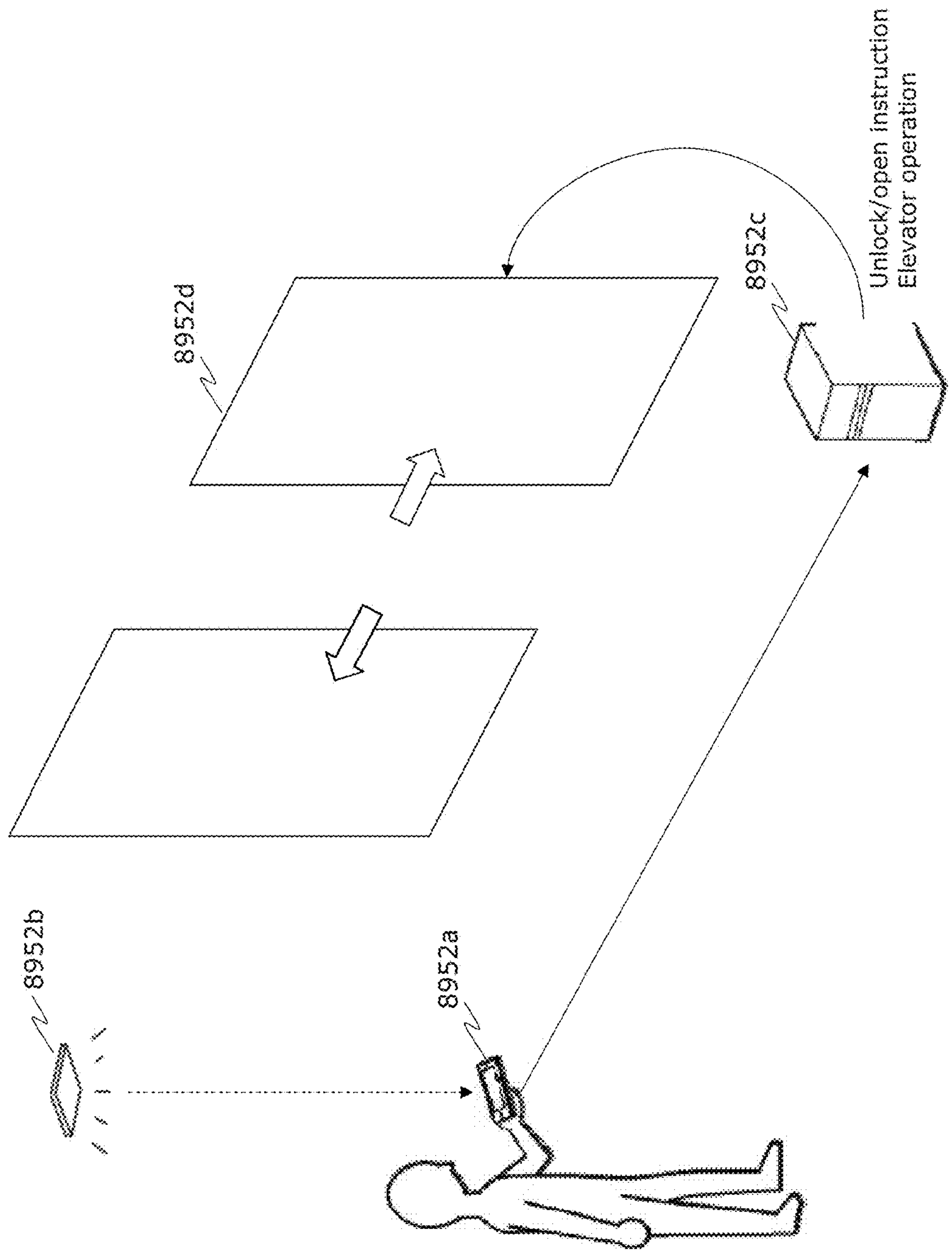
Figure 204C:
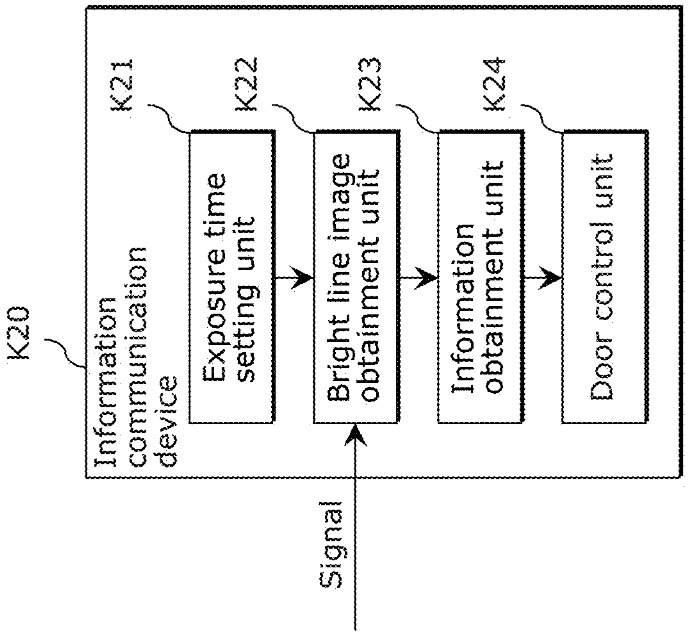
Figure 204B:
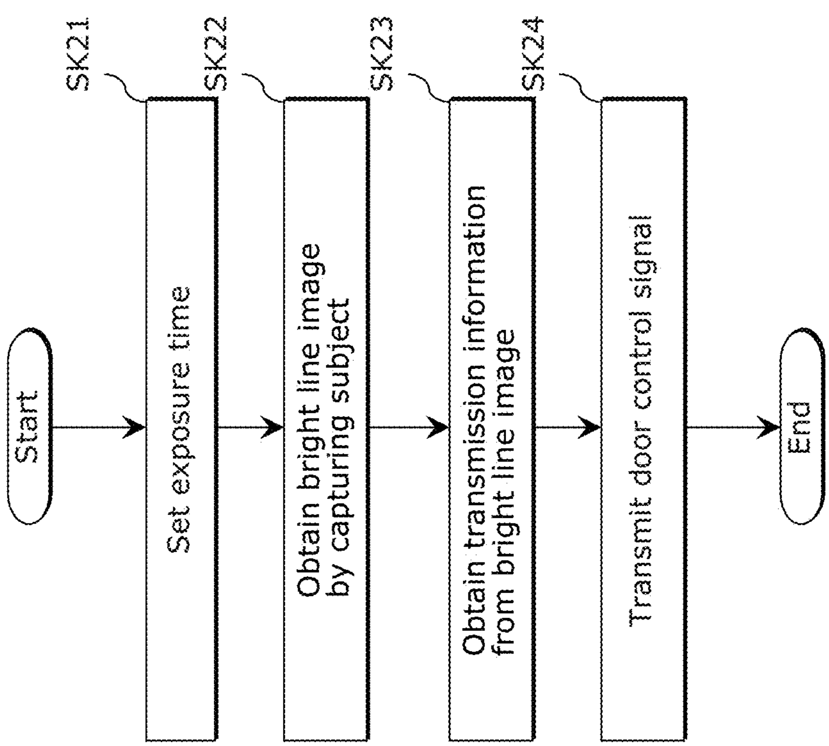
Figure 205:
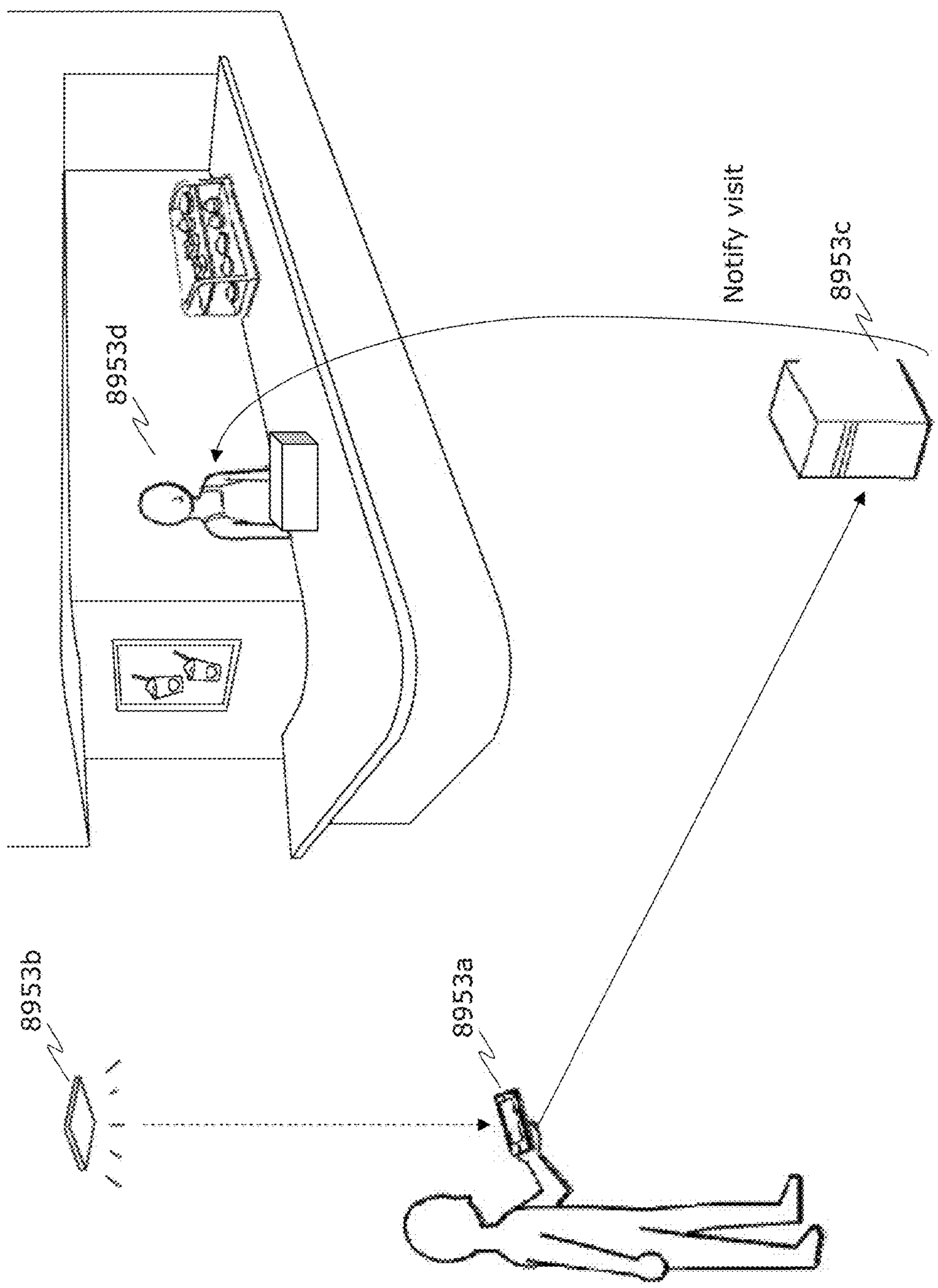
Figure 206:
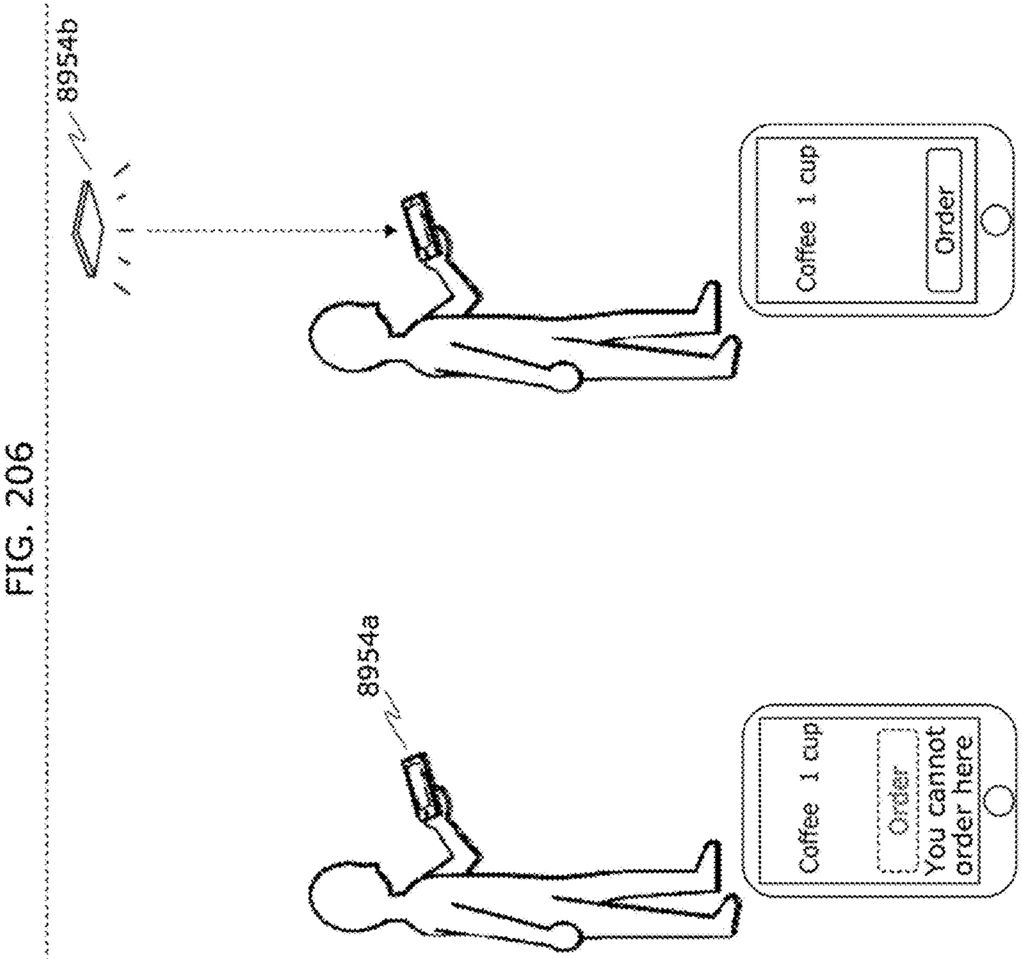
Figure 207:
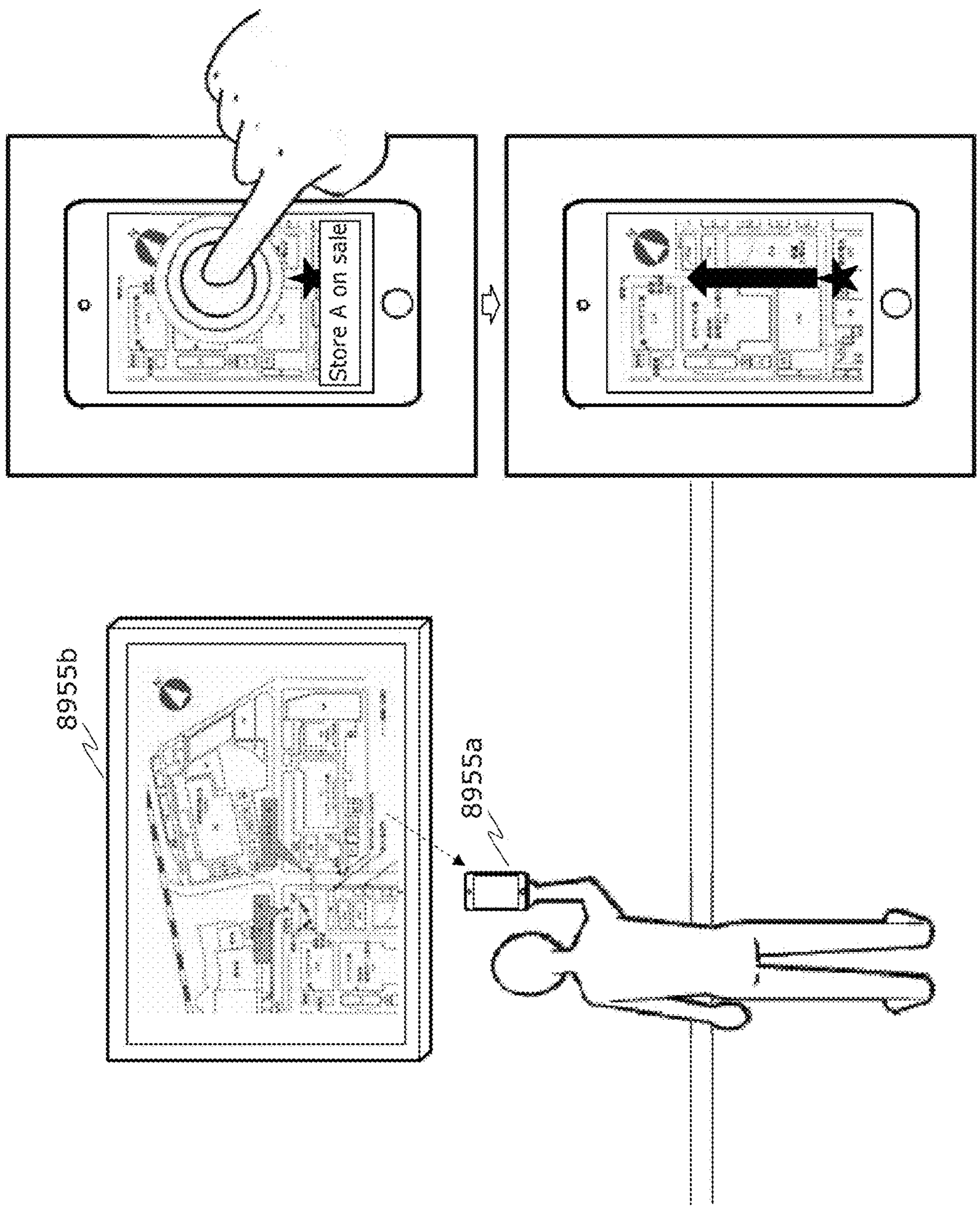
Figure 208:
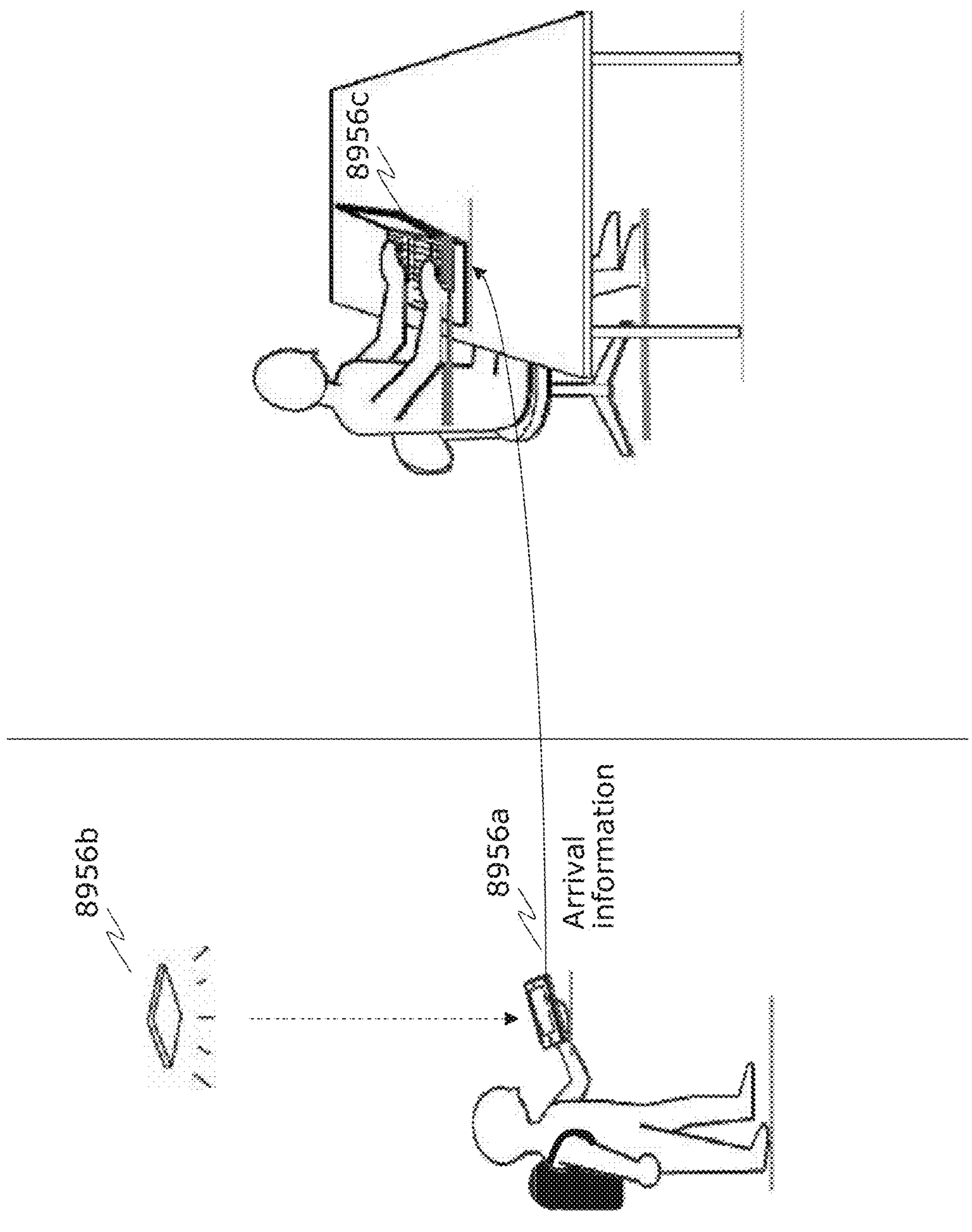
Figure 209:
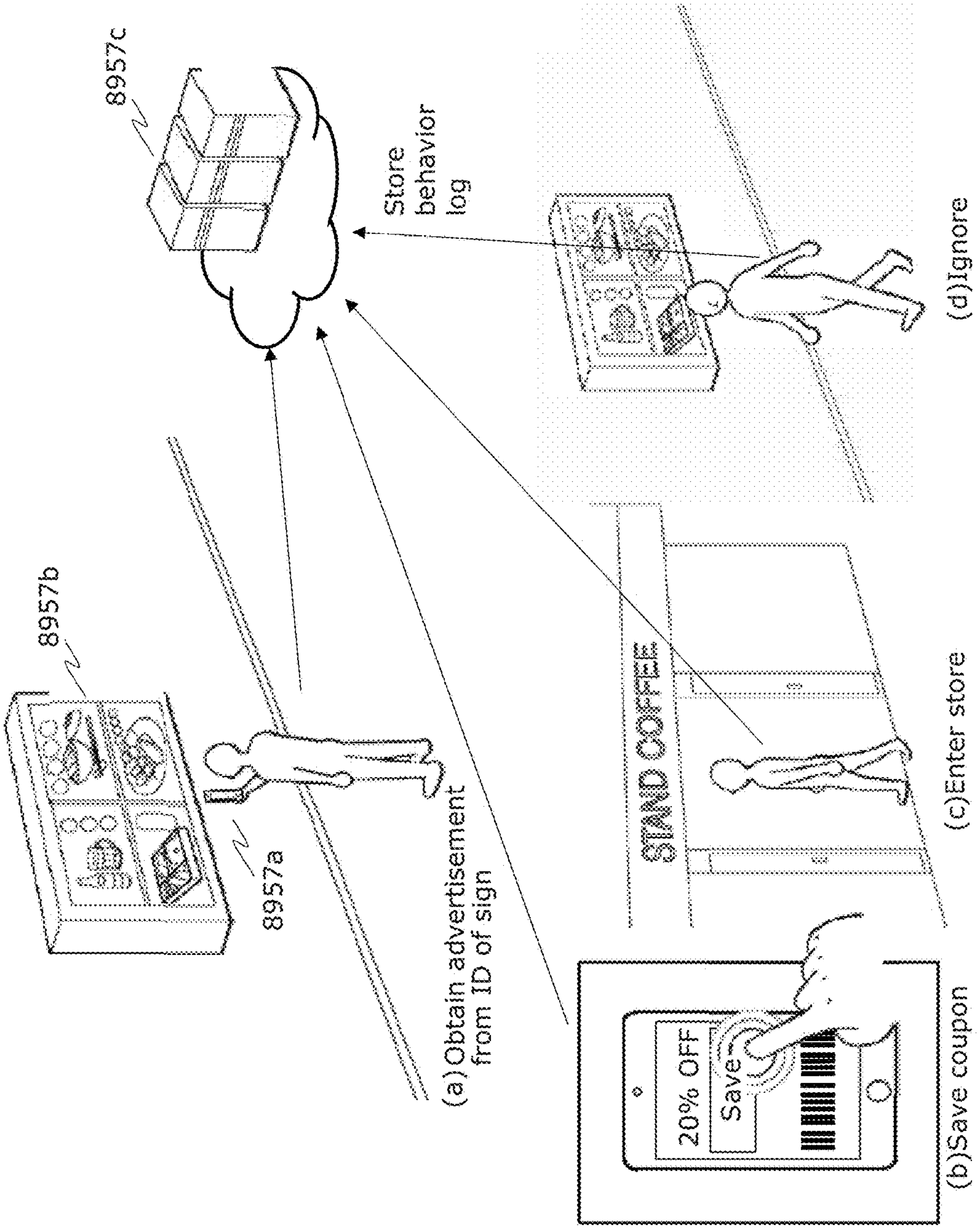
Figure 210:
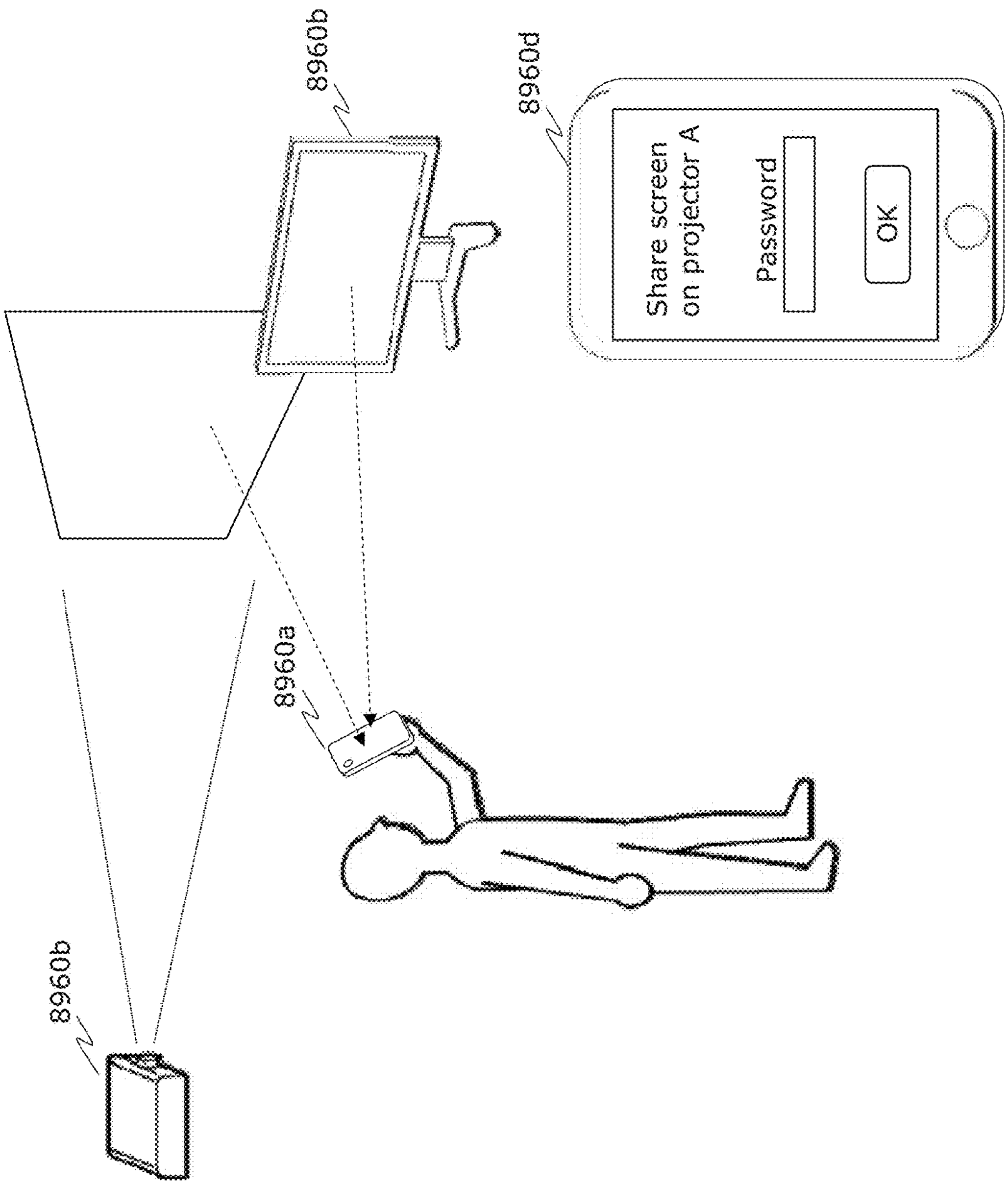
Figure 211:
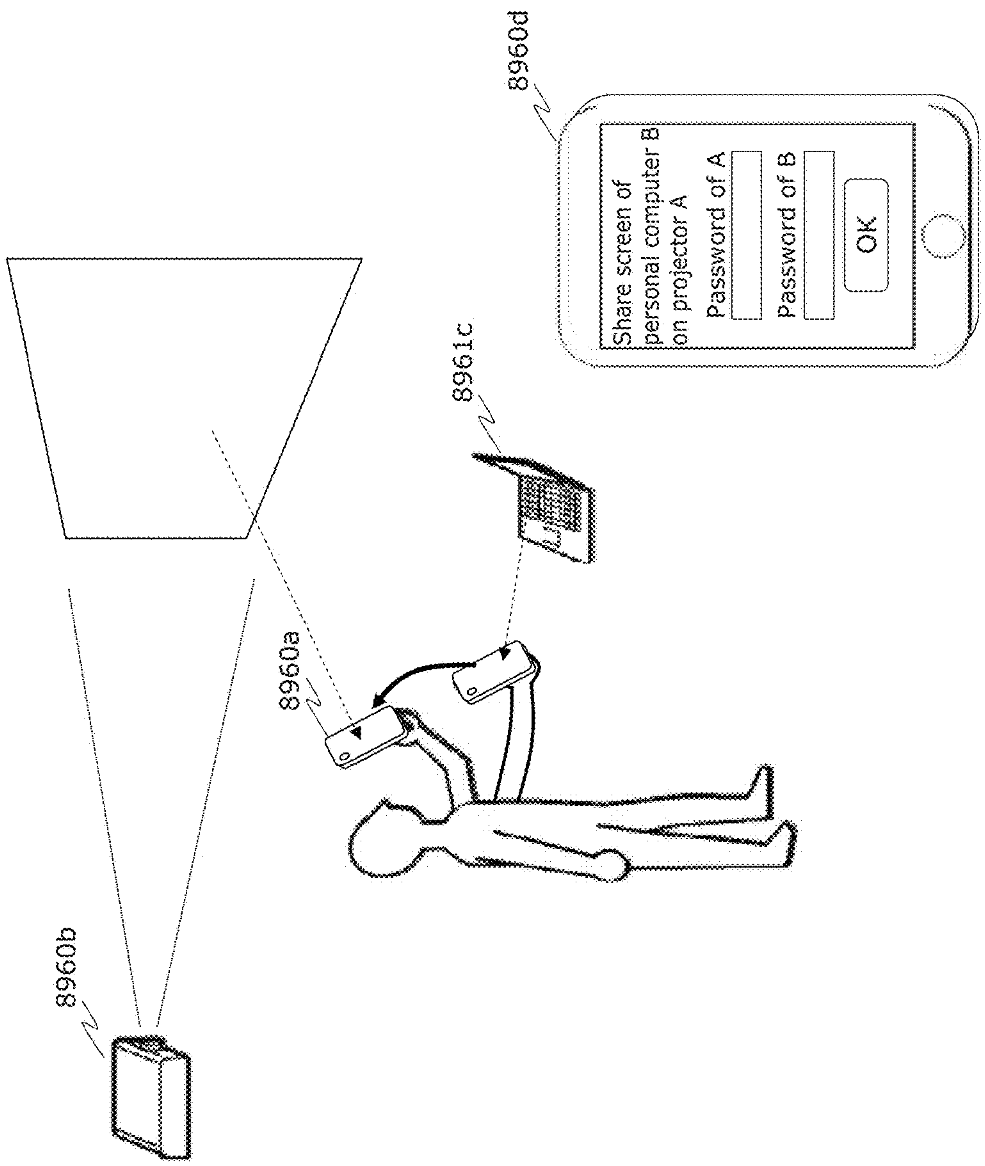
Figure 212:
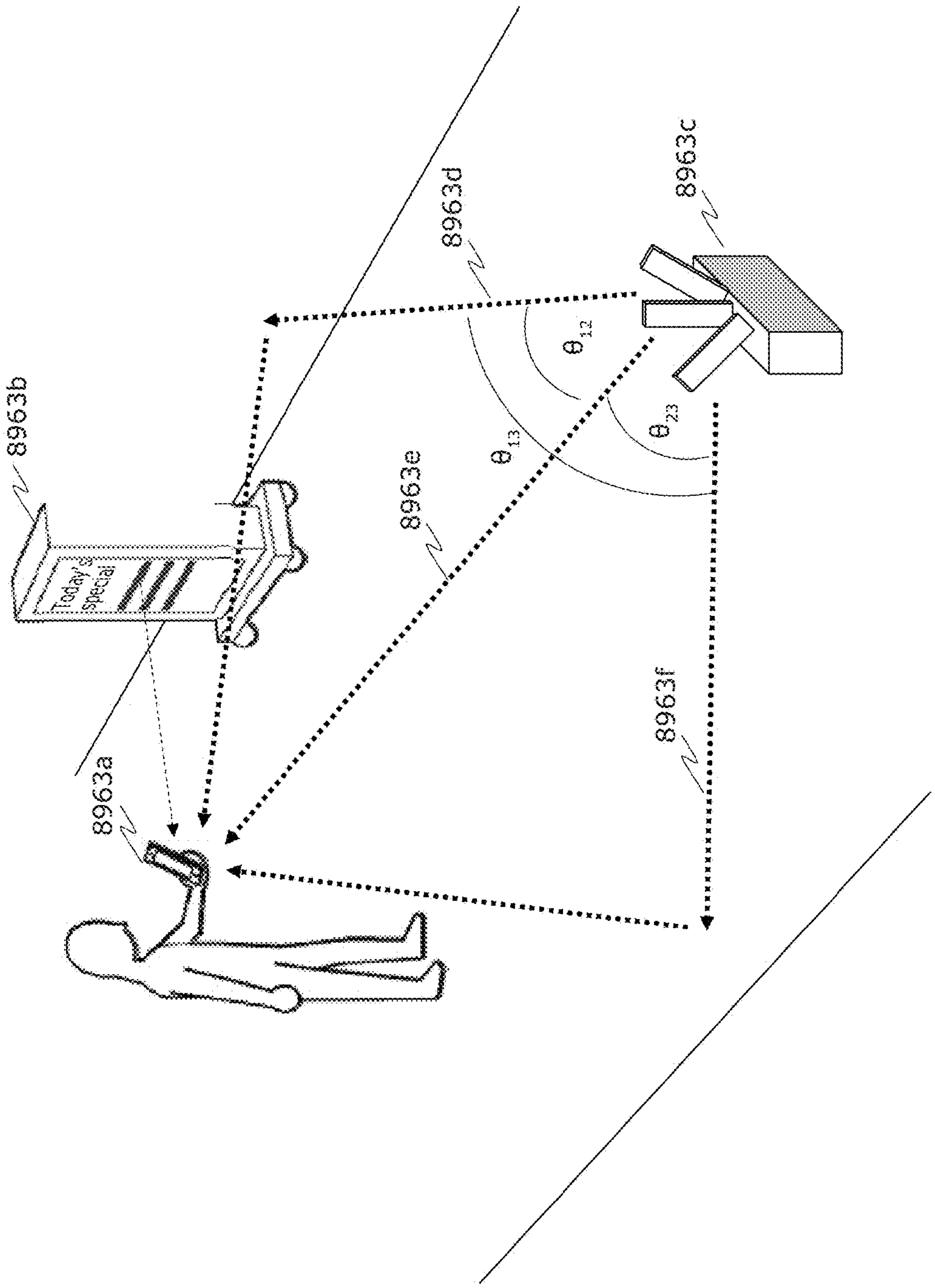
Figure 213:
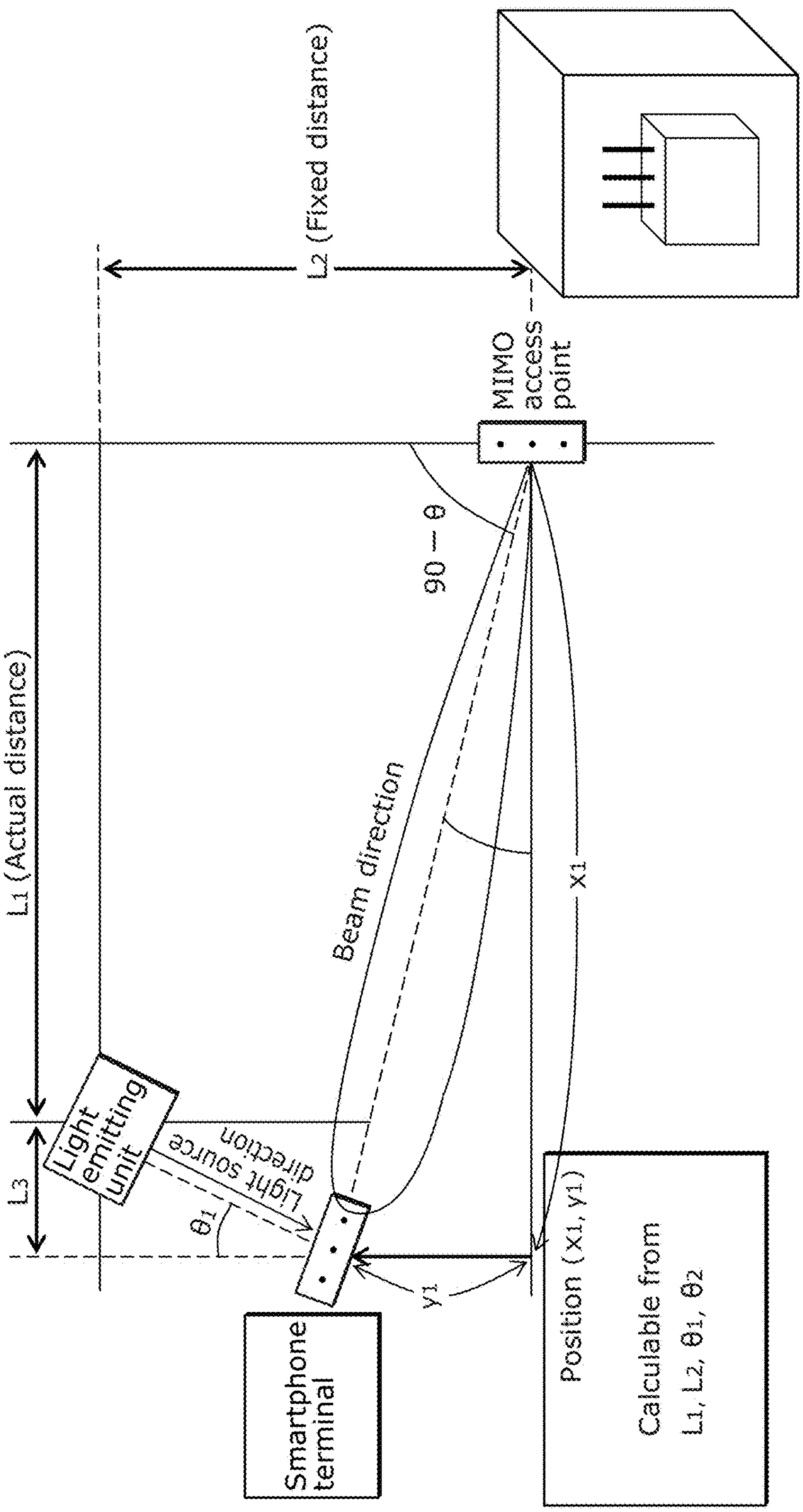
Figure 214:
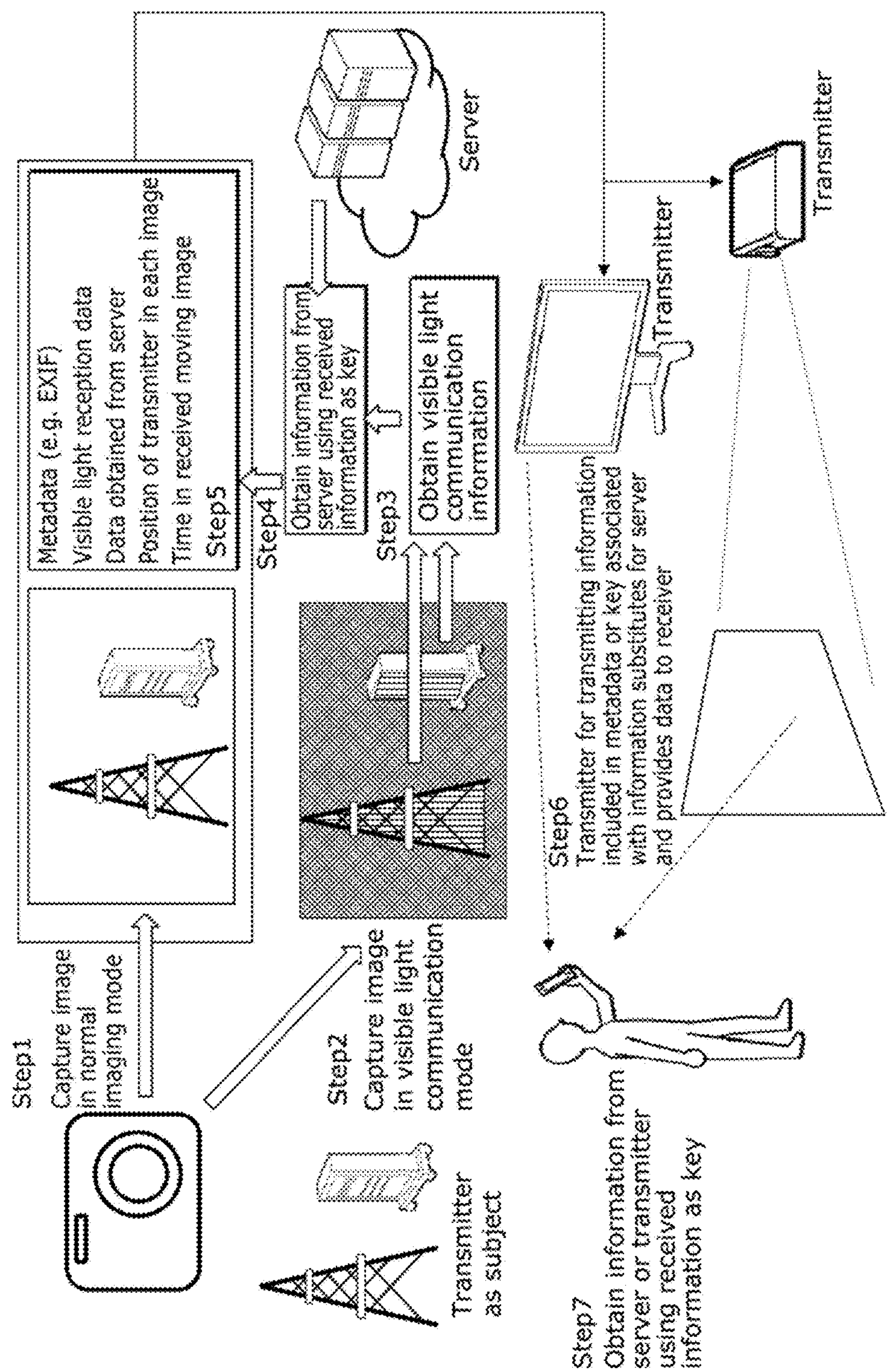
Figure 215:
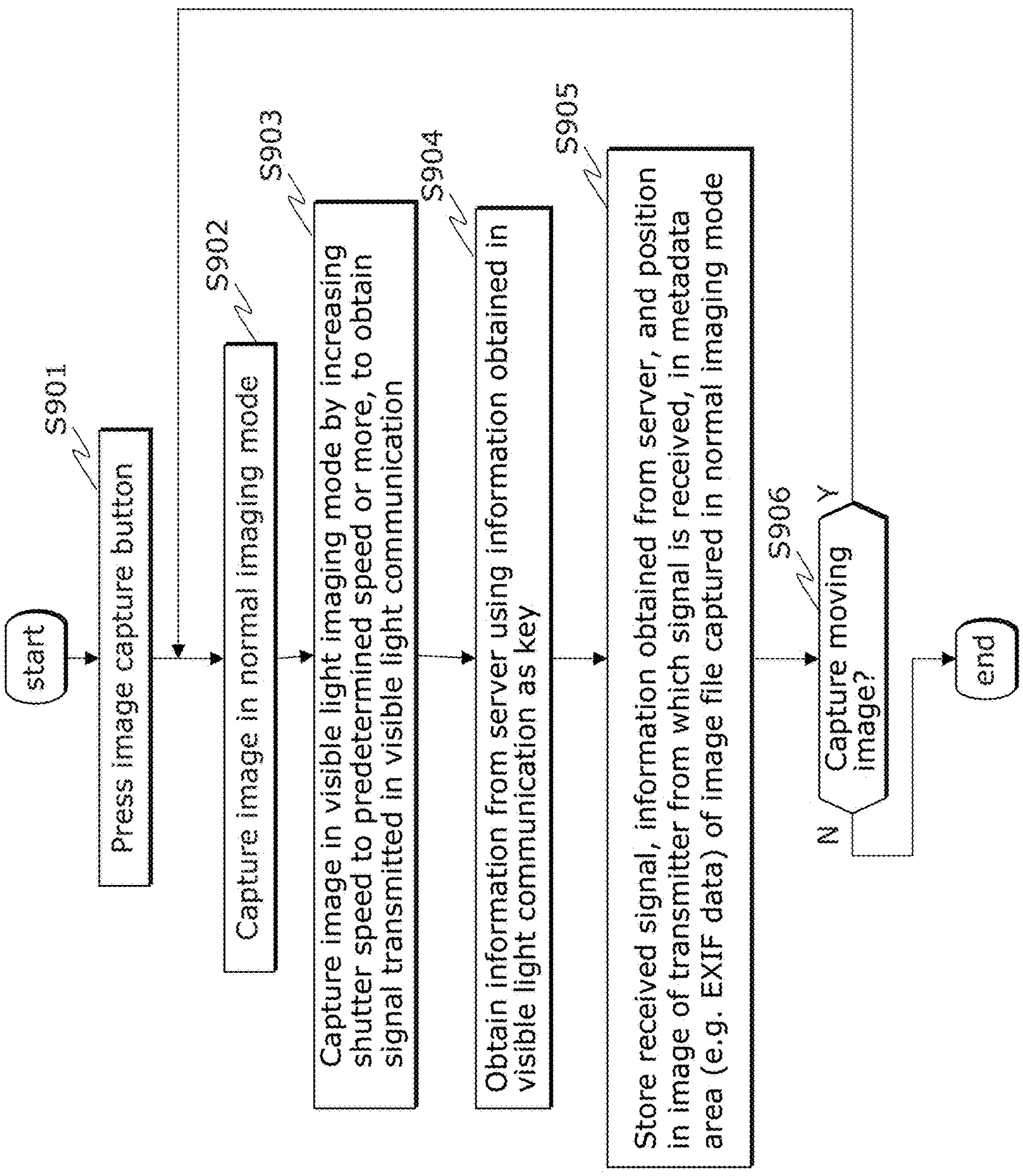
Figure 216:
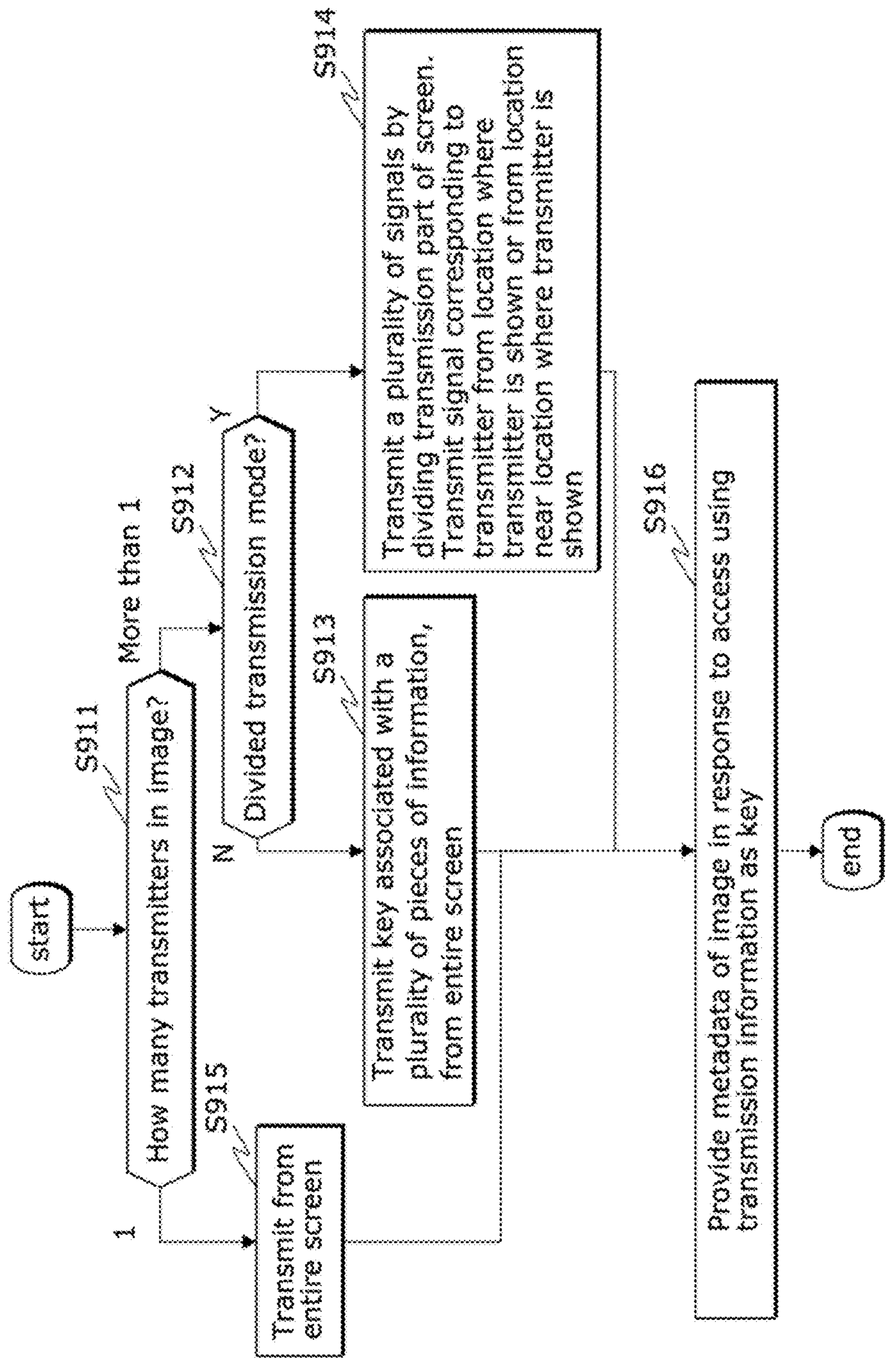
Figure 217:
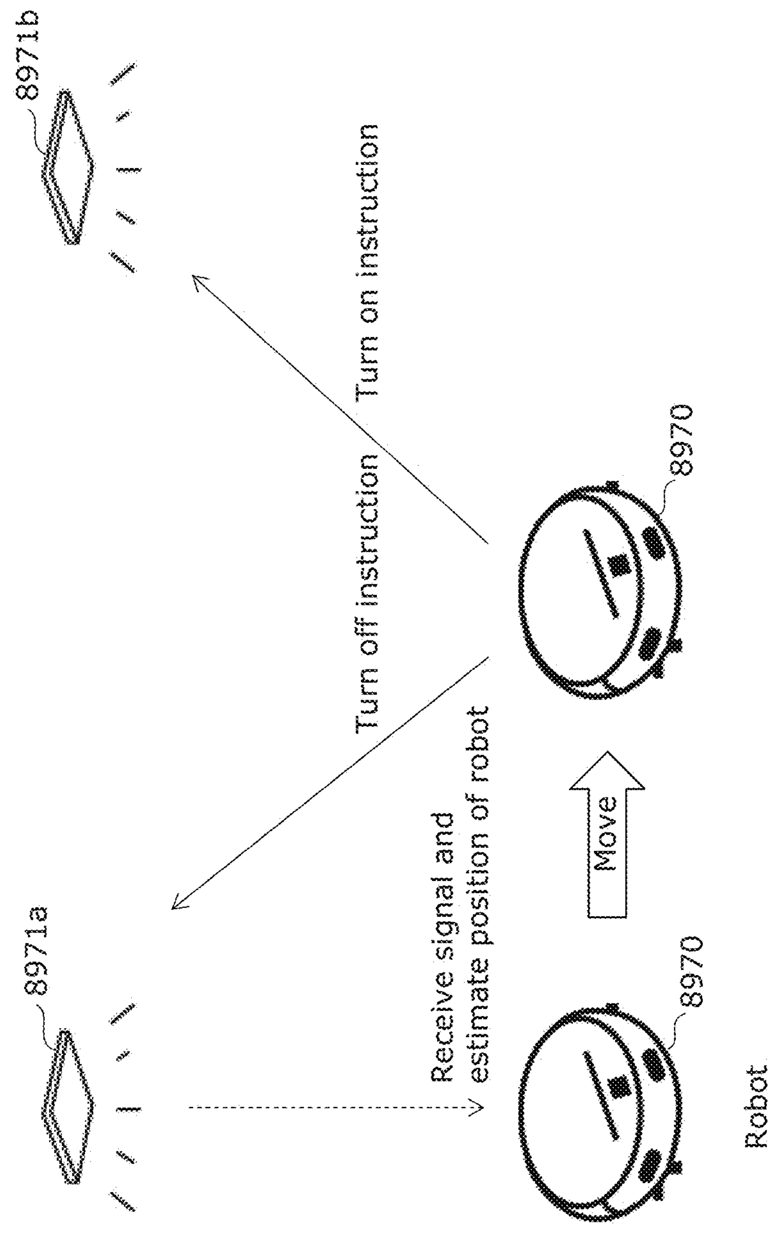
Figure 218:
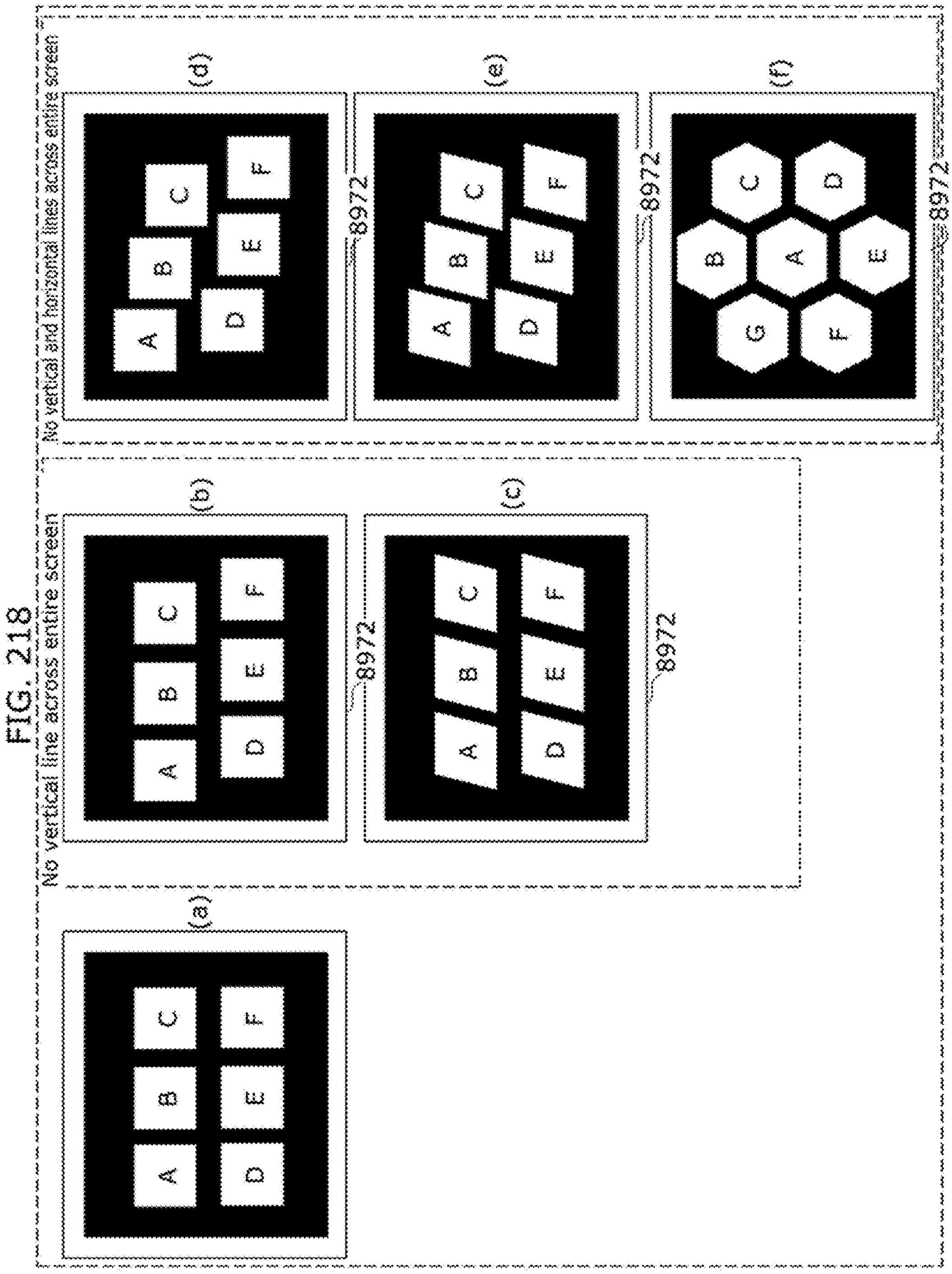
Figure 219:
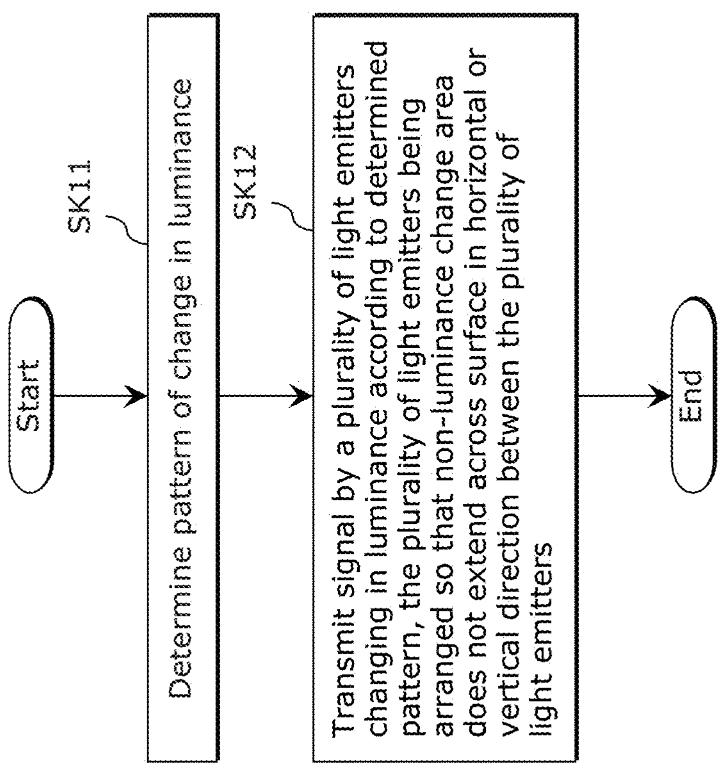
Figure 220:
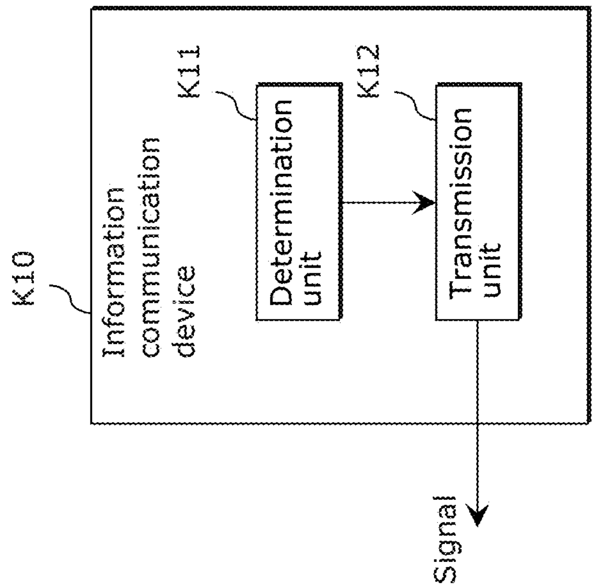
Figure 221A:
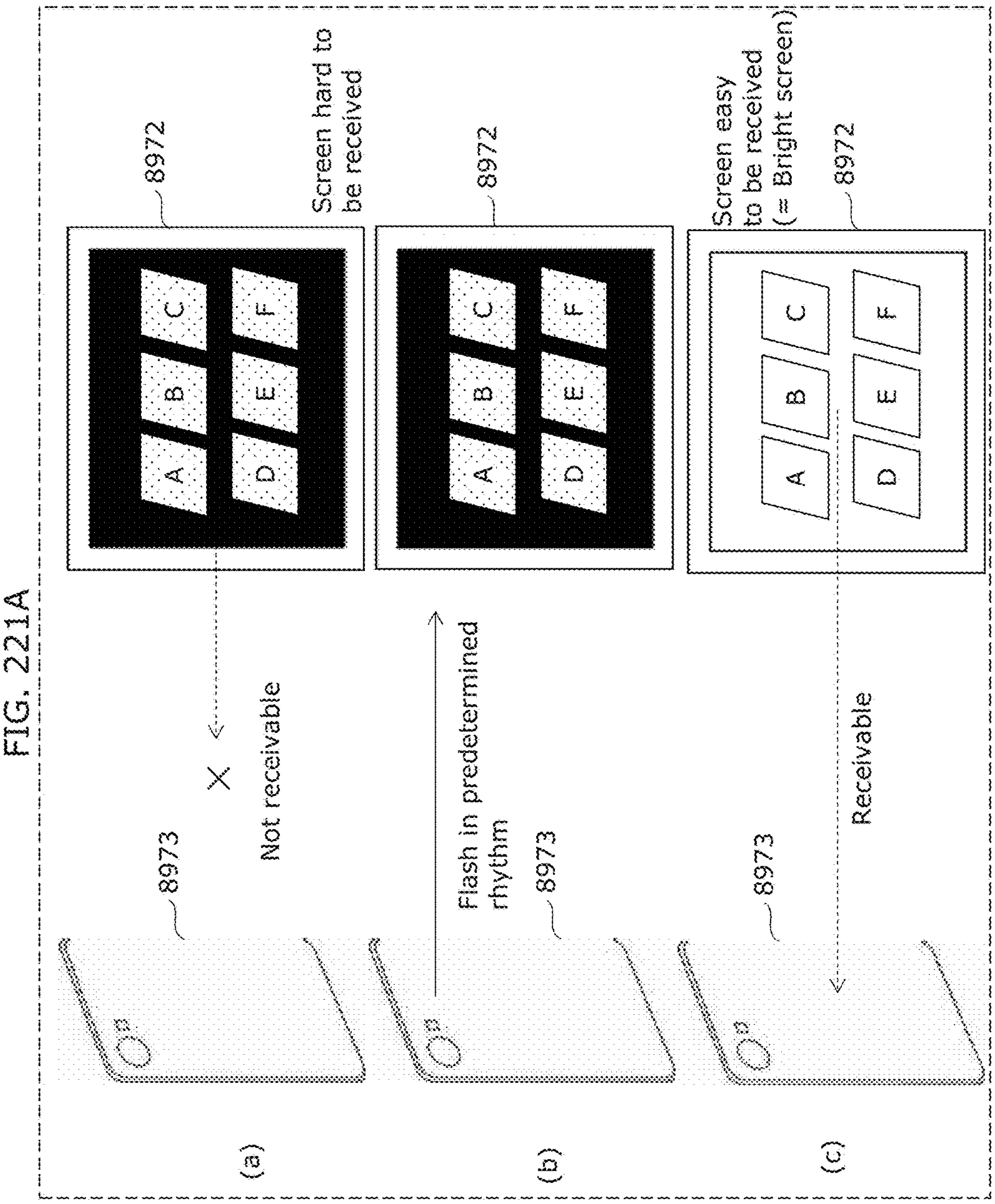
Figure 221B:
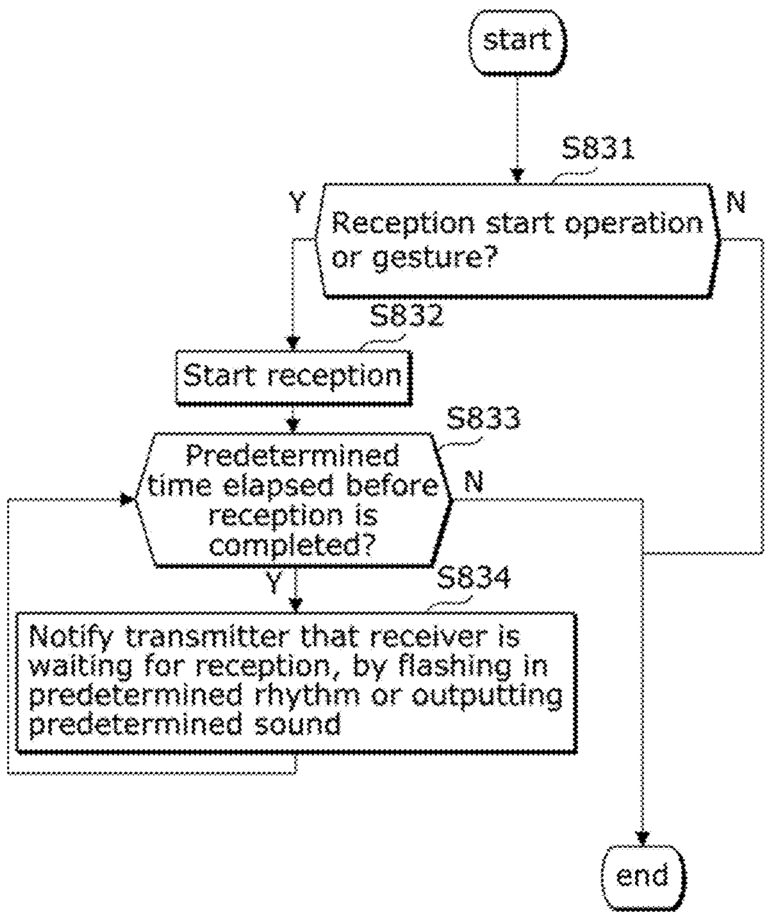
Figure 222:
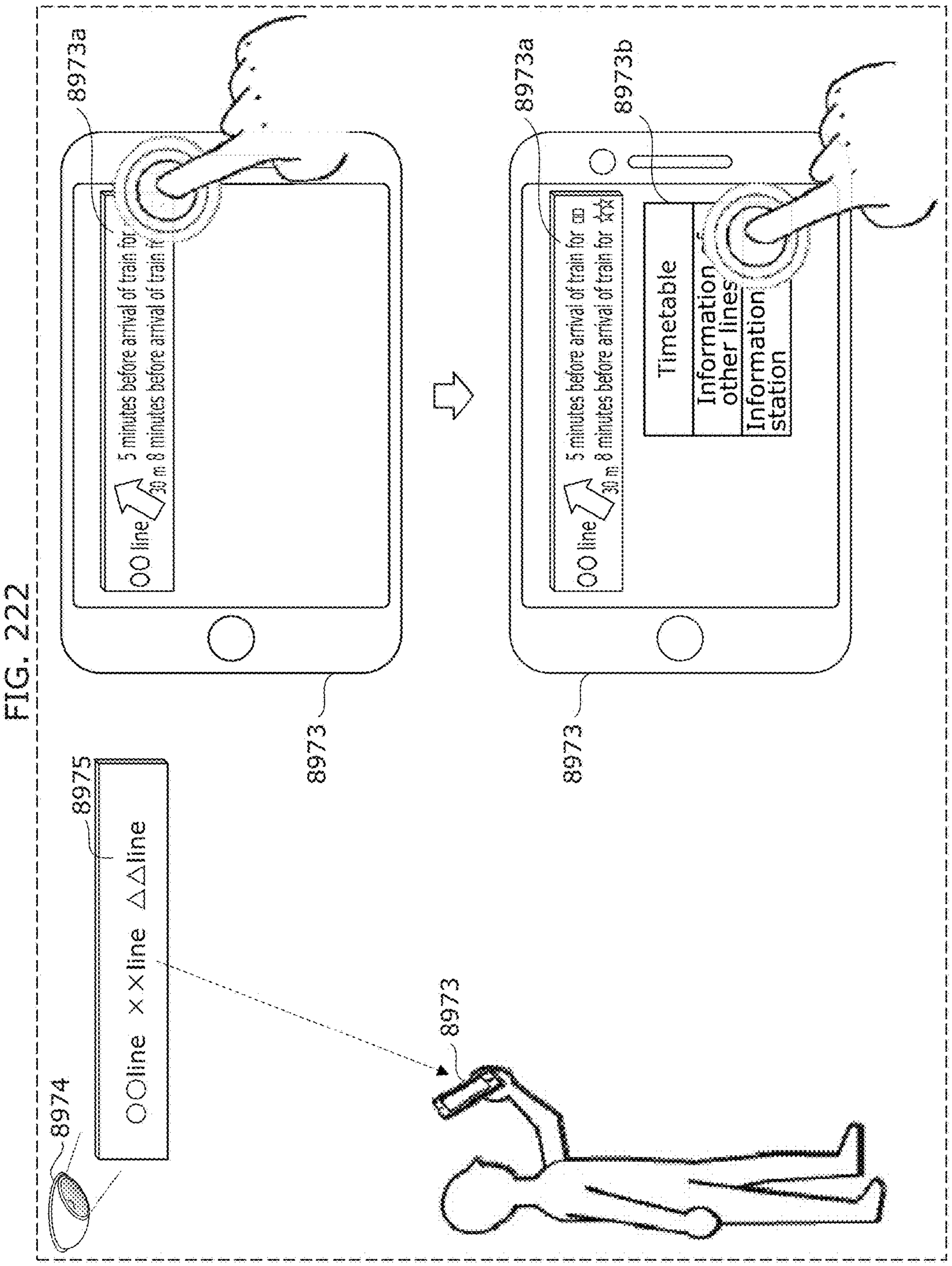
Figure 223:
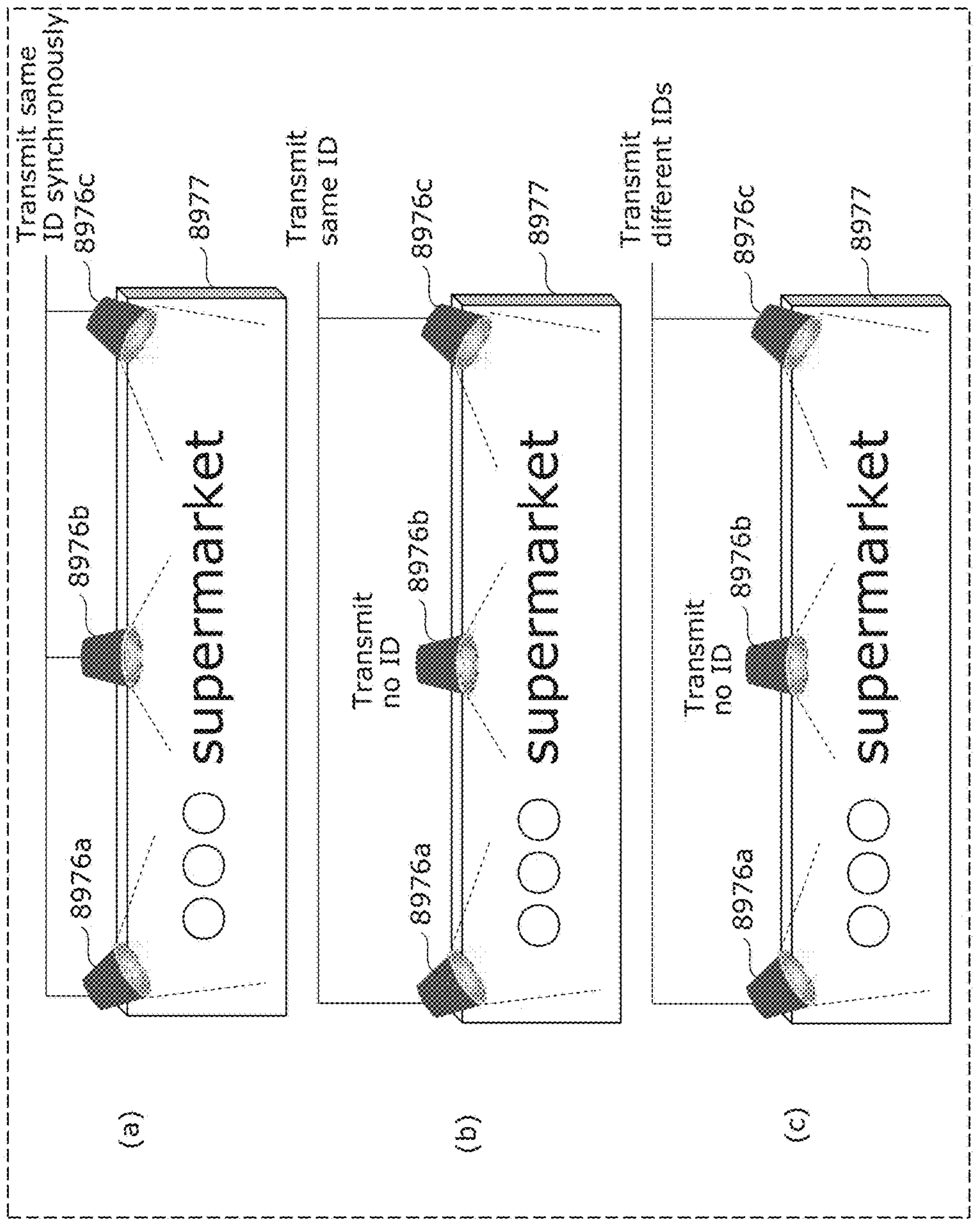
Figure 224A:
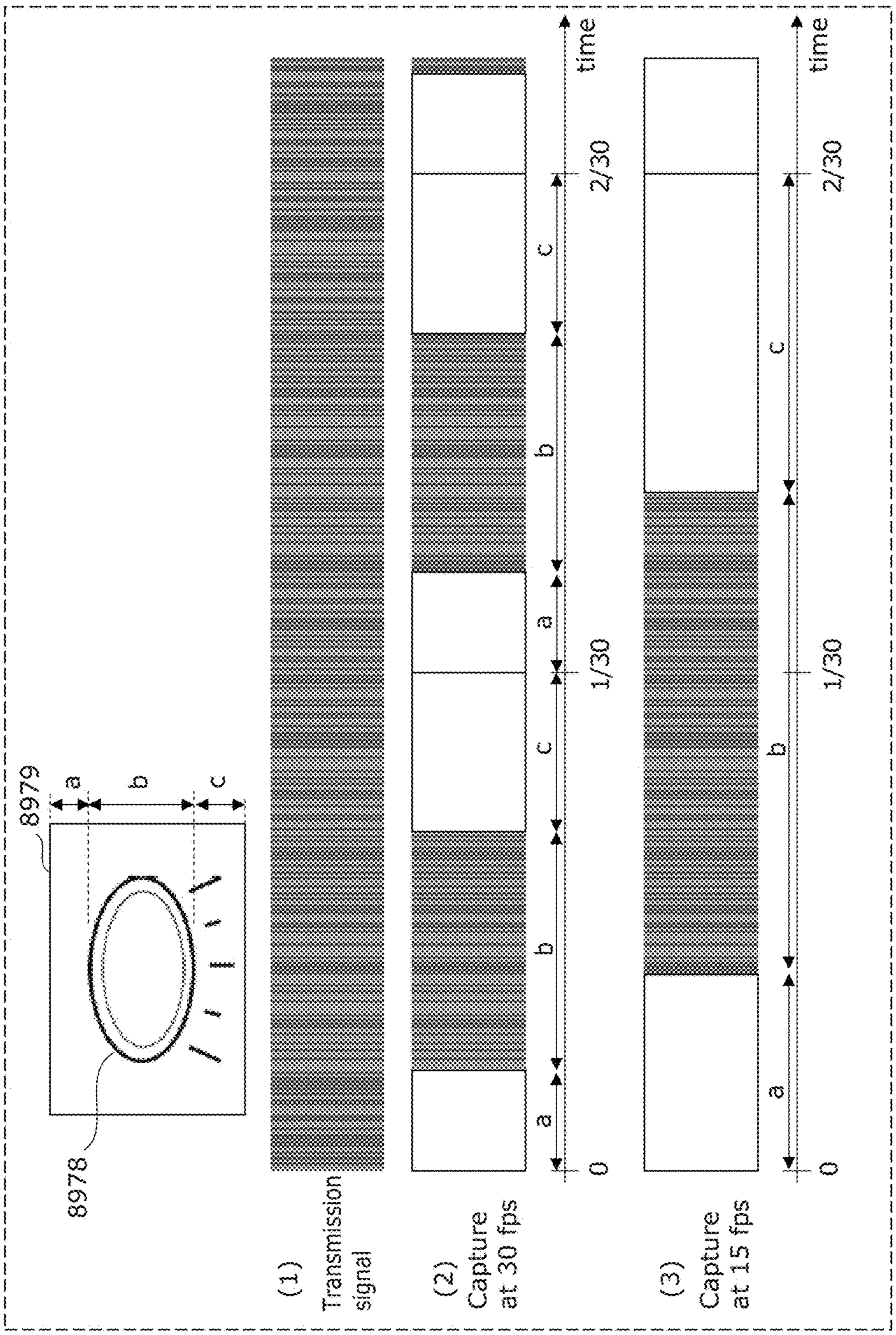
Figure 224B:
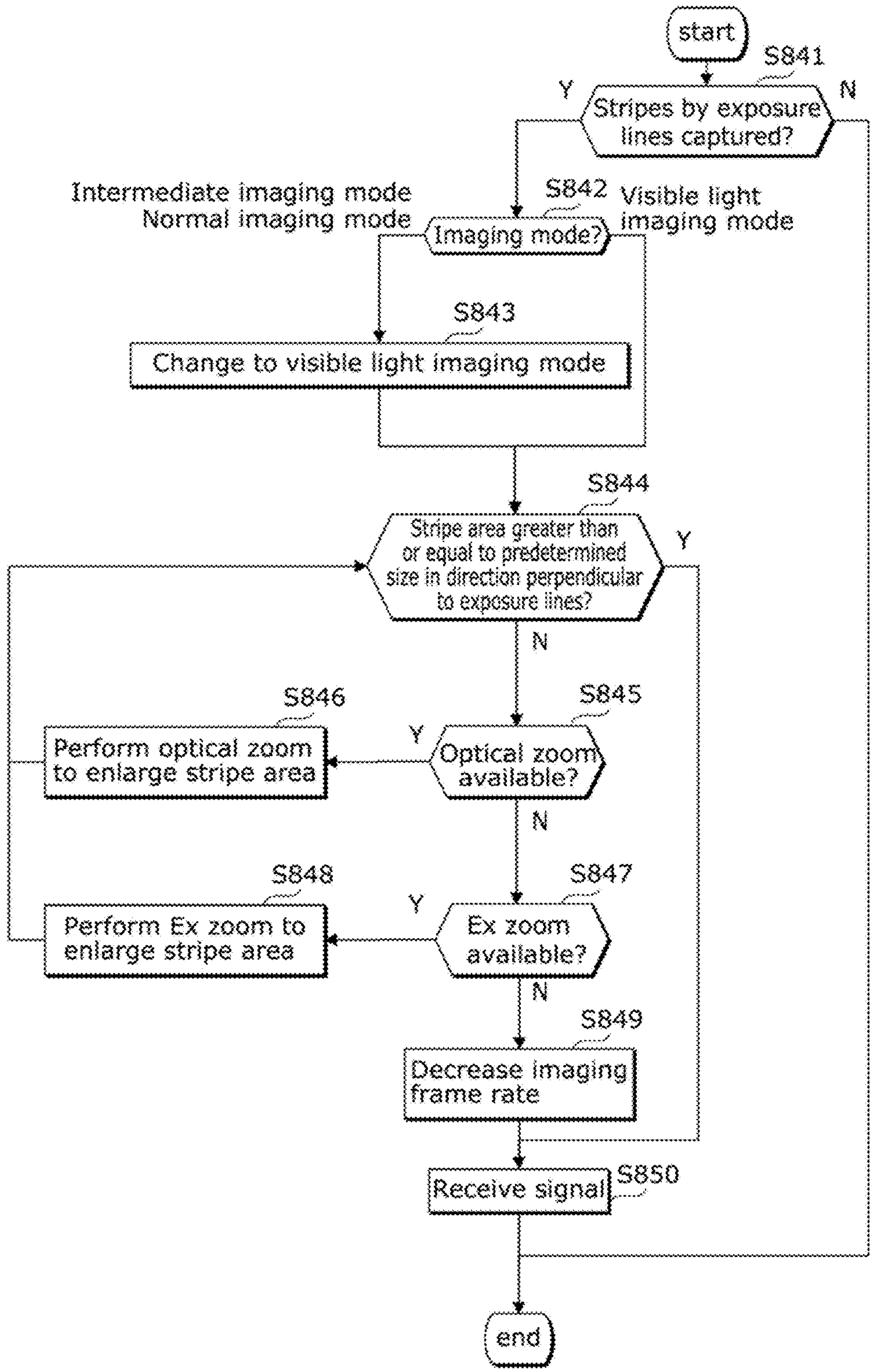
Figure 225:
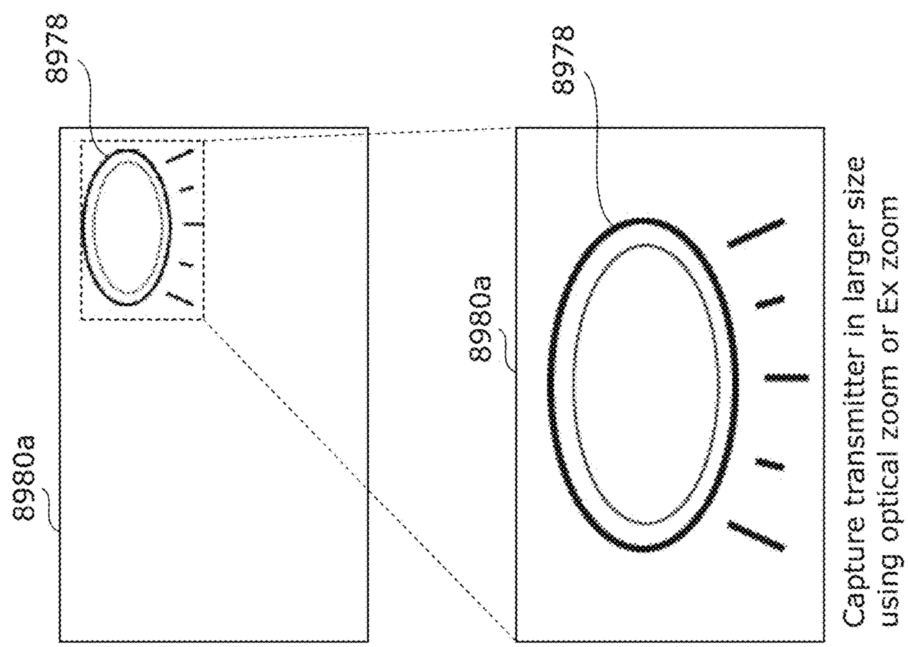
Figure 226:
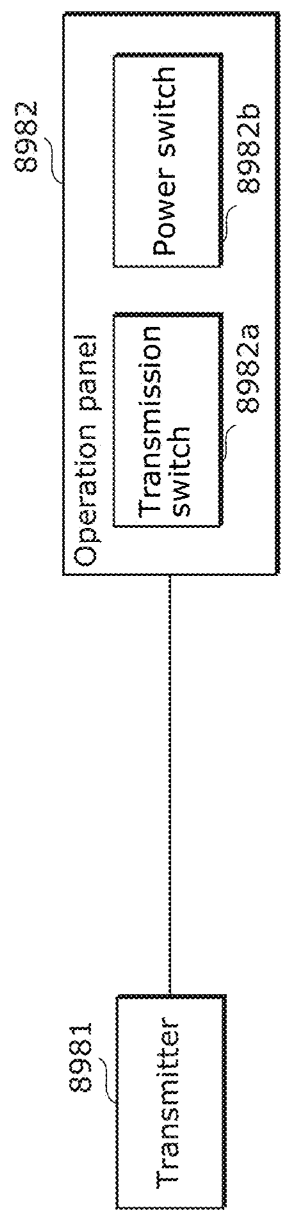
Figure 227:
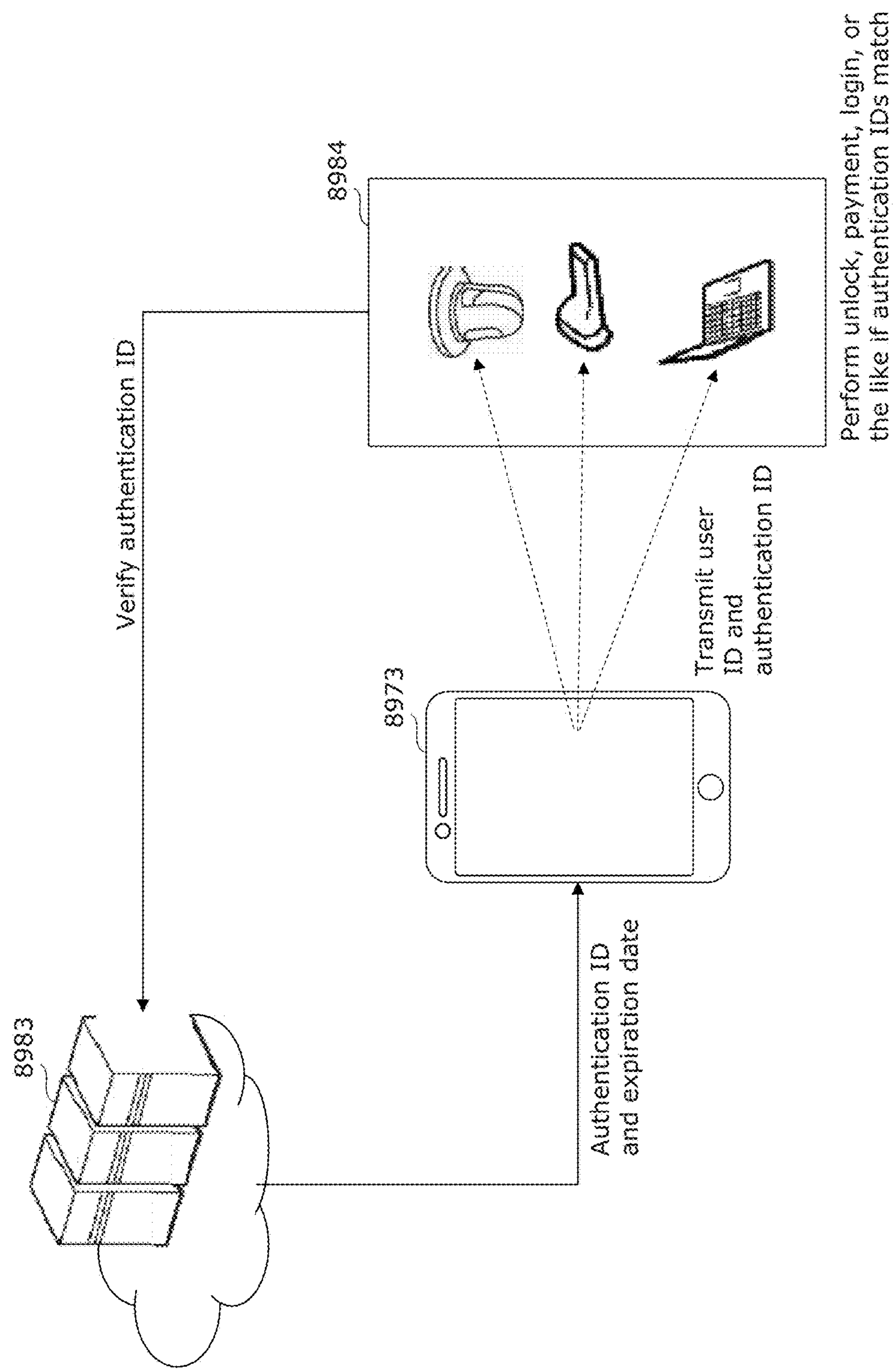
Figure 228A:
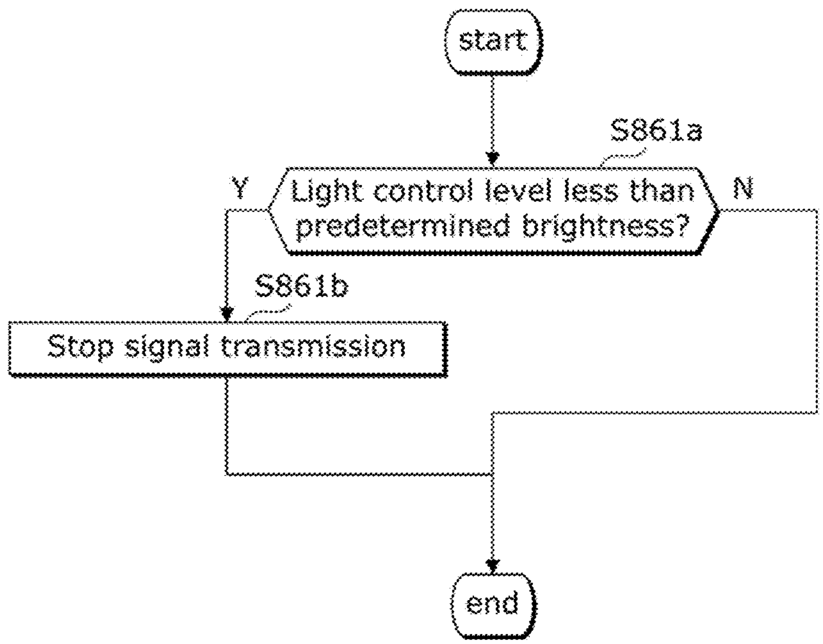
Figure 228B:
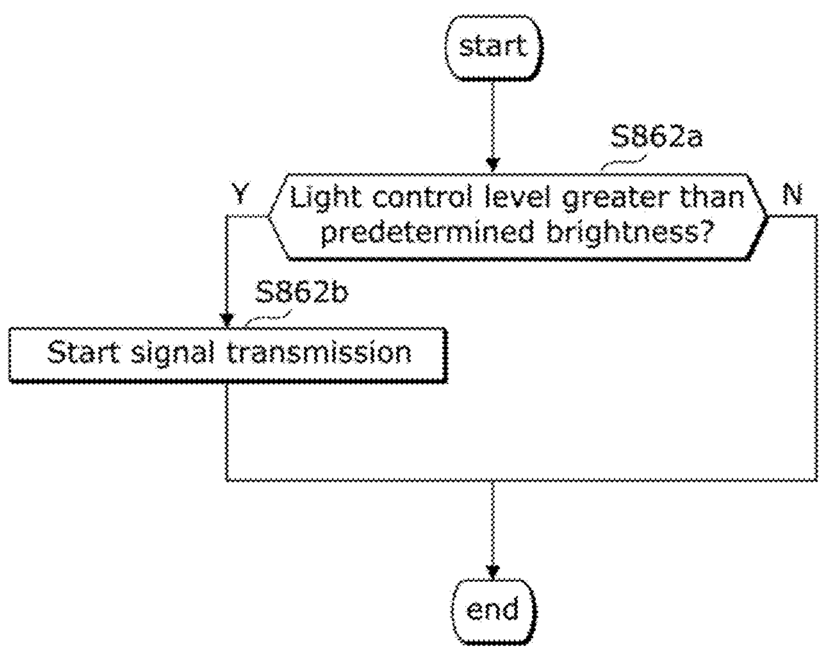
Figure 229:
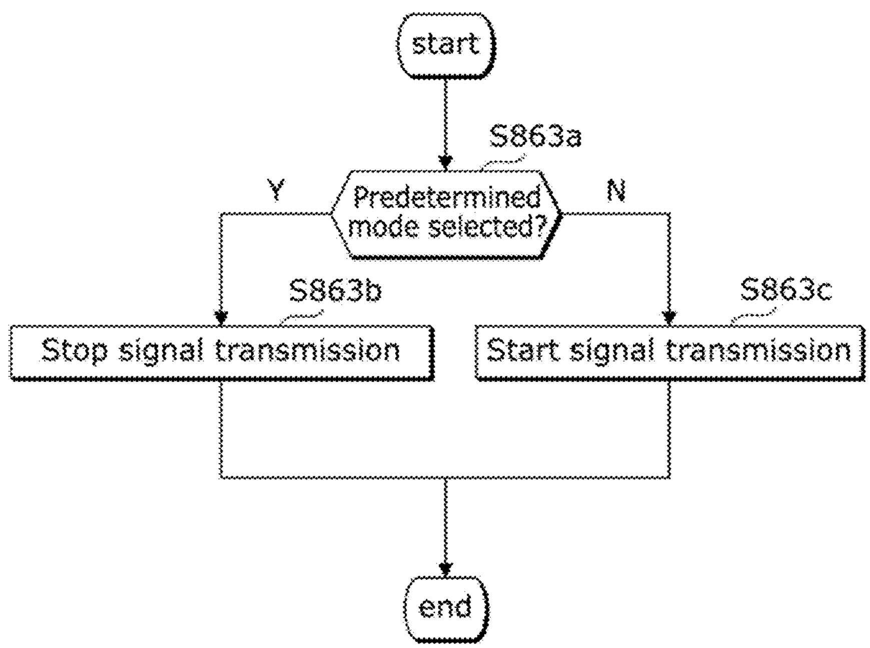
Figure 230:
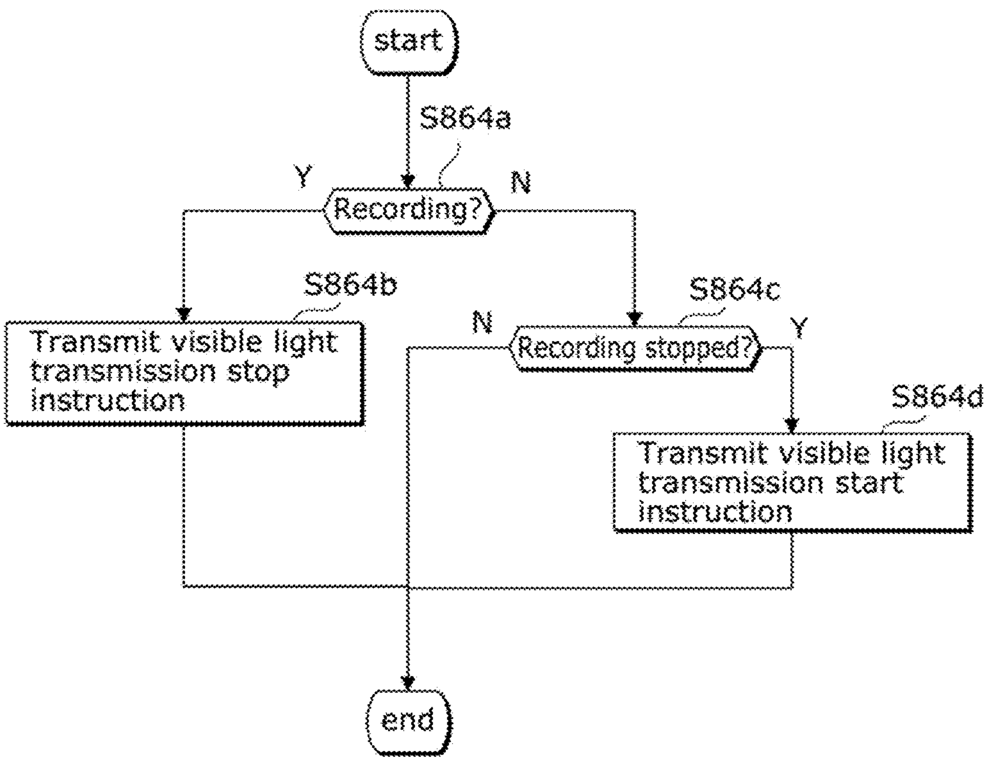
Figure 231:
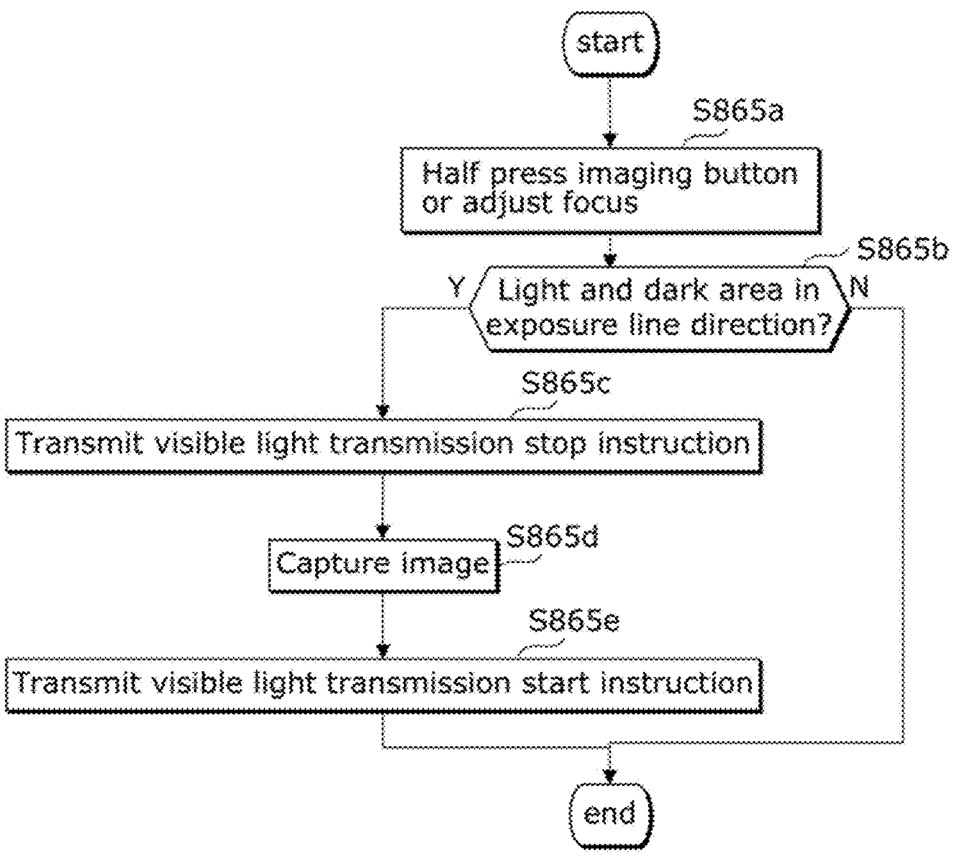
Figure 232:
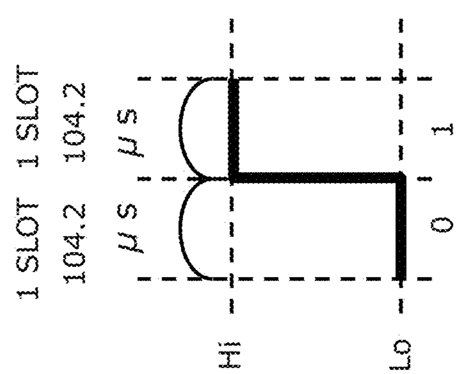
Figure 233:
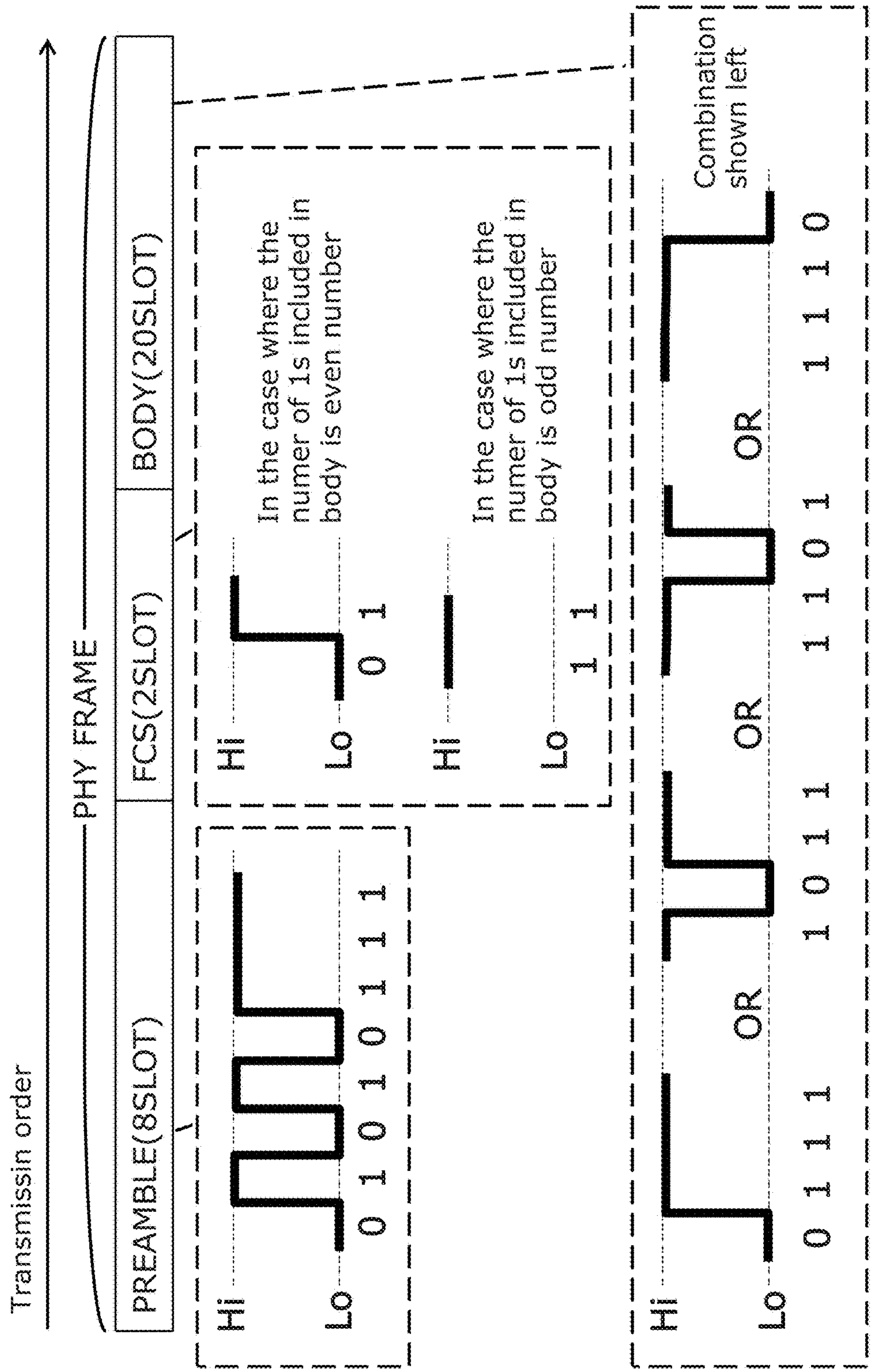
Figure 234:
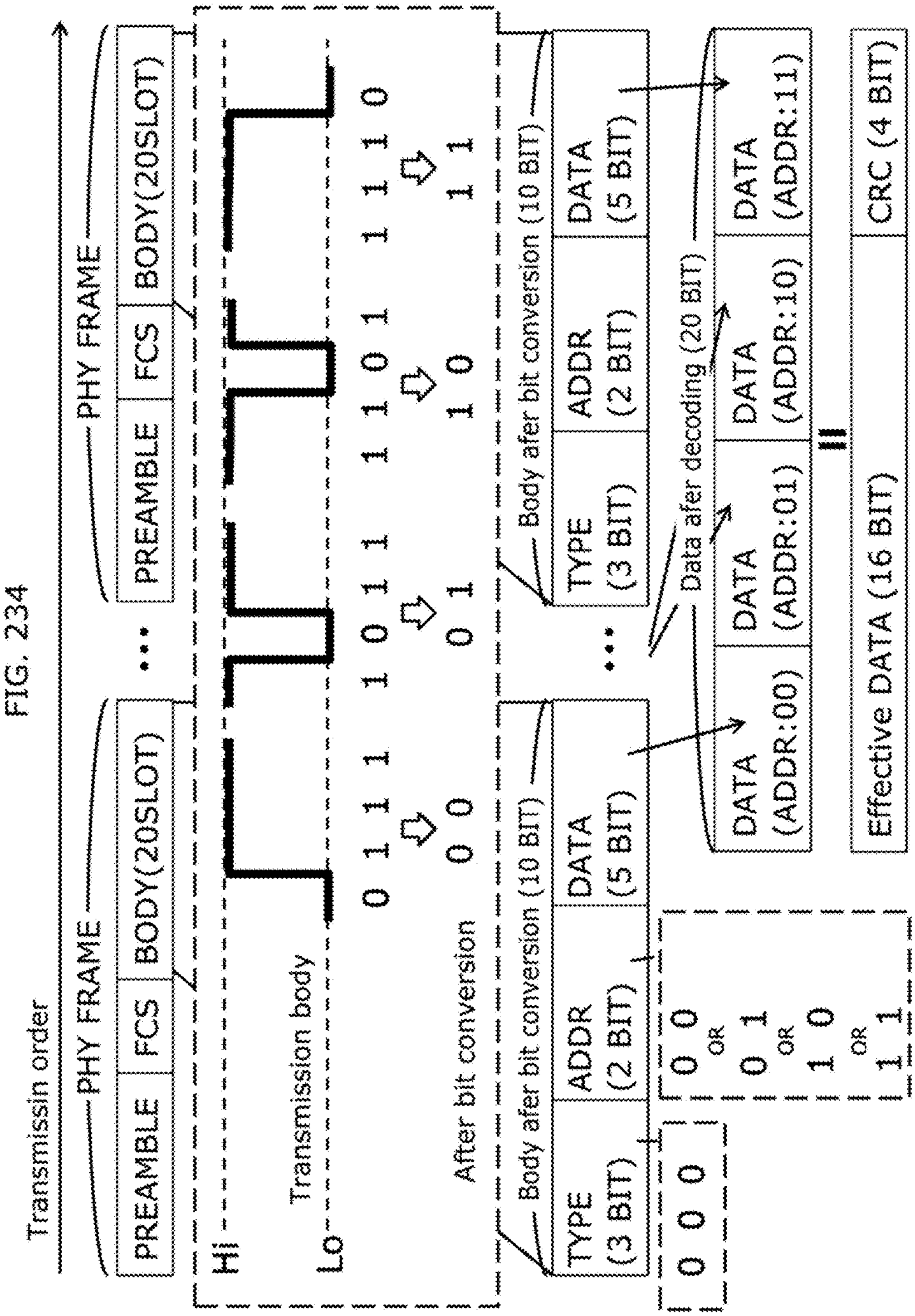
Figure 236:
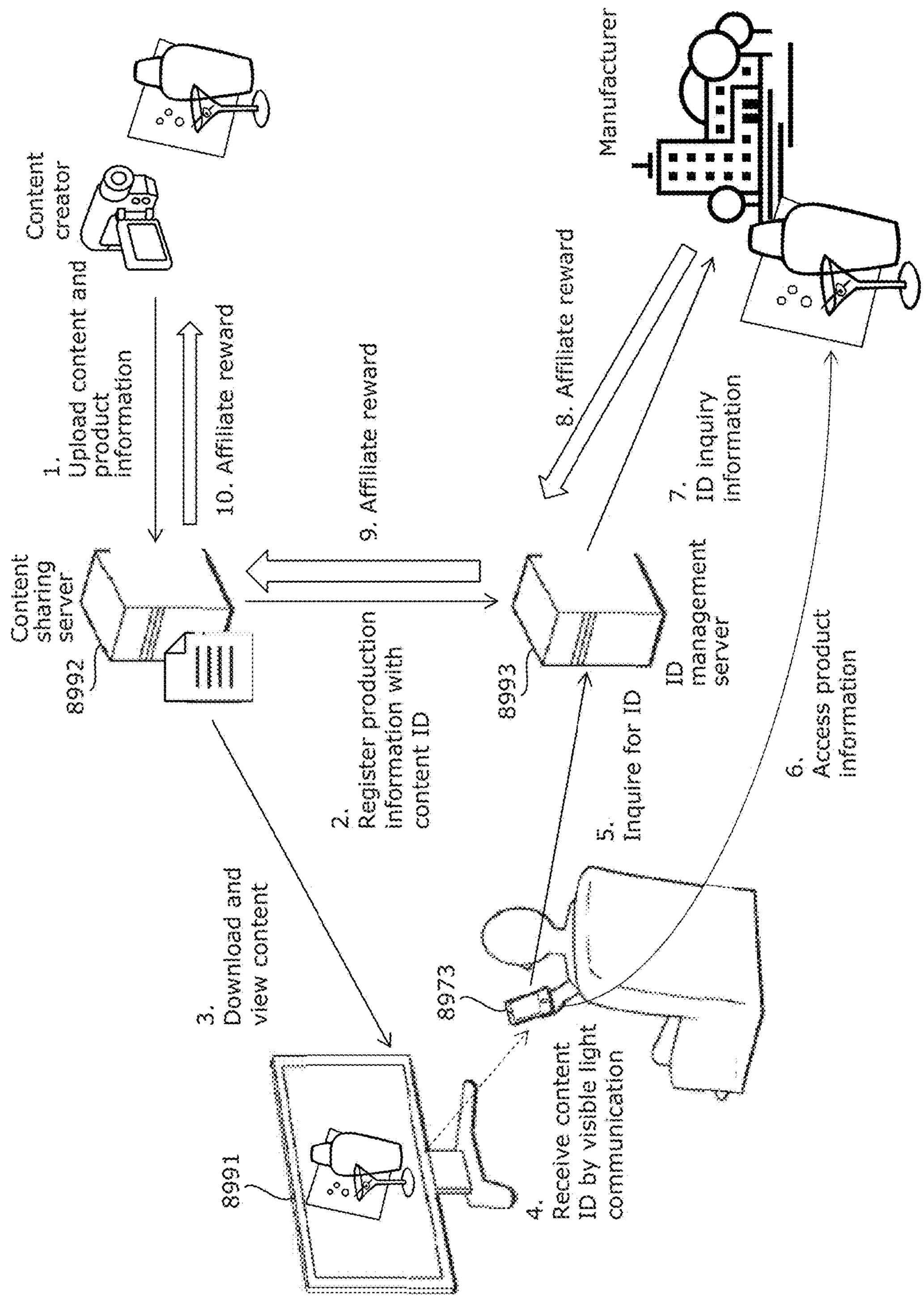
Figure 237:
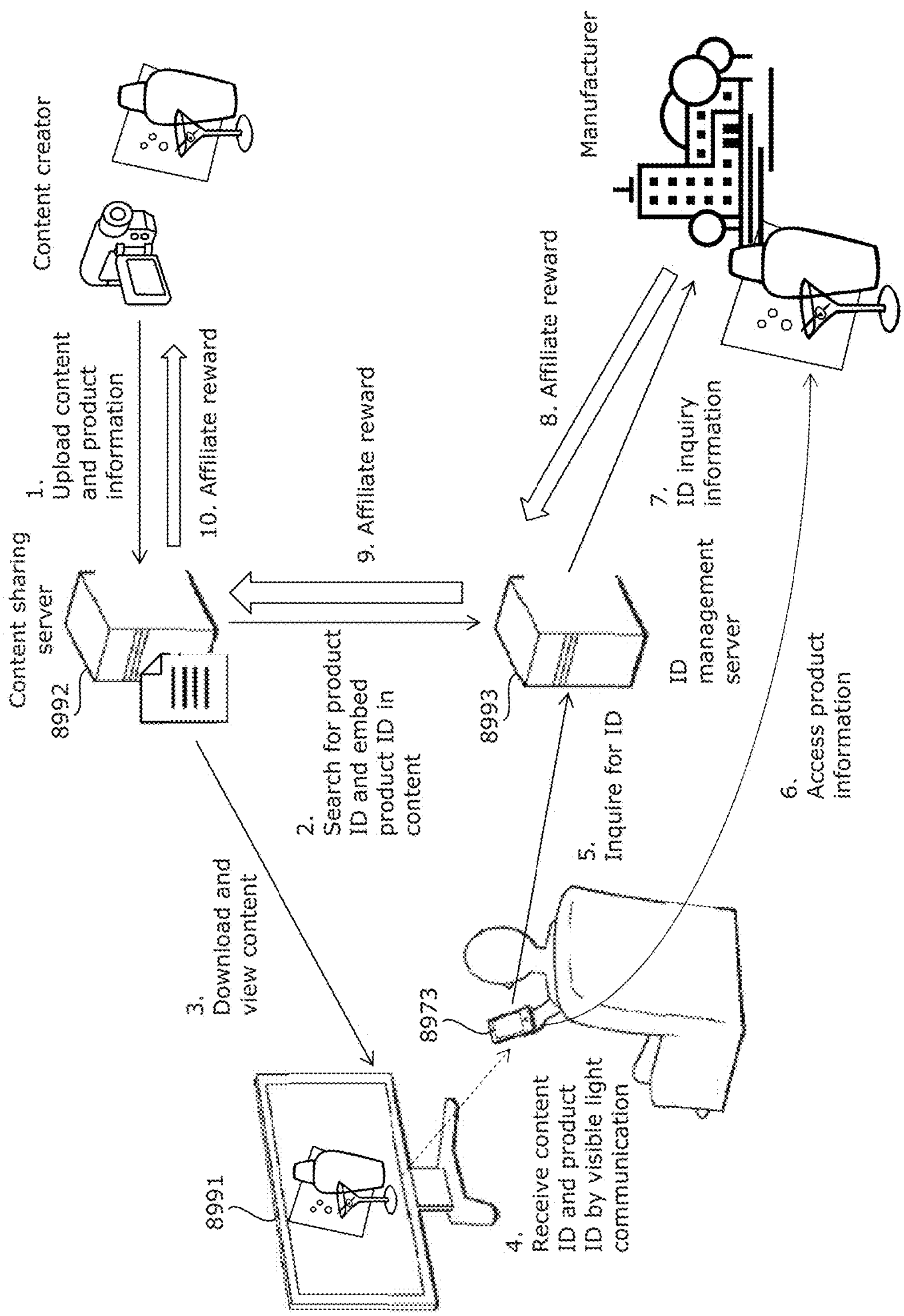
Figure 238:
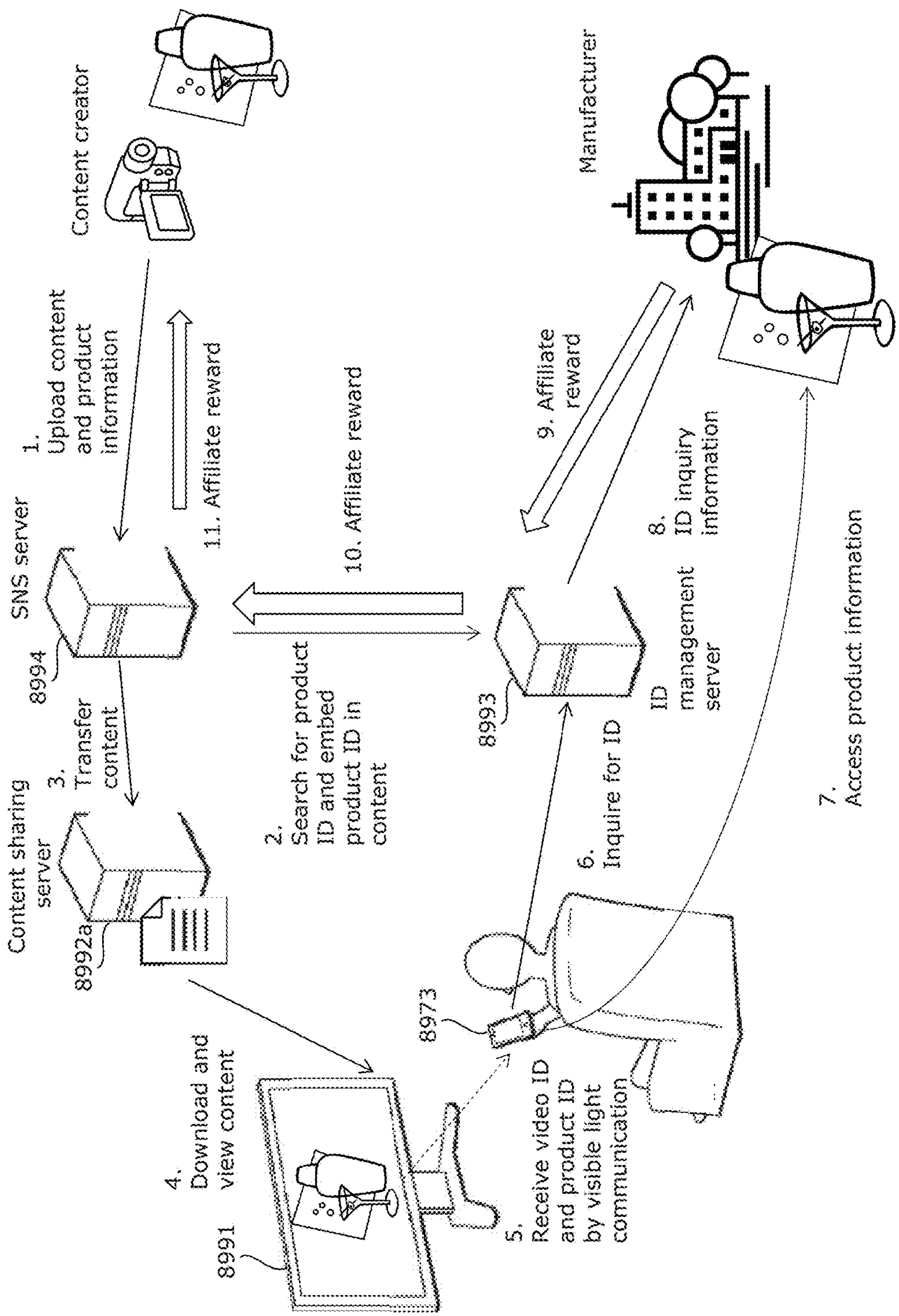
Figure 239:
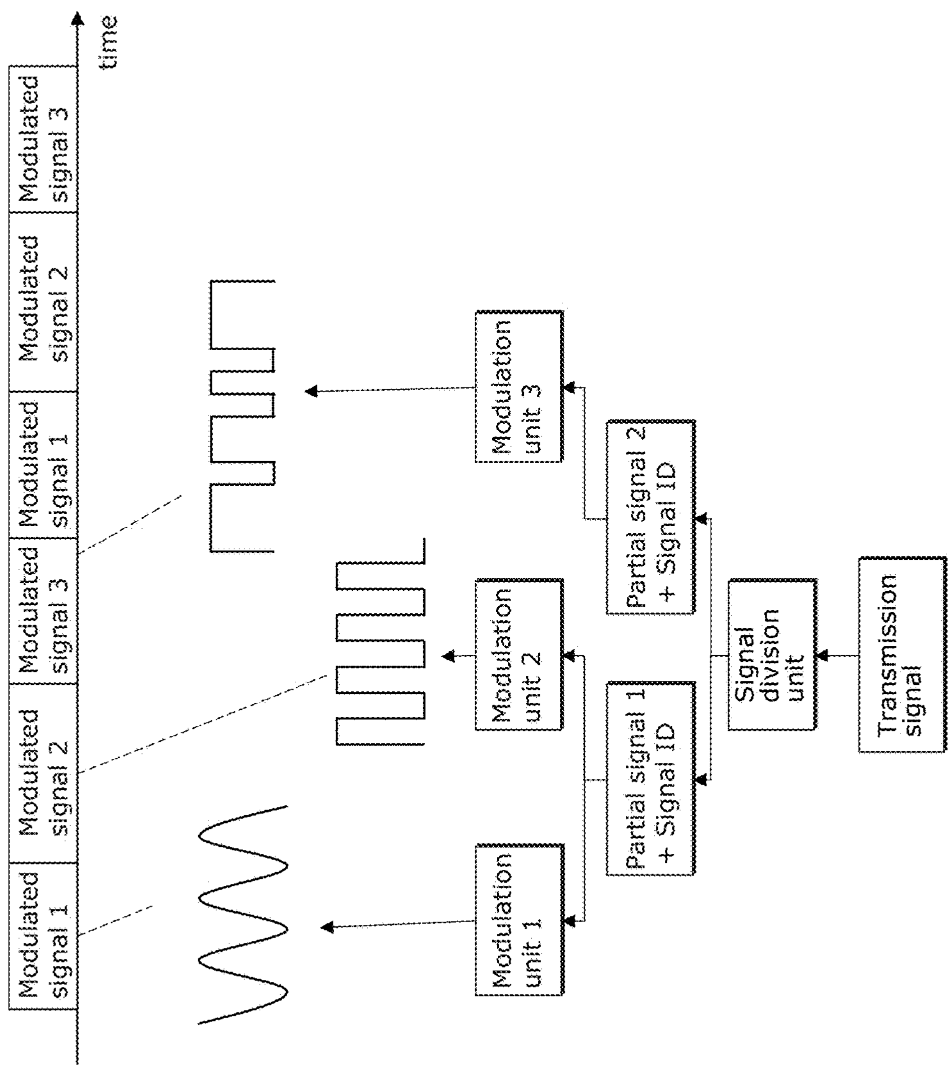
Figure 240:
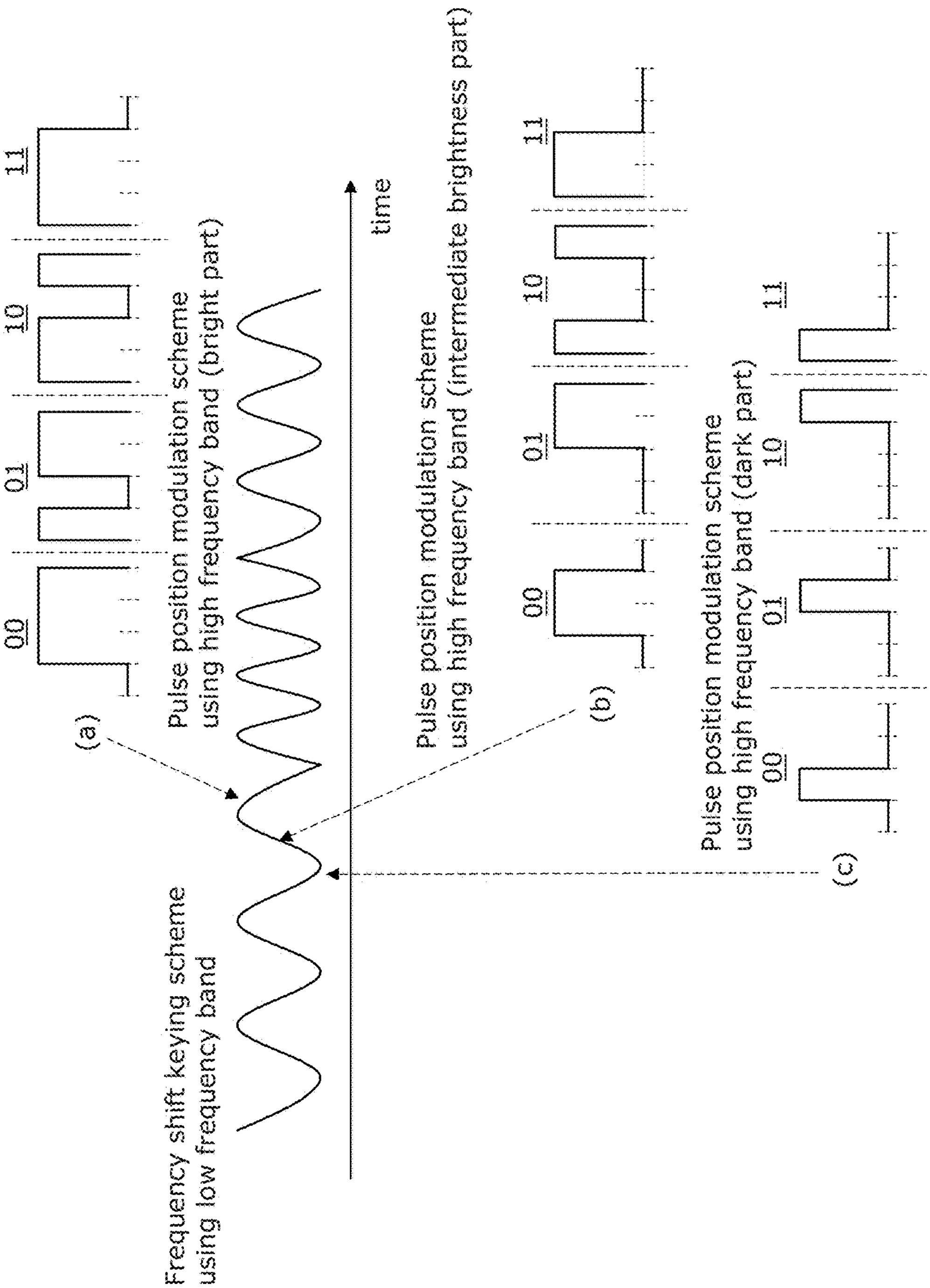
Figure 241:
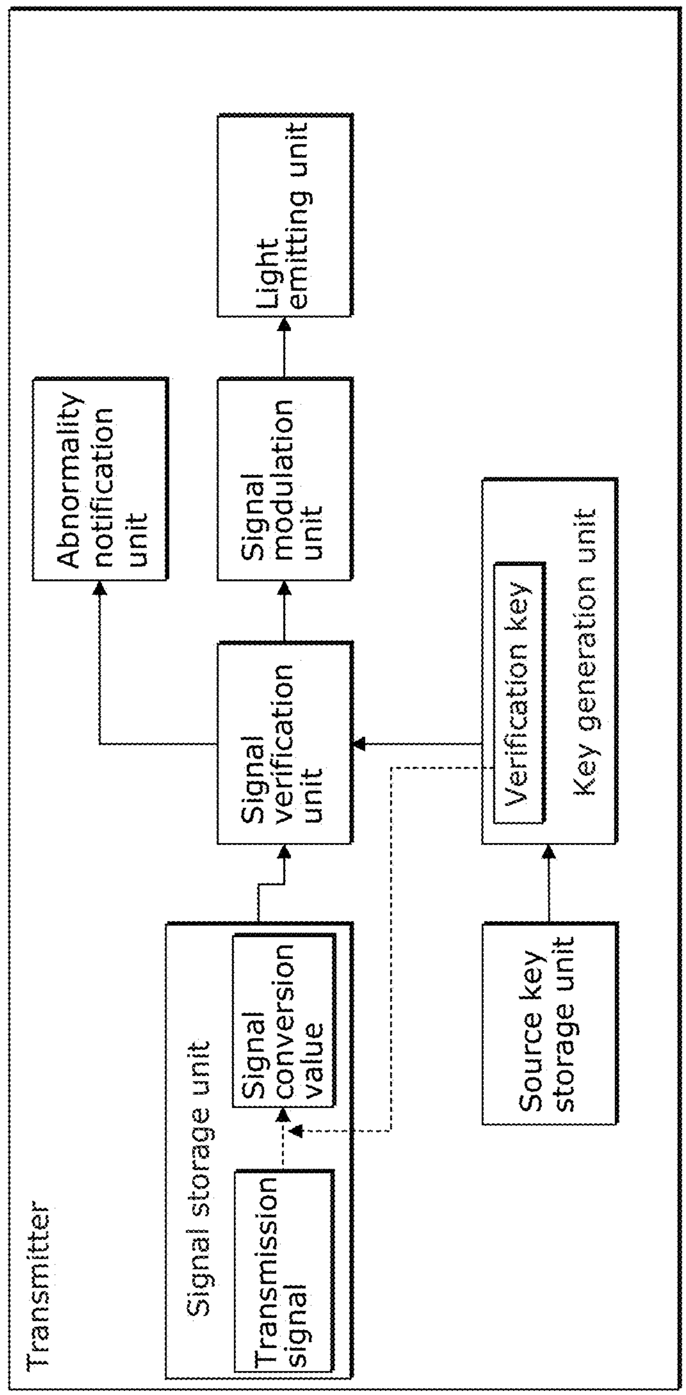
Figure 242:
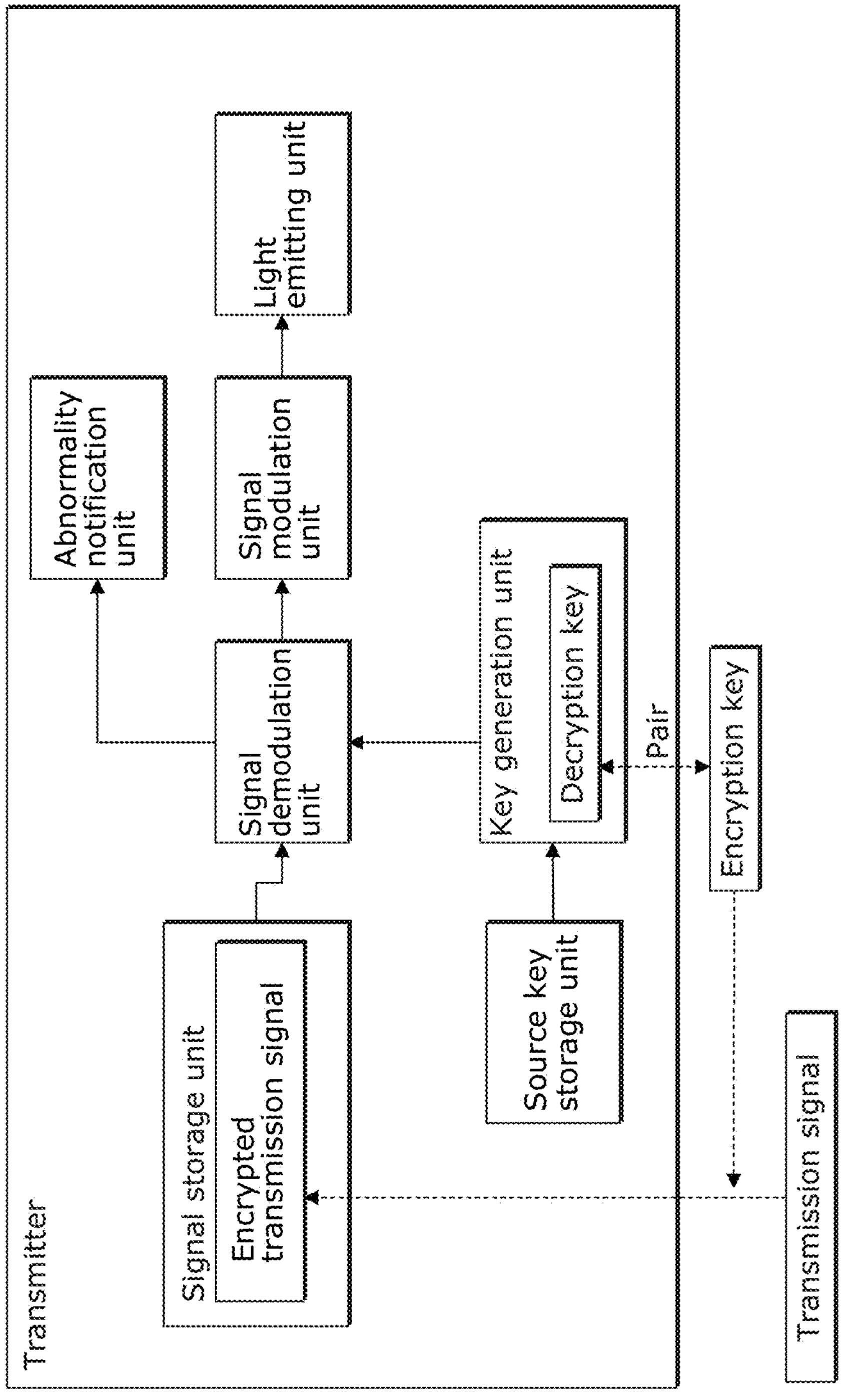
Figure 243:
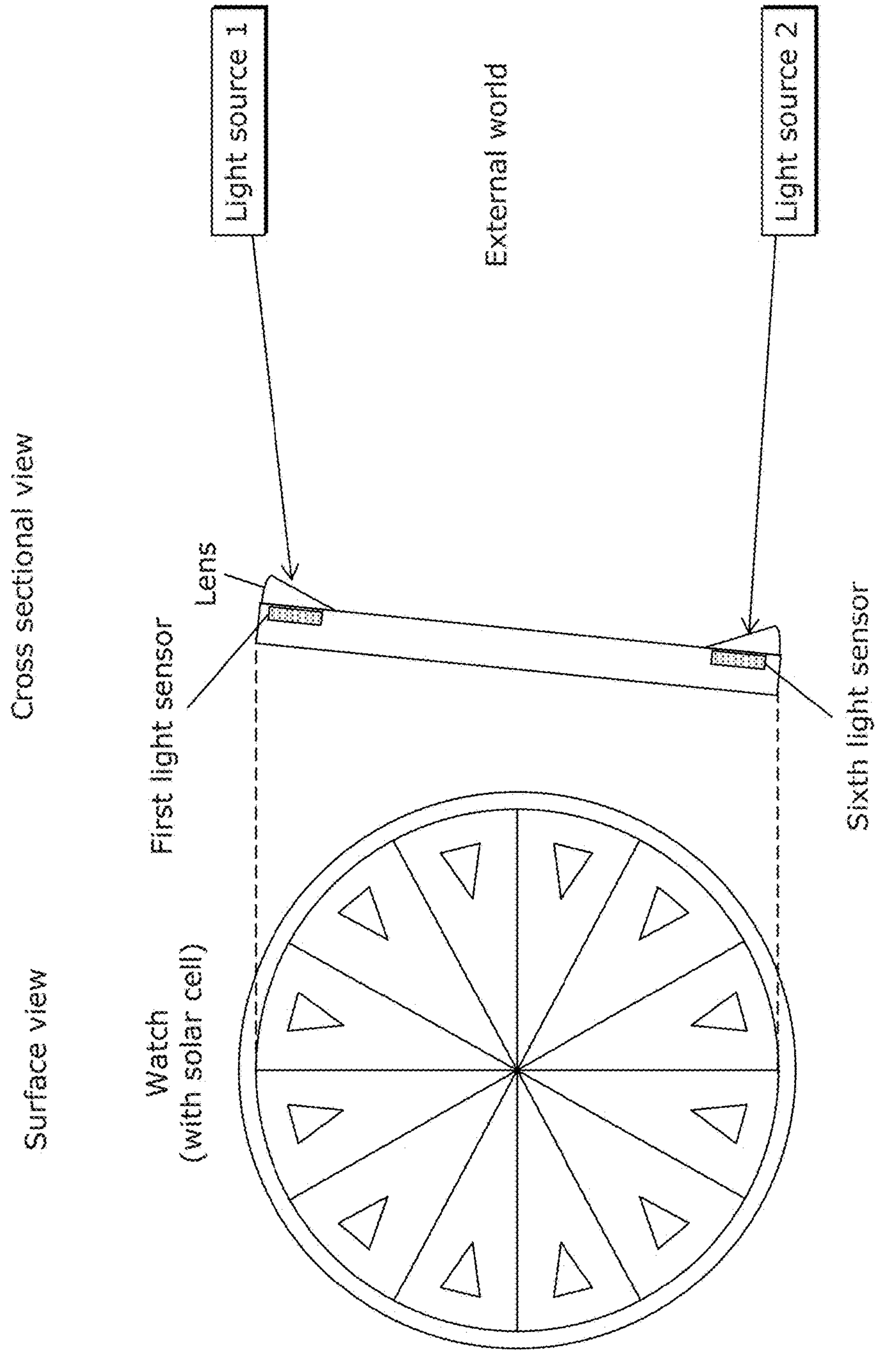
Figure 244:
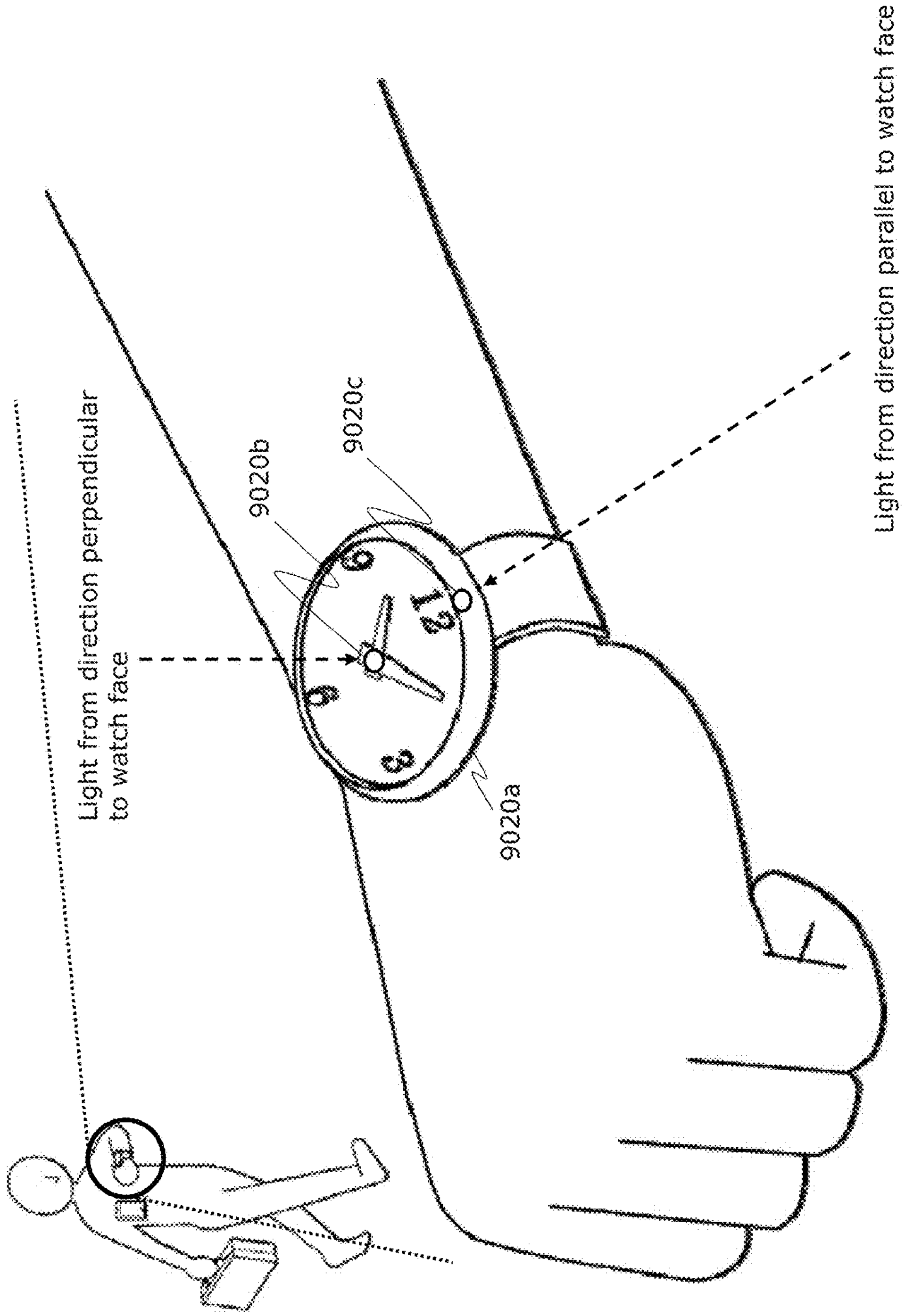
Figure 245:
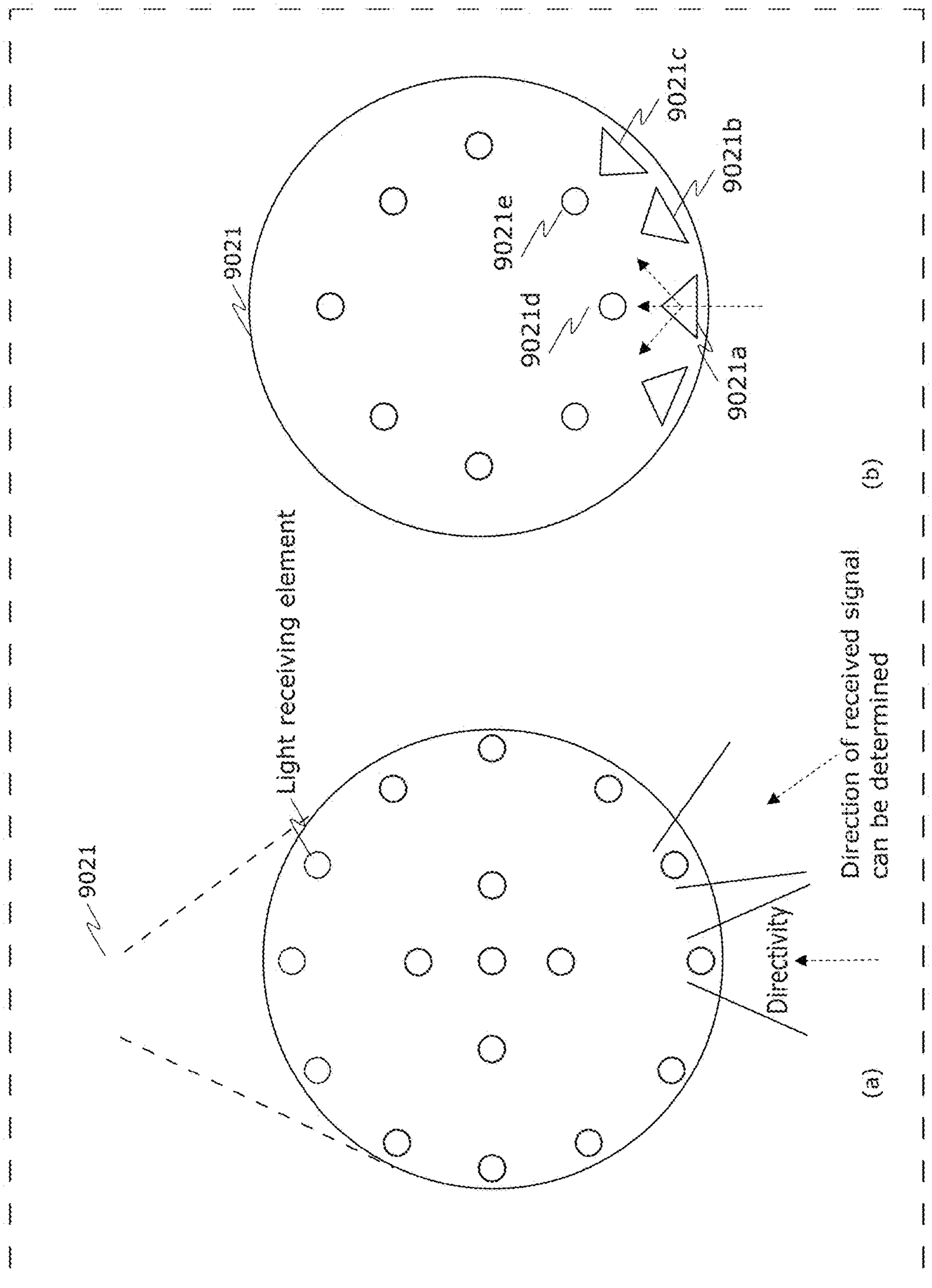
Figure 246B:
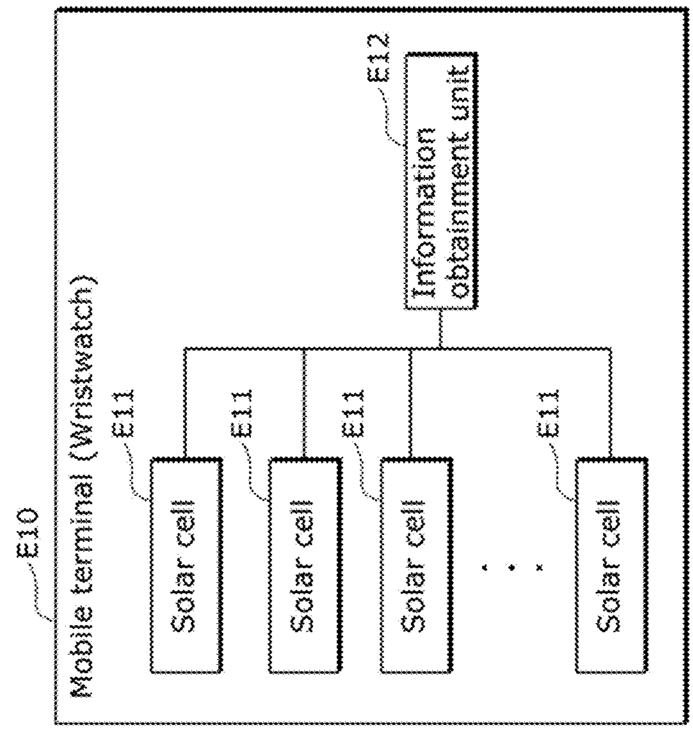
Figure 246A:
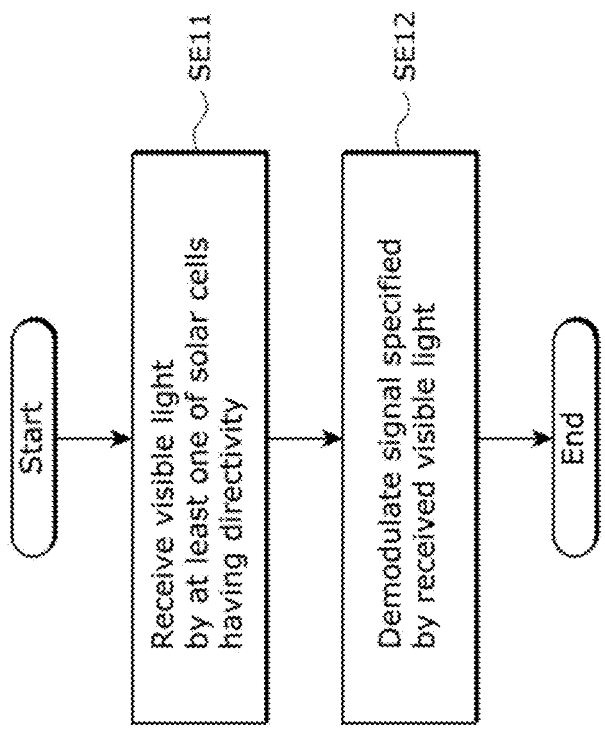
Figure 247:
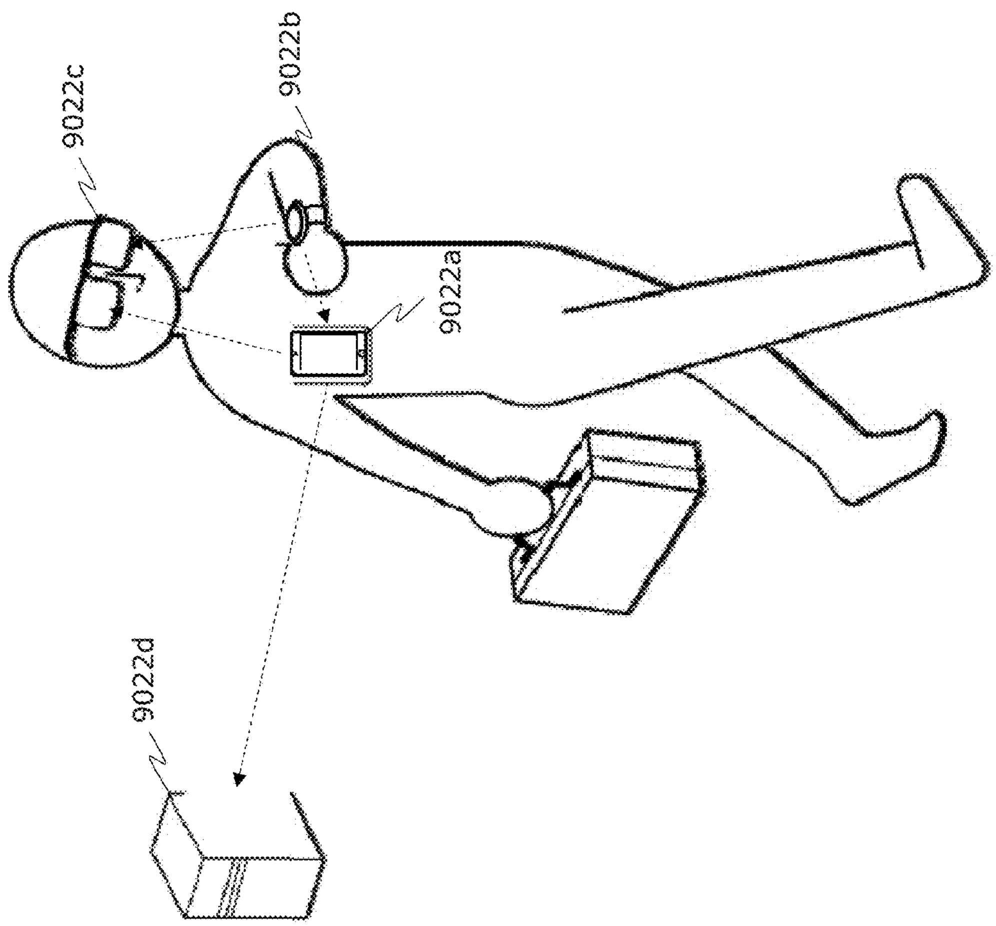
Figure 248:
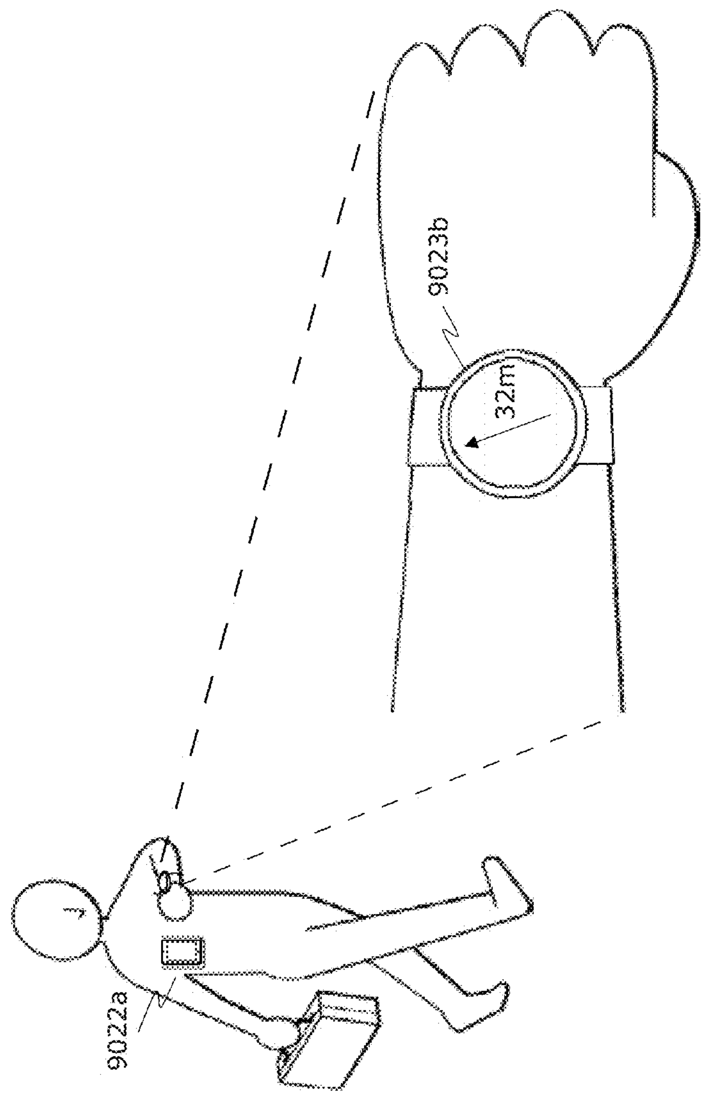
Figure 249A:
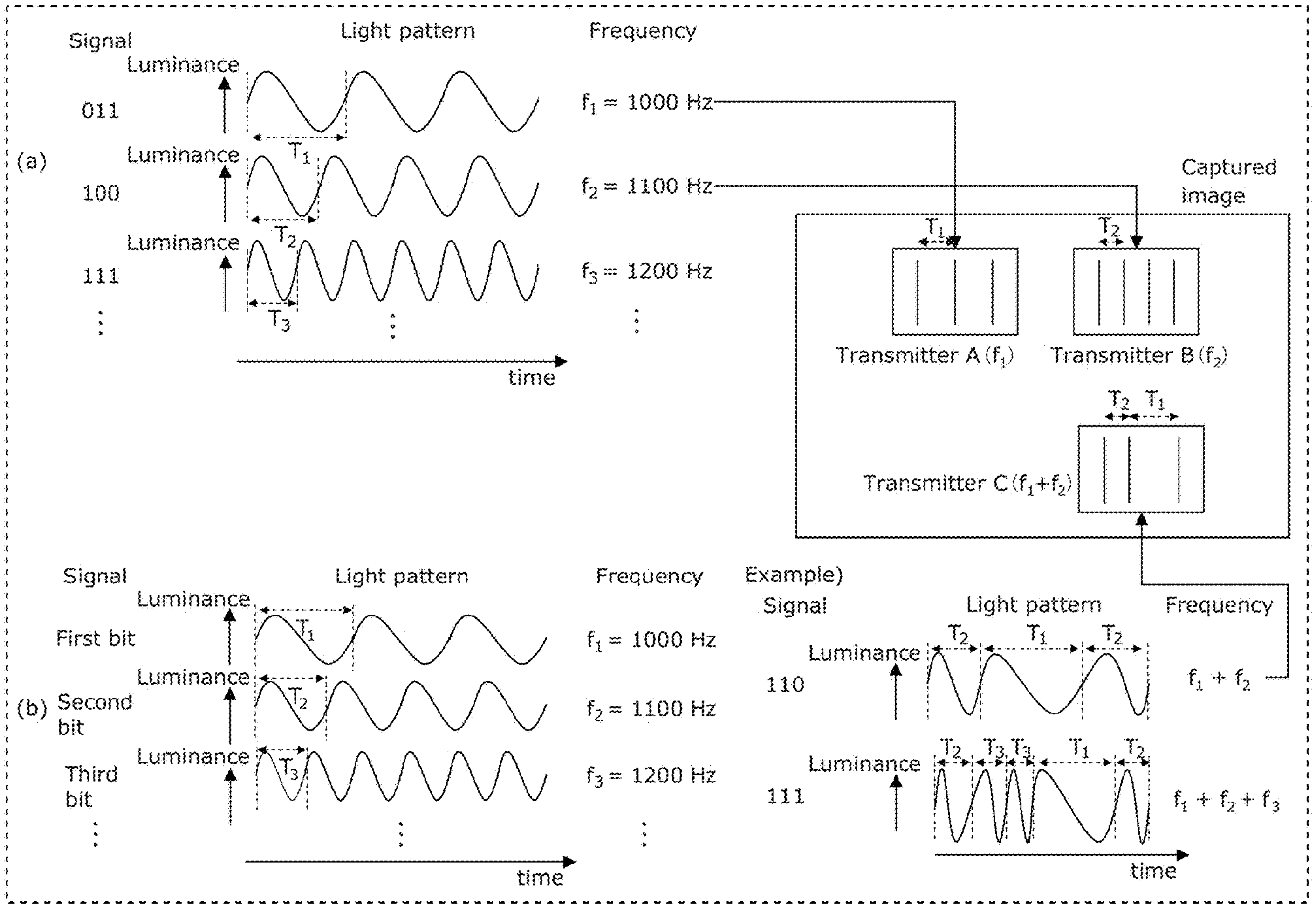
Figure 249B:
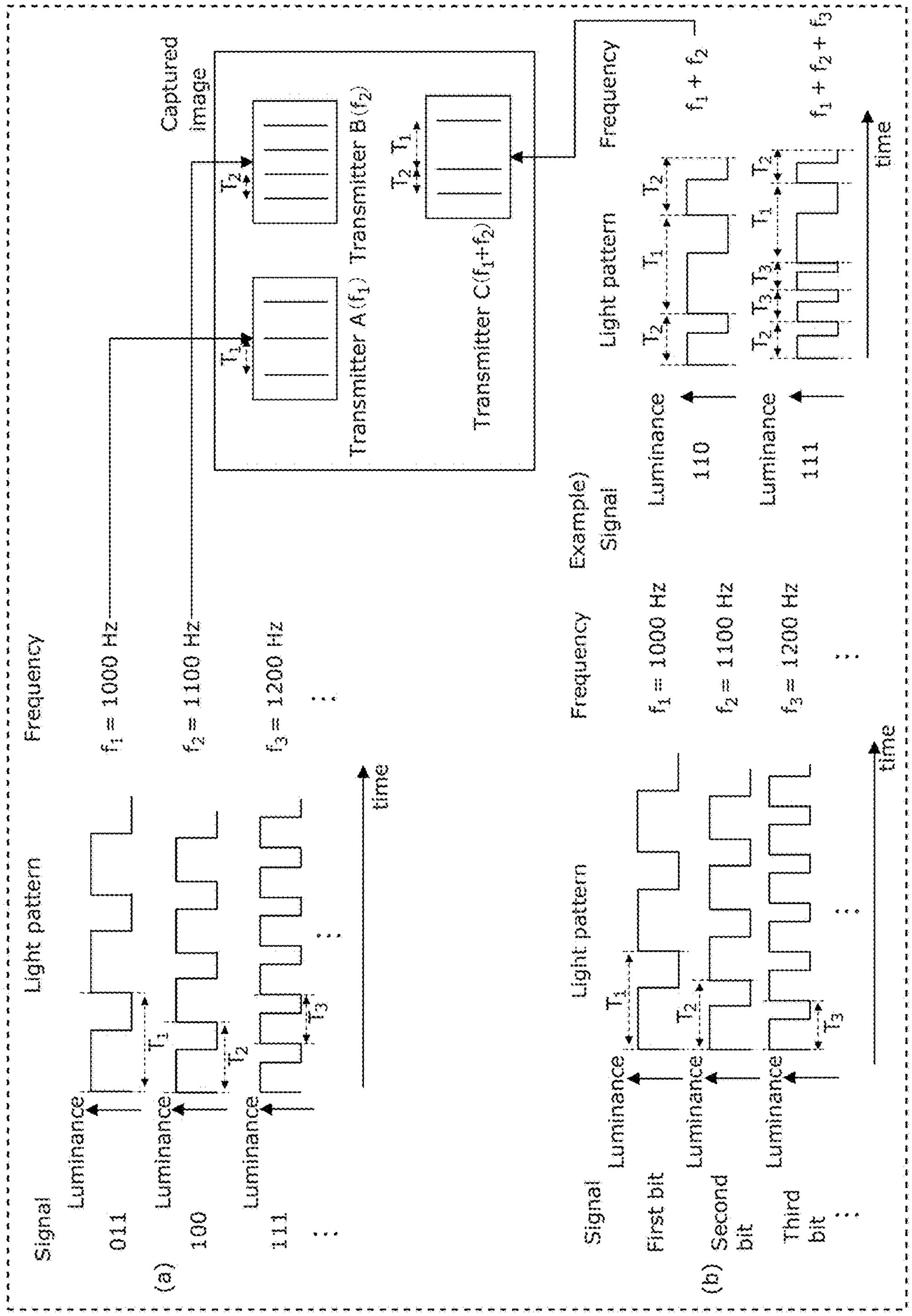
Figure 249C:
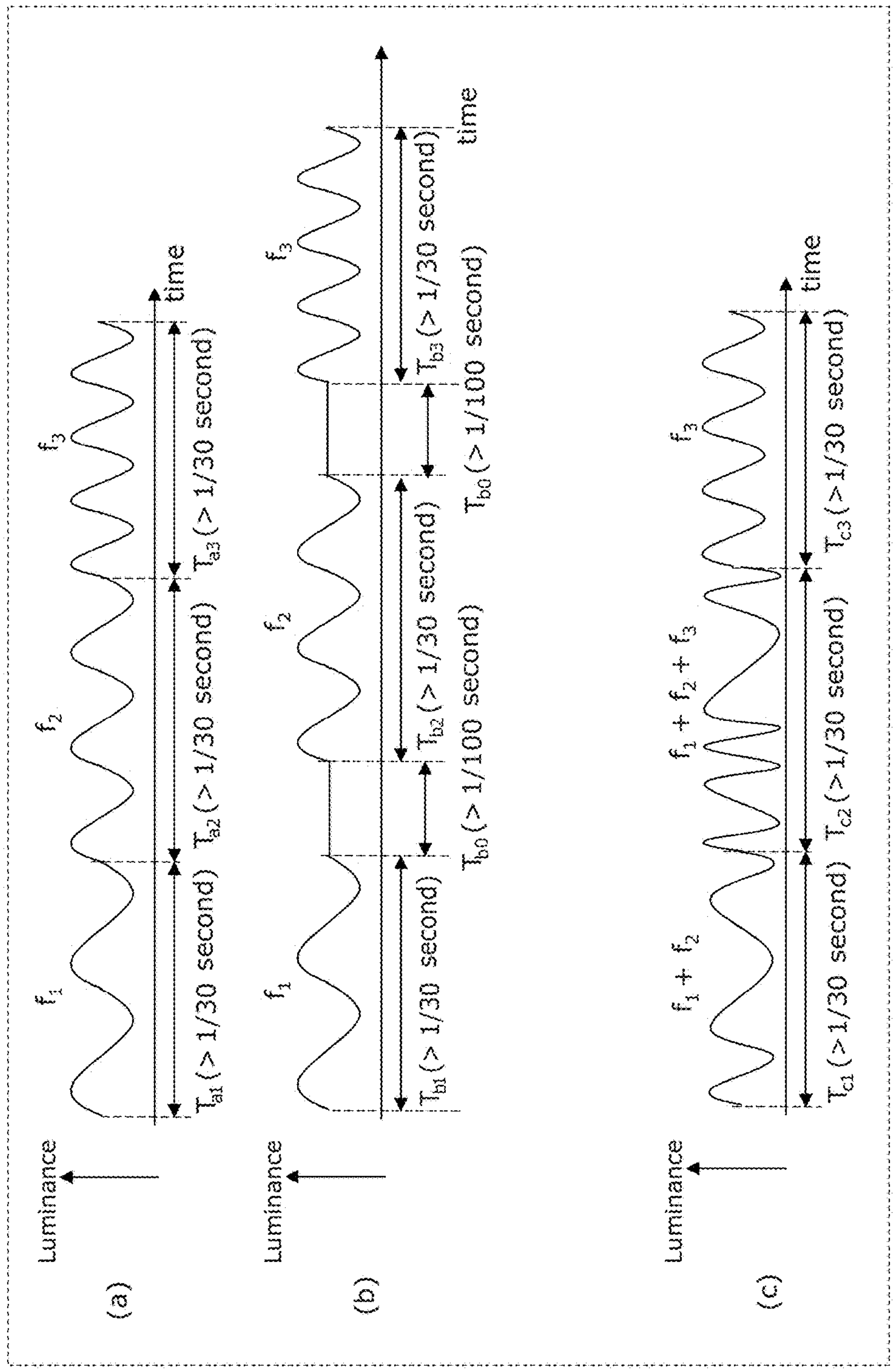
Figure 249D:
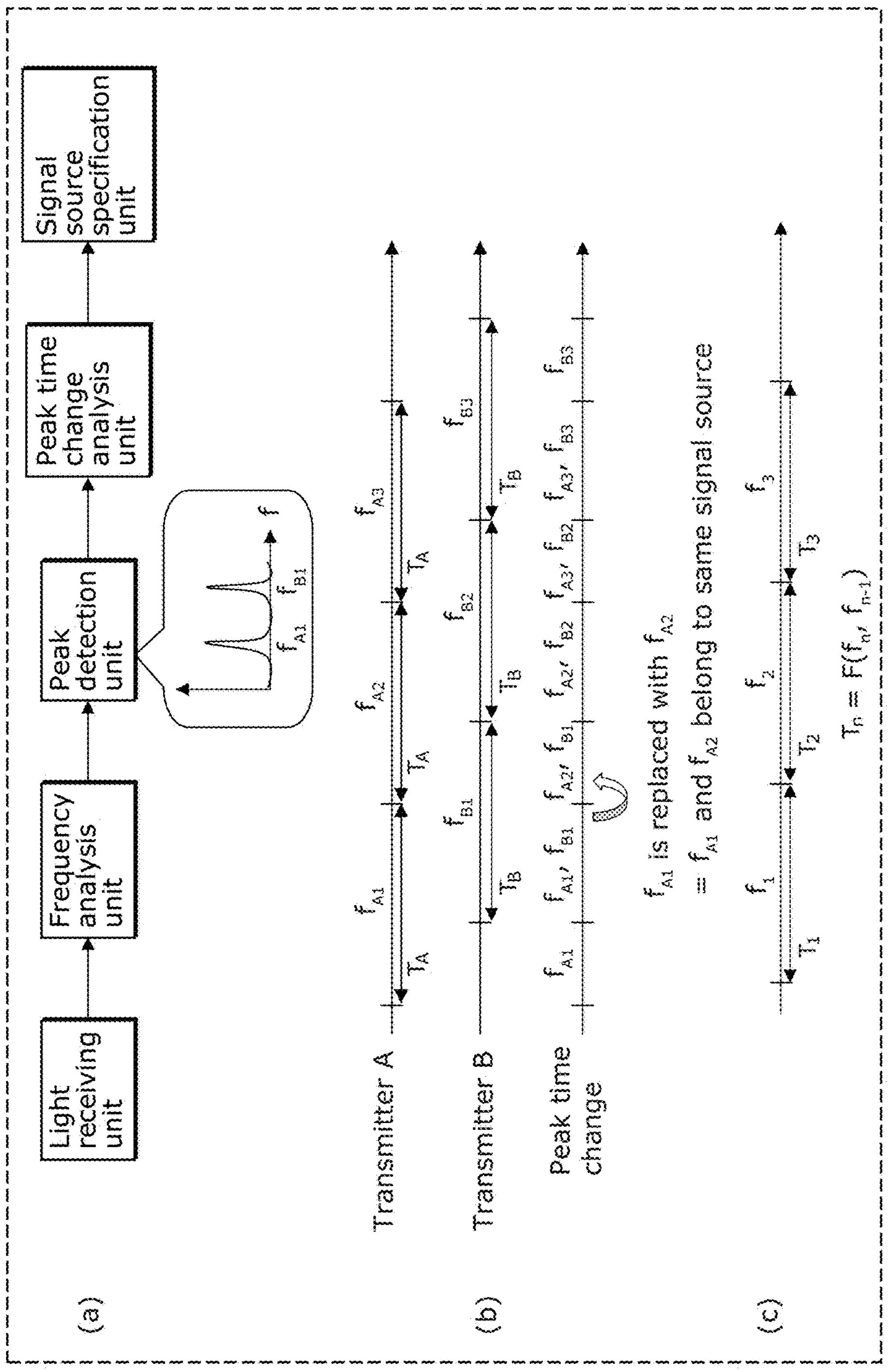
Figure 249E:
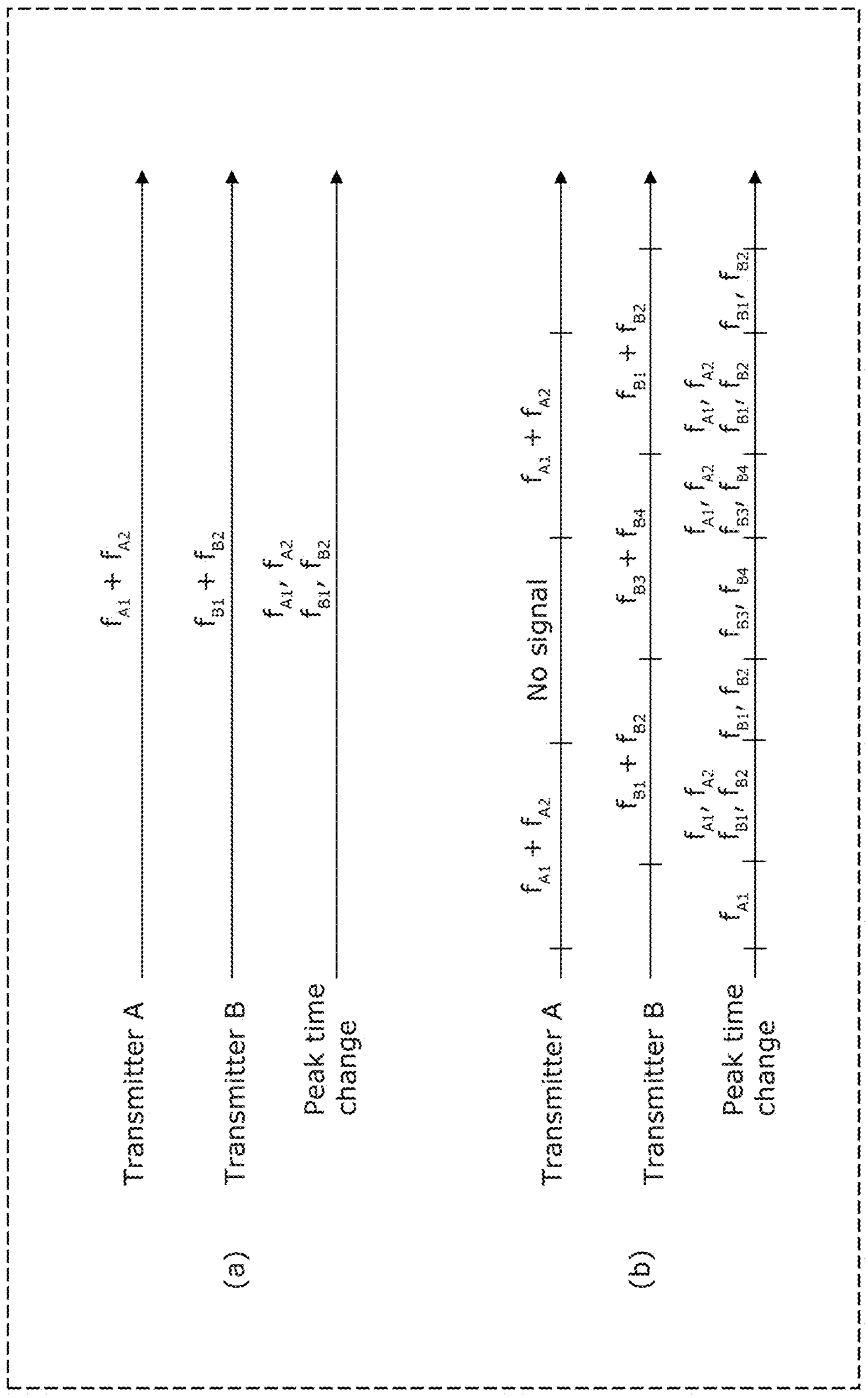
Figure 249F:
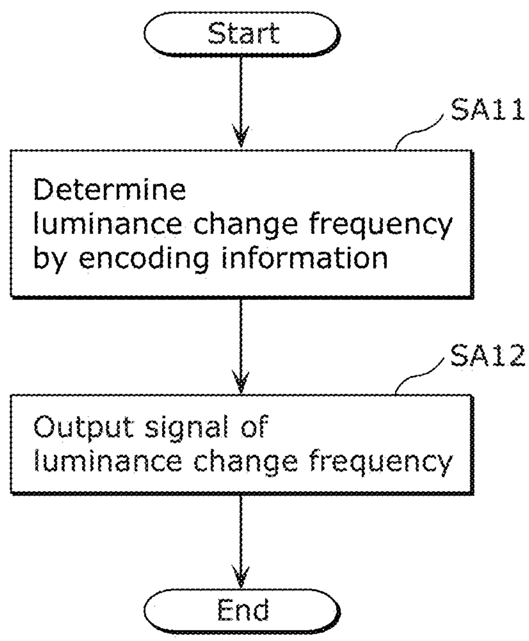
Figure 249G:
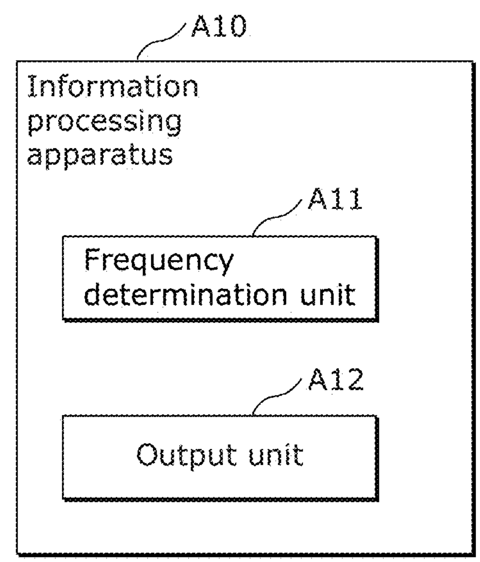
Figure 250A:
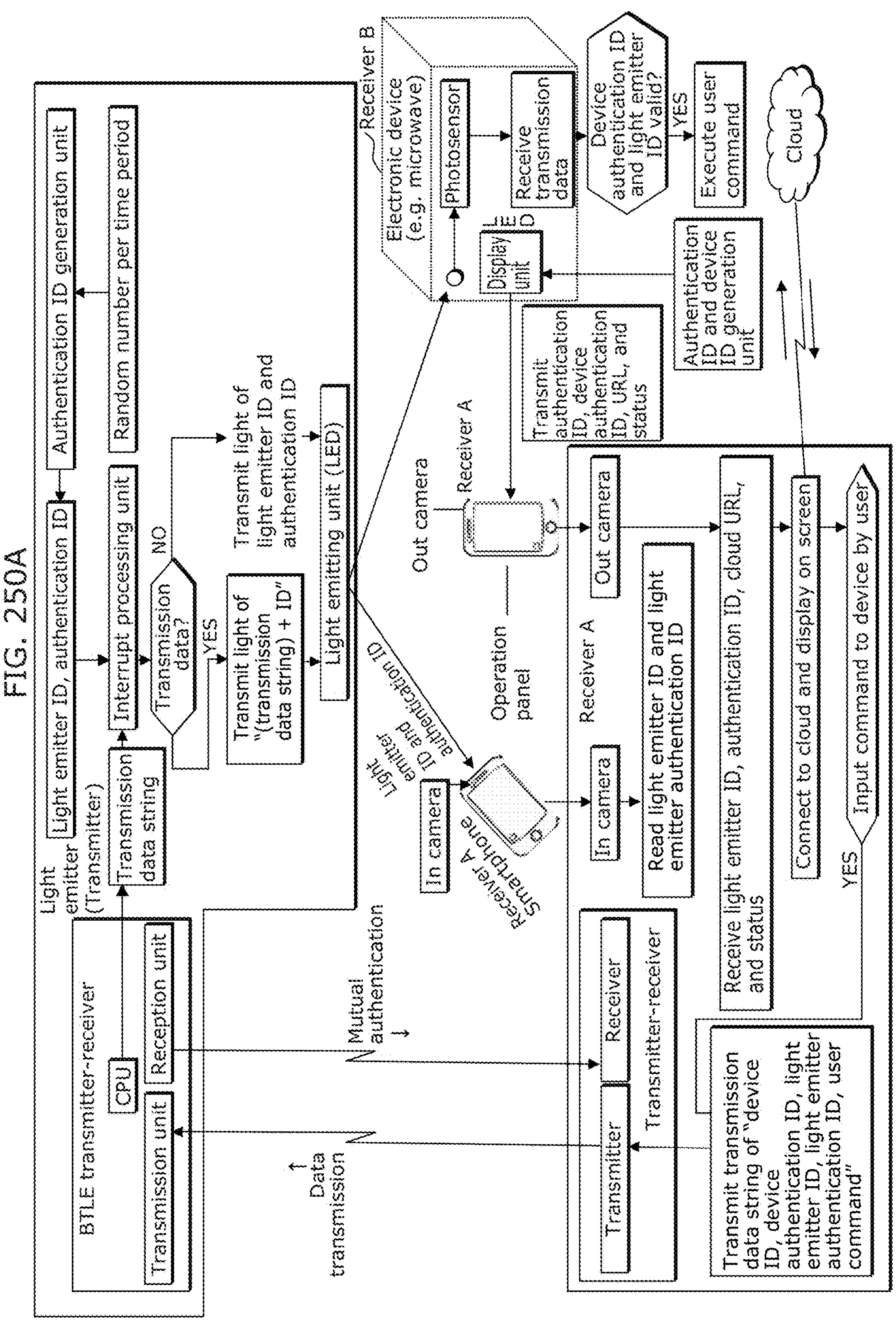
Figure 250B:
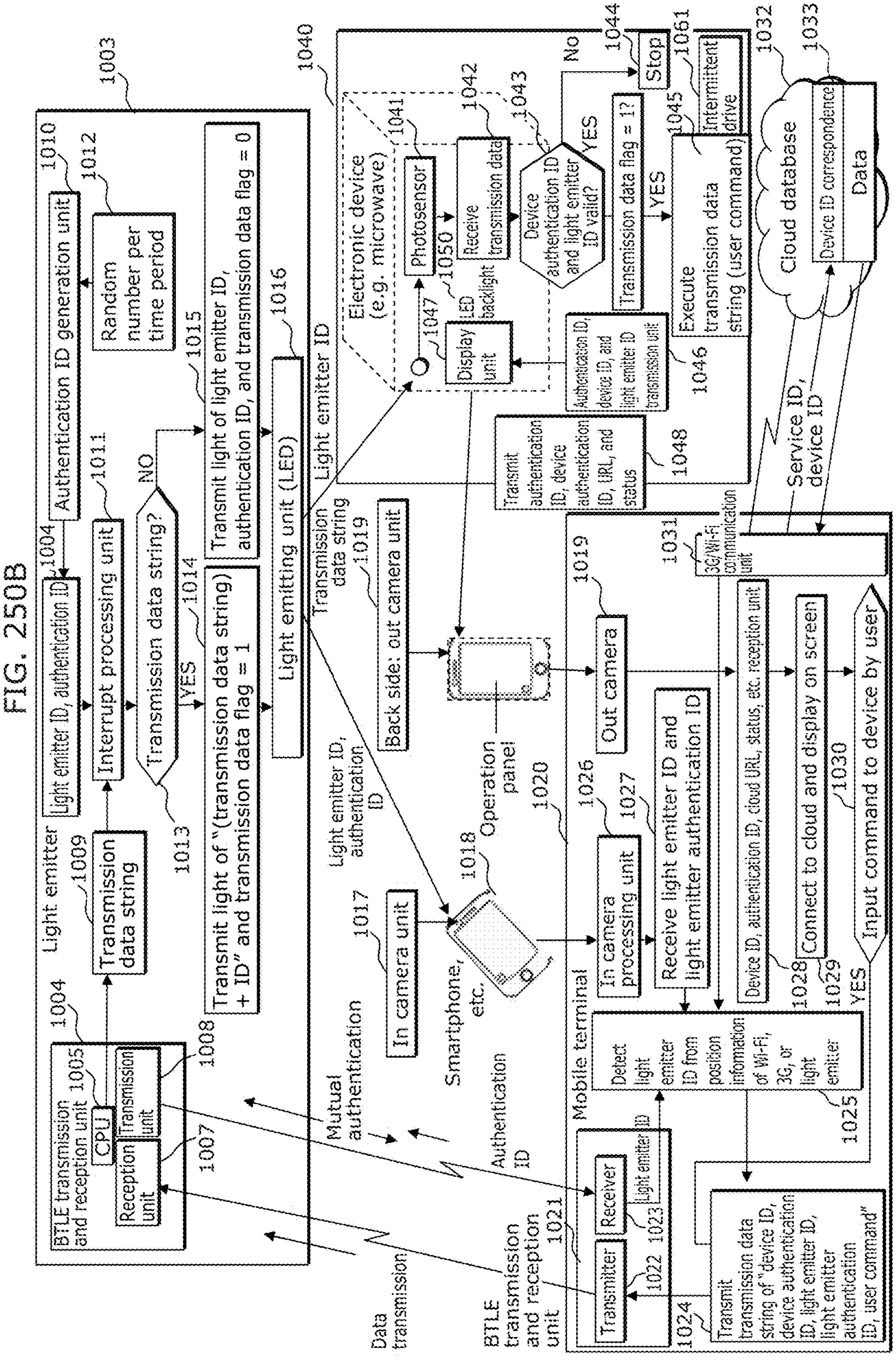
Figure 250C:
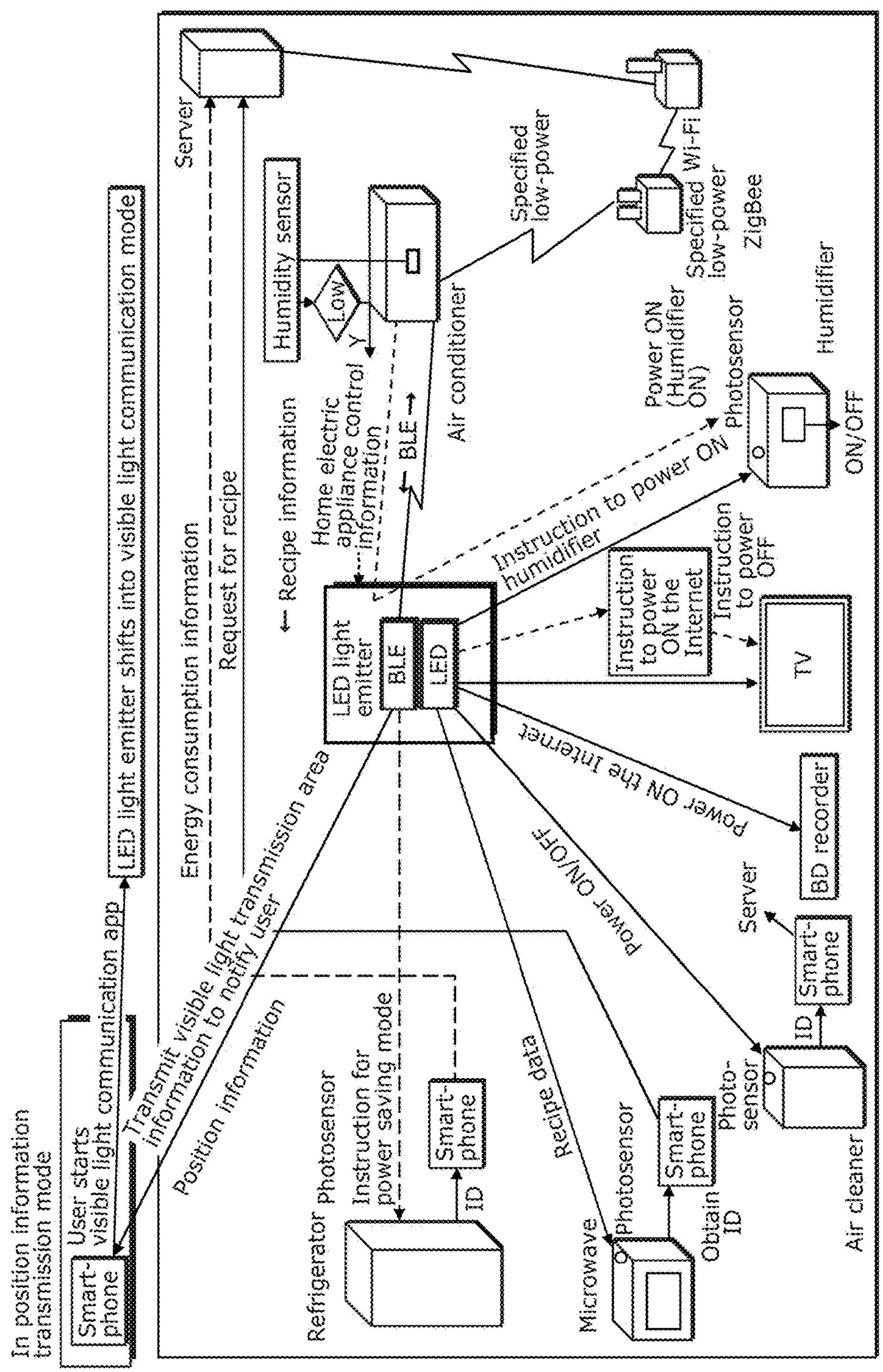
Figure 251:
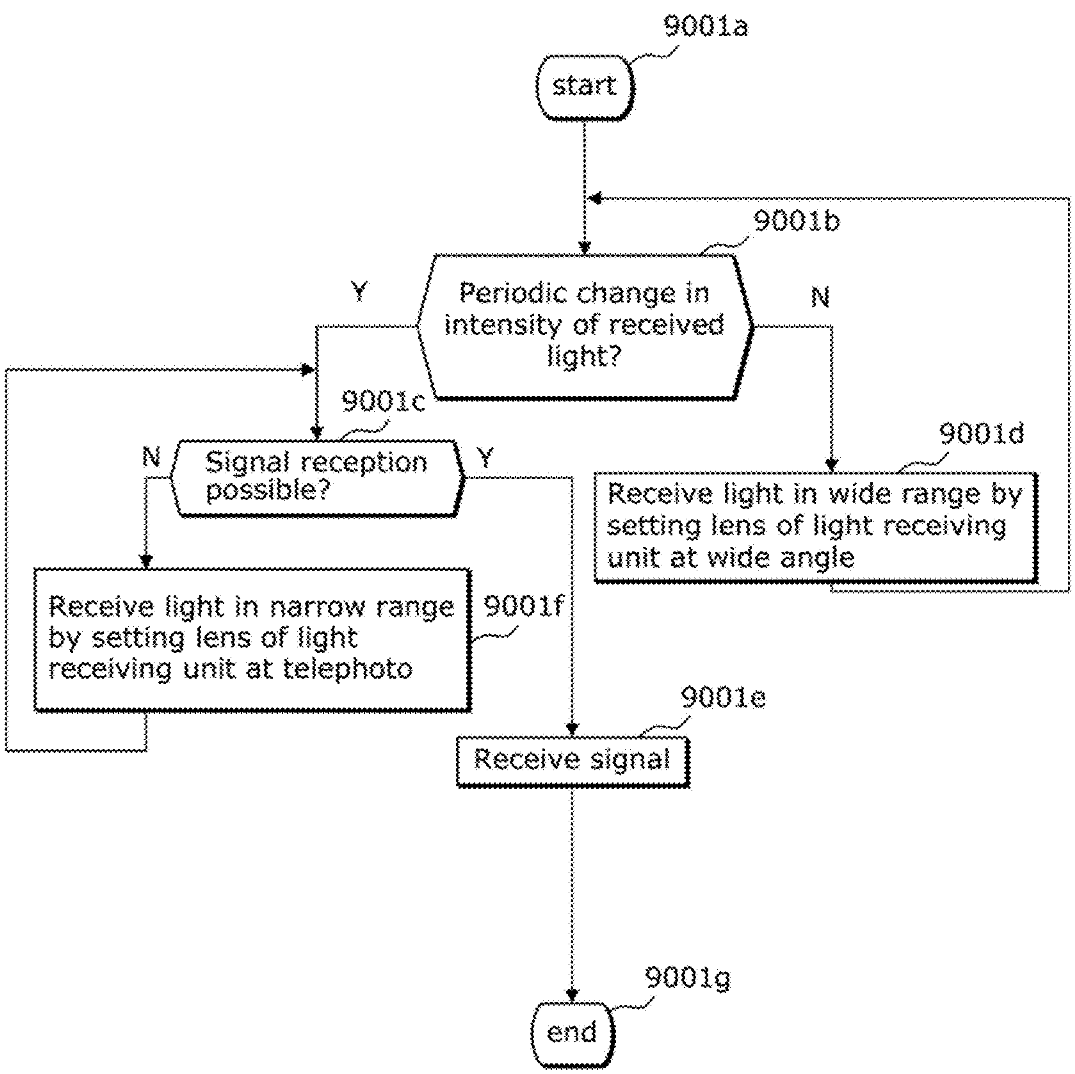
Figure 252:
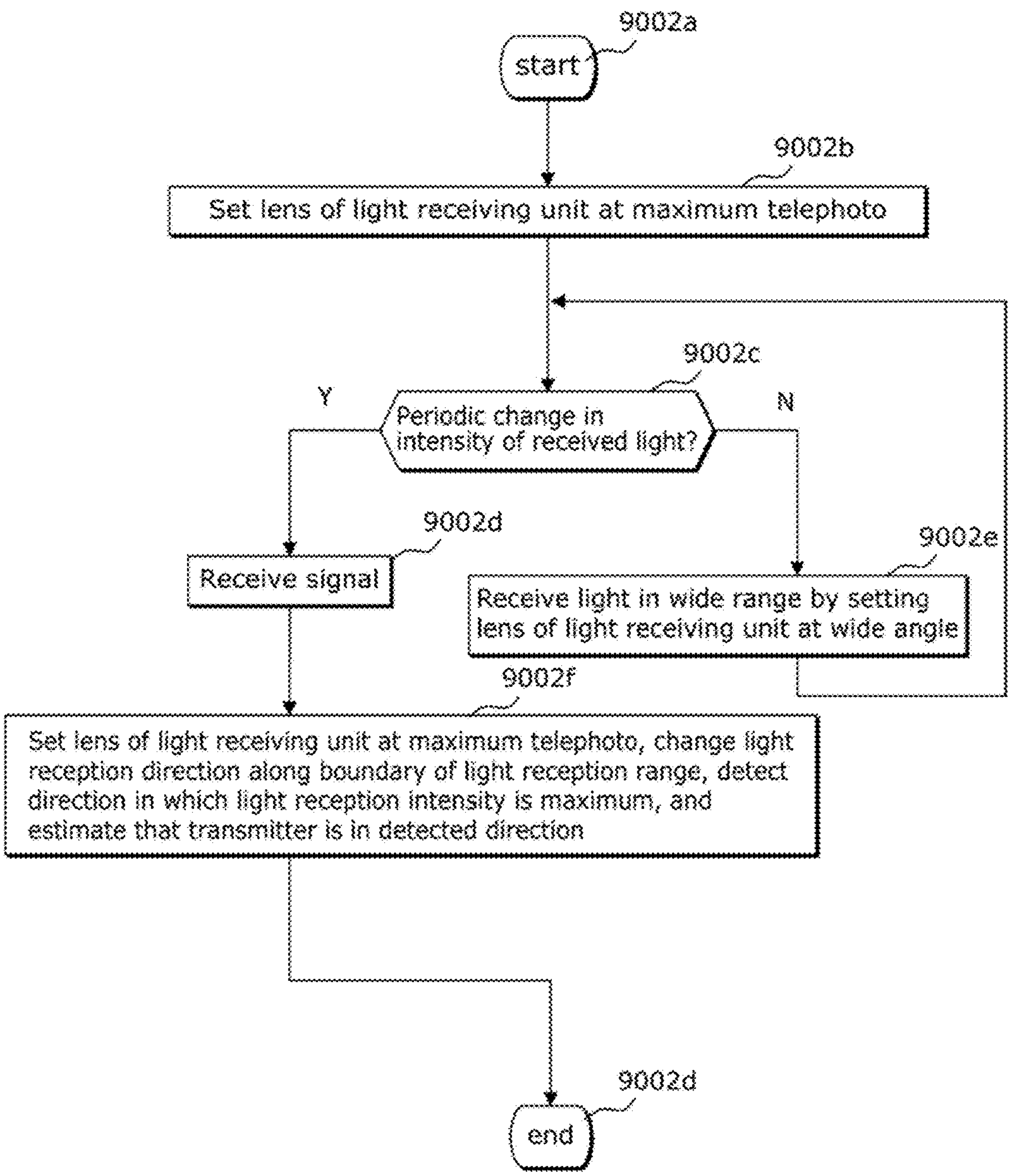
Figure 253:
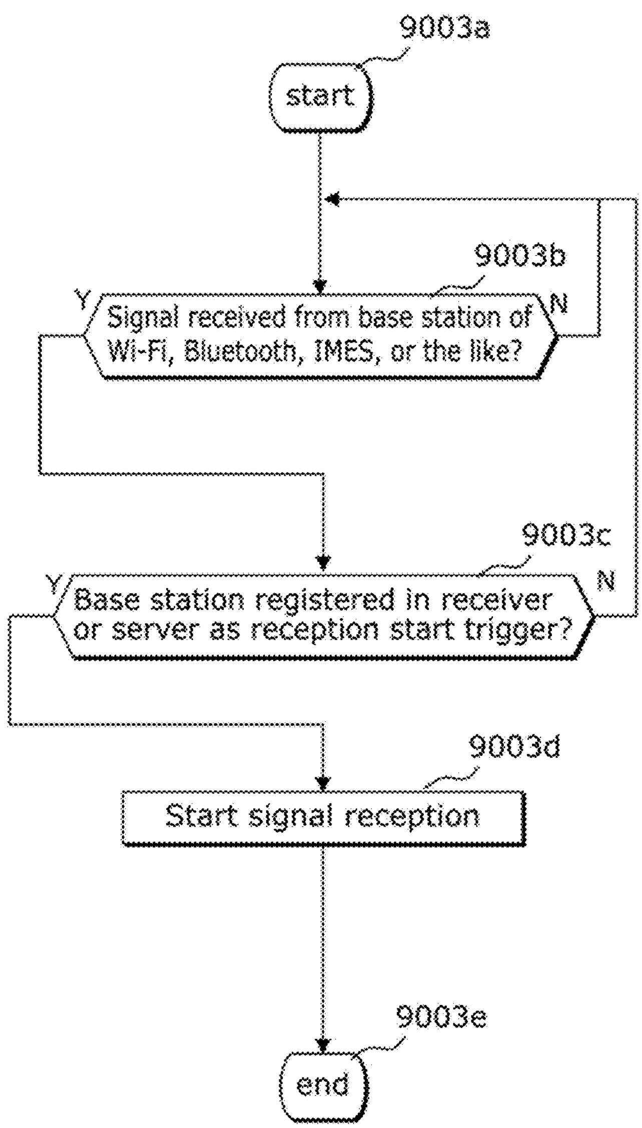
Figure 254:
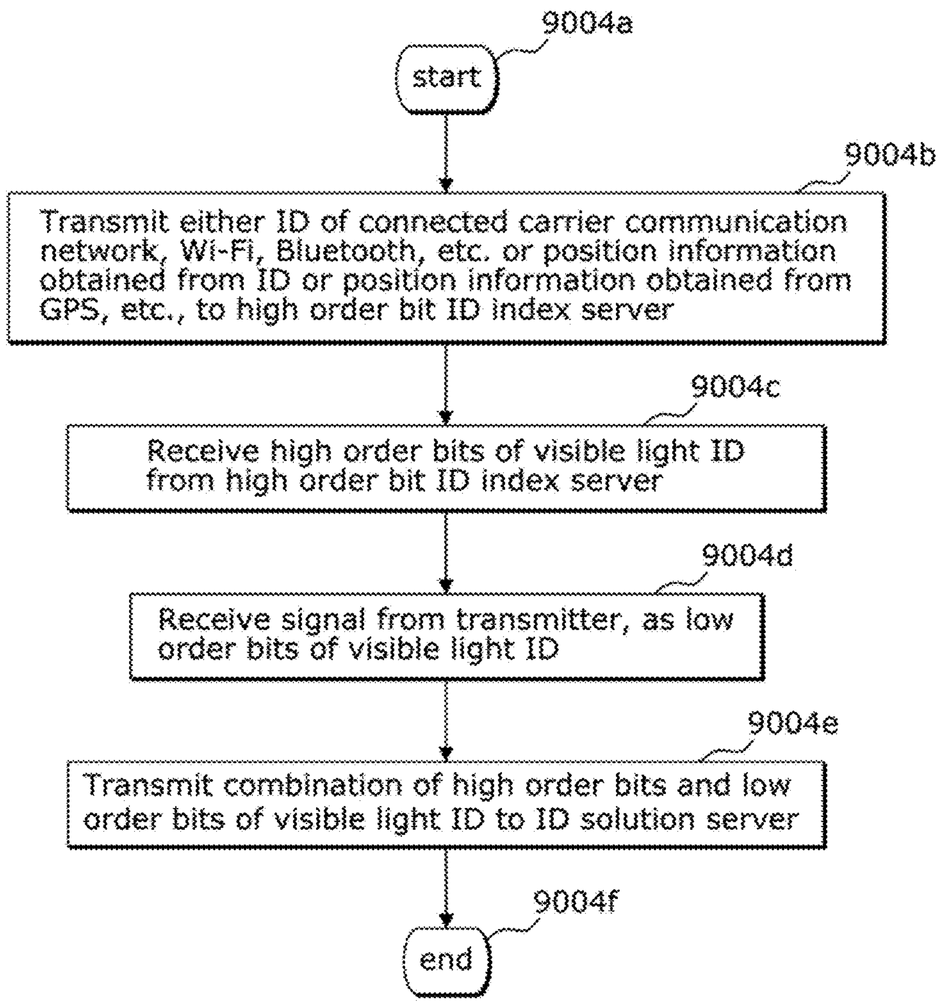
Figure 255:
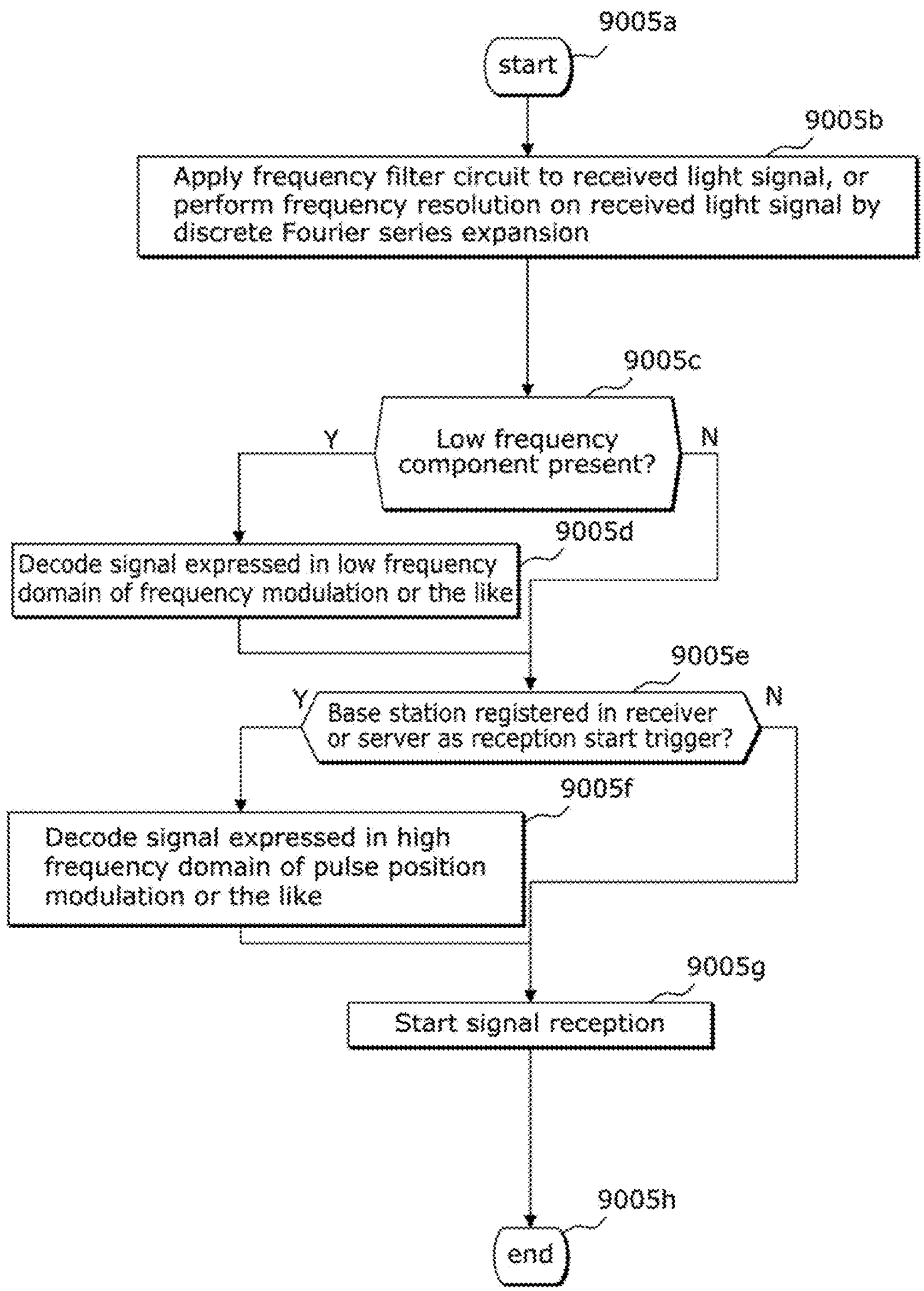

FIG. 172 is a diagram illustrating an example of a signal transmission method in Embodiment 6;

FIG. 173 is a diagram for describing a use case in Embodiment 6;

FIG. 174 is a diagram illustrating an information table transmitted from a smartphone to a server in Embodiment 6;

FIG. 175 is a block diagram of a server in Embodiment 6;

FIG. 176 is a flowchart illustrating an overall process of a system in Embodiment 6;

FIG. 177 is a diagram illustrating an information table transmitted from a server to a smartphone in Embodiment 6;

FIG. 178 is a diagram illustrating flow of screen displayed on a wearable device from when a user receives information from a server in front of a store to when the user actually buys a product in Embodiment 6;

FIG. 179 is a diagram for describing another use case in Embodiment 6;

FIG. 180 is a diagram illustrating a service provision system using the reception method described in any of the foregoing embodiments;

FIG. 181 is a flowchart illustrating service provision flow;

FIG. 182 is a flowchart illustrating service provision in another example;

FIG. 183 is a flowchart illustrating service provision in another example;

FIG. 184A is a diagram for describing a modulation scheme that facilitates reception in Embodiment 8;

FIG. 184B is a diagram for describing a modulation scheme that facilitates reception in Embodiment 8;

FIG. 185 is a diagram for describing a modulation scheme that facilitates reception in Embodiment 8;

FIG. 186 is a diagram for describing communication using bright lines and image recognition in Embodiment 8;

FIG. 187A is a diagram for describing an imaging element use method suitable for visible light signal reception in Embodiment 8;

FIG. 187B is a diagram for describing an imaging element use method suitable for visible light signal reception in Embodiment 8;

FIG. 187C is a diagram for describing an imaging element use method suitable for visible light signal reception in Embodiment 8;

FIG. 187D is a diagram for describing an imaging element use method suitable for visible light signal reception in Embodiment 8;

FIG. 187E is a flowchart for describing an imaging element use method suitable for visible light signal reception in Embodiment 8;

FIG. 188 is a diagram illustrating a captured image size suitable for visible light signal reception in Embodiment 8;

FIG. 189A is a diagram illustrating a captured image size suitable for visible light signal reception in Embodiment 8;

FIG. 189B is a flowchart illustrating operation for switching to a captured image size suitable for visible light signal reception in Embodiment 8;

FIG. 189C is a flowchart illustrating operation for switching to a captured image size suitable for visible light signal reception in Embodiment 8;

FIG. 190 is a diagram for describing visible light signal reception using zoom in Embodiment 8;

FIG. 191 is a diagram for describing an image data size reduction method suitable for visible light signal reception in Embodiment 8;

FIG. 192 is a diagram for describing a modulation scheme with high reception error detection accuracy in Embodiment 8;

FIG. 193 is a diagram for describing a change of operation of a receiver according to situation in Embodiment 8;

FIG. 194 is a diagram for describing notification of visible light communication to humans in Embodiment 8;

FIG. 195 is a diagram for describing expansion in reception range by a diffusion plate in Embodiment 8;

FIG. 196 is a diagram for describing a method of synchronizing signal transmission from a plurality of projectors in Embodiment 8;

FIG. 197 is a diagram for describing a method of synchronizing signal transmission from a plurality of displays in Embodiment 8;

FIG. 198 is a diagram for describing visible light signal reception by an illuminance sensor and an image sensor in Embodiment 8;

FIG. 199 is a diagram for describing a reception start trigger in Embodiment 8;

FIG. 200 is a diagram for describing a reception start gesture in Embodiment 8;

FIG. 201 is a diagram for describing an example of application to a car navigation system in Embodiment 8;

FIG. 202 is a diagram for describing an example of application to a car navigation system in Embodiment 8;

FIG. 203 is a diagram for describing an example of application to content protection system in Embodiment 8;

FIG. 204A is a diagram for describing an example of application to an electronic lock in Embodiment 8;

FIG. 204B is a flowchart of an information communication method in Embodiment 8;

FIG. 204C is a block diagram of an information communication device in Embodiment 8;

FIG. 205 is a diagram for describing an example of application to store visit information transmission in Embodiment 8;

FIG. 206 is a diagram for describing an example of application to location-dependent order control in Embodiment 8;

FIG. 207 is a diagram for describing an example of application to route guidance in Embodiment 8;

FIG. 208 is a diagram for describing an example of application to location notification in Embodiment 8;

FIG. 209 is a diagram for describing an example of application to use log storage and analysis in Embodiment 8;

FIG. 210 is a diagram for describing an example of application to screen sharing in Embodiment 8;

FIG. 211 is a diagram for describing an example of application to screen sharing in Embodiment 8;

FIG. 212 is a diagram for describing an example of application to position estimation using a wireless access point in Embodiment 8;

FIG. 213 is a diagram illustrating a structure of performing position estimation by visible light communication and wireless communication in Embodiment 8;

FIG. 214 is a diagram illustrating an example of application of an information communication method in Embodiment 8;

FIG. 215 is a flowchart illustrating an example of application of an information communication method in Embodiment 8;

FIG. 216 is a flowchart illustrating an example of application of an information communication method in Embodiment 8;

FIG. 217 is a diagram illustrating an example of application of a transmitter and a receiver in Embodiment 9;

FIG. 218 is a diagram illustrating an example of application of a transmitter in Embodiment 9;

FIG. 219 is a flowchart of an information communication method in Embodiment 9;

FIG. 220 is a block diagram of an information communication device in Embodiment 9;

FIG. 221A is a diagram illustrating an example of application of a transmitter and a receiver in Embodiment 9;

FIG. 221B is a flowchart illustrating an example of operation of a receiver in Embodiment 9;

FIG. 222 is a diagram illustrating an example of application of a transmitter and a receiver in Embodiment 9;

FIG. 223 is a diagram illustrating an example of application of a transmitter in Embodiment 9;

FIG. 224A is a diagram illustrating an example of application of a transmitter and a receiver in Embodiment 9;

FIG. 224B is a flowchart illustrating an example of operation of a receiver in Embodiment 9;

FIG. 225 is a diagram illustrating operation of a receiver in Embodiment 9;

FIG. 226 is a diagram illustrating an example of application of a transmitter in Embodiment 9;

FIG. 227 is a diagram illustrating an example of application of a receiver in Embodiment 9;

FIG. 228A is a flowchart illustrating an example of operation of a transmitter in Embodiment 9;

FIG. 228B is a flowchart illustrating an example of operation of a transmitter in Embodiment 9;

FIG. 229 is a flowchart illustrating an example of operation of a transmitter in Embodiment 9;

FIG. 230 is a flowchart illustrating an example of operation of an imaging device in Embodiment 9;

FIG. 231 is a flowchart illustrating an example of operation of an imaging device in Embodiment 9;

FIG. 232 is a diagram illustrating an example of a signal transmitted by a transmitter in Embodiment 9;

FIG. 233 is a diagram illustrating an example of a signal transmitted by a transmitter in Embodiment 9;

FIG. 234 is a diagram illustrating an example of a signal transmitted by a transmitter in Embodiment 9;

FIG. 235 is a diagram illustrating an example of a signal transmitted by a transmitter in Embodiment 9;

FIG. 236 is a diagram illustrating an example of a structure of a system including a transmitter and a receiver in Embodiment 9;

FIG. 237 is a diagram illustrating an example of a structure of a system including a transmitter and a receiver in Embodiment 9;

FIG. 238 is a diagram illustrating an example of a structure of a system including a transmitter and a receiver in Embodiment 9;

FIG. 239 is a diagram illustrating an example of operation of a transmitter in Embodiment 9;

FIG. 240 is a diagram illustrating an example of operation of a transmitter in Embodiment 9;

FIG. 241 is a diagram illustrating an example of operation of a transmitter in Embodiment 9;

FIG. 242 is a diagram illustrating an example of operation of a transmitter in Embodiment 9;

FIG. 243 is a diagram illustrating a watch including light sensors in Embodiment 10;

FIG. 244 is a diagram illustrating an example of a receiver in Embodiment 10;

FIG. 245 is a diagram illustrating an example of a receiver in Embodiment 10;

FIG. 246A is a flowchart of an information communication method according to an aspect of the present disclosure;

FIG. 246B is a block diagram of a mobile terminal according to an aspect of the present disclosure;

FIG. 247 is a diagram illustrating an example of a reception system in Embodiment 10;

FIG. 248 is a diagram illustrating an example of a reception system in Embodiment 10;

FIG. 249A is a diagram illustrating an example of a modulation scheme in Embodiment 10;

FIG. 249B is a diagram illustrating an example of a modulation scheme in Embodiment 10;

FIG. 249C is a diagram illustrating an example of a modulation scheme in Embodiment 10;

FIG. 249D is a diagram illustrating an example of separation of a mixed signal in Embodiment 10;

FIG. 249E is a diagram illustrating an example of separation of a mixed signal in Embodiment 10;

FIG. 249F is a flowchart illustrating processing of an image processing program in Embodiment 10;

FIG. 249G is a block diagram of an information processing apparatus in Embodiment 10;

FIG. 250A is a diagram illustrating an example of a visible light communication system in Embodiment 10;

FIG. 250B is a diagram for describing a use case in Embodiment 10;

FIG. 250C is a diagram illustrating an example of a signal transmission and reception system in Embodiment 10;

FIG. 251 is a flowchart illustrating a reception method in which interference is eliminated in Embodiment 10;

FIG. 252 is a flowchart illustrating a transmitter direction estimation method in Embodiment 10;

FIG. 253 is a flowchart illustrating a reception start method in Embodiment 10;

FIG. 254 is a flowchart illustrating a method of generating an ID additionally using information of another medium in Embodiment 10;

FIG. 255 is a flowchart illustrating a reception scheme selection method by frequency separation in Embodiment 10.

Figure 256:
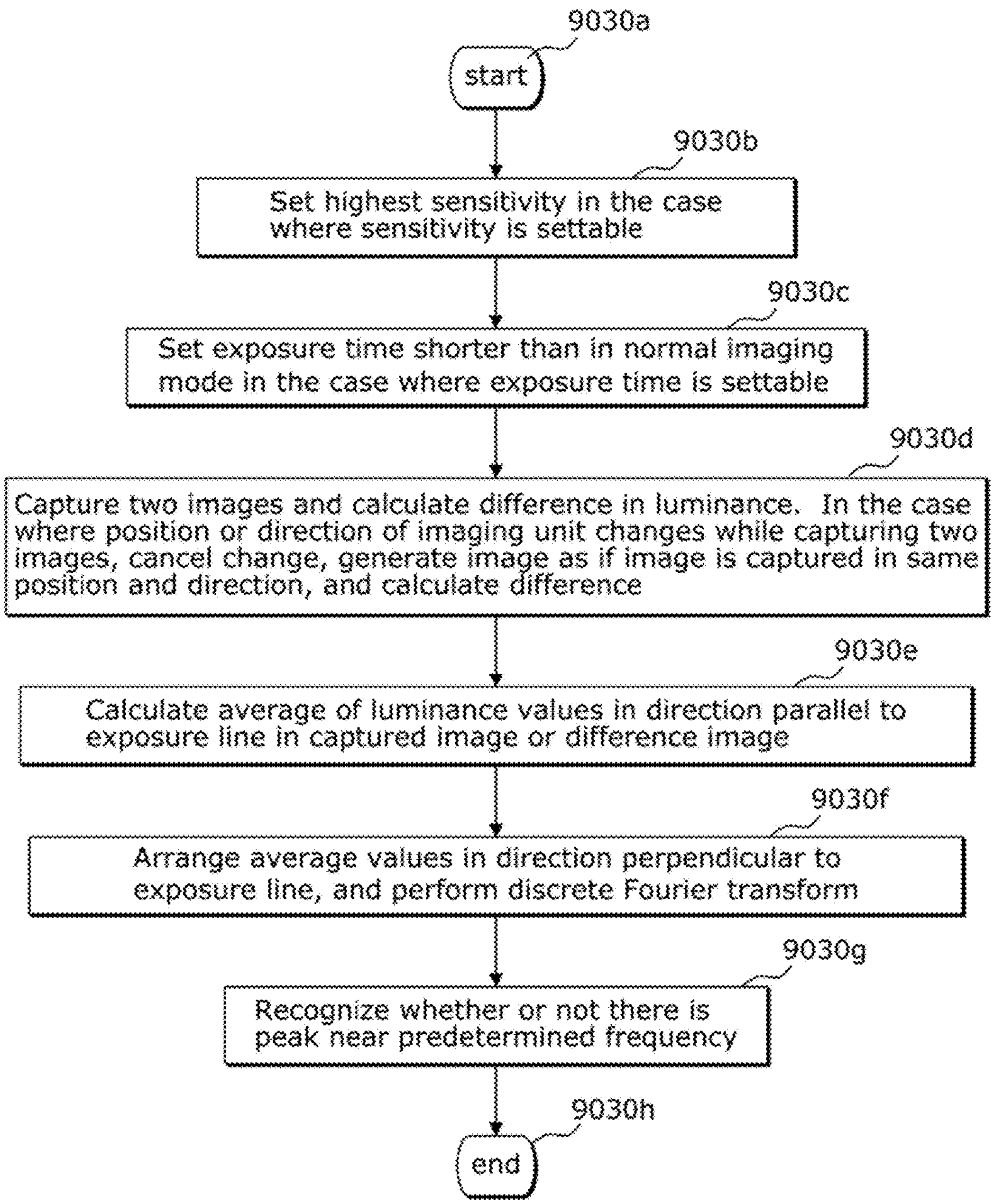
Figure 257:
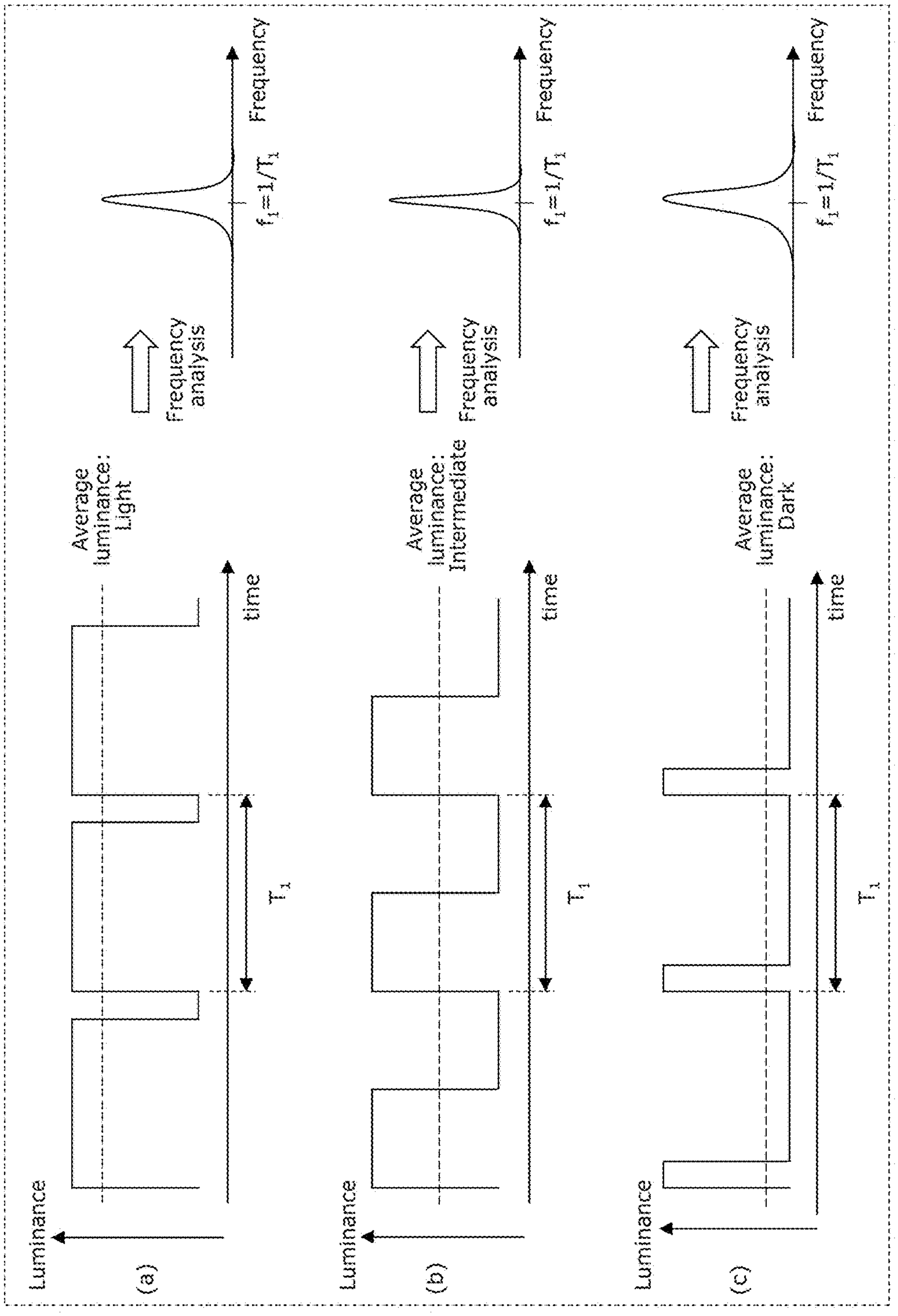
Figure 258:
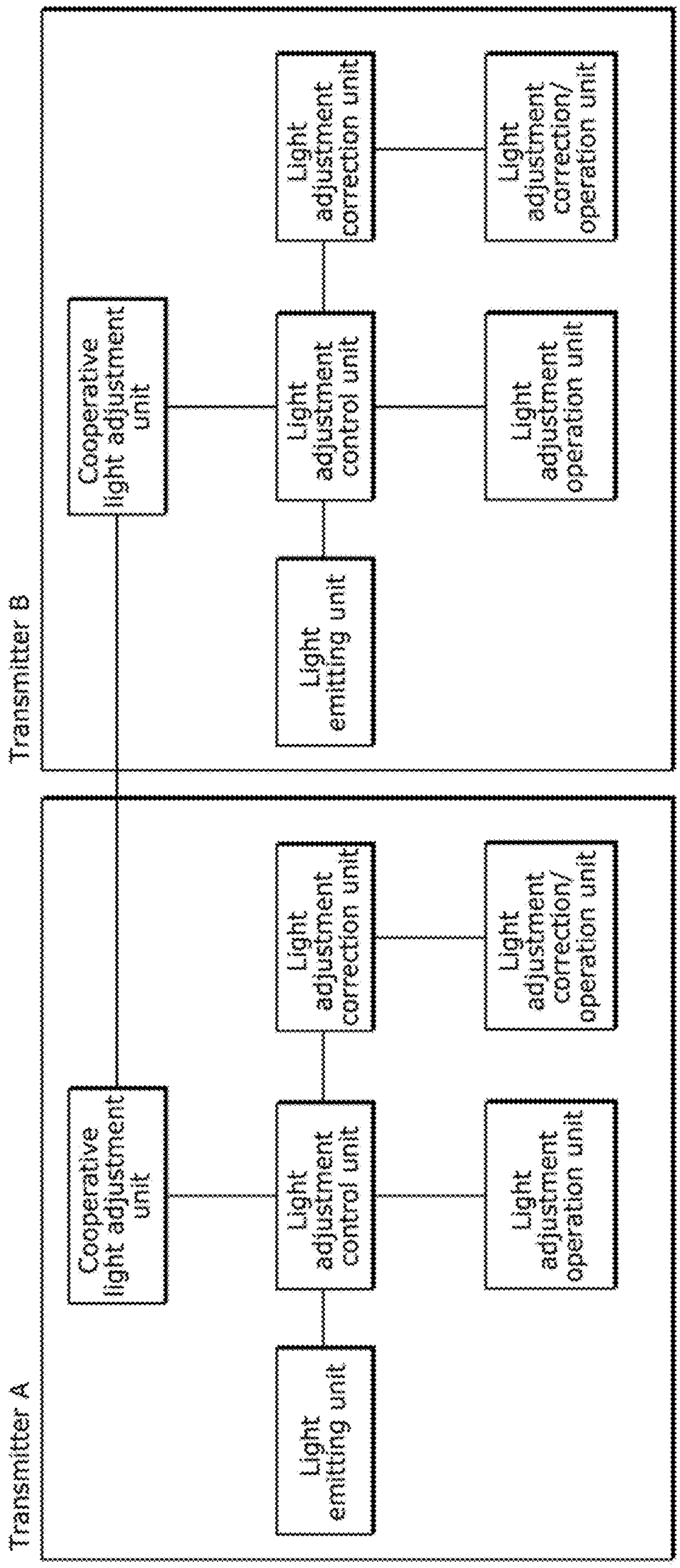
Figure 259A:
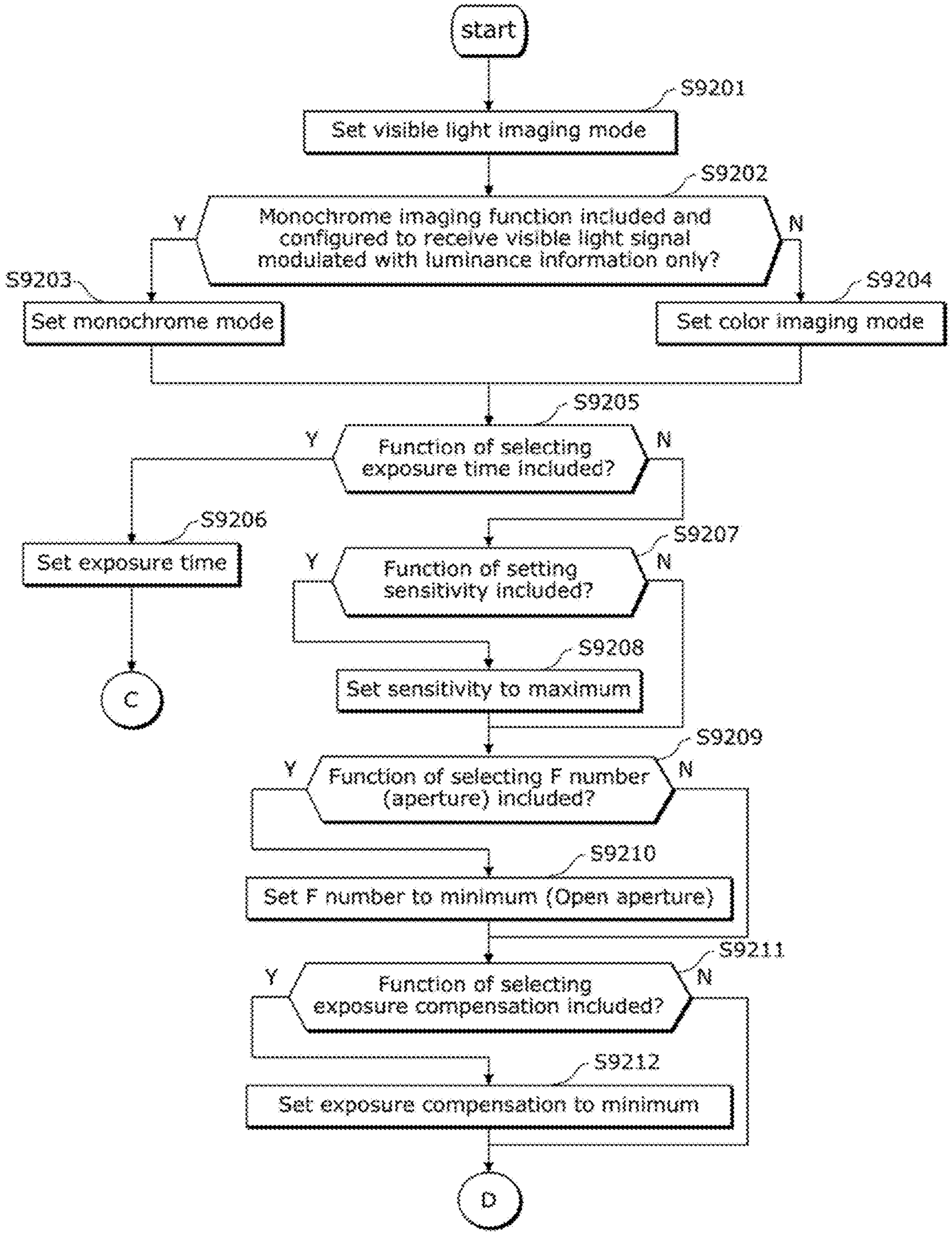
Figure 259B:
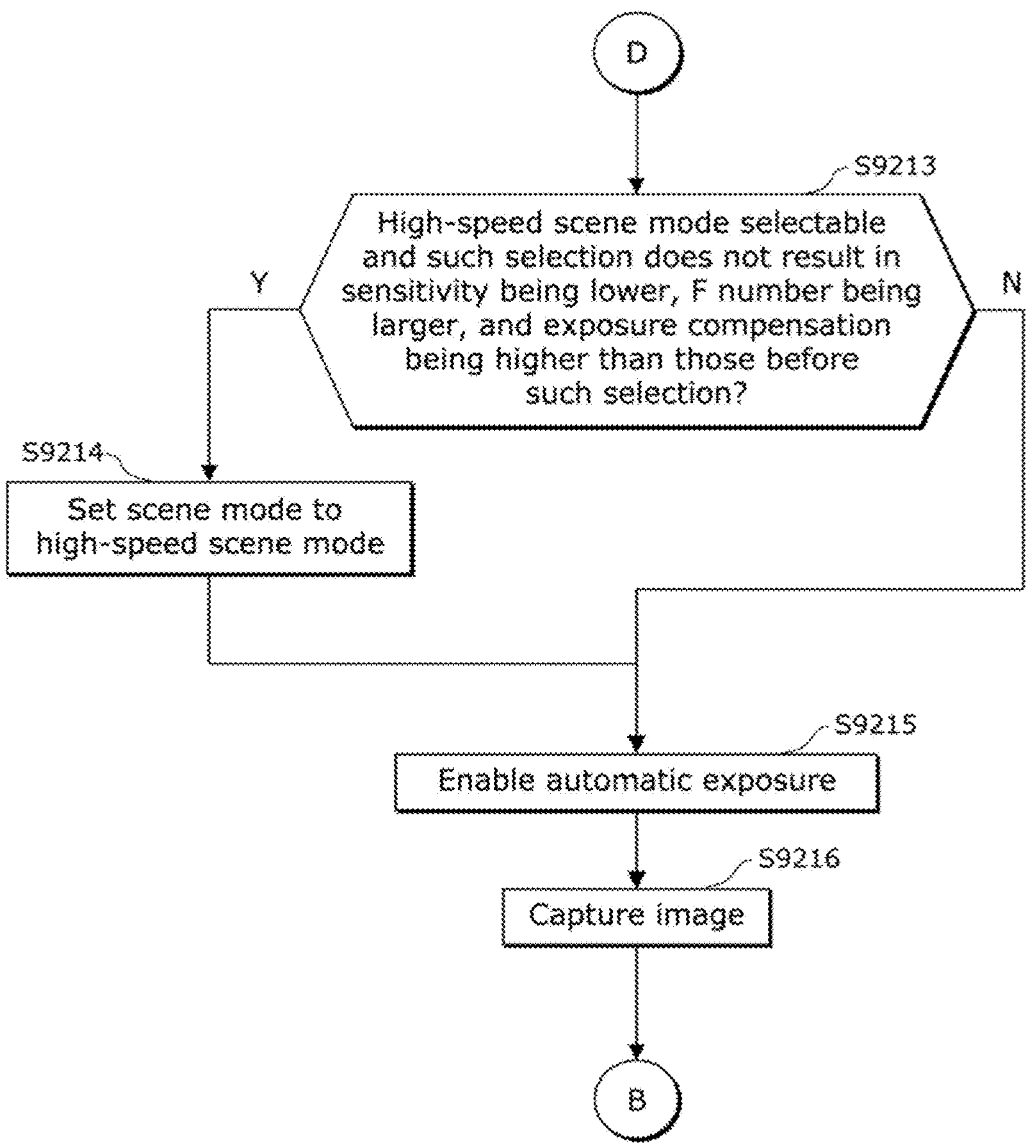
Figure 259C:
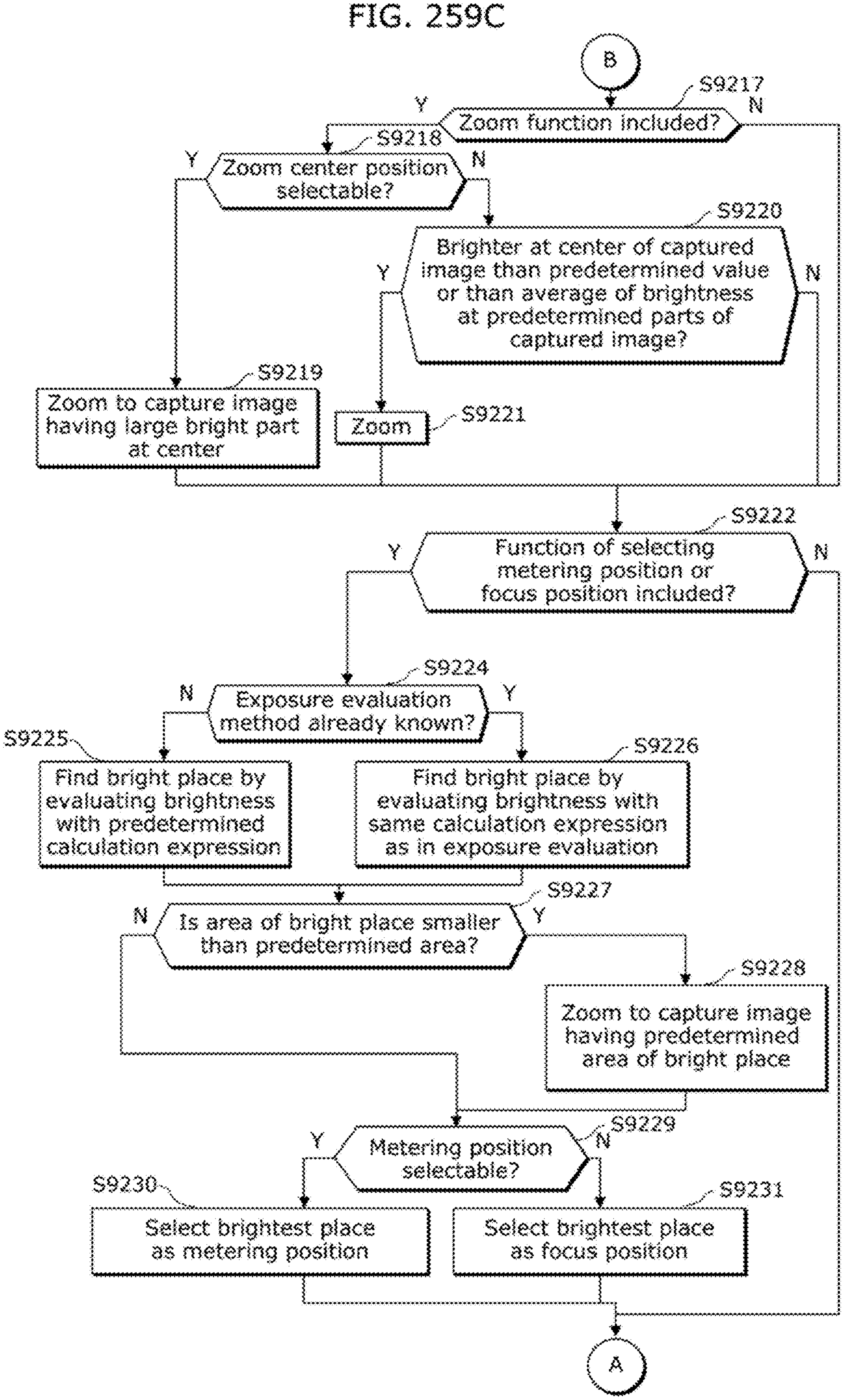
Figure 259D:
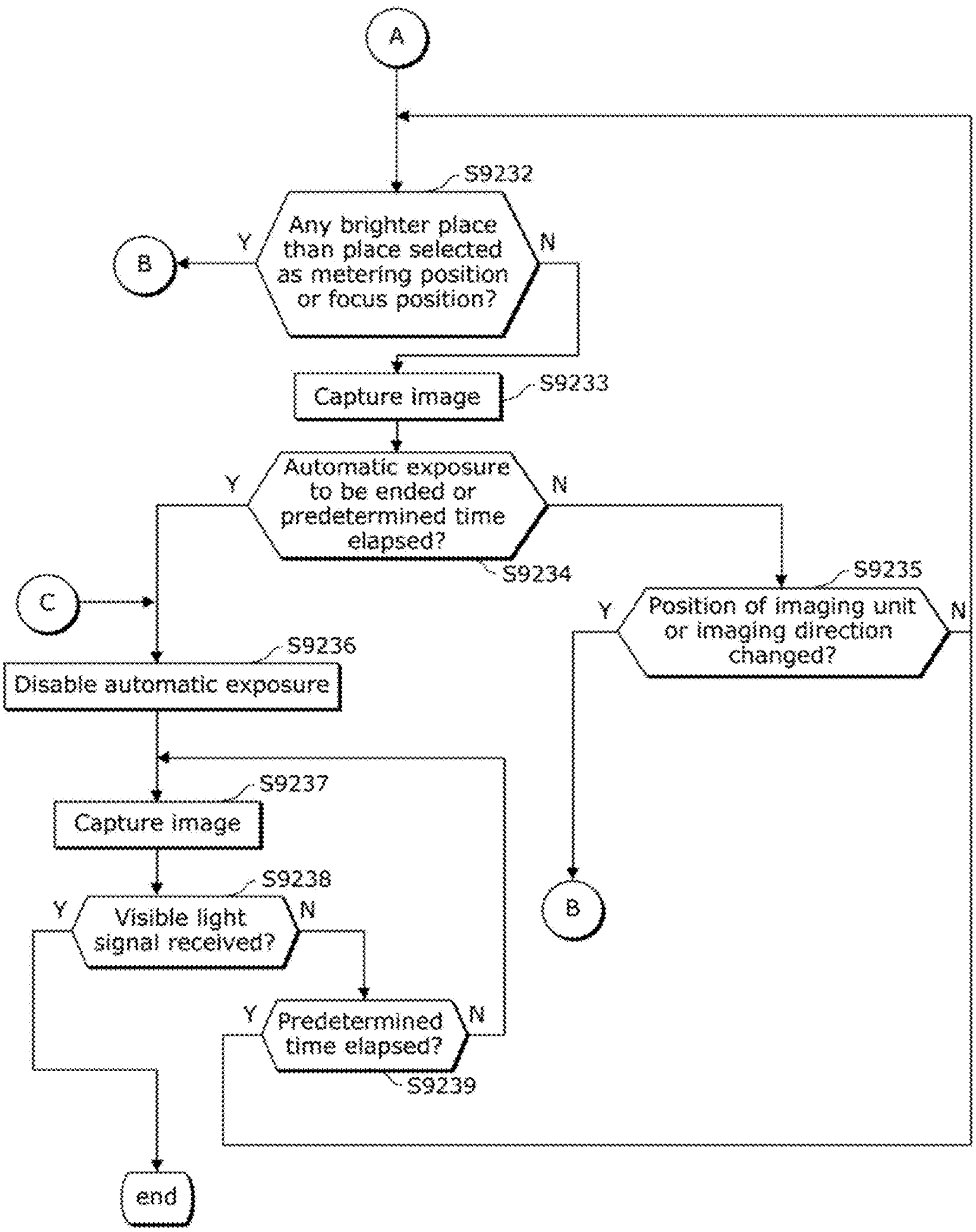
Figure 260:
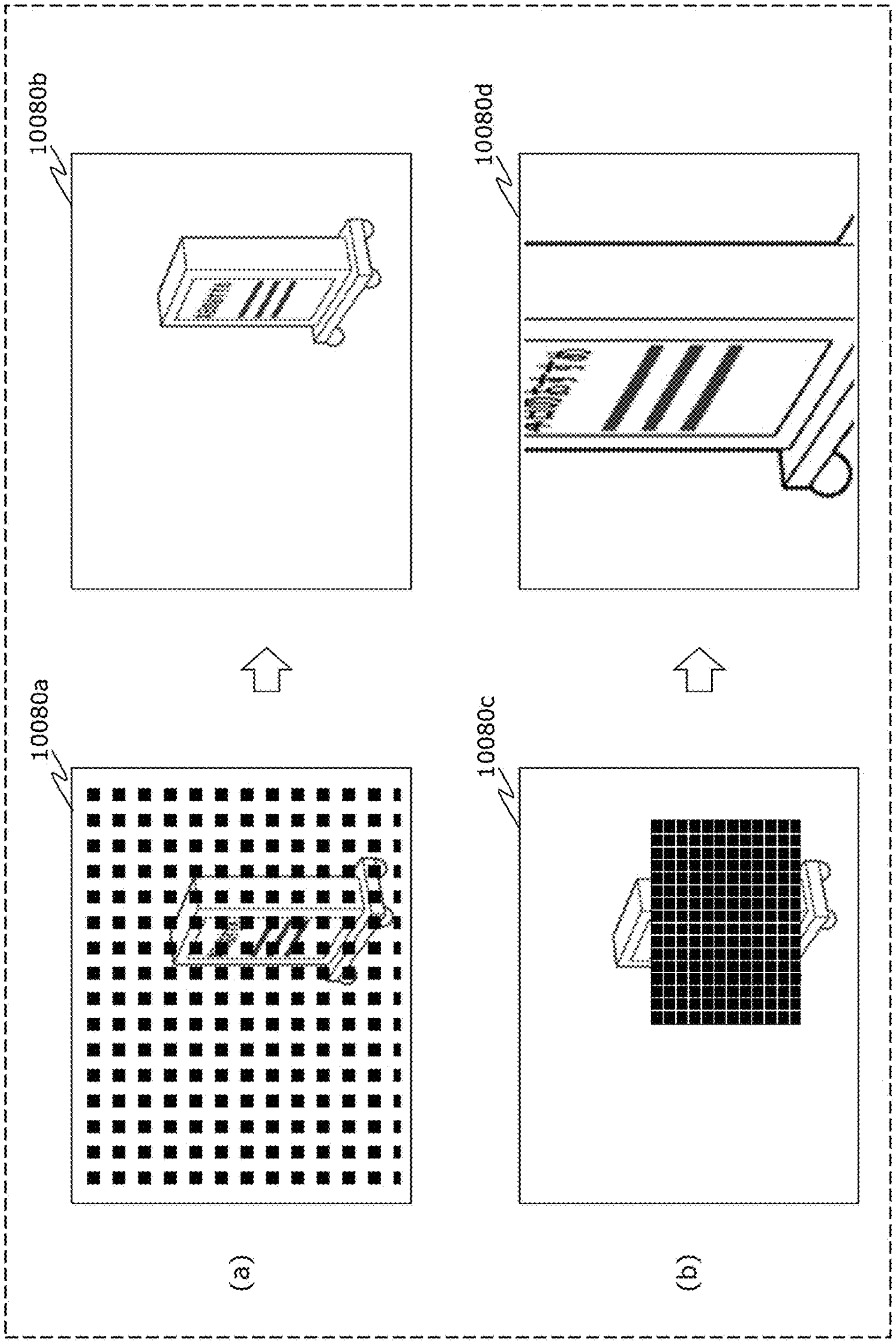
Figure 261A:
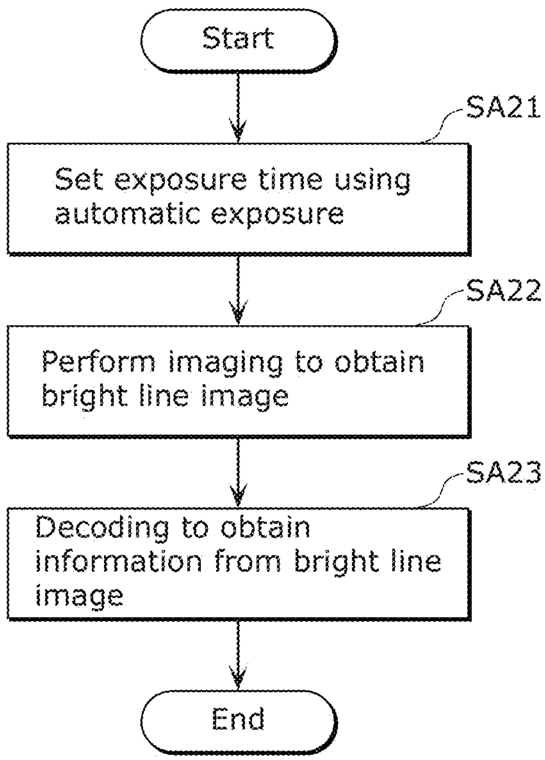
Figure 261B:
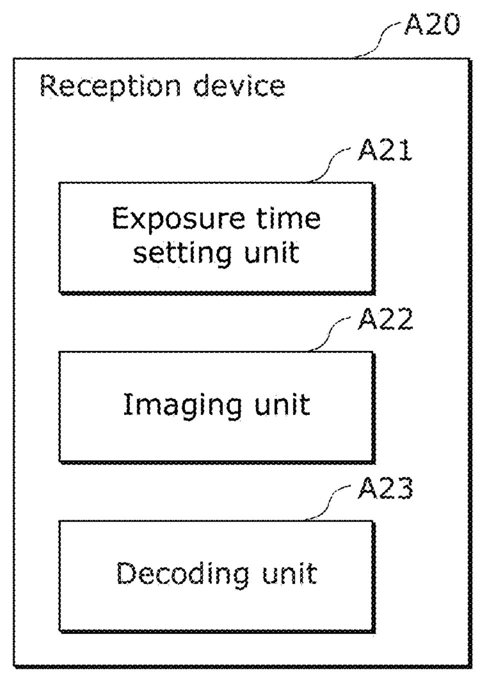
Figure 262:
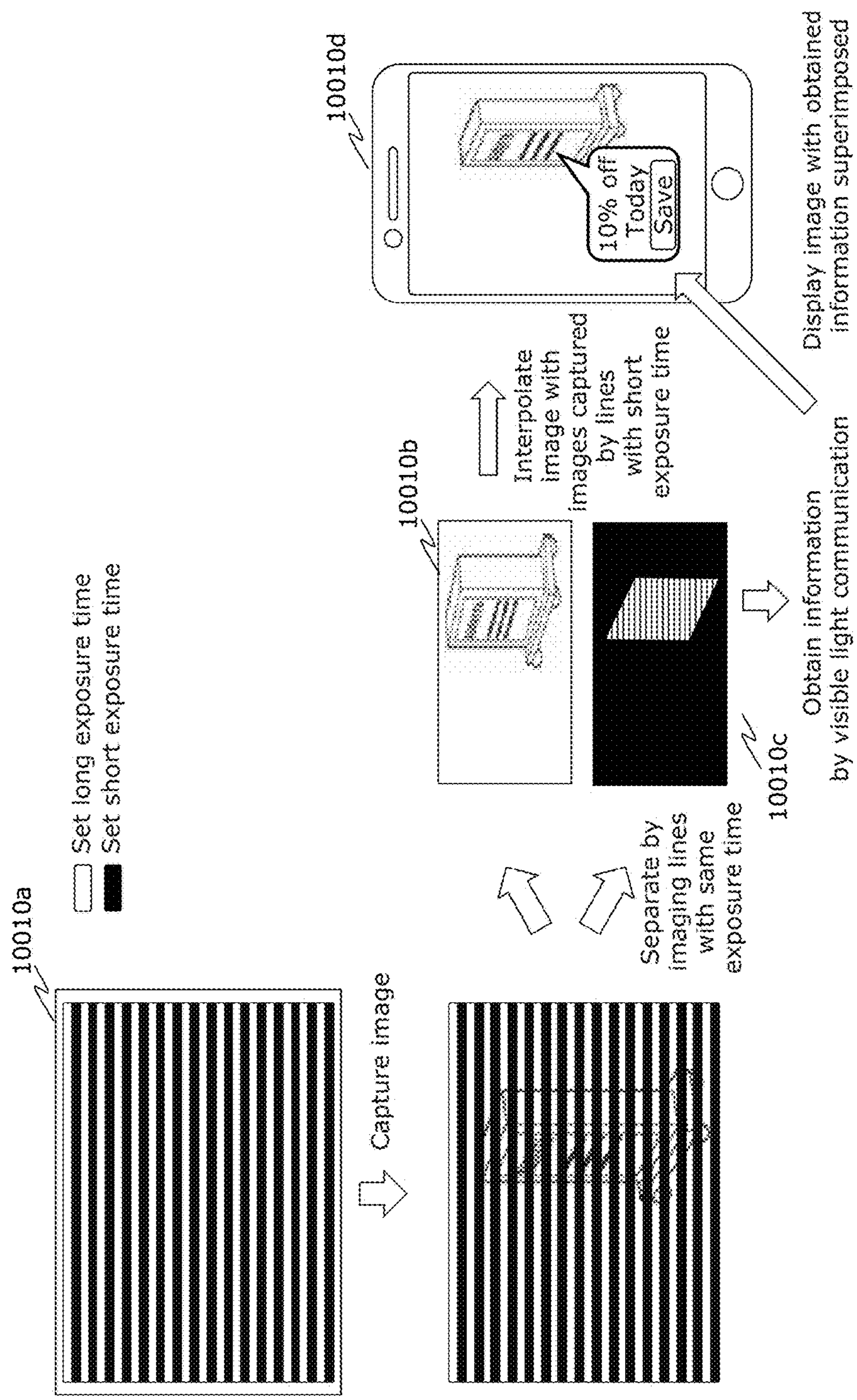
Figure 263:
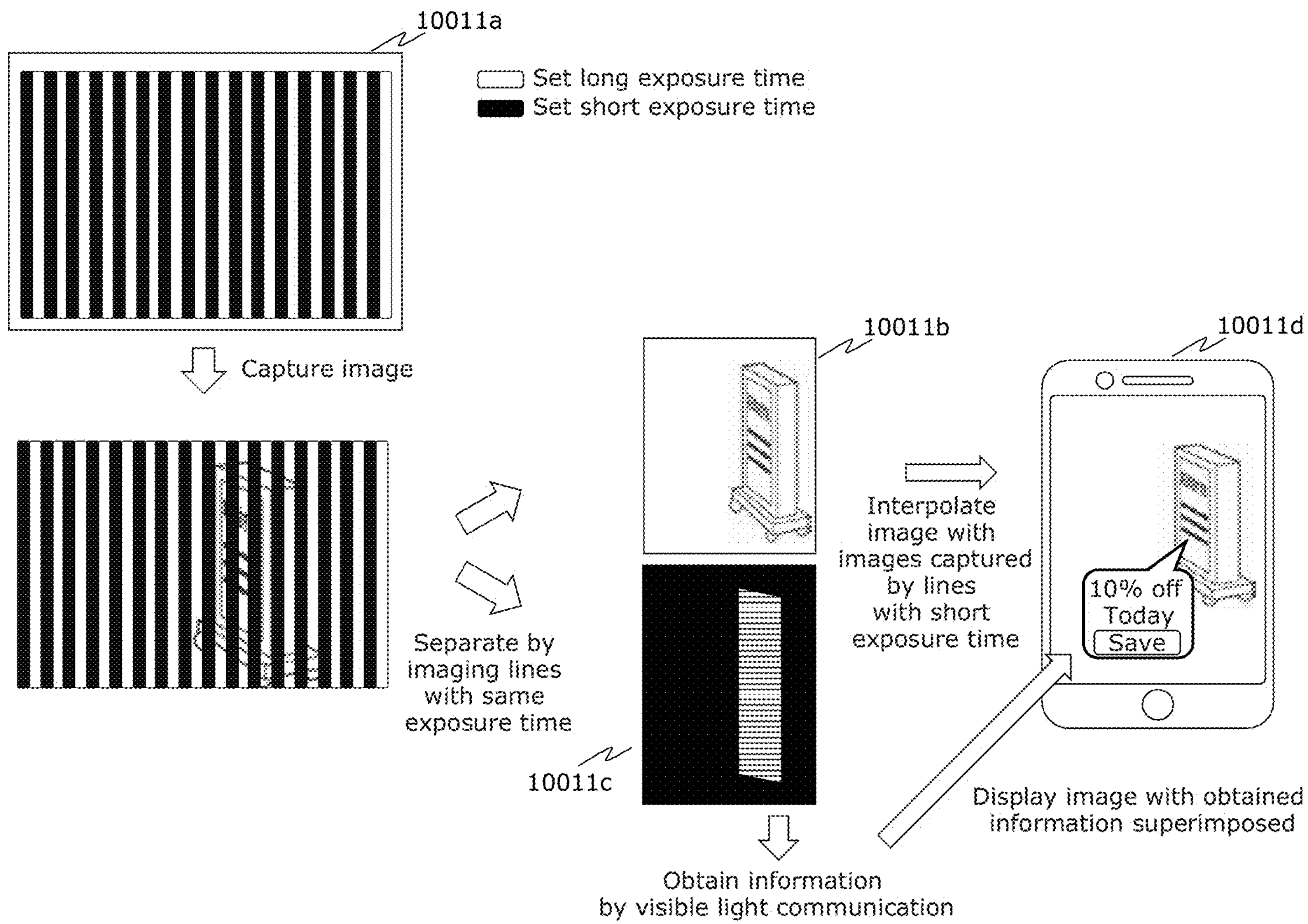
Figure 264:
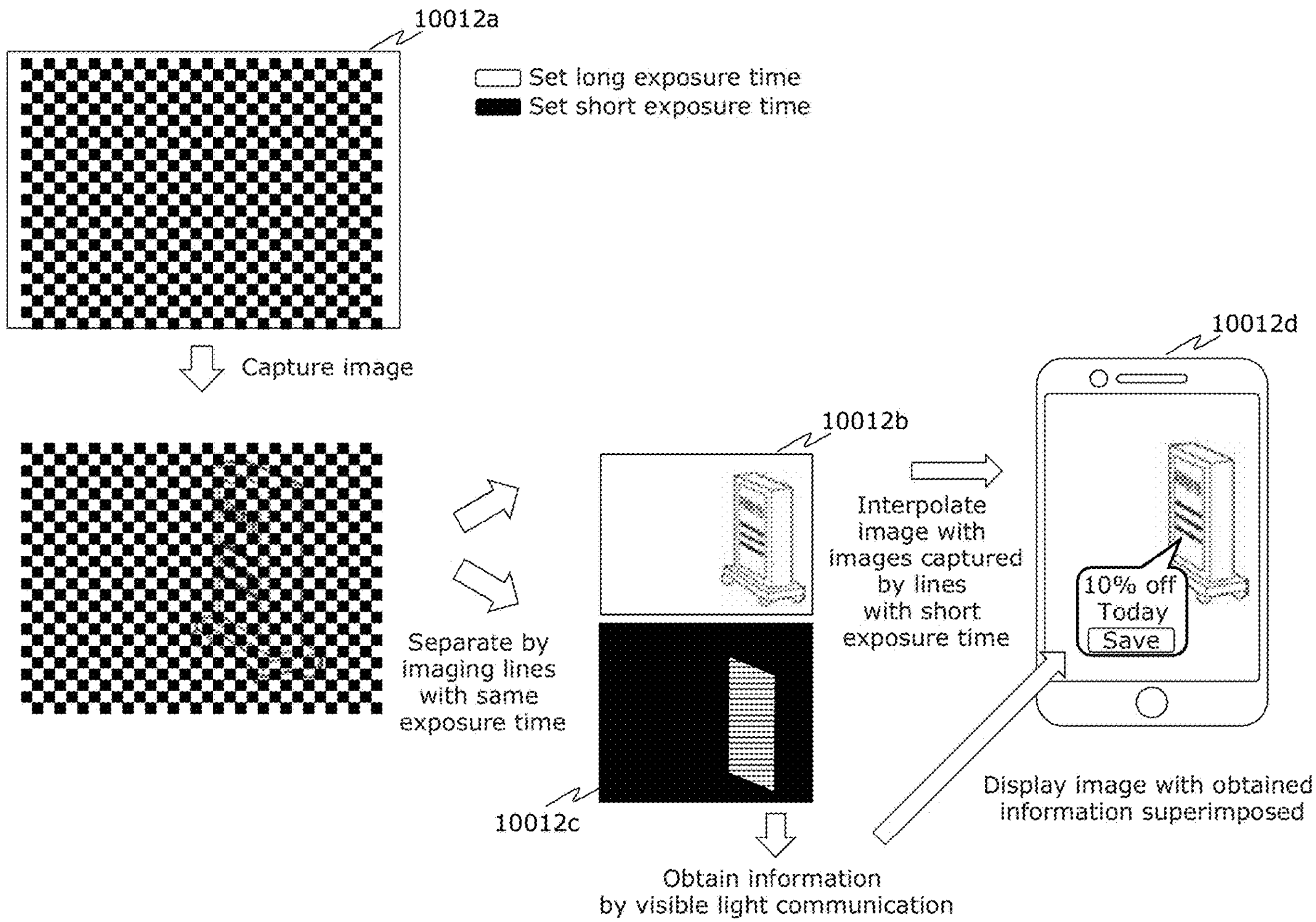
Figure 265:
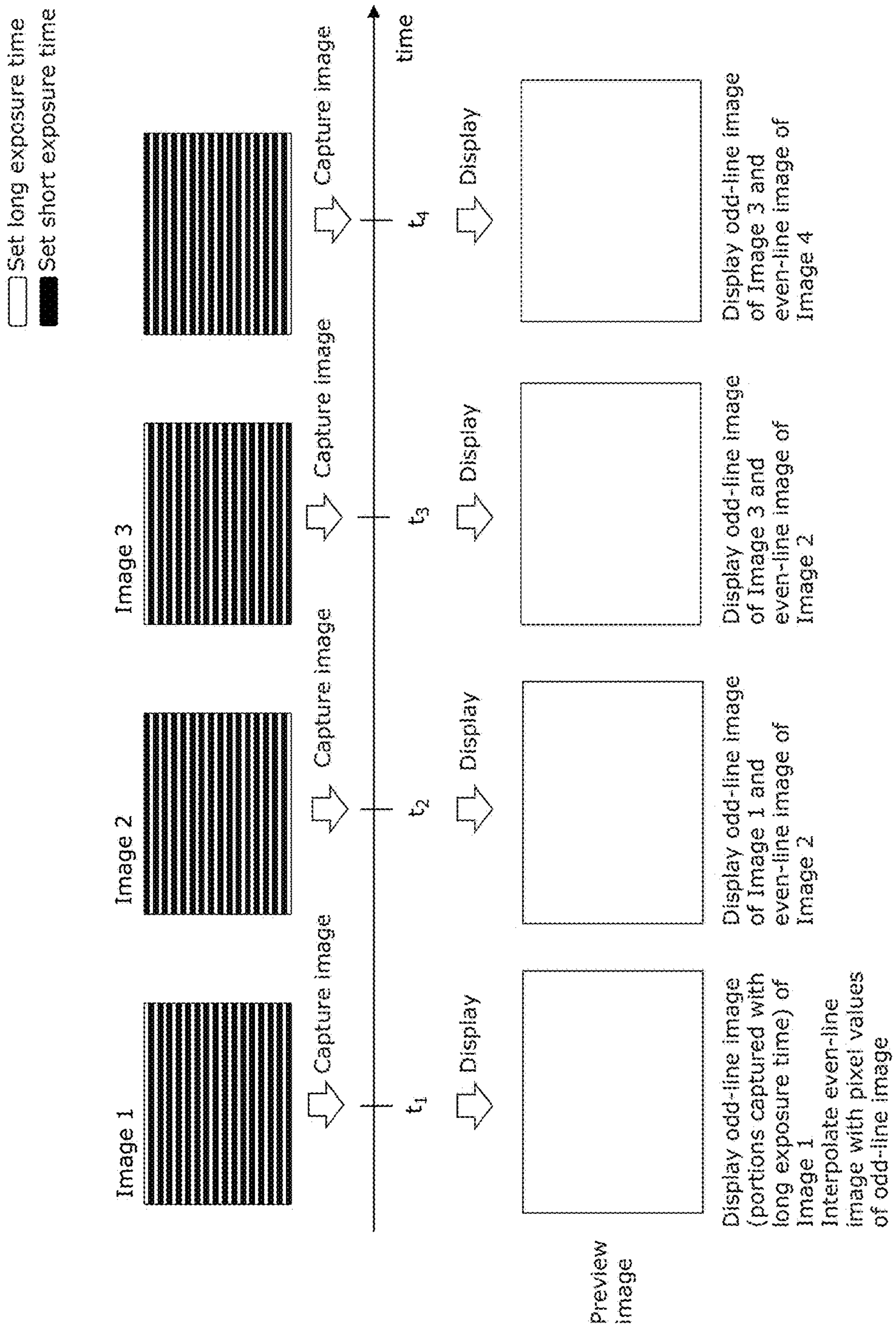
Figure 266:
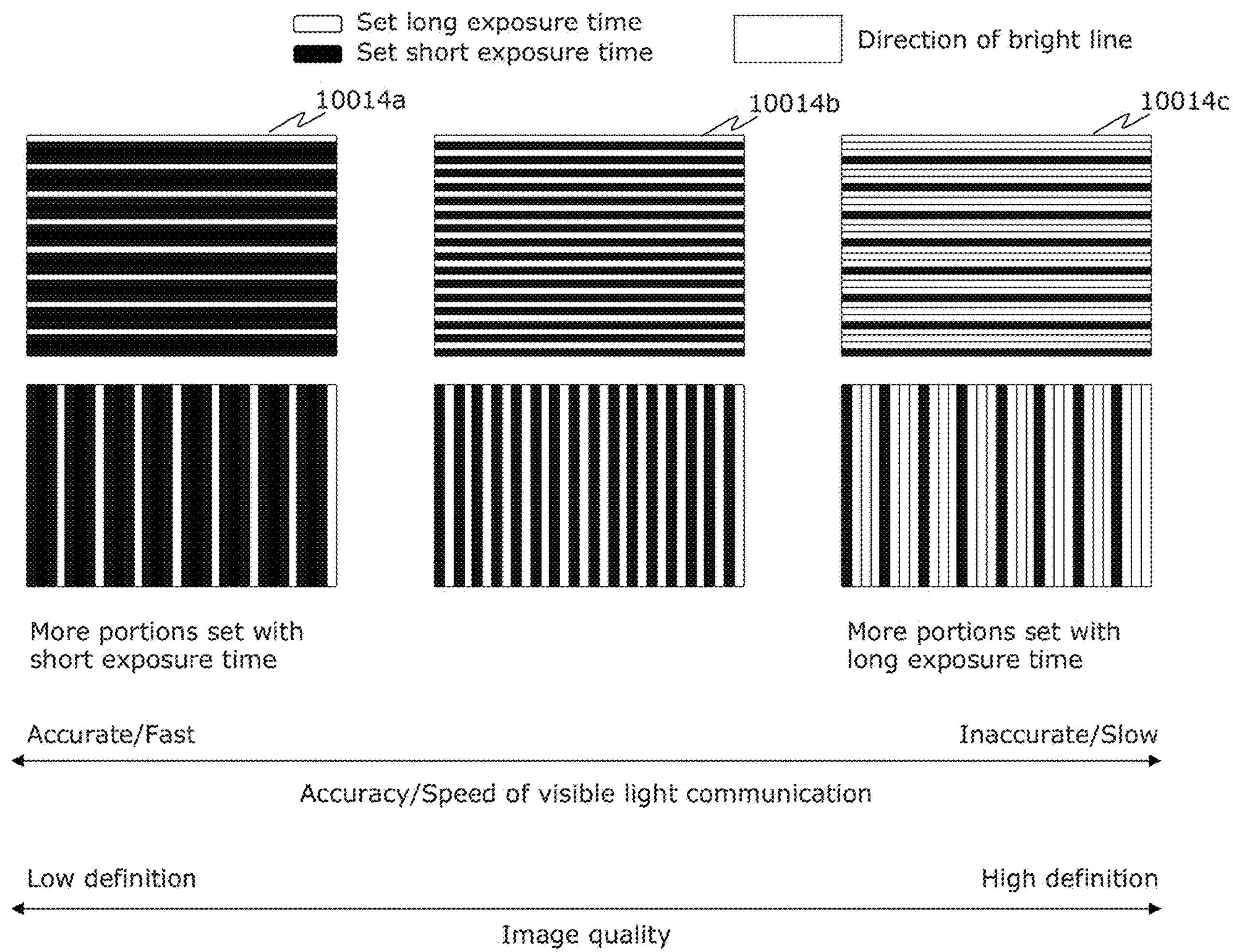
Figure 267:
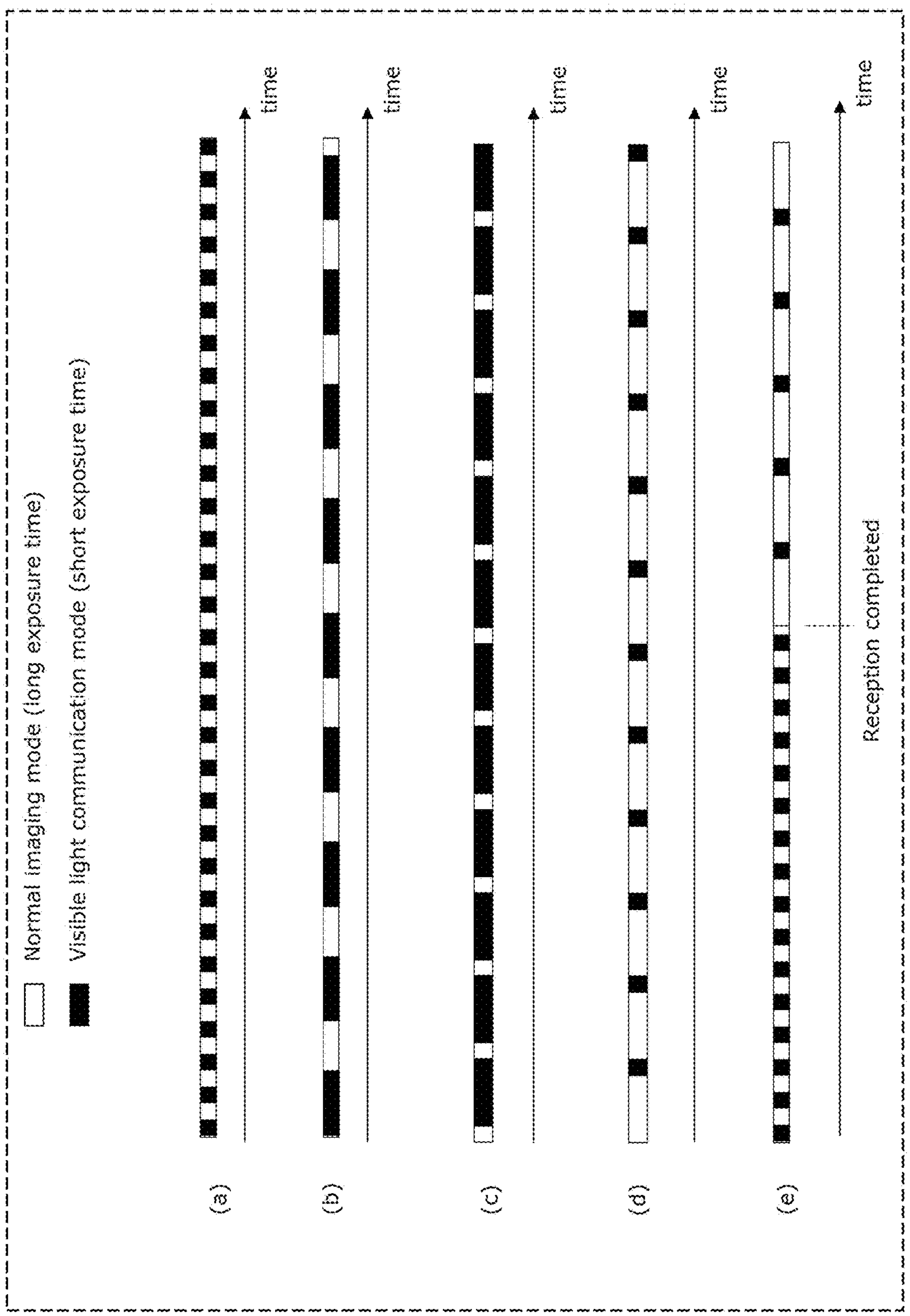
Figure 268:
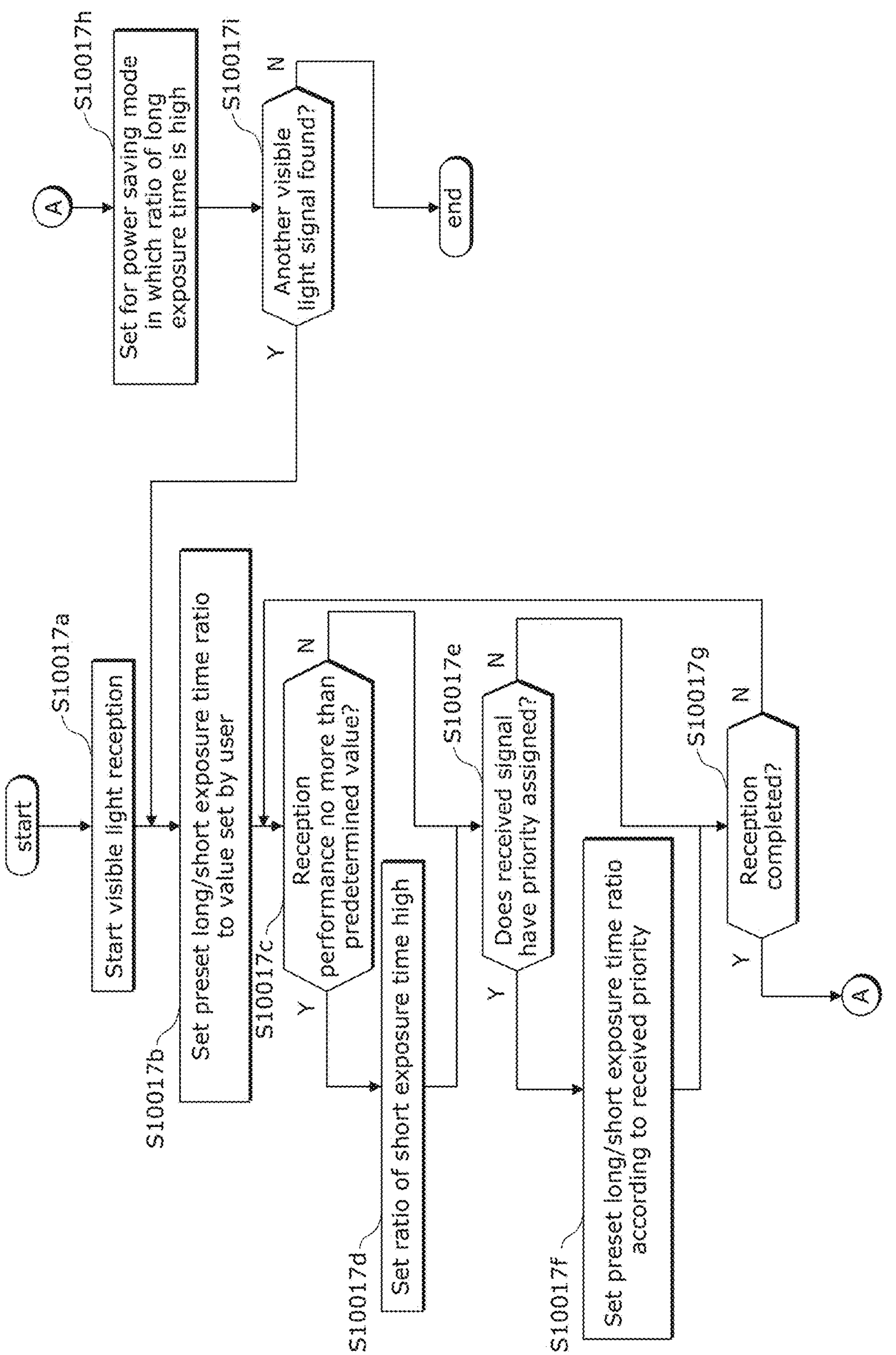
Figure 269:
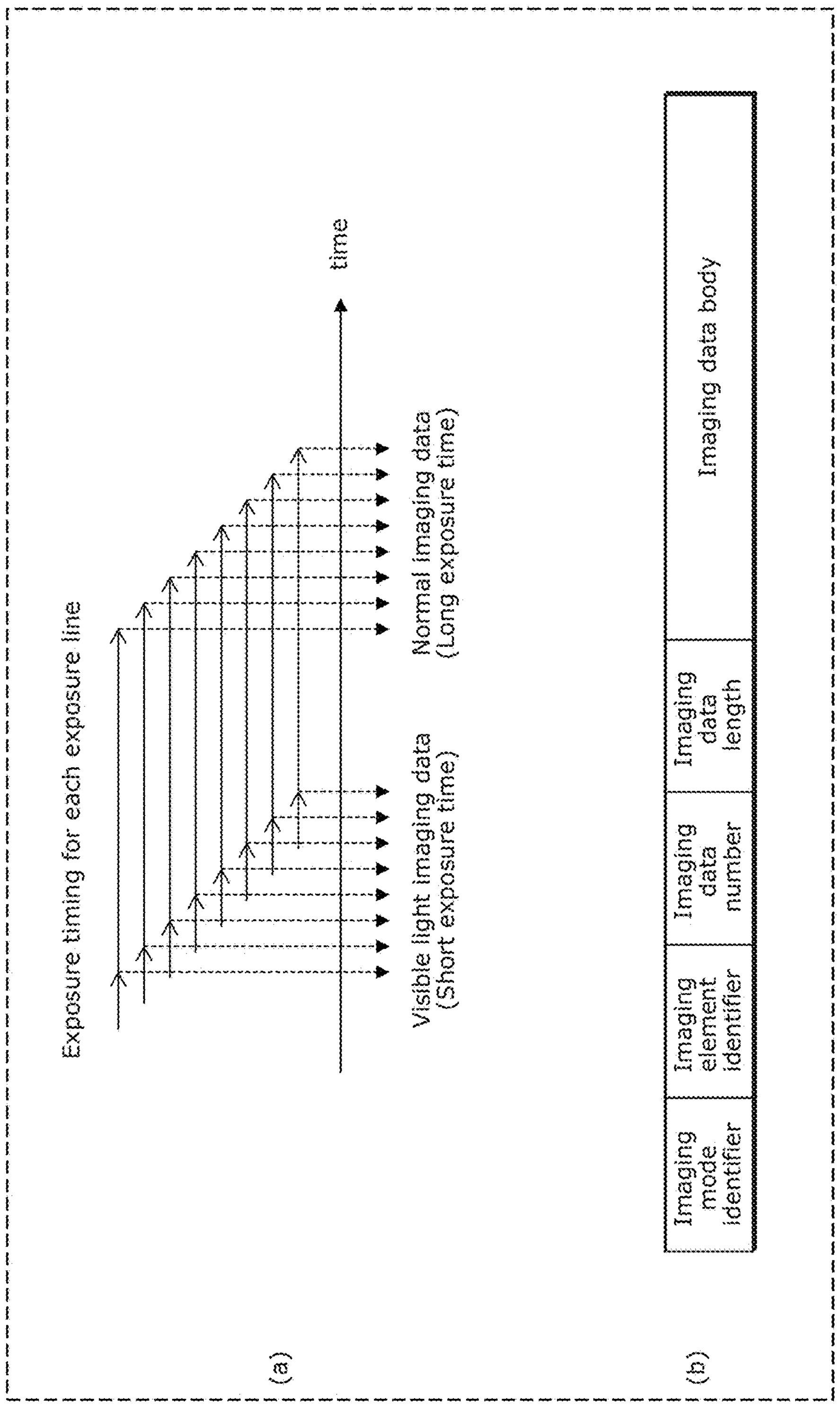
Figure 270A:
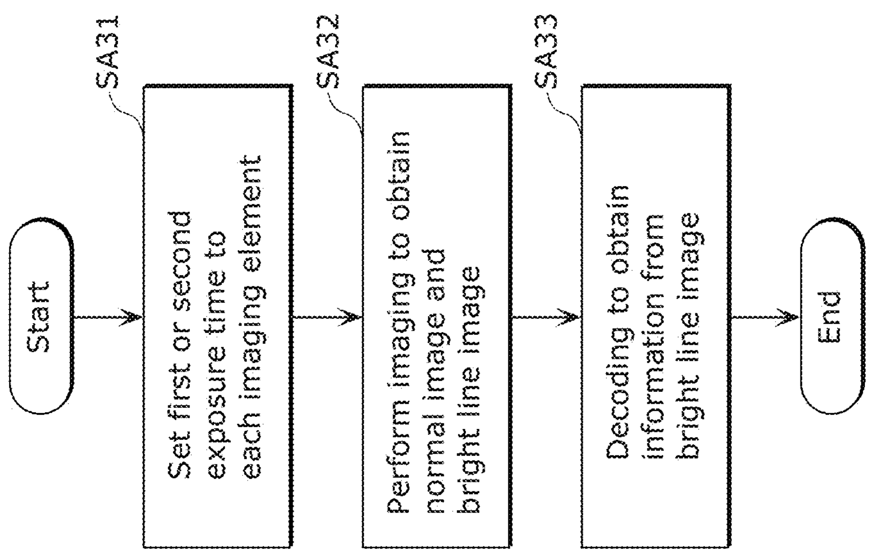
Figure 270B:
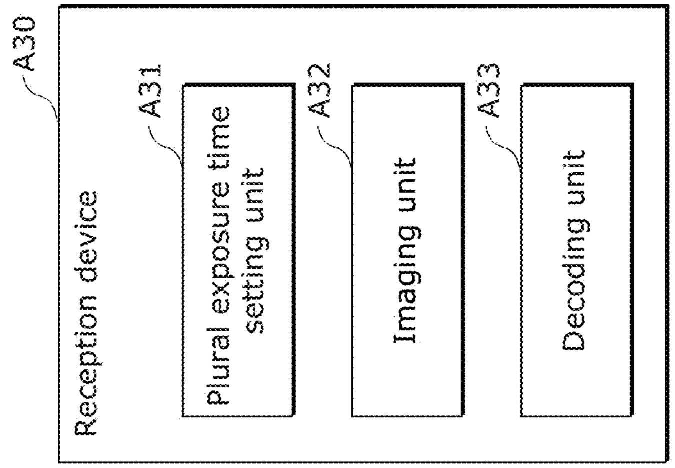
Figure 271:
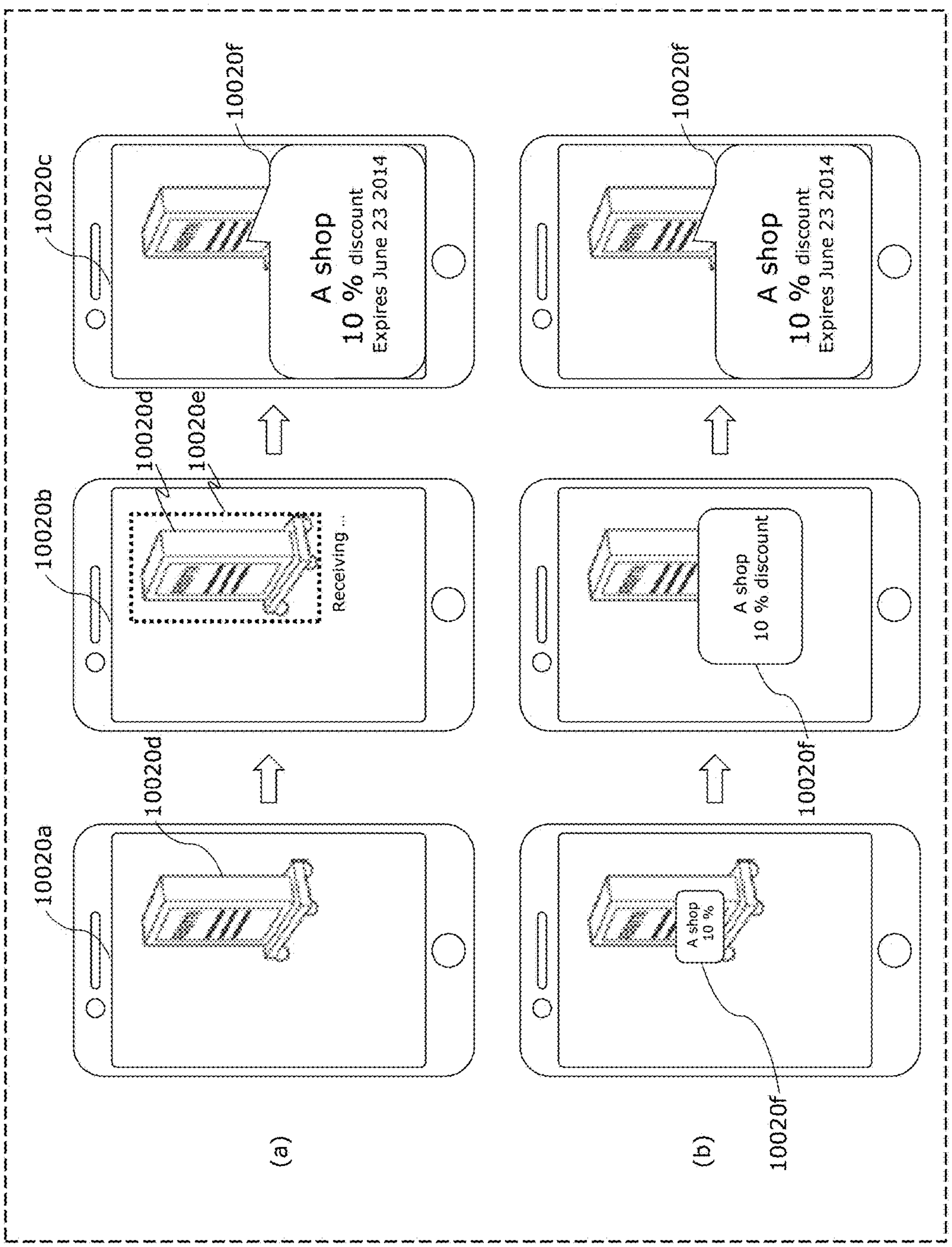
Figure 272:
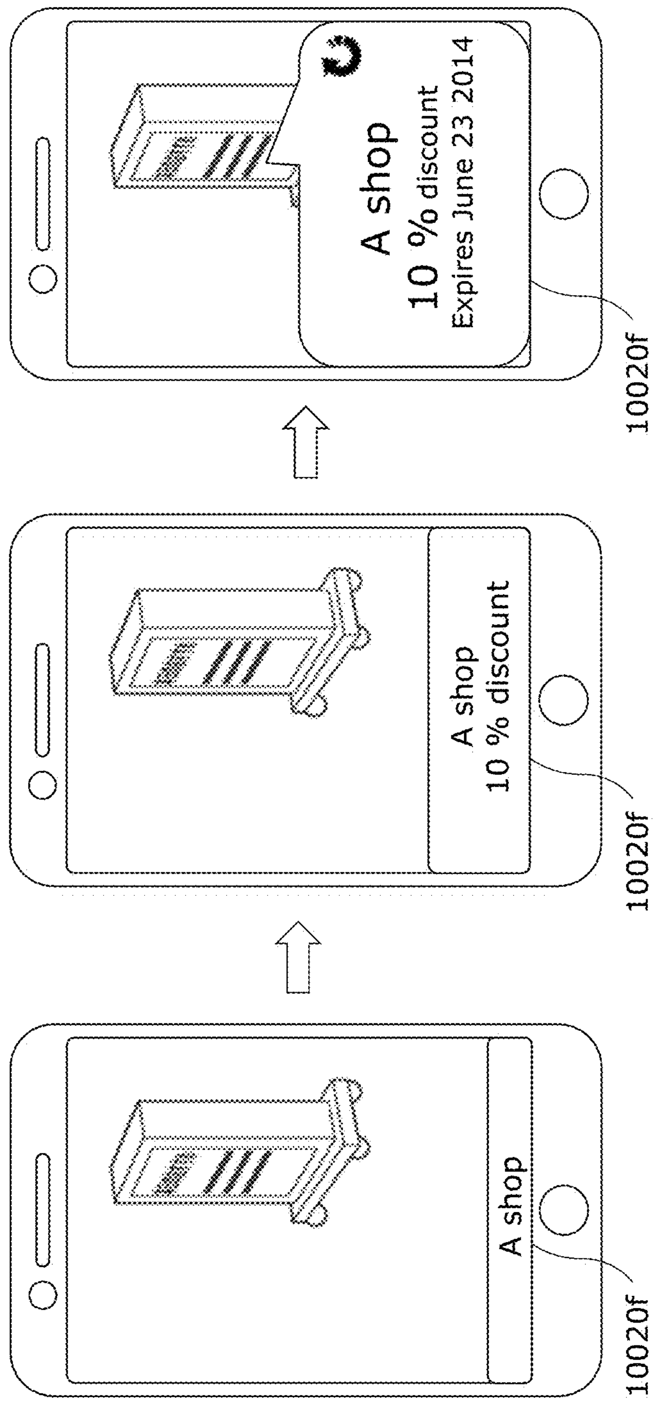
Figure 273:
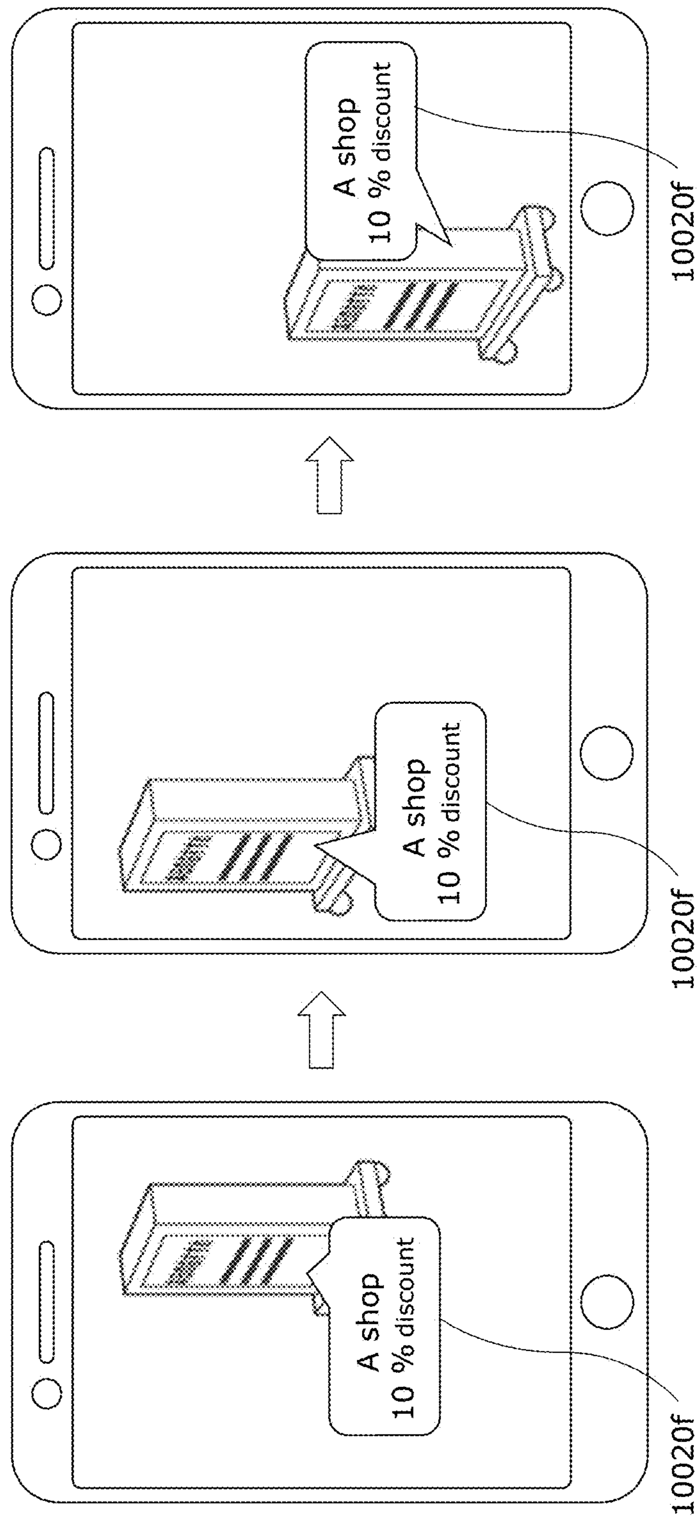
Figure 274:
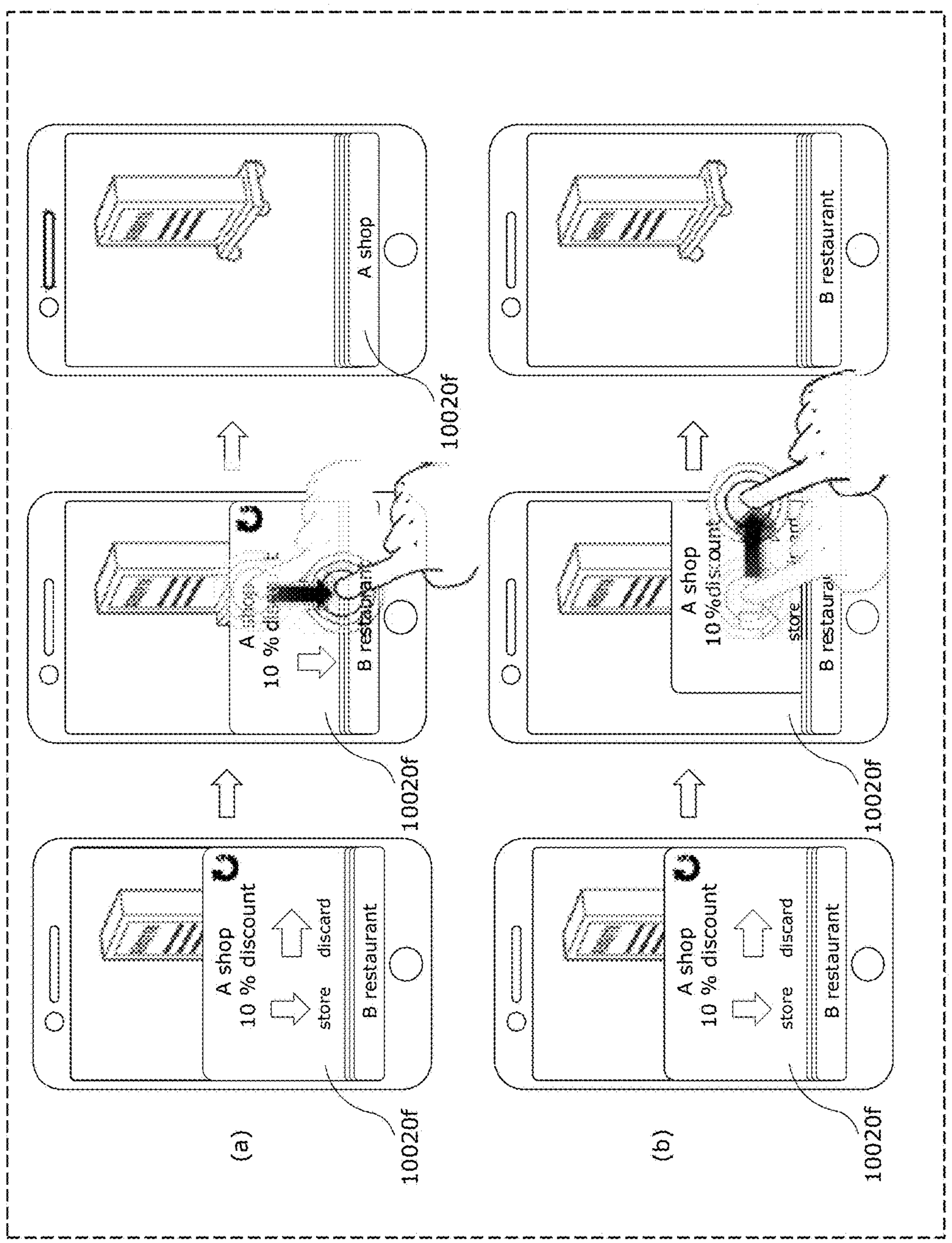
Figure 275:
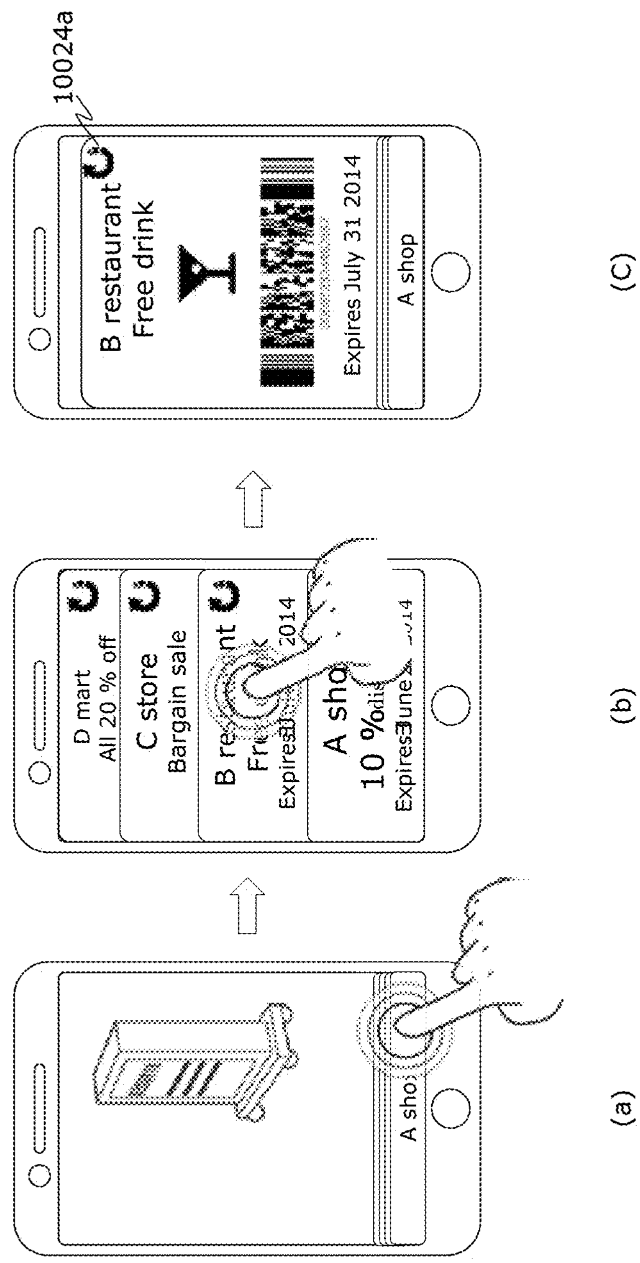
Figure 276:
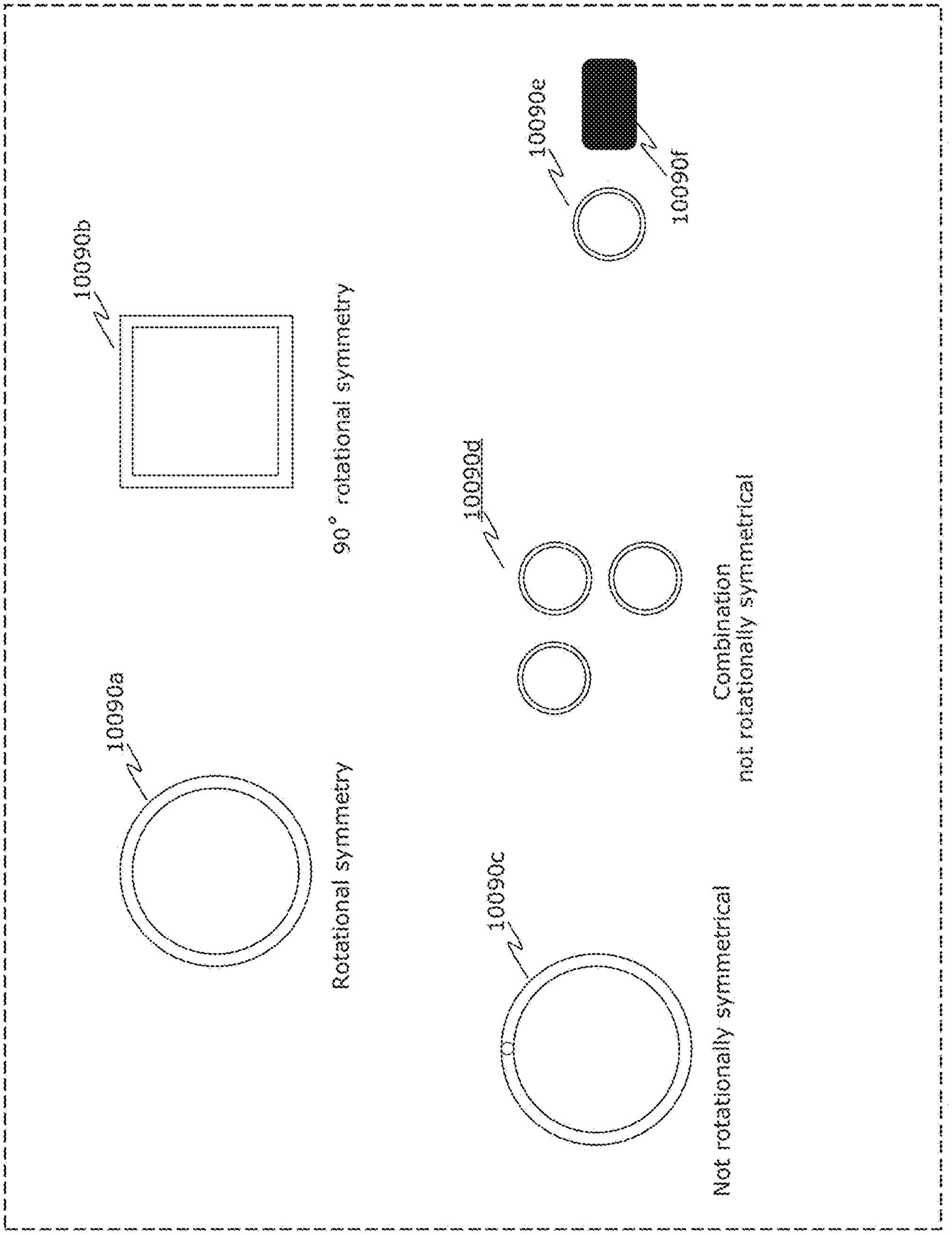
Figure 277:
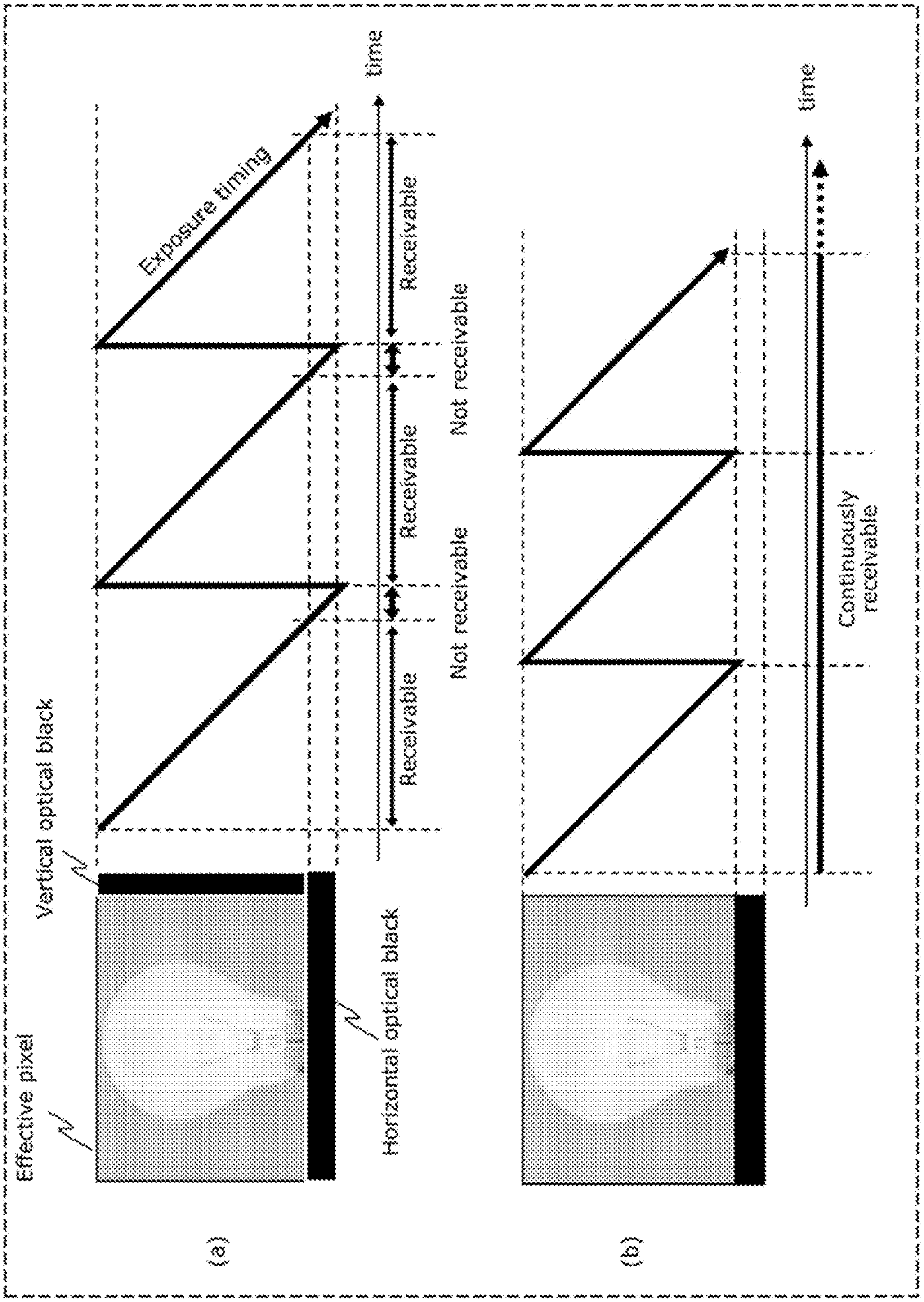
Figure 279:
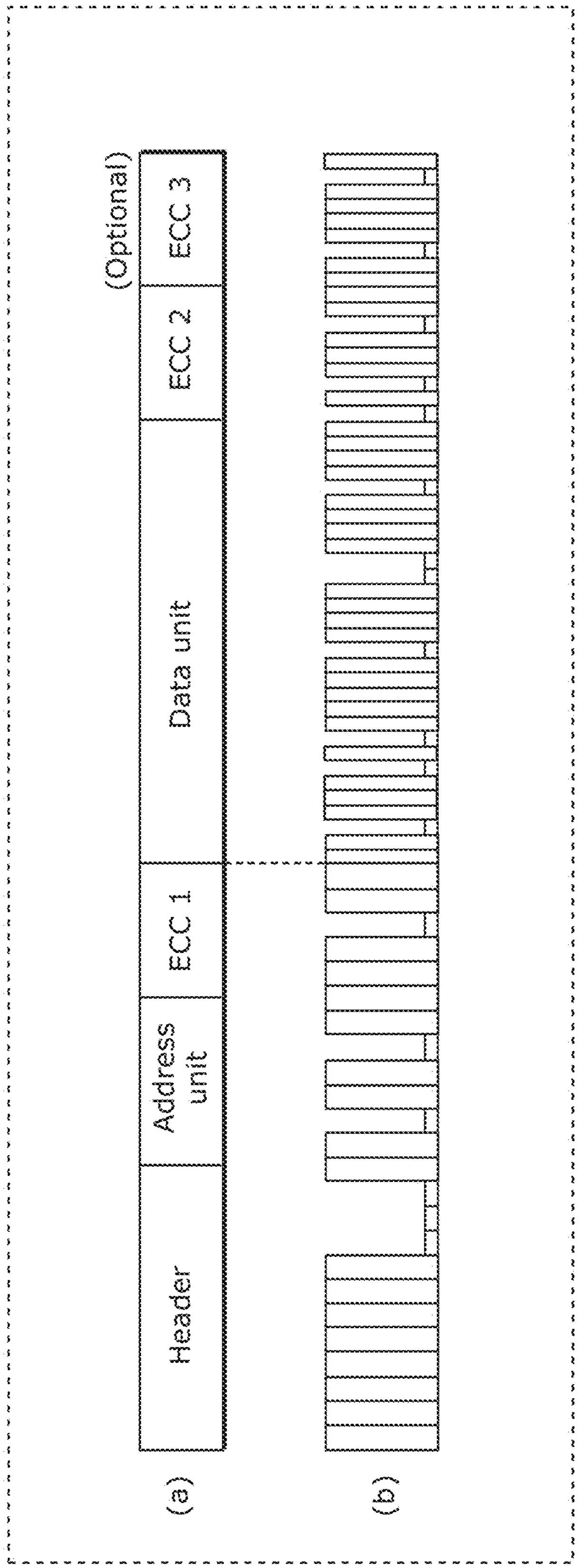
Figure 280:
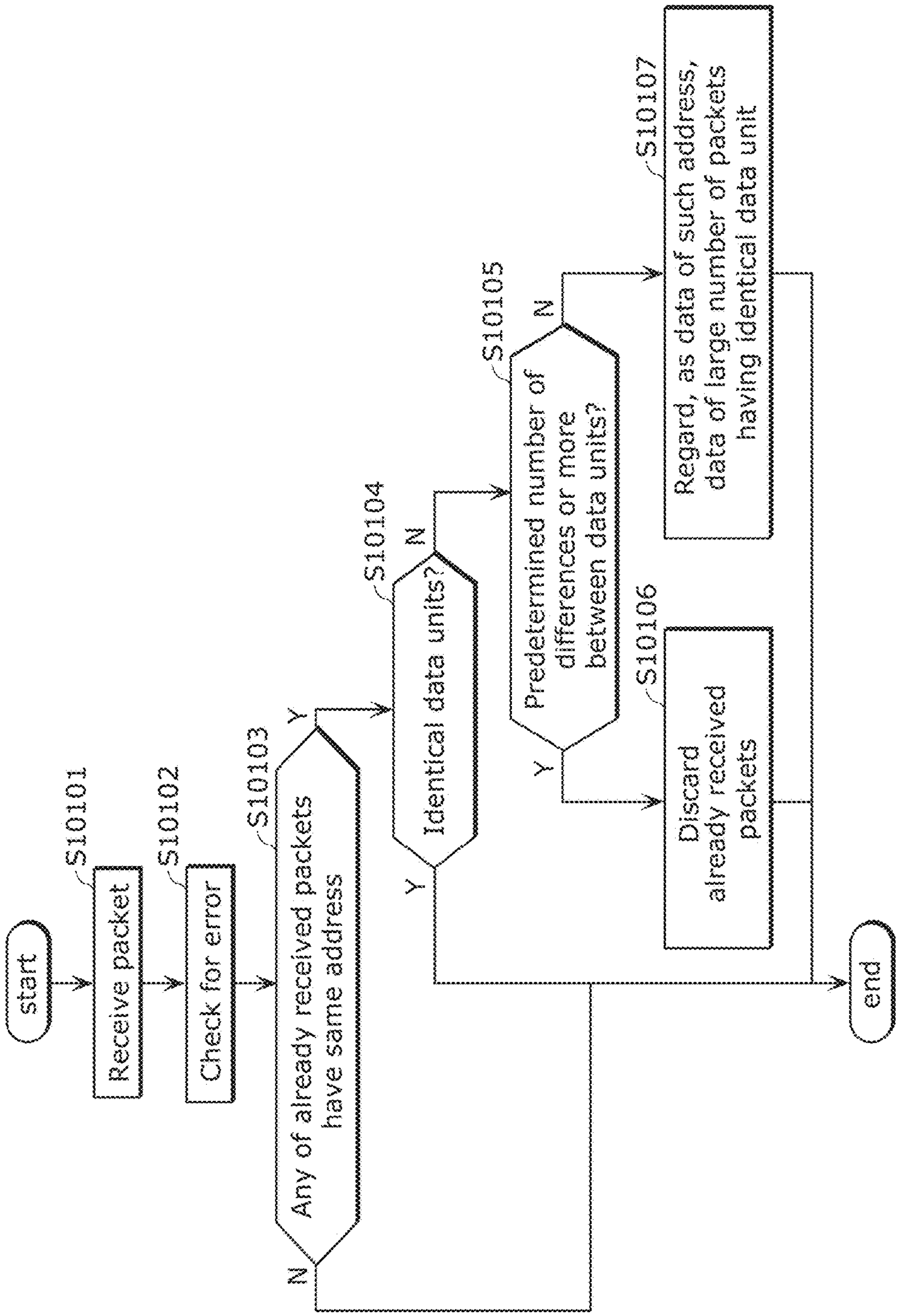
Figure 281:
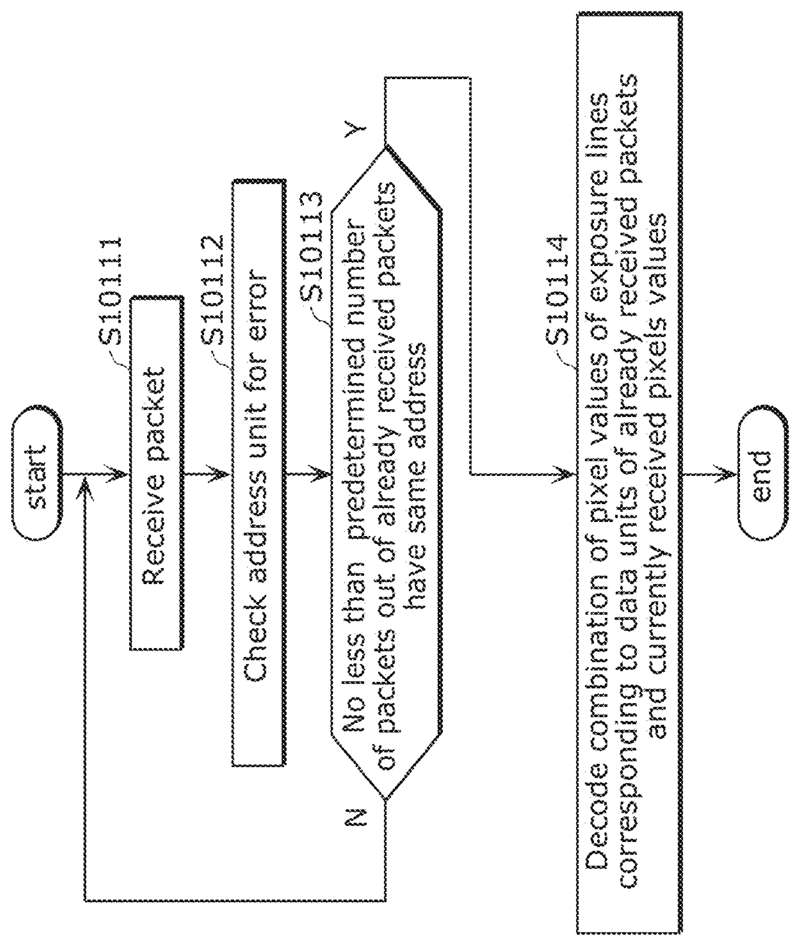
Figure 282:
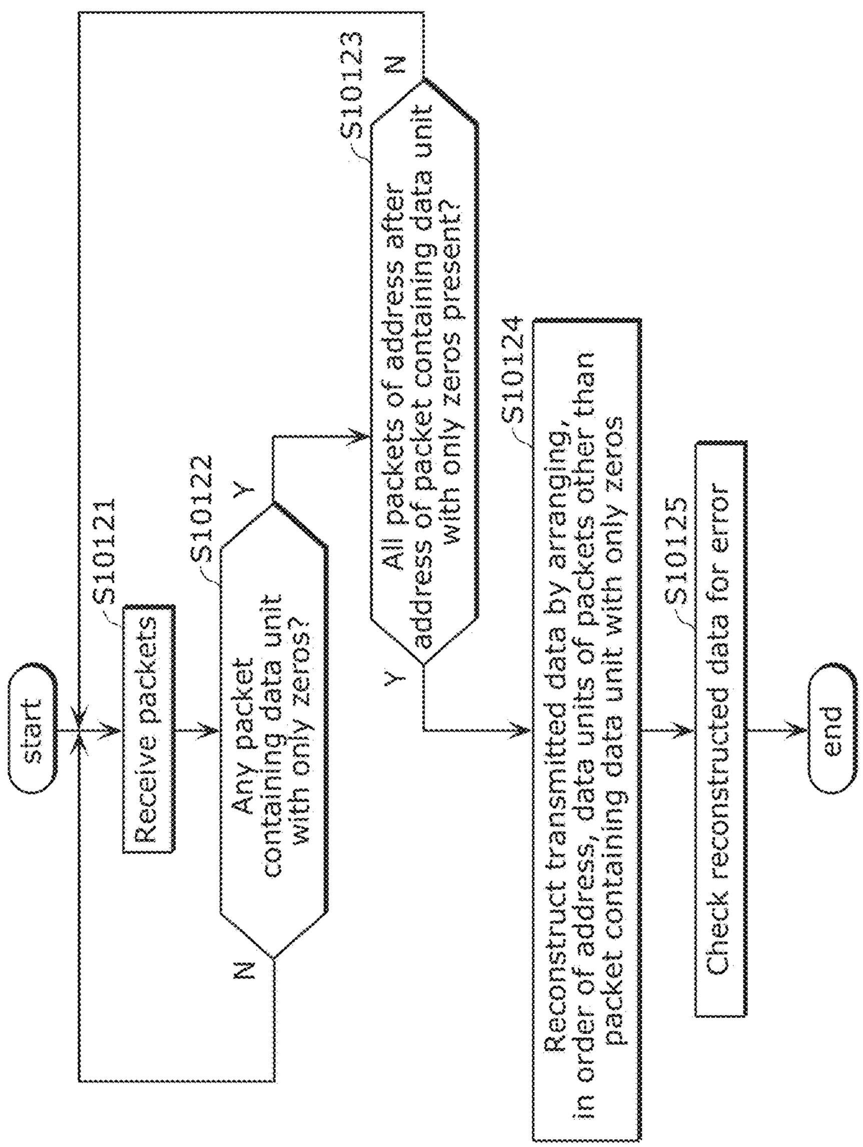
Figure 283:
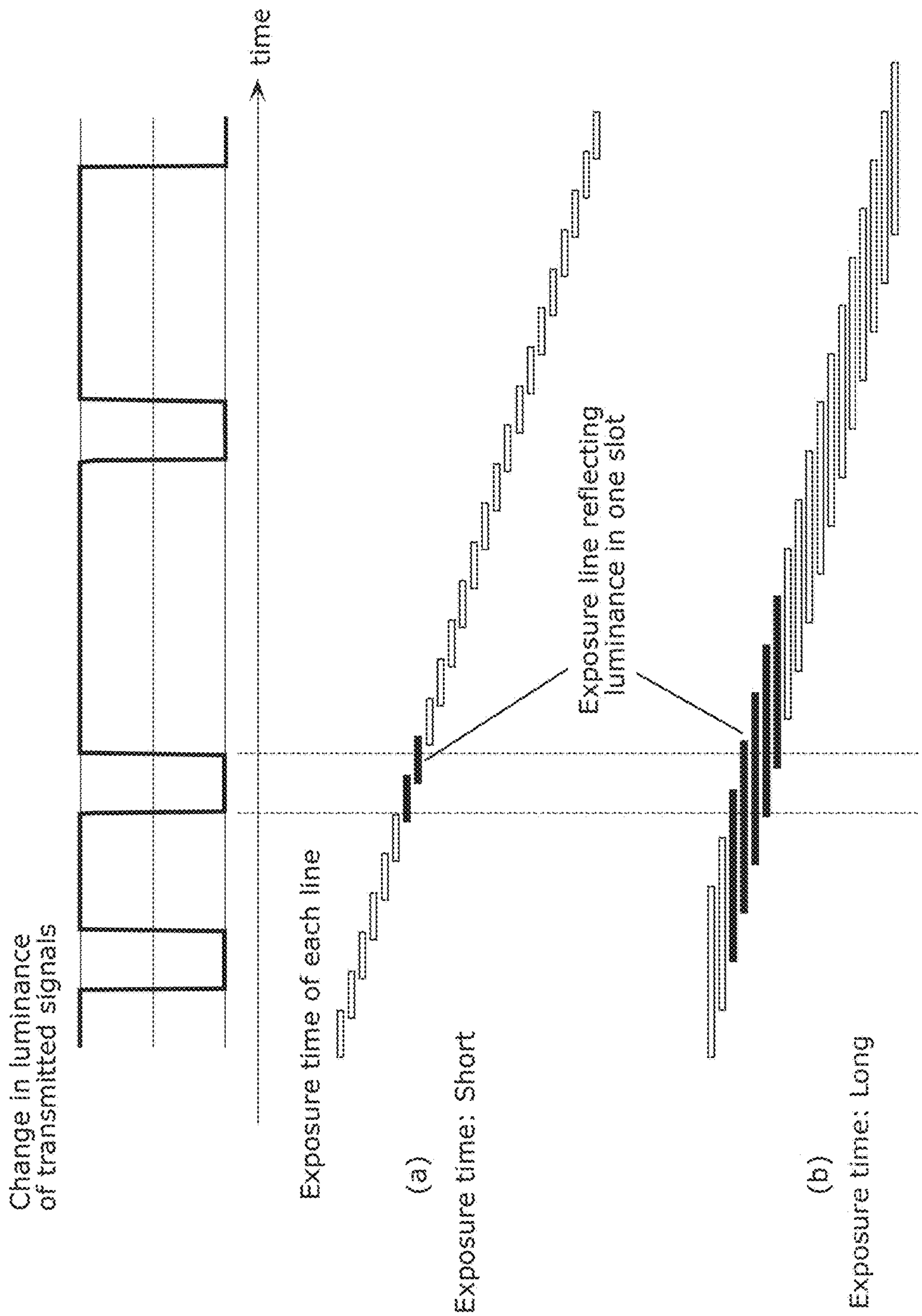
Figure 284:
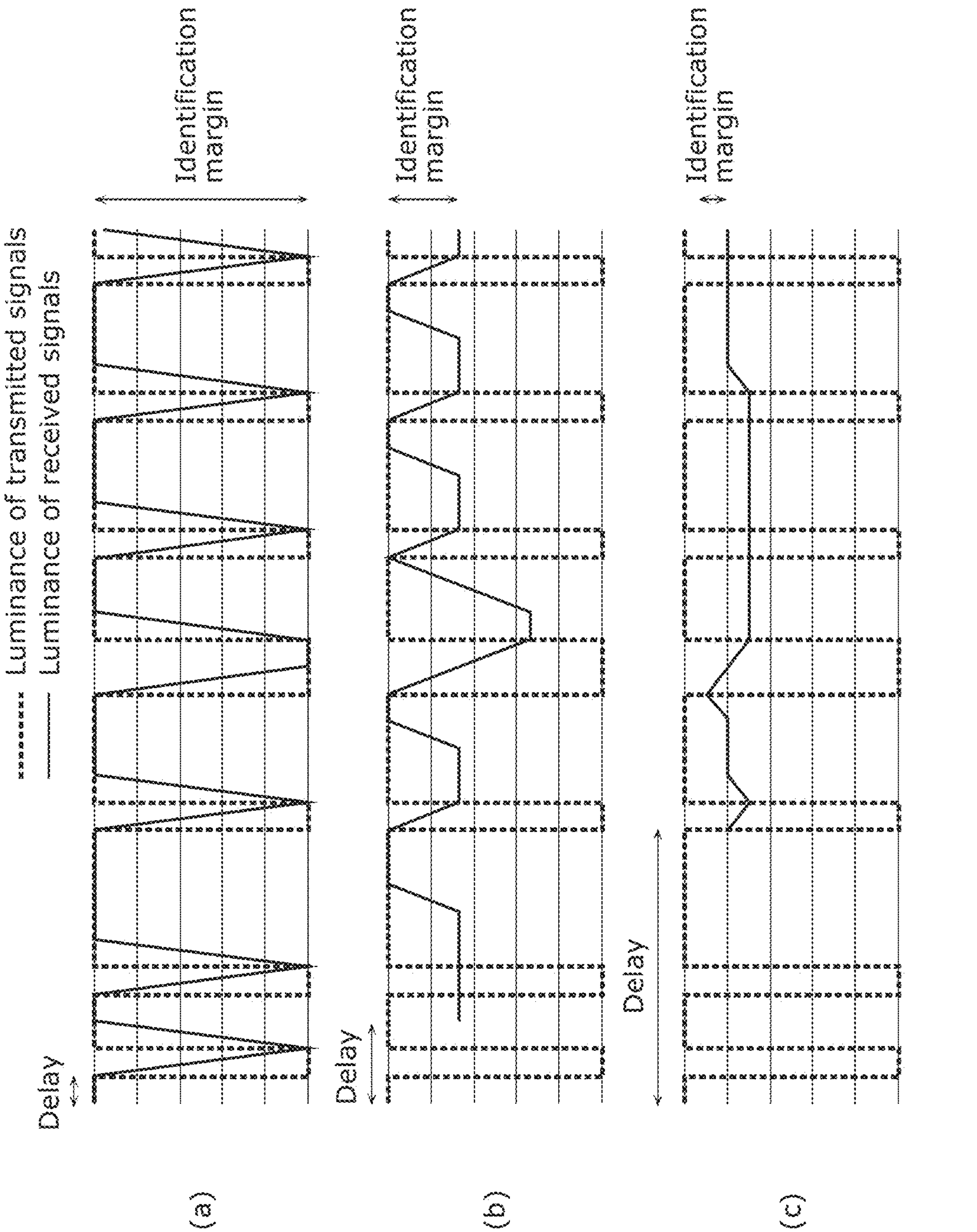
Figure 285:
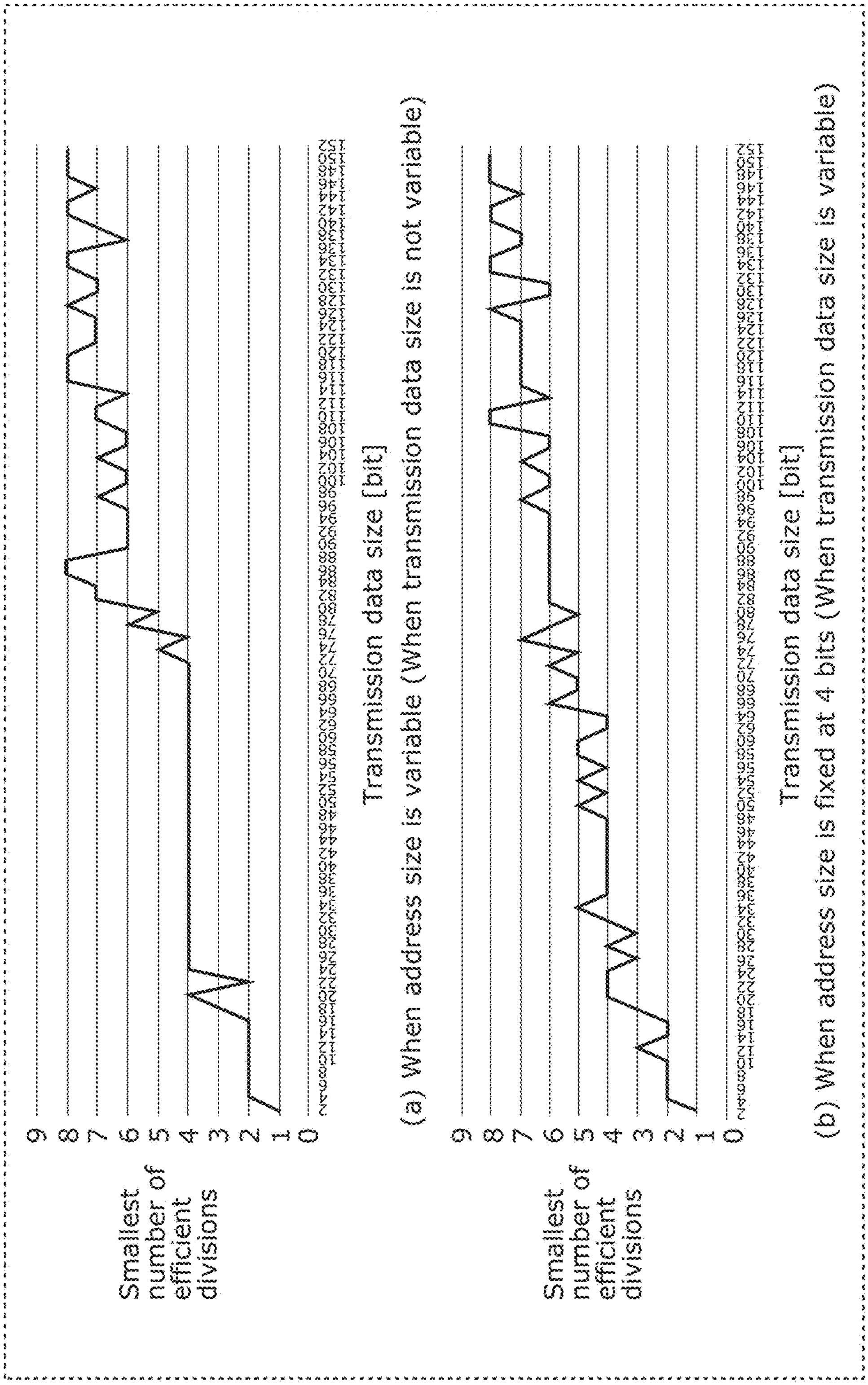
Figure 286A:
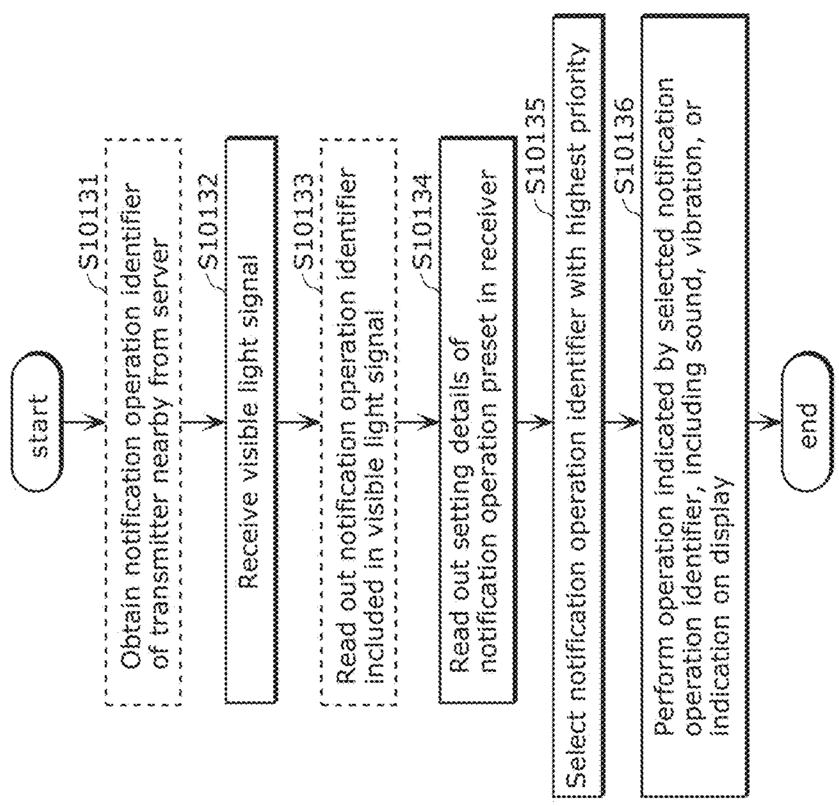
Figure 286B:
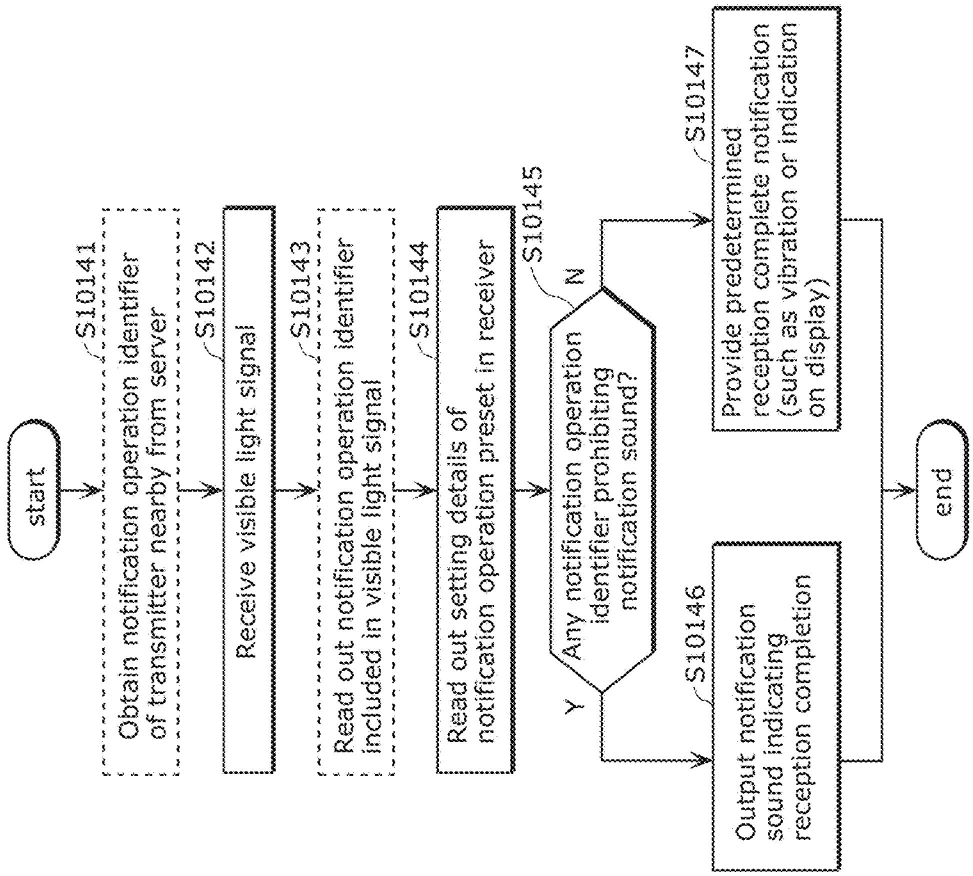
Figure 287A:
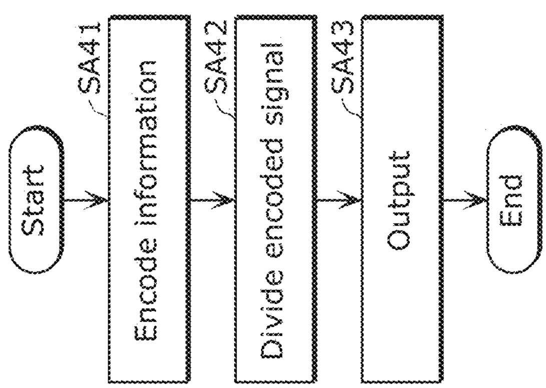
Figure 287B:
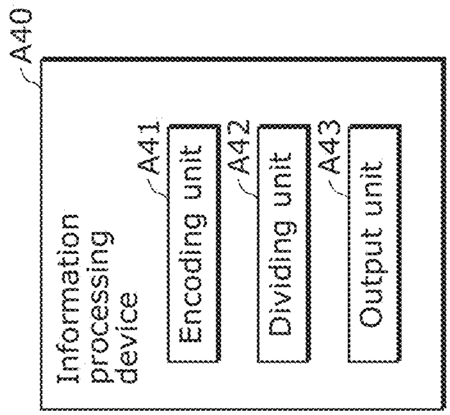
Figure 288:
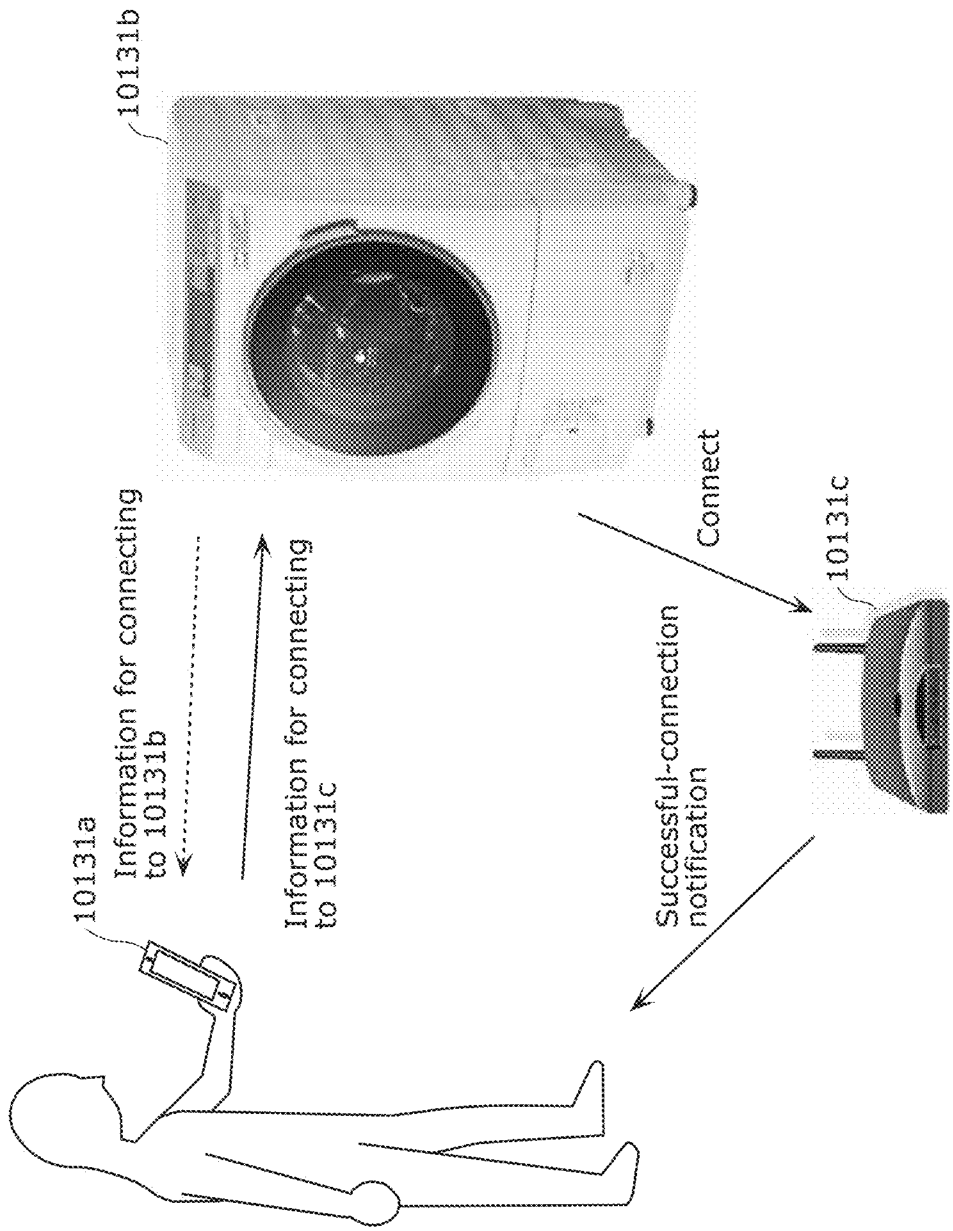
Figure 289:
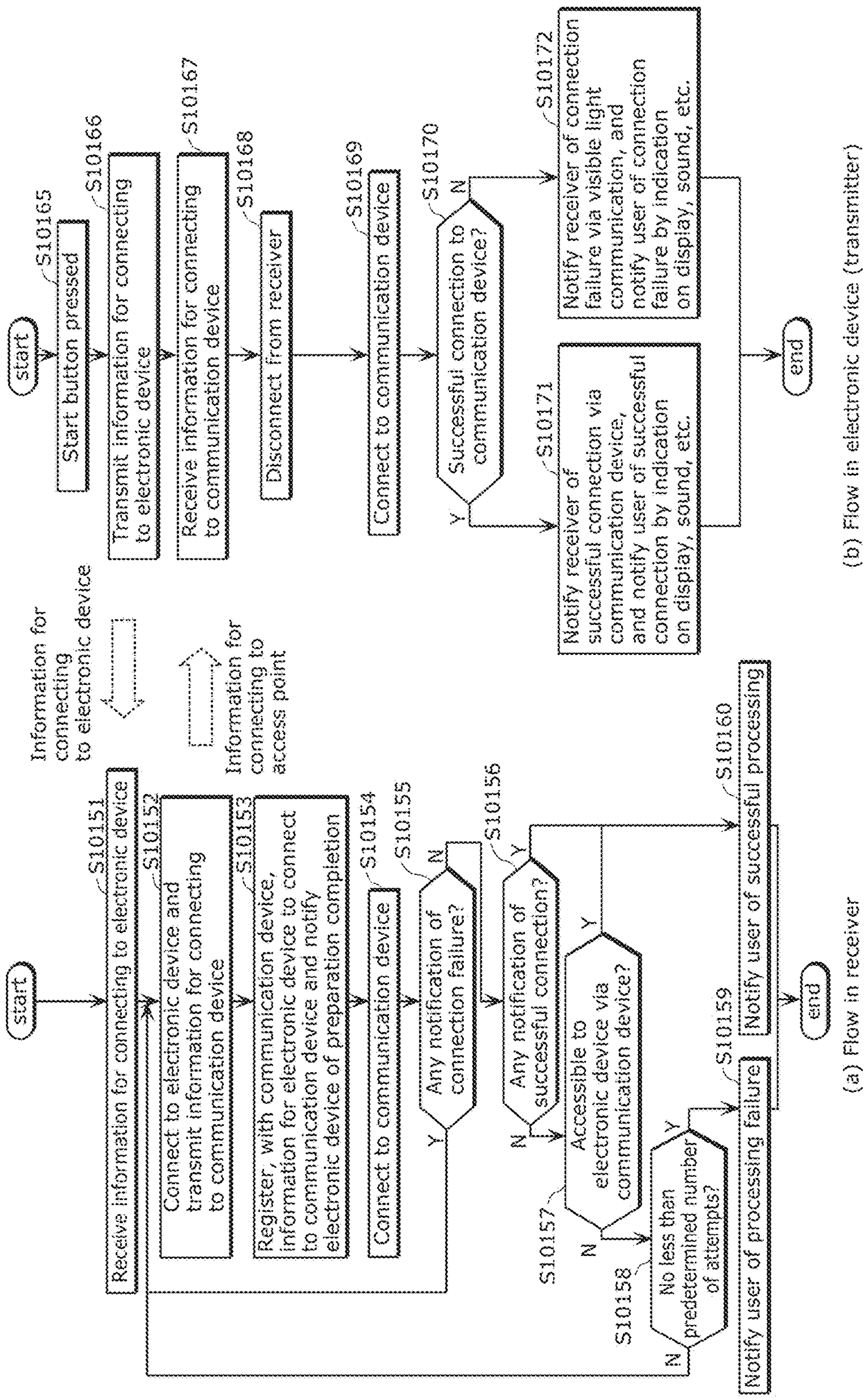
Figure 290:
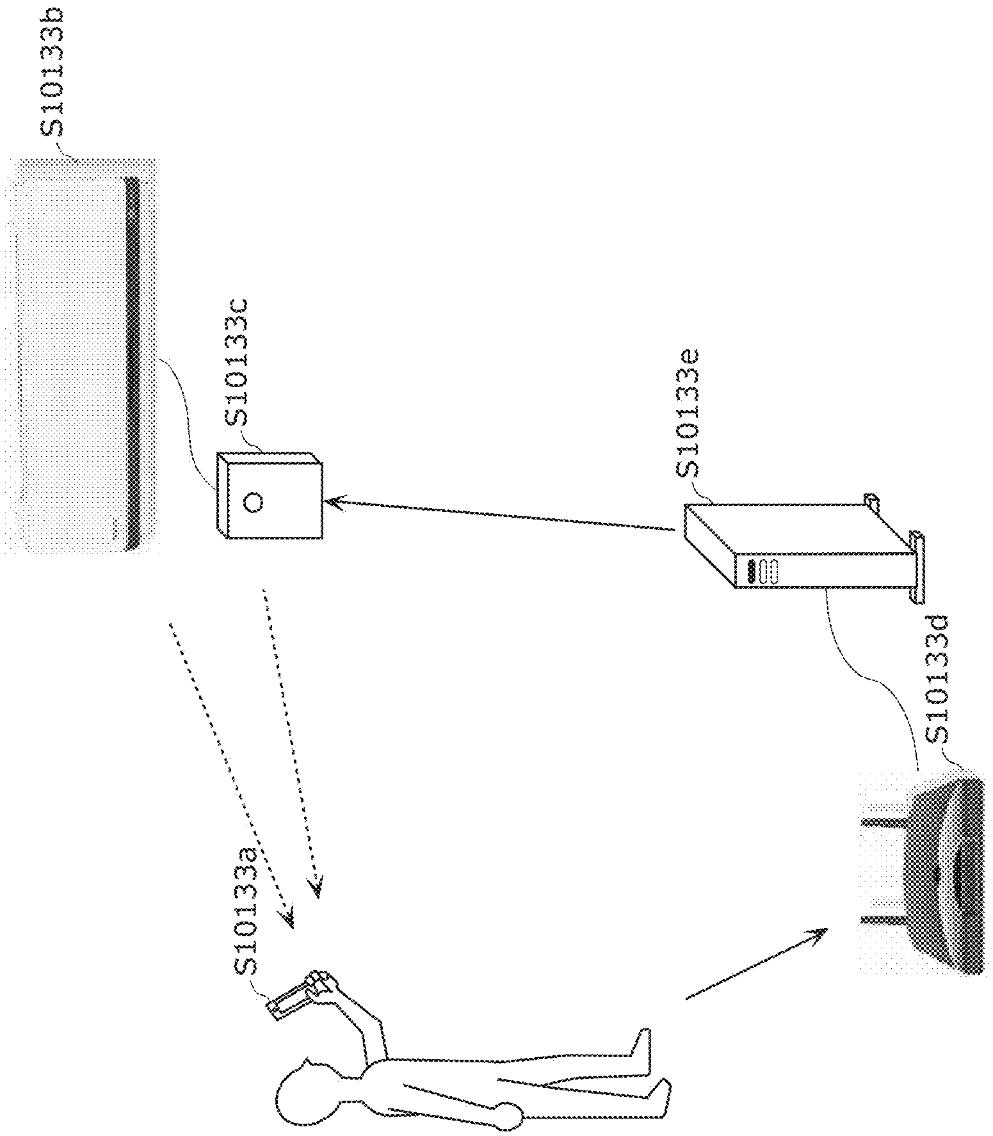
Figure 291:
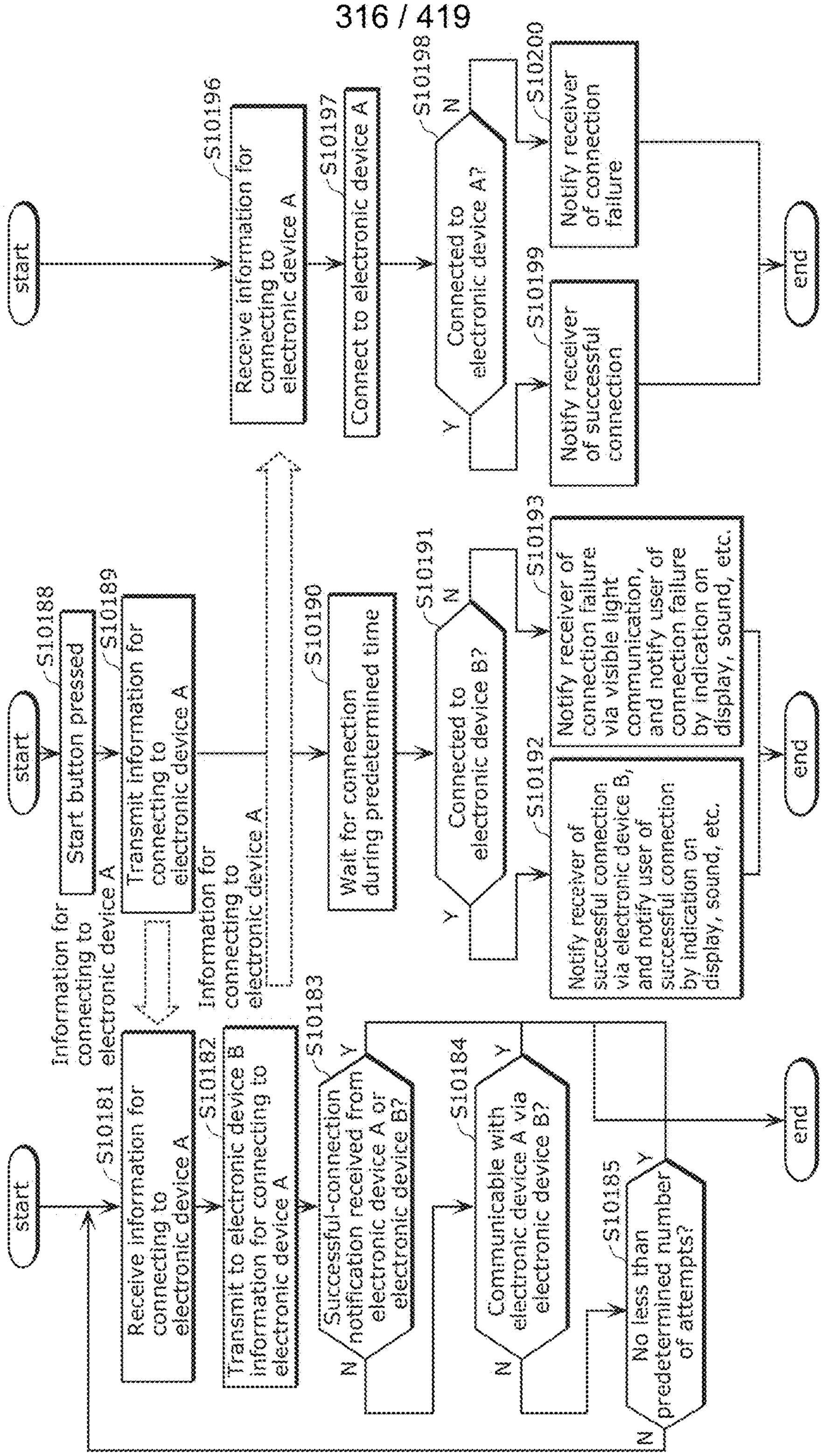
Figure 292:
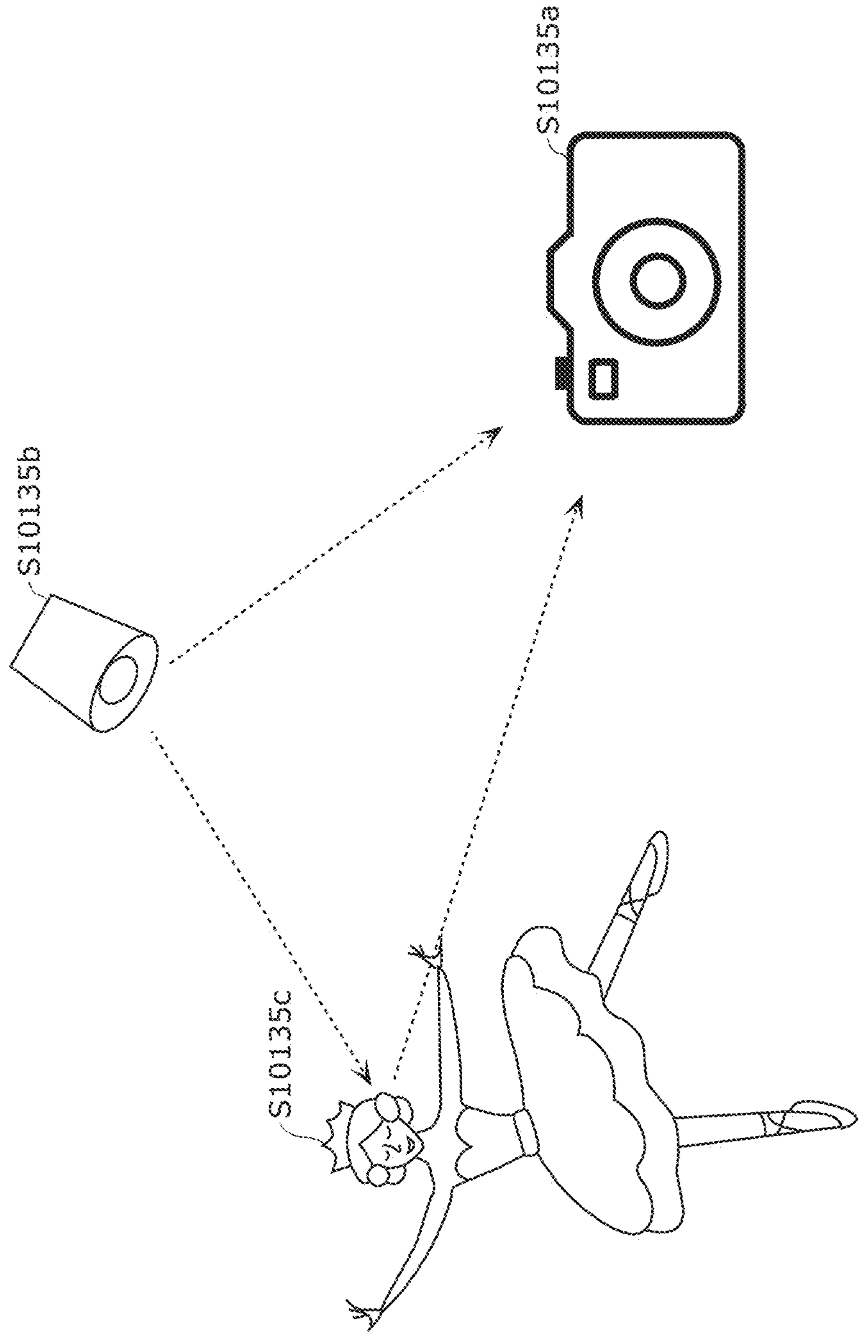
Figure 293:
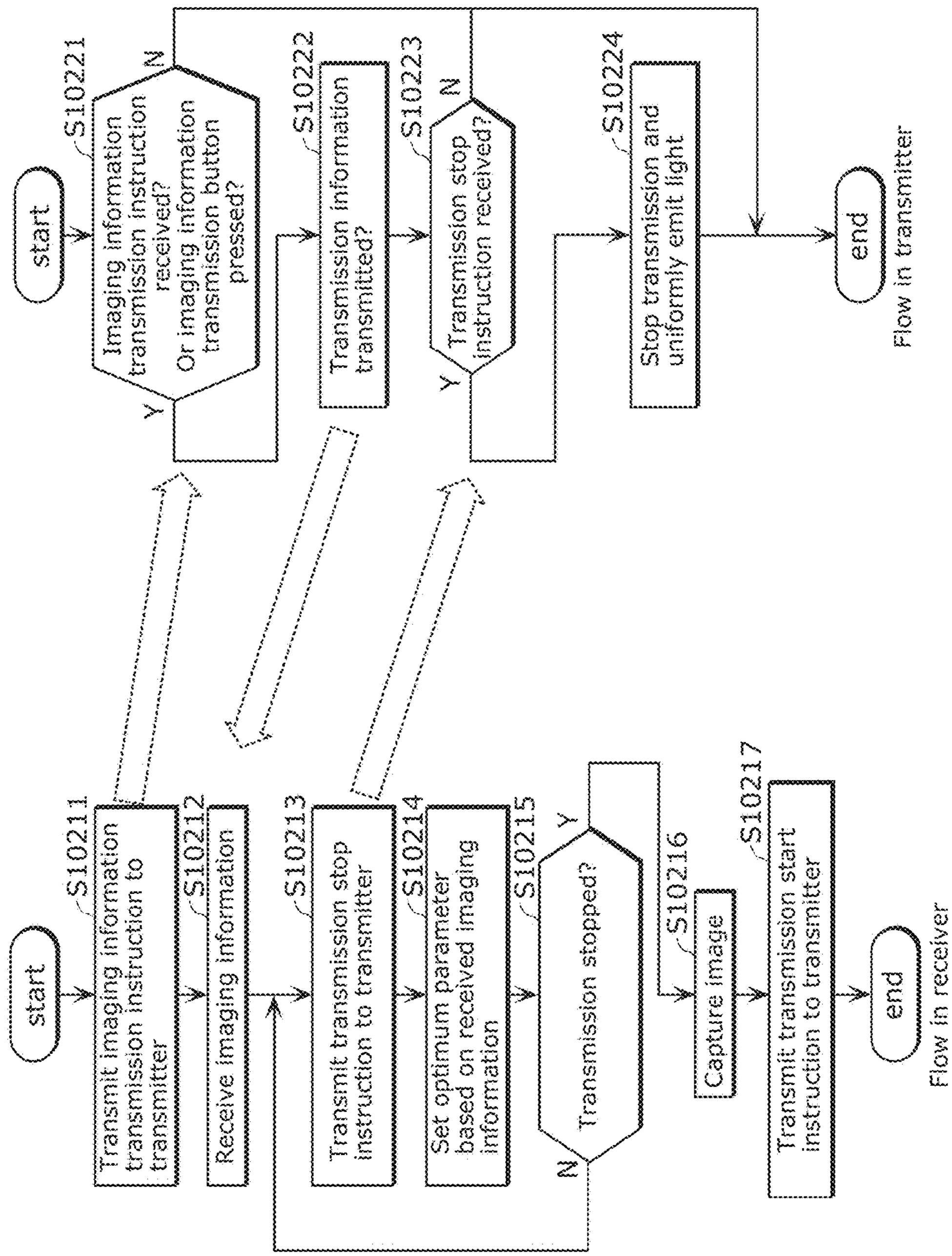
Figure 294:
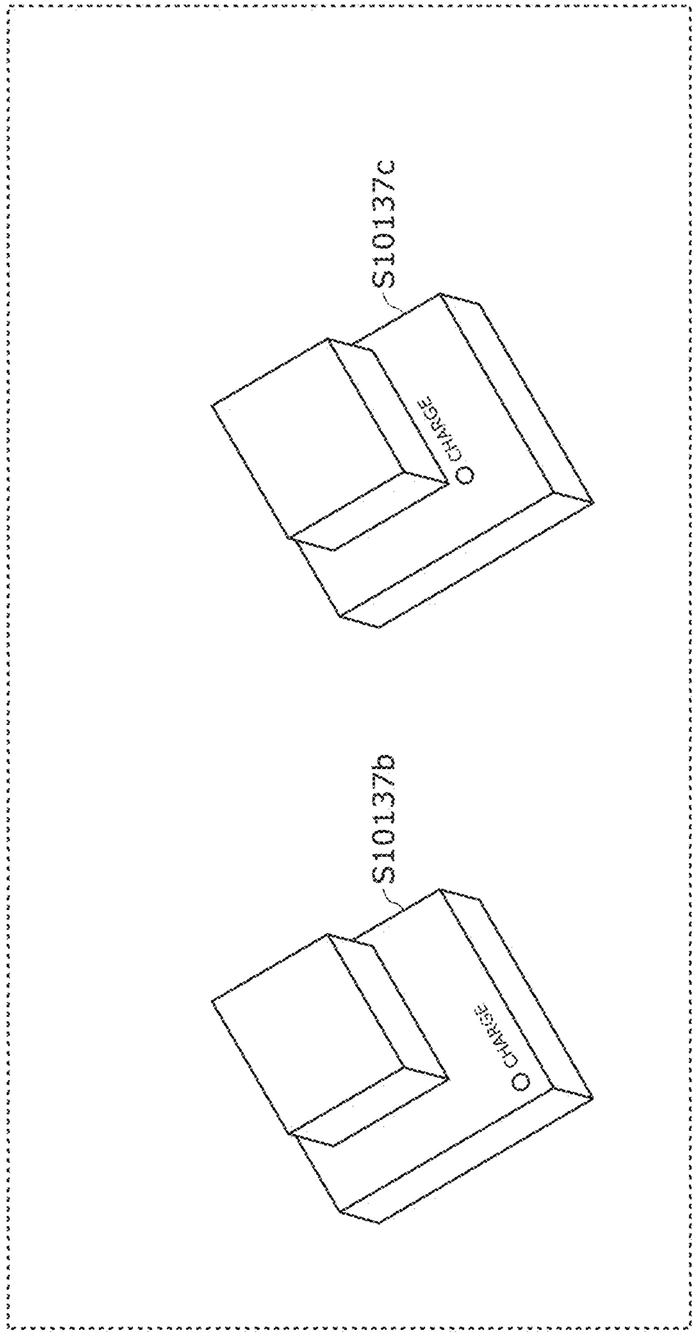
Figure 295:
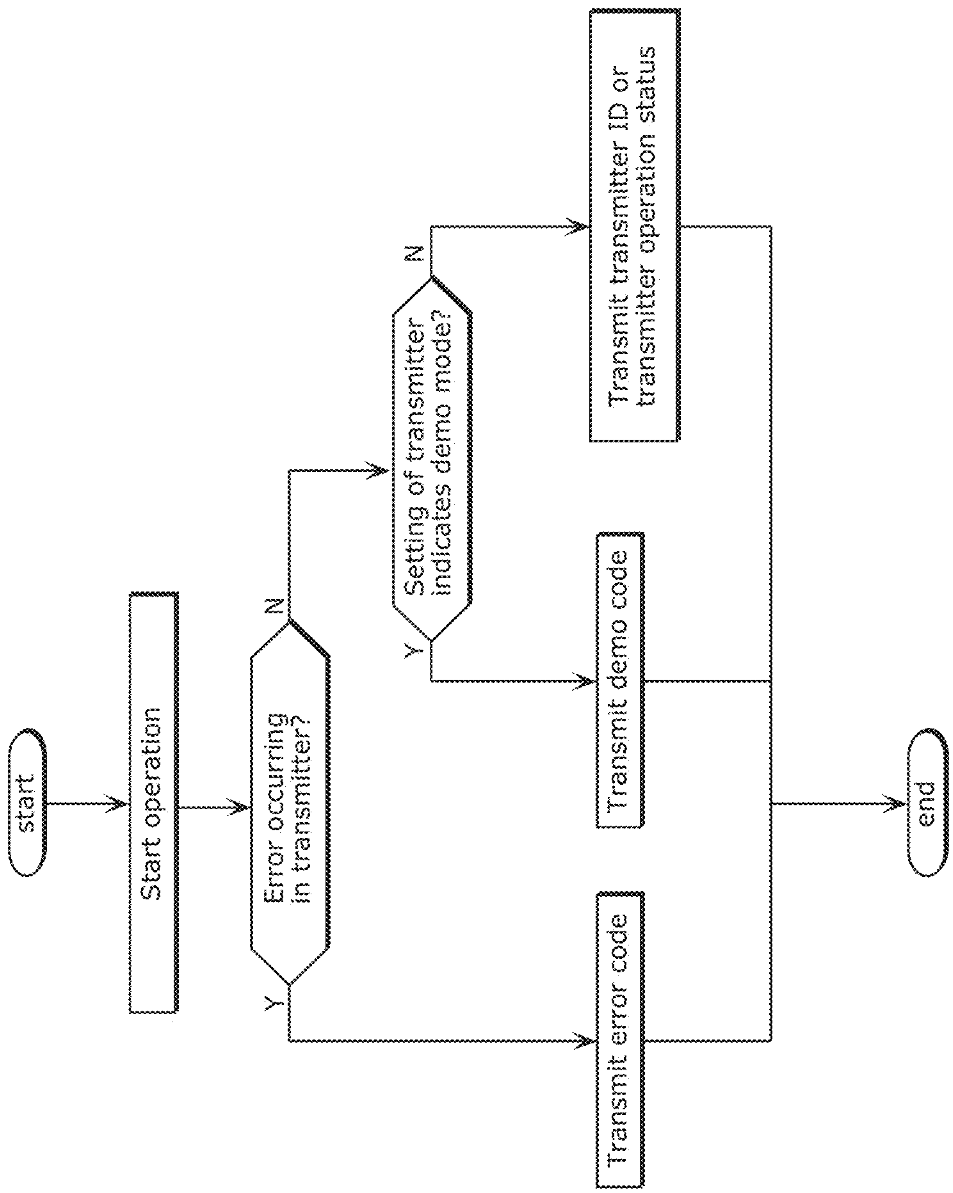
Figure 296:
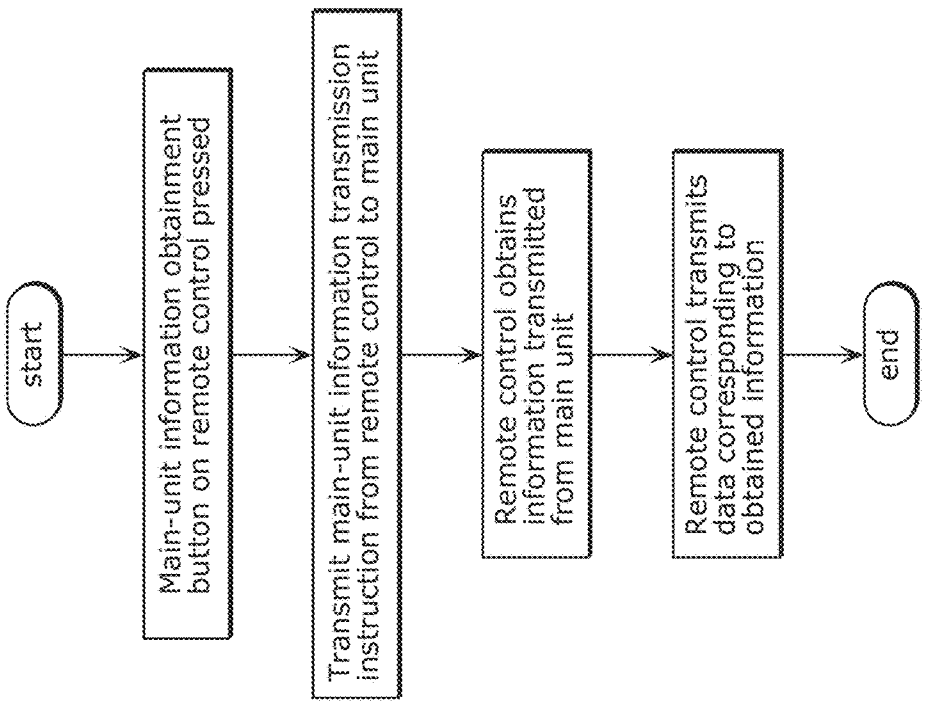
Figure 297:
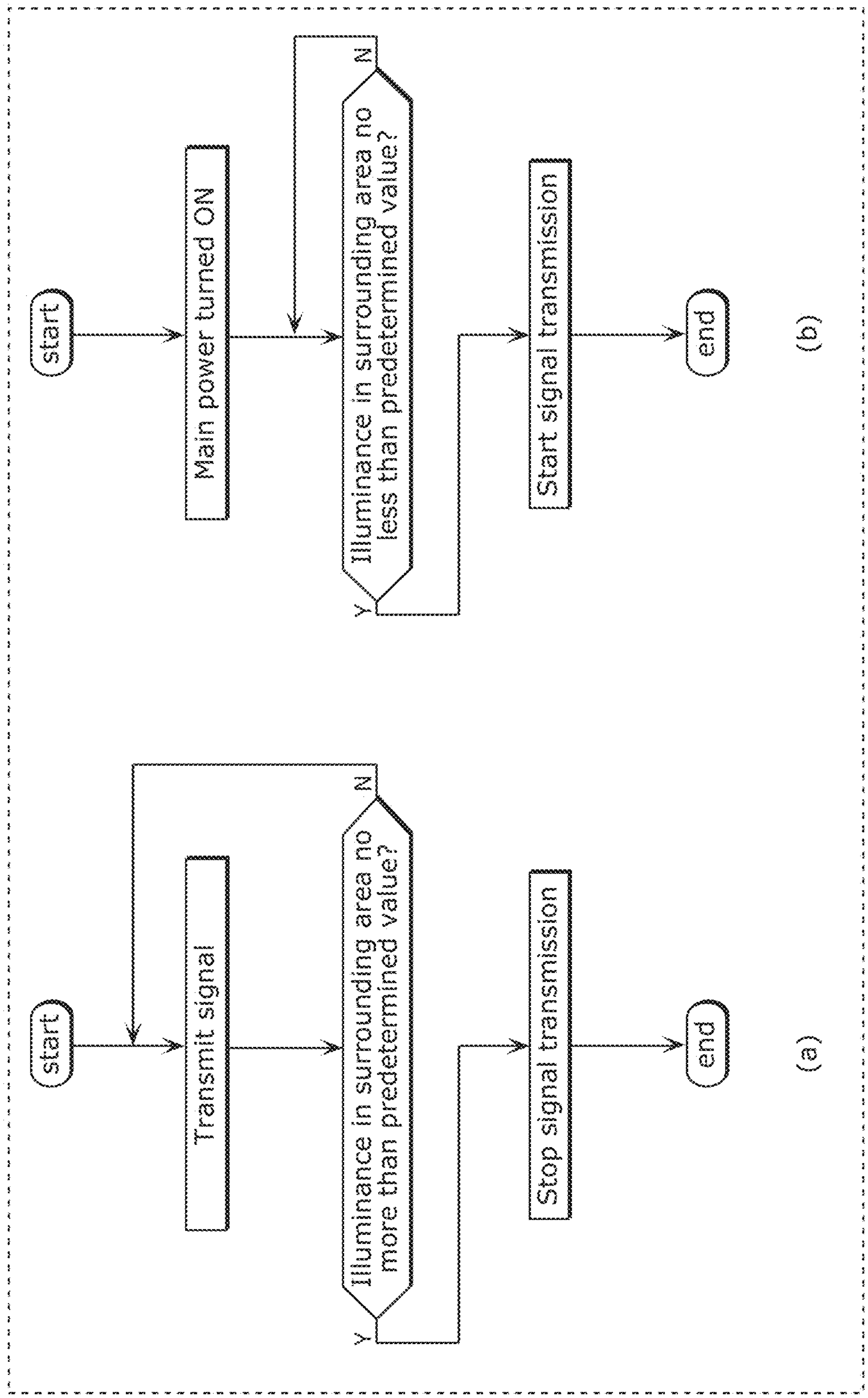
Figure 298:
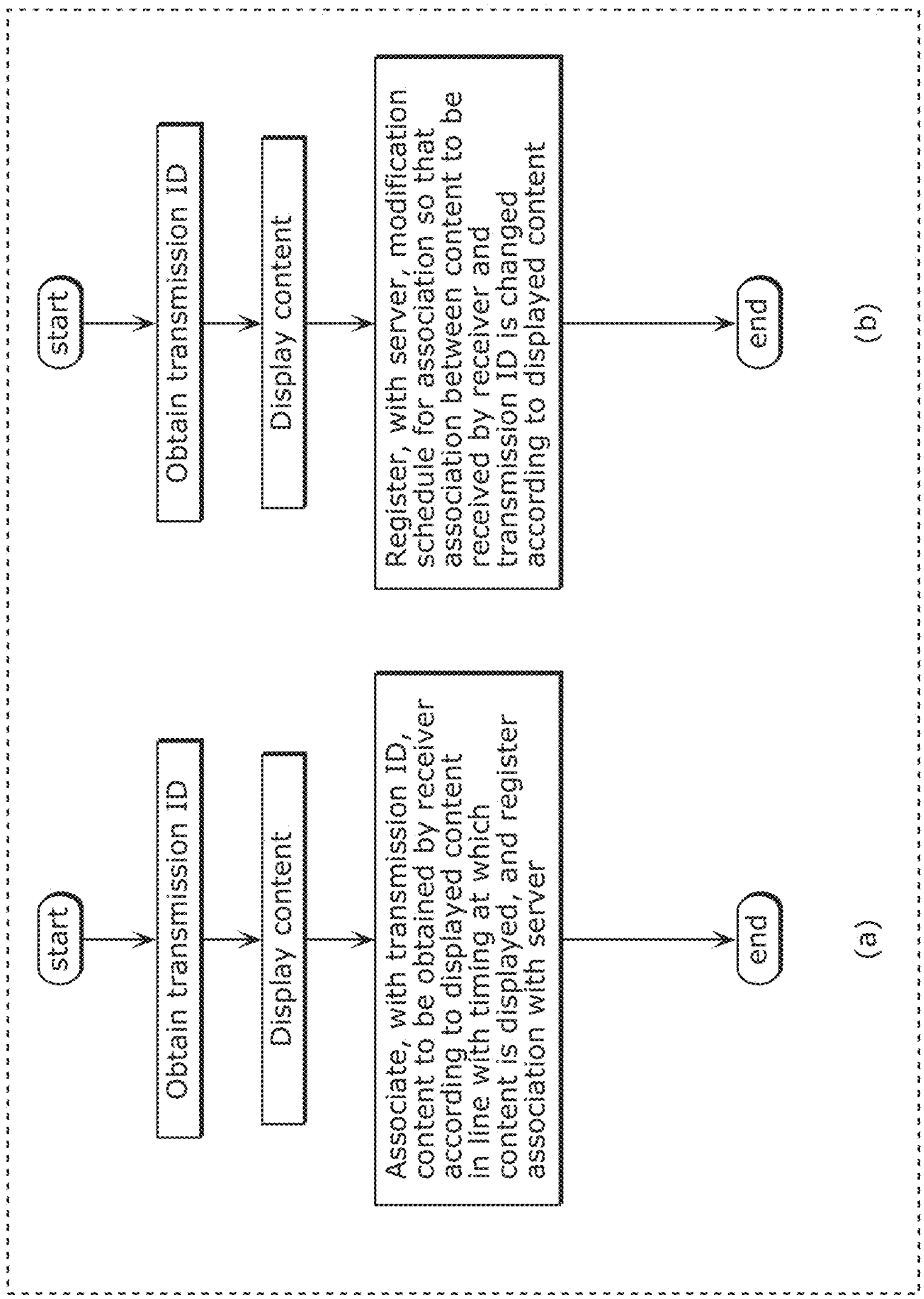
Figure 299:
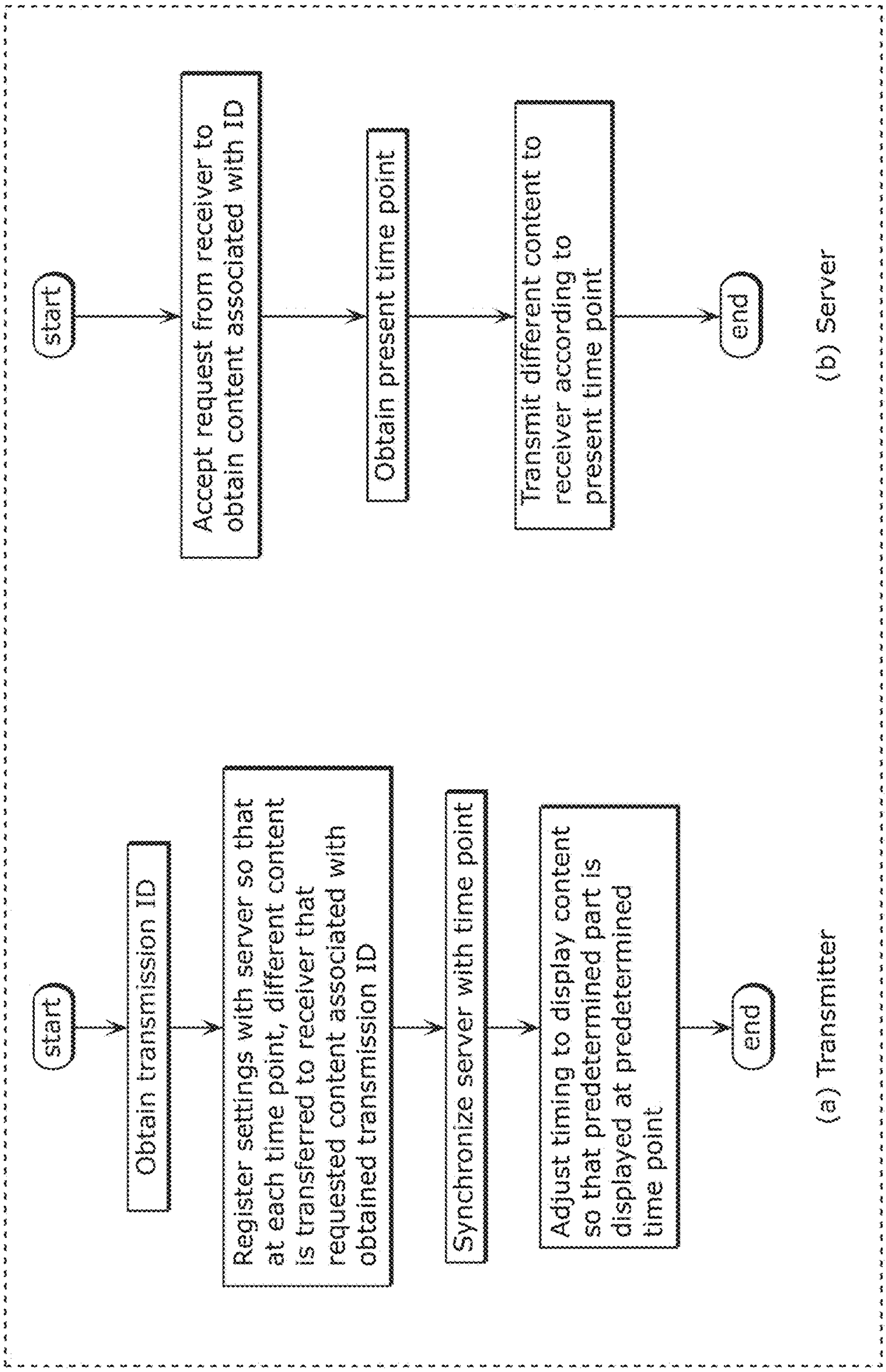
Figure 300:
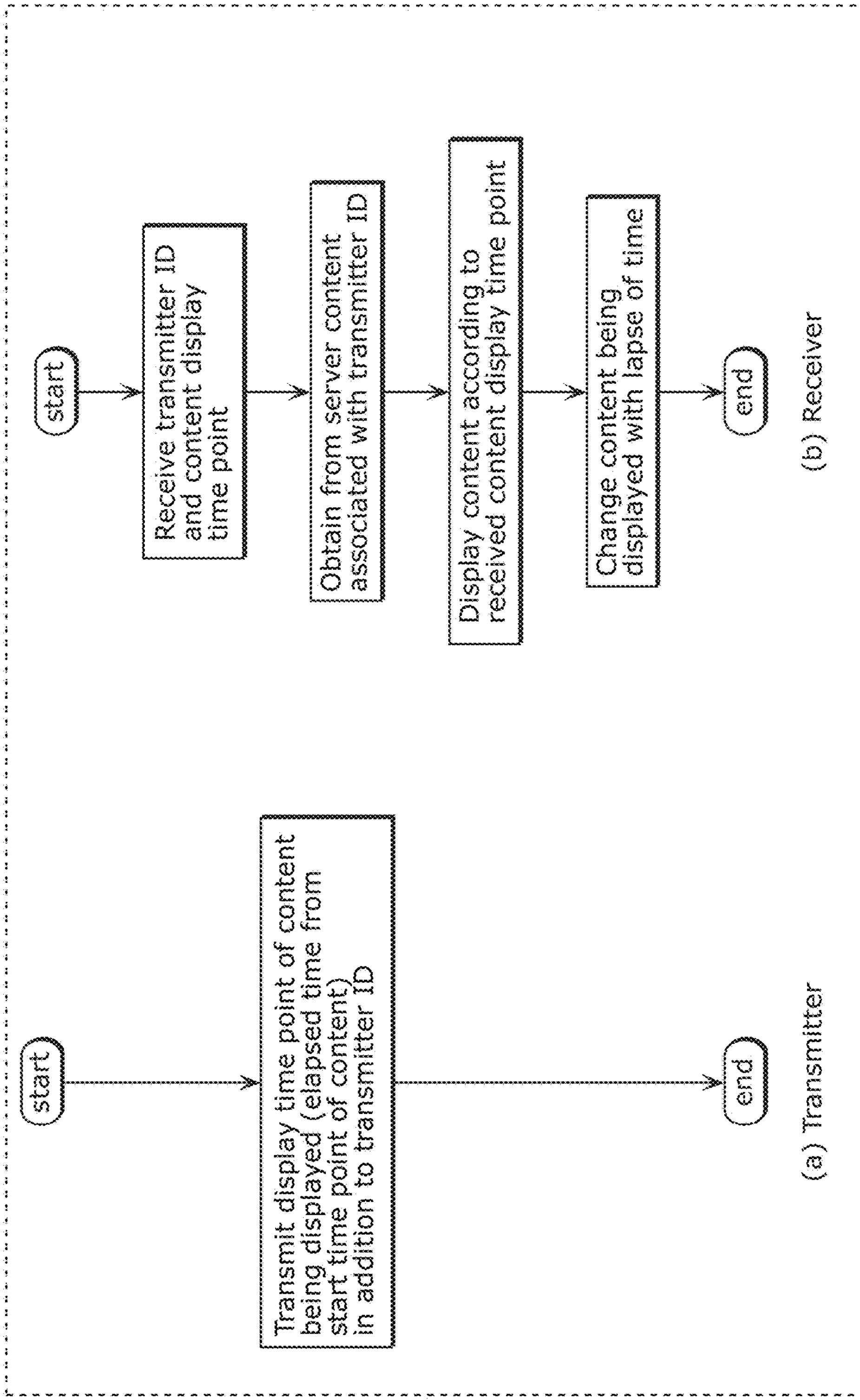
Figure 301:
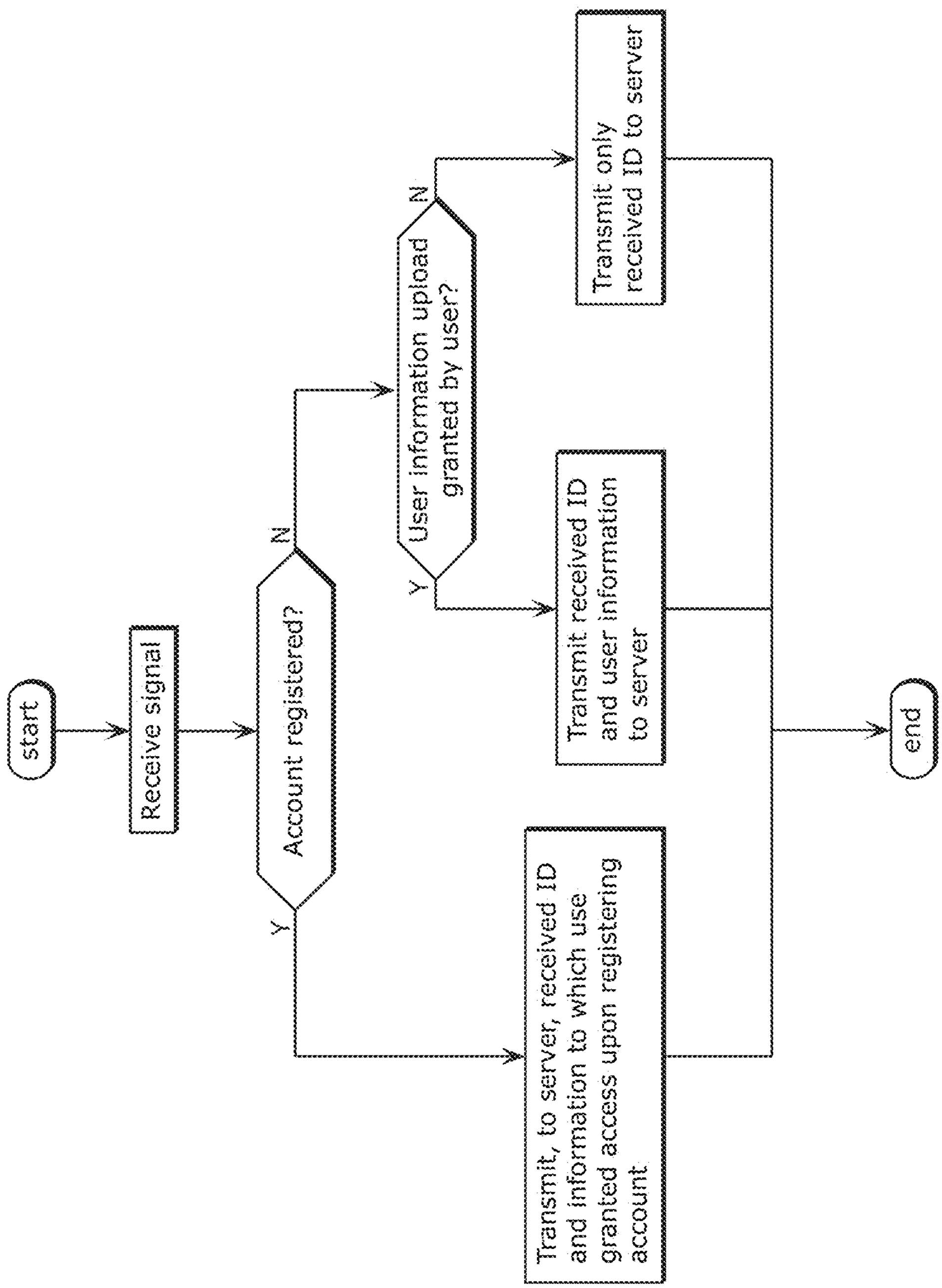
Figure 302:
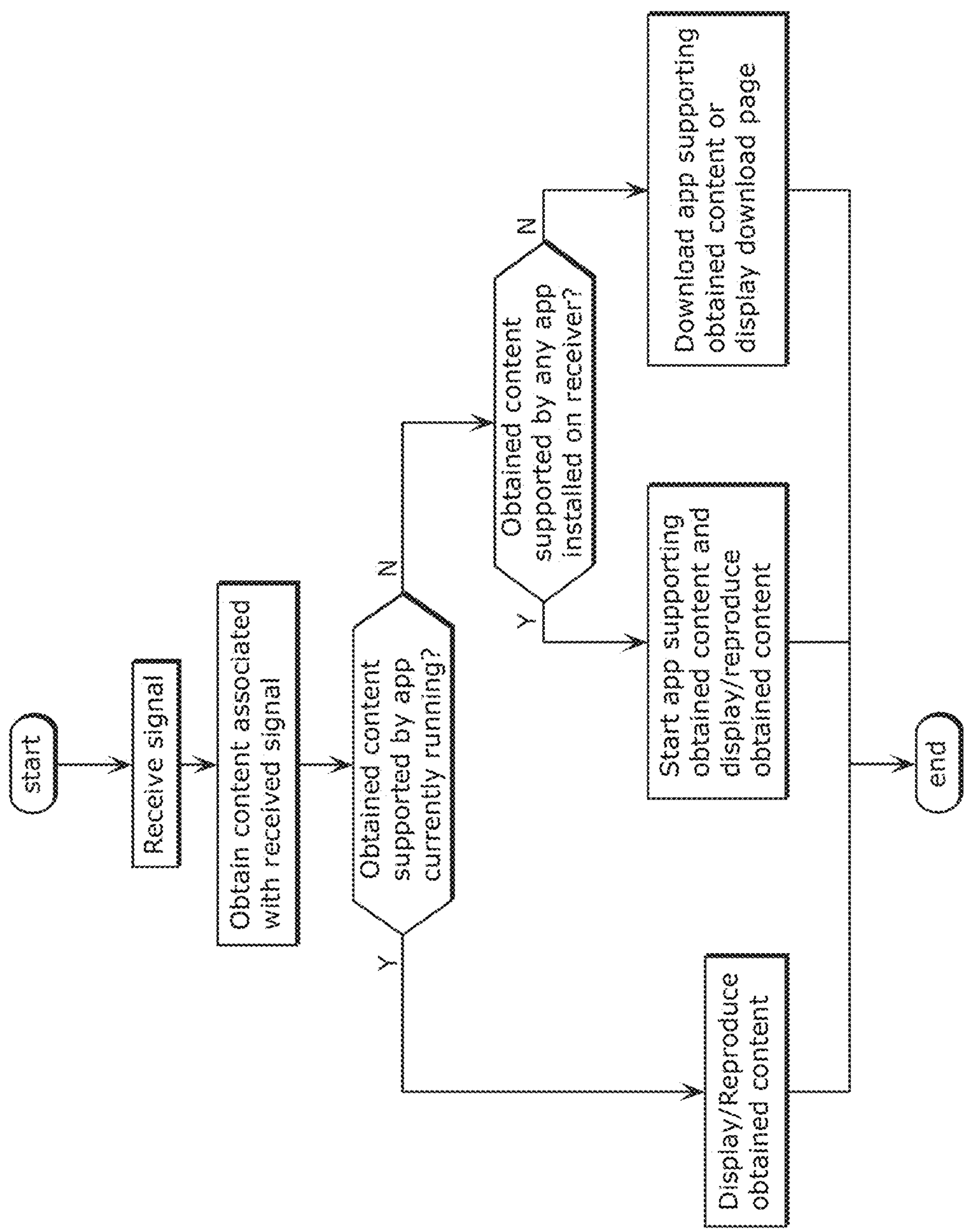
Figure 303:
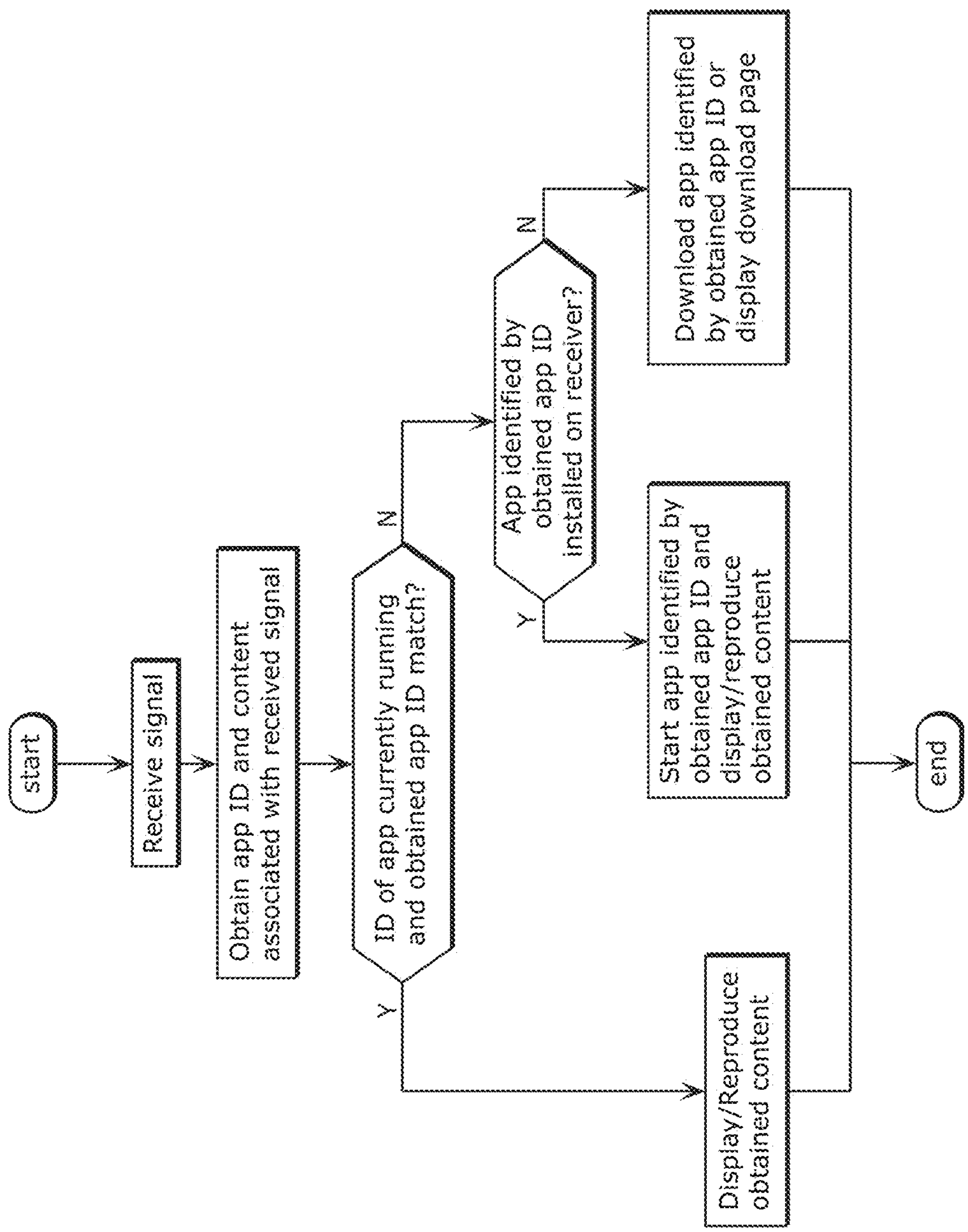
Figure 304:
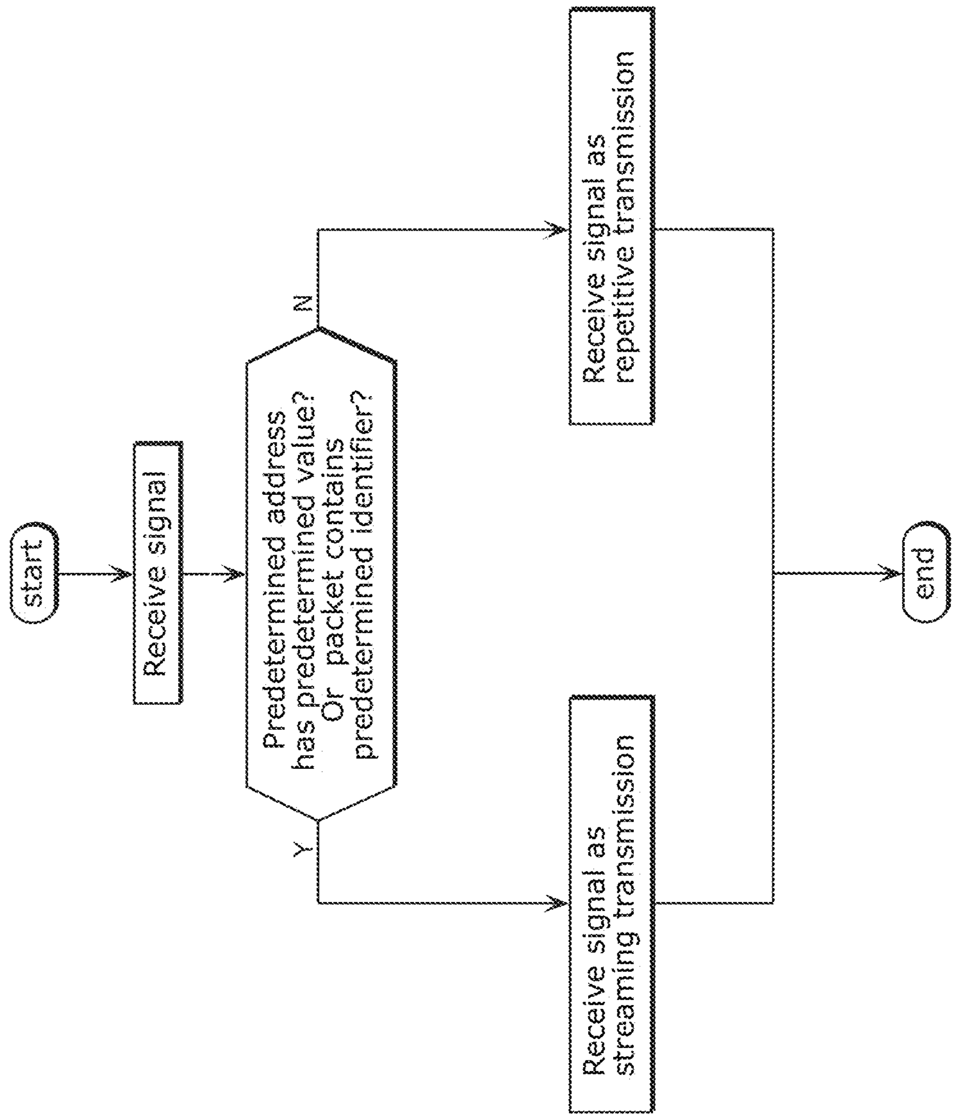
Figure 305:
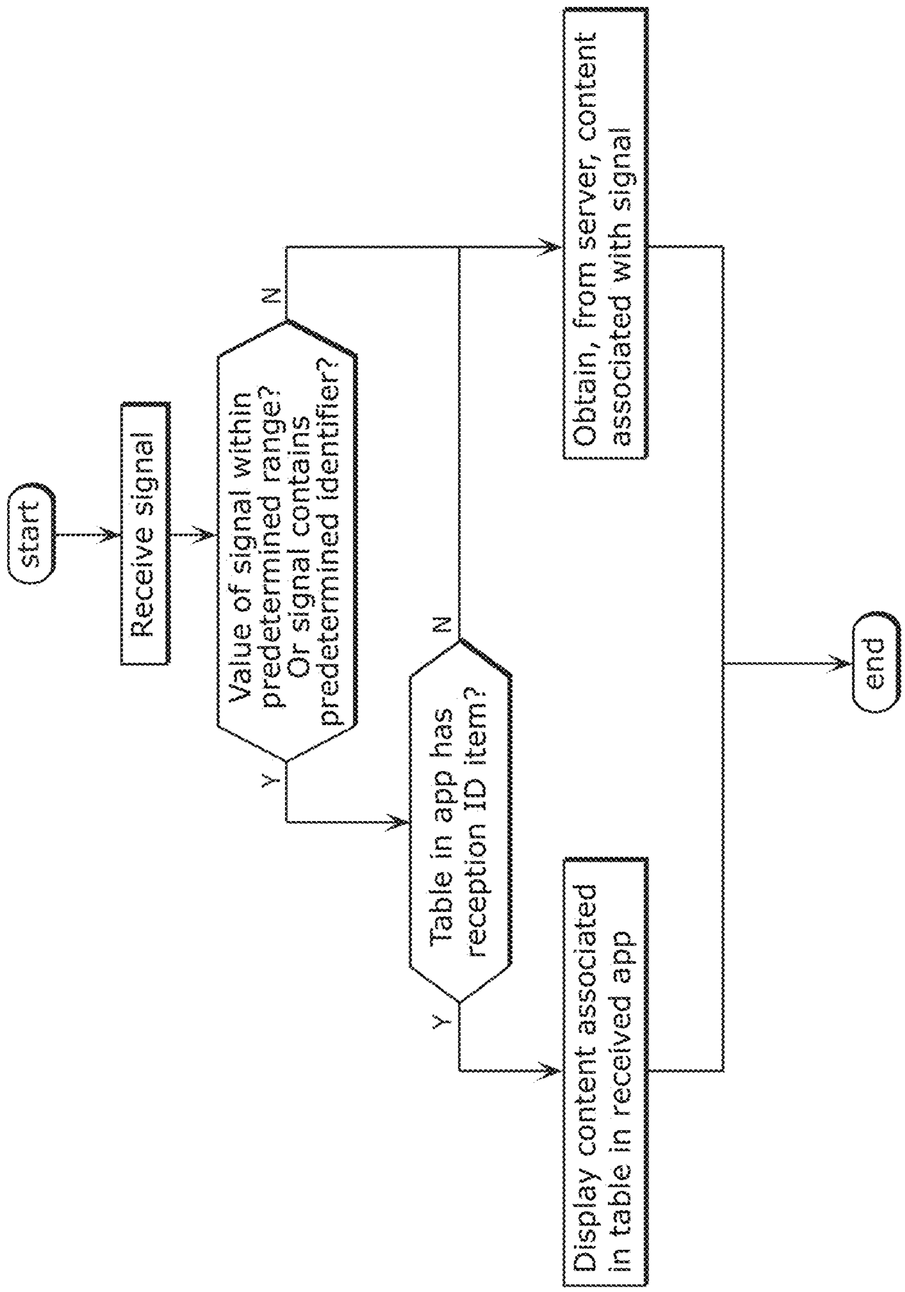
Figure 306:
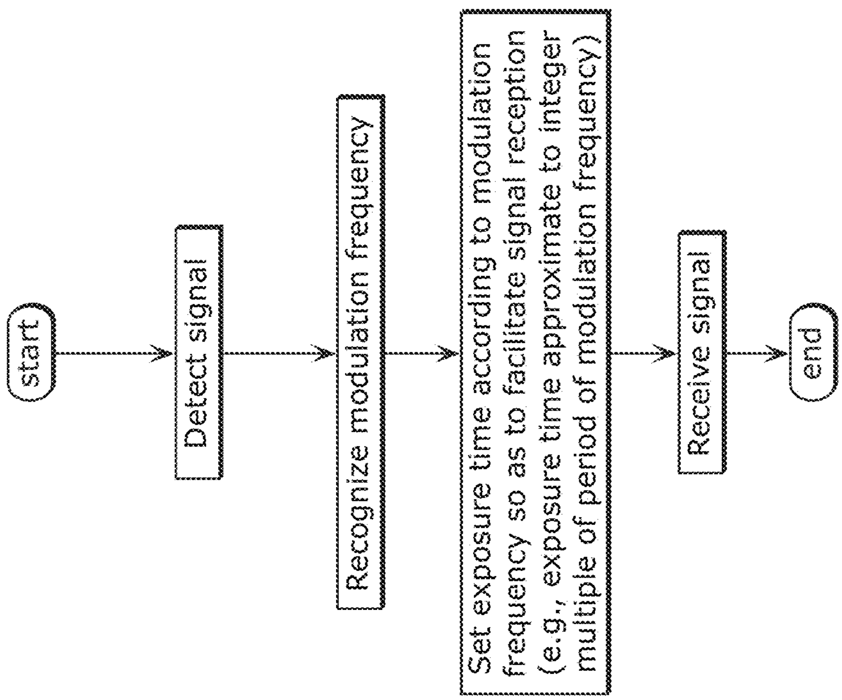
Figure 307:
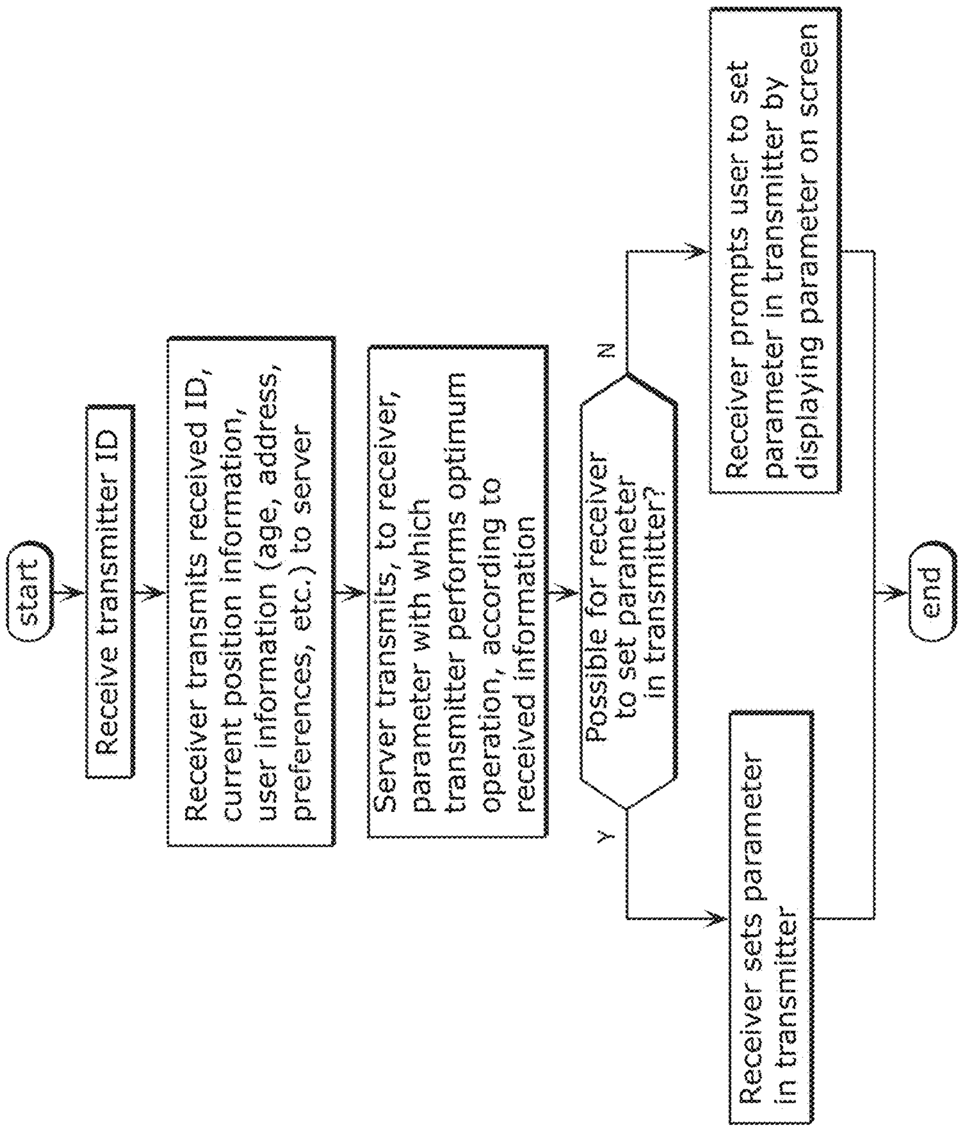
Figure 308:
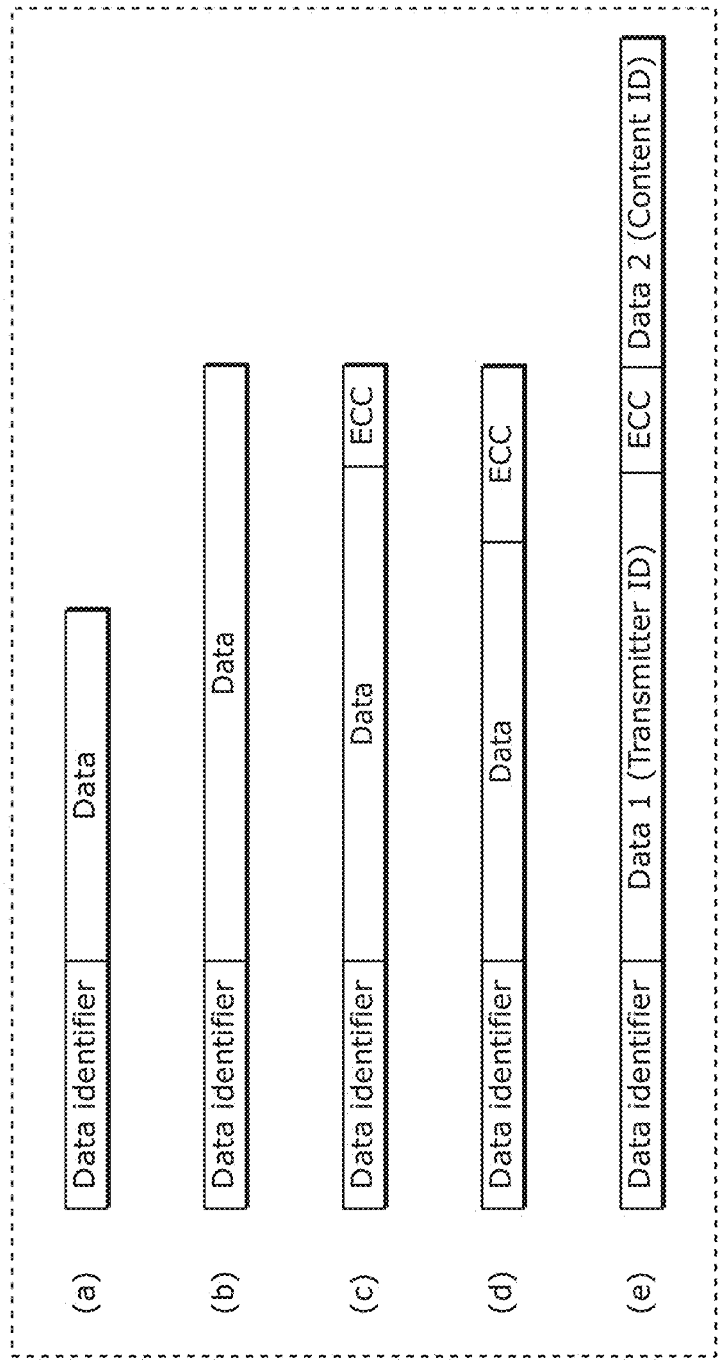
Figure 309:
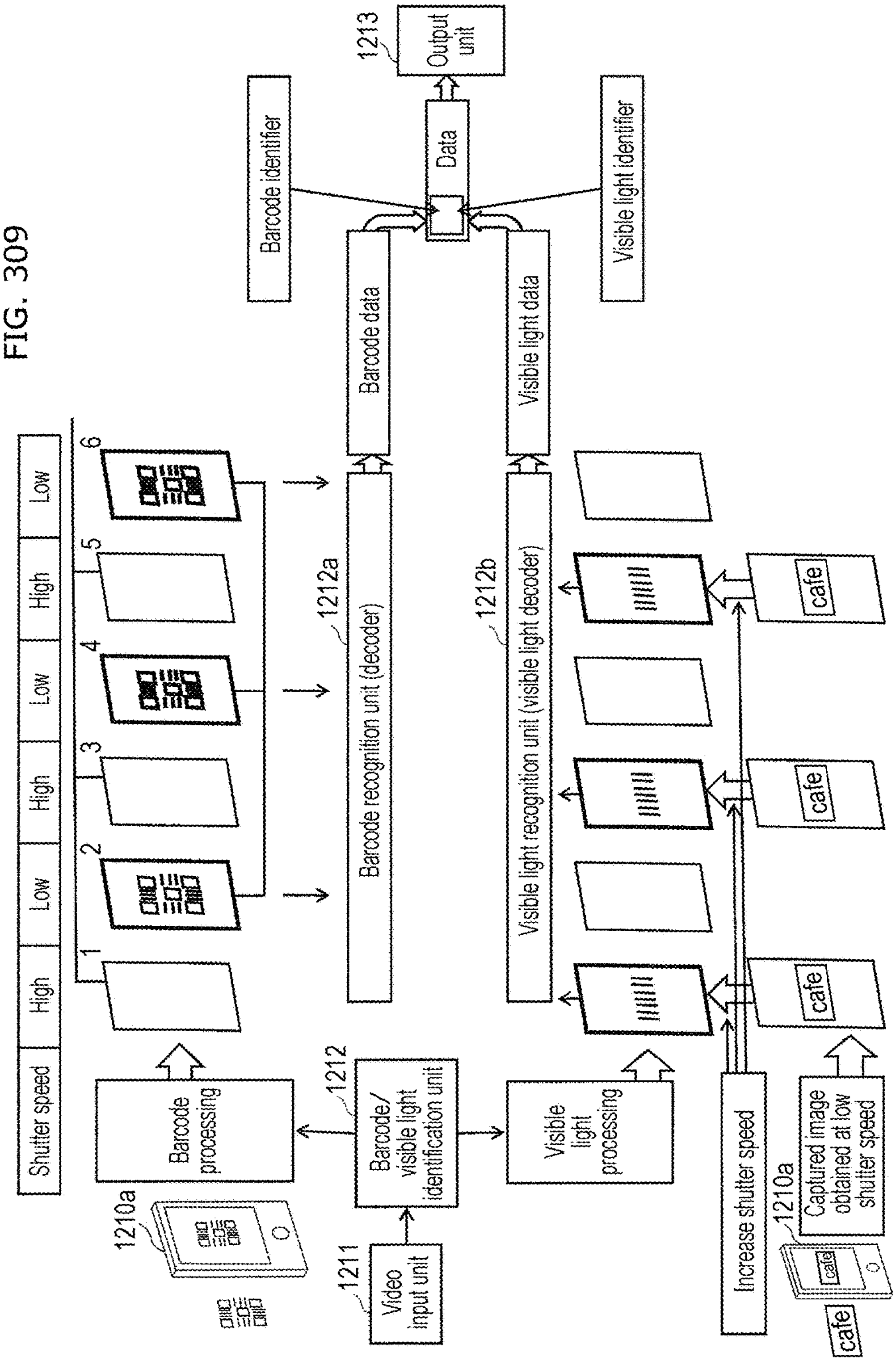
Figure 310A:
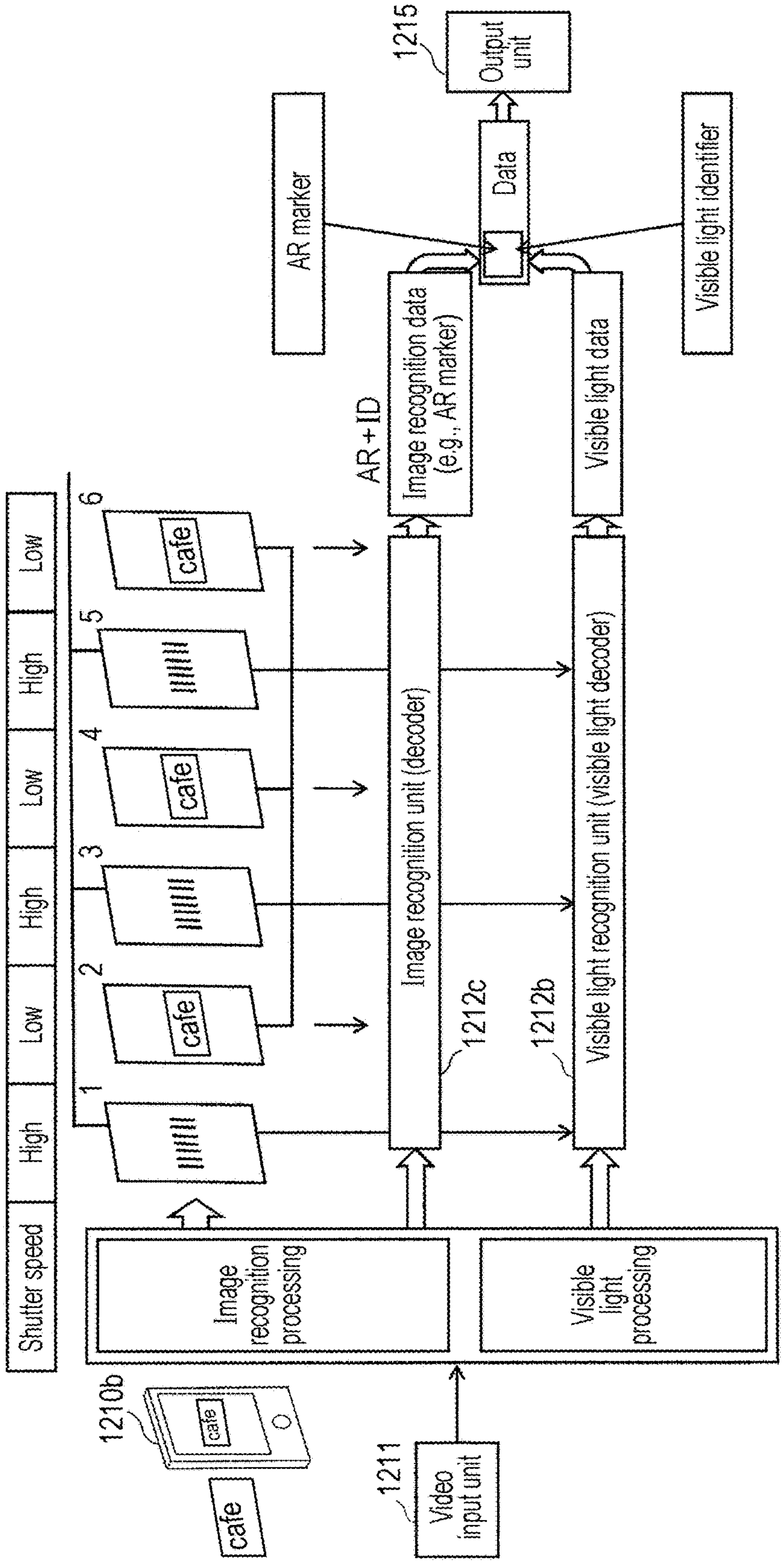
Figure 310B:
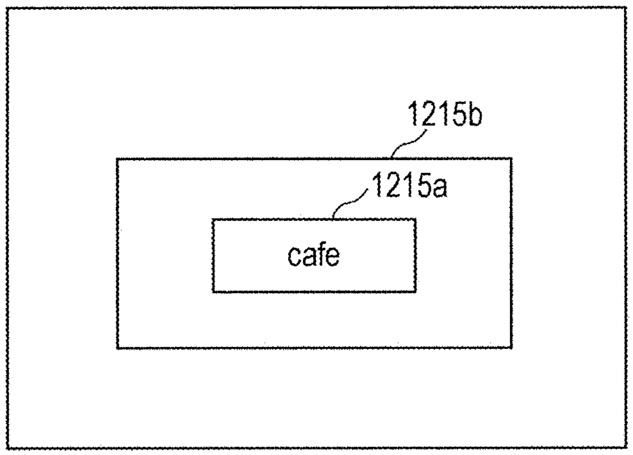
Figure 310C:
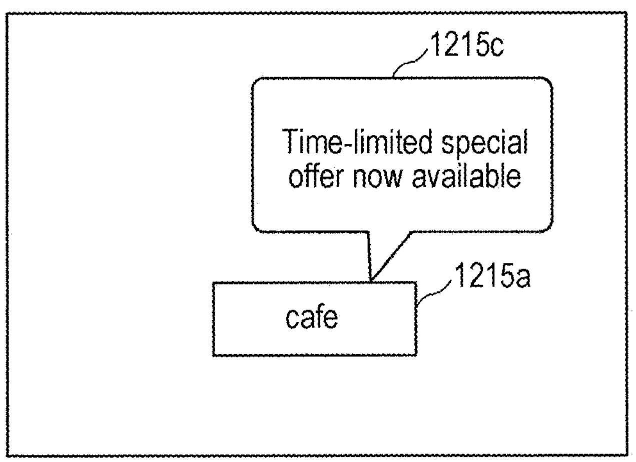
Figure 311A:
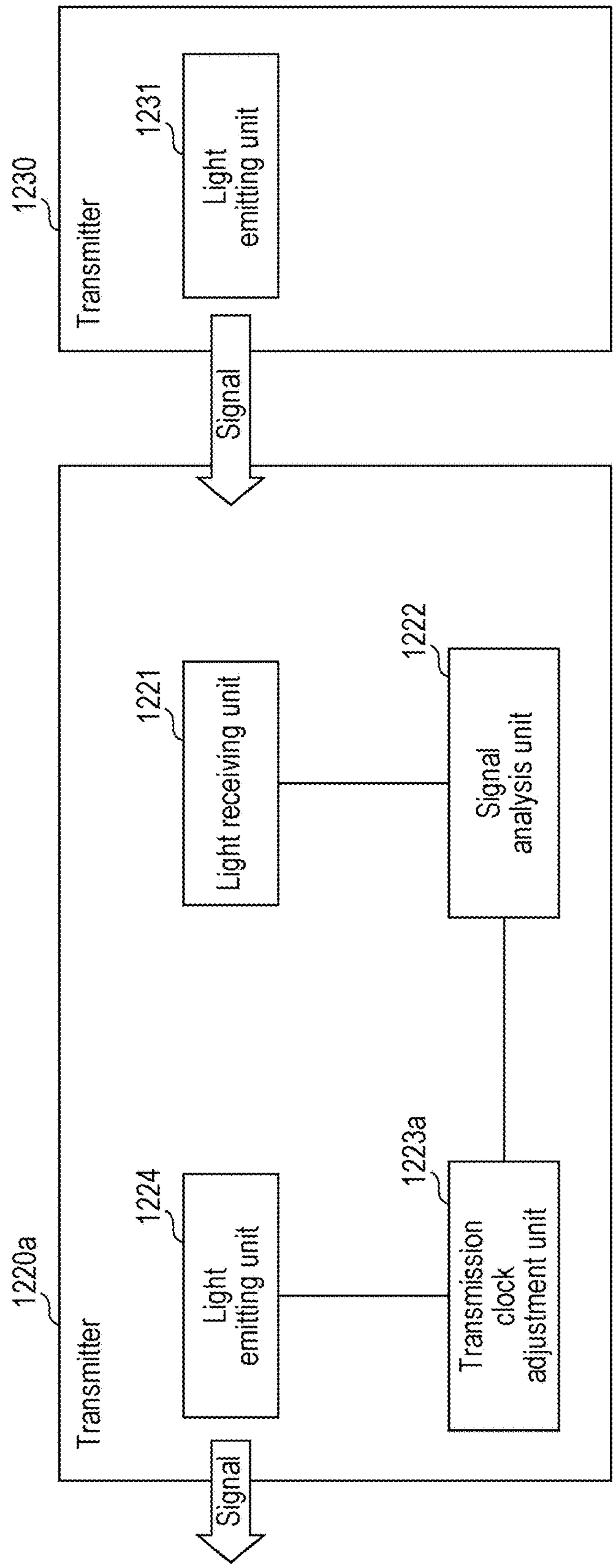
Figure 311B:
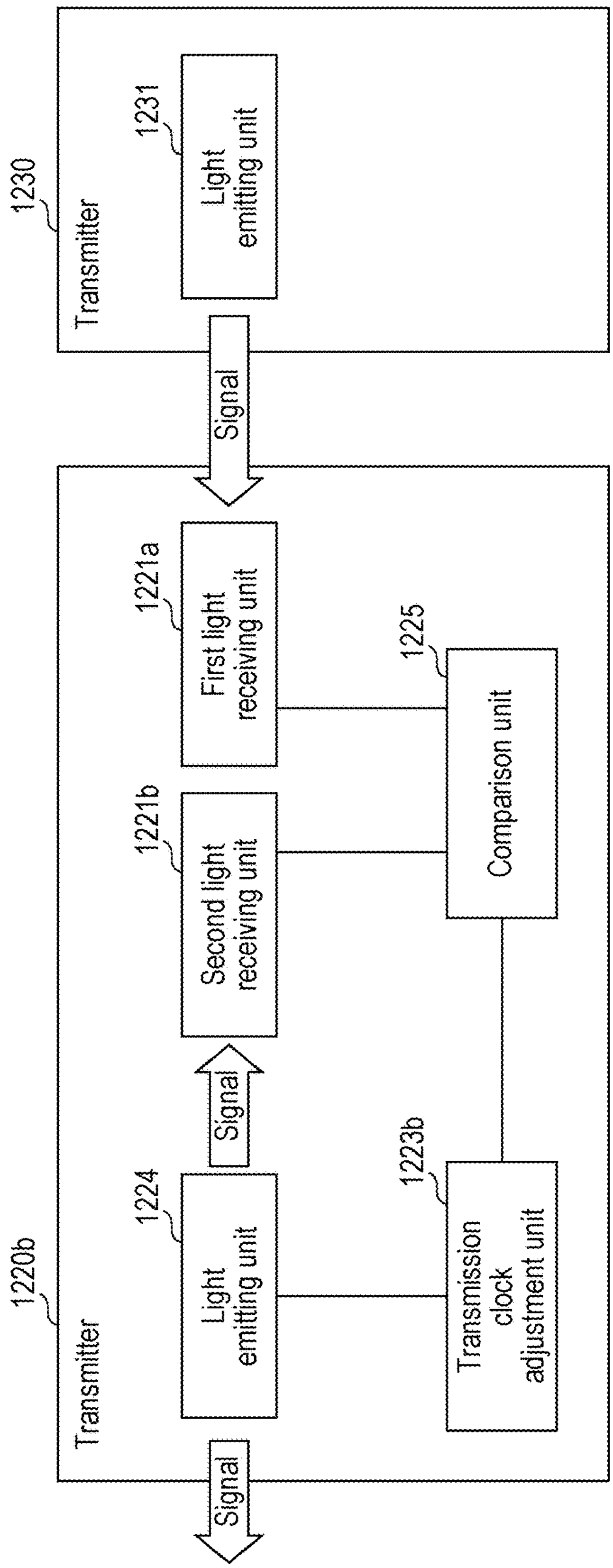
Figure 312A:
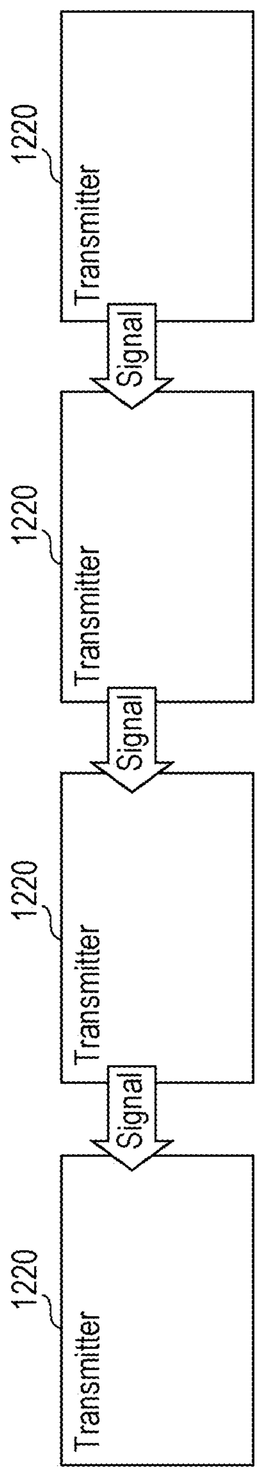
Figure 312B:
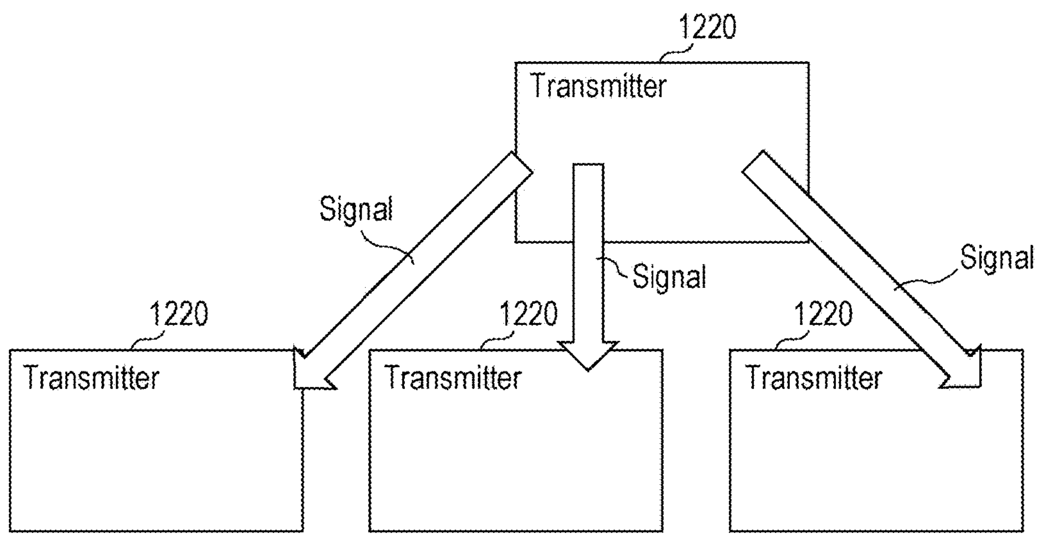
Figure 313:
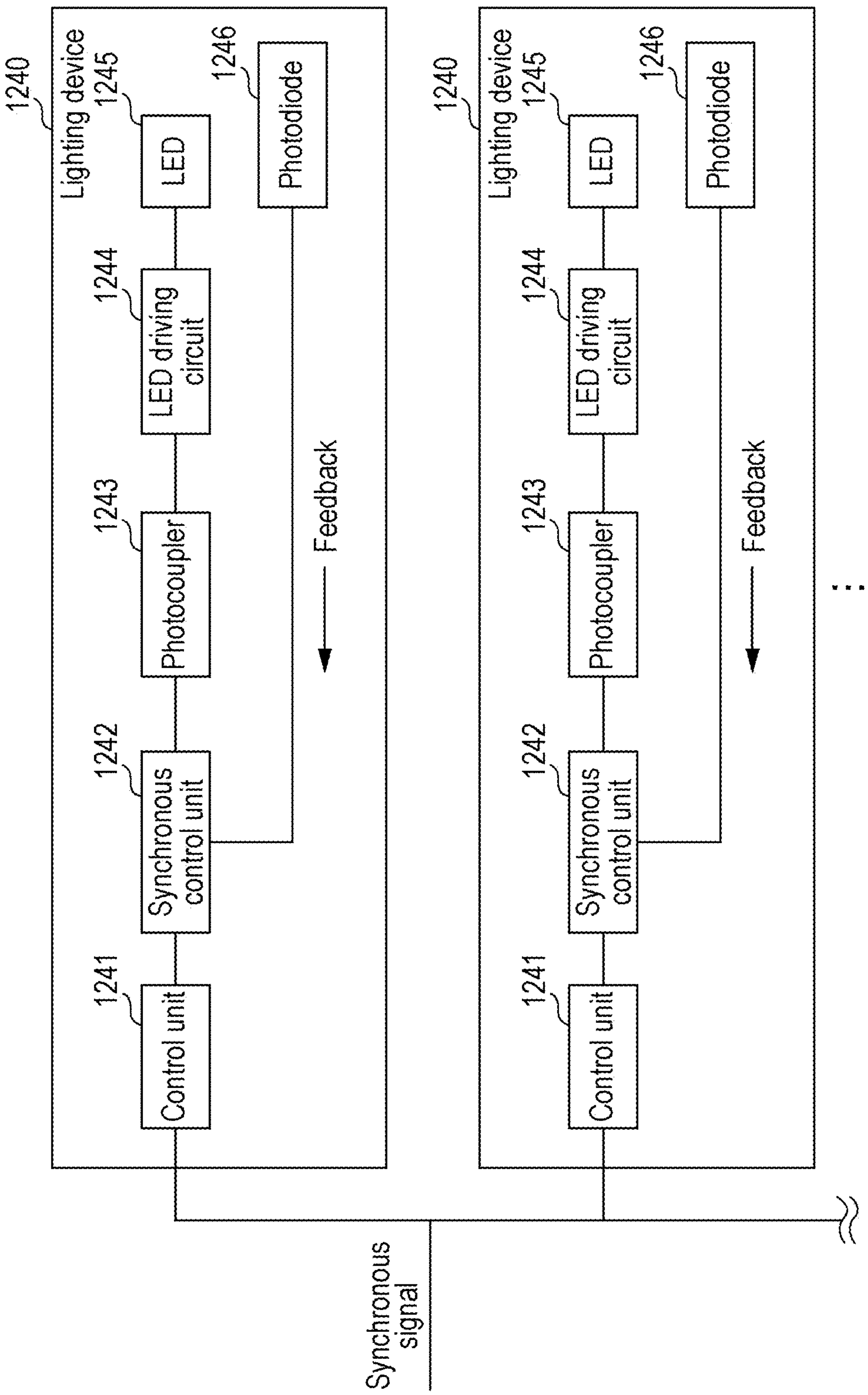
Figure 314:
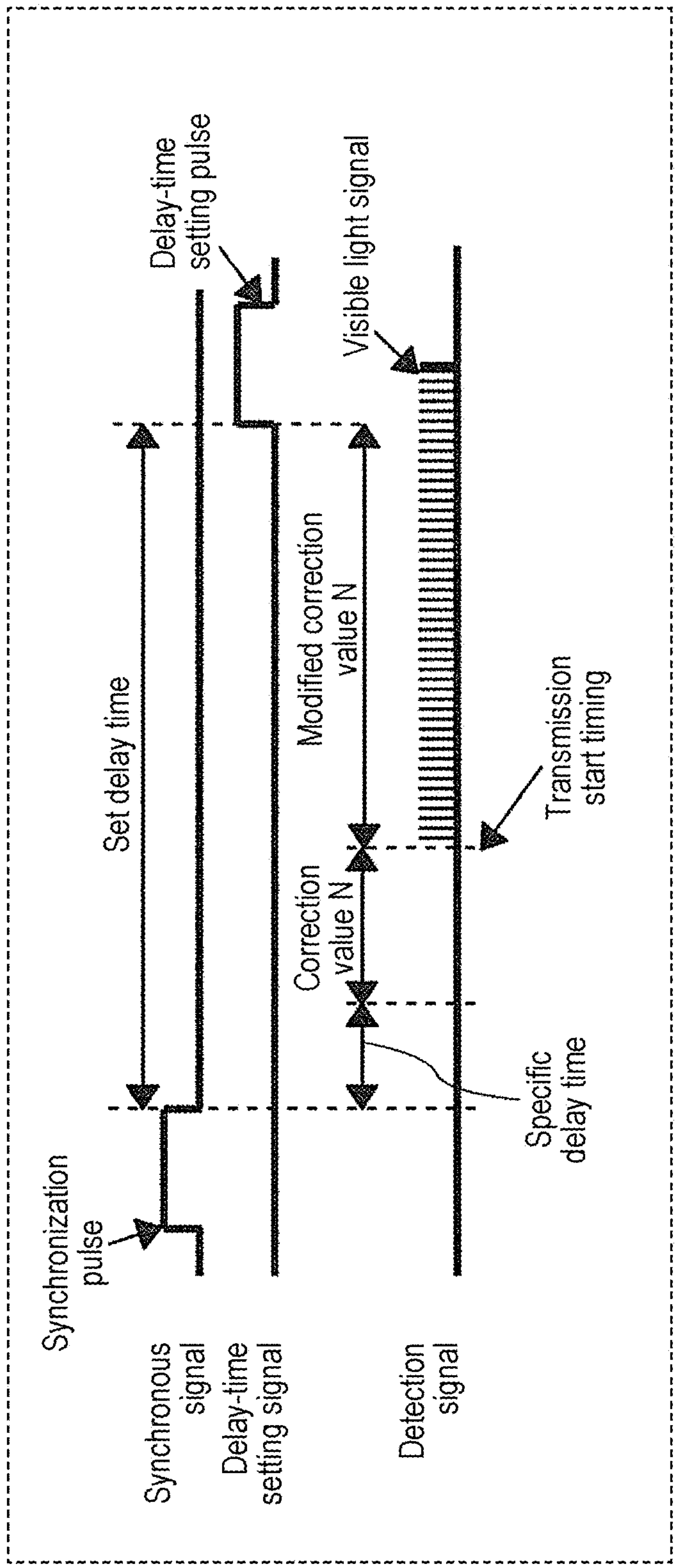
Figure 315:
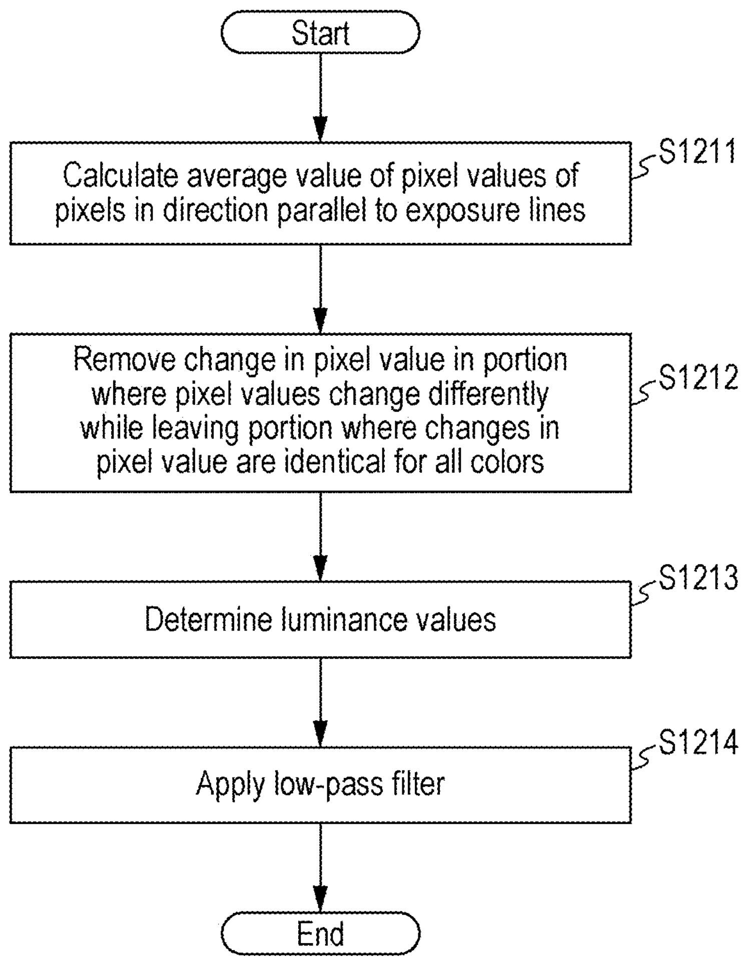
Figure 316:
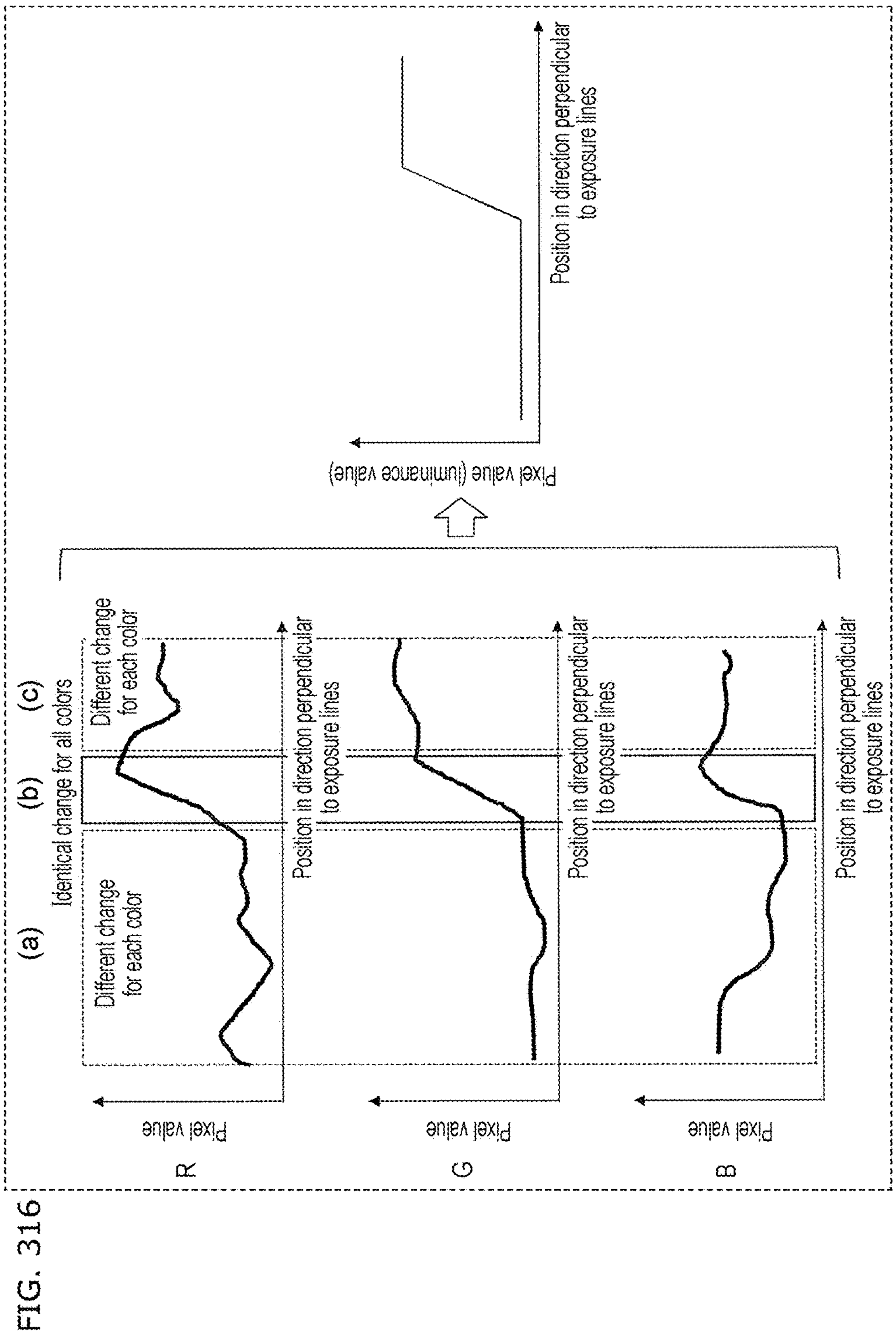
Figure 317:
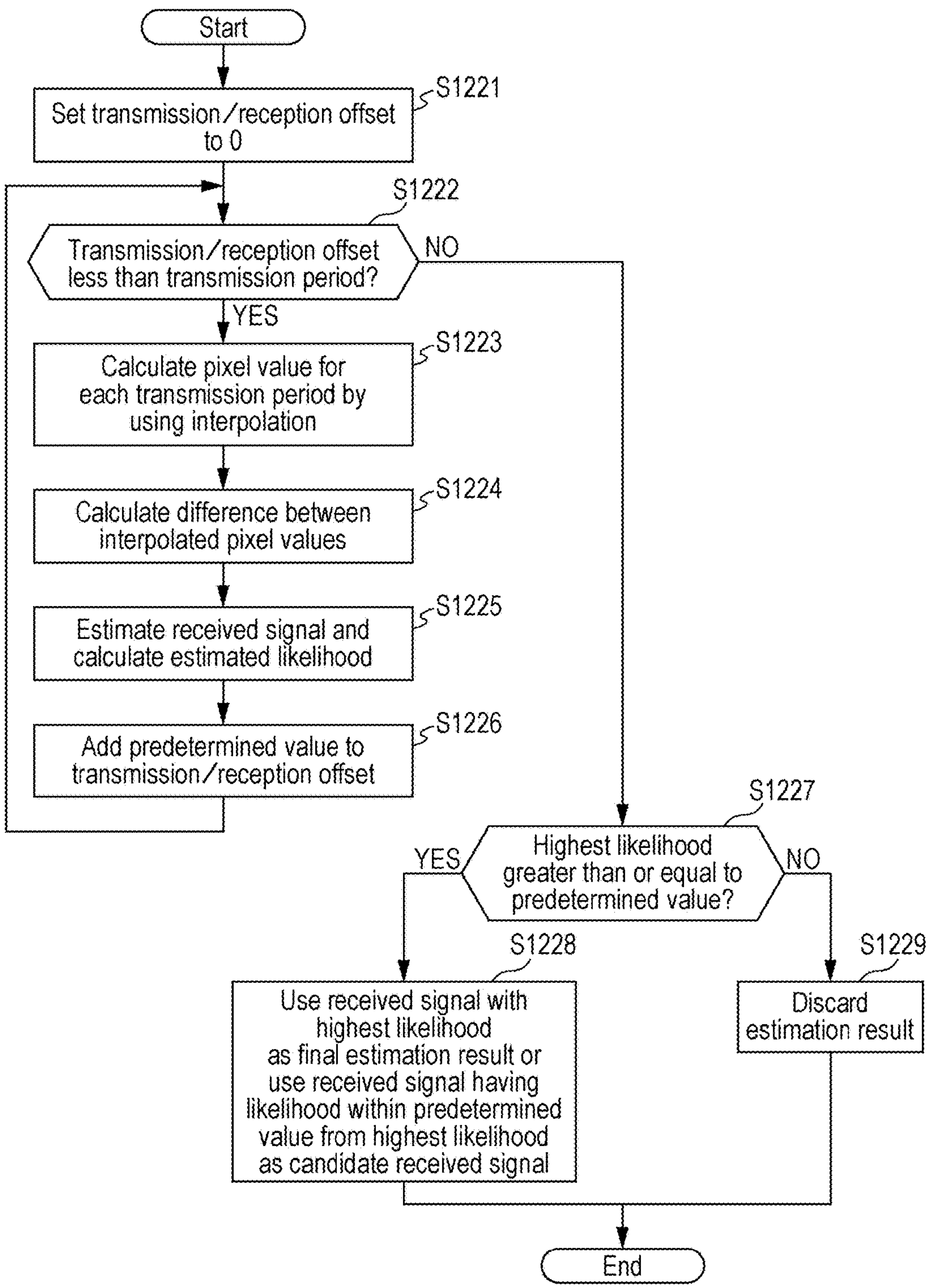
Figure 318:
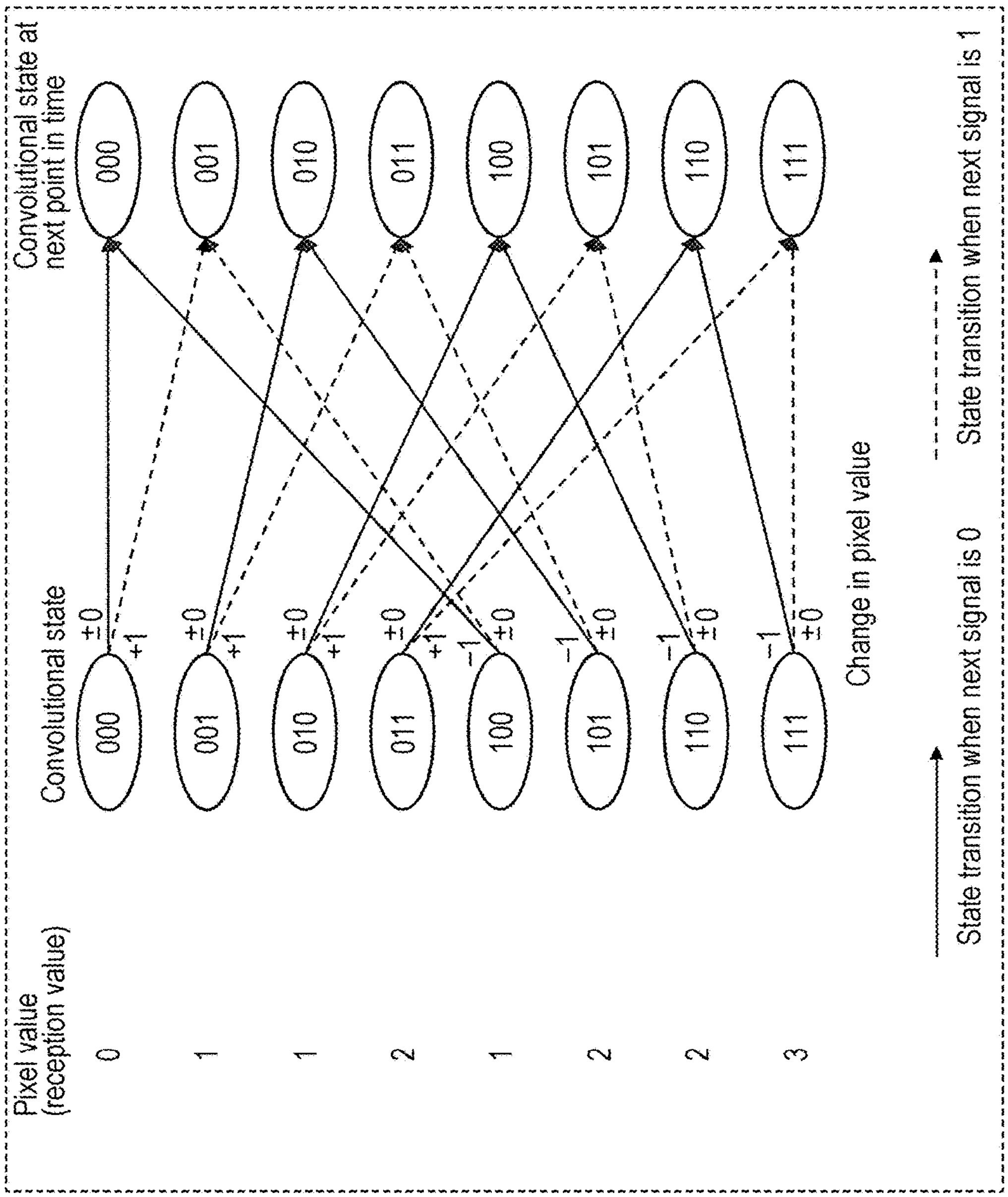
Figure 319:
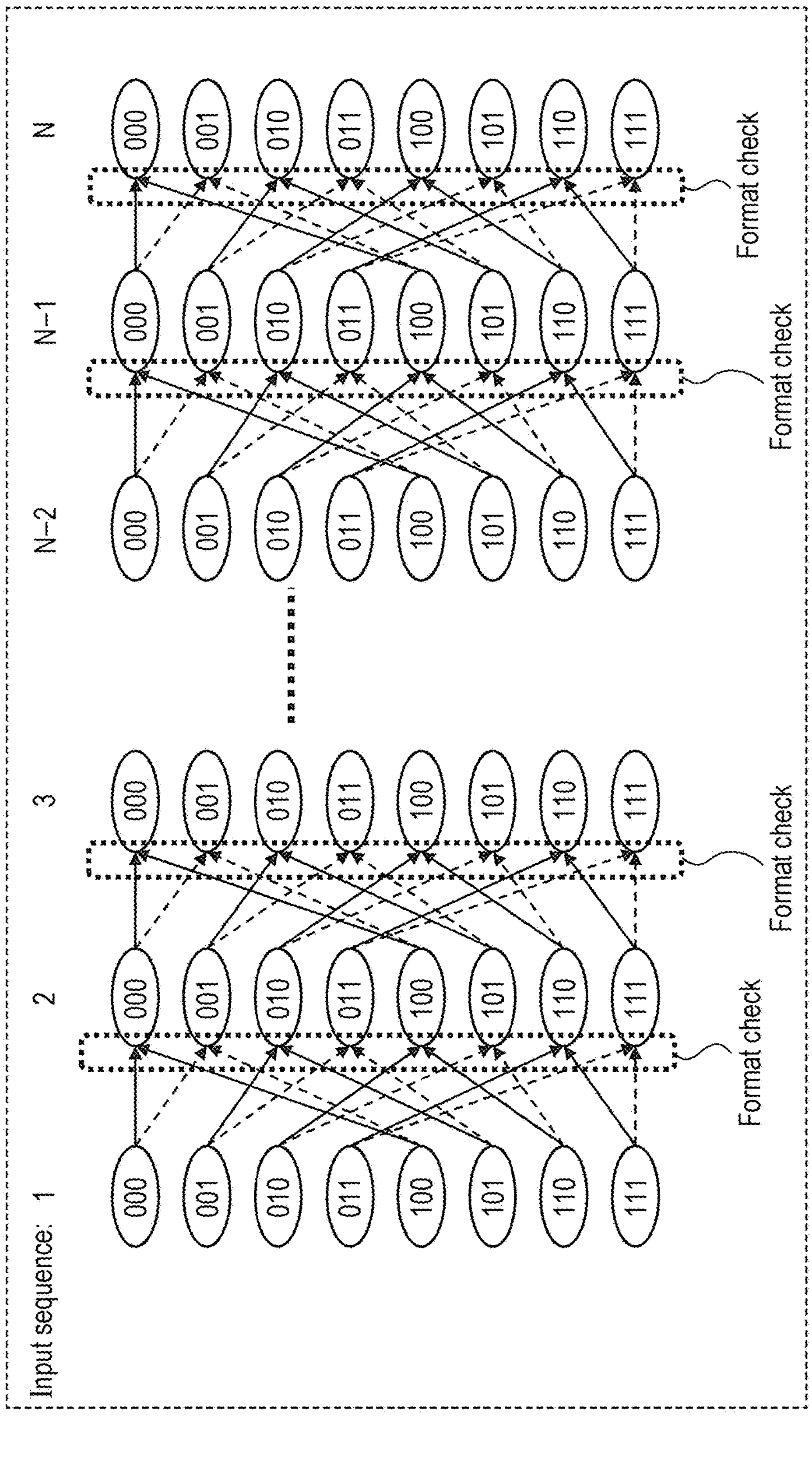
Figure 320:
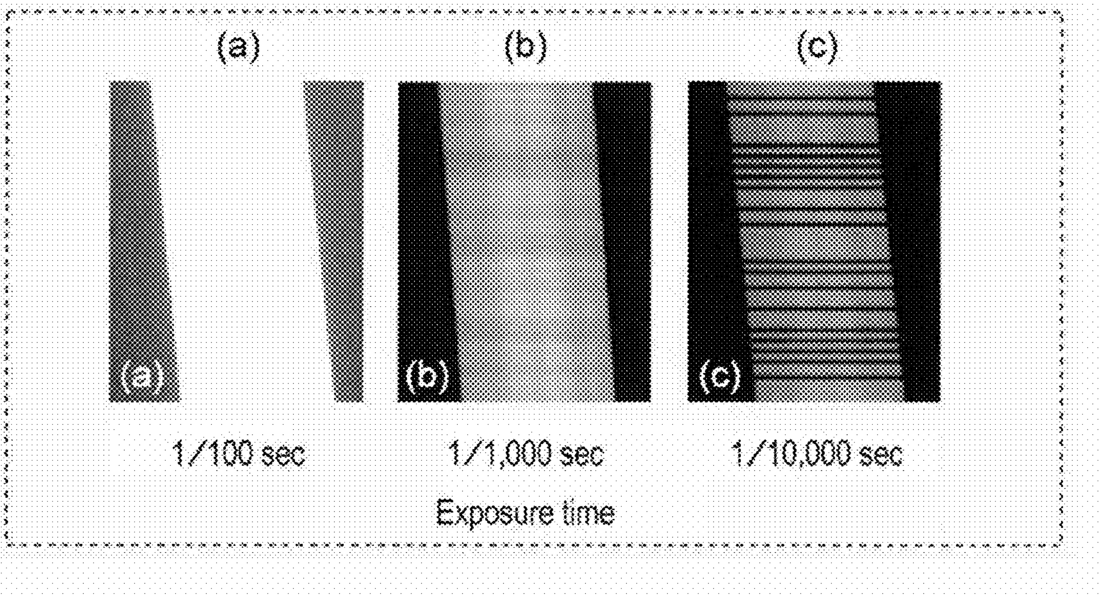
Figure 321:
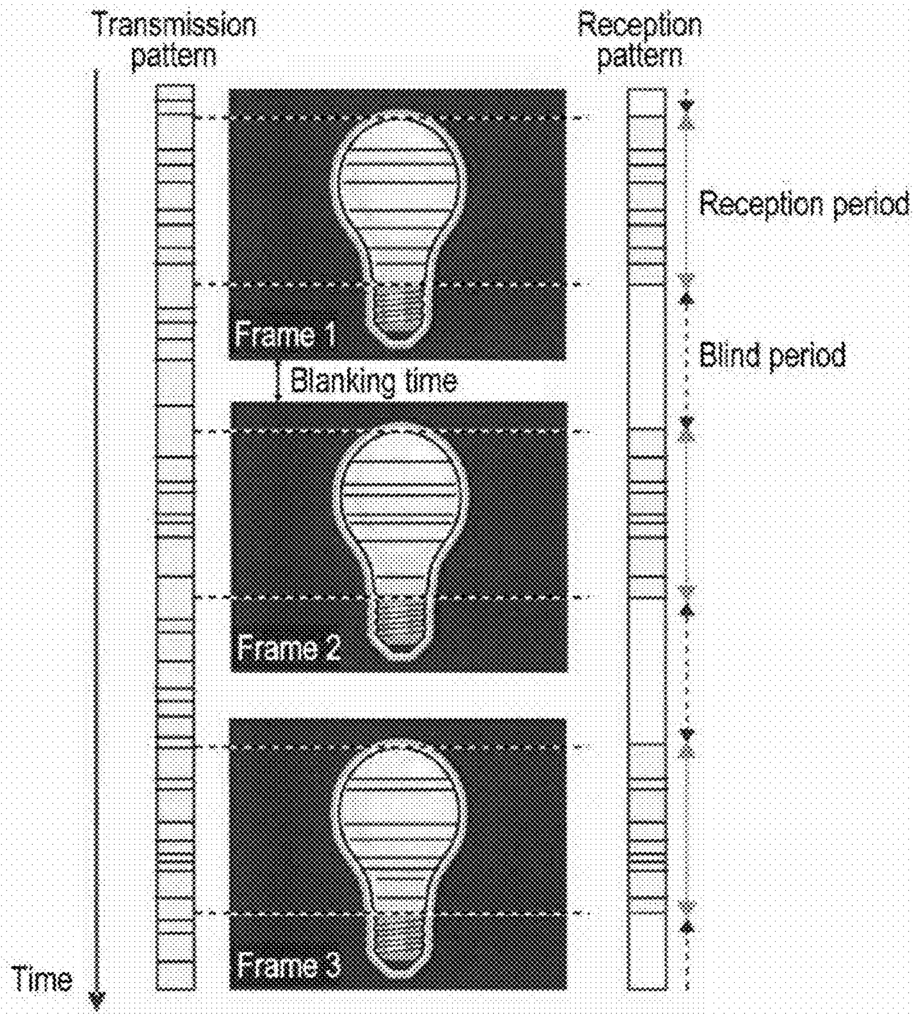
Figure 322:
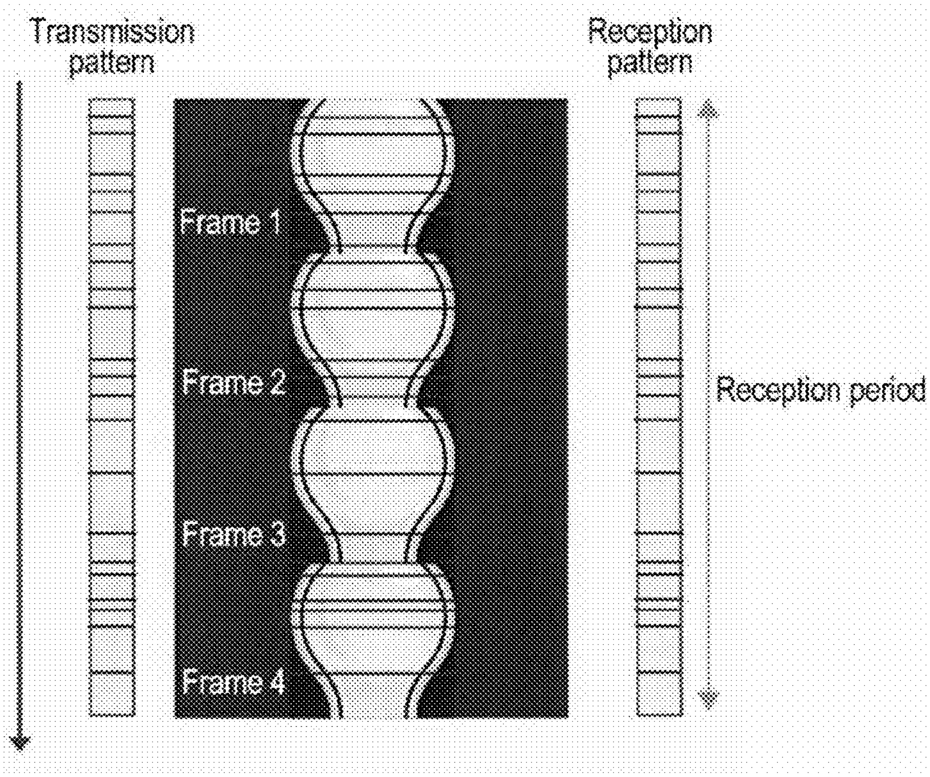
Figure 323:
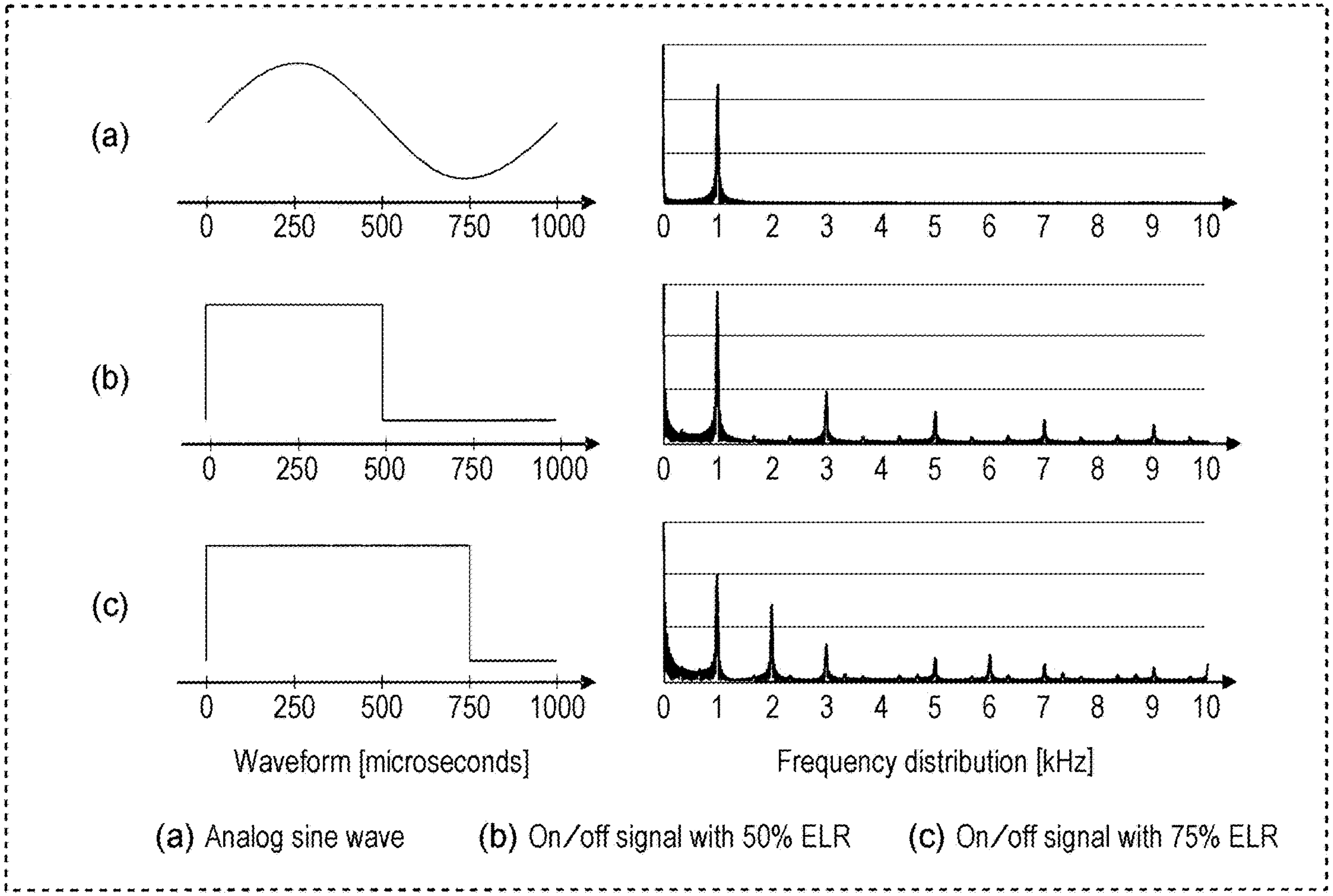
Figure 324:
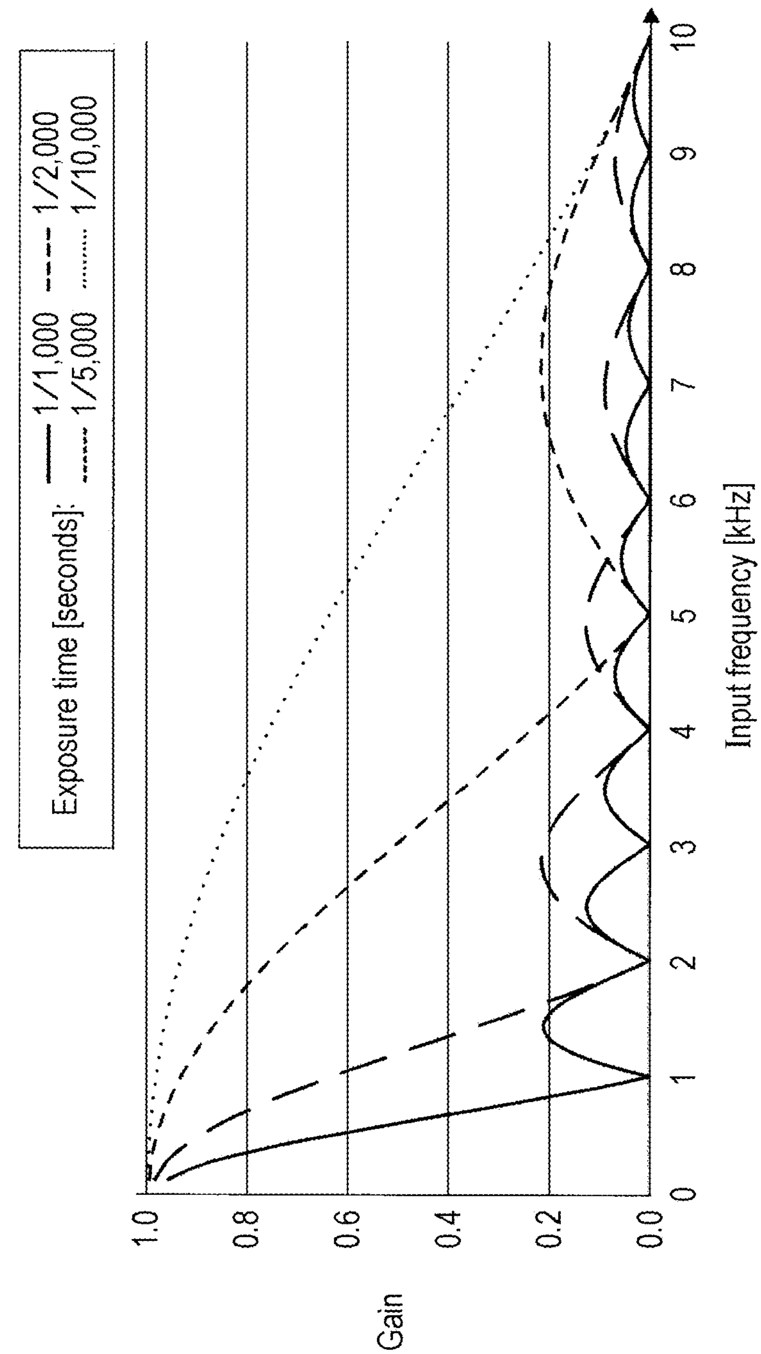
Figure 325:
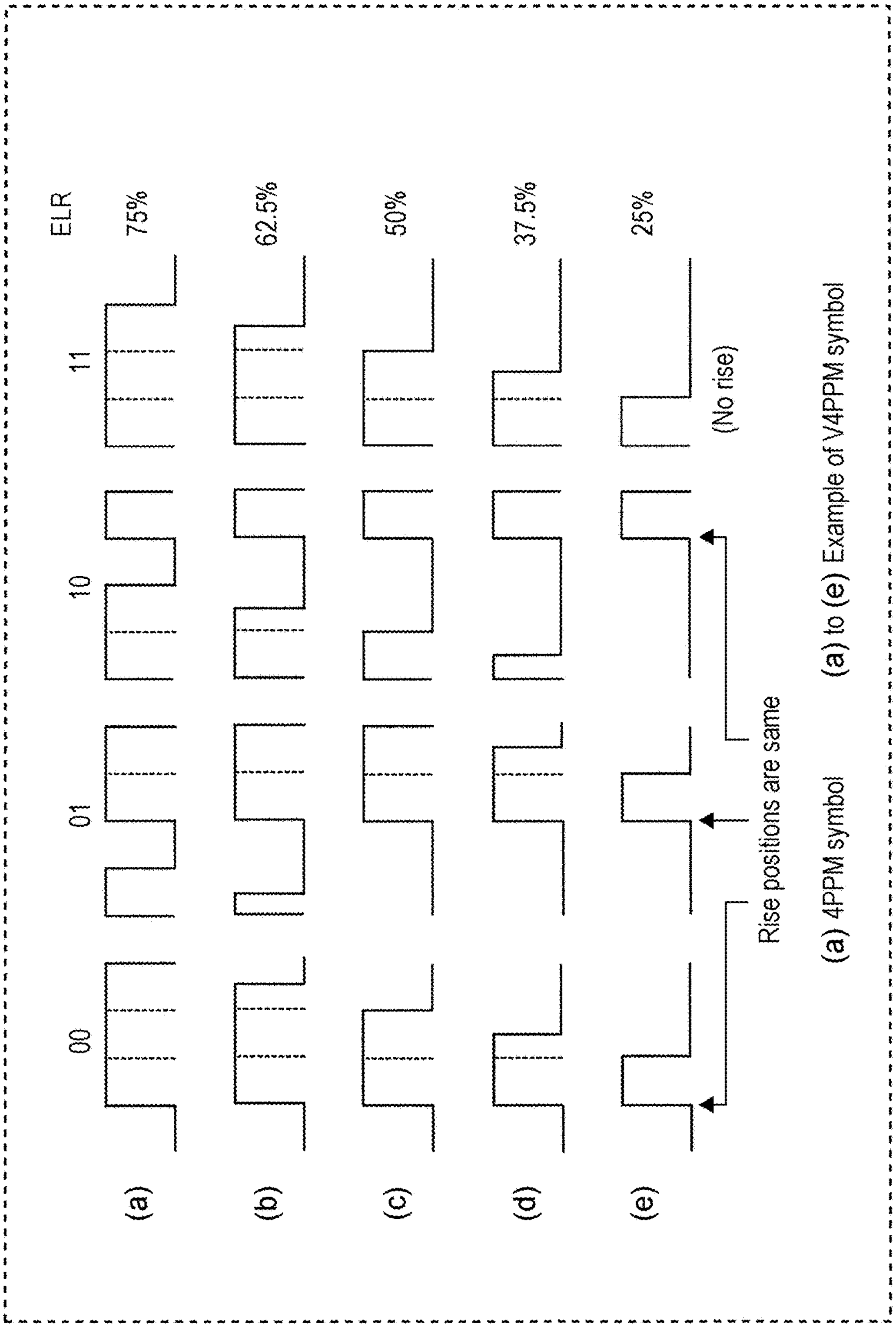
Figure 326:
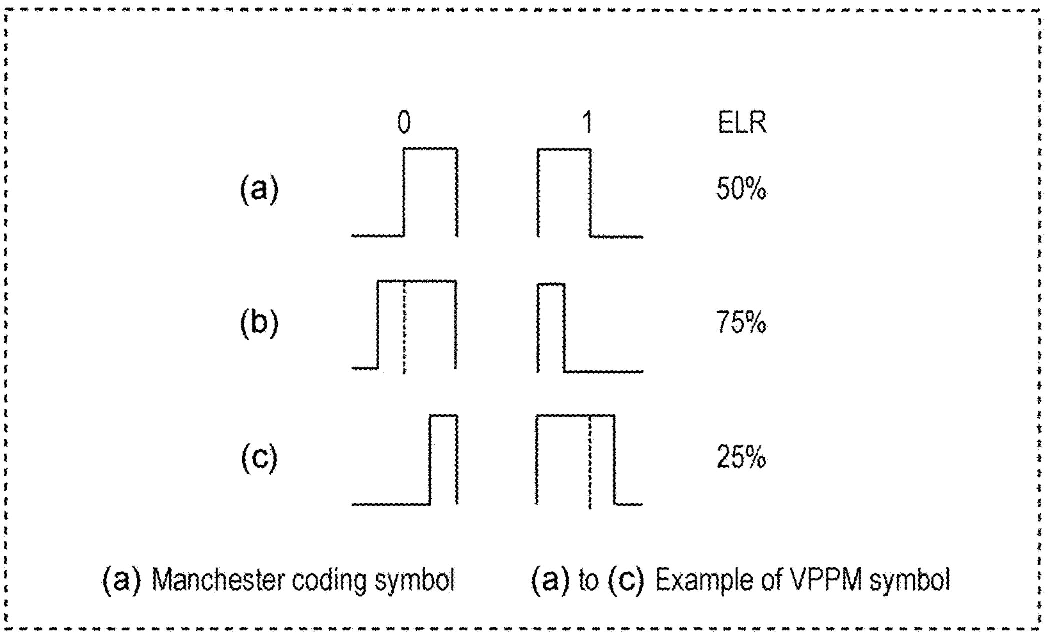
Figure 327:
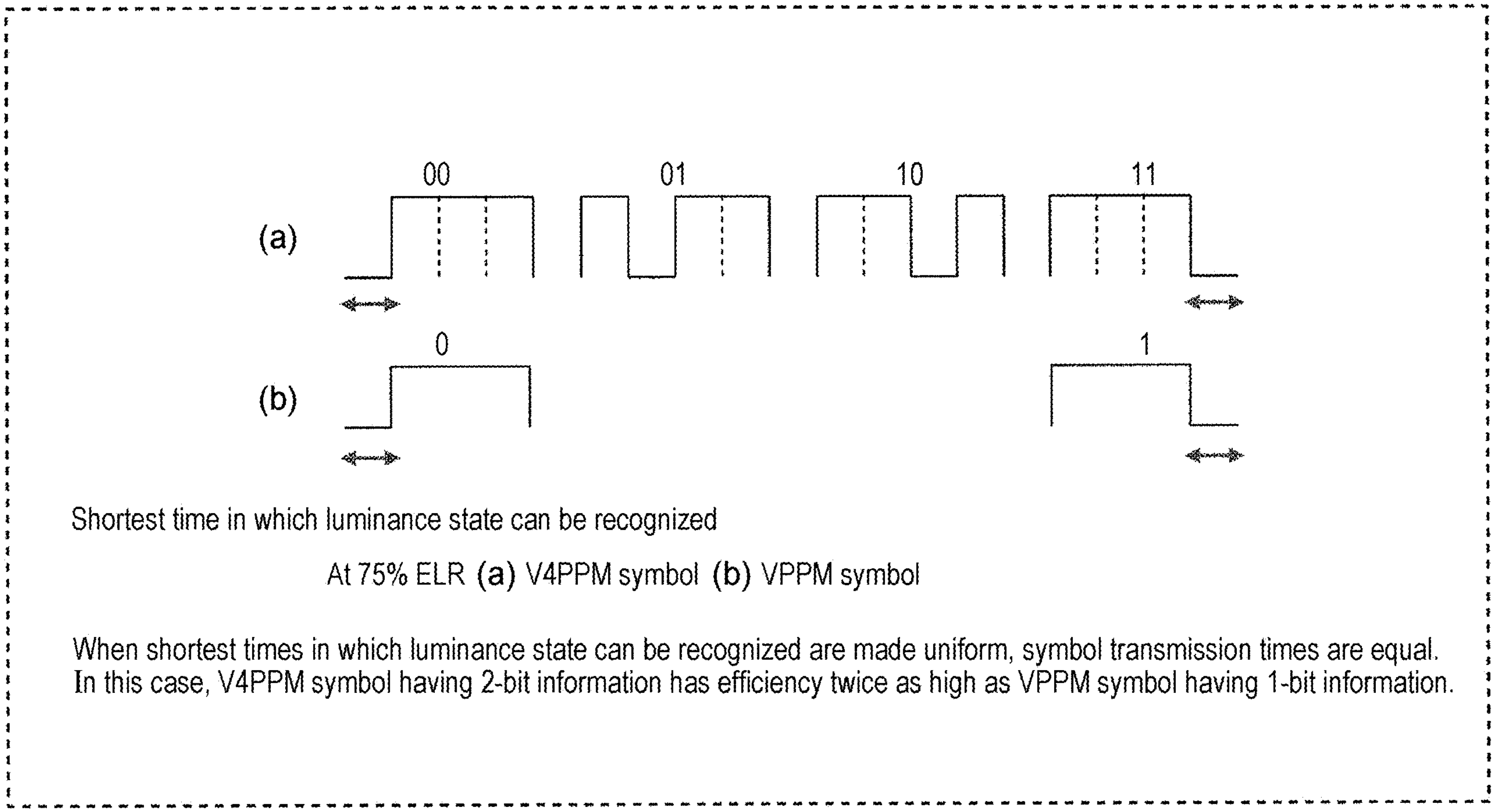
Figure 328:
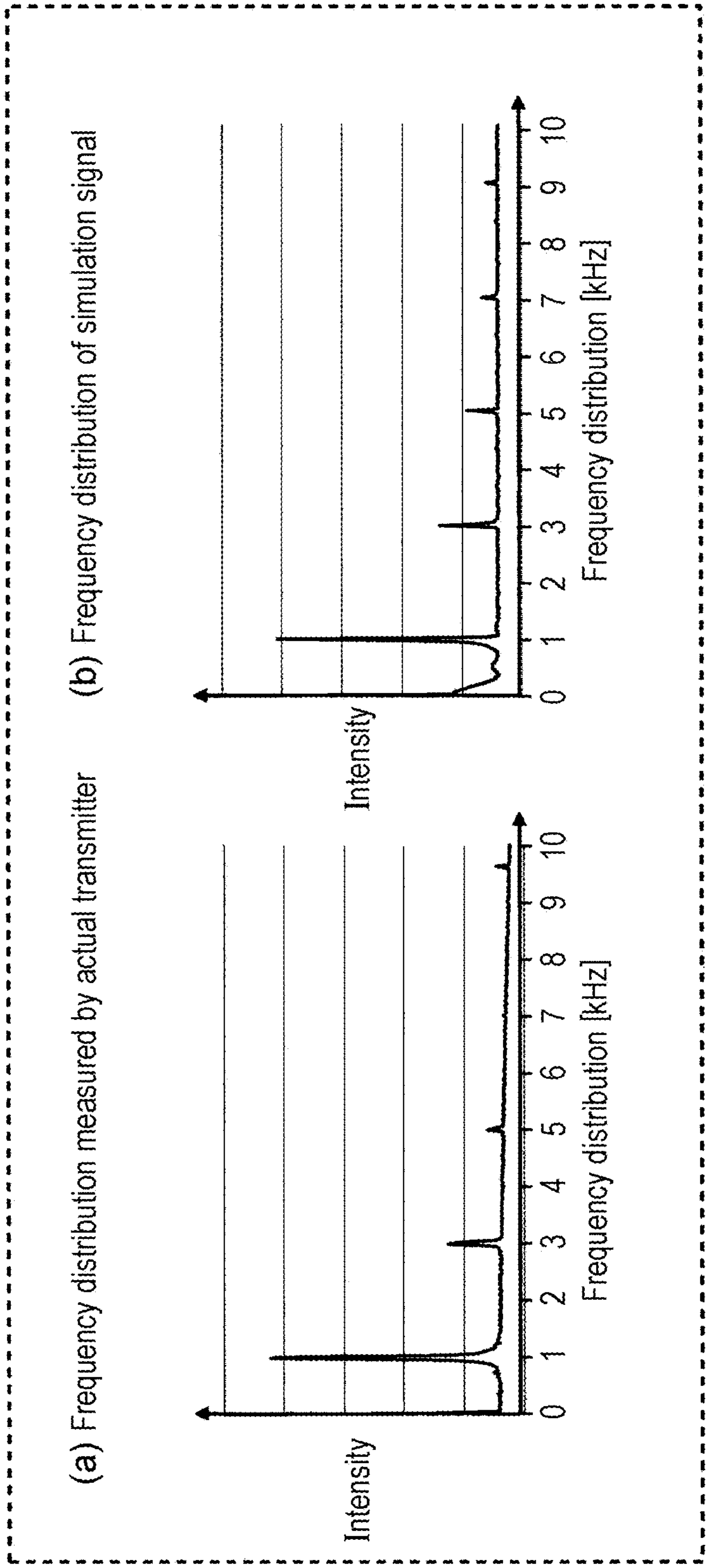
Figure 329A:
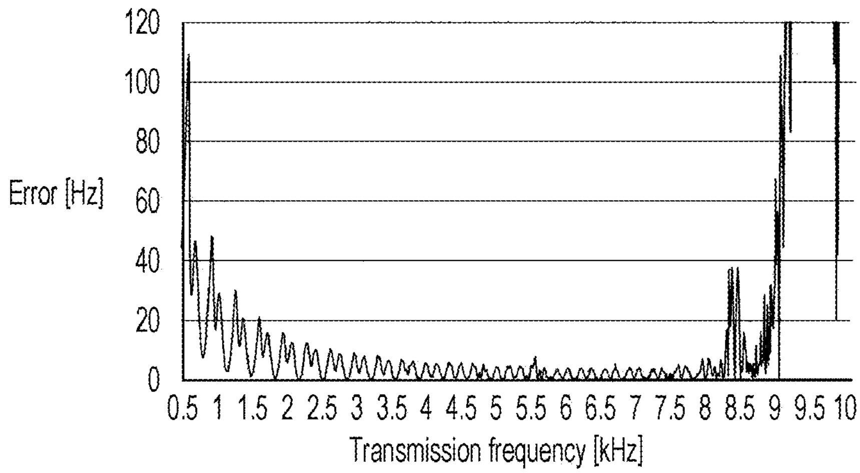
Figure 329B:
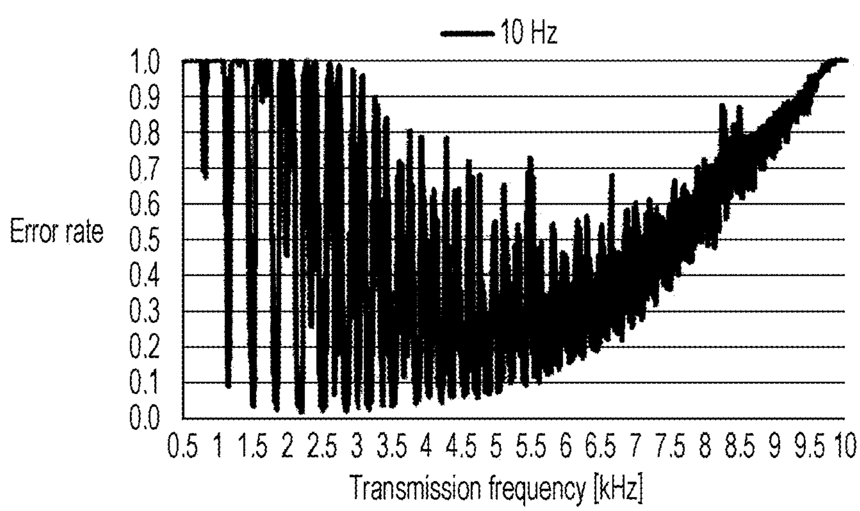
Figure 329C:
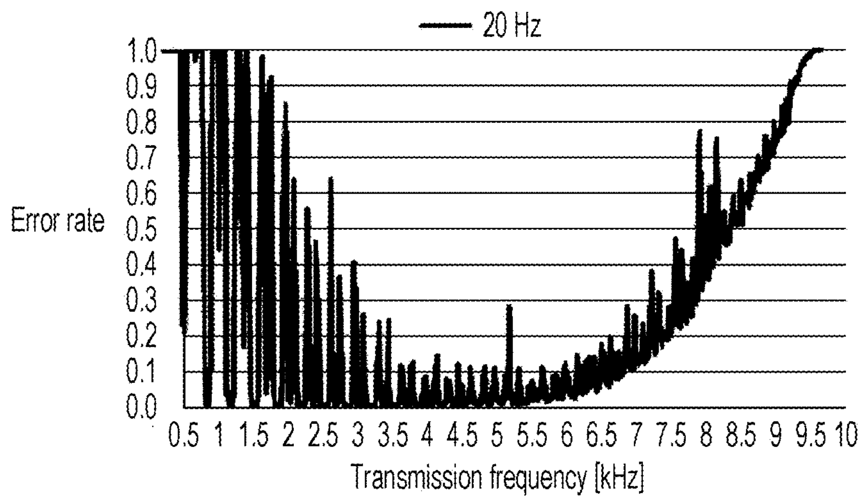
Figure 329D:
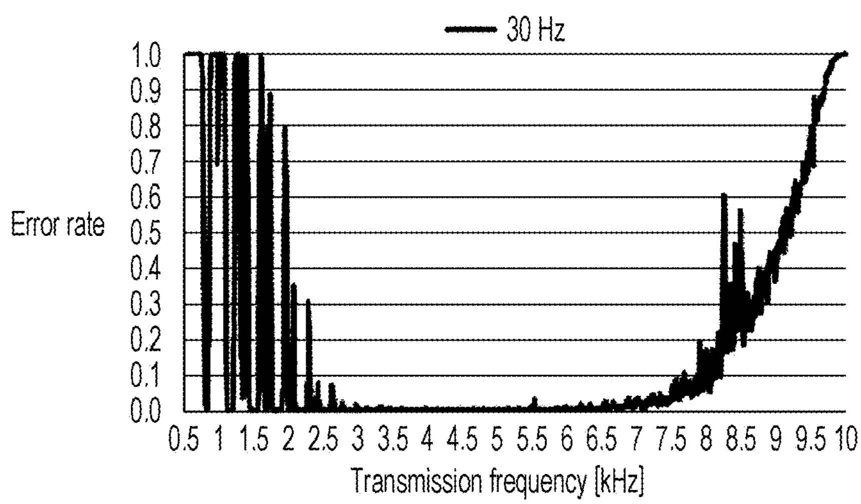
Figure 329E:
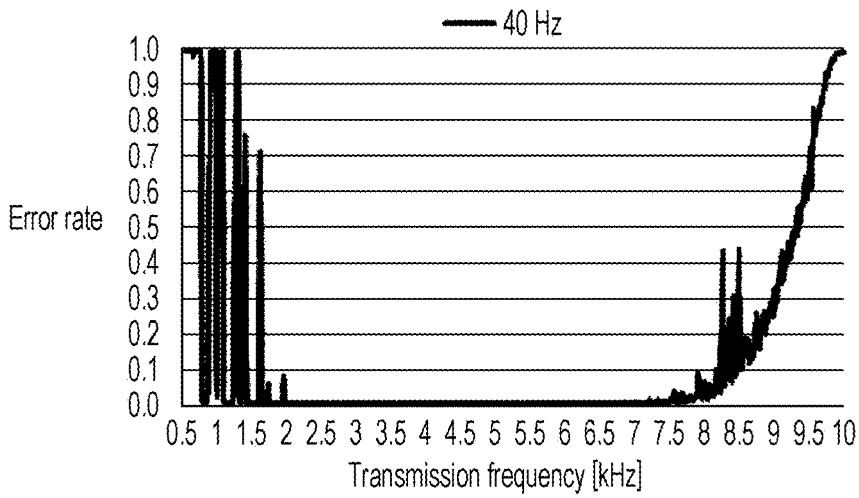
Figure 329F:
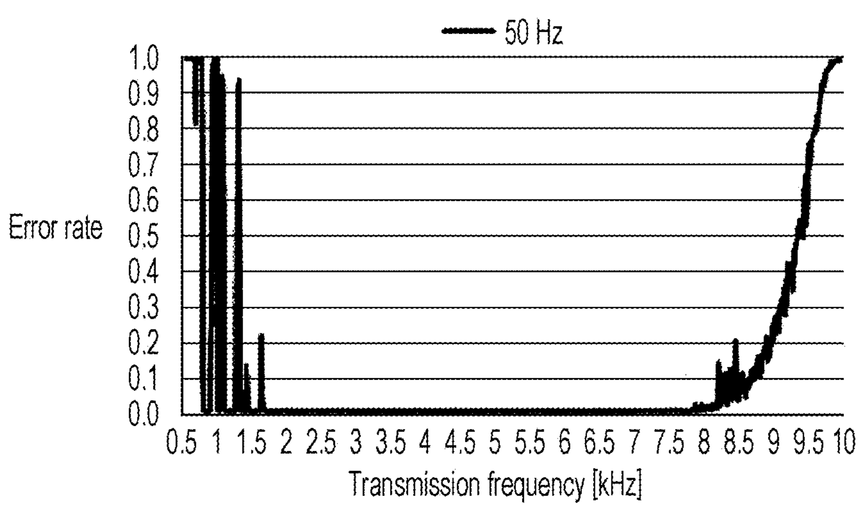
Figure 330:
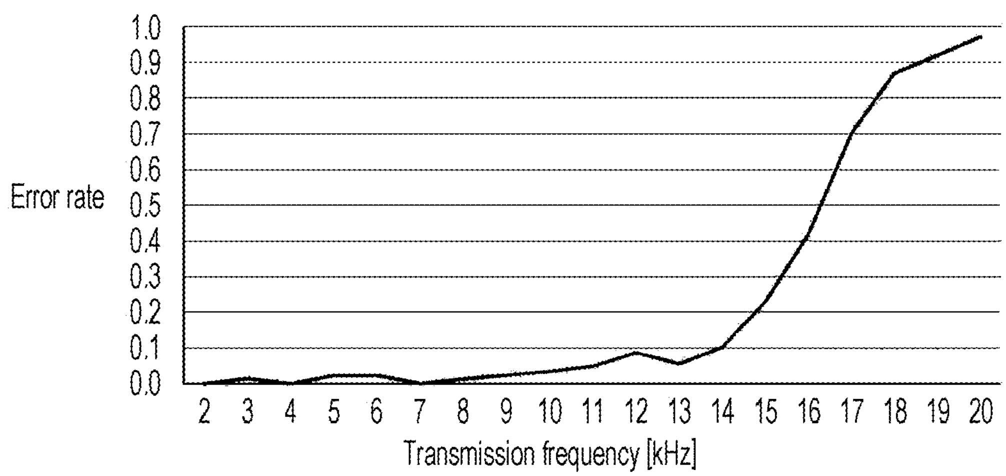
Figure 331:
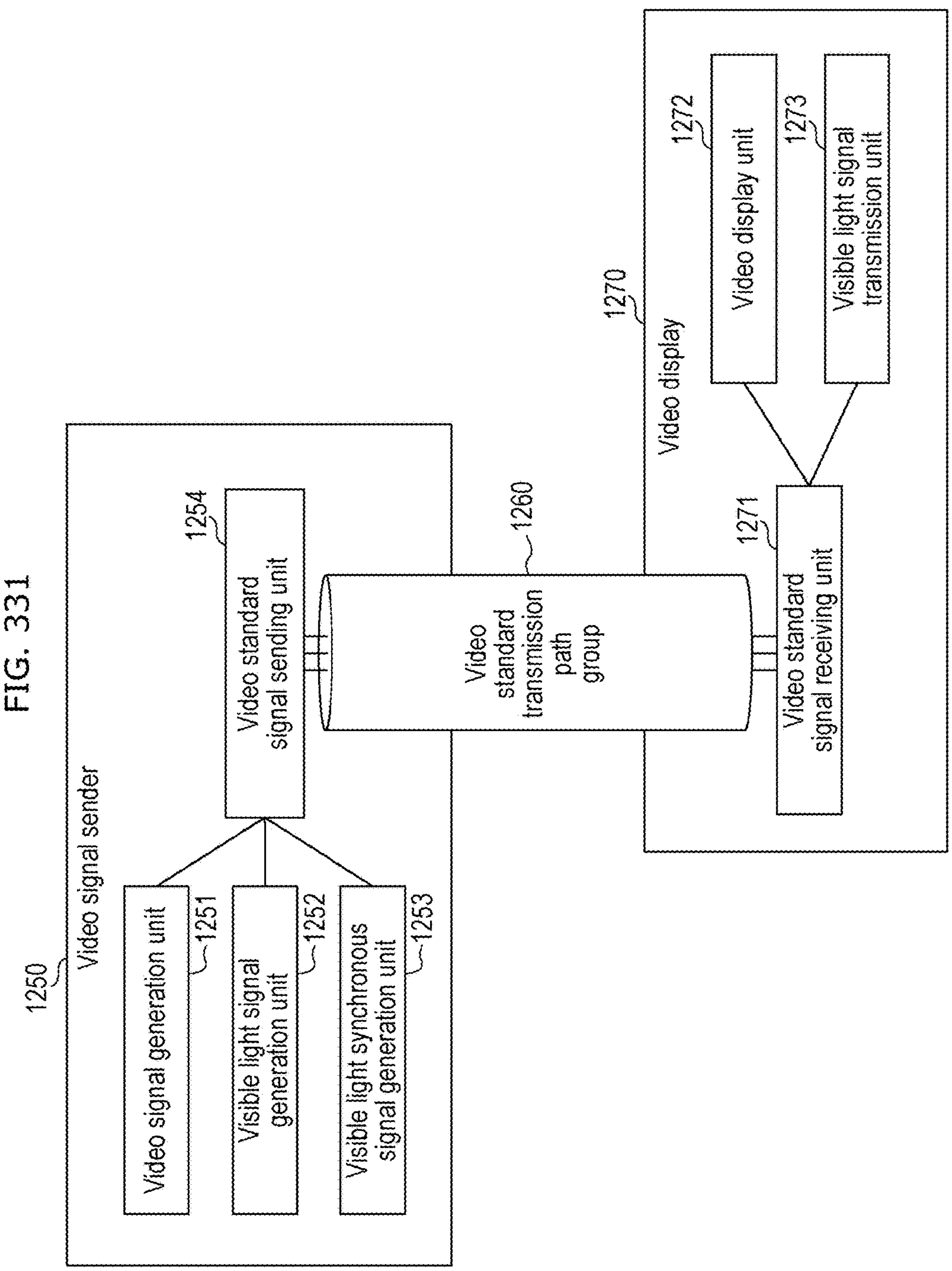
Figure 332:
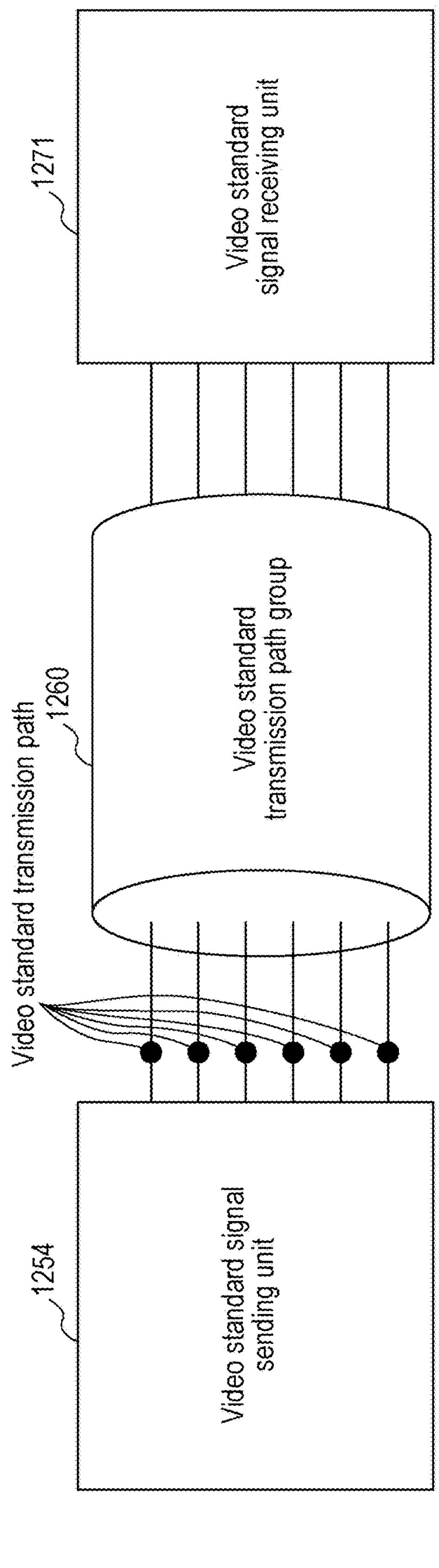
Figure 333:
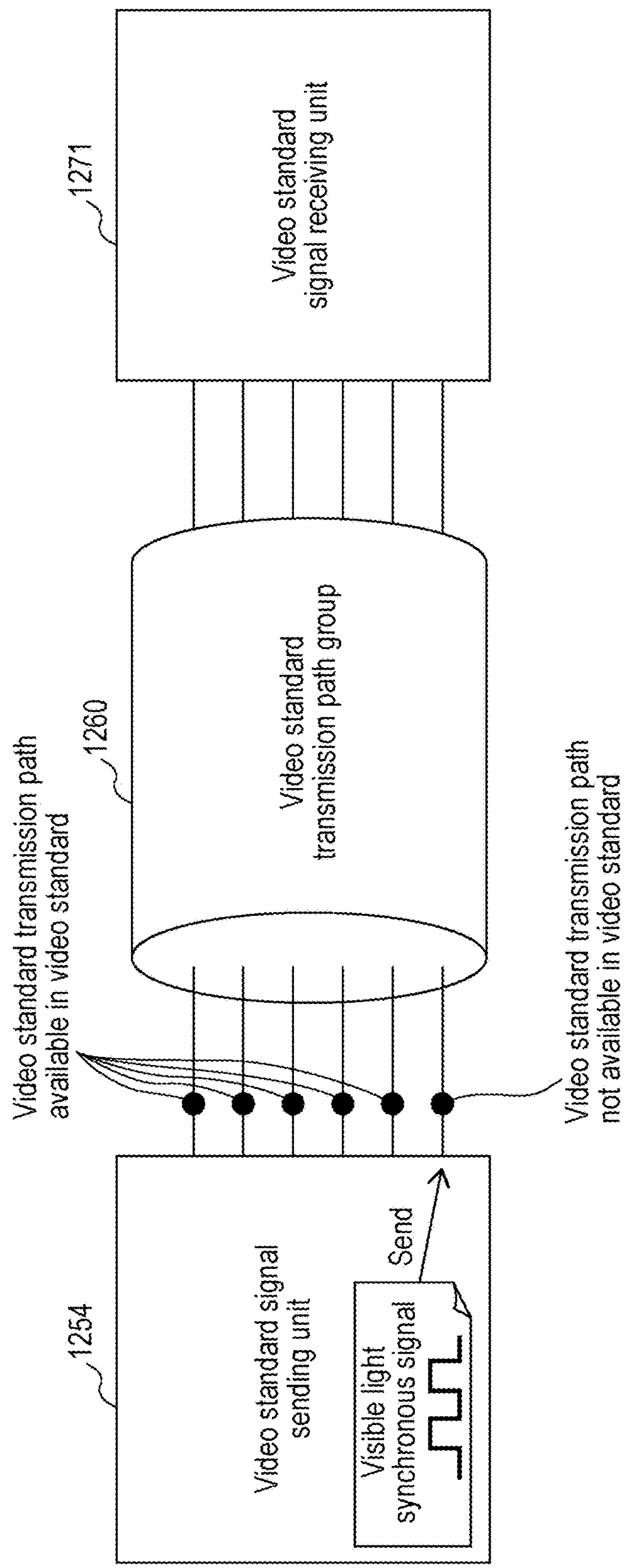
Figure 334:
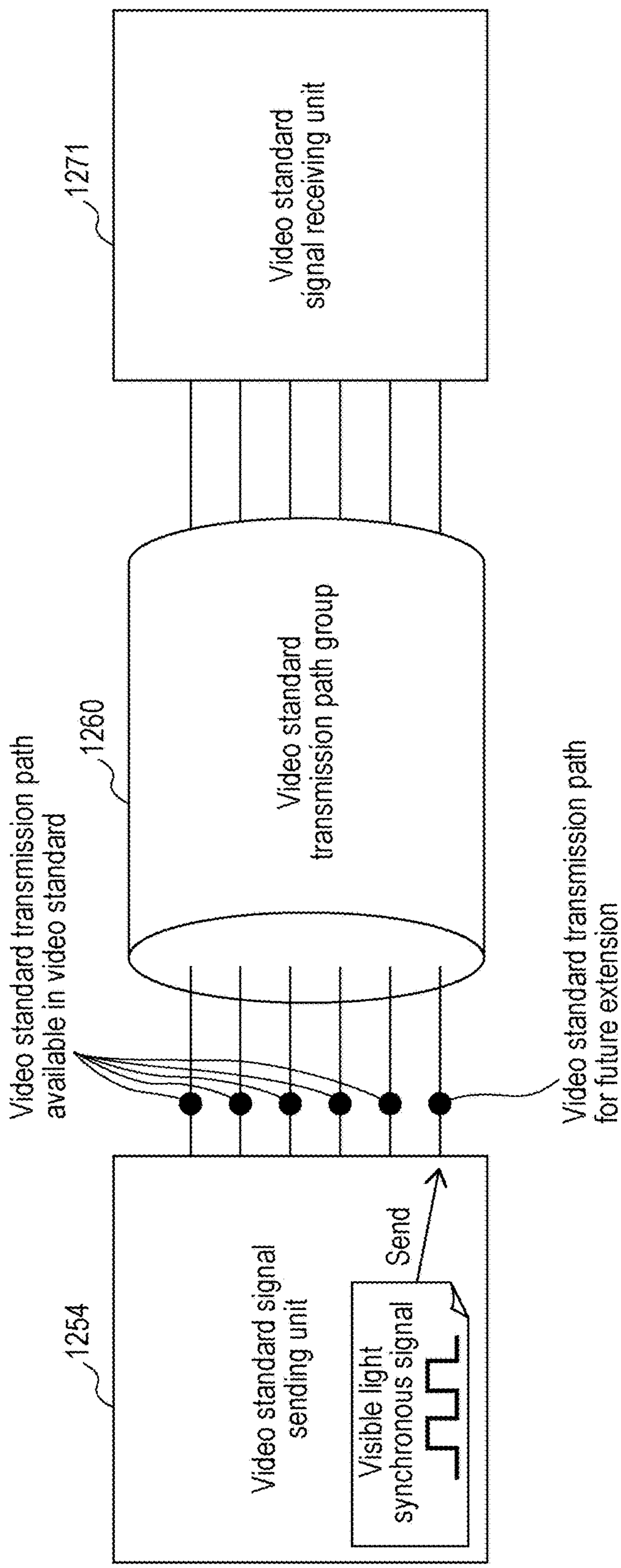
Figure 335:
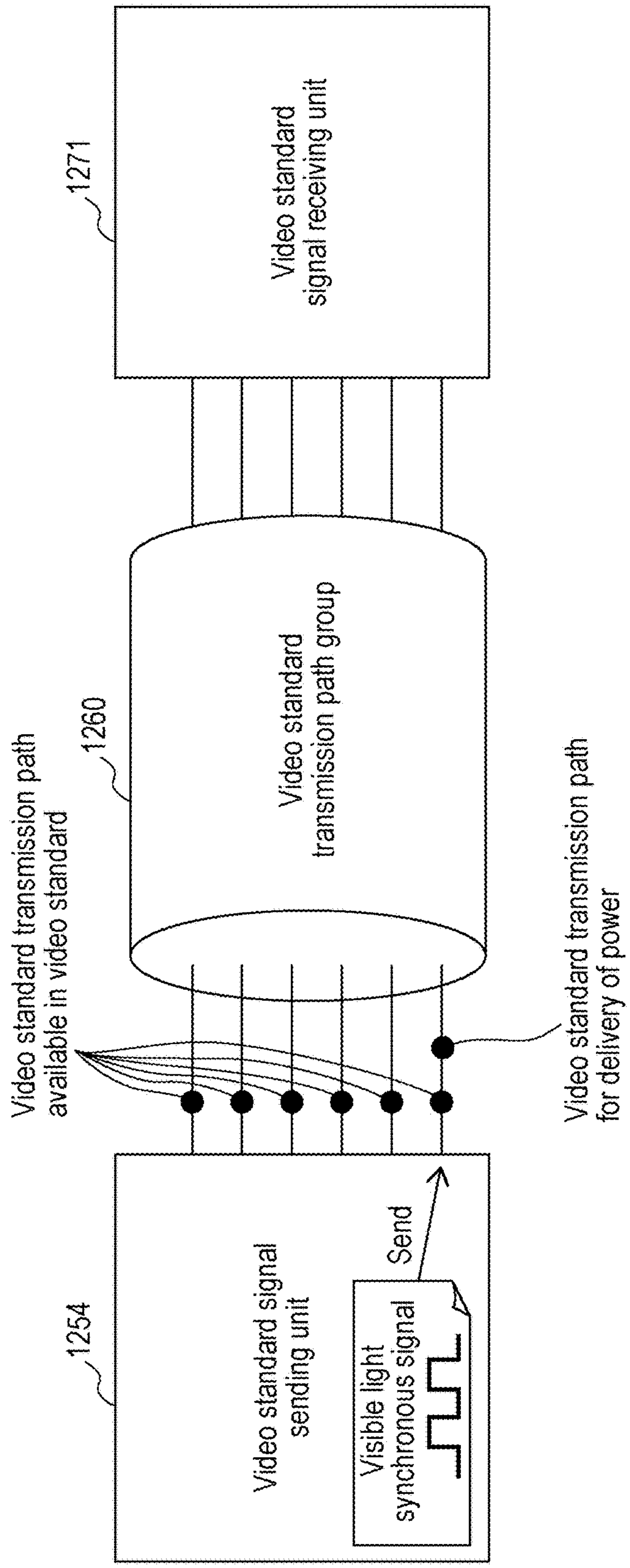
Figure 336A:
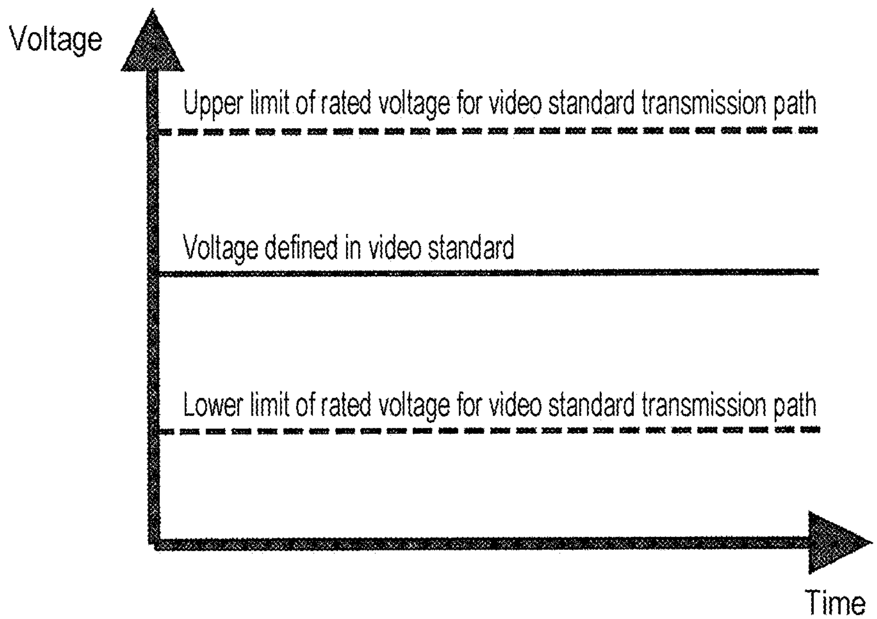
Figure 336B:
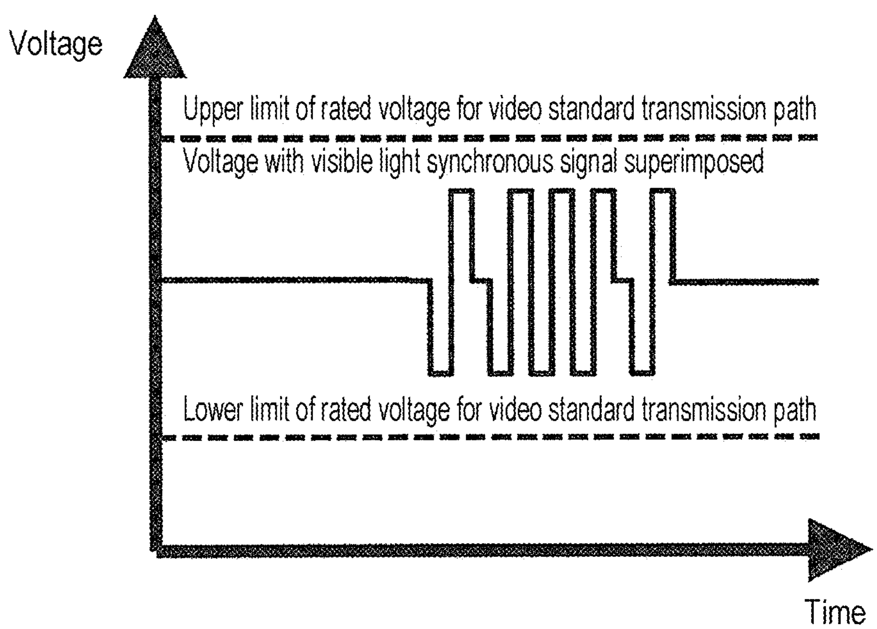
Figure 337:
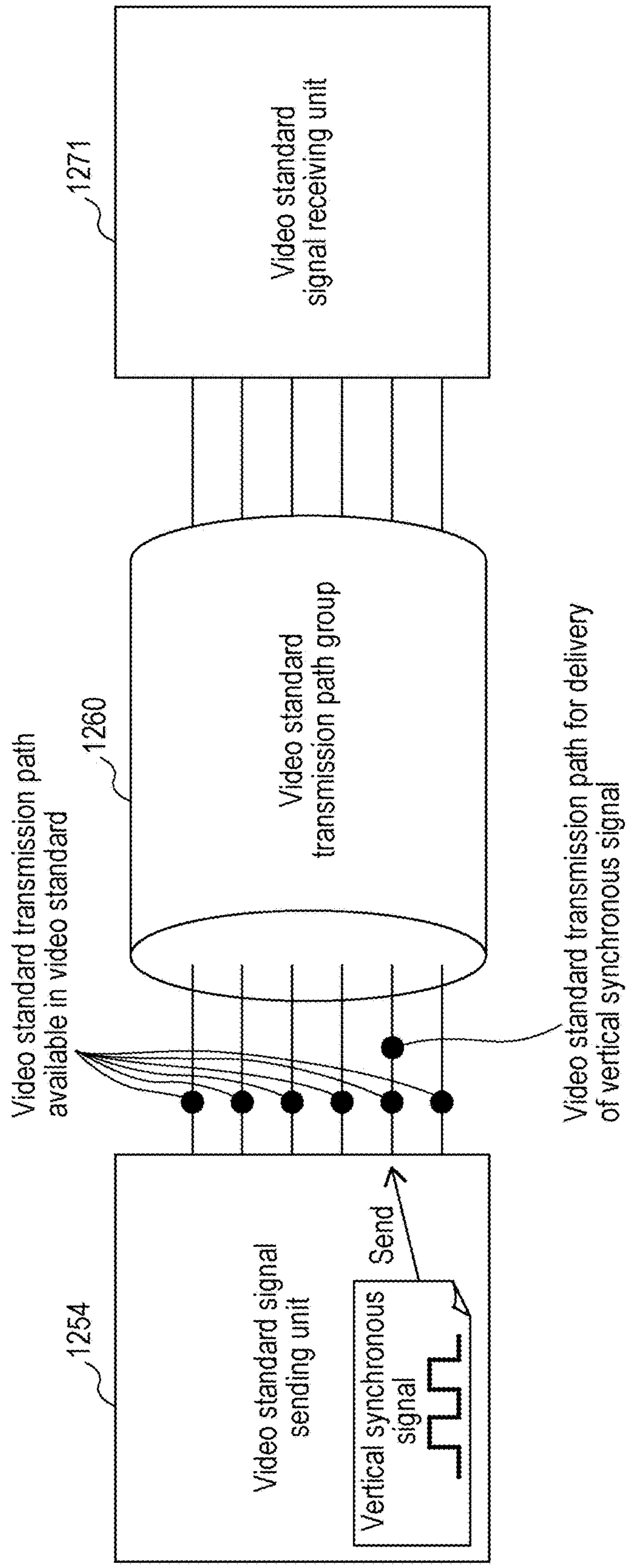
Figure 338:
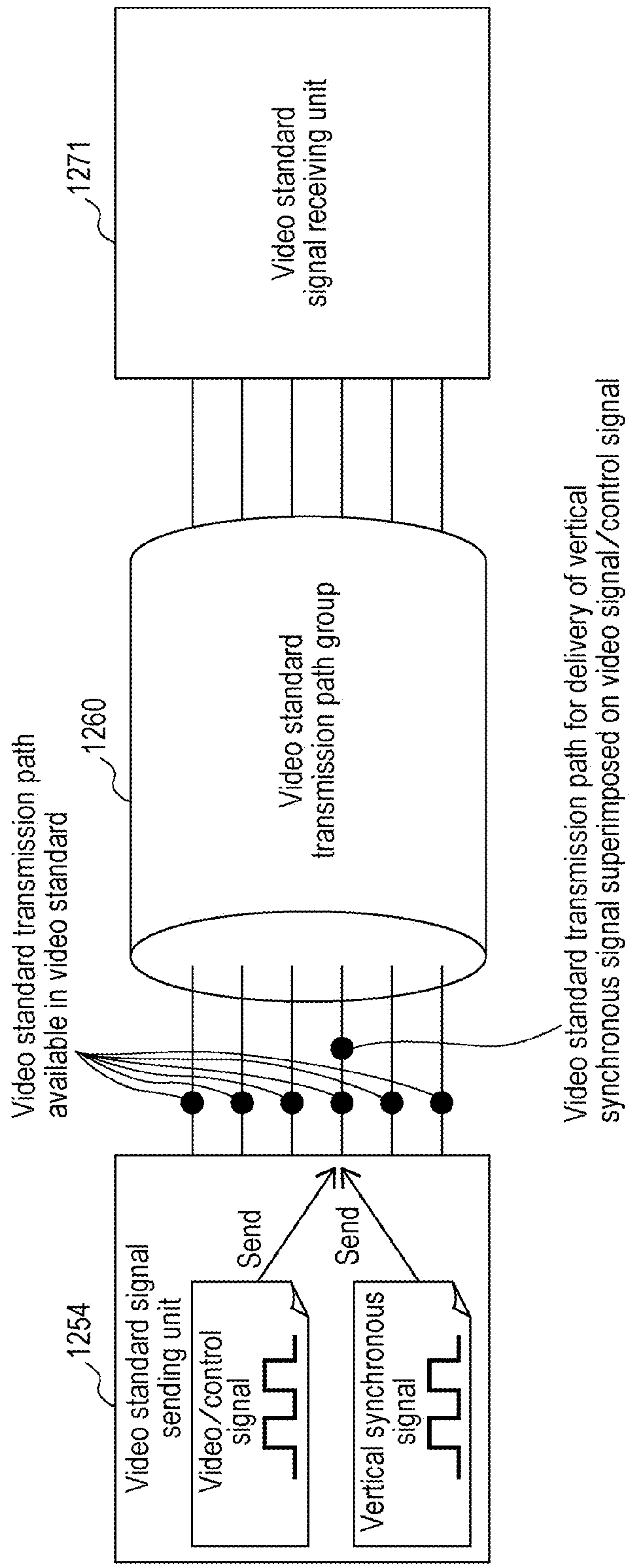
Figure 339:
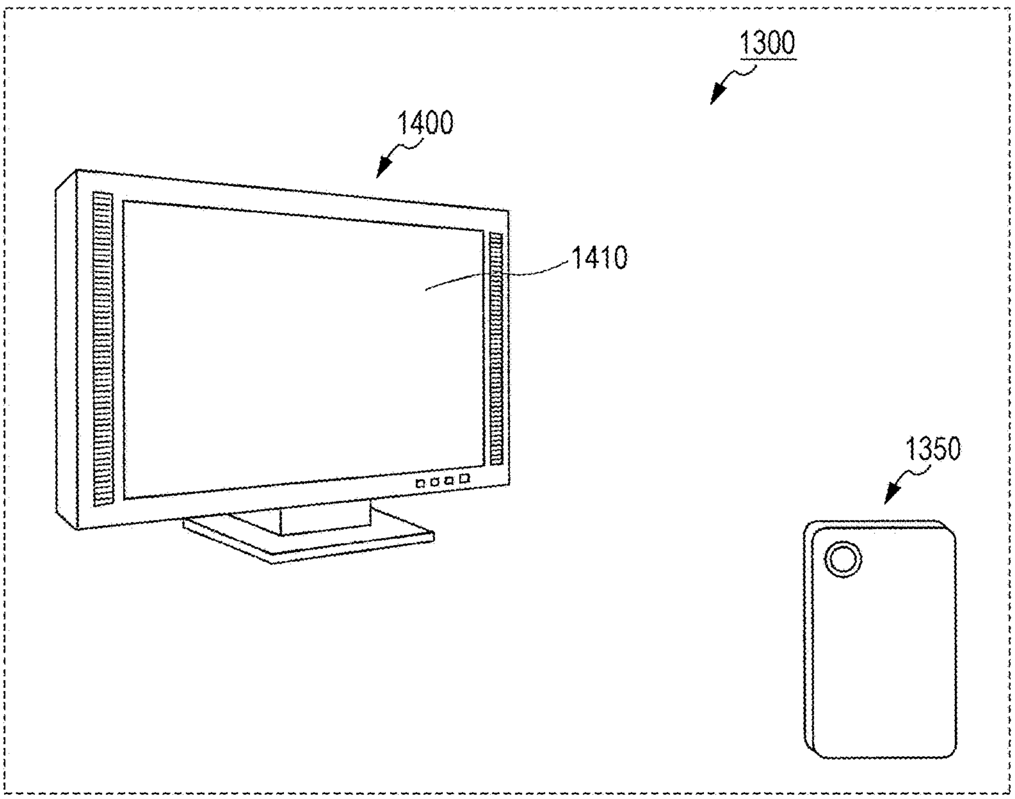
Figure 340:
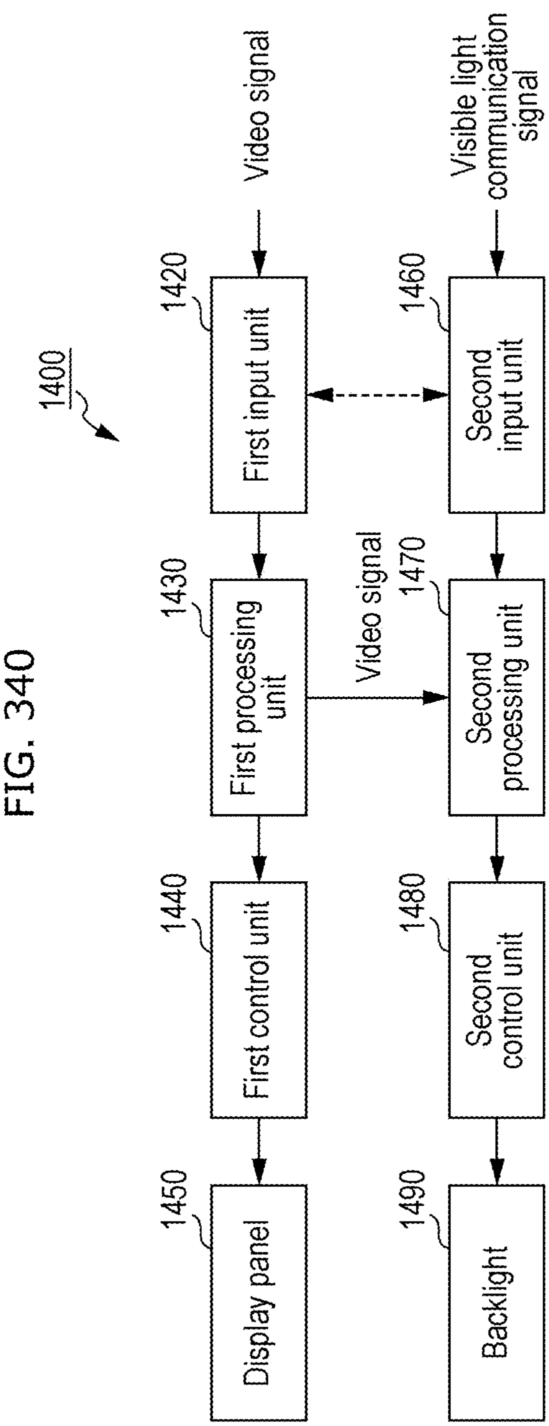
Figure 341A:
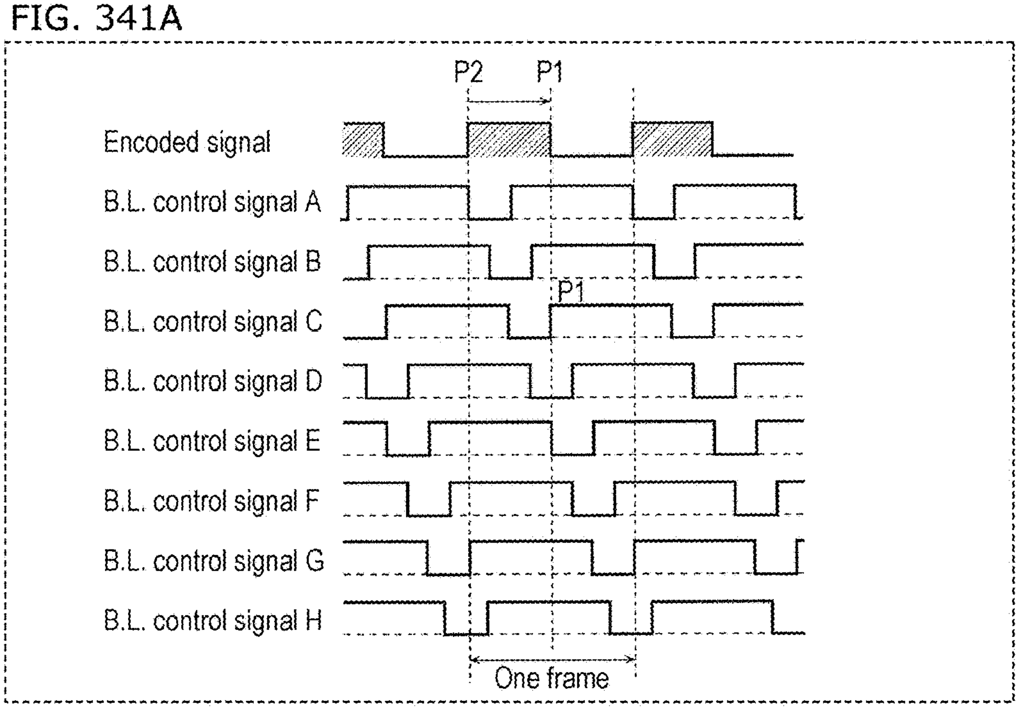
Figure 341B:
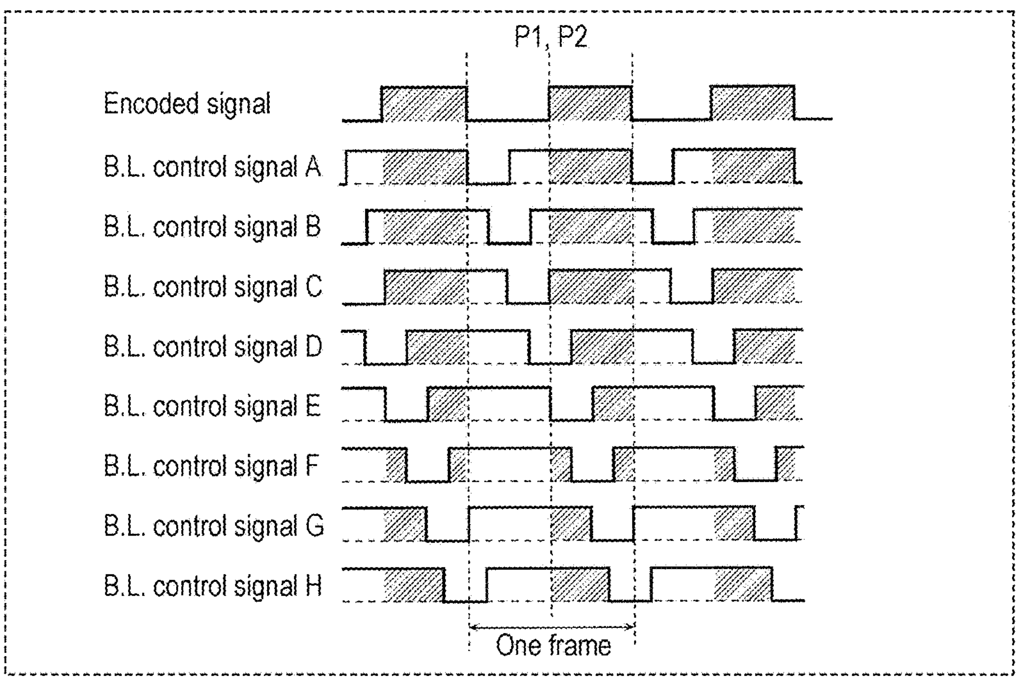
Figure 342:
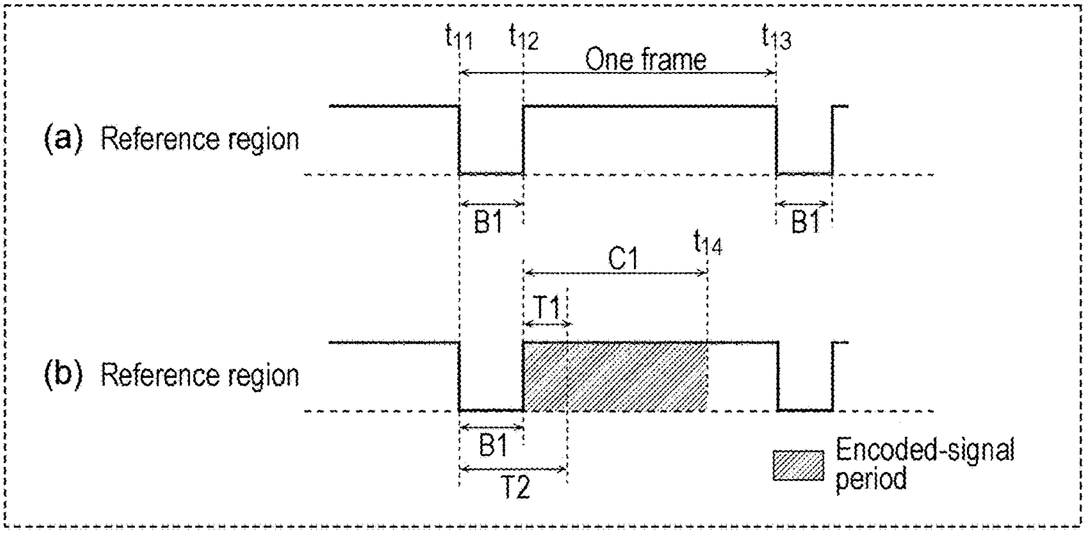
Figure 343:
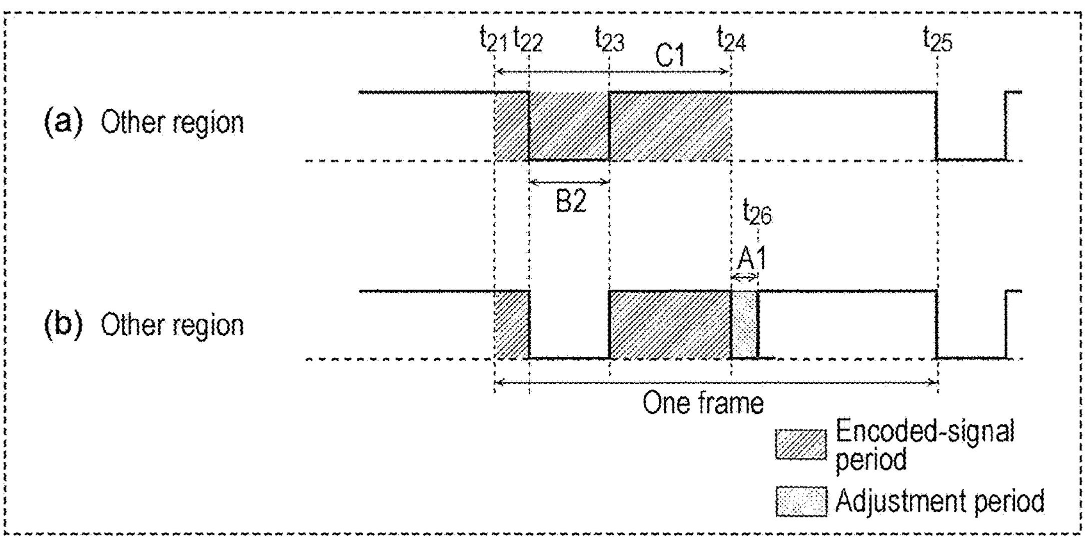
Figure 344A:
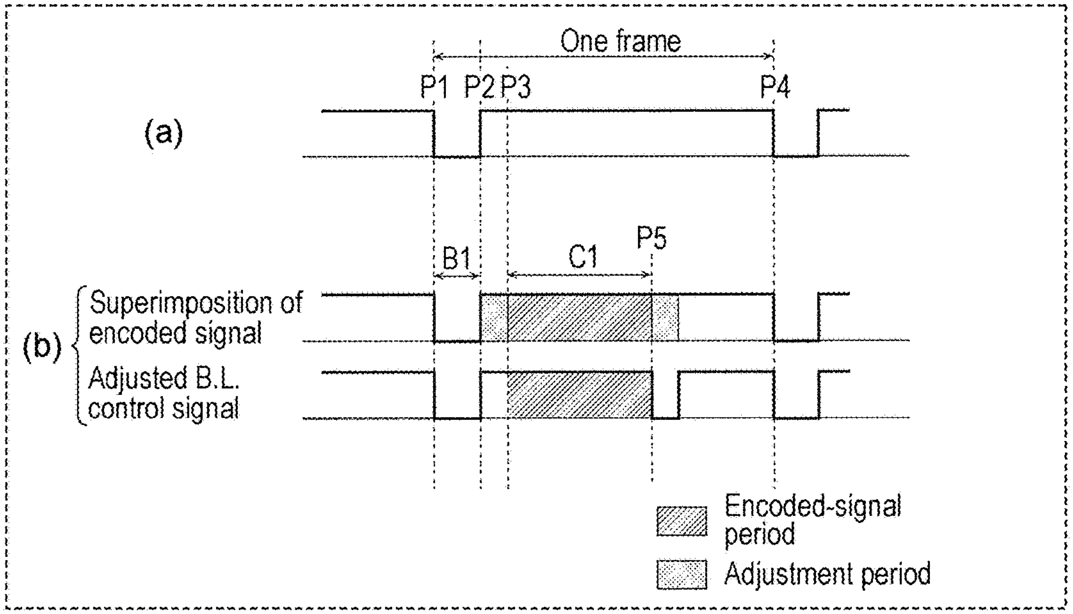
Figure 344B:
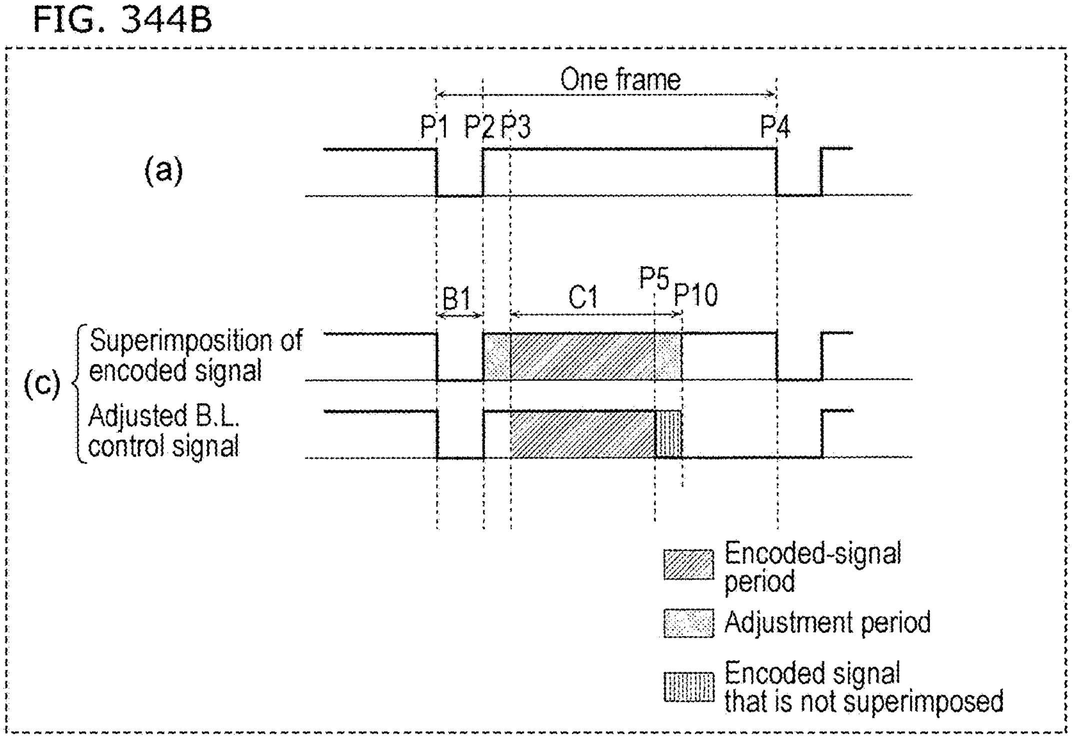
Figure 344C:
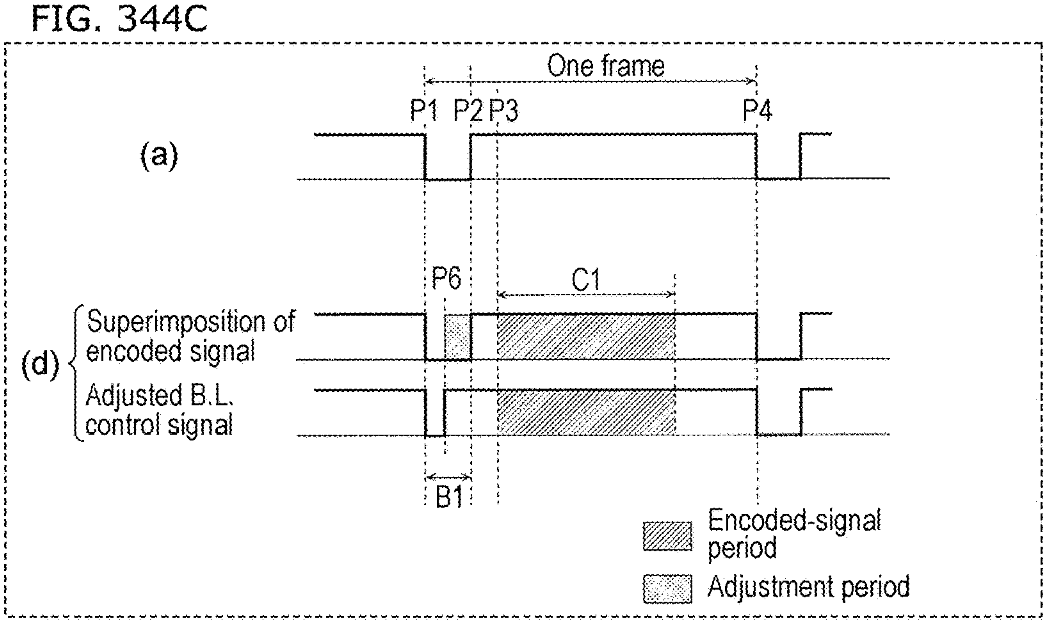
Figure 344D:
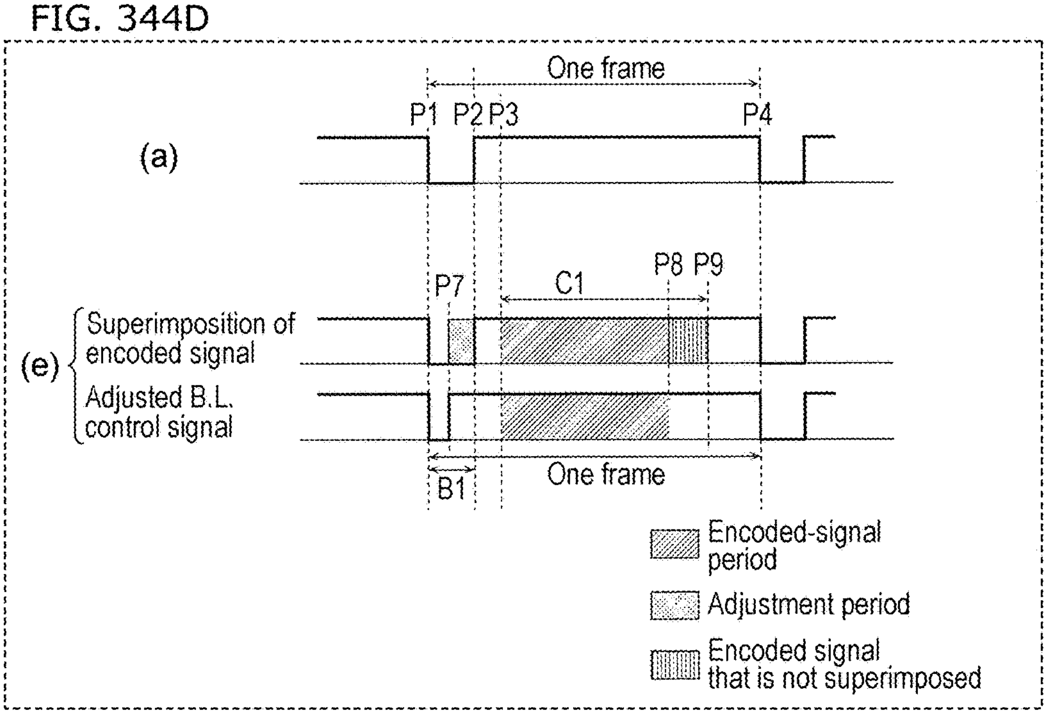
Figure 345A:
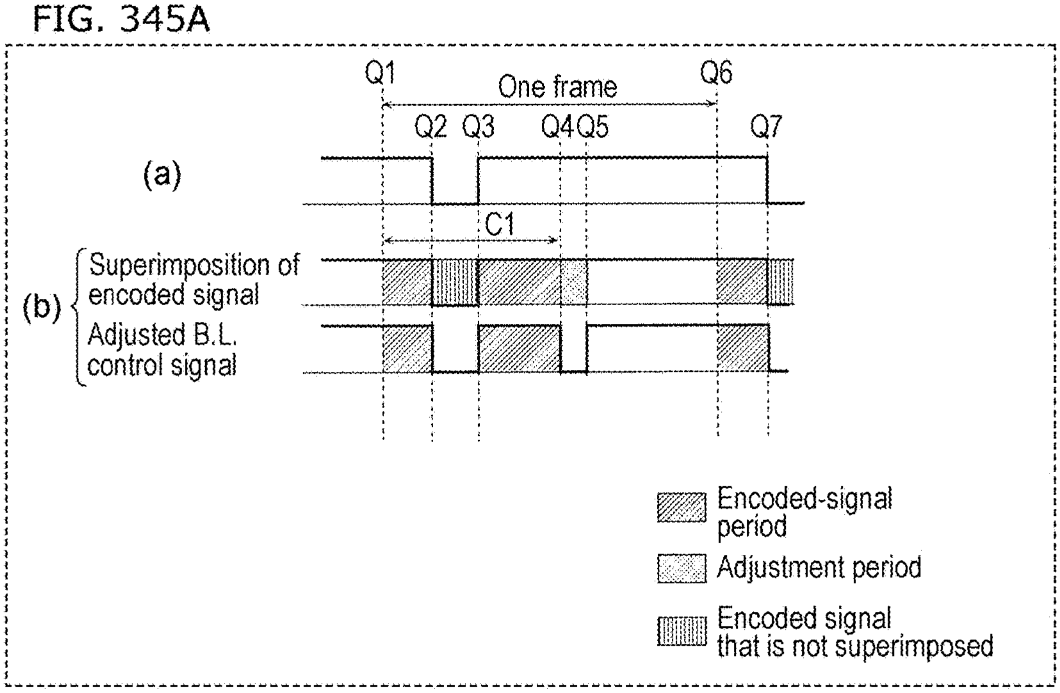
Figure 345B:
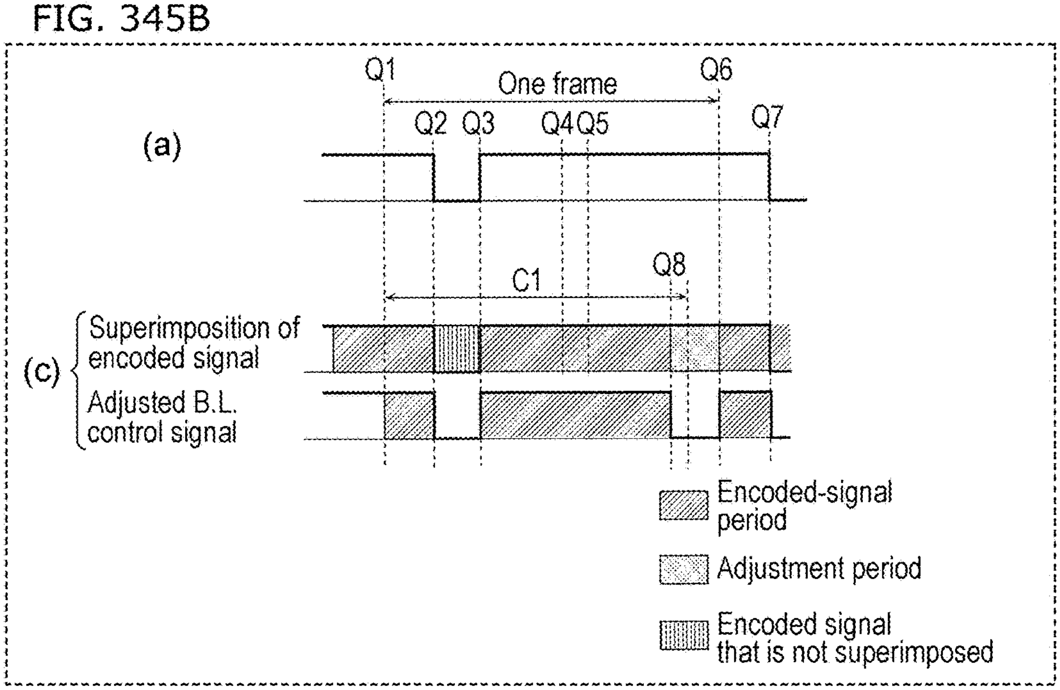
Figure 345C:
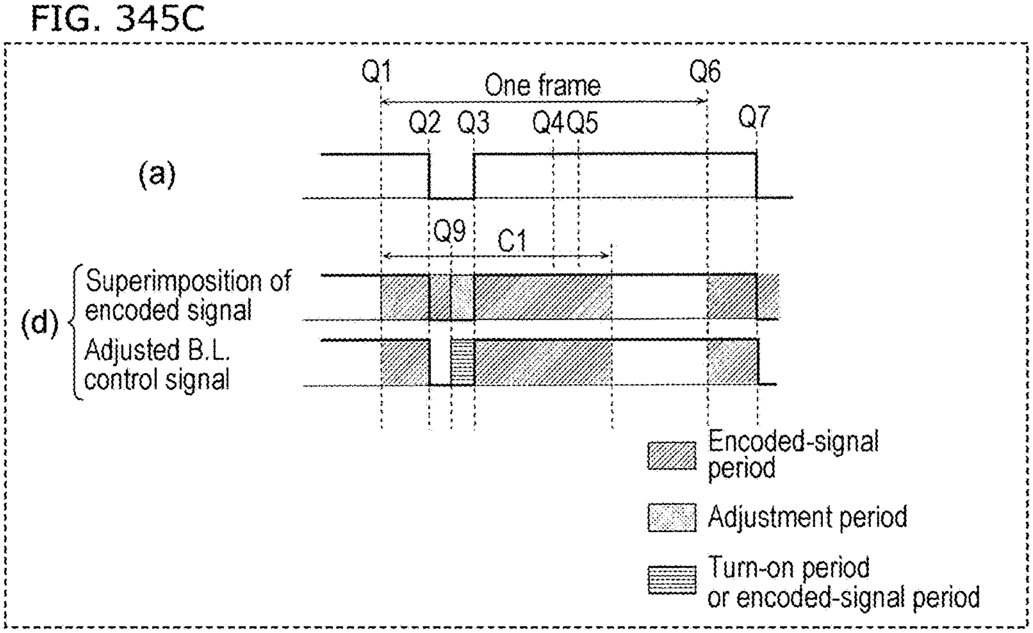
Figure 345D:
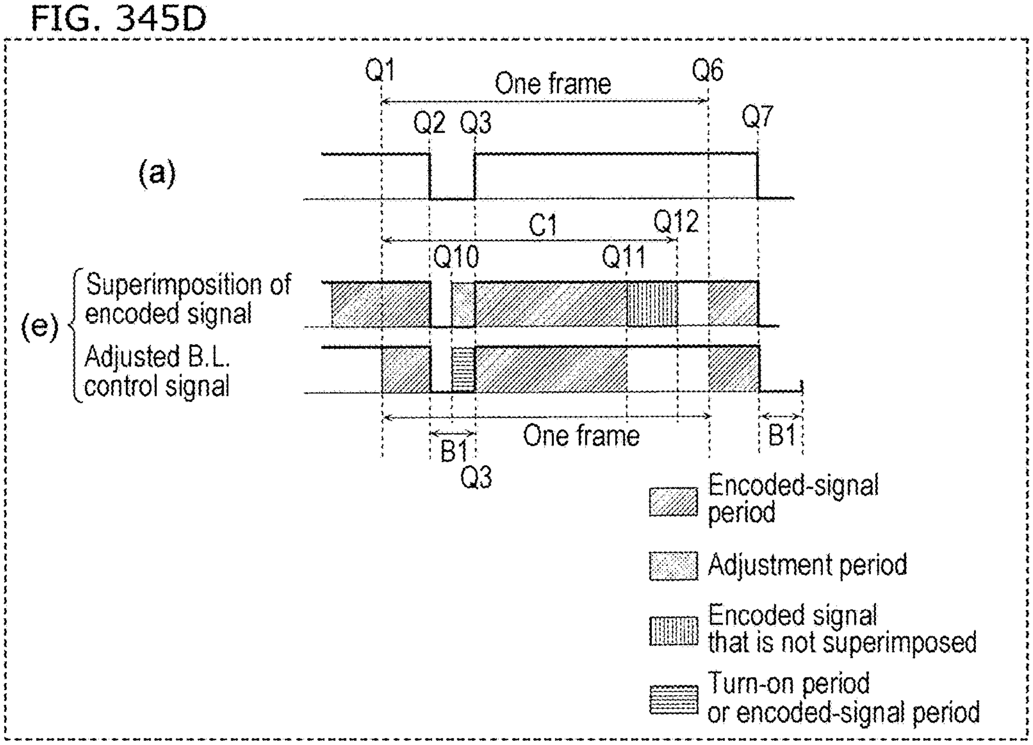
Figure 346:
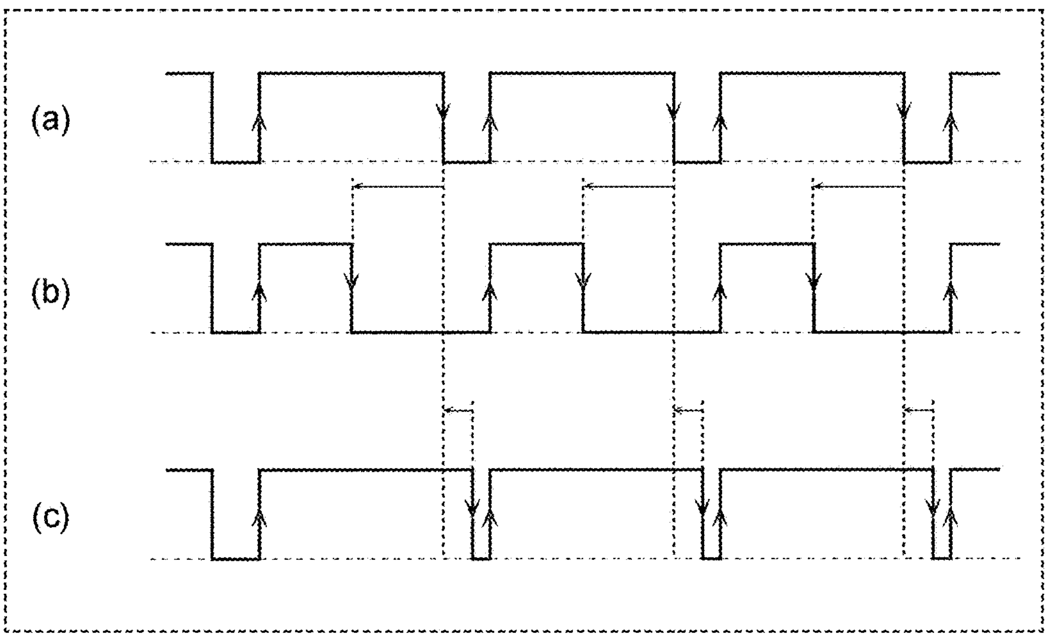
Figure 347:
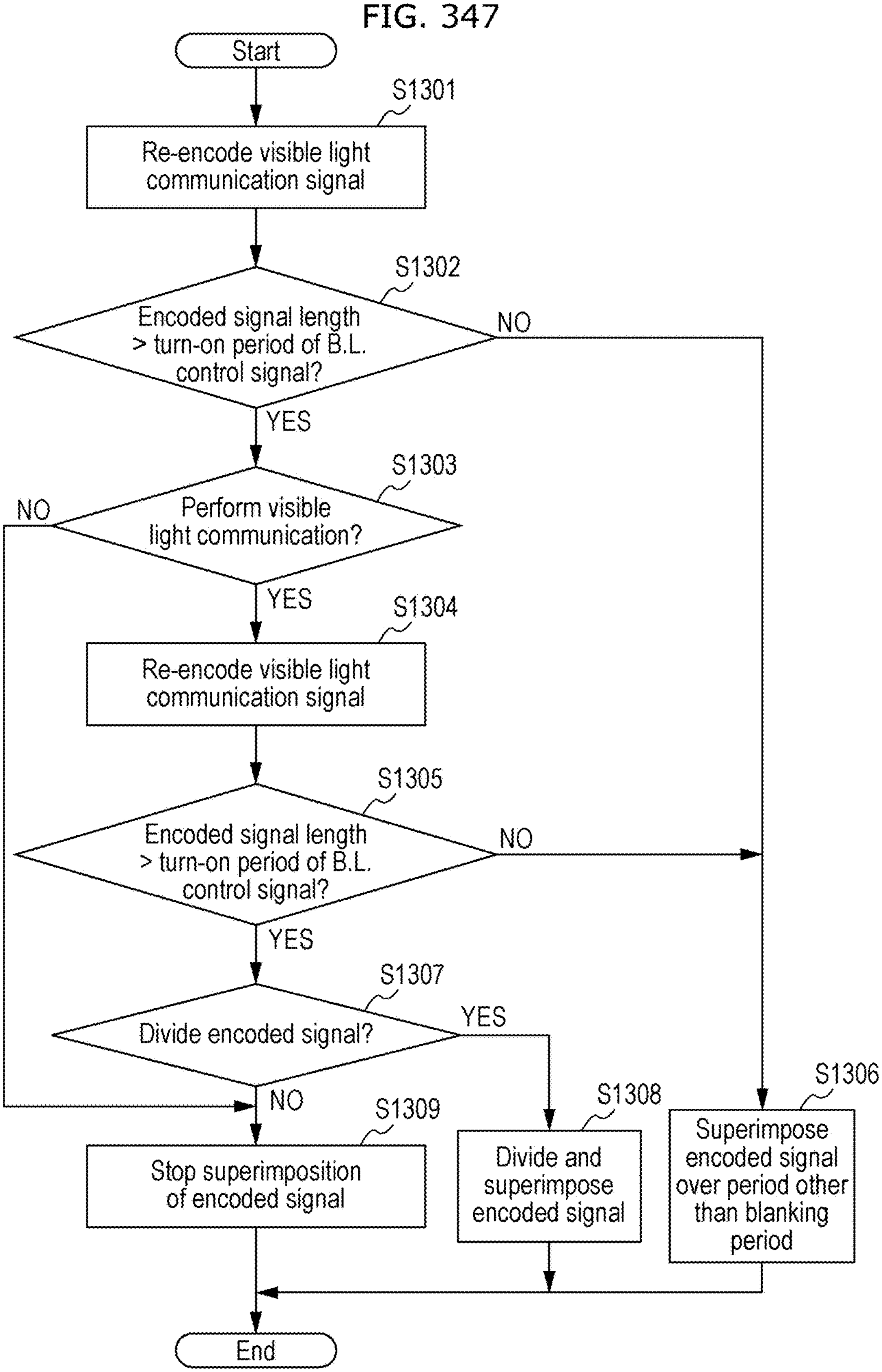
Figure 348A:
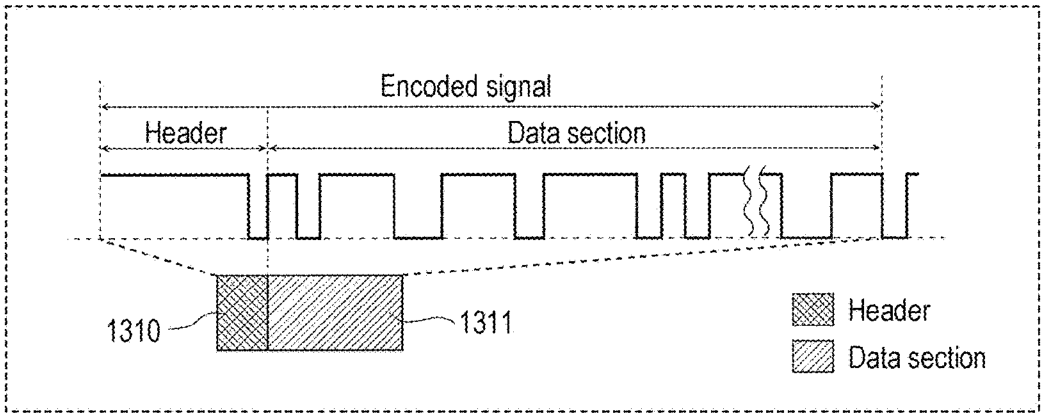
Figure 348B:
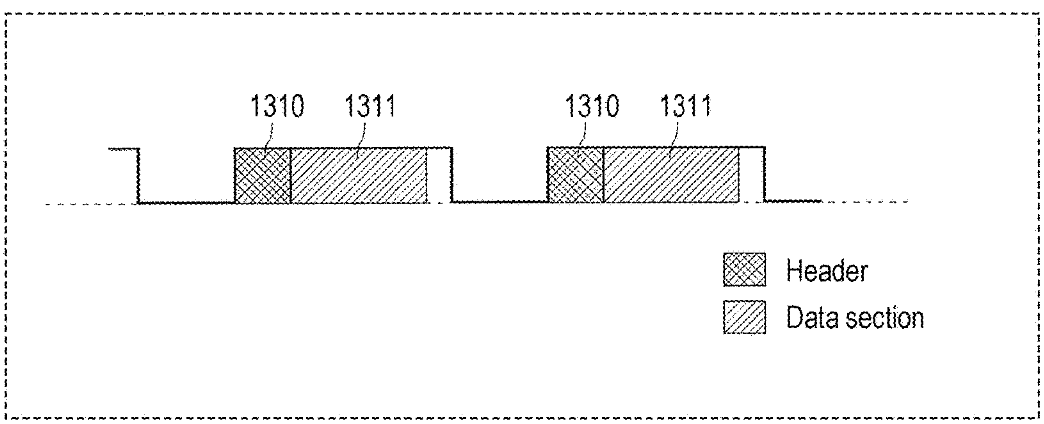
Figure 348C:
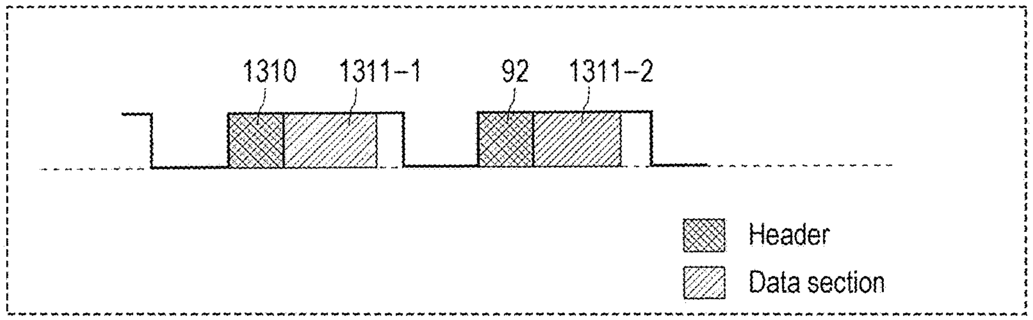
Figure 348D:
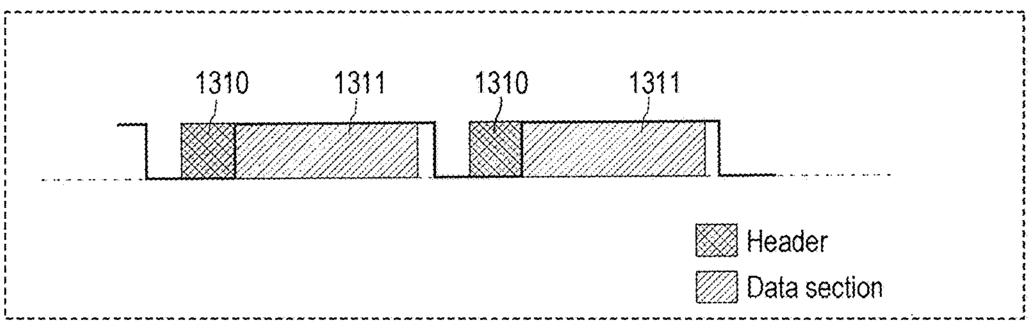
Figure 349:
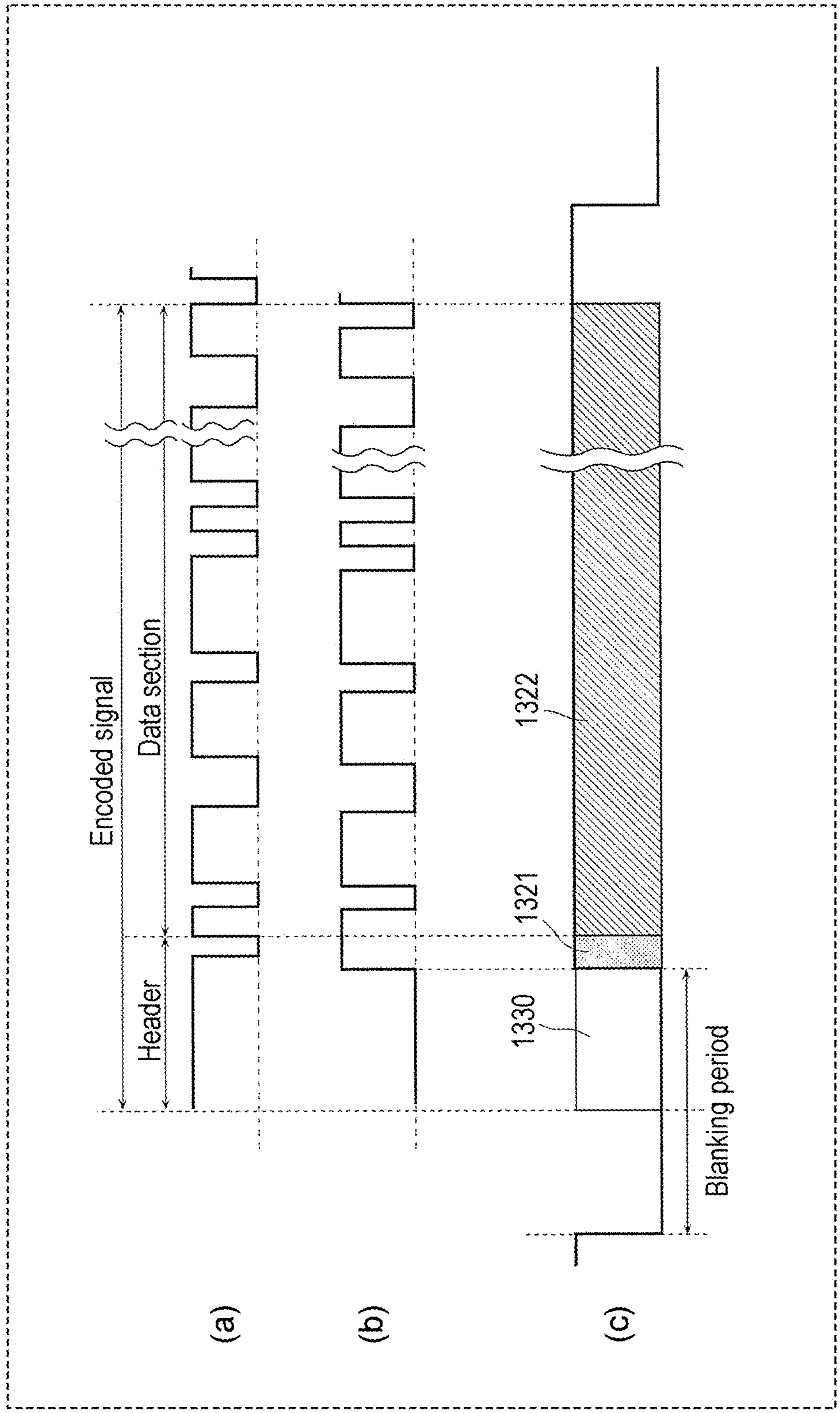
Figure 350:
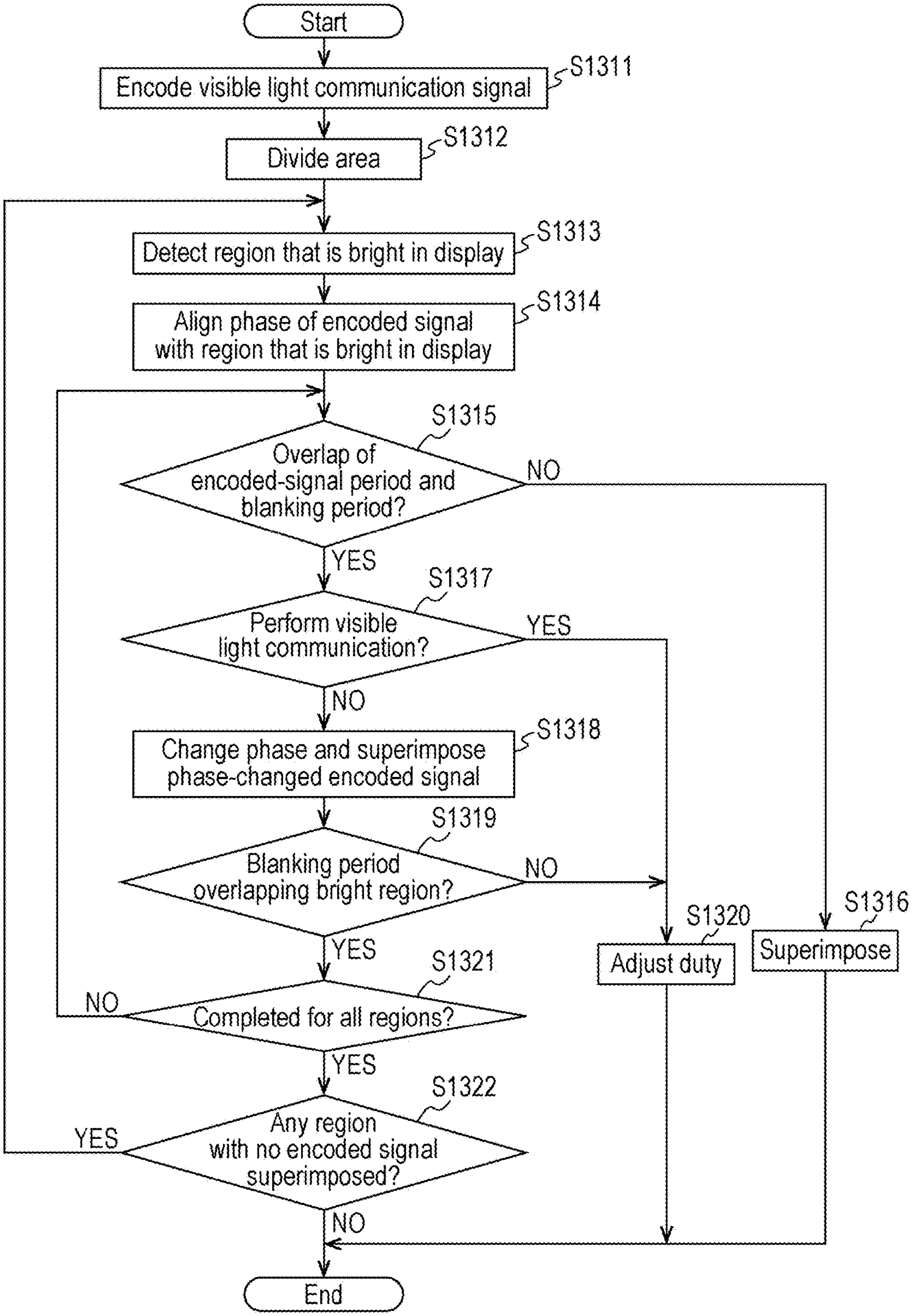
Figure 351:
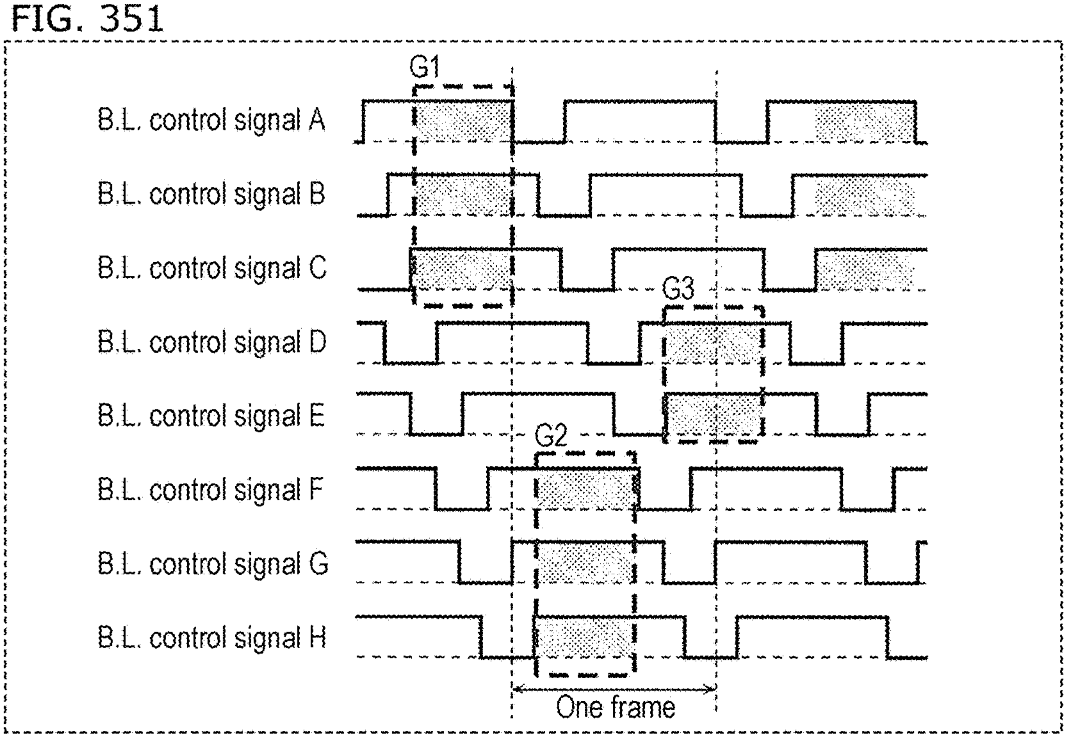
Figure 352:
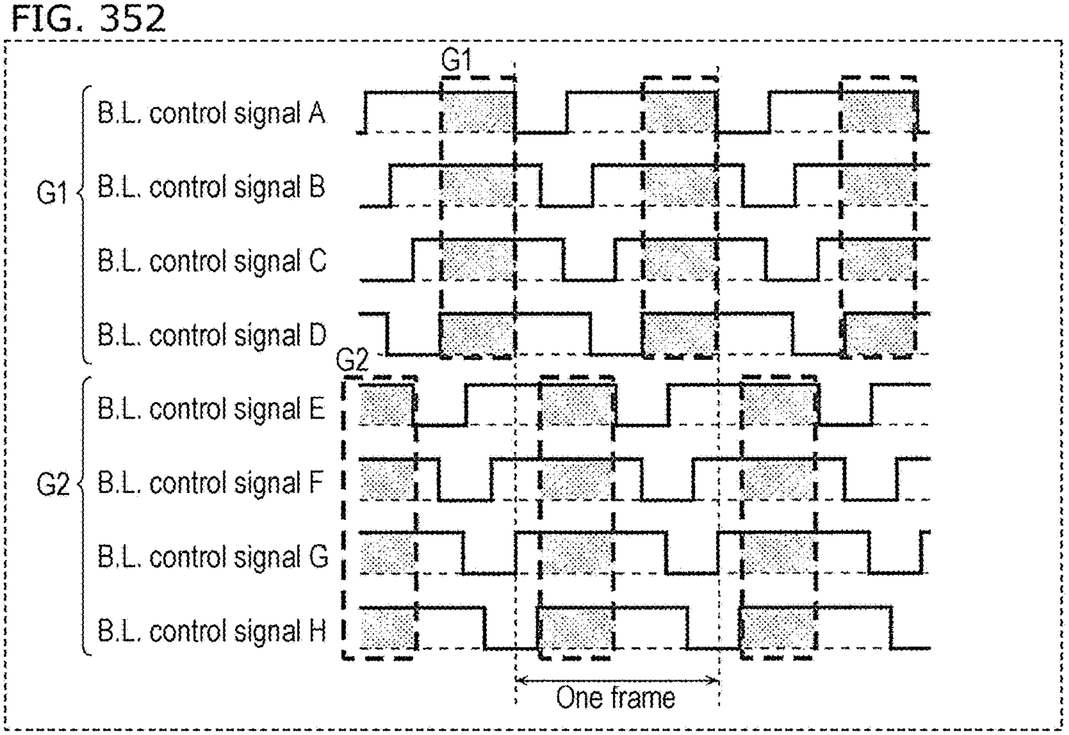
Figure 353:
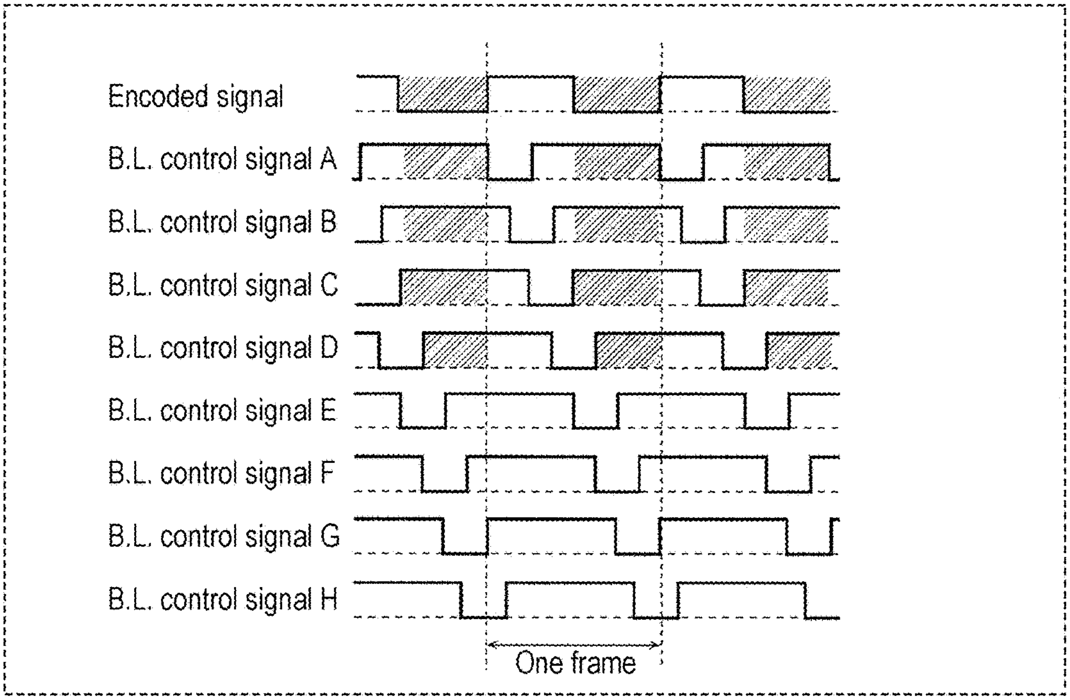
Figure 354:
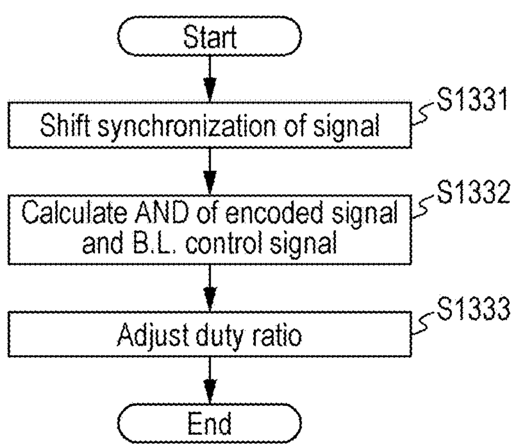
Figure 355A:
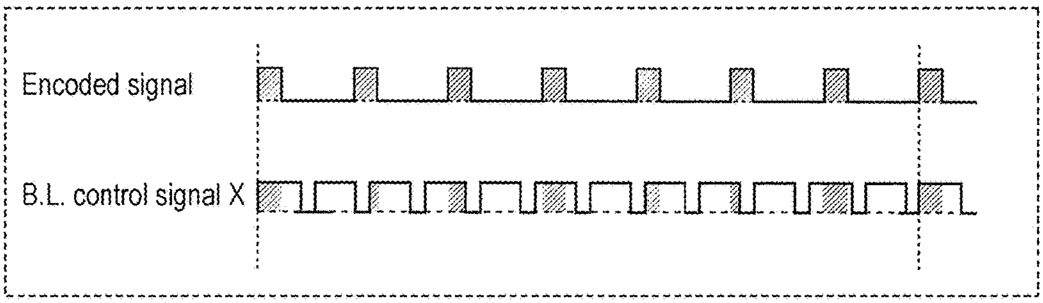
Figure 355B:
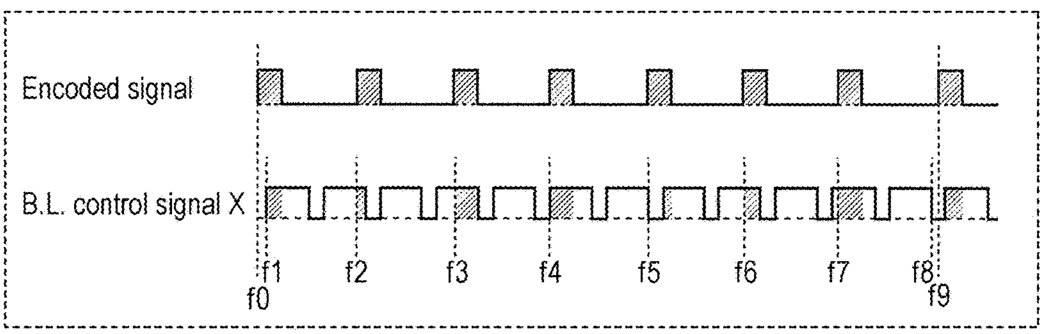
Figure 356A:
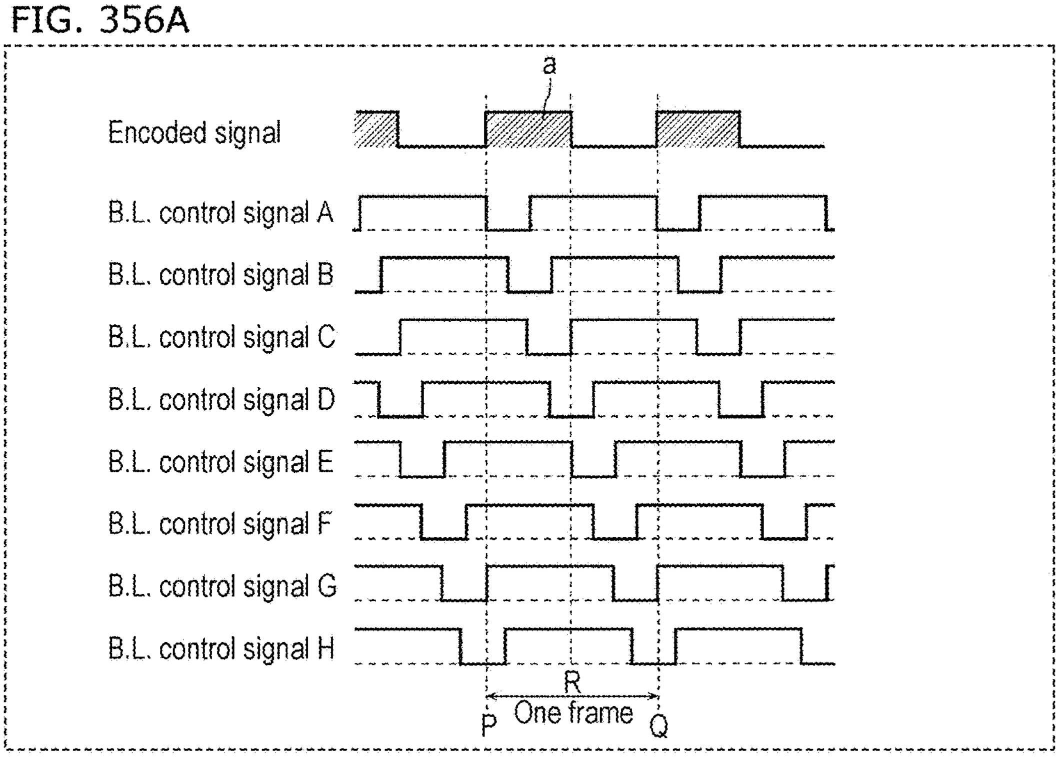
Figure 356B:
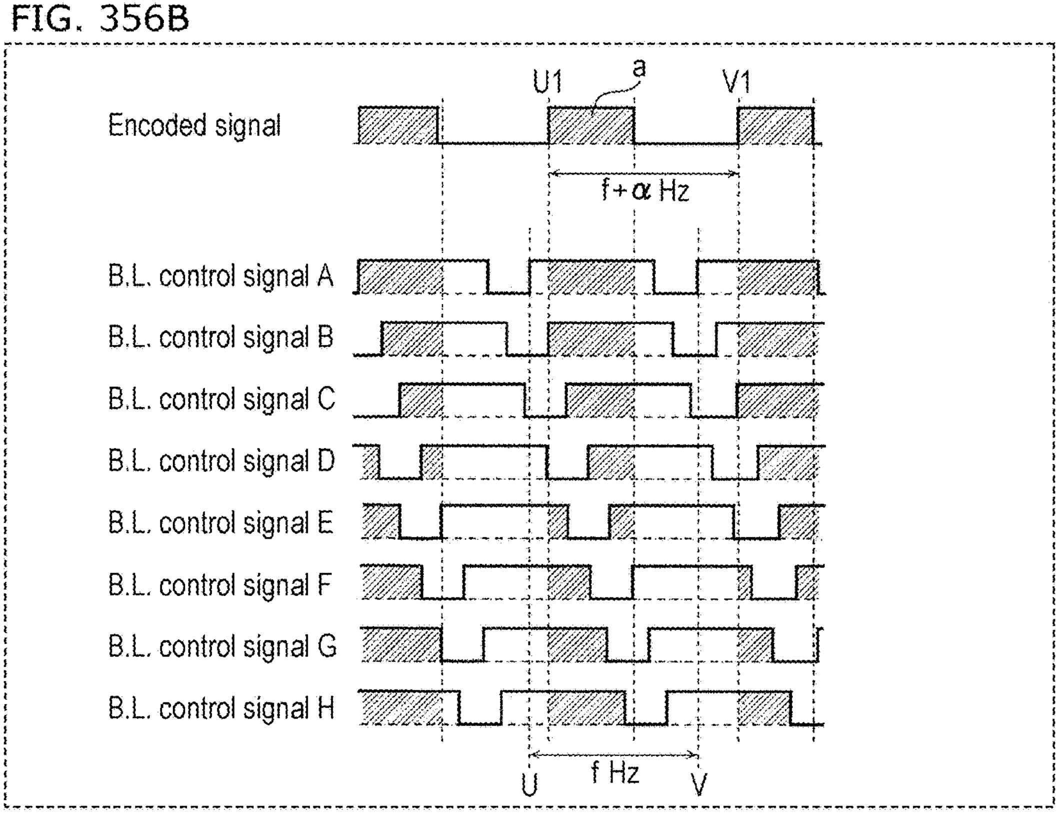
Figure 356C:
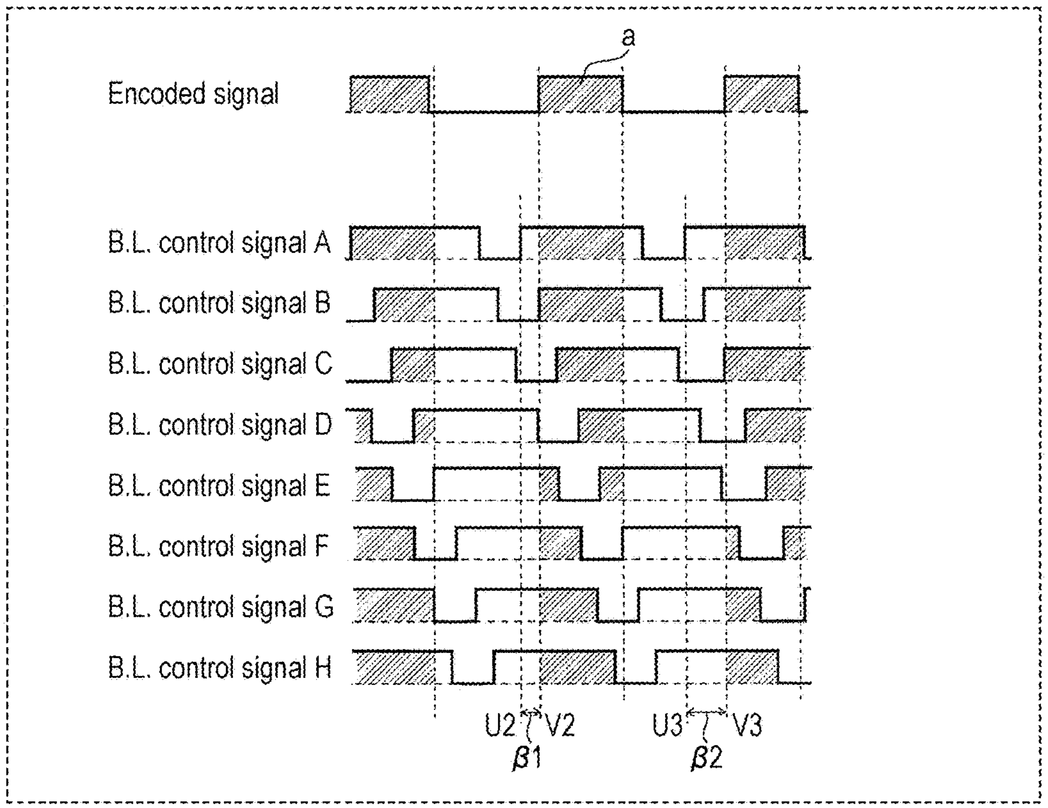
Figure 357A:
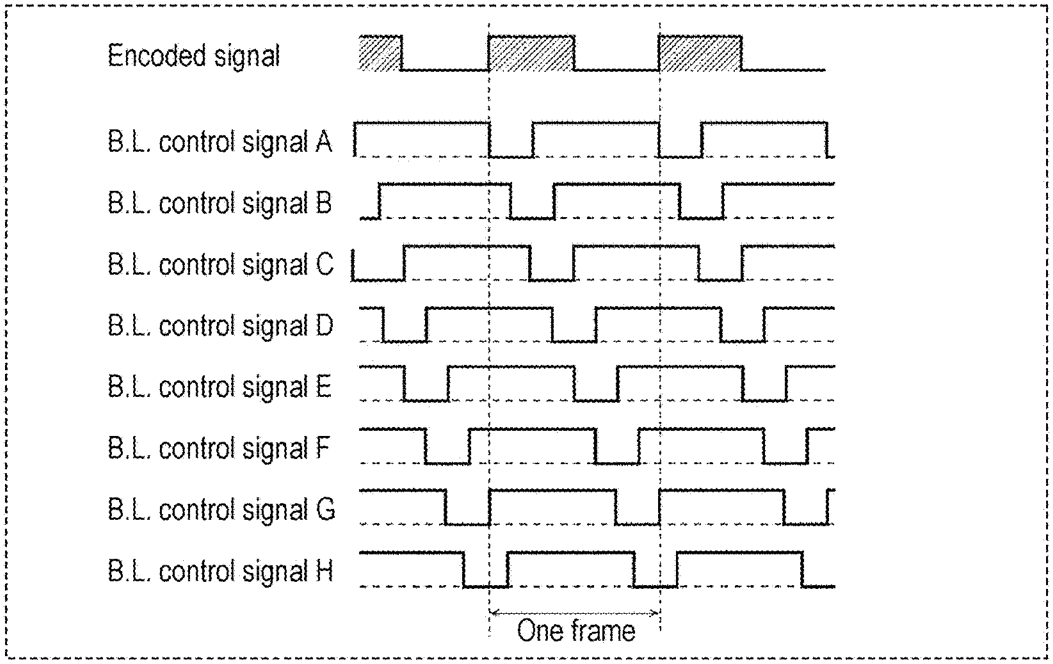
Figure 357B:
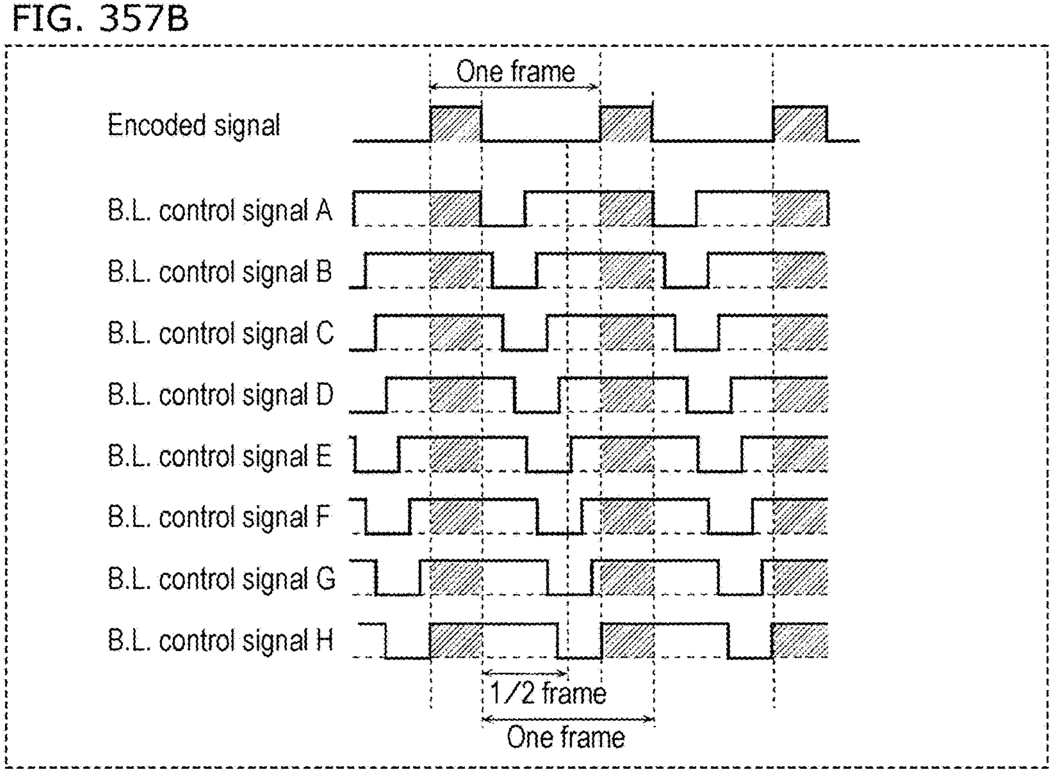
Figure 358:
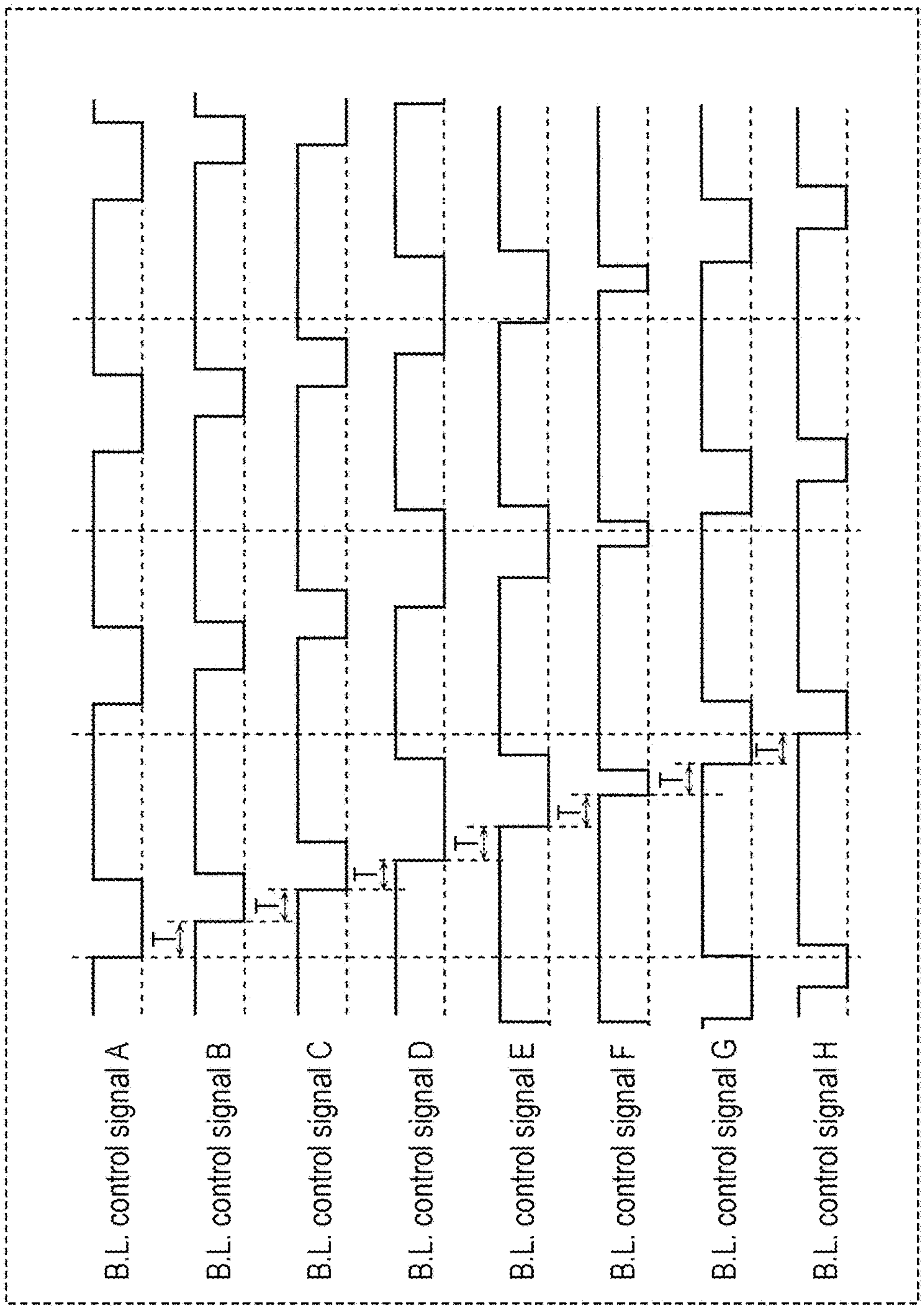
Figure 359:
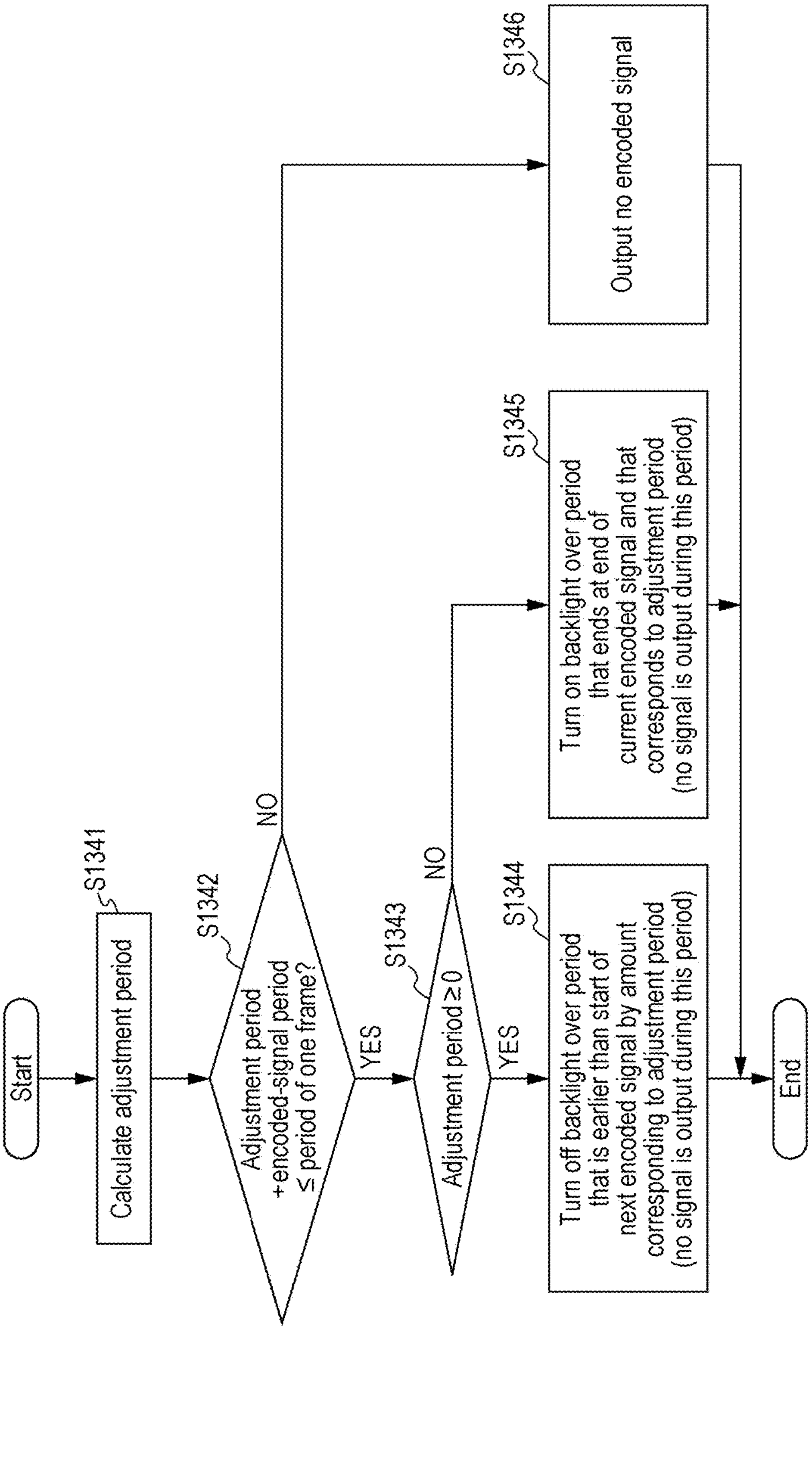
Figure 360:
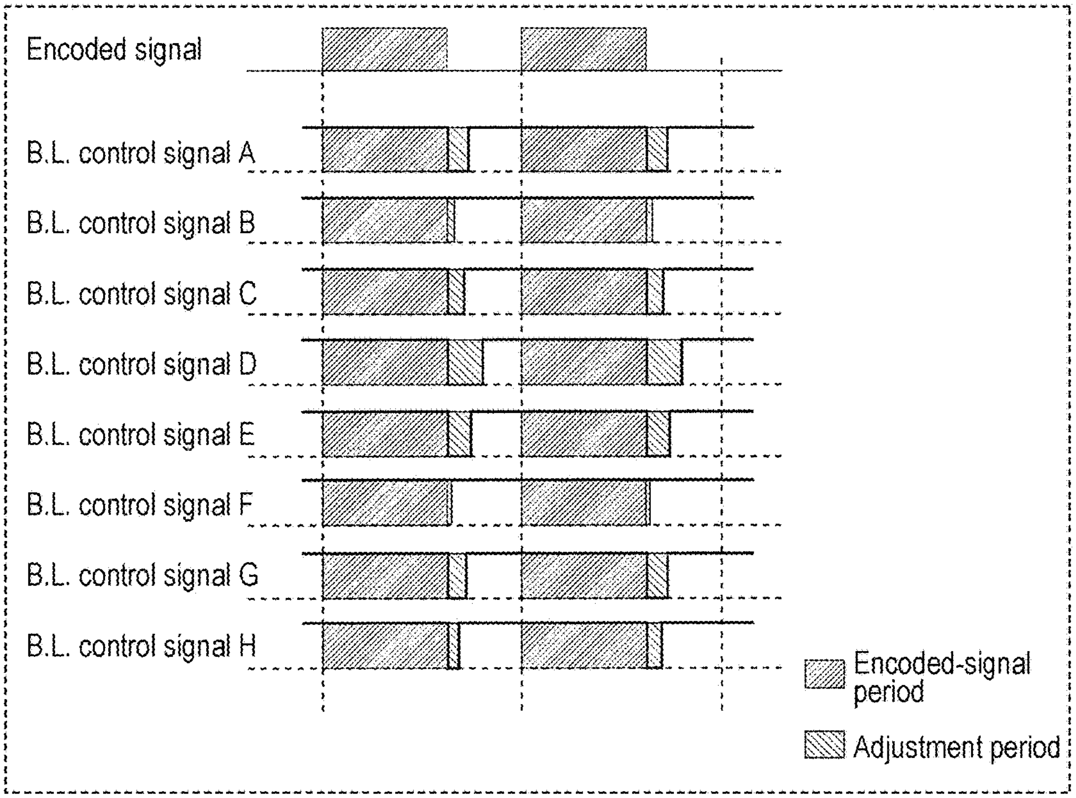
Figure 361:
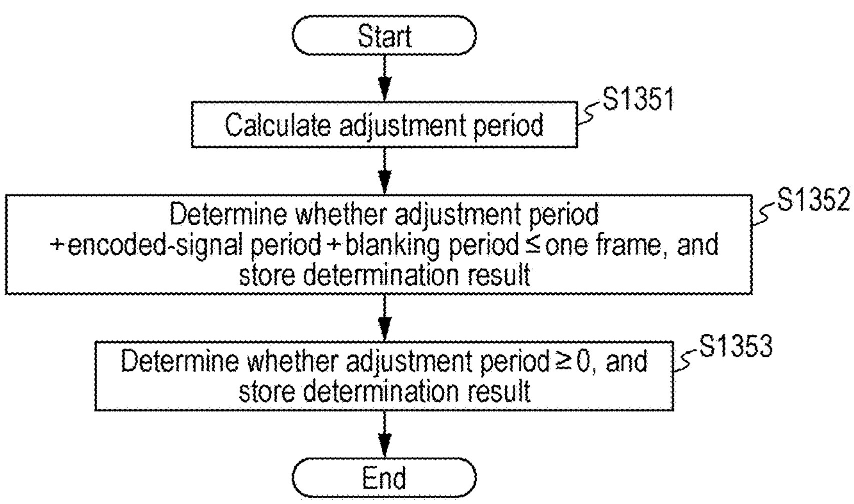
Figure 362:
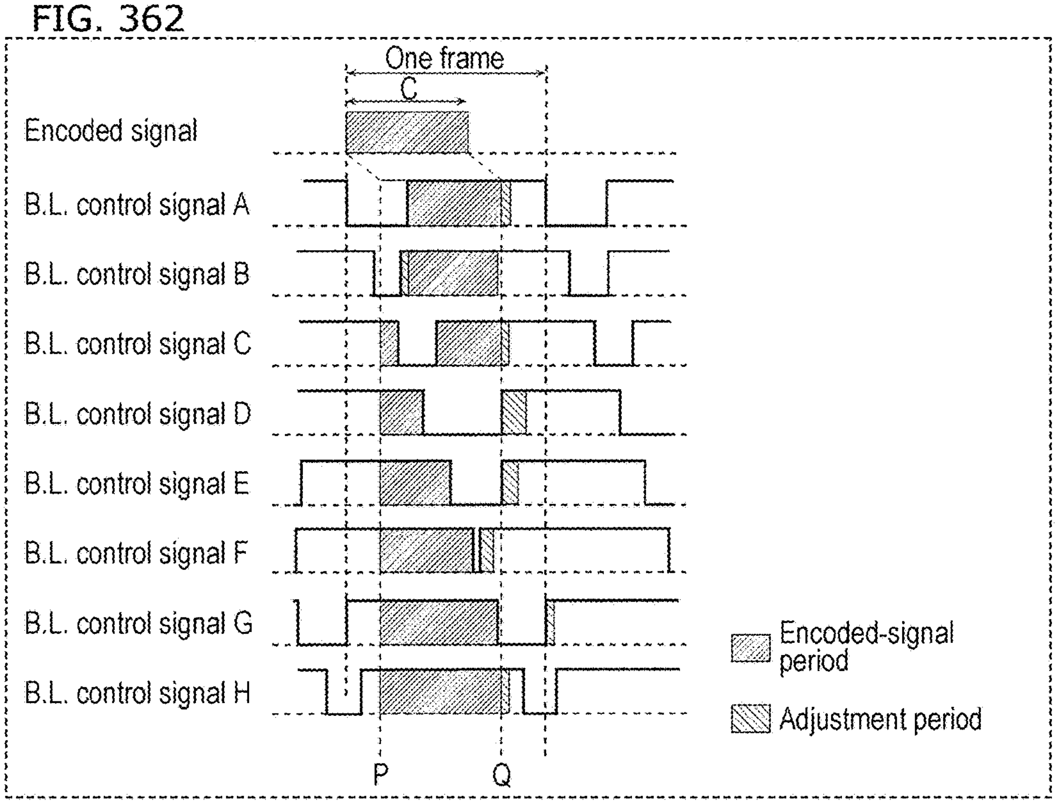
Figure 363:
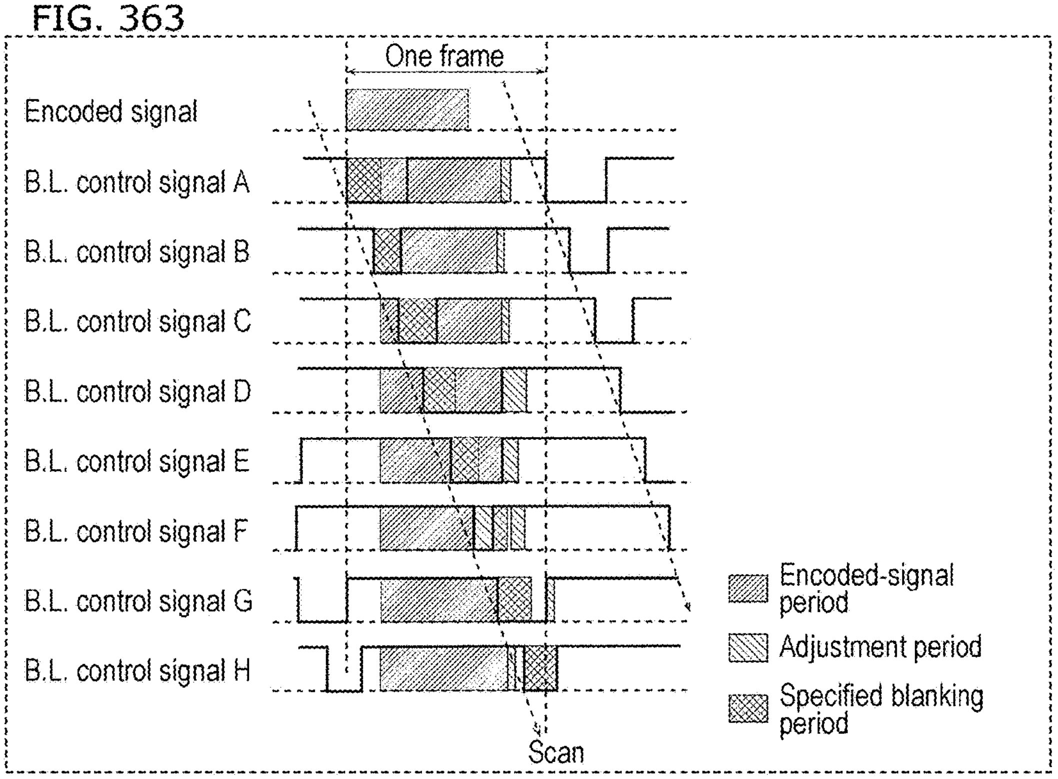
Figure 364:
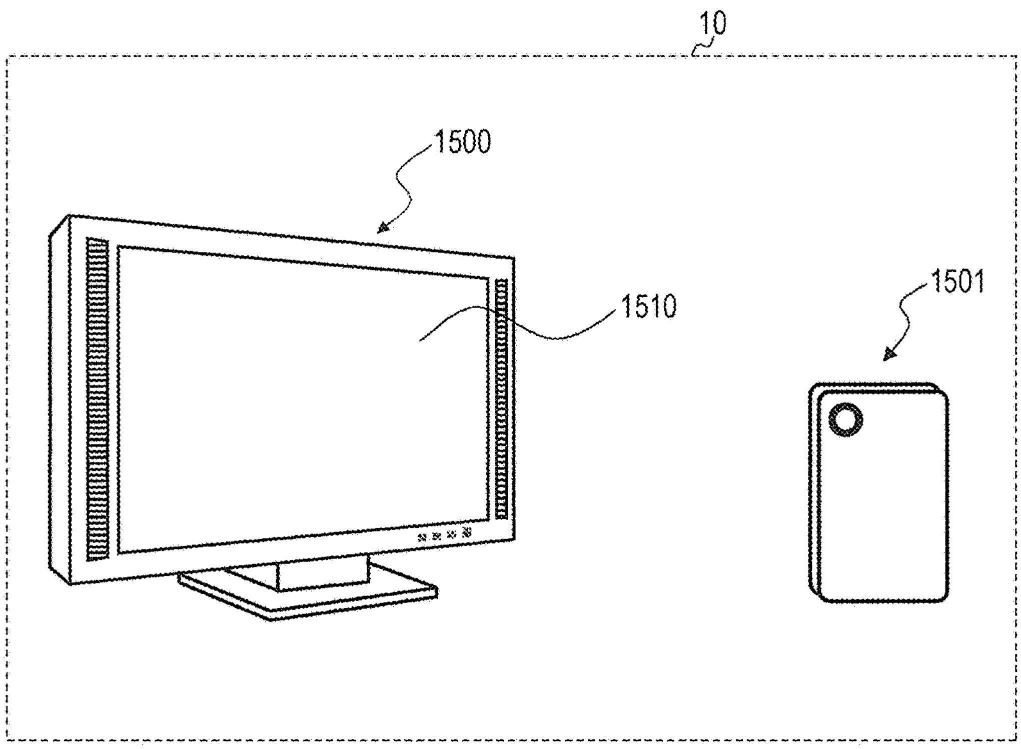
Figure 365:
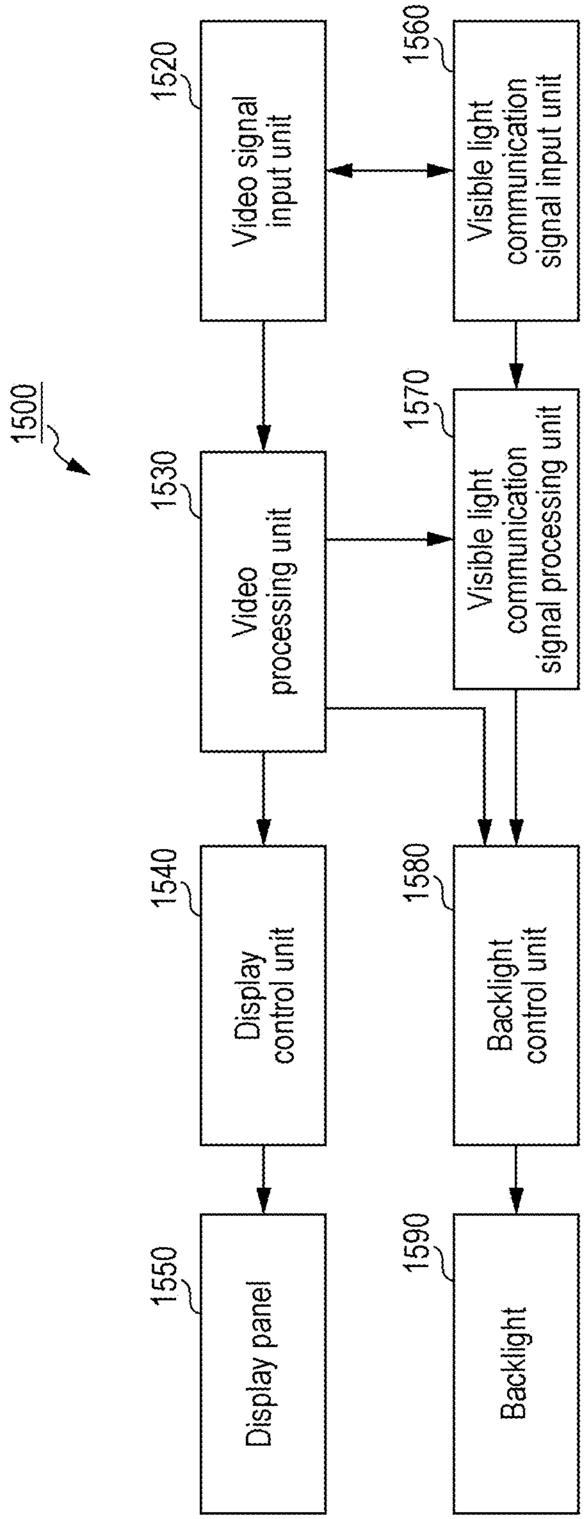
Figure 366:
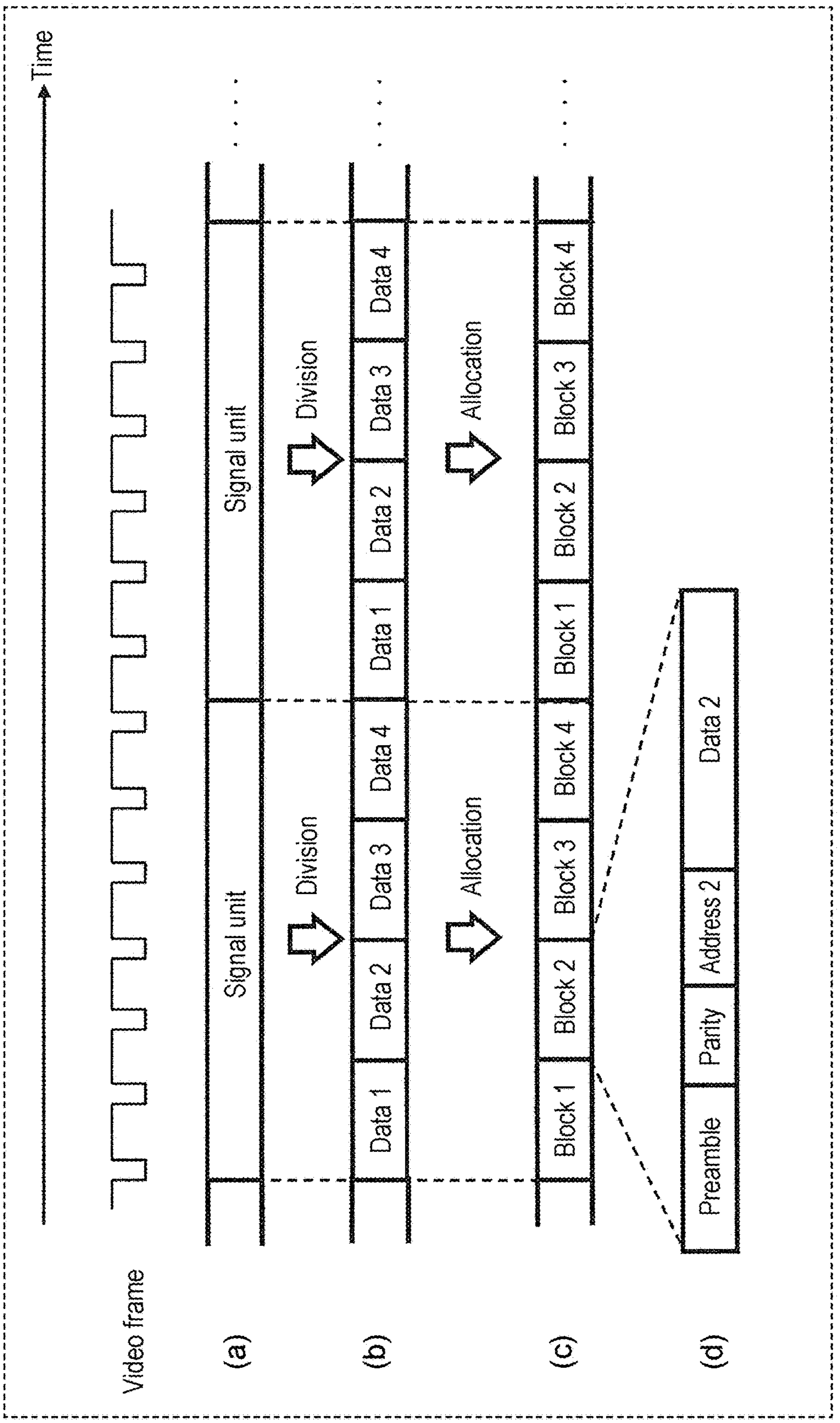
Figure 367:
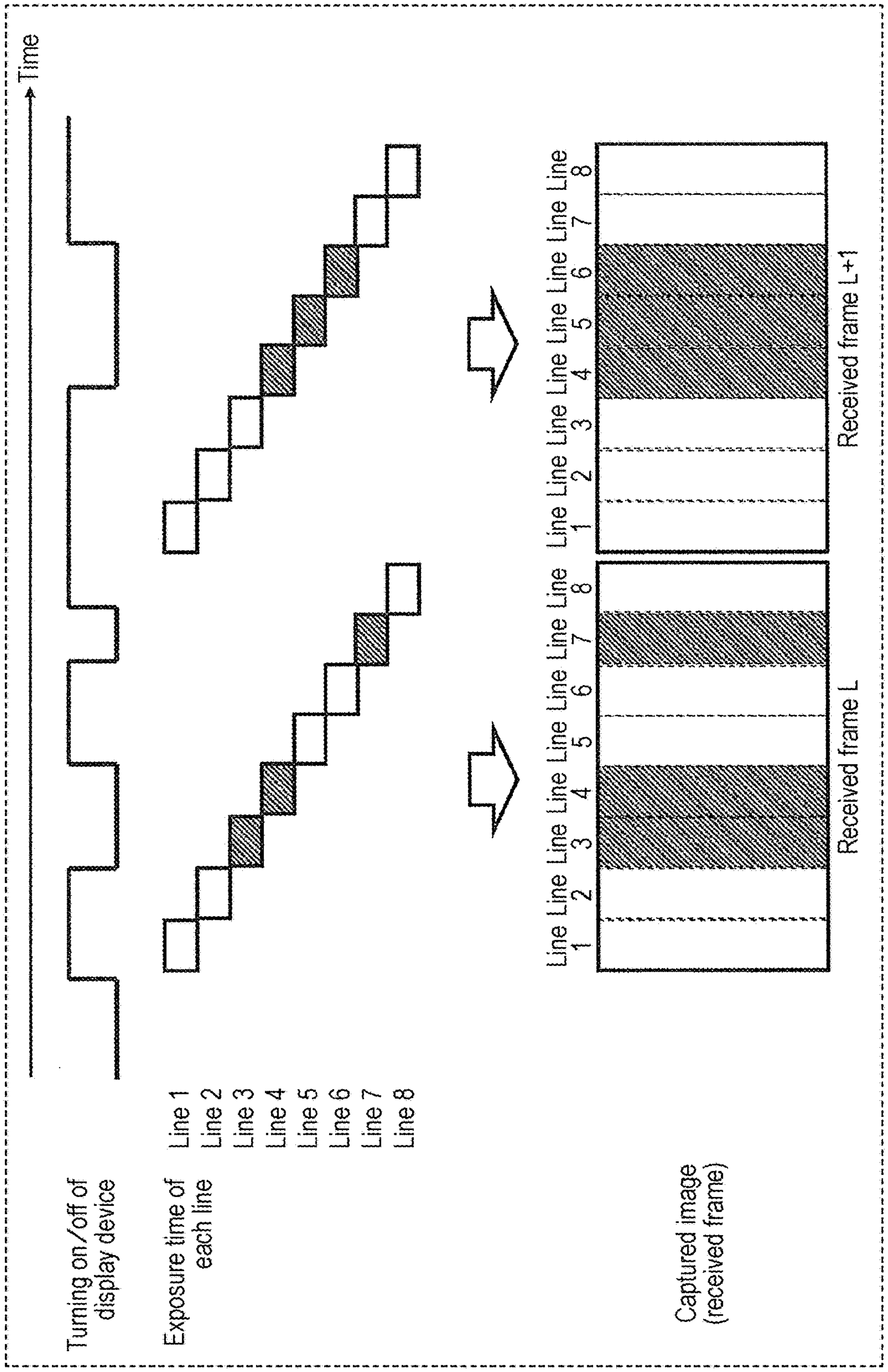
Figure 368:
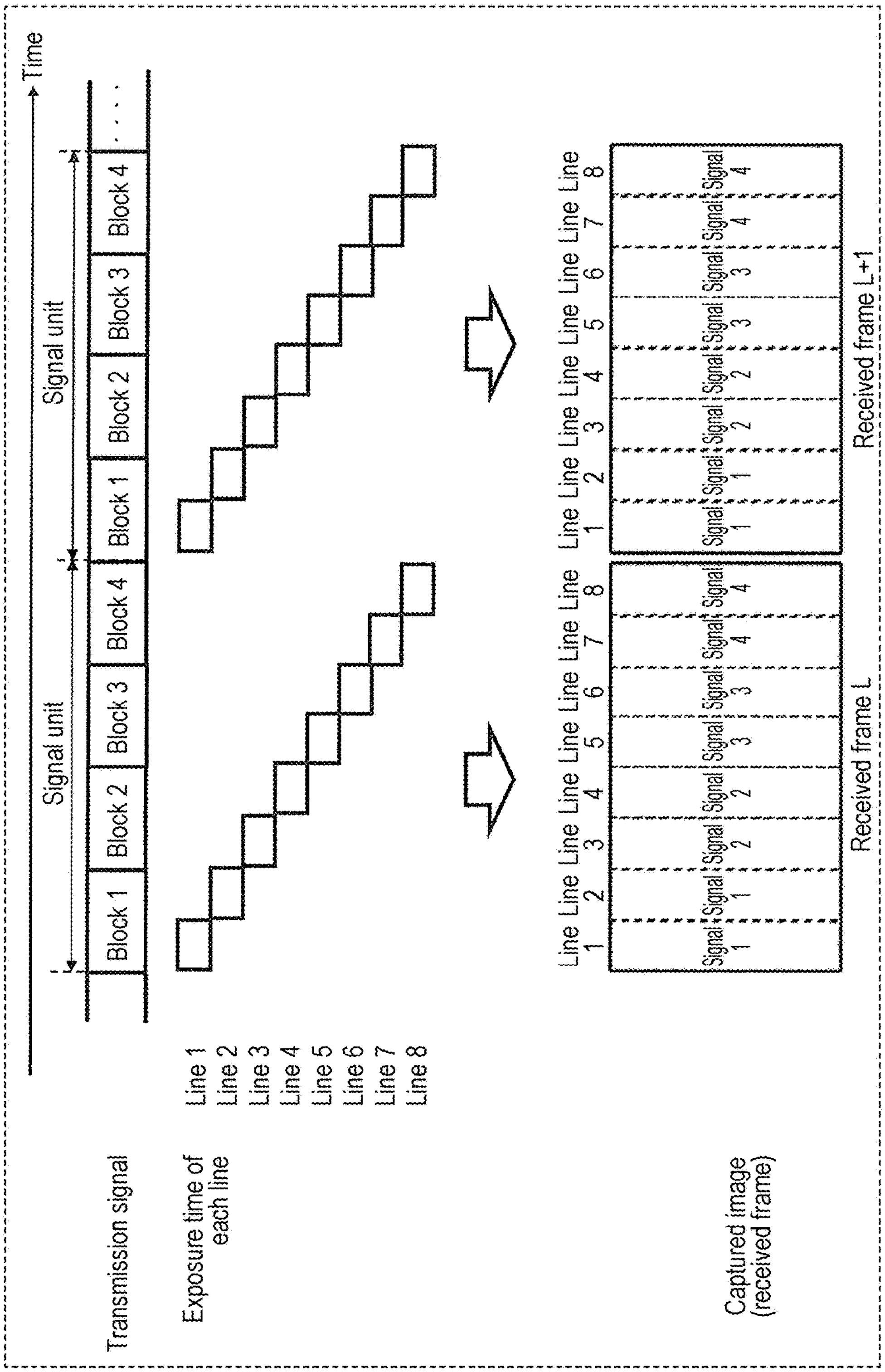
Figure 369:
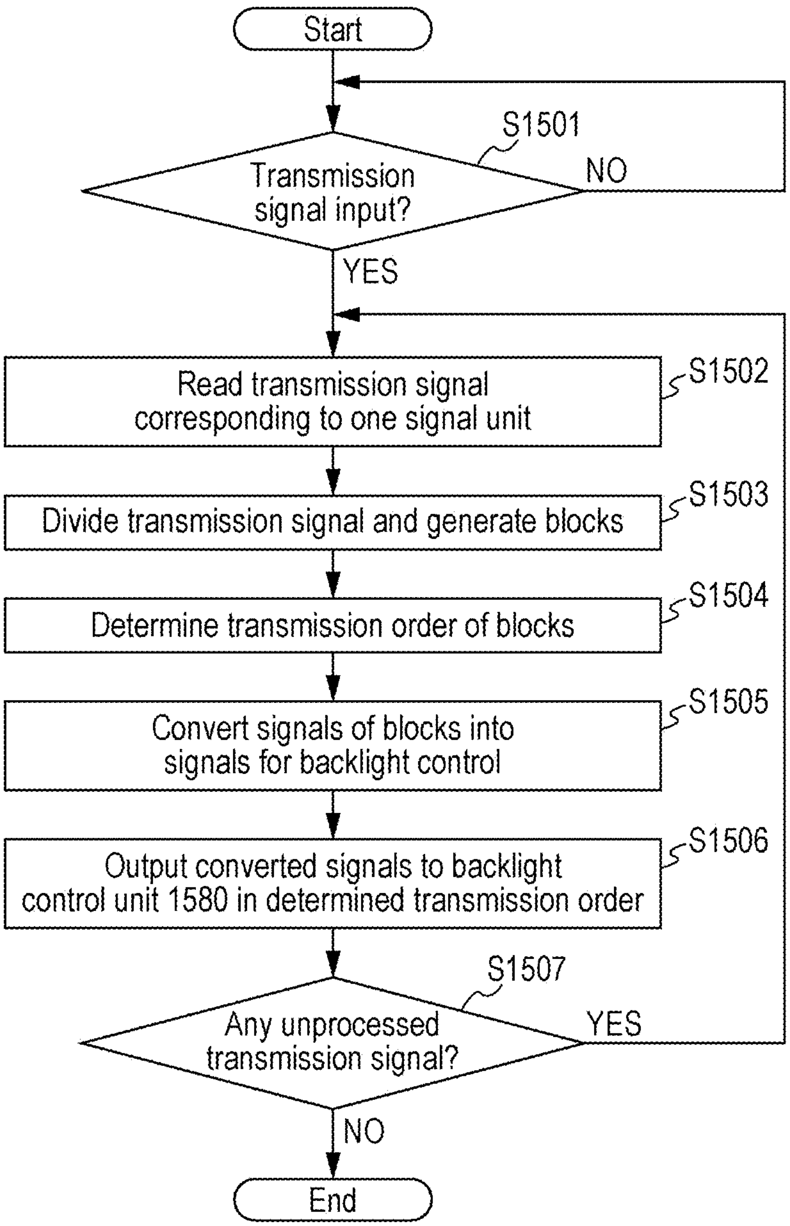
Figure 370:
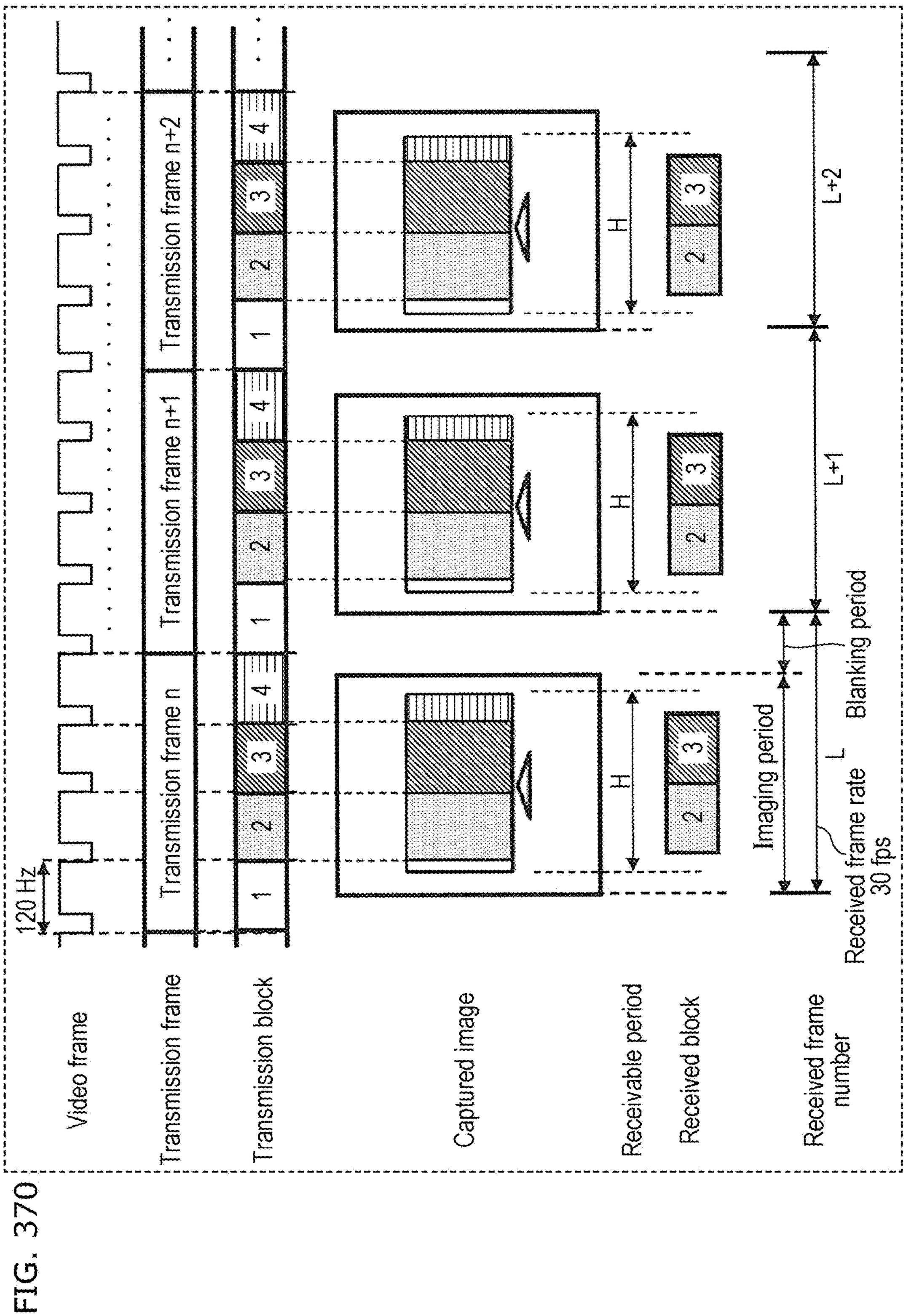
Figure 371:
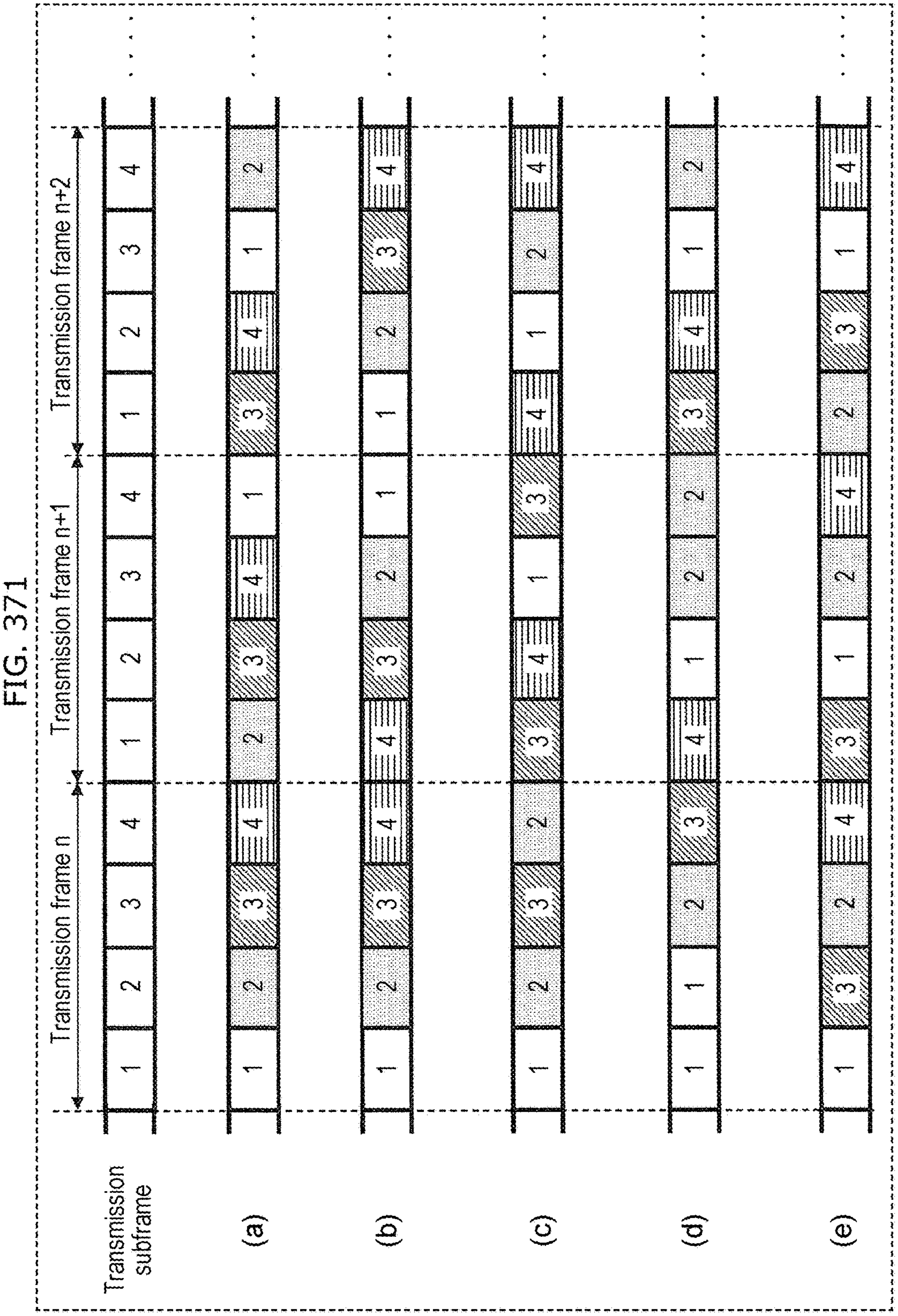
Figure 372:
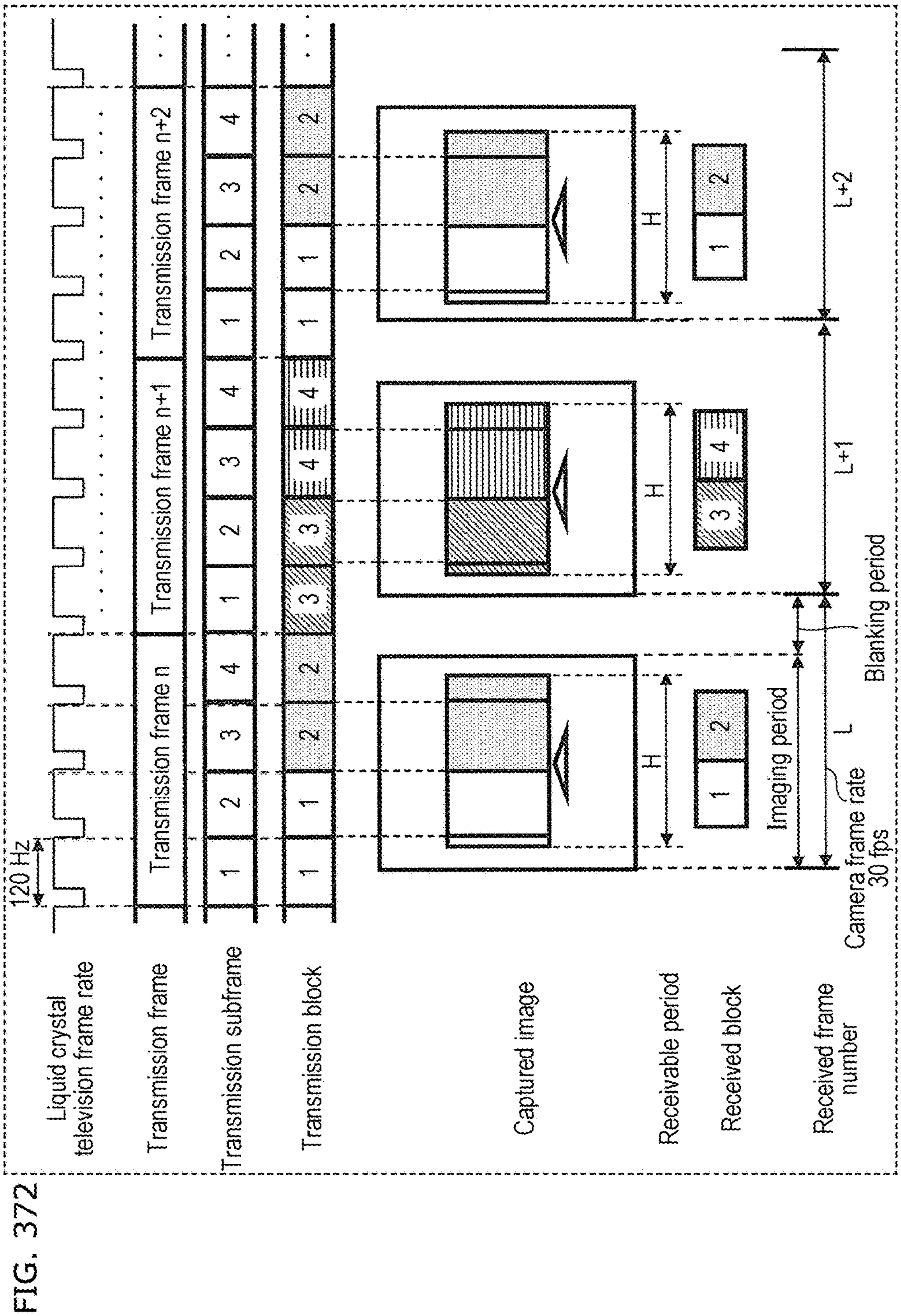
Figure 373:
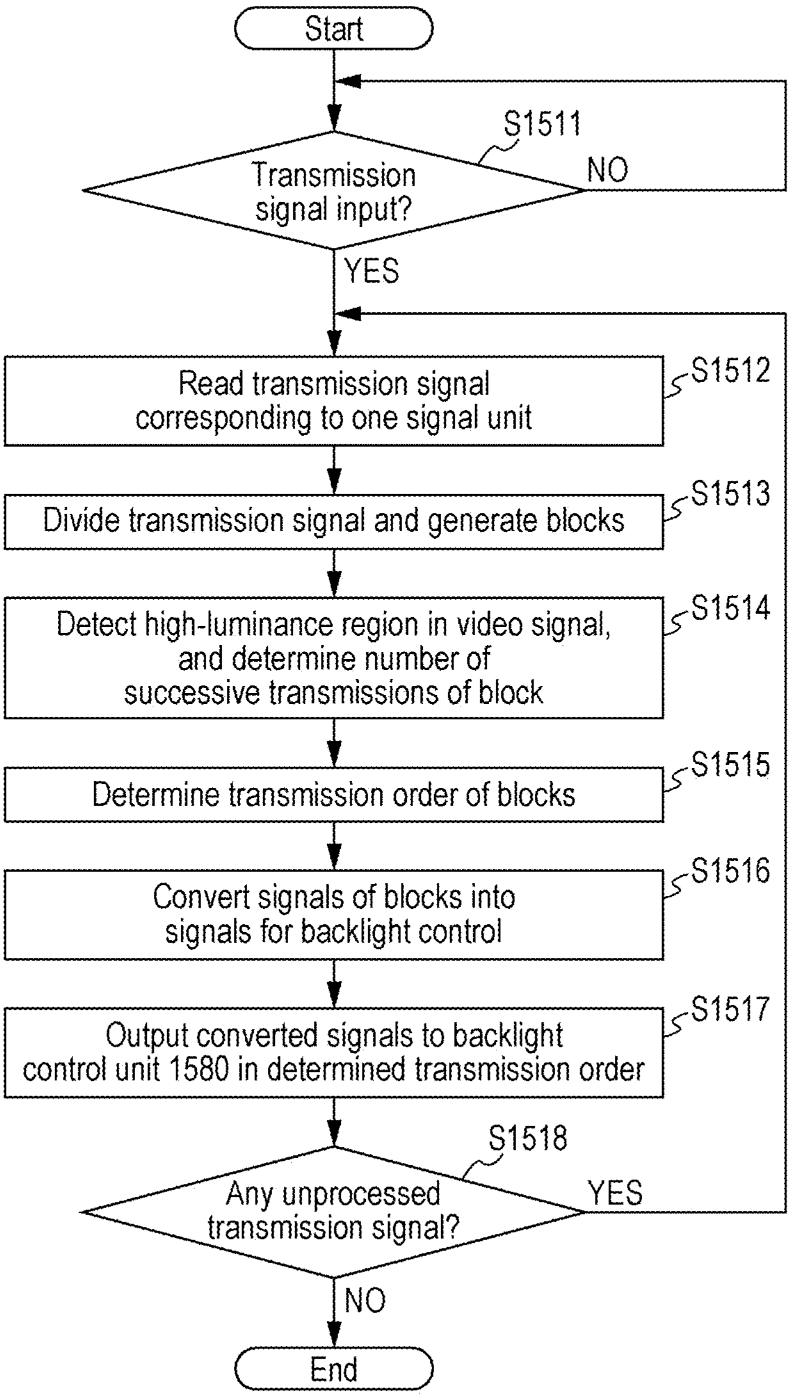
Figure 374:
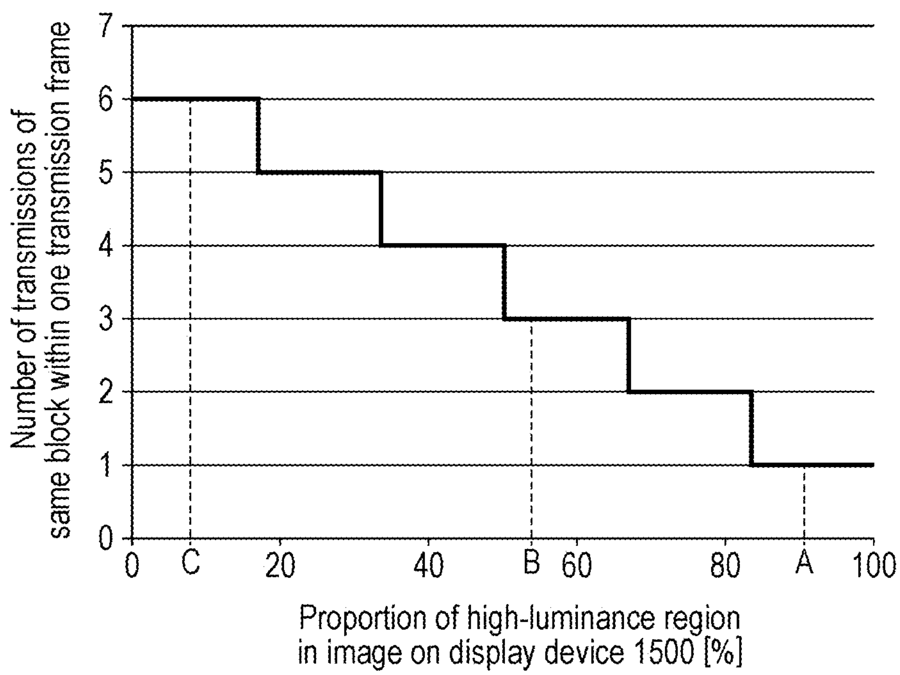
Figure 375:
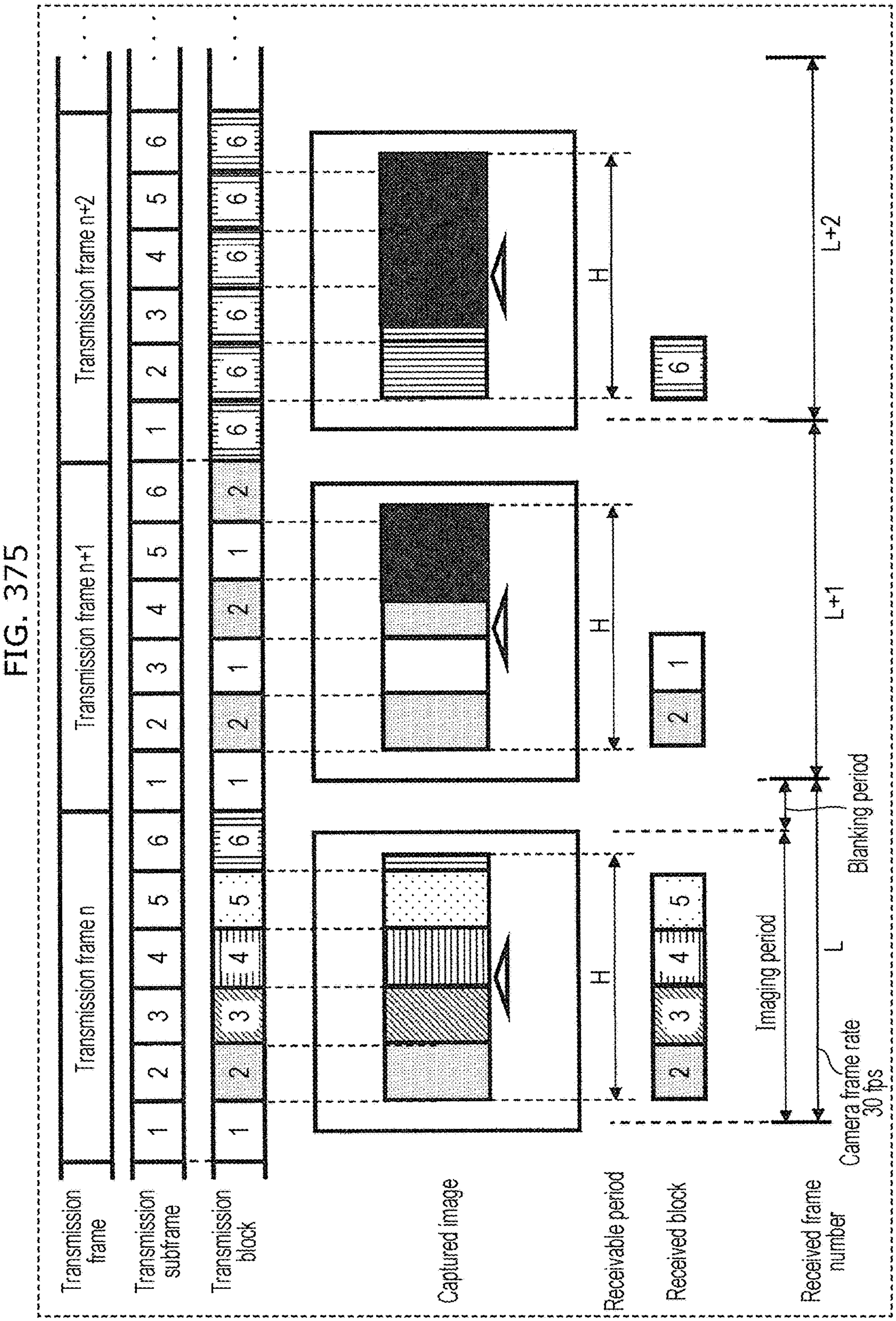
Figure 376:
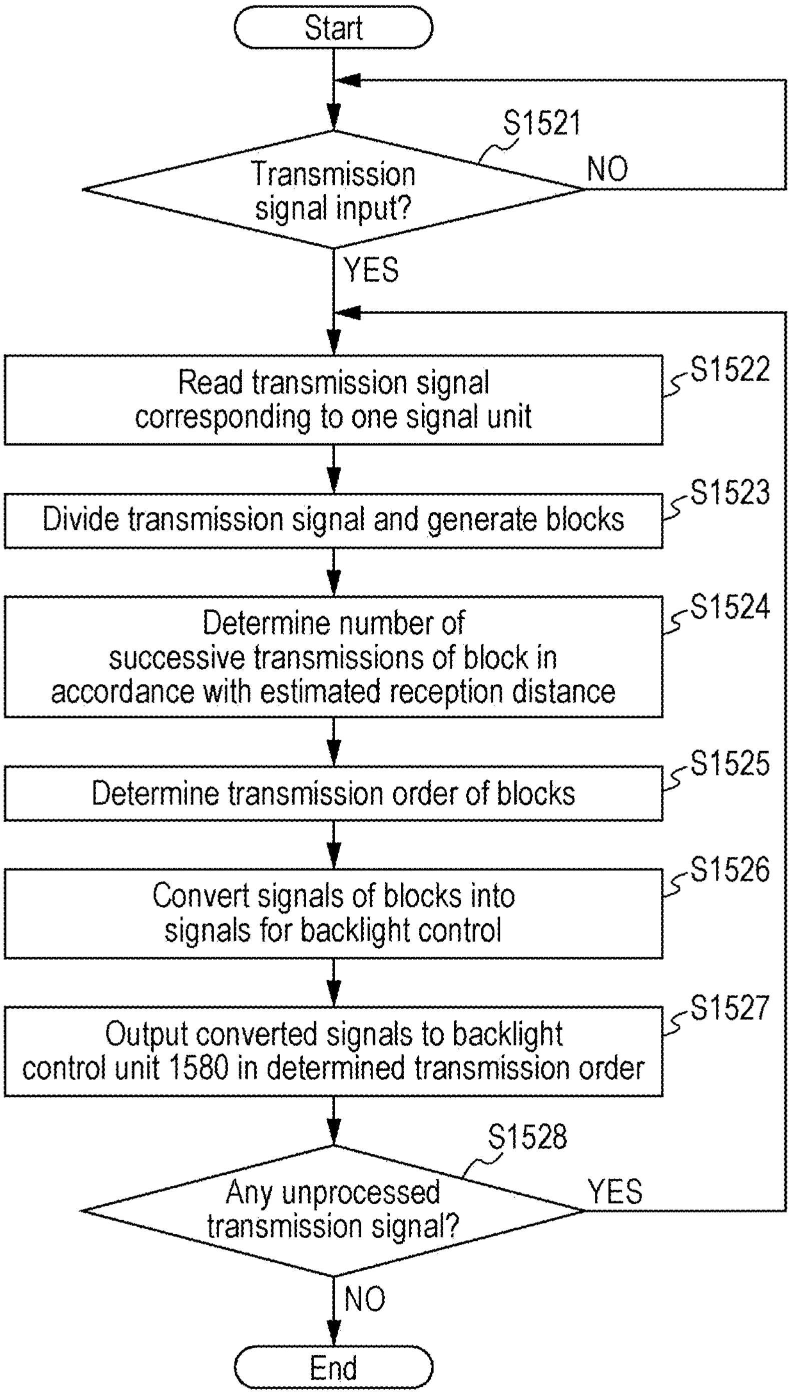
Figure 377:
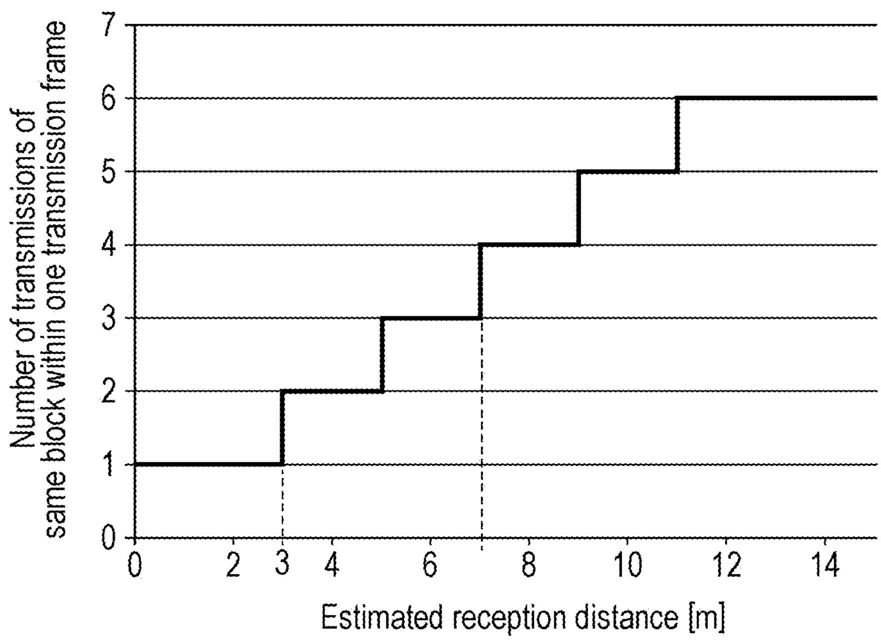
Figure 378:
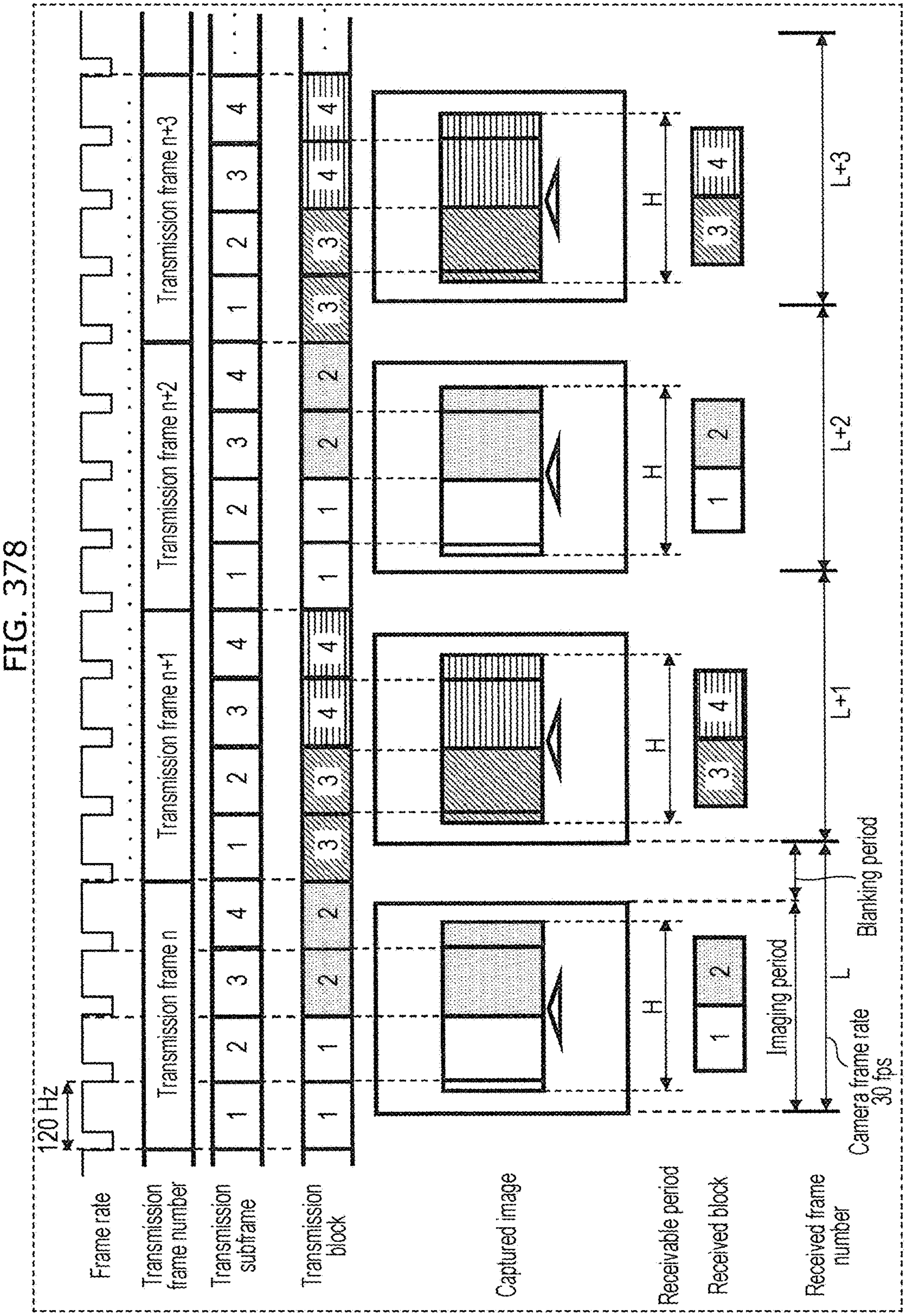
Figure 379:
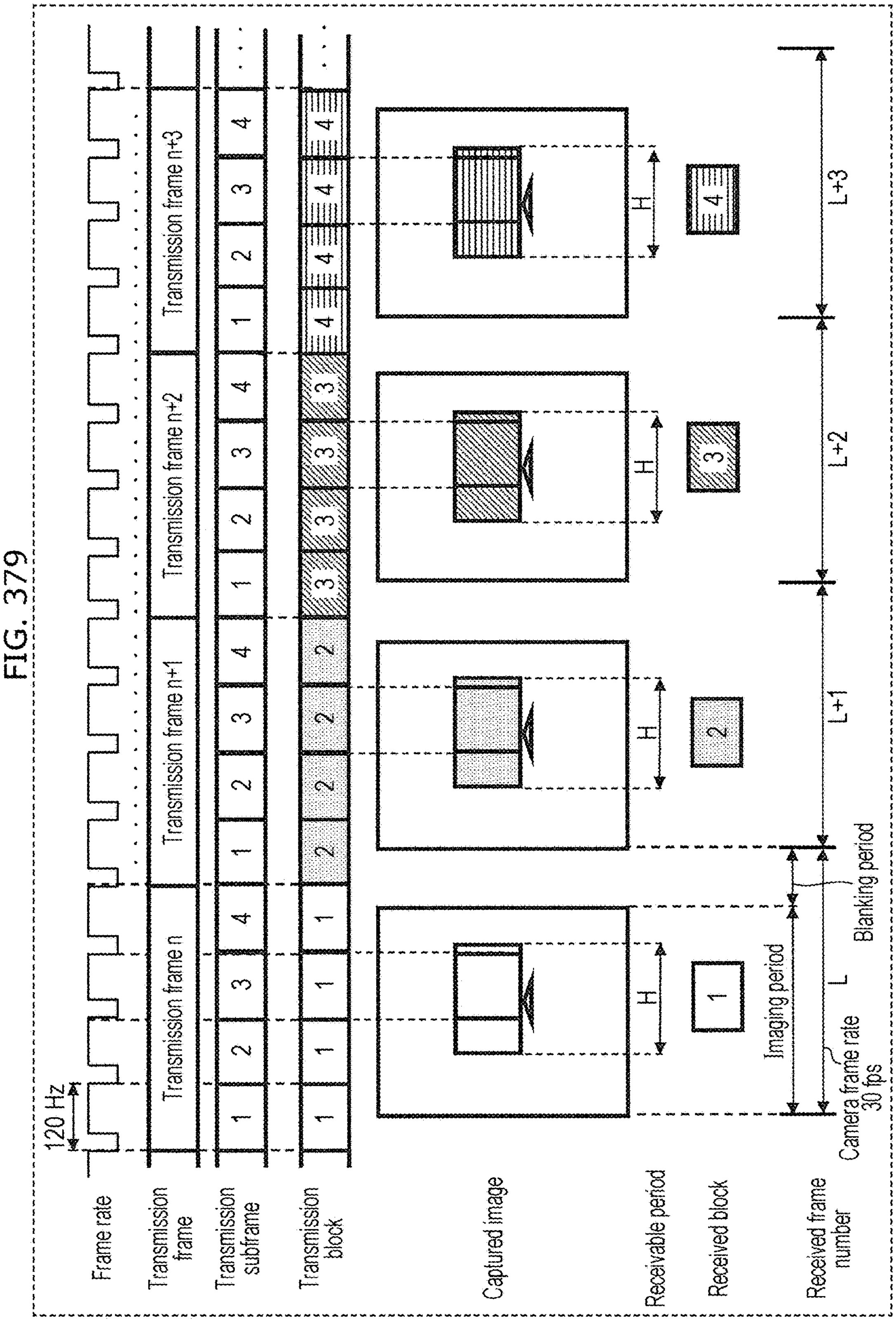
Figure 380:
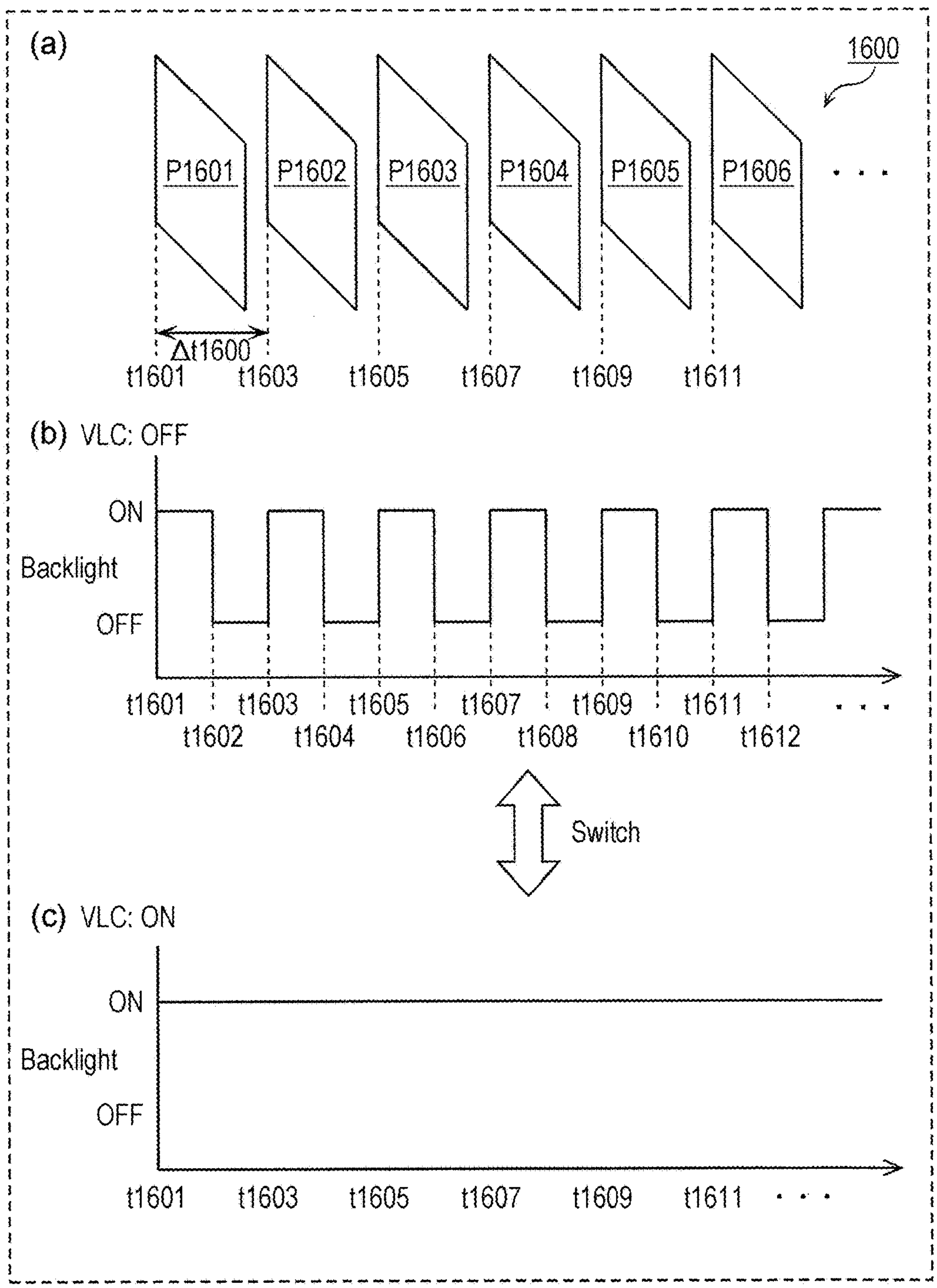
Figure 381:
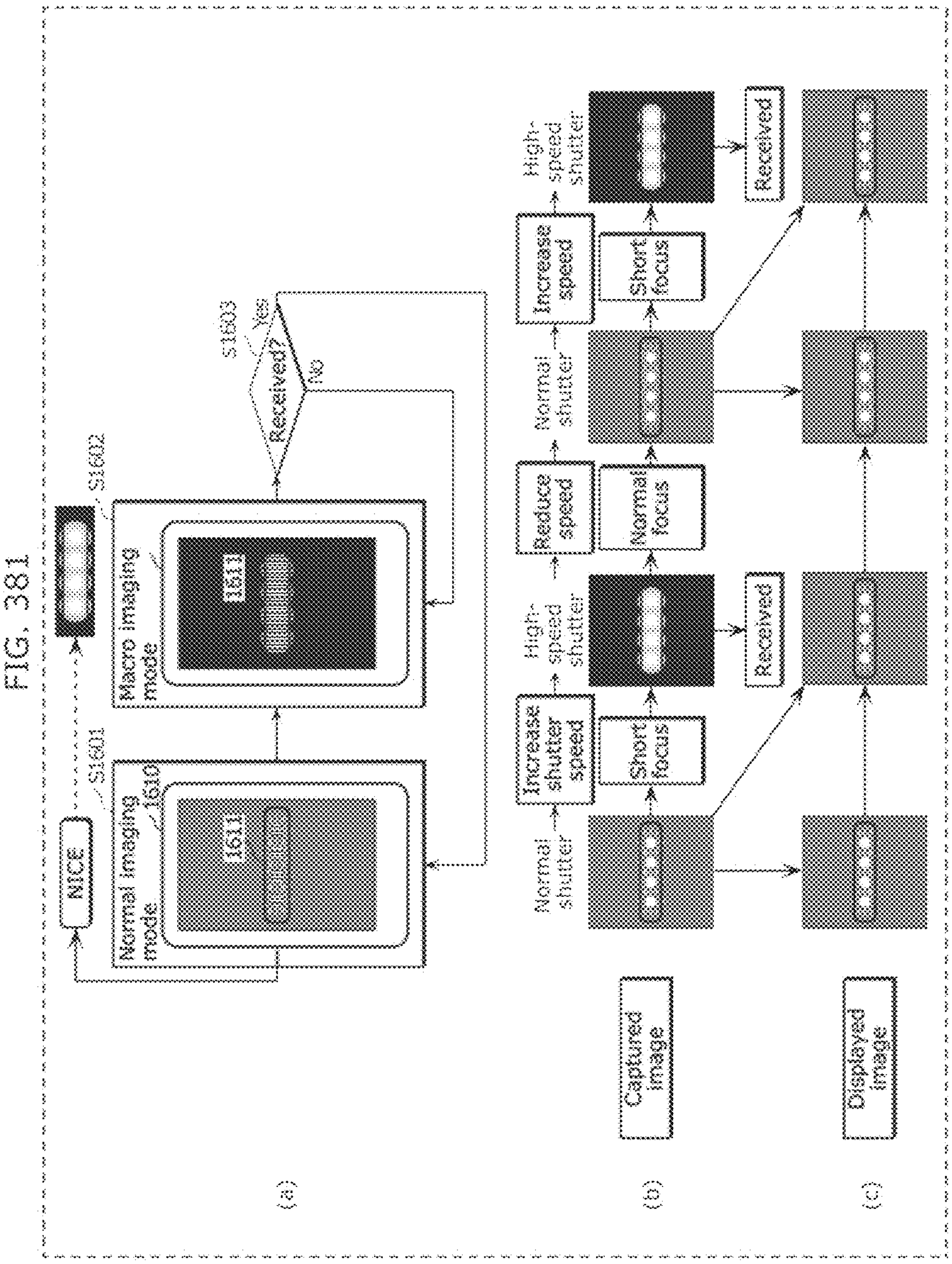

FIG. 256 is a flowchart illustrating a signal reception method in the case of a long exposure time in Embodiment 10;

FIG. 257 is a diagram illustrating an example of a transmitter light adjustment (brightness adjustment) method in Embodiment 10;

FIG. 258 is a diagram illustrating an exemplary method of performing a transmitter light adjustment function in Embodiment 10;

FIG. 259A is a flowchart illustrating an example of operation of a receiver in Embodiment 11;

FIG. 259B is a flowchart illustrating an example of operation of a receiver in Embodiment 11;

FIG. 259C is a flowchart illustrating an example of operation of a receiver in Embodiment 11;

FIG. 259D is a flowchart illustrating an example of operation of a receiver in Embodiment 11;

FIG. 260 is a diagram for describing EX zoom;

FIG. 261A is a flowchart illustrating processing of a reception program in Embodiment 10;

FIG. 261B is a block diagram of a reception device in Embodiment 10;

FIG. 262 is a diagram illustrating an example of a signal reception method in Embodiment 12;

FIG. 263 is a diagram illustrating an example of a signal reception method in Embodiment 12;

FIG. 264 is a diagram illustrating an example of a signal reception method in Embodiment 12;

FIG. 265 is a diagram illustrating an example of a screen display method used by a receiver in Embodiment 12;

FIG. 266 is a diagram illustrating an example of a signal reception method in Embodiment 12;

FIG. 267 is a diagram illustrating an example of a signal reception method in Embodiment 12;

FIG. 268 is a flowchart illustrating an example of a signal reception method in Embodiment 12;

FIG. 269 is a diagram illustrating an example of a signal reception method in Embodiment 12;

FIG. 270A is a flowchart illustrating processing of a reception program in Embodiment 12;

FIG. 270B is a block diagram of a reception device in Embodiment 12;

FIG. 271 is a diagram illustrating an example of what is displayed on a receiver when a visible light signal is received;

FIG. 272 is a diagram illustrating an example of what is displayed on a receiver when a visible light signal is received;

FIG. 273 is a diagram illustrating a display example of obtained data image;

FIG. 274 is a diagram illustrating an operation example for storing or discarding obtained data;

FIG. 275 is a diagram illustrating an example of what is displayed when obtained data is browsed;

FIG. 276 is a diagram illustrating an example of a transmitter in Embodiment 12;

FIG. 277 is a diagram illustrating an example of a reception method in Embodiment 12;

FIG. 278 is a diagram illustrating an example of a header pattern in Embodiment 13;

FIG. 279 is a diagram for describing an example of a packet structure in a communication protocol in Embodiment 13;

FIG. 280 is a flowchart illustrating an example of a reception method in Embodiment 13;

FIG. 281 is a flowchart illustrating an example of a reception method in Embodiment 13;

FIG. 282 is a flowchart illustrating an example of a reception method in Embodiment 13;

FIG. 283 is a diagram for describing a reception method in which a receiver in Embodiment 13 uses a exposure time longer than a period of a modulation frequency (a modulation period);

FIG. 284 is a diagram for describing a reception method in which a receiver in Embodiment 13 uses a exposure time longer than a period of a modulation frequency (a modulation period);

FIG. 285 is a diagram indicating an efficient number of divisions relative to a size of transmission data in Embodiment 13;

FIG. 286A is a diagram illustrating an example of a setting method in Embodiment 13;

FIG. 286B is a diagram illustrating another example of a setting method in Embodiment 13;

FIG. 287A is a flowchart illustrating processing of an image processing program in Embodiment 13;

FIG. 287B is a block diagram of an information processing apparatus in Embodiment 13;

FIG. 288 is a diagram for describing an example of application of a transmission and reception system in Embodiment 13;

FIG. 289 is a flowchart illustrating processing operation of a transmission and reception system in Embodiment 13;

FIG. 290 is a diagram for describing an example of application of a transmission and reception system in Embodiment 13;

FIG. 291 is a flowchart illustrating processing operation of a transmission and reception system in Embodiment 13;

FIG. 292 is a diagram for describing an example of application of a transmission and reception system in Embodiment 13;

FIG. 293 is a flowchart illustrating processing operation of a transmission and reception system in Embodiment 13;

FIG. 294 is a diagram for describing an example of application of a transmitter in Embodiment 13;

FIG. 295 is a diagram for describing an example of application of a transmission and reception system in Embodiment 14;

FIG. 296 is a diagram for describing an example of application of a transmission and reception system in Embodiment 14;

FIG. 297 is a diagram for describing an example of application of a transmission and reception system in Embodiment 14;

FIG. 298 is a diagram for describing an example of application of a transmission and reception system in Embodiment 14;

FIG. 299 is a diagram for describing an example of application of a transmission and reception system in Embodiment 14;

FIG. 300 is a diagram for describing an example of application of a transmission and reception system in Embodiment 14;

FIG. 301 is a diagram for describing an example of application of a transmission and reception system in Embodiment 14;

FIG. 302 is a diagram for describing an example of application of a transmission and reception system in Embodiment 14;

FIG. 303 is a diagram for describing an example of application of a transmission and reception system in Embodiment 14;

FIG. 304 is a diagram for describing an example of application of a transmission and reception system in Embodiment 14;

FIG. 305 is a diagram for describing an example of application of a transmission and reception system in Embodiment 14;

FIG. 306 is a diagram for describing an example of application of a transmission and reception system in Embodiment 14;

FIG. 307 is a diagram for describing an example of application of a transmission and reception system in Embodiment 14;

FIG. 308 is a diagram for describing an example of application of a transmission and reception system in Embodiment 14;

FIG. 309 is a diagram for describing operation of a receiver in Embodiment 15;

FIG. 310A is a diagram for describing other operation of the receiver in Embodiment 15;

FIG. 310B is a diagram illustrating an example of an indicator displayed by an output unit in Embodiment 15;

FIG. 310C is a diagram illustrating an example of an AR view in Embodiment 15;

FIG. 311A is a diagram for describing an example of a transmitter in Embodiment 15;

FIG. 311B is a diagram for describing another example of a transmitter in Embodiment 15;

FIG. 312A is a diagram for describing an example of synchronous transmission from a plurality of transmitters in Embodiment 15;

FIG. 312B is a diagram for describing another example of synchronous transmission from a plurality of transmitters in Embodiment 15;

FIG. 313 is a diagram for describing another example of synchronous transmission from a plurality of transmitters in Embodiment 15;

FIG. 314 is a diagram for describing signal processing of the transmitter in Embodiment 15;

FIG. 315 is a flowchart illustrating an example of a reception method in Embodiment 15;

FIG. 316 is a diagram for describing the example of the reception method in Embodiment 15;

FIG. 317 is a flowchart illustrating another example of a reception method in Embodiment 15;

FIG. 318 is a diagram illustrating an example of a case where the exposure time is three times the transmission period and the transmission signal is in the form of binary digits (0 or 1) in Embodiment 15;

FIG. 319 is a diagram illustrating state transition paths in Embodiment 15;

FIG. 320 illustrates diagrams illustrating captured images of an object that rapidly blinks in Embodiment 16;

FIG. 321 is a diagram illustrating reception periods and blind periods in Embodiment 16 when line-scan sampling (LSS) is used;

FIG. 322 is a diagram illustrating cutout scan that enables continuous reception in Embodiment 16;

FIG. 323 illustrates diagrams illustrating an example of symbols using frequency modulation in Embodiment 16;

FIG. 324 is a diagram illustrating frequency response using LSS in Embodiment 16;

FIG. 325 illustrates diagrams illustrating examples of a 4 PPM symbol and a V4 PPM symbol in Embodiment 16;

FIG. 326 illustrates diagrams illustrating example of a Manchester coding symbol and a VPPM symbol in Embodiment 16;

FIG. 327 illustrates diagrams for describing efficiency of V4 PPM and VPPM in Embodiment 16 by comparison;

FIG. 328 illustrates diagrams illustrating signals in the frequency domain and the magnitude of noise in Embodiment 16;

FIG. 329A is a diagram illustrating the difference between a transmission frequency and a reception frequency (maximum frequency component of a received signal) in Embodiment 16;

FIG. 329B is a diagram illustrating an example of error rate with respect to frequency margin in Embodiment 16;

FIG. 329C is a diagram illustrating another example of error rate with respect to frequency margin in Embodiment 16;

FIG. 329D is a diagram illustrating another example of error rate with respect to frequency margin in Embodiment 16;

FIG. 329E is a diagram illustrating another example of error rate with respect to frequency margin in Embodiment 16;

FIG. 329F is a diagram illustrating another example of error rate with respect to frequency margin in Embodiment 16;

FIG. 330 is a diagram illustrating a packet reception error rate of a V4 PPM symbol in Embodiment 16;

FIG. 331 is a block diagram illustrating a configuration of a display system in Embodiment 17;

FIG. 332 is a diagram illustrating a form of transmission and reception between a video standard signal sending unit and a video standard signal receiving unit in Embodiment 17;

FIG. 333 is a diagram illustrating an example of a specific form of transmission and reception between the video standard signal sending unit and the video standard signal receiving unit in Embodiment 17;

FIG. 334 is a diagram illustrating another example of a specific form of transmission and reception between the video standard signal sending unit and the video standard signal receiving unit in Embodiment 17;

FIG. 335 is a diagram illustrating another example of a specific form of transmission and reception between the video standard signal sending unit and the video standard signal receiving unit in Embodiment 17;

FIG. 336A is a diagram illustrating an example of power to be delivered via a power-delivery transmission path in Embodiment 17;

FIG. 336B is a diagram illustrating another example of power to be delivered via the power-delivery transmission path in Embodiment 17;

FIG. 337 is a diagram illustrating another example of a specific form of transmission and reception between the video standard signal sending unit and the video standard signal receiving unit in Embodiment 17;

FIG. 338 is a diagram illustrating another example of a specific form of transmission and reception between the video standard signal sending unit and the video standard signal receiving unit in Embodiment 17;

FIG. 339 is a schematic diagram illustrating an example of a visible light communication system according to Embodiment 18;

FIG. 340 is a block diagram illustrating an example of a schematic configuration of a display device according to Embodiment 18;

FIG. 341A is a diagram illustrating an example of B.L. control signals before a visible light communication signal is superimposed on the B.L. control signals according to Example 1 in Embodiment 18;

FIG. 341B is a diagram illustrating an example of B.L. control signals having a visible light communication signal superimposed thereon according to Example 1 in Embodiment 18;

FIG. 342 is a timing chart for describing a first method in Example 2 in Embodiment 18;

FIG. 343 is a timing chart for describing the first method in Example 2 in Embodiment 18;

FIG. 344A is a timing chart for describing a second method in Example 2 in Embodiment 18;

FIG. 344B is a timing chart for describing the second method in Example 2 in Embodiment 18;

FIG. 344C is a timing chart for describing the second method in Example 2 in Embodiment 18;

FIG. 344D is a timing chart for describing the second method in Example 2 in Embodiment 18;

FIG. 345A is a timing chart for describing the second method in Example 2 in Embodiment 18;

FIG. 345B is a timing chart for describing the second method in Example 2 in Embodiment 18;

FIG. 345C is a timing chart for describing the second method in Example 2 in Embodiment 18;

FIG. 345D is a timing chart for describing the second method in Example 2 in Embodiment 18;

FIG. 346 is a timing chart for describing a method for superimposing a visible light communication signal on a B.L. control signal in Example 3 in Embodiment 18;

FIG. 347 is a flowchart for describing operation of a second processing unit in Embodiment 19;

FIG. 348A is a diagram for describing a specific method for superimposing an encoded signal on a B.L. control signal in Embodiment 19;

FIG. 348B is a diagram for describing a specific method for superimposing an encoded signal on a B.L. control signal in Embodiment 19;

FIG. 348C is a diagram for describing a specific method for superimposing an encoded signal on a B.L. control signal in Embodiment 19;

FIG. 348D is a diagram for describing a specific method for superimposing an encoded signal on a B.L. control signal in Embodiment 19;

FIG. 349 is a diagram for describing another specific method for superimposes an encoded signal on a B.L. control signal in Embodiment 19;

FIG. 350 is a flowchart for describing operation of a second processing unit in Embodiment 20;

FIG. 351 is a timing chart illustrating an example of the division of regions into groups in Embodiment 20;

FIG. 352 is a timing chart illustrating another example of the division of regions into groups in Embodiment 20;

FIG. 353 is a timing chart illustrating another example of the division of regions into groups in Embodiment 20;

FIG. 354 is a flowchart for describing operation of a second processing unit in Embodiment 21;

FIG. 355A is a diagram for describing the phase relationship between a B.L. control signal and a visible light communication signal in Embodiment 21;

FIG. 355B is a diagram for describing the phase relationship between a B.L. control signal and a visible light communication signal in Embodiment 21;

FIG. 356A is a timing chart for describing operation of the second processing unit in Embodiment 21;

FIG. 356B is a timing chart for describing operation of the second processing unit in Embodiment 21;

FIG. 356C is a timing chart for describing operation of the second processing unit in Embodiment 21;

FIG. 357A is a timing chart for describing operation of a second processing unit in Embodiment 22;

FIG. 357B is a timing chart for describing operation of the second processing unit in Embodiment 22;

FIG. 358 is a timing chart illustrating backlight control in Embodiment 23 when local dimming is applied;

FIG. 359 is a flowchart for describing an example of operation of a second processing unit in Embodiment 23;

FIG. 360 is a timing chart for describing an example of operation of the second processing unit in Embodiment 23;

FIG. 361 is a flowchart for describing an example of operation of the second processing unit in Embodiment 23;

FIG. 362 is a timing chart for describing an example of operation of the second processing unit in Embodiment 23;

FIG. 363 is a timing chart for describing an example of operation of the second processing unit in Embodiment 23;

FIG. 364 is a schematic diagram illustrating an example of a visible light communication system according to Embodiment 24;

FIG. 365 is a block diagram illustrating an example of a schematic configuration of a display device according to Embodiment 24;

FIG. 366 is a schematic diagram illustrating an example of the generation of a visible light communication signal;

FIG. 367 is a schematic diagram for describing the turning on of the display device, exposure performed in a smartphone, and a captured image;

FIG. 368 is a schematic diagram for describing a transmission signal, exposure performed in a smartphone, and a captured image;

FIG. 369 is a flowchart for describing processing operation of a visible light communication signal processing unit according to Embodiment 24;

FIG. 370 is a diagram describing a relationship between the frequency of the display device and the frequency of the smartphone according to Embodiment 24;

FIG. 371 is a diagram for describing an example of a transmission method by the display device according to Embodiment 24;

FIG. 372 is a diagram for describing another example of a transmission method by a display device according to Embodiment 24;

FIG. 373 is a flowchart for describing processing operation of a visible light communication signal processing unit according to Embodiment 25;

FIG. 374 is a diagram for describing an example of a method for determining the number of successive transmissions of a block in one transmission frame according to Embodiment 25;

FIG. 375 is a diagram for describing an example of a transmission method by a display device according to Embodiment 25;

FIG. 376 is a flowchart for describing of processing operation of a visible light communication signal processing unit according to Embodiment 26;

FIG. 377 is a diagram for describing an example of a method for determining the number of successive transmissions of a block in one transmission frame according to Embodiment 26;

FIG. 378 is a diagram for describing an example of a transmission method by a display device according to Embodiment 26;

FIG. 379 is a diagram for describing another example of a transmission method by a display device according to Embodiment 26;

FIG. 380 is a diagram for describing switching control of visible light communication according to Embodiment 27 in the case where a transmission device is a moving-image display device such as a television set;

FIG. 381 is a diagram illustrating processing operation of a reception device (an imaging device) in Embodiment 27.

Figure 382:
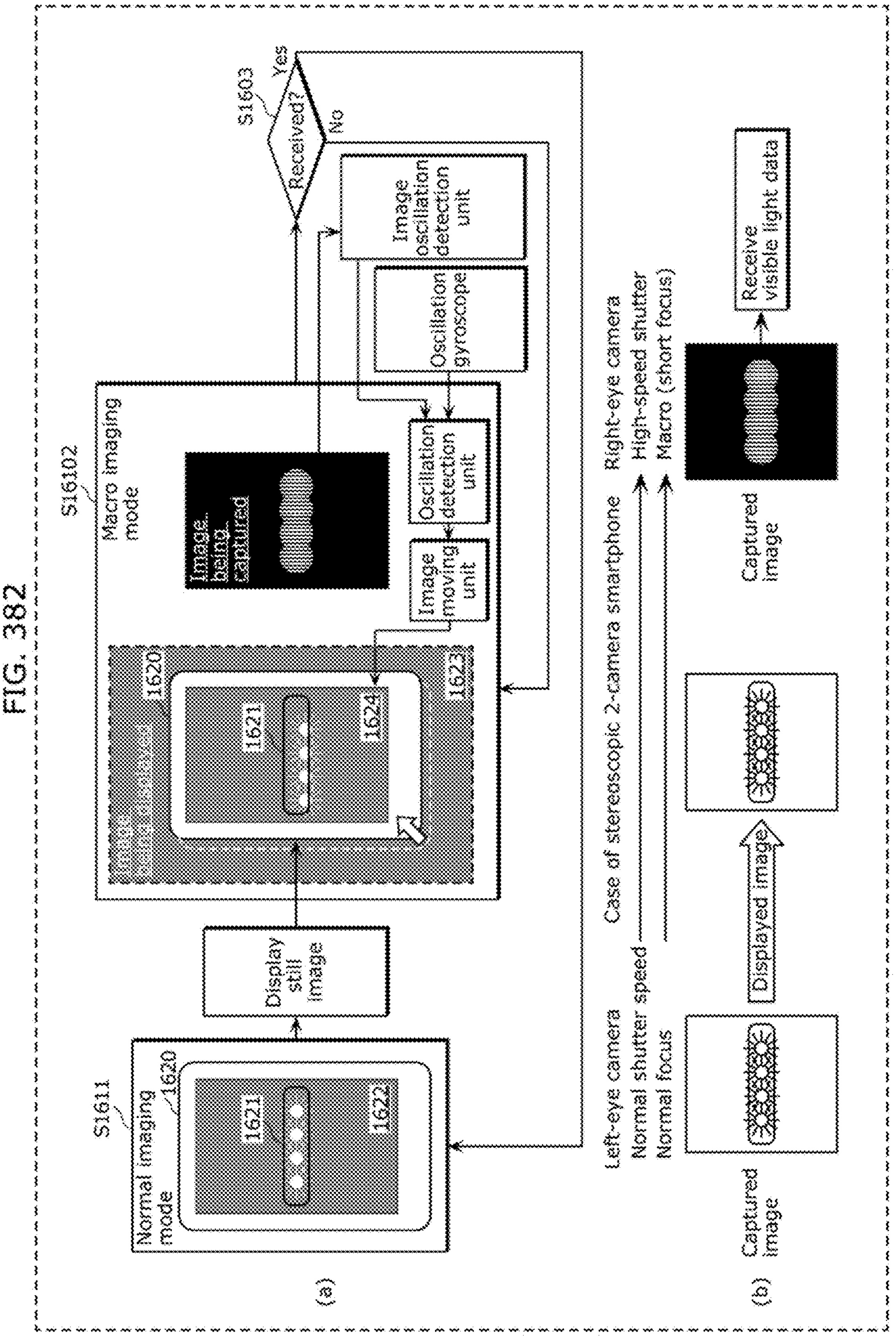

FIG. 382 is a diagram illustrating processing operation of a reception device (an imaging device) in Embodiment 27.

Figure 383:
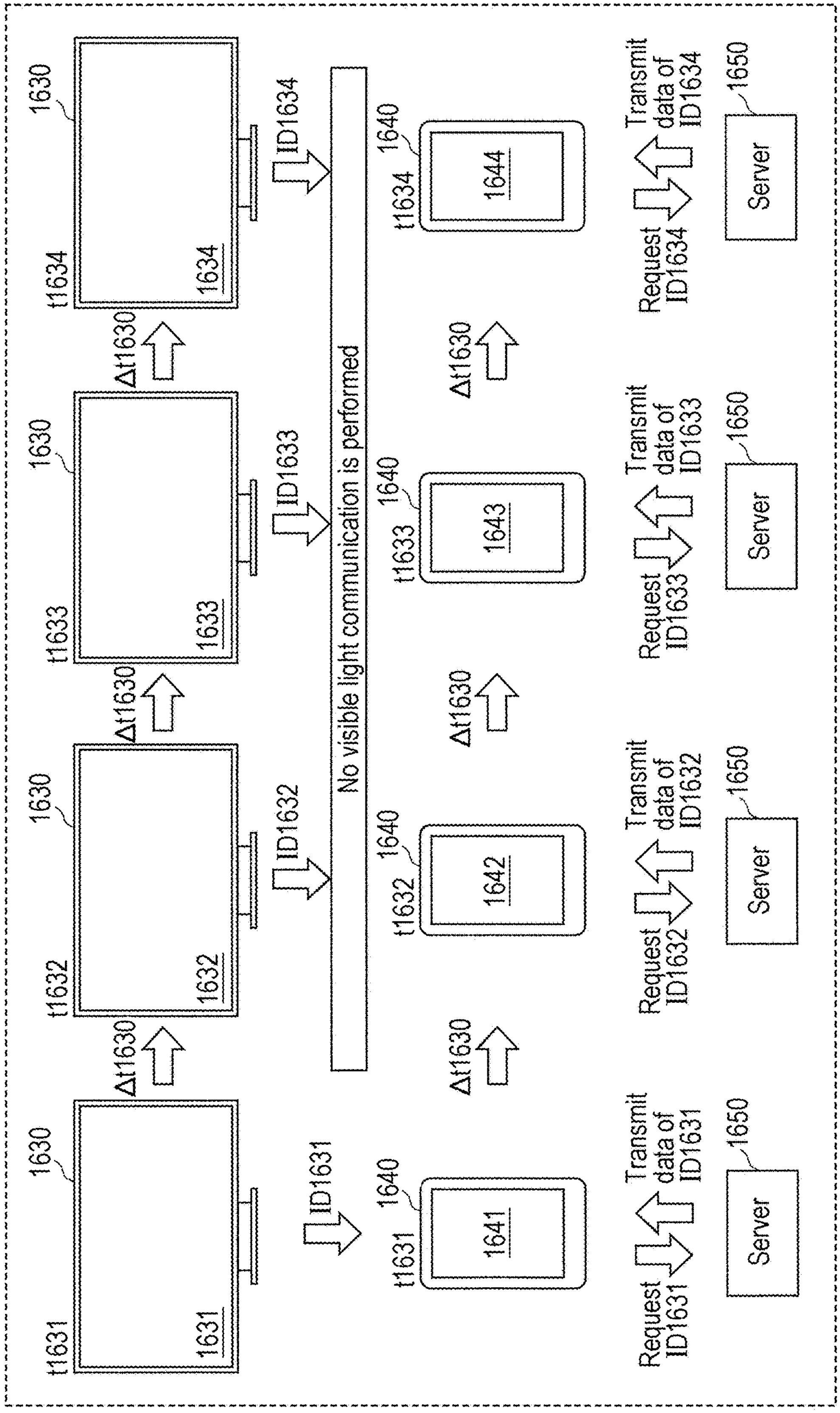
Figure 384:
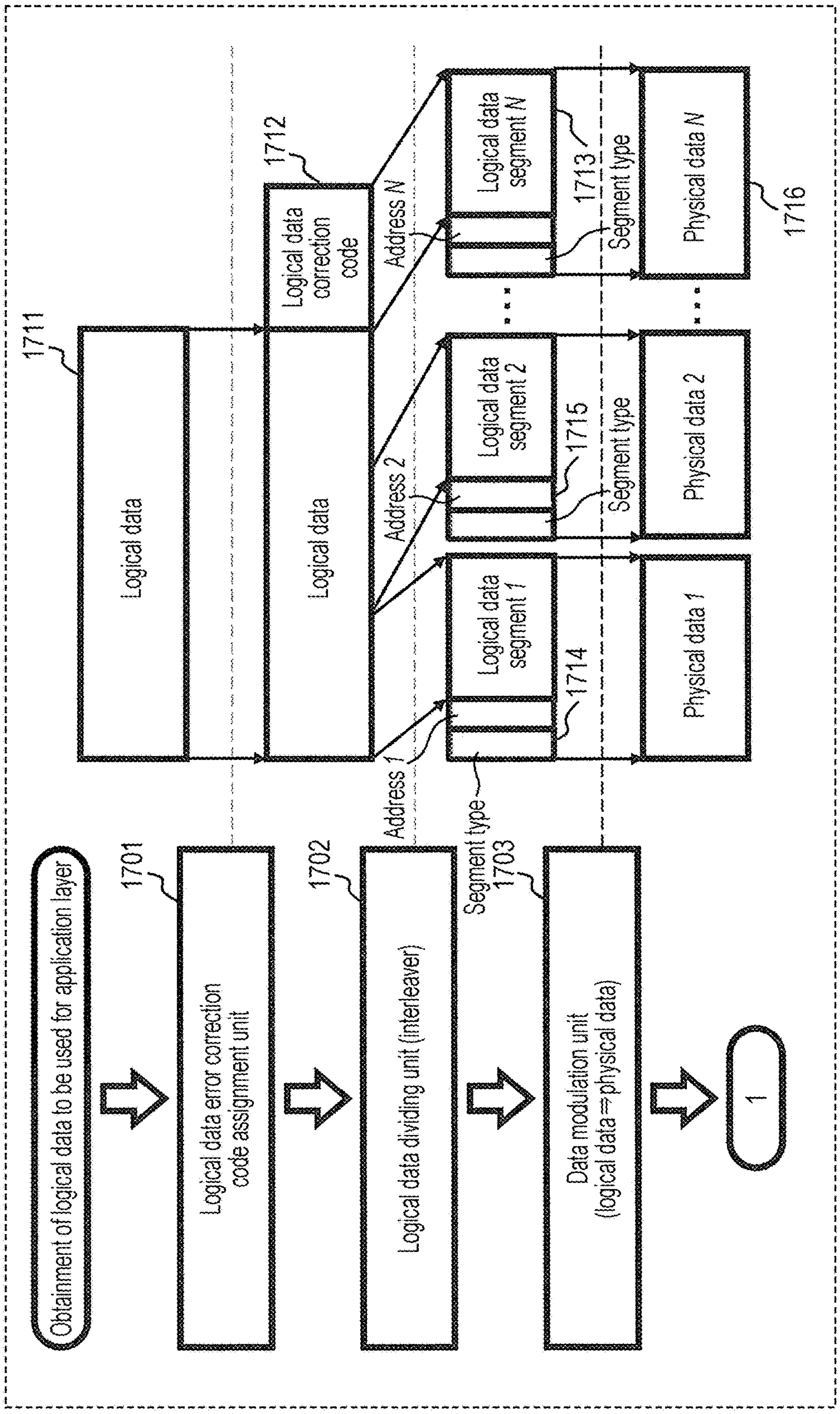
Figure 385:
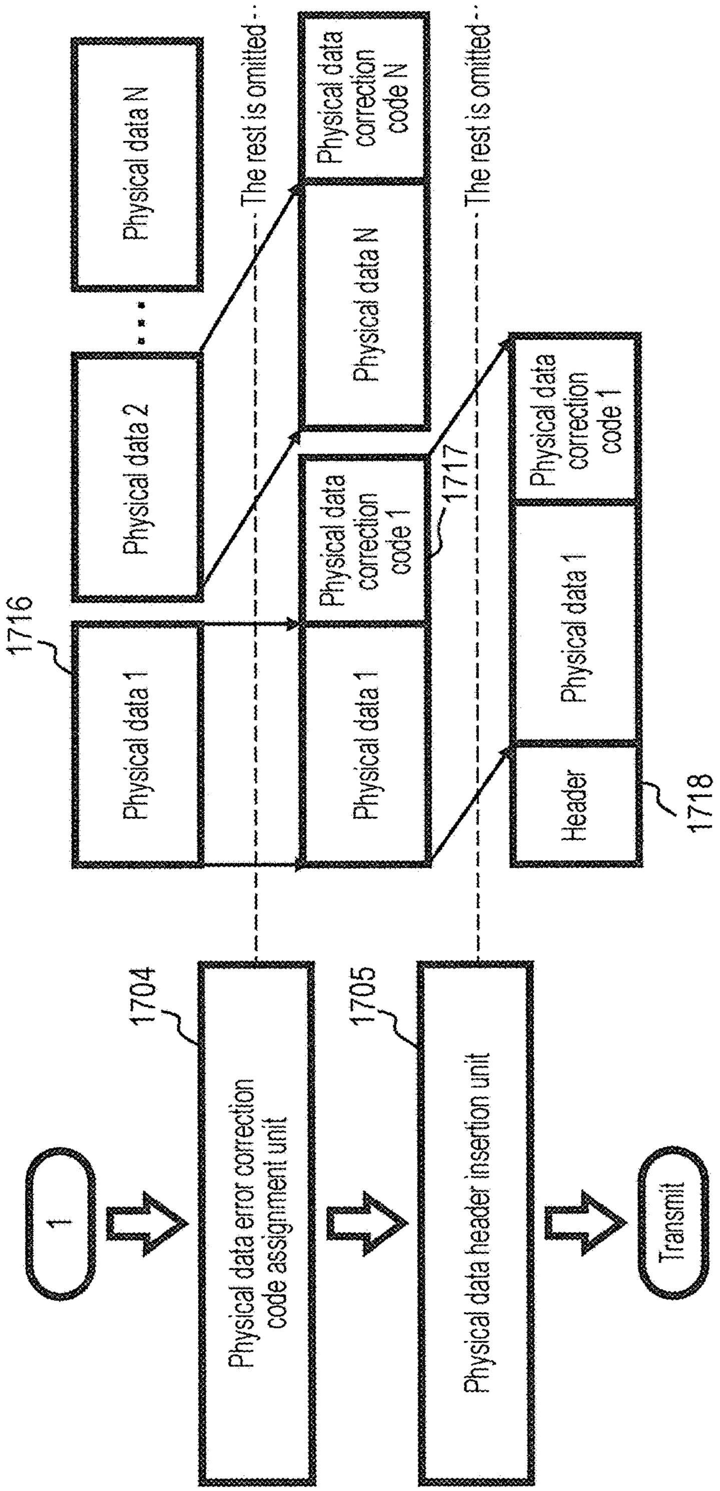
Figure 386:
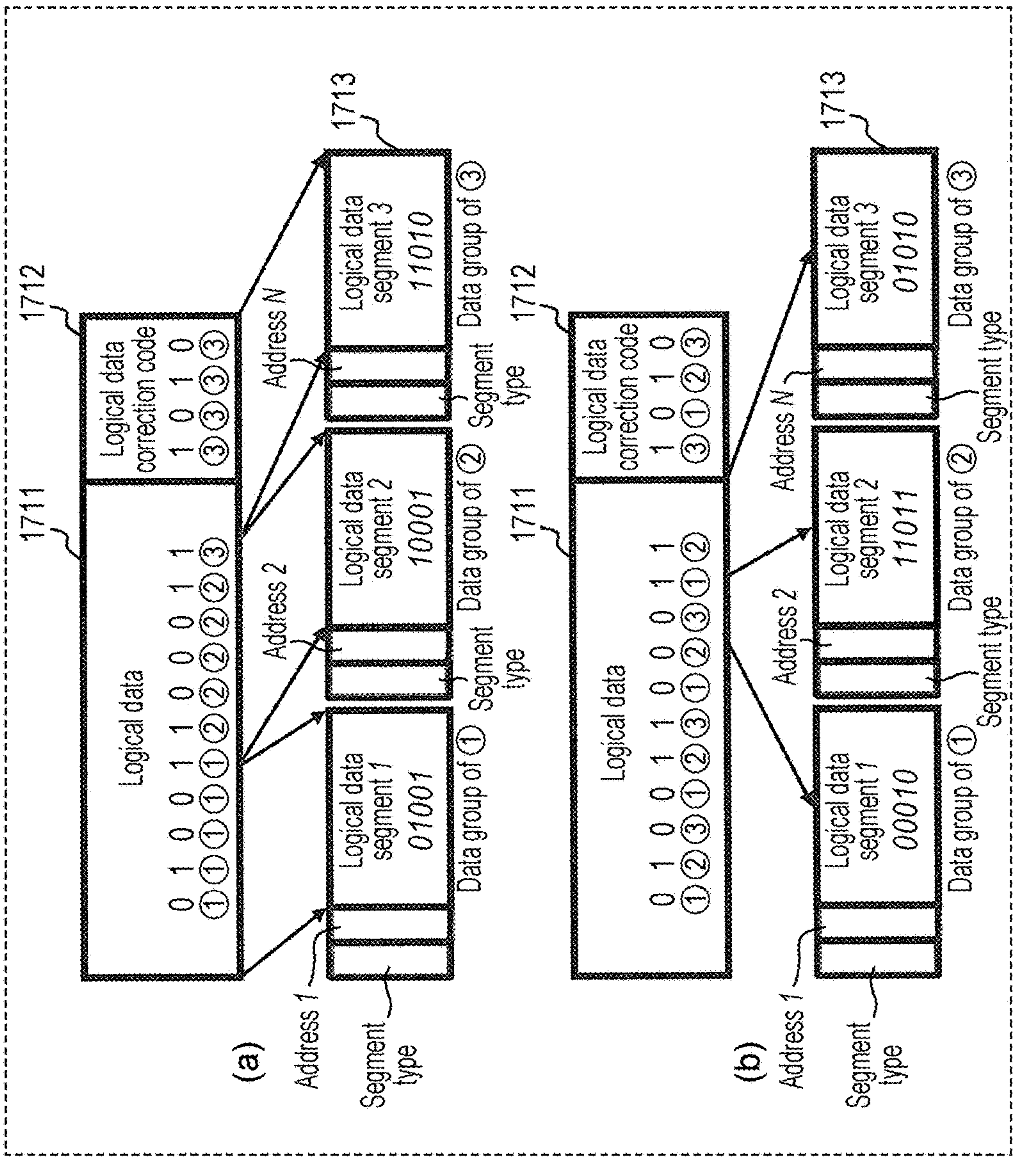
Figure 387:
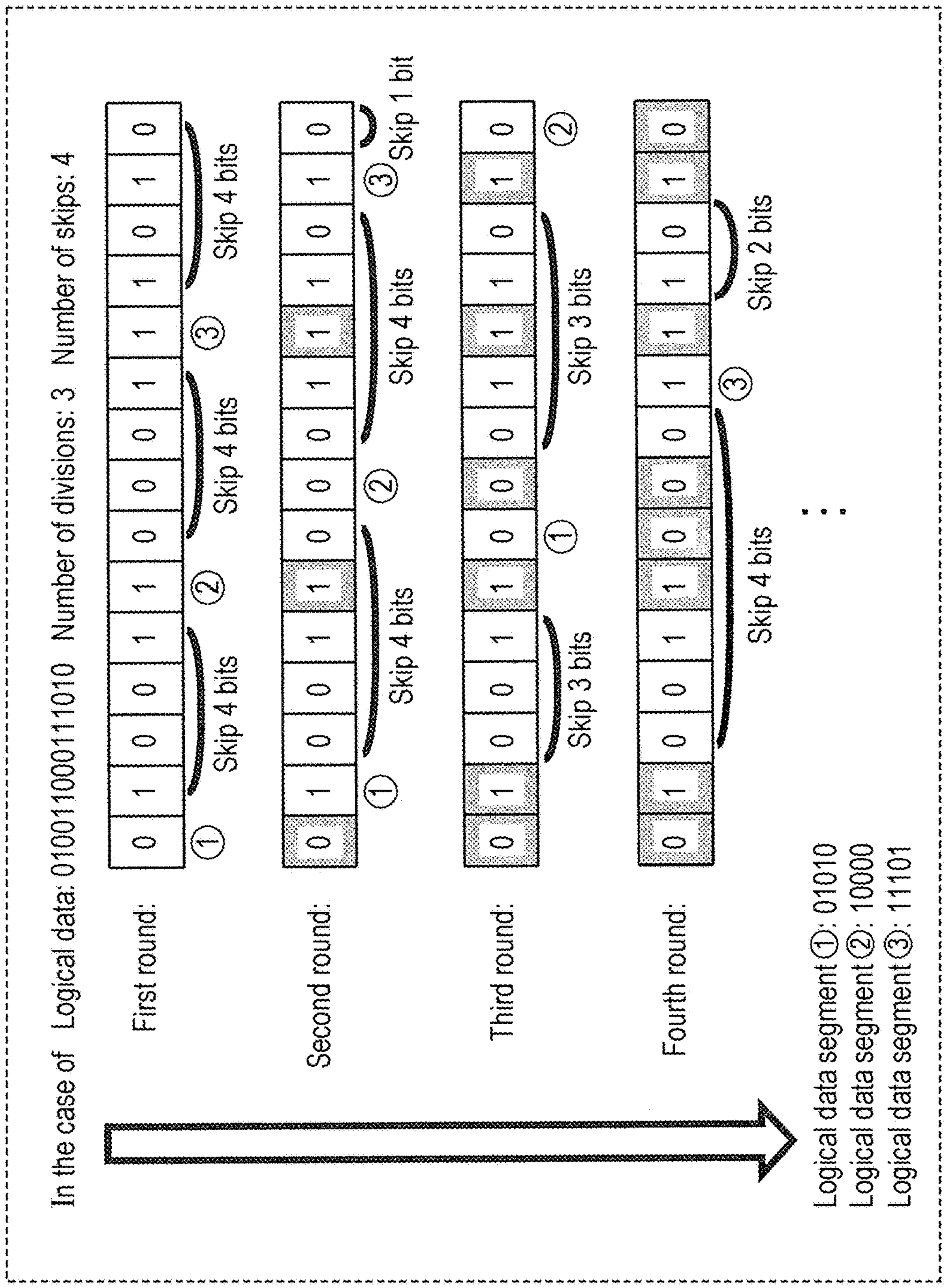
Figure 388:
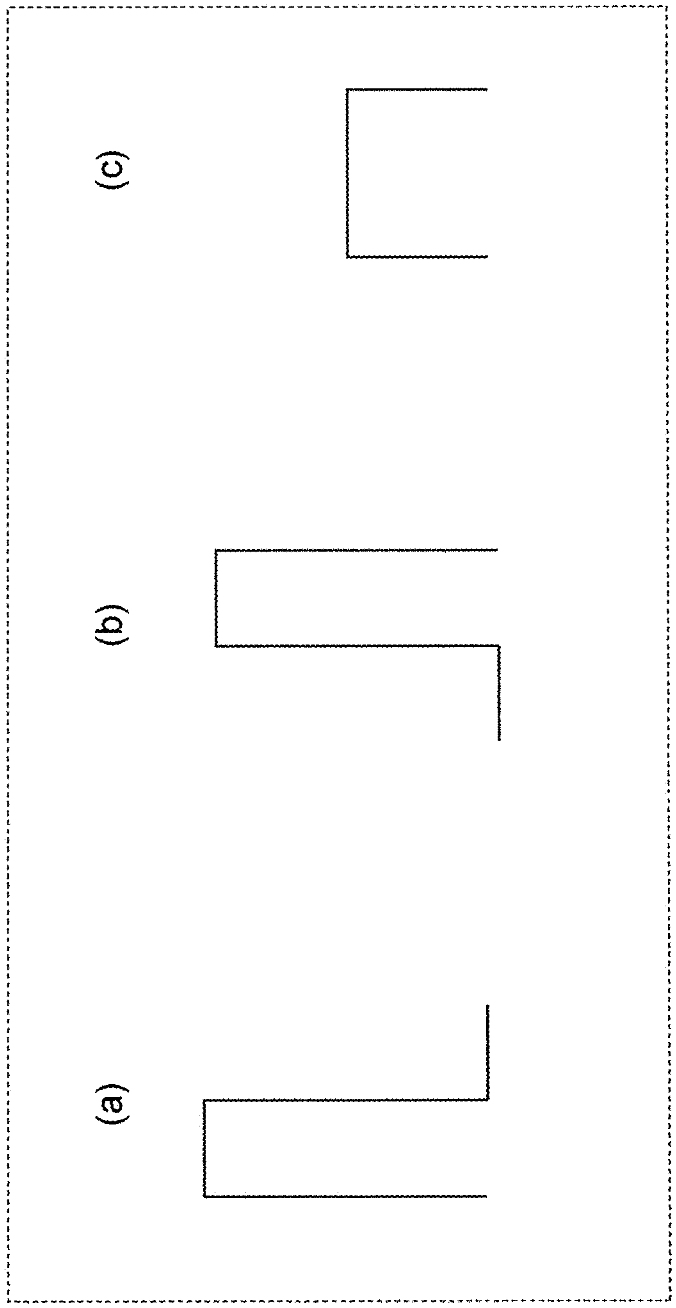
Figure 389:
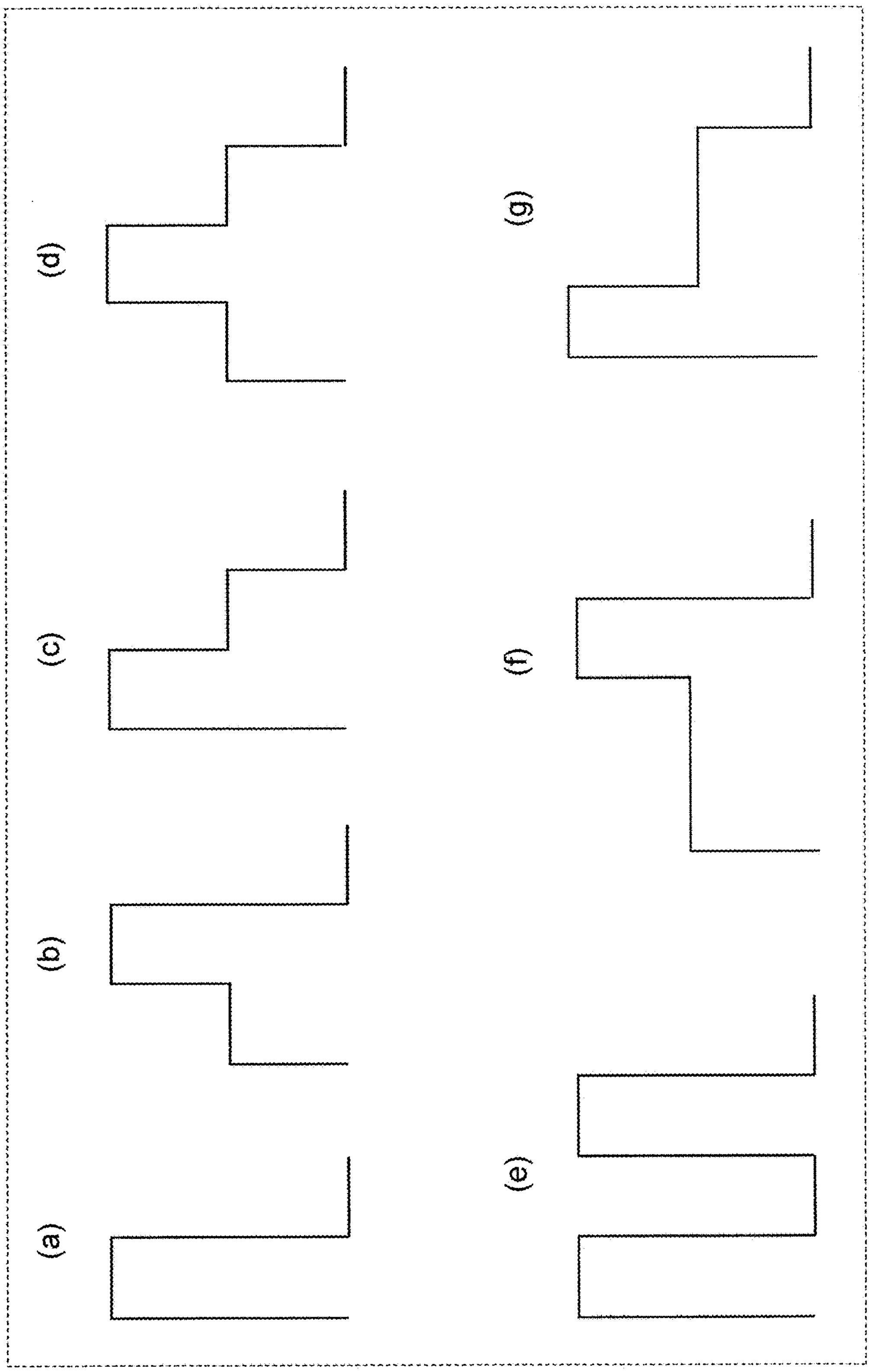
Figure 390:
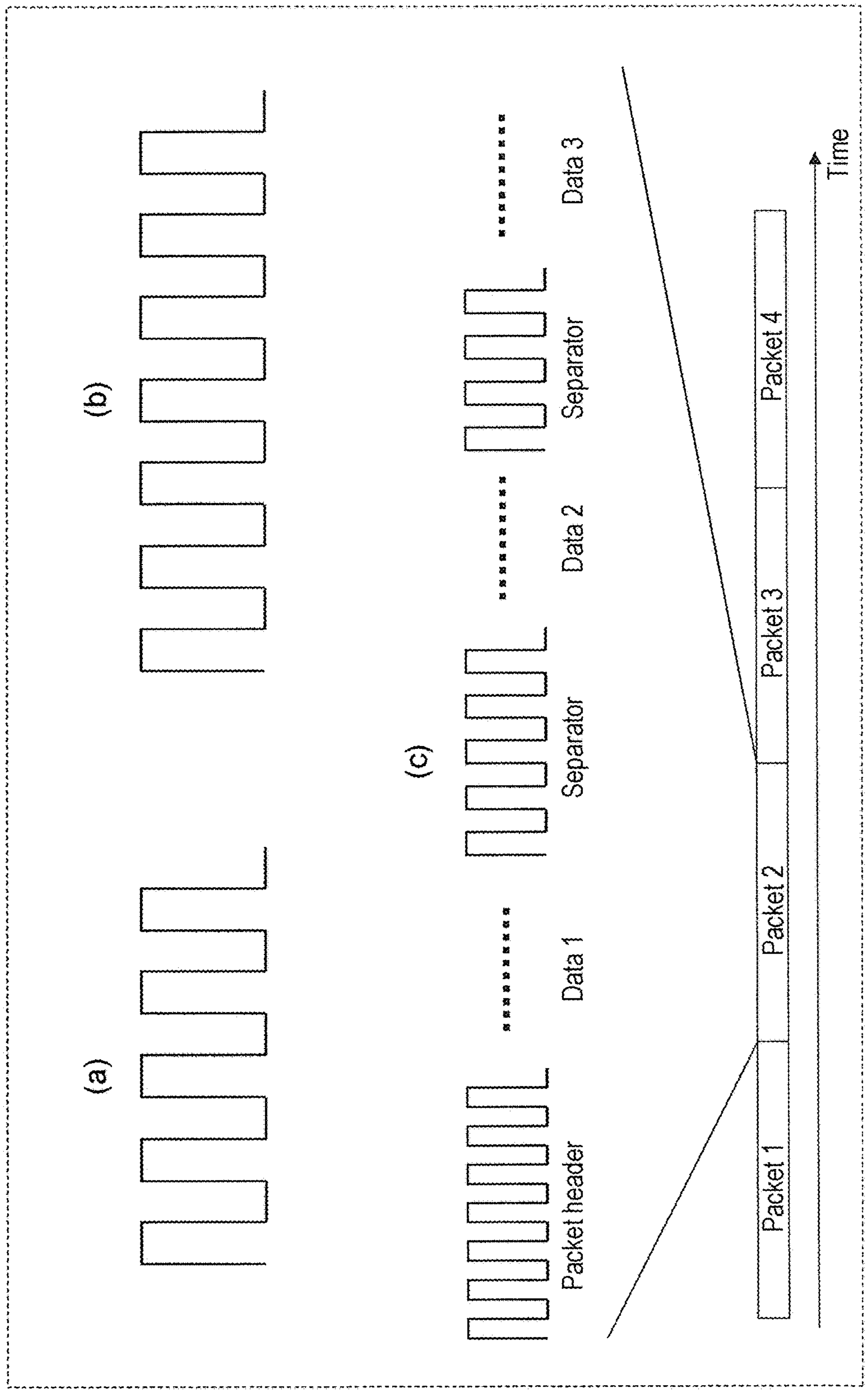

FIG. 383 is a diagram for describing processing operation of a reception device (or an imaging device) according to Embodiment 27;

FIG. 384 is a diagram illustrating a procedure according to Embodiment 28 for transmitting logical data via visible light communication;

FIG. 385 is a diagram illustrating a procedure according to Embodiment 28 for transmitting logical data via visible light communication;

FIG. 386 illustrates diagrams for describing a division process performed by a logical data dividing unit according to Embodiment 28;

FIG. 387 is a diagram for describing a division process performed by the logical data dividing unit according to Embodiment 28;

FIG. 388 illustrates diagrams illustrating examples of a transmission signal in Embodiment 28;

FIG. 389 illustrates diagrams illustrating other examples of a transmission signal in Embodiment 28; and FIG. 390 illustrates diagrams illustrating other examples of a transmission signal in Embodiment 28.

DETAILED DESCRIPTION

A non-transitory computer-readable recording medium according to an aspect of the present invention is a non-transitory computer-readable recording medium storing an information processing program for causing a computer to process transmission information to be transmitted so that the transmission information is transmitted by changing luminance. The information processing program includes instructions that, when executed, cause the computer to perform operations including encoding the transmission information to generate an encoded signal; dividing the generated encoded signal into four signal parts in a case where the encoded signal has a number of bits within a range of 24 bits to 64 bits; and sequentially outputting the four signal parts.

Thus, as illustrated in FIGS. 284 to 287B, when the number of bits in the encoded signal is in the range of 24 bits to 64 bits, the encoded signal is divided into four signal parts, and the four signal parts are output. As a result, the light emitter changes in luminance in accordance with the outputted four signal parts, and these four signal parts are transmitted in the form of visible light signals and received by the receiver. As the number of bits in an output signal increases, the level of difficulty for the receiver to properly receive the signal by imaging increases, meaning that the reception efficiency is reduced. Therefore, it is desirable that the signal have a small number of bits, that is, a signal be divided into small signals. However, when a signal is too finely divided into many small signals, the receiver cannot receive the original signal unless it receives all the small signals individually, meaning that the reception efficiency is reduced. Therefore, when the number of bits in the encoded signal is in the range of 24 bits to 64 bits, the encoded signal is divided into four signal parts and the four signal parts are sequentially output as described above. By doing so, the encoded signal representing the information to be transmitted can be transmitted in the form of a visible light signal with the best reception efficiency. As a result, it is possible to enable communication between various devices.

The outputting may include outputting the four signal parts in a first order and further outputting the four signal parts in a second order different from the first order.

By doing so, since these four signals parts are repeatedly output in different sequences, these four signal parts can be received with still higher efficiency when each of the output signals is transmitted to the receiver in the form of a visible light signal. In other words, if the four signal parts are repeatedly output in the same sequence, there are cases where the receiver fails to receive the same signal part, but it is possible to reduce these cases by changing the output sequence.

The outputting may include outputting the four signal parts, each being assigned a notification operation identifier, and the notification operation identifier may be an identifier for identifying an operation of a receiver by which a user of the receiver is notified that the four signal parts have been received when the four signal parts have been transmitted by changing luminance and received by the receiver.

With this, in the case where the notification operation identifier is transmitted in the form of a visible light signal and received by the receiver, the receiver can notify a user of the reception of the four signal parts in accordance with an operation identified by the notification operation identifier. This means that a transmitter that transmits information to be transmitted can set a notification operation to be performed by a receiver.

The outputting may further include outputting the four signal parts, each being assigned with a priority identifier for identifying a priority of the notification operation identifier.

With this, in the case where the priority identifier and the notification operation identifier are transmitted in the form of visible light signals and received by the receiver, the receiver can handle the notification operation identifier in accordance with the priority identified by the priority identifier. This means that when the receiver obtained another notification operation identifier, the receiver can select, based on the priority, one of the notification operation identified by the notification operation identifier transmitted in the form of the visible light signal and the notification operation identified by the other notification operation identifier.

A non-transitory computer-readable recording medium according to another aspect of the present invention is a non-transitory computer-readable recording medium storing a reception program for receiving information from a light emitter changing in luminance in accordance with a signal output in accordance with the information processing program stored in the non-transitory computer-readable recording medium described above. The reception program includes instructions that, when executed, cause the computer to perform operations including setting an exposure time of an image sensor by using automatic exposure; obtaining a bright line image which is an image including bright lines each corresponding to one of a plurality of exposure lines included in the image sensor, by causing the image sensor to capture an image of a subject including the light emitter changing in luminance over the set exposure time; and obtaining information by decoding a pattern of the plurality of bright lines included in the obtained bright line image. The setting includes setting a sensitivity of the image sensor to a maximum value within a range determined in advance for the image sensor, and setting an exposure time corresponding to the sensitivity set to the maximum value by using the automatic exposure.

By doing so, as illustrated in FIGS. 259A to 261B, a short exposure time that allows for an appropriate bright line image to be obtained can be set using an automatic exposure function included in a commonly used camera even when the exposure time of the image sensor cannot be directly set. Thus, in the automatic exposure, the exposure is adjusted based on brightness of an image captured by the image sensor. Therefore, when the sensitivity of the image sensor is set to a large value, the image is bright, and thus the exposure time of the image sensor is set short to reduce exposure. Setting the sensitivity of the image sensor to the maximum value allows the exposure time to be set shorter, and thus it is possible to obtain an appropriate bright line image. That is, it is possible to appropriately receive information from the light emitter. As a result, communication between various devices becomes possible. Note that the sensitivity is ISO speed, for example.

The setting may further include setting a value indicating an exposure compensation level of the image sensor to a minimum value within a range set in advance for the image sensor, and setting an exposure time corresponding to the sensitivity set to the maximum value and the exposure compensation level set to the minimum value by using the automatic exposure.

By doing so, since the value indicating the exposure compensation level is set to the minimum value, processing in the automatic exposure to reduce exposure allows the exposure time to be set shorter, and thus it is possible to obtain an appropriate bright line image. Note that the unit of the value indicating the exposure compensation level is EV, for example.

The setting may further include specifying a part that is brighter than any other part in a first image, captured by the image sensor, of the subject including the light emitter, enlarging a portion of the subject corresponding to the brighter part by using optical zoom, and setting the exposure time by using, as input of the automatic exposure, a second image obtained by capturing an image of the enlarged portion of the subject by using the image sensor. The obtaining of the bright line image may include obtaining the bright line image by causing the image sensor to capture an image of the enlarged portion of the subject over the set exposure time.

Thus, the optical zoom enlarges an image of a part of the subject that corresponds to the bright part in the first image, that is, the optical zoom enlarges an image of a bright light emitter, with the result that the second image can be brighter than the first image as a whole. Since this bright second image is used as input of the automatic exposure, processing in the automatic exposure to reduce exposure allows the exposure time to be set shorter, and thus it is possible to obtain an appropriate bright line image.

The setting may further include determining whether or not a central part of a first image, captured by the image sensor, of the subject including the light emitter is brighter than an average brightness of a plurality of positions in the first image, enlarging a portion of the subject corresponding to the central part by using optical zoom in a case where it is determined that the central part is brighter, and setting the exposure time by using, as input of the automatic exposure, a second image obtained by capturing an image of the enlarged portion of the subject by using the image sensor. The obtaining of the bright line image may include obtaining the bright line image by causing the image sensor to capture an image of the enlarged portion of the subject over the set exposure time.

Thus, the optical zoom enlarges an image of a part of the subject that corresponds to the bright central part in the first image, that is, the optical zoom enlarges an image of a bright light emitter, with the result that the second image can be brighter than the first image as a whole. Since this bright second image is used as input of the automatic exposure, processing in the automatic exposure to reduce exposure allows the exposure time to be set shorter, and thus it is possible to obtain an appropriate bright line image. If arbitrary setting of a center position for the enlargement is not possible, the optical zoom enlarges a central part of the angle of view or the image. Therefore, even when arbitrary setting of the center position is not possible, the optical zoom can be used to make the second image brighter as a whole as long as the central part of the first image is bright. Here, if the enlargement by the optical zoom is performed even when the central part of the first image is dark, the second image will be dark, resulting in the exposure time becoming long. Therefore, as described above, the enlargement by the optical zoom is performed only when the central part is determined to be bright so that the exposure time can be prevented from becoming long.

The setting may further include specifying a part that is brighter than any other part in a first image, captured by the image sensor, of the subject including the light emitter, by using, among K imaging elements included in the image sensor, where K is an integer greater than or equal to 3, only N imaging elements evenly dispersed in the image sensor, where N is an integer less than K and greater than or equal to 2, and setting the exposure time by using, as input of the automatic exposure, a second image captured by using, among the K imaging elements included in the image sensor, only N densely arranged imaging elements corresponding to the brighter part. The obtaining of the bright line image may include obtaining the bright line image by causing only the N densely arranged imaging elements included in the image sensor to capture an image over the set exposure time.

By doing so, the second image can be bright as a whole through what is called the EX zoom even when the bright part is not located at the center of the first image, with the result that the exposure time can be set short.

The setting may further include setting a metering position in an image, captured by the image sensor, of the subject, and setting an exposure time corresponding to brightness at the set metering position by using the automatic exposure.

By doing so, when the bright part in the captured image is set as the metering position, processing in the automatic exposure to reduce exposure allows the exposure time to be set shorter, and thus it is possible to obtain an appropriate bright line image.

In the reception program, the operations may further include switching an imaging mode of the image sensor from a color imaging mode for obtaining a color image by imaging to a monochrome imaging mode for obtaining a monochrome image by imaging. The setting may further include setting the exposure time by using, as input of the automatic exposure, an image obtained in the monochrome imaging mode.

Thus, an image obtained in the monochrome imaging mode is used as input of the automatic exposure, with the result that an appropriate exposure time can be set without influence of color information. When the exposure time is set in the monochrome imaging mode, the bright line image is obtained by imaging according to this mode. Therefore, when the light emitter transmits information only by changing in luminance, the information can be appropriately obtained.

The setting may further include updating the exposure time of the image sensor, every time an image is obtained by capturing an image of the light emitter by using the image sensor, by using the obtained image as input of the automatic exposure, and setting the exposure time by bringing the updating of the exposure time by using the automatic exposure to an end when a fluctuation range of the exposure time that is updated as needed falls below a predetermined range.

Thus, when the fluctuation of the exposure time is stable, that is, when brightness of an image obtained by imaging is within a target brightness range, the exposure time set at the point is used in the imaging for obtaining a bright line image. Therefore, an appropriate bright line image can be obtained.

These general and specific aspects may be implemented using an apparatus, a system, a method, an integrated circuit, a computer program, or a computer-readable recording medium such as a compact disc read-only memory (CD-ROM), or any combination of apparatuses, systems, methods, integrated circuits, computer programs, or computer-readable recording media.

Embodiments will be described in specific detail with reference to the drawings.

Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the present disclosure. Therefore, among the structural elements in the following embodiments, structural elements not recited in any one of the independent claims representing the broadest concepts are described as arbitrary structural elements.

Embodiment 1

The following describes Embodiment 1.

Observation of Luminance of Light Emitting Unit

Figure 1:
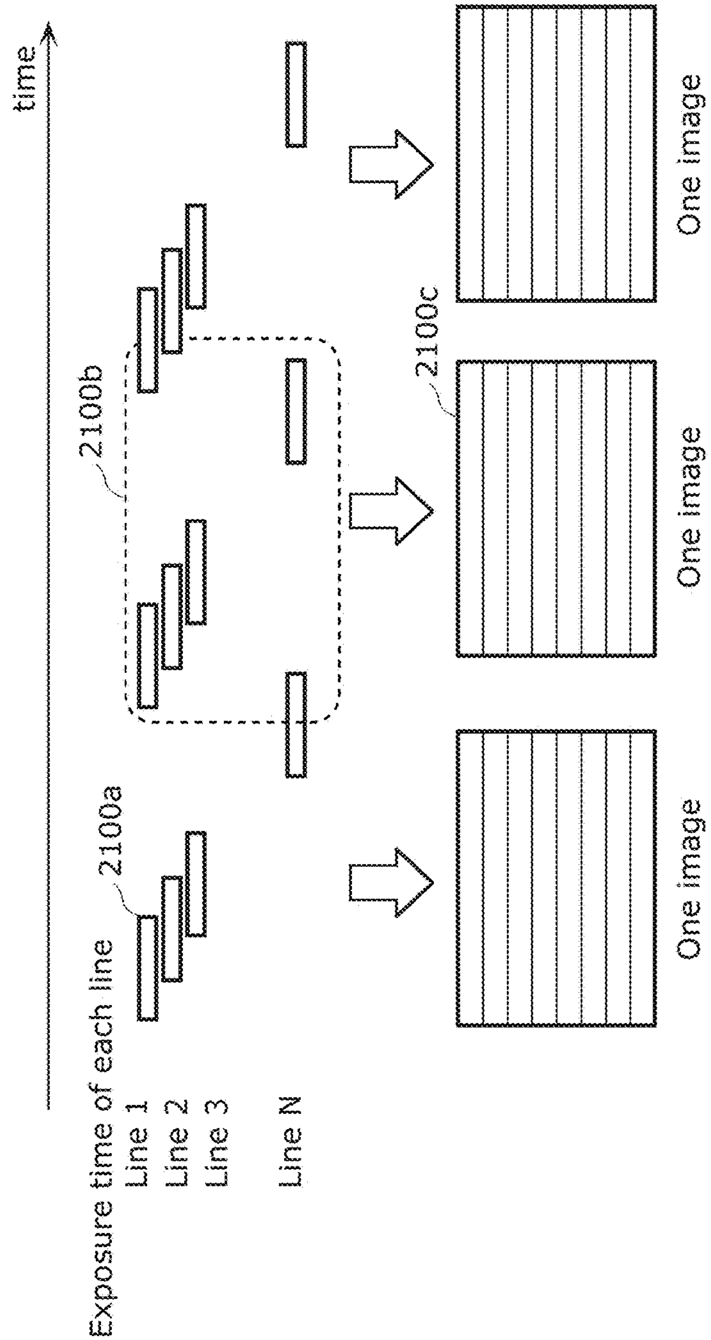
FIG. 1 is a diagram illustrating an example of an observation method of luminance of a light emitting unit in Embodiment 1.

The following proposes an imaging method in which, when capturing one image, all imaging elements are not exposed simultaneously but the times of starting and ending the exposure differ between the imaging elements. FIG. 1 illustrates an example of imaging where imaging elements arranged in a line are exposed simultaneously, with the exposure start time being shifted in order of lines. Here, the simultaneously exposed imaging elements are referred to as "exposure line", and the line of pixels in the image corresponding to the imaging elements is referred to as "bright line".

Figure 2:
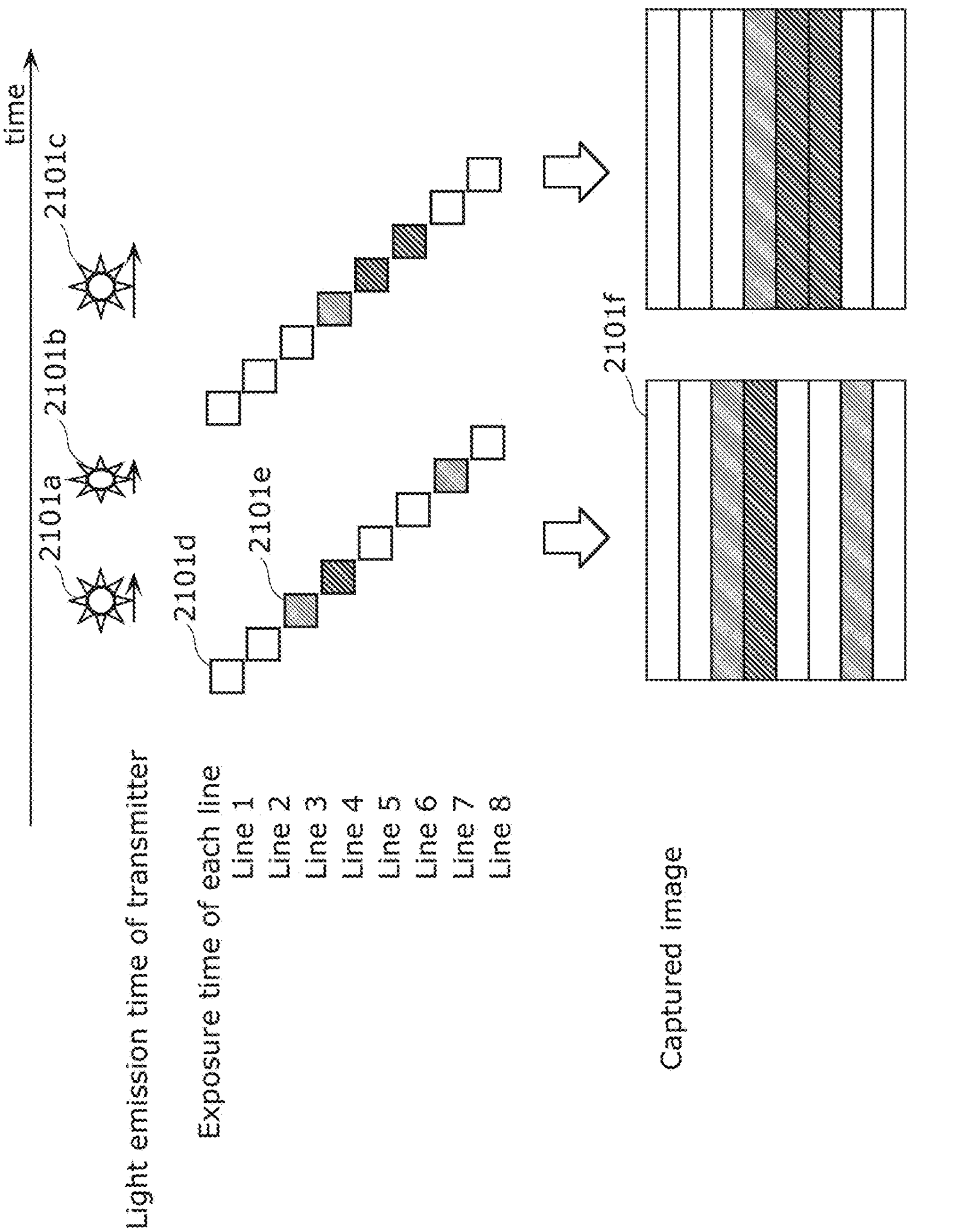
FIG. 2 is a diagram illustrating an example of an observation method of luminance of a light emitting unit in Embodiment 1.

In the case of capturing a blinking light source shown on the entire imaging elements using this imaging method, bright lines (lines of brightness in pixel value) along exposure lines appear in the captured image as illustrated in FIG. 2. By recognizing this bright line pattern, the luminance change of the light source at a speed higher than the imaging frame rate can be estimated. Hence, transmitting a signal as the luminance change of the light source enables communication at a speed not less than the imaging frame rate. In the case where the light source takes two luminance values to express a signal, the lower luminance value is referred to as "low" (LO), and the higher luminance value is referred to as "high" (HI). The low may be a state in which the light source emits no light, or a state in which the light source emits weaker light than in the high.

By this method, information transmission is performed at a speed higher than the imaging frame rate.

In the case where the number of exposure lines whose exposure times do not overlap each other is 20 in one captured image and the imaging frame rate is 30 fps, it is possible to recognize a luminance change in a period of 1.67 millisecond. In the case where the number of exposure lines whose exposure times do not overlap each other is 1000, it is possible to recognize a luminance change in a period of 1/30000 second (about 33 microseconds). Note that the exposure time is set to less than 10 milliseconds, for example.

FIG. 2 illustrates a situation where, after the exposure of one exposure line ends, the exposure of the next exposure line starts.

In this situation, when transmitting information based on whether or not each exposure line receives at least a predetermined amount of light, information transmission at a speed of fl bits per second at the maximum can be realized where f is the number of frames per second (frame rate) and I is the number of exposure lines constituting one image.

Note that faster communication is possible in the case of performing time-difference exposure not on a line basis but on a pixel basis.

In such a case, when transmitting information based on whether or not each pixel receives at least a predetermined amount of light, the transmission speed is flm bits per second at the maximum, where m is the number of pixels per exposure line.

Figure 3:
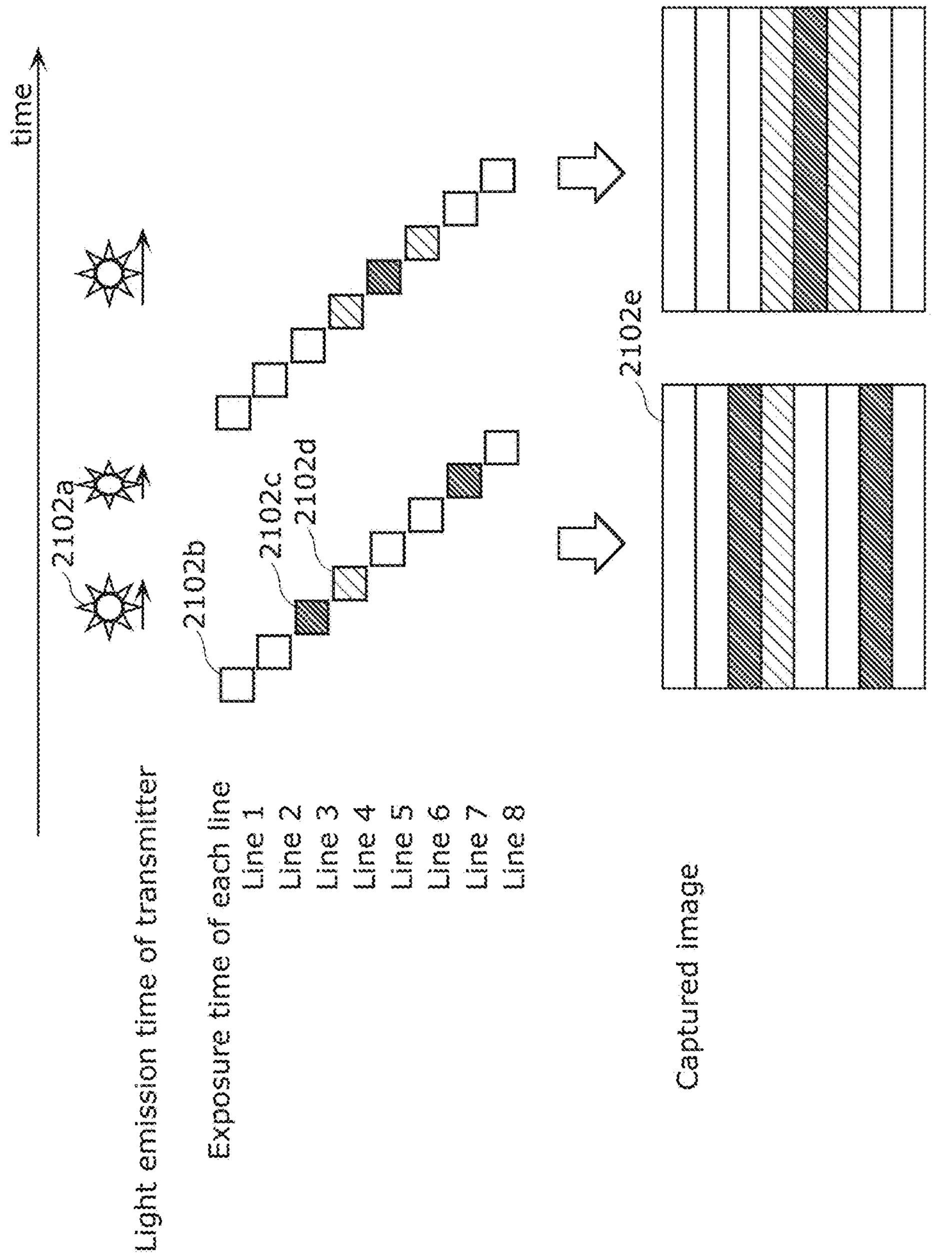
FIG. 3 is a diagram illustrating an example of an observation method of luminance of a light emitting unit in Embodiment 1.

If the exposure state of each exposure line caused by the light emission of the light emitting unit is recognizable in a plurality of levels as illustrated in FIG. 3, more information can be transmitted by controlling the light emission time of the light emitting unit in a shorter unit of time than the exposure time of each exposure line.

In the case where the exposure state is recognizable in Elv levels, information can be transmitted at a speed of flElv bits per second at the maximum.

Moreover, a fundamental period of transmission can be recognized by causing the light emitting unit to emit light with a timing slightly different from the timing of exposure of each exposure line.

Figure 4:
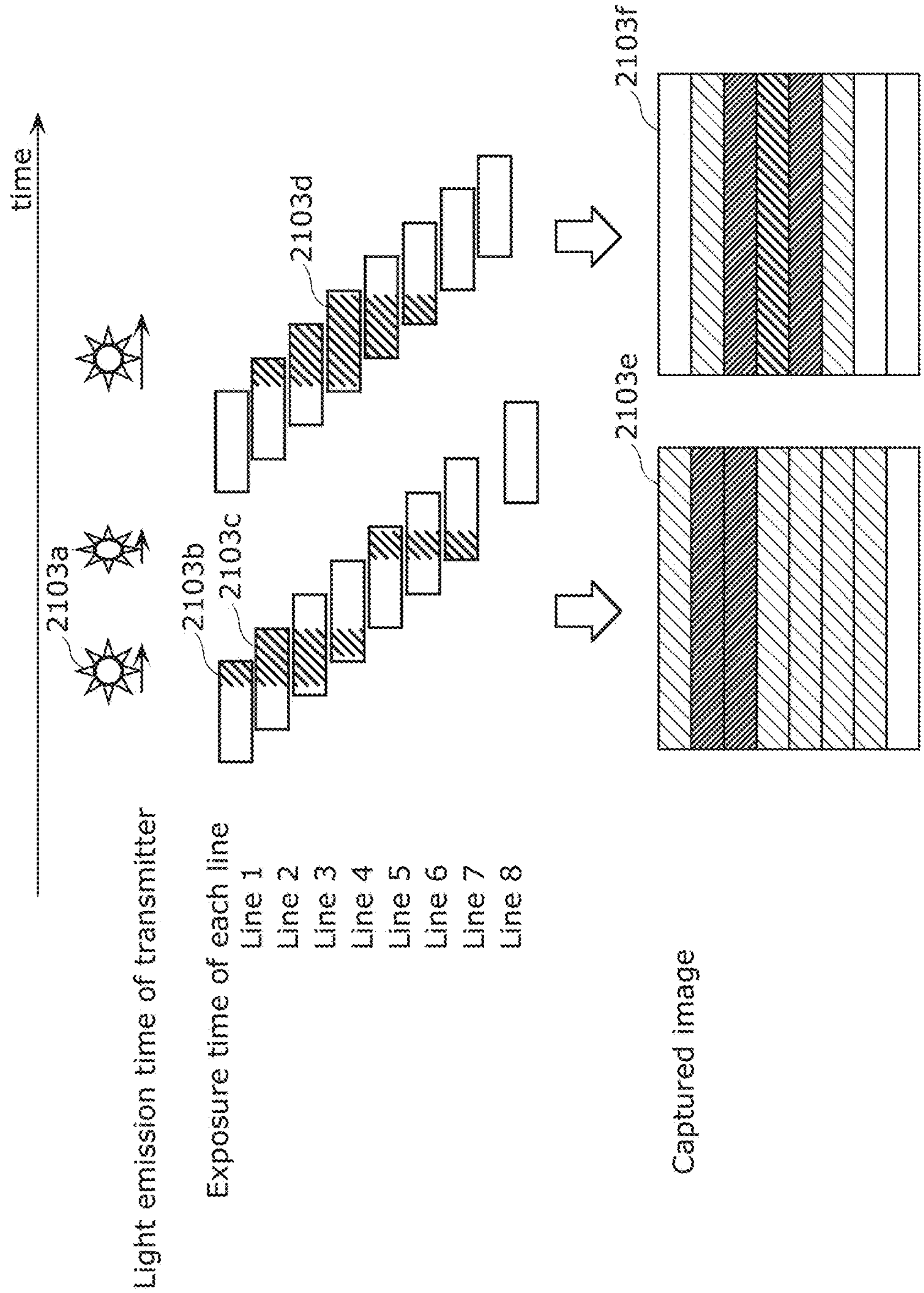
FIG. 4 is a diagram illustrating an example of an observation method of luminance of a light emitting unit in Embodiment 1.

FIG. 4 illustrates a situation where, before the exposure of one exposure line ends, the exposure of the next exposure line starts. That is, the exposure times of adjacent exposure lines partially overlap each other. This structure has the feature (1): the number of samples in a predetermined time can be increased as compared with the case where, after the exposure of one exposure line ends, the exposure of the next exposure line starts. The increase of the number of samples in the predetermined time leads to more appropriate detection of the light signal emitted from the light transmitter which is the subject. In other words, the error rate when detecting the light signal can be reduced. The structure also has the feature (2): the exposure time of each exposure line can be increased as compared with the case where, after the exposure of one exposure line ends, the exposure of the next exposure line starts. Accordingly, even in the case where the subject is dark, a brighter image can be obtained, i.e., the S/N ratio can be improved. Here, the structure in which the exposure times of adjacent exposure lines partially overlap each other does not need to be applied to all exposure lines, and part of the exposure lines may not have the structure of partially overlapping in exposure time. By keeping part of the exposure lines from partially overlapping in exposure time, the occurrence of an intermediate color caused by exposure time overlap is suppressed on the imaging screen, as a result of which bright lines can be detected more appropriately.

In this situation, the exposure time is calculated from the brightness of each exposure line, to recognize the light emission state of the light emitting unit.

Note that, in the case of determining the brightness of each exposure line in a binary fashion of whether or not the luminance is greater than or equal to a threshold, it is necessary for the light emitting unit to continue the state of emitting no light for at least the exposure time of each line, to enable the no light emission state to be recognized.

Figure 5A:
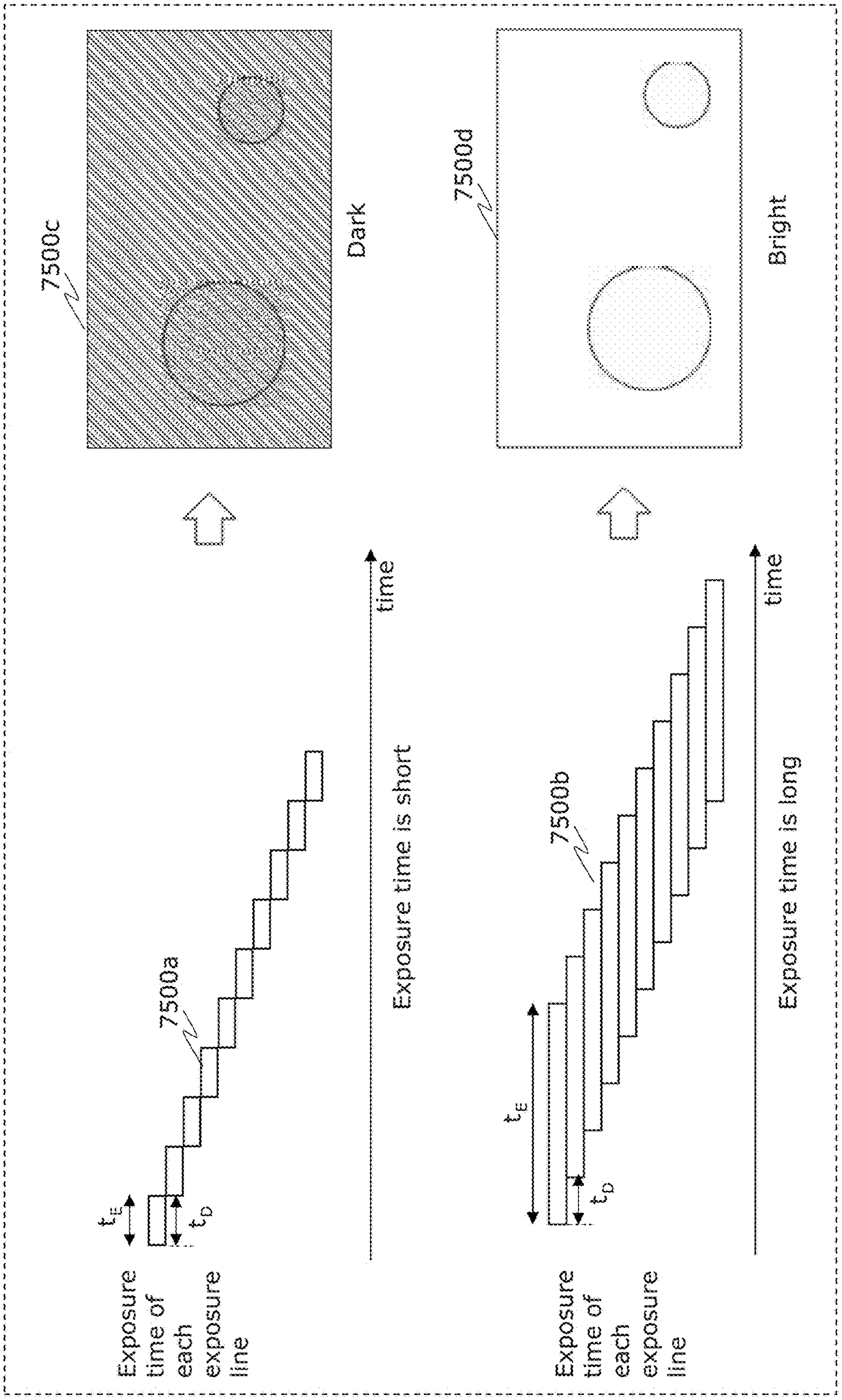
FIG. 5A is a diagram illustrating an example of an observation method of luminance of a light emitting unit in Embodiment 1.

FIG. 5A illustrates the influence of the difference in exposure time in the case where the exposure start time of each exposure line is the same. In 7500*a*, the exposure end time of one exposure line and the exposure start time of the next exposure line are the same. In 7500*b*, the exposure time is longer than that in 7500*a*. The structure in which the exposure times of adjacent exposure lines partially overlap each other as in 7500*b* allows a longer exposure time to be used. That is, more light enters the imaging element, so that a brighter image can be obtained. In addition, since the imaging sensitivity for capturing an image of the same brightness can be reduced, an image with less noise can be obtained. Communication errors are prevented in this way.

Figure 5B:
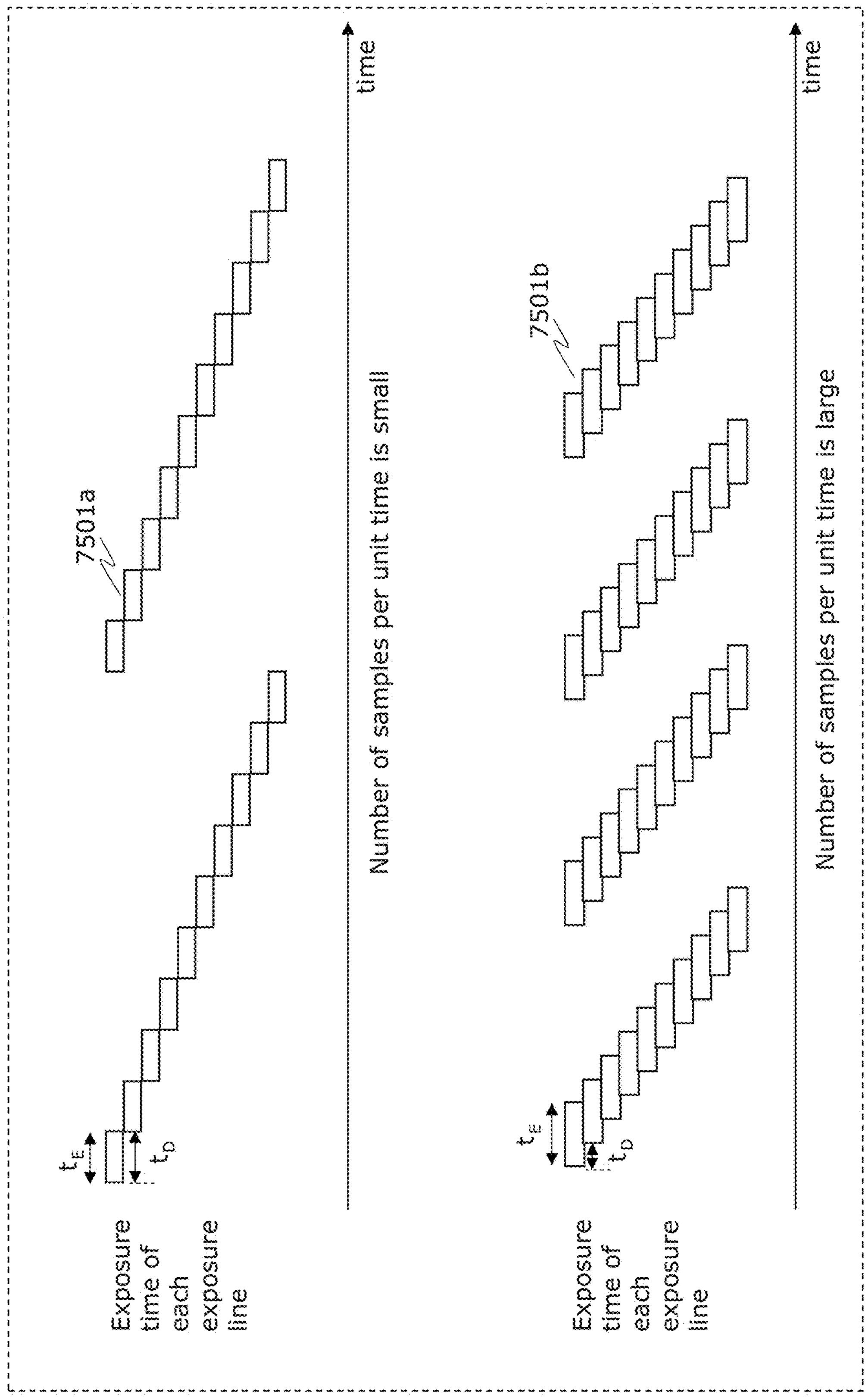
FIG. 5B is a diagram illustrating an example of an observation method of luminance of a light emitting unit in Embodiment 1.

FIG. 5B illustrates the influence of the difference in exposure start time of each exposure line in the case where the exposure time is the same. In 7501*a*, the exposure end time of one exposure line and the exposure start time of the next exposure line are the same. In 7501*b*, the exposure of one exposure line ends after the exposure of the next exposure line starts. The structure in which the exposure times of adjacent exposure lines partially overlap each other as in 7501*b* allows more lines to be exposed per unit time. This increases the resolution, so that more information can be obtained. Since the sample interval (i.e., the difference in exposure start time) is shorter, the luminance change of the light source can be estimated more accurately, contributing to a lower error rate. Moreover, the luminance change of the light source in a shorter time can be recognized. By exposure time overlap, light source blinking shorter than the exposure time can be recognized using the difference of the amount of exposure between adjacent exposure lines.

As described with reference to FIGS. 5A and 5B, in the structure in which each exposure line is sequentially exposed so that the exposure times of adjacent exposure lines partially overlap each other, the communication speed can be dramatically improved by using, for signal transmission, the bright line pattern generated by setting the exposure time shorter than in the normal imaging mode. Setting the exposure time in visible light communication to less than or equal to 1/480 second enables an appropriate bright line pattern to be generated. Here, it is necessary to set (exposure time)<1/8×f, where f is the frame frequency. Blanking during imaging is half of one frame at the maximum. That is, the blanking time is less than or equal to half of the imaging time. The actual imaging time is therefore ½f at the shortest. Besides, since 4-value information needs to be received within the time of ½f, it is necessary to at least set the exposure time to less than 1/(2f×4). Given that the normal frame rate is less than or equal to 60 frames per second, by setting the exposure time to less than or equal to 1/480 second, an appropriate bright line pattern is generated in the image data and thus fast signal transmission is achieved.

Figure 5C:
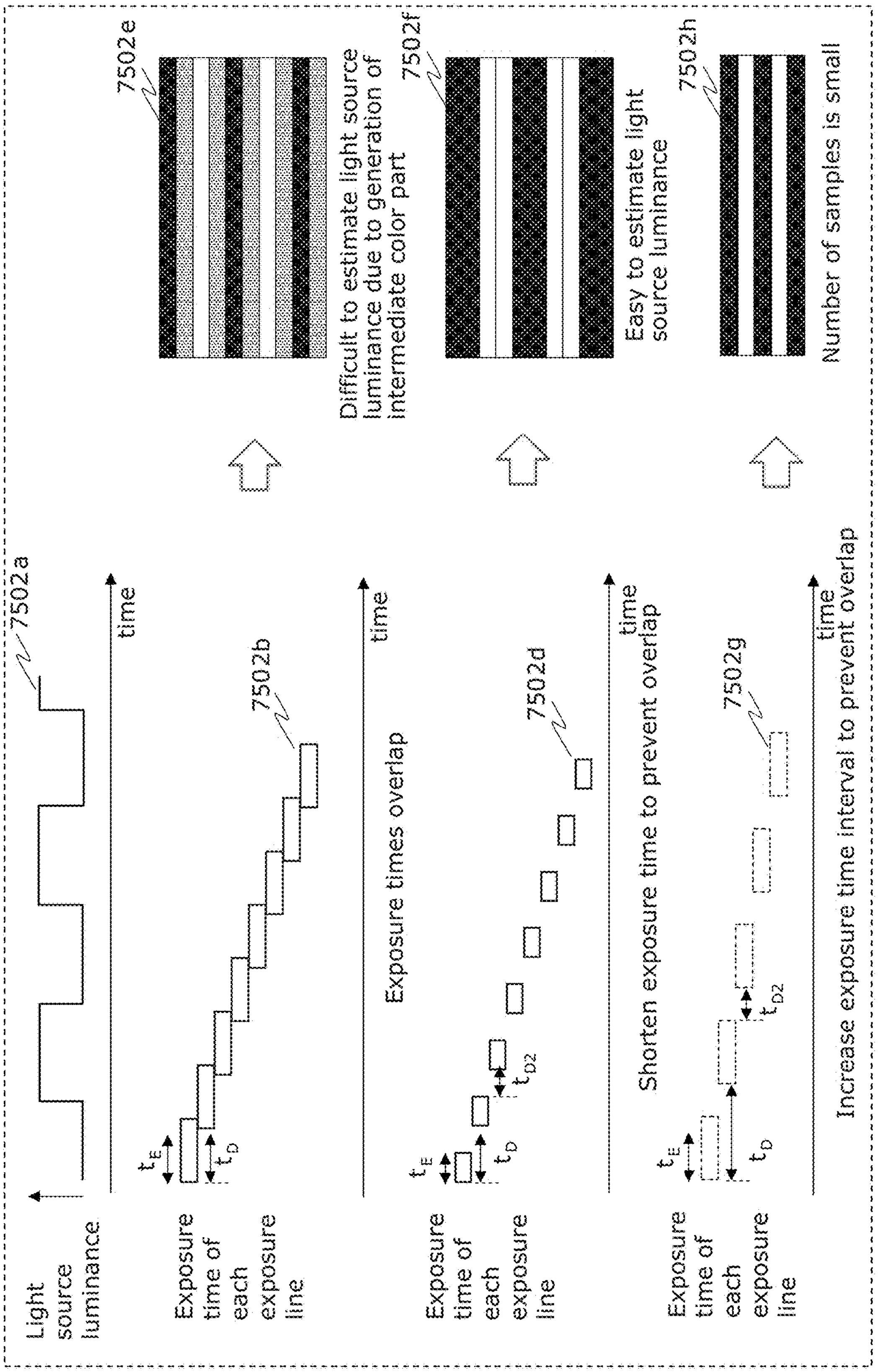
FIG. 5C is a diagram illustrating an example of an observation method of luminance of a light emitting unit in Embodiment 1.

FIG. 5C illustrates the advantage of using a short exposure time in the case where each exposure line does not overlap in exposure time. In the case where the exposure time is long, even when the light source changes in luminance in a binary fashion as in 7502*a*, an intermediate-color part tends to appear in the captured image as in 7502*e*, making it difficult to recognize the luminance change of the light source. By providing a predetermined non-exposure blank time (predetermined wait time) $t_{D2}$ from when the exposure of one exposure line ends to when the exposure of the next exposure line starts as in 7502*d*, however, the luminance change of the light source can be recognized more easily. That is, a more appropriate bright line pattern can be detected as in 7502*f*. The provision of the predetermined non-exposure blank time is possible by setting a shorter exposure time $t_E$ than the time difference $t_D$ between the exposure start times of the exposure lines, as in 7502*d*. In the case where the exposure times of adjacent exposure lines partially overlap each other in the normal imaging mode, the exposure time is shortened from the normal imaging mode so as to provide the predetermined non-exposure blank time. In the case where the exposure end time of one exposure line and the exposure start time of the next exposure line are the same in the normal imaging mode, too, the exposure time is shortened so as to provide the predetermined non-exposure time. Alternatively, the predetermined non-exposure blank time (predetermined wait time) $t_{D2}$ from when the exposure of one exposure line ends to when the exposure of the next exposure line starts may be provided by increasing the interval $t_D$ between the exposure start times of the exposure lines, as in 7502*g*. This structure allows a longer exposure time to be used, so that a brighter image can be captured. Moreover, a reduction in noise contributes to higher error tolerance. Meanwhile, this structure is disadvantageous in that the number of samples is small as in 7502*h*, because fewer exposure lines can be exposed in a predetermined time. Accordingly, it is desirable to use these structures depending on circumstances. For example, the estimation error of the luminance change of the light source can be reduced by using the former structure in the case where the imaging object is bright and using the latter structure in the case where the imaging object is dark.

Here, the structure in which the exposure times of adjacent exposure lines partially overlap each other does not need to be applied to all exposure lines, and part of the exposure lines may not have the structure of partially overlapping in exposure time. Moreover, the structure in which the predetermined non-exposure blank time (predetermined wait time) is provided from when the exposure of one exposure line ends to when the exposure of the next exposure line starts does not need to be applied to all exposure lines, and part of the exposure lines may have the structure of partially overlapping in exposure time. This makes it possible to take advantage of each of the structures. Furthermore, the same reading method or circuit may be used to read a signal in the normal imaging mode in which imaging is performed at the normal frame rate (30 fps, 60 fps) and the visible light communication mode in which imaging is performed with the exposure time less than or equal to 1/480 second for visible light communication. The use of the same reading method or circuit to read a signal eliminates the need to employ separate circuits for the normal imaging mode and the visible light communication mode. The circuit size can be reduced in this way.

Figure 5D:
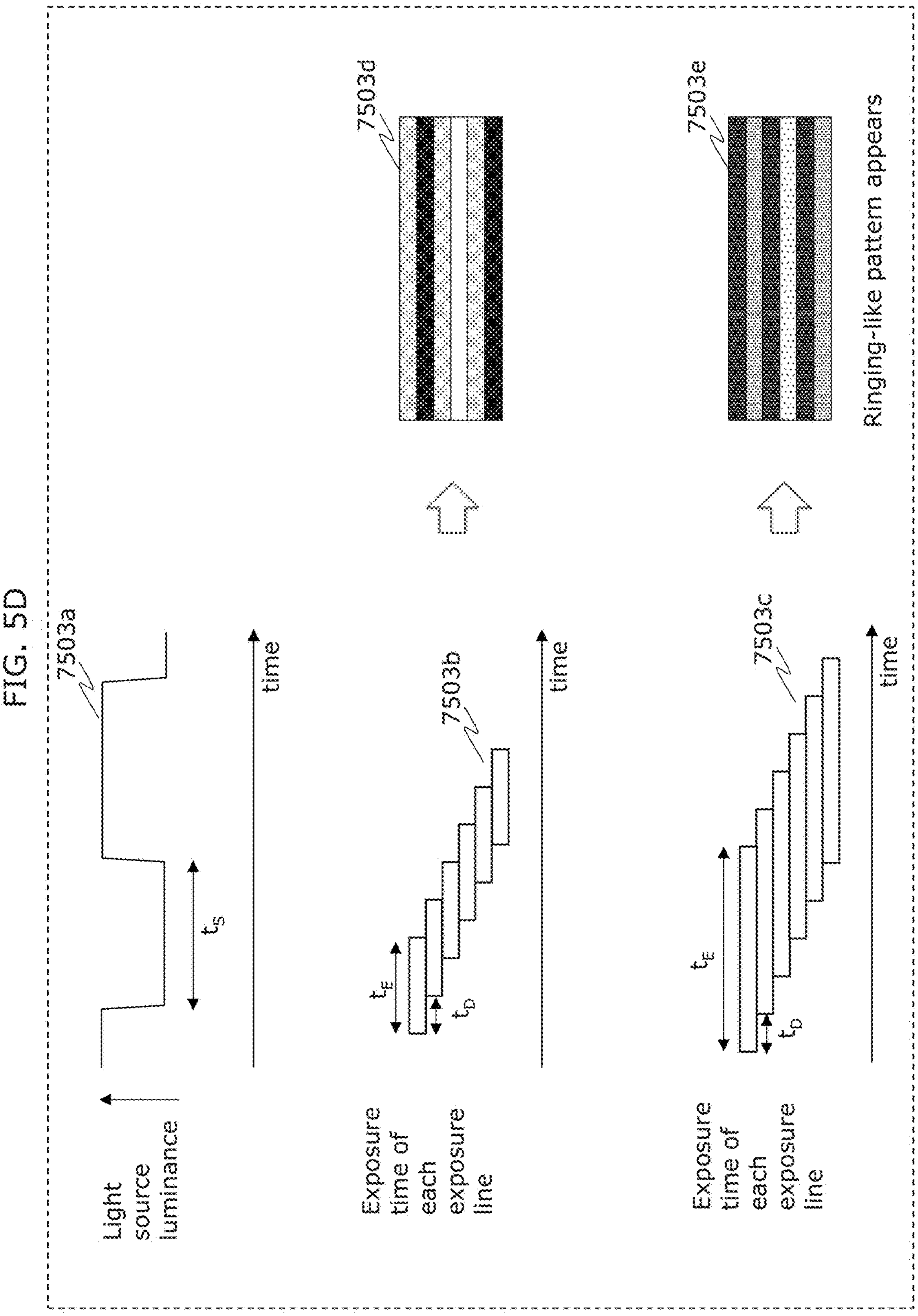
FIG. 5D is a diagram illustrating an example of an observation method of luminance of a light emitting unit in Embodiment 1.

FIG. 5D illustrates the relation between the minimum change time $t_S$ of light source luminance, the exposure time $t_E$, the time difference $t_D$ between the exposure start times of the exposure lines, and the captured image. In the case where $t_E+t_D<t_S$, imaging is always performed in a state where the light source does not change from the start to end of the exposure of at least one exposure line. As a result, an image with clear luminance is obtained as in 7503*d*, from which the luminance change of the light source is easily recognizable. In the case where $2t_E>t_S$, a bright line pattern different from the luminance change of the light source might be obtained, making it difficult to recognize the luminance change of the light source from the captured image.

Figure 5E:
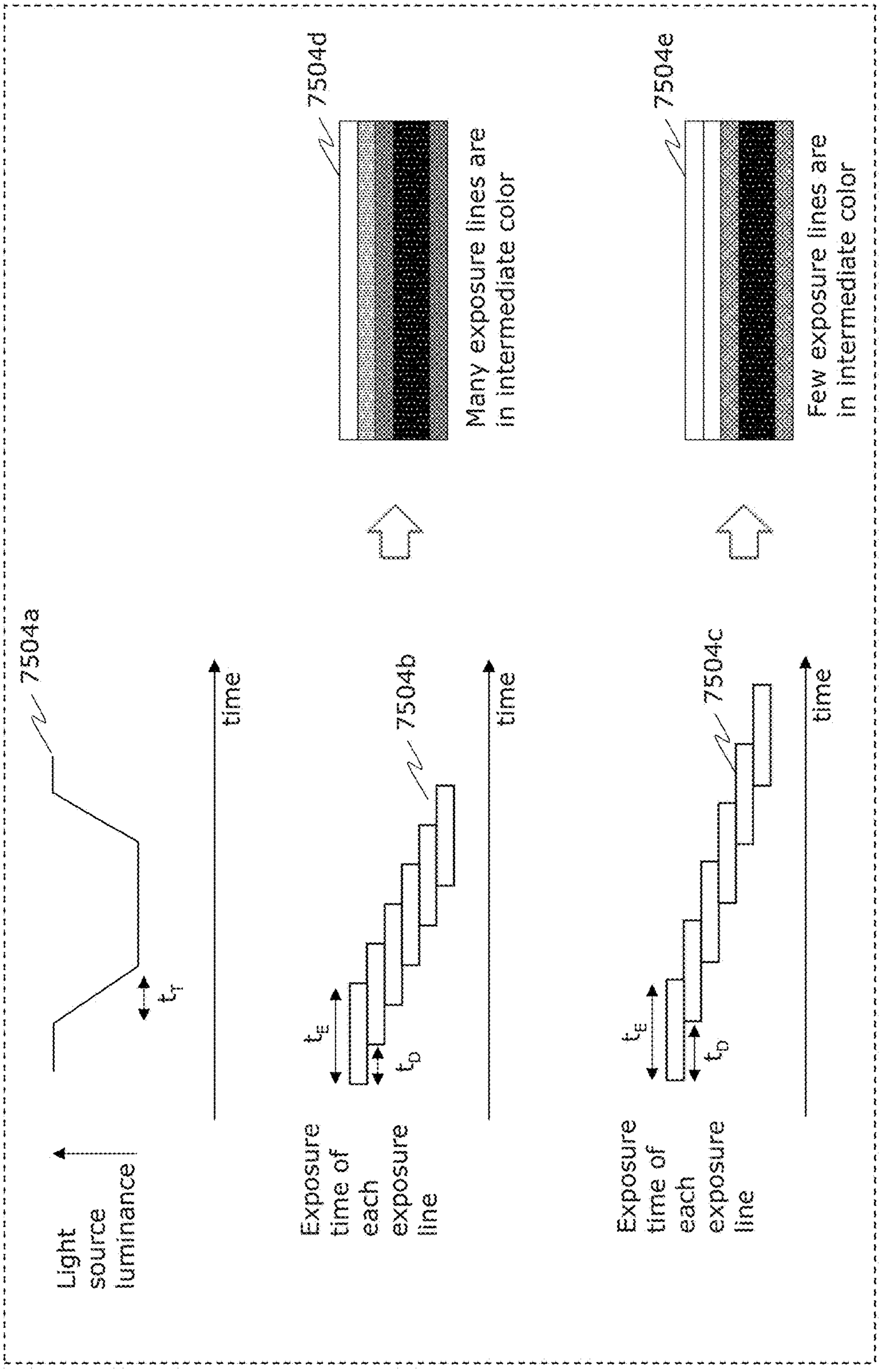
FIG. 5E is a diagram illustrating an example of an observation method of luminance of a light emitting unit in Embodiment 1.

FIG. 5E illustrates the relation between the transition time $t_T$ of light source luminance and the time difference $t_D$ between the exposure start times of the exposure lines. When $t_D$ is large as compared with $t_T$, fewer exposure lines are in the intermediate color, which facilitates estimation of light source luminance. It is desirable that $t_D>t_T$, because the number of exposure lines in the intermediate color is two or less consecutively. Since $t_T$ is less than or equal to 1 microsecond in the case where the light source is a light-emitting diode (LED) and about 5 microseconds in the case where the light source is an organic electroluminescent (EL) device, setting $t_D$ to greater than or equal to 5 microseconds facilitates estimation of light source luminance.

Figure 5F:
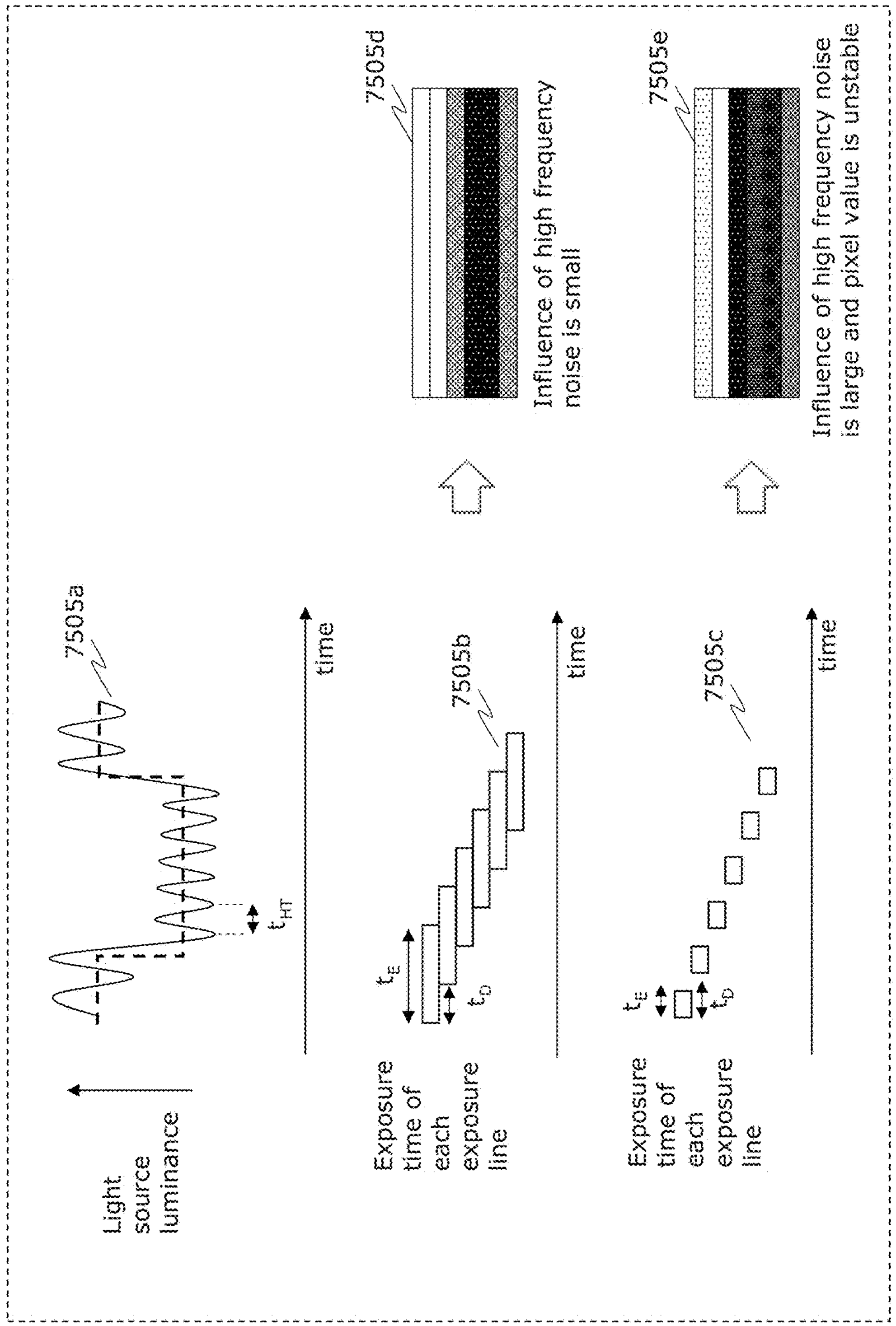
FIG. 5F is a diagram illustrating an example of an observation method of luminance of a light emitting unit in Embodiment 1.

FIG. 5F illustrates the relation between the high frequency noise $t_{HT}$ of light source luminance and the exposure time $t_E$. When $t_E$ is large as compared with $t_{HT}$, the captured image is less influenced by high frequency noise, which facilitates estimation of light source luminance. When $t_E$ is an integral multiple of $t_{HT}$, there is no influence of high frequency noise, and estimation of light source luminance is easiest. For estimation of light source luminance, it is desirable that $t_E > t_{HT}$. High frequency noise is mainly caused by a switching power supply circuit. Since $t_{HT}$ is less than or equal to 20 microseconds in many switching power supplies for lightings, setting $t_E$ to greater than or equal to 20 microseconds facilitates estimation of light source luminance.

Figure 5G:
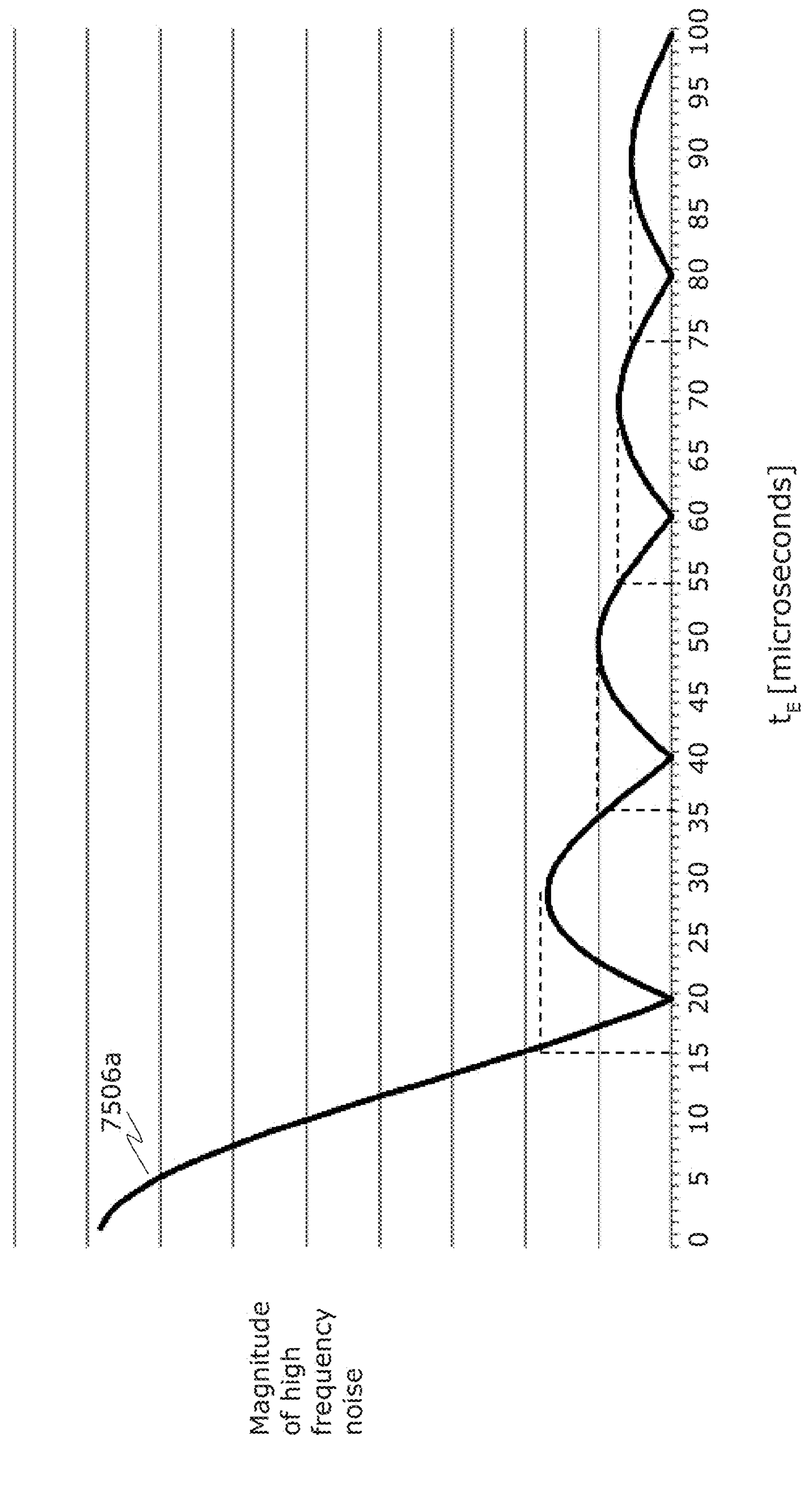
FIG. 5G is a diagram illustrating an example of an observation method of luminance of a light emitting unit in Embodiment 1.

FIG. 5G is a graph representing the relation between the exposure time $t_E$ and the magnitude of high frequency noise when $t_{HT}$ is 20 microseconds. Given that $t_{HT}$ varies depending on the light source, the graph demonstrates that it is efficient to set $t_E$ to greater than or equal to 15 microseconds, greater than or equal to 35 microseconds, greater than or equal to 54 microseconds, or greater than or equal to 74 microseconds, each of which is a value equal to the value when the amount of noise is at the maximum. Though $t_E$ is desirably larger in terms of high frequency noise reduction, there is also the above-mentioned property that, when $t_E$ is smaller, an intermediate-color part is less likely to occur and estimation of light source luminance is easier. Therefore, $t_E$ may be set to greater than or equal to 15 microseconds when the light source luminance change period is 15 to 35 microseconds, to greater than or equal to 35 microseconds when the light source luminance change period is 35 to 54 microseconds, to greater than or equal to 54 microseconds when the light source luminance change period is 54 to 74 microseconds, and to greater than or equal to 74 microseconds when the light source luminance change period is greater than or equal to 74 microseconds.

Figure 5H:
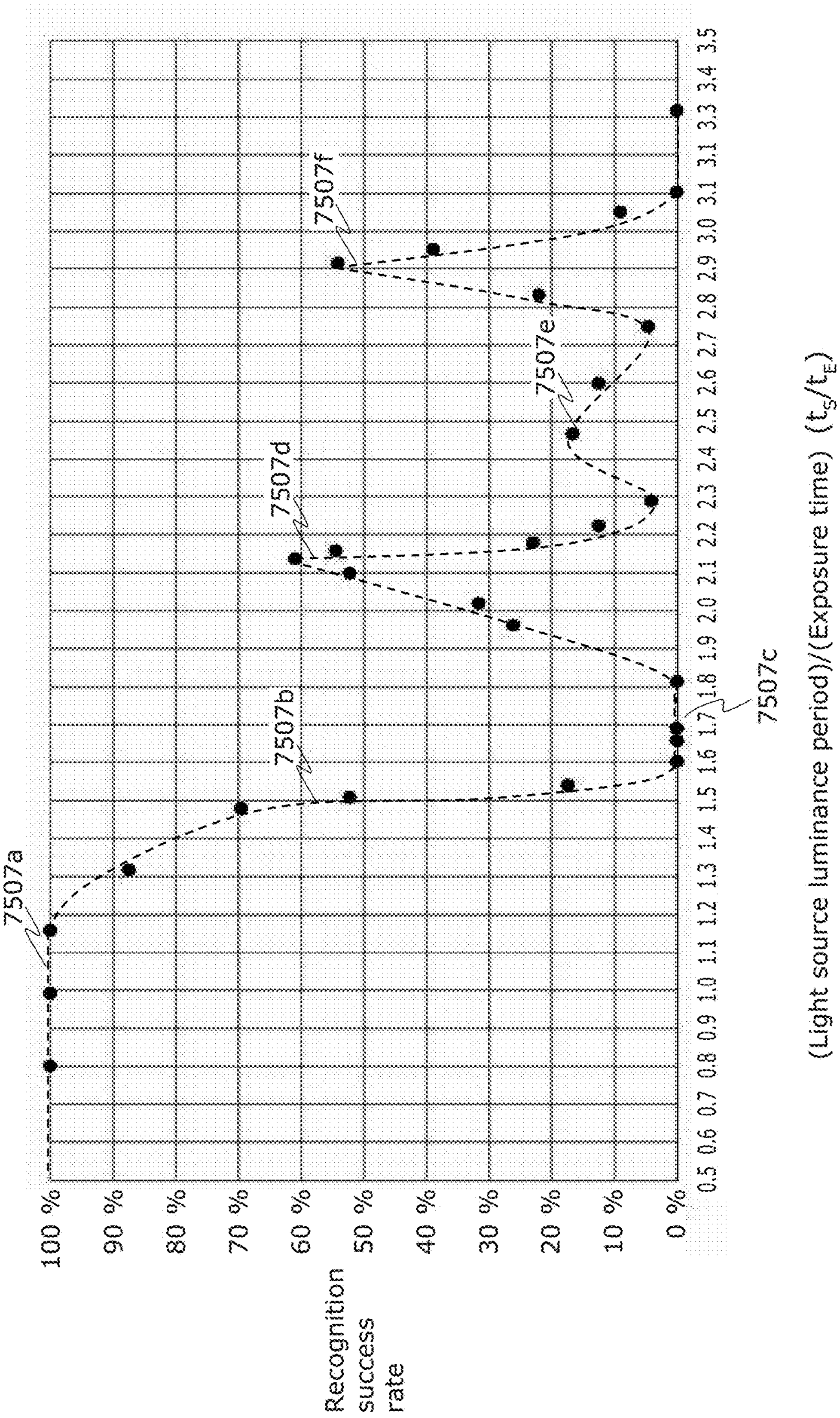
FIG. 5H is a diagram illustrating an example of an observation method of luminance of a light emitting unit in Embodiment 1.

FIG. 5H illustrates the relation between the exposure time $t_E$ and the recognition success rate. Since the exposure time $t_E$ is relative to the time during which the light source luminance is constant, the horizontal axis represents the value (relative exposure time) obtained by dividing the light source luminance change period $t_S$ by the exposure time $t_E$. It can be understood from the graph that the recognition success rate of approximately 100% can be attained by setting the relative exposure time to less than or equal to 1.2. For example, the exposure time may be set to less than or equal to approximately 0.83 millisecond in the case where the transmission signal is 1 kHz. Likewise, the recognition success rate greater than or equal to 95% can be attained by setting the relative exposure time to less than or equal to 1.25, and the recognition success rate greater than or equal to 80% can be attained by setting the relative exposure time to less than or equal to 1.4. Moreover, since the recognition success rate sharply decreases when the relative exposure time is about 1.5 and becomes roughly 0% when the relative exposure time is 1.6, it is necessary to set the relative exposure time not to exceed 1.5. After the recognition rate becomes 0% at 7507*c*, it increases again at 7507*d*, 7507*e*, and 7507*f*. Accordingly, for example, to capture a bright image with a longer exposure time, the exposure time may be set so that the relative exposure time is 1.9 to 2.2, 2.4 to 2.6, or 2.8 to 3.0. Such an exposure time may be used, for instance, as an intermediate mode in FIG. 7.

Figure 6A:
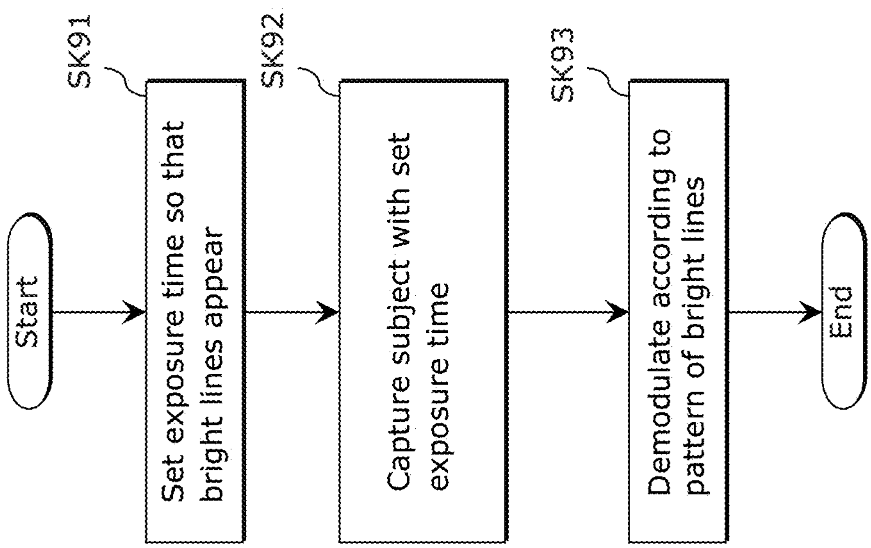
FIG. 6A is a flowchart of an information communication method in Embodiment 1.

FIG. 6A is a flowchart of an information communication method in this embodiment.

The information communication method in this embodiment is an information communication method of obtaining information from a subject, and includes Steps SK91 to SK93.

In detail, the information communication method includes: a first exposure time setting step SK91 of setting a first exposure time of an image sensor so that, in an image obtained by capturing the subject by the image sensor, a plurality of bright lines corresponding to a plurality of exposure lines included in the image sensor appear according to a change in luminance of the subject; a first image obtainment step SK92 of obtaining a bright line image including the plurality of bright lines, by capturing the subject changing in luminance by the image sensor with the set first exposure time; and an information obtainment step SK93 of obtaining the information by demodulating data specified by a pattern of the plurality of bright lines included in the obtained bright line image, wherein in the first image obtainment step SK92, exposure starts sequentially for the plurality of exposure lines each at a different time, and exposure of each of the plurality of exposure lines starts after a predetermined blank time elapses from when exposure of an adjacent exposure line adjacent to the exposure line ends.

Figure 6B:
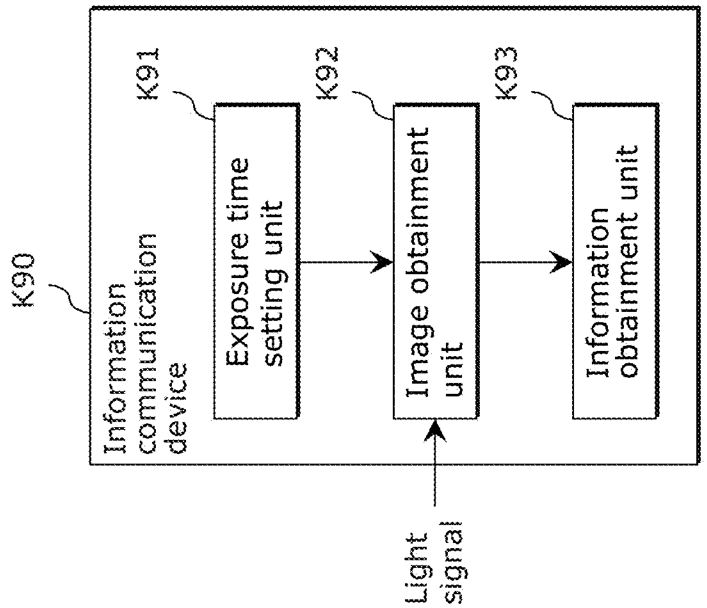
FIG. 6B is a block diagram of an information communication device in Embodiment 1.

FIG. 6B is a block diagram of an information communication device in this embodiment.

An information communication device K90 in this embodiment is an information communication device that obtains information from a subject, and includes structural elements K91 to K93.

In detail, the information communication device K90 includes: an exposure time setting unit K91 that sets an exposure time of an image sensor so that, in an image obtained by capturing the subject by the image sensor, a plurality of bright lines corresponding to a plurality of exposure lines included in the image sensor appear according to a change in luminance of the subject; an image obtainment unit K92 that includes the image sensor, and obtains a bright line image including the plurality of bright lines by capturing the subject changing in luminance with the set exposure time; and an information obtainment unit K93 that obtains the information by demodulating data specified by a pattern of the plurality of bright lines included in the obtained bright line image, wherein exposure starts sequentially for the plurality of exposure lines each at a different time, and exposure of each of the plurality of exposure lines starts after a predetermined blank time elapses from when exposure of an adjacent exposure line adjacent to the exposure line ends.

In the information communication method and the information communication device K90 illustrated in FIGS. 6A and 6B, the exposure of each of the plurality of exposure lines starts a predetermined blank time after the exposure of the adjacent exposure line adjacent to the exposure line ends, for instance as illustrated in FIG. 5C. This eases the recognition of the change in luminance of the subject. As a result, the information can be appropriately obtained from the subject.

It should be noted that in the above embodiment, each of the constituent elements may be constituted by dedicated hardware, or may be obtained by executing a software program suitable for the constituent element. Each constituent element may be achieved by a program execution unit such as a CPU or a processor reading and executing a software program stored in a recording medium such as a hard disk or semiconductor memory. For example, the program causes a computer to execute the information communication method illustrated in the flowchart of FIG. 6A.

Embodiment 2

This embodiment describes each example of application using a receiver such as a smartphone which is the information communication device K90 and a transmitter for transmitting information as a blink pattern of the light source such as an LED or an organic EL device in Embodiment 1 described above.

Figure 7:
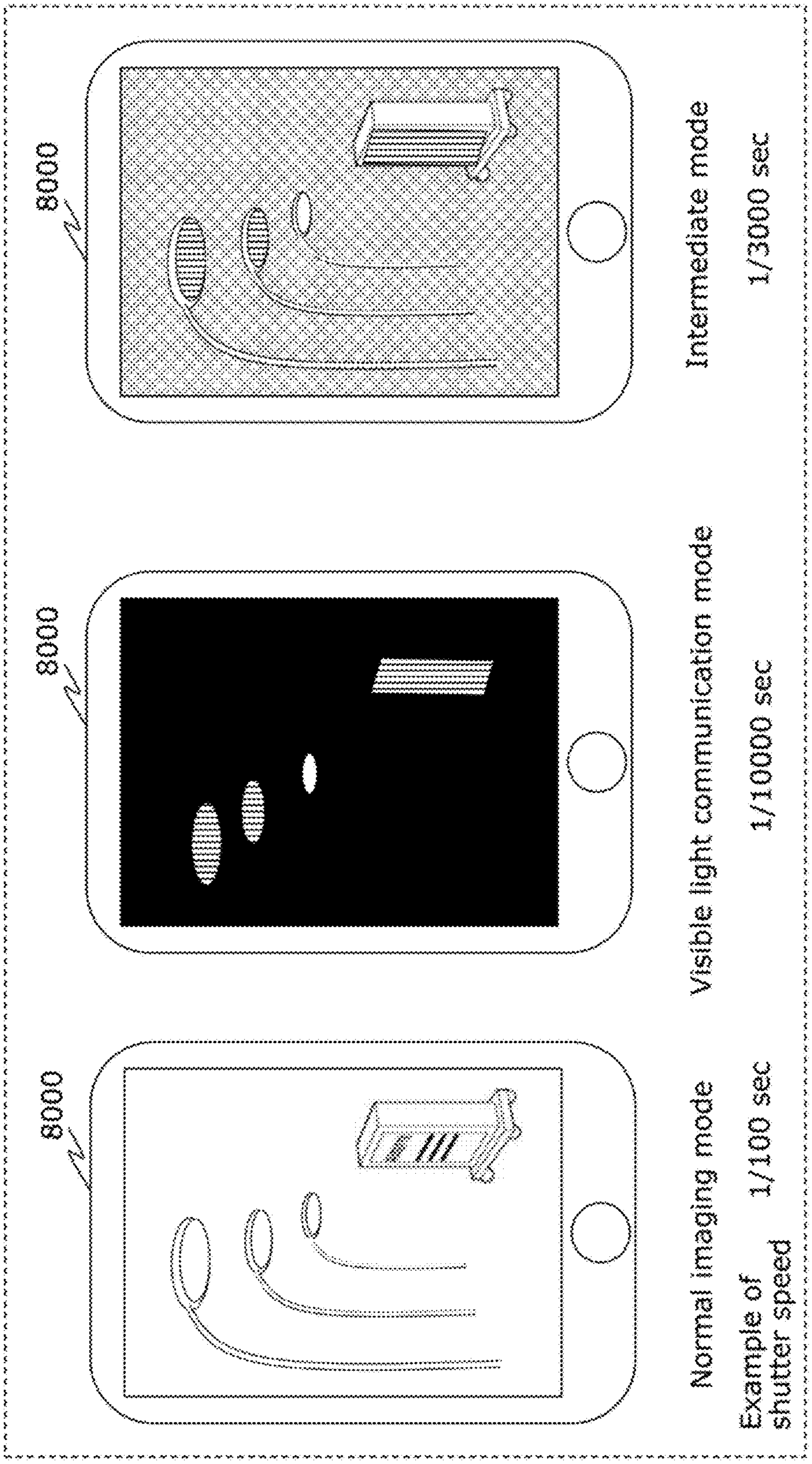
FIG. 7 is a diagram illustrating an example of each mode of a receiver in Embodiment 2.

FIG. 7 is a diagram illustrating an example of each mode of a receiver in this embodiment.

In the normal imaging mode, a receiver 8000 performs imaging at a shutter speed of 1/100 second as an example to obtain a normal captured image, and displays the normal captured image on a display. For example, a subject such as a street lighting or a signage as a store sign and its surroundings are clearly shown in the normal captured image.

In the visible light communication mode, the receiver 8000 performs imaging at a shutter speed of 1/10000 second as an example, to obtain a visible light communication image. For example, in the case where the above-mentioned street lighting or signage is transmitting a signal by way of luminance change as the light source described in Embodiment 1, that is, a transmitter, one or more bright lines (hereafter referred to as "bright line pattern") are shown in the signal transmission part of the visible light communication image, while nothing is shown in the other part. That is, in the visible light communication image, only the bright line pattern is shown and the part of the subject not changing in luminance and the surroundings of the subject are not shown.

In the intermediate mode, the receiver 8000 performs imaging at a shutter speed of 1/3000 second as an example, to obtain an intermediate image. In the intermediate image, the bright line pattern is shown, and the part of the subject not changing in luminance and the surroundings of the subject are shown, too. By the receiver 8000 displaying the intermediate image on the display, the user can find out from where or from which position the signal is being transmitted. Note that the bright line pattern, the subject, and its surroundings shown in the intermediate image are not as clear as the bright line pattern in the visible light communication image and the subject and its surroundings in the normal captured image respectively, but have the level of clarity recognizable by the user.

In the following description, the normal imaging mode or imaging in the normal imaging mode is referred to as "normal imaging", and the visible light communication mode or imaging in the visible light communication mode is referred to as "visible light imaging" (visible light communication). Imaging in the intermediate mode may be used instead of normal imaging and visible light imaging, and the intermediate image may be used instead of the below-mentioned synthetic image.

Figure 8:
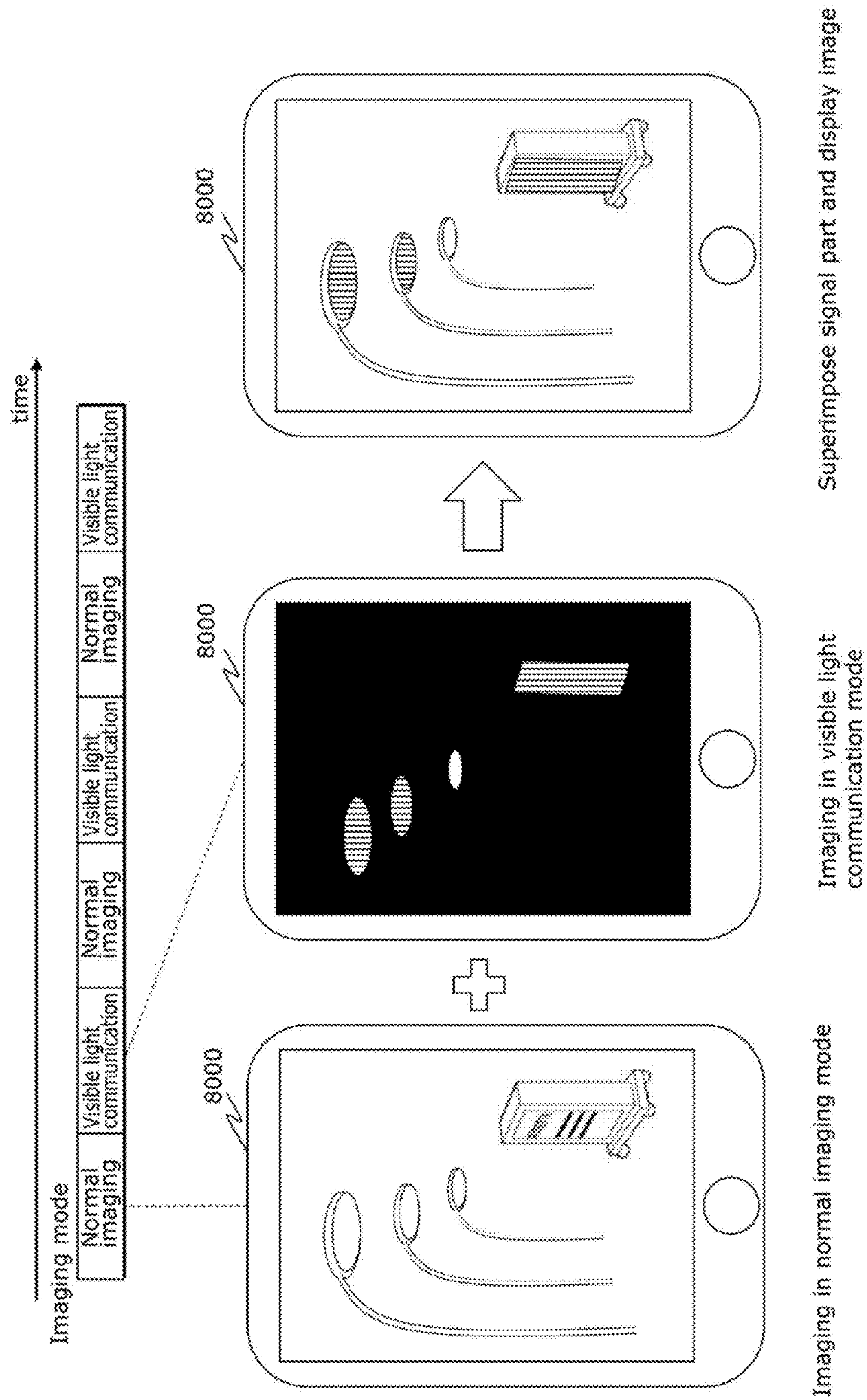
FIG. 8 is a diagram illustrating an example of imaging operation of a receiver in Embodiment 2.

FIG. 8 is a diagram illustrating an example of imaging operation of a receiver in this embodiment.

The receiver 8000 switches the imaging mode in such a manner as normal imaging, visible light communication, normal imaging. The receiver 8000 synthesizes the normal captured image and the visible light communication image to generate a synthetic image in which the bright line pattern, the subject, and its surroundings are clearly shown, and displays the synthetic image on the display. The synthetic image is an image generated by superimposing the bright line pattern of the visible light communication image on the signal transmission part of the normal captured image. The bright line pattern, the subject, and its surroundings shown in the synthetic image are clear, and have the level of clarity sufficiently recognizable by the user. Displaying such a synthetic image enables the user to more distinctly find out from which position the signal is being transmitted.

Figure 9:
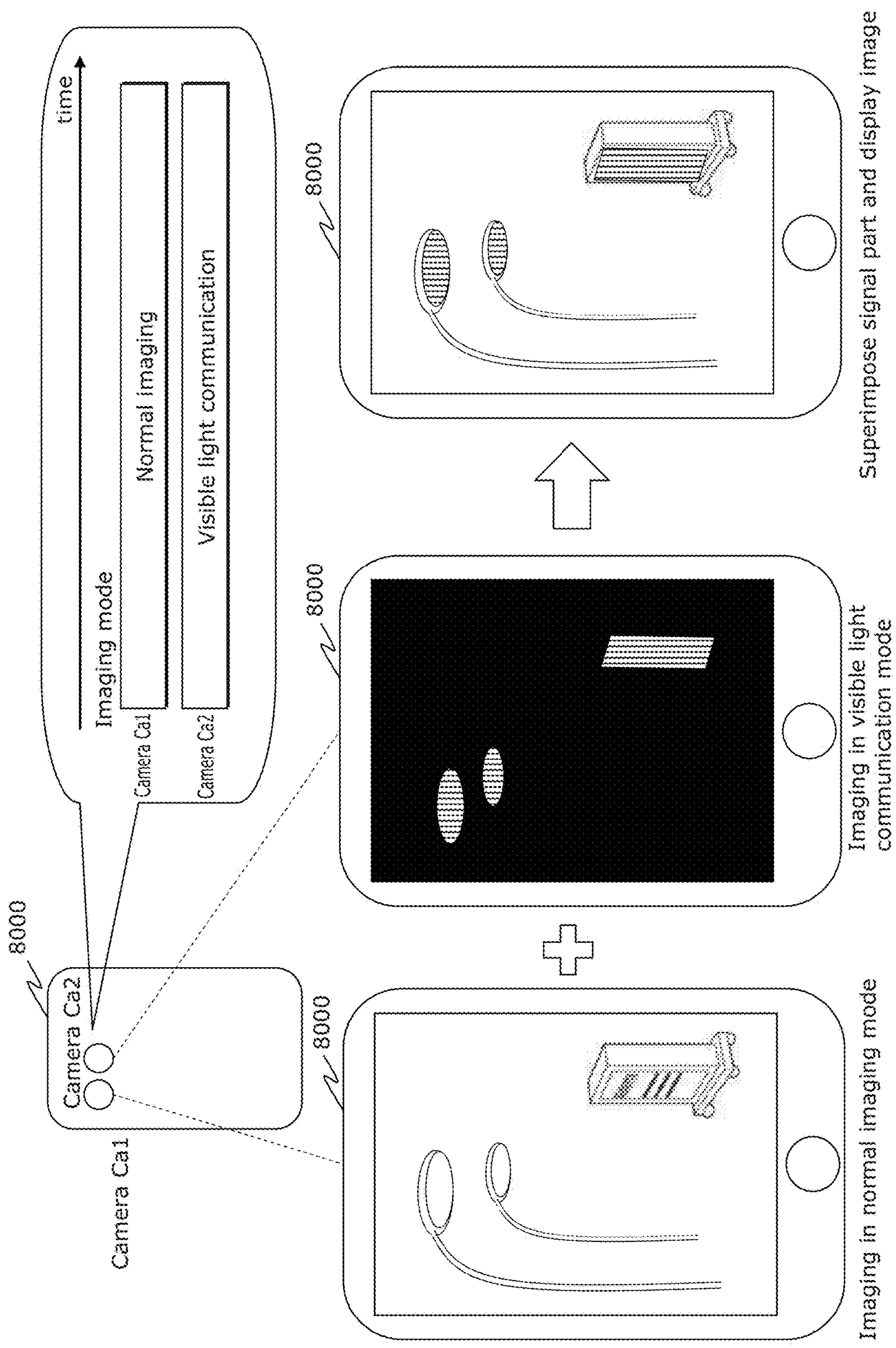
FIG. 9 is a diagram illustrating another example of imaging operation of a receiver in Embodiment 2.

FIG. 9 is a diagram illustrating another example of imaging operation of a receiver in this embodiment.

The receiver 8000 includes a camera Ca1 and a camera Ca2. In the receiver 8000, the camera Ca1 performs normal imaging, and the camera Ca2 performs visible light imaging. Thus, the camera Ca1 obtains the above-mentioned normal captured image, and the camera Ca2 obtains the above-mentioned visible light communication image. The receiver 8000 synthesizes the normal captured image and the visible light communication image to generate the above-mentioned synthetic image, and displays the synthetic image on the display.

Figure 10A:
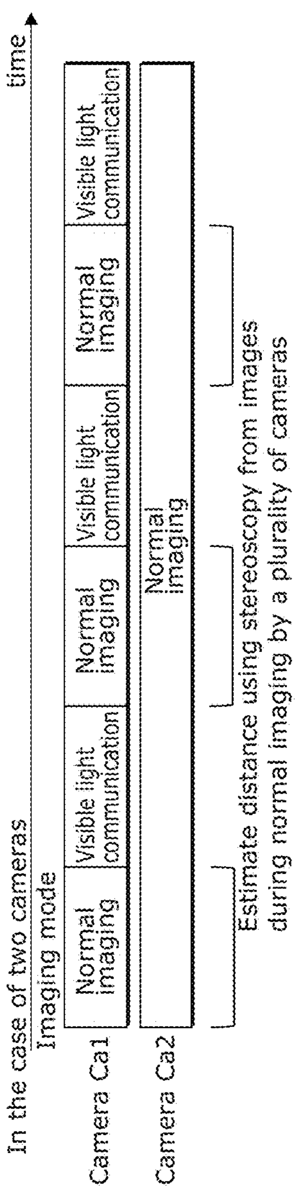
FIG. 10A is a diagram illustrating another example of imaging operation of a receiver in Embodiment 2.

FIG. 10A is a diagram illustrating another example of imaging operation of a receiver in this embodiment.

In the receiver 8000 including two cameras, the camera Ca1 switches the imaging mode in such a manner as normal imaging, visible light communication, normal imaging. Meanwhile, the camera Ca2 continuously performs normal imaging. When normal imaging is being performed by the cameras Ca1 and Ca2 simultaneously, the receiver 8000 estimates the distance (hereafter referred to as "subject distance") from the receiver 8000 to the subject based on the normal captured images obtained by these cameras, through the use of stereoscopy (triangulation principle). By using such estimated subject distance, the receiver 8000 can superimpose the bright line pattern of the visible light communication image on the normal captured image at the appropriate position. The appropriate synthetic image can be generated in this way.

Figure 10B:
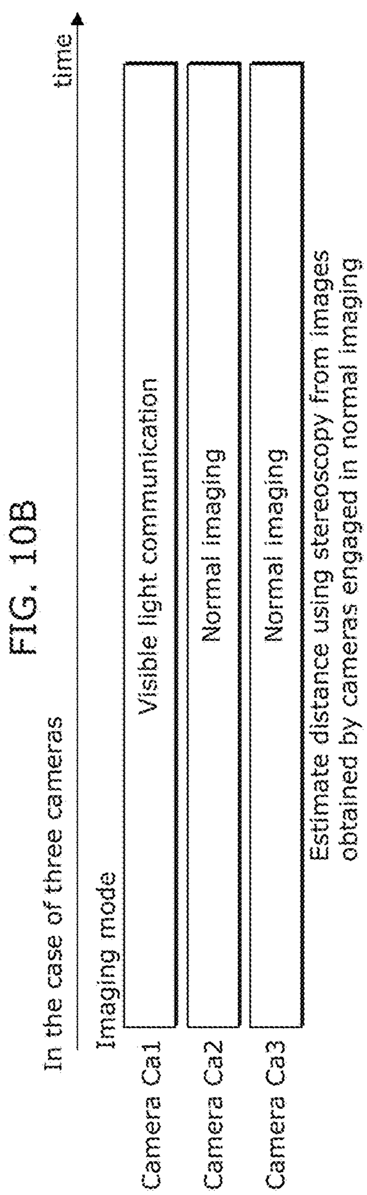
FIG. 10B is a diagram illustrating another example of imaging operation of a receiver in Embodiment 2.

FIG. 10B is a diagram illustrating another example of imaging operation of a receiver in this embodiment.

The receiver 8000 includes three cameras (cameras Ca1, Ca2, and Ca3) as an example. In the receiver 8000, two cameras (cameras Ca2 and Ca3) continuously perform normal imaging, and the remaining camera (camera Ca1) continuously performs visible light communication. Hence, the subject distance can be estimated at any timing, based on the normal captured images obtained by two cameras engaged in normal imaging.

Figure 10C:
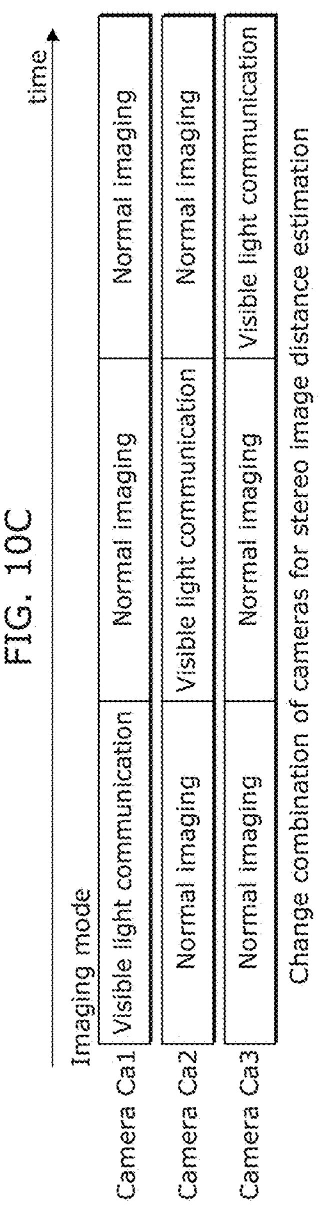
FIG. 10C is a diagram illustrating another example of imaging operation of a receiver in Embodiment 2.

FIG. 10C is a diagram illustrating another example of imaging operation of a receiver in this embodiment.

The receiver 8000 includes three cameras (cameras Ca1, Ca2, and Ca3) as an example. In the receiver 8000, each camera switches the imaging mode in such a manner as normal imaging, visible light communication, normal imaging. The imaging mode of each camera is switched per period so that, in one period, two cameras perform normal imaging and the remaining camera performs visible light communication. That is, the combination of cameras engaged in normal imaging is changed periodically. Hence, the subject distance can be estimated in any period, based on the normal captured images obtained by two cameras engaged in normal imaging.

Figure 11A:
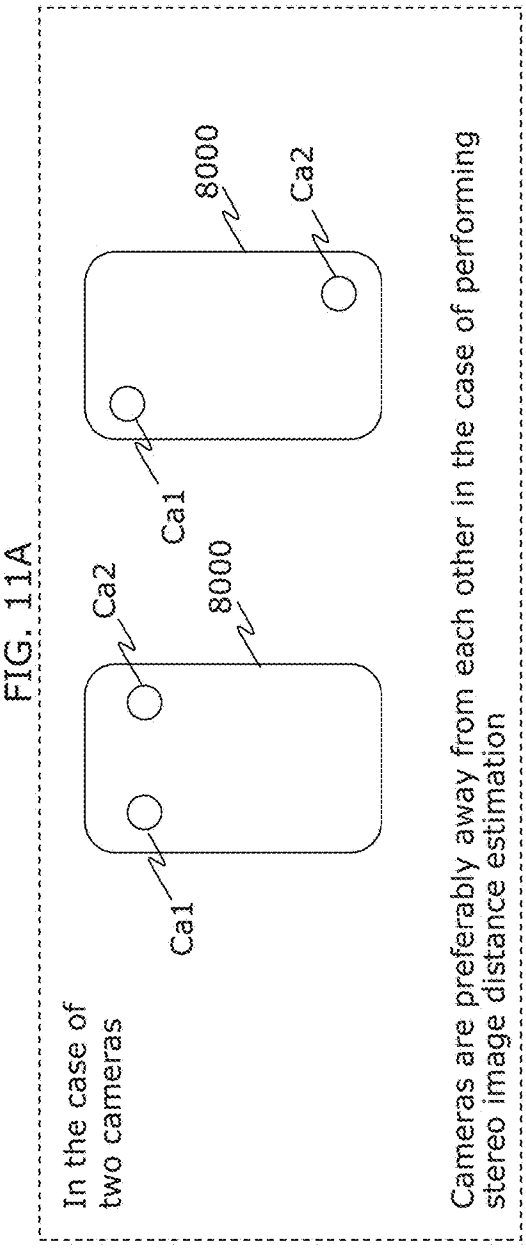
FIG. 11A is a diagram illustrating an example of camera arrangement of a receiver in Embodiment 2.

FIG. 11A is a diagram illustrating an example of camera arrangement of a receiver in this embodiment.

In the case where the receiver 8000 includes two cameras Ca1 and Ca2, the two cameras Ca1 and Ca2 are positioned away from each other as illustrated in FIG. 11A. The subject distance can be accurately estimated in this way. In other words, the subject distance can be estimated more accurately when the distance between two cameras is longer.

Figure 11B:
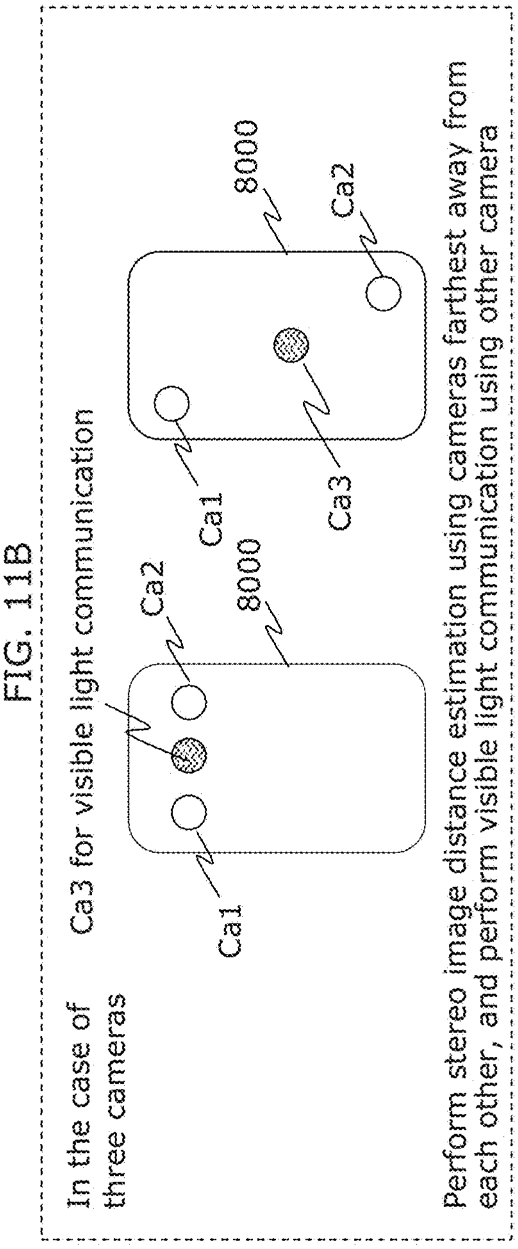
FIG. 11B is a diagram illustrating another example of camera arrangement of a receiver in Embodiment 2.

FIG. 11B is a diagram illustrating another example of camera arrangement of a receiver in this embodiment.

In the case where the receiver 8000 includes three cameras Ca1, Ca2, and Ca3, the two cameras Ca1 and Ca2 for normal imaging are positioned away from each other as illustrated in FIG. 11B, and the camera Ca3 for visible light communication is, for example, positioned between the cameras Ca1 and Ca2. The subject distance can be accurately estimated in this way. In other words, the subject distance can be accurately estimated by using two farthest cameras for normal imaging.

Figure 12:
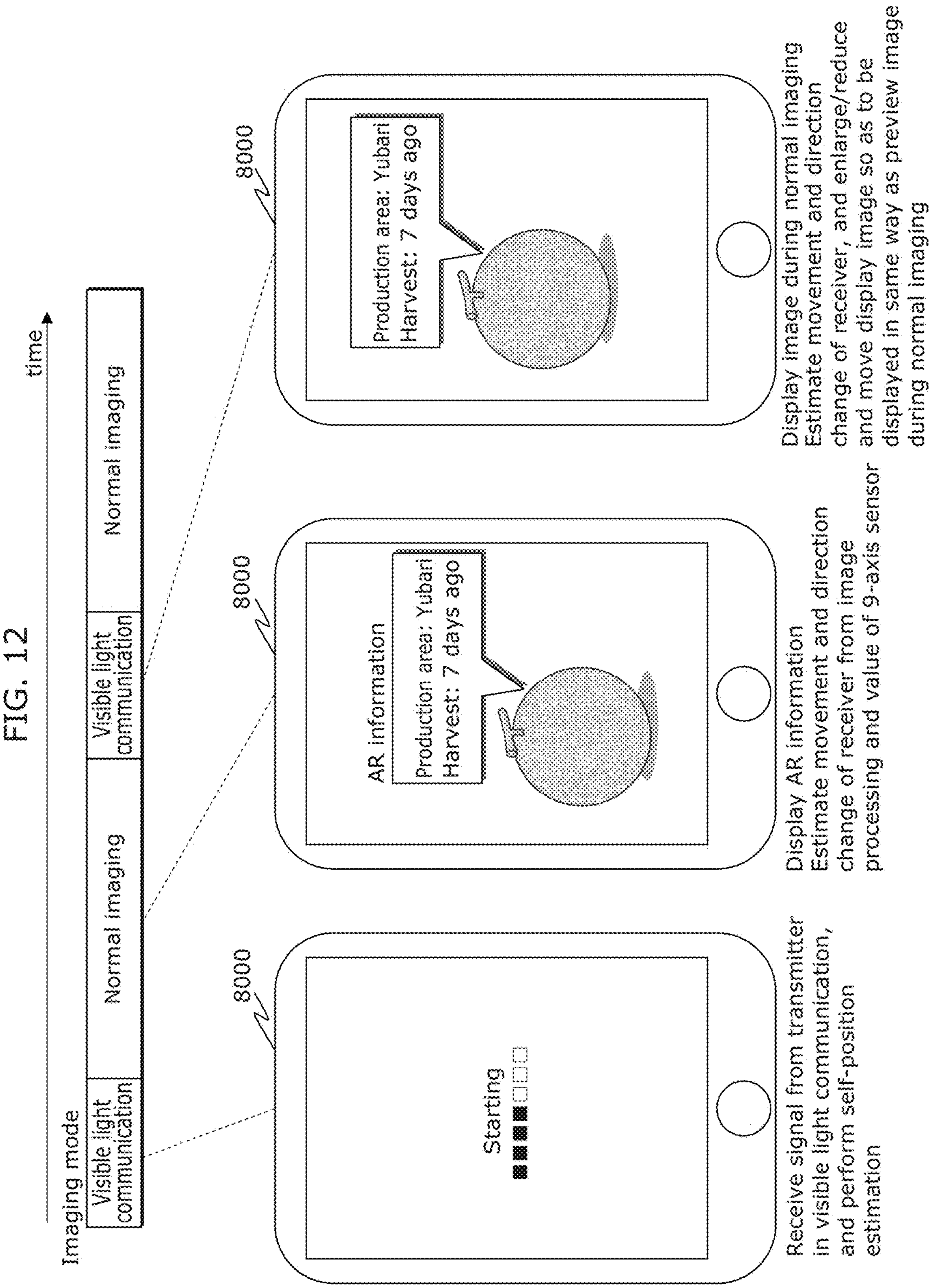
FIG. 12 is a diagram illustrating an example of display operation of a receiver in Embodiment 2.

FIG. 12 is a diagram illustrating an example of display operation of a receiver in this embodiment.

The receiver 8000 switches the imaging mode in such a manner as visible light communication, normal imaging, visible light communication, as mentioned above. Upon performing visible light communication first, the receiver 8000 starts an application program. The receiver 8000 then estimates its position based on the signal received by visible light communication. Next, when performing normal imaging, the receiver 8000 displays AR (Augmented Reality) information on the normal captured image obtained by normal imaging. The AR information is obtained based on, for example, the position estimated as mentioned above. The receiver 8000 also estimates the change in movement and direction of the receiver 8000 based on the detection result of the 9-axis sensor, the motion detection in the normal captured image, and the like, and moves the display position of the AR information according to the estimated change in movement and direction. This enables the AR information to follow the subject image in the normal captured image.

When switching the imaging mode from normal imaging to visible light communication, in visible light communication the receiver 8000 superimposes the AR information on the latest normal captured image obtained in immediately previous normal imaging. The receiver 8000 then displays the normal captured image on which the AR information is superimposed. The receiver 8000 also estimates the change in movement and direction of the receiver 8000 based on the detection result of the 9-axis sensor, and moves the AR information and the normal captured image according to the estimated change in movement and direction, in the same way as in normal imaging. This enables the AR information to follow the subject image in the normal captured image according to the movement of the receiver 8000 and the like in visible light communication, as in normal imaging. Moreover, the normal image can be enlarged or reduced according to the movement of the receiver 8000 and the like.

Figure 13:
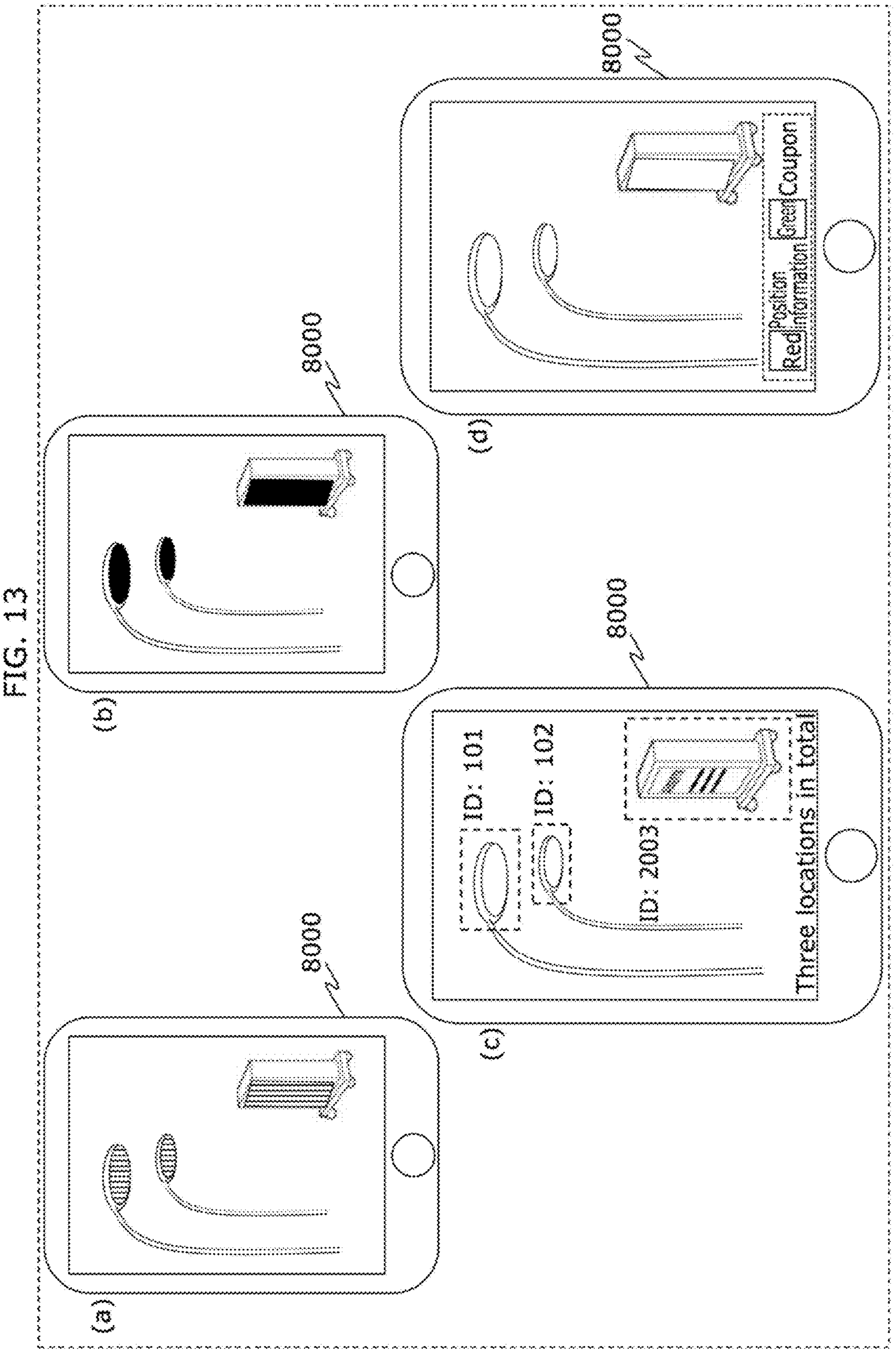
FIG. 13 is a diagram illustrating an example of display operation of a receiver in Embodiment 2.

FIG. 13 is a diagram illustrating an example of display operation of a receiver in this embodiment.

For example, the receiver 8000 may display the synthetic image in which the bright line pattern is shown, as illustrated in (a) in FIG. 13. As an alternative, the receiver 8000 may superimpose, instead of the bright line pattern, a signal specification object which is an image having a predetermined color for notifying signal transmission on the normal captured image to generate the synthetic image, and display the synthetic image, as illustrated in (b) in FIG. 13.

As another alternative, the receiver 8000 may display, as the synthetic image, the normal captured image in which the signal transmission part is indicated by a dotted frame and an identifier (e.g., ID: 101, ID: 102, etc.), as illustrated in (c) in FIG. 13. As another alternative, the receiver 8000 may superimpose, instead of the bright line pattern, a signal identification object which is an image having a predetermined color for notifying transmission of a specific type of signal on the normal captured image to generate the synthetic image, and display the synthetic image, as illustrated in (d) in FIG. 13. In this case, the color of the signal identification object differs depending on the type of signal output from the transmitter. For example, a red signal identification object is superimposed in the case where the signal output from the transmitter is position information, and a green signal identification object is superimposed in the case where the signal output from the transmitter is a coupon.

Figure 14:
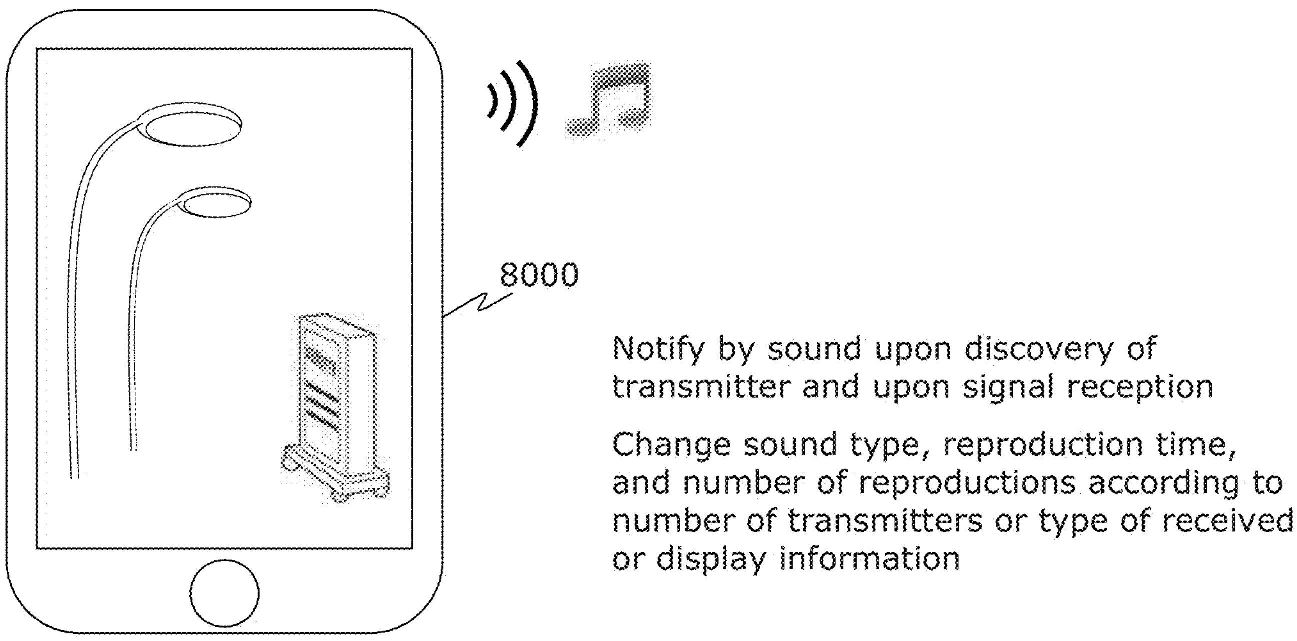
FIG. 14 is a diagram illustrating an example of operation of a receiver in Embodiment 2.

FIG. 14 is a diagram illustrating an example of display operation of a receiver in this embodiment.

For example, in the case of receiving the signal by visible light communication, the receiver 8000 may output a sound for notifying the user that the transmitter has been discovered, while displaying the normal captured image. In this case, the receiver 8000 may change the type of output sound, the number of outputs, or the output time depending on the number of discovered transmitters, the type of received signal, the type of information specified by the signal, or the like.

Figure 15:
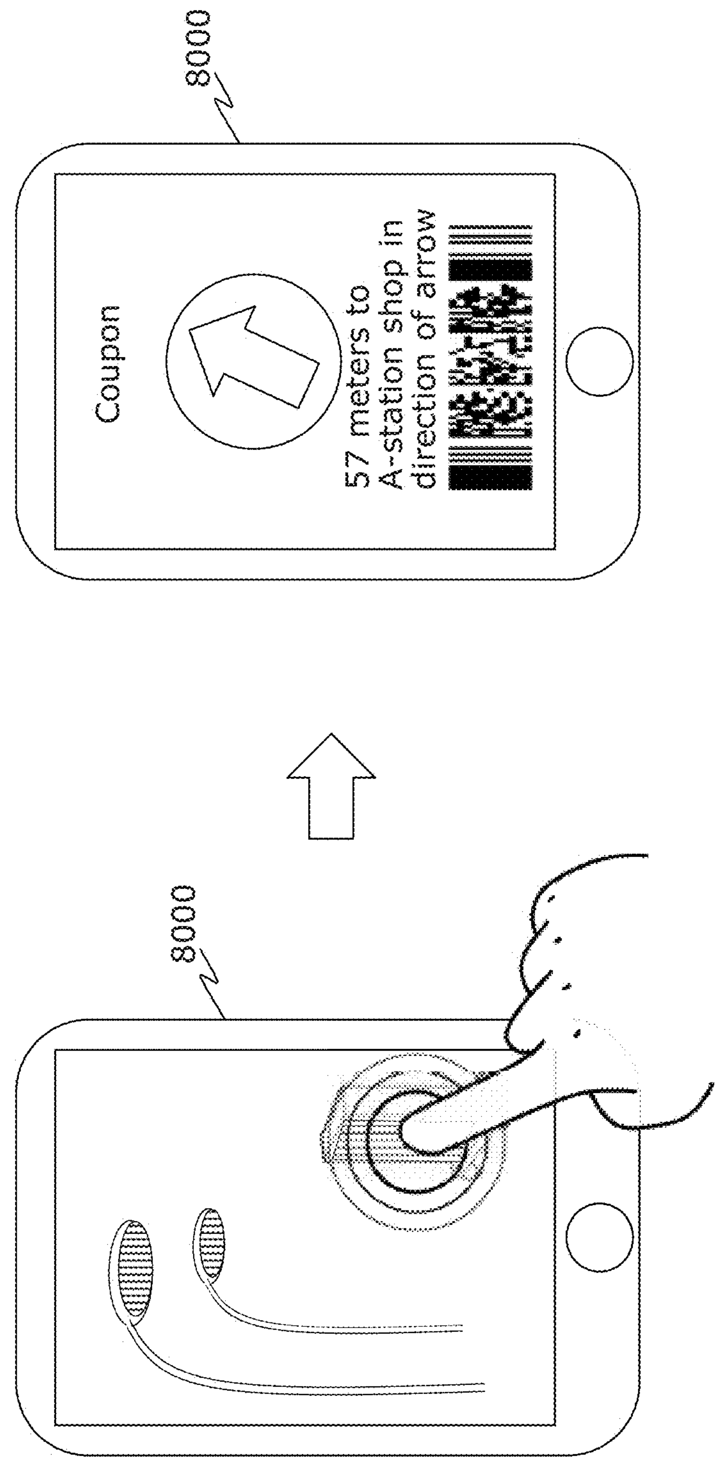
FIG. 15 is a diagram illustrating another example of operation of a receiver in Embodiment 2.

FIG. 15 is a diagram illustrating another example of operation of a receiver in this embodiment.

For example, when the user touches the bright line pattern shown in the synthetic image, the receiver 8000 generates an information notification image based on the signal transmitted from the subject corresponding to the touched bright line pattern, and displays the information notification image. The information notification image indicates, for example, a coupon or a location of a store. The bright line pattern may be the signal specification object, the signal identification object, or the dotted frame illustrated in FIG. 13. The same applies to the below-mentioned bright line pattern.

Figure 16:
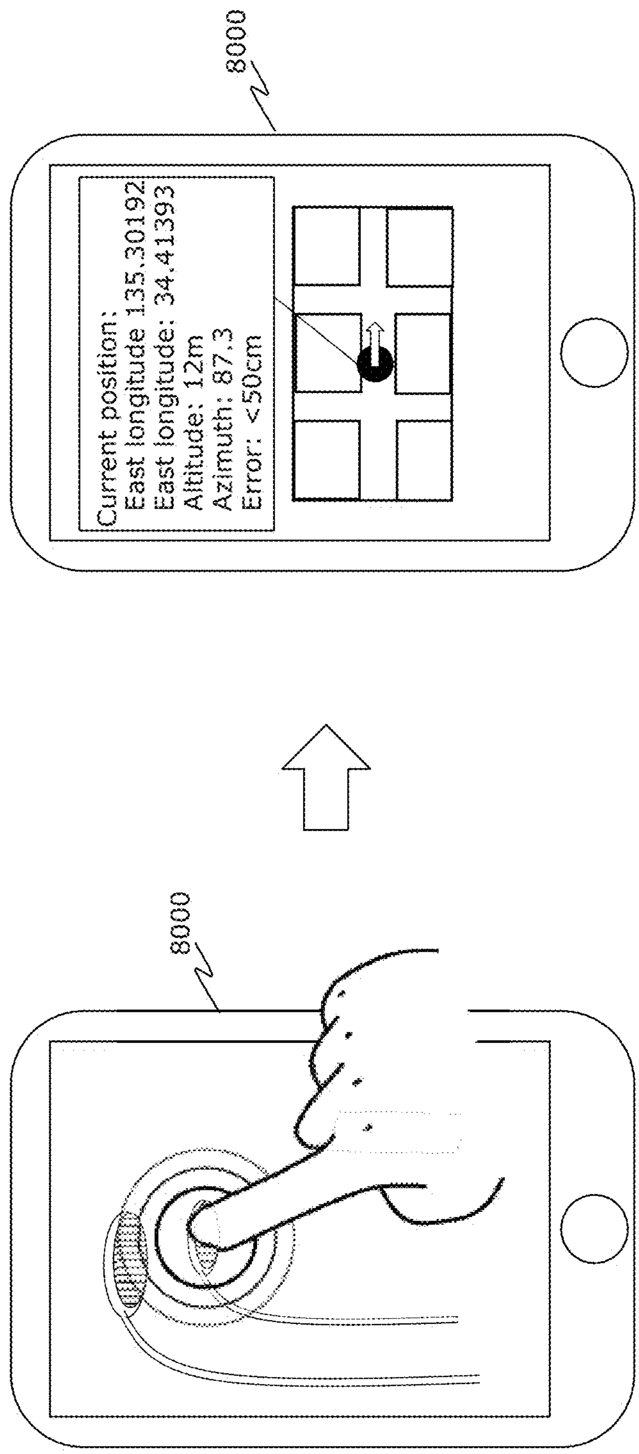
FIG. 16 is a diagram illustrating another example of operation of a receiver in Embodiment 2.

FIG. 16 is a diagram illustrating another example of operation of a receiver in this embodiment.

For example, when the user touches the bright line pattern shown in the synthetic image, the receiver 8000 generates an information notification image based on the signal transmitted from the subject corresponding to the touched bright line pattern, and displays the information notification image. The information notification image indicates, for example, the current position of the receiver 8000 by a map or the like.

Figure 17:
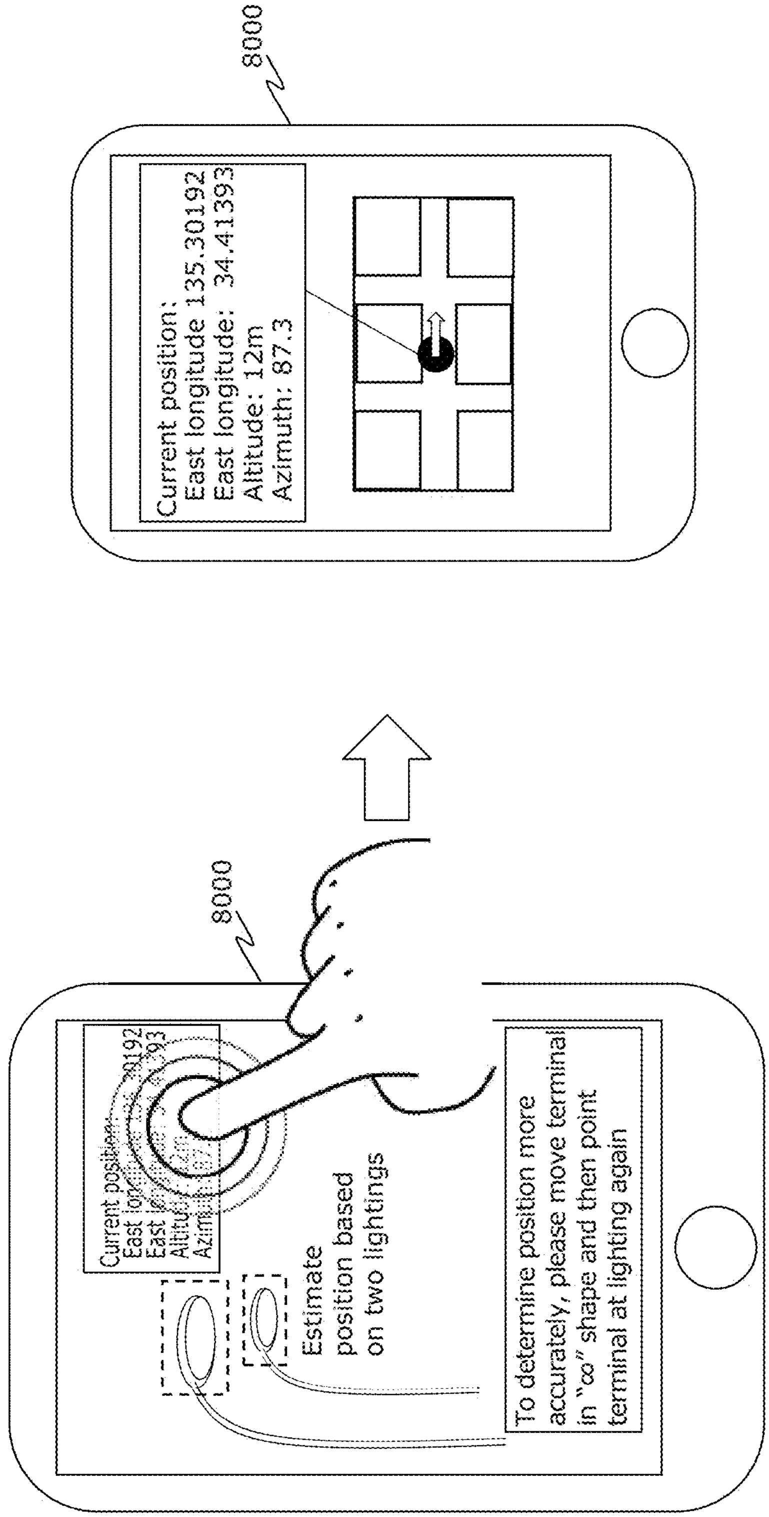
FIG. 17 is a diagram illustrating another example of operation of a receiver in Embodiment 2.

FIG. 17 is a diagram illustrating another example of operation of a receiver in this embodiment.

For example, the receiver 8000 receives signals from two street lightings which are subjects as transmitters. The receiver 8000 estimates the current position of the receiver 8000 based on these signals, in the same way as above. The receiver 8000 then displays the normal captured image, and also superimposes an information notification image (an image showing latitude, longitude, and the like) indicating the estimation result on the normal captured image. The receiver 8000 may also display an auxiliary information notification image on the normal captured image. For instance, the auxiliary information notification image prompts the user to perform an operation for calibrating the 9-axis sensor (particularly the geomagnetic sensor), i.e., an operation for drift cancellation. As a result of such an operation, the current position can be estimated with high accuracy.

When the user touches the displayed information notification image, the receiver 8000 may display the map showing the estimated position, instead of the normal captured image.

Figure 18:
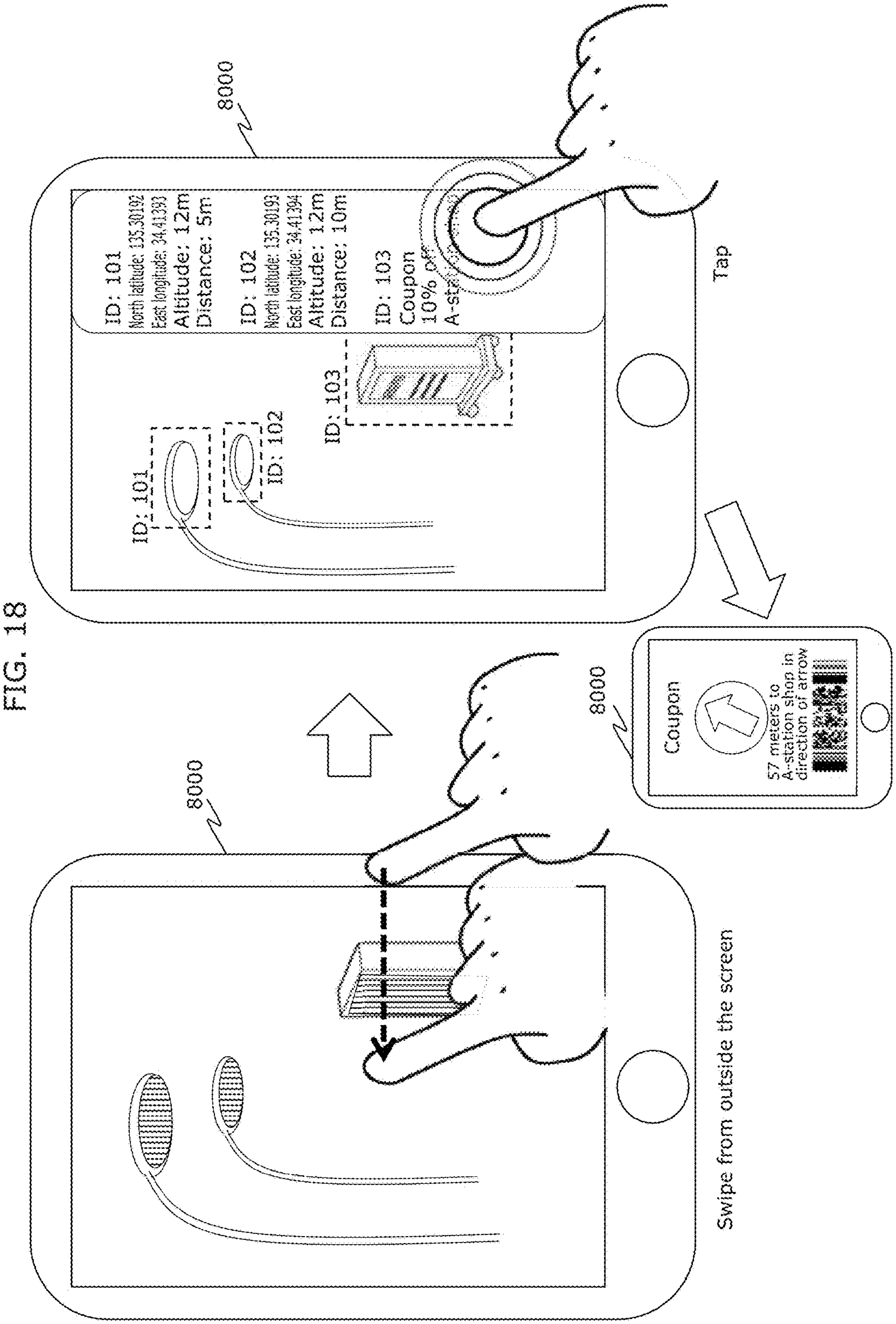
FIG. 18 is a diagram illustrating another example of operation of a receiver in Embodiment 2.

FIG. 18 is a diagram illustrating another example of operation of a receiver in this embodiment.

For example, when the user swipes on the receiver 8000 on which the synthetic image is displayed, the receiver 8000 displays the normal captured image including the dotted frame and the identifier like the normal captured image illustrated in (c) in FIG. 13, and also displays a list of information to follow the swipe operation. The list includes information specified by the signal transmitted from the part (transmitter) identified by each identifier. The swipe may be, for example, an operation of moving the user's finger from outside the display of the receiver 8000 on the right side into the display. The swipe may be an operation of moving the user's finger from the top, bottom, or left side of the display into the display.

When the user taps information included in the list, the receiver 8000 may display an information notification image (e.g., an image showing a coupon) indicating the information in more detail.

Figure 19:
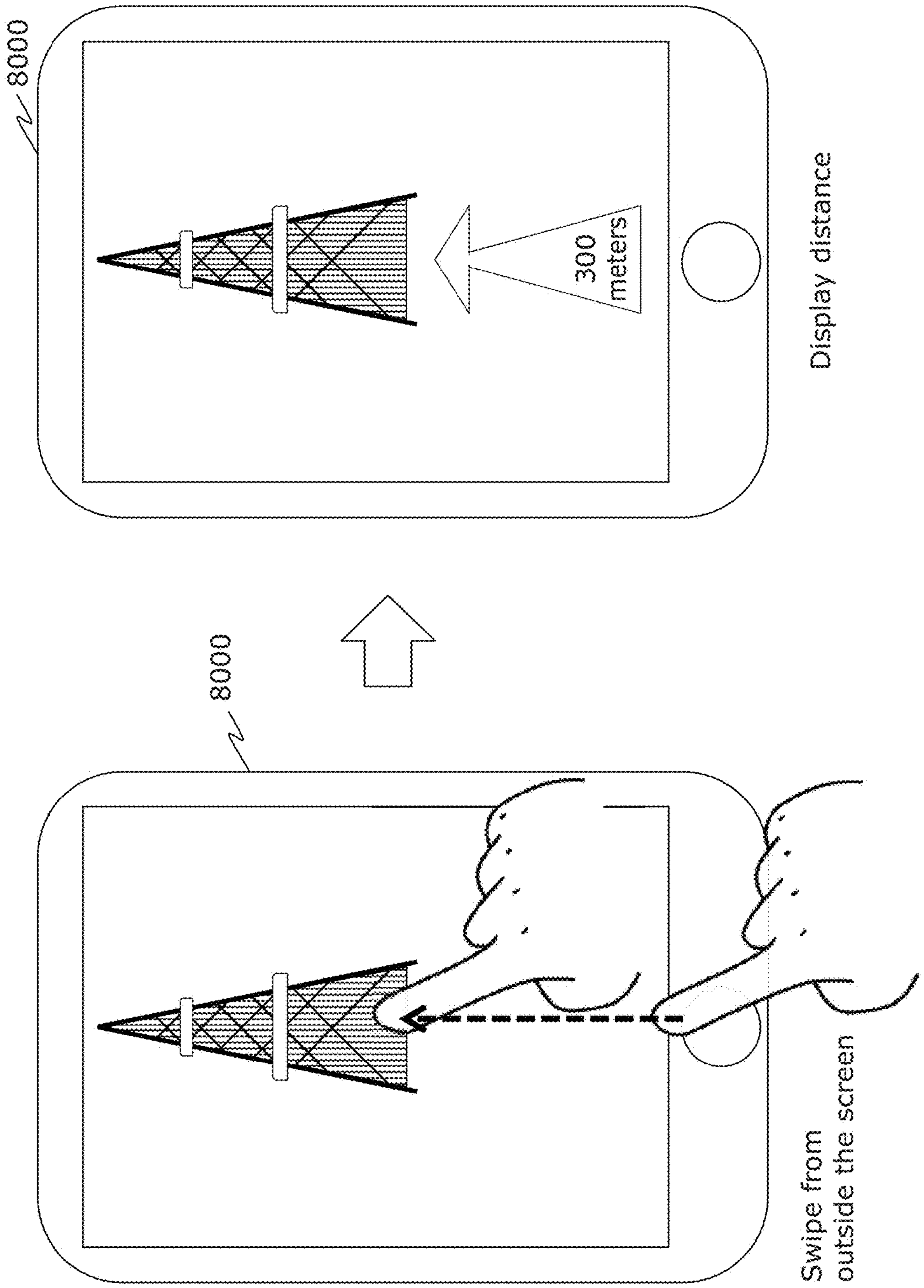
FIG. 19 is a diagram illustrating another example of operation of a receiver in Embodiment 2.

FIG. 19 is a diagram illustrating another example of operation of a receiver in this embodiment.

For example, when the user swipes on the receiver 8000 on which the synthetic image is displayed, the receiver 8000 superimposes an information notification image on the synthetic image, to follow the swipe operation. The information notification image indicates the subject distance with an arrow so as to be easily recognizable by the user. The swipe may be, for example, an operation of moving the user's finger from outside the display of the receiver 8000 on the bottom side into the display. The swipe may be an operation of moving the user's finger from the left, top, or right side of the display into the display.

Figure 20:
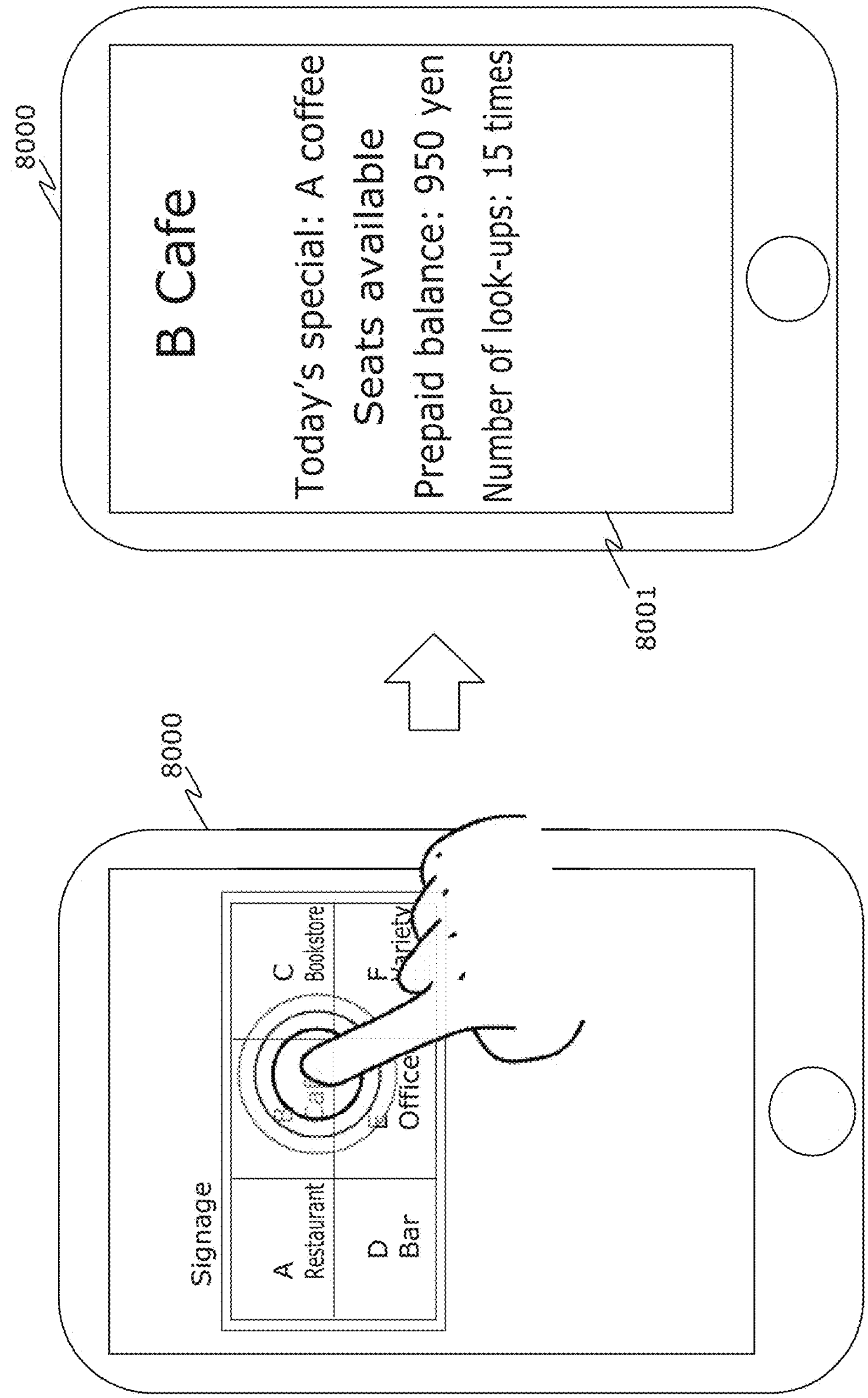
FIG. 20 is a diagram illustrating another example of operation of a receiver in Embodiment 2.

FIG. 20 is a diagram illustrating another example of operation of a receiver in this embodiment.

For example, the receiver 8000 captures, as a subject, a transmitter which is a signage showing a plurality of stores, and displays the normal captured image obtained as a result. When the user taps a signage image of one store included in the subject shown in the normal captured image, the receiver 8000 generates an information notification image based on the signal transmitted from the signage of the store, and displays an information notification image 8001. The information notification image 8001 is, for example, an image showing the availability of the store and the like.

Figure 21:
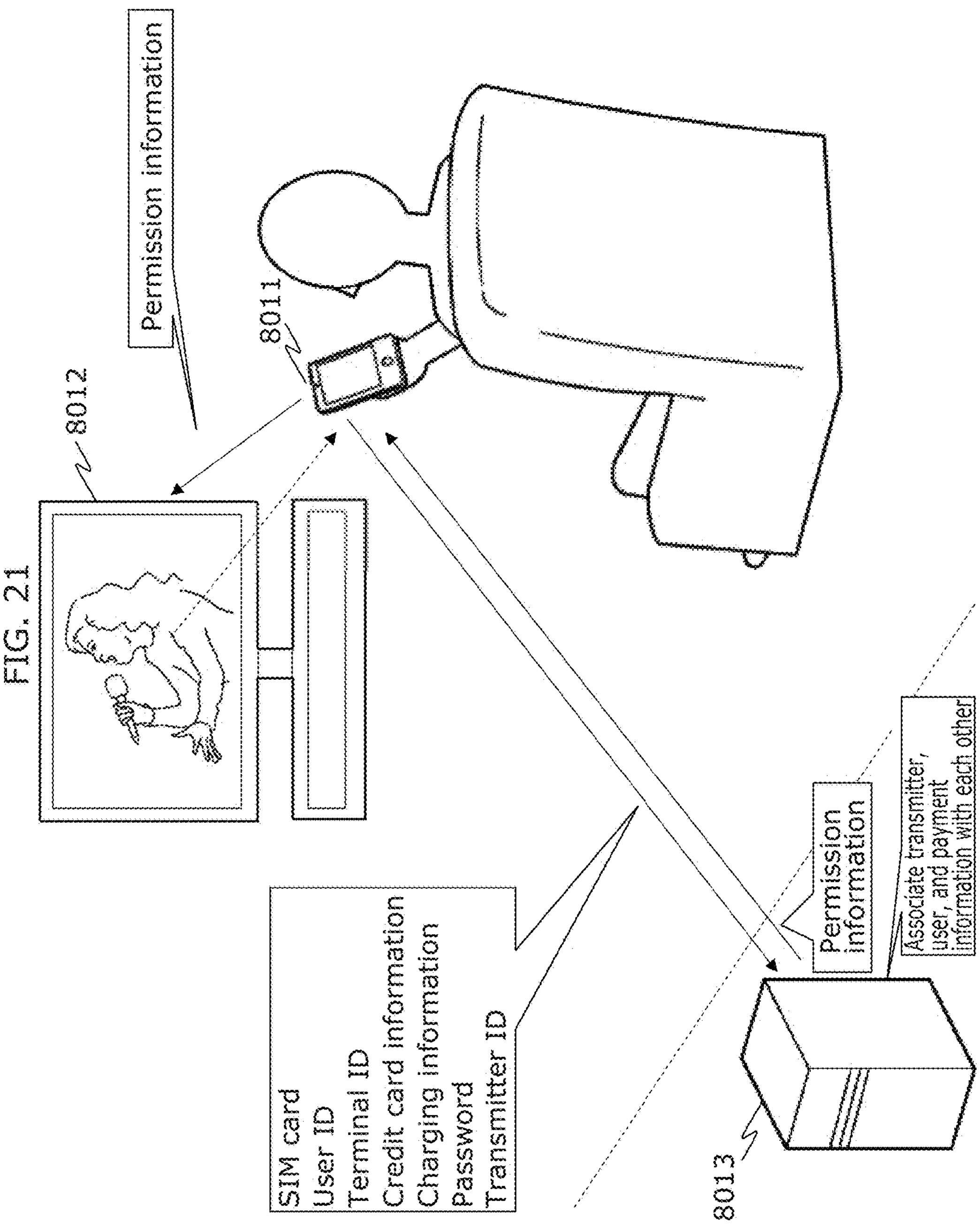
FIG. 21 is a diagram illustrating an example of operation of a receiver, a transmitter, and a server in Embodiment 2.

FIG. 21 is a diagram illustrating an example of operation of a receiver, a transmitter, and a server in this embodiment.

A transmitter 8012 as a television transmits a signal to a receiver 8011 by way of luminance change. The signal includes information prompting the user to buy content relating to a program being viewed. Having received the signal by visible light communication, the receiver 8011 displays an information notification image prompting the user to buy content, based on the signal. When the user performs an operation for buying the content, the receiver 8011 transmits at least one of information included in a SIM (Subscriber Identity Module) card inserted in the receiver 8011, a user ID, a terminal ID, credit card information, charging information, a password, and a transmitter ID, to a server 8013. The server 8013 manages a user ID and payment information in association with each other, for each user. The server 8013 specifies a user ID based on the information transmitted from the receiver 8011, and checks payment information associated with the user ID. By this check, the server 8013 determines whether or not to permit the user to buy the content. In the case of determining to permit the user to buy the content, the server 8013 transmits permission information to the receiver 8011. Having received the permission information, the receiver 8011 transmits the permission information to the transmitter 8012. Having received the permission information, the transmitter 8012 obtains the content via a network as an example, and reproduces the content.

The transmitter 8012 may transmit information including the ID of the transmitter 8012 to the receiver 8011, by way of luminance change. In this case, the receiver 8011 transmits the information to the server 8013. Having obtained the information, the server 8013 can determine that, for example, the television program is being viewed on the transmitter 8012, and conduct television program rating research.

The receiver 8011 may include information of an operation (e.g., voting) performed by the user in the above-mentioned information and transmit the information to the server 8013, to allow the server 8013 to reflect the information on the television program. An audience participation program can be realized in this way. Besides, in the case of receiving a post from the user, the receiver 8011 may include the post in the above-mentioned information and transmit the information to the server 8013, to allow the server 8013 to reflect the post on the television program, a network message board, or the like.

Furthermore, by the transmitter 8012 transmitting the above-mentioned information, the server 8013 can charge for television program viewing by paid broadcasting or on-demand TV. The server 8013 can also cause the receiver 8011 to display an advertisement, or the transmitter 8012 to display detailed information of the displayed television program or an URL of a site showing the detailed information. The server 8013 may also obtain the number of times the advertisement is displayed on the receiver 8011, the price of a product bought from the advertisement, or the like, and charge the advertiser according to the number of times or the price. Such price-based charging is possible even in the case where the user seeing the advertisement does not buy the product immediately. When the server 8013 obtains information indicating the manufacturer of the transmitter 8012 from the transmitter 8012 via the receiver 8011, the server 8013 may provide a service (e.g., payment for selling the product) to the manufacturer indicated by the information.

Figure 22:
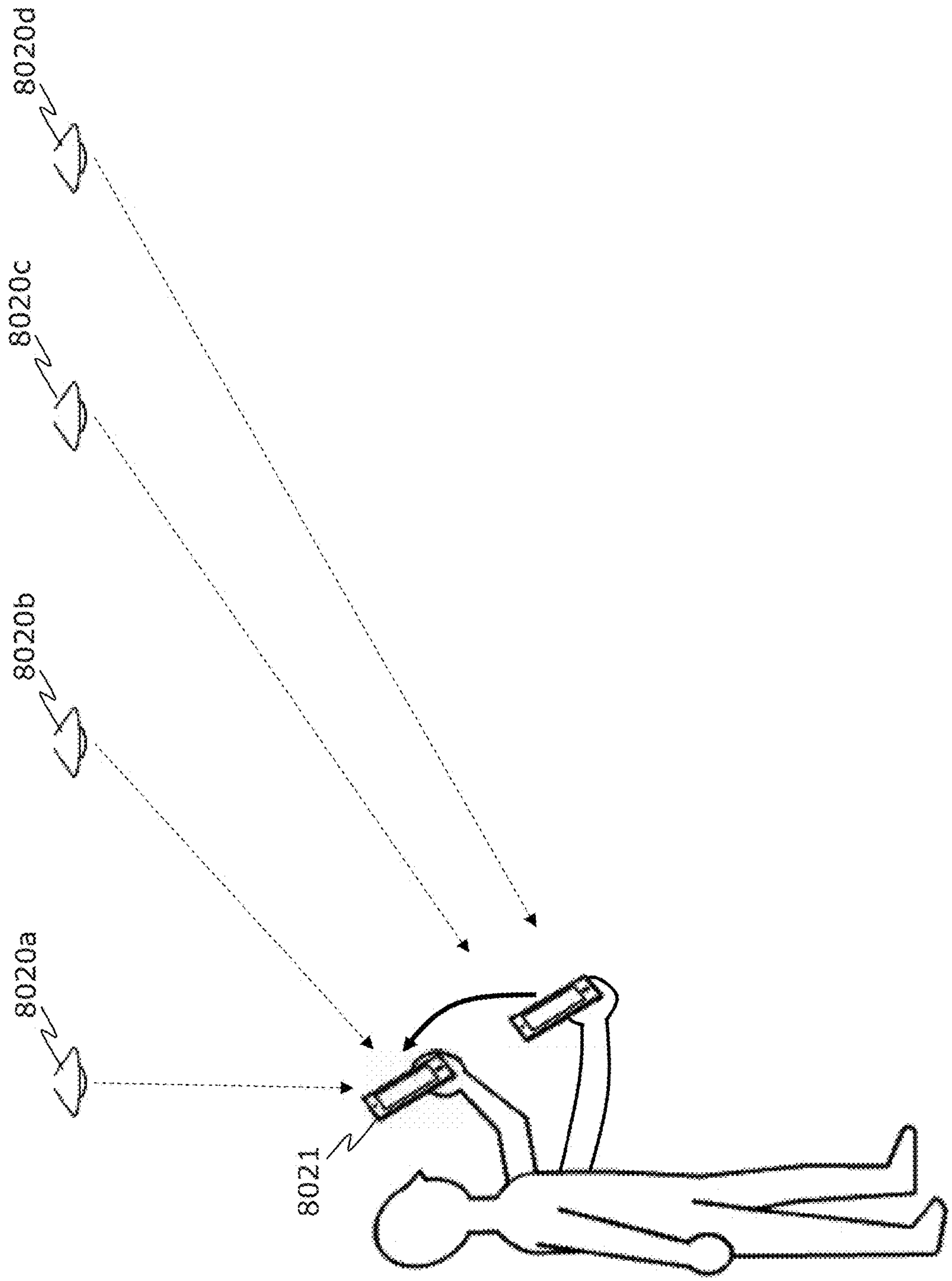
FIG. 22 is a diagram illustrating another example of operation of a receiver in Embodiment 2.

FIG. 22 is a diagram illustrating another example of operation of a receiver in this embodiment.

For example, the user points a camera of a receiver 8021 at a plurality of transmitters 8020*a* to 8020*d* as lightings. Here, the receiver 8021 is moved so that the transmitters 8020*a* to 8020*d* are sequentially captured as a subject. By performing visible light communication during the movement, the receiver 8021 receives a signal from each of the transmitters 8020*a* to 8020*d*. The signal includes information indicating the position of the transmitter. The receiver 8021 estimates the position of the receiver 8021 using the triangulation principle, based on the positions indicated by the signals received from the transmitters 8020*a* to 8020*d*, the detection result of the 9-axis sensor included in the receiver 8021, and the movement of the captured image. In this case, the drift of the 9-axis sensor (particularly the geomagnetic sensor) is canceled by moving the receiver 8021, so that the position can be estimated with higher accuracy.

Figure 23:
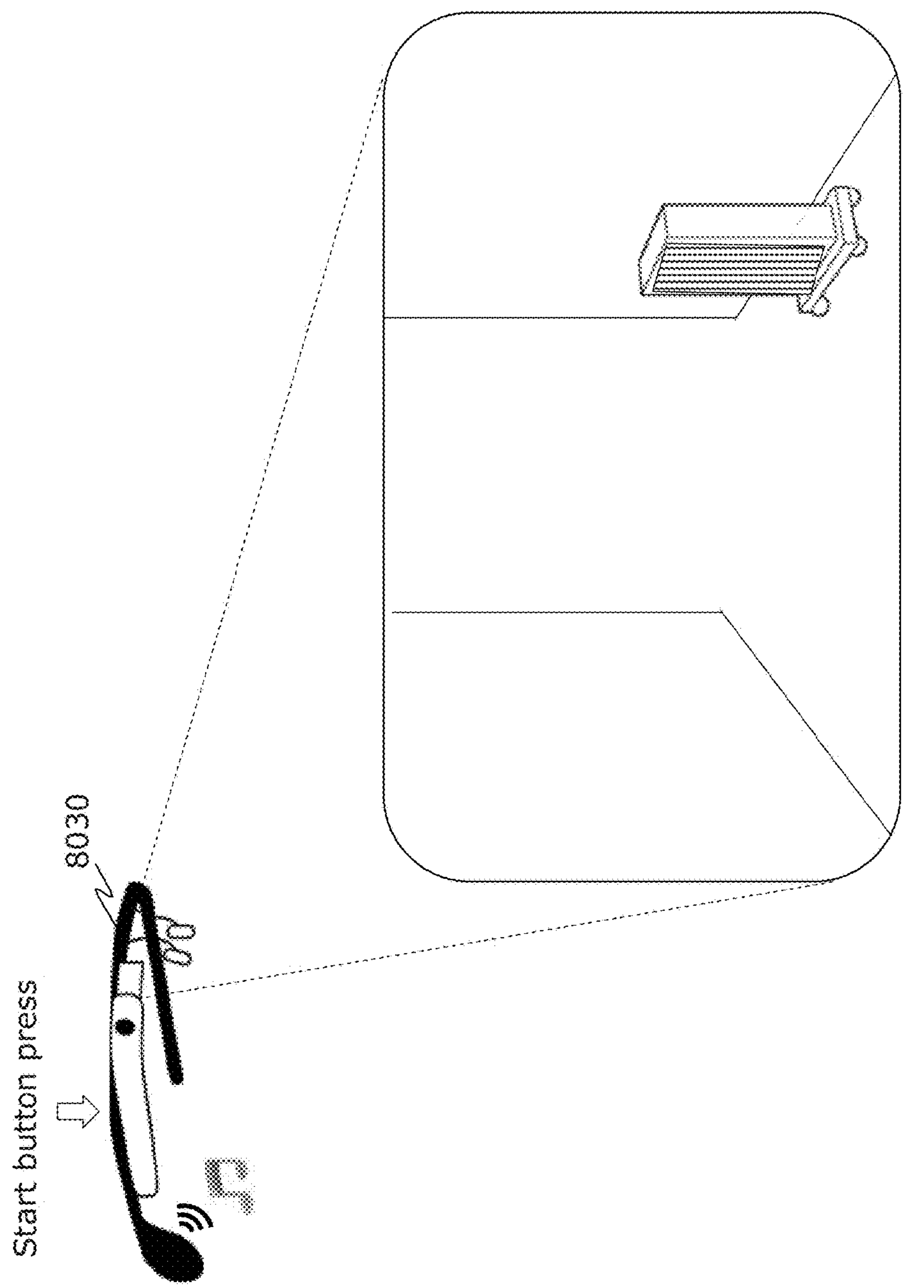
FIG. 23 is a diagram illustrating another example of operation of a receiver in Embodiment 2.

FIG. 23 is a diagram illustrating another example of operation of a receiver in this embodiment.

For example, a receiver 8030 is a head-mounted display including a camera. When a start button is pressed, the receiver 8030 starts imaging in the visible light communication mode, i.e., visible light communication. In the case of receiving a signal by visible light communication, the receiver 8030 notifies the user of information corresponding to the received signal. The notification is made, for example, by outputting a sound from a speaker included in the receiver 8030, or by displaying an image. Visible light communication may be started not only when the start button is pressed, but also when the receiver 8030 receives a sound instructing the start or when the receiver 8030 receives a signal instructing the start by wireless communication. Visible light communication may also be started when the change width of the value obtained by a 9-axis sensor included in the receiver 8030 exceeds a predetermined range or when a bright line pattern, even if only slightly, appears in the normal captured image.

Figure 24:
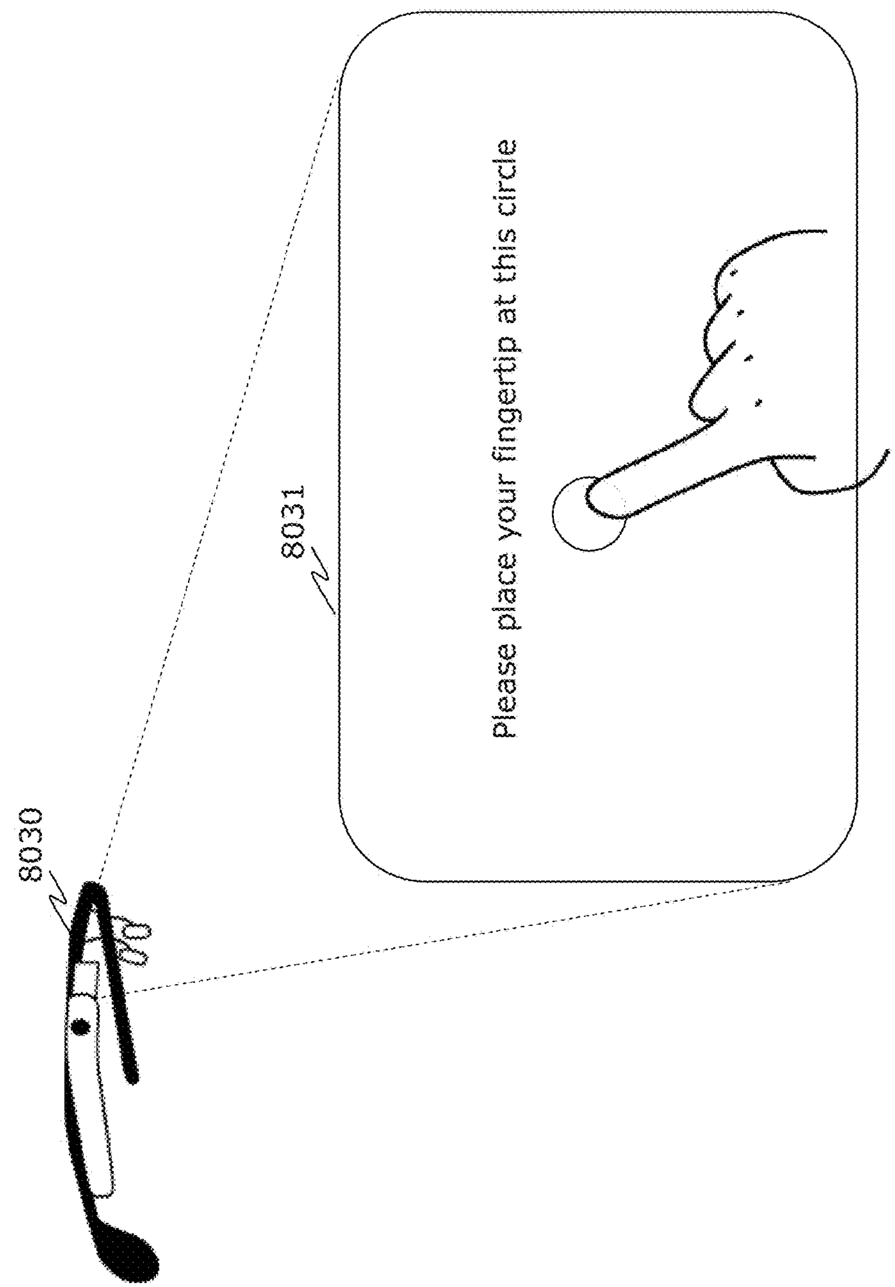
FIG. 24 is a diagram illustrating an example of initial setting of a receiver in Embodiment 2.

FIG. 24 is a diagram illustrating an example of initial setting of a receiver in this embodiment.

The receiver 8030 displays an alignment image 8031 upon initial setting. The alignment image 8031 is used to align the position pointed by the user in the image captured by the camera of the receiver 8030 and the image displayed on the receiver 8030. When the user places his or her fingertip at the position of a circle shown in the alignment image 8031, the receiver associates the position of the fingertip and the position of the circle, and performs alignment. That is, the position pointed by the user is calibrated.

Figure 25:
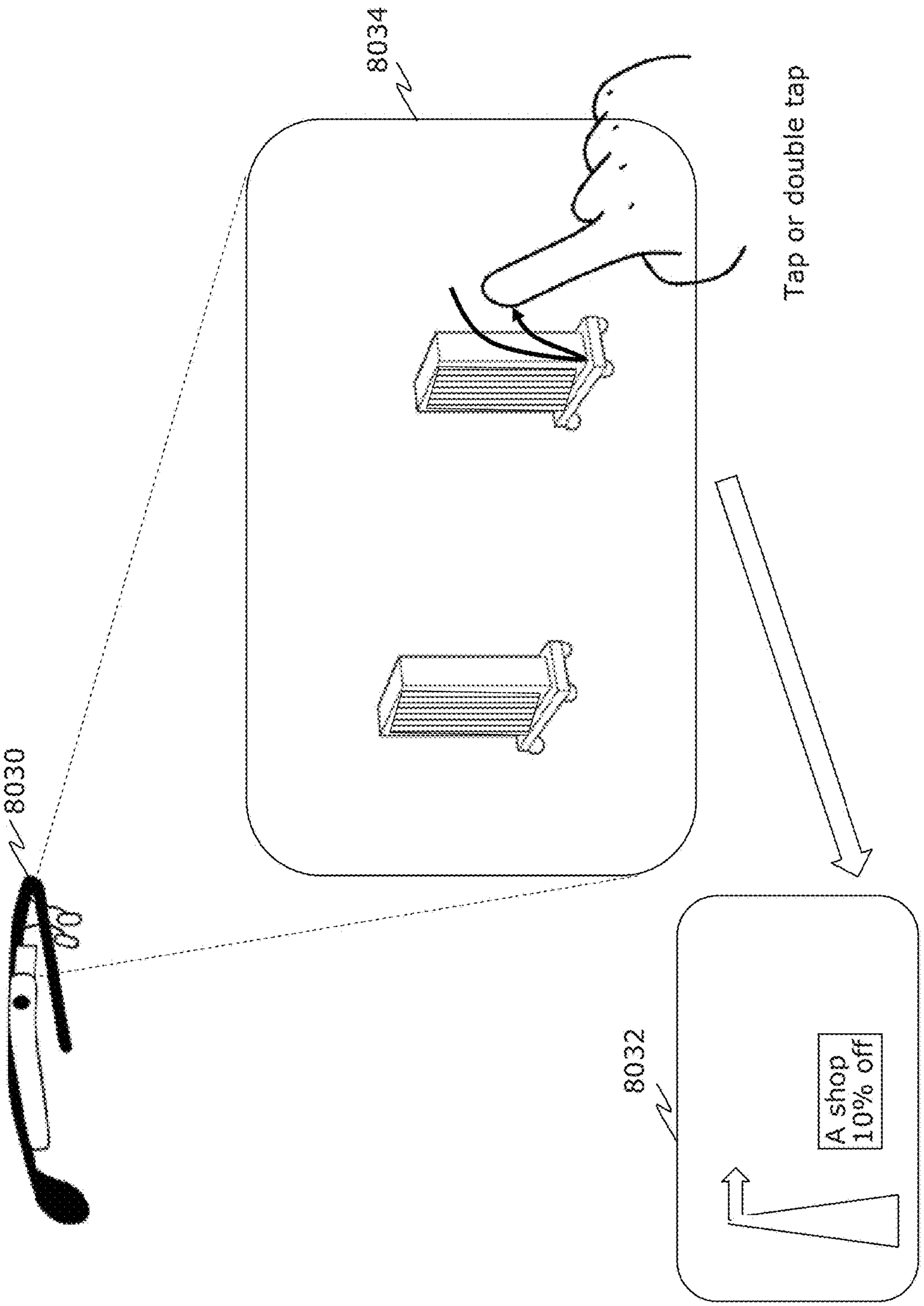
FIG. 25 is a diagram illustrating another example of operation of a receiver in Embodiment 2.

FIG. 25 is a diagram illustrating another example of operation of a receiver in this embodiment.

The receiver 8030 specifies a signal transmission part by visible light communication, and displays a synthetic image 8034 in which a bright line pattern is shown in the part. The user performs an operation such as a tap or a double tap, on the bright line pattern. The receiver 8030 receives the operation, specifies the bright line pattern subjected to the operation, and displays an information notification image 8032 based on a signal transmitted from the part corresponding to the bright line pattern.

Figure 26:
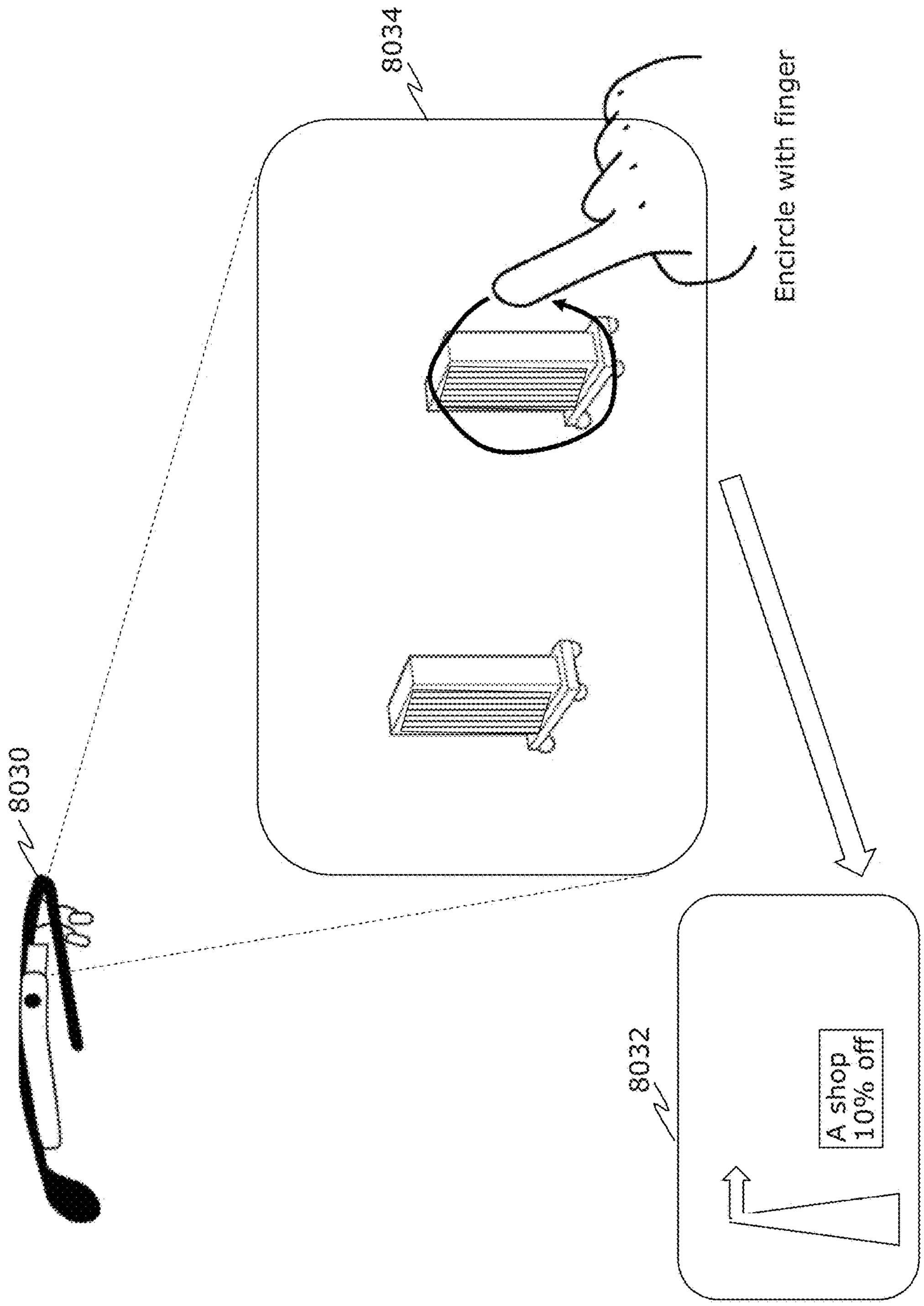
FIG. 26 is a diagram illustrating another example of operation of a receiver in Embodiment 2.

FIG. 26 is a diagram illustrating another example of operation of a receiver in this embodiment.

The receiver 8030 displays the synthetic image 8034 in the same way as above. The user performs an operation of moving his or her fingertip so as to encircle the bright line pattern in the synthetic image 8034. The receiver 8030 receives the operation, specifies the bright line pattern subjected to the operation, and displays an information notification image 8032 based on a signal transmitted from the part corresponding to the bright line pattern.

Figure 27:
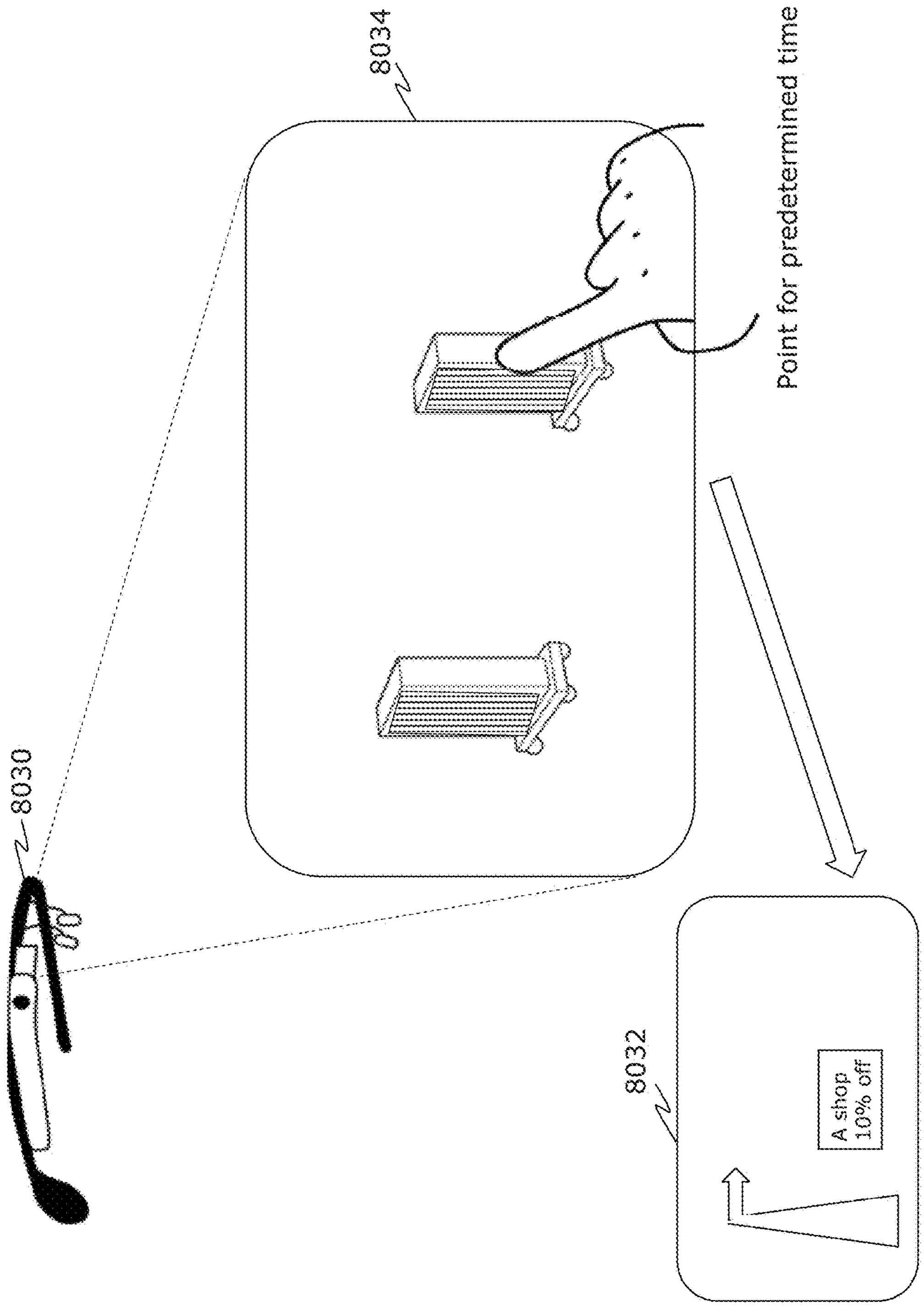
FIG. 27 is a diagram illustrating another example of operation of a receiver in Embodiment 2.

FIG. 27 is a diagram illustrating another example of operation of a receiver in this embodiment.

The receiver 8030 displays the synthetic image 8034 in the same way as above. The user performs an operation of placing his or her fingertip at the bright line pattern in the synthetic image 8034 for a predetermined time or more. The receiver 8030 receives the operation, specifies the bright line pattern subjected to the operation, and displays an information notification image 8032 based on a signal transmitted from the part corresponding to the bright line pattern.

Figure 28:
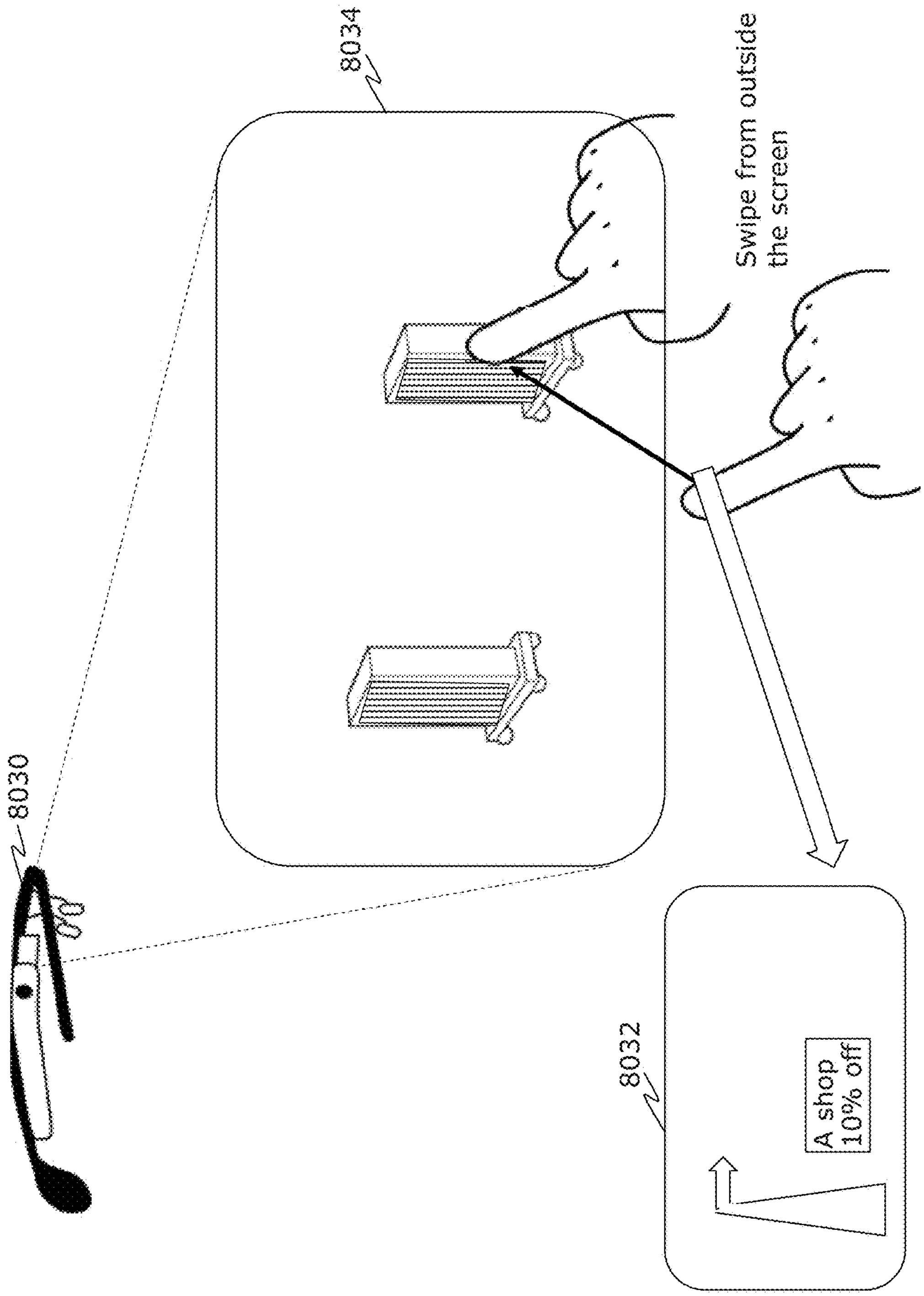
FIG. 28 is a diagram illustrating another example of operation of a receiver in Embodiment 2.

FIG. 28 is a diagram illustrating another example of operation of a receiver in this embodiment.

The receiver 8030 displays the synthetic image 8034 in the same way as above. The user performs an operation of moving his or her fingertip toward the bright line pattern in the synthetic image 8034 by a swipe. The receiver 8030 receives the operation, specifies the bright line pattern subjected to the operation, and displays an information notification image 8032 based on a signal transmitted from the part corresponding to the bright line pattern.

Figure 29:
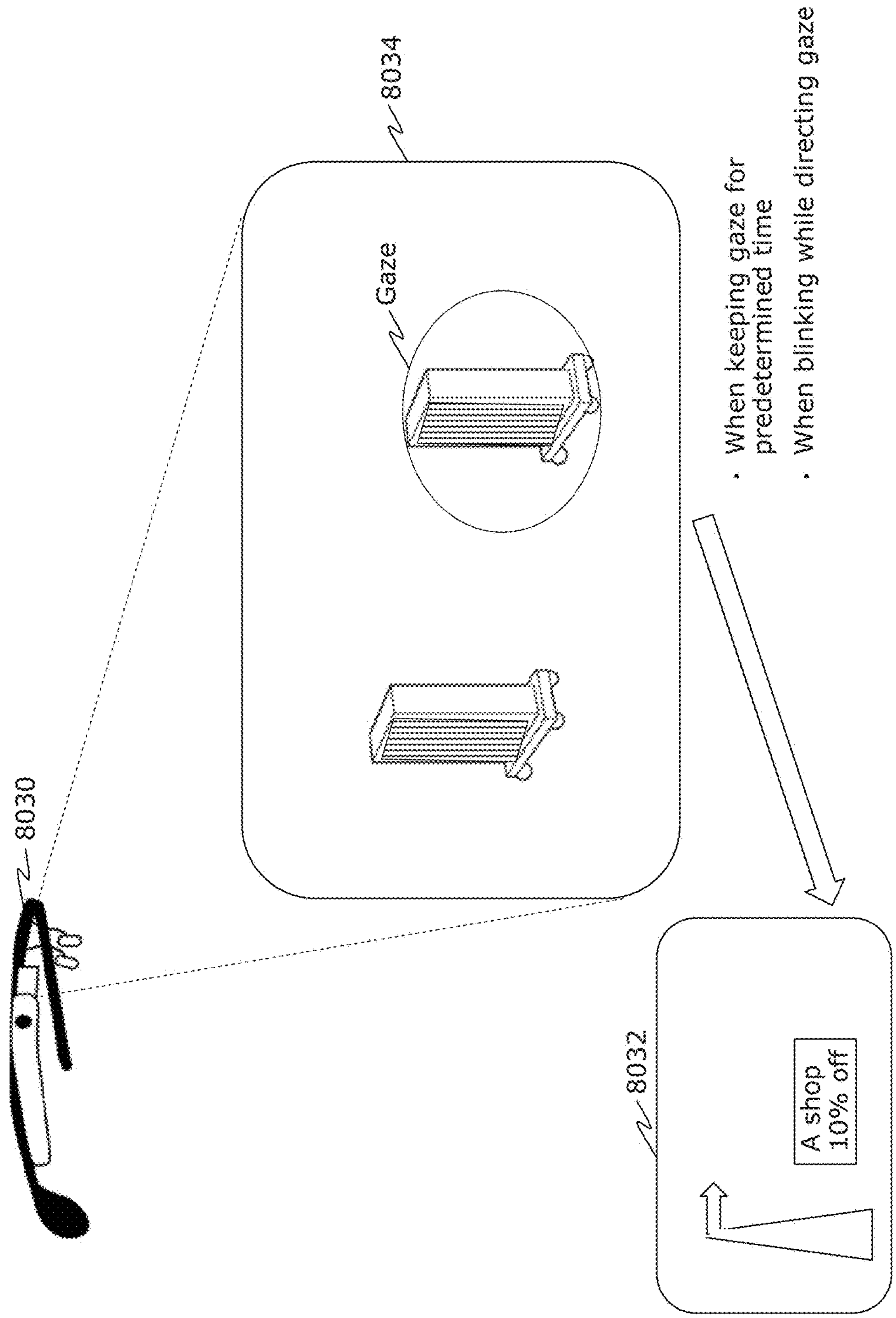
FIG. 29 is a diagram illustrating another example of operation of a receiver in Embodiment 2.

FIG. 29 is a diagram illustrating another example of operation of a receiver in this embodiment.

The receiver 8030 displays the synthetic image 8034 in the same way as above. The user performs an operation of continuously directing his or her gaze to the bright line pattern in the synthetic image 8034 for a predetermined time or more. Alternatively, the user performs an operation of blinking a predetermined number of times while directing his or her gaze to the bright line pattern. The receiver 8030 receives the operation, specifies the bright line pattern subjected to the operation, and displays an information notification image 8032 based on a signal transmitted from the part corresponding to the bright line pattern.

Figure 30:
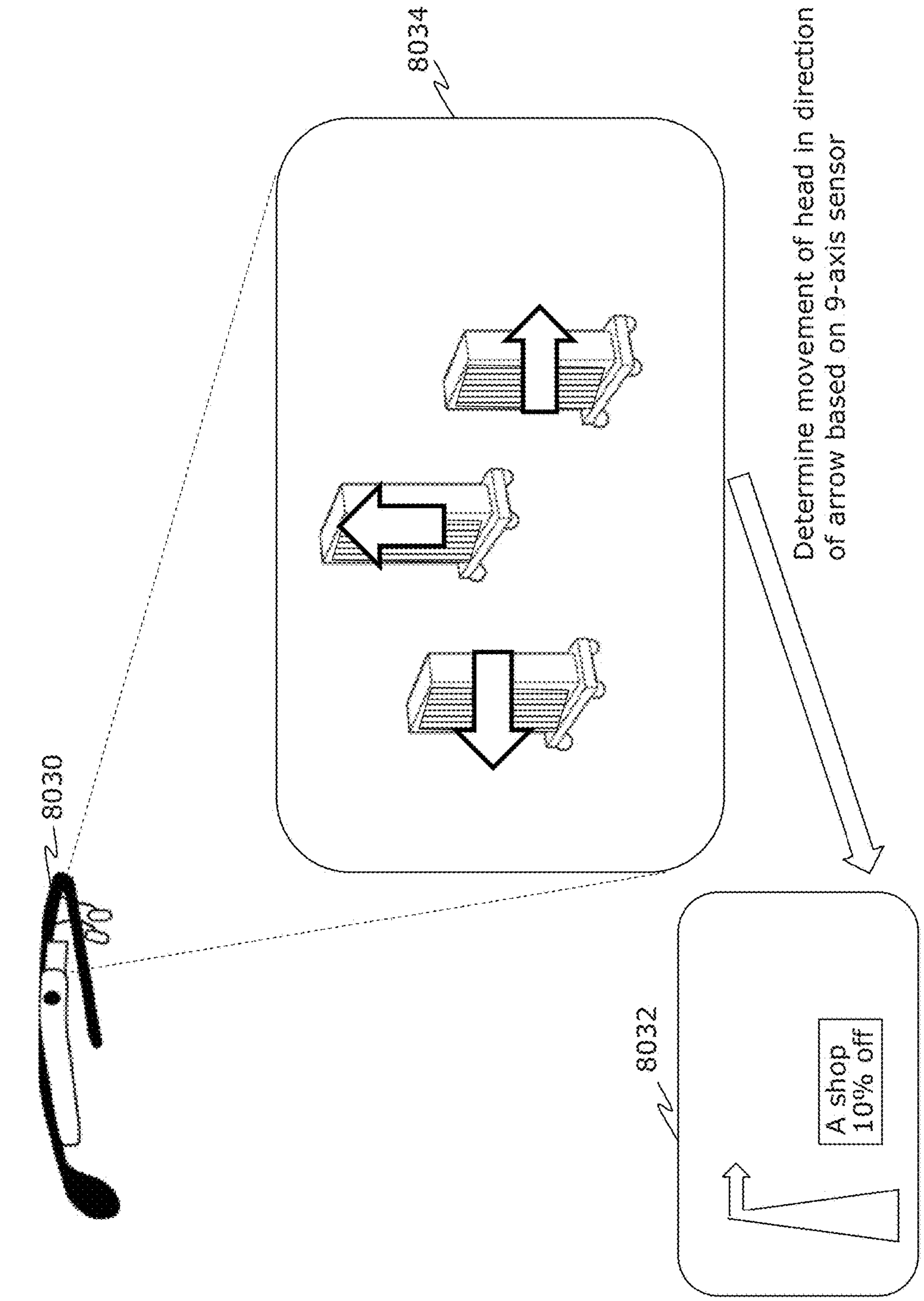
FIG. 30 is a diagram illustrating another example of operation of a receiver in Embodiment 2.

FIG. 30 is a diagram illustrating another example of operation of a receiver in this embodiment.

The receiver 8030 displays the synthetic image 8034 in the same way as above, and also displays an arrow associated with each bright line pattern in the synthetic image 8034. The arrow of each bright line pattern differs in direction. The user performs an operation of moving his or her head along one of the arrows. The receiver 8030 receives the operation based on the detection result of the 9-axis sensor, and specifies the bright line pattern associated with the arrow corresponding to the operation, i.e., the arrow in the direction in which the head is moved. The receiver 8030 displays the information notification image 8032 based on the signal transmitted from the part corresponding to the bright line pattern.

Figure 31A:
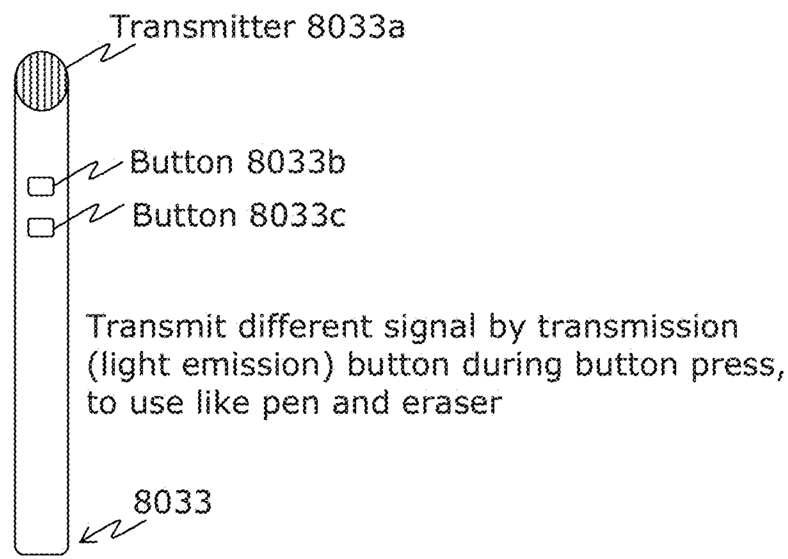
FIG. 31A is a diagram illustrating a pen used to operate a receiver in Embodiment 2.

FIG. 31A is a diagram illustrating a pen used to operate a receiver in this embodiment.

A pen 8033 includes a transmitter 8033*a* for transmitting a signal by way of luminance change, and buttons 8033*b* and 8033*c*. When the button 8033*b* is pressed, the transmitter 8033*a* transmits a predetermined first signal. When the button 8033*c* is pressed, the transmitter 8033*a* transmits a predetermined second signal different from the first signal.

Figure 31B:
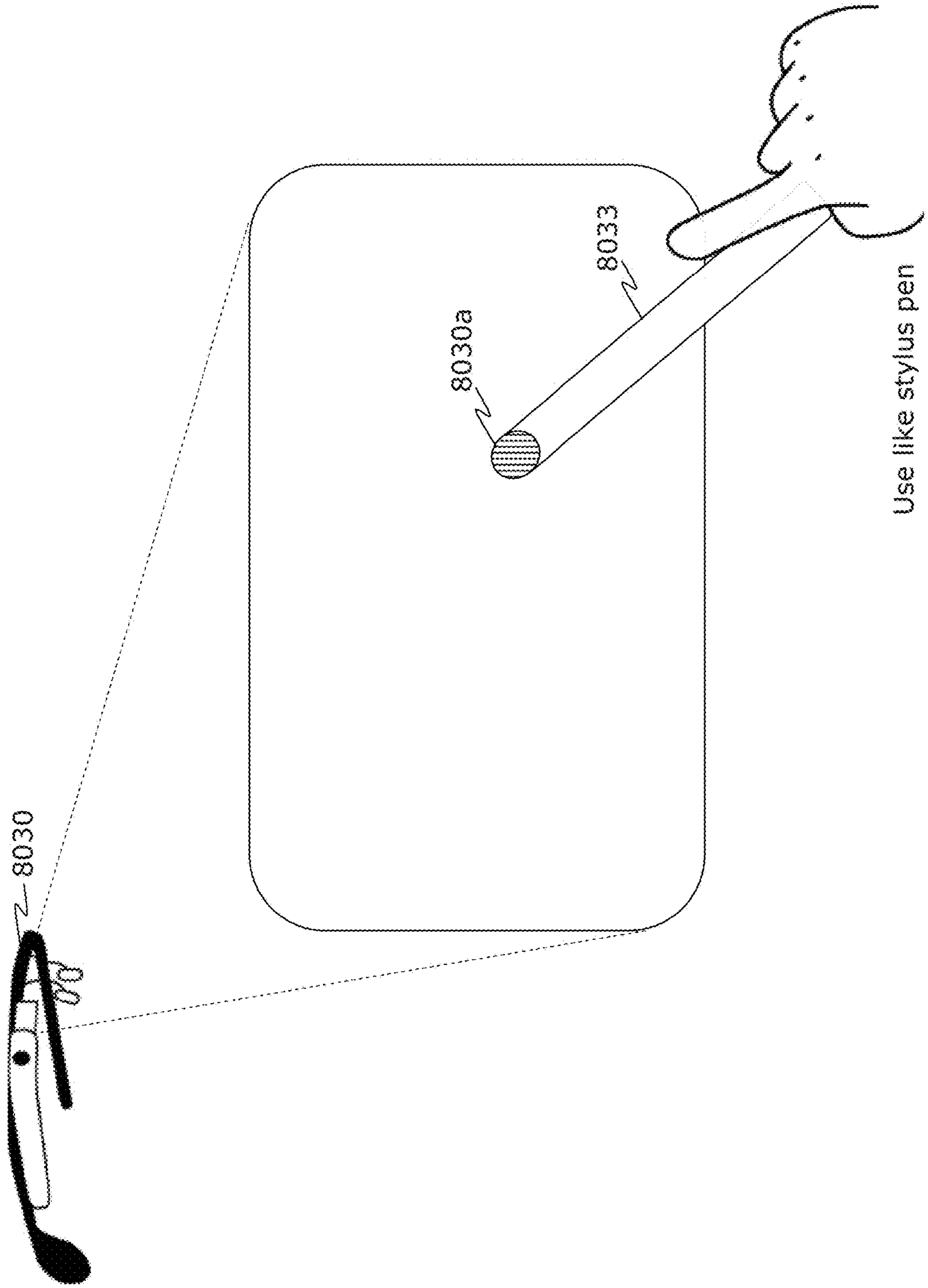
FIG. 31B is a diagram illustrating operation of a receiver using a pen in Embodiment 2.

FIG. 31B is a diagram illustrating operation of a receiver using a pen in this embodiment.

The pen 8033 is used instead of the user's finger mentioned above, like a stylus pen. By selective use of the buttons 8033*b* and 8033*c*, the pen 8033 can be used like a normal pen or an eraser.

Figure 32:
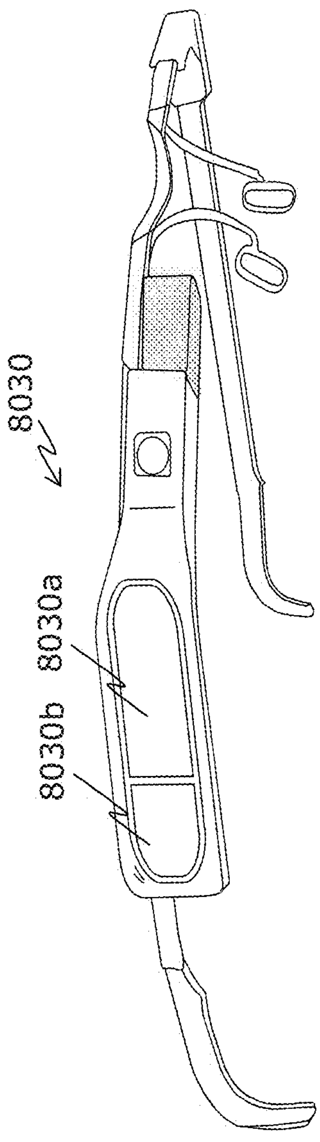
FIG. 32 is a diagram illustrating an example of appearance of a receiver in Embodiment 2.

FIG. 32 is a diagram illustrating an example of appearance of a receiver in this embodiment.

The receiver 8030 includes a first touch sensor 8030*a* and a second touch sensor 8030*b*. These touch sensors are attached to the frame of the receiver 8030. For example, when the user places his or her fingertip on the first touch sensor 8030*a* and moves the fingertip, the receiver 8030 moves the pointer in the image displayed to the user, according to the movement of the fingertip. When the user touches the second touch sensor 8030*b*, the receiver 8030 selects the object pointed by the pointer in the image displayed to the user.

Figure 33:
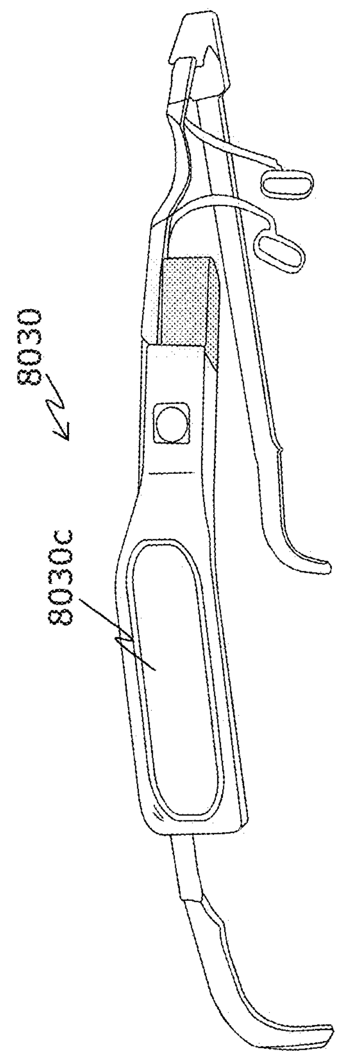
FIG. 33 is a diagram illustrating another example of appearance of a receiver in Embodiment 2.

FIG. 33 is a diagram illustrating another example of appearance of a receiver in this embodiment.

The receiver 8030 includes a touch sensor 8030*c*. The touch sensor 8030*c* is attached to the frame of the receiver 8030. For example, when the user places his or her fingertip on the touch sensor 8030*c* and moves the fingertip, the receiver 8030 moves the pointer in the image displayed to the user, according to the movement of the fingertip. When the user presses the touch sensor 8030*c*, the receiver 8030 selects the object pointed by the pointer in the image displayed to the user. The touch sensor 8030*c* is thus realized as a clickable touch sensor.

Figure 34:
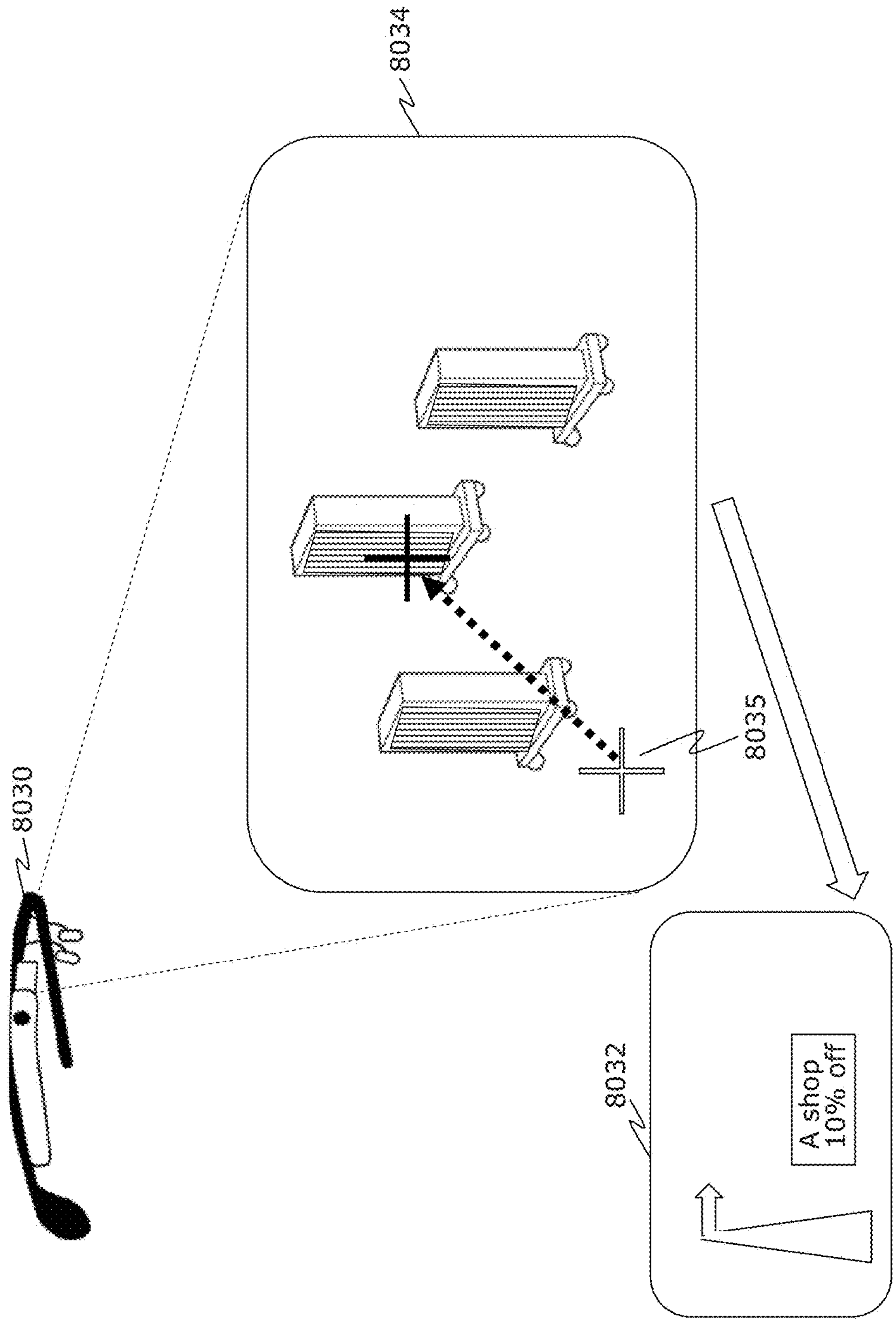
FIG. 34 is a diagram illustrating another example of operation of a receiver in Embodiment 2.

FIG. 34 is a diagram illustrating another example of operation of a receiver in this embodiment.

The receiver 8030 displays the synthetic image 8034 in the same way as above, and also displays a pointer 8035 in the synthetic image 8034. In the case where the receiver 8030 includes the first touch sensor 8030*a* and the second touch sensor 8030*b*, the user places his or her fingertip on the first touch sensor 8030*a* and moves the fingertip, to move the pointer to the object as the bright line pattern. The user then touches the second touch sensor 8030*b*, to cause the receiver 8030 to select the bright line pattern. Having selected the bright line pattern, the receiver 8030 displays the information notification image 8032 based on the signal transmitted from the part corresponding to the bright line pattern.

In the case where the receiver 8030 includes the touch sensor 8030*c*, the user places his or her fingertip on the touch sensor 8030*c* and moves the fingertip, to move the pointer to the object as the bright line pattern. The user then presses the touch sensor 8030*c*, to cause the receiver 8030 to select the bright line pattern. Having selected the bright line pattern, the receiver 8030 displays the information notification image 8032 based on the signal transmitted from the part corresponding to the bright line pattern.

Figure 35A:
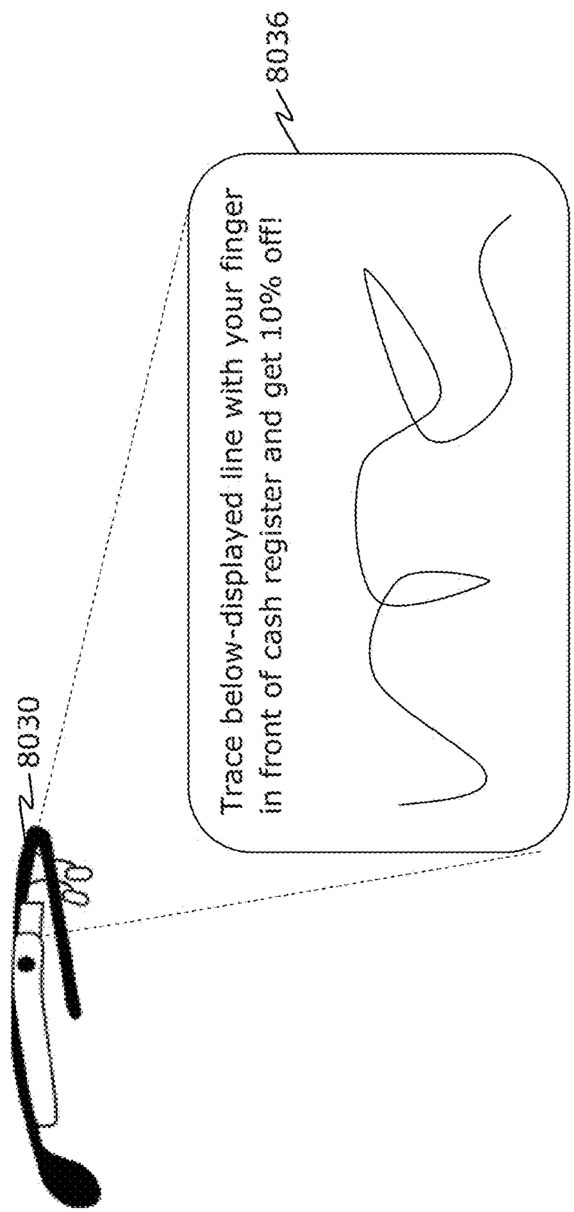
FIG. 35A is a diagram illustrating another example of operation of a receiver in Embodiment 2.

FIG. 35A is a diagram illustrating another example of operation of a receiver in this embodiment.

The receiver 8030 displays a gesture confirmation image 8036 based on a signal obtained by visible light communication. The gesture confirmation image 8036 prompts the user to make a predetermined gesture, to provide a service to the user as an example.

Figure 35B:
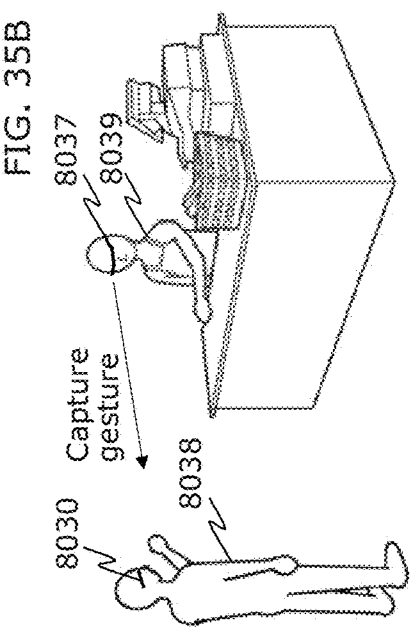
FIG. 35B is a diagram illustrating an example of application using a receiver in Embodiment 2.

FIG. 35B is a diagram illustrating an example of application using a receiver in this embodiment.

A user 8038 carrying the receiver 8030 is in a shop or the like. Here, the receiver 8030 displays the above-mentioned gesture confirmation image 8036 to the user 8038. The user 8038 makes the predetermined gesture according to the gesture confirmation image 8036. A staff 8039 in the shop carries a receiver 8037. The receiver 8037 is a head-mounted display including a camera, and may have the same structure as the receiver 8030. The receiver 8037 displays the gesture confirmation image 8036 based on a signal obtained by visible light communication, too. The staff 8039 determines whether or not the predetermined gesture indicated by the displayed gesture confirmation image 8036 and the gesture made by the user 8038 match. In the case of determining that the predetermined gesture and the gesture made by the user 8038 match, the staff 8039 provides the service associated with the gesture confirmation image 8036, to the user 8038.

Figure 36A:
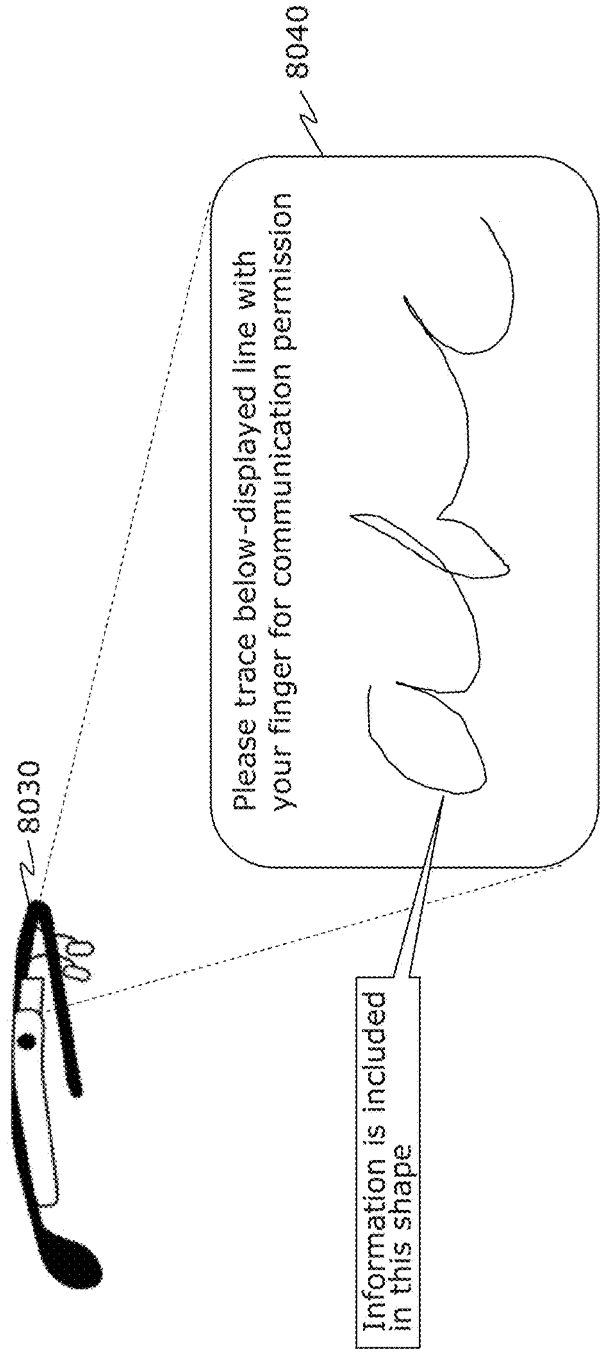
FIG. 36A is a diagram illustrating another example of operation of a receiver in Embodiment 2.

FIG. 36A is a diagram illustrating another example of operation of a receiver in this embodiment.

The receiver 8030 displays a gesture confirmation image 8040 based on a signal obtained by visible light communication. The gesture confirmation image 8040 prompts the user to make a predetermined gesture, to permit wireless communication as an example.

Figure 36B:
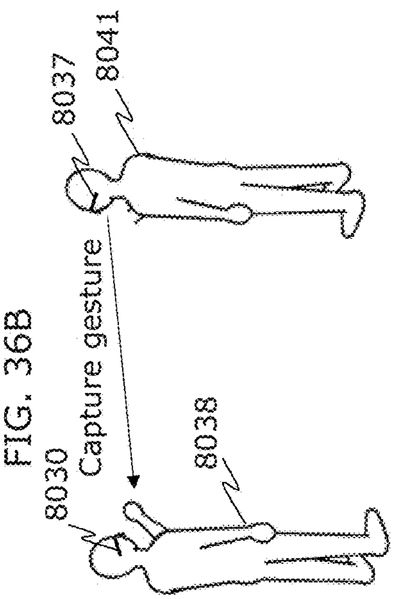
FIG. 36B is a diagram illustrating an example of application using a receiver in Embodiment 2.

FIG. 36B is a diagram illustrating an example of application using a receiver in this embodiment.

The user 8038 carries the receiver 8030. Here, the receiver 8030 displays the above-mentioned gesture confirmation image 8040 to the user 8038. The user 8038 makes the predetermined gesture according to the gesture confirmation image 8040. A person around the user 8038 carries the receiver 8037. The receiver 8037 is a head-mounted display including a camera, and may have the same structure as the receiver 8030. The receiver 8037 captures the predetermined gesture made by the user 8038, to obtain authentication information such as a password included in the gesture. In the case where the receiver 8037 determines that the authentication information matches predetermined information, the receiver 8037 establishes wireless connection with the receiver 8030. Subsequently, the receivers 8030 and 8037 can wirelessly communicate with each other.

Figure 37A:
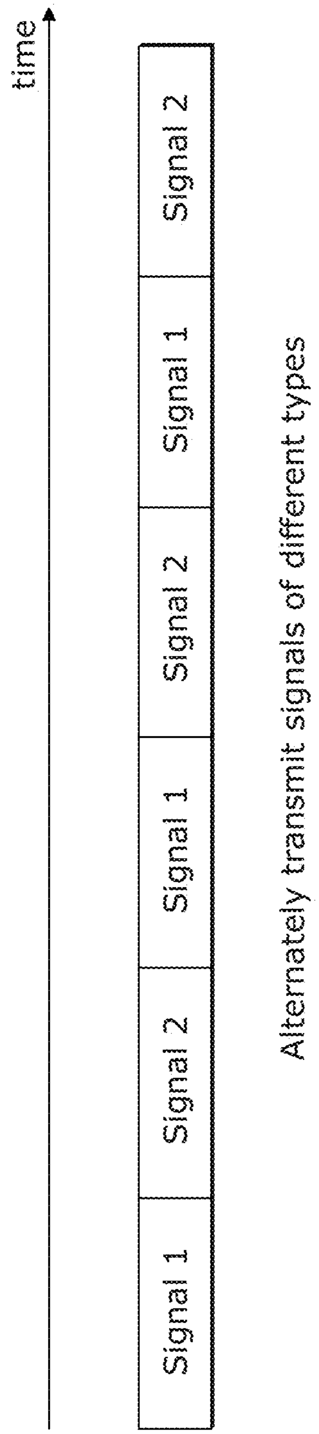
FIG. 37A is a diagram illustrating an example of operation of a transmitter in Embodiment 2.

FIG. 37A is a diagram illustrating an example of operation of a transmitter in this embodiment.

The transmitter alternately transmits signals 1 and 2, for example, in a predetermined period. The transmission of the signal 1 and the transmission of the signal 2 are each carried out by way of luminance change such as blinking of visible light. A luminance change pattern for transmitting the signal 1 and a luminance change pattern for transmitting the signal 2 are different from each other.

Figure 37B:
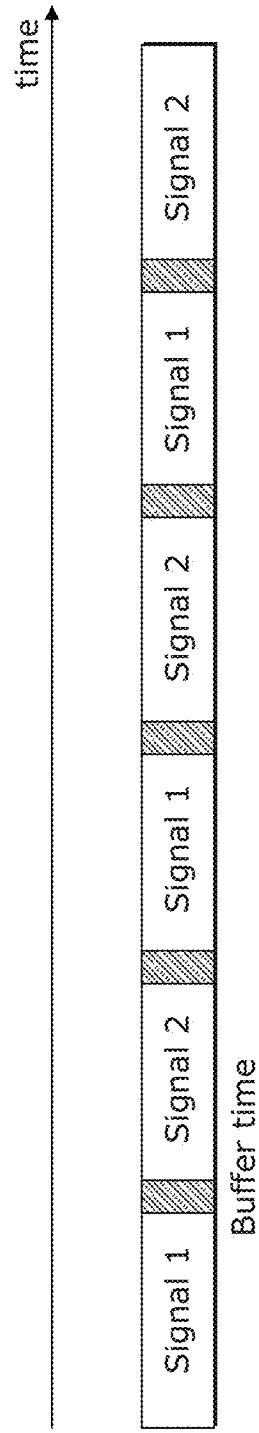
FIG. 37B is a diagram illustrating another example of operation of a transmitter in Embodiment 2.

FIG. 37B is a diagram illustrating another example of operation of a transmitter in this embodiment.

The transmitter may transmit the signals 1 and 2 intermittently with a buffer time, instead of continuously transmitting the signals 1 and 2 as mentioned above. In the buffer time, the transmitter does not change in luminance. Alternatively, in the buffer time, the transmitter may transmit a signal indicating that the transmitter is in the buffer time by way of luminance change, or perform a luminance change different from the luminance change for transmitting the signal 1 or the luminance change for transmitting the signal 2. This enables the receiver to appropriately receive the signals 1 and 2 without interference.

Figure 38:
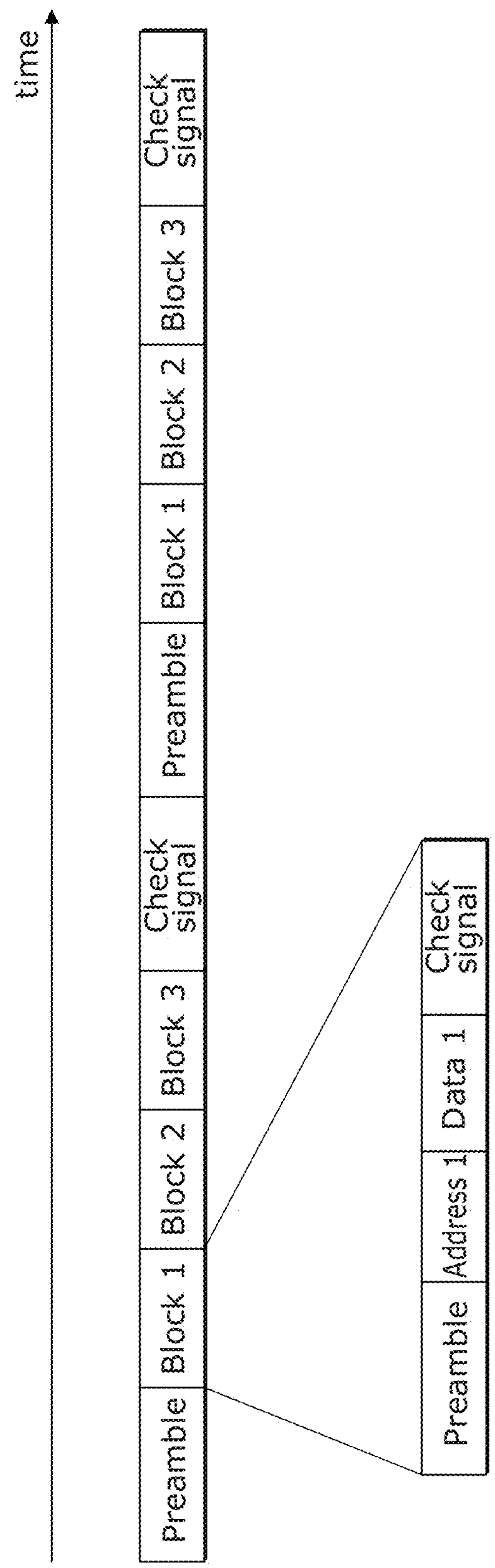
FIG. 38 is a diagram illustrating another example of operation of a transmitter in Embodiment 2.

FIG. 38 is a diagram illustrating another example of operation of a transmitter in this embodiment.

The transmitter repeatedly transmits a signal sequence made up of a preamble, a block 1, a block 2, a block 3, and a check signal, by way of luminance change. The block 1 includes a preamble, an address 1, data 1, and a check signal. The blocks 2 and 3 each have the same structure as the block 1. Specific information is obtained by using data included in the blocks 1, 2, and 3.

In detail, in the above-mentioned signal sequence, one set of data or information is stored in a state of being divided into three blocks. Accordingly, even when a receiver that needs a blanking period for imaging cannot receive all data of the blocks 1, 2, and 3 from one signal sequence, the receiver can receive the remaining data from another signal sequence. As a result, even a receiver that needs a blanking period can appropriately obtain the specific information from at least one signal sequence.

In the above-mentioned signal sequence, a preamble and a check signal are provided for a set of three blocks. Hence, a receiver capable of receiving light without needing a blanking period, such as a receiver including an illuminance sensor, can receive one signal sequence at one time through the use of the preamble and the check signal provided for the set, thus obtaining the specific information in a short time.

Figure 39:
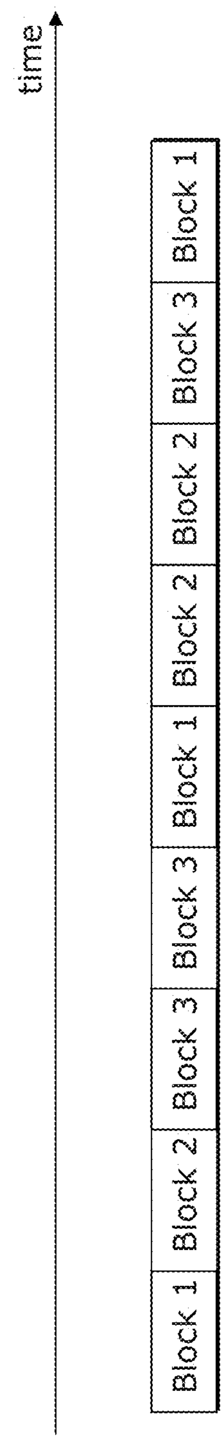
FIG. 39 is a diagram illustrating another example of operation of a transmitter in Embodiment 2.

FIG. 39 is a diagram illustrating another example of operation of a transmitter in this embodiment.

When repeatedly transmitting the signal sequence including the blocks 1, 2, and 3 as described above, the transmitter may change, for each signal sequence, the order of the blocks included in the signal sequence. For example, the blocks 1, 2, and 3 are included in this order in the first signal sequence, and the blocks 3, 1, and 2 are included in this order in the next signal sequence. A receiver that requires a periodic blanking time can therefore avoid obtaining only the same block.

Figure 40:
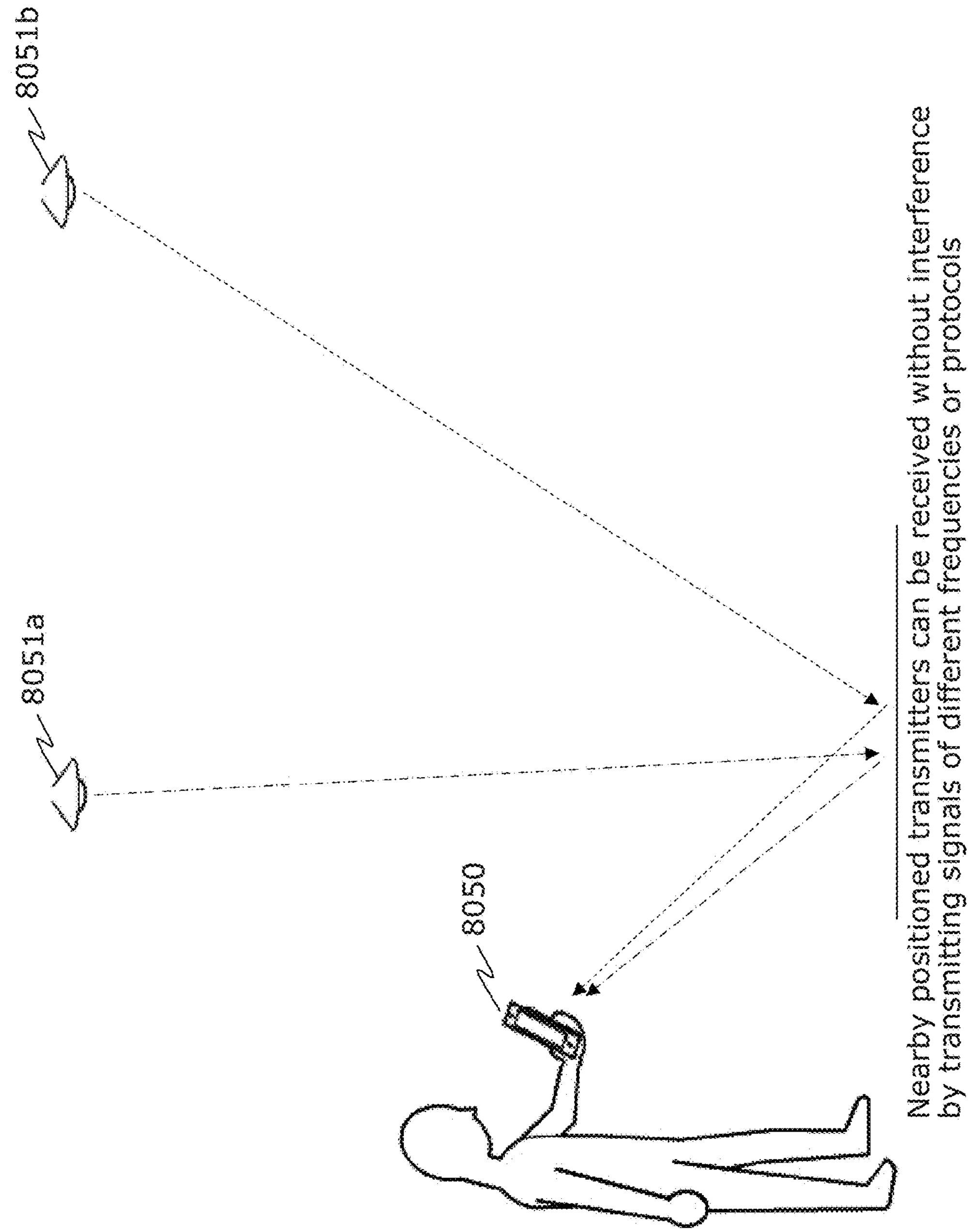
FIG. 40 is a diagram illustrating an example of communication form between a plurality of transmitters and a receiver in Embodiment 2.

FIG. 40 is a diagram illustrating an example of communication form between a plurality of transmitters and a receiver in this embodiment.

A receiver 8050 may receive signals (visible light) transmitted from transmitters 8051*a* and 8051*b* as lightings and reflected by a reflection surface. The receiver 8050 can thus receive signals from many transmitters all together. In this case, the transmitters 8051*a* and 8051*b* transmit signals of different frequencies or protocols. As a result, the receiver 8050 can receive the signals from the transmitters without interference.

Figure 41:
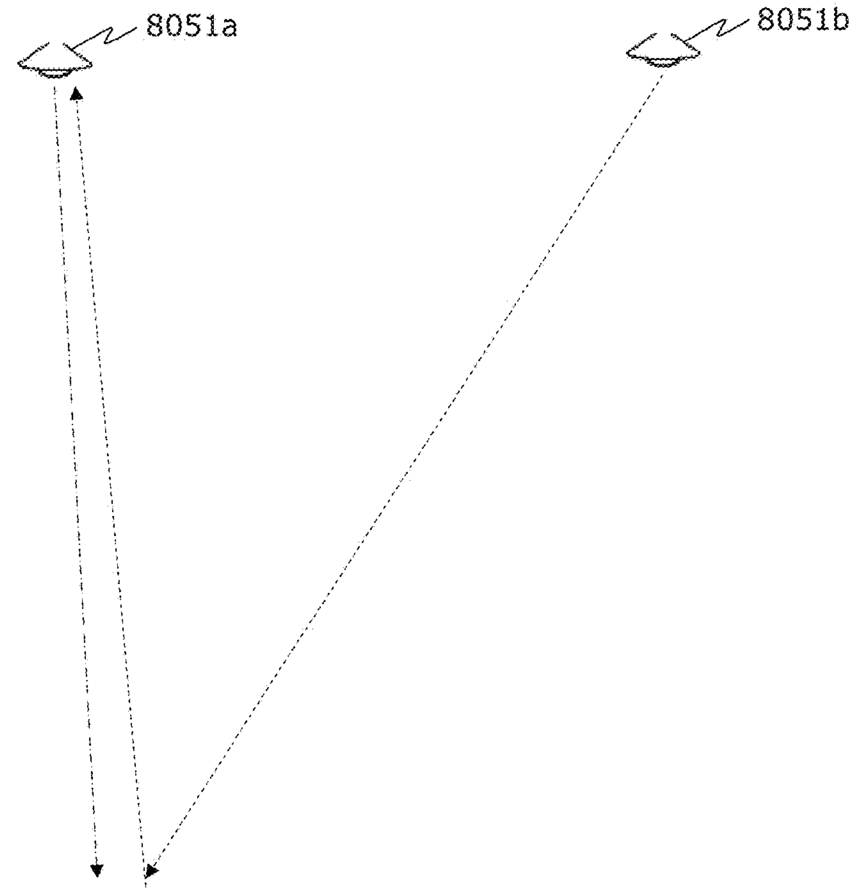
FIG. 41 is a diagram illustrating an example of operation of a plurality of transmitters in Embodiment 2.

FIG. 41 is a diagram illustrating an example of operation of a plurality of transmitters in this embodiment.

One of the transmitters 8051*a* and 8051*b* may monitor the signal transmission state of the other transmitter, and transmit a signal to avoid interference with a signal of the other transmitter. For instance, one transmitter receives a signal transmitted from the other transmitter, and transmits a signal of a protocol different from the received signal. Alternatively, one transmitter detects a time period during which no signal is transmitted from the other transmitter, and transmits a signal during the time period.

Figure 42:
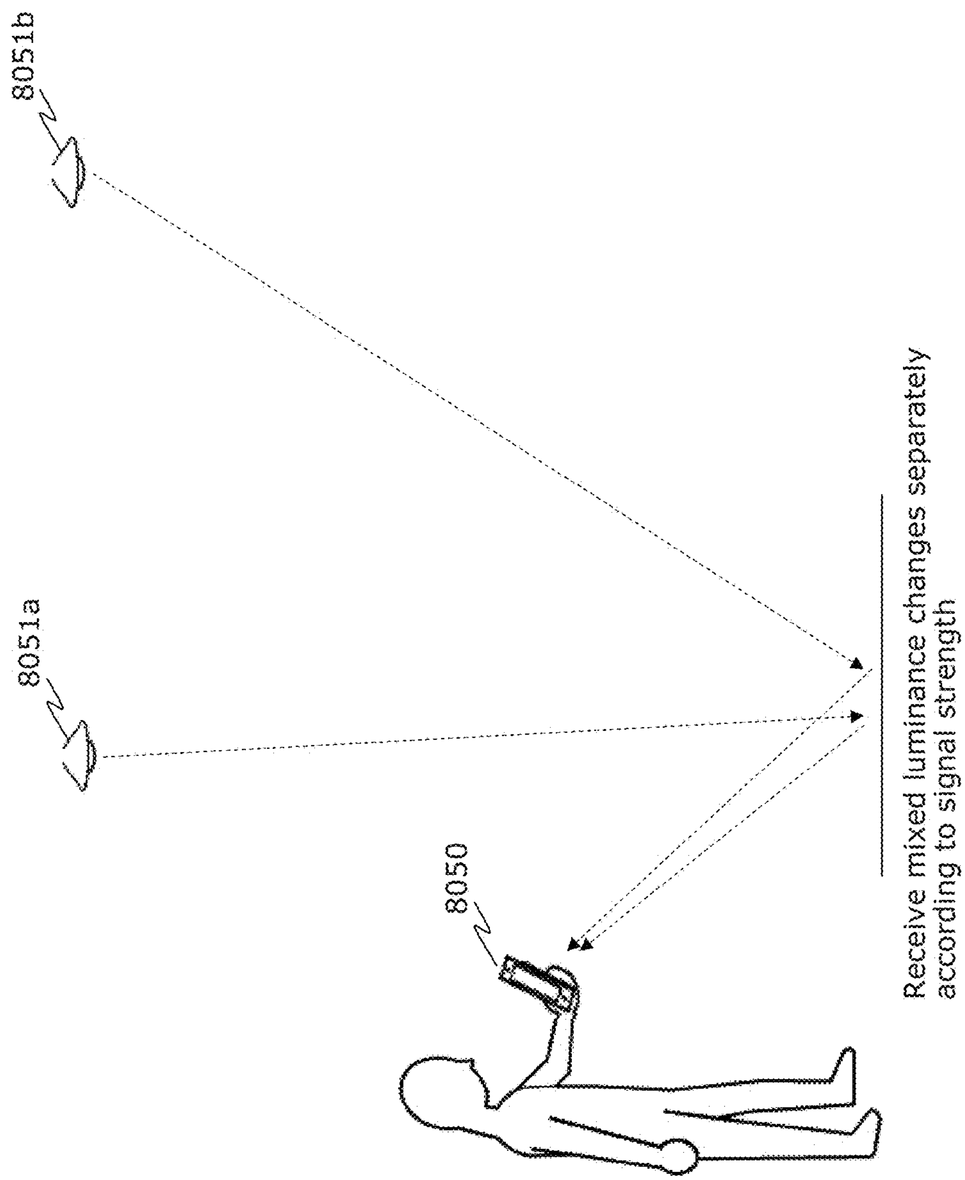
FIG. 42 is a diagram illustrating another example of communication form between a plurality of transmitters and a receiver in Embodiment 2.

FIG. 42 is a diagram illustrating another example of communication form between a plurality of transmitters and a receiver in this embodiment.

The transmitters 8051*a* and 8051*b* may transmit signals of the same frequency or protocol. In this case, the receiver 8050 specifies the strength of the signal transmitted from each of the transmitters, i.e., the edge strength of the bright line included in the captured image. The strength is lower when the distance between the receiver 8050 and the transmitter is longer. In the case where the distance between the receiver 8050 and the transmitter 8051*a* and the distance between the receiver 8050 and the transmitter 8051*b* are different from each other, the difference in distance can be exploited in this way. Thus, the receiver 8050 can separately receive the signals transmitted from the transmitters 8051*a* and 8051*b* appropriately, according to the specified strengths.

Figure 43:
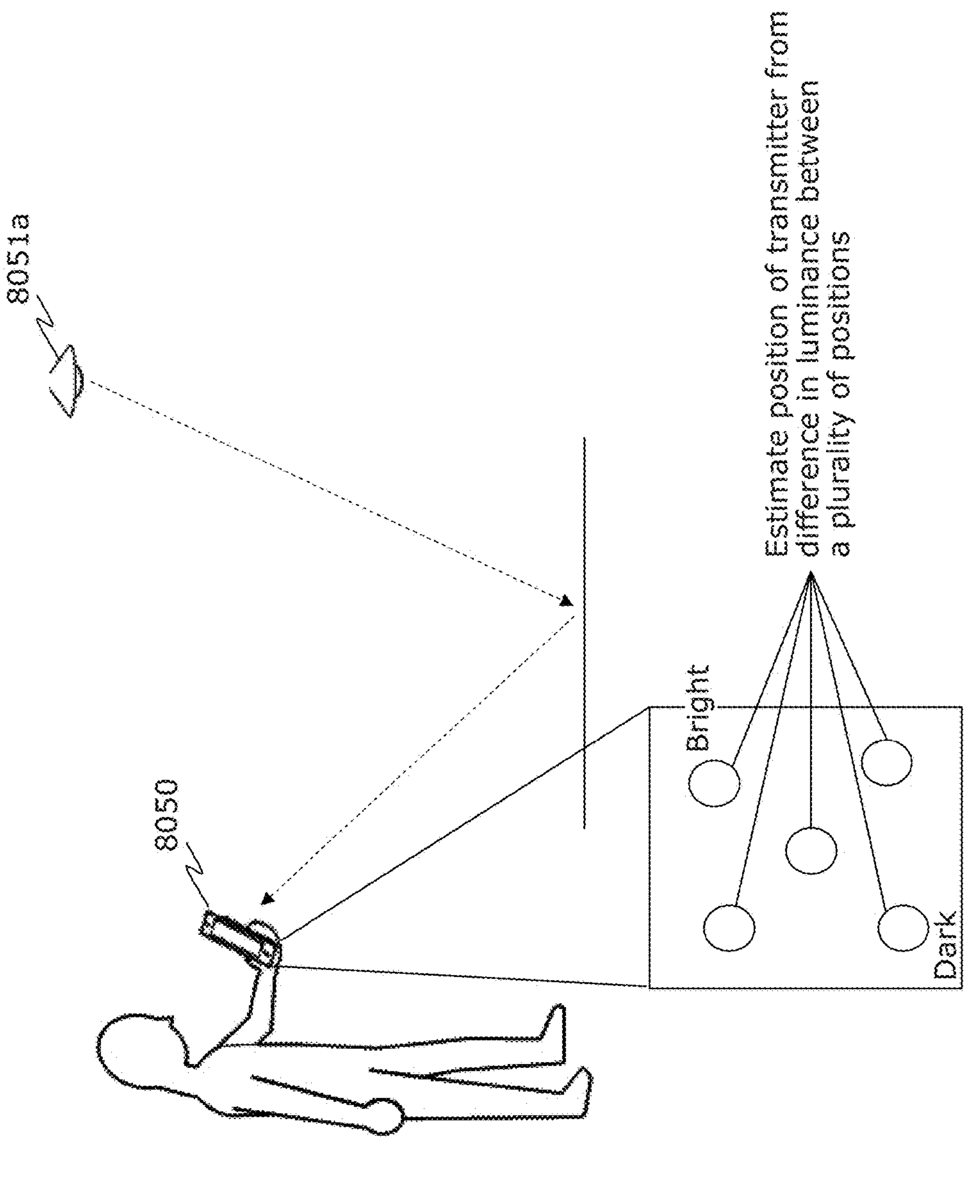
FIG. 43 is a diagram illustrating another example of operation of a receiver in Embodiment 2.

FIG. 43 is a diagram illustrating another example of operation of a receiver in this embodiment.

The receiver 8050 receives a signal transmitted from the transmitter 8051*a* and reflected by a reflection surface. Here, the receiver 8050 may estimate the position of the transmitter 8051*a*, based on the strength distribution of luminance (the difference in luminance between a plurality of positions) in the captured image.

Figure 44:
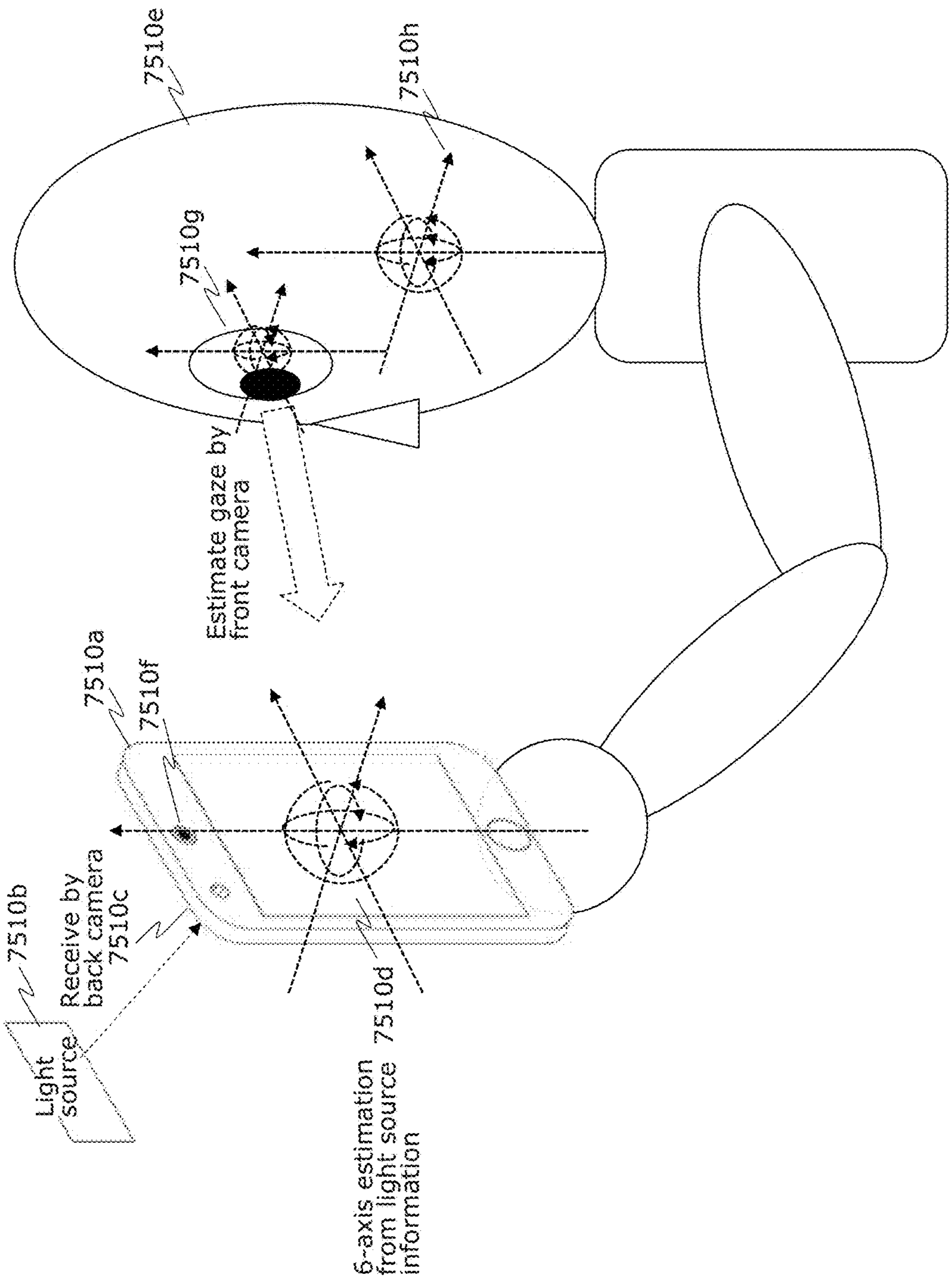
FIG. 44 is a diagram illustrating an example of application of a receiver in Embodiment 2.

FIG. 44 is a diagram illustrating an example of application of a receiver in this embodiment.

A receiver 7510*a* such as a smartphone captures a light source 7510*b* by a back camera (out camera) 7510*c* to receive a signal transmitted from the light source 7510*b*, and obtains the position and direction of the light source 7510*b* from the received signal. The receiver 7510*a* estimates the position and direction of the receiver 7510*a*, from the state of the light source 7510*b* in the captured image and the sensor value of the 9-axis sensor included in the receiver 7510*a*. The receiver 7510*a* captures a user 7510*e* by a front camera (face camera, in camera) 7510*f*, and estimates the position and direction of the head and the gaze direction (the position and direction of the eye) of the user 7510*e* by image processing. The receiver 7510*a* transmits the estimation result to the server. The receiver 7510*a* changes the behavior (display content or playback sound) according to the gaze direction of the user 7510*e*. The imaging by the back camera 7510*c* and the imaging by the front camera 7510*f* may be performed simultaneously or alternately.

Figure 45:
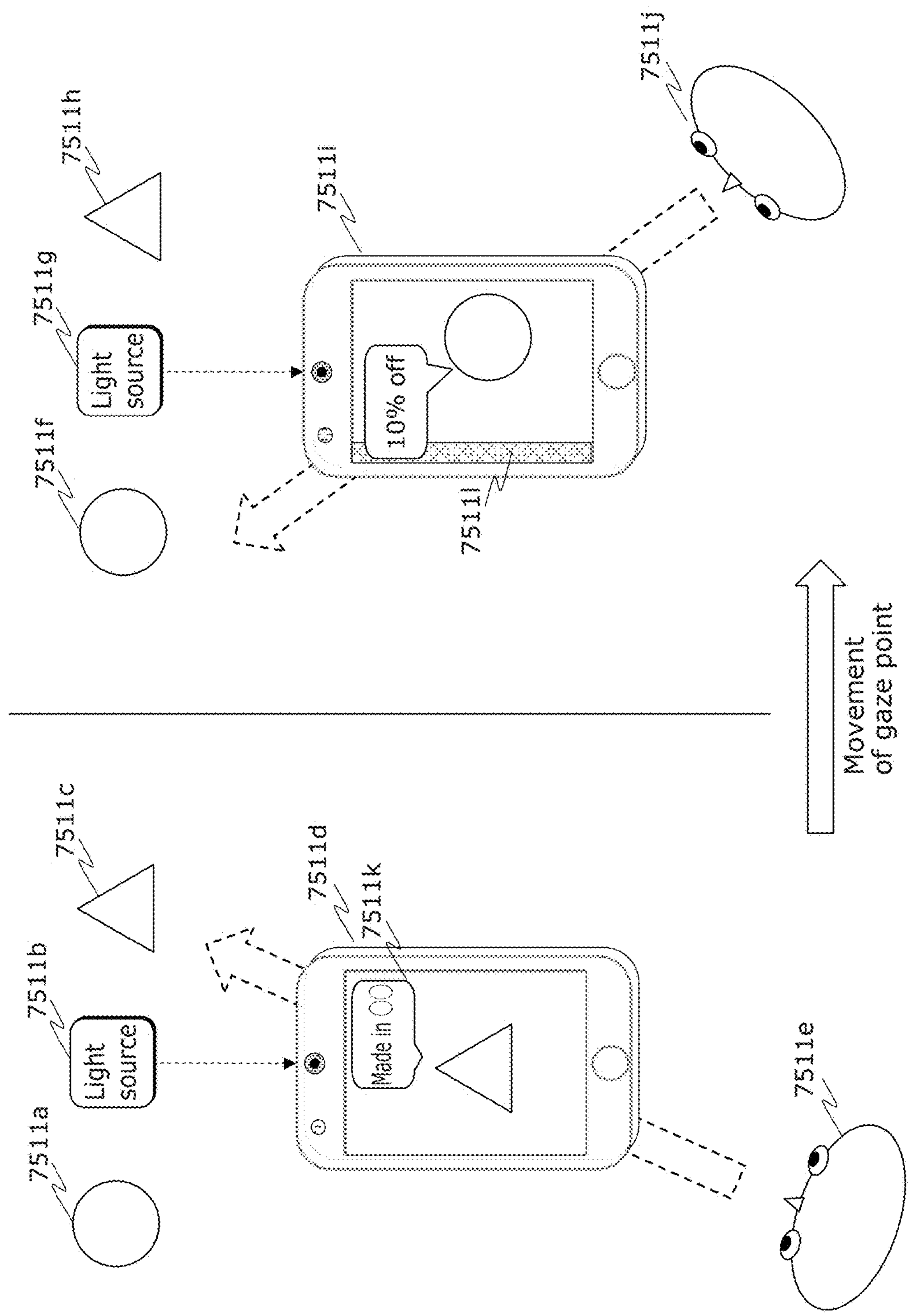
FIG. 45 is a diagram illustrating an example of application of a receiver in Embodiment 2.

FIG. 45 is a diagram illustrating an example of application of a receiver in this embodiment.

Receivers 7511*d* and 7511*i* such as smartphones respectively receive signals from light sources 7511*b* and 7511*g*, estimate the positions and directions of the receivers 7511*d* and 7511*i*, and estimate the gaze directions of users 7511*e* and 7511*i*, as in the above-mentioned way. The receivers 7511*d* and 7511*i* respectively obtain information of surrounding objects 7511*a* to 7511*c* and 7511*f* to 7511*h* from a server, based on the received data. The receivers 7511*d* and 7511*i* change their display contents as if the users can see the objects on the opposite side through the receivers 7511*d* and 7511*i*. The receivers 7511*d* and 7511*i* display an AR (Augmented Reality) object such as 7511*k*, according to the display contents. When the gaze of the user 7511*j* exceeds the imaging range of the camera, the receiver 7511*i* displays that the range is exceeded, as in 7511*l*. As an alternative, the receiver 7511*i* displays an AR object or other information in the area outside the range. As another alternative, the receiver 7511*i* displays a previously captured image in the area outside the range in a state of being connected to the current image.

Figure 46:
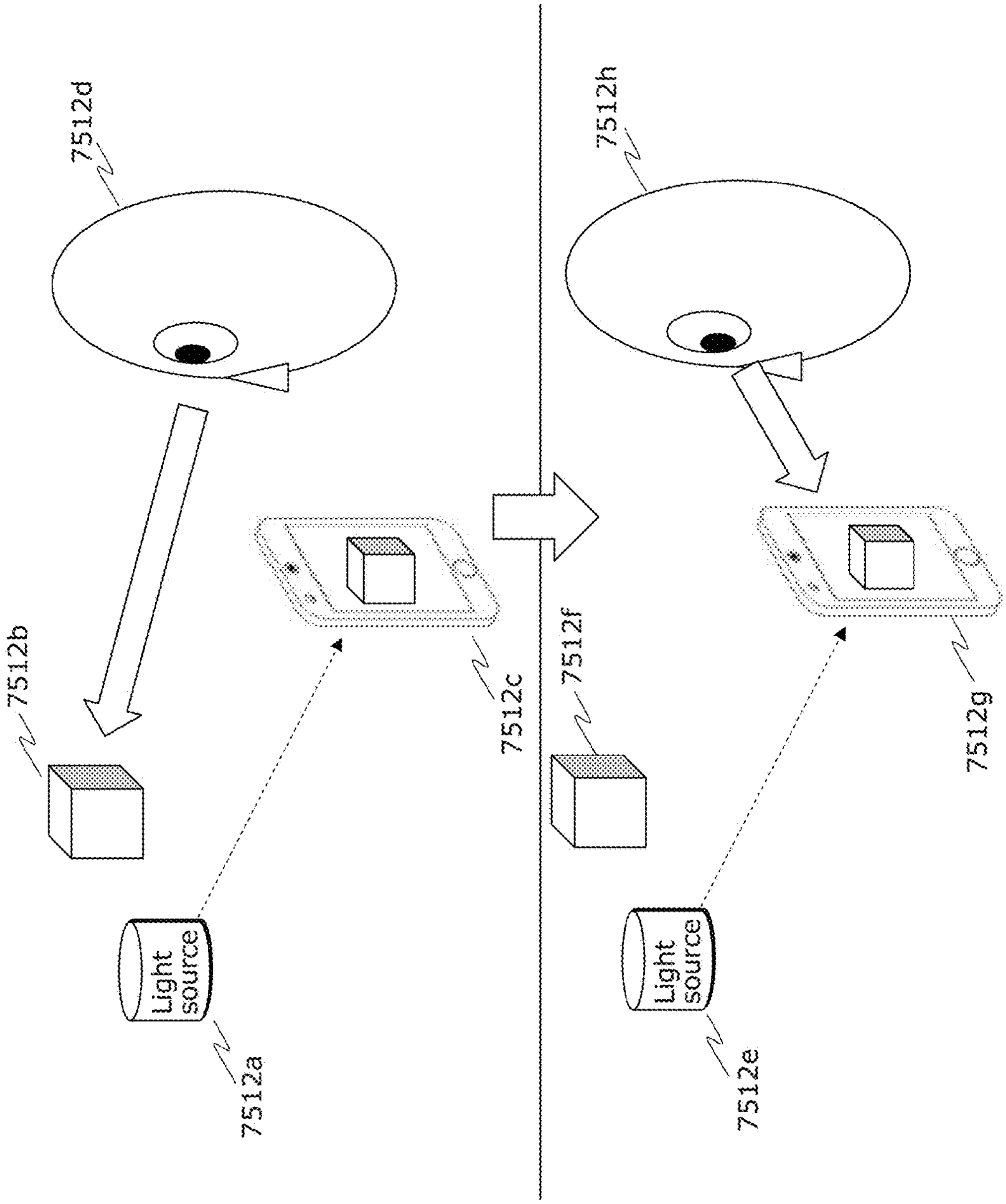
FIG. 46 is a diagram illustrating an example of application of a receiver in Embodiment 2.

FIG. 46 is a diagram illustrating an example of application of a receiver in this embodiment.

A receiver 7512*c* such as a smartphone receives a signal from a light source 7512*a*, estimates the position and direction of the receiver 7512*c*, and estimates the gaze direction of a user 7512*d*, as in the above-mentioned way. The receiver 7512*c* performs a process relating to an object 7512*b* in the gaze direction of the user 7512*d*. For example, the receiver 7512*c* displays information about the object 7512*b* on the screen. When the gaze direction of a user 7512*h* moves from an object 7512*f* to a receiver 7512*g*, the receiver 7512*g* determines that the user 7512*h* is interested in the object 7512*h*, and continues the process relating to the object 7512*h*. For example, the receiver 7512*g* keeps displaying the information of the object 7512*f* on the screen.

Figure 47:
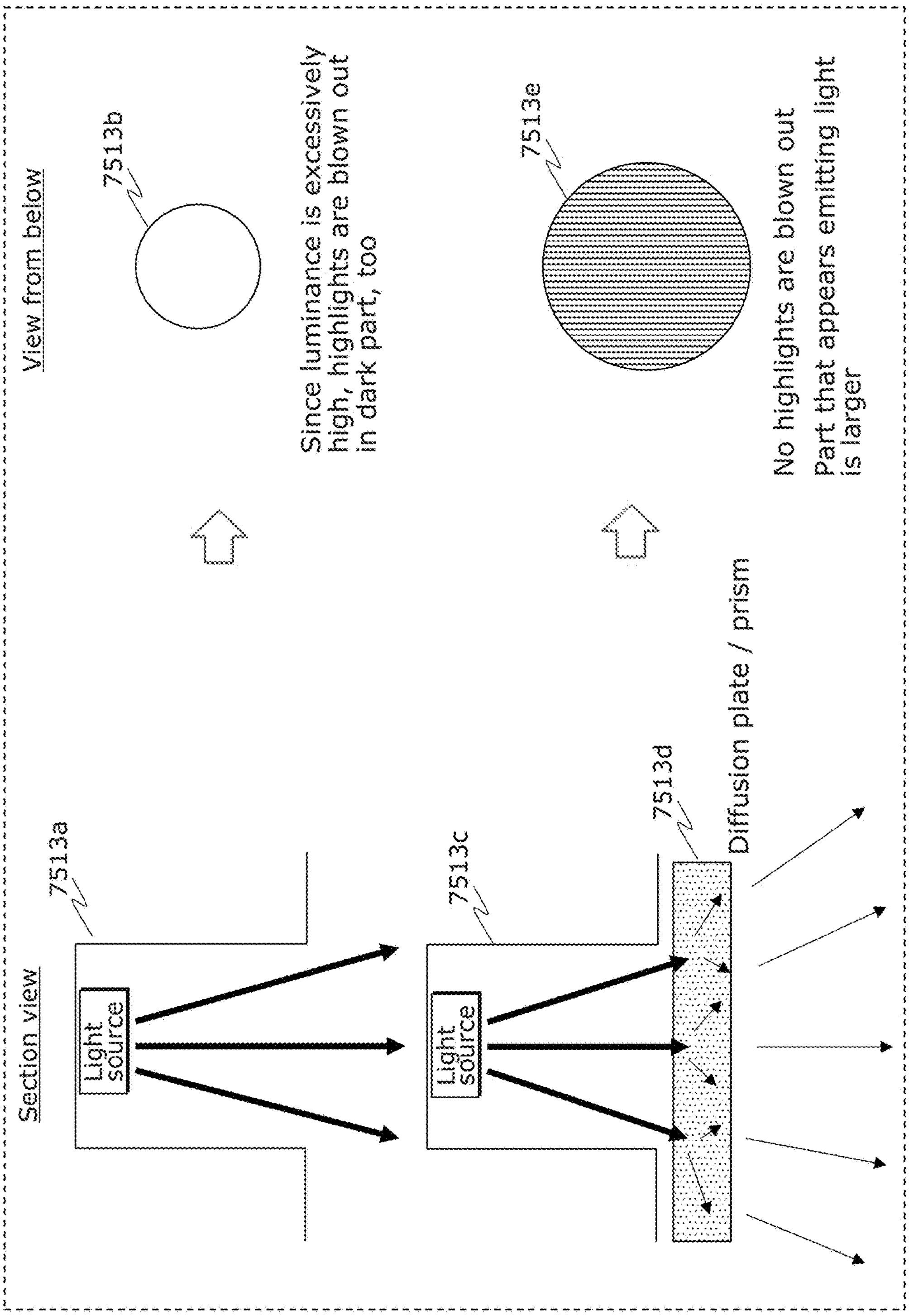
FIG. 47 is a diagram illustrating an example of application of a transmitter in Embodiment 2.

FIG. 47 is a diagram illustrating an example of application of a transmitter in this embodiment.

A transmitter 7513*a* such as a lighting is high in luminance. Regardless of whether the luminance is high or low as a transmission signal, the transmitter 7513*a* captured by a receiver exceeds an upper limit of brightness, and as a result no bright line appears as in 7513*b*. Accordingly, a transmitter 7513*c* includes a part 7513*d* such as a diffusion plate or a prism for diffusing or weakening light, to reduce the luminance. As a result, the receiver can capture bright lines as in 7513*e*.

Figure 48:
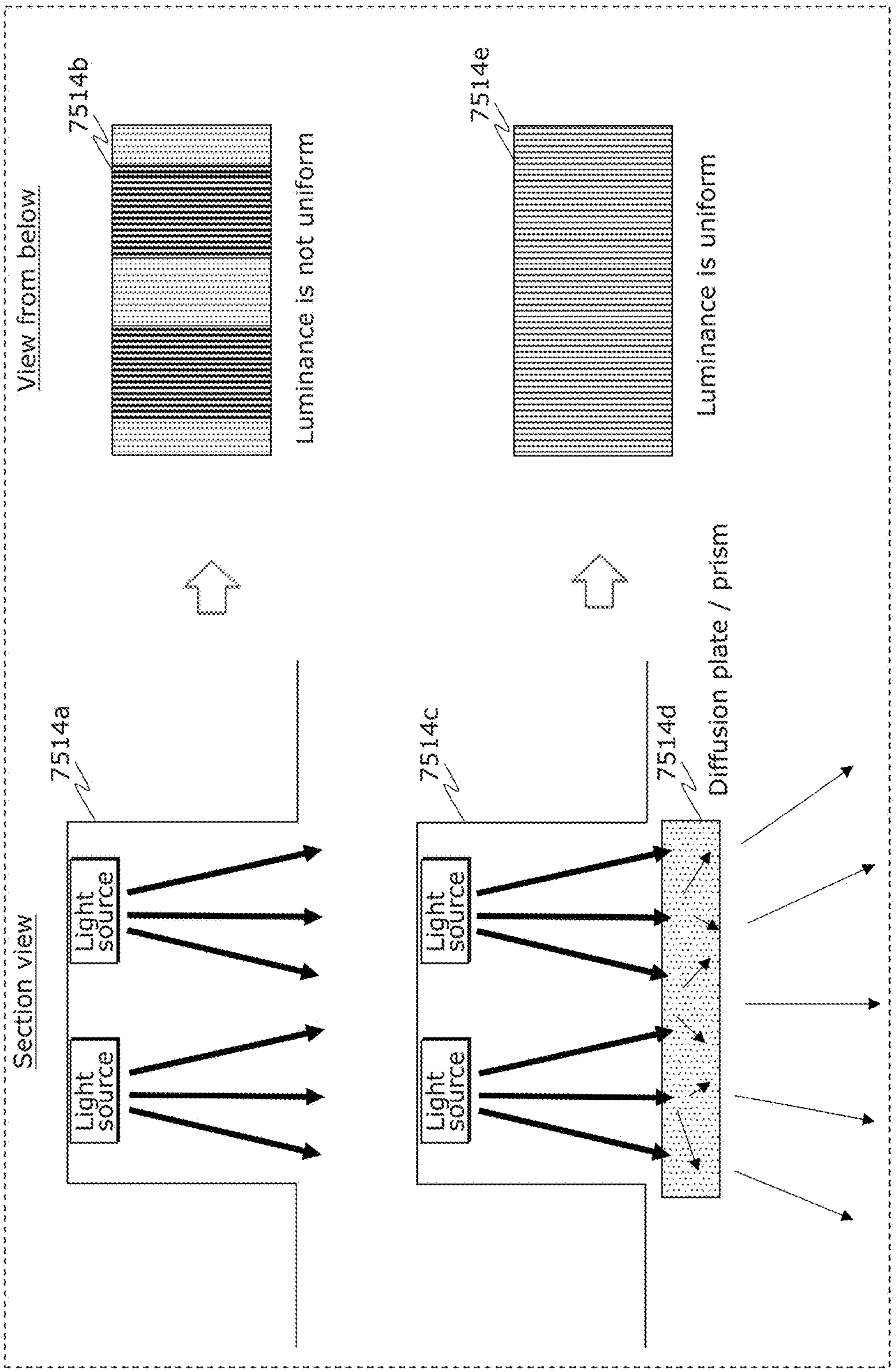
FIG. 48 is a diagram illustrating an example of application of a transmitter in Embodiment 2.

FIG. 48 is a diagram illustrating an example of application of a transmitter in this embodiment.

A transmitter 7514*a* such as a lighting does not have a uniform light source, and so the luminance is not uniform in a captured image 7514*b*, causing a reception error. Accordingly, a transmitter 7514*c* includes a part 7514*d* such as a diffusion plate or a prism for diffusing light, to attain uniform luminance as in 7514*c*. A reception error can be prevented in this way.

Figure 49:
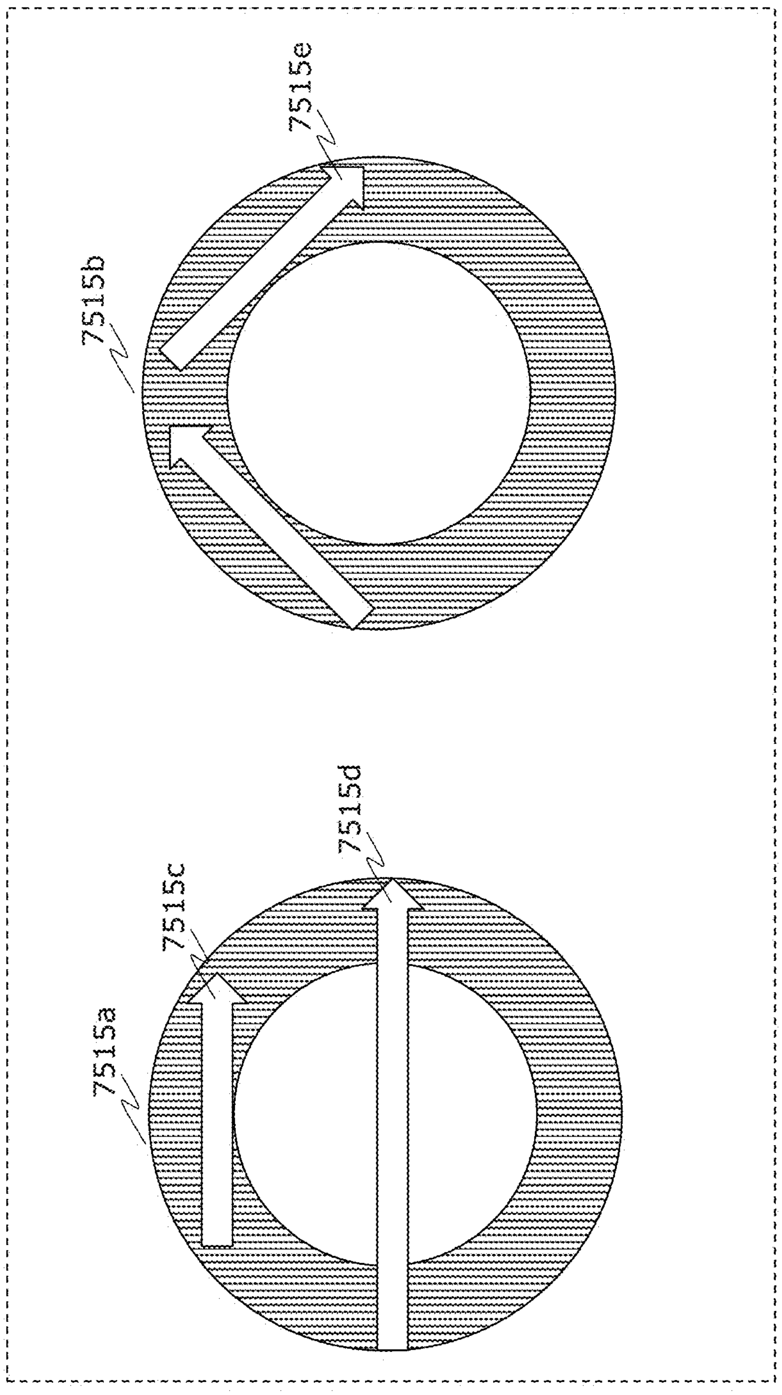
FIG. 49 is a diagram illustrating an example of application of a reception method in Embodiment 2.

FIG. 49 is a diagram illustrating an example of application of a receiver in this embodiment.

Transmitters 7515*a* and 7515*b* are each high in luminance in the center part, so that bright lines appear not in the center part but in the peripheral part in an image captured by a receiver. Since the bright lines are discontinuous, the receiver cannot receive a signal from a part 7515*d*, but can receive a signal from a part 7515*c*. By reading bright lines along a path 7515*e*, the receiver can receive a signal from more bright lines than in the part 7515*c*.

Figure 50:
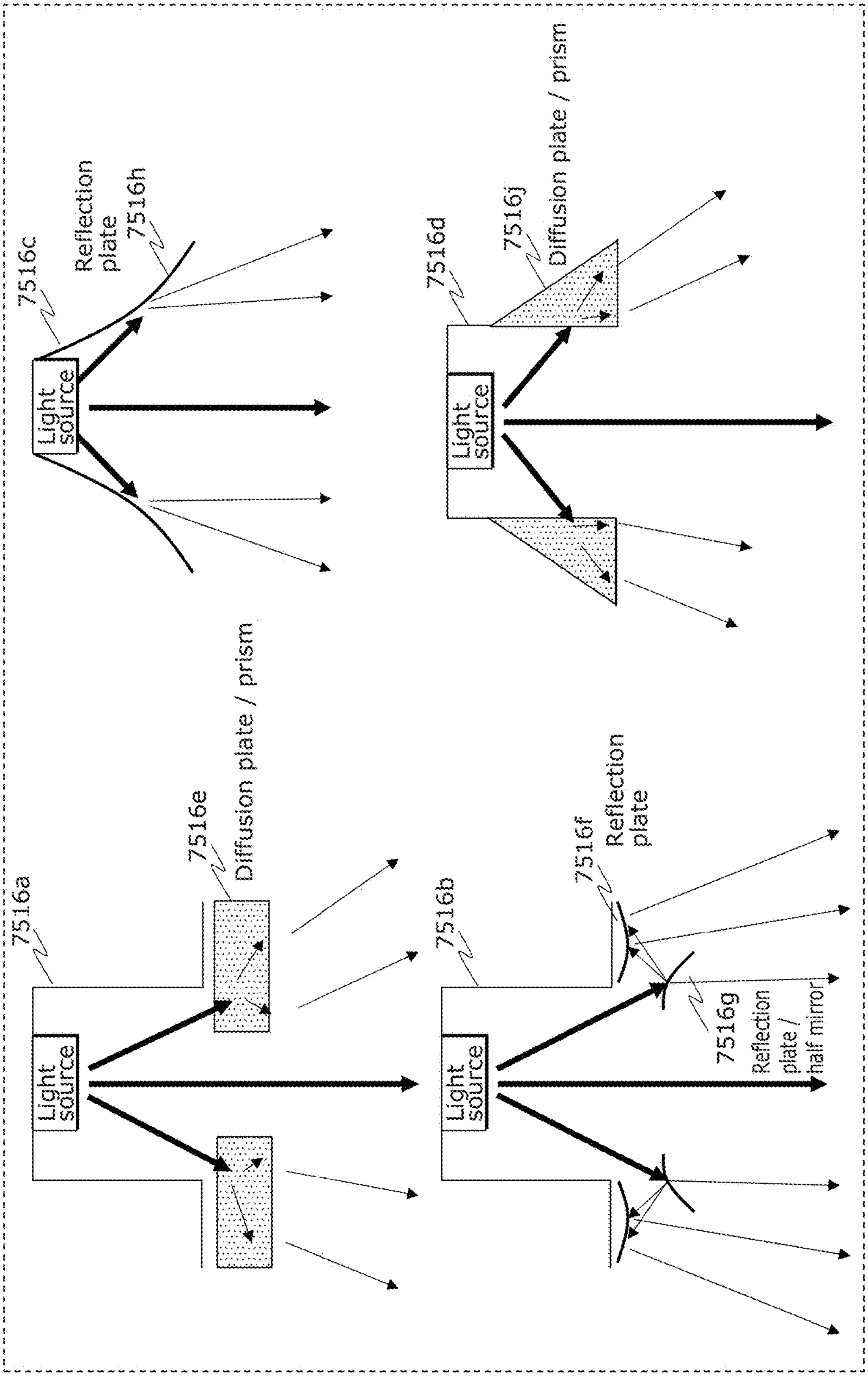
FIG. 50 is a diagram illustrating an example of application of a transmitter in Embodiment 2.

FIG. 50 is a diagram illustrating an example of application of a transmitter in this embodiment.

Transmitters 7516*a*, 7516*b*, 7516*c*, and 7516*d* such as lightings are high in luminance like 7513*a*, and bright lines tend not to appear when captured by a receiver. Accordingly, a diffusion plate/prism 7516*e*, a reflection plate 7516*f*, a reflection plate/half mirror 7516*g*, a reflection plate 7516*h*, or a diffusion plate/prism 7516*j* is included to diffuse light, with it being possible to widen the part where bright lines appear. These transmitters are each captured with bright lines appearing in the periphery, like 7515*a*. Since the receiver estimates the distance between the receiver and the transmitter using the size of the transmitter in the captured image, the part where light is diffused is set as the size of the light source and stored in a server or the like in association with the transmission ID, as a result of which the receiver can accurately estimate the distance to the transmitter.

Figure 51:
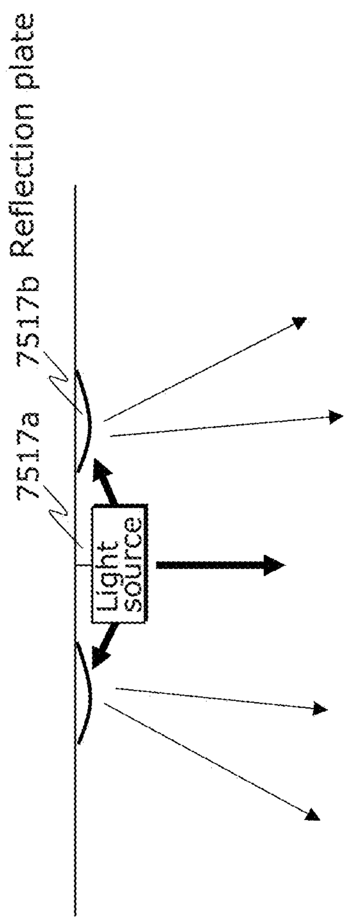
FIG. 51 is a diagram illustrating an example of application of a transmitter in Embodiment 2.

FIG. 51 is a diagram illustrating an example of application of a transmitter in this embodiment.

A transmitter 7517*a* such as a lighting is high in luminance like 7513*a*, and bright lines tend not to appear when captured by a receiver. Accordingly, a reflection plate 7517*b* is included to diffuse light, with it being possible to widen the part where bright lines appear.

Figure 52:
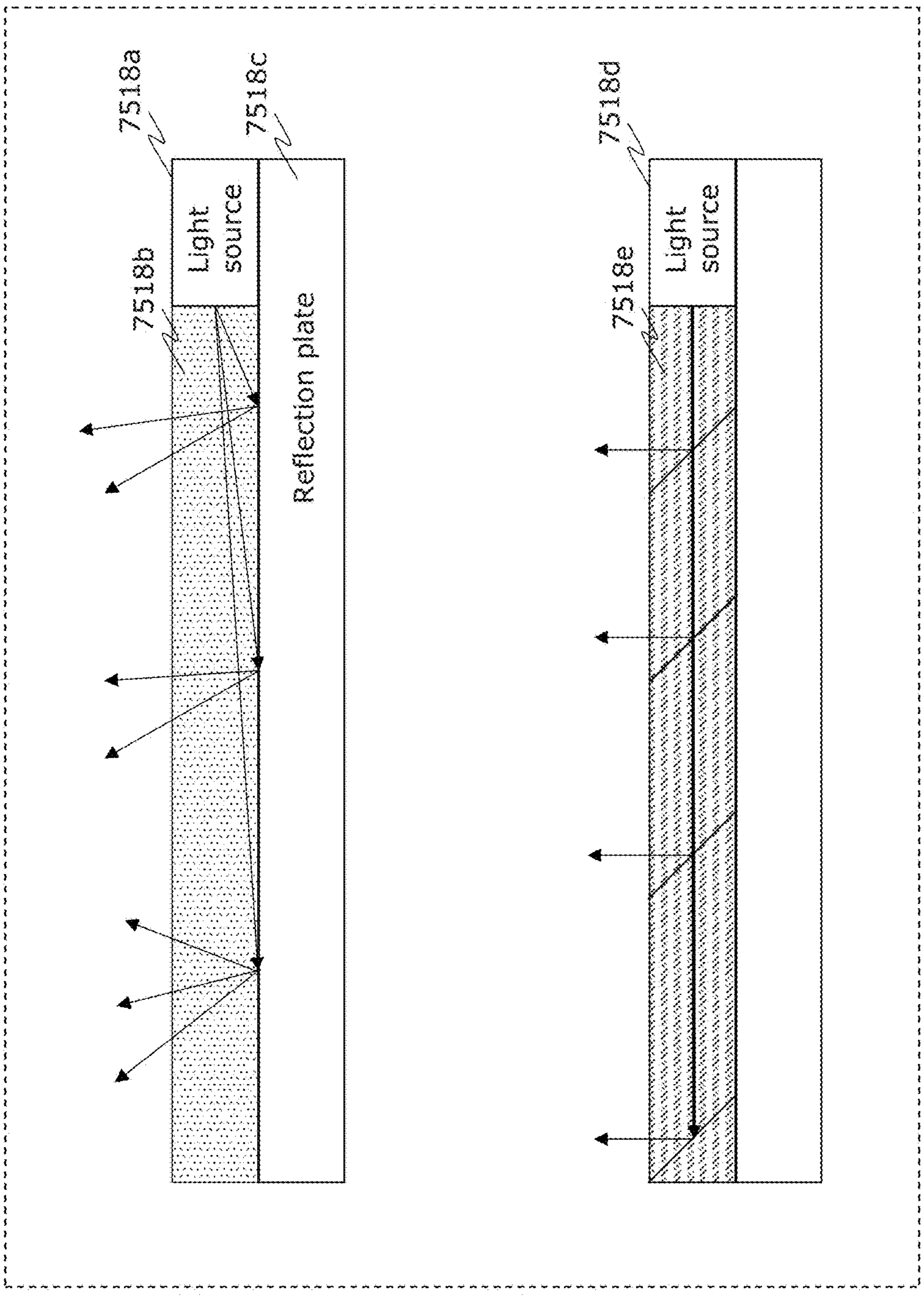
FIG. 52 is a diagram illustrating an example of application of a transmitter in Embodiment 2.

FIG. 52 is a diagram illustrating an example of application of a transmitter in this embodiment.

A transmitter 7518*a* reflects light from a light source by a reflection plate 7518*c*, as a result of which a receiver can capture bright lines in a wide range. A transmitter 7518*d* directs a light source toward a diffusion plate or prism 7518*e*, as a result of which a receiver can capture bright lines in a wide range.

Figure 53:
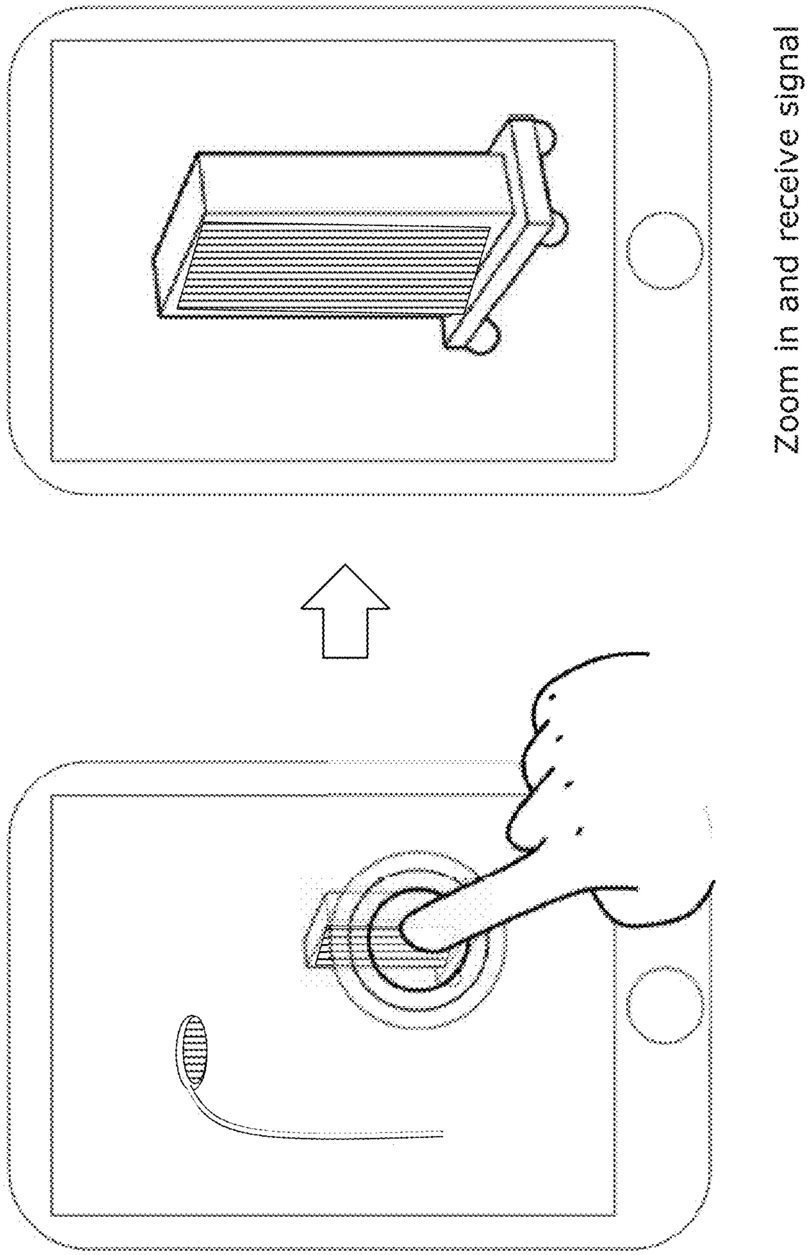
FIG. 53 is a diagram illustrating another example of operation of a receiver in Embodiment 2.

FIG. 53 is a diagram illustrating another example of operation of a receiver in this embodiment.

A receiver displays a bright line pattern using the above-mentioned synthetic image, intermediate image, or the like. Here, the receiver may be incapable of receiving a signal from a transmitter corresponding to the bright line pattern. When the user performs an operation (e.g., a tap) on the bright line pattern to select the bright line pattern, the receiver displays the synthetic image or intermediate image in which the bright line pattern is enlarged by optical zoom. Through such optical zoom, the receiver can appropriately receive the signal from the transmitter corresponding to the bright line pattern. That is, even when the captured image is too small to obtain the signal, the signal can be appropriately received by performing optical zoom. In the case where the displayed image is large enough to obtain the signal, too, faster reception is possible by optical zoom.

Summary of this Embodiment

An information communication method in this embodiment is an information communication method of obtaining information from a subject, the information communication method including: setting an exposure time of an image sensor so that, in an image obtained by capturing the subject by the image sensor, a bright line corresponding to an exposure line included in the image sensor appears according to a change in luminance of the subject; obtaining a bright line image by capturing the subject that changes in luminance by the image sensor with the set exposure time, the bright line image being an image including the bright line; displaying, based on the bright line image, a display image in which the subject and surroundings of the subject are shown, in a form that enables identification of a spatial position of a part where the bright line appears; and obtaining transmission information by demodulating data specified by a pattern of the bright line included in the obtained bright line image.

In this way, a synthetic image or an intermediate image illustrated in, for instance, FIGS. 7 to 9 and 13 is displayed as the display image. In the display image in which the subject and the surroundings of the subject are shown, the spatial position of the part where the bright line appears is identified by a bright line pattern, a signal specification object, a signal identification object, a dotted frame, or the like. By looking at such a display image, the user can easily find the subject that is transmitting the signal through the change in luminance.

For example, the information communication method may further include: setting a longer exposure time than the exposure time; obtaining a normal captured image by capturing the subject and the surroundings of the subject by the image sensor with the longer exposure time; and generating a synthetic image by specifying, based on the bright line image, the part where the bright line appears in the normal captured image, and superimposing a signal object on the normal captured image, the signal object being an image indicating the part, wherein in the displaying, the synthetic image is displayed as the display image.

In this way, the signal object is, for example, a bright line pattern, a signal specification object, a signal identification object, a dotted frame, or the like, and the synthetic image is displayed as the display image as illustrated in FIGS. 8, 9, and 13. Hence, the user can more easily find the subject that is transmitting the signal through the change in luminance.

For example, in the setting of an exposure time, the exposure time may be set to 1/3000 second, in the obtaining of a bright line image, the bright line image in which the surroundings of the subject are shown may be obtained, and in the displaying, the bright line image may be displayed as the display image.

In this way, the bright line image is obtained and displayed as an intermediate image, for instance as illustrated in FIG. 7. This eliminates the need for a process of obtaining a normal captured image and a visible light communication image and synthesizing them, thus contributing to a simpler process.

For example, the image sensor may include a first image sensor and a second image sensor, in the obtaining of the normal captured image, the normal captured image may be obtained by image capture by the first image sensor, and in the obtaining of a bright line image, the bright line image may be obtained by image capture by the second image sensor simultaneously with the first image sensor.

In this way, the normal captured image and the visible light communication image which is the bright line image are obtained by the respective cameras, for instance as illustrated in FIG. 9. As compared with the case of obtaining the normal captured image and the visible light communication image by one camera, the images can be obtained promptly, contributing to a faster process.

For example, the information communication method may further include presenting, in the case where the part where the bright line appears is designated in the display image by an operation by a user, presentation information based on the transmission information obtained from the pattern of the bright line in the designated part. Examples of the operation by the user include: a tap; a swipe; an operation of continuously placing the user's fingertip on the part for a predetermined time or more; an operation of continuously directing the user's gaze to the part for a predetermined time or more; an operation of moving a part of the user's body according to an arrow displayed in association with the part; an operation of placing a pen tip that changes in luminance on the part; and an operation of pointing to the part with a pointer displayed in the display image by touching a touch sensor.

In this way, the presentation information is displayed as an information notification image, for instance as illustrated in FIGS. 15 to 20 and 25 to 34. Desired information can thus be presented to the user.

For example, the image sensor may be included in a head-mounted display, and in the displaying, the display image may be displayed by a projector included in the head-mounted display.

In this way, the information can be easily presented to the user, for instance as illustrated in FIGS. 23 to 30.

For example, an information communication method of obtaining information from a subject may include: setting an exposure time of an image sensor so that, in an image obtained by capturing the subject by the image sensor, a bright line corresponding to an exposure line included in the image sensor appears according to a change in luminance of the subject; obtaining a bright line image by capturing the subject that changes in luminance by the image sensor with the set exposure time, the bright line image being an image including the bright line; and obtaining the information by demodulating data specified by a pattern of the bright line included in the obtained bright line image, wherein in the obtaining of a bright line image, the bright line image including a plurality of parts where the bright line appears is obtained by capturing a plurality of subjects in a period during which the image sensor is being moved, and in the obtaining of the information, a position of each of the plurality of subjects is obtained by demodulating, for each of the plurality of parts, the data specified by the pattern of the bright line in the part, and the information communication method may further include estimating a position of the image sensor, based on the obtained position of each of the plurality of subjects and a moving state of the image sensor.

In this way, the position of the receiver including the image sensor can be accurately estimated based on the changes in luminance of the plurality of subjects such as lightings, for instance as illustrated in FIG. 22.

For example, an information communication method of obtaining information from a subject may include: setting an exposure time of an image sensor so that, in an image obtained by capturing the subject by the image sensor, a bright line corresponding to an exposure line included in the image sensor appears according to a change in luminance of the subject; obtaining a bright line image by capturing the subject that changes in luminance by the image sensor with the set exposure time, the bright line image being an image including the bright line; obtaining the information by demodulating data specified by a pattern of the bright line included in the obtained bright line image; and presenting the obtained information, wherein in the presenting, an image prompting to make a predetermined gesture is presented to a user of the image sensor as the information.

In this way, user authentication and the like can be conducted according to whether or not the user makes the gesture as prompted, for instance as illustrated in FIGS. 35A to 36B. This enhances convenience.

For example, an information communication method of obtaining information from a subject may include: setting an exposure time of an image sensor so that, in an image obtained by capturing the subject by the image sensor, a bright line corresponding to an exposure line included in the image sensor appears according to a change in luminance of the subject; obtaining a bright line image by capturing the subject that changes in luminance by the image sensor with the set exposure time, the bright line image being an image including the bright line; and obtaining the information by demodulating data specified by a pattern of the bright line included in the obtained bright line image, wherein in the obtaining of a bright line image, the bright line image is obtained by capturing a plurality of subjects reflected on a reflection surface, and in the obtaining of the information, the information is obtained by separating a bright line corresponding to each of the plurality of subjects from bright lines included in the bright line image according to a strength of the bright line and demodulating, for each of the plurality of subjects, the data specified by the pattern of the bright line corresponding to the subject.

In this way, even in the case where the plurality of subjects such as lightings each change in luminance, appropriate information can be obtained from each subject, for instance as illustrated in FIG. 42.

For example, an information communication method of obtaining information from a subject may include: setting an exposure time of an image sensor so that, in an image obtained by capturing the subject by the image sensor, a bright line corresponding to an exposure line included in the image sensor appears according to a change in luminance of the subject; obtaining a bright line image by capturing the subject that changes in luminance by the image sensor with the set exposure time, the bright line image being an image including the bright line; and obtaining the information by demodulating data specified by a pattern of the bright line included in the obtained bright line image, wherein in the obtaining of a bright line image, the bright line image is obtained by capturing the subject reflected on a reflection surface, and the information communication method may further include estimating a position of the subject based on a luminance distribution in the bright line image.

In this way, the appropriate position of the subject can be estimated based on the luminance distribution, for instance as illustrated in FIG. 43.

For example, an information communication method of transmitting a signal using a change in luminance may include: determining a first pattern of the change in luminance, by modulating a first signal to be transmitted; determining a second pattern of the change in luminance, by modulating a second signal to be transmitted; and transmitting the first signal and the second signal by a light emitter alternately changing in luminance according to the determined first pattern and changing in luminance according to the determined second pattern.

In this way, the first signal and the second signal can each be transmitted without a delay, for instance as illustrated in FIG. 37A.

For example, in the transmitting, a buffer time may be provided when switching the change in luminance between the change in luminance according to the first pattern and the change in luminance according to the second pattern.

In this way, interference between the first signal and the second signal can be suppressed, for instance as illustrated in FIG. 37B.

For example, an information communication method of transmitting a signal using a change in luminance may include: determining a pattern of the change in luminance by modulating the signal to be transmitted; and transmitting the signal by a light emitter changing in luminance according to the determined pattern, wherein the signal is made up of a plurality of main blocks, each of the plurality of main blocks includes first data, a preamble for the first data, and a check signal for the first data, the first data is made up of a plurality of sub-blocks, and each of the plurality of sub-blocks includes second data, a preamble for the second data, and a check signal for the second data.

In this way, data can be appropriately obtained regardless of whether or not the receiver needs a blanking period, for instance as illustrated in FIG. 38.

For example, an information communication method of transmitting a signal using a change in luminance may include: determining, by each of a plurality of transmitters, a pattern of the change in luminance by modulating the signal to be transmitted; and transmitting, by each of the plurality of transmitters, the signal by a light emitter in the transmitter changing in luminance according to the determined pattern, wherein in the transmitting, the signal of a different frequency or protocol is transmitted.

In this way, interference between signals from the plurality of transmitters can be suppressed, for instance as illustrated in FIG. 40.

For example, an information communication method of transmitting a signal using a change in luminance may include: determining, by each of a plurality of transmitters, a pattern of the change in luminance by modulating the signal to be transmitted; and transmitting, by each of the plurality of transmitters, the signal by a light emitter in the transmitter changing in luminance according to the determined pattern, wherein in the transmitting, one of the plurality of transmitters receives a signal transmitted from a remaining one of the plurality of transmitters, and transmits an other signal in a form that does not interfere with the received signal.

In this way, interference between signals from the plurality of transmitters can be suppressed, for instance as illustrated in FIG. 41.

Embodiment 3

This embodiment describes each example of application using a receiver such as a smartphone and a transmitter for transmitting information as a blink pattern of an LED, an organic EL device, or the like in Embodiment 1 or 2 described above.

Figure 54:
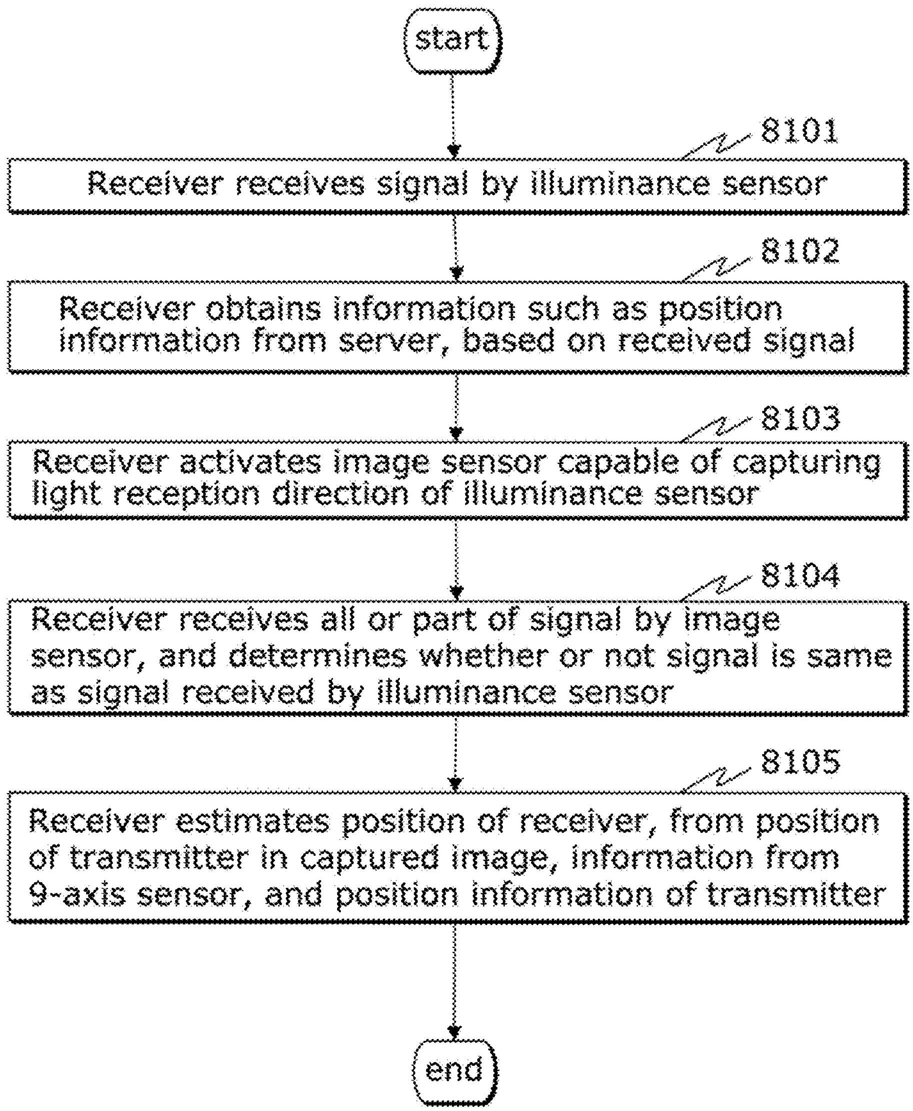
FIG. 54 is a flowchart illustrating an example of operation of a receiver in Embodiment 3.

FIG. 54 is a flowchart illustrating an example of operation of a receiver in Embodiment 3.

First, a receiver receives a signal by an illuminance sensor (Step 8101). Next, the receiver obtains information such as position information from a server, based on the received signal (Step 8102). The receiver then activates an image sensor capable of capturing the light reception direction of the illuminance sensor (Step 8103). The receiver receives all or part of a signal by the image sensor, and determines whether or not all or part of the signal is the same as the signal received by the illuminance sensor (Step 8104). Following this, the receiver estimates the position of the receiver, from the position of the transmitter in the captured image, information from a 9-axis sensor included in the receiver, and the position information of the transmitter (Step 8105). Thus, the receiver activates the illuminance sensor of low power consumption and, in the case where the signal is received by the illuminance sensor, activates the image sensor. The receiver then performs position estimation using image capture by the image sensor. In this way, the position of the receiver can be accurately estimated while saving power.

Figure 55:
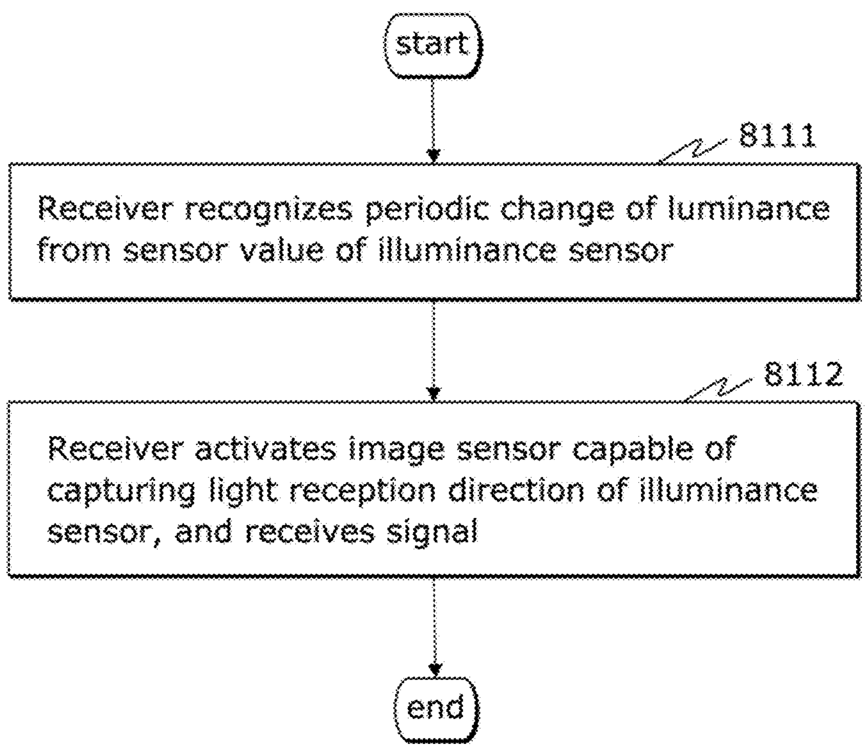
FIG. 55 is a flowchart illustrating another example of operation of a receiver in Embodiment 3.

FIG. 55 is a flowchart illustrating another example of operation of a receiver in Embodiment 3.

A receiver recognizes a periodic change of luminance from the sensor value of an illuminance sensor (Step 8111). The receiver then activates an image sensor capable of capturing the light reception direction of the illuminance sensor, and receives a signal (Step 8112). Thus, the receiver activates the illuminance sensor of low power consumption and, in the case where the periodic change of luminance is received by the illuminance sensor, activates the image sensor, in the same way as above. The receiver then receives the accurate signal using image capture by the image sensor. In this way, the accurate signal can be received while saving power.

Figure 56A:
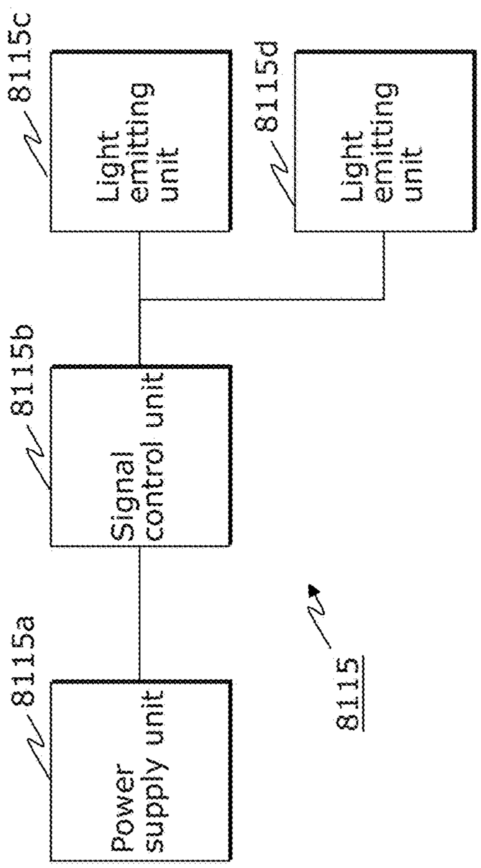
FIG. 56A is a block diagram illustrating an example of a transmitter in Embodiment 3.

FIG. 56A is a diagram illustrating an example of operation of a transmitter in Embodiment 3.

A transmitter 8115 includes a power supply unit 8115*a*, a signal control unit 8115*b*, a light emitting unit 8115*c*, and a light emitting unit 8115*d*. The power supply unit 8115*a* supplies power to the signal control unit 8115*b*. The signal control unit 8115*b* divides the power supplied from the power supply unit 8115*a* into the light emitting units 8115*c* and 8115*d*, and controls the luminance changes of the light emitting units 8115*c* and 8115*d*.

Figure 56B:
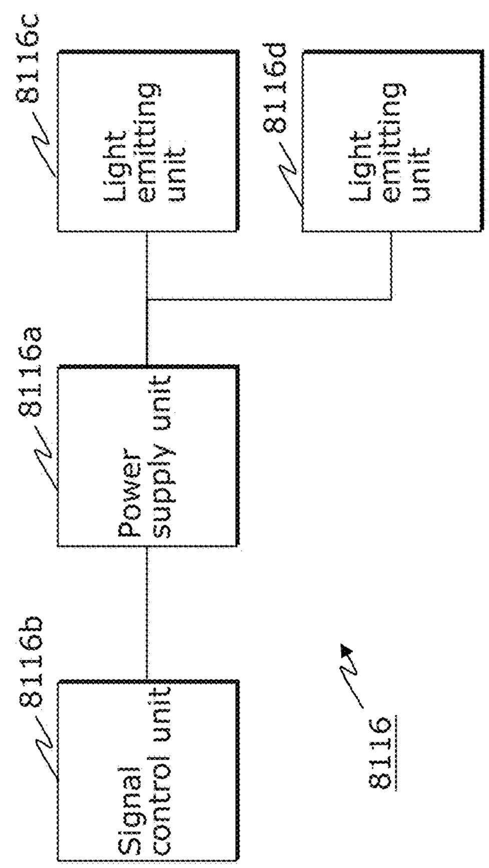
FIG. 56B is a block diagram illustrating another example of a transmitter in Embodiment 3.

FIG. 56B is a diagram illustrating another example of operation of a transmitter in Embodiment 3.

A transmitter 8116 includes a power supply unit 8116*a*, a signal control unit 8116*b*, a light emitting unit 8116*c*, and a light emitting unit 8116*d*. The power supply unit 8116*a* supplies power to the light emitting units 8116*c* and 8116*d*. The signal control unit 8116*b* controls the power supplied from the power supply unit 8116*a*, thereby controlling the luminance changes of the light emitting units 8116*c* and 8116*d*. The power use efficiency can be enhanced by the signal control unit 8116*b* controlling the power supply unit 8116*a* that supplies power to each of the light emitting units 8116*c* and 8116*d*.

Figure 57:
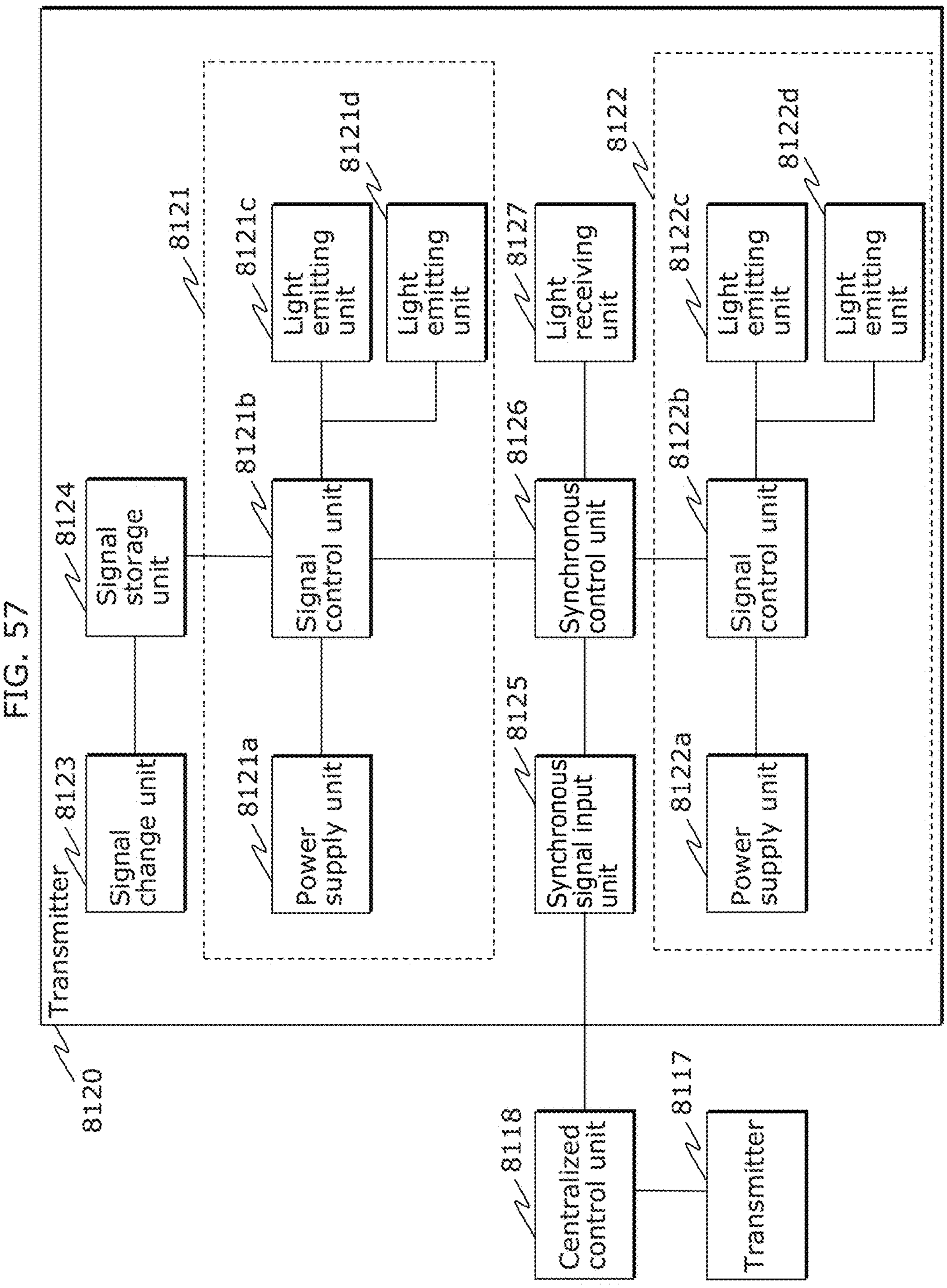
FIG. 57 is a diagram illustrating an example of a structure of a system including a plurality of transmitters in Embodiment 3.

FIG. 57 is a diagram illustrating an example of a structure of a system including a plurality of transmitters in Embodiment 3.

The system includes a centralized control unit 8118, a transmitter 8117, and a transmitter 8120. The centralized control unit 8118 controls signal transmission by a change in luminance of each of the transmitters 8117 and 8120. For example, the centralized control unit 8118 causes the transmitters 8117 and 8120 to transmit the same signal at the same time, or causes one of the transmitters to transmit a signal unique to the transmitter.

The transmitter 8120 includes two transmission units 8121 and 8122, a signal change unit 8123, a signal storage unit 8124, a synchronous signal input unit 8125, a synchronous control unit 8126, and a light receiving unit 8127.

The two transmission units 8121 and 8122 each have the same structure as the transmitter 8115 illustrated in FIG. 56A, and transmits a signal by changing in luminance. In detail, the transmission unit 8121 includes a power supply unit 8121*a*, a signal control unit 8121*b*, a light emitting unit 8121*c*, and a light emitting unit 8121*d*. The transmission unit 8122 includes a power supply unit 8122*a*, a signal control unit 8122*b*, a light emitting unit 8122*c*, and a light emitting unit 8122*d*.

The signal change unit 8123 modulates a signal to be transmitted, to a signal indicating a luminance change pattern. The signal storage unit 8124 stores the signal indicating the luminance change pattern. The signal control unit 8121*b* in the transmission unit 121 reads the signal stored in the signal storage unit 8124, and causes the light emitting units 8121*c* and 8121*d* to change in luminance according to the signal.

The synchronous signal input unit 8125 obtains a synchronous signal according to control by the centralized control unit 8118. The synchronous control unit 8126 synchronizes the luminance changes of the transmission units 8121 and 8122, when the synchronous signal is obtained. That is, the synchronous control unit 8126 controls the signal control units 8121*b* and 8122*b*, to synchronize the luminance changes of the transmission units 8121 and 8122. Here, the light receiving unit 8127 detects light emission from the transmission units 8121 and 8122. The synchronous control unit 8126 feedback-controls the signal control units 8121*b* and 8122*b*, according to the light detected by the light receiving unit 8127.

Figure 58:
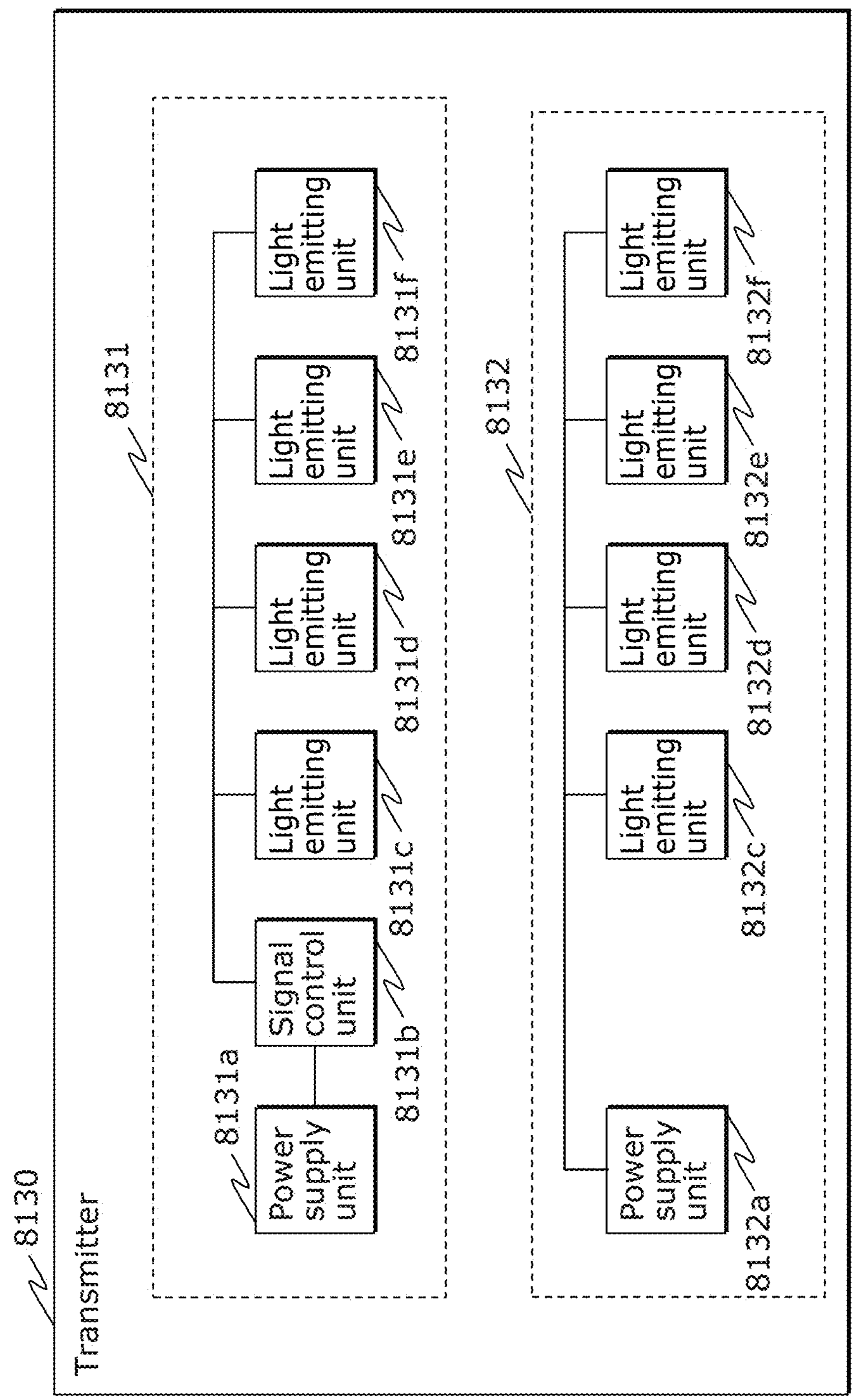
FIG. 58 is a block diagram illustrating another example of a transmitter in Embodiment 3.

FIG. 58 is a block diagram illustrating another example of a transmitter in Embodiment 3.

A transmitter 8130 includes a transmission unit 8131 that transmits a signal by changing in luminance, and a non-transmission unit 8132 that emits light without transmitting a signal.

The transmission unit 8131 has the same structure as the transmitter 8115 illustrated in FIG. 56A, and includes a power supply unit 8131*a*, a signal control unit 8131*b*, and light emitting units 8131*c* to 8131*f*. The non-transmission unit 8132 includes a power supply unit 8132*a* and light emitting units 8132*c* to 8132*f*, but does not include a signal control unit. In other words, in the case where there are a plurality of units each including a power supply and luminance change synchronous control cannot be performed between the plurality of units, a signal control unit is provided in only one of the plurality of units to cause the unit to change in luminance, as in the structure illustrated in FIG. 58.

In the transmitter 8130, the light emitting units 8131*c* to 8131*f* in the transmission unit 8131 are continuously arranged in a line. That is, none of the light emitting units 8132*c* to 8132*f* in the non-transmission unit 8132 is mixed in the set of the light emitting units 8131*c* to 8131*f*. This makes the light emitter that changes in luminance larger in size, so that the receiver can easily receive the signal transmitted using the change in luminance.

Figure 59A:
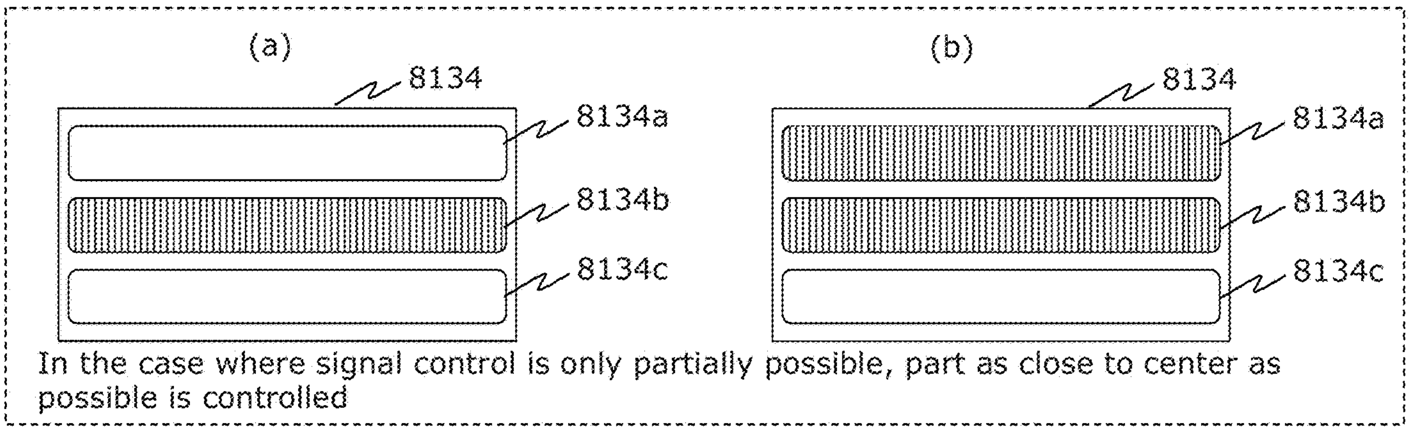
FIG. 59A is a diagram illustrating an example of a transmitter in Embodiment 3.

FIG. 59A is a diagram illustrating an example of a transmitter in Embodiment 3.

A transmitter 8134 such as a signage includes three light emitting units (light emitting areas) 8134*a* to 8134*c*. Light from these light emitting units 8134*a* to 8134*c* do not interfere with each other. In the case where only one of the light emitting units 8134*a* to 8134*c* can be changed in luminance to transmit a signal, it is desirable to change in luminance the light emitting unit 8134*b* at the center, as illustrated in (a) in FIG. 59A. In the case where two of the light emitting units 8134*a* to 8134*c* can be changed in luminance, it is desirable to change in luminance the light emitting unit 8134*b* at the center and the light emitting unit 8134*a* or 8134*c* at either edge, as illustrated in (b) in FIG. 59A. Changing in luminance the light emitting units at such positions enables the receiver to appropriately receive the signal transmitted using the change in luminance.

Figure 59B:
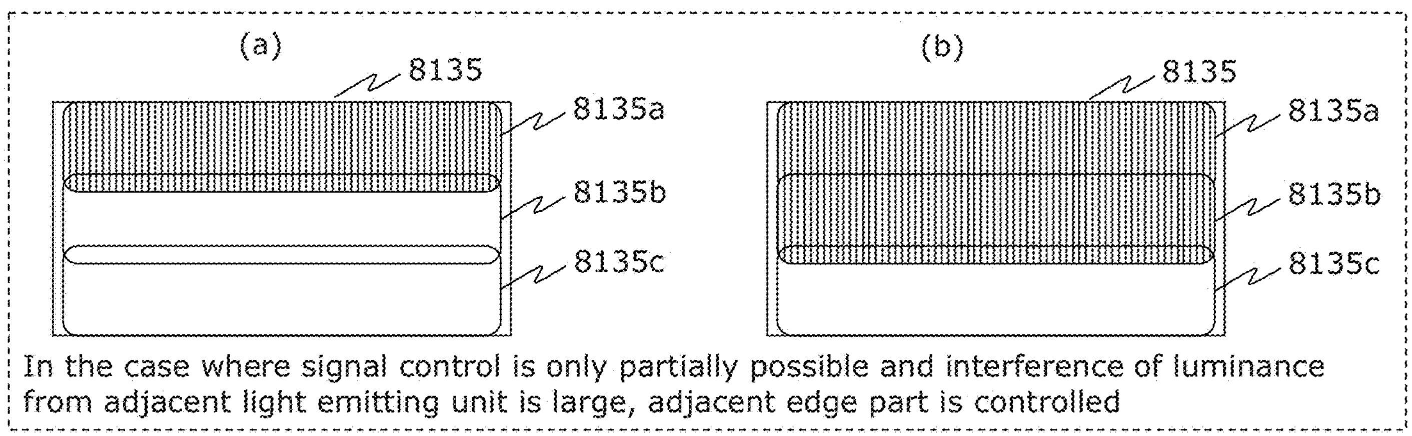
FIG. 59B is a diagram illustrating an example of a transmitter in Embodiment 3.

FIG. 59B is a diagram illustrating an example of a transmitter in Embodiment 3.

A transmitter 8135 such as a signage includes three light emitting units 8135*a* to 8135*c*. Light from adjacent light emitting units of these light emitting units 8135*a* to 8135*c* interferes with each other. In the case where only one of the light emitting units 8135*a* to 8135*c* can be changed in luminance to transmit a signal, it is desirable to change in luminance the light emitting unit 8135*a* or 8135*c* at either edge, as illustrated in (a) in FIG. 59B. This prevents light from another light emitting unit from interfering with the luminance change for signal transmission. In the case where two of the light emitting units 8135*a* to 8135*c* can be changed in luminance, it is desirable to change in luminance the light emitting unit 8135*b* at the center and the light emitting unit 8135*a* or 8135*c* at either edge, as illustrated in (b) in FIG. 59B. Changing in luminance the light emitting units at such positions contributes to a larger luminance change area, and so enables the receiver to appropriately receive the signal transmitted using the change in luminance.

Figure 59C:
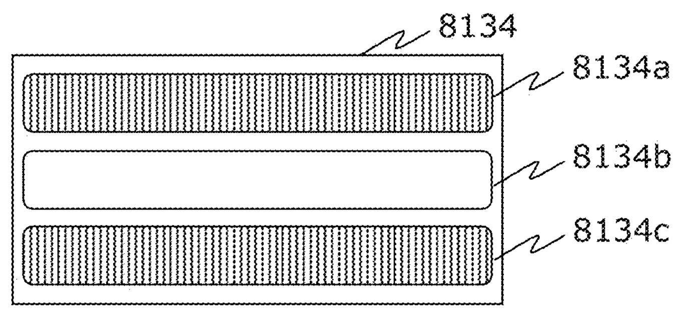
FIG. 59C is a diagram illustrating an example of a transmitter in Embodiment 3.

FIG. 59C is a diagram illustrating an example of a transmitter in Embodiment 3.

In the case where two of the light emitting units 8134*a* to 8134*c* can be changed in luminance in the transmitter 8134, the light emitting units 8134*a* and 8134*c* at both edges may be changed in luminance, as illustrated in FIG. 50C. In this case, the imaging range in which the luminance change part is shown can be widened in the image capture by the receiver.

Figure 60A:
FIG. 60A is a diagram illustrating an example of a transmitter in Embodiment 3.

FIG. 60A is a diagram illustrating an example of a transmitter in Embodiment 3.

A transmitter 8137 such as a signage transmits a signal by a character part "A Shop" and a light emitting unit 8137*a* changing in luminance. For example, the light emitting unit 8137*a* is formed like a horizontally long rectangle, and uniformly changes in luminance. The uniform change in luminance of the light emitting unit 8137*a* enables the receiver to appropriately receive the signal transmitted using the change in luminance.

Figure 60B:
FIG. 60B is a diagram illustrating an example of a transmitter in Embodiment 3.

FIG. 60B is a diagram illustrating an example of a transmitter in Embodiment 3.

A transmitter 8138 such as a signage transmits a signal by a character part "A Shop" and a light emitting unit 8138*a* changing in luminance. For example, the light emitting unit 8138*a* is formed like a frame along the edges of the signage, and uniformly changes in luminance. That is, the light emitting unit 8138*a* is formed so that, when the light emitting unit is projected onto an arbitrary straight line, the length of the continuous projection part is at the maximum. The uniform change in luminance of the light emitting unit 8138*a* enables the receiver to more appropriately receive the signal transmitted using the change in luminance.

Figure 61:
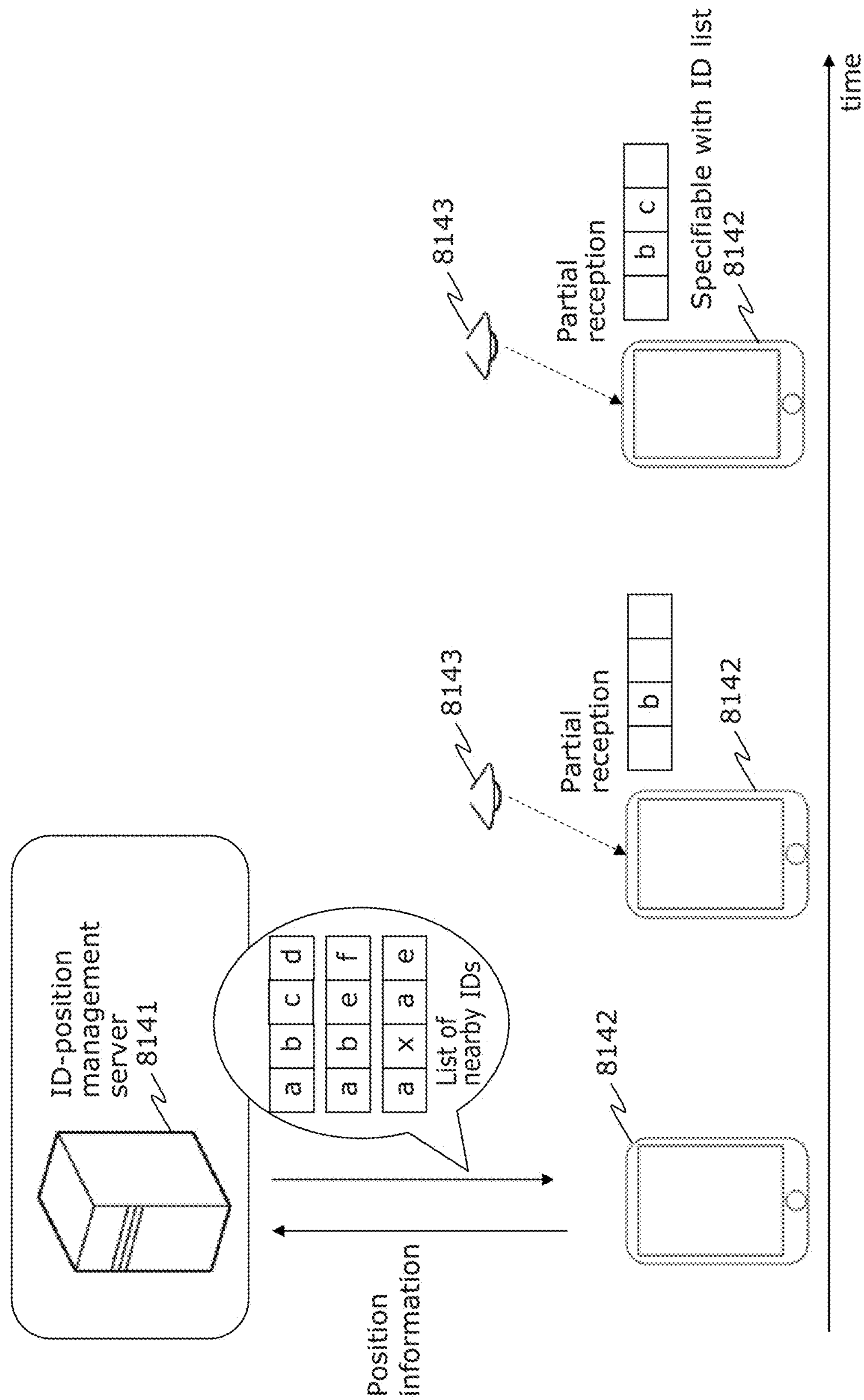
FIG. 61 is a diagram illustrating an example of processing operation of a receiver, a transmitter, and a server in Embodiment 3.

FIG. 61 is a diagram illustrating an example of processing operation of a receiver, a transmitter, and a server in Embodiment 3.

A receiver 8142 such as a smartphone obtains position information indicating the position of the receiver 8142, and transmits the position information to a server 8141. For example, the receiver 8142 obtains the position information when using a Global Positioning System (GPS) or the like or receiving another signal. The server 8141 transmits an ID list associated with the position indicated by the position information, to the receiver 8142. The ID list includes each ID such as "abcd" and information associated with the ID.

The receiver 8142 receives a signal from a transmitter 8143 such as a lighting device. Here, the receiver 8142 may be able to receive only a part (e.g., "b") of an ID as the above-mentioned signal. In such a case, the receiver 8142 searches the ID list for the ID including the part. In the case where the unique ID is not found, the receiver 8142 further receives a signal including another part of the ID, from the transmitter 8143. The receiver 8142 thus obtains a larger part (e.g., "bc") of the ID. The receiver 8142 again searches the ID list for the ID including the part (e.g., "bc"). Through such search, the receiver 8142 can specify the whole ID even in the case where the ID can be obtained only partially. Note that, when receiving the signal from the transmitter 8143, the receiver 8142 receives not only the part of the ID but also a check portion such as a CRC (Cyclic Redundancy Check).

Figure 62:
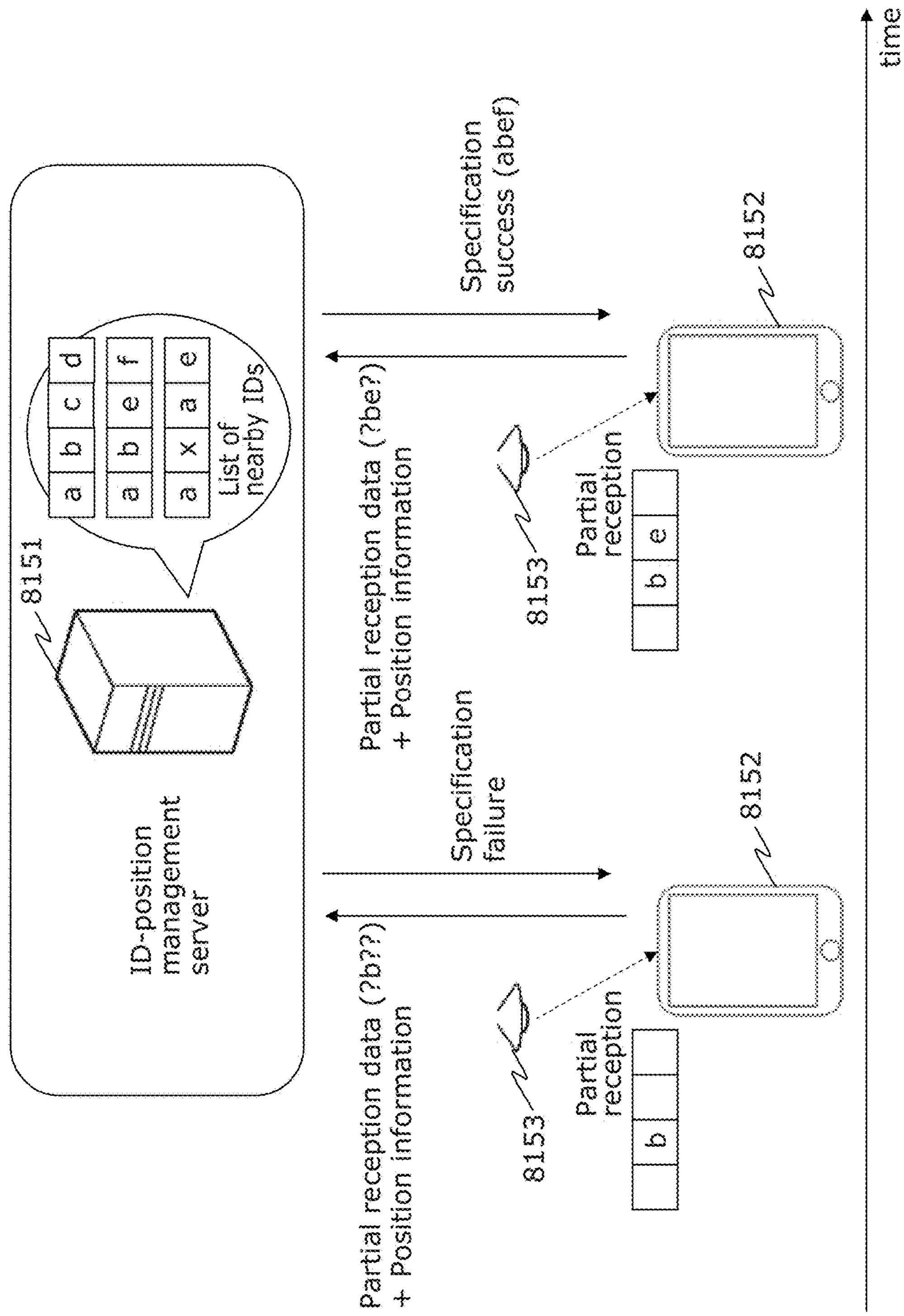
FIG. 62 is a diagram illustrating an example of processing operation of a receiver, a transmitter, and a server in Embodiment 3.

FIG. 62 is a diagram illustrating an example of processing operation of a receiver, a transmitter, and a server in Embodiment 3.

A receiver 8152 such as a smartphone obtains position information indicating the position of the receiver 8152. For example, the receiver 8152 obtains the position information when using a GPS or the like or receiving another signal. The receiver 8152 also receives a signal from a transmitter 8153 such as a lighting device. The signal includes only a part (e.g., "b") of an ID. The receiver 8152 transmits the position information and the part of the ID to a server 8151.

The server 8151 searches an ID list associated with the position indicated by the position information, for the ID including the part. In the case where the unique ID is not found, the server 8151 notifies the receiver 8152 that the specification of the ID has failed.

Following this, the receiver 8152 receives a signal including another part of the ID, from the transmitter 8153. The receiver 8152 thus obtains a large part (e.g., "be") of the ID. The receiver 8152 transmits the part (e.g., "be") of the ID and the position information to the server 8151.

The server 8151 searches the ID list associated with the position indicated by the position information, for the ID including the part. When the unique ID is found, the server 8151 notifies the receiver 8152 that the ID (e.g., "abef") has been specified, and transmits information associated with the ID to the receiver 8152.

Figure 63:
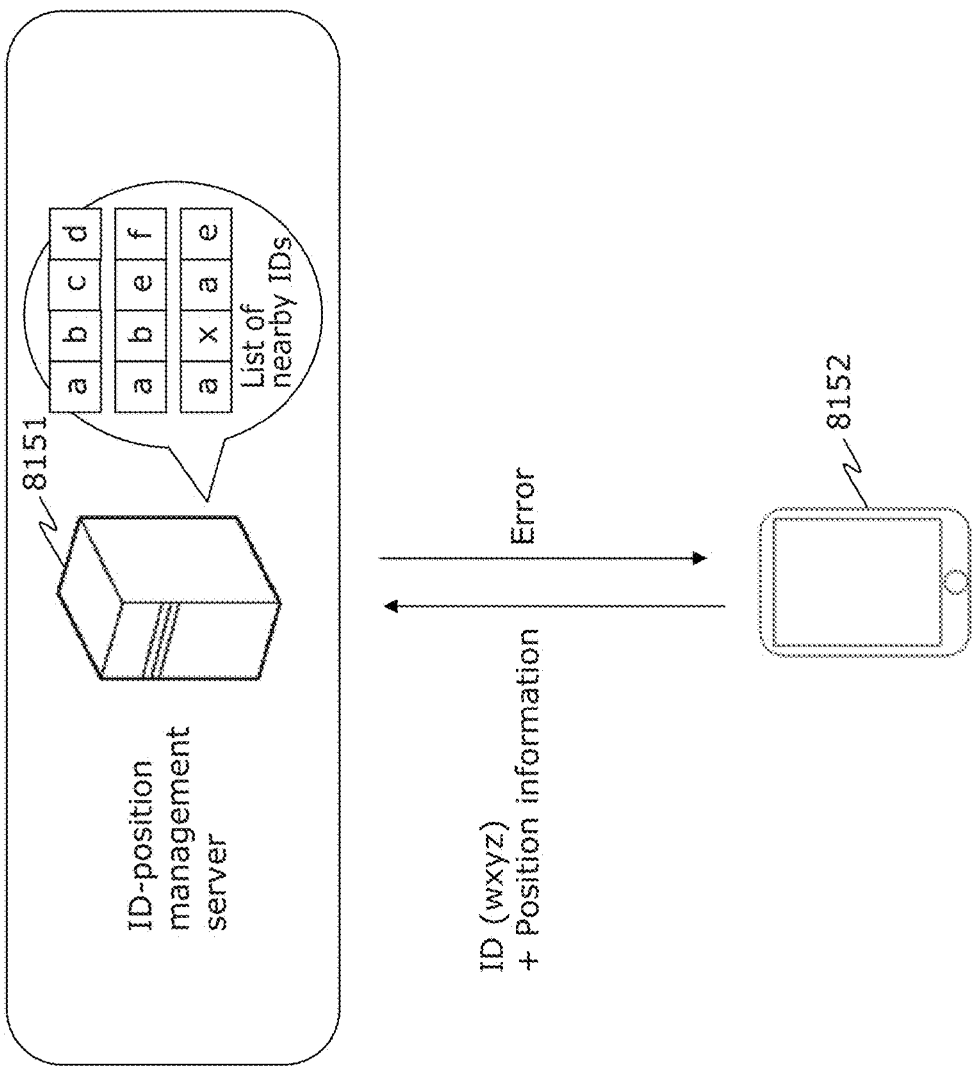
FIG. 63 is a diagram illustrating an example of processing operation of a receiver, a transmitter, and a server in Embodiment 3.

FIG. 63 is a diagram illustrating an example of processing operation of a receiver, a transmitter, and a server in Embodiment 3.

The receiver 8152 may transmit not the part of the ID but the whole ID to the server 8151, together with the position information. In the case where the complete ID (e.g., "wxyz") is not included in the ID list, the server 8151 notifies the receiver 8152 of an error.

Figure 64A:
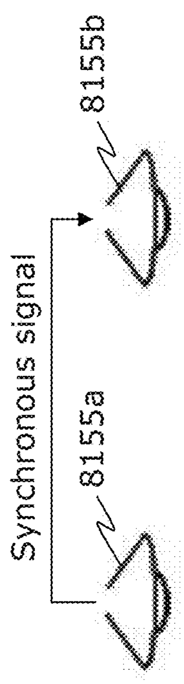
FIG. 64A is a diagram for describing synchronization between a plurality of transmitters in Embodiment 3.

FIG. 64A is a diagram for describing synchronization between a plurality of transmitters in Embodiment 3.

Transmitters 8155*a* and 8155*b* transmit a signal by changing in luminance. Here, the transmitter 8155*a* transmits a synchronous signal to the transmitter 8155*b*, thereby changing in luminance synchronously with the transmitter 8155*b*. Further, the transmitters 8155*a* and 8155*b* each obtain a signal from a source, and change in luminance according to the signal. There is a possibility that the time (first delay time) taken for the signal transmission from the source to the transmitter 8155*a* and the time (second delay time) taken for the signal transmission from the source to the transmitter 8155*b* are different. In view of this, the signal round-trip time between each of the transmitters 8155*a* and 8155*b* and the source is measured, and ½ of the round-trip time is specified as the first or second delay time. The transmitter 8155*a* transmits the synchronous signal so as to cancel out the difference between the first and second delay times, thereby changing in luminance synchronously with the transmitter 8155*b*.

Figure 64B:
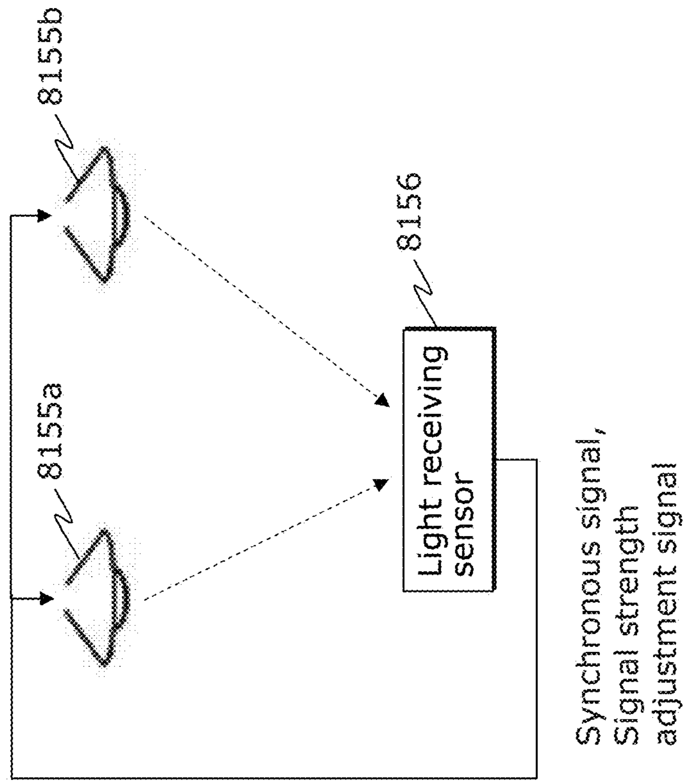
FIG. 64B is a diagram for describing synchronization between a plurality of transmitters in Embodiment 3.

FIG. 64B is a diagram for describing synchronization between a plurality of transmitters in Embodiment 3.

A light receiving sensor 8156 detects light from the transmitters 8155*a* and 8155*b*, and outputs the result to the transmitters 8155*a* and 8155*b* as a detection signal. Having received the detection signal from the light receiving sensor 8156, the transmitters 8155*a* and 8155*b* change in luminance synchronously or adjust the signal strength based on the detection signal.

Figure 65:
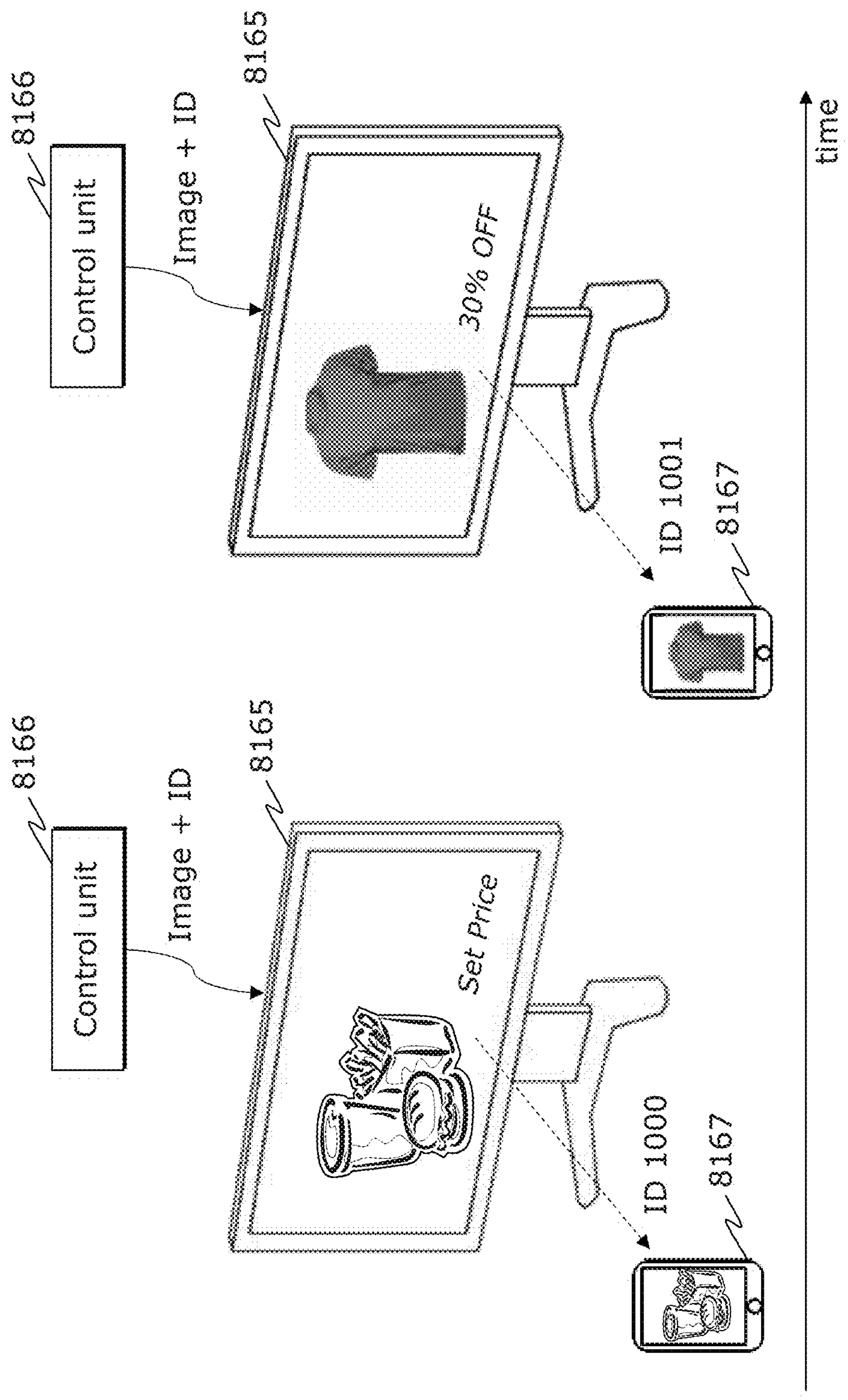
FIG. 65 is a diagram illustrating an example of operation of a transmitter and a receiver in Embodiment 3.

FIG. 65 is a diagram illustrating an example of operation of a transmitter and a receiver in Embodiment 3.

A transmitter 8165 such as a television obtains an image and an ID (ID 1000) associated with the image, from a control unit 8166. The transmitter 8165 displays the image, and also transmits the ID (ID 1000) to a receiver 8167 by changing in luminance. The receiver 8167 captures the transmitter 8165 to receive the ID (ID 1000), and displays information associated with the ID (ID 1000). The control unit 8166 then changes the image output to the transmitter 8165, to another image. The control unit 8166 also changes the ID output to the transmitter 8165. That is, the control unit 8166 outputs the other image and the other ID (ID 1001) associated with the other image, to the transmitter 8165. The transmitter 8165 displays the other image, and transmits the other ID (ID 1001) to the receiver 8167 by changing in luminance. The receiver 8167 captures the transmitter 8165 to receive the other ID (ID 1001), and displays information associated with the other ID (ID 1001).

Figure 66:
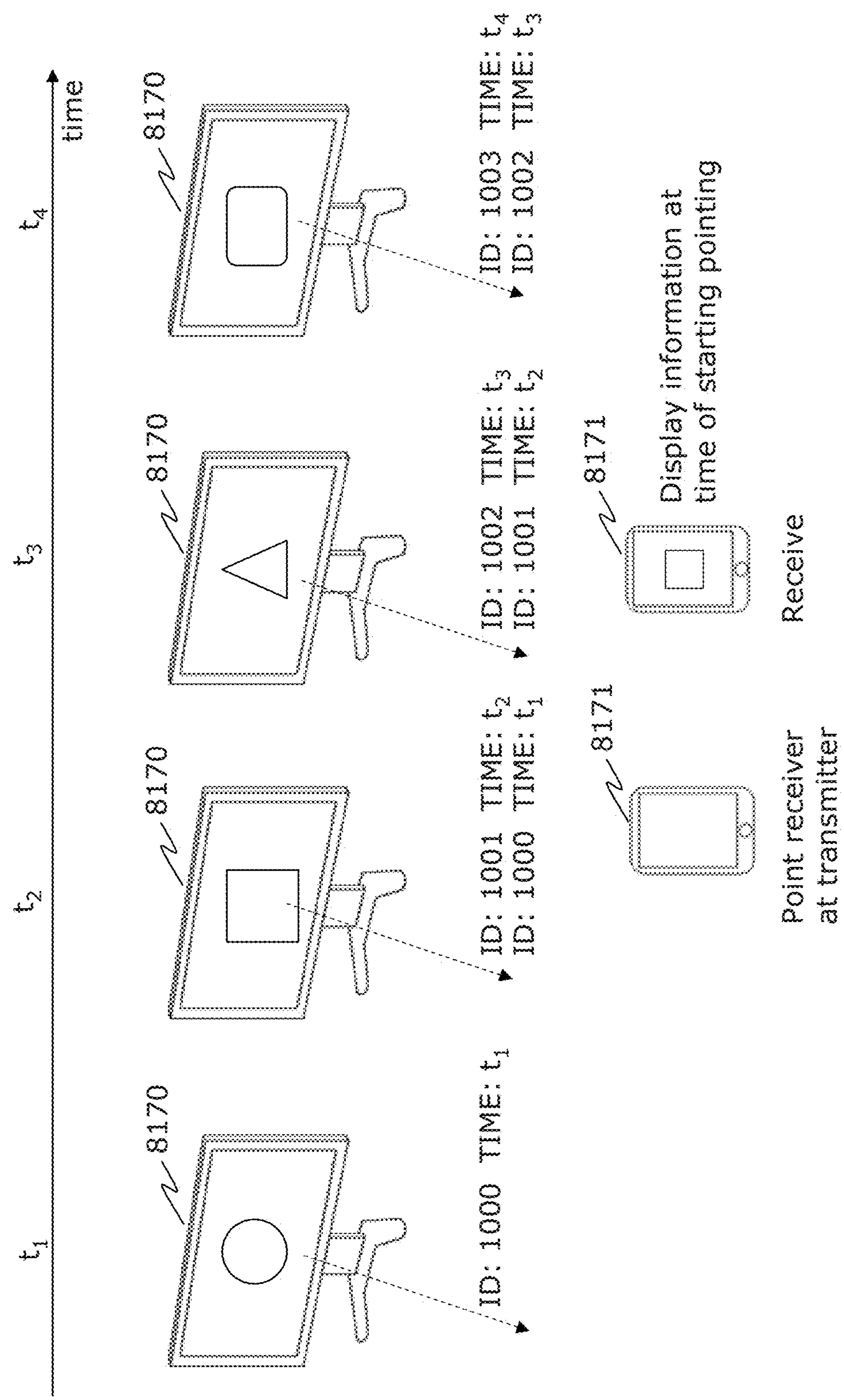
FIG. 66 is a diagram illustrating an example of operation of a transmitter and a receiver in Embodiment 3.

FIG. 66 is a diagram illustrating an example of operation of a transmitter and a receiver in Embodiment 3.

A transmitter 8170 such as a signage displays images by switching between them. When displaying an image, the transmitter 8170 transmits, to a receiver 8171, ID time information indicating the ID corresponding to the displayed image and the time at which the image is displayed, by changing in luminance. For example, at time t1, the transmitter 8170 displays an image showing a circle, and transmits ID time information indicating the ID (ID: 1000) corresponding to the image and the time (TIME: t1) at which the image is displayed.

Here, the transmitter 8170 transmits not only the ID time information corresponding to the currently displayed image but also ID time information corresponding to at least one previously displayed image. For example, at time t2, the transmitter 8170 displays an image showing a square, and transmits ID time information indicating the ID (ID: 1001) corresponding to the image and the time (TIME: t2) at which the image is displayed. At this time, the transmitter 8170 also transmits the ID time information indicating the ID (ID: 1000) corresponding to the image showing the circle and the time (TIME: t1) at which the image is displayed. Likewise, at time t3, the transmitter 8170 displays an image showing a triangle, and transmits ID time information indicating the ID (ID: 1002) corresponding to the image and the time (TIME: t3) at which the image is displayed. At this time, the transmitter 8170 also transmits the ID time information indicating the ID (ID: 1001) corresponding to the image showing the square and the time (TIME: t2) at which the image is displayed. Thus, the transmitter 8170 transmits a plurality of sets of ID time information at the same time.

Suppose, to obtain information related to the image showing the square, the user points an image sensor of the receiver 8171 at the transmitter 8170 and starts image capture by the receiver 8171, at the time t2 at which the image showing the square is displayed.

Even when the receiver 8171 starts capturing at time t2, the receiver 8171 may not be able to obtain the ID time information corresponding to the image showing the square while the image is displayed on the transmitter 8170. Even in such a case, since the ID time information corresponding to the previously displayed image is also transmitted from the transmitter 8170 as mentioned above, at time t3 the receiver 8171 can obtain not only the ID time information (ID: 1002, TIME: t3) corresponding to the image showing the triangle but also the ID time information (ID: 1001, TIME: t2) corresponding to the image showing the square. The receiver 8171 selects, from these ID time information, the ID time information (ID: 1001, TIME: t2) indicating the time (t2) at which the receiver 8171 is pointed at the transmitter 8170, and specifies the ID (ID: 1001) indicated by the ID time information. As a result, at time t3, the receiver 8171 can obtain, from a server or the like, information related to the image showing the square based on the specified ID (ID: 1001).

The above-mentioned time is not limited to an absolute time, and may be a time (relative time) between the time at which the receiver 8171 is pointed at the transmitter 8170 and the time at which the receiver 8171 receives the ID time information. Moreover, though the transmitter 8170 transmits the ID time information corresponding to the previously displayed image together with the ID time information corresponding to the currently displayed image, the transmitter 8170 may transmit ID time information corresponding to an image to be displayed in the future. Furthermore, in a situation where the reception by the receiver 8171 is difficult, the transmitter 8170 may transmit more sets of previous or future ID time information.

In the case where the transmitter 8170 is not a signage but a television, the transmitter 8170 may transmit information indicating a channel corresponding to a displayed image, instead of ID time information. In detail, in the case where an image of a television program being broadcasted is displayed on the transmitter 8170 in real time, the display time of the image displayed on the transmitter 8170 can be uniquely specified for each channel. Accordingly, the receiver 8171 can specify the time at which the receiver 8171 is pointed at the transmitter 8170, i.e., the time at which the receiver 8171 starts capturing, based on the captured image and the channel. The receiver 8171 can then obtain, from a server or the like, information related to the captured image based on the channel and the time. Here, the transmitter 8170 may transmit information indicating the display time of the displayed image, instead of ID time information. In such a case, the receiver 8171 searches all television programs being broadcasted, for a television program including the captured image. The receiver 8171 can then obtain, from a server or the like, information related to the image based on the channel and display time of the television program.

Figure 67:
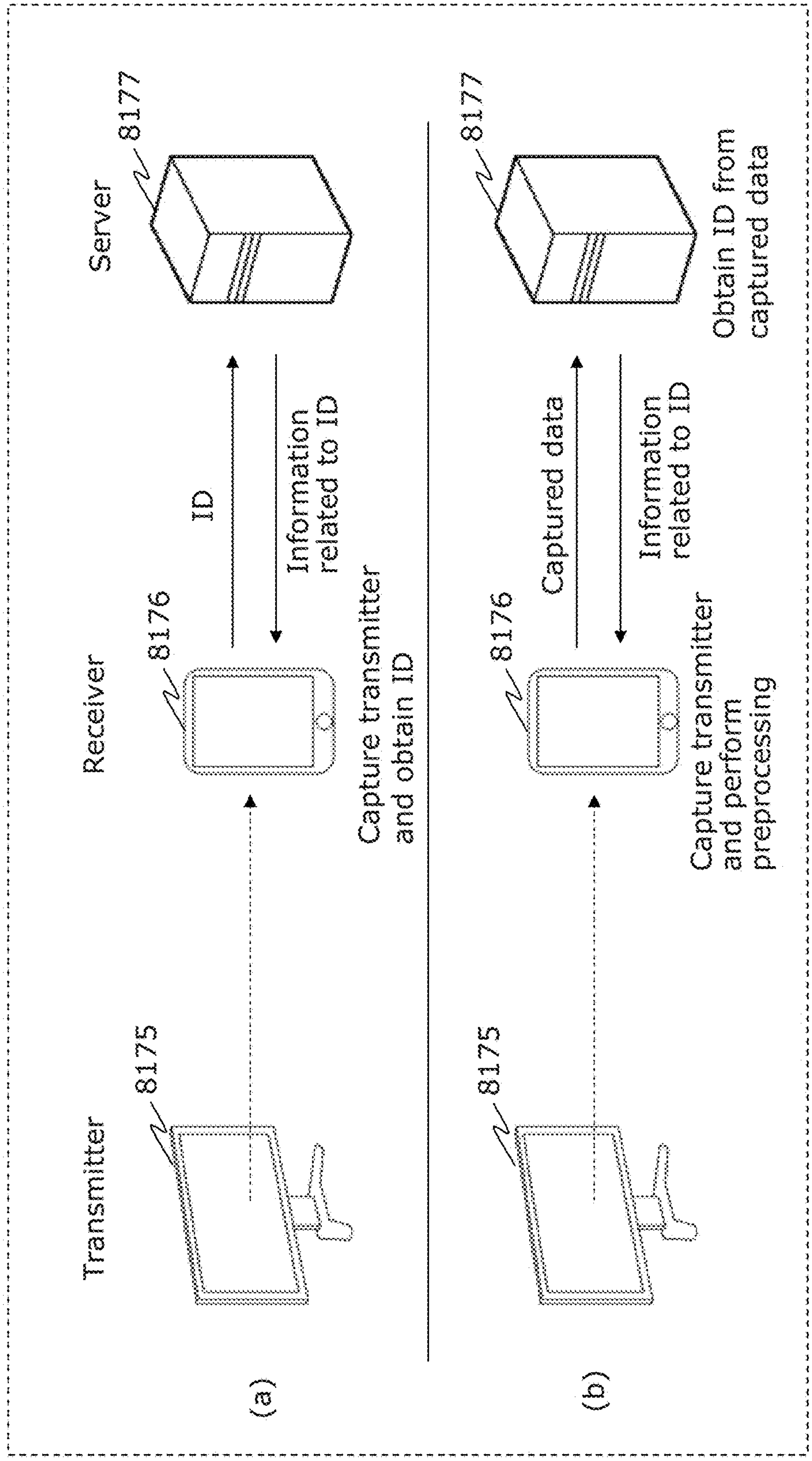
FIG. 67 is a diagram illustrating an example of operation of a transmitter, a receiver, and a server in Embodiment 3.

FIG. 67 is a diagram illustrating an example of operation of a transmitter, a receiver, and a server in Embodiment 3.

As illustrated in (a) in FIG. 67, a receiver 8176 captures a transmitter 8175 to obtain an image including a bright line, and specifies (obtains) the ID of the transmitter 8175 from the image. The receiver 8176 transmits the ID to a server 8177, and obtains information associated with the ID from the server 8177.

On the other hand, as illustrated in (b) in FIG. 67, the receiver 8176 may capture the transmitter 8175 to obtain the image including the bright line, and transmit the image to the server 8177 as captured data. The receiver 8176 may also perform, on the image including the bright line, such preprocessing that reduces the amount of information of the image, and transmit the preprocessed image to the server 8177 as captured data. The preprocessing is, for instance, image binarization. Having received the captured data, the server 8177 specifies (obtains) the ID of the transmitter 8175 from the image indicated by the captured data. The server 8177 then transmits the information associated with the ID to the receiver 8176.

Figure 68:
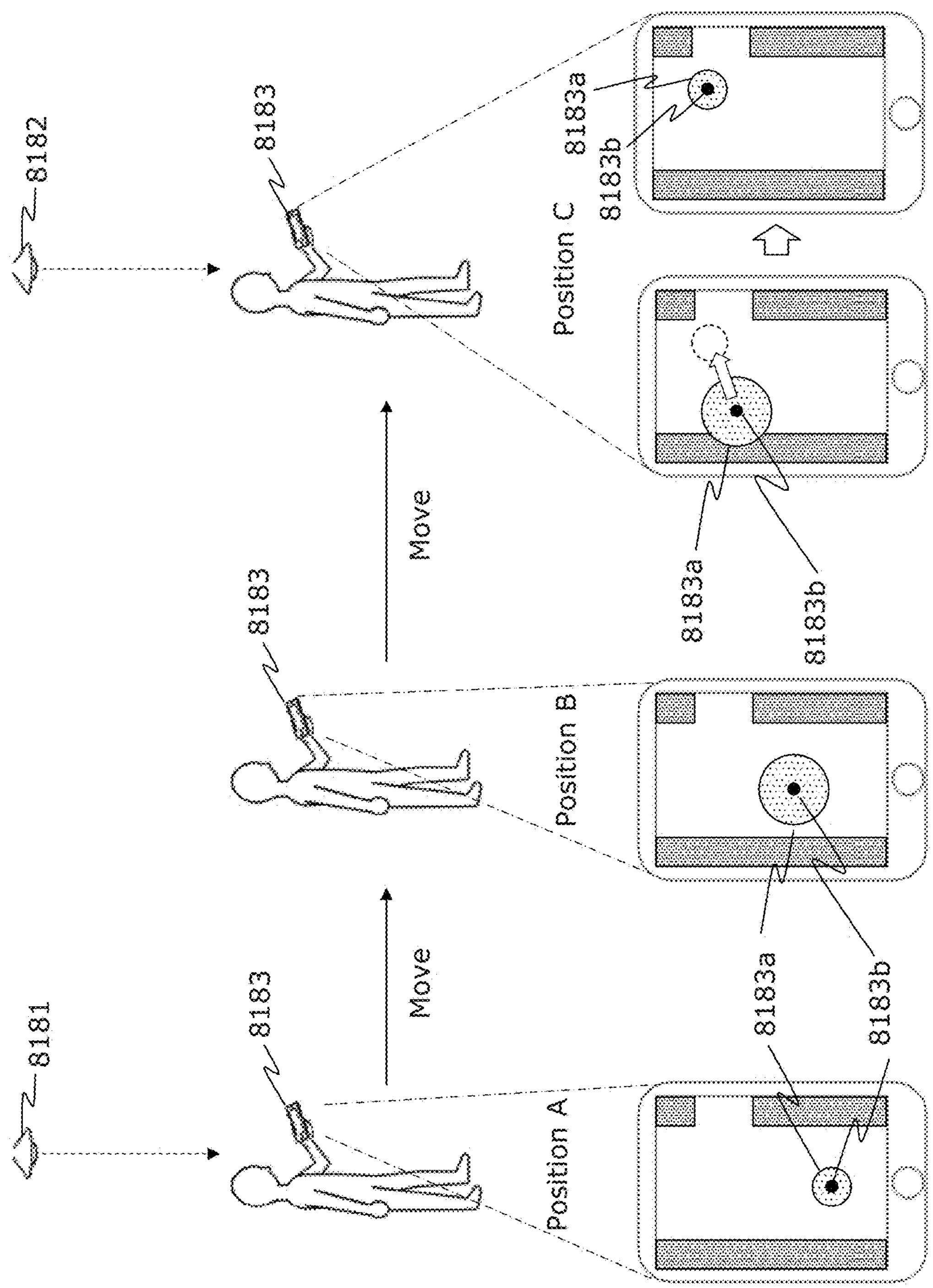
FIG. 68 is a diagram illustrating an example of operation of a transmitter and a receiver in Embodiment 3.

FIG. 68 is a diagram illustrating an example of operation of a transmitter and a receiver in Embodiment 3.

When the user is located at position A, a receiver 8183 specifies the position of the receiver 8183, by obtaining a signal transmitted from a transmitter 8181 that changes in luminance. The receiver 8183 displays a point 8183*b* indicating the specified position, together with an error range 8183*a* of the position.

Next, when the user moves from position A to position B, the receiver 8183 cannot obtain a signal from the transmitter 8181. The receiver 8183 accordingly estimates the position of the receiver 8183, using a 9-axis sensor and the like included in the receiver 8183. The receiver 8183 displays the point 8183*b* indicating the estimated position, together with the error range 8183*a* of the position. Since this position is estimated by the 9-axis sensor, a larger error range 8183*a* is displayed.

Next, when the user moves from position B to position C, the receiver 8183 specifies the position of the receiver 8183, by obtaining a signal transmitted from another transmitter 8182 that changes in luminance. The receiver 8183 displays the point 8183*b* indicating the specified position, together with the error range 8183*a* of the position. Here, the receiver 8183 does not instantly switch the display from the point 8183*b* indicating the position estimated using the 9-axis sensor and its error range 8183*a* to the position specified as mentioned above and its error range, but smoothly switches the display with movement. The error range 8183*a* becomes smaller as a result.

Figure 69:
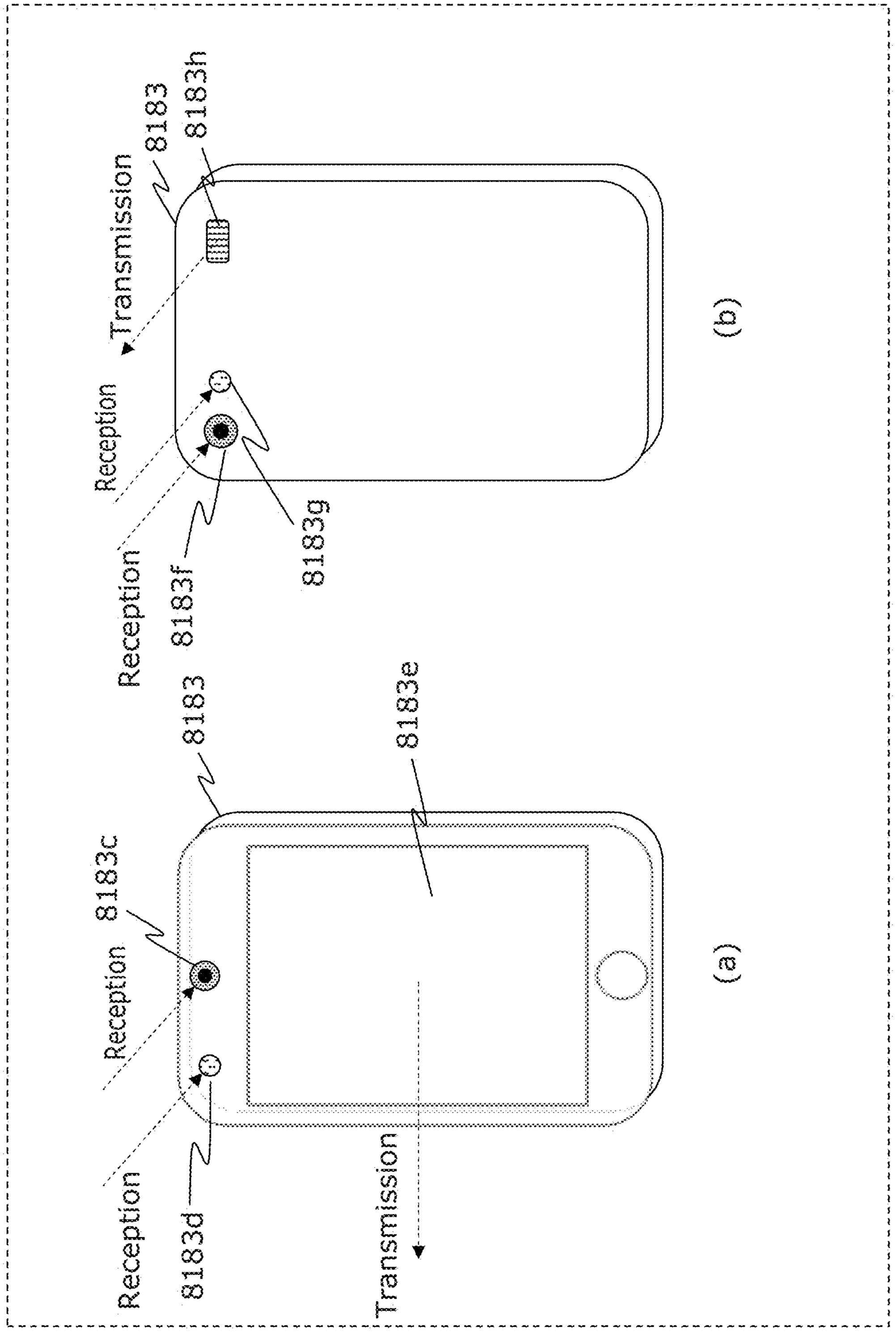
FIG. 69 is a diagram illustrating an example of appearance of a receiver in Embodiment 3.

FIG. 69 is a diagram illustrating an example of appearance of a receiver in Embodiment 3.

The receiver 8183 such as a smartphone (advanced mobile phone) includes an image sensor 8183*c*, an illuminance sensor 8183*d*, and a display 8183*e* on its front surface, as illustrated in (a) in FIG. 69. The image sensor 8183*c* obtains an image including a bright line by capturing a subject that changes in luminance as mentioned above. The illuminance sensor 8183*d* detects the change in luminance of the subject. Hence, the illuminance sensor 8183*d* can be used in place of the image sensor 8183*c*, depending on the state or situation of the subject. The display 8183*e* displays an image and the like. The receiver 8183 may also have a function as a subject that changes in luminance. In this case, the receiver 8183 transmits a signal by causing the display 8183*e* to change in luminance.

The receiver 8183 also includes an image sensor 8183*f*, an illuminance sensor 8183*g*, and a flash light emitting unit 8183*h* on its back surface, as illustrated in (b) in FIG. 69. The image sensor 8183*f* is the same as the above-mentioned image sensor 8183*c*, and obtains an image including a bright line by capturing a subject that changes in luminance as mentioned above. The illuminance sensor 8183*g* is the same as the above-mentioned illuminance sensor 8183*d*, and detects the change in luminance of the subject. Hence, the illuminance sensor 8183*g* can be used in place of the image sensor 8183*f*, depending on the state or situation of the subject. The flash light emitting unit 8183*h* emits a flash for imaging. The receiver 8183 may also have a function as a subject that changes in luminance. In this case, the receiver 8183 transmits a signal by causing the flash light emitting unit 8183*h* to change in luminance.

Figure 70:
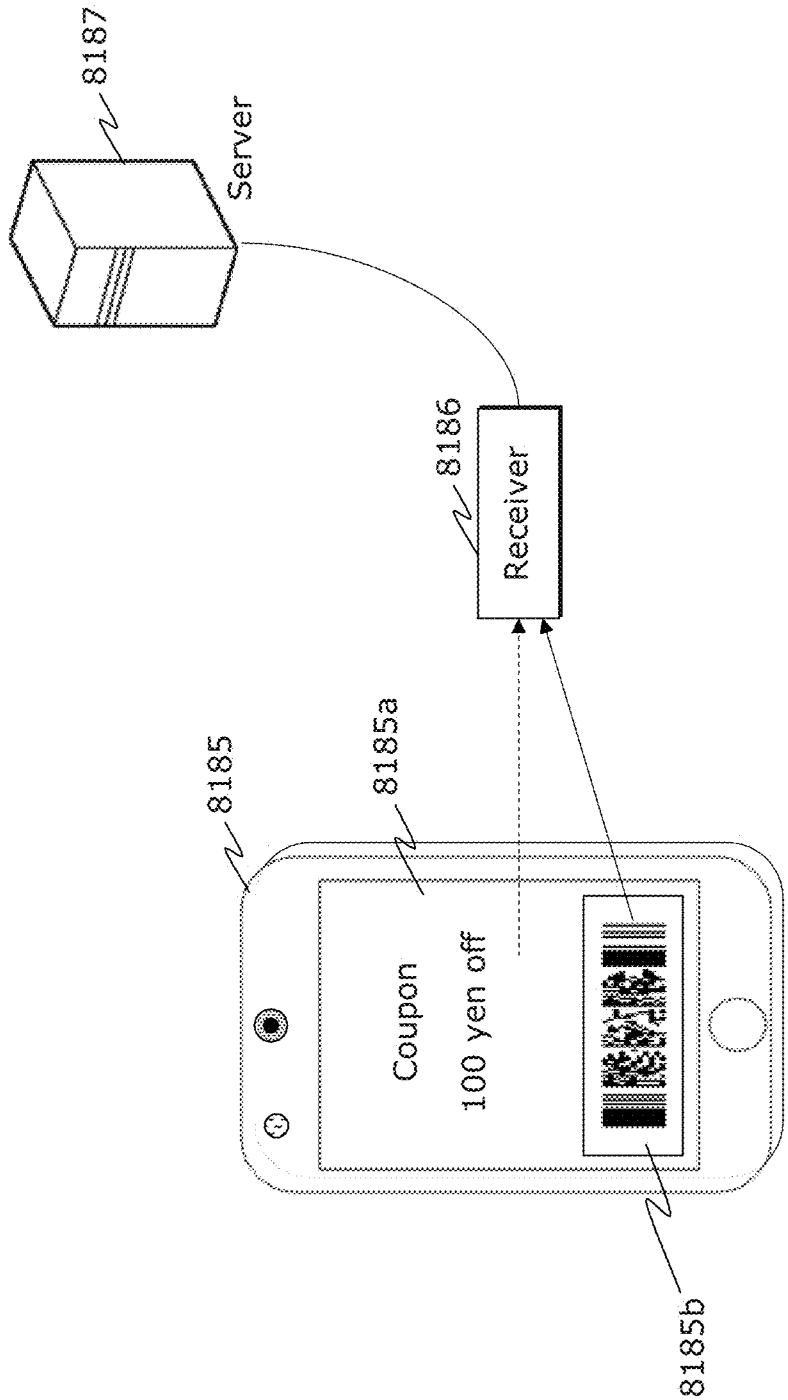
FIG. 70 is a diagram illustrating an example of operation of a transmitter, a receiver, and a server in Embodiment 3.

FIG. 70 is a diagram illustrating an example of operation of a transmitter, a receiver, and a server in Embodiment 3.

A transmitter 8185 such as a smartphone transmits information indicating "Coupon 100 yen off" as an example, by causing a part of a display 8185*a* except a barcode part 8185*b* to change in luminance, i.e., by visible light communication. The transmitter 8185 also causes the barcode part 8185*b* to display a barcode without changing in luminance. The barcode indicates the same information as the above-mentioned information transmitted by visible light communication. The transmitter 8185 further causes the part of the display 8185*a* except the barcode part 8185*b* to display the characters or pictures, e.g., the characters "Coupon 100 yen off", indicating the information transmitted by visible light communication. Displaying such characters or pictures allows the user of the transmitter 8185 to easily recognize what kind of information is being transmitted.

A receiver 8186 performs image capture to obtain the information transmitted by visible light communication and the information indicated by the barcode, and transmits these information to a server 8187. The server 8187 determines whether or not these information match or relate to each other. In the case of determining that these information match or relate to each other, the server 8187 executes a process according to these information. Alternatively, the server 8187 transmits the determination result to the receiver 8186 so that the receiver 8186 executes the process according to these information.

The transmitter 8185 may transmit a part of the information indicated by the barcode, by visible light communication. Moreover, the URL of the server 8187 may be indicated in the barcode. Furthermore, the transmitter 8185 may obtain an ID as a receiver, and transmit the ID to the server 8187 to thereby obtain information associated with the ID. The information associated with the ID is the same as the information transmitted by visible light communication or the information indicated by the barcode. The server 8187 may transmit an ID associated with information (visible light communication information or barcode information) transmitted from the transmitter 8185 via the receiver 8186, to the transmitter 8185.

Figure 71:
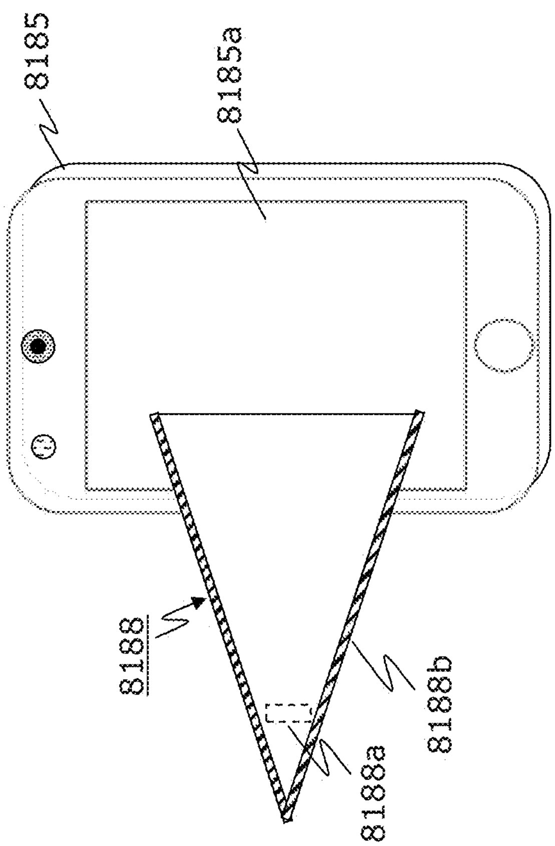
FIG. 71 is a diagram illustrating an example of operation of a transmitter and a receiver in Embodiment 3.

FIG. 71 is a diagram illustrating an example of operation of a transmitter and a receiver in Embodiment 3.

The transmitter 8185 such as a smartphone transmits a signal by causing the display 8185*a* to change in luminance. A receiver 8188 includes a light-resistant cone-shaped container 8188*b* and an illuminance sensor 8188*a*. The illuminance sensor 8188*a* is contained in the container 8188*b*, and located near the tip of the container 8188*b*. When the signal is transmitted from the transmitter 8185 by visible light communication, the opening (bottom) of the container 8188*b* in the receiver 8188 is directed to the display 8185*a*. Since no light other than the light from the display 8185*a* enters the container 8188*b*, the illuminance sensor 8188*a* in the receiver 8188 can appropriately receive the light from the display 8185*a* without being affected by any light which is noise. As a result, the receiver 8188 can appropriately receive the signal from the transmitter 8185.

Figure 72:
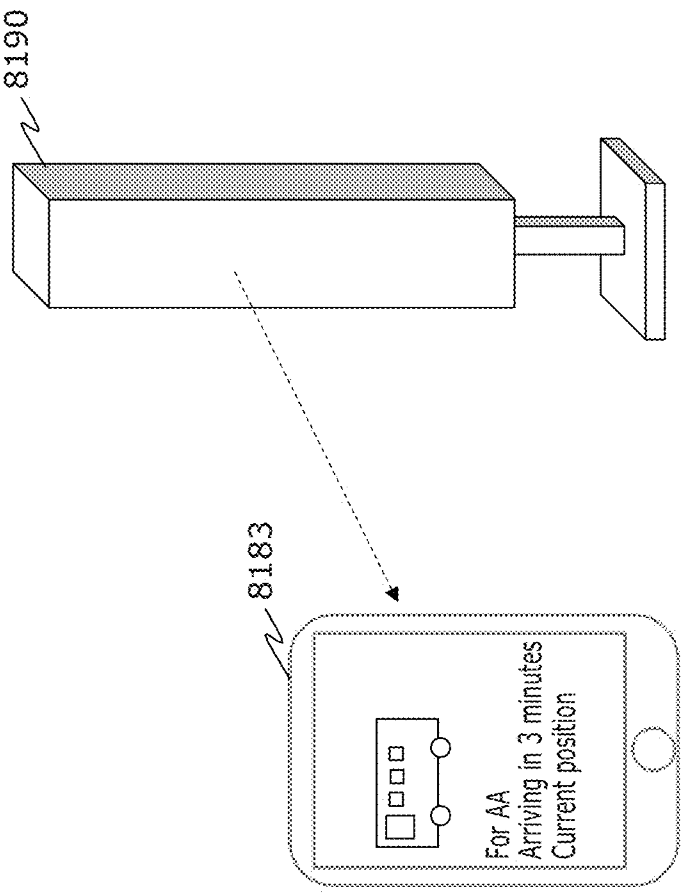
FIG. 72 is a diagram illustrating an example of operation of a transmitter and a receiver in Embodiment 3.

FIG. 72 is a diagram illustrating an example of operation of a transmitter and a receiver in Embodiment 3.

A transmitter 8190 such as a bus stop sign transmits operation information indicating a bus operation state and the like to the receiver 8183, by changing in luminance. For instance, the operation information indicating the destination of a bus, the arrival time of the bus at the bus stop, the current position of the bus, and the like is transmitted to the receiver 8183. Having received the operation information, the receiver 8183 displays the contents of the operation information on its display.

For example, suppose buses with different destinations stop at the bus stop. The transmitter 8190 transmits operation information about these buses with the different destinations. Having received these operation information, the receiver 8183 selects operation information of a bus with a destination that is frequently used by the user, and displays the contents of the selected operation information on the display. In detail, the receiver 8183 specifies the destination of each bus used by the user through a GPS or the like, and records a history of destinations. With reference to this history, the receiver 8183 selects operation information of a bus with a destination frequently used by the user. As an alternative, the receiver 8183 may display the contents of operation information selected by the user from these operation information, on the display. As another alternative, the receiver 8183 may display, with priority, operation information of a bus with a destination frequently selected by the user.

Figure 73:
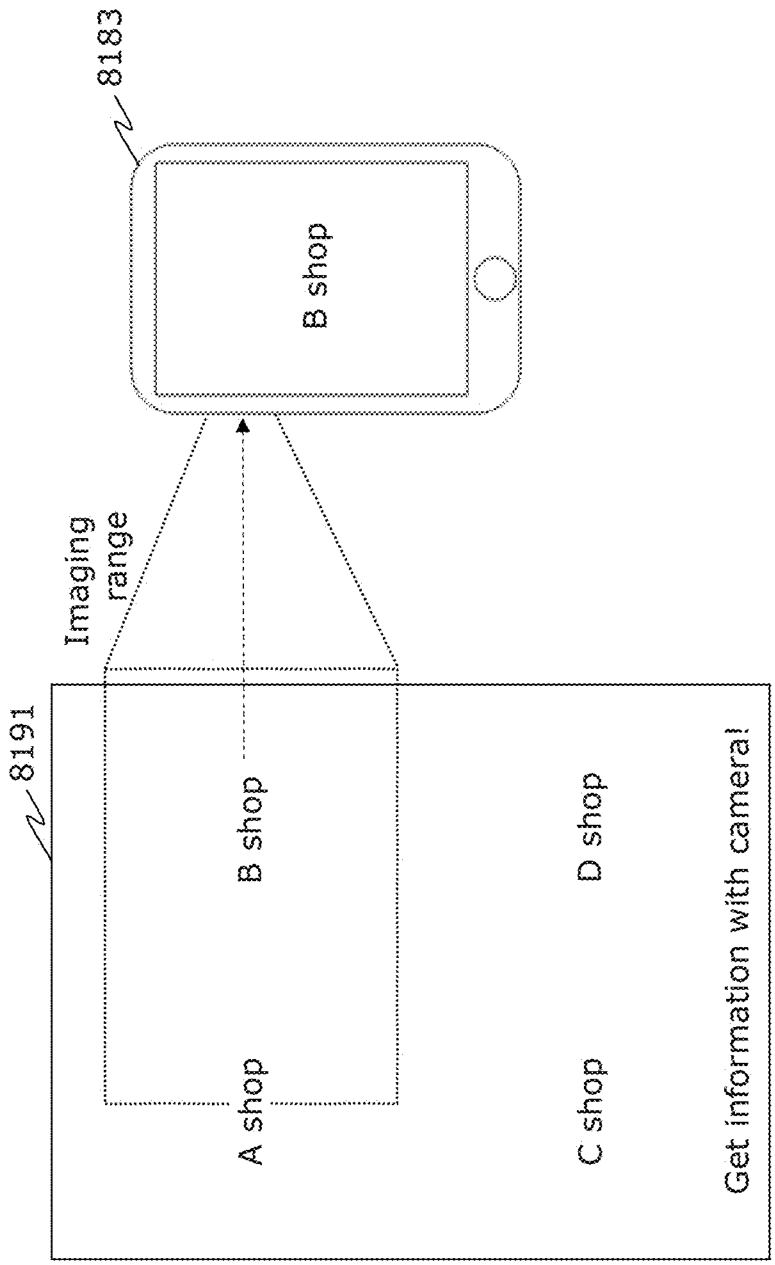
FIG. 73 is a diagram illustrating an example of operation of a transmitter and a receiver in Embodiment 3.

FIG. 73 is a diagram illustrating an example of operation of a transmitter and a receiver in Embodiment 3.

A transmitter 8191 such as a signage transmits information of a plurality of shops to the receiver 8183, by changing in luminance. This information summarizes information about the plurality of shops, and is not information unique to each shop. Accordingly, having received the information by image capture, the receiver 8183 can display information about not only one shop but the plurality of shops. The receiver 8183 selects information about a shop (e.g., "B shop") within the imaging range from the information about the plurality of shops, and displays the selected information. When displaying the information, the receiver 8183 translates the language for expressing the information to a language registered beforehand, and displays the information in the translated language. Moreover, a message prompting for image capture by an image sensor (camera) of the receiver 8183 may be displayed on the transmitter 8191 using characters or the like. In detail, a special application program is started to display, on the transmitter 8191, a message (e.g., "Get information with camera") informing that information can be provided if the transmitter 8191 is captured by camera.

Figure 74:
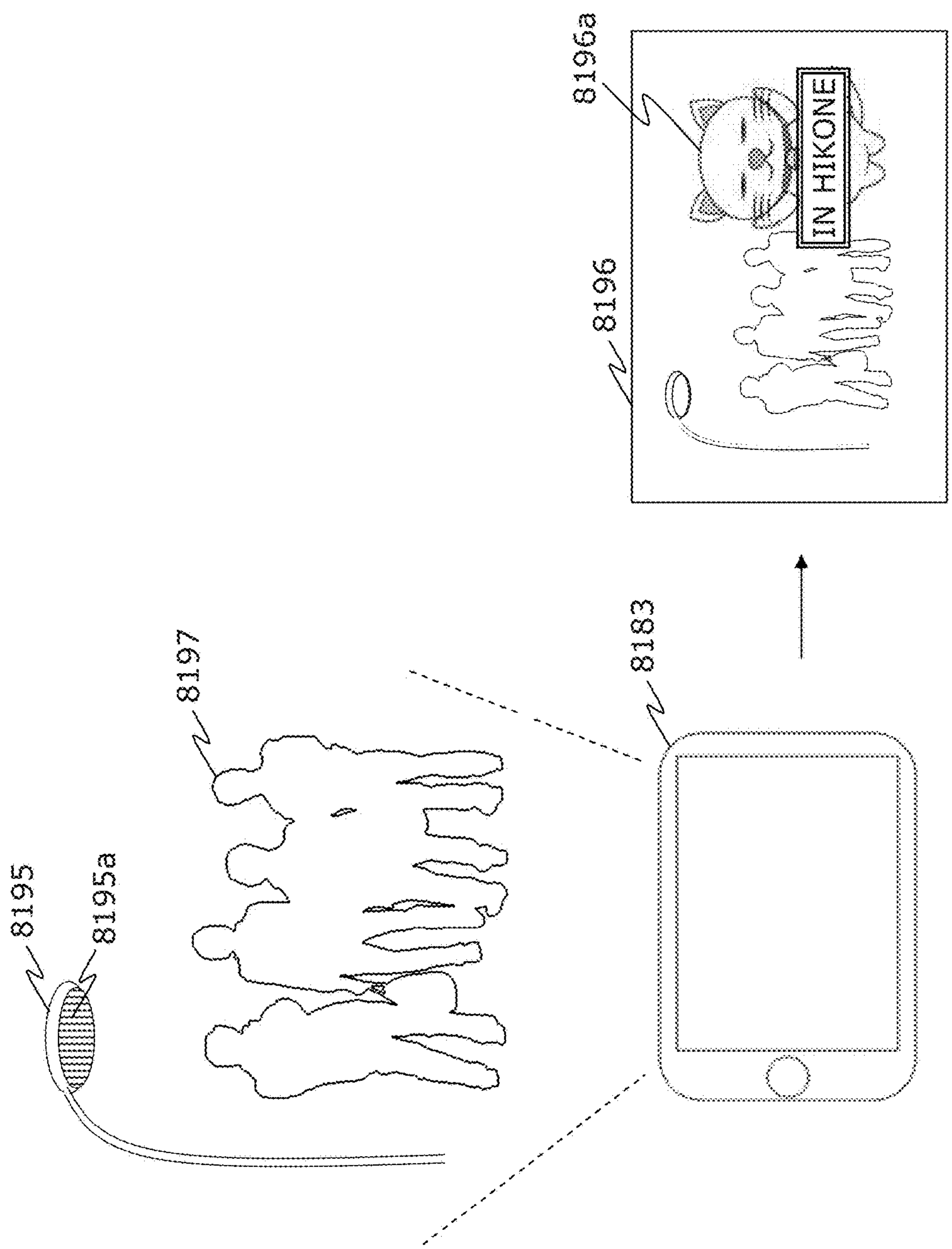
FIG. 74 is a diagram illustrating an example of operation of a transmitter and a receiver in Embodiment 3.

FIG. 74 is a diagram illustrating an example of operation of a transmitter and a receiver in Embodiment 3.

For example, the receiver 8183 captures a subject including a plurality of persons 8197 and a street lighting 8195. The street lighting 8195 includes a transmitter 8195*a* that transmits information by changing in luminance. By capturing the subject, the receiver 8183 obtains an image in which the image of the transmitter 8195*a* appears as the above-mentioned bright line pattern. The receiver 8183 obtains an AR object 8196*a* associated with an ID indicated by the bright line pattern, from a server or the like. The receiver 8183 superimposes the AR object 8196*a* on a normal captured image 8196 obtained by normal imaging, and displays the normal captured image 8196 on which the AR object 8196*a* is superimposed.

Figure 75A:
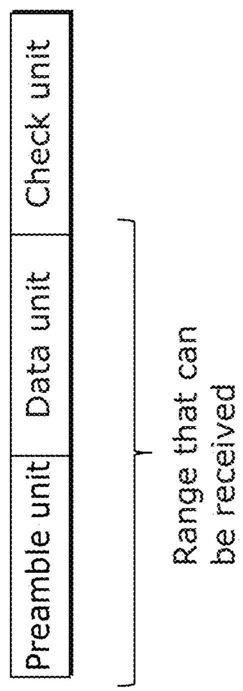
FIG. 75A is a diagram illustrating another example of a structure of information transmitted by a transmitter in Embodiment 3.

FIG. 75A is a diagram illustrating an example of a structure of information transmitted by a transmitter in Embodiment 3.

For example, information transmitted by a transmitter is made up of a preamble unit, a data unit of fixed length, and a check unit. A receiver checks the data unit using the check unit, thus successfully receiving the information made up of these units. When the receiver receives the preamble unit and the data unit but cannot receive the check unit, the receiver omits the check using the check unit. Even in such a case where the check is omitted, the receiver can successfully receive the information made up of these units.

Figure 75B:
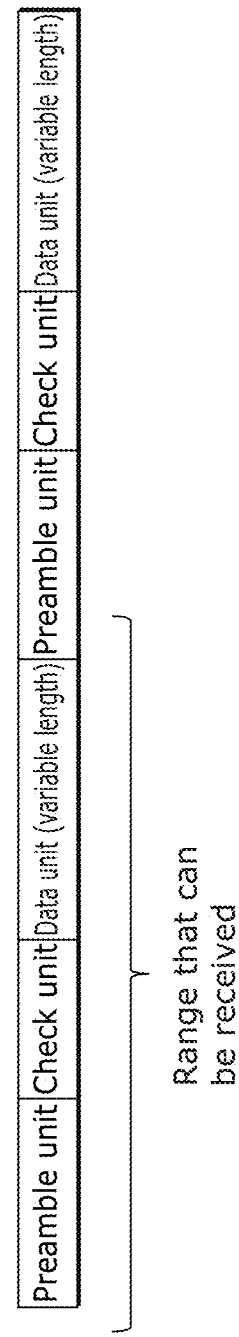
FIG. 75B is a diagram illustrating another example of a structure of information transmitted by a transmitter in Embodiment 3.

FIG. 75B is a diagram illustrating another example of a structure of information transmitted by a transmitter in Embodiment 3.

For example, information transmitted by a transmitter is made up of a preamble unit, a check unit, and a data unit of variable length. The next information transmitted by the transmitter is equally made up of the preamble unit, the check unit, and the data unit of variable length. When a receiver receives one preamble unit and the next preamble unit, the receiver recognizes information from the preamble unit to immediately before the next preamble unit, as one set of significant information. The receiver may also use the check unit, to specify the end of the data unit received following the check unit. In this case, even when the receiver cannot receive the above-mentioned next preamble unit (all or part of the preamble unit), the receiver can appropriately receive one set of significant information transmitted immediately before.

Figure 76:
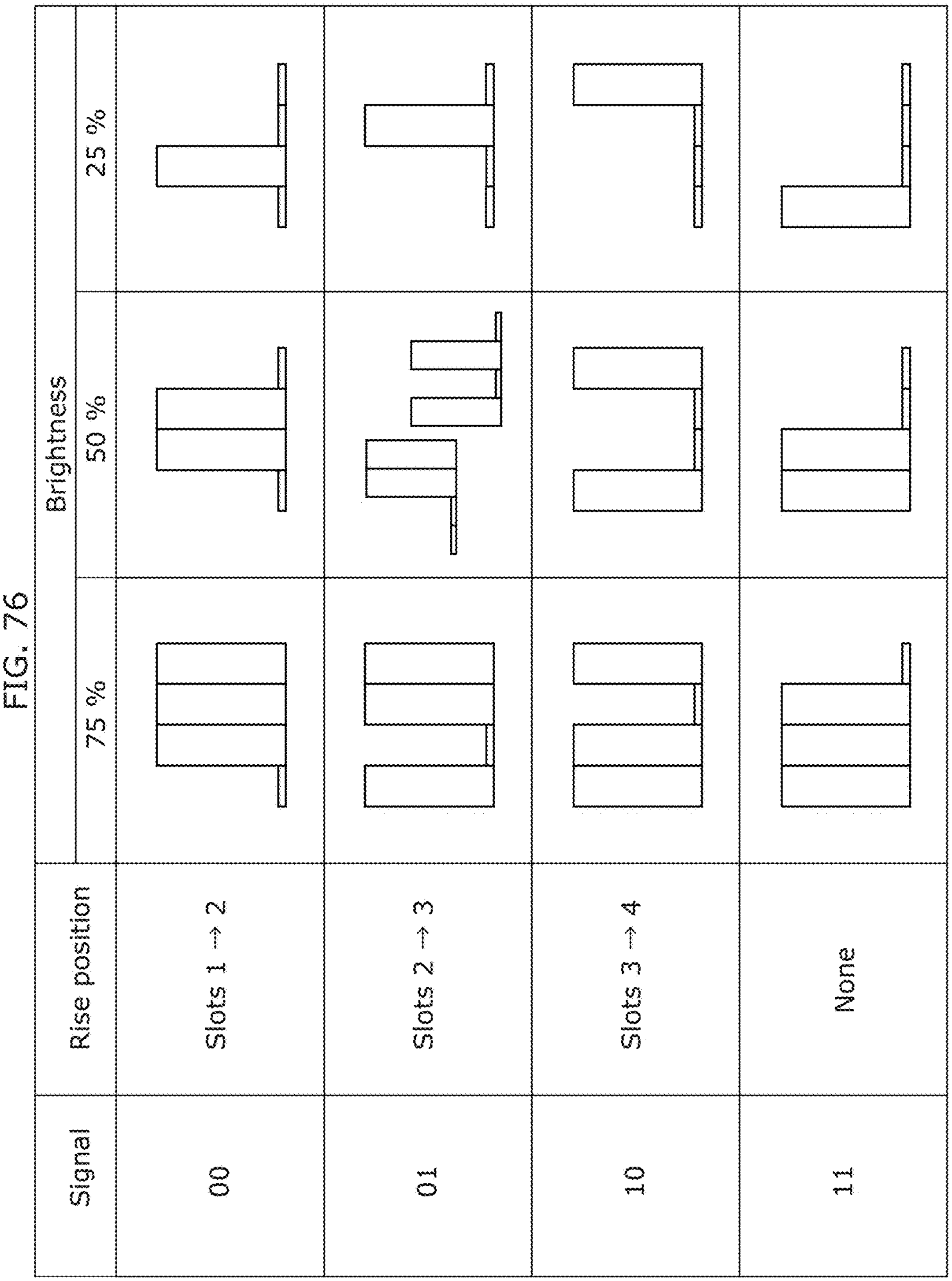
FIG. 76 is a diagram illustrating an example of a 4-value PPM modulation scheme by a transmitter in Embodiment 3.

FIG. 76 is a diagram illustrating an example of a 4-value PPM modulation scheme by a transmitter in Embodiment 3.

A transmitter modulates a transmission signal (signal to be transmitted) to a luminance change pattern by a 4-value PPM modulation scheme. When doing so, the transmitter can maintain the brightness of light that changes in luminance constant, regardless of the transmission signal.

For instance, in the case of maintaining the brightness at 75%, the transmitter modulates each of the transmission signals “00”, “01”, “10”, and “11” to a luminance change pattern in which luminance L (Low) is represented in one of four consecutive slots and luminance H (High) is represented in the other three slots. In detail, the transmitter modulates the transmission signal “00” to a luminance change pattern (L, H, H, H) in which luminance L is represented in the first slot and luminance H is represented in the second to fourth slots. In this luminance change, the luminance rises between the first and second slots. Likewise, the transmitter modulates the transmission signal “01” to a luminance change pattern (H, L, H, H) in which luminance L is represented in the second slot and luminance H is represented in the first, third, and fourth slots. In this luminance change, the luminance rises between the second and third slots.

In the case of maintaining the brightness at 50%, the transmitter modulates each of the transmission signals “00”, “01”, “10”, and “11” to a luminance change pattern in which luminance L (Low) is represented in two of the four slots and luminance H (High) is represented in the other two slots. In detail, the transmitter modulates the transmission signal “00” to a luminance change pattern (L, H, H, L) in which luminance L is represented in the first and fourth slots and luminance H is represented in the second and third slots. In this luminance change, the luminance rises between the first and second slots. Likewise, the transmitter modulates the transmission signal “01” to a luminance change pattern (L, L, H, H) in which luminance L is represented in the first and second slots and luminance H is represented in the third and fourth slots. Alternatively, the transmitter modulates the transmission signal “01” to a luminance change pattern (H, L, H, L) in which luminance L is represented in the second and fourth slots and luminance H is represented in the first and third slots. In this luminance change, the luminance rises between the second and third slots.

In the case of maintaining the brightness at 25%, the transmitter modulates each of the transmission signals “00”, “01”, “10”, and “11” to a luminance change pattern in which luminance L (Low) is represented in three of the four slots and luminance H (High) is represented in the other slot. In detail, the transmitter modulates the transmission signal “00” to a luminance change pattern (L, H, L, L) in which luminance L is represented in the first, third, and fourth slots and luminance H is represented in the second slot. In this luminance change, the luminance rises between the first and second slots. Likewise, the transmitter modulates the transmission signal “01” to a luminance change pattern (L, L, H, L) in which luminance L is represented in the first, second, and fourth slots and luminance H is represented in the third slot. In this luminance change, the luminance rises between the second and third slots.

By the above-mentioned 4-value PPM modulation scheme, the transmitter can suppress flicker, and also easily adjust the brightness in levels. Moreover, a receiver can appropriately demodulate the luminance change pattern by specifying the position at which the luminance rises. Here, the receiver does not use but ignores whether or not the luminance rises at the boundary between one slot group made up of four slots and the next slot group, when demodulating the luminance change pattern.

FIG. 77 is a diagram illustrating an example of a PPM modulation scheme by a transmitter in Embodiment 3.

A transmitter modulates a transmission signal to a luminance change pattern, as in the 4-value PPM modulation scheme illustrated in FIG. 76. Here, the transmitter may perform PPM modulation without switching the luminance between L and H per slot. In detail, the transmitter performs PPM modulation by switching the position at which the luminance rises in the duration (time width) (hereafter referred to as “unit duration”) of four consecutive slots illustrated in FIG. 76, depending on the transmission signal. For example, the transmitter modulates the transmission signal “00” to a luminance change pattern in which the luminance rises at the position of 25% in the unit duration, as illustrated in FIG. 77. Likewise, the transmitter modulates the transmission signal “01” to a luminance change pattern in which the luminance rises at the position of 50% of the unit duration, as illustrated in FIG. 77.

In the case of maintaining the brightness at 75%, the transmitter modulates the transmission signal “00” to a luminance change pattern in which luminance L is represented in the position of 0 to 25% and luminance H is represented in the position of 25 to 100% in the unit duration. In the case of maintaining the brightness at 99%, the transmitter modulates the transmission signal “00” to a luminance change pattern in which luminance L is represented in the position of 24 to 25% and luminance H is represented in the position of 0 to 24% and the position of 25 to 100% in the unit duration. Likewise, in the case of maintaining the brightness at 1%, the transmitter modulates the transmission signal “00” to a luminance change pattern in which luminance L is represented in the position of 0 to 25% and the position of 26 to 100% and luminance H is represented in the position of 25 to 26% in the unit duration.

By such switching the luminance between L and H at an arbitrary position in the unit duration without switching the luminance between L and H per slot, it is possible to adjust the brightness continuously.

FIG. 78 is a diagram illustrating an example of a PPM modulation scheme by a transmitter in Embodiment 3.

A transmitter performs modulation in the same way as in the PPM modulation scheme illustrated in FIG. 77. Here, regardless of the transmission signal, the transmitter modulates the signal to a luminance change pattern in which luminance H is represented at the start of the unit duration and luminance L is represented at the end of the unit duration. Since the luminance rises at the boundary between one unit duration and the next unit duration, a receiver can appropriately specify the boundary. Therefore, the receiver and the transmitter can correct clock discrepancies.

Figure 79A:
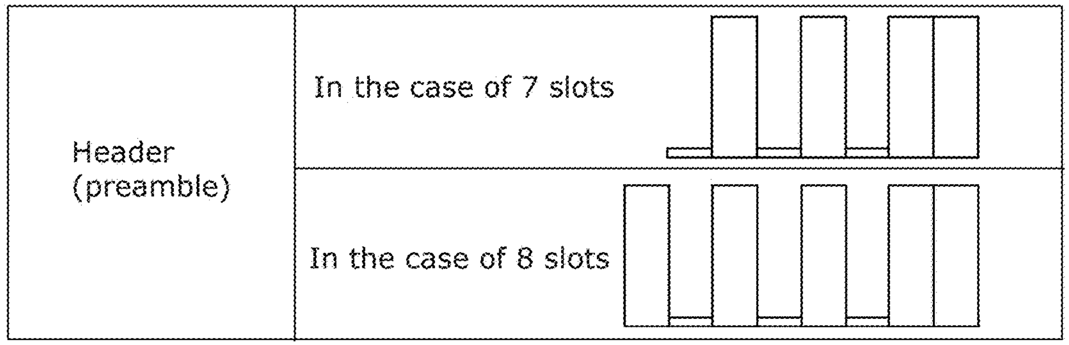
FIG. 79A is a diagram illustrating an example of a luminance change pattern corresponding to a header (preamble unit) in Embodiment 3.

FIG. 79A is a diagram illustrating an example of a luminance change pattern corresponding to a header (preamble unit) in Embodiment 3.

For example, in the case of transmitting the header (preamble unit) illustrated in FIGS. 75A and 75B, a transmitter changes in luminance according to a pattern illustrated in FIG. 79A. In detail, in the case where the header is made up of 7 slots, the transmitter changes in luminance according to the pattern “L, H, L, H, L, H, H”. In the case where the header is made up of 8 slots, the transmitter changes in luminance according to the pattern “H, L, H, L, H, L, H, H”. These patterns are distinguishable from the luminance change patterns illustrated in FIG. 76, with it being possible to clearly inform a receiver that the signal indicated by any of these patterns is the header.

Figure 79B:
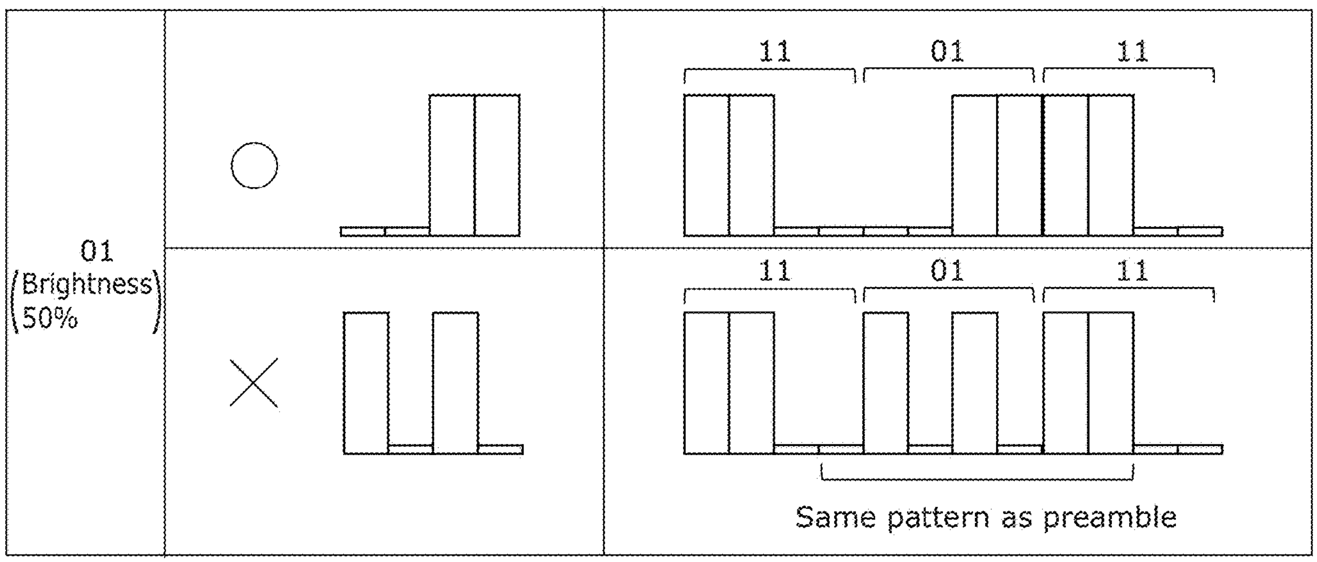
FIG. 79B is a diagram illustrating an example of a luminance change pattern in Embodiment 3.

FIG. 79B is a diagram illustrating an example of a luminance change pattern in Embodiment 3.

In the 4-value PPM modulation scheme, in the case of modulating the transmission signal “01” included in the data unit while maintaining the brightness at 50%, the transmitter modulates the signal to one of the two patterns, as illustrated in FIG. 76. In detail, the transmitter modulates the signal to the first pattern “L, L, H, H” or the second pattern “H, L, H, L”.

Here, suppose the luminance change pattern corresponding to the header is such a pattern as illustrated in FIG. 79A. In this case, it is desirable that the transmitter modulates the transmission signal “01” to the first pattern “L, L, H, H”. For instance, in the case of using the first pattern, the transmission signal “11, 01, 11” included in the data unit is modulated to the pattern “H, H, L, L, L, L, H, H, H, H, L, L”. In the case of using the second pattern, on the other hand, the transmission signal “11, 01, 11” included in the data unit is modulated to the pattern “H, H, L, L, H, L, H, L, H, H, L, L”. The pattern “H, H, L, L, H, L, H, L, H, H, L, L” includes the same pattern as the pattern of the header made up of 7 slots illustrated in FIG. 79A. For clear distinction between the header and the data unit, it is desirable to modulate the transmission signal “01” to the first pattern.

Figure 80A:
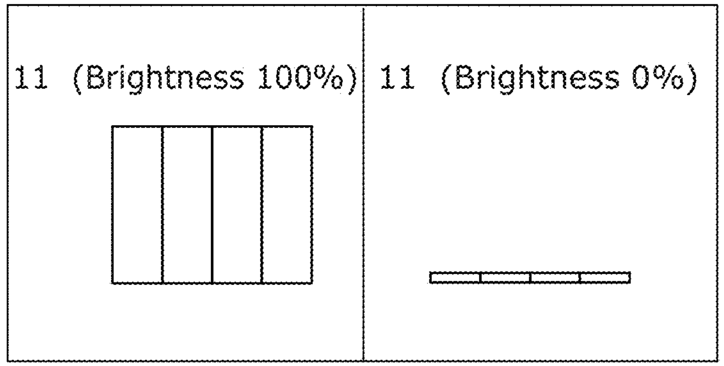
FIG. 80A is a diagram illustrating an example of a luminance change pattern in Embodiment 3.

FIG. 80A is a diagram illustrating an example of a luminance change pattern in Embodiment 3.

In the 4-value PPM modulation scheme, in the case of modulating the transmission signal “11”, the transmitter modulates the signal to the pattern “H, H, H, L”, the pattern “H, H, L, L”, or the pattern “H, L, L, L” so as not to cause a rise in luminance, as illustrated in FIG. 76. However, the transmitter may modulate the transmission signal “11” to the pattern “H, H, H, H” or the pattern “L, L, L, L” in order to adjust the brightness, as illustrated in FIG. 80A.

Figure 80B:
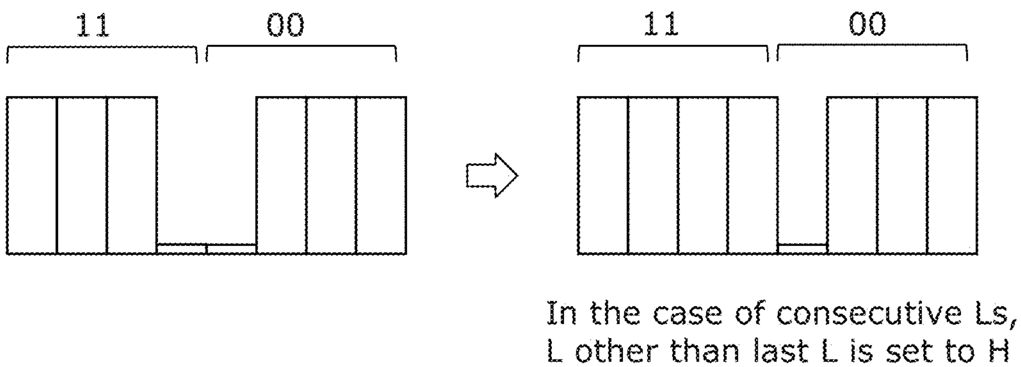
FIG. 80B is a diagram illustrating an example of a luminance change pattern in Embodiment 3.

FIG. 80B is a diagram illustrating an example of a luminance change pattern in Embodiment 3.

In the 4-value PPM modulation scheme, in the case of modulating the transmission signal “11, 00” while maintaining the brightness at 75%, the transmitter modulates the signal to the pattern “H, H, H, L, L, H, H, H”, as illustrated in FIG. 76. However, if luminance L is consecutive, each of the consecutive values of luminance L other than the last value may be changed to H so that luminance L is not consecutive. That is, the transmitter modulates the signal “11, 00” to the pattern “H, H, H, H, L, H, H, H”.

Since luminance L is not consecutive, the load on the transmitter can be reduced. Moreover, the capacitance of the capacitor included in the transmitter can be reduced, enabling a reduction in control circuit capacity. Furthermore, a lighter load on the light source of the transmitter facilitates the production of the light source. The power efficiency of the transmitter can also be enhanced. Besides, since it is ensured that luminance L is not consecutive, the receiver can easily demodulate the luminance change pattern.

Summary of this Embodiment

An information communication method in this embodiment is an information communication method of transmitting a signal using a change in luminance, the information communication method including: determining a pattern of the change in luminance by modulating the signal to be transmitted; and transmitting the signal by a light emitter changing in luminance according to the determined pattern, wherein the pattern of the change in luminance is a pattern in which one of two different luminance values occurs in each arbitrary position in a predetermined duration, and in the determining, the pattern of the change in luminance is determined so that, for each of different signals to be transmitted, a luminance change position in the duration is different and an integral of luminance of the light emitter in the duration is a same value corresponding to preset brightness, the luminance change position being a position at which the luminance rises or a position at which the luminance falls.

In this way, the luminance change pattern is determined so that, for each of the different signals “00”, “01”, “10”, and “11” to be transmitted, the position at which the luminance rises (luminance change position) is different and also the integral of luminance of the light emitter in the predetermined duration (unit duration) is the same value corresponding to the preset brightness (e.g., 99% or 1%), for instance as illustrated in FIG. 77. Thus, the brightness of the light emitter can be maintained constant for each signal to be transmitted, with it being possible to suppress flicker. In addition, a receiver that captures the light emitter can appropriately demodulate the luminance change pattern based on the luminance change position. Furthermore, since the luminance change pattern is a pattern in which one of two different luminance values (luminance H (High) or luminance L (Low)) occurs in each arbitrary position in the unit duration, the brightness of the light emitter can be changed continuously.

For example, the information communication method may include sequentially displaying a plurality of images by switching between the plurality of images, wherein in the determining, each time an image is displayed in the sequentially displaying, the pattern of the change in luminance for identification information corresponding to the displayed image is determined by modulating the identification information as the signal, and in the transmitting, each time the image is displayed in the sequentially displaying, the identification information corresponding to the displayed image is transmitted by the light emitter changing in luminance according to the pattern of the change in luminance determined for the identification information.

In this way, each time an image is displayed, the identification information corresponding to the displayed image is transmitted, for instance as illustrated in FIG. 65. Based on the displayed image, the user can easily select the identification information to be received by the receiver.

For example, in the transmitting, each time the image is displayed in the sequentially displaying, identification information corresponding to a previously displayed image may be further transmitted by the light emitter changing in luminance according to the pattern of the change in luminance determined for the identification information.

In this way, even in the case where, as a result of switching the displayed image, the receiver cannot receive the identification signal transmitted before the switching, the receiver can appropriately receive the identification information transmitted before the switching because the identification information corresponding to the previously displayed image is transmitted together with the identification information corresponding to the currently displayed image, for instance as illustrated in FIG. 66.

For example, in the determining, each time the image is displayed in the sequentially displaying, the pattern of the change in luminance for the identification information corresponding to the displayed image and a time at which the image is displayed may be determined by modulating the identification information and the time as the signal, and in the transmitting, each time the image is displayed in the sequentially displaying, the identification information and the time corresponding to the displayed image may be transmitted by the light emitter changing in luminance according to the pattern of the change in luminance determined for the identification information and the time, and the identification information and a time corresponding to the previously displayed image may be further transmitted by the light emitter changing in luminance according to the pattern of the change in luminance determined for the identification information and the time.

In this way, each time an image is displayed, a plurality of sets of ID time information (information made up of identification information and a time) are transmitted, for instance as illustrated in FIG. 66. The receiver can easily select, from the received plurality of sets of ID time information, a previously transmitted identification signal which the receiver cannot be received, based on the time included in each set of ID time information.

For example, the light emitter may have a plurality of areas each of which emits light, and in the transmitting, in the case where light from adjacent areas of the plurality of areas interferes with each other and only one of the plurality of areas changes in luminance according to the determined pattern of the change in luminance, only an area located at an edge from among the plurality of areas may change in luminance according to the determined pattern of the change in luminance.

In this way, only the area (light emitting unit) located at the edge changes in luminance, for instance as illustrated in (a) in FIG. 59B. The influence of light from another area on the luminance change can therefore be suppressed as compared with the case where only an area not located at the edge changes in luminance. As a result, the receiver can capture the luminance change pattern appropriately.

For example, in the transmitting, in the case where only two of the plurality of areas change in luminance according to the determined pattern of the change in luminance, the area located at the edge and an area adjacent to the area located at the edge from among the plurality of areas may change in luminance according to the determined pattern of the change in luminance.

In this way, the area (light emitting unit) located at the edge and the area (light emitting unit) adjacent to the area located at the edge change in luminance, for instance as illustrated in (b) in FIG. 59B. The spatially continuous luminance change range has a wide area, as compared with the case where areas apart from each other change in luminance. As a result, the receiver can capture the luminance change pattern appropriately.

An information communication method in this embodiment is an information communication method of obtaining information from a subject, the information communication method including: transmitting position information indicating a position of an image sensor used to capture the subject; receiving an ID list that is associated with the position indicated by the position information and includes a plurality of sets of identification information; setting an exposure time of the image sensor so that, in an image obtained by capturing the subject by the image sensor, a bright line corresponding to an exposure line included in the image sensor appears according to a change in luminance of the subject; obtaining a bright line image including the bright line, by capturing the subject that changes in luminance by the image sensor with the set exposure time; obtaining the information by demodulating data specified by a pattern of the bright line included in the obtained bright line image; and searching the ID list for identification information that includes the obtained information.

In this way, since the ID list is received beforehand, even when the obtained information "bc" is only a part of identification information, the appropriate identification information "abcd" can be specified based on the ID list, for instance as illustrated in FIG. 61.

For example, in the case where the identification information that includes the obtained information is not uniquely specified in the searching, the obtaining of a bright line image and the obtaining of the information may be repeated to obtain new information, and the information communication method may further include searching the ID list for the identification information that includes the obtained information and the new information.

In this way, even in the case where the obtained information "b" is only a part of identification information and the identification information cannot be uniquely specified with this information alone, the new information "c" is obtained and so the appropriate identification information "abcd" can be specified based on the new information and the ID list, for instance as illustrated in FIG. 61.

An information communication method in this embodiment is an information communication method of obtaining information from a subject, the information communication method including: setting an exposure time of an image sensor so that, in an image obtained by capturing the subject by the image sensor, a bright line corresponding to an exposure line included in the image sensor appears according to a change in luminance of the subject; obtaining a bright line image including the bright line, by capturing the subject that changes in luminance by the image sensor with the set exposure time; obtaining identification information by demodulating data specified by a pattern of the bright line included in the obtained bright line image; transmitting the obtained identification information and position information indicating a position of the image sensor; and receiving error notification information for notifying an error, in the case where the obtained identification information is not included in an ID list that is associated with the position indicated by the position information and includes a plurality of sets of identification information.

In this way, the error notification information is received in the case where the obtained identification information is not included in the ID list, for instance as illustrated in FIG. 63. Upon receiving the error notification information, the user of the receiver can easily recognize that information associated with the obtained identification information cannot be obtained.

Embodiment 4

This embodiment describes each example of application using a receiver such as a smartphone and a transmitter for transmitting information as a blink pattern of an LED, an organic EL device, or the like in Embodiments 1 to 3 described above, according to situation.

Situation: In Front of Store

An example of application in a situation where a user carrying a receiver is in front of a store bearing an advertisement sign which functions as a transmitter is described first, with reference to FIGS. 81 to 85.

Figure 81:
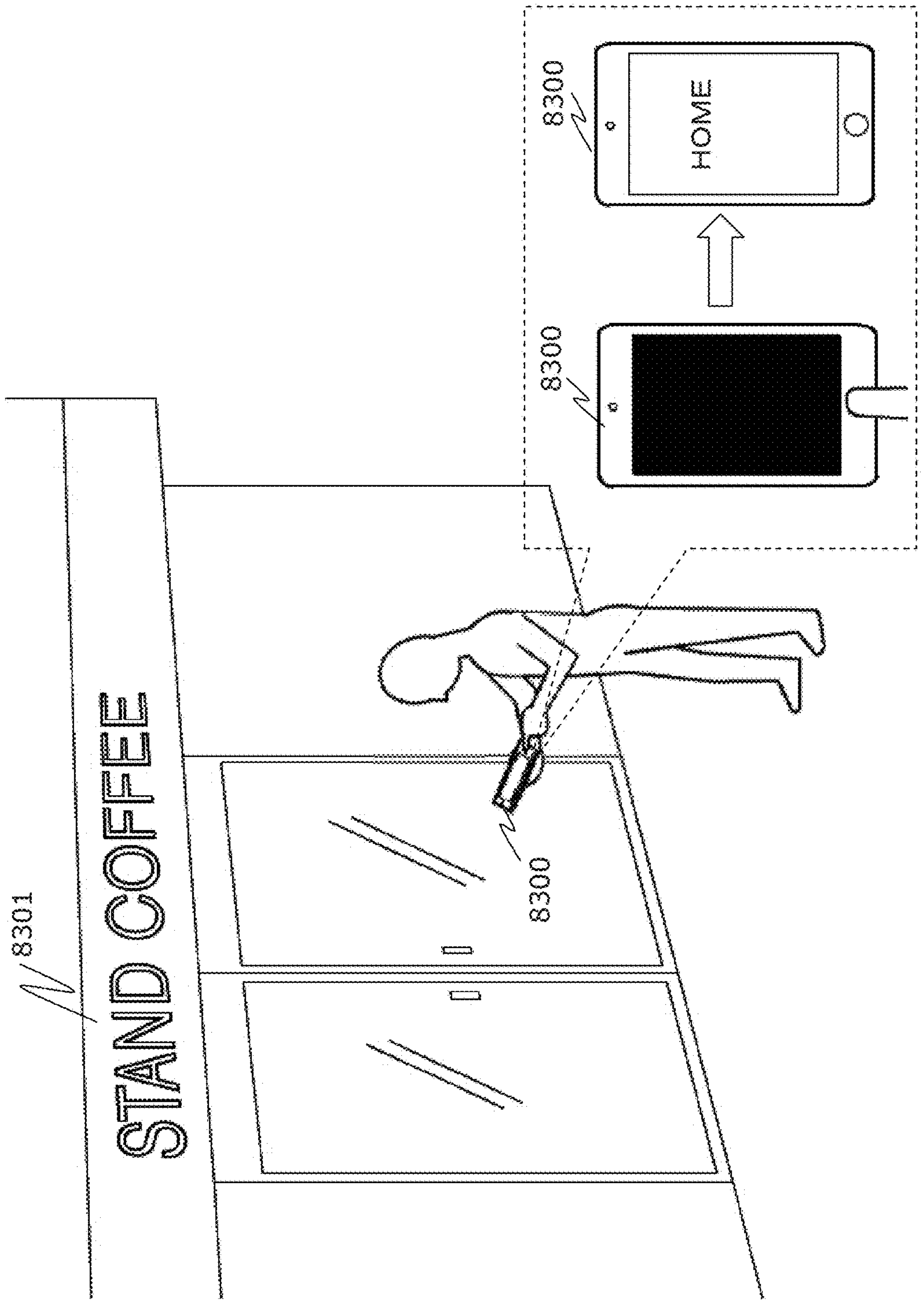
FIG. 81 is a diagram illustrating an example of operation of a receiver in an in-front-of-store situation in Embodiment 4.

FIG. 81 is a diagram illustrating an example of operation of a receiver in the in-front-of-store situation.

For example, when a user carrying a receiver 8300 (terminal device) such as a smartphone is walking, the user finds a sign 8301 of a store. The sign 8301 is a transmitter (subject) that transmits a signal using a change in luminance, like the transmitter in any of Embodiments 1 to 3 described above. The user is interested in the store and, upon determining that the sign 8301 is transmitting a signal by changing in luminance, operates the receiver 8300 to start visible light communication application software (hereafter referred to as "communication application") of the receiver 8300.

Figure 82:
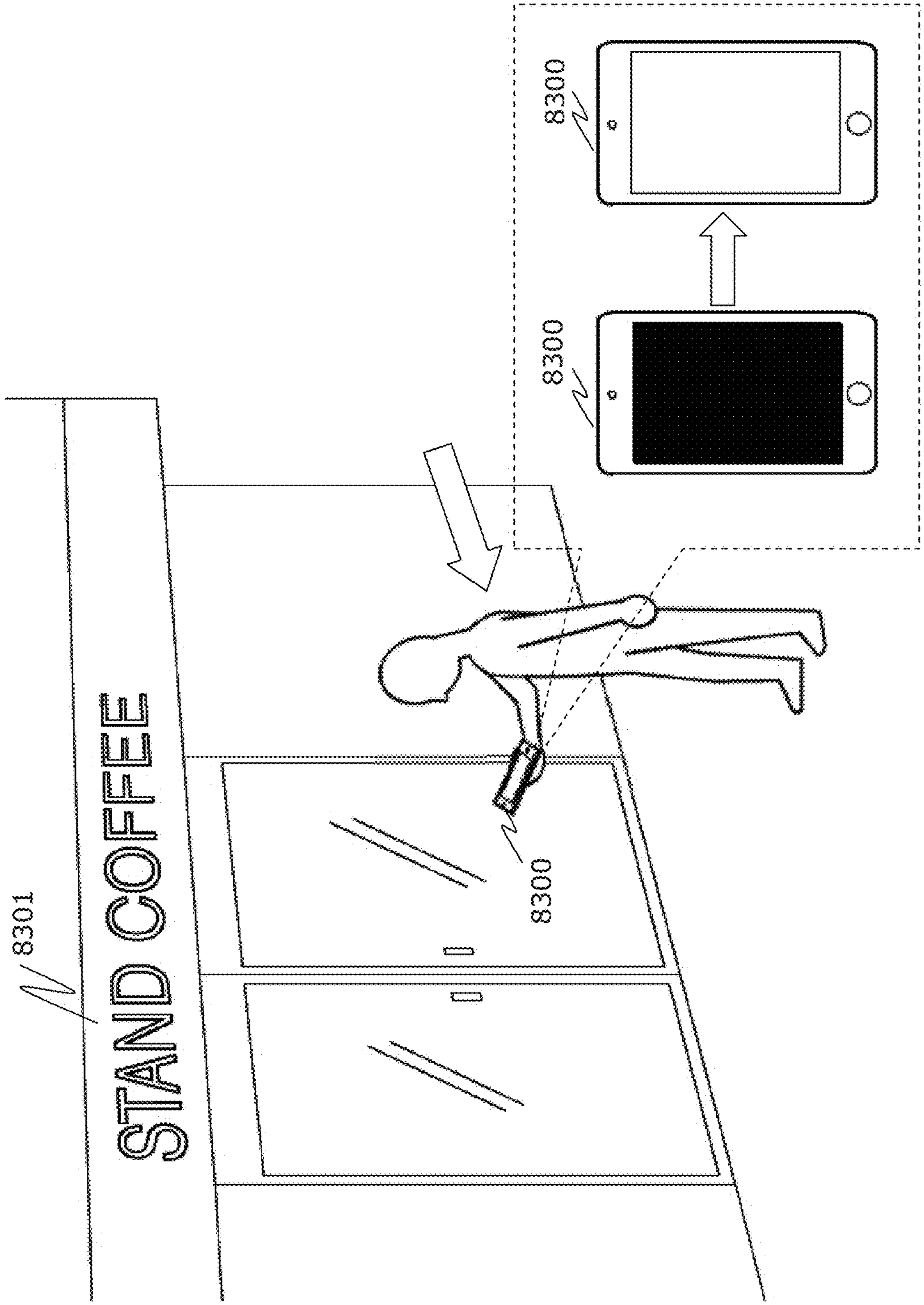
FIG. 82 is a diagram illustrating anther example of operation of a receiver in an in-front-of-store situation in Embodiment 4.

FIG. 82 is a diagram illustrating another example of operation of the receiver 8300 in the in-front-of-store situation.

The receiver 8300 may automatically start the communication application, without being operated by the user. For example, the receiver 8300 detects the current position of the receiver 8300 using a GPS, a 9-axis sensor, or the like, and determines whether or not the current position is in a predetermined specific area for the sign 8301. The specific area is an area near the sign 8301. In the case of determining that the current position of the receiver 8300 is in the specific area, the receiver 8300 starts the communication application. The receiver 8300 may also start the communication application upon detecting, through its 9-axis sensor or the like, the user sticking the receiver 8300 out or turning the receiver 8300. This saves the user operation, and provides ease of use.

Figure 83:
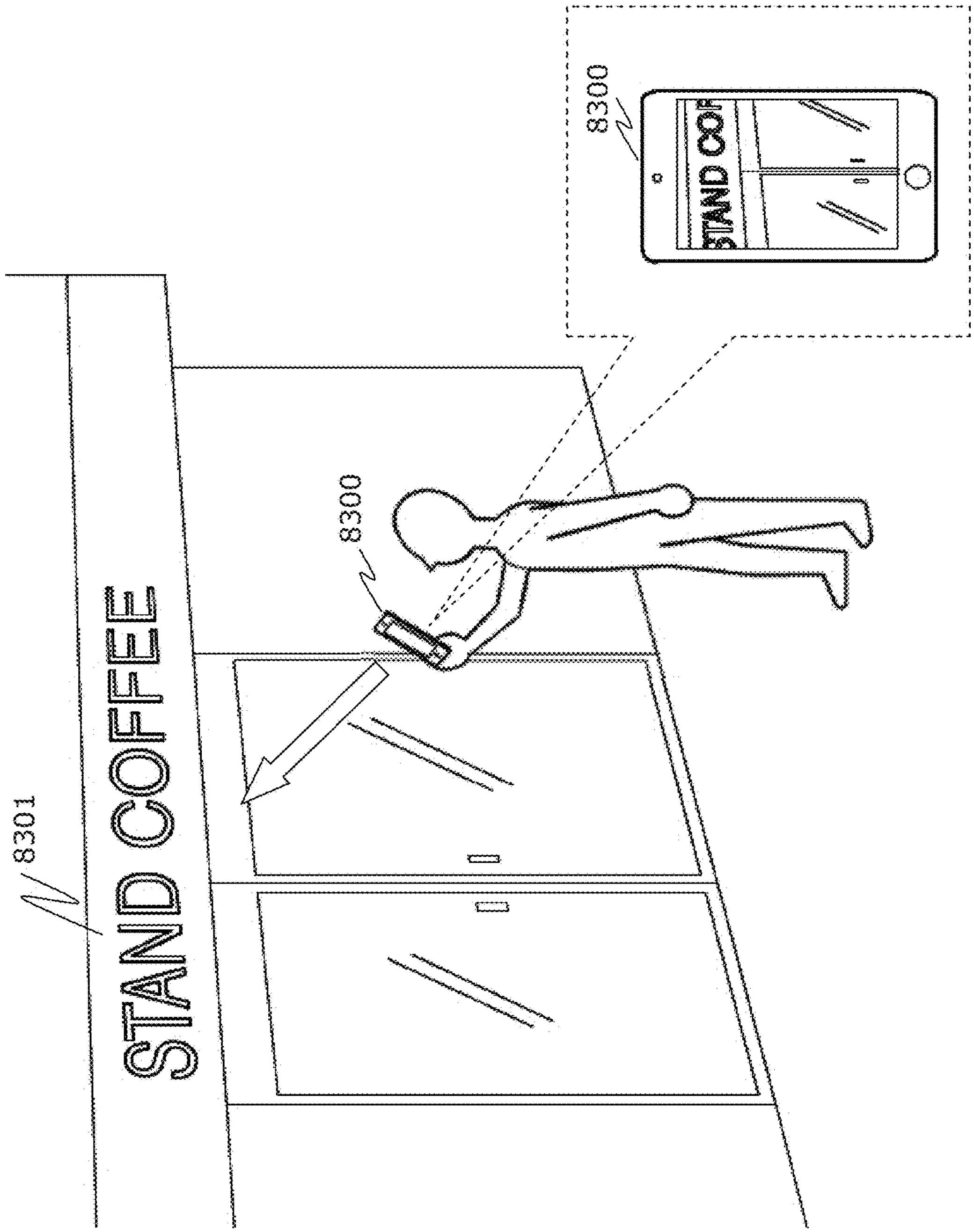
FIG. 83 is a diagram illustrating an example of next operation of a receiver in an in-front-of-store situation in Embodiment 4.

FIG. 83 is a diagram illustrating an example of next operation of the receiver 8300 in the in-front-of-store situation.

After starting the communication application as described above, the receiver 8300 captures (visible light imaging) the sign 8301 that functions as a transmitter for transmitting a signal using a change in luminance. That is, the receiver 8300 performs visible light communication with the sign 8301.

Figure 84:
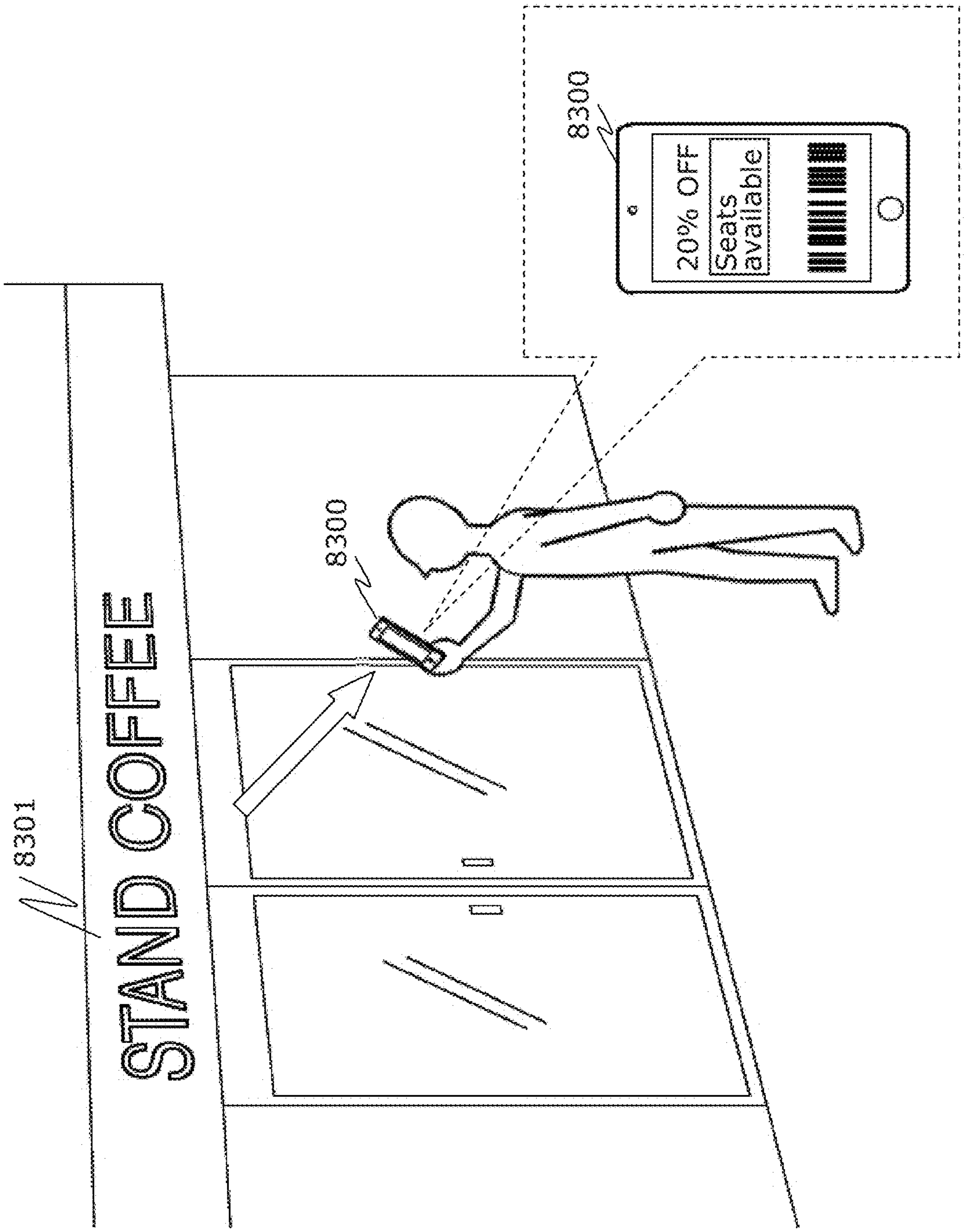
FIG. 84 is a diagram illustrating an example of next operation of a receiver in an in-front-of-store situation in Embodiment 4.

FIG. 84 is a diagram illustrating an example of next operation of the receiver 8300 in the in-front-of-store situation.

The receiver 8300 obtains an image including a bright line, as a result of capturing the sign 8301. The receiver 8300 obtains a device ID of the sign 8301, by demodulating data specified by the pattern of the bright line. That is, the receiver 8300 obtains the device ID from the sign 8301, by visible light imaging or visible light communication in Embodiments 1 to 3. The receiver 8300 transmits the device ID to a server, and obtains advertisement information (service information) associated with the device ID from the server.

The receiver 8300 may obtain the advertisement information associated with the device ID, from a plurality of sets of advertisement information held beforehand. In this case, when determining that the current position of the receiver 8300 is in the above-mentioned specific area, the receiver 8300 notifies the server of the specific area or the current position, and obtains all device IDs corresponding to the specific area and advertisement information associated with each of the device IDs from the server and holds (caches) them beforehand. By doing so, upon obtaining the device ID of the sign 8301 in the specific area, the receiver 8300 can promptly obtain the advertisement information associated with the device ID of the sign 8301 from the pre-stored advertisement information associated with each device ID, with no need to request the advertisement information associated with the device ID from the server.

Upon obtaining the advertisement information associated with the device ID of the sign 8301, the receiver 8300 displays the advertisement information. For instance, the receiver 8300 displays a coupon and availability of the store shown by the sign 8301 and a barcode indicating the same contents.

The receiver 8300 may obtain not only the device ID but also privilege data from the sign 8301 by visible light communication. For example, the privilege data indicates a random ID (random number), the time at which or period during which the privilege data is transmitted, or the like. In the case of receiving the privilege data, the receiver 8300 transmits the privilege data to the server together with the device ID. The receiver 8300 then obtains advertisement information associated with the device ID and the privilege data. The receiver 8300 can thus receive different advertisement information according to the privilege data. As an example, if the sign 8301 is captured early in the morning, the receiver 8300 can obtain and display advertisement information indicating an early bird discount coupon. In other words, the advertisement by the same sign can be varied according to the privilege data (e.g., hours). As a result, the user can be provided with a service suitable for hours and the like. In this embodiment, the presentation (display) of information such as service information to the user is referred to as "service provision".

The receiver 8300 may also obtain, by visible light communication, 3D information indicating the spatial placement of the sign 8301 with high accuracy (within a tolerance of 1 m), from the sign 8301 together with the device ID. Alternatively, the receiver 8300 may obtain the 3D information associated with the device ID from the server. The receiver 8300 may obtain size information indicating the size of the sign 8301, instead of or together with the 3D information. In the case of receiving the size information, the receiver 8300 can calculate the distance from the receiver 8300 to the sign 8301, based on the difference between the size of the sign 8301 indicated by the size information and the size of the sign 8301 shown in the captured image.

Moreover, when transmitting the device ID obtained by visible light communication to the server, the receiver 8300 may transmit retention information (ancillary information) retained in the receiver 8300 to the server together with the device ID. For instance, the retention information is personal information (e.g., age, sex) or a user ID of the user of the receiver 8300. Having received the retention information together with the device ID, the server transmits advertisement information associated with the retention information (the personal information or user ID) from among one or more sets of advertisement information associated with the device ID, to the receiver 8300. The receiver 8300 can thus receive store advertisement information suitable for the personal information and the like, store advertisement information corresponding to the user ID, or the like. As a result, the user can be provided with a more valuable service.

As an alternative, the retention information indicates a reception condition set in the receiver 8300 beforehand. For example, in the case where the store is a restaurant, the reception condition is the number of customers. Having received such retention information together with the device ID, the server transmits advertisement information associated with the reception condition (the number of customers) from among one or more sets of advertisement information associated with the device ID, to the receiver 8300. The receiver 8300 can thus receive store advertisement information suitable for the number of customers, such as availability information for the number of customers. The store can achieve customer attraction and profit optimization, by displaying advertisement information with a different discount rate according to the number of customers, the day of the week, or the time of day.

As another alternative, the retention information indicates the current position detected by the receiver 8300 beforehand. Having received such retention information together with the device ID, the server transmits not only advertisement information associated with the device ID but also one or more other device IDs corresponding to the current position (the current position and its surroundings) indicated by the retention information and advertisement information associated with each of the other device IDs, to the receiver 8300. The receiver 8300 can cache the other device IDs and the advertisement information associated with each of the other device IDs. Accordingly, when the receiver 8300 performs visible light communication with another transmitter in the current position (the current position and its surroundings), the receiver 8300 can promptly obtain advertisement information associated with the device ID of this other transmitter, with no need to access the server.

Figure 85:
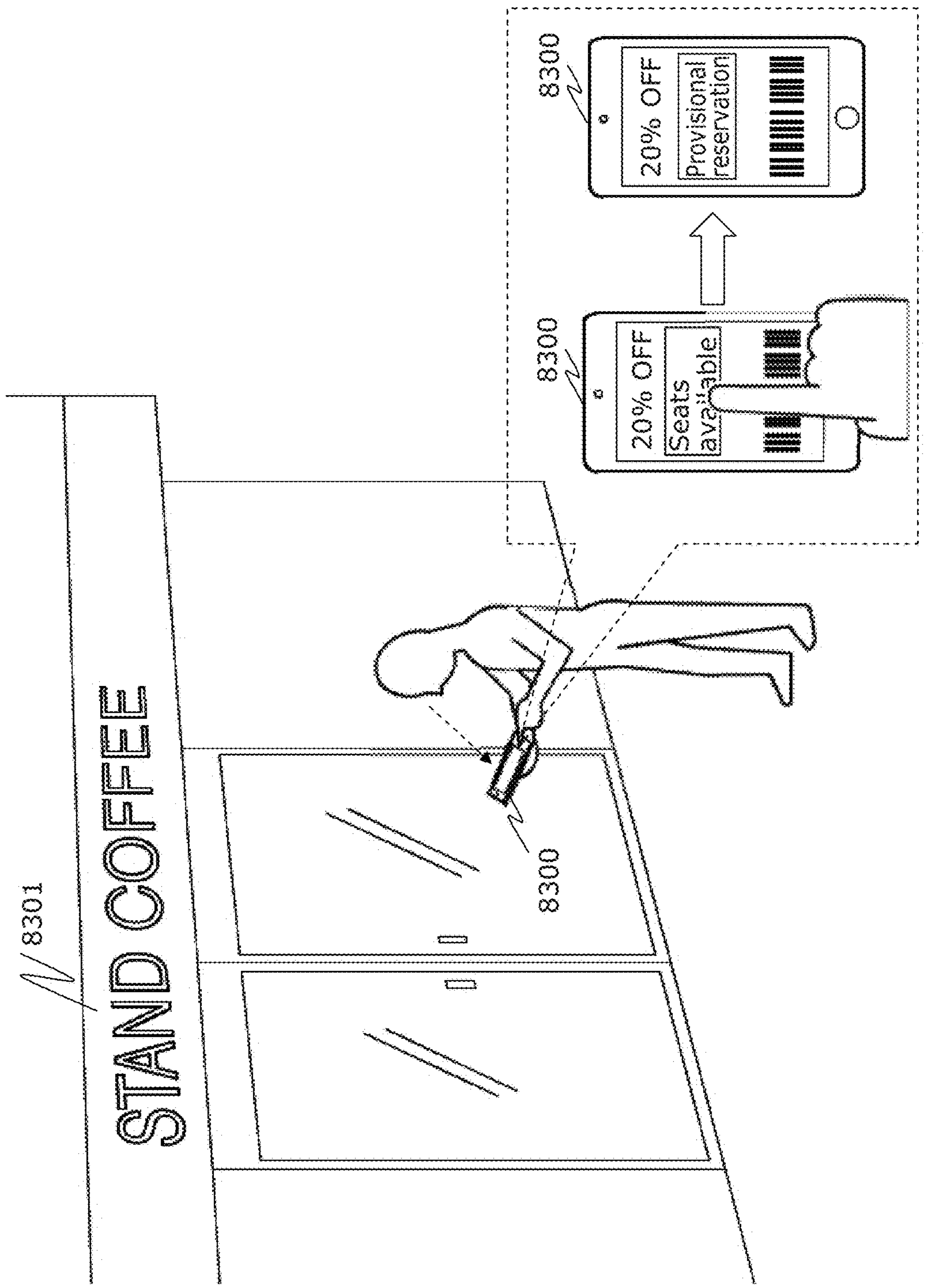
FIG. 85 is a diagram illustrating an example of next operation of a receiver in an in-front-of-store situation in Embodiment 4.

FIG. 85 is a diagram illustrating an example of next operation of the receiver 8300 in the in-front-of-store situation.

Upon obtaining the advertisement information from the server as described above, the receiver 8300 displays, for example, the "Seats available" button as the availability indicated by the advertisement information. When the user performs an operation of touching the "Seats available" button with his or her finger, the receiver 8300 notifies the server of the operation. When notified of the operation, the server makes a provisional reservation at the store of the sign 8301, and notifies the receiver 8300 of the completion of the provisional reservation. The receiver 8300 receives the notification from the server, and displays the character string "Provisional reservation" indicating the completion of the provisional reservation, instead of the "Seats available" button. The receiver 8300 stores an image including: the coupon of the store shown by the sign 8301; the character string "Provisional reservation" proving the provisional reservation at the store; and a barcode indicating the same contents, in a memory as a prior obtainment image.

Here, the server can log information relating to visible light communication performed between the sign 8301 and the receiver 8300, by the operation described with reference to FIGS. 84 and 85. In detail, the server can log the device ID of the transmitter (sign) performing visible light communication, the location where visible light communication is performed (the current position of the receiver 8300), the privilege data indicating, for example, the time when visible light communication is performed, the personal information of the user of the receiver 8300 performing visible light communication, and so on. Through the use of at least one of these logged sets of information, the server can analyze the value of the sign 8301, i.e., the contribution of the sign 8301 to the advertisement of the store, as advertising effectiveness.

Situation: In Store

An example of application in a situation where the user carrying the receiver 8300 enters the store corresponding to the displayed advertisement information (service information) is described next, with reference to FIGS. 86 to 94.

Figure 86:
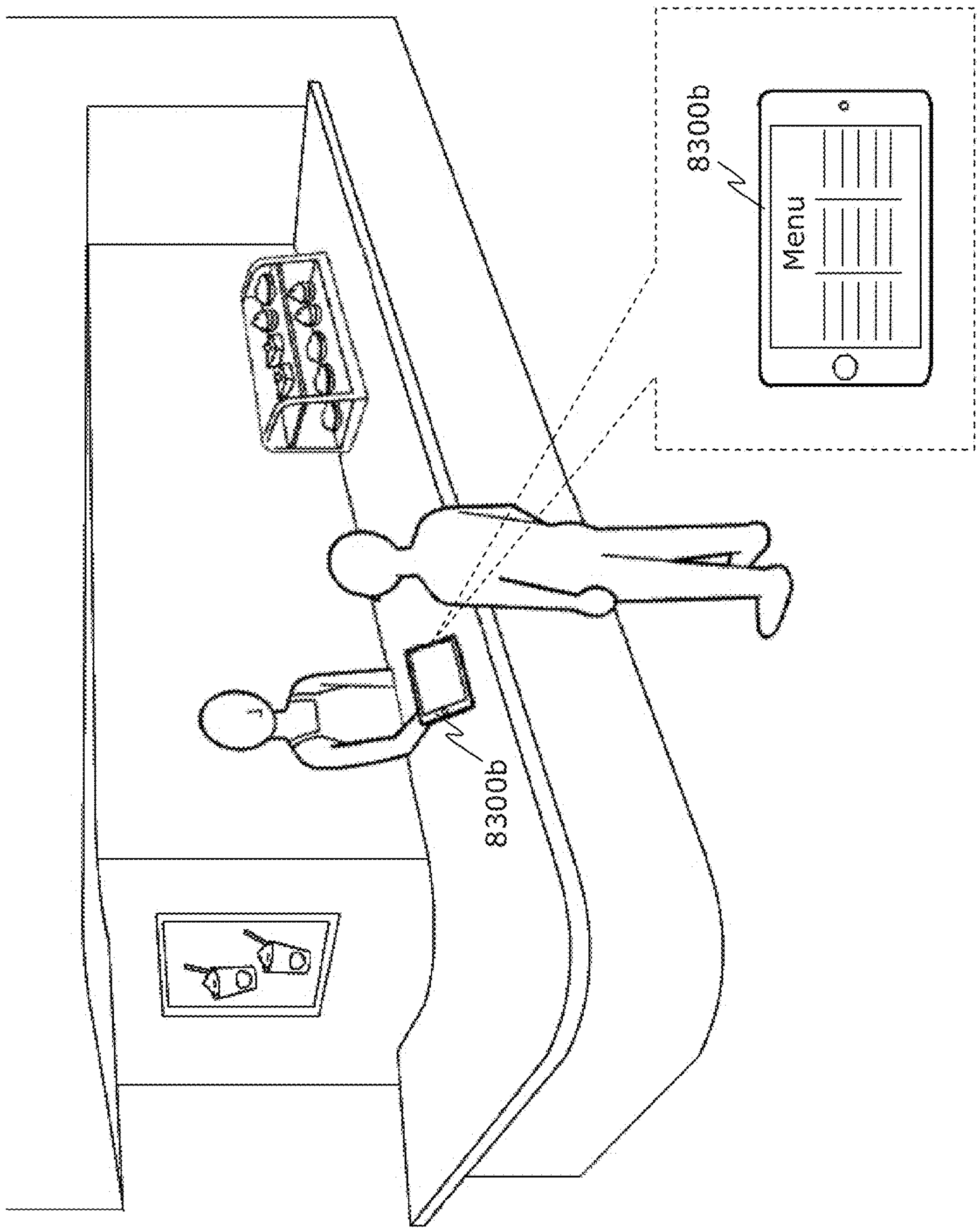
FIG. 86 is a diagram illustrating an example of operation of a display device in an in-front-of-store situation in Embodiment 4.

FIG. 86 is a diagram illustrating an example of operation of a display device in the in-store situation.

For example, the user of the receiver 8300 that has performed visible light communication with the above-mentioned sign 8301 enters the store corresponding to the displayed advertisement information. At this time, the receiver 8300 detects the user entering the store corresponding to the advertisement information displayed using visible light communication (i.e., detects the entrance). For instance, after performing visible light communication with the sign 8301, the receiver 8300 obtains store information indicating the location of the store associated with the device ID of the sign 8301, from the server. The receiver 8300 then determines whether or not the current position of the receiver 8300 obtained using the GPS, the 9-axis sensor, or the like enters the location of the store indicated by the store information. The receiver 8300 detects the above-mentioned entrance, by determining that the current position enters the location of the store.

Upon detecting the entrance, the receiver 8300 notifies a display device **8300*b* of the entrance, via the server or the like. Alternatively, the receiver 8300 notifies the display device 8300*b* of the entrance by visible light communication or wireless communication. When notified of the entrance, the display device 8300*b* obtains product service information indicating, for example, a menu of products or services provided in the store, and displays the menu indicated by the product service information. The display device 8300*b* may be a mobile terminal carried by the user of the receiver 8300** or the store staff, or a device installed in the store.

Figure 87:
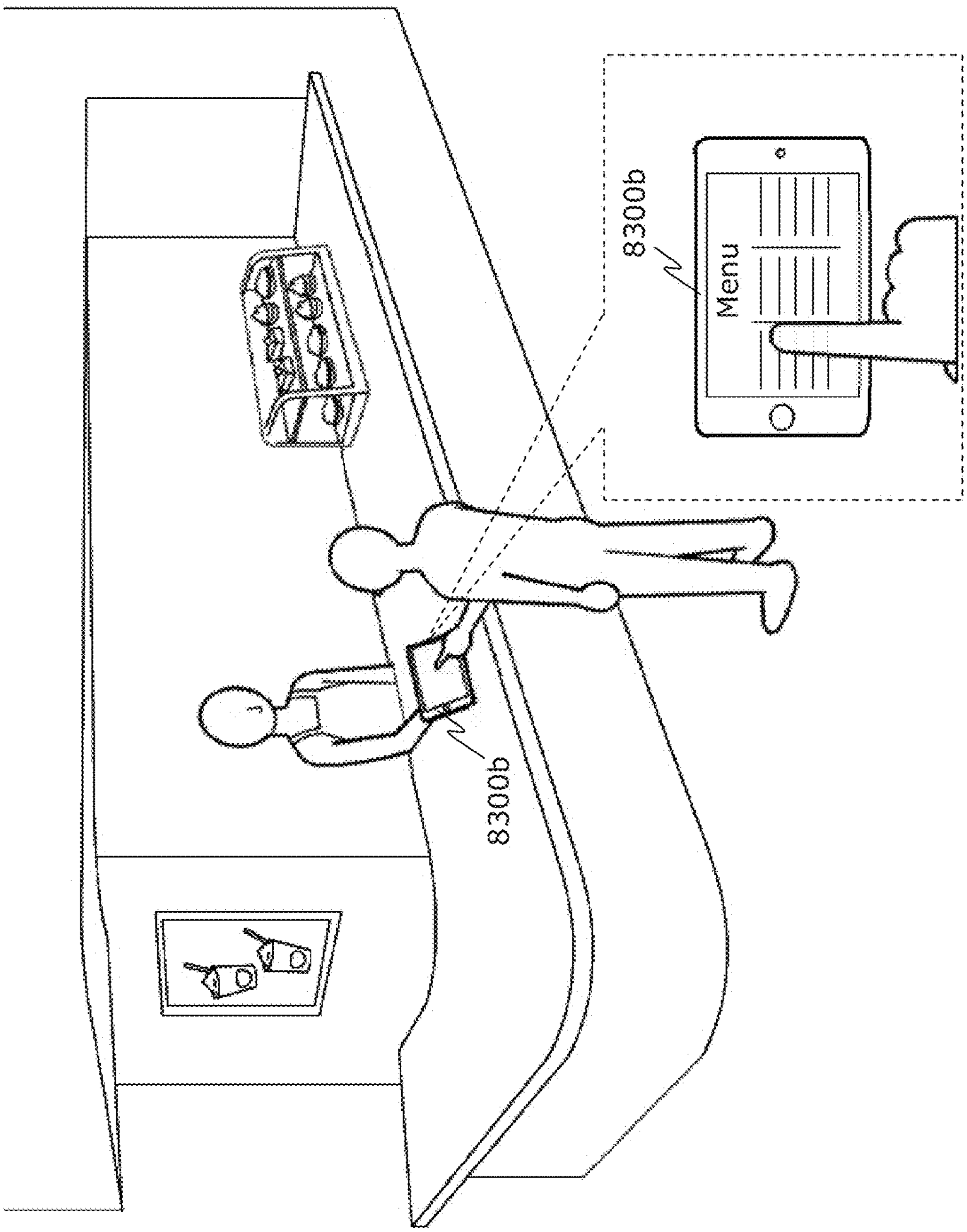
FIG. 87 is a diagram illustrating an example of next operation of a display device in an in-front-of-store situation in Embodiment 4.

FIG. 87 is a diagram illustrating an example of next operation of the display device **8300*b*** in the in-store situation.

The user selects a desired product from the menu displayed on the display device **8300*b*. In detail, the user performs an operation of touching the part of the menu where the name of the desired product is displayed. The display device 8300*b*** receives the product selection operation result.

Figure 88:
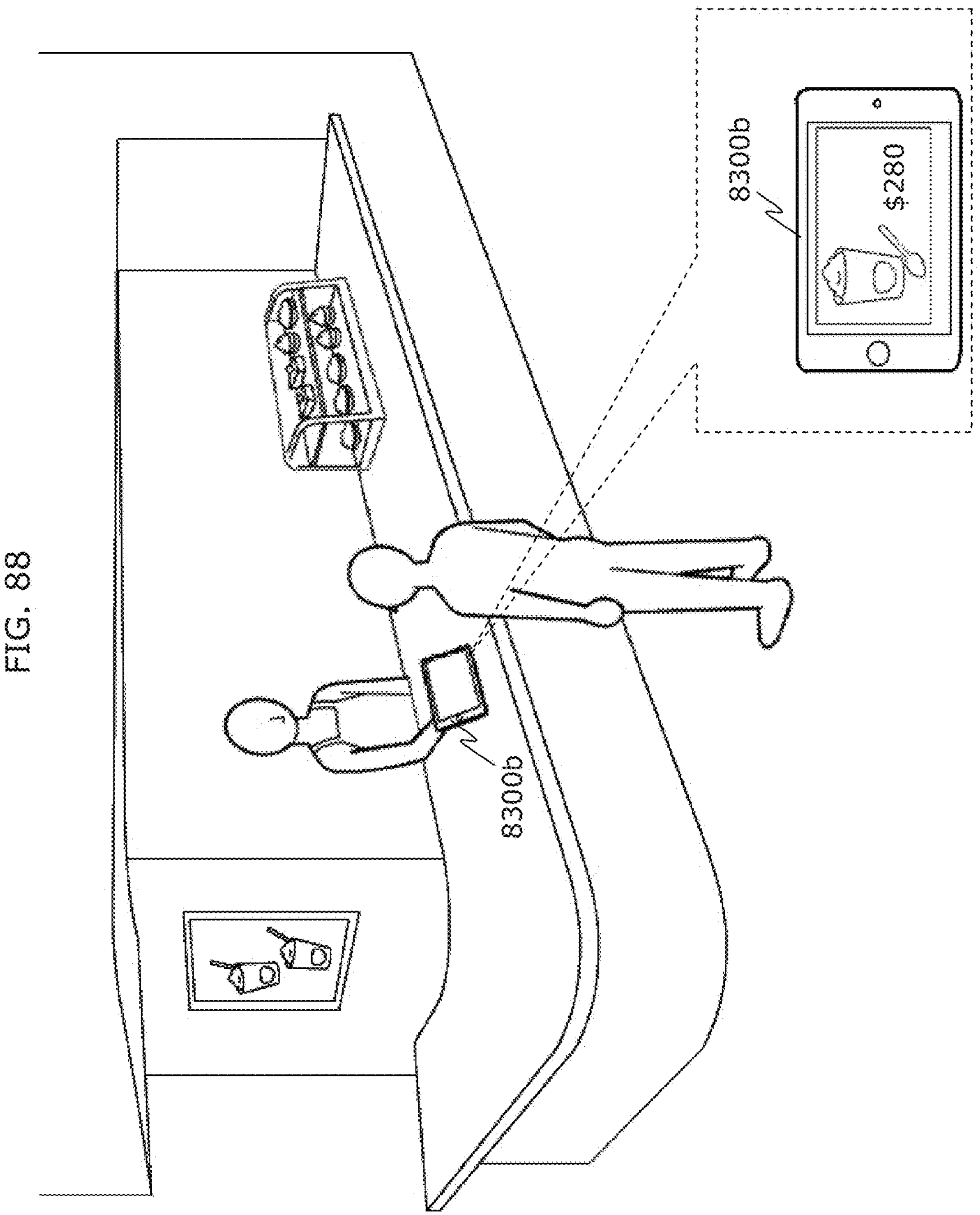
FIG. 88 is a diagram illustrating an example of next operation of a display device in an in-front-of-store situation in Embodiment 4.

FIG. 88 is a diagram illustrating an example of next operation of the display device **8300*b*** in the in-store situation.

Upon receiving the product selection operation result, the display device **8300*b* displays an image representing the selected product and the price of the product. The display device 8300*b*** thus prompts the user to confirm the selected product. The image representing the product, information indicating the price of the product, and the like are included, for example, in the above-mentioned product service information.

Figure 89:
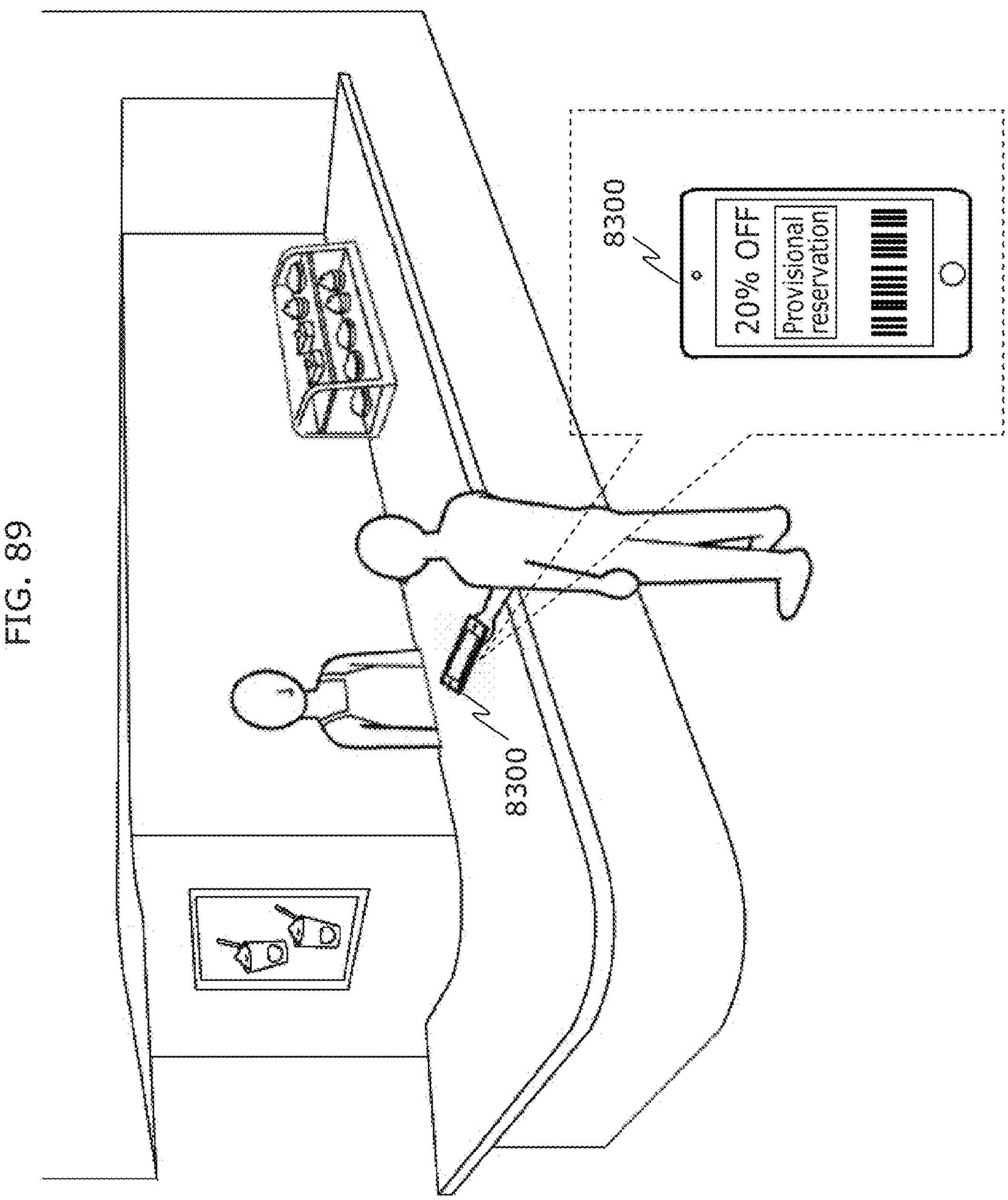
FIG. 89 is a diagram illustrating an example of next operation of a receiver in an in-front-of-store situation in Embodiment 4.

FIG. 89 is a diagram illustrating an example of next operation of the receiver 8300 in the in-store situation.

When prompted to confirm the selected product, the user performs an operation for ordering the product. After the operation is performed, the receiver 8300 notifies payment information necessary for electronic payment to a POS (Point of Sale) system of the store via the display device **8300*b* or the server. The receiver 8300 also determines whether or not there is the above-mentioned prior obtainment image which is obtained using visible light communication with the sign 8301 of the store and stored. In the case of determining that there is the prior obtainment image, the receiver 8300** displays the prior obtainment image.

Though the display device **8300*b* is used in this situation, the receiver 8300 may perform the processes by the display device 8300*b* instead, without using the display device 8300*b*. In this case, upon detecting the entrance, the receiver 8300 obtains, from the server, the product service information indicating, for example, the menu of products or services provided in the store, and displays the menu indicated by the product service information. Moreover, upon receiving the operation for ordering the product, the receiver 8300** notifies the ordered product and the payment information necessary for electronic payment, to the POS system of the store via the server.

Figure 90:
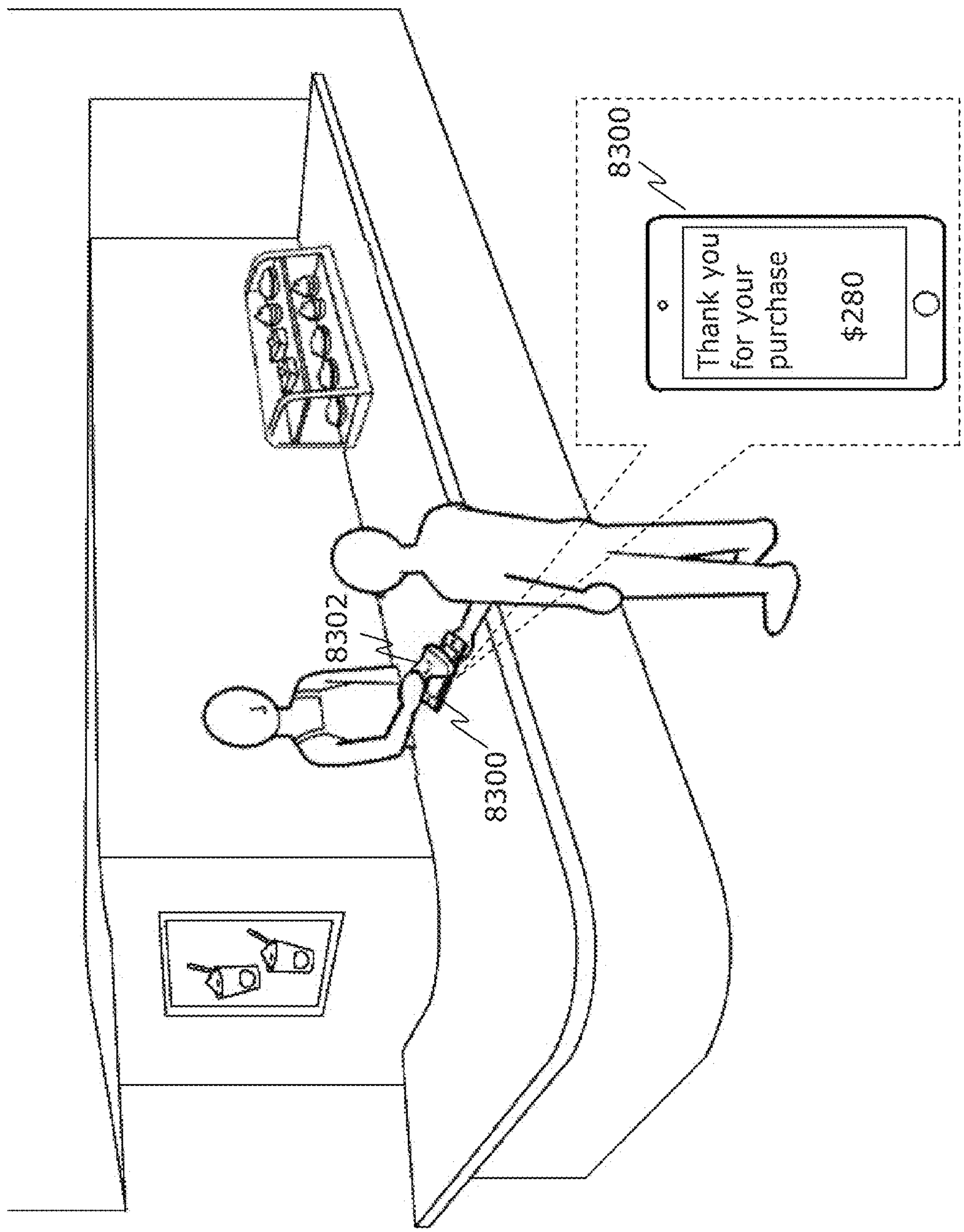
FIG. 90 is a diagram illustrating an example of next operation of a receiver in an in-front-of-store situation in Embodiment 4.

FIG. 90 is a diagram illustrating an example of next operation of the receiver 8300 in the in-store situation.

The store staff applies a barcode scanner 8302 of the POS system to the barcode in the prior obtainment image displayed on the receiver 8300. The barcode scanner 8302 reads the barcode in the prior obtainment image. As a result, the POS system completes the electronic payment according to the coupon indicated by the barcode. The barcode scanner 8302 of the POS system then transmits, to the receiver 8300, payment completion information indicating the completion of the electronic payment, by changing in luminance. Thus, the barcode scanner 8302 also has a function as a transmitter in visible light communication. The receiver 8300 receives the payment completion information by visible light communication, and displays the payment completion information. For example, the payment completion information indicates the message "Thank you for your purchase" and the amount paid. As a result of such electronic payment, the POS system, the server, and the receiver 8300 can determine that, in the store corresponding to the advertisement information (service information) displayed in front of the store, the user uses the service indicated by the advertisement information.

As described above, the product in the store is ordered through the operation of the receiver 8300, the POS system, and the like as illustrated in FIGS. 86 to 90. Accordingly, the user who has entered the store can order the product from the menu of the store automatically displayed on the display device 8300*b* or the receiver 8300. In other words, there is no need for the store staff to show the menu to the user and directly receive the order for the product from the user. This significantly reduces the burden on the store staff. Though the barcode scanner 8302 reads the barcode in the above example, the barcode scanner 8302 may not be used. For instance, the receiver 8300 may transmit the information indicated by the barcode, to the POS system via the server. The receiver 8300 may then obtain the payment completion information from the POS system via the server. This further reduces the store staff's workload, and allows the user to order the product without the store staff. Alternatively, the display device 8300*b* and the receiver 8300 may transfer the order and charging data with each other by visible light communication, or transfer the data by wireless communication using a key exchanged by visible light communication.

There is the case where the sign 8301 is displayed by one of a plurality of stores belonging to a chain. In such a case, the advertisement information obtained from the sign 8301 using visible light communication can be used in all stores of the chain. Here, the service provided to the user may be different between a store (advertisement store) displaying the sign 8301 and a store (non-advertisement store) not displaying the sign 8301, even though they belong to the same chain. For example, in the case where the user enters the non-advertisement store, the user receives the service of the discount rate (e.g., 20%) according to the coupon indicated by the prior obtainment image. In the case where the user enters the advertisement store, the user receives the service of a higher discount rate (e.g., 30%) than the discount rate of the coupon. In detail, in the case of detecting the entrance into the advertisement store, the receiver 8300 obtains additional service information indicating an additional discount of 10% from the server, and displays an image indicating a discount rate of 30% (20%+10%) instead of the prior obtainment image illustrated in FIG. 89. Here, the receiver 8300 detects whether the user enters the advertisement store or the non-advertisement store, based on the above-mentioned store information obtained from the server. The store information indicates the location of each of the plurality of stores belonging to the chain, and whether the store is the advertisement store or the non-advertisement store.

In the case where a plurality of non-advertisement stores are included in the chain, the service provided to the user may be different in each of the non-advertisement stores. For instance, the service according to the distance from the position of the sign 8301 or the current position of the receiver 8300 when performing visible light communication with the sign 8301 to the non-advertisement store is provided to the user entering the non-advertisement store. Alternatively, the service according to the difference (time difference) between the time at which the receiver 8300 and the sign 8301 perform visible light communication and the time at which the user enters the non-advertisement store is provided to the user entering the non-advertisement store. That is, the receiver 8300 obtains, from the server, additional service information indicating an additional discount that differs depending on the above-mentioned distance (the position of the sign 8301) and time difference, and displays an image indicating a discount rate (e.g., 30%) on which the additional discount has been reflected, instead of the prior obtainment image illustrated in FIG. 89. Note that such a service is determined by the server or the POS system, or by cooperation between the server and the POS system. The service may be applied to every store belonging to the chain, regardless of whether the store is the advertisement store or the non-advertisement store.

In the case where the user enters the non-advertisement store and makes the order using the advertisement information, the POS system of the non-advertisement store may pass part of the amount earned as a result of the order, to the POS system of the advertisement store.

Each time the advertisement information is displayed, the server may determine whether or not the advertisement information is used. By collecting the determination results, the server can easily analyze the advertising effectiveness of the sign 8301. Moreover, by collecting at least one of: the position of the sign 8301; the time at which the advertisement information is displayed; the position of the store in which the advertisement information is used; the time at which the advertisement information is used; and the time at which the user enters the store, the server can improve the accuracy of analyzing the advertising effectiveness of the sign 8301, and find the position of the sign 8301 highest in advertising effectiveness.

The receiver 8300 may also obtain, from the server, additional service information indicating an additional discount corresponding to the number of times the advertisement information is used to order the product (the number of uses), and display an image indicating a discount rate (e.g., 30%) on which the additional discount corresponding to the number of uses has been reflected, instead of the prior obtainment image illustrated in FIG. 89. For example, the server may provide such a service that sets a higher discount rate when the number of uses is larger, in cooperation with the POS system.

In the case where the receiver 8300 receives advertisement information associated with each of the device IDs of all signs 8301 displayed by the store (i.e., in the case where the obtainment of all advertisement information is completed), the server may provide a good-value service to the user entering the store of the sign 8301. Examples of the good-value service include a service of a very high discount rate and a service of offering a product other than the ordered product free of charge. When the receiver 8300 detects the entrance of the user into the store, the server determines whether or not the receiver 8300 has performed the process including visible light communication and the like on each of all signs associated with the store. In the case where the server determines that the receiver 8300 has performed the process, the receiver 8300 obtains additional service information indicating an additional discount from the server as the above-mentioned good-value service, and displays an image indicating a discount rate (e.g., 50%) on which the additional discount has been reflected, instead of the prior obtainment image illustrated in FIG. 89.

The receiver 8300 may also obtain, from the server, additional service information indicating an additional discount that differs depending on the difference between the time at which the receiver 8300 performs visible light communication with the sign 8301 and displays the advertisement information and the time at which the user enters the store, and display an image indicating a discount rate (e.g., 30%) on which the additional discount has been reflected, instead of the prior obtainment image illustrated in FIG. 89. For instance, the receiver 8300 obtains additional service information indicating a higher discount rate when the difference is smaller, from the server.

Figure 91:
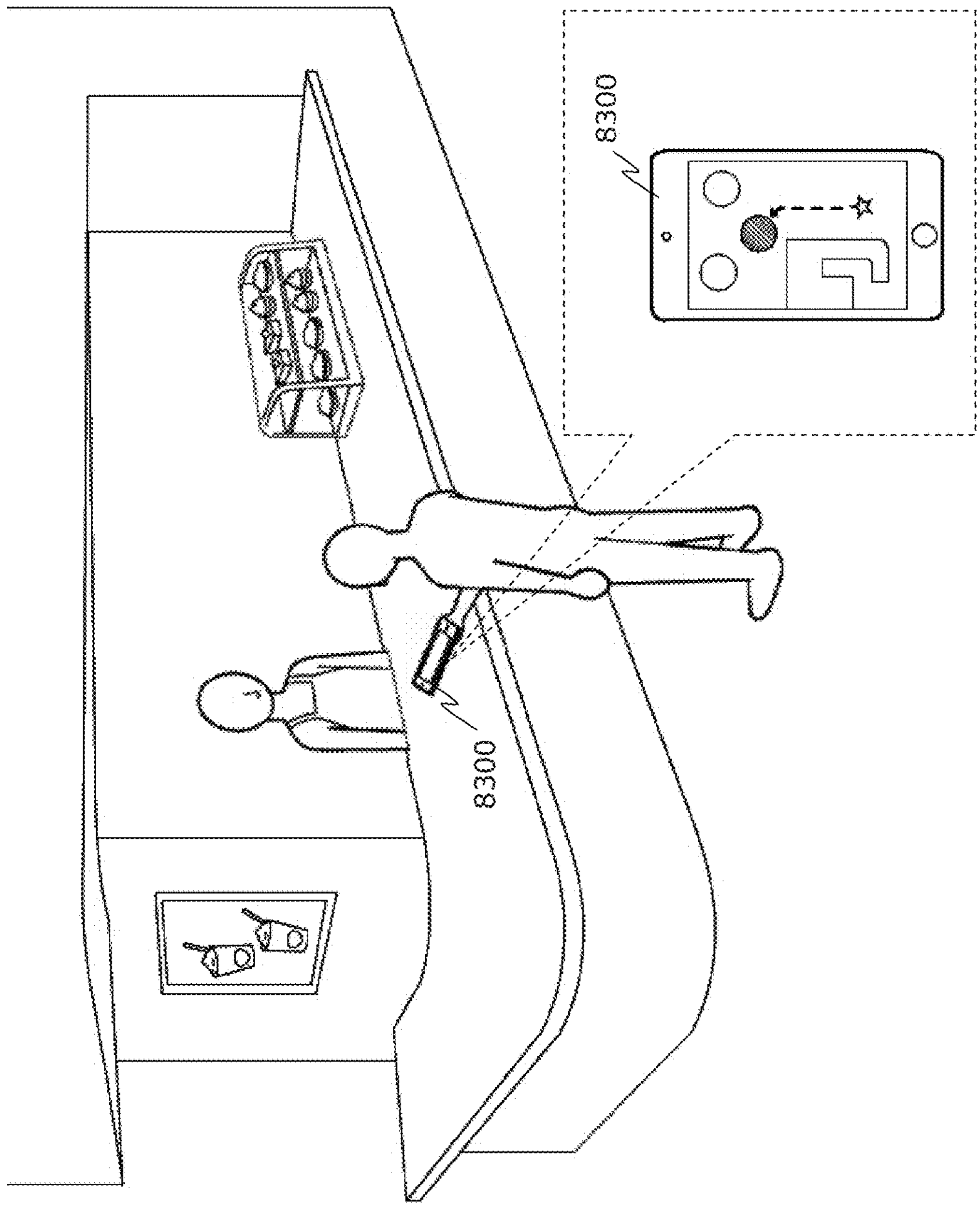
FIG. 91 is a diagram illustrating an example of next operation of a receiver in an in-front-of-store situation in Embodiment 4.

FIG. 91 is a diagram illustrating an example of next operation of the receiver 8300 in the in-store situation.

Having completed the order and the electronic payment, the receiver 8300 receives a signal transmitted from a transmitter such as a lighting device in the store by changing in luminance, and transmits the signal to the server, thus obtaining an in-store guide map indicating the seat position (e.g., black circle) of the user. The receiver 8300 also specifies the position of the receiver 8300 using the received signal, as in any of Embodiments 1 to 3 described above. The receiver 8300 displays the specified position (e.g., star) of the receiver 8300 in the guide map. This enables the user to easily find the way to his or her seat.

While the user is moving, too, the receiver 8300 frequently specifies the position of the receiver 8300 by performing visible light communication with a nearby transmitter such as a lighting device in the store. Hence, the receiver 8300 sequentially updates the displayed position (e.g., start) of the receiver 8300. The user can be appropriately guided to the seat in this manner.

Figure 92:
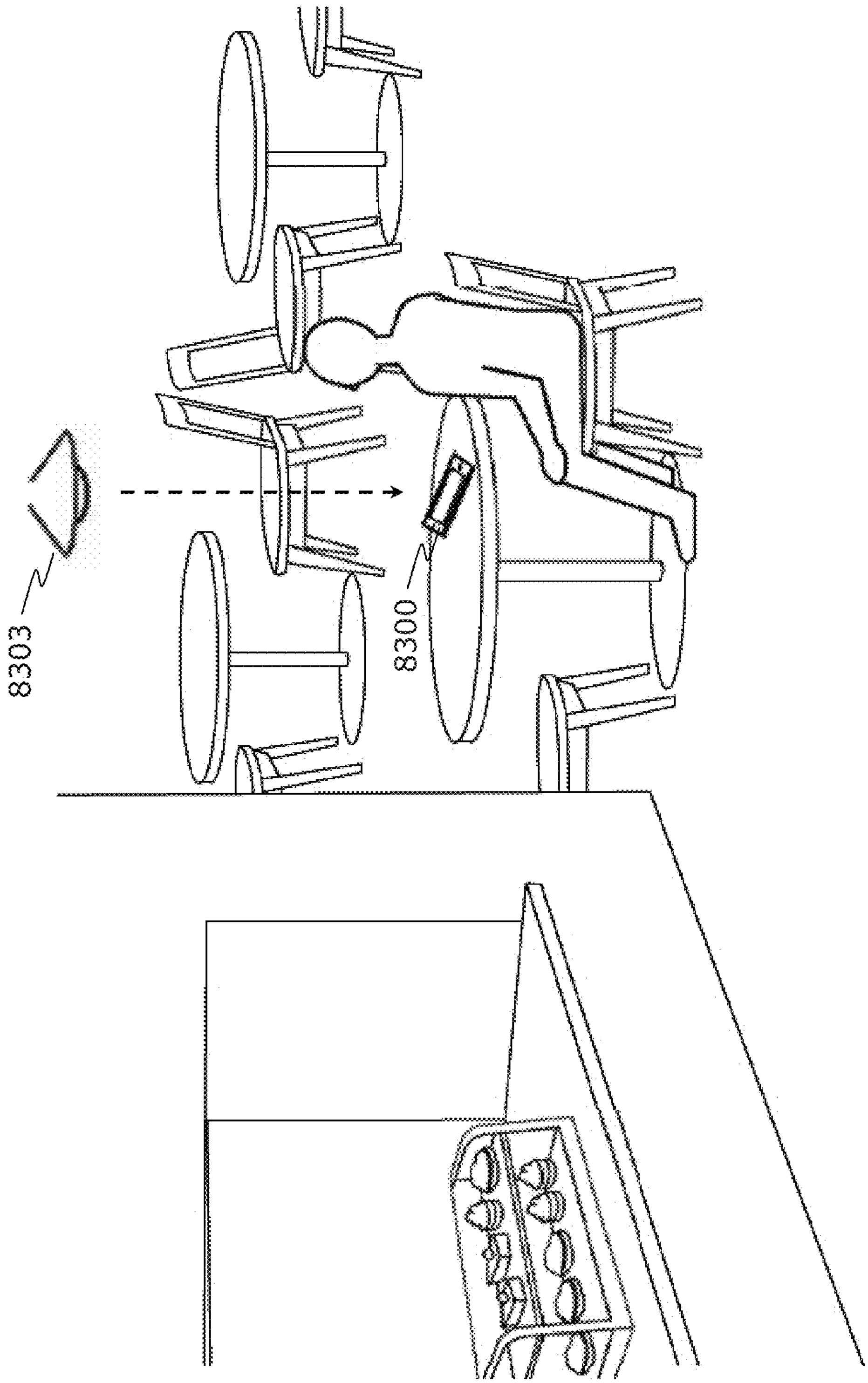
FIG. 92 is a diagram illustrating an example of next operation of a receiver in an in-front-of-store situation in Embodiment 4.

FIG. 92 is a diagram illustrating an example of next operation of the receiver 8300 in the in-store situation.

When the user is seated, the receiver 8300 specifies the position of the receiver 8300 by performing visible light communication with a transmitter 8303 such as a lighting device, and determines that the position is the seat position of the user. The receiver 8300 notifies, together with the user name or nickname, that the user is seated, to a terminal in the store via the server. This enables the store staff to recognize which seat the user is in.

Figure 93:
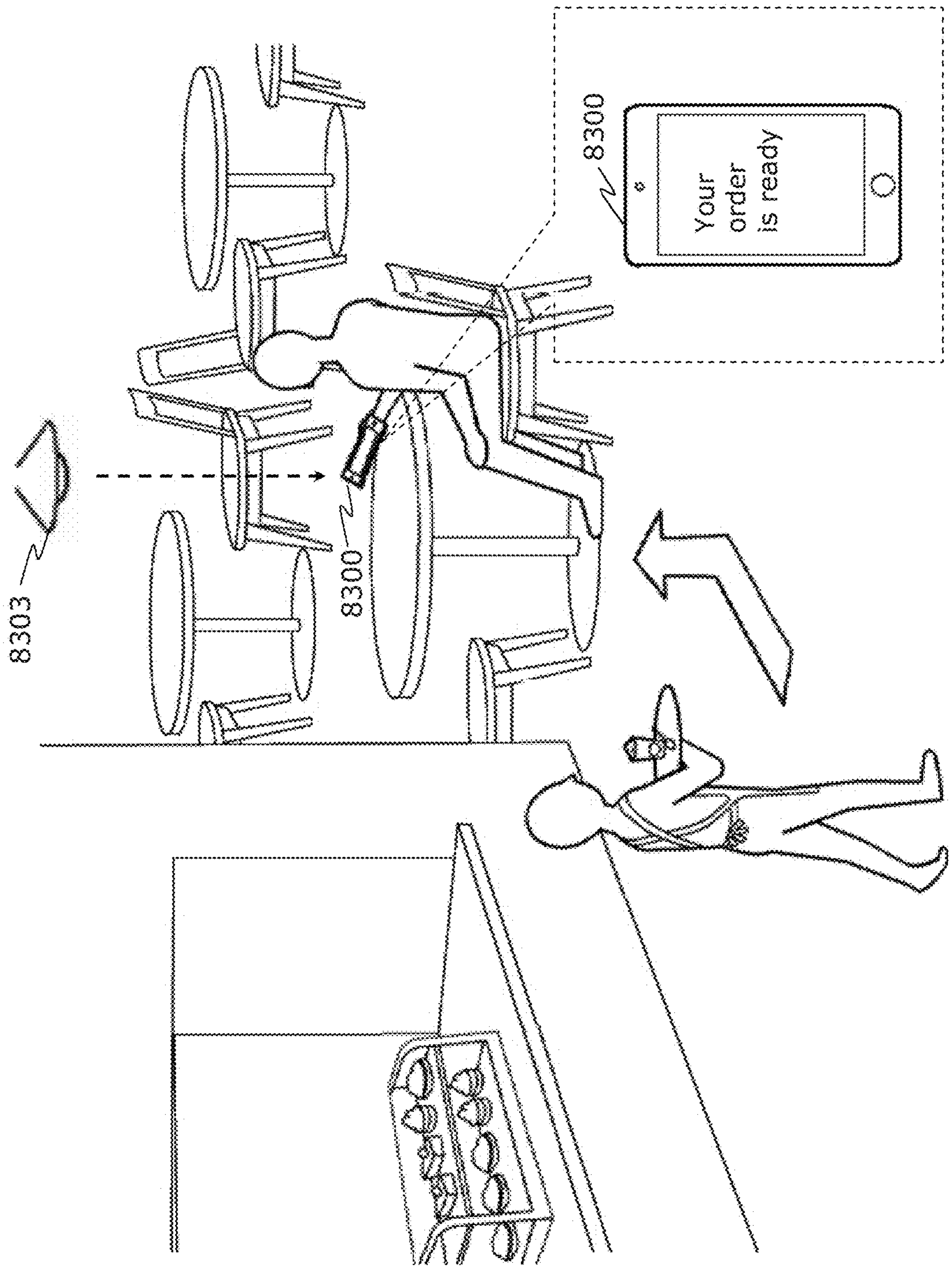
FIG. 93 is a diagram illustrating an example of next operation of a receiver in an in-front-of-store situation in Embodiment 4.

FIG. 93 is a diagram illustrating an example of next operation of the receiver 8300 in the in-store situation.

The transmitter 8303 transmits a signal including a customer ID and a message informing that the ordered product is ready, by changing in luminance. Note that, for example, when obtaining the product service information indicating the product menu and the like from the server, the receiver 8300 also obtains the customer ID from the server and holds it. The receiver 8300 receives the signal, by performing visible light imaging on the transmitter 8303. The receiver 8300 determines whether or not the customer ID included in the signal matches the customer ID held beforehand. In the case of determining that they match, the receiver 8300 displays the message (e.g., "Your order is ready") included in the signal.

Figure 94:
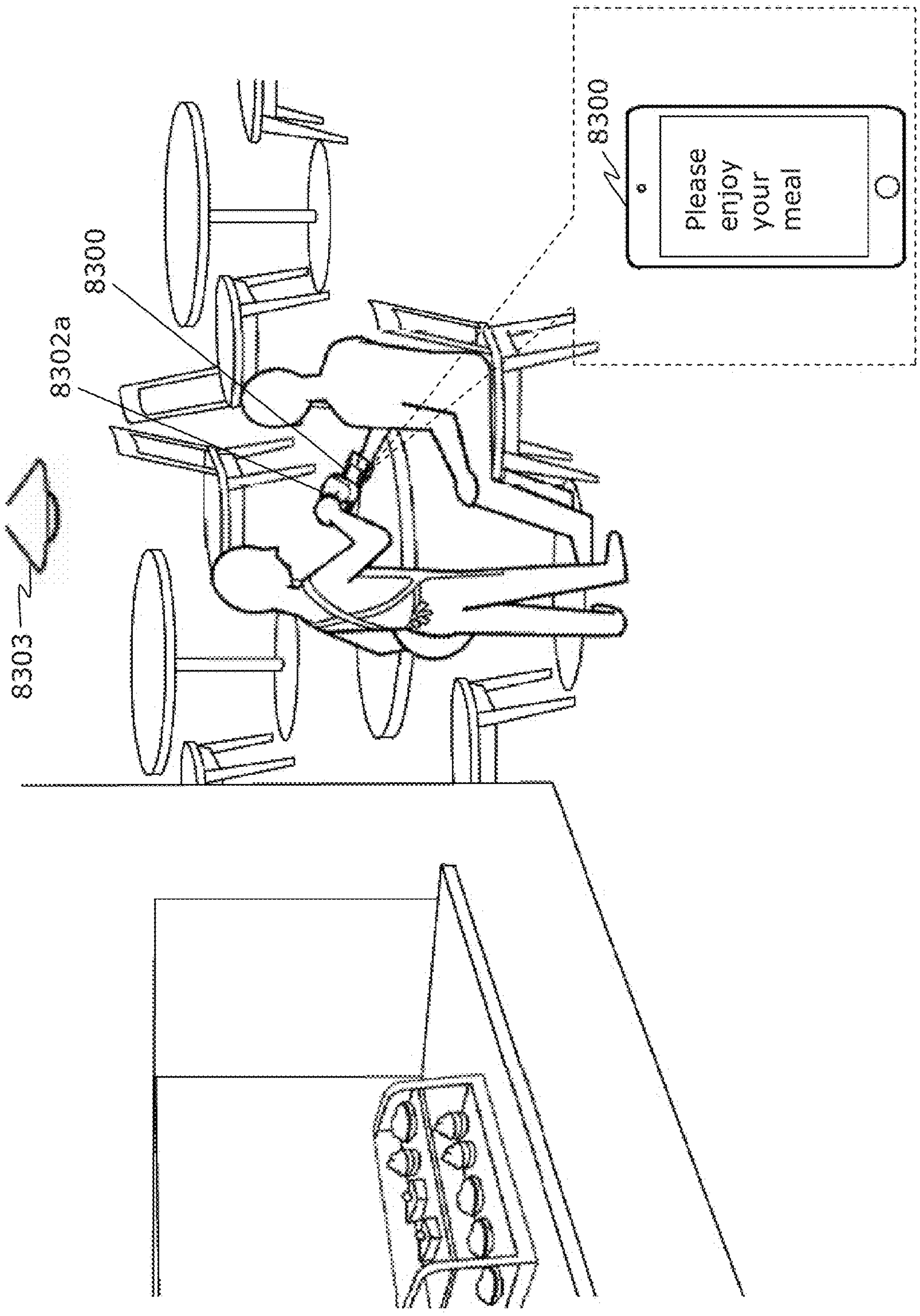
FIG. 94 is a diagram illustrating an example of next operation of a receiver in an in-front-of-store situation in Embodiment 4.

FIG. 94 is a diagram illustrating an example of next operation of the receiver 8300 in the in-store situation.

The store staff, having delivered the ordered product to the user's seat, directs a handheld terminal 8302*a* to the receiver 8300 in order to prove that the ordered product has been delivered. The handheld terminal 8302*a* functions as a transmitter. The handheld terminal 8302*a* transmits, to the receiver 8300, a signal indicating the delivery of the ordered product by changing in luminance. The receiver 8300 captures the handheld terminal 8302*a* to receive the signal, and displays a message (e.g., "Please enjoy your meal") indicated by the signal.

Situation: Store Search

An example of application in a situation where the user carrying the receiver 8300 is searching for a store of interest is described below, with reference to FIGS. 95 to 97.

Figure 95:
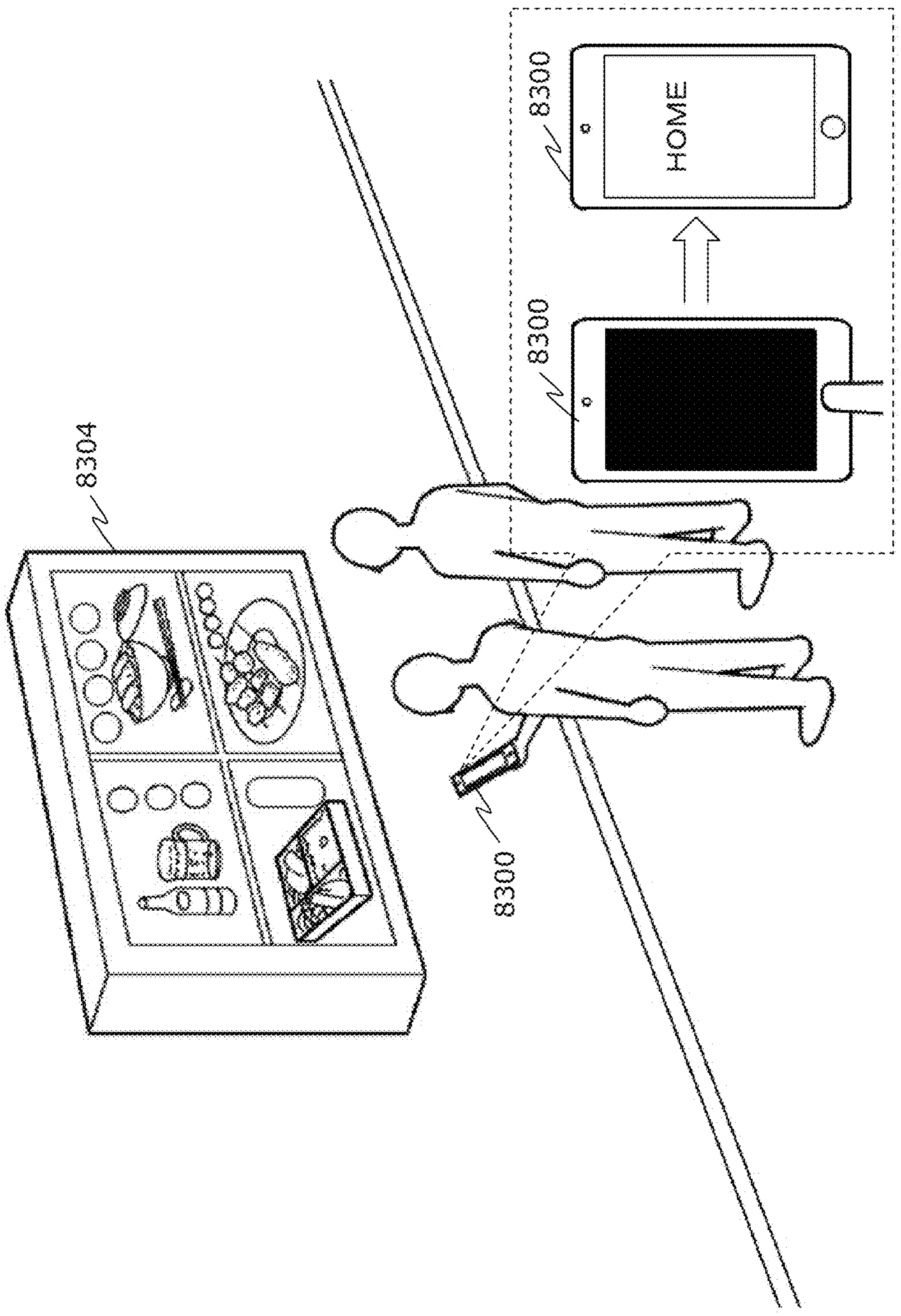
FIG. 95 is a diagram illustrating an example of operation of a receiver in a store search situation in Embodiment 4.

FIG. 95 is a diagram illustrating an example of operation of the receiver 8300 in the store search situation.

The user finds a signage 8304 showing restaurants of interest. Upon determining that the signage 8304 is transmitting a signal by changing in luminance, the user operates the receiver 8300 to start the communication application of the receiver 8300, as in the example illustrated in FIG. 81. Alternatively, the receiver 8300 may automatically start the communication application as in the example illustrated in FIG. 82.

Figure 96:
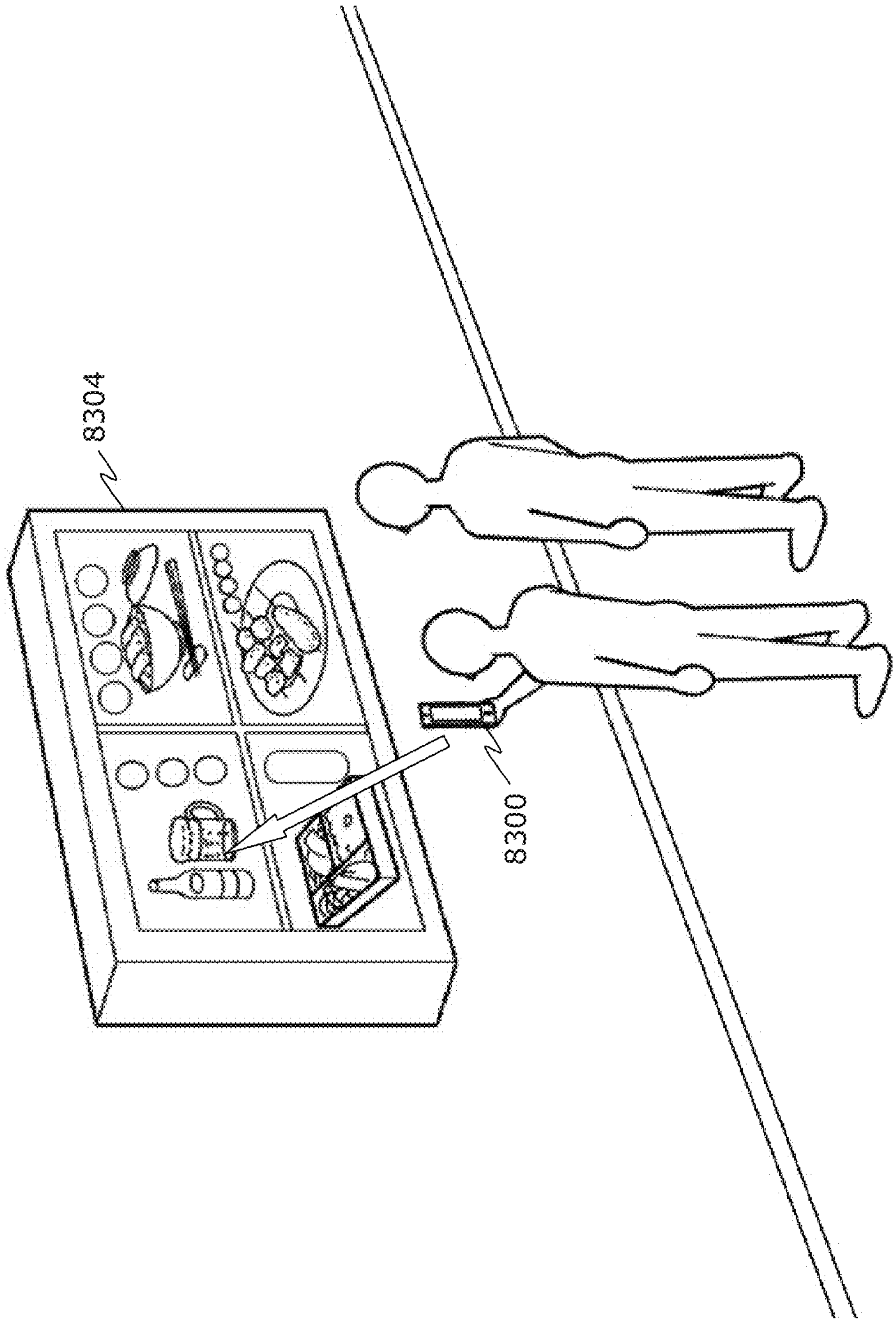
FIG. 96 is a diagram illustrating an example of next operation of a receiver in a store search situation in Embodiment 4.

FIG. 96 is a diagram illustrating an example of next operation of the receiver 8300 in the store search situation.

The receiver 8300 captures the entire signage 8304 or a part of the signage 8304 showing a restaurant of the user's interest, to receive an ID for identifying the signage 8304 or the restaurant.

Figure 97:
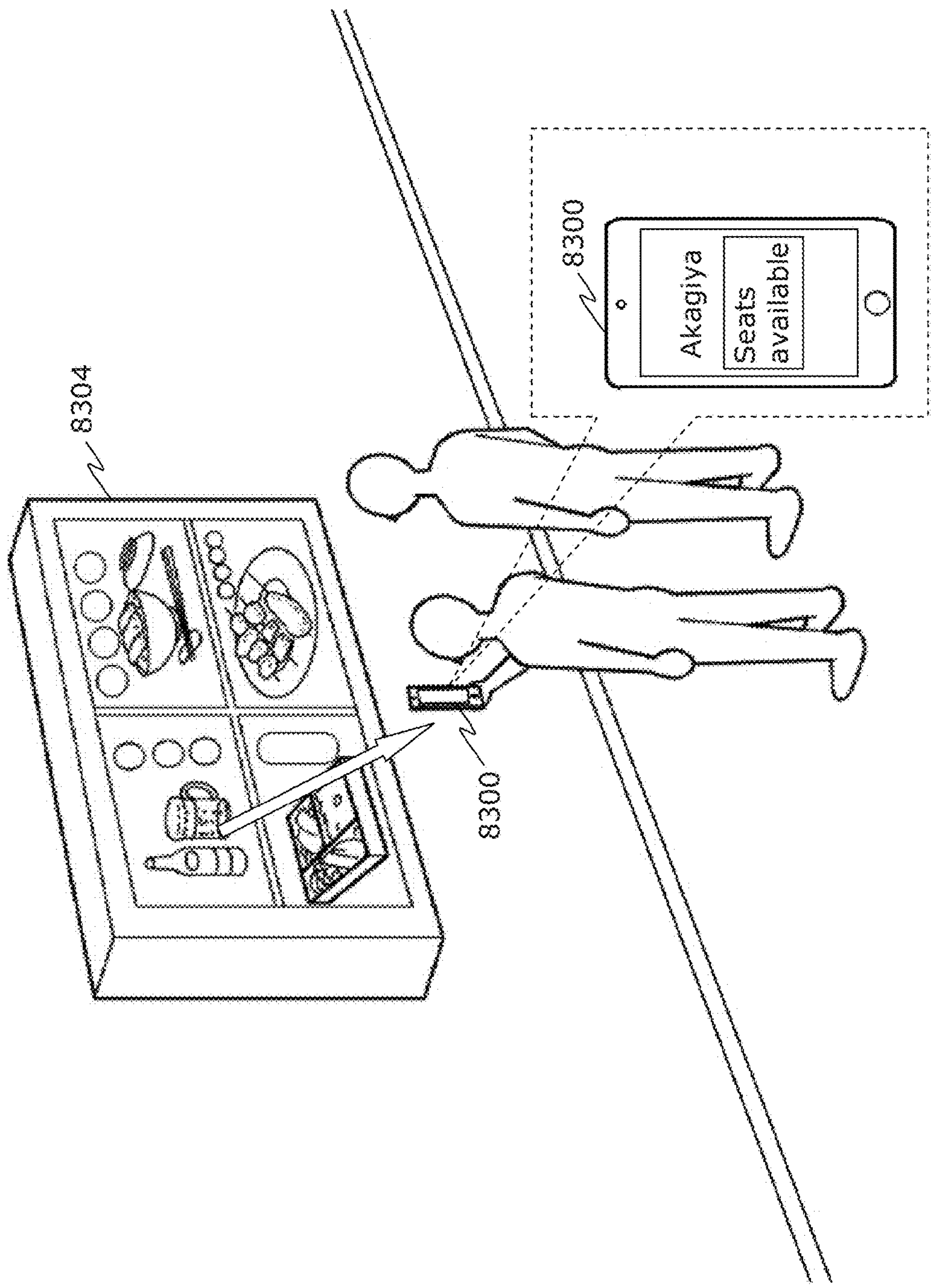

FIG. 97 is a diagram illustrating an example of next operation of the receiver 8300 in the store search situation.

Upon receiving the ID mentioned above, the receiver 8300 transmits the ID to the server, and obtains advertisement information (service information) associated with the ID from the server and displays it. Here, the receiver 8300 may notify the number of people (ancillary information) who are about to enter the restaurant, to the server together with the ID. As a result, the receiver 8300 can obtain advertisement information corresponding to the number of people. For example, the receiver 8300 can obtain advertisement information indicating that seats are available in the restaurant for the notified number of people.

Situation: Movie Advertisement

An example of application in a situation where the user carrying the receiver 8300 is in front of a signage including a movie advertisement of interest is described below, with reference to FIGS. 98 to 101.

Figure 98:
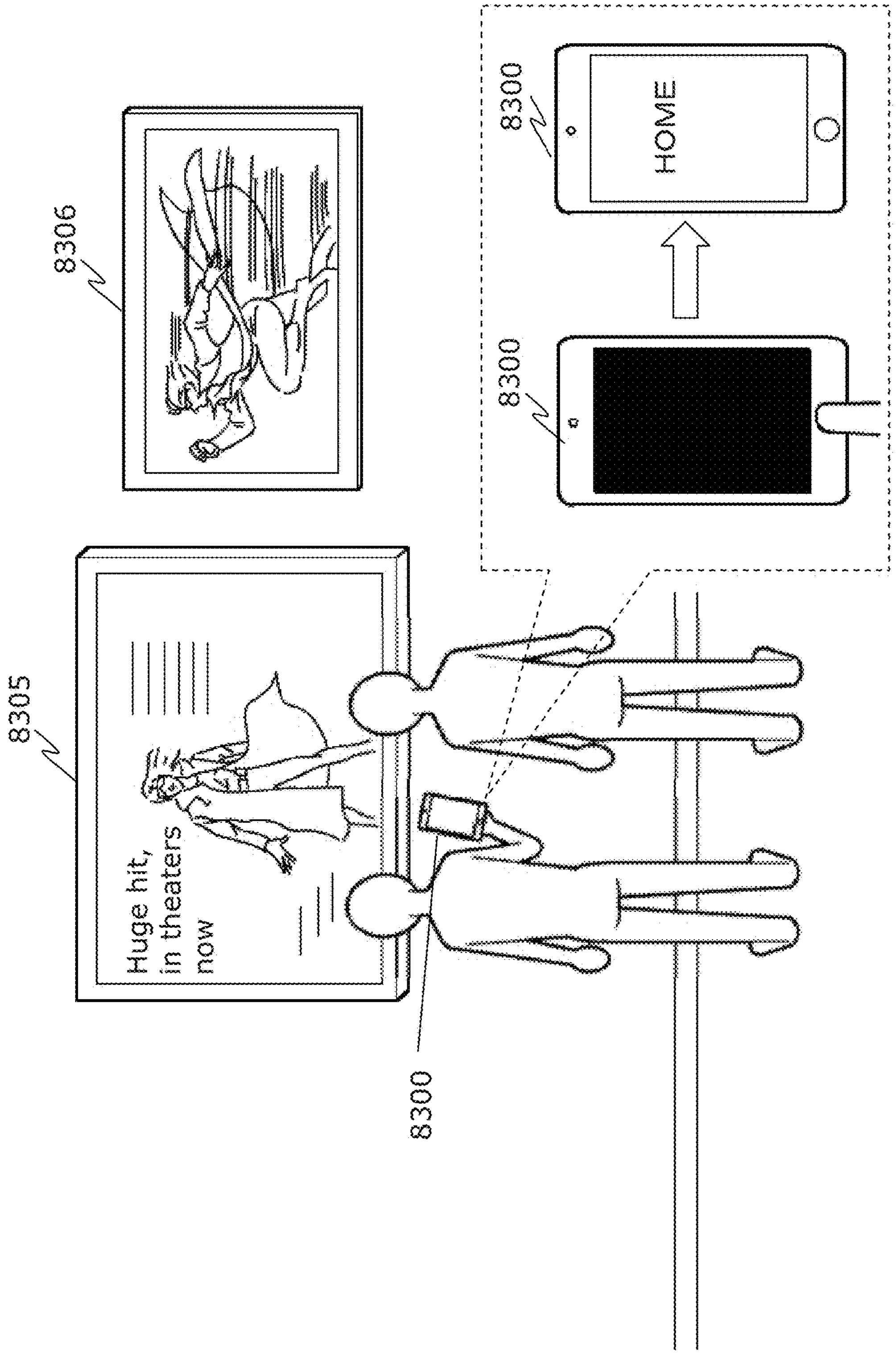

FIG. 98 is a diagram illustrating an example of operation of the receiver 8300 in the movie advertisement situation.

The user finds a signage 8305 including a movie advertisement of interest, and a signage 8306 such as a liquid crystal display for displaying movie advertisement video. The signage 8305 includes, for example, a transparent film on which an image representing the movie advertisement is drawn, and a plurality of LEDs arranged on the back side of the film and lights the film. That is, the signage 8305 brightly displays the image drawn on the film by the light emission from the plurality of LEDs, as a still image. The signage 8305 is a transmitter for transmitting a signal by changing in luminance.

Upon determining that the signage 8305 is transmitting a signal by changing in luminance, the user operates the receiver 8300 to start the communication application of the receiver 8300, as in the example illustrated in FIG. 81. Alternatively, the receiver 8300 may automatically start the communication application as in the example illustrated in FIG. 82.

Figure 99:
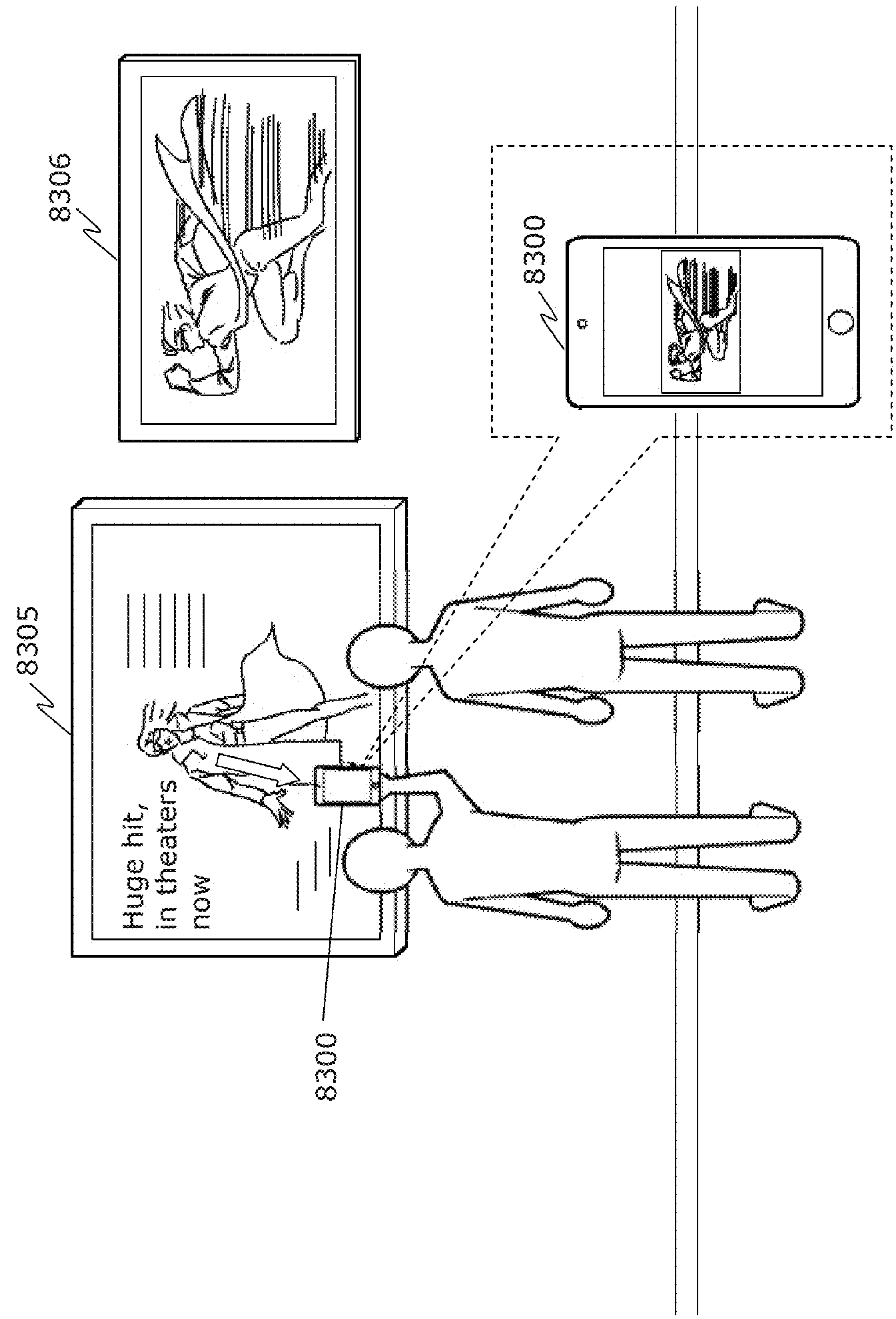

FIG. 99 is a diagram illustrating an example of next operation of the receiver 8300 in the movie advertisement situation.

The receiver 8300 captures the signage 8305, to obtain the ID of the signage 8305. The receiver 8300 transmits the ID to the server, downloads movie advertisement video data associated with the ID from the server as service information, and reproduces the video.

Figure 100:
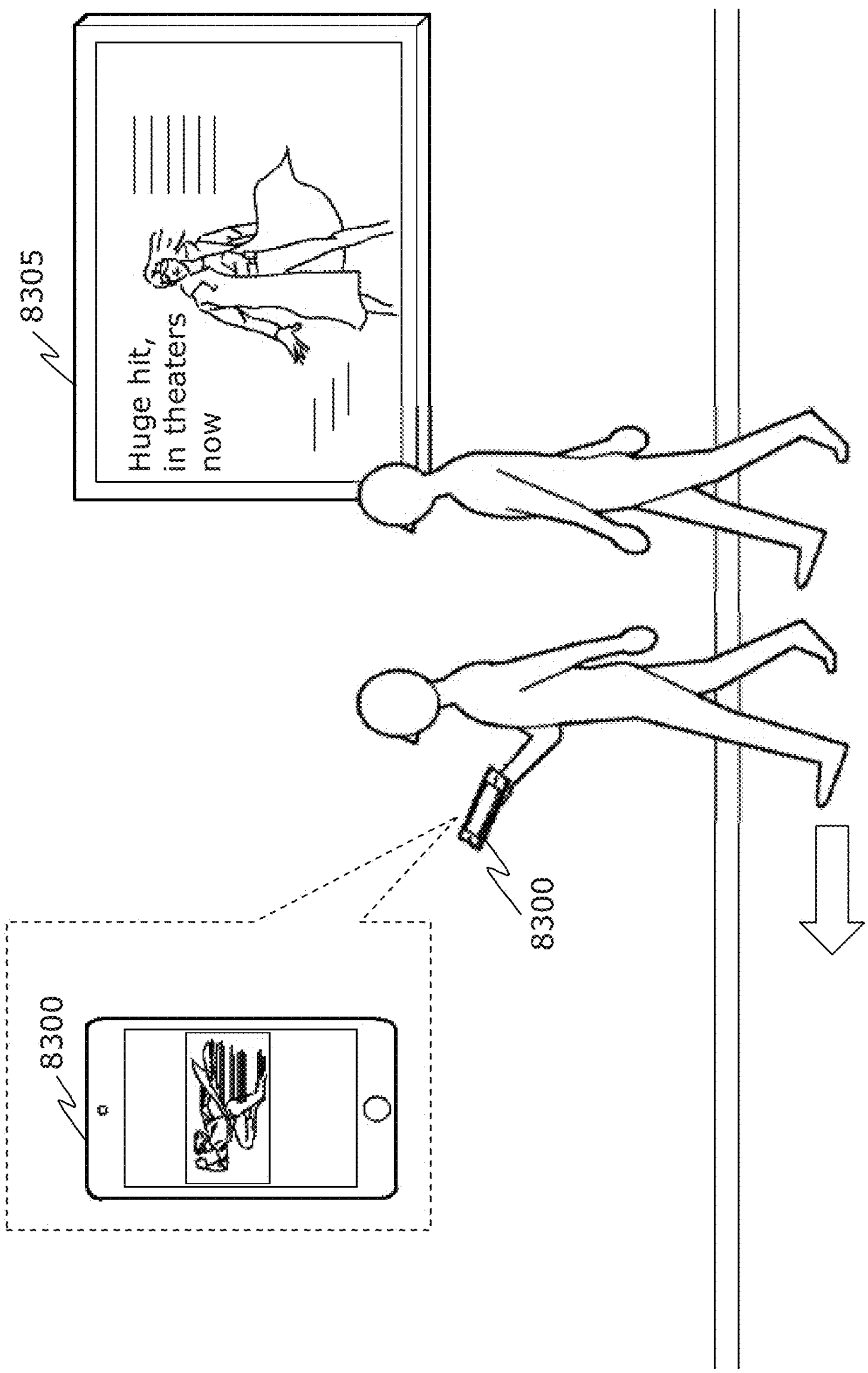

FIG. 100 is a diagram illustrating an example of next operation of the receiver 8300 in the movie advertisement situation.

Video displayed by reproducing the downloaded video data as mentioned above is the same as the video displayed by the signage 8306 as an example. Accordingly, in the case where the user wants to watch the movie advertisement video, the user can watch the video in any location without stopping in front of the signage 8306.

Figure 101:
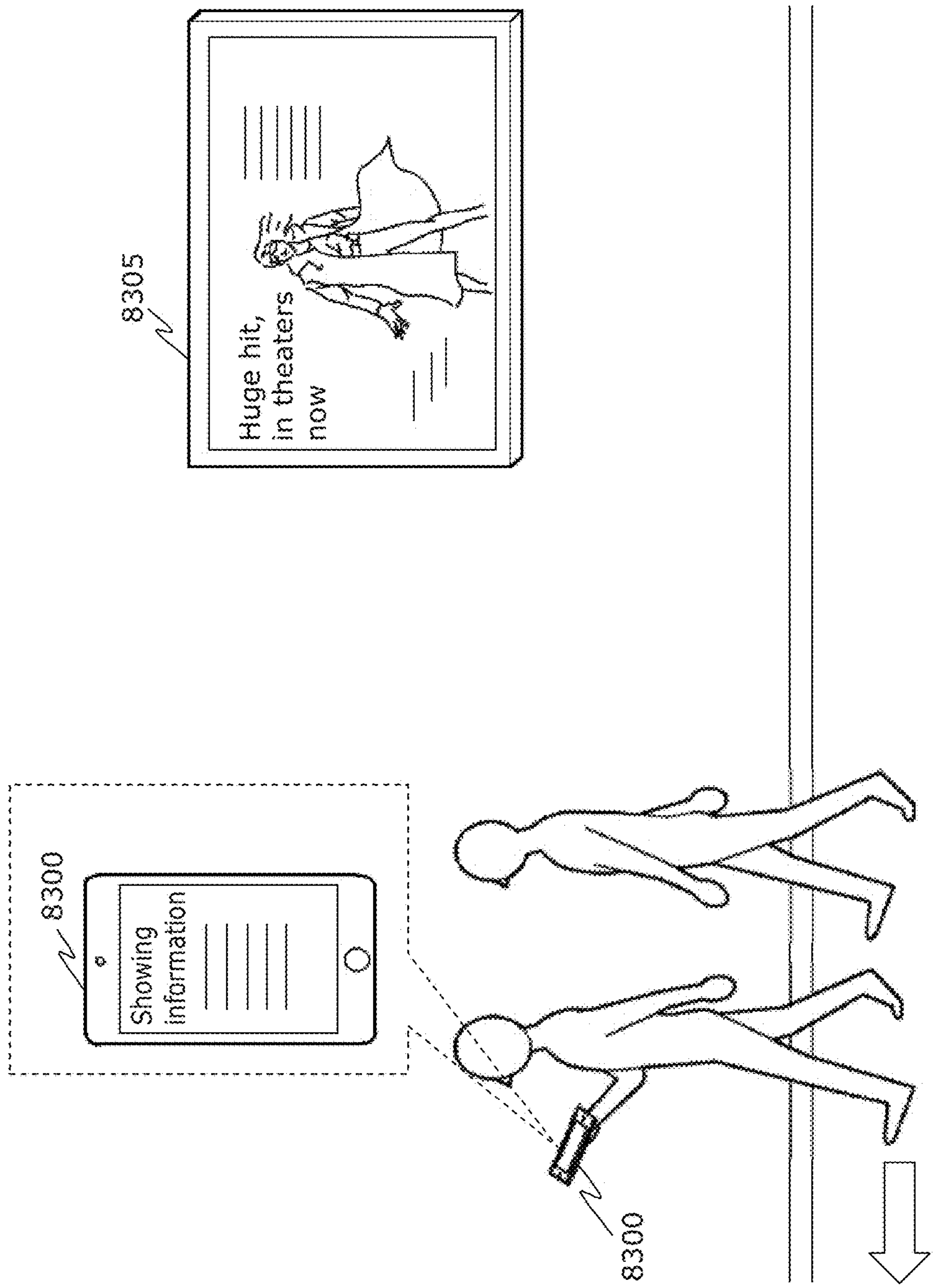

FIG. 101 is a diagram illustrating an example of next operation of the receiver 8300 in the movie advertisement situation.

The receiver 8300 may download not only the video data but also showing information indicating the showtimes of the movie and the like together with the video data, as service information. The receiver 8300 can then display the showing information to inform the user, and also share the showing information with other terminals (e.g., other smartphones).

Situation: Museum

An example of application in a situation where the user carrying the receiver 8300 enters a museum to appreciate each exhibit in the museum is described below, with reference to FIGS. 102 to 107.

Figure 102:
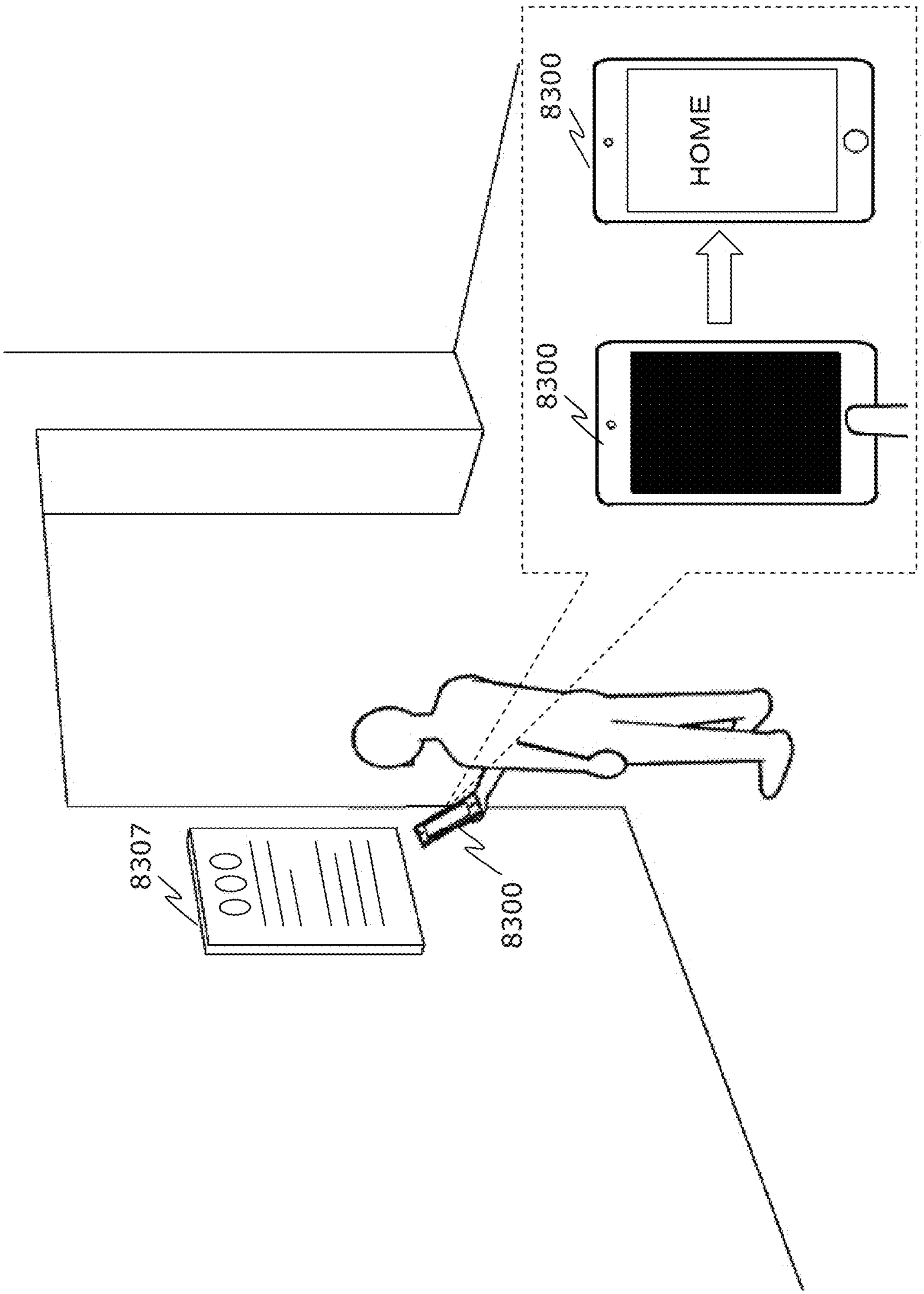

FIG. 102 is a diagram illustrating an example of operation of the receiver 8300 in the museum situation.

For example, when entering the museum, the user finds a signboard 8307 on the entrance of the museum. Upon determining that the signboard 8307 is transmitting a signal by changing in luminance, the user operates the receiver 8300 to start the communication application of the receiver 8300, as in the example illustrated in FIG. 81. Alternatively, the receiver 8300 may automatically start the communication application as in the example illustrated in FIG. 82.

Figure 103:
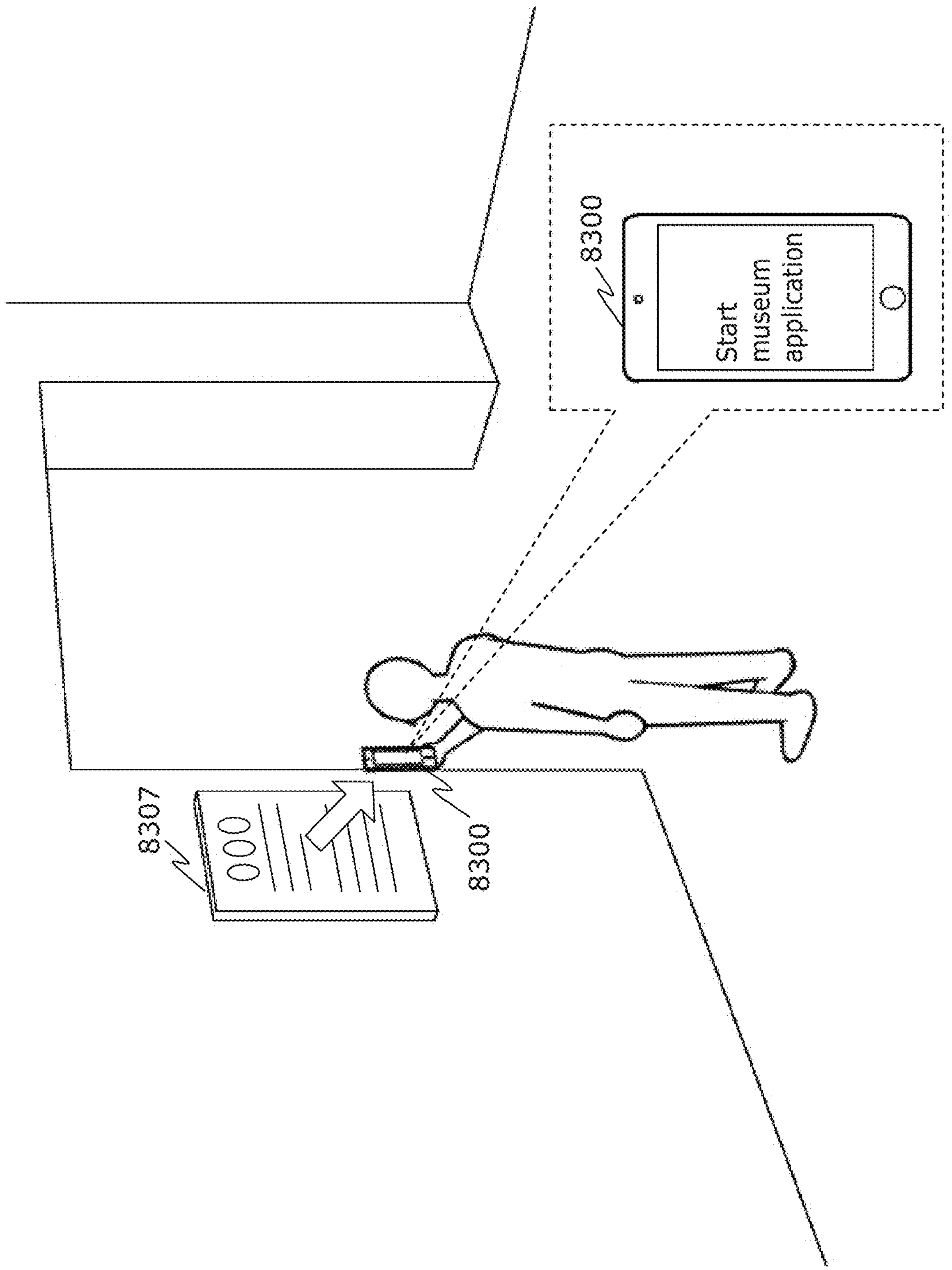

FIG. 103 is a diagram illustrating an example of operation of the receiver 8300 in the museum situation.

The receiver 8300 captures the signboard 8307, to obtain the ID of the signboard 8307. The receiver 8300 transmits the ID to the server, downloads a guide application program of the museum (hereafter referred to as "museum application") from the server as service information associated with the ID, and starts the museum application.

Figure 104:
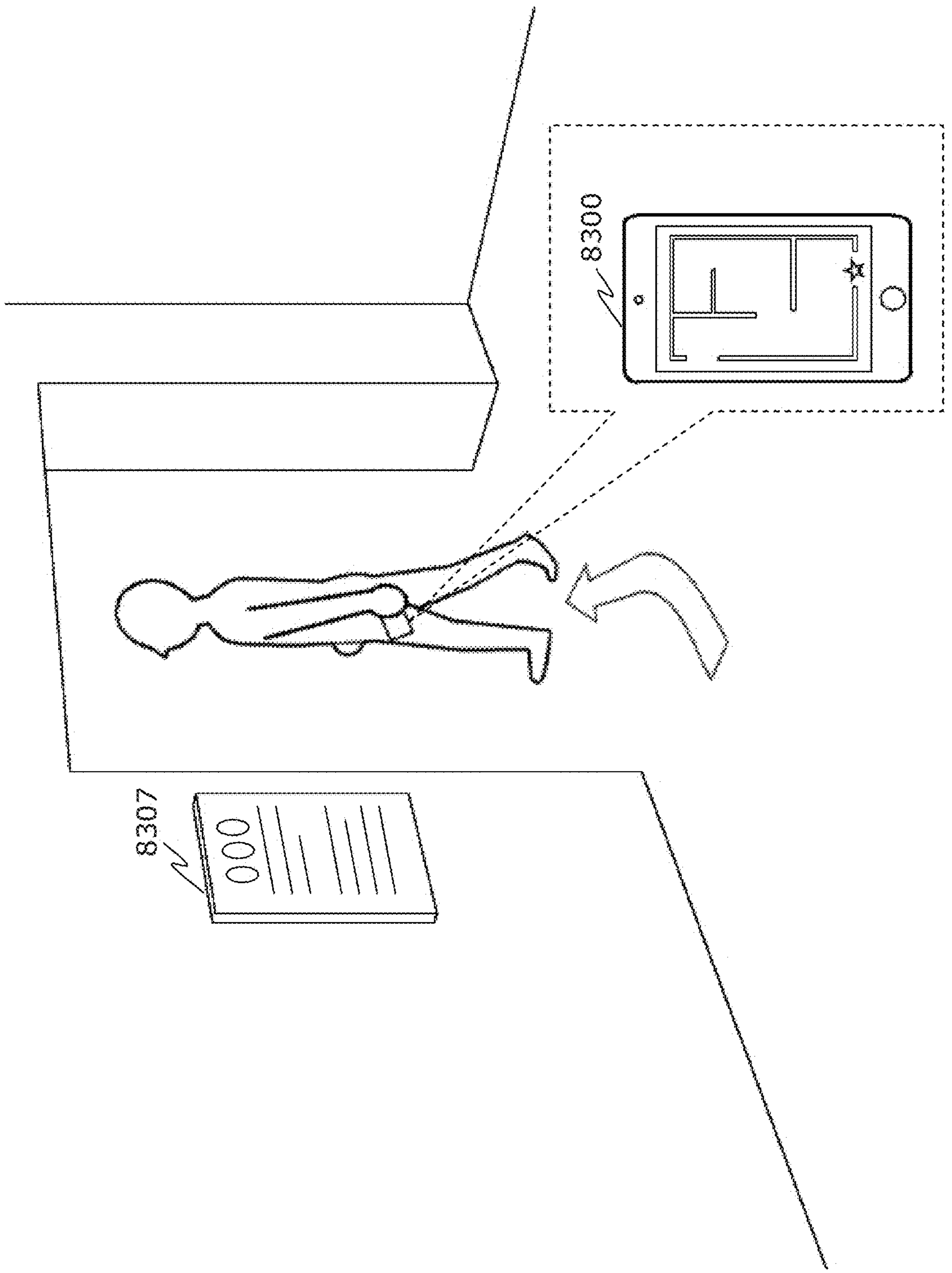

FIG. 104 is a diagram illustrating an example of next operation of the receiver 8300 in the museum situation.

After the museum application starts, the receiver 8300 displays a museum guide map according to the museum application. The receiver 8300 also specifies the position of the receiver 8300 in the museum, as in any of Embodiments 1 to 3 described above. The receiver 8300 displays the specified position (e.g., star) of the receiver 8300 in the guide map.

To specify the position as mentioned above, the receiver 8300 obtains form information indicating the size, shape, and the like of the signboard 8307 from the server, for example, when downloading the museum application. The receiver 8300 specifies the relative position of the receiver 8300 to the signboard 8307 by triangulation or the like, based on the size and shape of the signboard 8307 indicated by the form information and the size and shape of the signboard 8307 shown in the captured image.

Figure 105:
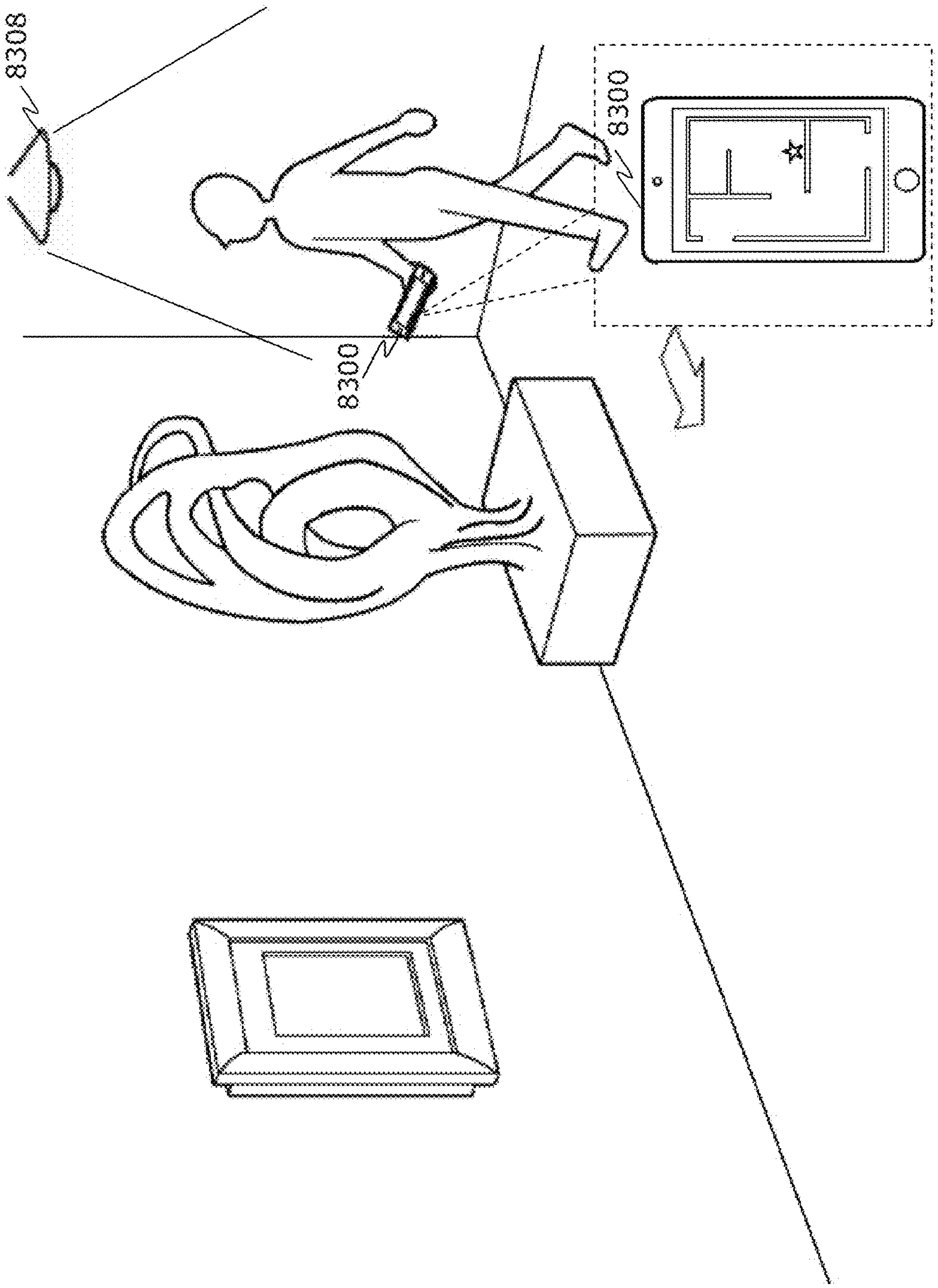

FIG. 105 is a diagram illustrating an example of next operation of the receiver 8300 in the museum situation.

When the user enters the museum, the receiver 8300 which has started the museum application as mentioned above frequently specifies the position of the receiver 8300 by performing visible light communication with a nearby transmitter such as a lighting device in the museum. For example, the receiver 8300 captures a transmitter 8308 such as a lighting device, to obtain the ID of the transmitter 8308 from the transmitter 8308. The receiver 8300 then obtains position information indicating the position of the transmitter 8308 and form information indicating the size, shape, and the like of the transmitter 8308 which are associated with the ID, from the server. The receiver 8300 estimates the relative position of the receiver 8300 to the transmitter 8308 by triangulation or the like, based on the size and shape of the transmitter 8308 indicated by the form information and the size and shape of the transmitter 8308 shown in the captured image. The receiver 8300 also specifies the position of the receiver 8300 in the museum, based on the position of the transmitter 8308 indicated by the position information obtained from the server and the estimated relative position of the receiver 8300.

Each time the position of the receiver 8300 is specified, the receiver 8300 moves the displayed star to the specified new position. The user who has entered the museum can easily know his or her position in the museum, from the guide map and the star displayed on the receiver 8300.

Figure 106:
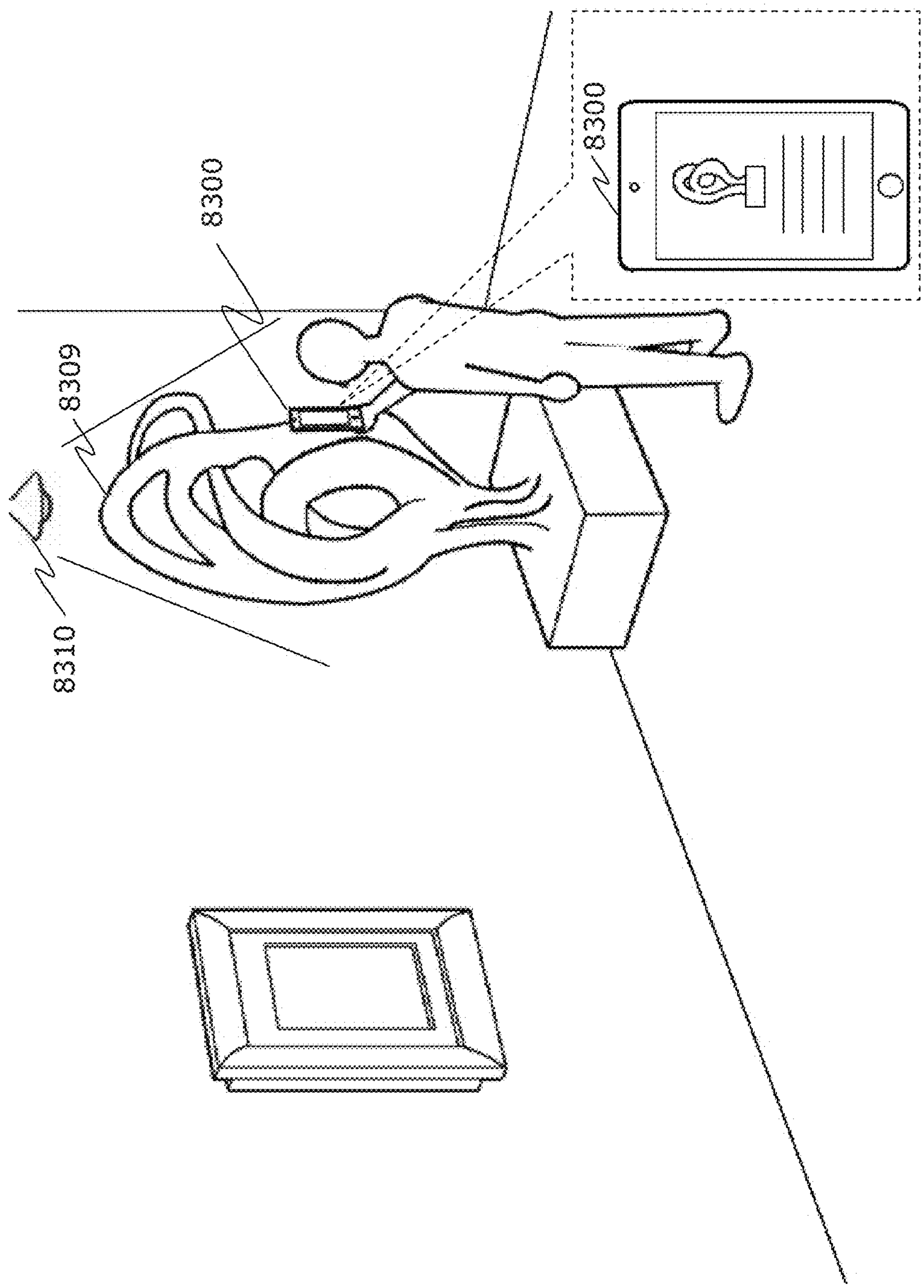

FIG. 106 is a diagram illustrating an example of next operation of the receiver 8300 in the museum situation.

The user who has entered the museum, upon finding an exhibit 8309 of interest, performs an operation of pointing the receiver 8300 at the exhibit 8309 so that the receiver 8300 can capture the exhibit 8309. Here, the exhibit 8309 is lit by light from a lighting device 8310. The lighting device 8310 is used exclusively for the exhibit 8309, and is a transmitter for transmitting a signal by changing in luminance. Accordingly, the exhibit 8309 which is lit by the light changing in luminance is indirectly transmitting the signal from the lighting device 8310.

Upon detecting the operation of pointing the receiver 8300 at the exhibit 8309 based on the output from the internal 9-axis sensor or the like, the receiver 8300 captures the exhibit 8309 to receive the signal from the lighting device 8310. The signal indicates the ID of the exhibit 8309, as an example. The receiver 8300 then obtains introduction information (service information) of the exhibit 8309 associated with the ID, from the server. The introduction information indicates a figure for introducing the exhibit 8309, and text for introduction in the language of each country such as Japanese, English, and French.

Having obtained the introduction information from the server, the receiver 8300 displays the figure and the text indicated by the introduction information. When displaying the text, the receiver 8300 extracts text of a language set by the user beforehand from among text of each language, and displays only the text of the language. The receiver 8300 may change the language according to a selection operation by the user.

Figure 107:
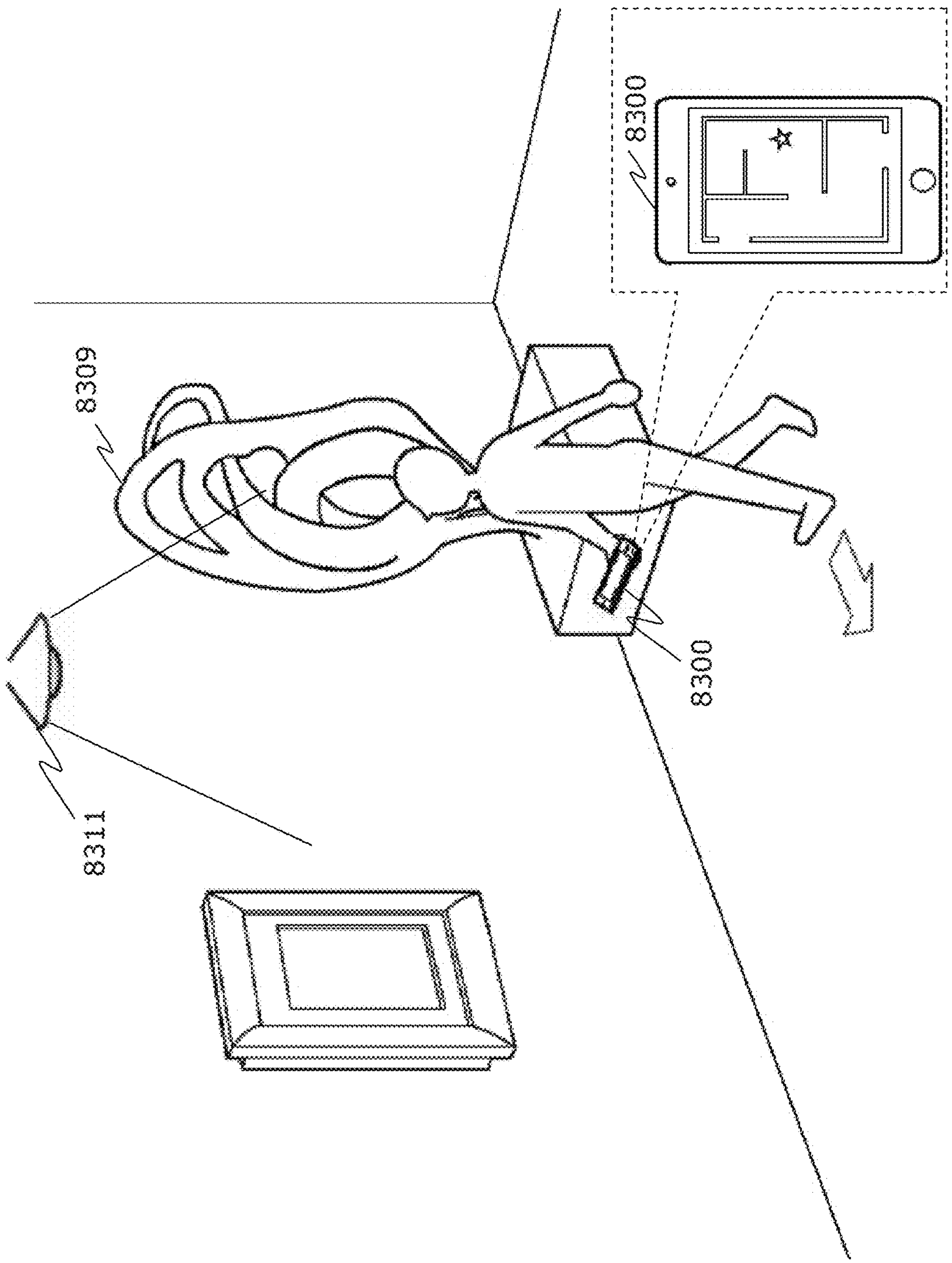

FIG. 107 is a diagram illustrating an example of next operation of the receiver 8300 in the museum situation.

After the display of the figure and the text in the introduction information ends according to a user operation, the receiver 8300 again specifies the position of the receiver 8300 by performing visible light communication with a nearby transmitter such as a lighting device (e.g., a lighting device 8311). Upon specifying the new position of the receiver 8300, the receiver 8300 moves the displayed star to the specified new position. Hence, the user who has appreciated the exhibit 8309 can easily move to the next exhibit of interest, by referring to the guide map and the star displayed on the receiver 8300.

Situation: Bus Stop

An example of application in a situation where the user carrying the receiver 8300 is at a bus stop is described below, with reference to FIGS. 108 to 109.

Figure 108:
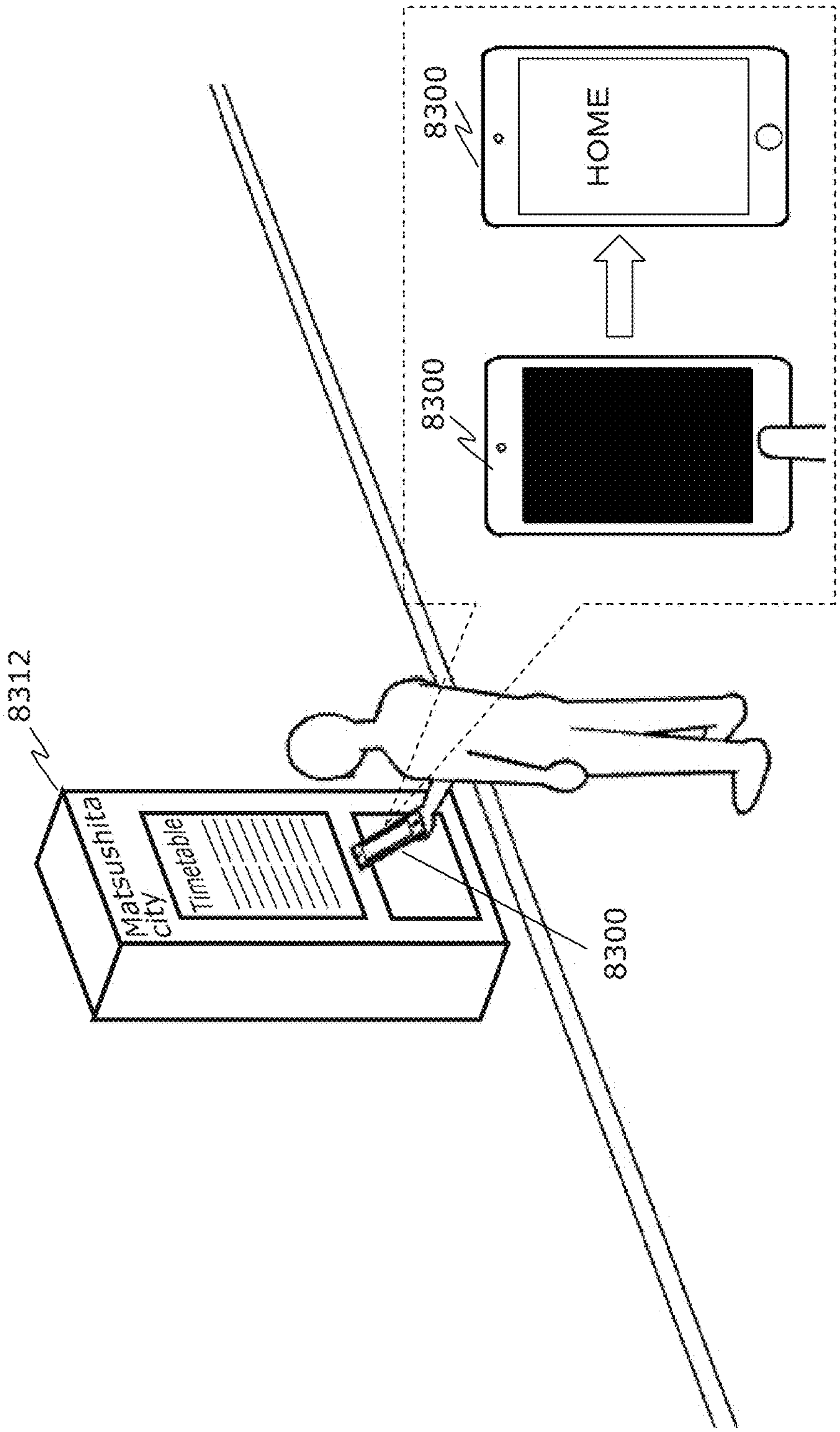

FIG. 108 is a diagram illustrating an example of operation of the receiver 8300 in the bus stop situation.

For example, the user goes to the bus stop to ride a bus. Upon determining that a sign 8312 at the bus stop is transmitting a signal by changing in luminance, the user operates the receiver 8300 to start the communication application of the receiver 8300, as in the example illustrated in FIG. 81. Alternatively, the receiver 8300 may automatically start the communication application as in the example illustrated in FIG. 82.

FIG. 109 is a diagram illustrating an example of next operation of the receiver 8300 in the bus stop situation.

The receiver 8300 captures the sign 8312, to obtain the ID of the bus stop where the sign 8312 is placed. The receiver 8300 transmits the ID to the server, and obtains operation state information associated with the ID from the server. The operation state information indicates the traffic state, and is service information indicating a service provided to the user.

Here, the server collects information from each bus operating in an area including the bus stop, to manage the operation state of each bus. Hence, upon obtaining the ID of the bus stop from the receiver 8300, the server estimates the time at which a bus arrives at the bus stop of the ID based on the managed operation state, and transmits the operation state information indicating the estimated time to the receiver 8300.

Having obtained the operation state information, the receiver 8300 displays the time indicated by the operation state information in a form such as “Arriving in 10 minutes”. This enables the user to easily recognize the operation state of the bus.

Supplementary Note

In the case where the scan direction on the imaging side is the vertical direction (up-down direction) of a mobile terminal, when an LED lighting device is captured with a shorter exposure time, bright lines of a black and white pattern can be captured in the same direction as the scan direction for ON/OFF of the entire LED lighting device, as illustrated in (a) in FIG. 110. In (a) in FIG. 110, a vertically long LED lighting device is captured so that its longitudinal direction is perpendicular to the scan direction on the imaging side (the left-right direction of the mobile terminal), and therefore many bright lines of the black and white pattern can be captured in the same direction as the scan direction. In other words, a larger amount of information can be transmitted and received. On the other hand, in the case where the vertically long LED lighting device is captured so as to be parallel to the scan direction on the imaging side (the up-down direction of the mobile terminal) as illustrated in (b) in FIG. 110, the number of bright lines of the black and white pattern that can be captured decreases. In other words, the amount of information that can be transmitted decreases.

Thus, depending on the direction of the LED lighting device with respect to the scan direction on the imaging side, many bright lines of the black and white pattern can be captured (in the case where the vertically long LED lighting device is captured so that its longitudinal direction is perpendicular to the scan direction on the imaging side) or only a few bright lines of the black and white pattern can be captured (in the case where the vertically long LED lighting device is captured so that its longitudinal direction is parallel to the scan direction on the imaging side).

This embodiment describes a lighting device control method capable of capturing many bright lines even in the case where only a few bright lines of the black and white pattern can be captured.

FIG. 111 illustrates an example of a lighting device having a plurality of LEDs in the vertical direction, and a drive signal for the lighting device. (a) in FIG. 111 illustrates the lighting device having the plurality of LEDs in the vertical direction. Suppose each LED element corresponds to a smallest unit of horizontal stripes obtained by coding a visible light communication signal, and corresponds to a coded ON/OFF signal. By generating the black and white pattern and turning each LED element ON or OFF for lighting in this way, the black and white pattern on an LED element basis can be captured even when the scan direction on the imaging side and the longitudinal direction of the vertically long LED lighting device are parallel to each other.

(c) and (d) in FIG. 111 illustrate an example of generating the black and white pattern and turning each LED element ON or OFF for lighting. When the lighting device lights as the black and white pattern, the light may become not uniform even in a short time. In view of this, an example of generating a reverse phase pattern and performing lighting alternately between the two patterns is illustrated in (c) and (d) in FIG. 111. Each element that is ON in (c) in FIG. 111 is OFF in (d) in FIG. 111, whereas each element that is OFF in (c) in FIG. 111 is ON in (d) in FIG. 111. By lighting in the black and white pattern alternately between the normal phase pattern and the reverse phase pattern in this way, a lot of information can be transmitted and received in visible light communication, without causing the light to become not uniform and without being affected by the relation between the scan direction on the imaging side and the direction of the lighting device. The present disclosure is not limited to the case of alternately generating two types of patterns, i.e., the normal phase pattern and the reverse phase pattern, for lighting, as three or more types of patterns may be generated for lighting. FIG. 112 illustrates an example of lighting in four types of patterns in sequence.

A structure in which usually the entire LED lighting blinks ((b) in FIG. 111) and, only for a predetermined time, the black and white pattern is generated to perform lighting on an LED element basis is also available. As an example, the entire LED lighting blinks for a transmission and reception time of a predetermined data unit, and subsequently lighting is performed in the black and white pattern on an LED element basis for a short time. The predetermined data unit is, for instance, a data unit from the first header to the next header. In this case, when the LED lighting is captured in the direction in (a) in FIG. 110, a signal is received from bright lines obtained by capturing the blink of the entire LED lighting. When the LED lighting is captured in the direction in (b) in FIG. 110, a signal is received from a light emission pattern on an LED element basis.

This embodiment is not limited to an LED lighting device, and is applicable to any device whose ON/OFF can be controlled in units of small elements like LED elements. Moreover, this embodiment is not limited to a lighting device, and is applicable to other devices such as a television, a projector, and a signage.

Though an example of lighting in the black and white pattern is described in this embodiment, colors may be used instead of the black and white pattern. As an example, in RGB, blink may be performed using only B, while R and G are constantly ON. The use of only B rather than R or G prevents recognition by humans, and therefore suppresses flicker. As another example, additive complementary colors (e.g., a red and cyan pattern, a green and magenta pattern, a yellow and blue pattern) may be used to display ON/OFF, instead of the black and white pattern. The use of additive complementary colors suppresses flicker.

Though an example of one-dimensionally arranging LED elements is described in this embodiment, LED elements may be arranged not one-dimensionally but two-dimensionally so as to be displayed like a 2D barcode.

Summary of this Embodiment

A service provision method in this embodiment is a service provision method of providing, using a terminal device that includes an image sensor having a plurality of exposure lines, a service to a user of the terminal device, the service provision method including: obtaining image data, by starting exposure sequentially for the plurality of exposure lines in the image sensor each at a different time and capturing a subject with an exposure time less than or equal to 1/480 second so that an exposure time of each of the plurality of exposure lines partially overlaps an exposure time of an adjacent one of the plurality of exposure lines; obtaining identification information of the subject, by demodulating a bright line pattern that appears in the image data, the bright line pattern corresponding to the plurality of exposure lines; and presenting service information associated with the identification information of the subject, to the user.

In this way, through the use of communication between the subject and the terminal device respectively as a transmitter and a receiver, the service information relating to the subject can be presented to the user of the terminal device. The user can thus be provided with information variable to the user in various forms, as a service. For example, in the presenting, at least one of: information indicating an advertisement, availability, or reservation status of a store relating to the subject; information indicating a discount rate of a product or a service; movie advertisement video; information indicating a showtime of a movie; information for guiding in a building; information for introducing an exhibit; and information indicating a traffic state may be presented as the service information.

For example, the service provision method may further include: transmitting, by the terminal device, the identification information of the subject to a server; and obtaining, by the terminal device, the service information associated with the identification information of the subject from the server, wherein in the presenting, the terminal device presents the obtained service information to the user.

In this way, the service information can be managed in the server in association with the identification information of the subject, which contributes to ease of maintenance such as service information update.

For example, in the transmitting, ancillary information may be transmitted to the server together with the identification information of the subject, and in the obtaining of the service information, the service information associated with the identification information of the subject and the ancillary information may be obtained.

In this way, a more suitable service for the user can be provided according to the ancillary information. For example, in the transmitting, personal information of the user, identification information of the user, number information indicating the number of people of a group including the user, or position information indicating a position of the terminal device may be transmitted as the ancillary information, as in the operation described with reference to FIGS. 84 and 97.

For example, the service provision method may further include: transmitting, by the terminal device, position information indicating a position of the terminal device to the server; and obtaining, by the terminal device, one or more sets of identification information of respective one or more devices located in a predetermined range including the position indicated by the position information and one or more sets of service information respectively associated with the one or more sets of identification information, from the server and holding the one or more sets of identification information and the one or more sets of service information, wherein in the presenting, the terminal device selects service information associated with the identification information of the subject from the one or more sets of service information held in the obtaining of the identification information, and presents the service information to the user.

In this way, when the terminal device obtains the identification information of the subject, the terminal device can obtain the service information associated with the identification information of the subject from the one or more sets of service information held beforehand and present the service information without communicating with the server or the like, as in the operation described with reference to FIG. 82 as an example. Faster service provision can therefore be achieved.

For example, the service provision method may further include: determining whether or not the user enters a store corresponding to the service information presented in the presenting, by specifying a position of the user; and in the case of determining that the user enters the store, obtaining, by the terminal device, product service information relating to a product or a service of the store from the server, and presenting the product service information to the user.

In this way, when the user enters the store, the menu of the store or the like can be automatically presented to the user as the product service information, as in the operation described with reference to FIGS. 86 to 90 as an example. This saves the need for the store staff to present the menu or the like to the user, and enables the user to make an order to the store in a simple manner.

For example, the service provision method may further include: determining whether or not the user enters a store corresponding to the service information presented in the presenting, by specifying a position of the user; and in the case of determining that the user enters the store, presenting, by the terminal device, additional service information of the store to the user, the additional service information being different depending on at least one of the position of the subject and a time at which the service information is presented.

In this way, when the subject is closer to the store which the user enters or when the time at which the user enters the store and the time at which the service information is presented (or the time at which the subject is captured) are closer to each other, service information more valuable to the user can be presented to the user as the additional service information, as in the process described with reference to FIGS. 86 to 90 as an example. Suppose each of a plurality of stores belonging to a chain is a store corresponding to the presented service information, and a sign which is the subject is displayed by one (advertisement store) of the plurality of stores. In such a case, the advertisement store is usually closest to the subject (sign) from among the plurality of stores belonging to the chain. Accordingly, when the subject is closer to the store which the user enters or when the time at which the user enters the store and the time at which the service information is presented are closer to each other, there is a high possibility that the store which the user enters is the advertisement store. In the case where there is a high possibility that the user enters the advertisement store, service information more valuable to the user can be presented to the user as the additional service information.

For example, the service provision method may further include: determining whether or not the user enters a store corresponding to the service information presented in the presenting, by specifying a position of the user; and in the case of determining that the user enters the store, presenting, by the terminal device, additional service information of the store to the user, the additional service information being different depending on the number of times the user uses a service indicated by the service information in the store.

In this way, when the number of times the service is used is larger, service information more valuable to the user can be presented to the user as the additional service information, as in the operation described with reference to FIGS. 86 to 90 as an example. For instance, when the number of uses of service information indicating 20% product price discount exceeds a threshold, additional service information indicating additional 10% discount can be presented to the user.

For example, the service provision method may further include: determining whether or not the user enters a store corresponding to the service information presented in the presenting, by specifying a position of the user; in the case of determining that the user enters the store, determining whether or not a process including the obtaining of image data, the obtaining of identification information, and the presenting is also performed for all subjects associated with the store other than the subject; and presenting, by the terminal device, additional service information of the store to the user in the case of determining that the process is performed.

In this way, for instance in the case where the store displays several subjects as signs and the obtaining of image data, the obtaining of identification information, and the presenting have been performed for all of these signs, service information most valuable to the user can be presented to the user as the additional service information, as in the operation described with reference to FIGS. 86 to 90 as an example.

For example, the service provision method may further include: determining whether or not the user enters a store corresponding to the service information presented in the presenting, by specifying a position of the user; and in the case of determining that the user enters the store, presenting, by the terminal device, additional service information of the store to the user, the additional service information being different depending on a difference between a time at which the service information is presented and a time at which the user enters the store.

In this way, when the difference between the time at which the service information is presented (or the time at which the subject is captured) and the time at which the user enters the store is smaller, service information more valuable to the user can be presented to the user as the additional service information, as in the operation described with reference to FIGS. 86 to 90 as an example. That is, the time from when the service information is presented to the user as a result of capturing the subject to when the user enters the store is shorter, the user is additionally provided with a more valuable service.

For example, the service provision method may further include: determining whether or not the user uses a service indicated by the service information in a store corresponding to the service information presented in the presenting; and accumulating, each time the service information is presented, a determination result in the determining, and analyzing an advertising effect of the subject based on an accumulation result.

In this way, in the case where the service information indicates a service such as 20% product price discount or the like, it is determined whether or not the service is used by electronic payment or the like, as in the operation described with reference to FIGS. 86 to 90 as an example. Thus, each time the service is provided to the user upon capturing the subject, whether or not the service is used is determined. As a result, the advertising effect of the subject is analyzed as high in the case where, for example, it is frequently determined that the service is used. Hence, the advertising effect of the subject can be appropriately analyzed based on the use result.

For example, in the analyzing, at least one of a position of the subject, a time at which the service information is presented, a position of the store, and a time at which the user enters the store may be accumulated together with the determination result in the determining, to analyze the advertising effect of the subject based on an accumulation result.

In this way, the advertising effect of the subject can be analyzed in more detail. For instance, in the case where the position of the subject is changed, it is possible to compare the advertising effect between the original position and the changed position, as a result of which the subject can be displayed at a position with higher advertising effectiveness.

For example, the service provision method may further include: determining whether or not the user uses a service indicated by the service information in a store corresponding to the service information presented in the presenting; in the case of determining that the user uses the service, determining whether or not a used store which is the store where the service is used is a specific store associated with the subject; and in the case of determining that the used store is not the specific store, returning at least a part of an amount paid for using the service in the store, to the specific store using electronic commerce.

In this way, even in the case where the service is not used in the specific store (e.g., the advertisement store displaying the sign which is the subject), the specific store can earn a profit for the cost of installing the sign which is the subject, as in the operation described with reference to FIGS. 86 to 90 as an example.

For example, in the presenting, the terminal device may present the service information for introducing the subject to the user in the case where the subject lit by light changing in luminance is captured in the obtaining of the image data, and the terminal device may present the service information for guiding in a building in which the subject is placed in the case where a lighting device changing in luminance is captured as the subject in the obtaining of the image data.

In this way, a guide service in a building such as a museum and an introduction service for an exhibit which is the subject can be appropriately provided to the user, as in the operation described with reference to FIGS. 105 and 106 as an example.

An information communication method in this embodiment is an information communication method of obtaining information from a subject having a plurality of light emitting elements, the information communication method including: setting an exposure time of an image sensor so that, in an image obtained by capturing the subject by the image sensor, a bright line corresponding to an exposure line included in the image sensor appears according to a change in luminance of the subject; obtaining a bright line image by capturing, by the image sensor with the set exposure time, the subject in which the plurality of light emitting elements all change in luminance in the same manner according to a pattern of the change in luminance for representing first information, the bright line image being an image including the bright line; obtaining the first information by demodulating data specified by a pattern of the bright line included in the obtained bright line image; and obtaining second information, by capturing the subject in which each of the plurality of light emitting elements emits light with one of two different luminance values and demodulating data specified by a light and dark sequence of luminance along a direction parallel to the exposure line, the light and dark sequence being shown in an image obtained by capturing the subject.

Alternatively, an information communication method in this embodiment is an information communication method of transmitting a signal using a change in luminance, the information communication method including: determining a pattern of the change in luminance, by modulating a first signal to be transmitted; transmitting the first signal, by all of a plurality of light emitting elements in a light emitter changing in luminance in the same manner according to the determined pattern of the change in luminance; and transmitting a second signal to be transmitted, by each of the plurality of light emitting elements emitting light with one of two different luminance values so that a light and dark sequence of luminance appears in a space where the light emitter is placed.

In this way, even when a lighting device which is the subject or the light emitter has a long and thin shape including a plurality of LEDs arranged in a line, the receiver can appropriately obtain the information or signal from the lighting device regardless of the imaging direction, as in the operation described with reference to FIGS. 110 to 112 as an example. In detail, in the case where the exposure line (the operation direction on the imaging side) of the image sensor included in the receiver is not parallel to the arrangement direction of the plurality of LEDs, the receiver can appropriately obtain the information or signal from the luminance change of the entire lighting device. Even in the case where the exposure line is parallel to the arrangement direction, the receiver can appropriately obtain the information or signal from the light and dark sequence of luminance along the direction parallel to the exposure line. In other words, the dependence of information reception on the imaging direction can be reduced.

Embodiment 5

This embodiment describes each example of application using a receiver such as a smartphone and a transmitter for transmitting information as a blink pattern of an LED, an organic EL device, or the like in Embodiments 1 to 4 described above.

FIG. 113 is a diagram illustrating an example of operation of a transmitter in Embodiment 5.

Transmitters 8321, 8322, and 8323 each have the same function as the transmitter in any of Embodiments 1 to 4 described above, and is a lighting device that transmits a signal by changing in luminance (visible light communication). The transmitters 8321 to 8323 each transmit a signal by changing in luminance at a different frequency. For example, the transmitter 8321 transmits the ID "1000" of the transmitter 8321, by changing in luminance at frequency a (e.g., 9200 Hz). The transmitter 8322 transmits the ID "2000" of the transmitter 8322, by changing in luminance at frequency b (e.g., 9600 Hz). The transmitter 8323 transmits the ID "3000" of the transmitter 8322, by changing in luminance at frequency c (e.g., 10000 Hz).

A receiver captures (visible light imaging) the transmitters 8321 to 8323 so that the transmitters 8321 to 8323 are all included in the angle of view, in the same way as in Embodiments 1 to 4. A bright line pattern corresponding to each transmitter appears in an image obtained as a result of image capture. It is possible to specify, from the bright line pattern, the luminance change frequency of the transmitter corresponding to the bright line pattern.

Suppose the frequencies of the transmitters 8321 to 8323 are the same. In such a case, the same frequency is specified from the bright line pattern corresponding to each transmitter. In the case where these bright line patterns are adjacent to each other, it is difficult to distinguish between the bright line patterns because the frequency specified from each of the bright line patterns is the same.

In view of this, the transmitters 8321 to 8323 each change in luminance at a different frequency, as mentioned above. As a result, the receiver can easily distinguish between the bright line patterns and, by demodulating data specified by each bright line pattern, appropriately obtain the ID of each of the transmitters 8321 to 8323. Thus, the receiver can appropriately distinguish between the signals from the transmitters 8321 to 8323.

The frequency of each of the transmitters 8321 to 8323 may be set by a remote control, and may be set randomly. Each of the transmitters 8321 to 8323 may communicate with its adjacent transmitter, and automatically set the frequency of the transmitter so as to be different from the frequency of the adjacent transmitter.

FIG. 114 is a diagram illustrating an example of operation of a transmitter in Embodiment 5.

In the above example, each transmitter changes in luminance at a different frequency. In the case where there are at least five transmitters, however, each transmitter need not change in luminance at a different frequency. In detail, each of the at least five transmitters may change in luminance at any one of four types of frequencies.

For example as illustrated in FIG. 114, even in a situation where the bright line patterns (rectangles in FIG. 114) respectively corresponding to the at least five transmitters are adjacent, the same number of types of frequencies as the number of transmitters are not needed. So long as there are four types (frequencies a, b, c, and d), it can be ensured that the frequencies of adjacent bright line patterns are different. This is reasoned by the four color theorem or the four color problem.

In detail, in this embodiment, each of the plurality of transmitters changes in luminance at any one of at least four types of frequencies, and two or more light emitters of the plurality of transmitters change in luminance at the same frequency. Moreover, the plurality of transmitters each change in luminance so that the luminance change frequency is different between all transmitters (bright line patterns as transmitter images) which, in the case where the plurality of transmitters are projected on the light receiving surface of the image sensor of the receiver, are adjacent to each other on the light receiving surface.

FIG. 115 is a diagram illustrating an example of operation of a transmitter in Embodiment 5.

A transmitter changes in luminance to output high-luminance light (H) or low-luminance light (L) per predetermined time unit (slot), thereby transmitting a signal. Here, the transmitter transmits a signal for each block made up of a header and a body. The header is expressed as (L, H, L, H, L, H, H) using seven slots, as illustrated in FIG. 79A as an example. The body is made up of a plurality of symbols (00, 01, 10, or 11), where each symbol is expressed using four slots (4-value PPM). The block is expressed using a predetermined number (19 in the example in FIG. 115) of slots. For instance, an ID is obtained by combining the body included in each of four blocks. The block may instead be expressed using 33 slots.

A bright line pattern obtained by image capture by a receiver includes a pattern (header pattern) corresponding to the header and a pattern (data pattern) corresponding to the body. The data pattern does not include the same pattern as the header pattern. Accordingly, the receiver can easily find the header pattern from the bright line pattern, and measure the number of pixels between the header pattern and the next header pattern (the number of exposure lines corresponding to the block). Since the number of slots per block (19 in the example in FIG. 115) is set to a fixed number regardless of the frequency, the receiver can specify the frequency (the inverse of the duration of one slot) of the transmitter according to the measured number of pixels. That is, the receiver specifies a lower frequency when the number of pixels is larger, and a higher frequency when the number of pixels is smaller.

Thus, by capturing the transmitter, the receiver can obtain the ID of the transmitter, and also specify the frequency of the transmitter. Through the use of the specified frequency, the receiver can determine whether or not the obtained ID is correct, that is, perform error detection on the ID. In detail, the receiver calculates a hash value for the ID, and compares the hash value with the specified frequency. In the case where the hash value and the frequency match, the receiver determines that the obtained ID is correct. In the case where the hash value and the frequency do not match, the receiver determines that the obtained ID is incorrect (error). For instance, the receiver uses the remainder when dividing the ID by a predetermined divisor, as the hash value. Conversely, the transmitter transmits the ID, by changing in luminance at the frequency (the inverse of the duration of one slot) of the same value as the hash value for the ID.

FIG. 116 is a diagram illustrating an example of operation of a transmitter and a receiver in Embodiment 5.

The transmitter may change in luminance using an arbitrary frequency, instead of using the frequency of the same value as the hash value as mentioned above. In this case, the transmitter transmits a signal indicating a value different from the ID of the transmitter. For example, in the case where the ID of the transmitter is “100” and the transmitter uses 2 kHz as an arbitrary frequency, the transmitter transmits the signal “1002” that combines the ID and the frequency. Likewise, in the case where the ID of another transmitter is “110” and this other transmitter uses 1 kHz as an arbitrary frequency, the other transmitter transmits the signal “1101” that combines the ID and the frequency.

In such a case, the receiver uses the value of the last digit of the signal obtained from the transmitter for error detection, and extracts the value of the other digits as the ID of the transmitter. The receiver compares the frequency specified from the luminance pattern and the value of the last digit of the obtained signal. In the case where the value of the last digit and the frequency match, the receiver determines that the extracted ID is correct. In the case where the value of the last digit and the frequency do not match, the receiver determines that the extracted ID is incorrect (error).

In this way, the degree of freedom in setting the luminance change frequency in the transmitter can be increased, while enabling error detection in the receiver.

FIG. 117 is a diagram illustrating an example of operation of a receiver in Embodiment 5.

As illustrated in FIG. 117, there is the case where, in an image obtained by image capture (visible light imaging) by the receiver, a part of a bright line pattern 8327*a* and a part of a bright line pattern 8327*b* overlap each other. In such a case, the receiver does not demodulate data from an overlapping part 8327*c* of the bright line patterns 8327*a* and 8327*b*, and demodulates data from the parts of the bright line patterns 8327*a* and 8327*b* other than the part 8327*c*. By doing so, the receiver can obtain an appropriate ID from each of the bright line patterns 8327*a* and 8327*b*.

FIG. 118 is a diagram illustrating an example of operation of a receiver in Embodiment 5.

The transmitter switches, for each block as an example, the luminance change frequency for transmitting the block, as illustrated in (a) in FIG. 118. This enables the receiver to detect the block boundary more easily.

Moreover, the transmitter uses different frequencies as the luminance change frequency for transmitting the header of the block and the luminance change frequency for transmitting the body of the block as an example, as illustrated in (b) in FIG. 118. This prevents the same pattern as the header from occurring in the body. As a result, the receiver can distinguish between the header and the body more appropriately.

FIG. 119 is a diagram illustrating an example of operation of a system including a transmitter, a receiver, and a server in Embodiment 5.

The system in this embodiment includes a transmitter 8331, a receiver 8332, and a server 8333. The transmitter 8331 has the same function as the transmitter in any of Embodiments 1 to 4 described above, and is a lighting device that transmits the ID of the transmitter 8331 by changing in luminance (visible light communication). The receiver 8332 has the same function as the receiver in any of Embodiments 1 to 4 described above, and obtains the ID of the transmitter 8331 from the transmitter 8331 by capturing the transmitter 8331 (visible light imaging). The server 8333 communicates with the transmitter 8331 and the receiver 8332 via a network such as the Internet.

Note that, in this embodiment, the ID of the transmitter 8331 is fixed without a change. Meanwhile, the frequency used for the luminance change (visible light communication) of the transmitter 8331 can be arbitrarily changed by setting.

In such a system, first the transmitter 8331 registers the frequency used for the luminance change (visible light communication), in the server 8333. In detail, the transmitter 8331 transmits the ID of the transmitter 8331, registered frequency information indicating the frequency of the transmitter 8331, and related information relating to the transmitter 8331, to the server 8333. Upon receiving the ID, registered frequency information, and related information of the transmitter 8331, the server 8333 records them in association with each other. That is, the ID of the transmitter 8331, the frequency used for the luminance change of the transmitter 8331, and the related information are recorded in association with each other. The frequency used for the luminance change of the transmitter 8331 is registered in this way.

Next, the transmitter 8331 transmits the ID of the transmitter 8331, by changing in luminance at the registered frequency. The receiver 8332 captures the transmitter 8331 to obtain the ID of the transmitter 8331, and specifies the luminance change frequency of the transmitter 8331 as mentioned above.

The receiver 8332 then transmits the obtained ID and specified frequency information indicating the specified frequency, to the server 8333. Upon receiving the ID and the specified frequency information transmitted from the receiver 8332, the server 8333 searches for the frequency (the frequency indicated by the registered frequency information) recorded in association with the ID, and determines whether or not the recorded frequency and the frequency indicated by the specified frequency information match. In the case of determining that the frequencies match, the server 8333 transmits the related information (data) recorded in association with the ID and the frequency, to the receiver 8332.

If the frequency specified by the receiver 8332 does not match the frequency registered in the server 8333, the related information is not transmitted from the server 8333 to the receiver 8332. Therefore, by changing the frequency registered in the server 8333 according to need, it is possible to prevent a situation where, once the receiver 8332 has obtained the ID from the transmitter 8331, the receiver 8332 can receive the related information from the server 8333 at any time. In detail, by changing the frequency registered in the server 8333 (i.e., the frequency used for the luminance change), the transmitter 8331 can prohibit the receiver 8332 that has obtained the ID before the change, from obtaining the related information. In other words, by changing the frequency, it is possible to set a time limit for the obtainment of the related information. As an example, in the case where the user of the receiver 8332 stays at a hotel in which the transmitter 8331 is installed, an administrator in the hotel changes the frequency after the stay. Hence, the receiver 8332 can obtain the related information only on the date when the user stays at the hotel, and is prohibited from obtaining the related information after the stay.

The server 8333 may register a plurality of frequencies in association with one ID. For instance, each time the server 8333 receives the registered frequency information from the receiver 8332, the server 8333 registers the frequencies indicated by four latest sets of registered frequency information, in association with the ID. This allows even the receiver 8332 which obtained the ID in the past, to obtain the related information from the server 8333 until the frequency is changed three times. The server 8333 may also manage, for each registered frequency, the time at which or period during which the frequency is set in the transmitter 8331. In such a case, upon receiving the ID and the specified frequency information from the receiver 8332, the server 8333 can specify the period during which the receiver 8332 obtains the ID, by referring to the time period and the like managed for the frequency indicated by the specified frequency information.

FIG. 120 is a block diagram illustrating a structure of a transmitter in Embodiment 5.

A transmitter 8334 has the same function as the transmitter in any of Embodiments 1 to 4 described above, and includes a frequency storage unit 8335, an ID storage unit 8336, a check value storage unit 8337, a check value comparison unit 8338, a check value calculation unit 8339, a frequency calculation unit 8340, a frequency comparison unit 8341, a transmission unit 8342, and an error reporting unit 8343.

The frequency storage unit 8335 stores the frequency used for the luminance change (visible light communication). The ID storage unit 8336 stores the ID of the transmitter 8334. The check value storage unit 8337 stores a check value for determining whether or not the ID stored in the ID storage unit 8336 is correct.

The check value calculation unit 8339 reads the ID stored in the ID storage unit 8336, and applies a predetermined function to the ID to calculate a check value (calculated check value) for the ID. The check value comparison unit 8338 reads the check value stored in the check value storage unit 8337, and compares the check value with the calculated check value calculated by the check value calculation unit 8339. In the case of determining that the calculated check value is different from the check value, the check value comparison unit 8338 notifies an error to the error reporting unit 8343. For example, the check value storage unit 8337 stores the value “0” indicating that the ID stored in the ID storage unit 8336 is an even number, as the check value. The check value calculation unit 8339 reads the ID stored in the ID storage unit 8336, and divides it by the value “2” to calculate the remainder as the calculated check value. The check value comparison unit 8338 compares the check value “0” and the calculated check value which is the remainder of the division mentioned above.

The frequency calculation unit 8340 reads the ID stored in the ID storage unit 8336 via the check value calculation unit 8339, and calculates the frequency (calculated frequency) from the ID. For instance, the frequency calculation unit 8340 divides the ID by a predetermined value, to calculate the remainder as the frequency. The frequency comparison unit 8341 compares the frequency (stored frequency) stored in the frequency storage unit 8335 and the calculated frequency. In the case of determining that the calculated frequency is different from the stored frequency, the frequency comparison unit 8341 notifies an error to the error reporting unit 8343.

The transmission unit 8342 transmits the ID stored in the ID storage unit 8336, by changing in luminance at the calculated frequency calculated by the frequency calculation unit 8340.

The error reporting unit 8343, when notified of the error from at least one of the check value comparison unit 8338 and the frequency comparison unit 8341, reports the error by buzzer sound, blink, or lighting. In detail, the error reporting unit 8343 includes a lamp for error reporting, and reports the error by lighting or blinking the lamp. Alternatively, when the power switch of the transmitter 8334 is turned on, the error reporting unit 8343 reports the error by blinking, at a frequency perceivable by humans, a light source that changes in luminance to transmit a signal such as an ID, for a predetermined period (e.g., 10 seconds).

Thus, whether or not the ID stored in the ID storage unit 8336 and the frequency calculated from the ID are correct is checked, with it being possible to prevent erroneous ID transmission and luminance change at an erroneous frequency.

FIG. 121 is a block diagram illustrating a structure of a receiver in Embodiment 5.

A receiver 8344 has the same function as the receiver in any of Embodiments 1 to 4 described above, and includes a light receiving unit 8345, a frequency detection unit 8346, an ID detection unit 8347, a frequency comparison unit 3848, and a frequency calculation unit 8349.

The light receiving unit 8345 includes an image sensor as an example, and captures (visible light imaging) a transmitter that changes in luminance to obtain an image including a bright line pattern. The ID detection unit 8347 detects the ID of the transmitter from the image. That is, the ID detection unit 8347 obtains the ID of the transmitter, by demodulating data specified by the bright line pattern included in the image. The frequency detection unit 8346 detects the luminance change frequency of the transmitter, from the image. That is, the frequency detection unit 8346 specifies the frequency of the transmitter from the bright line pattern included in the image, as in the example described with reference to FIG. 115.

The frequency calculation unit 8349 calculates the frequency of the transmitter from the ID detected by the ID detection unit 8347, for example, by dividing the ID as mentioned above. The frequency comparison unit 8348 compares the frequency detected by the frequency detection unit 8346 and the frequency calculated by the frequency calculation unit 8349. In the case where these frequencies are different, the frequency comparison unit 8348 determines that the detected ID is an error, and causes the ID detection unit 8347 to detect the ID again. Obtainment of an erroneous ID can be prevented in this way.

FIG. 122 is a diagram illustrating an example of operation of a transmitter in Embodiment 5.

The transmitter may transmit each of the symbols “00, 01, 10, 11” separately, by making the luminance change position in a predetermined time unit different.

For example, when transmitting the symbol “00”, the transmitter transmits the symbol “00” by changing in luminance only for a first section which is the first section in the time unit. When transmitting the symbol “01”, the transmitter transmits the symbol “01” by changing in luminance only for a second section which is the second section in the time unit. Likewise, when transmitting the symbol “10”, the transmitter transmits the symbol “10” by changing in luminance only for a third section which is the third section in the time unit. When transmitting the symbol “11”, the transmitter transmits the symbol “11” by changing in luminance only for a fourth section which is the fourth section in the time unit.

Thus, in this embodiment, the luminance changes in one section regardless of which symbol is transmitted, so that flicker can be suppressed as compared with the above-mentioned transmitter that causes one entire section (slot) to be low in luminance.

FIG. 123 is a diagram illustrating an example of operation of a transmitter in Embodiment 5.

The transmitter may transmit each of the symbols “0, 1” separately, by making whether or not the luminance changes in a predetermined time unit different. For example, when transmitting the symbol “0”, the transmitter transmits the symbol “0” by not changing in luminance in the time unit. When transmitting the symbol “1”, the transmitter transmits the symbol “1” by changing in luminance in the time unit.

FIG. 124 is a diagram illustrating an example of operation of a transmitter in Embodiment 5.

The transmitter may transmit each of the symbols “00, 01, 10, 11” separately, by making the luminance change frequency in a predetermined time unit different. For example, when transmitting the symbol “00”, the transmitter transmits the symbol “00” by not changing in luminance in the time unit. When transmitting the symbol “01”, the transmitter transmits the symbol “01” by changing in luminance (changing in luminance at a low frequency) in the time unit. When transmitting the symbol “10”, the transmitter transmits the symbol “10” by changing in luminance sharply (changing in luminance at a high frequency) in the time unit. When transmitting the symbol “11”, the transmitter transmits the symbol “11” by changing in luminance more sharply (changing in luminance at a higher frequency) in the time unit.

FIG. 125 is a diagram illustrating an example of operation of a transmitter in Embodiment 5.

The transmitter may transmit each of the symbols “0, 1” separately, by making the phase of the luminance change in a predetermined time unit different. For example, when transmitting the symbol “0”, the transmitter transmits the symbol “0” by changing in luminance in a predetermined phase in the time unit. When transmitting the symbol “1”, the transmitter transmits the symbol “1” by changing in luminance in the reverse phase of the above-mentioned phase in the time unit.

FIG. 126 is a diagram illustrating an example of operation of a transmitter in Embodiment 5.

When transmitting a signal such as an ID, the transmitter changes in luminance according to color such as red, green and blue. The transmitter can therefore transmit a signal of a larger amount of information, to a receiver capable of recognizing the luminance change according to color. The luminance change of any of the colors may be used for clock synchronization. For example, the luminance change of red color may be used for clock synchronization. In this case, the luminance change of red color serves as a header. Since there is no need to use a header for the luminance change of each color (green and blue) other than red, redundant data transmission can be avoided.

FIG. 127 is a diagram illustrating an example of operation of a transmitter in Embodiment 5.

The transmitter may express the luminance of synthetic color (e.g., white) by synthesizing a plurality of colors such as red, green, and blue. In other words, the transmitter expresses the luminance change of synthetic color, by changing in luminance according to color such as red, green, and blue. A signal is transmitted using this luminance change of synthetic color, as in the above-mentioned visible light communication. Here, the luminance of one or more colors of red, green, and blue may be used for adjustment when expressing predetermined luminance of synthetic color. This enables the signal to be transmitted using the luminance change of synthetic color, and also enables the signal to be transmitted using the luminance change of any two colors of red, green, and blue. The transmitter can therefore transmit a signal even to a receiver capable of recognizing only the luminance change of the above-mentioned synthetic color (e.g., white), and also transmit more signals as ancillary information to a receiver capable of recognizing each color such as red, green, and blue.

FIG. 128 is a diagram illustrating an example of operation of a transmitter in Embodiment 5.

The transmitter includes four light sources. The four light sources (e.g., LED lights) emit light of the colors expressed by different positions 8351*a*, 8351*b*, 8352*a*, and 8352*b* in a CIExy chromaticity diagram illustrated in FIG. 128.

The transmitter transmits each signal by switching between first lighting transmission and second lighting transmission. The first lighting transmission is a process of transmitting the signal "0" by turning on the light source for emitting light of the color of the position 8351*a* and the light source for emitting the light of the color of the position 8351*b* from among the four light sources. The second lighting transmission is a process of transmitting the signal "1" by turning on the light source for emitting light of the color of the position 8352*a* and the light source for emitting the light of the color of the position 8352*b*. The image sensor in the receiver can identify the color expressed by each of the positions 8351*a*, 8351*b*, 8352*a*, and 8352*b*, and so the receiver can appropriately receive the signal "0" and the signal "1".

During the first lighting transmission, the color expressed by the intermediate position between the positions 8351*a* and 8351*b* in the CIExy chromaticity diagram is seen by the human eye. Likewise, during the second lighting transmission, the color expressed by the intermediate position between the positions 8352*a* and 8352*b* in the CIExy chromaticity diagram is seen by the human eye. Therefore, by appropriately adjusting the color and luminance of each of the four light sources, it is possible to match the intermediate position between the positions 8351*a* and 8351*b* and the intermediate position between the positions 8352*a* and 8352*b* to each other (to a position 8353). As a result, even when the transmitter switches between the first lighting transmission and the second lighting transmission, to the human eye the light emission color of the transmitter appears to be fixed. Flicker perceived by humans can thus be suppressed.

FIG. 129 is a diagram illustrating an example of operation of a transmitter and a receiver in Embodiment 5.

The transmitter includes an ID storage unit 8361, a random number generation unit 8362, an addition unit 8363, an encryption unit 8364, and a transmission unit 8365. The ID storage unit 8361 stores the ID of the transmitter. The random number generation unit 8362 generates a different random number at regular time intervals. The addition unit 8363 combines the ID stored in the ID storage unit 8361 with the latest random number generated by the random number generation unit 8362, and outputs the result as an edited ID. The encryption unit 8364 encrypts the edited ID to generate an encrypted edited ID. The transmission unit 8365 transmits the encrypted edited ID to the receiver by changing in luminance.

The receiver includes a reception unit 8366, a decryption unit 8367, and an ID obtainment unit 8368. The reception unit 8366 receives the encrypted edited ID from the transmitter, by capturing the transmitter (visible light imaging). The decryption unit 8367 decrypts the received encrypted edited ID to restore the edited ID. The ID obtainment unit 8368 extracts the ID from the edited ID, thus obtaining the ID.

For instance, the ID storage unit 8361 stores the ID "100", and the random number generation unit 8362 generates a new random number "817" (example 1). In this case, the addition unit 8363 combines the ID "100" with the random number "817" to generate the edited ID "100817", and outputs it. The encryption unit 8364 encrypts the edited ID "100817" to generate the encrypted edited ID "abced". The decryption unit 8367 in the receiver decrypts the encrypted edited ID "abced" to restore the edited ID "100817". The ID obtainment unit 8368 extracts the ID "100" from the restored edited ID "100817". In other words, the ID obtainment unit 8368 obtains the ID "100" by deleting the last three digits of the edited ID.

Next, the random number generation unit 8362 generates a new random number "619" (example 2). In this case, the addition unit 8363 combines the ID "100" with the random number "619" to generate the edited ID "100619", and outputs it. The encryption unit 8364 encrypts the edited ID "100619" to generate the encrypted edited ID "difia". The decryption unit 8367 in the receiver decrypts the encrypted edited ID "difia" to restore the edited ID "100619". The ID obtainment unit 8368 extracts the ID "100" from the restored edited ID "100619". In other words, the ID obtainment unit 8368 obtains the ID "100" by deleting the last three digits of the edited ID.

Thus, the transmitter does not simply encrypt the ID but encrypts its combination with the random number changed at regular time intervals, with it being possible to prevent the ID from being easily cracked from the signal transmitted from the transmission unit 8365. That is, in the case where the simply encrypted ID is transmitted from the transmitter to the receiver a plurality of times, even though the ID is encrypted, the signal transmitted from the transmitter to the receiver is the same if the ID is the same, so that there is a possibility of the ID being cracked. In the example illustrated in FIG. 129, however, the ID is combined with the random number changed at regular time intervals, and the ID combined with the random number is encrypted. Therefore, even in the case where the same ID is transmitted to the receiver a plurality of times, if the time of transmitting the ID is different, the signal transmitted from the transmitter to the receiver is different. This protects the ID from being cracked easily.

FIG. 130 is a diagram illustrating an example of operation of a transmitter and a receiver in Embodiment 5.

The transmitter includes an ID storage unit 8371, a timer unit 8372, an addition unit 8373, an encryption unit 8374, and a transmission unit 8375. The ID storage unit 8371 stores the ID of the transmitter. The timer unit 8372 counts time, and outputs the current date and time (the current year, month, day, and time). The addition unit 8373 combines the ID stored in the ID storage unit 8371 with the current date and time output from the timer unit 8372 as a transmission date and time, and outputs the result as an edited ID. The encryption unit 8374 encrypts the edited ID to generate an encrypted edited ID. The transmission unit 8375 transmits the encrypted edited ID to the receiver by changing in luminance.

The receiver includes a reception unit 8376, a decryption unit 8377, a validity determination unit 8378, and a timer unit 8379. The reception unit 8376 receives the encrypted edited ID from the transmitter, by capturing the transmitter (visible light imaging). The decryption unit 8377 decrypts the received encrypted edited ID to restore the edited ID. The timer unit 8379 counts time, and outputs the current date and time (the current year, month, day, and time). The validity determination unit 8378 extracts the ID from the restored edited ID, thus obtaining the ID. The validity determination unit 8378 also extracts the transmission date and time from the restored edited ID, and compares the transmission date and time with the current date and time output from the timer unit 8379 to determine the validity of the ID. For example, in the case where the difference between the transmission date and time and the current date and time is longer than a predetermined time or in the case where the transmission date and time is later than the current date and time, the validity determination unit 8378 determines that the ID is invalid.

For instance, the ID storage unit 8371 stores the ID "100", and the timer unit 8372 outputs the current date and time "201305011200" (May 1, 2013 12:00) as the transmission date and time (example 1). In this case, the addition unit 8373 combines the ID "100" with the transmission date and time "201305011200" to generate the edited ID "100201305011200", and outputs it. The encryption unit 8374 encrypts the edited ID "100201305011200" to generate the encrypted edited ID "ei39ks". The decryption unit 8377 in the receiver decrypts the encrypted edited ID "ei39ks" to restore the edited ID "100201305011200". The validity determination unit 8378 extracts the ID "100" from the restored edited ID "100201305011200". In other words, the validity determination unit 8378 obtains the ID "100" by deleting the last 12 digits of the edited ID. The validity determination unit 8378 also extracts the transmission date and time "201305011200" from the restored edited ID "100201305011200". If the transmission date and time "201305011200" is earlier than the current date and time output from the timer unit 8379 and the difference between the transmission date and time and the current date and time is within, for example, 10 minutes, the validity determination unit 8378 determines that the ID "100" is valid.

On the other hand, the ID storage unit 8371 stores the ID "100", and the timer unit 8372 outputs the current date and time "201401011730" (Jan. 1, 2014 17:30) as the transmission date and time (example 2). In this case, the addition unit 8373 combines the ID "100" with the transmission date and time "201401011730" to generate the edited ID "100201401011730", and outputs it. The encryption unit 8374 encrypts the edited ID "100201401011730" to generate the encrypted edited ID "002jflk". The decryption unit 8377 in the receiver decrypts the encrypted edited ID "002jflk" to restore the edited ID "100201401011730". The validity determination unit 8378 extracts the ID "100" from the restored edited ID "100201401011730". In other words, the validity determination unit 8378 obtains the ID "100" by deleting the last 12 digits of the edited ID. The validity determination unit 8378 also extracts the transmission date and time "201401011730" from the restored edited ID "100201401011730". If the transmission date and time "201401011730" is later than the current date and time output from the timer unit 8379, the validity determination unit 8378 determines that the ID "100" is invalid.

Thus, the transmitter does not simply encrypt the ID but encrypts its combination with the current date and time changed at regular time intervals, with it being possible to prevent the ID from being easily cracked from the signal transmitted from the transmission unit 8375. That is, in the case where the simply encrypted ID is transmitted from the transmitter to the receiver a plurality of times, even though the ID is encrypted, the signal transmitted from the transmitter to the receiver is the same if the ID is the same, so that there is a possibility of the ID being cracked. In the example illustrated in FIG. 130, however, the ID is combined with the current date and time changed at regular time intervals, and the ID combined with the current date and time is encrypted. Therefore, even in the case where the same ID is transmitted to the receiver a plurality of times, if the time of transmitting the ID is different, the signal transmitted from the transmitter to the receiver is different. This protects the ID from being cracked easily.

Moreover, whether or not the obtained ID is valid is determined by comparing the transmission date and time of the encrypted edited ID and the current date and time. Thus, the validity of the ID can be managed based on the transmission/reception time.

Note that the receiver illustrated in each of FIGS. 129 and 130 may, upon obtaining the encrypted edited ID, transmit the encrypted edited ID to the server, and obtain the ID from the server.

Station Guide)

FIG. 131 is a diagram illustrating an example of use according to the present disclosure on a train platform. A user points a mobile terminal at an electronic display board or a lighting, and obtains information displayed on the electronic display board or train information or station information of a station where the electronic display board is installed, by visible light communication. Here, the information displayed on the electronic display board may be directly transmitted to the mobile terminal by visible light communication, or ID information corresponding to the electronic display board may be transmitted to the mobile terminal so that the mobile terminal inquires of a server using the obtained ID information to obtain the information displayed on the electronic display board. In the case where the ID information is transmitted from the mobile terminal, the server transmits the information displayed on the electronic display board to the mobile terminal, based on the ID information. Train ticket information stored in a memory of the mobile terminal is compared with the information displayed on the electronic display board and, in the case where ticket information corresponding to the ticket of the user is displayed on the electronic display board, an arrow indicating the way to the platform at which the train the user is going to ride arrives is displayed on a display of the mobile terminal. An exit or a path to a train car near a transfer route may be displayed when the user gets off a train. When a seat is reserved, a path to the seat may be displayed. When displaying the arrow, the same color as the train line in a map or train guide information may be used to display the arrow, to facilitate understanding. Reservation information (platform number, car number, departure time, seat number) of the user may be displayed together with the arrow. A recognition error can be prevented by also displaying the reservation information of the user. In the case where the ticket is stored in a server, the mobile terminal inquires of the server to obtain the ticket information and compares it with the information displayed on the electronic display board, or the server compares the ticket information with the information displayed on the electronic display board. Information relating to the ticket information can be obtained in this way. The intended train line may be estimated from a history of transfer search made by the user, to display the route. Not only the information displayed on the electronic display board but also the train information or station information of the station where the electronic display board is installed may be obtained and used for comparison. Information relating to the user in the electronic display board displayed on the display may be highlighted or modified. In the case where the train ride schedule of the user is unknown, a guide arrow to each train line platform may be displayed. When the station information is obtained, a guide arrow to souvenir shops and toilets may be displayed on the display. The behavior characteristics of the user may be managed in the server so that, in the case where the user frequently goes to souvenir shops or toilets in a train station, the guide arrow to souvenir shops and toilets is displayed on the display. By displaying the guide arrow to souvenir shops and toilets only to each user having the behavior characteristics of going to souvenir shops or toilets while not displaying the guide arrow to other users, it is possible to reduce processing. The guide arrow to souvenir shops and toilets may be displayed in a different color from the guide arrow to the platform. When displaying both arrows simultaneously, a recognition error can be prevented by displaying them in different colors. Though a train example is illustrated in FIG. 131, the same structure is applicable to display for planes, buses, and so on.

Guide Sign Translation

FIG. 132 is a diagram illustrating an example of obtaining information from an electronic guidance display board installed in an airport, a train station, a hospital, or the like by visible light communication. Information displayed on the electronic guidance display board is obtained by visible light communication and, after the displayed information is translated into language information set in a mobile terminal, the information is displayed on a display of the mobile terminal. Since the displayed information has been translated into the language of the user, the user can easily understand the information. The language translation may be performed in the mobile terminal or in a server. In the case of performing the translation in the server, the mobile terminal may transmit the displayed information obtained by visible light communication and the language information of the mobile terminal to the server. The server then performs the translation and transmits the translated information to the mobile terminal, and the mobile terminal displays the information on the display. In the case of obtaining ID information from the electronic guidance display board, the mobile terminal may transmit ID information to the server, and obtain display information corresponding to the ID information from the server. Furthermore, a guide arrow indicating where the user should go next may be displayed based on nationality information, ticket information, or baggage check information stored in the mobile terminal.

Coupon Popup

FIG. 133 is a diagram illustrating an example of displaying, on a display of a mobile terminal, coupon information obtained by visible light communication or a popup when a user comes close to a store. The user obtains the coupon information of the store from an electronic display board or the like by visible light communication, using his or her mobile terminal. After this, when the user enters a predetermined range from the store, the coupon information of the store or a popup is displayed. Whether or not the user enters the predetermined range from the store is determined using GPS information of the mobile terminal and store information included in the coupon information. The information is not limited to coupon information, and may be ticket information. Since the user is automatically alerted when coming close to a store where a coupon or a ticket can be used, the user can use the coupon or the ticket effectively.

FIG. 134 is a diagram illustrating an example of displaying coupon information, ticket information, or a popup on a display of a mobile terminal at a cash register, a ticket gate, or the like. Position information is obtained from a lighting installed at the cash register or the ticket gate, by visible light communication. In the case where the obtained position information matches information included in the coupon information or the ticket information, the display is performed. A barcode reader may include a light emitting unit so that the position information is obtained by performing visible light communication with the light emitting unit. Alternatively, the position information may be obtained from the GPS of the mobile terminal. A transmitter may be installed near the cash register so that, when the user points the receiver at the transmitter, the coupon or payment information is displayed on the display of the receiver. The receiver may also perform the payment process by communicating with the server. The coupon information or the ticket information may include Wi-Fi information installed in a store or the like so that, in the case where the mobile terminal of the user obtains the same information as the W-Fi information included in the coupon information or the ticket information, the display is performed.

Start of Operation Application

FIG. 135 is a diagram illustrating an example where a user obtains information from a home appliance by visible light communication using a mobile terminal. In the case where ID information or information related to the home appliance is obtained from the home appliance by visible light communication, an application for operating the home appliance starts automatically. FIG. 135 illustrates an example of using a TV. Thus, merely pointing the mobile terminal at the home appliance enables the application for operating the home appliance to start.

Stopping Transmission During Operation of Barcode Reader

FIG. 136 is a diagram illustrating an example of stopping, when a barcode reader 8405*a* reads a barcode of a product, data communication for visible light communication is stopped near the barcode reader 8405*a*. By stopping visible light communication during barcode read, the barcode reader 8405*a* can be kept from erroneously recognizing the barcode. When a barcode read button is pressed, the barcode reader 8405*a* transmits a transmission stop signal to a visible light signal transmitter 8405*b*. When the finger is released from the button or when a predetermined time has elapsed after the release, the barcode reader 8405*a* transmits a transmission restart signal to the visible light signal transmitter 8405*b*. The transmission stop signal or the transmission restart signal is transmitted by wired/wireless communication, infrared communication, or sound wave communication. The barcode reader 8405*a* may transmit the transmission stop signal upon estimating that the barcode reader 8405*a* is moved, and transmit the transmission restart signal upon estimating that the barcode reader 8405*a* is not moved for a predetermined time, based on the measurement of an accelerometer included in the barcode reader 8405*a*. The barcode reader 8405*a* may transmit the transmission stop signal upon estimating that the barcode reader 8405*a* is grasped, and transmit the transmission restart signal upon estimating that the hand is released from the barcode reader 8405*a*, based on the measurement of an electrostatic sensor or an illuminance sensor included in the barcode reader 8405*a*. The barcode reader 8405*a* may transmit the transmission stop signal upon detecting that the barcode reader 8405*a* is lifted on the ground that a switch on the supporting surface of the barcode reader 8405*a* is released form the pressed state, and transmit the transmission restart signal upon detecting that the barcode reader 8405*a* is placed on the ground that the button is pressed. The barcode reader 8405*a* may transmit the transmission stop signal upon detecting that the barcode reader 8405*a* is lifted, and transmit the transmission restart signal upon detecting that the barcode reader 8405*a* is placed again, based on the measurement of a switch or an infrared sensor of a barcode reader receptacle. A cash register 8405*c* may transmit the transmission stop signal when operation is started, and transmit the transmission restart signal when settlement is completed.

Upon receiving the transmission stop signal, the transmitter 8405*b* such as a lighting stops signal transmission, or operates so that the ripple (luminance change) from 100 Hz to 100 kHz is smaller. As an alternative, the transmitter 8405*b* continues signal transmission while reducing the luminance change of the signal pattern. As another alternative, the transmitter 8405*b* makes the carrier wave period longer than the barcode read time of the barcode reader 8405*a*, or makes the carrier wave period shorter than the exposure time of the barcode reader 8405*a*. Malfunction of the barcode reader 8405*a* can be prevented in this way.

As illustrated in FIG. 137, a transmitter 8406*b* such as a lighting detects, by a motion sensor or a camera, that there is a person near a barcode reader 8406*a*, and stops signal transmission. As an alternative, the transmitter 8406*b* performs the same operation as the transmitter 8405*b* when receiving the transmission stop signal. The transmitter 8406*b* restarts signal transmission, upon detecting that no one is present near the barcode reader 8406*a* any longer. The transmitter 8406*b* may detect the operation sound of the barcode reader 8406*a*, and stop signal transmission for a predetermined time.

Information Transmission from Personal Computer

FIG. 138 is a diagram illustrating an example of use according to the present disclosure.

A transmitter 8407*a* such as a personal computer transmits a visible light signal, through a display device such as a display included in the transmitter 8407*a*, a display connected to the transmitter 8407*a*, or a projector. The transmitter 8407*a* transmits an URL of a website displayed by a browser, information of a clipboard, or information defined by a focused application. For example, the transmitter 8407*a* transmits coupon information obtained in a website.

Database

FIG. 139 is a diagram illustrating an example of a structure of a database held in a server that manages an ID transmitted from a transmitter.

The database includes an ID-data table holding data provided in response to an inquiry using an ID as a key, and an access log table holding each record of inquiry using an ID as a key. The ID-data table includes an ID transmitted from a transmitter, data provided in response to an inquiry using the ID as a key, a data provision condition, the number of times access is made using the ID as a key, and the number of times the data is provided as a result of clearing the condition. Examples of the data provision condition include the date and time, the number of accesses, the number of successful accesses, terminal information of the inquirer (terminal model, application making inquiry, current position of terminal, etc.), and user information of the inquirer (age, sex, occupation, nationality, language, religion, etc.). By using the number of successful accesses as the condition, a method of providing such a service that "1 yen per access, though no data is returned after 100 yen as upper limit" is possible. When access is made using an ID as a key, the log table records the ID, the user ID of the requester, the time, other ancillary information, whether or not data is provided as a result of clearing the condition, and the provided data.

Reception Start Gesture

FIG. 140 is a diagram illustrating an example of gesture operation for starting reception by the present communication scheme.

A user sticks out a receiver such as a smartphone and turns his or her wrist right and left, to start reception. The receiver detects these operations from the measurement of a 9-axis sensor, and starts reception. The receiver may start reception in the case of detecting at least one of these operations. The operation of sticking out the receiver has the effect of enhancing the reception speed and accuracy, because the receiver comes closer to a transmitter and so captures the transmitter in a larger size. The operation of turning the wrist right and left has the effect of stabilizing reception, because the angle dependence of the scheme is resolved by changing the angle of the receiver.

Note that these operations may be performed only when the receiver's home screen is in the foreground. This can prevent the communication from being launched despite the user's intension while the user is using another application.

The following modification is also possible: an image sensor is activated upon detection of the operation of sticking out the receiver and, if the operation of turning the wrist right and left is not conducted, the reception is canceled. Since activating the image sensor takes about several hundred milliseconds to 2 seconds, the responsiveness can be enhanced in this way.

Control of Transmitter by Power Line

FIG. 141 is a diagram illustrating an example of a transmitter according to the present disclosure.

A signal control unit 8410*g* controls the transmission state (the contents of a transmission signal, whether or not to transmit the signal, the intensity of luminance change used for transmission, etc.) of a transmitter 8410*a*. The signal control unit 8410*g* transmits the details of control of the transmitter 8410*a*, to a power distribution control unit 8410*f*. The power distribution control unit 8410*f* changes the voltage or current supplied to a power supply unit 8410*b* of the transmitter 8410*a* or its frequency, thereby notifying the details of control in the form of the magnitude of the change or the time of the change. The power supply unit 8410*b* produces constant output, without being affected by a slight change in voltage, current, or frequency. Accordingly, the signal is transmitted by being expressed by such a change that exceeds the stabilizing ability of the power supply unit 8410*b*, e.g., a timing or duration that cuts power supply. A luminance control unit 8410*d* receives the signal transmitted from the power distribution control unit 8410*f* while taking into account the conversion by the power supply unit 8410*b*, and changes the luminance change pattern of a light emitting unit.

Coding Scheme

FIG. 142 is a diagram illustrating a coding scheme for a visible light communication image.

This coding scheme has the advantage that flicker is unlikely to be perceived by humans, because black and white are substantially equal in proportion and so the normal phase image and the reverse phase image are substantially equal in average luminance.

Coding Scheme Capable of Light Reception Even in the Case of Capturing Image from Diagonal Direction FIG. 143 is a diagram illustrating a coding scheme for a visible light communication image.

An image 1001*a* is an image displayed with black and white lines of uniform width. In an image 1001*b* obtained by capturing the image 1001*a* from a diagonal direction, left lines appear thinner and right lines appear thicker. In an image 1001*i* obtained by capturing the image 1001*a* in a manner of projecting the image 1001*a* on a curved surface, lines that differ in thickness appear.

In view of this, a visible light communication image is generated by the following coding scheme. A visible light communication image 1001*c* is made up of a white line, a black line whose thickness is three times that of the white line, and a white line whose thickness is ⅓ that of the black line, from left. A preamble is coded as such an image in which a line whose thickness is three times that of its left adjacent line is followed by a line whose thickness is ⅓ that of its left adjacent line. As in visible light communication images 1001*d* and 1001*e*, a line whose thickness is equal to that of its left adjacent line is coded as "0". As in visible light communication images 1001*f* and 1001g, a line whose thickness is twice that of its left adjacent line or ½ that of its left adjacent line is coded as "1". That is, a line whose thickness is different from that of its left adjacent line is coded as "1". As an example using this coding scheme, a signal including "010110001011" following the preamble is expressed by an image such as a visible light communication image 1001*h*. Though the line whose thickness is equal to that of its left adjacent line is coded as "0" and the line whose thickness is different from that of its left adjacent line is coded as "1" in this example, the line whose thickness is equal to that of its left adjacent line may be coded as "1" and the line whose thickness is different from that of its left adjacent line as "0". Moreover, the reference thickness is not limited to the thickness of the left adjacent line, and may be the thickness of the right adjacent line. In detail, "1" or "0" may be coded depending on whether the thickness of the line to be coded is equal to or different from the thickness of its right adjacent line. Thus, a transmitter codes "0" by setting the line to be coded to be equal in thickness to the line that is different in color from and adjacent to the line to be coded, and codes "1" by setting the line to be coded to be different in thickness from the line that is different in color from and adjacent to the line to be coded.

A receiver captures the visible light communication image, and detects the thickness of the white or black line in the captured visible light communication image. The receiver compares the thickness of the line to be decoded, with the thickness of the line that is different in color from and adjacent (left adjacent or right adjacent) to the line to be decoded. The line is decoded as "0" in the case where the thicknesses are equal, and "1" in the case where the thicknesses are different. Alternatively, the line may be decoded as "1" in the case where the thicknesses are equal, and "0" in the case where the thicknesses are different. The receiver lastly decodes the data based on the decoded data sequence of 1 and 0.

This coding scheme employs the local line thickness relation. Since the thickness ratio between neighboring lines does not change significantly as seen in the images 1001*b* and 1001*i*, the visible light communication image generated by this coding scheme can be properly decoded even in the case of being captured from a diagonal direction or being projected on a curved surface.

This coding scheme has the advantage that flicker is unlikely to be perceived by humans, because black and white are substantially equal in proportion and so the normal phase image and the reverse phase image are substantially equal in average luminance. This coding scheme also has the advantage that the visible light communication images of both the normal phase signal and the reverse phase signal are decodable by the same algorithm, because the coding scheme does not depend on the distinction between black and white.

This coding scheme further has the advantage that a code can be added easily. As an example, a visible light communication image 1001*j* is a combination of a line whose thickness is four times that of its left adjacent line and a line whose thickness is ¼ that of its left adjacent line. Like this, many unique patterns such as "five times that of its left adjacent line and ⅕ that of its left adjacent line" and "three times that of its left adjacent line and ⅔ that of its left adjacent line" are available, enabling definition as a signal having a special meaning. For instance, given that one set of data can be expressed by a plurality of visible light communication images, the visible light communication image 1001*j* may be used as a cancel signal indicating that, since the transmission data is changed, part of the previously received data is no longer valid. Note that the colors are not limited to black and white, and any colors may be used so long as they are different. For instance, complementary colors may be used.

Coding Scheme that Differs in Information Amount Depending on Distance

FIGS. 144 and 145 are diagrams illustrating a coding scheme for a visible light communication image.

As in (a-1) in FIG. 144, when a 2-bit signal is expressed in a form that one part of an image divided by four is black and the other parts are white, the average luminance of the image is 75%, where white is 100% and black is 0%. As in (a-2) in FIG. 144, when black and white are reversed, the average luminance is 25%.

An image 1003*a* is a visible light communication image in which the white part of the visible light communication image generated by the coding scheme in FIG. 143 is expressed by the image in (a-1) in FIG. 144 and the black part is expressed by the image in (a-2) in FIG. 144. This visible light communication image represents signal A coded by the coding scheme in FIG. 143 and signal B coded by (a-1) and (a-2) in FIG. 144. When a nearby receiver 1003*b* captures the visible light communication image 1003*a*, a fine image 1003*d* is obtained and both of signals A and B can be received. When a distant receiver 1003*c* captures the visible light communication image 1003*a*, a small image 1003*e* is obtained. In the image 1003*e*, the details are not recognizable, and the part corresponding to (a-1) in FIG. 144 is white and the part corresponding to (a-2) in FIG. 144 is black, so that only signal A can be received. Thus, more information can be transmitted when the distance between the visible light communication image and the receiver is shorter. The scheme for coding signal B may be the combination of (b-1) and (b-2) or the combination of (c-1) and (c-2) in FIG. 144.

The use of signals A and B enables basic important information to be expressed by signal A and additional information to be expressed by signal B. In the case where the receiver transmits signals A and B to a server as ID information and the server transmits information corresponding to the ID information to the receiver, the information transmitted from the server may be varied depending on whether or not signal B is present.

Coding Scheme with Data Division

FIG. 146 is a diagram illustrating a coding scheme for a visible light communication image.

A transmission signal 1005*a* is divided into a plurality of data segments 1005*b*, 1005*c*, and 1005*d*. Frame data 1005*e*, 1005*f*, and 1005*g* are generated by adding, to each data segment, an address indicating the position of the data segment, a preamble, an error detection/correction code, a frame type description, and the like. The frame data are coded to generate visible light communication images 1005*h*, 1005*i*, and 1005*j*, and the visible light communication images 1005*h*, 1005*i*, and 1005*j* are displayed. In the case where the display area is sufficiently large, a visible light communication image 1005*k* obtained by concatenating the plurality of visible light communication images is displayed.

A method of inserting the visible light communication image in video as in FIG. 1464 is described below. In the case of a display device including a solid state light source, the visible light communication image is displayed in normal time, and the solid state light source is on only during the period for displaying the visible light communication image and off during the other period. This method is applicable to a wide range of display devices including a projector using a DMD, a projector using a liquid crystal such as LCOS, and a display device using MEMS. The method is also applicable to display devices that divide image display into subframes, e.g., a display device such as a PDP or an EL display that does not use a light source such as a backlight, by replacing part of the subframes with the visible light communication image. Examples of the solid state light source include a semiconductor laser and an LED light source.

Effect of Inserting Reverse Phase Image

FIGS. 147 and 148 are diagrams illustrating a coding scheme for a visible light communication image.

As in (1006*a*) in FIG. 147, a transmitter inserts a black image between video and a visible light communication image (normal phase image). An image obtained by capturing this by a receiver is as illustrated in (1006*b*) in FIG. 147. Since it is easy to search for a part where a simultaneously exposed pixel line is all black, the receiver can easily specify the position where the visible light communication image is captured, as the pixel position exposed at the next timing.

As in (1006*a*) in FIG. 147, after displaying a visible light communication image (normal phase image), the transmitter displays a visible light communication image of reverse phase with black and white being inverted. The receiver calculates the difference in pixel value between the normal phase image and the reverse phase image, thus attaining an SN ratio that is twice as compared with the case of using only the normal phase image. Conversely, when ensuring the same SN ratio, the luminance difference between black and white can be reduced to half, with it being possible to suppress flicker perceived by humans. As in (1007*a*) and (1007*b*) in FIG. 148, the moving average of the expected value of the luminance difference between the video and the visible light communication image is canceled out by the normal phase image and the reverse phase image. Since the temporal resolution of human vision is about 1/60 second, by setting the time for displaying the visible light communication image to less than or equal to this, it is possible to make humans perceive as if the visible light communication image is not being displayed.

As in (1006*c*) in FIG. 147, the transmitter may further insert a black image between the normal phase image and the reverse phase image. In this case, an image illustrated in (1006*d*) in FIG. 147 is obtained as a result of image capture by the receiver. In the image illustrated in (1006*b*) in FIG. 147, the pattern of the normal phase image and the pattern of the reverse phase image are adjacent to each other, which might cause averaging of pixel values at the boundary. In the image illustrated in (1006*d*) in FIG. 147, no such problem occurs.

Superresolution

FIG. 149 is a diagram illustrating a coding scheme for a visible light communication image.

In (a) in FIG. 149, in the case where video data and signal data transmitted by visible light communication are separated, a superresolution process is performed on the video data, and the visible light communication image is superimposed on the obtained superresolution image. That is, the superresolution process is not performed on the visible light communication image. In (b) in FIG. 149, in the case where a visible light communication image is already superimposed on video data, the superresolution process is performed so that (1) the edges (parts indicating data by the difference between colors such as black and white) of the visible light communication image are maintained sharp and (2) the average image of the normal phase image and the reverse phase image of the visible light communication image is of uniform luminance. By changing the process for the visible light communication image depending on whether or not the visible light communication image is superimposed on the video data in this way, visible light communication can be performed more appropriately (with reduced error rate).

Display of Support for Visible Light Communication

FIG. 150 is a diagram illustrating operation of a transmitter.

A transmitter 8500*a* displays information indicating that the transmitter 8500*a* is capable of visible light communication, by superimposing the information on a projected or displayed image. The information is displayed, for example, only for a predetermined time after the transmitter 8500*a* is activated.

The transmitter 8500*a* transmits the information indicating that the transmitter 8500*a* is capable of visible light communication, to a connected device 8500*c*. The device 8500*c* displays that the transmitter 8500*a* is capable of visible light communication. As an example, the device 8500*c* displays that the transmitter 8500*a* is capable of visible light communication, on a display of the device 8500*c*. In the case where the connected transmitter 8500*a* is capable of visible light communication, the device 8500*c* transmits visible light communication data to the transmitter 8500*a*. The information that the transmitter 8500*a* is capable of visible light communication may be displayed when the device 8500*c* is connected to the transmitter 8500*a* or when the visible light communication data is transmitted from the device 8500*c* to the transmitter 8500*a*. In the case of displaying the information when the visible light communication data is transmitted from the device 8500*c*, the transmitter 8500*a* may obtain identification information indicating visible light communication from the data and, if the identification information indicates that the visible light communication data is included in the data, display that the transmitter 8500*a* is capable of visible light communication.

By displaying that the transmitter (lighting, projector, video display device, etc.) is capable of visible light communication or whether or not the transmitter is capable of visible light communication on the projection screen or the display of the device in this way, the user can easily recognize whether or not the transmitter is capable of visible light communication. This prevents a failure of visible light communication even though visible light communication data is transmitted from the device to the transmitter.

Information Obtainment Using Visible Light Communication Signal

FIG. 151 is a diagram illustrating an example of application of visible light communication.

A transmitter 8501*a* receives video data and signal data from a device 8501*c*, and displays a visible light communication image 8501*b*. A receiver 8501*d* captures the visible light communication image 8501*b*, to receive a signal included in the visible light communication image. The receiver 8501*d* communicates with the device 8501*c* based on information (address, password, etc.) included in the received signal, and receives the video displayed by the transmitter 8501*a* and its ancillary information (video ID, URL, password, SSID, translation data, audio data, hash tag, product information, purchase information, coupon, availability information, etc.). The device 8501*c* may transmit, to a server 8501*e*, the status of transmission to the transmitter 8501*a* so that the receiver 8501*d* may obtain the information from the server 8501*e*.

Data Format

FIG. 152 is a diagram illustrating a format of visible light communication data.

Data illustrated in (a) in FIG. 152 has a video address table indicating the position of video data in a storage area, and a position address table indicating the position of signal data transmitted by visible light communication. A video display device not capable of visible light communication refers only to the video address table, and therefore video display is not affected even when the signal address table and signal data are included in the input. Backward compatibility with the video display device not capable of visible light communication is maintained in this manner.

In a data format illustrated in (b) in FIG. 152, an identifier indicating that data which follows is video data is positioned before video data, and an identifier indicating that data which follows is signal data is positioned before signal data. Since the identifier is inserted in the data only when there is video data or signal data, the total amount of code can be reduced. Alternatively, identification information indicating whether data is video data or signal data may be provided. Moreover, program information may include identification information indicating whether or not the program information includes visible light communication data. The inclusion of the identification information indicating whether or not the program information includes visible light communication data allows the user to determine, upon program search, whether or not visible light communication is possible. The program information may include an identifier indicating that the program information includes visible light communication data. Furthermore, adding an identifier or identification information on a data basis makes it possible to switch the luminance or switch the process such as superresolution on a data basis, which contributes to a lower error rate in visible light communication.

The data format illustrated in (a) in FIG. 152 is suitable for a situation of reading data from a storage medium such a an optical disc, and the data format illustrated in (b) in FIG. 152 is suitable for streaming data such as television broadcasting. Note that the signal data includes information such as the signal value transmitted by visible light communication, the transmission start time, the transmission end time, the area used for transmission on a display or a projection surface, the luminance of the visible light communication image, the direction of barcode of the visible light communication image, and so on.

Estimation of Stereoscopic Shape and Reception

FIGS. 153 and 154 are diagrams illustrating an example of application of visible light communication.

As illustrated in FIG. 153, a transmitter 8503*a* such as a projector projects not only video and a visible light communication image but also a distance measurement image. A dot pattern indicated by the distance measurement image is a dot pattern in which the position relation between a predetermined number of dots near an arbitrary dot is different from the position relation between other arbitrary combination of dots. A receiver captures the distance measurement image to specify a local dot pattern, with it being possible to estimate the stereoscopic shape of a projection surface 8503*b*. The receiver restores the visible light communication image distorted due to the stereoscopic shape of the projection surface to a 2D image, thereby receiving a signal. The distance measurement image and the visible light communication image may be projected by infrared which is not perceivable by humans.

As illustrated in FIG. 154, a transmitter 8504*a* such as a projector includes an infrared projection device 8504*b* for projecting a distance measurement image by infrared. A receiver estimates the stereoscopic shape of a projection surface 8504*c*, and restores a distorted visible light communication image to receive a signal. The transmitter 8504*a* may project video by visible light, and a visible light communication image by infrared. The infrared projection device 8504*b* may project a visible light communication image by infrared.

Stereoscopic Projection

FIGS. 155 and 156 are diagrams illustrating a visible light communication image display method.

In the case of performing stereoscopic projection or in the case of displaying a visible light communication image on a cylindrical display surface, displaying visible light communication images 8505*a* to 8505*f* as illustrated in FIG. 155 enables reception from a wide angle. Displaying the visible light communication images 8505*a* and 8505*b* enables reception from a horizontally wide angle. By combining the visible light communication images 8505*a* and 8505*b*, reception is possible even when a receiver is tilted. The visible light communication images 8505*a* and 8505*b* may be displayed alternately, or the visible light communication image 8505*f* obtained by synthesizing these images may be displayed. Moreover, adding the visible light communication images 8505*c* and 8505*d* enables reception from a vertically wide angle. The visible light communication image boundary may be expressed by providing a part projected in an intermediate color or an unprojected part, as in the visible light communication image 8505*e*. Rotating the visible light communication images 8505*a* to 8505*f* enables reception from a wider angle. Though the visible light communication image is displayed on the cylindrical display surface in FIG. 155, the visible light communication image may be displayed on a columnar display surface.

In the case of performing stereoscopic projection or in the case of displaying a visible light communication image on a spherical display surface, displaying visible light communication images 8506*a* to 8506*d* as illustrated in FIG. 156 enables reception from a wide angle. In the visible light communication image 8506*a*, the receivable area in the horizontal direction is wide, but the receivable area in the vertical direction is narrow. Hence, the visible light communication image 8506*a* is combined with the visible light communication image 8506*b* having the opposite property. The visible light communication images 8506*a* and 8506*b* may be displayed alternately, or the visible light communication image 8506*c* obtained by synthesizing these images may be displayed. The part where barcodes concentrate as in the upper part of the visible light communication image 8506*a* is fine in display, and there is a high possibility of a signal reception error. Such a reception error can be prevented by displaying this part in an intermediate color as in the visible light communication image 8506*d* or by not projecting any image in this part.

Communication Protocol Different According to Zone

FIG. 157 is a diagram illustrating an example of operation of a transmitter and a receiver in Embodiment 5.

A receiver 8420*a* receives zone information form a base station 8420*h*, recognizes in which position the receiver 8420*a* is located, and selects a reception protocol. The base station 8420*h* is, for example, a mobile phone communication base station, a W-Fi access point, an IMES transmitter, a speaker, or a wireless transmitter (Bluetooth®, ZigBee, specified low power radio station, etc.). The receiver 8420*a* may specify the zone based on position information obtained from GPS or the like. As an example, it is assumed that communication is performed at a signal frequency of 9.6 kHz in zone A, and communication is performed at a signal frequency of 15 kHz by a ceiling light and at a signal frequency of 4.8 kHz by a signage in zone B. At a position 8420*j*, the receiver 8420*a* recognizes that the current position is zone A from information from the base station 8420*h*, and performs reception at the signal frequency of 9.6 kHz, thus receiving signals transmitted from transmitters 8420*b* and 8420*c*. At a position 84201, the receiver 8420*a* recognizes that the current position is zone B from information from a base station 8420*i*, and also estimates that a signal from a ceiling light is to be received from the movement of directing the in camera upward. The receiver 8420*a* performs reception at the signal frequency of 15 kHz, thus receiving signals transmitted from transmitters 8420*e* and 8420*f*. At a position 8420*m*, the receiver 8420*a* recognizes that the current position is zone B from information from the base station 8420*i*, and also estimates that a signal transmitted from a signage is to be received from the movement of sticking out the out camera. The receiver 8420*a* performs reception at the signal frequency of 4.8 kHz, thus receiving a signal transmitted from a transmitter 8420*g*. At a position 8420*k*, the receiver 8420*a* receives signals from both of the base stations 8420*h* and 8420*i* and cannot determine whether the current position is zone A or zone B. The receiver 8420*a* accordingly performs reception at both 9.6 kHz and 15 kHz. The part of the protocol different according to zone is not limited to the frequency, and may be the transmission signal modulation scheme, the signal format, or the server inquired using an ID. The base station 8420*h* or 8420*i* may transmit the protocol in the zone to the receiver, or transmit only the ID indicating the zone to the receiver so that the receiver obtains protocol information from a server using the zone ID as a key.

Transmitters 8420*b* to 8420*f* each receive the zone ID or protocol information from the base station 8420*h* or 8420*i*, and determine the signal transmission protocol. The transmitter 8420*d* that can receive the signals from both the base stations 8420*h* and 8420*i* uses the protocol of the zone of the base station with a higher signal strength, or alternately use both protocols.

Recognition of Zone and Service for Each Zone

FIG. 158 is a diagram illustrating an example of operation of a transmitter and a receiver in Embodiment 5.

A receiver 8421*a* recognizes a zone to which the position of the receiver 8421*a* belongs, from a received signal. The receiver 8421*a* provides a service (coupon distribution, point assignment, route guidance, etc.) determined for each zone. As an example, the receiver 8421*a* receives a signal transmitted from the left of a transmitter 8421*b*, and recognizes that the receiver 8421*a* is located in zone A. Here, the transmitter 8421*b* may transmit a different signal depending on the transmission direction. Moreover, the transmitter 8421*b* may, through the use of a signal of the light emission pattern such as 2217*a*, transmit a signal so that a different signal is received depending on the distance to the receiver. The receiver 8421*a* may recognize the position relation with the transmitter 8421*b* from the direction and size in which the transmitter 8421*b* is captured, and recognize the zone in which the receiver 8421*a* is located.

Signals indicating the same zone may have a common part. For example, the first half of an ID indicating zone A, which is transmitted from each of the transmitters 8421*b* and 8421*c*, is common. This enables the receiver 8421*a* to recognize the zone where the receiver 8421*a* is located, merely by receiving the first half of the signal.

Summary of this Embodiment

An information communication method in this embodiment is an information communication method of transmitting a signal using a change in luminance, the information communication method including: determining a plurality of patterns of the change in luminance, by modulating each of a plurality of signals to be transmitted; and transmitting, by each of a plurality of light emitters changing in luminance according to any one of the plurality of determined patterns of the change in luminance, a signal corresponding to the pattern, wherein in the transmitting, each of two or more light emitters of the plurality of light emitters changes in luminance at a different frequency so that light of one of two types of light different in luminance is output per a time unit determined for the light emitter beforehand and that the time unit determined for each of the two or more light emitters is different.

In this way, two or more light emitters (e.g., transmitters as lighting devices) each change in luminance at a different frequency, as in the operation described with reference to FIG. 113. Therefore, a receiver that receives signals (e.g., light emitter IDs) from these light emitters can easily obtain the signals separately from each other.

For example, in the transmitting, each of the plurality of light emitters may change in luminance at any one of at least four types of frequencies, and the two or more light emitters of the plurality of transmitters may change in luminance at the same frequency. For example, in the transmitting, the plurality of light emitters each change in luminance so that a luminance change frequency is different between all light emitters which, in the case where the plurality of light emitters are projected on a light receiving surface of an image sensor for receiving the plurality of signals, are adjacent to each other on the light receiving surface.

In this way, as long as there are at least four types of frequencies used for luminance changes, even in the case where two or more light emitters change in luminance at the same frequency, i.e., in the case where the number of types of frequencies is smaller than the number of light emitters, it can be ensured that the luminance change frequency is different between all light emitters adjacent to each other on the light receiving surface of the image sensor based on the four color problem or the four color theorem, as in the operation described with reference to FIG. 114. As a result, the receiver can easily obtain the signals transmitted from the plurality of light emitters, separately from each other.

For example, in the transmitting, each of the plurality of light emitters may transmit the signal, by changing in luminance at a frequency specified by a hash value of the signal.

In this way, each of the plurality of light emitters changes in luminance at the frequency specified by the hash value of the signal (e.g., light emitter ID), as in the operation described with reference to FIG. 113. Accordingly, upon receiving the signal, the receiver can determine whether or not the frequency specified from the actual change in luminance and the frequency specified by the hash value match. That is, the receiver can determine whether or not the received signal (e.g., light emitter ID) has an error.

For example, the information communication method may further include: calculating, from a signal to be transmitted which is stored in a signal storage unit, a frequency corresponding to the signal according to a predetermined function, as a first frequency; determining whether or not a second frequency stored in a frequency storage unit and the calculated first frequency match; and in the case of determining that the first frequency and the second frequency do not match, reporting an error, wherein in the case of determining that the first frequency and the second frequency match, in the determining, a pattern of the change in luminance is determined by modulating the signal stored in the signal storage unit, and in the transmitting, the signal stored in the signal storage unit is transmitted by any one of the plurality of light emitters changing in luminance at the first frequency according to the determined pattern.

In this way, whether or not the frequency stored in the frequency storage unit and the frequency calculated from the signal stored in the signal storage unit (ID storage unit) match is determined and, in the case of determining that the frequencies do not match, an error is reported, as in the operation described with reference to FIG. 120. This eases abnormality detection on the signal transmission function of the light emitter.

For example, the information communication method may further include: calculating a first check value from a signal to be transmitted which is stored in a signal storage unit, according to a predetermined function; determining whether or not a second check value stored in a check value storage unit and the calculated first check value match; and in the case of determining that the first check value and the second check value do not match, reporting an error, wherein in the case of determining that the first check value and the second check value match, in the determining, a pattern of the change in luminance is determined by modulating the signal stored in the signal storage unit, and in the transmitting, the signal stored in the signal storage unit is transmitted by any one of the plurality of light emitters changing in luminance at the first frequency according to the determined pattern.

In this way, whether or not the check value stored in the check value storage unit and the check value calculated from the signal stored in the signal storage unit (ID storage unit) match is determined and, in the case of determining that the check values do not match, an error is reported, as in the operation described with reference to FIG. 120. This eases abnormality detection on the signal transmission function of the light emitter.

An information communication method in this embodiment is an information communication method of obtaining information from a subject, the information communication method including: setting an exposure time of an image sensor so that, in an image obtained by capturing the subject by the image sensor, a plurality of bright lines corresponding to a plurality of exposure lines included in the image sensor appear according to a change in luminance of the subject; obtaining a bright line image including the plurality of bright lines, by capturing the subject that changes in luminance by the image sensor with the set exposure time; obtaining the information by demodulating data specified by a pattern of the plurality of bright lines included in the obtained image; and specifying a luminance change frequency of the subject, based on the pattern of the plurality of bright lines included in the obtained bright line image. For example, in the specifying, a plurality of header patterns that are included in the pattern of the plurality of bright lines and are a plurality of patterns each determined beforehand to indicate a header are specified, and a frequency corresponding to the number of pixels between the plurality of header patterns is specified as the luminance change frequency of the subject.

In this way, the luminance change frequency of the subject is specified, as in the operation described with reference to FIG. 115. In the case where a plurality of subjects that differ in luminance change frequency are captured, information from these subjects can be easily obtained separately from each other.

For example, in the obtaining of a bright line image, the bright line image including a plurality of patterns represented respectively by the plurality of bright lines may be obtained by capturing a plurality of subjects each of which changes in luminance, and in the obtaining of the information, in the case where the plurality of patterns included in the obtained bright line image overlap each other in a part, the information may be obtained from each of the plurality of patterns by demodulating the data specified by a part of each of the plurality of patterns other than the part.

In this way, data is not demodulated from the overlapping part of the plurality of patterns (the plurality of bright line patterns), as in the operation described with reference to FIG. 117. Obtainment of wrong information can thus be prevented.

For example, in the obtaining of a bright line image, a plurality of bright line images may be obtained by capturing the plurality of subjects a plurality of times at different timings from each other, in the specifying, for each bright line image, a frequency corresponding to each of the plurality of patterns included in the bright line image may be specified, and in the obtaining of the information, the plurality of bright line images may be searched for a plurality of patterns for which the same frequency is specified, the plurality of patterns searched for may be combined, and the information may be obtained by demodulating the data specified by the combined plurality of patterns.

In this way, the plurality of bright line images are searched for the plurality of patterns (the plurality of bright line patterns) for which the same frequency is specified, the plurality of patterns searched for are combined, and the information is obtained from the combined plurality of patterns. Hence, even in the case where the plurality of subjects are moving, information from the plurality of subjects can be easily obtained separately from each other.

For example, the information communication method may further include: transmitting identification information of the subject included in the obtained information and specified frequency information indicating the specified frequency, to a server in which a frequency is registered for each set of identification information; and obtaining related information associated with the identification information and the frequency indicated by the specified frequency information, from the server.

In this way, the related information associated with the identification information (ID) obtained based on the luminance change of the subject (transmitter) and the frequency of the luminance change is obtained, as in the operation described with reference to FIG. 119. By changing the luminance change frequency of the subject and updating the frequency registered in the server with the changed frequency, a receiver that has obtained the identification information before the change of the frequency is prevented from obtaining the related information from the server. That is, by changing the frequency registered in the server according to the change of the luminance change frequency of the subject, it is possible to prevent a situation where a receiver that has previously obtained the identification information of the subject can obtain the related information from the server for an indefinite period of time.

For example, the information communication method may further include: obtaining identification information of the subject, by extracting a part from the obtained information; and specifying a number indicated by the obtained information other than the part, as a luminance change frequency set for the subject.

In this way, the identification information of the subject and the luminance change frequency set for the subject can be included independently of each other in the information obtained from the pattern of the plurality of bright lines, as in the operation described with reference to FIG. 116. This contributes to a higher degree of freedom of the identification information and the set frequency.

Embodiment 6

This embodiment describes each example of application using a receiver such as a smartphone and a transmitter for transmitting information as an LED blink pattern in Embodiments 1 to 5 described above.

FIG. 159 is a diagram illustrating an example of a transmission signal in Embodiment 6.

A transmission signal D is divided into data segments Dx (e.g., Dx=D1, D2, D3) of a predetermined size, and a header Hdr and an error detection/correction frame check sequence FCS calculated from each data segment are added to the data segment. A header Hdr2 and an error detection/correction frame check sequence FCS2 calculated from the original data are added, too. Data made up of Hdr, Dx, and FCS is a structure for reception by an image sensor. Since the image sensor is suitable for reception of continuous data in a short time, Hdr, Dx, and FCS are transmitted continuously. Data made up of Hdr2, Dx, and FCS2 is a structure for reception by an illuminance sensor. While Hdr and FCS received by the image sensor are desirably short, Hdr2 and FCS2 received by the illuminance sensor may each be a longer signal sequence. The use of a longer signal sequence for Hdr2 enhances the header detection accuracy. When FCS2 is longer, a code capable of detecting and correcting many bit errors can be employed, which leads to improved error detection/correction performance. Note that, instead of transmitting Hdr2 and FCS2, Hdr and FCS may be received by the illuminance sensor. The illuminance sensor may receive both Hdr and Hdr2 or both FCS and FCS2.

FIG. 160 is a diagram illustrating an example of a transmission signal in Embodiment 6.

FCS2 is a long signal. Frequently inserting such FCS2 causes a decrease in reception efficiency of the image sensor. In view of this, the insertion frequency of FCS2 is reduced, and a signal PoFCS2 indicating the location of FCS2 is inserted instead. For example, in the case of using 4-value PPM having 2-bit information per unit time for signal representation, 16 transmission time units are necessary when CRC32 is used for FCS2, whereas PoFCS2 with a range of 0 to 3 can be transmitted in one time unit. Since the transmission time is shortened as compared with the case of inserting only FCS2, the reception efficiency of the image sensor can be improved. The illuminance sensor receives PoFCS2 following the transmission signal D, specifies the transmission time of FCS2 from PoFCS2, and receives FCS2. The illuminance sensor further receives PoFCS2 following FCS2, specifies the transmission time of the next FCS2, and receives the next FCS2. If FCS2 received first and FCS2 received next are the same, the receiver estimates that the same signal is being received.

FIGS. 161A to 161C are each a diagram illustrating an example of an image (bright line image) captured by a receiver in Embodiment 6.

In the captured image illustrated in FIG. 161A, a transmitter is shown small and so the number of bright lines is small. Only a small amount of data can be received at one time from this captured image. The captured image illustrated in FIG. 161B is an image captured using zoom, where the transmitter is shown large and so the number of bright lines is large. Thus, a large amount of data can be received at one time by using zoom. In addition, data can be received from far away, and a signal of a small transmitter can be received. Optical zoom or Ex zoom is employed as the zoom method. Optical zoom is realized by increasing the focal length of a lens. Ex zoom is a zoom method in which, in the case of performing imaging with a lower resolution than the imaging element capacity, not all but only a part of the imaging elements is used to thereby enlarge a part of the captured image. The captured image illustrated in FIG. 161C is an image captured using electronic zoom (image enlargement). Though the transmitter is shown large, bright lines are thicker in the enlargement by electronic zoom, and the number of bright lines is unchanged from pre-zoom. Hence, the reception characteristics are unchanged from pre-zoom.

FIGS. 162A and 162B are each a diagram illustrating an example of an image (bright line image) captured by a receiver in Embodiment 6.

The captured image illustrated in FIG. 162A is an image captured with focus on a subject. The captured image illustrated in FIG. 162B is an image captured out of focus. In the captured image illustrated in FIG. 162B, bright lines can be observed even in the surroundings of the actual transmitter because the image is captured out of focus, so that more bright lines can be observed. Thus, more data can be received at one time and also data can be received farther away, by out-of-focus imaging. Imaging in macro mode can produce the same image as the captured image illustrated in FIG. 162B.

FIGS. 163A to 163C are each a diagram illustrating an example of an image (bright line image) captured by a receiver in Embodiment 6.

The image illustrated in FIG. 163A is obtained by setting the exposure time to be longer than that in the visible light communication mode and shorter than that in the normal imaging mode. The imaging mode for obtaining such an image is referred to as "bright line detection mode" (intermediate mode). In the image illustrated in FIG. 163A, bright lines of a transmitter are observed at the center left, while a darker normal captured image appears in the other part. When this image is displayed on the receiver, the user can easily point the receiver at the intended transmitter and capture the transmitter. In the bright line detection mode, an image is captured darker than in the normal imaging mode. Accordingly, imaging is performed in a high sensitivity mode to capture an image having brightness easily visible by humans, i.e., an image similar to that in the normal imaging mode. Since excessively high sensitivity causes the darker parts of the bright lines to become brighter, the sensitivity is set to such a level that allows the bright lines to be observed. The receiver switches to the visible light communication mode, and receives the transmission signal of the transmitter captured in the part designated by, for example, the user touching the image. The receiver may automatically switch to the visible light communication mode and receive the signal in the case where any bright line (transmission signal) is found in the captured image.

The receiver detects the transmission signal from the bright lines in the captured image, and highlights the detected part as illustrated in FIG. 163B. The receiver can thus present the signal transmission part clearly to the user. The bright lines may be observed with regard to not only the transmission signal but also the pattern of the subject. Therefore, instead of determining whether or not there is the transmission signal from the bright lines in one image, it may be determined that there is the transmission signal in the case where the positions of the bright lines change in a plurality of images.

The image captured in the bright line detection mode is darker than the image captured in the normal imaging mode, and is not easily visible. Hence, the image with visibility increased by image processing may be displayed. The image illustrated in FIG. 163C is an example of an image in which the edges are extracted and the boundary of the imaging object is enhanced.

FIG. 164 is a diagram illustrating an example of an image (bright line image) captured by a receiver in Embodiment 6. In detail, FIG. 492 illustrates an image obtained by capturing a transmitter whose signal transmission period is 1/9600 second, with the ratio of exposure time indicated in the lower part of the drawing. When the exposure time is shorter than the transmission period of 1/9600 second, the captured image is roughly the same, and clear bright lines can be captured. When the exposure time is longer, the bright line contours are blurred. In this signal representation example, however, the bright line pattern is observable and the signal can be received as long as the exposure time is up to about 1.5 times the transmission period. Moreover, in this signal representation example, the bright lines are observable as long as the exposure time is up to about 20 times the transmission period. The exposure time of this range is available as the exposure time in the bright line detection mode.

The upper limit of the exposure time that enables signal reception differs depending on the method of signal representation. The use of such a signal representation rule in which the number of bright lines is smaller and the interval between the bright lines is longer enables signal reception with a longer exposure time and also enables observation of bright lines with a longer exposure time, though the transmission efficiency is lower.

Exposure Time in Intermediate Imaging Mode

As illustrated in FIG. 164, clear bright lines are observable when the exposure time is up to about 3 times the modulation period. Since the modulation frequency is greater than or equal to 480 Hz, the exposure time in the intermediate imaging mode (intermediate mode) is desirably less than or equal to 1/160 second.

If the exposure time is less than or equal to 1/10000 second, an object not emitting light is hard to be seen under illumination light even when captured in the high sensitivity mode. Accordingly, the exposure time in the intermediate imaging mode is desirably greater than or equal to 1/10000 second. This limitation is, however, expected to be eased by future improvement in sensitivity of imaging elements.

FIG. 165 is a diagram illustrating an example of a transmission signal in Embodiment 6.

A receiver receives a series of signals by combining a plurality of received data segments. Therefore, if a transmission signal is abruptly changed, data segments before and after the change are mixed with each other, making it impossible to accurately combine the signals. In view of this, upon changing the transmission signal, a transmitter performs normal illumination for a predetermined time as a buffer zone while transmitting no signal, as in (a) in FIG. 165. In the case where no signal can be received for a predetermined time T2 shorter than the above-mentioned predetermined time T1, the receiver abandons previously received data segments, thus avoiding mixture of data segments before and after the change. As an alternative, upon changing the transmission signal, the transmitter repeatedly transmits a signal X for notifying the change of the transmission signal, as in (b) in FIG. 165. Such repeated transmission prevents a failure to receive the transmission signal change notification X. As another alternative, upon changing the transmission signal, the transmitter repeatedly transmits a preamble, as in (c) in FIG. 165. In the case of receiving the preamble in a shorter period than the period in which the preamble appears in the normal signal, the receiver abandons previously received data segments.

FIG. 166 is a diagram illustrating an example of operation of a receiver in Embodiment 6.

An image illustrated in (a) in FIG. 166 is an image obtained by capturing a transmitter in just focus. By out-of-focus imaging, a receiver can capture an image illustrated in (b) in FIG. 166. Further out of focus leads to a captured image illustrated in (c) in FIG. 166. In (c) in FIG. 166, bright lines of a plurality of transmitters overlap each other, and the receiver cannot perform signal reception. Hence, the receiver adjusts the focus so that the bright lines of the plurality of transmitters do not overlap each other. In the case where only one transmitter is present in the imaging range, the receiver adjusts the focus so that the size of the transmitter is maximum in the captured image.

The receiver may compress the captured image in the direction parallel to the bright lines, but do not perform image compression in the direction perpendicular to the bright lines. Alternatively, the receiver reduces the degree of compression in the perpendicular direction. This prevents a reception error caused by the bright lines being blurred by compression.

FIGS. 167 and 168 are each a diagram illustrating an example of an instruction to a user displayed on a screen of a receiver in Embodiment 6.

By capturing a plurality of transmitters, a receiver can estimate the position of the receiver using triangulation from position information of each transmitter and the position, size, and angle of each transmitter in the captured image. Accordingly, in the case where only one transmitter is captured in a receivable state, the receiver instructs the imaging direction or the moving direction by displaying an image including an arrow or the like, to cause the user to change the direction of the receiver or move backward so as to capture a plurality of transmitters. (a) in FIG. 167 illustrates a display example of an instruction to turn the receiver to the right to capture a transmitter on the right side. (b) in FIG. 167 illustrates a display example of an instruction to move backward to capture a transmitter in front. FIG. 168 illustrates a display example of an instruction to shake the receiver or the like to capture another transmitter, because the position of another transmitter is unknown to the receiver. Though it is desirable to capture a plurality of transmitters in one image, the position relation between transmitters in a plurality of images may be estimated using image processing or the sensor value of the 9-axis sensor. The receiver may inquire of a server about position information of nearby transmitters using an ID received from one transmitter, and instruct the user to capture a transmitter that is easiest to capture.

The receiver detects that the user is moving the receiver from the sensor value of the 9-axis sensor and, after a predetermined time from the end of the movement, displays a screen based on the last received signal. This prevents a situation where, when the user points the receiver to the intended transmitter, a signal of another transmitter is received during the movement of the receiver and as a result a process based on the transmission signal of the unintended transmitter is accidentally performed.

The receiver may continue the reception process during the movement, and perform a process based on the received signal, e.g., information obtainment from the server using the received signal as a key. In this case, after the process the receiver still continues the reception process, and performs a process based on the last received signal as a final process.

The receiver may process a signal received a predetermined number of times, or notify the signal received the predetermined number of times to the user. The receiver may process a signal received a largest number of times during the movement.

The receiver may include notification means for notifying the user when signal reception is successful or when a signal is detected in a captured image. The notification means performs notification by sound, vibration, display update (e.g., popup display), or the like. This enables the user to recognize the presence of a transmitter.

FIG. 169 is a diagram illustrating an example of a signal transmission method in Embodiment 6.

A plurality of transmitters such as displays are arranged adjacent to each other. In the case of transmitting the same signal, the plurality of transmitters synchronize the signal transmission timing, and transmit the signal from the entire surface as in (a) in FIG. 169. This allows a receiver to observe the plurality of displays as one large transmitter, so that the receiver can receive the signal faster or from a longer distance. In the case where the plurality of transmitters transmit different signals, the plurality of transmitters transmit the signals while providing a buffer zone (non-transmission area) where no signal is transmitted, as in (b) in FIG. 169. This allows the receiver to recognize the plurality of transmitters as separate transmitters with the buffer zone in between, so that the receiver can receive the signals separately.

FIG. 170 is a diagram illustrating an example of a signal transmission method in Embodiment 6.

As illustrated in (a) in FIG. 170, a liquid crystal display provides a backlight off period, and changes the liquid crystal state during backlight off to make the image in the state change invisible, thus enhancing dynamic resolution. On the liquid crystal display performing such backlight control, a signal is superimposed according to the backlight on period as illustrated in (b) in FIG. 170. Continuously transmitting the set of data (Hdr, Data, FCS) contributes to higher reception efficiency. The light emitting unit is in a bright state (Hi) in the first and last parts of the backlight on period. This is because, if the dark state (Lo) of the light emitting unit is continuous with the backlight off period, the receiver cannot determine whether Lo is transmitted as a signal or the light emitting unit is in a dark state due to the backlight off period.

A signal decreased in average luminance may be superimposed in the backlight off period.

Signal superimposition causes the average luminance to change as compared with the case where no signal is superimposed. Hence, adjustment such as increasing/decreasing the backlight on period or increasing/decreasing the luminance during backlight on is performed so that the average luminance is equal.

FIG. 171 is a diagram illustrating an example of a signal transmission method in Embodiment 6.

A liquid crystal display can reduce the luminance change of the entire screen, by performing backlight control at a different timing depending on position. This is called backlight scan. Backlight scan is typically performed so that the backlight is turned on sequentially from the end, as in (a) in FIG. 171. A captured image 8802*a* is obtained as a result. In the captured image 8802*a*, however, the part including the bright lines is divided, and there is a possibility that the entire screen of the display cannot be estimated as one transmitter. The backlight scan order is accordingly set so that all light emitting parts (signal superimposition parts) are connected when the vertical axis is the spatial axis in the backlight scan division direction and the horizontal axis is the time axis, as in (b) in FIG. 171. A captured image 8802*b* is obtained as a result. In the captured image 8802*b*, all bright line parts are connected, facilitating estimation that this is a transmission signal from one transmitter. Besides, since the number of continuously receivable bright lines increases, faster or longer-distance signal reception is possible. Moreover, the size of the transmitter is easily estimated, and therefore the position of the receiver can be accurately estimated from the position, size, and angle of the transmitter in the captured image.

FIG. 172 is a diagram illustrating an example of a signal transmission method in Embodiment 6.

In time-division backlight scan, in the case where the backlight on period is short and the light emitting parts (signal superimposition parts) cannot be connected on the graph in which the vertical axis is the spatial axis in the backlight scan division direction and the horizontal axis is the time axis, signal superimposition is performed in each light emitting part according to the backlight illumination timing, in the same way as in FIG. 170. Here, by controlling the backlight so that the distance from another backlight on part on the graph is maximum, it is possible to prevent mixture of bright lines in adjacent parts.

FIG. 173 is a diagram for describing a use case in Embodiment 6. A system in this embodiment includes a lighting fixture 100 that performs visible light communication, a wearable device 101 having a visible light communication function, a smartphone 102, and a server 103.

This embodiment is intended to save, through the use of visible light communication, the user's trouble when shopping in a store, thereby reducing the time for shopping. Conventionally, when the user buys a product in a store, the user needs to search for the site of the store and obtain coupon information beforehand. There is also a problem that it takes time to search the store for the product for which the coupon is available.

As illustrated in FIG. 173, the lighting fixture 100 periodically transmits lighting ID information of the lighting fixture 100 using visible light communication, in front of the store (an electronics retail store is assumed as an example). The wearable device 101 of the user receives the lighting ID information, and transmits the lighting ID information to the smartphone 102 using near field communication. The smartphone 102 transmits information of the user and the lighting ID information to the server 103 using a mobile line or the like. The smartphone 102 receives point information, coupon information, and the like of the store in front of the user, from the server 103. The user views the information received from the server 103, on the wearable device 101 or the smartphone 102. Thus, the user can buy displayed product information of the store on the spot, or be guided to an exhibit in the store. This is described in detail below, with reference to drawings.

FIG. 174 is a diagram illustrating an information table transmitted from the smartphone 102 to the server 103. The smartphone 102 transmits not only the membership number, the store ID information, the transmission time, and the position information of the store held in the smartphone 102, but also the user preference information, biological information, search history, and behavior history information held in the smartphone 102.

FIG. 175 is a block diagram of the server 103. A transmission and reception unit 201 receives the information from the smartphone 102. A control unit 202 performs overall control. A membership information DB 203 holds each membership number and the name, date of birth, point information, purchase history, and the like of the user of the membership number. A store DB 204 holds each store ID and in-store information such as product information sold in the store, display information of the store, and map information of the store. A notification information generation unit 205 generates coupon information or recommended product information according to user preference.

FIG. 176 is a flowchart illustrating an overall process of the system. The wearable device 101 receives the lighting ID from the lighting 100 (Step S301). The wearable device 101 then transmits the lighting ID to the smartphone 102, for example, using proximity wireless communication such as Bluetooth® (Step S302). The smartphone 102 transmits the user history information and the membership number held in the smartphone 102 illustrated in FIG. 174 and the lighting ID, to the server 103 (Step S303). When the server 103 receives the data, the data is first sent to the control unit 202 (Step S304). The control unit 202 refers to the membership DB 203 with the membership number, and obtains membership information (Step S305). The control unit 202 also refers to the store DB 204 with the lighting ID, and obtains store information (Step S306). The store information includes product information in stock in the store, product information which the store wants to promote, coupon information, in-store map information, and the like. The control unit 202 sends the membership information and the store information to the notification information generation unit (Step S307). The notification information generation unit 205 generates advertisement information suitable for the user from the membership information and the store information, and sends the advertisement information to the control unit 202 (Step S308). The control unit 202 sends the membership information and the advertisement information to the transmission and reception unit 201 (Step S309). The membership information includes point information, expiration date information, and the like of the user. The transmission and reception unit 201 transmits the membership information and the advertisement information to the smartphone 102 (Step S310). The smartphone 102 displays the received information on the display screen (Step S311).

The smartphone 102 further transfers the information received from the server 103, to the wearable device 101 (Step S312). If the notification setting of the wearable device 101 is ON, the wearable device 101 displays the information (Step S314). When the wearable device displays the information, it is desirable to alert the user by vibration or the like, for the following reason. Since the user does not always enter the store, even when the coupon information or the like is transmitted, the user might be unaware of it.

FIG. 177 is a diagram illustrating an information table transmitted from the server 103 to the smartphone 102. A store map DB is in-store guide information indicating which product is displayed in which position in the store. Store product information is product information in stock in the store, product price information, and the like. User membership information is point information, membership card expiration date information, and the like of the user.

FIG. 178 is a diagram illustrating flow of screen displayed on the wearable device 101 from when the user receives the information from the server 103 in front of the store to when the user actually buys a product. In front of the store, the points provided when the user visits the store and the coupon information are displayed. When the user taps the coupon information, the information according to the user preference transmitted from the server 103 is displayed. For example when the user taps "TV", recommended TV information is displayed. When the user presses the buy button, a receiving method selection screen is displayed to enable the user to select the delivery to the home or the reception in the store. In this embodiment, in which store the user is present is known, and so there is an advantage that the user can receive the product in the store. When the user selects "guide to sales floor" in flow 403, the wearable device 101 switches to a guide mode. This is a mode of guiding the user to a specific location using an arrow and the like, and the user can be guided to the location where the selected product is actually on display. After the user is guided to the store shelf, the wearable device 101 switches to a screen inquiring whether or not to buy the product. The user can determine whether or not to buy the product, after checking the size, the color, the usability and the like with the actual product.

Visible light communication in the present disclosure allows the position of the user to be specified accurately. Therefore, for example, in the case where the user is likely to enter a dangerous area in a factory as in FIG. 179, a warning can be issued to the user. Whether or not to issue a warning may be determined by the wearable device. It is thus possible to create such a warning system with a high degree of freedom that warns children of a specific age or below.

Embodiment 7

FIG. 180 is a diagram illustrating a service provision system using the reception method described in any of the foregoing embodiments.

First, a company A ex8000 managing a server ex8002 is requested to distribute information to a mobile terminal, by another company B or an individual ex8001. For example, the distribution of detailed advertisement information, coupon information, map information, or the like to the mobile terminal that performs visible light communication with a signage is requested. The company A ex8000 managing the server manages information distributed to the mobile terminal in association with arbitrary ID information. A mobile terminal ex8003 obtains ID information from a subject ex8004 by visible light communication, and transmits the obtained ID information to the server ex8002. The server ex8002 transmits the information corresponding to the ID information to the mobile terminal, and counts the number of times the information corresponding to the ID information is transmitted. The company A ex8000 managing the server charges the fee corresponding to the count, to the requesting company B or individual ex8001. For example, a larger fee is charged when the count is larger.

FIG. 181 is a flowchart illustrating service provision flow.

In Step ex8000, the company A managing the server receives the request for information distribution from another company B. In Step ex8001, the information requested to be distributed is managed in association with the specific ID information in the server managed by the company A. In Step ex8002, the mobile terminal receives the specific ID information from the subject by visible light communication, and transmits it to the server managed by the company A. The visible light communication method has already been described in detail in the other embodiments, and so its description is omitted here. The server transmits the information corresponding to the specific ID information received from the mobile terminal, to the mobile terminal. In Step ex8003, the number of times the information is distributed is counted in the server. Lastly, in Step ex8004, the fee corresponding to the information distribution count is charged to the company B. By such charging according to the count, the appropriate fee corresponding to the advertising effect of the information distribution can be charged to the company B.

FIG. 182 is a flowchart illustrating service provision in another example. The description of the same steps as those in FIG. 181 is omitted here.

In Step ex8008, whether or not a predetermined time has elapsed from the start of the information distribution is determined. In the case of determining that the predetermined time has not elapsed, no fee is charged to the company B in Step ex8011. In the case of determining that the predetermined time has elapsed, the number of times the information is distributed is counted in Step ex8009. In Step ex8010, the fee corresponding to the information distribution count is charged to the company B. Since the information distribution is performed free of charge within the predetermined time, the company B can receive the accounting service after checking the advertising effect and the like.

FIG. 183 is a flowchart illustrating service provision in another example. The description of the same steps as those in FIG. 182 is omitted here.

In Step ex8014, the number of times the information is distributed is counted. In the case of determining that the predetermined time has not elapsed from the start of the information distribution in Step ex8015, no fee is charged in Step ex8016. In the case of determining that the predetermined time has elapsed, on the other hand, whether or not the number of times the information is distributed is greater than or equal to a predetermined number is determined in Step ex8017. In the case where the number of times the information is distributed is less than the predetermined number, the count is reset, and the number of times the information is distributed is counted again. In this case, no fee is charged to the company B regarding the predetermined time during which the number of times the information is distributed is less than the predetermined number. In the case where the count is greater than or equal to the predetermined number in Step ex8017, the count is reset and started again in Step ex8018. In Step ex8019, the fee corresponding to the count is charged to the company B. Thus, in the case where the count during the free distribution time is small, the free distribution time is provided again. This enables the company B to receive the accounting service at an appropriate time. Moreover, in the case where the count is small, the company A can analyze the information and, for example, when the information is out of season, suggest the change of the information to the company B. In the case where the free distribution time is provided again, the time may be shorter than the predetermined time provided first. The shorter time than the predetermined time provided first reduces the burden on the company A. Further, the free distribution time may be provided again after a fixed time period. For instance, if the information is influenced by seasonality, the free distribution time is provided again after the fixed time period until the new season begins.

Note that the charge fee may be changed according to the amount of data, regardless of the number of times the information is distributed. Distribution of a predetermined amount of data or more may be charged, while distribution is free of charge within the predetermined amount of data. The charge fee may be increased with the increase of the amount of data. Moreover, when managing the information in association with the specific ID information, a management fee may be charged. By charging the management fee, it is possible to determine the fee upon requesting the information distribution.

Embodiment 8

This embodiment describes each example of application using a receiver such as a smartphone and a transmitter for transmitting information as a blink pattern of an LED or an organic EL device in each of the embodiments described above.

Modulation Scheme that Facilitates Reception

FIGS. 184A, 184B, and 185 are diagrams illustrating an example of signal coding in Embodiment 8.

A transmission signal is made up of a header (H) and a body (Body). The header includes a unique signal pattern. A receiver finds this unique pattern from a received signal, recognizes which part of the received signal represents the header or the body based on the position of the unique pattern, and receives data.

In the case where the transmission signal is modulated in a pattern (a) in FIG. 184A, the receiver can receive data when successively receiving the header and the body that follows the header. The duration in which the receiver can continuously receive the signal depends on the size of a transmitter shown in a captured image (taken image). In the case where the transmitter is small or the transmitter is captured from a distance, the duration in which the receiver can continuously receive the signal is short. In the case where the duration (continuous reception time) in which the receiver can continuously receive the signal is the same as the time taken for transmitting one block including the header and the body, the receiver can receive data only when the transmission start point and the reception start point of the header are the same. (a) in FIG. 184A illustrates the case where the continuous reception time is a little longer than the transmission time for one block including the header and the body. Each arrow indicates the continuous reception time. The receiver can receive data when receiving the signal at the timings indicated by the thick arrows, but cannot receive data when receiving the signal at the timings indicated by the thin arrows because the header and the body are not completely contained in the received signal.

In the case where the transmission signal is modulated in a pattern (b) in FIG. 184A, the receiver can receive data at more reception timings. The transmitter transmits the signal modulated with “body, header, body” as one set. The two bodies in the same set represent the same signal. The receiver does not need to continuously receive the whole signal included in the body, but can restore the body by concatenating the body parts before and after the header. Hence, the receiver can receive data so long as it can continuously receive the whole signal included in the header. In FIG. 184A, the reception timings at which data can be received are indicated by the thick lines. As illustrated in FIG. 184A, data reception is possible at more reception timings in (b) than in (a).

In the modulation scheme (b) in FIG. 184A, the receiver can restore the body in the case where the body signal length is fixed. The receiver can also restore the body in the case where information of the body signal length is included in the header.

In detail, as illustrated in FIG. 184B, the receiver first detects the header having a unique bright line pattern, from the captured image (bright line image) including bright lines. The receiver then sequentially reads each signal of the body following the header (in the direction (1) in FIG. 184B). Each time the receiver reads a signal, the receiver determines whether or not the signal of the body has been read for the body signal length. That is, the receiver determines whether or not the whole signal included in the body has been read. In the case of determining that the whole signal has not been read, the receiver reads a signal following the read signal. If there is no following signal, the receiver sequentially reads each signal of the body preceding the header (in the direction (2) in FIG. 184B). The whole signal included in the body is read in this way. Here, in the case where the body signal length is fixed, the receiver holds the body signal length beforehand, and makes the above-mentioned determination using the body signal length. Alternatively, the receiver specifies the body signal length from the header, and makes the above-mentioned determination using the body signal length.

Even in the case where the body signal length is variable, if the modulation scheme is defined so that the body modulated by the same transmitter has the same signal length, the receiver can restore the body by estimating the body signal length from the signal length between two headers. In this case, in the modulation scheme (b) in FIG. 184A, a signal corresponding to two headers and two bodies needs to be received at one time. In a modulation scheme illustrated in FIG. 185, on the other hand, merely receiving a signal corresponding to two headers and one body enables the body signal length to be estimated. FIG. 185 illustrates the modulation scheme in which "body, header, body, header 2 (H2)" constitute one set, where the receiver can receive data so long as it can continuously receive the whole signal included in the header.

Thus, the transmitter in this embodiment determines a first luminance change pattern corresponding to a body which is a part of a signal to be transmitted and a second luminance change pattern indicating a header for specifying the body, and transmits the header and the body by changing in luminance according to the first luminance change pattern, the second luminance change pattern, and the first luminance change pattern in this order. The transmitter may also determine a third luminance change pattern indicating another header different from the header, and transmit the header, the body, and the other header by changing in luminance according to the first luminance change pattern, the second luminance change pattern, the first luminance change pattern, and the third luminance change pattern in this order.

Communication Using Bright Lines and Image Recognition

FIG. 186 is a diagram illustrating an example of a captured image in Embodiment 8.

A receiver can not only read a signal from bright lines in the captured image, but also analyze a part other than the bright lines by image processing. For instance, the receiver receives a signal from a transmitter such as a digital signage. Even in the case where the receiver receives the same signal, the receiver can display a different advertisement depending on an image displayed on a screen of the transmitter.

Since the bright lines are noise in image processing, image processing may be performed after interpolating pixel values in the bright line part from pixels right and left of the bright lines. Alternatively, image processing may be performed on an image except the bright line part.

Imaging Element Use Method Suitable for Visible Light Signal Reception

FIGS. 187A to 187C are diagrams illustrating an example of a structure and operation of a receiver in Embodiment 8.

The receiver includes an imaging element 8910*a*, as illustrated in FIG. 187A. The imaging element includes effective pixels which constitute a part for capturing an image, optical black for measuring noise such as dark current, and an ineffective area 8910*b*. The optical black includes VOB for measuring vertical noise and HOB for measuring horizontal noise. Since bright lines appear in a direction 8910*c* (horizontal direction), during exposure of the VOB or the ineffective area 8910*b*, bright lines are not obtained and signal reception is impossible. The time during which signal reception is possible can be increased by switching, upon visible light communication, to such an imaging mode that does not use the VOB and the ineffective area 8910*b* or minimally uses the VOB and the ineffective area 8910*b*.

As illustrated in FIG. 187B, the exposure time in an effective pixel area which is an area including the effective pixels can be increased by not using the VOB and the ineffective area 8910*b*. In detail, in normal imaging, one captured image is obtained in each of time t0 to t10, time t10 to t20, and time t20 to t30, as illustrated in (a) in FIG. 187B. Since the VOB and the ineffective area 8910*b* are also used when obtaining each captured image, the exposure time (the time during which electric charge is read, the shaded part in FIG. 187B) in the effective pixel area is time t3 to t10, time t13 to t20, and time t23 to t30.

In visible light communication, by not using the VOB and the ineffective area 8910*b*, the exposure time in the effective pixel area can be increased by the time during which the VOB and the ineffective area 8910*b* are used, as illustrated in (b) in FIG. 187B. That is, the time during which reception is possible in visible light communication can be increased. This enables reception of more signals.

In normal imaging, the exposure of each exposure line in the effective pixel area starts after a predetermined time m elapses from when the exposure of its adjacent exposure line starts, as illustrated in (a) in FIG. 187C. In visible light communication, on the other hand, since the exposure time in the effective pixel area is increased, the exposure of each exposure line in the effective pixel area starts after a predetermined time n (n>m) elapses from when the exposure of its adjacent exposure line starts, as illustrated in (b) in FIG. 187C.

Thus, in normal imaging, the receiver in this embodiment performs electric charge reading on each of a plurality of exposure lines in an area including optical black in the image sensor, after a predetermined time elapses from when electric charge reading is performed on an exposure line adjacent to the exposure line. In visible light communication, the receiver performs electric charge reading on each of a plurality of exposure lines in an area other than the optical black in the image sensor, after a time longer than the predetermined time elapses from when electric charge reading is performed on an exposure line adjacent to the exposure line, the optical black not being used in electric charge reading.

The time during which signal reception is possible can be further increased by switching, upon visible light communication, to such an imaging mode that does not reduce the number of vertical pixels by a process such as demosaicing or clipping.

When an image is captured in such a mode that does not use the VOB and the ineffective area 8910*b* and does not reduce the number of vertical pixels, the timing of exposing the bottom edge of the captured image and the timing of exposing the top edge of the captured image at the next frame are continuous, so that continuous signal reception is possible. Even in the case where the VOB and the like cannot be completely disabled, by modulating the transmission signal by an error correctable scheme, continuous signal reception is possible.

In FIG. 187A, photodiodes in the horizontal direction are exposed simultaneously, as a result of which horizontal bright lines appear. In visible light communication, this exposure mode and an exposure mode of exposing photodiodes in the vertical direction simultaneously are alternately applied to obtain horizontal bright lines and vertical bright lines. Thus, the signal can be stably received regardless of the shape of the transmitter.

Continuous Signal Reception

FIG. 187D is a diagram illustrating an example of a signal reception method in Embodiment 8.

An imaging element includes effective pixels which are pixels for converting received light intensity to an image and ineffective pixels for not converting received light intensity to an image but using it as, for example, reference intensity of dark current. In the normal imaging mode, there is the time during which only the ineffective pixels receive light, i.e., the time during which signal reception is impossible, as illustrated in (a). In the visible light communication mode, the time during which reception is possible is increased by minimizing the time during which only the ineffective pixels receive light as illustrated in (b) or by setting the effective pixels to constantly receive light as illustrated in (c). This also enables continuous reception. Though there is the time during which reception is impossible in the case of (b), the use of error correction code in the transmission data allows the whole signal to be estimated even when a part of the signal cannot be received.

Method of Receiving Signal from Transmitter Captured in Small Size

FIG. 187E is a flowchart illustrating an example of a signal reception method in Embodiment 8.

As illustrated in FIG. 187E, the process starts in Step 9000*a*. In Step 9000*b*, a receiver receives a signal. In Step 9000*c*, the receiver detects a header. In Step 9000*d*, the receiver determines whether or not the data size of a body following the header is known. In the case of Yes, the process proceeds to Step 9000*f*. In the case of No, the process proceeds to Step 9000*e*, and the receiver reads the data size of the body following the header, from the header. The process then proceeds to Step 9000*f*. In Step 9000*f*, the receiver determines whether or not the signal indicating the body is all successively received following the header. In the case of Yes, the process proceeds to Step 9000*g*, and the receiver reads the body part from the signal received following the header. In Step 9000*p*, the process ends. In the case of No, the process proceeds to Step 9000*h*, and the receiver determines whether or not the total data length of the part received following the header and the part received before the header is sufficient for the data length of the body. In the case of Yes, the process proceeds to Step 9000*i*, and the receiver reads the body part by concatenating the part received following the header and the part received before the header. In Step 9000*p*, the process ends. In the case of No, the process proceeds to Step 9000*j*, and the receiver determines whether or not means for capturing many bright lines from a transmitter is available. In the case of Yes, the process proceeds to Step 9000*n*, and the receiver changes to a setting capable of capturing many bright lines. The process then returns to Step 9000*b*. In the case of No, the process proceeds to Step 9000*k*, and the receiver notifies that a transmitter is present but the image capture size is insufficient. In Step 9000*m*, the receiver notifies the direction toward the transmitter and that reception is possible if moving closer to the transmitter. In Step 9000*p*, the process ends.

With this method, the signal can be stably received even in the case where the number of exposure lines passing through the transmitter in the captured image is small.

Captured Image Size Suitable for Visible Light Signal Reception

FIGS. 188 and 189A are diagrams illustrating an example of a reception method in Embodiment 8.

In the case where an effective pixel area of an imaging element is 4:3, if an image is captured at 16:9, top and bottom parts of the image are clipped. When horizontal bright lines appear, bright lines are lost due to this clipping, and the time during which signal reception is possible is shortened. Likewise, in the case where the effective pixel area of the imaging element is 16:9, if an image is captured at 4:3, right and left parts of the image are clipped. When vertical bright lines appear, the time during which signal reception is possible is shortened. In view of this, an aspect ratio that involves no clipping, i.e., 4:3 in FIG. 188 and 16:9 in FIG. 189A, is set as an aspect ratio for imaging in the visible light communication mode. This contributes to a longer time during which reception is possible.

Thus, the receiver in this embodiment further sets an aspect ratio of an image obtained by the image sensor. In visible light communication, the receiver determines whether or not an edge of the image perpendicular to the exposure lines (bright lines) is clipped in the set aspect ratio, and changes the set aspect ratio to a non-clipping aspect ratio in which the edge is not clipped in the case of determining that the edge is clipped. The image sensor in the receiver obtains the bright line image in the non-clipping aspect ratio, by capturing the subject changing in luminance.

FIG. 189B is a flowchart illustrating an example of a reception method in Embodiment 8.

This reception method sets an imaging aspect ratio for increasing the reception time and receiving a signal from a small transmitter.

As illustrated in FIG. 189B, the process starts in Step 8911Ba. In Step 8911Bb, the receiver changes the imaging mode to the visible light communication mode. In Step 8911Bc, the receiver determines whether or not the captured image aspect ratio is set to be closest to the effective pixel aspect ratio. In the case of Yes, the process proceeds to Step 8911Bd, and the receiver sets the captured image aspect ratio to be closest to the effective pixel aspect ratio. In Step 8911Be, the process ends. In the case of No, the process ends in Step 8911Be. Setting the aspect ratio in the visible light communication mode in this way reduces the time during which reception is impossible, and also enables signal reception from a small transmitter or a distant transmitter.

FIG. 189C is a flowchart illustrating an example of a reception method in Embodiment 8.

This reception method sets an imaging aspect ratio for increasing the number of samples per unit time.

As illustrated in FIG. 189C, the process starts in Step 8911Ca. In Step 8911Cb, the receiver changes the imaging mode to the visible light communication mode. In Step 8911Cc, the receiver determines whether or not, though bright lines of exposure lines can be recognized, signal reception is impossible because the number of samples per unit time is small. In the case of Yes, the process proceeds to Step 8911Cd, and the receiver sets the captured image aspect ratio to be most different from the effective pixel aspect ratio. In Step 8911Ce, the receiver increases the imaging frame rate. The process then returns to Step 8911Cc. In the case of No, the process proceeds to Step 8911Cf, and the receiver receives a signal. The process then ends.

Setting the aspect ratio in the visible light communication mode in this way enables reception of a high frequency signal, and also enables reception even in an environment with a large amount of noise.

Visible Light Signal Reception Using Zoom)

FIG. 190 is a diagram illustrating an example of a reception method in Embodiment 8.

A receiver finds an area where bright lines are present in a captured image 8913*a*, and performs zoom so that as many bright lines as possible appear. The number of bright lines can be maximized by enlarging the bright line area in the direction perpendicular to the bright line direction until the bright line area lies over the top and bottom edges of the screen as in a captured image 8913*b*.

The receiver may find an area where bright lines are displayed clearly, and perform zoom so that the area is shown in a large size as in a captured image 8913*c*.

In the case where a plurality of bright line areas are present in a captured image, the above-mentioned process may be performed for each of the bright line areas, or performed for a bright line area designated by a user from the captured image.

Image Data Size Reduction Method Suitable for Visible Light Signal Reception

FIG. 191 is a diagram illustrating an example of a reception method in Embodiment 8.

In the case where the image data size needs to be reduced when sending a captured image (a) from an imaging unit to an image processing unit or from an imaging terminal (receiver) to a server, reduction or pixel omission in the direction parallel to bright lines as in (c) enables the data size to be reduced without decreasing the amount of information of bright lines. When reduction or pixel omission is performed as in (b) or (d), on the other hand, the number of bright lines decreases or it becomes difficult to recognize bright lines. Upon image compression, too, a decrease in reception efficiency can be prevented by not performing compression in the direction perpendicular to bright lines or by setting the compression rate in the perpendicular direction lower than that in the parallel direction. Note that a moving average filter is applicable to any of the parallel and perpendicular directions, and is effective in both data size reduction and noise reduction.

Thus, the receiver in this embodiment further: compresses the bright line image in a direction parallel to each of the plurality of bright lines included in the bright line image, to generate a compressed image; and transmits the compressed image.

Modulation Scheme with High Reception Error Detection Accuracy

FIG. 192 is a diagram illustrating an example of a signal modulation method in Embodiment 8.

Error detection by a parity bit detects a 1-bit reception error, and so cannot detect a mix-up between "01" and "10" and a mix-up between "00" and "11". In a modulation scheme (a), "01" and "10" tend to be mixed up because the L position differs only by one between "01" and "10". In a modulation scheme (b), on the other hand, the L position differs by two between "01" and "10" and between "00" and "11". Hence, a reception error can be detected with high accuracy through the use of the modulation scheme (b). The same applies to the modulation schemes in FIGS. 76 to 78.

Thus, in this embodiment, luminance change patterns between which the timing at which a predetermined luminance value (e.g., L) occurs is different are assigned to different signal units beforehand, to prevent two luminance change patterns from being assigned to signal units of the same parity (e.g., "01" and "10"), the timing at which the predetermined luminance value occurs in one of the two luminance change patterns being adjacent to the timing at which the predetermined luminance value occurs in the other one of the two luminance change patterns. The transmitter in this embodiment determines, for each signal unit included in the transmission signal, a luminance change pattern assigned to the signal unit.

Change of Operation of Receiver According to Situation

FIG. 193 is a diagram illustrating an example of operation of a receiver in Embodiment 8.

A receiver 8920*a* operates differently according to a situation in which reception starts. For instance, in the case of being activated in Japan, the receiver 8920*a* receives a signal modulated by phase shift keying at 60 kHz, and downloads data from a server 8920*d* using the received ID as a key. In the case of being activated in the US, the receiver 8920*a* receives a signal modulated by frequency shift keying at 50 kHz, and downloads data from a server 8920*e* using the received ID as a key. The situation according to which the operation of the receiver changes includes a location (country or building) where the receiver 8920*a* is present, a base station or a wireless access point (Wi-Fi, Bluetooth, IMES, etc.) in communication with the receiver 8920*a*, a time of day, and so on.

For example, the receiver 8920*a* transmits, to a server 8920*f*, position information, information of a last accessed wireless base station (a base station of a carrier communication network, Wi-Fi, Bluetooth®, IMES, etc.), or an ID last received by visible light communication. The server 8920*f* estimates the position of the receiver 8920*a* based on the received information, and transmits a reception algorithm capable of receiving transmission signals of transmitters near the position and information (e.g., URI) of an ID management server managing IDs of transmitters near the position. The receiver 8920*a* receives a signal of a transmitter 8920*b* or 8920*c* using the received algorithm, and inquires of an ID management server 8920*d* or 8920*e* indicated by the received information using the ID as a key.

With this method, communication can be performed by a scheme that differs depending on country, region, building, or the like. The receiver 8920*a* in this embodiment may, upon receiving a signal, switch the server to be accessed, the reception algorithm, or the signal modulation method illustrated in FIG. 192, according to the frequency used for modulating the signal.

Notification of Visible Light Communication to Humans

FIG. 194 is a diagram illustrating an example of operation of a transmitter in Embodiment 8.

A light emitting unit in a transmitter 8921*a* repeatedly performs blinking visually recognizable by humans and visible light communication, as illustrated in (a) in FIG. 194.

Blinking visually recognizable by humans can notify humans that visible light communication is possible. Upon seeing that the transmitter 8921*a* is blinking, a user notices that visible light communication is possible. The user accordingly points a receiver 8921*b* at the transmitter 8921*a* to perform visible light communication, and conducts user registration of the transmitter 8921*a*.

Thus, the transmitter in this embodiment repeatedly alternates between a step of a light emitter transmitting a signal by changing in luminance and a step of the light emitter blinking so as to be visible to the human eye.

The transmitter may include a visible light communication unit and a blinking unit (communication state display unit) separately, as illustrated in (b) in FIG. 194.

The transmitter may operate as illustrated in (c) in FIG. 194 using the modulation scheme in FIG. 77 or 78, thereby making the light emitting unit appear blinking to humans while performing visible light communication. In detail, the transmitter repeatedly alternates between high-luminance visible light communication with brightness 75% and low-luminance visible light communication with brightness 1%. As an example, by operating as illustrated in (c) in FIG. 194 when an abnormal condition or the like occurs in the transmitter and the transmitter is transmitting a signal different from normal, the transmitter can alert the user without stopping visible light communication.

Expansion in Reception Range by Diffusion Plate

FIG. 195 is a diagram illustrating an example of a receiver in Embodiment 8.

A receiver 8922*a* is in a normal mode in (a) in FIG. 195, and in a visible light communication mode in (b) in FIG. 195. The receiver 8922*a* includes a diffusion plate 8922*b* in front of an imaging unit. In the visible light communication mode, the receiver 8922*a* moves the diffusion plate 8922*b* to be in front of the imaging unit so that a light source is captured wider. Here, the position of the diffusion plate 8922*b* is adjusted to prevent light from a plurality of light sources from overlapping each other. A macro lens or a zoom lens may be used instead of the diffusion plate 8922*b*. This enables signal reception from a distant transmitter or a small transmitter.

The imaging direction of the imaging unit may be moved instead of moving the diffusion plate 8922*b*.

An area of an image sensor where the diffusion plate 8922*b* is shown may be used only in the visible light communication mode and not in the normal imaging mode. In this way, the above-mentioned advantageous effect can be achieved without moving the diffusion plate 8922*b* or the imaging unit.

Method of Synchronizing Signal Transmission from a Plurality of Transmitters

FIGS. 196 and 197 are diagrams illustrating an example of a transmission system in Embodiment 8.

In the case of using a plurality of projectors for projection mapping or the like, for projection onto one part, there is a need to transmit a signal only from one projector or synchronize the signal transmission timings of the plurality of projectors, in order to avoid interference. FIG. 196 illustrates a mechanism for synchronization of transmission.

Projectors A and B that project onto the same projection surface transmit signals as illustrated in FIG. 196. A receiver captures the projection surface for signal reception, calculates the time difference between signals a and b, and adjusts the signal transmission timing of each projector.

Since the projectors A and B are not synchronous at the operation start, a time (total pause time) during which both the projectors A and B transmit no signal is provided to prevent the signals a and b from overlapping and being unable to be received. The signal transmitted from each projector may be changed as the timing adjustment for the projector progresses. For example, efficient timing adjustment can be made by taking a longer total pause time at the operation start and shortening the total pause time as the timing adjustment progresses.

For accurate timing adjustment, it is desirable that the signals a and b are contained in one captured image. The imaging frame rate of the receiver tends to be 60 fps to 7.5 fps. By setting the signal transmission period to less than or equal to 1/7.5 second, the signals a and b can be contained in an image captured at 7.5 fps. By setting the signal transmission period to less than or equal to 1/60 second, the signals a and b can be reliably contained in an image captured at 30 fps.

FIG. 197 illustrates synchronization of a plurality of transmitters as displays. The displays to be synchronized are captured so as to be contained within one image, to perform timing adjustment.

Visible Light Signal Reception by Illuminance Sensor and Image Sensor

FIG. 198 is a diagram illustrating an example of operation of a receiver in Embodiment 8.

An image sensor consumes more power than an illuminance sensor. Accordingly, when a signal is detected by an illuminance sensor 8940*c*, a receiver 8940*a* activates an image sensor 8940*b* to receive the signal. As illustrated in (a) in FIG. 198, the receiver 8940*a* receives a signal transmitted from a transmitter 8940*d*, by the illuminance sensor 8940*c*. After this, the receiver 8940*a* activates the image sensor 8940*b*, receives the transmission signal of the transmitter 8940*d* by the image sensor, and also recognizes the position of the transmitter 8940*d*. At the time when the image sensor 8940*b* receives a part of the signal, if the part is the same as the signal received by the illuminance sensor 8940*c*, the receiver 8940*a* provisionally determines that the same signal is received, and performs a subsequent process such as displaying the current position. The determination is completed once the image sensor 8940*b* has successfully received the whole signal.

Upon the provisional determination, information that the determination is not completed may be displayed. For instance, the current position is displayed semi-transparently, or a position error is displayed.

The part of the signal may be, for example, 20% of the total signal length or an error detection code portion.

In a situation as illustrated in (b) in FIG. 198, the receiver 8940*a* cannot receive signals by the illuminance sensor 8940*c* due to interference, but can recognize the presence of signals. For example, the receiver 8940*a* can estimate that signals are present, in the case where a peak appears in transmission signal modulation frequency when the sensor value of the illuminance sensor 8940*c* is Fourier transformed. Upon estimating that signals are present from the sensor value of the illuminance sensor 8940*c*, the receiver 8940*a* activates the image sensor 8940*b* and receives signals from transmitters 8940*e* and 8940*f*.

Reception Start Trigger

FIG. 199 is a diagram illustrating an example of operation of a receiver in Embodiment 8.

Power is consumed while an image sensor or an illuminance sensor (hereafter collectively referred to as "light receiving sensor") is on. Stopping the light receiving sensor when not needed and activating it when needed contributes to improved power consumption efficiency. Here, since the illuminance sensor consumes less power than the image sensor, only the image sensor may be controlled while the illuminance sensor is always on.

In (a) in FIG. 199, a receiver 8941*a* detects movement from a sensor value of a 9-axis sensor, and activates a light receiving sensor to start reception.

In (b) in FIG. 199, the receiver 8941*a* detects an operation of tilting the receiver horizontally from the sensor value of the 9-axis sensor, and activates a light receiving sensor pointed upward to start reception.

In (c) in FIG. 199, the receiver 8941*a* detects an operation of sticking the receiver out from the sensor value of the 9-axis sensor, and activates a light receiving sensor in the stick out direction to start reception.

In (d) in FIG. 199, the receiver 8941*a* detects an operation of directing the receiver upward or shaking the receiver from the sensor value of the 9-axis sensor, and activates a light receiving sensor pointed upward to start reception.

Thus, the receiver in this embodiment further: determines whether or not the receiver (reception device) is moved in a predetermined manner; and activates the image sensor, in the case of determining that the reception device is moved in the predetermined manner.

Reception Start Gesture

FIG. 200 is a diagram illustrating an example of gesture operation for starting reception by the present communication scheme.

A receiver 8942*a* such as a smartphone detects an operation of setting the receiver upright and sliding the receiver in the horizontal direction or repeatedly sliding the receiver in the horizontal direction, from a sensor value of a 9-axis sensor. The receiver 8942*a* then starts reception, and obtains the position of each transmitter 8942*b* based on the received ID. The receiver 8942*a* obtains the position of the receiver, from the relative position relations between the receiver and the plurality of transmitters 8942*b*. The receiver 8942*a* can stably capture the plurality of transmitters 8942*b* by being slid, and estimate the position of the receiver with high accuracy by triangulation.

This operation may be performed only when the receiver's home screen is in the foreground. This can prevent the communication from being launched despite the user's intension while the user is using another application.

Example of Application to Car Navigation System

FIGS. 201 and 202 are diagrams illustrating an example of application of a transmission and reception system in Embodiment 8.

A transmitter 8950*b* such as a car navigation system transmits information for wirelessly connecting to the transmitter 8950*b*, such as Bluetooth® pairing information, Wi-Fi SSID and password, or an IP address. A receiver 8950*a* such as a smartphone establishes wireless connection with the transmitter 8950*b* based on the received information, and performs subsequent communication via the wireless connection.

As an example, a user inputs a destination, store information to be searched for, or the like to the smartphone 8950*a*. The smartphone 8950*a* transmits the input information to the car navigation system 8950*b* via the wireless connection, and the car navigation system 8950*b* displays route information. As another example, the smartphone 8950*a* operates as a controller of the car navigation system 8950*b*, to control music or video reproduced in the car navigation system 8950*b*. As another example, music or video held in the smartphone 8950*a* is reproduced in the car navigation system 8950*b*. As another example, the car navigation system 8950*b* obtains nearby store information or road congestion information, and has the smartphone 8950*a* display the information. As another example, upon receiving a call, the smartphone 8950*a* uses a microphone and a speaker of the wirelessly connected car navigation system 8950*b* for a conversation process. The smartphone 8950*a* may establish wireless connection and performs the above-mentioned operation upon receiving a call.

In the case where the car navigation system 8950*b* is set in an automatic connection mode for wireless connection, the car navigation system 8950*b* is wirelessly connected to a registered terminal automatically. In the case where the car navigation system 8950*b* is not in the automatic connection mode, the car navigation system 8950*b* transmits connection information using visible light communication, and waits for connection. The car navigation system 8950*b* may transmit connection information using visible light communication and wait for connection, even in the automatic connection mode. In the case where the car navigation system is manually connected, the automatic connection mode may be cleared, and a terminal automatically connected to the car navigation system may be disconnected.

Example of Application to Content Protection

FIG. 203 is a diagram illustrating an example of application of a transmission and reception system in Embodiment 8.

A transmitter 8951*b* such as a television transmits content protection information held in the transmitter 8951*b* or a device 8951*c* connected to the transmitter 8951*b*. A receiver 8951*a* such as a smartphone receives the content protection information, and performs content protection for a predetermined time afterward so that content protected by the content protection information in the transmitter 8951*b* or the device 8951*c* can be reproduced. Thus, content held in another device possessed by the user can be reproduced in the receiver.

The transmitter 8951*b* may store the content protection information in a server, and the receiver 8951*a* may obtain the content protection information from the server using a received ID of the transmitter 8951*b* as a key.

The receiver 8951*a* may transmit the obtained content protection information to another device.

Example of Application to Electronic Lock

FIG. 204A is a diagram illustrating an example of application of a transmission and reception system in Embodiment 8.

A receiver 8952*a* receives an ID transmitted from a transmitter 8952*b*, and transmits the ID to a server 8952*c*. When receiving the ID of the transmitter 8952*b* from the receiver 8952*a*, the server 8952*c* unlocks a door 8952*d*, opens an automatic door, or calls an elevator for moving to a floor registered in the receiver 8952*a* to a floor on which the receiver 8952*a* is present. The receiver 8952*a* thus functions as a key, allowing the user to unlock the door 8952*d* before reaching the door 8952*d* as an example.

Thus, the receiver in this embodiment: obtains a first bright line image which is an image including a plurality of bright lines, by capturing a subject (e.g., the above-mentioned transmitter) changing in luminance; and obtains first transmission information (e.g., the ID of the subject) by demodulating data specified by a pattern of the plurality of bright lines included in the obtained first bright line image. After the first transmission information is obtained, the receiver causes an opening and closing drive device of a door to open the door, by transmitting a control signal (e.g., the ID of the subject).

To prevent malicious operation, the server 8952*c* may verify that the device in communication is the receiver 8952*a*, through the use of security protection such as a secure element of the receiver 8952*a*. Moreover, to make sure that the receiver 8952*a* is near the transmitter 8952*b*, the server 8952*c* may, upon receiving the ID of the transmitter 8952*b*, issue an instruction to transmit a different signal to the transmitter 8952*b* and, in the case where the signal is transmitted from the receiver 8952*a*, unlock the door 8952*d*.

In the case where a plurality of transmitters 8952*b* as lighting devices are arranged along a passageway to the door 8952*d*, the receiver 8952*a* receives IDs from these transmitters 8952*b*, to determine whether or not the receiver 8952*a* is approaching the door 8952*d*. For example, in the case where the values indicated by the IDs decrease in the order in which the IDs are obtained, the receiver determines that the receiver is approaching the door. Alternatively, the receiver specifies the position of each transmitter 8952*b* based on the corresponding ID, and estimates the position of the receiver based on the position of each transmitter 8952*b* and the position of the transmitter 8952*b* shown in the captured image. The receiver then compares the position of the door 8952*d* held beforehand and the estimated position of the receiver as needed, to determine whether or not the receiver is approaching the door 8952*d*. Upon determining that the receiver is approaching the door 8952*d*, the receiver transmits any of the obtained IDs to the server 8952*c*. The server 8952*c* responsively performs a process for opening the door 8952*d* as an example.

Thus, the receiver in this embodiment: obtains a second bright line image which is an image including a plurality of bright lines, by capturing another subject changing in luminance; and obtains second transmission information (e.g., the ID of the other subject) by demodulating data specified by a pattern of the plurality of bright lines included in the obtained second bright line image. The receiver determines whether or not the receiver is approaching the door, based on the obtained first transmission information and second transmission information. In the case of determining that the receiver is approaching the door, the receiver transmits the control signal (e.g., the ID of any of the subjects).

FIG. 204B is a flowchart of an information communication method in this embodiment.

An information communication method in this embodiment is an information communication method of obtaining information from a subject, and includes steps SK21 to SK24.

In detail, the information communication method includes: a first exposure time setting step SK21 of setting a first exposure time of an image sensor so that, in an image obtained by capturing a first subject by the image sensor, a plurality of bright lines corresponding to exposure lines included in the image sensor appear according to a change in luminance of the first subject, the first subject being the subject; a first bright line image obtainment step SK22 of obtaining a first bright line image which is an image including the plurality of bright lines, by capturing the first subject changing in luminance by the image sensor with the set first exposure time; a first information obtainment step SK23 of obtaining first transmission information by demodulating data specified by a pattern of the plurality of bright lines included in the obtained first bright line image; and a door control step SK24 of causing an opening and closing drive device of a door to open the door, by transmitting a control signal after the first transmission information is obtained.

FIG. 204C is a block diagram of an information communication device in this embodiment.

An information communication device K20 in this embodiment is an information communication device that obtains information from a subject, and includes structural elements K21 to K24.

In detail, the information communication device K20 includes: an exposure time setting unit K21 that sets an exposure time of an image sensor so that, in an image obtained by capturing the subject by the image sensor, a plurality of bright lines corresponding to exposure lines included in the image sensor appear according to a change in luminance of the subject; a bright line image obtainment unit K22 that includes the image sensor, and obtains a bright line image which is an image including the plurality of bright lines, by capturing the subject changing in luminance with the set exposure time; an information obtainment unit K23 that obtains transmission information by demodulating data specified by a pattern of the plurality of bright lines included in the obtained bright line image; and a door control unit K24 that causes an opening and closing drive device of a door to open the door, by transmitting a control signal after the transmission information is obtained.

In the information communication method and the information communication device K20 illustrated in FIGS. 204B and 204C, the receiver including the image sensor can be used as a door key, thus eliminating the need for a special electronic lock, for instance as illustrated in FIG. 204A. This enables communication between various devices including a device with low computational performance.

It should be noted that in the above embodiments, each of the constituent elements may be constituted by dedicated hardware, or may be obtained by executing a software program suitable for the constituent element. Each constituent element may be achieved by a program execution unit such as a CPU or a processor reading and executing a software program stored in a recording medium such as a hard disk or semiconductor memory. For example, the program causes a computer to execute the information communication method illustrated in the flowchart of FIG. 204B.

Example of Application to Store Visit Information Transmission

FIG. 205 is a diagram illustrating an example of application of a transmission and reception system in Embodiment 8.

A receiver 8953*a* transmits an ID transmitted from a transmitter 8953*b*, to a server 8953*c*. The server 8953*c* notifies a store staff 8953*d* of order information associated with the receiver 8953*a*. The store staff 8953*d* prepares a product or the like, based on the order information. Since the order has already been processed when the user enters the store, the user can promptly receive the product or the like.

Example of Application to Location-Dependent Order Control

FIG. 206 is a diagram illustrating an example of application of a transmission and reception system in Embodiment 8.

A receiver 8954*a* displays a screen allowing an order only when a transmission signal of a transmitter 8954*b* is received. In this way, a store can avoid taking an order from a customer who is not nearby.

Alternatively, the receiver 8954*a* places an order by transmitting an ID of the transmitter 8954*b* in addition to order information. This enables the store to recognize the position of the orderer, and recognize the position to which a product is to be delivered or estimate the time by which the orderer is likely to arrive at the store. The receiver 8954*a* may add the travel time to the store calculated from the moving speed, to the order information. Regarding suspicious purchase based on the current position (e.g., purchase of a ticket of a train departing from a station other than the current position), the receiver may reject the purchase.

Example of Application to Route Guidance

FIG. 207 is a diagram illustrating an example of application of a transmission and reception system in Embodiment 8.

A receiver 8955*a* receives a transmission ID of a transmitter 8955*b* such as a guide sign, obtains data of a map displayed on the guide sign from a server, and displays the map data. Here, the server may transmit an advertisement suitable for the user of the receiver 8955*a*, so that the receiver 8955*a* displays the advertisement information, too. The receiver 8955*a* displays the route from the current position to the location designated by the user.

Example of Application to Location Notification

FIG. 208 is a diagram illustrating an example of application of a transmission and reception system in Embodiment 8.

A receiver 8956*a* receives an ID transmitted from a transmitter 8956*b* such as a home or school lighting, and transmits position information obtained using the ID as a key, to a terminal 8956*c*. A parent having the terminal 8956*c* can thus be notified that his or her child having the receiver 8956*a* has got back home or arrived at the school. As another example, a supervisor having the terminal 8956*c* can recognize the current position of a worker having the receiver 8956*a*.

Example of Application to Use Log Storage and Analysis

FIG. 209 is a diagram illustrating an example of application of a transmission and reception system in Embodiment 8.

A receiver 8957*a* receives an ID transmitted from a transmitter 8957*b* such as a sign, obtains coupon information from a server, and displays the coupon information. The receiver 8957*a* stores the subsequent behavior of the user such as saving the coupon, moving to a store displayed in the coupon, shopping in the store, or leaving without saving the coupon, in the server 8957*c*. In this way, the subsequent behavior of the user who has obtained information from the sign 8957*b* can be analyzed to estimate the advertisement value of the sign 8957*b*.

Example of Application to Screen Sharing

FIGS. 210 and 211 are diagrams illustrating an example of application of a transmission and reception system in Embodiment 8.

A transmitter 8960*b* such as a projector or a display transmits information (an SSID, a password for wireless connection, an IP address, a password for operating the transmitter) for wirelessly connecting to the transmitter 8960*b*, or transmits an ID which serves as a key for accessing such information. A receiver 8960*a* such as a smartphone, a tablet, a notebook computer, or a camera receives the signal transmitted from the transmitter 8960*b* to obtain the information, and establishes wireless connection with the transmitter 8960*b*. The wireless connection may be made via a router, or directly made by Wi-Fi Direct, Bluetooth®, Wireless Home Digital Interface, or the like. The receiver 8960*a* transmits a screen to be displayed by the transmitter 8960*b*. Thus, an image on the receiver can be easily displayed on the transmitter.

When connected with the receiver 8960*a*, the transmitter 8960*b* may notify the receiver 8960*a* that not only the information transmitted from the transmitter but also a password is needed for screen display, and refrain from displaying the transmitted screen if a correct password is not obtained. In this case, the receiver 8960*a* displays a password input screen 8960*d* or the like, and prompts the user to input the password.

FIG. 211 is a diagram illustrating an example where a screen of a transmitter 8961*c* is displayed on the transmitter 8960*b* via the receiver 8960*a*. The transmitter 8961*c* such as a notebook computer transmits information for connecting to the terminal 8961*c*, or an ID associated with the information. The receiver 8960*a* receives the signal transmitted from the transmitter 8960*b* and the signal transmitted from the transmitter 8961*c*, establishes connection with each of the transmitters, and causes the transmitter 8961*c* to transmit an image to be displayed on the transmitter 8960*b*. The transmitters 8960*b* and 8961*c* may communicate directly, or communicate via the receiver 8960*a* or a router. Hence, even in the case where the transmitter 8961*c* cannot receive the signal transmitted from the transmitter 8960*b*, an image on the transmitter 8961*c* can be easily displayed on the transmitter 8960*b*.

The above-mentioned operation may be performed only in the case where the difference between the time at which the receiver 8960*a* receives the signal transmitted from the transmitter 8960*b* and the time at which the receiver 8960*a* receives the signal transmitted from the transmitter 8961*c* is within a predetermined time.

The transmitter 8961*c* may transmit the image to the transmitter 8960*b* only in the case where the transmitter 8961*c* receives a correct password from the receiver 8960*a*.

Example of Application to Position Estimation Using Wireless Access Point

FIG. 212 is a diagram illustrating an example of application of a transmission and reception system in Embodiment 8.

A receiver 8963*a* such as a smartphone receives an ID transmitted from a transmitter 8963*b*. The receiver 8963*a* obtains position information of the transmitter 8963*b* using the received ID as a key, and estimates the position of the receiver 8963*a* based on the position and direction of the transmitter 8963*b* in the captured image. The receiver 8963*a* also receives a signal from a radio wave transmitter 8963*c* such as a Wi-Fi access point. The receiver 8963*a* estimates the position of the receiver 8963*a*, based on position information and radio wave transmission direction information of the radio wave transmitter 8963*c* included in the signal. The receiver 8963*a* estimates the position of the receiver 8963*a* by a plurality of means in this manner, and so can estimate its position with high accuracy.

A method of estimating the position of the receiver 8963*a* using the information of the radio transmitter 8963*c* is described below. The radio transmitter 8963*c* transmits synchronous signals in different directions, from a plurality of antennas. The radio transmitter 8963*c* also changes the signal transmission direction in sequence. The receiver 8963*a* estimates that a radio wave transmission direction in which the radio field intensity is highest is the direction from the radio transmitter 8963*c* to the receiver 8963*a*. Moreover, the receiver 8963*a* calculates path differences from the differences in arrival time of radio waves transmitted from the different antennas and respectively passing through paths 8963*d*, 8963*e*, and 8963*f*, and calculates the distance between the radio transmitter 8963*c* and the receiver 8963*a* from radio wave transmission angle differences θ12, θ13, and θ23. By further using surrounding electric field information and radio wave reflector information, the receiver 8963*a* can estimate its position with higher accuracy.

Position Estimation by Visible Light Communication and Wireless Communication

FIG. 213 is a diagram illustrating a structure for performing position estimation by visible light communication and wireless communication. In other words, FIG. 213 illustrates a structure for performing terminal position estimation using visible light communication and wireless communication.

A mobile terminal (a smartphone terminal) performs visible light communication with a light emitting unit, to obtain an ID of the light emitting unit. The mobile terminal inquires of a server using the obtained ID, and obtains position information of the light emitting unit. By doing so, the mobile terminal obtains an actual distance L1 and an actual distance L2 which are respective distances in the x-axis direction and in the y-axis direction between a multiple-input and multiple-output access point (MIMO) and the light emitting unit. Furthermore, the mobile terminal detects a tilt θ1 of the mobile terminal using a gyroscope or the like as already described in other embodiments.

In the case where beamforming is performed from an MIMO access point toward the mobile terminal, a beamforming angle θ2 is set by the MIMO access point and is a known value. Accordingly, the mobile terminal obtains the beamforming angle θ2 by wireless communication or the like.

As a result, using the actual distance L1, the actual distance L2, the tilt θ1 of the mobile terminal, and the beamforming angle θ2, the mobile terminal is capable of calculating a coordinate position (x1, y1) of the mobile terminal which is based on the MIMO access point. The MIMO access point is capable of forming a plurality of beams, and so a plurality of beamformings may be used for position estimation of higher accuracy.

As described above, according to this embodiment, the position estimation accuracy can be enhanced by employing both the position estimation by visible light communication and the position estimation by wireless communication.

Though the information communication method according to one or more aspects has been described by way of the embodiments above, the present disclosure is not limited to these embodiments. Modifications obtained by applying various changes conceivable by those skilled in the art to the embodiments and any combinations of structural elements in different embodiments are also included in the scope of one or more aspects without departing from the scope of the present disclosure.

An information communication method according to an aspect of the present disclosure may also be applied as illustrated in FIGS. 214, 215, and 216.

FIG. 214 is a diagram illustrating an example of application of a transmission and reception system in Embodiment 8.

A camera serving as a receiver in the visible light communication captures an image in a normal imaging mode (Step 1). Through this imaging, the camera obtains an image file in a format such as an exchangeable image file format (EXIF). Next, the camera captures an image in a visible light communication imaging mode (Step 2). The camera obtains, based on a pattern of bright lines in an image obtained by this imaging, a signal (visible light communication information) transmitted from a subject serving as a transmitter by visible light communication (Step 3). Furthermore, the camera accesses a server by using the signal (reception information) as a key and obtains, from the server, information corresponding to the key (Step 4). The camera stores each of the following as metadata of the above image file: the signal transmitted from the subject by visible light communication (visible light reception data); the information obtained from the server; data indicating a position of the subject serving as the transmitter in the image represented by the image file; data indicating the time at which the signal transmitted by visible light communication is received (time in the moving image); and others. Note that in the case where a plurality of transmitters are shown as subjects in a captured image (an image file), the camera stores, for each of the transmitters, pieces of the metadata corresponding to the transmitter into the image file.

When displaying an image represented by the above-described image file, a display or projector serving as a transmitter in the visible light communication transmits, by visible light communication, a signal corresponding to the metadata included in the image file. For example, in the visible light communication, the display or the projector may transmit the metadata itself or transmit, as a key, the signal associated with the transmitter shown in the image.

The mobile terminal (the smartphone) serving as the receiver in the visible light communication captures an image of the display or the projector, thereby receiving a signal transmitted from the display or the projector by visible light communication. When the received signal is the above-described key, the mobile terminal uses the key to obtain, from the display, the projector, or the server, metadata of the transmitter associated with the key. When the received signal is a signal transmitted from a really existing transmitter by visible light communication (visible light reception data or visible light communication information), the mobile terminal obtains information corresponding to the visible light reception data or the visible light communication information from the display, the projector, or the server.

FIG. 215 is a flowchart illustrating operation of a camera (a receiver) of a transmission and reception system in Embodiment 8.

First, upon detection of pressing of an image capture button (Step S901), the camera captures an image in the normal imaging mode (Step S902). The camera then increases its shutter speed to a predetermined speed or greater, that is, sets a shorter exposure time than that set in the normal imaging mode, and captures an image in a visible light imaging mode (Step S903). Thus, the camera obtains a signal transmitted from the subject by visible light communication.

Subsequently, the camera uses, as a key, a signal (information) obtained by visible light communication, thereby obtaining information associated with the key from the server (Step S905). Next, the camera stores the signal and each piece of information and data into a metadata area (e.g., an area into which EXIF metadata is stored) of an image file obtained by imaging in the normal imaging mode (Step S905). In detail, the camera stores a signal obtained by visible light communication, information obtained from the server, position data indicating a position, in an image (an image captured in the normal imaging mode), of a transmitter which is a subject that has transmitted the signal in the visible light communication, and the like.

The camera then determines whether to capture moving images (Step S906), and when determining to capture moving images (Step S906: Y), repeats the processes following Step S902, and when determining to not capture moving images (Step S906: N), ends the imaging process.

FIG. 216 is a flowchart illustrating operation of a display (a transmitter) of a transmission and reception system in Embodiment 8.

First, the display checks the metadata area of the image file to determine whether the number of transmitters shown in the image represented by the image file is one or more than one (Step S911). Here, when determining that the number of transmitters is more than one (Step S911: more than 1), the display further determines whether or not a divided transmission mode has been set as a mode in the visible light communication (Step S912). When determining that the divided transmission mode has been set (Step S912: Y), a display area (a transmission part) of the display is divided into display areas, and the display transmits a signal from each of the display areas (Step S914). Specifically, for each transmitter, the display handles, as a display area, an area in which the transmitter is shown or an area in which the transmitter and surroundings thereof are shown, and transmits a signal corresponding to the transmitter from the display area by visible light communication.

When determining in Step S912 that the divided transmission mode has not been set (Step S912: N), the display transmits a signal corresponding to each of the transmitters from the entire display area of the display by visible light communication (Step S913). In short, the display transmits, from the entire screen, a key associated with a plurality of pieces of information.

When determining in Step S911 that the number of transmitters is one (Step S911: 1), the display transmits a signal corresponding to the one transmitter from the entire display area of the display by visible light communication (Step S915). In short, the display transmits the signal from the entire screen.

Furthermore, when a mobile terminal (a smartphone) accesses the display by using the signal transmitted by visible light communication (the transmission information) as a key after any one of Steps S913 to 915, for example, the display provides the access source, i.e., the mobile terminal, with metadata of the image file that is associated with the key (Step S916).

Summary of this Embodiment

An information communication method in this embodiment is an information communication method of obtaining information from a subject, the information communication method including: setting a first exposure time of an image sensor so that, in an image obtained by capturing a first subject by the image sensor, a plurality of bright lines corresponding to exposure lines included in the image sensor appear according to a change in luminance of the first subject, the first subject being the subject; obtaining a first bright line image which is an image including the plurality of bright lines, by capturing the first subject changing in luminance by the image sensor with the set first exposure time; obtaining first transmission information by demodulating data specified by a pattern of the plurality of bright lines included in the obtained first bright line image; and causing an opening and closing drive device of a door to open the door, by transmitting a control signal after the first transmission information is obtained.

In this way, the receiver including the image sensor can be used as a door key, thus eliminating the need for a special electronic lock, for instance as illustrated in FIG. 204A. This enables communication between various devices including a device with low computational performance.

For example, the information communication method may further include: obtaining a second bright line image which is an image including a plurality of bright lines, by capturing a second subject changing in luminance by the image sensor with the set first exposure time; obtaining second transmission information by demodulating data specified by a pattern of the plurality of bright lines included in the obtained second bright line image; and determining whether or not a reception device including the image sensor is approaching the door, based on the obtained first transmission information and second transmission information, wherein in the causing of an opening and closing drive device, the control signal is transmitted in the case of determining that the reception device is approaching the door.

In this way, the door can be opened at appropriate timing, i.e., only when the reception device (receiver) is approaching the door, for instance as illustrated in FIG. 204A.

For example, the information communication method may further include: setting a second exposure time longer than the first exposure time; and obtaining a normal image in which a third subject is shown, by capturing the third subject by the image sensor with the set second exposure time, wherein in the obtaining of a normal image, electric charge reading is performed on each of a plurality of exposure lines in an area including optical black in the image sensor, after a predetermined time elapses from when electric charge reading is performed on an exposure line adjacent to the exposure line, and in the obtaining of a first bright line image, electric charge reading is performed on each of a plurality of exposure lines in an area other than the optical black in the image sensor, after a time longer than the predetermined time elapses from when electric charge reading is performed on an exposure line adjacent to the exposure line, the optical black not being used in electric charge reading.

In this way, electric charge reading (exposure) is not performed on the optical black when obtaining the first bright line image, so that the time for electric charge reading (exposure) on an effective pixel area, which is an area in the image sensor other than the optical black, can be increased, for instance as illustrated in FIGS. 187A to 187E. As a result, the time for signal reception in the effective pixel area can be increased, with it being possible to obtain more signals.

For example, the information communication method may further include: determining whether or not a length of the pattern of the plurality of bright lines included in the first bright line image is less than a predetermined length, the length being perpendicular to each of the plurality of bright lines; changing a frame rate of the image sensor to a second frame rate lower than a first frame rate used when obtaining the first bright line image, in the case of determining that the length of the pattern is less than the predetermined length; obtaining a third bright line image which is an image including a plurality of bright lines, by capturing the first subject changing in luminance by the image sensor with the set first exposure time at the second frame rate; and obtaining the first transmission information by demodulating data specified by a pattern of the plurality of bright lines included in the obtained third bright line image.

In this way, in the case where the signal length indicated by the bright line pattern (bright line area) included in the first bright line image is less than, for example, one block of the transmission signal, the frame rate is decreased and the bright line image is obtained again as the third bright line image, for instance as illustrated in FIG. 224A. Since the length of the bright line pattern included in the third bright line image is longer, one block of the transmission signal is successfully obtained.

For example, the information communication method may further include setting an aspect ratio of an image obtained by the image sensor, wherein the obtaining of a first bright line image includes: determining whether or not an edge of the image perpendicular to the exposure lines is clipped in the set aspect ratio; changing the set aspect ratio to a non-clipping aspect ratio in which the edge is not clipped, in the case of determining that the edge is clipped; and obtaining the first bright line image in the non-clipping aspect ratio, by capturing the first subject changing in luminance by the image sensor.

In this way, in the case where the aspect ratio of the effective pixel area in the image sensor is 4:3 but the aspect ratio of the image is set to 16:9 and horizontal bright lines appear, i.e., the exposure lines extend along the horizontal direction, it is determined that top and bottom edges of the image are clipped, i.e., edges of the first bright line image is lost, for instance as illustrated in FIGS. 188 and 189A to 189C. In such a case, the aspect ratio of the image is changed to an aspect ratio that involves no clipping, for example, 4:3. This prevents edges of the first bright line image from being lost, as a result of which a lot of information can be obtained from the first bright line image.

For example, the information communication method may further include: compressing the first bright line image in a direction parallel to each of the plurality of bright lines included in the first bright line image, to generate a compressed image; and transmitting the compressed image.

In this way, the first bright line image can be appropriately compressed without losing information indicated by the plurality of bright lines, for instance as illustrated in FIG. 191.

For example, the information communication method may further include: determining whether or not a reception device including the image sensor is moved in a predetermined manner; and activating the image sensor, in the case of determining that the reception device is moved in the predetermined manner.

In this way, the image sensor can be easily activated only when needed, for instance as illustrated in FIG. 199. This contributes to improved power consumption efficiency.

Embodiment 9

This embodiment describes each example of application using a receiver such as a smartphone and a transmitter for transmitting information as a blink pattern of an LED or an organic EL device in each of the embodiments described above.

FIG. 217 is a diagram illustrating an example of application of a transmitter and a receiver in Embodiment 9.

A robot 8970 has a function as, for example, a self-propelled vacuum cleaner and a function as a receiver in each of the above embodiments. Lighting devices 8971*a* and 8971*b* each have a function as a transmitter in each of the above embodiments.

For instance, the robot 8970 cleans a room and also captures the lighting device 8971*a* illuminating the interior of the room, while moving in the room. The lighting device 8971*a* transmits the ID of the lighting device 8971*a* by changing in luminance. The robot 8970 accordingly receives the ID from the lighting device 8971*a*, and estimates the position (self-position) of the robot 8970 based on the ID, as in each of the above embodiments. That is, the robot 8970 estimates the position of the robot 8970 while moving, based on the result of detection by a 9-axis sensor, the relative position of the lighting device 8971*a* shown in the captured image, and the absolute position of the lighting device 8971*a* specified by the ID.

When the robot 8970 moves away from the lighting device 8971*a*, the robot 8970 transmits a signal (turn off instruction) instructing to turn off, to the lighting device 8971*a*. For example, when the robot 8970 moves away from the lighting device 8971*a* by a predetermined distance, the robot 8970 transmits the turn off instruction. Alternatively, when the lighting device 8971*a* is no longer shown in the captured image or when another lighting device is shown in the image, the robot 8970 transmits the turn off instruction to the lighting device 8971*a*. Upon receiving the turn off instruction from the robot 8970, the lighting device 8971*a* turns off according to the turn off instruction.

The robot 8970 then detects that the robot 8970 approaches the lighting device 8971*b* based on the estimated position of the robot 8970, while moving and cleaning the room. In detail, the robot 8970 holds information indicating the position of the lighting device 8971*b* and, when the distance between the position of the robot 8970 and the position of the lighting device 8971*b* is less than or equal to a predetermined distance, detects that the robot 8970 approaches the lighting device 8971*b*. The robot 8970 transmits a signal (turn on instruction) instructing to turn on, to the lighting device 8971*b*. Upon receiving the turn on instruction, the lighting device 8971*b* turns on according to the turn on instruction.

In this way, the robot 8970 can easily perform cleaning while moving, by making only its surroundings illuminated.

FIG. 218 is a diagram illustrating an example of application of a transmitter in Embodiment 9.

For example, a plurality of light emitting areas A to F are arranged in a display, and each of the light emitting areas A to F changes in luminance to transmit a signal, as illustrated in (a) in FIG. 218. In the example illustrated in (a) in FIG. 218, the light emitting areas A to F are each a rectangle, and are aligned along the horizontal and vertical directions. In such a case, a non-luminance change area that does not change in luminance extends across the display along the horizontal direction of the display, between the light emitting areas A, B, and C and the light emitting areas D, E, and F. Another non-luminance change area that does not change in luminance also extends across the display along the vertical direction of the display, between the light emitting areas A and D and the light emitting areas B and E. Another non-luminance change area that does not change in luminance also extends across the display along the vertical direction of the display, between the light emitting areas B and E and the light emitting areas C and F.

When a receiver in each of the above embodiments captures the display in a state where the exposure lines of the receiver are in the horizontal direction, no bright line appears in the part of the image obtained by image capture (captured image) corresponding to the non-luminance change area along the horizontal direction. That is, the area (bright line area) where bright lines appear is discontinuous in the captured image. When the receiver captures the display in a state where the exposure lines of the receiver are in the vertical direction, no bright line appears in the parts of the captured image corresponding to the two non-luminance change areas along the vertical direction. In this case, too, the bright line area is discontinuous in the captured image. When the bright line area is discontinuous, it is difficult to receive the signal transmitted by luminance change.

In view of this, a display 8972 in this embodiment has a function as a transmitter in each of the above embodiments, and has each of the plurality of light emitting areas A to F shifted in position so that the bright line area is continuous.

For example, the upper light emitting areas A, B, and C and the lower light emitting areas D, E, and F are shifted in position from each other in the horizontal direction in the display 8972, as illustrated in (b) in FIG. 218. Alternatively, the light emitting areas A to F that are each a parallelogram or a rhombus are arranged in the display 8972, as illustrated in (c) in FIG. 218. This eliminates a non-luminance change area lying across the display 8972 along the vertical direction of the display 8972 between the light emitting areas A to F. As a result, the bright line area is continuous in the captured image, even when the receiver captures the display 8972 in a state where the exposure lines are in the vertical direction.

The light emitting areas A to F may be shifted in position in the vertical direction in the display 8972, as illustrated in (d) and (e) in FIG. 218. This eliminates a non-luminance change area lying across the display 8972 along the horizontal direction of the display 8972 between the light emitting areas A to F. As a result, the bright line area is continuous in the captured image, even when the receiver captures the display 8972 in a state where the exposure lines are in the horizontal direction.

The light emitting areas A to F that are each a hexagon may be arranged in the display 8972 so that the sides of the areas are parallel to each other, as illustrated in (f) in FIG. 218. This eliminates a non-luminance change area lying across the display 8972 along any of the horizontal and vertical directions of the display 8972 between the light emitting areas A to F, as in the above-mentioned cases. As a result, the bright line area is continuous in the captured image, even when the receiver captures the display 8972 in a state where the exposure lines are in the horizontal direction or captures the display 8972 in a state where the exposure lines are in the vertical direction.

FIG. 219 is a flowchart of an information communication method in this embodiment.

An information communication method in this embodiment is an information communication method of transmitting a signal by a change in luminance, and includes steps SK11 and SK12.

In detail, the information communication method includes: a determination step SK11 of determining a pattern of the change in luminance, by modulating the signal to be transmitted; and a transmission step SK12 of transmitting the signal, by a plurality of light emitters changing in luminance according to the determined pattern of the change in luminance. The plurality of light emitters are arranged on a surface so that a non-luminance change area does not extend across the surface between the plurality of light emitters along at least one of a horizontal direction and a vertical direction of the surface, the non-luminance change area being an area in the surface outside the plurality of light emitters and not changing in luminance.

FIG. 220 is a block diagram of an information communication device in this embodiment.

An information communication device K10 in this embodiment is an information communication device that transmits a signal by a change in luminance, and includes structural elements K11 and K12.

In detail, the information communication device K10 includes: a determination unit K11 that determines a pattern of the change in luminance, by modulating the signal to be transmitted; and a transmission unit K12 that transmits the signal, by a plurality of light emitters changing in luminance according to the determined pattern of the change in luminance. The plurality of light emitters are arranged on a surface so that a non-luminance change area does not extend across the surface between the plurality of light emitters along at least one of a horizontal direction and a vertical direction of the surface, the non-luminance change area being an area in the surface outside the plurality of light emitters and not changing in luminance.

In the information communication method and the information communication device K10 illustrated in FIGS. 219 and 220, the bright line area can be made continuous in the captured image obtained by capturing the surface (display) by the image sensor included in the receiver, for instance as illustrated in FIG. 218. This eases the reception of the transmission signal, and enables communication between various devices including a device with low computational performance.

It should be noted that in the above embodiments, each of the constituent elements may be constituted by dedicated hardware, or may be obtained by executing a software program suitable for the constituent element. Each constituent element may be achieved by a program execution unit such as a CPU or a processor reading and executing a software program stored in a recording medium such as a hard disk or semiconductor memory. For example, the program causes a computer to execute the information communication method illustrated in the flowchart of FIG. 219.

FIG. 221A is a diagram illustrating an example of application of a transmitter and a receiver in Embodiment 9.

A receiver 8973 is a smartphone having a function as a receiver in each of the above embodiments. As illustrated in (a) in FIG. 221A, the receiver 8973 captures a display 8972, and tries to read bright lines appearing in the captured image. In the case where the display 8972 is dark, the receiver 8973 may not be able to read the bright lines and receive the signal from the display 8972. In such a case, the receiver 8973 flashes in a predetermined rhythm, as illustrated in (b) in FIG. 221A. Upon receiving the flash, the display 8972 increases the luminance and produces bright display, as illustrated in (c) in FIG. 221A. As a result, the receiver 8973 can read the bright lines appearing in the captured image and receive the signal from the display 8972.

FIG. 221B is a flowchart illustrating operation of the receiver 8973 in Embodiment 9.

First, the receiver 8973 determines whether or not an operation or gesture by the user to start reception is received (Step S831). In the case of determining that the operation or gesture is received (Step S831: Y), the receiver 8973 starts reception by image capture using an image sensor (Step S832). The receiver 8973 then determines whether or not a predetermined time has elapsed from the reception start without completing the reception (Step S833). In the case of determining that the predetermined time has elapsed (Step S833: Y), the receiver 8973 flashes in a predetermined rhythm (Step S834), and repeats the process from Step S833. In the case of repeating the process from Step S833, the receiver 8973 determines whether or not a predetermined time has elapsed from the flash without completing the reception. In Step S834, instead of flashing, the receiver 8973 may output a predetermined sound of a frequency inaudible to humans, or transmit, to the transmitter which is the display 8972, a signal indicating that the receiver 8973 is waiting for reception.

FIG. 222 is a diagram illustrating an example of application of a transmitter and a receiver in Embodiment 9.

A lighting device 8974 has a function as a transmitter in each of the above embodiments. The lighting device 8974 illuminates, for example, a line guide sign 8975 in a train station, while changing in luminance. A receiver 8973 pointed at the line guide sign 8975 by the user captures the line guide sign 8975. The receiver 8973 thus obtains the ID of the line guide sign 8975, and obtains information associated with the ID, i.e., detailed information of each line shown in the line guide sign 8975. The receiver 8973 displays a guide image 8973*a* indicating the detailed information. For example, the guide image 8973*a* indicates the distance to the line shown in the line guide sign 8975, the direction to the line, and the time of arrival of the next train on the line.

When the user touches the guide image 8973*a*, the receiver 8973 displays a supplementary guide image 8973*b*. For instance, the supplementary guide image 8973*b* is an image for displaying any of a train timetable, information about lines other than the line shown by the guide image 8973*a*, and detailed information of the station, according to selection by the user.

FIG. 223 is a diagram illustrating an example of application of a transmitter in Embodiment 9.

Lighting devices 8976*a* to 8976*c* each have a function as a transmitter in each of the above embodiments, and illuminate a store sign 8977. As illustrated in (a) in FIG. 223, the lighting devices 8976*a* to 8976*c* may transmit the same ID by changing in luminance synchronously. As illustrated in (b) in FIG. 223, the lighting devices 8976*a* and 8976*c* located at both ends may transmit the same ID by changing in luminance synchronously, while the lighting device 8976*b* located between these lighting devices illuminates the sign 8977 without transmitting an ID by luminance change. As illustrated in (c) in FIG. 223, the lighting devices 8976*a* and 8976*c* located at both ends may transmit different IDs by changing in luminance, in a state where the lighting device 8976*b* does not transmit an ID. In this case, since the lighting device 8976*b* between the lighting devices 8976*a* and 8976*c* does not change in luminance for ID transmission, the signals from the lighting devices 8976*a* and 8976*c* can be kept from interfering with each other. Though the ID transmitted from the lighting device 8976*a* and the ID transmitted from the lighting device 8976*c* are different, these IDs may be associated with the same information.

FIG. 224A is a diagram illustrating an example of application of a transmitter and a receiver in Embodiment 9.

A lighting device 8978 has a function as a transmitter in each of the above embodiments, and constantly transmits a signal by changing in luminance as illustrated in (1) in FIG. 224A.

A receiver in this embodiment captures the lighting device 8978. Here, an imaging range 8979 of the receiver includes the lighting device 8978 and a part other than the lighting device 8978, as illustrated in FIG. 224A. In detail, a part other than the lighting device 8978 is included in each of an upper area a and a lower area c in the imaging range 8979, and the lighting device 8978 is included in a center area b in the imaging range 8979.

The receiver captures the lighting device 8978 to obtain a captured image (bright line image) including a plurality of bright lines that appear according to the change in luminance of the lighting device 8978, as illustrated in (2) and (3) in FIG. 224A. In the bright line image, bright lines appear only in the part corresponding to the center area b, while no bright line appears in the parts corresponding to the upper area a and the lower area c.

In the case where the receiver captures the lighting device 8978 at a frame rate of 30 fps as an example, the length b of the bright line area in the bright line image is short, as illustrated in (2) in FIG. 224A. In the case where the receiver captures the lighting device 8978 at a frame rate of 15 fps as an example, the length b of the bright line area in the bright line image is long, as illustrated in (3) in FIG. 224A. Note that the length of the bright line area (bright line pattern) is the length perpendicular to each bright line included in the bright line area.

Hence, the receiver in this embodiment captures the lighting device 8978 at a frame rate of 30 fps as an example, and determines whether or not the length b of the bright line area in the bright line image is less than a predetermined length. For example, the predetermined length is the length corresponding to one block of signal transmitted by luminance change by the lighting device 8978. In the case where the receiver determines that the length b is less than the predetermined length, the receiver changes the frame rate to 15 fps as an example. Thus, the receiver can receive one block of signal from the lighting device 8978 at one time.

FIG. 224B is a flowchart illustrating operation of a receiver in Embodiment 9.

First, the receiver determines whether or not bright lines are included in a captured image, i.e., whether or not stripes by exposure lines are captured (Step S841). In the case of determining that the stripes are captured (Step S841: Y), the receiver determines in which imaging mode (image capture mode) the receiver is set (Step S842). In the case of determining that the imaging mode is the intermediate imaging mode (intermediate mode) or the normal imaging mode (normal image capture mode), the receiver changes the imaging mode to the visible light imaging mode (visible light communication mode) (Step S843).

The receiver then determines whether or not the length perpendicular to the bright lines in the bright line area (bright line pattern) is greater than or equal to a predetermined length (Step S844). That is, the receiver determines whether or not there is a stripe area greater than or equal to a predetermined size in the direction perpendicular to the exposure lines. In the case of determining that the length is not greater than or equal to the predetermined length (Step S844: N), the receiver determines whether or not optical zoom is available (Step S845). In the case of determining that optical zoom is available (Step S845: Y), the receiver performs optical zoom to lengthen the bright line area, i.e., to enlarge the stripe area (Step S846). In the case of determining that optical zoom is not available (Step S845: N), the receiver determines whether or not Ex zoom (Ex optical zoom) is available (Step S847). In the case of determining that Ex zoom is available (Step S847: Y), the receiver performs Ex zoom to lengthen the bright line area, i.e., to enlarge the stripe area (Step S848). In the case of determining that Ex zoom is not available (Step S847: N), the receiver decreases the imaging frame rate (Step S849). The receiver then captures the lighting device 8978 at the set frame rate, to receive a signal (Step S850).

Though the frame rate is decreased in the case where optical zoom and Ex zoom are not available in the example illustrated in FIG. 224B, the frame rate may be decreased in the case where optical zoom and Ex zoom are available. Ex zoom is a function of limiting the use area of the image sensor and reducing the imaging angle of view so that the apparent focal length is telephoto.

FIG. 225 is a diagram illustrating operation of a receiver in Embodiment 9.

In the case where a lighting device 8978 which is a transmitter is shown in a small size in a captured image 8980*a*, the receiver can obtain a captured image 8980*b* in which the lighting device 8978 is shown in a larger size, through the use of optical zoom or Ex zoom. Thus, the use of optical zoom or Ex zoom enables the receiver to obtain a bright line image (captured image) having a bright line area that is long in the direction perpendicular to bright lines.

FIG. 226 is a diagram illustrating an example of application of a transmitter in Embodiment 9.

A transmitter 8981 has a function as a transmitter in each of the above embodiments, and communicates with an operation panel 8982 as an example. The operation panel 8982 includes a transmission switch 8982*a* and a power switch 8982*b*.

When the transmission switch 8982*a* is turned on, the operation panel 8982 instructs the transmitter 8981 to perform visible light communication. Upon receiving the instruction, the transmitter 8981 transmits a signal by changing in luminance. When the transmission switch 8982*a* is turned off, the operation panel 8982 instructs the transmitter 8981 to stop visible light communication. Upon receiving the instruction, the transmitter 8981 stops signal transmission without changing in luminance.

When the power switch 8982*b* is turned on, the operation panel 8982 instructs the transmitter 8981 to turn on the power of the transmitter 8981. Upon receiving the instruction, the transmitter 8981 turns its power on. For example, in the case where the transmitter 8981 is a lighting device, the transmitter 8981 turns its power on to illuminate the surroundings. In the case where the transmitter 8981 is a television, the transmitter 8981 turns its power on to display video and the like. When the power switch 8982*b* is turned off, the operation panel 8982 instructs the transmitter 8981 to turn off the power of the transmitter 8981. Upon receiving the instruction, the transmitter 8981 turns its power off and enters a standby state.

FIG. 227 is a diagram illustrating an example of application of a receiver in Embodiment 9.

For example, a receiver 8973 as a smartphone has a function as a transmitter in each of the above embodiments, and obtains an authentication ID and an expiration date from a server 8983. In the case where the current time is within the expiration date, the receiver 8973 transmits the authentication ID to a peripheral device 8984 by changing, for example, its display in luminance. Examples of the peripheral device 8984 include a camera, a barcode reader, and a personal computer.

Having received the authentication ID from the receiver 8973, the peripheral device 8984 transmits the authentication ID to the server 8983, and requests verification. The server 8983 compares the authentication ID transmitted from the peripheral device 8984 and the authentication ID held in the server 8983 and transmitted to the receiver 8973. When they match, the server 8983 notifies the peripheral device 8984 of the match. Having received the notification of the match from the server 8983, the peripheral device 8984 releases a lock set therein, executes electronic payment, or performs a login process or the like.

FIG. 228A is a flowchart illustrating an example of operation of a transmitter in Embodiment 9.

The transmitter in this embodiment has a function as a transmitter in each of the above embodiments, and is a lighting device or a display as an example. For instance, the transmitter determines whether or not the light control level (brightness level) is less than a predetermined level (Step S861*a*). In the case of determining that the light control level is less than the predetermined level (Step S861*a*: Y), the transmitter stops signal transmission by luminance change (Step S861*b*).

FIG. 228B is a flowchart illustrating an example of operation of a transmitter in Embodiment 9.

The transmitter in this embodiment determines whether or not the light control level (brightness level) is greater than a predetermined level (Step S862*a*). In the case of determining that the light control level is greater than the predetermined level (Step S862*a*: Y), the transmitter starts signal transmission by luminance change (Step S862*b*).

FIG. 229 is a flowchart illustrating an example of operation of a transmitter in this embodiment.

The transmitter in this embodiment determines whether or not a predetermined mode is selected (Step S863*a*). For example, the predetermined mode is eco mode or power saving mode. In the case of determining that the predetermined mode is selected (Step S863*a*: Y), the transmitter stops signal transmission by luminance change (Step S863*b*). In the case of determining that the predetermined mode is not selected (Step S863*a*: N), the transmitter starts signal transmission by luminance change (Step S863*c*).

FIG. 230 is a flowchart illustrating an example of operation of an imaging device in Embodiment 9.

The imaging device in this embodiment is a video camera as an example, and determines whether or not the imaging device is in a recording process (Step S864*a*). In the case of determining that the imaging device is in a recording process (Step S864*a*: Y), the imaging device transmits a visible light transmission stop instruction to a transmitter transmitting a signal by luminance change (Step S864*b*). Upon receiving the visible light transmission stop instruction, the transmitter stops signal transmission by luminance change (visible light transmission). In the case of determining that the imaging device is not in a recording process (Step S864*a*: N), the imaging device further determines whether or not recording has been stopped, i.e., the imaging device has just stopped recording (Step S864*c*). In the case of determining that recording has been stopped (Step S864*c*: Y), the imaging device transmits a visible light transmission start instruction to the transmitter (Step S864*d*). Upon receiving the visible light transmission start instruction, the transmitter starts signal transmission by luminance change (visible light transmission).

FIG. 231 is a flowchart illustrating an example of operation of an imaging device in Embodiment 9.

The imaging device in this embodiment is a digital still camera as an example, and determines whether or not an imaging button (shutter button) is being half pressed or whether or not focus is being adjusted (Step S865*a*). The imaging device then determines whether or not a light and dark area appears in the direction along exposure lines in an image sensor included in the imaging device (Step S865*b*). In the case of determining that the light and dark area appears (Step S865*b*: Y), there is a possibility that a transmitter transmitting a signal by luminance change is near the imaging device. The imaging device accordingly transmits a visible light transmission stop instruction to the transmitter (Step S865*c*). After this, the imaging device performs imaging to obtain a captured image (Step S865*d*). The imaging device then transmits a visible light transmission start instruction to the transmitter (Step S865*e*). Thus, the imaging device can obtain the captured image, without being affected by the luminance change by the transmitter. Moreover, since the time during which signal transmission by luminance change is stopped is a very short period of time when the imaging device performs imaging, the time during which visible light communication is disabled can be reduced.

FIG. 232 is a diagram illustrating an example of a signal transmitted by a transmitter in Embodiment 9.

The transmitter in this embodiment has a function as a transmitter in each of the above embodiments, and outputs high-luminance light (Hi) or low-luminance light (Lo) per slot, thereby transmitting a signal. In detail, the slot is a time unit of 104.2 ρs. The transmitter outputs Hi to transmit a signal indicating 1, and outputs Lo to transmit a signal indicating 0.

FIG. 233 is a diagram illustrating an example of a signal transmitted by a transmitter in Embodiment 9.

The above-mentioned transmitter outputs Hi or Lo per slot, thereby transmitting each PHY (physical layer) frame which is a signal unit in sequence. The PHY frame includes a preamble made up of 8 slots, an FCS (Frame Check Sequence) made up of 2 slots, and a body made up of 20 slots. The parts included in the PHY frame are transmitted in the order of the preamble, the FCS, and the body.

The preamble corresponds to the header of the PHY frame, and includes "01010111" as an example. The preamble may be made up of 7 slots. In this case, the preamble includes "0101011". The FCS includes "01" in the case where the number of 1s included in the body is an even number, and "11" in the case where the number of 1s included in the body is an odd number. The body includes 5 symbols each of which is made up of 4 slots. In the case of 4-value PPM, the symbol includes "0111", "1011", "1101", or "1110".

FIG. 234 is a diagram illustrating an example of a signal transmitted by a transmitter in Embodiment 9.

The above-mentioned symbol is converted to a 2-bit value by a receiver. For example, the symbols "0111", "1011", "1101", and "1110" are respectively converted to "00", "01", "10", and "11". Accordingly, the body (20 slots) of the PHY frame is converted to a 10-bit signal. The 10-bit body includes 3-bit TYPE indicating the type of the PHY frame, 2-bit ADDR indicating the address of the PHY frame or the body, and 5-bit DATA indicating the entity of data. For example, in the case where the type of the PHY frame is TYPE1, TYPE indicates "000". ADDR indicates "00", "01", "10", or "11".

The receiver concatenates DATA included in the respective bodies of 4 PHY frames. ADDR mentioned above is used in this concatenation. In detail, the receiver concatenates DATA included in the body of the PHY frame having ADDR "00", DATA included in the body of the PHY frame having ADDR "01", DATA included in the body of the PHY frame having ADDR "10", and DATA included in the body of the PHY frame having ADDR "11", thus generating 20-bit data. The four PHY frames are decoded in this way. The generated data includes 16-bit effective DATA and 4-bit CRC (Cyclic Redundancy Check).

FIG. 235 is a diagram illustrating an example of a signal transmitted by a transmitter in Embodiment 9.

The type of the PHY frame mentioned above includes TYPE1, TYPE2, TYPE3, and TYPE4. The body length, the ADDR length, the DATA length, the number of DATA concatenated (concatenation number), the effective DATA length, and the CRC type differ between these types.

For example, in TYPE1, TYPE (TYPEBIT) indicates "000", the body length is 20 slots, the ADDR length is 2 bits, the DATA length is 5 bits, the concatenation number is 4, the effective DATA length is 16 bits, and the CRC type is CRC-4. In TYPE2, on the other hand, TYPE (TYPEBIT) indicates "001", the body length is 24 slots, the ADDR length is 4 bits, the DATA length is 5 bits, the concatenation number is 8, the effective DATA length is 32 bits, and the CRC type is CRC-8.

The use of such a signal illustrated in FIGS. 232 to 235 enables visible light communication to be performed appropriately.

FIG. 236 is a diagram illustrating an example of a structure of a system including a transmitter and a receiver in Embodiment 9.

The system in this embodiment includes a transmitter 8991 having the same function as a transmitter in each of the above embodiments, a receiver 8973 such as a smartphone, a content sharing server 8992, and an ID management server 8993.

For instance, a content creator uploads, to the content sharing server 8992, content such as audio video data representing a still image or a moving image for introducing a product, and product information indicating the manufacturer, area of production, material, specifications, etc. of the product. The content sharing server 8992 registers the product information in the ID management server 8993, in association with a content ID for identifying the content.

Following this, the transmitter 8991 downloads the content and the content ID from the content sharing server 8992, displays the content, and transmits the content ID by changing in luminance, i.e., by visible light communication, according to an operation by the user. The user views the content. In the case where the user is interested in the product introduced in the content, the user points the receiver 8973 at the transmitter 8991 to capture the transmitter 8991. The receiver 8973 captures the content displayed on the transmitter 8991, thus receiving the content ID.

The receiver 8973 then accesses the ID management server 8993, and inquires of the ID management server 8993 for the content ID. As a result, the receiver 8973 receives the product information associated with the content ID from the ID management server 8993, and displays the product information. When the receiver 8973 receives an operation requesting to buy the product corresponding to the product information, the receiver 8973 accesses the manufacturer of the product and executes a process for buying the product.

Next, the ID management server notifies inquiry information indicating the number of inquiries or the number of accesses made for the content ID, to the manufacturer indicated by the product information associated with the content ID. Having received the inquiry information, the manufacturer pays an affiliate reward corresponding to the number of inquiries or the like indicated by the inquiry information to the content creator specified by the content ID, by electronic payment via the ID management server 8993 and the content sharing server 8992.

FIG. 237 is a diagram illustrating an example of a structure of a system including a transmitter and a receiver in Embodiment 9.

In the example illustrated in FIG. 236, when the content and the product information are uploaded, the content sharing server 8992 registers the product information in the ID management server 8993 in association with the content ID. However, such registration may be omitted. For example, the content sharing server 8992 searches the ID management server for a product ID for identifying the product of the uploaded product information, and embeds the product ID in the uploaded content, as illustrated in FIG. 237.

Following this, the transmitter 8991 downloads the content in which the product ID is embedded and the content ID from the content sharing server 8992, displays the content, and transmits the content ID and the product ID by changing in luminance, i.e., by visible light communication, according to an operation by the user. The user views the content. In the case where the user is interested in the product introduced in the content, the user points the receiver 8973 at the transmitter 8991 to capture the transmitter 8991. The receiver 8973 captures the content displayed on the transmitter 8991, thus receiving the content ID and the product ID.

The receiver 8973 then accesses the ID management server 8993, and inquires of the ID management server 8993 for the content ID and the product ID. As a result, the receiver 8973 receives the product information associated with the product ID from the ID management server 8993, and displays the product information. When the receiver 8973 receives an operation requesting to buy the product corresponding to the product information, the receiver 8973 accesses the manufacturer of the product and executes a process for buying the product.

Next, the ID management server notifies inquiry information indicating the number of inquiries or the number of accesses made for the content ID and the product ID, to the manufacturer indicated by the product information associated with the product ID. Having received the inquiry information, the manufacturer pays an affiliate reward corresponding to the number of inquiries or the like indicated by the inquiry information to the content creator specified by the content ID, by electronic payment via the ID management server 8993 and the content sharing server 8992.

FIG. 238 is a diagram illustrating an example of a structure of a system including a transmitter and a receiver in Embodiment 9.

The system in this embodiment includes a content sharing server 8992*a* instead of the content sharing server 8992 illustrated in FIG. 237, and further includes an SNS server 8994. The SNS server 8994 is a server providing a social networking service, and performs part of the process performed by the content sharing server 8992 illustrated in FIG. 237.

In detail, the SNS server 8994 obtains the content and the product information uploaded from the content creator, searches for the product ID corresponding to the product information, and embeds the product ID in the content. The SNS server 8994 then transfers the content in which the product ID is embedded, to the content sharing server 8992*a*. The content sharing server 8992*a* receives the content transferred from the SNS server 8994, and transmits the content in which the product ID is embedded and the content ID to the transmitter 8991.

Thus, in the example illustrated in FIG. 238, the unit including the SNS server 8994 and the content sharing server 8992*a* serves as the content sharing server 8992 illustrated in FIG. 237.

In the system illustrated in each of FIGS. 236 to 238, an appropriate affiliate reward can be paid for an advertisement (content) for which inquiries have been made using visible light communication.

Though the information communication method according to one or more aspects has been described by way of the embodiments above, the present disclosure is not limited to these embodiments. Modifications obtained by applying various changes conceivable by those skilled in the art to the embodiments and any combinations of structural elements in different embodiments are also included in the scope of one or more aspects without departing from the scope of the present disclosure.

The following describes the embodiment.

Mixed Modulation Scheme

FIGS. 239 and 240 are diagrams illustrating an example of operation of a transmitter in Embodiment 9.

As illustrated in FIG. 239, the transmitter modulates a transmission signal by a plurality of modulation schemes, and transmits modulated signals alternately or simultaneously.

By modulating the same signal by the plurality of modulation schemes and transmitting the modulated signals, even a receiver that supports only one of the modulation schemes can receive the signal. Moreover, for example, the combined use of a modulation scheme with high transmission speed, a modulation scheme with high noise resistance, and a modulation scheme with long communication distance allows reception to be performed using an optimal method according to the receiver environment.

In the case where the receiver supports reception by the plurality of modulation schemes, the receiver receives the signals modulated by the plurality of schemes. When modulating the same signal, the transmitter assigns the same signal ID to the modulated signals, and transmits the modulated signals. By checking the signal ID, the receiver can recognize that the same signal is modulated by the different modulation schemes. The receiver synthesizes the signal having the same signal ID from the plurality of types of modulated signals, with it being possible to receive the signal promptly and accurately.

For example, the transmitter includes a signal dividing unit and modulation units 1 to 3. The signal dividing unit divides a transmission signal into a partial signal 1 and a partial signal 2, and attaches a signal ID to the partial signal 1 and another signal ID to the partial signal 2. The modulation unit 1 generates a signal having sine waves by performing frequency modulation on the partial signal 1 with the signal ID. The modulation unit 2 generates a signal having square waves by performing, on the partial signal 1 with the signal ID, frequency modulation different from that performed by the modulation unit 1. Meanwhile, the modulation unit 3 generates a signal having square waves by performing pulse-position modulation on the partial signal 2 with the other signal ID.

As illustrated in FIG. 240, the transmitter transmits together the signals modulated by a plurality of modulation schemes. In the example in FIG. 240, with a long exposure time set, the receiver can receive only the signal modulated by a frequency modulation scheme that uses a low frequency. With a short exposure time set, the receiver can receive the signal modulated by the pulse-position modulation scheme that uses a high frequency band. In this case, the receiver will obtain a temporal average of strength of received light by calculating an average of luminance in a direction perpendicular to a bright line, and thus can obtain a signal that is the same as a signal obtained when the exposure time is long.

Transmission Signal Verification and Digital Modulation

FIGS. 241 and 242 are diagrams illustrating an example of a structure and operation of a transmitter in Embodiment 9.

As illustrated in FIG. 241, the transmitter includes a signal storage unit, a signal verification unit, a signal modulation unit, a light emitting unit, an abnormality notification unit, a source key storage unit, and a key generation unit. The signal storage unit stores a transmission signal and a signal conversion value obtained by converting the transmission signal using a verification key described later. A one-way function is used for this conversion. The source key storage unit stores a source key which is a source value of a key, for example, as a circuit constant such as a time constant or a resistance. The key generation unit generates the verification key from the source key.

The signal verification unit converts the transmission signal stored in the signal storage unit using the verification key, to obtain a signal conversion value. The signal verification unit determines whether or not the signal has not been tampered with, depending on whether or not the obtained signal conversion value and the signal conversion value stored in the signal storage unit are equal. Even when the signal in the signal storage unit is copied to another transmitter, this other transmitter cannot transmit the signal because the verification key is different. Transmitter forgery can thus be prevented.

In the case where the signal has been tampered with, an abnormality notification unit notifies that the signal has been tampered with. Examples of the notification method include blinking a light emitting unit in a cycle visible to humans, outputting a sound, and so on. By limiting the abnormality notification to a predetermined time immediately after power on, the transmitter can be put to use other than transmission even in the case where the signal has an abnormality.

In the case where the signal has not been tampered with, a signal modulation unit converts the signal to a light emission pattern. Various modulation schemes are available. For example, the following modulation schemes are available: amplitude shift keying (ASK); phase shift keying (PSK); frequency shift keying (FSK); quadrature amplitude modulation (QAM); delta modulation (DM); minimum shift keying (MSK); complementary code keying (CCK); orthogonal frequency division multiplexing (OFDM); amplitude modulation (AM); frequency modulation (FM); phase modulation (PM); pulse width modulation (PWM); pulse amplitude modulation (PAM); pulse density modulation (PDM); pulse position modulation (PPM); pulse code modulation (PCM); frequency hopping spread spectrum (FHSS); and direct sequence spread spectrum (DSSS). A modulation scheme is selected according to the property of the transmission signal (whether analog or digital, whether continuous data transmission or not, etc.) and the required performance (transmission speed, noise resistance, transmission distance). Moreover, two or more modulation schemes may be used in combination.

In Embodiments 1 to 9, the same advantageous effects can be achieved in the case where the signal modulated by any of the above-mentioned modulation schemes is used.

As illustrated in FIG. 242, the transmitter may include a signal demodulation unit instead of the signal verification unit. In this case, a signal storage unit holds an encrypted transmission signal obtained by encrypting a transmission signal using an encryption key that is paired with a decryption key generated in a key generation unit. The signal demodulation unit decrypts the encrypted transmission signal, using the decryption key. This structure makes it difficult to forge a transmitter, i.e., to produce a transmitter for transmitting an arbitrary signal.

Embodiment 10

This embodiment describes each example of application using a receiver such as a smartphone and a transmitter for transmitting information as a blink pattern of an LED or an organic EL device in each of the embodiments described above.

Signal Reception from a Plurality of Directions by a Plurality of Light Receiving Units FIG. 243 is a diagram illustrating a watch including light sensors.

This watch is configured as a receiver for visible light communication, and includes light sensors and collecting lenses corresponding to the respective light sensors. Specifically, a collecting lens is placed on the top surface of each sensor as illustrated in the cross sectional view in FIG. 243. In FIG. 243, the collecting lens has a predetermined tilt. The shape of the collecting lens is not limited to this, and may be any other shape capable of collecting light. With this structure, the light sensor can collect and receive light from a light source in the external world, by the lens. Even a small light sensor as included in a watch can thus perform visible light communication. In FIG. 243, the watch is divided into 12 areas and 12 light sensors are arranged in the areas, with the collecting lens being placed on the top surface of each light sensor. By dividing the inside of the watch into a plurality of areas and arranging a plurality of light sensors in this way, it is possible to obtain information from a plurality of light sources. For example, in FIG. 243, a first light sensor can receive light from a light source 1, and a second light sensor can receive light from a light source 2. A solar cell may be used as a light sensor. The use of a solar cell as a light sensor enables solar power to be generated and also visible light communication to be performed by a single sensor, which contributes to lower cost and a more compact shape. Moreover, in the case where a plurality of light sensors are arranged, information from a plurality of light sources can be obtained simultaneously, with it being possible to improve the position estimation accuracy. Though this embodiment describes a structure of providing light sensors in a watch, this is not a limit for the present disclosure, and it may be possible to provide light sensors in any movable device such as a mobile phone or a mobile terminal.

FIG. 244 is a diagram illustrating an example of a receiver in Embodiment 10.

A receiver 9020*a* such as a wristwatch includes a plurality of light receiving units. For example, the receiver 9020*a* includes, as illustrated in FIG. 244, a light receiving unit 9020*b* on the upper end of a rotation shaft that supports the minute hand and the hour hand of the wristwatch, and a light receiving unit 9020*c* near the character indicating the 12 o'clock on the periphery of the wristwatch. The light receiving unit 9020*b* receives light directed to thereto along the direction of the above-mentioned rotation shaft, and the light receiving unit 9020*c* receives light directed thereto along a direction connecting the rotation shaft and the character indicating the 12 o'clock. Thus, the light receiving unit 9020*b* can receive light from above when the user holds the receiver 9020*a* in front of his or her chest as when checking the time. As a result, the receiver 9020*a* is capable of receiving a signal from a ceiling light. The light receiving unit 9020*c* can receive light from front when the user holds the receiver 9020*a* in front of his or her chest as when checking the time. As a result, the receiver 9020*a* can receive a signal from a signage or the like in front of the user.

When these light receiving units 9020*b* and 9020*c* have directivity, the signal can be received without interference even in the case where a plurality of transmitters are located nearby.

FIG. 245 is a diagram illustrating an example of a receiver in Embodiment 10.

For example, as illustrated in (a) in FIG. 245, the receiver 9021 such as a wristwatch includes 17 light receiving elements (light receiving units). These light receiving elements are arranged on the watch face. Out of these light receiving elements, 12 light receiving elements are arranged at positions corresponding to 1 o'clock to 12 o'clock on the watch face, and the remaining five light receiving elements are arranged in a central area on the watch face. Each of these 17 light receiving elements has different directivity and receives light (a signal) in a corresponding direction. Thus, as a result of arranging a plurality of light receiving elements having directivity, the receiver 9021 can estimate the direction of the received signal. Furthermore, prisms for guiding light to the light receiving elements may be arranged in front of the light receiving elements as illustrated in (b) in FIG. 245. Specifically, the receiver 9021 includes eight light emitting elements arranged at regular intervals in a peripheral part on the watch face, and a plurality of prisms for guiding light to at least one of those light emitting elements. With such prisms, an accurate direction of the transmitter can be estimated even when the number of light receiving elements is small. For example, when only a light receiving element 9021*d* of the eight light receiving elements receives light, the transmitter is estimated to be situated in a direction connecting the center of the watch face and a prism 9021*a*. When light receiving elements 9021*d* and 9021*e* receive the same signal, the transmitter is estimated to be situated in a direction connecting the center of the watch face and a prism 9021*b*. Note that windshield glass of the wristwatch may be given the directivity function and the prism function.

FIG. 246A is a flowchart of an information communication method according to an aspect of the present disclosure.

The information communication method according to an aspect of the present disclosure is an information communication method of obtaining information by a mobile terminal and includes Steps SE11 and SE12.

Specifically, this information communication method includes: receiving, by at least one of a plurality of solar cells included in the mobile terminal and each having directivity, visible light released along a direction corresponding to the directivity of the at least one of the plurality of solar cells (SE11); and obtaining the information by demodulating a signal specified by the received visible light (SE12).

FIG. 246B is a block diagram of a mobile terminal according to an aspect of the present disclosure.

A mobile terminal E10 according to an aspect of the present disclosure is a mobile terminal that obtains information, and includes a plurality of solar cells E11 each having directivity, and an information obtainment unit E12. When at least one of the plurality of solar cells E11 receives visible light released along a direction corresponding to the directivity of the solar cell E11, the information obtainment unit E12 obtains information by demodulating a signal specified by the received visible light.

In the information communication method and the mobile terminal E10 illustrated in FIGS. 246A and 246B, the solar cell E11 can be used in power generation while being used as a light sensor for visible light communication, and thus it is possible to reduce the cost for the mobile terminal E10 that obtains information and also possible to downsize the mobile terminal E10. Furthermore, since each of the plurality of solar cells E11 has directivity, the direction where a transmitter that emits visible light is present can be estimated based on the directivity of the solar cell E11 that has received visible light. Moreover, since each of the plurality of solar cells E11 has directivity, it is possible that visible light emitted from one transmitter is received separately from visible light emitted from another, and thus it is possible to appropriately obtain information from each of the plurality of transmitters.

Furthermore, in the receiving (SE11), the solar cell E11 (9021*d*, 9021*e*) may receive visible light transmitted by the prism (9021*a*, 9021*b*, or 9021*c*) included in the mobile terminal E11 (9021) as illustrated in (b) in FIG. 245. This makes it possible to accurately estimate a direction where a transmitter that emits visible light is present while reducing the number of solar cells E11 included in the mobile terminal E10. Furthermore, as illustrated in FIG. 245, the mobile terminal E10 is a wristwatch, and the plurality of solar cells E11 (the light receiving elements) are arranged along an outer edge of the watch face of the wristwatch. The orientation of the visible light received by one of the plurality of solar cells E11 may be different from the orientation of the visible light received by another. With this, it is possible to appropriately obtain information by a wristwatch.

Cooperation Between Watch-Type Receiver and Smartphone

FIG. 247 is a diagram illustrating an example of a reception system in Embodiment 10.

A receiver 9022*b* such as a wristwatch is connected to a smartphone 9022*a* or a glasses-type display 9022*c* via wireless communication such as Bluetooth®. In the case where the receiver 9022*b* receives a signal or detects the presence of a signal, the receiver 9022*b* displays, on the display 9022*c*, information indicating reception of the signal, for example. The receiver 9022*b* transmits the received signal to the smartphone 9022*a*. The smartphone 9022*a* obtains data associated with the received signal from a server 9022*d*, and displays the obtained data on the glasses-type display 9022*c*.

Route Guidance by Wristwatch-Type Display

FIG. 248 is a diagram illustrating an example of a reception system in Embodiment 10.

A receiver 9023*b* such as a wristwatch is connected to a smartphone 9022*a* via wireless communication such as Bluetooth®. The receiver 9023*b* has a watch face composed of a display such as a liquid crystal display, and is capable of displaying information other than the time. The smartphone 9022*a* recognizes the current position from a signal received by the receiver 9023*b*, and displays the route and distance to the destination on the display surface of the receiver 9023*b*.

Frequency Shift Keying and Frequency Multiplex Modulation

FIGS. 249A, 249B, and 249C are diagrams illustrating an example of a modulation scheme in Embodiment 10.

In (a) in FIG. 249A, a specific signal is expressed as a specific modulation frequency. The receiver performs frequency analysis on a light pattern (a pattern of luminance change of a light source) to determine a dominant modulation frequency, and reconstructs a signal.

In (a) in FIG. 249C, the modulation frequency is changed with time. This enables many values to be expressed. A typical image sensor has an imaging frame rate of 30 fps. Accordingly, reception can be ensured by continuing one modulation frequency for 1/30 second or more. In (b) in FIG. 249C, a time during which no signal is superimposed is inserted when changing the frequency. As a result, the receiver can easily recognize the change of the modulation frequency. A light pattern in the time during which no signal is superimposed can be distinguished from that in the signal superimposition part, by maintaining constant brightness or using a specific modulation frequency. When a frequency that is an integer multiple of 30 Hz is set as the specific modulation frequency, the non-signal superimposition part is unlikely to appear in the difference image and hamper the reception process. The length of the time during which no signal is superimposed may be greater than or equal to the same length as a signal of the longest period among light patterns used for signals. This facilitates reception. As an example, if a light pattern of a lowest modulation frequency is 100 Hz, the time during which no signal is superimposed is set to greater than or equal to 1/100 second.

FIG. 249A illustrates, in (b), an example (1) in which a specific bit and a specific modulation frequency are associated with each other, and a light pattern is expressed as a waveform in which modulation frequencies corresponding to bit "1" are overlapped. Specifically, when the first bit has 1 as information to be transmitted, the transmitter changes in luminance with a light pattern of frequency $f_1$ which is 1000 Hz. When the second bit has 1 as information to be transmitted, the transmitter changes in luminance with a light pattern of frequency $f_2$ which is 1100 Hz. When the third bit has 1 as information to be transmitted, the transmitter changes in luminance with a light pattern of frequency $f_3$ which is 1200 Hz. Therefore, when transmitting information of a bit string "110," for example, the transmitter changes in luminance with the light pattern of the frequency $f_2$ during time $T_2$ and changes in luminance with the light pattern of the frequency $f_1$ during time $T_1$ longer than the time $T_2$. When transmitting information of a bit string "111," for example, the transmitter changes in luminance with the light pattern of the frequency $f_2$ during time $T_2$, changes in luminance with the light pattern of the frequency $f_3$ during time $T_3$ shorter than the time $T_2$, and changes in luminance with the light pattern of the frequency $f_1$ during the time $T_1$. In this case, it is possible to express more values although a higher carrier to noise ratio (CN ratio) is necessary than the modulation scheme (a). In the example (1), when there is a large number of ON bits, that is, when the waveform includes many frequencies, there is a problem that energy per frequency becomes lower, requiring a higher CN ratio.

Therefore, in the example (2) in which a light pattern is expressed, the number of frequencies included in the waveform is limited to a predetermined number or less, that is, the number of frequencies is set variable below a predetermined number. Alternatively, in the example (3) in which a light pattern is expressed, the number of frequencies included in the waveform is limited to a predetermined number. By doing so, it is possible to avoid the above-described problem. As compared to the example (1) and the example (2), the example (3) allows signals and noise to be more easily separated and is most tolerant to noise because the number of included frequencies is predetermined.

When signals are represented using n different frequencies, $2^n-1$ different signals can be represented in the example (1). Furthermore, when the frequencies are limited to m different frequencies, $(\Sigma(k=1 \text{ to } m)_n C_k)-1$ different signals can be represented in the example (2), and ${}_nC_m$ different signals can be represented in the example (3).

As the method of overlapping a plurality of modulation frequencies, there are the following methods: (i) simply adding up waveforms; (ii) weighted averaging using weighted waveforms; and (iii) repeating the respective waveforms of the frequencies in sequence. When the receiver performs frequency analysis such as discrete cosine series expansion, an adjustment is preferably performed in the weighted averaging in (ii) such that the peak of each frequency is the same or similar, because there is a tendency for a higher frequency to have a lower peak. Specifically, it is preferred that more weight be given to a higher frequency. In (iii), it is possible to adjust the level of the frequency peak upon reception by adjusting the ratio of the number of outputs (the number of cycles) rather than repeating one output of the waveform of each frequency (on a per cycle basis). It may be that the number of output cycles is set larger for a higher frequency or that the length of time for output is set longer for a higher frequency. Through this adjustment, it is possible to facilitate the reception process by equalizing the levels of frequency peaks, and also possible to represent additional information by giving meaning to a difference between the levels of frequency peaks. For example, when the order of the levels of the frequency peaks is given meaning, it is possible to add information of $\log_2(n!)$ bits where n different frequencies are included. The frequency may be changed every period, every half a period, every multiple of half a period, or every length of predetermined time. The timing of changing the frequency may be when the luminance has the highest value, the lowest value, or any value. It is possible to reduce flicker by equalizing luminance before changing the frequency and luminance after changing the frequency (=continuously changing the luminance). This can be achieved when transmission signals are output at each frequency for a length of time that is an integral multiple of a half of the wavelength at the frequency. Here, the length of time of output at each frequency is different. Furthermore, when signals are output at a certain frequency for a length of time that is a multiple of a half of the period, the receiver can easily recognize by frequency analysis that the frequency is included in the signals even in the case of digital output. Discontinuous output rather than continuous output at the same frequency is better as it is hard to be caught by human eyes or cameras. For example, when period $T_1$ appears twice, $T_2$ appears twice, and $T_3$ appears once in terms of the proportion of output, $T_1T_2T_3T_2T_1$ is better than $T_1T_1T_2T_2T_3$. Instead of repeating the output in a predetermined order, output in varying order may also be applicable. This order may be given meaning to represent additional information. This order cannot be seen from the frequency peaks, but it is possible to obtain such information by analyzing the order of frequencies. Since the exposure time needs to be set shorter in the case of analyzing the order of the frequencies than the case of analyzing the frequency peaks, it may be possible to set the exposure time short only when the additional information is necessary, or it may be possible that only the receiver that can set the exposure time short can obtain the additional information.

In FIG. 249B, the signals of FIG. 249A are represented in a binary light pattern. In the methods (i) and (ii) among the methods of overlapping frequencies, analog waveforms are complicated, and even when such analog waveforms are binarized, it is not possible to represent a complicated form. Consequently, the receiver fails to obtain a correct frequency peak, leading to more reception errors. In the method (iii), analog waveforms are not complicated, meaning that binarization has less influence thereon, and thus a relatively correct frequency peak can be obtained. Therefore, the method (iii) is superior in the case of using a digitalized light pattern with, for example, a binary or a small number of values. This modulation method can be construed as one type of frequency modulation from the standpoint that signals are represented based on frequencies in a light pattern, or can alternatively be construed as one type of pulse width modulation (PWM) from the standpoint that signals are represented through adjustment on the duration of pulses.

With the setting in which the unit of time for a change in luminance is a discrete value, it is possible to transmit and receive signals in the same or similar way as pulse modulation. The average luminance can be set high by setting a low luminance section as the shortest unit of time regardless of the length of the period of a transmission frequency. Here, since the average luminance increases when the period of the transmission frequency is longer, it is possible to increase the average luminance by increasing the number of outputs at this frequency with a long period. Even when low luminance sections have the same length, a high luminance section is set to have a length determined by subtracting the length of the low luminance section from the period of the transmission frequency. By doing so, a frequency peak will appear in the transmission frequency when the frequency analysis is performed. Thus, when a frequency analysis technique such as the discrete cosine transform is used, the exposure time of the receiver does not need to be set so short to enable the receiver to receive signals.

In (c) in FIG. 249C, the modulation frequency overlap is changed with time in the same way as (a) in FIG. 249C. This enables many values to be expressed.

A signal of a high modulation frequency cannot be received unless the exposure time is short. Up to a certain level of modulation frequency, however, can be used without setting the exposure time. When a signal modulated using frequencies from low to high modulation frequencies is transmitted, all terminals can receive the signal expressed by the low modulation frequency. Besides, a terminal capable of setting a short exposure time also receives the signal up to the high modulation frequency, with it being possible to receive more information from the same transmitter at high speed. Alternatively, it may be that when a modulation signal of a low frequency is found in a normal imaging mode, overall transmission signals including a modulation signal of a high frequency are received in a visible light communication mode.

The frequency shift keying scheme and the frequency multiplex modulation scheme have an advantageous effect of causing no flicker perceivable by the human eye even in the case where a lower modulation frequency than when expressing a signal by pulse position is used, and so can use many frequency bands.

In Embodiments 1 to 10, the same advantageous effects can be achieved in the case where the signal modulated by the above-mentioned reception scheme and modulation scheme is used.

Separation of Mixed Signal

FIGS. 249D and 249E are diagrams illustrating an example of separation of a mixed signal in Embodiment 10.

A receiver has functions of (a) in FIG. 249D. A light receiving unit receives a light pattern. A frequency analysis unit Fourier transforms the light pattern, to map a signal in a frequency domain. A peak detection unit detects a peak of a frequency component in the light pattern. In the case where no peak is detected by the peak detection unit, the subsequent process is suspended. A peak time change analysis unit analyzes a time change of a peak frequency. A signal source specification unit specifies, in the case where a plurality of frequency peaks are detected, a combination of modulation frequencies of signals transmitted from the same transmitter.

Thus, reception can be performed without signal interference even in the case where a plurality of transmitters are located nearby. When light from a transmitter is reflected off a floor, a wall, or a ceiling and received, light from a plurality of transmitters tends to be mixed. Even in such a case, reception can be performed without signal interference.

As an example, in the case where the receiver receives a light pattern in which a signal of a transmitter A and a signal of a transmitter B are mixed, frequency peaks are obtained as in (b) in FIG. 249D. Since $f_{A1}$ disappears and $f_{A2}$ appears, $f_{A1}$ and $f_{A2}$ can be specified as signals from the same transmitter. Likewise, $f_{A1}$, $f_{A2}$, and $f_{A3}$ can be specified as signals from the same transmitter, and $f_{B1}$, $f_{B2}$, and $f_{B3}$ can be specified as signals from the same transmitter.

By fixing the time interval at which one transmitter changes the modulation frequency, it is possible to easily specify the signals from the same transmitter.

When a plurality of transmitters change the modulation frequency at the same timing, the signals from the same transmitter cannot be specified by the above-mentioned method. Hence, the time interval at which the modulation frequency is changed differs between transmitters. This prevents a situation where the plurality of transmitters change the modulation frequency always at the same timing, so that the signals from the same transmitter can be specified.

As illustrated in (c) in FIG. 249D, the time from when the transmitter changes the modulation frequency to when the transmitter changes the modulation frequency next time is calculated from the current modulation frequency and the modulation frequency before the change. In so doing, even in the case where the plurality of transmitters change the modulation frequency at the same timing, it is possible to specify which signals of modulation frequencies are transmitted from the same transmitter.

Each transmitter may recognize the transmission signal of the other transmitter, and adjust the modulation frequency change timing to be different from the other transmitter.

The method described above produces the same advantageous effects not only in the case of frequency shift keying where one transmission signal has one modulation frequency but also in the case where one transmission signal has a plurality of modulation frequencies.

In the case where the light pattern is not changed with time in the frequency multiplex modulation scheme as illustrated in (a) in FIG. 249E, the signals from the same transmitter cannot be specified. However, by inserting a segment with no signal or by changing to a specific modulation frequency as illustrated in (b) in FIG. 249E, the signals from the same transmitter can be specified based on the time change of the peak.

FIG. 249F is a flowchart illustrating processing of an image processing program in Embodiment 10.

This information processing program is a program for causing the light emitter (or the light emitting unit) of the above-described transmitter to change in luminance with the light pattern illustrated in (b) in FIG. 249A or (b) in FIG. 249B.

In other words, this information processing program is an information processing program that causes a computer to process information to be transmitted, in order for the information to be transmitted by way of luminance change. In detail, this information processing program causes a computer to execute: a determination step SA11 of encoding the information to determine a luminance change frequency; and an output step SA12 of outputting a signal of the luminance change frequency determined, to cause a light emitter to change in luminance according to the luminance change frequency determined, to transmit the information. In the determination step SA11, each of a first frequency (e.g., the frequency $f_1$) and a second frequency (e.g., the frequency $f_2$) different from the first frequency is determined as the luminance change frequency. In the output step SA12, each of a signal of the first frequency and a signal of the second frequency is output as the signal of the luminance change frequency determined, to cause the light emitter to change in luminance according to the first frequency during a first time (e.g., time $T_1$) and change in luminance according to the second frequency during a second time (e.g., time $T_2$) different from the first time after the first time elapses.

With this, the information to be transmitted can be appropriately transmitted in the form of visible light signals of the first and second frequencies. Furthermore, with the first time and the second time being different, the transmission can be adapted to various situations. As a result, communication between various devices becomes possible.

For example, as illustrated in FIGS. 249A and 249B, the first time is a duration corresponding to one period of the first frequency, and the second time is a duration corresponding to one period of the second frequency.

Furthermore, in the output step SA12, at least one of the signal of the first frequency and the signal of the second frequency may be repeatedly output to make a total number of times the signal of the first frequency is output and a total number of times the signal of the second frequency is output different from each other. With this, the transmission can be adapted to various situations.

Furthermore, in the output step SA12, at least one of the signal of the first frequency and the signal of the second frequency may be repeatedly output to make a total number of times one of the signal of the first frequency and the signal of the second frequency that has a lower frequency is output, greater than a total number of times a remaining one of the signal of the first frequency and the signal of the second frequency that has a higher frequency is output.

With this, in the case where the light emitter changes in luminance according to the frequency specified by each output signal, the light emitter can transmit, with high luminance, the information to be transmitted. For example, suppose that the duration for which low luminance lasts is the same in the change in luminance according to a low frequency, namely, the first frequency, and the change in luminance according to a high frequency, namely, the second frequency. In this case, the duration for which high luminance lasts is longer in the change in luminance according to the first frequency (that is, a low frequency) than in the change in luminance according to the second frequency (that is, a high frequency). Therefore, when many signals having the first frequency are output, the light emitter can transmit, with high luminance, the information to be transmitted.

Furthermore, in the output step SA12, at least one of the signal of the first frequency and the signal of the second frequency may be repeatedly output to make a total number of times one of the signal of the first frequency and the signal of the second frequency that has a higher frequency is output, greater than a total number of times a remaining one of the signal of the first frequency and the signal of the second frequency that has a lower frequency is output. For example, the number of times the signal of the frequency $f_2$ is output becomes greater than the number of times the signal of the frequency $f_1$ is output as illustrated in FIGS. 249A and 249B.

With this, in the case where the light emitter changes in luminance according to the frequency specified by each output signal, the reception efficiency of the information to be transmitted by way of such luminance change can be higher. For example, when the information to be transmitted is transmitted to the receiver in the form of visible light signals represented by a plurality of frequencies, the receiver performs frequency analysis, such as the Fourier transform, on a captured image, to detect a frequency peak included in the visible light signal. Here, with a higher frequency, such peak detection is more difficult. Therefore, the signal of the first frequency and the signal of the second frequency are output so that the number of times one of the signals having a higher frequency is output becomes greater than the number of times a remaining one of the signals having a lower frequency is output as described above. By doing so, it is possible to facilitate peak detection of a high frequency. As a result, the reception efficiency can be improved.

Furthermore, in the output step SA12, at least one of the signal of the first frequency and the signal of the second frequency may be repeatedly output to avoid continuous output of a signal of the same frequency. For example, the signal of the frequency $f_1$ is not continuously output, and the signal of the frequency $f_2$ is not continuously output either, as illustrated in FIGS. 249A and 249B.

With this, in the case where the light emitter changes in luminance according to the frequency specified by each output signal, it can make it harder for human eyes or cameras to catch flicker of light from the light emitter.

FIG. 249G is a block diagram of an information processing apparatus in Embodiment 10.

This information processing apparatus A10 is an apparatus for causing the light emitter of the above-described transmitter to change in luminance with the light pattern illustrated in (b) in FIG. 249A or (b) in FIG. 249B.

In other words, this information processing apparatus A10 is an apparatus that processes information to be transmitted, in order for the information to be transmitted by way of luminance change. In detail, the information processing apparatus A10 includes: a frequency determination unit A11 configured to encode the information to determine a luminance change frequency; and an output unit A12 configured to output a signal of the luminance change frequency determined, to cause a light emitter to change in luminance according to the luminance change frequency determined, to transmit the information. Here, the frequency determination unit A11 is configured to determine, as the luminance change frequency, each of a first frequency and a second frequency different from the first frequency. The output unit A12 is configured to output each of a signal of the first frequency and a signal of the second frequency as the signal of the luminance change frequency determined, to cause the light emitter to change in luminance according to the first frequency during a first time and change in luminance according to the second frequency during a second time different from the first time after the first time elapses. The information processing apparatus A10 can produce the same advantageous effects as the above-described information processing program.

Operation of Home Appliance Through Lighting by Visible Light Communication

FIG. 250A is a diagram illustrating an example of a visible light communication system in Embodiment 10.

A transmitter such as a ceiling light (a lighting device) has a wireless communication function of Wi-Fi, Bluetooth®, or the like. The transmitter transmits, by visible light communication, information (such as a light emitter ID and an authentication ID) for connecting to the transmitter by wireless communication. A receiver A such as a smartphone (a mobile terminal) performs wireless communication with the transmitter, based on the received information. The receiver A may connect to the transmitter using other information. In such a case, the receiver A does not need to have a reception function. A receiver B is an electronic device (a control target device) such as a microwave, as an example. The transmitter transmits information of the paired receiver B, to the receiver A. The receiver A displays the information of the receiver B, as an operable device. The receiver A provides an instruction to operate the receiver B (a control signal) to the transmitter via wireless communication, and the transmitter provides the operation instruction to the receiver B via visible light communication. As a result, the user can operate the receiver B through the receiver A. Moreover, a device connected to the receiver A via the Internet or the like can operate the receiver B through the receiver A.

Bidirectional communication is possible when the receiver B has a transmission function and the transmitter has a reception function. The transmission function may be realized as visible light by light emission, or communication by sound. For instance, the transmitter includes a sound collection unit, and recognizes the sound output from the receiver B to thereby recognize the state of the receiver B. As an example, the transmitter recognizes the operation end sound of the receiver B, and notifies the receiver A of such recognition. The receiver A displays the operation end of the receiver B on the display, thus notifying the user.

The receivers A and B each include a near field communication (NFC) module. The receiver A receives a signal from the transmitter, communicates with the receiver B via NFC, and registers in the receiver A and the transmitter that a signal from the transmitter transmitting the signal received immediately before is receivable by the receiver B. This is referred to as "pairing" between the transmitter and the receiver B. For example in the case where the receiver B is moved, the receiver A registers in the transmitter that the pairing is cleared. In the case where the receiver B is paired with another transmitter, the newly paired transmitter notifies this to the previously paired transmitter, to clear the previous pairing.

FIG. 250B is a diagram for describing a use case in Embodiment 10. An embodiment of using a reception unit 1028 that employs a modulation scheme such as PPM, FDM, FSK, or frequency allocation according to the present disclosure is described below, with reference to FIG. 250B.

Light emission operation by a light emitter 1003 which is a lighting device is described first. In a light emitter 1003 such as a lighting device or a TV monitor attached to a ceiling or a wall, an authentication ID generation unit 1010 generates an authentication ID, using a random number generation unit 1012 changing per time period. For the ID of the light emitter 1003 and this authentication ID 1004, in the case where there is no interrupt (Step 1011), the light emitter 1003 determines that there is no "transmission data string" transmitted from a mobile terminal 1020. Accordingly, a light emitting unit 1016 such as an LED continuously or intermittently outputs a light signal including: (1) the light emitter ID; (2) the authentication ID; and (3) a transmission data string flag=0 which is an identifier for identifying whether or not there is a transmission data string 1009 transmitted via a mobile terminal 1020 from an electronic device 1040 which is a control target device.

The transmitted light signal is received by a photosensor 1041 in the electronic device 1040 (Step 1042). The electronic device 1040 determines, in Step S1043, whether or not the device ID of the electronic device 1040 and the authentication ID (the device authentication ID and the light emitter ID) are valid. When the result of the determination is YES (the IDs are valid), the electronic device 1040 checks whether or not the transmission data string flag is 1 (Step 1051). Only when the result of the checking is YES (when the transmission data string flag is 1), the electronic device 1040 executes the data of the transmission data string, e.g., a user command for applying a cooking recipe or the like (Step 1045).

A mechanism of light transmission by the electronic device 1040 using the light modulation scheme according to the present disclosure is described below. The electronic device 1040 transmits the device ID, the authentication ID for authenticating the device, and the light emitter ID of the light emitter 1003 received by the electronic device 1040 as mentioned above, i.e., the light emitter ID of the light emitter 1003 the successful reception of which is ensured, for example, using an LED backlight unit 1050 of a display unit 1047 (Step 1046).

The light signal according to the present disclosure is transmitted from the display unit 1047 such as a liquid crystal display of a microwave or a POS device, by PPM, FDM, or FSK at a modulation frequency of 60 Hz or more without flicker. Accordingly, ordinary consumers are unaware of the transmission of the light signal. It is therefore possible to produce independent display such as a microwave menu on the display unit 1047.

Method of Detecting the ID of the Light Emitter 1003 Receivable by the Electronic Device 1040

The user who intends to use the microwave or the like receives a light signal from the light emitter 1003 by an in camera unit 1017 of a mobile terminal 1020, thus receiving the light emitter ID and the light emitter authentication ID via an in camera processing unit 1026 (Step 1027). As the light emitter ID receivable by the electronic device 1040, a light emitter ID corresponding to the position, which is recorded in the mobile terminal or a cloud 1032 with position information using Wi-Fi or mobile reception such as 3G, may be detected (Step 1025).

When the user points an out camera 1019 of the mobile terminal 1020 at the display unit 1047 of the microwave 1040 or the like, the light signal 1048 according to the present disclosure can be demodulated using a MOS camera. Increasing the shutter speed enables faster data reception. A reception unit 1028 receives the device ID of the electronic device 1040, the authentication ID, a service ID, or a service provision cloud URL or device status converted from the service ID.

In Step 1029, the mobile terminal 1020 connects to the external cloud 1032 using the URL received or held inside via a 3G/Wi-Fi communication unit 1031, and transmits the service ID and the device ID. In the cloud 1032, a database 1033 is searched for data corresponding to each of the device ID and the service ID. The data is then transmitted to the mobile terminal 1020. Video data, command buttons, and the like are displayed on the screen of the mobile terminal based on this data. Upon viewing the display, the user inputs a desired command by an input method of pressing a button on the screen or the like (Step 1030). In the case of Yes (input), a transmission unit 1022 of a BTLE (Bluetooth® Low Energy) transmission and reception unit 1021 transmits a transmission data string including the device ID of the electronic device 1040 or the like, the device authentication ID, the light emitter ID, the light emitter authentication ID, and the user command in Step 1030.

The light emitter 1003 receives the transmission data string by a reception unit 1007 in a BTLE transmission and reception unit 1004. When the interrupt processing unit 1011 detects that the transmission data string is received (Yes in Step 1013), data "(transmission data string)+ID+(transmission data flag=1)" is modulated by the modulation unit according to the present disclosure and transmitted by light from the light emitting unit 1016 such as an LED. When reception of the transmission data string is not detected (NO in Step 1013), the light emitter 1003 continuously transmits the light emitter ID and the like.

Since the electronic device 1040 has already confirmed, through actual reception, that the signal from the light emitter 1003 is receivable, the reception can be reliably performed.

In this case, the light emitter ID is included in the transmission data string, so that the interrupt processing unit 1011 recognizes that the electronic device as the transmission target is present in the light irradiation range of the light emitter of the ID. Therefore, the signal is transmitted only from the light emitter situated within the very narrow range where the electronic device is present, without transmitting the signal from other light emitters. The radio space can be efficiently used in this way.

In the case where this scheme is not employed, since a Bluetooth signal reaches far, a light signal will end up being transmitted from a light emitter at a different position from the electronic device. While one light emitter is emitting light, light transmission to another electronic device is impossible or is interfered with. Such a problem can be effectively solved by this scheme.

The following describes electronic device malfunction prevention.

In Step 1042, the photosensor 1041 receives the light signal. Since the light emitter ID is checked first, a light emission signal of another light emitter ID can be removed and so malfunctions are reduced.

In the present disclosure, the transmission data string 1009 includes the device ID and the device authentication ID of the electronic device that is to receive the signal. In Step 1043, whether or not the device authentication ID and the device ID belong to the electronic device 1040 is checked, thus preventing any malfunction. A malfunction of a microwave or the like caused by the electronic device 1040 erroneously processing a signal transmitted to another electronic device can be avoided, too.

The following describes user command execution error prevention.

In Step 1044, when the transmission data flag is 1, it is determined that there is a user command. When the transmission data flag is 0, the process is stopped. When the transmission data flag is 1, after the device ID and the authentication ID in the user data string are authenticated, the transmission data string of the user command and the like is executed. For example, the electronic device 1040 extracts and displays a recipe on the screen. When the user presses the corresponding button, the operation of the recipe such as 600 w for 3 minutes, 200 w for 1 minute, and steaming for 2 minutes can be started without an error.

When the user command is executed, electromagnetic noise of 2.4 GHz is generated in the microwave. To reduce this, in the case of operating according to instructions through the smartphone via Bluetooth or Wi-Fi, an intermittent drive unit 1061 intermittently stops microwave output, e.g., for about 100 ms in 2 seconds. Communication by Bluetooth, Wi-Fi 802.11n, etc. is possible during this period. For example, if the microwave is not stopped, transmission of a stop instruction from the smartphone to the light emitter 1003 by BTLE is interfered with. In the present disclosure, on the other hand, the transmission can be performed without any interference, with it being possible to stop the microwave or change the recipe by a light signal.

In this embodiment, by merely adding the photosensor 1041 which costs only several yen per unit to the electronic device including the display unit, bidirectional communication with the smartphone in interaction with the cloud can be realized. This has an advantageous effect of turning a low-cost home appliance into a smart home appliance. Though the home appliance is used in this embodiment, the same advantageous effects can be achieved with a POS terminal including a display unit, an electronic price board in a supermarket, a personal computer, etc.

In this embodiment, the light emitter ID can be received only from the lighting device situated above the electronic device. Since the reception area is narrow, a small zone ID of Wi-Fi or the like is defined for each light emitter, and the ID is assigned to the position in each zone, thereby reducing the number of digits of the light emitter ID. In such a case, since the number of digits of the light emitter ID transmitted by PPM, FSK, or FDM according to the present disclosure is reduced, it is possible to receive a light signal from a small light source, obtain an ID at high speed, receive data from a distant light source, etc.

FIG. 250C is a diagram illustrating an example of a signal transmission and reception system in Embodiment 10.

The signal transmission and reception system includes a smartphone which is a multifunctional mobile phone, an LED light emitter which is a lighting device, a home appliance such as a refrigerator, and a server. The LED light emitter performs communication using BTLE (Bluetooth® Low Energy) and also performs visible light communication using a light emitting diode (LED). For example, the LED light emitter controls a refrigerator or communicates with an air conditioner by BTLE. In addition, the LED light emitter controls a power supply of a microwave, an air cleaner, or a television (TV) by visible light communication.

For example, the television includes a solar power device and uses this solar power device as a photosensor. Specifically, when the LED light emitter transmits a signal using a change in luminance, the television detects the change in luminance of the LED light emitter by referring to a change in power generated by the solar power device. The television then demodulates the signal represented by the detected change in luminance, thereby obtaining the signal transmitted from the LED light emitter. When the signal is an instruction to power ON, the television switches a main power thereof to ON, and when the signal is an instruction to power OFF, the television switches the main power thereof to OFF.

The server is capable of communicating with an air conditioner via a router and a specified low-power radio station (specified low-power). Furthermore, the server is capable of communicating with the LED light emitter because the air conditioner is capable of communicating with the LED light emitter via BTLE. Therefore, the server is capable of switching the power supply of the TV between ON and OFF via the LED light emitter. The smartphone is capable of controlling the power supply of the TV via the server by communicating with the server via wireless fidelity (Wi-Fi), for example.

As illustrated in FIGS. 250A to 250C, the information communication method according to this embodiment includes: transmitting the control signal (the transmission data string or the user command) from the mobile terminal (the smartphone) to the lighting device (the light emitter) through the wireless communication (such as BTLE or Wi-Fi) different from the visible light communication; performing the visible light communication by the lighting device changing in luminance according to the control signal; and detecting a change in luminance of the lighting device, demodulating the signal specified by the detected change in luminance to obtain the control signal, and performing the processing according to the control signal, by the control target device (such as a microwave). By doing so, even the mobile terminal that is not capable of changing in luminance for visible light communication is capable of causing the lighting device to change in luminance instead of the mobile terminal and is thereby capable of appropriately controlling the control target device. Note that the mobile terminal may be a wristwatch instead of a smartphone.

Reception in which Interference is Eliminated

FIG. 251 is a flowchart illustrating a reception method in which interference is eliminated in Embodiment 10.

In Step 9001*a*, the process starts. In Step 9001*b*, the receiver determines whether or not there is a periodic change in the intensity of received light. In the case of Yes, the process proceeds to Step 9001*c*. In the case of No, the process proceeds to Step 9001*d*, and the receiver receives light in a wide range by setting the lens of the light receiving unit at wide angle. The process then returns to Step 9001*b*. In Step 9001*c*, the receiver determines whether or not signal reception is possible. In the case of Yes, the process proceeds to Step 9001*e*, and the receiver receives a signal. In Step 9001*g*, the process ends. In the case of No, the process proceeds to Step 9001*f*, and the receiver receives light in a narrow range by setting the lens of the light receiving unit at telephoto. The process then returns to Step 9001*c*.

With this method, a signal from a transmitter in a wide direction can be received while eliminating signal interference from a plurality of transmitters.

Transmitter Direction Estimation

FIG. 252 is a flowchart illustrating a transmitter direction estimation method in Embodiment 10.

In Step 9002*a*, the process starts. In Step 9002*b*, the receiver sets the lens of the light receiving unit at maximum telephoto. In Step 9002*c*, the receiver determines whether or not there is a periodic change in the intensity of received light. In the case of Yes, the process proceeds to Step 9002*d*. In the case of No, the process proceeds to Step 9002*e*, and the receiver receives light in a wide range by setting the lens of the light receiving unit at wide angle. The process then returns to Step 9002*c*. In Step 9002*d*, the receiver receives a signal. In Step 9002*f*, the receiver sets the lens of the light receiving unit at maximum telephoto, changes the light reception direction along the boundary of the light reception range, detects the direction in which the light reception intensity is maximum, and estimates that the transmitter is in the detected direction. In Step 9002*d*, the process ends.

With this method, the direction in which the transmitter is present can be estimated. Here, the lens may be initially set at maximum wide angle, and gradually changed to telephoto.

Reception Start

FIG. 253 is a flowchart illustrating a reception start method in Embodiment 10.

In Step 9003*a*, the process starts. In Step 9003*b*, the receiver determines whether or not a signal is received from a base station of Wi-Fi, Bluetooth®, IMES, or the like. In the case of Yes, the process proceeds to Step 9003*c*. In the case of No, the process returns to Step 9003*b*. In Step 9003*c*, the receiver determines whether or not the base station is registered in the receiver or the server as a reception start trigger. In the case of Yes, the process proceeds to Step 9003*d*, and the receiver starts signal reception. In Step 9003*e*, the process ends. In the case of No, the process returns to Step 9003*b*.

With this method, reception can be started without the user performing a reception start operation. Moreover, power can be saved as compared with the case of constantly performing reception.

Generation of ID Additionally Using Information of Another Medium

FIG. 254 is a flowchart illustrating a method of generating an ID additionally using information of another medium in Embodiment 10.

In Step 9004*a*, the process starts. In Step 9004*b*, the receiver transmits either an ID of a connected carrier communication network, Wi-Fi, Bluetooth®, etc. or position information obtained from the ID or position information obtained from GPS, etc., to a high order bit ID index server. In Step 9004*c*, the receiver receives the high order bits of a visible light ID from the high order bit ID index server. In Step 9004*d*, the receiver receives a signal from a transmitter, as the low order bits of the visible light ID. In Step 9004*e*, the receiver transmits the combination of the high order bits and the low order bits of the visible light ID, to an ID solution server. In Step 9004*f*, the process ends.

With this method, the high order bits commonly used in the neighborhood of the receiver can be obtained. This contributes to a smaller amount of data transmitted from the transmitter, and faster reception by the receiver.

Here, the transmitter may transmit both the high order bits and the low order bits. In such a case, a receiver employing this method can synthesize the ID upon receiving the low order bits, whereas a receiver not employing this method obtains the ID by receiving the whole ID from the transmitter.

Reception Scheme Selection by Frequency Separation

FIG. 255 is a flowchart illustrating a reception scheme selection method by frequency separation in Embodiment 10.

In Step 9005*a*, the process starts. In Step 9005*b*, the receiver applies a frequency filter circuit to a received light signal, or performs frequency resolution on the received light signal by discrete Fourier series expansion. In Step 9005*c*, the receiver determines whether or not a low frequency component is present. In the case of Yes, the process proceeds to Step 9005*d*, and the receiver decodes the signal expressed in a low frequency domain of frequency modulation or the like. The process then proceeds to Step 9005*e*. In the case of No, the process proceeds to Step 9005*e*. In Step 9005*e*, the receiver determines whether or not the base station is registered in the receiver or the server as a reception start trigger. In the case of Yes, the process proceeds to Step 9005*f*, and the receiver decodes the signal expressed in a high frequency domain of pulse position modulation or the like. The process then proceeds to Step 9005*g*. In the case of No, the process proceeds to Step 9005*g*. In Step 9005*g*, the receiver starts signal reception. In Step 9005*h*, the process ends.

With this method, signals modulated by a plurality of modulation schemes can be received.

Signal Reception in the Case of Long Exposure Time

FIG. 256 is a flowchart illustrating a signal reception method in the case of a long exposure time in Embodiment 10.

In Step 9030*a*, the process starts. In Step 9030*b*, in the case where the sensitivity is settable, the receiver sets the highest sensitivity. In Step 9030*c*, in the case where the exposure time is settable, the receiver sets the exposure time shorter than in the normal imaging mode. In Step 9030*d*, the receiver captures two images, and calculates the difference in luminance. In the case where the position or direction of the imaging unit changes while capturing two images, the receiver cancels the change, generates an image as if the image is captured in the same position and direction, and calculates the difference. In Step 9030*e*, the receiver calculates the average of luminance values in the direction parallel to the exposure lines in the captured image or the difference image. In Step 9030*f*, the receiver arranges the calculated average values in the direction perpendicular to the exposure lines, and performs discrete Fourier transform. In Step 9030*g*, the receiver recognizes whether or not there is a peak near a predetermined frequency. In Step 9030*h*, the process ends.

With this method, signal reception is possible even in the case where the exposure time is long, such as when the exposure time cannot be set or when a normal image is captured simultaneously.

In the case where the exposure time is automatically set, when the camera is pointed at a transmitter as a lighting, the exposure time is set to about 1/60 second to 1/480 second by an automatic exposure compensation function. If the exposure time cannot be set, signal reception is performed under this condition. In an experiment, when a lighting blinks periodically, stripes are visible in the direction perpendicular to the exposure lines if the period of one cycle is greater than or equal to about 1/16 of the exposure time, so that the blink period can be recognized by image processing. Since the part in which the lighting is shown is too high in luminance and the stripes are hard to be recognized, the signal period may be calculated from the part where light is reflected.

In the case of using a scheme, such as frequency shift keying or frequency multiplex modulation, that periodically turns on and off the light emitting unit, flicker is less visible to humans even with the same modulation frequency and also flicker is less likely to appear in video captured by a video camera, than in the case of using pulse position modulation. Hence, a low frequency can be used as the modulation frequency. Since the temporal resolution of human vision is about 60 Hz, a frequency not less than this frequency can be used as the modulation frequency.

When the modulation frequency is an integer multiple of the imaging frame rate of the receiver, bright lines do not appear in the difference image between pixels at the same position in two images and so reception is difficult, because imaging is performed when the light pattern of the transmitter is in the same phase. Since the imaging frame rate of the receiver is typically 30 fps, setting the modulation frequency to other than an integer multiple of 30 Hz eases reception. Moreover, given that there are various imaging frame rates of receivers, two relatively prime modulation frequencies may be assigned to the same signal so that the transmitter transmits the signal alternately using the two modulation frequencies. By receiving at least one signal, the receiver can easily reconstruct the signal.

FIG. 257 is a diagram illustrating an example of a transmitter light adjustment (brightness adjustment) method.

The ratio between a high luminance section and a low luminance section is adjusted to change the average luminance. Thus, brightness adjustment is possible. Here, when the period $T_1$ in which the luminance changes between HIGH and LOW is maintained constant, the frequency peak can be maintained constant. For example, in each of (a), (b), and (c) in FIG. 257, the time of brighter lighting than the average luminance is set short to adjust the transmitter to emit darker light, and the time of brighter lighting than the average luminance is set long to adjust the transmitter to emit brighter light, while time $T_1$ between a first change in luminance at which the luminance becomes higher than the average luminance and a second change in luminance is maintained constant. In FIG. 257, the light in (b) and (c) is adjusted to be darker than that in (a), and the light in (c) is adjusted to be darkest. With this, light adjustment can be performed while signals having the same meaning are transmitted.

It may be that the average luminance is changed by changing luminance in the high luminance section, luminance in the low luminance section, or luminance values in the both sections.

FIG. 258 is a diagram illustrating an exemplary method of performing a transmitter light adjustment function.

Since there is a limitation in component precision, the brightness of one transmitter will be slightly different from that of another even with the same setting of light adjustment. In the case where transmitters are arranged side by side, a difference in brightness between adjacent ones of the transmitters produces an unnatural impression. Hence, a user adjusts the brightness of the transmitters by operating a light adjustment correction/operation unit. A light adjustment correction unit holds a correction value. A light adjustment control unit controls the brightness of the light emitting unit according to the correction value. When the light adjustment level is changed by a user operating a light adjustment operation unit, the light adjustment control unit controls the brightness of the light emitting unit based on a light adjustment setting value after the change and the correction value held in the light adjustment correction unit. The light adjustment control unit transfers the light adjustment setting value to another transmitter through a cooperative light adjustment unit. When the light adjustment setting value is transferred from another transmitter through the cooperative light adjustment unit, the light adjustment control unit controls the brightness of the light emitting unit based on the light adjustment setting value and the correction value held in the light adjustment correction unit.

The control method of controlling an information communication device that transmits a signal by causing a light emitter to change in luminance according to an embodiment of the present disclosure may cause a computer of the information communication device to execute: determining, by modulating a signal to be transmitted that includes a plurality of different signals, a luminance change pattern corresponding to a different frequency for each of the different signals; and transmitting the signal to be transmitted, by causing the light emitter to change in luminance to include, in a time corresponding to a single frequency, only a luminance change pattern determined by modulating a single signal.

For example, when luminance change patterns determined by modulating more than one signal are included in the time corresponding to a single frequency, the waveform of changes in luminance with time will be complicated, making it difficult to appropriately receive signals. However, when only a luminance change pattern determined by modulating a single signal is included in the time corresponding to a single frequency, it is possible to more appropriately receive signals upon reception.

According to one embodiment of the present disclosure, the number of transmissions may be determined in the determining so as to make a total number of times one of the plurality of different signals is transmitted different from a total number of times a remaining one of the plurality of different signals is transmitted within a predetermined time.

When the number of times one signal is transmitted is different from the number of times another signal is transmitted, it is possible to prevent flicker at the time of transmission.

According to one embodiment of the present disclosure, in the determining, a total number of times a signal corresponding to a high frequency is transmitted may be set greater than a total number of times another signal is transmitted within a predetermined time.

At the time of frequency conversion at a receiver, a signal corresponding to a high frequency results in low luminance, but an increase in the number of transmissions makes it possible to increase a luminance value at the time of frequency conversion.

According to one embodiment of the present disclosure, changes in luminance with time in the luminance change pattern have a waveform of any of a square wave, a triangular wave, and a sawtooth wave.

With a square wave or the like, it is possible to more appropriately receive signals.

According to one embodiment of the present disclosure, when an average luminance of the light emitter is set to have a large value, a length of time for which luminance of the light emitter is greater than a predetermined value during the time corresponding to the single frequency may be set to be longer than when the average luminance of the light emitter is set to have a small value.

By adjusting the length of time for which the luminance of the light emitter is greater than the predetermined value during the time corresponding to a single frequency, it is possible to adjust the average luminance of the light emitter while transmitting signals. For example, when the light emitter is used as a lighting, signals can be transmitted while the overall brightness is decreased or increased.

Using an application programming interface (API) (indicating a unit for using OS functions) on which the exposure time is set, the receiver can set the exposure time to a predetermined value and stably receive the visible light signal. Furthermore, using the API on which sensitivity is set, the receiver can set sensitivity to a predetermined value, and even when the brightness of a transmission signal is low or high, can stably receive the visible light signal.

Embodiment 11

This embodiment describes each example of application using a receiver such as a smartphone and a transmitter for transmitting information as a blink pattern of an LED or an organic EL device in each of the embodiments described above.

Setting of Exposure Time

FIGS. 259A to 259D are flowcharts illustrating an example of operation of a receiver in Embodiment 11.

In order to receive the visible light signal by the image sensor in the scheme according to the present disclosure, it is necessary to set the exposure time shorter than a predetermined time. The predetermined time is determined according to a modulation scheme and a modulation frequency of the visible light signal. Generally, the exposure time needs to be shorter as the modulation frequency increases.

As the exposure time becomes shorter, the clarity of observed bright lines can increase. Meanwhile, a shorter exposure time leads to a reduction in the intensity of received light, resulting in an entire captured image being darker. In other words, the signal strength is attenuated. Therefore, it is possible to improve reception performance (such as a reception speed and an error rate) by setting a short exposure time within the range in which presence of the visible light signal is detectable.

As illustrated in FIG. 259A, the receiver sets the imaging mode to the visible light imaging mode (Step S9201). At this time, the receiver determines whether or not it includes a monochrome imaging function and is to receive a signal modulated with luminance information only (Step S9202). Here, when determining that it includes a monochrome imaging function and is to receive a signal modulated with luminance information only (Step S9202: Y), the receiver sets a color-related mode included in the imaging mode to a monochrome imaging mode in which the monochrome imaging function is used (Step S9203). By doing so, in the case of receiving a signal modulated with luminance information only, that is, in the case of receiving a visible light signal which represents information by changes in luminance only, it is possible to improve the processing speed by not handling color information. In contrast, when not determining in Step S9202 that it includes a monochrome imaging function and is to receive a signal modulated with luminance information only (Step S9202: N), that is, when the visible light signal is represented using color information, the receiver sets the color-related mode included in the imaging mode to a color imaging mode (Step S9204).

Next, the receiver determines whether or not an imaging unit including the above-stated image sensor includes a function of selecting an exposure time (Step S9205). Here, when determining that the function is included (Step 9205: Y), the receiver sets the exposure time shorter than the above-stated predetermined time using the function so that bright lines will appear in a captured image (Step S9206). Note that the receiver may set the exposure time to as short an exposure time as possible within the range in which the transmitter that transmits the visible light signal can be seen in the captured image.

In contrast, when determining in Step S9205 that the function of selecting the exposure time is not included (Step S9205: N), the receiver further determines whether or not the imaging unit includes a function of setting sensitivity (Step S9207). Here, when determining that the function of setting sensitivity is included (Step S9207: Y), the receiver sets the sensitivity to the maximum using the function (Step S9208). As a result, a captured image obtained by imaging with the maximum sensitivity will be bright. Therefore, in the receiver with automatic exposure enabled, the exposure time is set short by the automatic exposure so that the exposure falls within a predetermined range. Note that in the automatic exposure, every time an image is captured, the captured image is used as input of the automatic exposure, and the exposure time is adjusted as needed based on the captured image so that the exposure falls within the predetermined range. Details of the automatic exposure shall be described later.

Furthermore, the receiver determines whether or not the imaging unit includes a function of setting the F number (aperture) (Step S9209). Here, when the function of setting the F number (Step S9209: Y) is included, the receiver sets the F number to the minimum (opens the aperture) using the function (Step S9210). As a result, a captured image obtained by imaging with the minimum F number will be bright. Therefore, in the receiver with automatic exposure enabled, the exposure time is set short by the automatic exposure so that the exposure falls within a predetermined range.

Furthermore, the receiver determines whether or not the imaging unit includes a function of selecting an exposure compensation value (Step S9211). Here, when determining that the imaging unit includes the function of selecting an exposure compensation value (Step S9211: Y), the receiver sets the exposure compensation value to the minimum using the function (Step S9212). As a result, in the receiver with automatic exposure enabled, the exposure time is set short by the automatic exposure so that the exposure becomes low.

A scene mode (a high-speed scene mode) for capturing an image of a subject in high-speed motion is generally defined to have a name such as "Sport" or "Action".

As illustrated in FIG. 259B, the receiver determines, after Step S9211 or Step S9212, whether or not the following condition is satisfied (Step S9213): the imaging unit includes a function of setting the high-speed scene mode, and setting of the high-speed scene mode does not lead to setting the sensitivity lower than before the setting of the scene mode, or lead to setting the F number higher than before the setting of the scene mode, or lead to setting the exposure compensation value higher than before the setting of the scene mode. Here, when determining that the above condition is satisfied (Step S9213: Y), the receiver sets the scene mode to the high-speed scene mode (Step S9214). As a result, in the receiver with automatic exposure enabled, the exposure time is set short by the automatic exposure so that a blur-free image of the subject in high-speed motion can be captured.

Next, the receiver enables the automatic exposure (Step S9215) and captures an image of the subject (Step S9216).

As illustrated in FIG. 259C, the receiver determines after Step S9215 whether or not the imaging unit includes a zoom function (Step S9217). Here, when determining that the zoom function is included (Step S9217: Y), the receiver further determines whether or not a zoom center position is selectable, that is, whether or not the center position can be set to a given position within the captured image (Step S9218). When determining that the center position is selectable (Step S9218: Y), the receiver selects a bright part of the captured image as the zoom center position, and zooms to capture an image in which the subject corresponding to the bright part is shown large at the center (Step S9219). In contrast, when determining that the center position is not selectable (Step S9218: N), the receiver determines whether or not the center of the captured image is brighter than brightness having a predetermined value, or whether or not the center of the captured image is brighter than the average brightness of predetermined portions of the captured image (Step S9220). Here, when determining that the center is brighter (Step S9220: Y), the receiver zooms (Step S9221). Thus, also in this case, the subject corresponding to the bright part can be shown large at the center in a captured image.

Generally, in many of devices including an imaging unit, the center-weighted metering is adopted as a metering scheme, and when a captured image has a bright part at the center, the exposure is adjusted based on the bright part even when another position is not selected as the metering position. With this, the exposure time is set short. In addition, since the zooming results in an increase in the area of the bright part, and thus the exposure is adjusted based on a brighter screen, the exposure time is set short.

Next, the receiver determines whether or not a function of selecting a metering position or a focus position is included (Step S9222). Here, when determining that the function is included (Step S9222: Y), the receiver performs processing for finding a bright place within the captured image. That is, the receiver performs processing for finding, out of the captured image, a place in a region brighter than predetermined brightness and having predetermined shape and size. Specifically, the receiver first determines whether or not an exposure evaluation calculation expression for the automatic exposure is already known (Step S9224). When determining that the calculation expression is already known (Step S9224: Y), the receiver finds a place in the above-described bright region by evaluating the brightness of each region of the captured image with the use of the same calculation expression as the known calculation expression (Step S9226). In contrast, when determining that the exposure evaluation calculation expression is unknown (N in Step S9224), the receiver finds a place in the above-described bright region by evaluating the brightness of each region of the captured image with the use of a predetermined calculation expression for calculating an average value of brightness of pixels in a region having predetermined shape and size (Step S9225). Note that the predetermined shape is the shape of a rectangle, a circle, or a cross, for example. Furthermore, the region may be made up of a plurality of discontinuous regions. Furthermore, the calculation for the above-described average value may use, rather than a simple average, a weighted average calculated with a more weight in a part closer to the center.

The receiver determines whether or not a total area of all the bright regions found is smaller than a predetermined area (Step S9227). Here, when determined that the total area is smaller than the predetermined area (Step S9227: Y), the receiver zooms to capture an image in which the total area of the bright regions is no less than the predetermined area (Step S9228). Next, the receiver determines whether or not a metering position is selectable (Step S9229). When determining that the metering position is selectable (Step S9229: Y), the receiver selects a place in the brightest region as the metering position (Step S9230). In the automatic exposure, the exposure is adjusted based on the brightness of the metering position. Thus, when a place in the brightest region is selected as the metering position, the exposure time is set short by the automatic exposure. In contrast, when determining in Step S9229 that the metering position is not selectable (Step 9229: N), that is, when the focus position is selectable, the receiver selects a place in the brightest region as the focus position. Various imaging units can be mounted in the receiver. In the automatic exposure by some of these various imaging units, the exposure is adjusted based on brightness at the focus position. Therefore, when a place in the brightest region is selected as the focus position, the exposure time is set short by the automatic exposure. Here, the selected place may be different from the place in the region used to evaluate or calculate brightness and is set according to a setting scheme of the imaging unit. As an example, when the selected scheme is designed to select a center point, the receiver selects the center of the brightest region, and when the selected scheme is designed to select a rectangular region, the receiver selects a rectangular region including the center of the brightest region.

Next, the receiver determines whether or not any region of the captured image is brighter than the region of the place selected as the metering position or the focus position (Step S9232). Here, when determining that a brighter region is present (Step S9232: Y), the receiver repeats the processing following Step S9217. In contrast, when determining that no brighter region is present (Step S9232: N), the receiver captures an image of the subject (Step S9233).

Next, the receiver determines based on the image captured in Step S9233 whether or not the automatic exposure needs to be ended or whether or not a predetermined time has elapsed since the automatic exposure was enabled (Step S9234). Here, for example, when determining that the automatic exposure does not need to be ended (Step S9234: N), the receiver further determines based on the image captured in Step S9233 whether or not the position or the imaging direction of the imaging unit has changed (Step S9235). When determining that the position or the imaging direction of the imaging unit has changed (Step S9235: Y), the receiver performs the processing following Step S9217 again. By doing so, even when the place selected as the metering position or the focus position moves in the captured image, a place in the brightest region at that moment can be selected. In contrast, when determining in Step S9235 that the position or the imaging direction of the imaging unit has not changed (Step 9235: N), the receiver repeats the processing following Step S9232. Note that the receiver may search for the brightest region and select a metering position or a focus position every time one image is captured.

When determining in Step 9234 that the automatic exposure needs to be ended, when the exposure time does not change any more, or when determining in Step 9234 that the predetermined time has elapsed (Step S9234: Y), or when the exposure time is set in Step S9206, the receiver disables the automatic exposure (Step S9236) and captures an image of the subject (Step S9237). The receiver then determines whether or not a visible light signal has been received by capturing the image (Step S9238). Here, when determining that no visible light signal has been received (Step S9238: N), the receiver further determines whether or not a predetermined time has elapsed (Step S9239). When determining that the predetermined time has not elapsed (Step S9239: N), the receiver repeats the processing following Step S9237. In contrast, when determining that the predetermined time has elapsed (Step S9239: Y), that is, when failing to receive a visible light signal within the predetermined time, the receiver repeats the processing following Step S9232 to search for the brightest region again.

Note that the receiver may stop zooming at any point in time when the zoom function is used. This means that when not zooming, the receiver may detect whether or not a bright subject is present in a range that is not captured when zoomed in, but is captured when not zoomed in. Note that this bright subject is likely to be a transmitter that transmits a visible light signal by way of luminance change. By doing so, it is possible to receive signals from transmitters present in a wide range.

The automatic exposure and a metering method are described below.

The automatic exposure in FIGS. 259A to 259D is described below. The automatic exposure is an operation, a process, or a function of automatically adjusting a metering result to a predetermined value by the imaging unit of the receiver by way of adjusting the exposure time, the sensitivity, and the aperture.

The metering method for obtaining a metering result includes average metering (full-frame metering), center-weighted metering, spot metering (partial metering), and segment metering. The average metering calculates average brightness of an entire image to be captured. The center-weighted metering calculates a weighed average value of brightness that is more weighted toward the center (or a selected portion) of an image. The spot metering calculates an average value (or a weighted average value) of brightness of one predetermined area (or a few predetermined areas) defined with the center or the selected portion of the image as its center. The segment metering segments the image into portions, measures light at each of the portions, and calculates a value of total brightness.

Even being unable to directly set the exposure time short, the imaging unit including an automatic exposure function is capable of indirectly setting an exposure time by the automatic exposure function. For example, when the sensitivity is set high (e.g., to the maximum value), a captured image is bright where the other parameters are the same, and therefore the exposure time can be set short by the automatic exposure. When the aperture is set to be open (i.e., uncovered), the exposure time can be set short likewise. When a value indicating an exposure compensation level is set low (e.g., to the minimum value), the automatic exposure causes a dark image to be captured, that is, the exposure time is set short. When the brightest place in an image is selected as the metering position, the exposure time can be set short. If it a metering method is selectable, the exposure time can be set short when the spot metering is selected. If a metering range is selectable, the exposure time can be set short when the minimum metering range is selected. In the case where the area of the bright part in the image is large, the exposure time can be set short when the largest possible metering range that does not exceed the bright part is selected. If more than one metering position is selectable, the exposure time can be set short when the same place is selected as the metering position more than one time. When a zoomed-in image of a bright place in the image is captured and this place is selected as the metering position, the exposure time can be set short.

EX zoom is described below.

FIG. 260 is a diagram for describing EX zoom.

The zoom in FIG. 259C, that is, the way to obtain a magnified image, includes optical zoom which adjusts the focal length of a lens to change the size of an image formed on an imaging element, digital zoom which interpolates an image formed on an imaging element through digital processing to obtain a magnified image, and EX zoom which changes imaging elements that are used for imaging, to obtain a magnified image. The EX zoom is applicable when the number of imaging elements included in an image sensor is great relative to a resolution of a captured image.

For example, an image sensor 10080*a* illustrated in FIG. 260 includes 32 by 24 imaging elements arranged in matrix. Specifically, 32 imaging elements in width by 24 imaging elements in height are arranged. When this image sensor 10080*a* captures an image having a resolution of 16 pixels in width and 12 pixels in height, out of the 32 by 24 imaging elements included in the image sensor 10080*a*, only 16 by 12 imaging elements evenly dispersed as a whole in the image sensor 10080*a* (e.g., the imaging elements of the image sensor 1080*a* indicated by black squares in (a) in FIG. 260) are used for imaging as illustrated in (a) in FIG. 260. In other words, only odd-numbered or even-numbered imaging elements in each of the heightwise and widthwise arrangements of imaging elements is used to capture an image. By doing so, an image 10080*b* having a desired resolution is obtained. Note that although a subject appears on the image sensor 1008*a* in FIG. 260, this is for facilitating the understanding of a relationship between each of the imaging elements and a captured image.

When capturing an image of a wide range to search for a transmitter or to receive information from many transmitters, a receiver including the above image sensor 10080*a* captures an image using only a part of the imaging elements evenly dispersed as a whole in the image sensor 10080*a*.

When using the EX zoom, the receiver captures an image by only a part of the imaging elements that is locally dense in the image sensor 10080*a* (e.g., the 16 by 12 image sensors indicated by black squares in the image sensor 1080*a* in (b) in FIG. 260) as illustrated in (b) in FIG. 260. By doing so, an image 10080*d* is obtained which is a zoomed-in image of a part of the image 10080*b* that corresponds to that part of the imaging elements. With such EX zoom, a magnified image of a transmitter is captured, which makes it possible to receive visible light signals for a long time, as well as to increase the reception speed and to receive a visible light signal from far way.

In the digital zoom, it is not possible to increase the number of exposure lines that receive visible light signals, and the length of time for which the visible light signals are received does not increase; therefore, it is preferable to use other kinds of zoom as much as possible. The optical zoom requires time for physical movement of a lens, an image sensor, or the like; in this regard, the EX zoom requires only a digital setting change and is therefore advantageous in that it takes a short time to zoom. From this perspective, the order of priority of the zooms is as follows: (1) the EX zoom; (2) the optical zoom; and (3) the digital zoom. The receiver may use one or more of these zooms selected according to the above order of priority and the need of zoom magnification. Note that the imaging elements that are not used in the imaging methods represented in (a) and (b) in FIG. 260 may be used to reduce image noise.

FIG. 261A is a flowchart illustrating processing of a reception program in Embodiment 10.

This reception program is a program for causing a computer included in a receiver to execute the processing illustrated in FIGS. 259A to 260, for example.

In other words, this reception program is a reception program for receiving information from a light emitter. In detail, this reception program causes a computer to execute: an exposure time setting step SA21 of setting an exposure time of an image sensor using automatic exposure; a bright line image obtainment step SA22 of obtaining a bright line image which is an image including a plurality of bright lines corresponding to a plurality of exposure lines included in the image sensor, by capturing an image of a light emitter changing in luminance by the image sensor with the set exposure time; and an information obtainment step SA23 of obtaining information by decoding a pattern of the plurality of bright lines included in the obtained bright line image. In the exposure time setting step SA21, the sensitivity of the image sensor is set to the maximum value within a predetermined range for the image sensor as in Step S9208 in FIG. 259A, and an exposure time according to the sensitivity at the maximum value is set by the automatic exposure.

By doing so, a short exposure time that allows for an appropriate bright line image to be obtained can be set using an automatic exposure function included in a commonly used camera even when the exposure time of the image sensor cannot be directly set. Thus, in the automatic exposure, the exposure is adjusted based on brightness of an image captured by the image sensor. Therefore, when the sensitivity of the image sensor is set to a large value, the image is bright, and thus the exposure time of the image sensor is set short to reduce exposure. Setting the sensitivity of the image sensor to the maximum value allows the exposure time to be set shorter, and thus it is possible to obtain an appropriate bright line image. That is, it is possible to appropriately receive information from the light emitter. As a result, communication between various devices becomes possible. Note that the sensitivity is ISO speed, for example.

In the exposure time setting step SA21, a value indicating an exposure compensation level of the image sensor is set to the minimum value within a preset range for the image sensor as in Step S9212 in FIG. 259A, and an exposure time according to the sensitivity at the maximum value and the exposure compensation level at the minimum value is set by the automatic exposure.

By doing so, since the value indicating the exposure compensation level is set to the minimum value, processing in the automatic exposure to reduce exposure allows the exposure time to be set shorter, and thus it is possible to obtain an appropriate bright line image. Note that the unit of the value indicating the exposure compensation level is EV, for example.

Furthermore, in the exposure time setting step SA21, a brighter part than the other part in a first image, captured by the image sensor, of a subject including a light emitter is specified as in FIG. 259C. The optical zoom is then used to enlarge an image of a part of the subject that corresponds to this bright part. Furthermore, a second image obtained by capturing the enlarged image of the part of the subject by the image sensor is used as input of the automatic exposure to set the exposure time. Moreover, in the bright line image obtainment step SA22, the enlarged image of the part of the subject is captured by the image sensor with the set exposure time to obtain a bright line image.

Thus, the optical zoom enlarges an image of a part of the subject that corresponds to the bright part in the first image, that is, the optical zoom enlarges an image of a bright light emitter, with the result that the second image can be brighter than the first image as a whole. Since this bright second image is used as input of the automatic exposure, processing in the automatic exposure to reduce exposure allows the exposure time to be set shorter, and thus it is possible to obtain an appropriate bright line image.

Furthermore, in the exposure time setting step SA21, it is determined as illustrated in FIG. 259C whether or not a central part of the first image, captured by the image sensor, of the subject including the light emitter is brighter than the average brightness of a plurality of points in the first image. When the central part is determined to be brighter, the optical zoom enlarges an image of a part of the subject that corresponds to the central part. Furthermore, a second image obtained by capturing the enlarged image of the part of the subject by the image sensor is used as input of the automatic exposure to set the exposure time. Moreover, in the bright line image obtainment step SA22, the enlarged image of the part of the subject is captured by the image sensor with the set exposure time to obtain a bright line image.

Thus, the optical zoom enlarges an image of a part of the subject that corresponds to the bright central part in the first image, that is, the optical zoom enlarges an image of a bright light emitter, with the result that the second image can be brighter than the first image as a whole. Since this bright second image is used as input of the automatic exposure, processing in the automatic exposure to reduce exposure allows the exposure time to be set shorter, and thus it is possible to obtain an appropriate bright line image. If arbitrary setting of a center position for the enlargement is not possible, the optical zoom enlarges a central part of the angle of view or the image. Therefore, even when arbitrary setting of the center position is not possible, the optical zoom can be used to make the second image brighter as a whole as long as the central part of the first image is bright. Here, if the enlargement by the optical zoom is performed even when the central part of the first image is dark, the second image will be dark, resulting in the exposure time becoming long. Therefore, as described above, the enlargement by the optical zoom is performed only when the central part is determined to be bright so that the exposure time can be prevented from becoming long.

Furthermore, in the exposure time setting step SA21, a brighter part than the other part in a first image of a subject including a light emitter captured by, among K imaging elements (where K is an integer of 3 or more) included in an image sensor, only N imaging elements (where N is an integer less than K and no less than 2) evenly dispersed in the image sensor is specified as illustrated in FIG. 260. Moreover, a second image captured by only N densely arranged imaging elements corresponding to the brighter part among the K imaging elements included in the image sensor is used as input of the automatic exposure to set the exposure time. In the bright line image obtainment step SA22, an image is captured by only the N densely arrange imaging elements included in the image sensor with the set exposure time to obtain a bright line image.

By doing so, the second image can be bright as a whole through what is called the EX zoom even when the bright part is not located at the center of the first image, with the result that the exposure time can be set short.

Furthermore, in the exposure time setting step SA21, a metering position in the image of the subject captured by the image sensor is set as illustrated in FIG. 259C, and an exposure time according to brightness at the set metering position is set by the automatic exposure.

By doing so, when the bright part in the captured image is set as the metering position, processing in the automatic exposure to reduce exposure allows the exposure time to be set shorter, and thus it is possible to obtain an appropriate bright line image.

Furthermore, the reception program may further cause a computer to execute an imaging mode setting step of switching an imaging mode of the image sensor from a color imaging mode for obtaining a color image by imaging to a monochrome imaging mode for obtaining a monochrome image by imaging. In this case, in the exposure time setting step SA21, an image obtained in the monochrome imaging mode is used as input of the automatic exposure to set the exposure time.

Thus, an image obtained in the monochrome imaging mode is used as input of the automatic exposure, with the result that an appropriate exposure time can be set without influence of color information. When the exposure time is set in the monochrome imaging mode, the bright line image is obtained by imaging according to this mode. Therefore, when the light emitter transmits information only by changing in luminance, the information can be appropriately obtained.

Furthermore, in the exposure time setting step SA21, every time an image is obtained by capturing an image of the light emitter by the image sensor, the obtained image is used as input of the automatic exposure to update the exposure time of the image sensor. Here, as illustrated in Step S9234 in FIG. 259D, for example, the updating of the exposure time by the automatic exposure is brought to an end when the fluctuation range of the exposure time that is updated as needed falls below a predetermined range, and thus the exposure time is set.

Thus, when the fluctuation of the exposure time is stable, that is, when brightness of an image obtained by imaging is within a target brightness range, the exposure time set at the point is used in the imaging for obtaining a bright line image. Therefore, an appropriate bright line image can be obtained.

FIG. 261B is a block diagram of a reception device in Embodiment 10.

This reception device A20 is the above-described receiver that performs the processing illustrated in FIGS. 259A to 260, for example.

In detail, this reception device A20 is a device for receiving information from a light emitter and includes: an exposure time setting unit SA21 configured to set an exposure time of an image sensor using automatic exposure; an imaging unit A22 configured to obtain a bright line image which is an image including a plurality of bright lines corresponding to a plurality of exposure lines included in the image sensor, by capturing an image of a light emitter changing in luminance by the image sensor with the set exposure time; and a decoding unit A23 configured to obtain information by decoding a pattern of the plurality of bright lines included in the obtained bright line image. The exposure time setting unit A21 sets the sensitivity of the image sensor to the maximum value within a predetermined range for the image sensor and sets the exposure time according to the sensitivity at the maximum value by the automatic exposure. This reception device A20 can produce the same advantageous effects as the above-described reception program.

Embodiment 12

This embodiment describes each example of application using a receiver such as a smartphone and a transmitter for transmitting information as a blink pattern of an LED or an organic EL device in each of the embodiments described above.

In this embodiment, the exposure time is set for each exposure line or each imaging element.

FIGS. 262, 263, and 264 are diagrams illustrating an example of a signal reception method in Embodiment 12.

As illustrated in FIG. 262, the exposure time is set for each exposure line in an image sensor 10010*a* which is an imaging unit included in a receiver. Specifically, a long exposure time for normal imaging is set for a predetermined exposure line (white exposure lines in FIG. 262) and a short exposure time for visible light imaging is set for another exposure line (black exposure lines in FIG. 262). For example, a long exposure time and a short exposure line are alternately set for exposure lines arranged in the vertical direction. By doing so, normal imaging and visible light imaging (visible light communication) can be performed almost simultaneously upon capturing an image of a transmitter that transmits a visible light signal by changing in luminance. Note that out of the two exposure times, different exposure times may be alternately set on a per line basis, or a different exposure time may be set for each set of several lines or each of an upper part and a lower part of the image sensor 10010*a*. With the use of two exposure times in this way, combining data of images captured with the exposure lines for which the same exposure time is set results in each of a normal captured image 10010*b* and a visible light captured image 10010*c* which is a bright line image having a pattern of a plurality of bright lines. Since the normal captured image 10010*b* lacks an image portion not captured with the long exposure time (that is, an image corresponding to the exposure lines for which the short exposure time is set), the normal captured image 10010*b* is interpolated for the image portion so that a preview image 10010*d* can be displayed. Here, information obtained by visible light communication can be superimposed on the preview image 10010*d*. This information is information associated with the visible light signal, obtained by decoding the pattern of the plurality of bright lines included in the visible light captured image 10010*c*. Note that it is possible that the receiver stores, as a captured image, the normal captured image 10010*b* or an interpolated image of the normal captured image 10010*b*, and adds to the stored captured image the received visible light signal or the information associated with the visible light signal as additional information.

As illustrated in FIG. 263, an image sensor 10011*a* may be used instead of the image sensor 10010*a*. In the image sensor 10011*a*, the exposure time is set for each column of a plurality of imaging elements arranged in the direction perpendicular to the exposure lines (the column is hereinafter referred to as a vertical line) rather than for each exposure line. Specifically, a long exposure time for normal imaging is set for a predetermined vertical line (white vertical lines in FIG. 263) and a short exposure time for visible light imaging is set for another vertical line (black vertical lines in FIG. 263). In this case, in the image sensor 10011*a*, the exposure of each of the exposure lines starts at a different point in time as in the image sensor 10010*a*, but the exposure time of each imaging element included in each of the exposure lines is different. Through imaging by this image sensor 10011*a*, the receiver obtains a normal captured image 10011*b* and a visible light captured image 10011*c*. Furthermore, the receiver generates and displays a preview image 10011*d* based on this normal captured image 10011*b* and information associated with the visible light signal obtained from the visible light captured image 10011*c*.

This image sensor 10011*a* is capable of using all the exposure lines for visible light imaging unlike the image sensor 10010*a*. Consequently, the visible light captured image 10011*c* obtained by the image sensor 10011*a* includes a larger number of bright lines than in the visible light captured image 10010*c*, and therefore allows the visible light signal to be received with increased accuracy.

As illustrated in FIG. 264, an image sensor 10012*a* may be used instead of the image sensor 10010*a*. In the image sensor 10012*a*, the exposure time is set for each imaging element in such a way that the same exposure time is not set for imaging elements next to each other in the horizontal direction and the vertical direction. In other words, the exposure time is set for each imaging element in such a way that a plurality of imaging elements for which a long exposure time is set and a plurality of imaging elements for which a short exposure time is set are distributed in a grid or a checkered pattern. Also in this case, the exposure of each of the exposure lines starts at a different point in time as in the image sensor 10010*a*, but the exposure time of each imaging element included in each of the exposure lines is different. Through imaging by this image sensor 10012*a*, the receiver obtains a normal captured image 10012*b* and a visible light captured image 10012*c*. Furthermore, the receiver generates and displays a preview image 10012*d* based on this normal captured image 10012*b* and information associated with the visible light signal obtained from the visible light captured image 10012*c*.

The normal captured image 10012*b* obtained by the image sensor 10012*a* has data of the plurality of imaging elements arranged in a grid or evenly arranged, and therefore interpolation and resizing thereof can be more accurate than those of the normal captured image 10010*b* and the normal captured image 10011*b*. The visible light captured image 10012*c* is generated by imaging that uses all the exposure lines of the image sensor 10012*a*. Thus, this image sensor 10012*a* is capable of using all the exposure lines for visible light imaging unlike the image sensor 10010*a*. Consequently, as with the visible light captured image 10011*c*, the visible light captured image 10012*c* obtained by the image sensor 10012*a* includes a larger number of bright lines than in the visible light captured image 10010*c*, and therefore allows the visible light signal to be received with increased accuracy.

Interlaced display of the preview image is described below.

FIG. 265 is a diagram illustrating an example of a screen display method used by a receiver in Embodiment 12.

The receiver including the above-described image sensor 10010*a* illustrated in FIG. 262 switches, at predetermined intervals, between an exposure time that is set in an odd-numbered exposure line (hereinafter referred to as an odd line) and an exposure line that is set in an even-numbered exposure line (hereinafter referred to as an even line). For example, as illustrated in FIG. 265, at time t1, the receiver sets a long exposure time for each imaging element in the odd lines, and sets a short exposure time for each imaging element in the even lines, and an image is captured with these set exposure times. At time t2, the receiver sets a short exposure time for each imaging element in the odd lines, and sets a long exposure time for each imaging element in the even lines, and an image is captured with these set exposure times. At time t3, the receiver captures an image with the same exposure times set as those set at time t1. At time t4, the receiver captures an image with the same exposure times set as those set at time t2.

The receiver obtains Image 1 which includes captured images obtained from the plurality of odd lines (hereinafter referred to as odd-line images) and captured images obtained from the plurality of even lines (hereinafter referred to as even-line images). At this time, the exposure time for each of the even lines is short, resulting in the subject failing to appear clear in each of the even-line images. Therefore, the receiver generates interpolated line images by interpolating even-line images with pixel values. The receiver then displays a preview image including the interpolated line images instead of the even-line images. Thus, the odd-line images and the interpolated line images are alternately arranged in the preview image.

At time t2, the receiver obtains Image 2 which includes captured odd-line images and even-line images. At this time, the exposure time for each of the odd lines is short, resulting in the subject failing to appear clear in each of the odd-line images. Therefore, the receiver displays a preview image including the odd-line images of the Image 1 instead of the odd-line images of the Image 2. Thus, the odd-line images of the Image 1 and the even-line images of the Image 2 are alternately arranged in the preview image.

At time t3, the receiver obtains Image 3 which includes captured odd-line images and even-line images. At this time, the exposure time for each of the even lines is short, resulting in the subject failing to appear clear in each of the even-line images, as in the case of time t1. Therefore, the receiver displays a preview image including the even-line images of the Image 2 instead of the even-line images of the Image 3. Thus, the even-line images of the Image 2 and the odd-line images of the Image 3 are alternately arranged in the preview image. At time t4, the receiver obtains Image 4 which includes captured odd-line images and even-line images. At this time, the exposure time for each of the odd lines is short, resulting in the subject failing to appear clear in each of the odd-line images, as in the case of time t2. Therefore, the receiver displays a preview image including the odd-line images of the Image 3 instead of the odd-line images of the Image 4. Thus, the odd-line images of the Image 3 and the even-line images of the Image 4 are alternately arranged in the preview image.

In this way, the receiver displays the image including the even-line images and the odd-line images obtained at different times, that is, displays what is called an interlaced image.

The receiver is capable of displaying a high-definition preview image while performing visible light imaging. Note that the imaging elements for which the same exposure time is set may be imaging elements arranged along a direction horizontal to the exposure line as in the image sensor 10010*a*, or imaging elements arranged along a direction perpendicular to the exposure line as in the image sensor 10011*a*, or imaging elements arranged in a checkered pattern as in the image sensor 10012*a*. The receiver may store the preview image as captured image data.

Next, a spatial ratio between normal imaging and visible light imaging is described.

FIG. 266 is a diagram illustrating an example of a signal reception method in Embodiment 12.

In an image sensor 10014*b* included in the receiver, a long exposure time or a short exposure time is set for each exposure line as in the above-described image sensor 10010*a*. In this image sensor 10014*b*, the ratio between the number of imaging elements for which the long exposure time is set and the number of imaging elements for which the short exposure time is set is one to one. This ratio is a ratio between normal imaging and visible light imaging and hereinafter referred to as a spatial ratio.

In this embodiment, however, this spatial ratio does not need to be one to one. For example, the receiver may include an image sensor 10014*a*. In this image sensor 10014*a*, the number of imaging elements for which a short exposure time is set is greater than the number of imaging elements for which a long exposure time is set, that is, the spatial ratio is one to N (N>1). Alternatively, the receiver may include an image sensor 10014*c*. In this image sensor 10014*c*, the number of imaging elements for which a short exposure time is set is less than the number of imaging elements for which a long exposure time is set, that is, the spatial ratio is N (N>1) to one. It may also be that the exposure time is set for each vertical line described above, and thus the receiver includes, instead of the image sensors 10014*a* to 10014*c*, any one of image sensors 10015*a* to 10015*c* having spatial ratios of one to N, one to one, and N to one, respectively.

These image sensors 10014*a* and 10015*a* are capable of receiving the visible light signal with increased accuracy or speed because they include a large number of imaging elements for which the short exposure time is set. These image sensors 10014*c* and 10015*c* are capable of displaying a high-definition preview image because they include a large number of imaging elements for which the long exposure time is set.

Furthermore, using the image sensors 10014*a*, 10014*c*, 10015*a*, and 10015*c*, the receiver may display an interlaced image as illustrated in FIG. 265.

Next, a temporal ratio between normal imaging and visible light imaging is described.

FIG. 267 is a diagram illustrating an example of a signal reception method in Embodiment 12.

The receiver may switch the imaging mode between a normal imaging mode and a visible light imaging mode for each frame as illustrated in (a) in FIG. 267. The normal imaging mode is an image mode in which a long exposure time for normal imaging is set for all the imaging elements of the image sensor in the receiver. The visible light imaging mode is an image mode in which a short exposure time for visible light imaging is set for all the imaging elements of the image sensor in the receiver. Such switching between the long and short exposure times makes it possible to display a preview image using an image captured with the long exposure time while receiving a visible light signal using an image captured with the short exposure time.

Note that in the case of determining a long exposure time by the automatic exposure, the receiver may ignore an image captured with a short exposure time so as to perform the automatic exposure based on only brightness of an image captured with a long exposure time. By doing so, it is possible to determine an appropriate long exposure time.

Alternatively, the receiver may switch the imaging mode between the normal imaging mode and the visible light imaging mode for each set of frames as illustrated in (b) in FIG. 267. If it takes time to switch the exposure time or if it takes time for the exposure time to stabilize, changing the exposure time for each set of frames as in (b) in FIG. 267 enables the visible light imaging (reception of a visible light signal) and the normal imaging at the same time. The number of times the exposure time is switched is reduced as the number of frames included in the set increases, and thus it is possible to reduce power consumption and heat generation in the receiver.

The ratio between the number of frames continuously generated by imaging in the normal imaging mode using a long exposure time and the number of frames continuously generated by imaging in the visible light imaging mode using a short exposure time (hereinafter referred to as a temporal ratio) does not need to be one to one. That is, although the temporal ratio is one to one in the case illustrated in (a) and (b) of FIG. 267, this temporal ratio does not need to be one to one.

For example, the receiver can make the number of frames in the visible light imaging mode greater than the number of frames in the normal imaging mode as illustrated in (c) in FIG. 267. By doing so, it is possible to receive the visible light signal with increased speed. When the frame rate of the preview image is greater than or equal to a predetermined rate, a difference in the preview image depending on the frame rate is not visible to human eyes. When the imaging frame rate is sufficiently high, for example, when this frame rate is 120 fps, the receiver sets the visible light imaging mode for three consecutive frames and sets the normal imaging mode for one following frame. By doing so, it is possible to receive the visible light signal with high speed while displaying the preview image at 30 fps which is a frame rate sufficiently higher than the above predetermined rate. Furthermore, the number of switching operations is small, and thus it is possible to obtain the effects described with reference to (b) in FIG. 267.

Alternatively, the receiver can make the number of frames in the normal imaging mode greater than the number of frames in the visible light imaging mode as illustrated in (d) in FIG. 267. When the number of frames in the normal imaging mode, that is, the number of frames captured with the long exposure time, is set large as just mentioned, a smooth preview image can be displayed. In this case, there is a power saving effect because of a reduced number of times the processing of receiving a visible light signal is performed. Furthermore, the number of switching operations is small, and thus it is possible to obtain the effects described with reference to (b) in FIG. 267.

It may also be possible that, as illustrated in (e) in FIG. 267, the receiver first switches the imaging mode for each frame as in the case illustrated in (a) in FIG. 267 and next, upon completing receiving the visible light signal, increases the number of frames in the normal imaging mode as in the case illustrated in (d) in FIG. 267. By doing so, it is possible to continue searching for a new visible light signal while displaying a smooth preview image after completion of the reception of the visible light signal. Furthermore, since the number of switching operations is small, it is possible to obtain the effects described with reference to (b) in FIG. 267.

FIG. 268 is a flowchart illustrating an example of a signal reception method in Embodiment 12.

The receiver starts visible light reception which is processing of receiving a visible light signal (Step S10017*a*) and sets a preset long/short exposure time ratio to a value specified by a user (Step S10017*b*). The preset long/short exposure time ratio is at least one of the above spatial ratio and temporal ratio. A user may specify only the spatial ratio, only the temporal ratio, or values of both the spatial ratio and the temporal ratio. Alternatively, the receiver may automatically set the preset long/short exposure time ratio without depending on a ratio specified by a user.

Next, the receiver determines whether or not the reception performance is no more than a predetermined value (Step S10017*c*). When determining that the reception performance is no more than the predetermined value (Y in Step S10017*c*), the receiver sets the ratio of the short exposure time high (Step S10017*d*). By doing so, it is possible to increase the reception performance. Note that the ratio of the short exposure time is, when the spatial ratio is used, a ratio of the number of imaging elements for which the short exposure time is set to the number of imaging elements for which the long exposure time is set, and is, when the temporal ratio is used, a ratio of the number of frames continuously generated in the visible light imaging mode to the number of frames continuously generated in the normal imaging mode.

Next, the receiver receives at least part of the visible light signal and determines whether or not at least part of the visible light signal received (hereinafter referred to as a received signal) has a priority assigned (Step S10017*e*). The received signal that has a priority assigned contains an identifier indicating a priority. When determining that the received signal has a priority assigned (Step S10017*e*: Y), the receiver sets the preset long/short exposure time ratio according to the priority (Step S10017*f*). Specifically, the receiver sets the ratio of the short exposure time high when the priority is high. For example, an emergency light as a transmitter transmits an identifier indicating a high priority by changing in luminance. In this case, the receiver can increase the ratio of the short exposure time to increase the reception speed and thereby promptly display an escape route and the like.

Next, the receiver determines whether or not the reception of all the visible light signals has been completed (Step S10017*g*). When determining that the reception has not been completed (Step S10017*g*: N), the receiver repeats the processes following Step S10017*c*. In contrast, when determining that the reception has been completed (Step S10017*g*: Y), the receiver sets the ratio of the long exposure time high and effects a transition to a power saving mode (Step S10017*h*). Note that the ratio of the long exposure time is, when the spatial ratio is used, a ratio of the number of imaging elements for which the long exposure time is set to the number of imaging elements for which the short exposure time is set, and is, when the temporal ratio is used, a ratio of the number of frames continuously generated in the normal imaging mode to the number of frames continuously generated in the visible light imaging mode. This makes it possible to display a smooth preview image without performing unnecessary visible light reception.

Next, the receiver determines whether or not another visible light signal has been found (Step S10017*i*). When another visible light signal has been found (Step S10017*i*: Y), the receiver repeats the processes following Step S10017*b*.

Next, simultaneous operation of visible light imaging and normal imaging is described.

FIG. 269 is a diagram illustrating an example of a signal reception method in Embodiment 12.

The receiver may set two or more exposure times in the image sensor. Specifically, as illustrated in (a) in FIG. 269, each of the exposure lines included in the image sensor is exposed continuously for the longest exposure time of the two or more set exposure times. For each exposure line, the receiver reads out captured image data obtained by exposure of the exposure line, at a point in time when each of the above-described two or more set exposure times ends. The receiver does not reset the read captured image data until the longest exposure time ends. Therefore, the receiver records cumulative values of the read captured image data, so that the receiver will be able to obtain captured image data corresponding to a plurality of exposure times by exposure of the longest exposure time only. Note that it is optional whether the image sensor records cumulative values of captured image data. When the image sensor does not record cumulative values of captured image data, a structural element of the receiver that reads out data from the image sensor performs cumulative calculation, that is, records cumulative values of captured image data.

For example, when two exposure times are set, the receiver reads out visible light imaging data generated by exposure for a short exposure time that includes a visible light signal, and subsequently reads out normal imaging data generated by exposure for a long exposure time as illustrated in (a) in FIG. 269.

By doing so, visible light imaging which is imaging for receiving a visible light signal and normal imaging can be performed at the same time, that is, it is possible to perform the normal imaging while receiving the visible light signal. Furthermore, the use of data across exposure times allows a signal of no less than the frequency indicated by the sampling theorem to be recognized, making it possible to receive a high frequency signal, a high-density modulated signal, or the like.

When outputting captured image data, the receiver outputs a data sequence that contains the captured image data as an imaging data body as illustrated in (b) in FIG. 269. Specifically, the receiver generates the above data sequence by adding additional information to the imaging data body and outputs the generated data sequence. The additional information contains: an imaging mode identifier indicating an imaging mode (the visible light imaging or the normal imaging); an imaging element identifier for identifying an imaging element or an exposure line included in the imaging element; an imaging data number indicating a place of the exposure time of the captured image data in the order of the exposure times; and an imaging data length indicating a size of the imaging data body. In the method of reading out captured image data described with reference to (a) in FIG. 269, the captured image data is not necessarily output in the order of the exposure lines. Therefore, the additional information illustrated in (b) in FIG. 269 is added so that which exposure line the captured image data is based on can be identified.

FIG. 270A is a flowchart illustrating processing of a reception program in Embodiment 12.

This reception program is a program for causing a computer included in a receiver to execute the processing illustrated in FIGS. 262 to 269, for example.

In other words, this reception program is a reception program for receiving information from a light emitter changing in luminance. In detail, this reception program causes a computer to execute Step SA31, Step SA32, and Step SA33. In Step SA31, a first exposure time is set for a plurality of imaging elements which are a part of K imaging elements (where K is an integer of 4 or more) included in an image sensor, and a second exposure time shorter than the first exposure time is set for a plurality of imaging elements which are a remainder of the K imaging elements. In Step SA32, the image sensor captures a subject, i.e., a light emitter changing in luminance, with the set first exposure time and the set second exposure time, to obtain a normal image according to output from the plurality of imaging elements for which the first exposure time is set, and obtain a bright line image according to output from the plurality of imaging elements for which the second exposure time is set. The bright light image includes a plurality of bright lines each of which corresponds to a different one of a plurality of exposure lines included in the image sensor. In Step SA33, a pattern of the plurality of bright lines included in the obtained bright line image is decoded to obtain information.

With this, imaging is performed by the plurality of imaging elements for which the first exposure time is set and the plurality of imaging elements for which the second exposure time is set, with the result that a normal image and a bright line image can be obtained in a single imaging operation by the image sensor. That is, it is possible to capture a normal image and obtain information by visible light communication at the same time.

Furthermore, in the exposure time setting step SA31, a first exposure time is set for a plurality of imaging element lines which are a part of L imaging element lines (where L is an integer of 4 or more) included in the image sensor, and the second exposure time is set for a plurality of imaging element lines which are a remainder of the L imaging element lines. Each of the L imaging element lines includes a plurality of imaging elements included in the image sensor and arranged in a line.

With this, it is possible to set an exposure time for each imaging element line, which is a large unit, without individually setting an exposure time for each imaging element, which is a small unit, so that the processing load can be reduced.

For example, each of the L imaging element lines is an exposure line included in the image sensor as illustrated in FIG. 262. Alternatively, each of the L imaging element lines includes a plurality of imaging elements included in the image sensor and arranged along a direction perpendicular to the plurality of exposure lines as illustrated in FIG. 263.

It may be that in the exposure time setting step SA31, one of the first exposure time and the second exposure time is set for each of odd-numbered imaging element lines of the L imaging element lines included in the image sensor, to set the same exposure time for each of the odd-numbered imaging element lines, and a remaining one of the first exposure time and the second exposure time is set for each of even-numbered imaging element lines of the L imaging element lines, to set the same exposure time for each of the even-numbered imaging element lines, as illustrated in FIG. 265. In the case where the exposure time setting step SA31, the image obtainment step SA32, and the information obtainment step SA33 are repeated, in the current round of the exposure time setting step S31, an exposure time for each of the odd-numbered imaging element lines is set to an exposure time set for each of the even-numbered imaging element lines in an immediately previous round of the exposure time setting step S31, and an exposure time for each of the even-numbered imaging element lines is set to an exposure time set for each of the odd-numbered imaging element lines in the immediately previous round of the exposure time setting step S31.

With this, at every operation to obtain a normal image, the plurality of imaging element lines that are to be used in the obtainment can be switched between the odd-numbered imaging element lines and the even-numbered imaging element lines. As a result, each of the sequentially obtained normal images can be displayed in an interlaced format. Furthermore, by interpolating two continuously obtained normal images with each other, it is possible to generate a new normal image that includes an image obtained by the odd-numbered imaging element lines and an image obtained by the even-numbered imaging element lines.

It may be that in the exposure time setting step SA31, a preset mode is switched between a normal imaging priority mode and a visible light imaging priority mode, and when the preset mode is switched to the normal imaging priority mode, the total number of imaging elements for which the first exposure time is set is greater than the total number of imaging elements for which the second exposure time is set, and when the preset mode is switched to the visible light imaging priority mode, the total number of imaging elements for which the first exposure time is set is less than the total number of imaging elements for which the second exposure time is set, as illustrated in FIG. 266.

With this, when the preset mode is switched to the normal imaging priority mode, the quality of the normal image can be improved, and when the preset mode is switched to the visible light imaging priority mode, the reception efficiency for information from the light emitter can be improved.

It may be that in the exposure time setting step SA31, an exposure time is set for each imaging element included in the image sensor, to distribute, in a checkered pattern, the plurality of imaging elements for which the first exposure time is set and the plurality of imaging elements for which the second exposure time is set, as illustrated in FIG. 264.

This results in uniform distribution of the plurality of imaging elements for which the first exposure time is set and the plurality of imaging elements for which the second exposure time is set, so that it is possible to obtain the normal image and the bright line image, the quality of which is not unbalanced between the horizontal direction and the vertical direction.

FIG. 270B is a block diagram of a reception device in Embodiment 12.

This reception device A30 is the above-described receiver that performs the processing illustrated in FIGS. 262 to 269, for example.

In detail, this reception device A30 is a reception device that receives information from a light emitter changing in luminance, and includes a plural exposure time setting unit A31, an imaging unit A32, and a decoding unit A33. The plural exposure time setting unit A31 sets a first exposure time for a plurality of imaging elements which are a part of K imaging elements (where K is an integer of 4 or more) included in an image sensor, and sets a second exposure time shorter than the first exposure time for a plurality of imaging elements which are a remainder of the K imaging elements. The imaging unit A32 causes the image sensor to capture a subject, i.e., a light emitter changing in luminance, with the set first exposure time and the set second exposure time, to obtain a normal image according to output from the plurality of imaging elements for which the first exposure time is set, and obtain a bright line image according to output from the plurality of imaging elements for which the second exposure time is set. The bright line image includes a plurality of bright lines each of which corresponds to a different one of a plurality of exposure lines included in the image sensor. The decoding unit A33 obtains information by decoding a pattern of the plurality of bright lines included in the obtained bright line image. This reception device A30 can produce the same advantageous effects as the above-described reception program.

Next, displaying of content related to a received visible light signal is described.

FIGS. 271 and 272 are diagrams illustrating an example of what is displayed on a receiver when a visible light signal is received.

The receiver captures an image of a transmitter 10020*d* and then displays an image 10020*a* including the image of the transmitter 10020*d* as illustrated in (a) in FIG. 271. Furthermore, the receiver generates an image 10020*b* by superimposing an object 10020*e* on the image 10020*a* and displays the image 10020*b*. The object 10020*e* is an image indicating a location of the transmitter 10020*d* and that a visible light signal is being received from the transmitter 10020*d*. The object 10020*e* may be an image that is different depending on the reception status for the visible light signal (such as a state in which a visible light signal is being received or the transmitter is being searched for, an extent of reception progress, a reception speed, or an error rate). For example, the receiver changes a color, a line thickness, a line type (single line, double line, dotted line, etc.), or a dotted-line interval of the object 1020*e*. This allows a user to recognize the reception status. Next, the receiver generates an image 10020*c* by superimposing on the image 10020*a* an obtained data image 10020*f* which represents content of obtained data, and displays the image 10020*c*. The obtained data is the received visible light signal or data associated with an ID indicated by the received visible light signal.

Upon displaying this obtained data image 10020*f*, the receiver displays the obtained data image 10020*f* in a speech balloon extending from the transmitter 10020*d* as illustrated in (a) in FIG. 271, or displays the obtained data image 10020*f* near the transmitter 10020*d*. Alternatively, the receiver may display the obtained data image 10020*f* in such a way that the obtained data image 10020*f* can be displayed gradually closer to the transmitter 10020*d* as illustrated in (b) of FIG. 271. This allows a user to recognize which transmitter transmitted the visible light signal on which the obtained data image 10020*f* is based. Alternatively, the receiver may display the obtained data image 10020*f* as illustrated in FIG. 272 in such a way that the obtained data image 10020*f* gradually comes in from an edge of a display of the receiver. This allows a user to easily recognize that the visible light signal was obtained at that time.

Next, Augmented Reality (AR) is described.

FIG. 273 is a diagram illustrating a display example of the obtained data image 10020*f*.

When the image of the transmitter moves on the display, the receiver moves the obtained data image 10020*f* according to the movement of the image of the transmitter. This allows a user to recognize that the obtained data image 10020*f* is associated with the transmitter. The receiver may alternatively display the obtained data image 10020*f* in association with something different from the image of the transmitter. With this, data can be displayed in AR.

Next, storing and discarding the obtained data is described.

FIG. 274 is a diagram illustrating an operation example for storing or discarding obtained data.

For example, when a user swipes the obtained data image 10020*f* down as illustrated in (a) in FIG. 274, the receiver stores obtained data represented by the obtained data image 10020*f*. The receiver positions the obtained data image 10020*f* representing the obtained data stored, at an end of arrangement of the obtained data image representing one or more pieces of other obtained data already stored. This allows a user to recognize that the obtained data represented by the obtained data image 10020*f* is the obtained data stored last. For example, the receiver positions the obtained data image 10020*f* in front of any other one of obtained data images as illustrated in (a) in FIG. 274.

When a user swipes the obtained data image 10020*f* to the right as illustrated in (b) in FIG. 274, the receiver discards obtained data represented by the obtained data image 10020*f*. Alternatively, it may be that when a user moves the receiver so that the image of the transmitter goes out of the frame of the display, the receiver discards obtained data represented by the obtained data image 10020*f*. Here, all the upward, downward, leftward, and rightward swipes produce the same or similar effect as that described above. The receiver may display a swipe direction for storing or discarding. This allows a user to recognize that data can be stored or discarded with such operation.

Next, browsing of obtained data is described.

FIG. 275 is a diagram illustrating an example of what is displayed when obtained data is browsed.

In the receiver, obtained data images of a plurality of pieces of obtained data stored are displayed on top of each other, appearing small, in a bottom area of the display as illustrated in (a) in FIG. 275. When a user taps a part of the obtained data images displayed in this state, the receiver displays an expanded view of each of the obtained data images as illustrated in (b) in FIG. 275. Thus, it is possible to display an expanded view of each obtained data only when it is necessary to browse the obtained data, and efficiently use the display to display other content when it is not necessary to browse the obtained data.

When a user taps the obtained data image that is desired to be displayed in a state illustrated in (b) in FIG. 275, a further expanded view of the obtained data image tapped is displayed as illustrated in (c) in FIG. 275 so that a large amount of information is displayed out of the obtained data image. Furthermore, when a user taps a back-side display button 10024*a*, the receiver displays the back side of the obtained data image, displaying other data related to the obtained data.

Next, turning off of an image stabilization function upon self-position estimation is described.

By disabling (turning off) the image stabilization function or converting a captured image according to an image stabilization direction and an image stabilization amount, the receiver is capable of obtaining an accurate imaging direction and accurately performing self-position estimation. The captured image is an image captured by an imaging unit of the receiver. Self-position estimation means that the receiver estimates its position. Specifically, in the self-position estimation, the receiver identifies a position of a transmitter based on a received visible light signal and identifies a relative positional relationship between the receiver and the transmitter based on the size, position, shape, or the like of the transmitter appearing in a captured image. The receiver then estimates a position of the receiver based on the position of the transmitter and the relative positional relationship between the receiver and the transmitter.

The transmitter moves out of the frame due to even a little shake of the receiver at the time of partial read-out illustrated in, for example, FIG. 262, in which an image is captured only with the use of a part of the exposure lines, that is, when imaging illustrated in, for example, FIG. 262, is performed. In such a case, the receiver enables the image stabilization function and thereby can continue signal reception.

Next, self-position estimation using an asymmetrically shaped light emitting unit is described.

FIG. 276 is a diagram illustrating an example of a transmitter in Embodiment 12.

The above-described transmitter includes a light emitting unit and causes the light emitting unit to change in luminance to transmit a visible light signal. In the above-described self-position estimation, the receiver determines, as a relative positional relationship between the receiver and the transmitter, a relative angle between the receiver and the transmitter based on the shape of the transmitter (specifically, the light emitting unit) in a captured image. Here, in the case where the transmitter includes a light emitting unit 10090*a* having a rotationally symmetrical shape as illustrated in, for example, FIG. 276, the determination of a relative angle between the transmitter and the receiver based on the shape of the transmitter in a captured image as described above cannot be accurate. Thus, it is desirable that the transmitter include a light emitting unit having a non-rotationally symmetrical shape. This allows the receiver to accurately determine the above-described relative angle. This is because a bearing sensor for obtaining an angle has a wide margin of error in measurement; therefore, the use of the relative angle determined in the above-described method allows the receiver to perform accurate self-position estimation.

The transmitter may include a light emitting unit 10090*b*, the shape of which is not a perfect rotation symmetry as illustrated in FIG. 276. The shape of this light emitting unit 10090*b* is symmetrical at 90 degree rotation, but not perfect rotational symmetry. In this case, the receiver determines a rough angle using the bearing sensor and can further use the shape of the transmitter in a captured image to uniquely limit the relative angle between the receiver and the transmitter, and thus it is possible to perform accurate self-position estimation.

The transmitter may include a light emitting unit 10090*c* illustrated in FIG. 276. The shape of this light emitting unit 10090*c* is basically rotational symmetry. However, with a light guide plate or the like placed in a part of the light emitting unit 10090*c*, the light emitting unit 10090*c* is formed into a non-rotationally symmetrical shape.

The transmitter may include a light emitting unit 10090*d* illustrated in FIG. 276. This light emitting unit 10090*d* includes lightings each having a rotationally symmetrical shape. These lightings are arranged in combination to form the light emitting unit 10090*d*, and the whole shape thereof is not rotationally symmetrical. Therefore, the receiver is capable of performing accurate self-position estimation by capturing an image of the transmitter. It is not necessary that all the lightings included in the light emitting unit 10090*d* are each a lighting for visible light communication which changes in luminance for transmitting a visible light signal; it may be that only a part of the lightings is the lighting for visible light communication.

The transmitter may include a light emitting unit 10090*e* and an object 10090*f* illustrated in FIG. 276. The object 10090*f* is an object configured such that its positional relationship with the light emitting unit 10090*e* does not change (e.g., a fire alarm or a pipe). The shape of the combination of the light emitting unit 10090*e* and the object 10090*f* is not rotationally symmetrical. Therefore, the receiver is capable of performing self-position estimation with accuracy by capturing images of the light emitting unit 10090*e* and the object 10090*f*.

Next, time-series processing of the self-position estimation is described.

Every time the receiver captures an image, the receiver can perform the self-position estimation based on the position and the shape of the transmitter in the captured image. As a result, the receiver can estimate a direction and a distance in which the receiver moved while capturing images. Furthermore, the receiver can perform triangulation using frames or images to perform more accurate self-position estimation. By combining the results of estimation using images or the results of estimation using different combinations of images, the receiver is capable of performing the self-position estimation with higher accuracy. At this time, the results of estimation based on the most recently captured images are combined with a high priority, making it possible to perform the self-position estimation with higher accuracy.

Next, skipping read-out of optical black is described.

FIG. 277 is a diagram illustrating an example of a reception method in Embodiment 12. In the graph illustrated in FIG. 277, the horizontal axis represents time, and the vertical axis represents a position of each exposure line in the image sensor. A solid arrow in this graph indicates a point in time when exposure of each exposure line in the image sensor starts (an exposure timing).

The receiver reads out a signal of horizontal optical black as illustrated in (a) in FIG. 277 at the time of normal imaging, but can skip reading out a signal of horizontal optical black as illustrated in (b) of FIG. 277. By doing so, it is possible to continuously receive visible light signals.

The horizontal optical black is optical black that extends in the horizontal direction with respect to the exposure line. Vertical optical black is part of the optical black that is other than the horizontal optical black.

The receiver adjusts the black level based on a signal read out from the optical black and therefore, at a start of visible light imaging, can adjust the black level using the optical black as does at the time of normal imaging. Continuous signal reception and black level adjustment are possible when the receiver is designed to adjust the black level using only the vertical optical black if the vertical optical black is usable. The receiver may adjust the black level using the horizontal optical black at predetermined time intervals during continuous visible light imaging. In the case of alternately performing the normal imaging and the visible light imaging, the receiver skips reading out a signal of horizontal optical black when continuously performing the visible light imaging, and reads out a signal of horizontal optical black at a time other than that. The receiver then adjusts the black level based on the read-out signals and thus can adjust the black level while continuously receiving visible light signals. The receiver may adjust the black level assuming that the darkest part of a visible light captured image is black.

Thus, it is possible to continuously receive visible light signals when the optical black from which signals are read out is the vertical optical black only. Furthermore, with a mode for skipping reading out a signal of the horizontal optical black, it is possible to adjust the black level at the time of normal imaging and perform continuous communication according to the need at the time of visible light imaging. Moreover, by skipping reading out a signal of the horizontal optical black, the difference in timing of starting exposure between the exposure lines increases, with the result that a visible light signal can be received even from a transmitter that appears small in the captured image.

Next, an identifier indicating a type of the transmitter is described.

The transmitter may transmit a visible light signal after adding to the visible light signal a transmitter identifier indicating the type of the transmitter. In this case, the receiver is capable of performing a reception operation according to the type of the transmitter at the point in time when the receiver receives the transmitter identifier. For example, when the transmitter identifier indicates a digital signage, the transmitter transmits, as a visible light signal, a content ID indicating which content is currently displayed, in addition to a transmitter ID for individual identification of the transmitter. Based on the transmitter identifier, the receiver can handle these IDs separately to display information associated with the content currently displayed by the transmitter. Furthermore, for example, when the transmitter identifier indicates a digital signage, an emergency light, or the like, the receiver captures an image with increased sensitivity so that reception errors can be reduced.

Embodiment 13

This embodiment describes each example of application using a receiver such as a smartphone and a transmitter for transmitting information as a blink pattern of an LED or an organic EL device in each of the embodiments described above.

First, a header pattern in this embodiment is described.

FIG. 278 is a diagram illustrating an example of a header pattern in this embodiment.

The transmitter divides data to be transmitted into packets and transmits the packets. A packet is made up of a header and a body, for example. A luminance change pattern of the header, that is, a header pattern, needs to be a luminance change pattern that does not exist in the body. With this, it is possible to identify a position of a packet in data to be continuously transmitted.

For example, data to be transmitted is modulated using a 4 PPM scheme. Specifically, in this 4 PPM, data to be transmitted is modulated into a luminance change pattern having four slots, one of which indicates "0" and the other three of which indicate "1." Therefore, when data to be continuously transmitted is modulated, the number of continuous slots indicating "0" is no more than two, and the number of slots indicating "0" in four slots and next four slots is no more than two.

In this embodiment, the header pattern is represented as "111111111000" indicated in (a) in FIG. 278, "111111110001" indicated in (b) in FIG. 278, "111111101001" indicated in (c) in FIG. 278, or "111111100101" indicated in (d) in FIG. 278. With this, the header and the data to be continuously transmitted (i.e., the body) can be identified. Specifically, in the header pattern indicated in (a) in FIG. 278, the last four slots "1000" of the header pattern can show that the four slots are a part of the header. In this case, the receiver can easily recognize a change in luminance because the number of slots indicating "0" in the header is three and the largest number of continuous slots indicating "0" is four. This means that the receiver can easily receive data from a small transmitter or a distant transmitter.

In the header pattern indicated in (b) in FIG. 278, the last five slots "10001" of the header pattern can show that the five slots are a part of the header. In this case, flicker due to a change in luminance can be reduced because the largest number of continuous slots indicating "0" is three, which is fewer than in the case of (a) in FIG. 278. As a result, the load on a circuit of the transmitter or the request for design therefore can be reduced. That is, it is possible to downsize the capacitor, reducing the power consumption, the calorific value, or the load on the power supply.

In the header pattern indicated in (c) or (d) in FIG. 278, the last six slots "101001" or "100101" of the header pattern can show that the six slots are a part of the header. In this case, flicker due to a change in luminance can be further reduced because the largest number of continuous slots indicating "0" is two, which is still fewer than in the case of (b) in FIG. 278.

FIG. 279 is a diagram for describing an example of a packet structure in a communication protocol in this embodiment.

The transmitter divides data to be transmitted into packets and transmits the packets. A packet is made up of a header, an address unit, a data unit, and an error correction code unit. When the header has a luminance change pattern that does not exist in the other part, it is possible to identify a position of a packet in continuous data. Part of the divided data is stored into the data unit. An address indicating which part of the whole the data in the data unit is present is stored into the address unit. A code for detecting or correcting a reception error of part of a packet or the whole packet (which is specifically ECC1, ECC2, or ECC3 illustrated in FIG. 279 and are collectively referred to as an error correction code) is stored into the error correction code unit.

The ECC1 is an error correction code of the address unit. When the error correction code of the address unit is provided rather than the error correction code of the whole packet, the reliability of the address unit can be higher than the reliability of the whole packet. With this, when a plurality of packets have been received, data units of packets that have the same address are compared so that the data units can be verified, allowing for a reduction in the reception error rate. The same or similar advantageous effects can be produced when the error correction code of the address unit is longer than the error correction code of the data unit.

Each of the ECC2 and the ECC3 is an error correction code of the data unit. The number of error correction code units may be other than two. When the data unit has a plurality of error correction codes, it is possible to perform error correction using only the error correction code for a part successfully received so far, and thus it is possible to receive highly reliable data even when the packet has not been fully received.

The transmitter may be configured to transmit a predetermined number of error correction codes or less. This allows the receiver to receive data with high speed. This transmission method is effective for a transmitter having a light emitting unit which is small in size and high in luminance, such as a downlighting. This is because when the luminance is high, the error probability is low, meaning that there is no need for many error correction codes. In the case of a failure to transmit the ECC3, the header in next transmission starts with the ECC2, resulting in a high luminance state continuing over four or more slots, and thus the receiver can recognize that this part is not ECC 3.

Note that the header, the address unit, and the ECC1 are transmitted with a frequency lower than the data unit, the ECC2, and the ECC3 as illustrated in (b) in FIG. 279. Conversely, the data unit, the ECC2, and the ECC3 are transmitted with a frequency higher than the header, the address unit, and the ECC1. With this, it is possible to reduce the reception error rate of data such as the header, and it is also possible to transmit a large amount of data in the data unit with high speed.

A reception method in which data units having the same addresses are compared is described below.

FIG. 280 is a flowchart illustrating an example of a reception method in this embodiment.

The receiver receives a packet (Step S10101) and performs error correction (Step S10102). The receiver then determines whether or not a packet having the same address as the address of the received packet has already been received (Step S10103). When determining that a packet having the same address has been received (Step S10103: Y), the receiver compares data in these packets. The receiver determines whether or not the data units are identical (Step S10104). When determining that the data units are not identical (Step S10104: N), the receiver further determines whether or not the number of differences between the data units is a predetermined number or more, specifically, whether or not the number of different bits or the number of slots indicating different luminance states is a predetermined number or more (Step S10105). When determining that the number of differences is the predetermined number or more (Step S10105: N), the receiver discards the already received packet (Step S10106). By doing so, when a packet from another transmitter starts being received, interference with the packet received from a previous transmitter can be avoided. In contrast, when determining that the number of differences is not the predetermined number or more (Step S10105: N), the receiver regards, as data of the address, data of the data unit of packets having an identical data unit, the number of which is largest (Step S10107). Alternatively, the receiver regards identical bits, the number of which is largest, as a value of a bit of the address. Still alternatively, the receiver demodulates data of the address, regarding an identical luminance state, the number of which is largest, as a luminance state of a slot of the address.

A reception method of demodulating data of the data unit based on a plurality of packets is described.

FIG. 281 is a flowchart illustrating an example of a reception method in this embodiment.

First, the receiver receives a packet (Step S10111) and performs error correction on the address unit (Step S10112). Here, the receiver does not demodulate the data unit and retains pixel values in the captured image as they are. The receiver then determines whether or not no less than a predetermined number of packets out of the already received packets have the same address (Step S10113). When determining that no less than the predetermined number of packets have the same address (Step S10113: Y), the receiver performs a demodulation process on a combination of pixel values corresponding to the data units in the packets having the same address. Since these packets have been received at different points in time, each of the pixel values for the data units reflects luminance of the transmitter that is at a slightly different point in time. Therefore, the part subject to the above-described demodulation process will contain a larger amount of data (a larger number of samples) than the data unit in a single packet. This makes it possible to demodulate the data unit with higher accuracy. Furthermore, the increase in the number of samples makes it possible to demodulate a signal modulated with a higher modulation frequency.

As illustrated in (b) in FIG. 279, the data unit and the error correction code unit for the data unit are modulated with a higher frequency than the header unit, the address unit, and the error correction code unit for the address unit. In the above-described demodulation method, data following the data unit can be demodulated even when the data has been modulated with a high modulation frequency. With this configuration, it is possible to shorten the time for the whole packet to be transmitted, and it is possible to receive a visible light signal with higher speed from far away and from a smaller light source.

Next, a reception method of receiving data of a variable length address is described.

FIG. 282 is a flowchart illustrating an example of a reception method in this embodiment.

The receiver receives packets (Step S10121), and determines whether or not a packet containing the data unit in which all the bits are zero (hereinafter referred to as a 0-end packet) has been received (Step S10122). When determining that the packet has been received, that is, when determining that a 0-end packet is present (Step S10122: Y), the receiver determines whether or not all the packets having addresses following the address of the 0-end packet are present, that is, have been received (Step S10123). Note that the address of a packet to be transmitted later among packets generated by dividing data to be transmitted is assigned a larger value. When determining that all the packets have been received (Step S10123: Y), the receiver determines that the address of the 0-end packet is the last address of the packets to be transmitted from the transmitter. The receiver then reconstructs data by combining data of all the packets having the addresses up to the 0-end packet (Step S10124). In addition, the receiver checks the reconstructed data for an error (Step S10125). By doing so, even when it is not known how many parts the data to be transmitted has been divided into, that is, when the address has a variable length rather than a fixed length, data having a variable-length address can be transmitted and received, meaning that it is possible to efficiently transmit and receive more IDs than with data having a fixed-length address.

Next, a reception method using an exposure time longer than a period of a modulation frequency is described.

FIGS. 283 and 284 are each a diagram for describing a reception method in which a receiver in this embodiment uses an exposure time longer than a period of a modulation frequency (a modulation period).

For example, as illustrated in (a) in FIG. 283, there is a case where the visible light signal cannot be properly received when the exposure time is set to time equal to a modulation period. Note that the modulation period is a length of time for one slot described above. Specifically, in such a case, the number of exposure lines that reflect a luminance state in a particular slot (black exposure lines in FIG. 283) is small. As a result, when there happens to be much noise in pixel values of these exposure lines, it is difficult to estimate luminance of the transmitter.

In contrast, the visible light signal can be properly received when the exposure time is set to time longer than the modulation period as illustrated in (b) in FIG. 283, for example. Specifically, in such a case, the number of exposure lines that reflect luminance in a particular slot is large, and therefore it is possible to estimate luminance of the transmitter based on pixel values of a large number of exposure lines, resulting in high resistance to noise.

However, when the exposure time is too long, the visible light signal cannot be properly received.

For example, as illustrated in (a) in FIG. 284, when the exposure time is equal to the modulation period, a luminance change (that is, a change in pixel value of each exposure line) received by the receiver follows a luminance change used in the transmission. However, as illustrated in (b) in FIG. 284, when the exposure time is three times as long as the modulation period, a luminance change received by the receiver cannot fully follow a luminance change used in the transmission. Furthermore, as illustrated in (c) in FIG. 284, when the exposure time is 10 times as long as the modulation period, a luminance change received by the receiver cannot at all follow a luminance change used in the transmission. To sum up, when the exposure time is longer, luminance can be estimated based on a larger number of exposure lines and therefore noise resistance increases, but a longer exposure time causes a reduction in identification margin or a reduction in the noise resistance due to the reduced identification margin. Considering the balance between these effects, the exposure time is set to time that is approximately two to five times as long as the modulation period, so that the highest noise resistance can be obtained.

Next, the number of packets after division is described.

FIG. 285 is a diagram indicating an efficient number of divisions relative to a size of transmission data.

When the transmitter transmits data by changing in luminance, the data size of one packet will be large if all pieces of data to be transmitted (transmission data) are included in the packet. However, as described with reference to FIG. 279, when the transmission data is divided into data parts and each of these data parts is included in a packet, the data size of the packet is small. The receiver receives this packet by imaging. As the data size of the packet increases, the receiver has more difficulty in receiving the packet in a single imaging operation, and needs to repeat the imaging operation.

Therefore, it is desirable that as the data size of the transmission data increases, the transmitter increase the number of divisions in the transmission data as illustrated in (a) and (b) in FIG. 285. However, when the number of divisions is too large, the transmission data cannot be reconstructed unless all the data parts are received, resulting in lower reception efficiency.

Therefore, as illustrated in (a) in FIG. 285, when the data size of the address (address size) is variable and the data size of the transmission data is 2 to 16 bits, 16 to 24 bits, 24 to 64 bits, 66 to 78 bits, 78 bits to 128 bits, and 128 bits or more, the transmission data is divided into 1 to 2, 2 to 4, 4, 4 to 6, 6 to 8, and 7 or more data parts, respectively, so that the transmission data can be efficiently transmitted in the form of visible light signals. As illustrated in (b) in FIG. 285, when the data size of the address (address size) is fixed to 4 bits and the data size of the transmission data is 2 to 8 bits, 8 to 16 bits, 16 to 30 bits, 30 to 64 bits, 66 to 80 bits, 80 to 96 bits, 96 to 132 bits, and 132 bits or more, the transmission data is divided into 1 to 2, 2 to 3, 2 to 4, 4 to 5, 4 to 7, 6, 6 to 8, and 7 or more data parts, respectively, so that the transmission data can be efficiently transmitted in the form of visible light signals.

The transmitter sequentially changes in luminance based on packets containing respective ones of the data parts. For example, according to the sequence of the addresses of packets, the transmitter changes in luminance based on the packets. Furthermore, the transmitter may change in luminance again based on data parts of the packets according to a sequence different from the sequence of the addresses. This allows the receiver to reliably receive each of the data parts.

Next, a method of setting a notification operation by the receiver is described.

FIG. 286A is a diagram illustrating an example of a setting method in this embodiment.

First, the receiver obtains, from a server near the receiver, a notification operation identifier for identifying a notification operation and a priority of the notification operation identifier (specifically, an identifier indicating the priority) (Step S10131). The notification operation is an operation of the receiver to notify a user using the receiver that packets containing data parts have been received, when the packets have been transmitted by way of luminance change and then received by the receiver. For example, this operation is making sound, vibration, indication on a display, or the like.

Next, the receiver receives packetized visible light signals, that is, packets containing respective data parts (Step S10132). The receiver obtains a notification operation identifier and a priority of the notification operation identifier (specifically, an identifier indicating the priority) which are included in the visible light signals (Step S10133).

Furthermore, the receiver reads out setting details of a current notification operation of the receiver, that is, a notification operation identifier preset in the receiver and a priority of the notification operation identifier (specifically, an identifier indicating the priority) (Step S10134). Note that the notification operation identifier preset in the receiver is one set by an operation by a user, for example.

The receiver then selects an identifier having the highest priority from among the preset notification operation identifier and the notification operation identifiers respectively obtained in Step S10131 and Step S10133 (Step S10135). Next, the receiver sets the selected notification operation identifier in the receiver itself to operate as indicated by the selected notification operation identifier, notifying a user of the reception of the visible light signals (Step S10136).

Note that the receiver may skip one of Step S10131 and Step S10133 and select a notification operation identifier with a higher priority from among two notification operation identifiers.

Note that a high priority may be assigned to a notification operation identifier transmitted from a server installed in a theater, a museum, or the like, or a notification operation identifier included in the visible light signal transmitted inside these facilities. With this, it can be made possible that sound for receipt notification is not played inside the facilities regardless of settings set by a user. In other facilities, a low priority is assigned to the notification operation identifier so that the receiver can operate according to settings set by a user to notify a user of signal reception.

FIG. 286B is a diagram illustrating an example of a setting method in this embodiment.

First, the receiver obtains, from a server near the receiver, a notification operation identifier for identifying a notification operation and a priority of the notification operation identifier (specifically, an identifier indicating the priority) (Step S10141). Next, the receiver receives packetized visible light signals, that is, packets containing respective data parts (Step S10142). The receiver obtains a notification operation identifier and a priority of the notification operation identifier (specifically, an identifier indicating the priority) which are included in the visible light signals (Step S10143).

Furthermore, the receiver reads out current setting details of notification operation of the receiver, that is, a notification operation identifier preset in the receiver and a priority of the notification operation identifier (specifically, an identifier indicating the priority) (Step S10144).

The receiver then determines whether or not an operation notification identifier indicating an operation that prohibits notification sound reproduction is included in the preset notification operation identifier and the notification operation identifiers respectively obtained in Step S10141 and Step S10143 (Step S10145). When determining that the operation notification identifier is included (Step S10145: Y), the receiver outputs a notification sound for notifying a user of completion of the reception (Step 10146). In contrast, when determining that the operation notification identifier is not included (Step S10145: N), the receiver notifies a user of completion of the reception by vibration, for example (Step S10147).

Note that the receiver may skip one of Step S10141 and Step S10143 and determine whether or not an operation notifying identifier indicating an operation that prohibits notification sound reproduction is included in two notification operation identifiers.

Furthermore, the receiver may perform self-position estimation based on a captured image and notify a user of the reception by an operation associated with the estimated position or facilities located at the estimated position.

FIG. 287A is a flowchart illustrating processing of an image processing program in Embodiment 13.

This information processing program is a program for causing the light emitter of the above-described transmitter to change in luminance according to the number of divisions illustrated in FIG. 285.

In other words, this information processing program is an information processing program that causes a computer to process information to be transmitted, in order for the information to be transmitted by way of luminance change. In detail, this information processing program causes a computer to execute: an encoding step SA41 of encoding the information to generate an encoded signal; a dividing step SA42 of dividing the encoded signal into four signal parts when a total number of bits in the encoded signal is in a range of 24 bits to 64 bits; and an output step SA43 of sequentially outputting the four signal parts. Note that each of these signal parts is output in the form of the packet illustrated in (a) in FIG. 279. Furthermore, this information processing program may cause a computer to identify the number of bits in the encoded signal and determine the number of signal parts based on the identified number of bits. In this case, the information processing program causes the computer to divide the encoded signal into the determined number of signal parts.

Thus, when the number of bits in the encoded signal is in the range of 24 bits to 64 bits, the encoded signal is divided into four signal parts, and the four signal parts are output. As a result, the light emitter changes in luminance according to the outputted four signal parts, and these four signal parts are transmitted in the form of visible light signals and received by the receiver. As the number of bits in an output signal increases, the level of difficulty for the receiver to properly receive the signal by imaging increases, meaning that the reception efficiency is reduced. Therefore, it is desirable that the signal have a small number of bits, that is, a signal be divided into small signals. However, when a signal is too finely divided into many small signals, the receiver cannot receive the original signal unless it receives all the small signals individually, meaning that the reception efficiency is reduced. Therefore, when the number of bits in the encoded signal is in the range of 24 bits to 64 bits, the encoded signal is divided into four signal parts and the four signal parts are sequentially output as described above. By doing so, the encoded signal representing the information to be transmitted can be transmitted in the form of a visible light signal with the best reception efficiency. As a result, it is possible to enable communication between various devices.

In the output step SA43, it may be that the four signal parts are output in a first sequence and then, the four signal parts are output in a second sequence different from the first sequence.

By doing so, since these four signals parts are repeatedly output in different sequences, these four signal parts can be received with still higher efficiency when each of the output signals is transmitted to the receiver in the form of a visible light signal. In other words, if the four signal parts are repeatedly output in the same sequence, there are cases where the receiver fails to receive the same signal part, but it is possible to reduce these cases by changing the output sequence.

Furthermore, the four signal parts may be each assigned a notification operation identifier and output in the output step SA43 as indicated in FIGS. 286A and 286B. The notification operation identifier is an identifier for identifying an operation of the receiver by which a user using the receiver is notified that the four signal parts have been received when the four signal parts have been transmitted by way of luminance change and received by the receiver.

With this, in the case where the notification operation identifier is transmitted in the form of a visible light signal and received by the receiver, the receiver can notify a user of the reception of the four signal parts according to an operation identified by the notification operation identifier. This means that a transmitter that transmits information to be transmitted can set a notification operation to be performed by a receiver.

Furthermore, the four signal parts may be each assigned with a priority identifier for identifying a priority of the notification operation identifier and output in the output step SA43 as indicated in FIGS. 286A and 286B.

With this, in the case where the priority identifier and the notification operation identifier are transmitted in the form of visible light signals and received by the receiver, the receiver can handle the notification operation identifier according to the priority identified by the priority identifier. This means that when the receiver obtained another notification operation identifier, the receiver can select, based on the priority, one of the notification operation identified by the notification operation identifier transmitted in the form of the visible light signal and the notification operation identified by the other notification operation identifier.

FIG. 287B is a block diagram of an information processing apparatus in Embodiment 13.

This information processing apparatus A40 is an apparatus for causing the light emitter (the light emitting unit) of the above-described transmitter to change in luminance according to the number of divisions illustrated in FIG. 285.

In other words, this information processing apparatus A40 is an apparatus that processes information to be transmitted, in order for the information to be transmitted by way of luminance change. In detail, this information processing apparatus A40 includes: an encoding unit A41 that encodes the information to generate an encoded signal; a dividing unit that divides the encoded signal into four signal parts when a total number of bits in the encoded signal is in a range of 24 bits to 64 bits; and an output unit A43 that sequentially outputs the four signal parts. The information processing apparatus A40 can produce the same advantageous effects as the above-described information processing program.

Next, registration of a network connection of an electronic device is described.

FIG. 288 is a diagram for describing an example of application of a transmission and reception system in this embodiment.

This transmission and reception system includes: a transmitter 10131*b* configured as an electronic device such as a washing machine, for example; a receiver 10131*a* configured as a smartphone, for example, and a communication device 10131*c* configured as an access point or a router.

FIG. 289 is a flowchart illustrating processing operation of a transmission and reception system in this embodiment.

When a start button is pressed (Step S10165), the transmitter 10131*b* transmits, via Wi-Fi, Bluetooth®, Ethernet®, or the like, information for connecting to the transmitter itself, such as SSID, password, IP address, MAC address, or decryption key (Step S10166), and then waits for connection. The transmitter 10131*b* may directly transmit these pieces of information, or may indirectly transmit these pieces of information. In the case of indirectly transmitting these pieces of information, the transmitter 10131*b* transmits ID associated with these pieces of information. When the receiver 10131*a* receives the ID, the receiver 10131*a* then downloads, from a server or the like, information associated with the ID, for example.

The receiver 10131*a* receives the information (Step S10151), connects to the transmitter 10131*b*, and transmits to the transmitter 10131*b* information for connecting to the communication device 10131*c* configured as an access point or a router (such as SSID, password, IP address, MAC address, or decryption key) (Step S10152). The receiver 10131*a* registers, with the communication device 10131*c*, information for the transmitter 10131*b* to connect to the communication device 10131*c* (such as MAC address, IP address, or decryption key), to have the communication device 10131*c* wait for connection. Furthermore, the receiver 10131*a* notifies the transmitter 10131*b* that preparation for connection from the transmitter 10131*b* to the communication device 10131*c* has been completed (Step S10153).

The transmitter 10131*b* disconnects from the receiver 10131*a* (Step S10168) and connects to the communication device 10131*c* (Step S10169). When the connection is successful (Step S10170: Y), the transmitter 10131*b* notifies the receiver 10131*a* that the connection is successful, via the communication device 10131*c*, and notifies a user that the connection is successful, by an indication on the display, an LED state, sound, or the like (Step S10171). When the connection fails (Step S10170: N), the transmitter 10131*b* notifies the receiver 10131*a* that the connection fails, via the visible light communication, and notifies a user that the connection fails, using the same means as in the case where the connection is successful (Step S10172). Note that the visible light communication may be used to notify that the connection is successful.

The receiver 10131*a* connects to the communication device 10131*c* (Step S10154), and when the notifications to the effect that the connection is successful and that the connection fails (Step S10155: N and Step S10156: N) are absent, the receiver 10131*a* checks whether or not the transmitter 10131*b* is accessible via the communication device 10131*c* (Step S10157). When the transmitter 10131*b* is not accessible (Step S10157: N), the receiver 10131*a* determines whether or not no less than a predetermined number of attempts to connect to the transmitter 10131*b* using the information received from the transmitter 10131*b* have been made (Step S10158). When determining that the number of attempts is less than the predetermined number (Step S10158: N), the receiver 10131*a* repeats the processes following Step S10152. In contrast, when the number of attempts is no less than the predetermined number (Step S10158: Y), the receiver 10131*a* notifies a user that the processing fails (Step S10159). When determining in Step S10156 that the notification to the effect that the connection is successful is present (Step S10156: Y), the receiver 10131*a* notifies a user that the processing is successful (Step S10160). Specifically, using an indication on the display, sound, or the like, the receiver 10131*a* notifies a user whether or not the connection from the transmitter 10131*b* to the communication device 10131*c* has been successful. By doing so, it is possible to connect the transmitter 10131*b* to the communication device 10131*c* without requiring for cumbersome input from a user.

Next, registration of a network connection of an electronic device (in the case of connection via another electronic device) is described.

FIG. 290 is a diagram for describing an example of application of a transmission and reception system in this embodiment.

This transmission and reception system includes: an air conditioner 10133*b*; a transmitter 10133*c* configured as an electronic device such as a wireless adaptor or the like connected to the air conditioner 10133*b*; a receiver 10133*a* configured as a smartphone, for example; a communication device 10133*d* configured as an access point or a router; and another electronic device 10133*e* configured as a wireless adaptor, a wireless access point, a router, or the like, for example.

FIG. 291 is a flowchart illustrating processing operation of a transmission and reception system in this embodiment. Hereinafter, the air conditioner 10133*b* or the transmitter 10133*c* is referred to as an electronic device A, and the electronic device 10133*e* is referred to as an electronic device B.

First, when a start button is pressed (Step S10188), the electronic device A transmits information for connecting to the electronic device A itself (such as individual ID, password, IP address, MAC address, or decryption key) (Step S10189), and then waits for connection (Step S10190). The electronic device A may directly transmit these pieces of information, or may indirectly transmit these pieces of information, in the same manner as described above.

The receiver 10133*a* receives the information from the electronic device A (Step S10181) and transmits the information to the electronic device B (Step S10182). When the electronic device B receives the information (Step S10196), the electronic device B connects to the electronic device A according to the received information (Step S10197). The electronic device B determines whether or not connection to the electronic device A has been established (Step S10198), and notifies the receiver 10133*a* of the result (Step 10199 or Step S101200).

When the connection to the electronic device B is established within a predetermine time (Step S10191: Y), the electronic device A notifies the receiver 10133*a* that the connection is successful, via the electronic device B (Step S10192), and when the connection fails (Step S10191: N), the electronic device A notifies the receiver 10133*a* that the connection fails, via the visible light communication (Step S10193). Furthermore, using an indication on the display, a light emitting state, sound, or the like, the electronic device A notifies a user whether or not the connection is successful. By doing so, it is possible to connect the electronic device A (the transmitter 10133*c*) to the electronic device B (the electronic device 10133*e*) without requiring for cumbersome input from a user. Note that the air conditioner 10133*b* and the transmitter 10133*c* illustrated in FIG. 290 may be integrated together and likewise, the communication device 10133*d* and the electronic device 10133*e* illustrated in FIG. 290 may be integrated together.

Next, transmission of proper imaging information is described.

FIG. 292 is a diagram for describing an example of application of a transmission and reception system in this embodiment.

This transmission and reception system includes: a receiver 10135*a* configured as a digital still camera or a digital video camera, for example; and a transmitter 10135*b* configured as a lighting, for example.

FIG. 293 is a flowchart illustrating processing operation of a transmission and reception system in this embodiment.

First, the receiver 10135*a* transmits an imaging information transmission instruction to the transmitter 10135*b* (Step S10211). Next, when the transmitter 10135*b* receives the imaging information transmission instruction, when an imaging information transmission button is pressed, when an imaging information transmission switch is ON, or when a power source is turned ON (Step S10221: Y), the transmitter 10135*b* transmits imaging information (Step S10222). The imaging information transmission instruction is an instruction to transmit imaging information. The imaging information indicates a color temperature, a spectrum distribution, illuminance, or luminous intensity distribution of a lighting, for example. The transmitter 10135*b* may directly transmit the imaging information, or may indirectly transmit the imaging information. In the case of indirectly transmitting the imaging information, the transmitter 10135*b* transmits ID associated with the imaging information. When the receiver 10135*a* receives the ID, the receiver 10135*a* then downloads, from a server or the like, the imaging information associated with the ID, for example. At this time, the transmitter 10135*b* may transmit a method for transmitting a transmission stop instruction to the transmitter 10135*b* itself (e.g., a frequency of radio waves, infrared rays, or sound waves for transmitting a transmission stop instruction, or SSID, password, or IP address for connecting to the transmitter 10135*b* itself).

When the receiver 10135*a* receives the imaging information (Step S10212), the receiver 10135*a* transmits the transmission stop instruction to the transmitter 10135*b* (Step S10213). When the transmitter 10135*b* receives the transmission stop instruction from the receiver 10135*a* (Step S10223), the transmitter 10135*b* stops transmitting the imaging information and uniformly emits light (Step S10224).

Furthermore, the receiver 10135*a* sets an imaging parameter according to the imaging information received in Step S10212 (Step S10214) or notifies a user of the imaging information. The imaging parameter is, for example, white balance, an exposure time, a focal length, sensitivity, or a scene mode. With this, it is possible to capture an image with optimum settings according to a lighting. Next, after the transmitter 10135*b* stops transmitting the imaging information (Step S10215: Y), the receiver 10135*a* captures an image (Step S10216). Thus, it is possible to capture an image while a subject does not change in brightness for signal transmission. Note that after Step S10216, the receiver 10135*a* may transmit to the transmitter 10135*b* a transmission start instruction to request to start transmission of the imaging information (Step S10217).

Next, an indication of a state of charge is described.

FIG. 294 is a diagram for describing an example of application of a transmitter in this embodiment.

For example, a transmitter 10137*b* configured as a charger includes a light emitting unit, and transmits from the light emitting unit a visible light signal indicating a state of charge of a battery. With this, a costly display device is not needed to allow a user to be notified of a state of charge of the battery. When a small LED is used as the light emitting unit, the visible light signal cannot be received unless an image of the LED is captured from a nearby position. In the case of a transmitter 10137*c* which has a protrusion near the LED, the protrusion becomes an obstacle for closeup of the LED. Therefore, it is easier to receive a visible light signal from the transmitter 10137*b* having no protrusion near the LED than a visible light signal from the transmitter 10137*c*.

Embodiment 14

This embodiment describes each example of application using a receiver such as a smartphone and a transmitter for transmitting information as a blink pattern of an LED or an organic EL in each of the embodiments described above.

First, transmission in a demo mode and upon malfunction is described.

FIG. 295 is a diagram for describing an example of operation of a transmitter in this embodiment.

When an error occurs, the transmitter transmits a signal indicating that an error has occurred or a signal corresponding to an error code so that the receiver can be notified that an error has occurred or of details of an error. The receiver takes an appropriate measure according to details of an error so that the error can be corrected or the details of the error can be properly reported to a service center.

In the demo mode, the transmitter transmits a demo code. With this, during a demonstration of a transmitter as a product in a store, for example, a customer can receive a demo code and obtain a product description associated with the demo code. Whether or not the transmitter is in the demo mode can be determined based on the fact that the transmitter is set to the demo mode, that a CAS card for the store is inserted, that no CAS card is inserted, or that no recording medium is inserted.

Next, signal transmission from a remote controller is described.

FIG. 296 is a diagram for describing an example of operation of a transmitter in this embodiment.

For example, when a transmitter configured as a remote controller of an air conditioner receives main-unit information, the transmitter transmits the main-unit information so that the receiver can receive from the nearby transmitter the information on the distant main unit. The receiver can receive information from a main unit located at a site where the visible light communication is unavailable, for example, across a network.

Next, a process of transmitting information only when the transmitter is in a bright place is described.

FIG. 297 is a diagram for describing an example of operation of a transmitter in this embodiment.

The transmitter transmits information when the brightness in its surrounding area is no less than a predetermined level, and stops transmitting information when the brightness falls below the predetermined level. By doing so, for example, a transmitter configured as an advertisement on a train can automatically stop its operation when the car enters a train depot. Thus, it is possible to reduce battery power consumption.

Next, content distribution according to an indication on the transmitter (changes in association and scheduling) is described.

FIG. 298 is a diagram for describing an example of operation of a transmitter in this embodiment.

The transmitter associates, with a transmission ID, content to be obtained by the receiver in line with the timing at which the content is displayed. Every time the content to be displayed is changed, a change in the association is registered with the server.

When the timing at which the content to be displayed is displayed is known, the transmitter sets the server so that other content is transmitted to the receiver according to the timing of a change in the content to be displayed. When the server receives from the receiver a request for content associated with the transmission ID, the server transmits to the receiver corresponding content according to the set schedule.

By doing so, for example, when content displayed by a transmitter configured as a digital signage changes one after another, the receiver can obtain content that corresponds to the content displayed by the transmitter.

Next, content distribution corresponding to what is displayed by the transmitter (synchronization using a time point) is described.

FIG. 299 is a diagram for describing an example of operation of a transmitter in this embodiment.

The server holds previously registered settings to transfer different content at each time point in response to a request for content associated with a predetermined ID.

The transmitter synchronizes the server with a time point, and adjusts timing to display content so that a predetermined part is displayed at a predetermined time point.

By doing so, for example, when content displayed by a transmitter configured as a digital signage changes one after another, the receiver can obtain content that corresponds to the content displayed by the transmitter.

Next, content distribution corresponding to what is displayed by the transmitter (transmission of a display time point) is described.

FIG. 300 is a diagram for describing an example of operation of a transmitter and a receiver in this embodiment.

The transmitter transmits, in addition to the ID of the transmitter, a display time point of content being displayed. The display time point of content is information with which the content currently being displayed can be identified, and can be represented by an elapsed time from a start time point of the content, for example.

The receiver obtains from the server content associated with the received ID and displays the content according to the received display time point. By doing so, for example, when content displayed by a transmitter configured as a digital signage changes one after another, the receiver can obtain content that corresponds to the content displayed by the transmitter.

Furthermore, the receiver displays content while changing the content with time. By doing so, even when content being displayed by the transmitter changes, there is no need to renew signal reception to display content corresponding to displayed content.

Next, data upload according to a grant status of a user is described.

FIG. 301 is a diagram for describing an example of operation of a receiver in this embodiment.

In the case where a user has a registered account, the receiver transmits to the server the received ID and information to which the user granted access upon registering the account or other occasions (such as position, telephone number, ID, installed applications, etc. of the receiver, or age, sex, occupation, preferences, etc. of the user).

In the case where a user has no registered account, the above information is transmitted likewise to the server when the user has granted uploading of the above information, and when the user has not granted uploading of the above information, only the received ID is transmitted to the server.

With this, a user can receive content suitable to a reception situation or own personality, and as a result of obtaining information on a user, the server can make use of the information in data analysis.

Next, running of an application for reproducing content is described.

FIG. 302 is a diagram for describing an example of operation of a receiver in this embodiment.

The receiver obtains from the server content associated with the received ID. When an application currently running supports the obtained content (the application can displays or reproduces the obtained content), the obtained content is displayed or reproduced using the application currently running. When the application does not support the obtained content, whether or not any of the applications installed on the receiver supports the obtained content is checked, and when an application supporting the obtained content has been installed, the application is started to display and reproduce the obtained content. When all the applications installed do not support the obtained content, an application supporting the obtained content is automatically installed, or an indication or a download page is displayed to prompt a user to install an application supporting the obtained content, for example, and after the application is installed, the obtained content is displayed and reproduced.

By doing so, the obtained content can be appropriately supported (displayed, reproduced, etc.).

Next, running of a designated application is described.

FIG. 303 is a diagram for describing an example of operation of a receiver in this embodiment.

The receiver obtains, from the server, content associated with the received ID and information designating an application to be started (an application ID). When the application currently running is a designated application, the obtained content is displayed and reproduced. When a designated application has been installed on the receiver, the designated application is started to display and reproduce the obtained content. When the designated application has not been installed, the designated application is automatically installed, or an indication or a download page is displayed to prompt a user to install the designated application, for example, and after the designated application is installed, the obtained content is displayed and reproduced.

The receiver may be designed to obtain only the application ID from the server and start the designated application.

The receiver may be configured with designated settings. The receiver may be designed to start the designated application when a designated parameter is set.

Next, selecting between streaming reception and normal reception is described.

FIG. 304 is a diagram for describing an example of operation of a receiver in this embodiment.

When a predetermined address of the received data has a predetermined value or when the received data contains a predetermined identifier, the receiver determines that signal transmission is streaming distribution, and receives signals by a streaming data reception method. Otherwise, a normal reception method is used to receive the signals.

By doing so, signals can be received regardless of which method, streaming distribution or normal distribution, is used to transmit the signals.

Next, private data is described.

FIG. 305 is a diagram for describing an example of operation of a receiver in this embodiment.

When the value of the received ID is within a predetermined range or when the received ID contains a predetermined identifier, the receiver refers to a table in an application and when the table has the reception ID, content indicated in the table is obtained. Otherwise, content identified by the reception ID is obtained from the server.

By doing so, it is possible to receive content without registration with the server. Furthermore, response can be quick because no communication is performed with the server.

Next, setting of an exposure time according to a frequency is described.

FIG. 306 is a diagram for describing an example of operation of a receiver in this embodiment.

The receiver detects a signal and recognizes a modulation frequency of the signal. The receiver sets an exposure time according to a period of the modulation frequency (a modulation period). For example, the exposure time is set to a value substantially equal to the modulation frequency so that signals can be more easily received. When the exposure time is set to an integer multiple of the modulation frequency or an approximate value (roughly plus/minus 30%) thereof, for example, convolutional decoding can facilitate reception of signals.

Next, setting of an optimum parameter in the transmitter is described.

FIG. 307 is a diagram for describing an example of operation of a receiver in this embodiment.

The receiver transmits, to the server, data received from the transmitter, and current position information, information related to a user (address, sex, age, preferences, etc.), and the like. The server transmits to the receiver a parameter for the optimum operation of the transmitter according to the received information. The receiver sets the received parameter in the transmitter when possible. When not possible, the parameter is displayed to prompt a user to set the parameter in the transmitter.

With this, it is possible to operate a washing machine in a manner optimized according to the nature of water in a district where the transmitter is used, or to operate a rice cooker in such a way that rice is cooked in an optimal way for the kind of rice used by a user, for example.

Next, an identifier indicating a data structure is described.

FIG. 308 is a diagram for describing an example of a structure of transmission data in this embodiment.

Information to be transmitted contains an identifier, the value of which shows to the receiver a structure of a part following the identifier. For example, it is possible to identify a length of data, kind and length of an error correction code, a dividing point of data, and the like.

This allows the transmitter to change the kind and length of data body, the error correction code, and the like according to characteristics of the transmitter, a communication path, and the like. Furthermore, the transmitter can transmit a content ID in addition to an ID of the transmitter, to allow the receiver to obtain an ID corresponding to the content ID.

Embodiment 15

This embodiment describes each example of application using a receiver such as a smartphone and a transmitter for transmitting information as a blink pattern of an LED or an organic EL device in each of the embodiments described above.

FIG. 309 is a diagram for describing operation of a receiver in this embodiment.

A receiver 1210*a* in this embodiment switches the shutter speed between high and low speeds, for example, on a frame-by-frame basis when performing continuous imaging by using an image sensor. The receiver 1210*a* further switches, based on a frame obtained by the imaging, a process for the frame between a barcode recognition process and a visible light recognition process. The barcode recognition process is a process for decoding a barcode shown on a frame obtained at a low shutter speed. The visible light recognition process is a process for decoding the above-described bright line pattern shown on a frame obtained at a high shutter speed.

The receiver 1210*a* includes a video input unit 1211, a barcode/visible light identification unit 1212, a barcode recognition unit 1212*a*, a visible light recognition unit 1212*b*, and an output unit 1213.

The video input unit 1211 includes an image sensor, and switches a shutter speed for imaging with the image sensor. Specifically, the video input unit 1211 alternately switches the shutter speed between low and high speeds on, for example, a frame-by-frame basis. More specifically, the video input unit 1211 switches the shutter speed to high speed for an odd-numbered frame and to low speed for an even-numbered frame. Imaging at a low shutter speed is imaging in the normal imaging mode described above, and imaging at a high shutter speed is imaging in the visible light communication mode described above. That is, at a low shutter speed, the exposure time of each of the exposure lines included in the image sensor is long, and a normal captured image in which the subject is shown is obtained as a frame. At a high shutter speed, the exposure time of each of the exposure lines included in the image sensor is short, and a visible light communication image in which the bright lines described above are shown is obtained as a frame.

The barcode/visible light identification unit 1212 determines whether or not a barcode appears in an image obtained by the video input unit 1211 or whether or not bright lines appear in an image obtained by the video input unit 1211 to switch the process for the image. For example, when a barcode appears in a frame obtained by imaging at a low shutter speed, the barcode/visible light identification unit 1212 causes the barcode recognition unit 1212*a* to execute a process for the image. When bright lines appear in an image obtained by imaging at a high shutter speed, the barcode/visible light identification unit 1212 causes the visible light recognition unit 1212*b* to execute a process for the image.

The barcode recognition unit 1212*a* decodes a barcode shown on a frame obtained by imaging at a low shutter speed. The barcode recognition unit 1212*a* obtains barcode data (e.g., a barcode identifier) as a result of the decoding, and outputs the barcode identifier to the output unit 1213. The barcode may be a one-dimensional code or a two-dimensional code (e.g., QR (registered trademark) code).

The visible light recognition unit 1212*b* decodes a bright line pattern shown on a frame obtained by imaging at a high shutter speed. The visible light recognition unit 1212*b* obtains visible light data (e.g., a visible light identifier) as a result of the decoding, and outputs the visible light identifier to the output unit 1213. The visible light data corresponds to the visible light signal described above.

The output unit 1213 displays only frames obtained by imaging at low shutter speeds. In the case where the subject to be imaged by the video input unit 1211 is a barcode, the output unit 1213 displays the barcode. In the case where the subject to be imaged by the video input unit 1211 is a digital signage or any other product configured to transmit a visible light signal, the output unit 1213 displays an image of the digital signage without displaying a bright line pattern. Upon obtaining a barcode identifier, the output unit 1213 obtains information associated with the barcode identifier from, for example, a server and displays the information. Upon obtaining a visible light identifier, the output unit 1213 obtains information associated with the visible light identifier from, for example, a server and displays the information.

In the receiver 1210*a* in this embodiment, switching between the barcode recognition process and the visible light recognition process enables the decoding of a barcode and also enables the reception of a visible light signal. The switching also enables a reduction in power consumption.

A receiver in this embodiment may perform an image recognition process, instead of a barcode recognition process, simultaneously with a visible light recognition process.

FIG. 310A is a diagram for describing other operation of the receiver in this embodiment.

A receiver 1210*b* in this embodiment switches the shutter speed between high and low speeds, for example, on a frame-by-frame basis when performing continuous imaging by using an image sensor. The receiver 1210*b* further performs an image recognition process and the visible light recognition process described above simultaneously on an image (frame) obtained by the imaging. The image recognition process is a process for recognizing a subject shown in a frame obtained at a low shutter speed.

The receiver 1210*b* includes a video input unit 1211, an image recognition unit 1212*c*, a visible light recognition unit 1212*b*, and an output unit 1215.

The video input unit 1211 includes an image sensor, and switches a shutter speed for imaging with the image sensor. Specifically, the video input unit 1211 alternately switches the shutter speed between low and high speeds, for example, on a frame-by-frame basis. More specifically, the video input unit 1211 switches the shutter speed to high speed for an odd-numbered frame and to low speed for an even-numbered frame. Imaging at a low shutter speed is imaging in the normal imaging mode described above, and imaging at a high shutter speed is imaging in the visible light communication mode described above. That is, at a low shutter speed, the exposure time of each of the exposure lines included in the image sensor is long, and a normal captured image in which the subject is shown is obtained as a frame. At a high shutter speed, the exposure time of each of the exposure lines included in the image sensor is short, and a visible light communication image in which the bright lines described above are shown is obtained as a frame.

The image recognition unit 1212*c* recognizes a subject appearing in a frame obtained by imaging at a low shutter speed, and identifies the position of the subject in the frame. In the consequence of the recognition of the subject, the image recognition unit 1212*c* determines whether or not the subject is an object to be displayed in augmented reality (AR) (hereinafter referred to as an "AR object"). When the image recognition unit 1212*c* determines that the subject is an AR object, the image recognition unit 1212*c* generates image recognition data that is data (e.g., the position of the subject, an AR marker, etc.) for displaying information on the subject, and outputs the AR marker to the output unit 1215.

Like the output unit 1213 described above, the output unit 1215 displays only frames obtained by imaging at low shutter speeds. Thus, in the case where the subject to be imaged by the video input unit 1211 is a digital signage or any other product configured to transmit a visible light signal, the output unit 1213 displays an image of the digital signage without displaying a bright line pattern. Upon obtaining image recognition data from the image recognition unit 1212*c*, the output unit 1215 superimposes a white frame indicator surrounding the subject on the frame in accordance with the position of the subject in the frame, which is specified in the image recognition data.

FIG. 310B is a diagram illustrating an example of an indicator displayed by the output unit 1215.

The output unit 1215 superimposes a white frame indicator 1215*b* surrounding an image 1215*a* of the subject, which is configured as, for example, a digital signage, on the frame. That is, the output unit 1215 displays the indicator 1215*b* indicating the subject whose image has been recognized. Furthermore, upon obtaining a visible light identifier from the visible light recognition unit 1212*b*, the output unit 1215 changes the color of the indicator 1215*b* from white to red, for example.

FIG. 310C is a diagram illustrating an example of an AR view.

The output unit 1215 further obtains information on the subject, which is associated with the visible light identifier, from, for example, a server or the like as related information. The output unit 1215 writes the related information to an AR marker 1215*c* indicated by the image recognition data, and displays the AR marker 1215*c* in which the related information is written, in association with the image 1215*a* of the subject in the frame.

The receiver 1210*b* in this embodiment simultaneously executes the image recognition process and the visible light recognition process, thereby making AR based on visible light communication feasible. Like the receiver 1210*b*, the receiver 1210*a* illustrated in FIG. 310A may also display the indicator 1215*b* illustrated in FIG. 310B. In this case, when a barcode is recognized in a frame obtained by imaging at a low shutter speed, the receiver 1210*a* displays a white frame indicator 1215*b* surrounding the barcode. When the barcode is decoded, the receiver 1210*a* changes the color of the indicator 1215*b* from white to red. Likewise, when a bright line pattern is recognized in a frame obtained by imaging at a high shutter speed, the receiver 1210*a* identifies a part of the low-speed frame corresponding to the part in which the bright line pattern is located. For instance, a digital signage is transmitting a visible light signal. In this case, an image of the digital signage in the low-speed frame is identified. The low-speed frame is a frame obtained by imaging at a low shutter speed. The receiver 1210*a* displays the white frame indicator 1215*b* surrounding the identified part of the low-speed frame (e.g., the image of the digital signage) in such a way that the white frame indicator 1215*b* is superimposed on the low-speed frame. When the bright line pattern is decoded, the receiver 1210*a* changes the color of the indicator 1215*b* from white to red.

FIG. 311A is a diagram for describing an example of a transmitter in this embodiment.

A transmitter 1220*a* in this embodiment transmits a visible light signal synchronously with a transmitter 1230. Specifically, at the timing when the transmitter 1230 transmits a visible light signal, the transmitter 1220*a* transmits the same visible light signal as the visible light signal transmitted from the transmitter 1230. The transmitter 1230 includes a light emitting unit 1231, and transmits a visible light signal in accordance with a change in the luminance of the light emitting unit 1231.

The transmitter 1220*a* includes a light receiving unit 1221, a signal analysis unit 1222, a transmission clock adjustment unit 1223*a*, and a light emitting unit 1224. The light emitting unit 1224 transmits the same visible light signal as the visible light signal transmitted from the transmitter 1230, by changing luminance. The light receiving unit 1221 receives visible light from the transmitter 1230, and accordingly receives a visible light signal from the transmitter 1230. The signal analysis unit 1222 analyzes the visible light signal received by the light receiving unit 1221, and transmits the analysis result to the transmission clock adjustment unit 1223*a*. The transmission clock adjustment unit 1223*a* adjusts the timing of a visible light signal to be transmitted from the light emitting unit 1224, in accordance with the analysis result. Specifically, the transmission clock adjustment unit 1223*a* adjusts the timing of the luminance change of the light emitting unit 1224 so that the timing of transmission of a visible light signal from the light emitting unit 1231 of the transmitter 1230 matches the timing of transmission of a visible light signal from the light emitting unit 1224.

This allows the waveform of the visible light signal transmitted by the transmitter 1220*a* and the waveform of the visible light signal transmitted by the transmitter 1230 to match in terms of timing.

FIG. 311B is a diagram for describing another example of a transmitter in this embodiment.

Like the transmitter 1220*a*, a transmitter 1220*b* in this embodiment transmits a visible light signal synchronously with the transmitter 1230. Specifically, at the timing when the transmitter 1230 transmits a visible light signal, the transmitter 1220*b* transmits the same visible light signal as the visible light signal transmitted from the transmitter 1230.

The transmitter 1220*b* includes a first light receiving unit 1221*a*, a second light receiving unit 1221*b*, a comparison unit 1225, a transmission clock adjustment unit 1223*b*, and a light emitting unit 1224.

Like the light receiving unit 1221, the first light receiving unit 1221*a* receives visible light from the transmitter 1230, and accordingly receives a visible light signal from the transmitter 1230. The second light receiving unit 1221*b* receives visible light from the light emitting unit 1224. The comparison unit 1225 compares a first timing at which the first light receiving unit 1221*a* receives visible light with a second timing at which the second light receiving unit 1221*b* receives visible light. The comparison unit 1225 then outputs the difference between the first timing and the second timing (i.e., a delay time) to the transmission clock adjustment unit 1223*b*. The transmission clock adjustment unit 1223*b* adjusts the timing of a visible light signal to be transmitted from the light emitting unit 1224 so as to reduce the delay time.

This allows the waveform of the visible light signal transmitted by the transmitter 1220*b* and the waveform of the visible light signal transmitted by the transmitter 1230 to more accurately match in terms of timing.

In the examples illustrated in FIGS. 311A and 311B, two transmitters transmit the same visible light signal. Alternatively, two transmitters may transmit different visible light signals. That is, in the case where two transmitters transmit the same visible light signal, the transmitters are synchronized with each other, as described above. In the case where two transmitters transmit different visible light signals, only a first transmitter of the two transmitters transmits a visible light signal while a second transmitter of the two transmitters is uniformly illuminated or extinguished. Thereafter, the first transmitter is uniformly illuminated or extinguished while only the second transmitter transmits a visible light signal. Note that the two transmitters may transmit different visible light signals simultaneously.

FIG. 312A is a diagram for describing an example of synchronous transmission from a plurality of transmitters in this embodiment.

As illustrated in FIG. 312A, a plurality of transmitters 1220 in this embodiment are arranged in a line, for example. Each of the transmitters 1220 has the same configuration as that of the transmitter 1220*a* illustrated in FIG. 311A or the transmitter 1220*b* illustrated in FIG. 311B. Each of the plurality of transmitters 1220 transmits a visible light signal synchronously with one of the adjacent transmitters 1220.

This configuration allows many transmitters to synchronously transmit visible light signals.

FIG. 312B is a diagram for describing an example of synchronous transmission from a plurality of transmitters in this embodiment.

One of the plurality of transmitters 1220 in this embodiment is used as a standard on which synchronous transmission of visible light signals is based, and the remaining transmitters 1220 transmit visible light signals in accordance with the standard.

This configuration allows many transmitters to more accurately synchronously transmit visible light signals.

FIG. 313 is a diagram for describing another example of synchronous transmission from a plurality of transmitters in this embodiment.

Each of a plurality of transmitters 1240 in this embodiment receives a synchronous signal, and transmits a visible light signal in accordance with the synchronous signal. Accordingly, visible light signals are synchronously transmitted from the plurality of transmitters 1240.

Specifically, each of the plurality of transmitters 1240 includes a control unit 1241, a synchronous control unit 1242, a photocoupler 1243, an LED driving circuit 1244, an LED 1245, and a photodiode 1246.

The control unit 1241 receives a synchronous signal, and outputs the synchronous signal to the synchronous control unit 1242.

The LED 1245 is a light source that emits visible light. The LED 1245 blinks (or changes in luminance) in accordance with the control of the LED driving circuit 1244. Accordingly, a visible light signal is transmitted from the LED 1245 to outside the transmitter 1240.

The photocoupler 1243 transfers a signal between the synchronous control unit 1242 and the LED driving circuit 1244 while providing electrical isolation therebetween. Specifically, the photocoupler 1243 transmits to the LED driving circuit 1244*a* below-mentioned transmission start signal transmitted from the synchronous control unit 1242.

Upon receiving a transmission start signal from the synchronous control unit 1242 via the photocoupler 1243, the LED driving circuit 1244 causes the LED 1245 to start the transmission of a visible light signal at the timing of reception of the transmission start signal.

The photodiode 1246 detects visible light emitted from the LED 1245, and outputs a detection signal indicating the detection of the visible light to the synchronous control unit 1242.

Upon receiving a synchronous signal from the control unit 1241, the synchronous control unit 1242 transmits a transmission start signal to the LED driving circuit 1244 via the photocoupler 1243. The transmission of the transmission start signal triggers the start of the transmission of a visible light signal. Furthermore, upon receiving a detection signal from the photodiode 1246 in response to the transmission of the visible light signal, the synchronous control unit 1242 calculates a delay time that is a difference between the time when the detection signal is received from the photodiode 1246 and the time when the synchronous signal is received from the control unit 1241. Upon receiving the subsequent synchronous signal from the control unit 1241, the synchronous control unit 1242 adjusts the timing of transmission of the subsequent transmission start signal in accordance with the calculated delay time. That is, the synchronous control unit 1242 adjusts the timing of transmission of the subsequent transmission start signal so that a delay time for the subsequent synchronous signal is equal to a set delay time determined in advance. The synchronous control unit 1242 transmits the subsequent transmission start signal at the adjusted timing.

FIG. 314 is a diagram for describing signal processing performed in the transmitter 1240.

Upon receiving a synchronous signal, the synchronous control unit 1242 generates a delay-time setting signal for producing a delay-time setting pulse at the required timing. The phrase "receiving a synchronous signal" specifically refers to receiving a synchronous pulse. That is, the synchronous control unit 1242 generates a delay-time setting signal so that the delay-time setting pulse rises at the time when the set delay time described above elapses after the fall of the synchronous pulse.

Then, the synchronous control unit 1242 transmits a transmission start signal to the LED driving circuit 1244 via the photocoupler 1243 at the timing delayed from the fall of the synchronous pulse by a previously obtained correction value N. Consequently, the LED driving circuit 1244 drives the LED 1245 to transmit a visible light signal. The synchronous control unit 1242 receives a detection signal from the photodiode 1246 at the timing delayed from the fall of the synchronous pulse by the sum of a specific delay time and the correction value N. In other words, the transmission of a visible light signal is started at that timing. This timing is hereinafter referred to as the "transmission start timing". The specific delay time is a delay time caused by a circuit such as the photocoupler 1243, and is a delay time that is generated even when the synchronous control unit 1242 transmits a transmission start signal immediately upon receipt of a synchronous signal.

The synchronous control unit 1242 identifies, as a modified correction value N, a time difference from the transmission start timing to the rise of the delay-time setting pulse. The synchronous control unit 1242 calculates a correction value (N+1) using the following equation: correction value (N+1)=(correction value N)+(modified correction value N). The synchronous control unit 1242 then holds the correction value (N+1). Accordingly, the synchronous control unit 1242, when receiving the subsequent synchronous signal (synchronous pulse), transmits a transmission start signal to the LED driving circuit 1244 at the timing delayed from the fall of the synchronous pulse by the correction value (N+1). The modified correction value N may be a positive or negative value.

Accordingly, each of the plurality of transmitters 1240 transmits a visible light signal after a lapse of a set delay time from the reception of a synchronous signal (synchronous pulse), enabling accurately synchronous transmission of visible light signals. That is, variations of a specific delay time caused by a circuit such as the photocoupler 1243 between the plurality of transmitters 1240 would not influence synchronous transmission of visible light signals from the plurality of transmitters 1240, and the synchronous transmission can be accurately achieved.

An LED driving circuit has large power consumption, and is electrically isolated from a control circuit that handles synchronous signals by using a photocoupler or the like. Such a use of a photocoupler makes it difficult to synchronize the transmission of visible light signals from a plurality of transmitters due to the variations of the specific delay time described above. In each of the plurality of transmitters 1240 in this embodiment, in contrast, the photodiode 1246 detects the timing of light emission from the LED 1245, and the synchronous control unit 1242 detects a delay time from a synchronous signal. The delay time is adjusted so as to be equal to a preset delay time (the set delay time described above). Thus, for example, even if individual variations occur between photocouplers included in a plurality of transmitters each configured as an LED lighting device, visible light signals (e.g., visible light IDs) can be transmitted accurately synchronously from the plurality of LED lighting devices.

The LED lighting device may be turned on or off in a period other than the visible light signal transmission period. In the case where the LED lighting device is turned on in a period other than the visible light signal transmission period, the first falling edge of the visible light signal may be detected. In the case where the LED lighting device is turn off in a period other than the visible light signal transmission period, the first rising edge of the visible light signal may be detected.

In the example described above, the transmitter 1240 transmits a visible light signal each time the transmitter 1240 receives a synchronous signal. Alternatively, the transmitter 1240 may transmit a visible light signal without receiving a synchronous signal. That is, the transmitter 1240 may be only required to transmit a visible light signal once in response to the receipt of a synchronous signal to sequentially transmit visible light signals without receiving a synchronous signal. Specifically, the transmitter 1240 may sequentially transmit a visible light signal twice to several thousands of times for a single reception of a synchronous signal. Alternatively, the transmitter 1240 may transmit a visible light signal once every 100 ms or once every several seconds in accordance with a synchronous signal.

In the case where a visible light signal is repeatedly transmitted in accordance with a synchronous signal, the set delay time described above may impair continuity of light emission of the LED 1245. In other words, a slightly long blanking period may occur. Consequently, the blinking of the LED 1245 may be visually perceived by a person. So-called flicker may occur. To address this issue, the transmitter 1240 may transmit a visible light signal in accordance with a synchronous signal in a period of 60 Hz or more. This causes rapid blinking, and such blinking is less likely to be perceived by a person. Accordingly, occurrence of flicker can be suppressed. Alternatively, the transmitter 1240 may transmit a visible light signal in accordance with a synchronous signal in a sufficiently long period such as once every several minutes. This may cause blinking to be perceived by a person, but the blinking can be prevented from being perceived repeatedly and continuously, which may make a person feel less uncomfortable.

Pre-Processing of Reception Method

FIG. 315 is a flowchart illustrating an example of a reception method in this embodiment. FIG. 316 is a diagram for describing an example of a reception method in this embodiment.

First, a receiver calculates an average value of the pixel values of a plurality of pixels arranged in a direction parallel to exposure lines (step S1211). According to the central limit theorem, averaging the pixel values of N pixels yields an expected value of N raised to the power of minus ½ for the amount of noise, improving the SN ratio.

Then, the receiver removes a change in pixel value in a portion where the pixel values change differently for each individual color while leaving a portion where the pixel values change identically in the vertical direction for all the colors (step S1212). In the case where a transmission signal (visible light signal) is expressed by a luminance of a light emitting unit included in a transmitter, a backlight of a display or a lighting device which is a transmitter changes in luminance. In this case, the pixel values change in the same direction for all the colors, as in a portion illustrated in (b) in FIG. 316. In portions illustrated in (a) and (c) in FIG. 316, the pixel values change differently for each individual color. In the portions illustrated in (a) and (c) in FIG. 316, the pixel values fluctuate due to the reception noise or depending on a picture of a display or a signage. The removal of the fluctuation of the pixel values can improve the SN ratio.

Then, the receiver determines luminance values (step S1213). Since luminance is less susceptible to changes in color, the influence of a picture of a display or a signage can be eliminated, improving the SN ratio.

Then, the receiver applies a low-pass filter to the luminance values (step S1214). In the reception method in this embodiment, since a moving average filter is applied in accordance with the length of the exposure time, substantially no signal is included in the high frequency domain and noise becomes dominant. Thus, the use of a low-pass filter that cuts high frequencies can improve the SN ratio. Since the signal components are dominant up to a frequency that is the reciprocal of the exposure time, frequencies equal to or higher than that frequency are cut off, enhancing the effect of improving the SN ratio. When the number of frequency components included in a signal is finite, frequencies equal to or higher than that frequency are cut off, improving the SN ratio. A filter free of frequency oscillating components (such as a Butterworth filter) is suitable as a low-pass filter.

Reception Method Using Maximum Likelihood Decoding

FIG. 317 is a flowchart illustrating another example of a reception method in this embodiment. FIGS. 318 and 319 are diagrams for describing the other example of the reception method in this embodiment. Referring to FIGS. 318 and 319, a description will now be made of a reception method in the case where the exposure time is longer than the transmission period.

The most accurate reception is achievable when the exposure time is an integer multiple of the transmission period. Even if the exposure time is not an integer multiple of the transmission period, reception is feasible as long as the exposure time is within a range of approximately (N±0.33) times the transmission period (where N is an integer).

First, the receiver sets a transmission/reception offset to 0 (step S1221). The transmission/reception offset is a value for correcting a shift between the transmission timing and the reception timing. Since the shift is unknown, the receiver checks possible values of the transmission/reception offset while slightly changing the values, and employs the most reasonable value as a transmission/reception offset.

Then, the receiver determines whether or not the transmission/reception offset is less than the transmission period (step S1222). Since the reception period and the transmission period are not synchronous, a reception value corresponding to the transmission period is not always obtained. Thus, when it is determined in step S1222 that the transmission/reception offset is less than the transmission period (YES in step S1222), the receiver computes, for each transmission period, a reception value corresponding to the transmission period (e.g., a pixel value) by using interpolation from neighboring reception values (step S1223). Examples of the interpolation method include linear interpolation, the nearest neighbor value, and spline interpolation. Then, the receiver calculates a difference between reception values determined for the respective transmission periods (step S1224).

FIG. 318 illustrates an example of a case where the exposure time is three times the transmission period and the transmission signal is in the form of binary digits (0 or 1). A reception value at a certain point in time is a value obtained by adding three transmission signals. The difference between the reception value at the certain point in time and a reception value at the next point in time is determined to determine the value of a newly received signal. Since the difference between the reception values contains noise, it is not clearly identifiable which signal has been received. Thus, the receiver computes the probability (estimated likelihood) that either signal would have been received (step S1225). Letting the transmission signal be x and the difference between reception values be y, the probability can be expressed by the conditional probability $P(x|y)$. Since $P(x|y)$ is difficult to calculate, the receiver performs calculation by using the value for the right-hand side of $P(x|y) \propto P(y|x)P(x)$ in accordance with Bayes' Law.

It is conceivable to apply the calculation described above to all the reception values. Given that the number of reception values is N, a number of convolutional transition patterns equal to 2 raised to the Nth power exist and its computation is NP-hard, which can be performed efficiently using the Viterbi algorithm.

Substantially all of the state transition paths illustrated in FIG. 319 do not conform to the transmission format. Thus, a format check is used each time a state transition occurs, and the likelihood for a path that does not conform to the transmission format is set to be 0, thereby improving the accuracy with which a correct received signal can be estimated.

The receiver adds a predetermined value to the transmission/reception offset (step S1226), and repeatedly executes the process after step S1222. When the receiver determines in step S1222 that the transmission/reception offset is not less than the transmission period (NO in step S1222), the receiver identifies the highest likelihood among the received signal likelihoods calculated for the respective transmission/reception offsets. Then, the receiver determines whether or not the highest likelihood is greater than or equal to a predetermined value (step S1227). When it is determined that the highest likelihood is greater than or equal to the predetermined value (YES in step S1227), the receiver uses the received signal with the highest likelihood as the final estimation. Alternatively, the receiver uses a received signal having a likelihood greater than or equal to a value obtained by subtracting a predetermined value from the highest likelihood as a candidate received signal (step S1228). When the receiver determines in step S1227 that the highest likelihood is less than the predetermined value (NO in step S1227), on the other hand, the receiver discards the estimation result (step S1229).

Too much noise generally prevents the appropriate estimation of a received signal, and results in low likelihood as well. In the case of low likelihood, the estimation result is discarded, improving the reliability of a received signal. Another issue is that maximum likelihood decoding permits an effective signal to be output as an estimation result even when no effective signal is included in the input image. In this case, the likelihood is also low. Thus, the above-described issue can be addressed by discarding an estimation result in the case of low likelihood.

Embodiment 16

1. Introduction

Conventional visible light communication schemes include a scheme that uses a general-purpose image sensor as a light receiving device, and a scheme that uses a photosensor or a special high-speed image sensor as a light receiving device. Examples of the former scheme include Picapicamera (registered trademark), developed by Casio Computer Co., Ltd. Many general-purpose image sensors have an imaging frame rate up to 30 fps, and a light source as a transmitter needs to change in luminance at a frequency less than or equal to that frequency. Since the luminance change at such a low frequency is visible to the human eye, a lighting device is difficult to use as a transmitter and it is necessary to use a dedicated transmitter. Examples of the latter scheme include those based on Institute of Electrical and Electronics Engineers (IEEE) 802.15.7 and CP 1223. These schemes use modulation frequencies as high as 9.6 kHz or more, and to the human eye it appears that a transmitter is uniformly illuminated. Thus, a lighting device can be used as a transmitter. However, such a transmitter requires a dedicated receiving device, and a modulated signal is not receivable by a smartphone, which is a barrier for the widespread dissemination of the scheme.

The inventors have developed a scheme that enables general-purpose image sensors incorporated in modern smartphones to be used as receiving devices to receive signals modulated at speeds unperceivable to the human eye. Complementary metal-oxide semiconductor (CMOS) image sensors are preferred over charge-coupled device (CCD) image sensors owing to their high responsiveness, ease of integration, low power consumption, and low-voltage operation, and are employed in almost all smartphones or digital cameras. CMOS image sensors adopt a line-scan imaging scheme in which pixels in each line in an image is exposed in sequence. The line-scan scheme is known to cause distortion in an image obtained by imaging a moving object. The inventors have developed a method (line-scan sampling (LSS)) utilizing the above-described characteristics of the line-scan scheme, in which the exposure time is appropriately set to provide sampling with a frequency not less than 30 kHz, which is 1000 times the conventional method. The inventors have also devised a modulation scheme suitable for the scheme, and applied the modulation scheme to a lighting device and a display. The inventors have confirmed that a signal modulated at 10 kHz or more is receivable by a commercially available smartphone that adopts the LSS-based reception scheme.

2. Line-Scan Sampling

A CMOS image sensor converts received light to a pixel value and reads the pixel value as one-dimensional data in the following procedure.

Step 1. A photodiode in a pixel is exposed to produce electric charge corresponding to the amount of exposure, and the electric charge is converted to voltage by an amplifier.

Step 2. The voltage is delivered to vertical signal lines by a row selection switch. After the removal of fixed pattern noise, the voltage is temporarily stored.

Step 3. The voltage is sequentially delivered to horizontal signal lines by a column selection switch, and is read as one-dimensional data.

Image sensors used in modern smartphones or digital cameras are sophisticatedly designed to be fine, and each pixel has no memory. Thus, the exposure in step 1 is not performed simultaneously on all the pixels but is performed in sequence in accordance with the timing of step 2, which is performed for each row in sequence. That is, the start and end of the exposure are performed at timings which slightly differ from one row to another, and thus an image obtained by imaging with a CMOS image sensor shows an image at a different time for each row. With the use of this mechanism, changes in the luminance of the transmitter can be sampled at a much higher speed than that for the sampling for each imaging frame. A line of pixels exposed simultaneously is referred to as an exposure line.

FIG. 320 illustrates diagrams of captured images of a signal modulated at a modulation frequency of 10 kHz with varying exposure times of 1/100 seconds, 1/1,000 seconds, and 1/10,000 seconds. Pixel values of a captured image are each obtained as a value determined by multiplying a value defined by a brightness level or a set sensitivity value of a lens by the integral of the luminance of an imaging object within the exposure time. Typically, an exposure time of approximately 1/30 to 1/200 seconds is used for indoor imaging. If an exposure time Te is sufficiently longer than a modulation period Ts, the difference in luminance between an exposure line corresponding to the brightest period and an exposure line corresponding to the darkest period can be approximated by Ts/Te. When Te=1/100 seconds and Ts=1/10,000 seconds (10 kHz), the pixel value difference is as little as 1%. Thus, this blinking is unperceivable in a photograph taken under normal conditions. However, as in (c) in FIG. 320, as the exposure time decreases, how blinking occurs distinctly appears in terms of pixel values for exposure lines. Reducing the exposure time can capture a high-frequency change in luminance.

Not all the photodiodes of the CMOS image sensor are used directly for imaging. The optical black portion is light-shielded, and subtracting the output potential of the optical black portion from the output potential of the effective pixels serves to cancel the dark current caused by thermal noise. Due to the design there is also an ineffective portion. The effective pixels are generally formed with an aspect ratio near 4:3. In the case where the size of the captured image is set to 16:9, the upper and lower effective pixel portions are cut away, and the resulting portion is handled in a manner similar to that for the ineffective portion. Since an image sensor sequentially performs read-out for each row including not only the effective pixels but also the optical black and the ineffective portion, a time difference corresponding to an amount of time in which the optical black and the ineffective portion are exposed occurs in the period from the time when the bottom line of one image is captured to the time when the top line of the subsequent image is captured. This period of time is called a "blanking time".

The luminance change of the light source can be sampled using LSS only for a period of time during which exposure lines for which the light source is imaged are exposed. This situation is illustrated in FIG. 321. If the light source is shown on an entire screen, the samples are discontinuous because of the presence of the blanking time described above. It is thus necessary to transmit signals by using a protocol suitable for LSS on the basis of the assumption that the signals are discontinuously received. Modern smartphones do not have such a function. As illustrated in FIG. 322, the light source position is identified and only the portion corresponding to the light source position is imaged. Such setting would enable continuous reception and attain a significant increase in communication efficiency.

Given that the sampling frequency or imaging frequency is 30 fps and an image has a vertical size of 1080 pixels, the number of times sampling based on LSS occurs is given by 30×1,080=32,400 per second. Due to the blanking time, no sampling is available for a certain period, resulting in a faster sampling frequency. The blanking time is substantially in a range of 1 to 10 milliseconds, which depends on the settings of each device and imaging conditions such as the frame rate and the image resolution, and thus the sampling frequency is approximately 33 to 46 kHz.

3. Conditions of Transmitter

In order to use illumination light as a light source for visible light communication, the luminance change for signal representation needs to be kept at a level that is imperceptible to humans. This requires a constant average luminance (effective luminance) regardless of the signal to be transmitted. It is also required that the frequency for changing luminance be sufficiently high or the rate of change be sufficiently low. The limit frequency of human perception is referred to as the Critical Flicker Frequency (CFF), and is said to be approximately 60 Hz, which depends on the conditions. This frequency is a limit for periodic blinking, and a higher modulation frequency is necessary for irregular changes for signal representation. In addition, the influence of a change in luminance on imaging with a camera or a video camera is also undesirable. In the exposure time setting within a range used for normal imaging, as described above, the influence of a change in luminance is so small that no problem arises for still images. In video imaging, however, even a change in luminance at a frequency higher than the CFF may be perceived as a shadow like a scanning line. This is caused by aliasing due to the shift between the signal frequency and the frame frequency for video imaging. To eliminate the influence, a frequency much higher than the CFF is used or the rate of change needs to be reduced.

The light adjustment control for lighting devices includes control based on the amount of current flowing through the light source (current control), and control based on the length of the light emission time (PWM control). PWM control is not available since a change in luminance is used for signal representation. However, changing conventional PWM control of components such as a backlight of a display to current control requires substantial circuit modification, which may become a barrier for the introduction of visible light communication. Therefore, it is desirable for a modulation scheme to include the function of making it possible to adjust an average luminance.

As a function inherent to a lighting device, higher luminance is more desirable. Since the number of LEDs serving as light sources and the withstanding voltage are determined by the maximum luminance, a modulation scheme which provides a higher ratio of the effective luminance to the maximum luminance (effective luminance rate (ELR)) is more desirable.

By controlling the luminance of the backlight of the display, a signal can be transmitted from the display. It is to be noted that, as compared with the case where a lighting device is used as a transmitter, attention should be paid to the following points: a low SN ratio since the luminance of the light source is low; and a noisy picture on a screen. In addition, it is necessary to turn off the backlight for a period during which the transmittance of the liquid crystals is changed in order to improve the resolution of video for which the SN ratio further decreases in the case of a dark picture. The refresh rate of the screen is high for a high-grade product, and the refresh rate supported by currently available products is up to 240 Hz. In this case, signals are transmitted intermittently in increments of 1/240 seconds.

4. Modulation Scheme Suitable for LSS

The most distinctive feature of LSS is discontinuous reception. Modulation methods supporting discontinuous reception include a small-symbol scheme and a large-symbol scheme.

4.1. Large-Symbol Scheme

The large-symbol scheme uses a uniform symbol for which it takes a longer time than the image capture period to transmit a symbol. The term "uniform symbol" refers to a symbol, like a frequency modulation symbol, a portion of which is received to allow a signal to be decoded. The receiver receives one symbol per image, and connects symbols received from a plurality of images to restore communication data. The method of receiving one symbol per image is similar to the existing image sensor reception scheme, but is different in that much more information per symbol can be delivered and the blinking of the light source is not visible to the human eye. Linking pieces of reception data in the order received makes it possible to restore communication data. However, the communication data will not be correctly restored, for example, if processing of an imaging frame fails due to an influence such as the processing load on the receiver, which contributes to lack of reliability. A portion of a signal is used for the representation of an address, thereby enabling correct reception of data even in the case described above.

A signal encoded using frequency modulation is suitable as a code for the large-symbol scheme because of the signal uniformity and more information carried per symbol. An example of frequency modulation using on-off control is illustrated in (b) in FIG. 323. Simple frequency modulation provides an effective luminance rate of 50%. The effective luminance rate can be increased by fixing the length of one period and reserving much time in which high luminance is achieved. In (b) and (c) in FIG. 323, an example of frequency analysis of signals with different ELRs at the same frequency is illustrated, which demonstrates that a frequency indicated by a signal can be identified from the fundamental frequency.

The sampling of the signal based on LSS yields an average value of the luminance during the exposure period, and thus a moving average filter with a length corresponding to the exposure time applies. FIG. 324 illustrates the frequency characteristic of the filter. Thus, it is necessary to maintain the exposure time of the receiver constant. In addition, it is to be noted that the frequency cut off here is not usable.

4.2. Small-Symbol Scheme

In the small-symbol scheme, the receiver receives a plurality of symbols over a series of reception times, and puts portions received using a plurality of image frames together to restore communication data. If the transmission signal has constant repeated periods, the time length of the non-reception-period can be computed from the imaging frame rate and the received portions can be connected together. However, this method has low reliability since many modern smartphones perform control to fluctuate the imaging frame rate by using the processing load on a processor or the temperature of the processor. To address the low reliability problem, communication data is divided into a plurality of packets, each of which is assigned a header indicating a packet boundary and an address indicating a packet number, thereby enabling the pieces of received data to be put together regardless of the length of the non-reception-period. In addition, the former method causes an issue that only the same portion of communication data can be received in the case where the ratio of the reception period (imaging frame rate) to the transmission period is a small integer, whereas the latter method can overcome this issue by randomly assigning the transmission order of the packets.

Pulse-position modulation and frequency modulation enable a short symbol transmission time and a high ELR, and are therefore suitable for the small-symbol scheme.

Coding schemes for pulse-position modulation which keep luminance constant include Manchester coding and four pulse-position modulation (4 PPM) coding (FIGS. 325 and 326). While both coding schemes have a coding efficiency of 50%, the Manchester coding has an effective luminance rate of 50% and the 4 PPM coding has an effective luminance rate of 75%. That is, the 4 PPM coding is superior. FIG. 325 illustrates a coding scheme (variable 4 PPM (V4 PPM)) based on the 4 PPM coding, which supports luminance adjustment. This coding scheme enables a continuous change of the effective luminance rate from 25% to 75%. Another feature of the V4 PPM coding is that since the rise position of the signal is constant regardless of luminance, the receiver can receive signals without paying attention to the set luminance value. Luminance adjustment enabled coding schemes based on the Manchester coding include the variable PPM (VPPM) scheme. In the case of the VPPM scheme with a variable effective luminance rate in a range of 25% to 75%, assuming that the shortest recognizable pulse width is considered as a reference, as illustrated in FIG. 327, a pulse width that is 25% of the symbol length is equal to the width of one pulse in 4 PPM. In this case, the coding efficiency of V4 PPM is twice as high as that of VPPM. That is, V4 PPM can be argued to be superior.

Frequency analysis using discrete cosine transform or the like enables the reception of a symbol whose frequency has been modulated. This method has the advantage of reception even with a long exposure time. However, information on the order of symbols is lost. Thus, there is a limitation on a combination of frequencies available while harmonics are taken into account. In the following experiment, V4 PPM was used as a symbol modulation scheme in the small-symbol scheme.

4.3. Performance Evaluation

The performance of the two modulation schemes is evaluated. Smartphone P-03E is used as a receiver and liquid crystal television set TH-L47DT5 is used as a transmitter. The backlight is turned off at the time of refreshing the liquid crystals. The liquid crystal refreshing frequency is 240 Hz, and the backlight is turned on for the period of 75% in the standard mode. Thus, signals are continuously transmitted for a time period given by $\frac{1{,}000{,}000}{240}\times 0.75=3{,}125$ microseconds. In (a) in FIG. 328, signal/noise power is illustrated which is measured by the transmitter and the receiver described above when the exposure time is $\frac{1}{10{,}000}$ seconds, a 50% gray portion is displayed on the screen of the display, and an on/off signal of 1 kHz is transmitted. The following experiment was conducted using a simulation signal ((b) in FIG. 328) simulating the above-described SN ratio. The received signal was a value obtained by averaging the pixel values of 256 pixels in a direction horizontal to the exposure lines. The following results were obtained in 1,000 attempts under the respective conditions.

A symbol having a single frequency was used as a symbol in the large-symbol scheme. The effective luminance rate is set to 75%, which is the same as the ELR used in an experiment for the small-symbol scheme, where the reception error rate decreases as the effective luminance rate is closer to 50%. The received signal is computed by using the discrete cosine transform of pixel values in a direction perpendicular to the exposure lines. FIG. 329A illustrates a reception error (a difference between the transmission signal frequency and the reception signal frequency). The reception error abruptly increases around 9 kHz. The abrupt increase in reception error occurs because the signal power decreases due to the moving average filter for LSS illustrated in FIG. 324 and is buried in noise. An increase in reception error occurs in the low frequency domain because only a short-period signal can be delivered during a transmission period. FIGS. 329B to 329F illustrate reception error rates at the respective frequency margins. For example, assuming that the allowable error rate is 5%, values can be assigned to the frequencies in the range of 1.6 kHz to 8 kHz in steps of 50 Hz, resulting in a representation of information of (8,000−1,600)/50=128=7 bits. For example, given that 2 bits are allocated to address and 5 bits are allocated to data, a representation of 20-bit information can be attained. Since communication data can be decoded from images of four frames at the highest speed, the effective communication speed for imaging at 30 fps is 150 bps. In actual use, an error check code needs to be included for the detection of reception error.

A V4 PPM symbol was used as a symbol in the small-symbol scheme. FIG. 330 illustrates a reception success rate at each symbol rate. Note that the reception success rate is a rate at which all the symbols in one packet are correctly received. The term "modulation frequency", as used here, refers to the number of luminance-change time slots in one second. That is, 2,500 V4 PPM symbols are included for a modulation frequency of 10 kHz. If the allowable error rate is 5%, the modulation frequency can be set to 10 kHz. If a whole continuous transmission period corresponds to one packet, the boundary of the packet can be determined when the transmission period starts with an on state (or a high-luminance state). Thus, a header indicating the boundary of the packet can be represented by one slot. Accordingly, one packet includes a number of V4 PPM symbols equal to the value given by following equation (1).

$$\lfloor (0.003125/(\tfrac{1}{10{,}000})-1)/4 \rfloor=7 \qquad (1)$$

In other words, 14-bit information is included. Given that 2 bits are allocated to address and 12 bits are allocated to data, a representation of 48-bit information can be attained. If a transmitter in a captured image is sufficiently large, the transmitter can receive a plurality of packets, achieving a maximum effective communication speed when all the packets can be received from one image. An effective communication speed of 1,440 bps is attained for imaging at 30 fps.

The small-symbol scheme, which can represent a larger number of bits, was applied, and an operation check was performed. A packet having the configuration described above was used, in which the combined 48-bit data includes a 4-bit CRC code. In addition, data for which the number of times packets having the same data were received is larger was adopted when packets having the same address but different data were received. In the case where the numbers of packets having the same data were identical, packets were continuously received until the number of packets having either data became maximum. It was assumed that, when an error was detected by CRC, all the packets received were discarded. The distance between the transmitter and the receiver was set to 4 m. When this distance is adopted, one image includes an image of at least one packet. In 200 attempts, the average reception time was 351 milliseconds and no error occurred even after a CRC error check was performed. The expected value of the number of receptions of packets required to collect N types of packets can be calculated by following equation (2).

$$\Sigma_{r=1}^{N} N/r \qquad (2)$$

The expected value is 8.33 when N=4. Thus, the expected reception time when no error occurs in reception and one packet is received from one image is given by 8.33×33=275 milliseconds. The reason for which the average reception time was longer than the expected reception time is that the reception of a plurality of packets was necessary because of the occurrence of a reception error. Taking measures such as including an error detection code in a packet to reduce reception errors can improve reception in terms of reception time.

5. Conclusion

Visible light communication is a type of wireless communication that uses electromagnetic waves in the visible light range that the human eye is able to detect. Visible light communication has attracted attention due to its potential applications in society in which lighting provides a communication infrastructure. Features of visible light communication include no need for radio-based authentication, safety because of no biological effects, no influence of electromagnetic radiation on other devices, an at-a-glance view of the communication range because of a visible generation source and communication path, ease of prevention of unauthorized communication, easy shielding, high directivity to allow a person to communicate only with a specific party, and the sharing of the energy of communication with lighting. In addition, utilization as bidirectional communication similar to existing wireless communication such as WiFi, and also utilization as a sign using one-way communication are contemplated. For example, visible light communication is expected to have applications in ceiling lights that transmit position information for indoor position locating outside GPS reception.

High-speed sampling using the line-scan characteristics of a CMOS image sensor is proposed herein, and it has been confirmed that a currently available smartphone is able to receive a signal modulated at a modulation frequency of 10 kHz.

The ability of a smartphone to receive a visible light signal from a lighting device as a transmitter allows for various applications. For example, it is expectable to have applications in ceiling lights that transmit position information for indoor position locating outside GPS reception. Another possible application is that a signboard is used as a transmitter and a person obtains a coupon using a smartphone or checks seat availability.

The visible light communication scheme proposed herein has the following advantages over the illuminance sensor reception scheme, in addition to the capability of using a smartphone as a receiver. Received light is spatially separable, allowing each of a plurality of transmitters located close to each other to receive a signal without causing interference with the other transmitters. In addition, it is possible to identify each light reception direction, enabling a relative position to the light source to be calculated. That is, the absolute position of the light source is obtained by using a received signal, enabling the absolute position of the receiver to be determined with an accuracy of several centimeters. Furthermore, it is possible to perform communication using a display or a signboard as a transmitter. Since a display or a signboard has lower luminance or luminous intensity than a lighting device, it is difficult to receive a signal by using a photosensor. In the image sensor reception scheme, it is possible to receive a signal regardless of the environmental luminous intensity. In the image sensor reception scheme, moreover, it is possible to select a flat portion with less noise on a display, the noise being caused by a motion on the screen, and it is also possible to receive a signal from the selected portion.

In the future, more studies on improvement of communication performance with an improved reception algorithm will be conducted. Furthermore, example applications of the visible light communication scheme disclosed herein will be studied and industrial applicability is to be proven.

Embodiment 17

This embodiment describes a system configured as a transmitter in each of the embodiments described above, and more specifically describes a display system configured to display video and transmit a visible light signal.

FIG. 331 is a block diagram illustrating a configuration of a display system in this embodiment.

The display system in this embodiment includes a video signal sender 1250 that generates and sends a video signal, and a video display 1270 that displays video and transmits a visible light signal.

The video signal sender 1250 includes a video signal generation unit 1251, a visible light signal generation unit 1252, a visible light synchronous signal generation unit 1253, and a video standard signal sending unit 1254.

The video signal generation unit 1251 generates a video signal, and outputs the video signal to the video standard signal sending unit 1254. The visible light signal generation unit 1252 generates a visible light signal as an electrical signal, and outputs the visible light signal to the video standard signal sending unit 1254. The visible light synchronous signal generation unit 1253 generates a visible light synchronous signal, and outputs the visible light synchronous signal to the video standard signal sending unit 1254.

The video standard signal sending unit 1254 outputs the video signal, visible light signal, and visible light synchronous signal generated in the way described above to the video display 1270 via a video standard transmission path group 1260.

The video display 1270 includes a video standard signal receiving unit 1271, a video display unit 1272, and a visible light signal transmission unit 1273.

The video standard signal receiving unit 1271 receives the video signal, the visible light signal, and the visible light synchronous signal from the video standard signal sending unit 1254 via the video standard transmission path group 1260. Then, the video standard signal receiving unit 1271 outputs the video signal to the video display unit 1272, and outputs the visible light signal and the visible light synchronous signal to the visible light signal transmission unit 1273.

The video display unit 1272 includes, for example, a liquid crystal display, an organic EL display, a plasma display, or any other suitable display. Upon receipt of a video signal from the video standard signal receiving unit 1271, the video display unit 1272 displays video corresponding to the video signal. In the case where the video display 1270 is a projector, the video display unit 1272 serves as a light projection mechanism including a light source and an optical system. Upon receiving a video signal from the video standard signal receiving unit 1271, the video display unit 1272 projects video corresponding to the video signal onto a screen.

The visible light signal transmission unit 1273 obtains a visible light signal and a visible light synchronous signal from the video standard signal receiving unit 1271. Upon receiving a visible light synchronous signal, the visible light signal transmission unit 1273 causes the video display unit 1272 to start blinking at the timing of the reception of the visible light synchronous signal in accordance with a visible light signal obtained beforehand. Accordingly, the video display unit 1272 displays video and changes in luminance to transmit a visible light signal as an optical signal. The visible light signal transmission unit 1273 may include a light source such as an LED, and the light source may change in luminance.

FIG. 332 is a diagram illustrating a form of transmission and reception between the video standard signal sending unit 1254 and the video standard signal receiving unit 1271.

The video standard signal sending unit 1254 sends the video signal, the visible light signal, and the visible light synchronous signal to the video standard signal receiving unit 1271 by using a plurality of video standard transmission paths included in the video standard transmission path group 1260.

Upon receiving the video signal, the visible light signal, and the visible light synchronous signal, the video standard signal receiving unit 1271 outputs the visible light synchronous signal to the visible light signal transmission unit 1273 preferentially to the interpretation of the video signal and the visible light signal. This can prevent the output of the visible light synchronous signal from being delayed by the interpretation of the video signal and the visible light signal.

FIG. 333 is a diagram illustrating an example of a specific form of transmission and reception between the video standard signal sending unit 1254 and the video standard signal receiving unit 1271.

The video standard signal sending unit 1254 sends the video signal, the visible light signal, and the visible light synchronous signal to the video standard signal receiving unit 1271 by using a plurality of video standard transmission paths included in the video standard transmission path group 1260. In this case, the video standard signal sending unit 1254 sends the video signal and the visible light signal to the video standard signal receiving unit 1271 via video standard transmission paths available in the video standard among the plurality of video standard transmission paths included in the video standard transmission path group 1260. The video standard signal sending unit 1254 further sends the visible light synchronous signal to the video standard signal receiving unit 1271 via a video standard transmission path not available in the video standard among the plurality of video standard transmission paths included in the video standard transmission path group 1260.

FIG. 334 is a diagram illustrating another example of a specific form of transmission and reception between the video standard signal sending unit 1254 and the video standard signal receiving unit 1271.

As in the above-mentioned case, the video standard signal sending unit 1254 sends the video signal and the visible light signal to the video standard signal receiving unit 1271 via video standard transmission paths available in the video standard. The video standard signal sending unit 1254 may send the visible light synchronous signal to the video standard signal receiving unit 1271 via a video standard transmission path for future extension. The video standard transmission path for future extension is a video standard transmission path provided for extension to a future standard.

FIG. 335 is a diagram illustrating another example of a specific form of transmission and reception between the video standard signal sending unit 1254 and the video standard signal receiving unit 1271.

As in the above-mentioned case, the video standard signal sending unit 1254 sends the video signal and the visible light signal to the video standard signal receiving unit 1271 via video standard transmission paths available in the video standard. On the other hand, the video standard signal sending unit 1254 may send the visible light synchronous signal to the video standard signal receiving unit 1271 via a video standard transmission path (hereinafter referred to as the "power-delivery transmission path") used for the delivery of the power consumed by the video display 1270. Thus, the visible light synchronous signal is sent together with the power. Specifically, the video standard signal sending unit 1254 superimposes the visible light synchronous signal on the power and sends the visible light synchronous signal.

FIGS. 336A and 336B are diagrams illustrating the power to be delivered via the power-delivery transmission path.

When no visible light synchronous signal is sent via the power-delivery transmission path, as illustrated in FIG. 336A, voltage defined in the video standard is continuously applied to the power-delivery transmission path. When a visible light synchronous signal is sent via the power-delivery transmission path, on the other hand, as illustrated in FIG. 336B, the voltage of the visible light synchronous signal is superimposed on the voltage defined in the video standard on the power-delivery transmission path. In this case, the visible light synchronous signal is superimposed on the power so that the maximum voltage of the visible light synchronous signal is less than or equal to the upper limit of the rated voltage for the video standard transmission path and the minimum voltage of the visible light synchronous signal is greater than or equal to the lower limit of the rated voltage for the video standard transmission path. In this case, furthermore, the visible light synchronous signal is superimposed on the power so that the average value of voltage over a period during which visible light synchronous signal is superimposed is equivalent to the voltage defined in the video standard.

FIG. 337 is a diagram illustrating another example of a specific form of transmission and reception between the video standard signal sending unit 1254 and the video standard signal receiving unit 1271.

As in the above-mentioned case, the video standard signal sending unit 1254 sends the video signal and the visible light signal to the video standard signal receiving unit 1271 via video standard transmission paths available in the video standard. The video standard signal sending unit 1254 may send the visible light synchronous signal to the video standard signal receiving unit 1271 via a video standard transmission path used in the video standard for sending a vertical synchronous signal. The vertical synchronous signal is a signal for vertical synchronization of video. The video standard signal sending unit 1254 sends the visible light synchronous signal as a vertical synchronous signal.

FIG. 338 is a diagram illustrating another example of a specific form of transmission and reception between the video standard signal sending unit 1254 and the video standard signal receiving unit 1271.

As in the above-mentioned case, the video standard signal sending unit 1254 sends the video signal and the visible light signal to the video standard signal receiving unit 1271 via video standard transmission paths available in the video standard. The video standard signal sending unit 1254 may send the visible light synchronous signal to the video standard signal receiving unit 1271 via a video standard transmission path (hereinafter referred to as a "composite transmission path") used in the video standard for sending a video signal/control signal, and a vertical synchronous signal. The video standard signal sending unit 1254 sends the visible light synchronous signal as a vertical synchronous signal.

In this case, the video standard signal receiving unit 1271 extracts the visible light synchronous signal, preferentially to the interpretation of the video signal and the control signal, from the received signal sent via the composite transmission path, and outputs the visible light synchronous signal to the visible light signal transmission unit 1273.

In this manner, in this embodiment, a visible light synchronous signal is extracted preferentially to the interpretation of a video signal and a visible light signal, preventing the output of the visible light synchronous signal from being delayed by the interpretation of the video signal and the visible light signal.

Embodiment 18

Embodiments of the present disclosure relate to a display device capable of outputting a visible light communication signal, and a method for controlling the display device.

For example, Japanese Unexamined Patent Application Publication No. 2007-43706 and Japanese Unexamined Patent Application Publication No. 2009-212768 disclose a communication technique using visible light. Japanese Unexamined Patent Application Publication No. 2007-43706 and Japanese Unexamined Patent Application Publication No. 2009-212768 disclose a communication technique for a video display device, examples of which include a display and a projector, for superimposing visible light communication information on normal video to be displayed to display the video with the visible light communication information.

An embodiment of the present disclosure provides a display device capable of outputting visible light communication signals without significantly degrading the quality of display images and also capable of reducing errors in reception of the output visible light communication signals, and a method for controlling the display device.

A display device according to an aspect of the present disclosure is a display device capable of outputting a visible light communication signal, including a display panel having a display surface to display video, a display control unit that controls the display panel to display video on the display surface of the display panel in accordance with a video signal, a backlight having a light emitting surface to illuminate the display surface of the display panel from the back of the display surface, a signal processing unit that superimposes the visible light communication signal on a backlight control signal generated based on the video signal, and a backlight control unit that divides the light emitting surface of the backlight into a plurality of regions and that provides a period during which light emission control is performed for each of the plurality of regions and turn-off control is performed for each of the plurality of regions at a different timing in accordance with the backlight control signal output by the signal processing unit. While superimposing the visible light communication signal on the backlight control signal, the signal processing unit does not superimpose the visible light communication signal on a signal indicating turning off of the backlight in the backlight control signal.

A display device according to an embodiment of the present disclosure can output visible light communication signals without significantly degrading the quality of display images, and can also reduce errors in reception of the output visible light communication signals.

Underlying Knowledge Forming Basis of the Present Disclosure

Recent display devices, particularly in the field of liquid crystal displays and projectors using liquid crystals, adopt a technique called backlight scan to improve image quality. Backlight scan is a backlight control method for accelerating responses of liquid crystals and preventing or reducing video blurring by holding. In backlight scan, a display screen is divided into several areas (backlight areas), and light emission of a backlight is controlled so that the respective regions are turned on periodically and sequentially. More specifically, backlight scan is a control method for providing a backlight turn-off period and making the timing of a turn-off period (blanking period) during which each backlight area is periodically turned off different from that for another backlight area. In general, control is often performed so that the timing of the blanking period matches the timing of scanning of liquid crystals.

As disclosed in Japanese Unexamined Patent Application Publication No. 2007-43706, visible light communication adopts a method for superimposing a visible light communication signal by using blinking of a backlight. This prevents a visible light communication signal from being transmitted during a backlight off period of time. In addition, this off period causes a signal transmission failure, and thus there is no choice to perform communication with reduced image quality without using backlight scan.

Accordingly, an embodiment of the present disclosure provides a display device capable of outputting visible light communication signals without significantly degrading the quality of display images and also capable of reducing errors in reception of the output visible light communication signals.

Hereinafter, embodiments will be described in detail with reference to the drawings as appropriate. However, detailed description more than necessary may be omitted. For example, the detailed description of well-known matters or repeated description of substantially the same configuration may be omitted. This is for preventing the following description from being unnecessarily redundant, thus facilitating the understanding by those skilled in the art.

The applicant provides the accompanying drawings and the following description to help those skilled in the art fully understand the present disclosure, and does not intend to limit the scope of the subject matters as defined in the claims in any way to the drawings and the description.

Embodiment 18 will be described hereinafter with reference to FIGS. 339 to 346.

1. Configuration

FIG. 339 is a schematic diagram illustrating an example of a visible light communication system according to Embodiment 18.

1.1. Configuration of Visible Light Communication System

A visible light communication system 1300 illustrated in FIG. 339 includes a display device 1400 and a smartphone 1350.

The display device 1400 is, for example, a television set, and is capable of displaying video on a display surface 1410. The display device 1400 is also capable of superimposing a visible light communication signal on the display surface 1410.

The smartphone 1350 is an example of an electronic device that receives a visible light communication signal, and is capable of receiving a visible light communication signal transmitted from the display device 1400. This allows the user of the smartphone 1350 to receive information related to the video displayed on the display device 1400, for example.

In this embodiment, the display device 1400 will be described in the context of a monitor configured to display video, such as a television set or a display, for purposes of illustration but not of limitation. The display device 1400 may be a device configured to project video, such as a projector. While the smartphone 1350 is used as an electronic device that receives a visible light communication signal output from the display device 1400 as an example, any electronic device, other than a smartphone, capable of receiving a visible light communication signal may be used. For example, the electronic device may a reception device conforming to JEITA (Japan Electronics and Information Technology Industries Association) CP-1222. Alternatively, the electronic device may be a general mobile terminal other than a smartphone. The electronic device may also be configured to receive a visible light communication signal and to decode the received visible light communication signal to obtain information.

The information transmission scheme for transmitting a visible light communication signal may conform to a standard such as JEITA CP-1223, which is being developed into an international standard, or IEEE P802.15, which has been standardized. In other words, the electronic device may be implemented by using a reception device supporting any of the standards described above.

1.2. Configuration of Display Device

FIG. 340 is a block diagram illustrating an example of a schematic configuration of a display device according to Embodiment 18.

The display device 1400 illustrated in FIG. 340 is a display device capable of outputting a visible light communication signal. The display device 1400 includes a first input unit 1420, a first processing unit 1430, a first control unit 1440, a display panel 1450, a second input unit 1460, a second processing unit 1470, a second control unit 1480, and a backlight 1490.

The first input unit 1420 receives input of a video signal related to video to be displayed on the display panel 1450. The video signal is input to the first input unit 1420 from, for example, broadcast radio waves, a video recorder, a video player, a PC, or the like through, for example, an antenna cable, a video signal line, a composite cable, an HDMI (registered trademark) cable, a PJ link cable, a LAN cable, or the like. The video signal may be stored in a variety of recording media by using a video recorder or player or any other suitable device.

The first processing unit 1430 receives input of the video signal from the first input unit 1420. The first processing unit 1430 performs general image processing, such as processing for enhancing image quality, on the video signal. The first processing unit 1430 transmits the video signal subjected to the image processing to the first control unit 1440. The first processing unit 1430 further transmits information indicating the size, display timing, brightness, and the like of subframes or video signals to the first control unit 1440 and the second processing unit 1470.

The first processing unit 1430 may output a duty ratio computed based on the video signal and backlight control signals for the respective regions (hereinafter referred to as "B.L. control signals") to the second processing unit 1470.

The display panel 1450 is, for example, a liquid crystal panel, and has the display surface 1410 to display video.

The first control unit 1440 is an example of a display control unit, and controls the display panel 1450 to display video on the display surface 1410 of the display panel 1450 in accordance with a video signal. In this embodiment, the first control unit 1440 performs control to display video on the display panel 1450 in accordance with the video signal transmitted from the first processing unit 1430. More specifically, the first control unit 1440 controls the opening and the like of the liquid crystals of the display panel 1450 in accordance with the video signal transmitted from the first processing unit 1430.

The second input unit 1460 receives input of a signal for use in visible light communication (hereinafter referred to as a "visible light communication signal"), and transmits the input visible light communication signal to the second processing unit 1470. In this embodiment, a signal for visible light communication created by a PC or the like is input as a visible light communication signal to the second input unit 1460 through, for example, a dedicated cable, a LAN cable, or the like.

The signal for visible light communication may be superimposed on some of the broadcast radio waves and input to the second input unit 1460 through an antenna cable. A visible light communication signal stored in a variety of recording media by using a video recorder or player may be input to the second input unit 1460. For example, a visible light communication signal may be input to the second input unit 1460 from a video recorder that records the visible light communication signal over some lines such as an HDMI (registered trademark) cable or a PJ link cable. Alternatively, a signal for visible light communication may be separately created by a PC or the like, superimposed on the video signal, and input to the second input unit 1460 from a video recorder or player.

The second input unit 1460 may obtain a visible light communication signal by receiving the visible light communication signal from outside or by reading server information via the Internet or the like by using information incorporated in a display device such as the ID of the display device.

The second processing unit 1470 performs operations such as encoding the visible light communication signal input from the second input unit 1460 to generate an encoded signal and computing a duty based on the video signal and/or the visible light communication signal. Furthermore, the second processing unit 1470 superimposes the encoded signal on a B.L. control signal input from the first processing unit 1430.

In this embodiment, the encoded signal is described as a signal in which ON periods and OFF periods are present in a certain ratio. Furthermore, the encoded signal is fundamentally described as a signal encoded by using the I-4 PPM scheme. The encoded signal may be a signal encoded by using the Manchester scheme or the like. The modulated signal is described as an on/off signal with a percent modulation of 100%, but is not limited thereto. High/Low modulation, which is not 100% percent modulation, may be used. In this case, ON/OFF in the following description may be replaced with High/Low, for example. The duty of a visible light communication signal may not only be handled as a value in which the ON period is normalized for the entire signal transmission period but may be read in accordance with (High level×High period+Low level×Low period)/(signal transmission period×High level).

More specifically, the second processing unit 1470 is an example of a signal processing unit, and performs a process for superimposing a visible light communication signal on a backlight control signal generated based on a video signal. Note that, while superimposing a visible light communication signal on a backlight control signal, the second processing unit 1470 does not superimpose a signal indicating turning off of the backlight in the visible light communication signal on a backlight control signal. An encoded visible light communication signal (encoded signal) may also be referred to as a "visible light communication signal".

The second control unit 1480 is an example of a backlight control unit. The second control unit 1480 divides a light emitting surface of the backlight 1490 into a plurality of regions, and performs control to provide a period during which light emission control is performed for on each of the plurality of regions and turn-off control is performed for each of the plurality of regions at a different timing in accordance with the backlight control signal (B.L. control signal) output from the second processing unit 1470. In this embodiment, the second control unit 1480 controls the luminance or timing of the backlight 1490 in accordance with the backlight control signal (B.L. control signal) transmitted from the second processing unit 1470.

The backlight 1490 irradiates the display panel 1450 with light from the back of the display panel 1450. More specifically, the backlight 1490 has a light emitting surface to illuminate the display surface 1410 of the display panel 1450 from the back of the display surface 1410. This enables a viewer to view the video displayed on the display panel 1450.

In this embodiment, the light emitting surface of the backlight 1490 is divided into a plurality of regions, and each of the regions is subjected to sequential light emission control to achieve backlight scan. The plurality of regions on the light emitting surface of the backlight 1490 correspond to the plurality of regions on the display surface 1410.

2. Operation of Display Device

Next, operation of the display device 1400 having the configuration described above will be described.

The display device 1400 performs backlight scan in which a backlight is sequentially turned off in accordance with the writing of a video signal, while sequentially scanning the entire screen of the display panel 1450.

In general, a display panel formed of liquid crystals shows a slow change in the phase of the liquid crystals, and takes long time to change the video even when a video signal is changed in order to display different gradations. Thus, backlight scan is performed to address video-related issues such as motion blur caused by the display of the video being changed, by temporarily turning off the backlight of the display panel while performing scanning with the backlight. Meanwhile, the scanning speed for switching is increasing year by year, and could increase from a normal scanning speed of 60 frames per second to as high as twice or four times the rate of 60 frames per second. For high-speed scanning, gradually changing images with normal frame interpolation between frames can achieve smooth video effects.

Accordingly, a backlight scan for turning off a backlight while performing scanning with the backlight is important to improve the video characteristics. No transmission of visible light communication signals during a turn-off period by backlight scan is desirable in terms of video characteristics.

For the reason described above, the display device 1400 outputs no visible light communication signal during a turn-off period by backlight scan (hereinafter referred to as a "blanking period").

In the following, a description will be given of a method (or operation) for allowing a receiver, such as the smartphone 1350, to receive a visible light communication signal with high probability even if the display device 1400 outputs no visible light communication signal during a blanking period of a backlight control signal (B.L. control signal).

First Example

2.1.1. Example of Operation of Second Processing Unit

FIG. 341A is a diagram illustrating an example of B.L. control signals before a visible light communication signal is superimposed on the B.L. control signals according to Example 1 in Embodiment 18. FIG. 341B is a diagram illustrating an example of B.L. control signals having a visible light communication signal superimposed thereon according to Example 1 in Embodiment 18.

In FIGS. 341A and 341B, an example is illustrated in which B.L. control signals A to H corresponding to eight regions A to H, which constitute a display area obtained by dividing the display surface 1410, are input in order to control the backlight 1490 for each of the regions A to H. The hatched portions indicate areas where an encoded signal (visible light communication signal) is present.

In the case where the encoded signal illustrated in FIG. 341A is superimposed on the B.L. control signals A to H at different phases and encoded signals of different phases coexist within a range received by the receiver, an error (a reception error of a visible light communication signal) occurs when the receiver decodes the signals.

In Example 1, accordingly, as illustrated in FIG. 341B, encoded signals (visible light communication signals) whose phases are aligned are superimposed on some areas on the display area.

The term "aligning of phases", as used here, is described to take an example of synchronizing the timings of the rise with each other, but is not limited thereto. Any timing may be used once a certain point in time from a state before the start of the rise to a state when the rise ends is defined as the rising time. In addition, since a delay time or the like occurs in a control signal voltage path, synchronizing does not only mean matching of timings but the term "aligning of phases" is also used to include the presence of a certain delay time or delay times within a certain range. The same applies to the following embodiments (Embodiments 18 to 23).

Since a backlight is sequentially turned off for the respective regions through sequential scanning, it is difficult to superimpose an encoded signal without any turn-off period (blanking period) being included. In Example 1, accordingly, the superimposition of an encoded signal on a specific area (hereinafter referred to as the "reference region") on the divided display area is timed immediately after a turn-off period (blanking period). On regions other than the specific area (reference region), encoded signals that are in phase with the encoded signal for the reference region are superimposed, while no encoded signal is superimposed over a turn-off period (blanking period) that is a backlight off period.

In the example illustrated in FIG. 341B, the second processing unit 1470 sets the region C to which the B.L. control signal C is input as a reference region, and adjusts the timing of superimposition of an encoded signal so that the beginning (rise time) P2 of the encoded signal is placed at a rise time P1 of the B.L. control signal C illustrated in FIG. 341A, and then superimposes encoded signals that are in phase on the B.L. control signals A to H. While superimposing an encoded signal on each of the B.L. control signals A to H, the second processing unit 1470 superimposes an encoded signal in the ON period of the B.L. control signal and does not superimpose an encoded signal in the OFF period of the B.L. control signal.

The reference region is not limited to the region C. In the following, a description will be given of an example of a reference region that can be set in Example 1. For example, the reference region may be the brightest region (a region for which the blanking period is short or a region where the transmittance of the display panel is the highest) on the divided display area.

Even when the brightest region is set as the reference region, further measures need to be taken to change the position of the reference region for each frame. This is because the position of the encoded signal to be superimposed changes from one frame to another, resulting in an extreme change in video centroid for each frame, which may cause a flicker. Another possible reason is that periods of encoded signals to be superimposed may overlap between regions and a reception error may occur at the receiver unless measures such as interrupting one of the overlapping encoded signals or performing no superimposition during the first predetermined period are taken. In the case where the position of the reference region is changed for each frame, accordingly, a period over which no encoded signal is superimposed, which corresponds to at least a period of one frame, may be provided.

In the case where a bright region is set as the reference region, furthermore, instead of a bright region being determined on the basis of the brightness of the display area for each frame, a bright region may be determined by the first processing unit 1430 on the basis of a transition of the center of the brightness of an image by using a video signal.

Alternatively, in the case where the brightness of the entire display area is not changed by a certain amount or more, such as in the case where no scene change occurs for a certain period of time, a region including the brightest location on the display area may be set as the reference region in accordance with the average of video signals over a certain period of time. The reference region may be determined in advance.

2.1.2. Advantageous Effects, Etc.

As described above, in Example 1, a display device is a display device (1400) capable of outputting a visible light communication signal, including a display panel (1450) having a display surface to display video, a display control unit (the first control unit 1440) that controls the display panel to display video on the display surface of the display panel in accordance with a video signal, a backlight (1490) having a light emitting surface to illuminate the display surface of the display panel (1450) from the back of the display surface, a signal processing unit (the second processing unit 1470) that superimposes the visible light communication signal on a backlight control signal generated based on the video signal, and a backlight control unit (the second control unit 1480) that divides the light emitting surface of the backlight (1490) into a plurality of regions and that provides a period during which light emission control is performed for each of the plurality of regions and turn-off control is performed for each of the plurality of regions at a different timing in accordance with the backlight control signal output by the signal processing unit (the second processing unit 1470). While superimposing the visible light communication signal on the backlight control signal, the signal processing unit (the second processing unit 1470) does not superimpose the visible light communication signal on a signal indicating turning off of the backlight (1490) in the backlight control signal.

This configuration can provide a display device capable of outputting visible light communication signals without significantly degrading the quality of display images and also capable of reducing errors in reception of the output visible light communication signals.

In addition, the signal processing unit (the second processing unit 1470) may superimpose the visible light communication signal on each of the backlight control signals for the plurality of regions, and the visible light communication signals superimposed on the plurality of regions may be in phase with each other.

This can reduce the occurrence of reception errors of visible light communication signals.

For example, the signal processing unit may align the phases of the visible light communication signals to be superimposed for the plurality of regions with each other by using as a reference a backlight control signal for a predetermined region among the plurality of regions.

This can minimize a period over which no visible light communication signal is superimposed during a blanking period.

The predetermined region may be the brightest region among the plurality of regions. Alternatively, the predetermined region may be a region corresponding to an end of the display surface among the plurality of regions.

This can reduce the influence of the reduced luminance caused by the turning off of the backlight based on the visible light communication signal.

Second Example

In the following description, the blanking periods for the respective regions on the display area have the same time length.

The total period of time during which the backlight 1490 is turned off ("total turn-off period") is a period obtained by adding together the blanking periods that are the OFF periods of the B.L. control signals and the OFF periods of the encoded signal.

Thus, even when an encoded signal is superimposed on the reference region immediately after the end of a blanking period and the encoded signal is completely included within a period from the blanking period to the next blanking period, the length of the period during which the backlight 1490 is turned off is increased by an amount corresponding to the OFF periods of the encoded signal superimposed on the B.L. control signal. That is, the reference region on which an encoded signal is superimposed is darker than the reference region on which the encoded signal is not superimposed.

For example, for a region other than the reference region, in contrast, no encoded signal is superimposed during a blanking period, and thus the period during which the backlight 1490 is turned off is shorter than that for the reference region by an amount corresponding to the OFF periods within an encoded-signal period. The encoded-signal period is a period that overlaps the blanking period and over which no encoded signal is superimposed. That is, for example, a region other than the reference region on which an encoded signal is superimposed may be brighter than the reference region.

To address this inconvenience, there are available two methods for providing an adjustment period during which the backlight 1490 is turned on or off. A first method is to make the total turn-off period for a region other the reference region match the total turn-off period for the reference region since the total turn-off period for the reference region is the longest. A second method is to make the total turn-off period for every region match a total turn-off period determined based on the original video signal.

2.2.1. Example of Operation of Second Processing Unit Using First Method

First, operation of the second processing unit 1470 using the first method will be described with reference to FIGS. 342 and 343.

FIGS. 342 and 343 are timing charts describing the first method in Example 2 in Embodiment 18. In (a) in FIG. 342, a B.L. control signal for the reference region before an encoded signal is superimposed is illustrated. In (b) in FIG. 342, a B.L. control signal for the reference region after an encoded signal has been superimposed is illustrated. In (a) in FIG. 343, a B.L. control signal for another region before an encoded signal is superimposed is illustrated. In (b) in FIG. 343, a B.L. control signal for another region after an encoded signal has been superimposed is illustrated.

More specifically, FIG. 342 illustrates an example in which the second processing unit 1470 adjusts the beginning (rise time) of the encoded signal to the rise time (time t12) of the B.L. control signal for the reference region and then superimposes the encoded signal on the B.L. control signal. FIG. 343 illustrates an example in which the second processing unit 1470 superimposes an encoded signal that is in phase with the encoded signal superimposed on the reference region on the B.L. control signal for another region.

That is, FIGS. 342 and 343 illustrate an example in which the second processing unit 1470 superimposes an encoded signal on the B.L. control signal for each region in phase with that for another region at the same time as the end of the blanking period for the reference region. As in Example 1, the blanking period for each region is prioritized, and no encoded signal is superimposed in the blanking period.

As illustrated in (b) in FIG. 342, for the reference region, for example, an encoded signal turn-off period T1 is present in addition to a blanking period B1 expressed as a period from time t11 to time t12. The encoded signal turn-off period T1 is obtained by, for example, totaling the OFF period of the encoded signal within an encoded-signal period C1 expressed as a period from time t12 to time t14.

Thus, for the reference region illustrated in (b) in FIG. 342, for example, the total OFF period of the encoded signal (encoded signal turn-off period) within one frame expressed as a period from time t11 to time t13 can be given by using the duty (Duty) of the encoded signal in accordance with (encoded signal turn-off period T1)=(encoded-signal period C1)×(1−Duty).

As illustrated in (b) in FIG. 342, for the reference region, there is fundamentally no period during which the encoded-signal period C1 and the blanking period B1 overlap. Thus, the total turn-off period T2 within one frame is represented by (total turn-off period T2)=(blanking period B1)+(encoded signal turn-off period T1). That is, the total turn-off period for the reference region is the longest among those of all the other regions.

For a region other than the reference region, in contrast, an encoded-signal period and a blanking period may overlap. As described above, a B.L. control signal is more prioritized than an encoded signal during the blanking period. Thus, no encoded signal is superimposed.

Thus, as illustrated in (b) in FIG. 343, the total turn-off period for a region other than the reference region is shorter than that for the reference region by an amount corresponding to, for example, within an encoded-signal period C1 expressed as a period from time t21 to time t24, the OFF period of the encoded signal in the encoded-signal period C1, which overlaps a blanking period B2 expressed as a period from time t22 to time t23.

The total OFF period of the encoded signal (encoded signal turn-off period) within the encoded-signal period C1 can be given by (encoded signal turn-off period)=(encoded-signal period C1−blanking period B2)×(1−Duty), where B2 is a period during which an encoded-signal period and a blanking period overlap.

As described above, if the total turn-off period differs for each region of the screen (display area), luminance varies depending on the region, resulting in a reduction in image quality.

To address this issue, the second processing unit 1470 operates in accordance with a first method of providing an adjustment period during which the backlight 1490 is turned on or off, thereby equalizing the total turn-off periods for the respective regions on the screen.

More specifically, the second processing unit 1470 provides an adjustment period for adjusting a difference between the total turn-off period for the reference region per frame and that for any other region in accordance with the first method in which the total turn-off period for any other region is made to match the total turn-off period for the reference region. As described above, Example 2 is based on the assumption that the blanking periods for the respective regions have the same time length.

In (b) in FIG. 343, an adjustment period A1 expressed as a period from time t24 to time t26 can be represented by blanking period B2×(1−Duty). That is, the adjustment period for each of the regions other than the reference region can be calculated by using the blanking periods for the respective regions including the reference region, the encoded-signal period, and the phase of the encoded signal. In (b) in FIG. 343, an example is illustrated in which an adjustment period is set in a period of one frame expressed as a period from time t21 to time t25.

In the display device 1400 according to Example 2, as described above, the second processing unit 1470 provides an adjustment period by using the first method. This enables the display device 1400 to output encoded signals without significantly changing the image quality although the superimposition of encoded signals on B.L. control signals results in a reduction in the brightness of the entire screen (display area) by a certain amount.

The second processing unit 1470 provides an adjustment period immediately after the encoded-signal period, which is desirable, but not limited thereto, because the adjustment period can stably be set so as to be as close to the blanking period as possible, the blanking period being a period during which the phase of the liquid crystals of the display panel 1450 largely changes. The second processing unit 1470 may provide an adjustment period before the time when the next encoded signal is superimposed.

2.2.2. Example of Operation of Second Processing Unit Using Second Method

Next, operation of the second processing unit 1470 using the second method will be described.

An adjustment period during which the backlight 1490 is turned on or off to adjust the total turn-off period can be generally defined as follows. If the original turn-off period (blanking period and black video period) of the backlight 1490 based on a video signal is represented by T4, the total OFF period of an encoded signal in the encoded-signal period that does not overlap the blanking period within the encoded-signal period is represented by T5, and the blanking period after a visible light communication signal has been superimposed is represented by T6, the adjustment period can be given by T4-T5-T6. As described above, it is desirable to set the adjustment period as close to the blanking period as possible.

For example, for the reference region, T5 can be determined by, first, calculating the total OFF period of an encoded signal the encoded-signal period and then subtracting the total OFF period in the encoded-signal period that overlaps the blanking period from the calculated total OFF period.

In the following, a specific example of operation of the second processing unit 1470 using the second method will be described with reference to FIGS. 344A to 345D.

FIGS. 344A to 345D are timing charts for describing the second method in Example 2 in Embodiment 18.

First, operation of the second processing unit 1470 for providing an adjustment period by using the second method when the encoded-signal period and the blanking period do not overlap each other will be described with reference to FIGS. 344A to 344D.

In FIGS. 344A to 344D, a B.L. control signal before an encoded signal is superimposed is illustrated in upper part (a), and a B.L. control signal with an encoded signal superimposed thereon and a B.L. control signal adjusted by using the second method are illustrated in lower parts (b) to (e). In FIGS. 344A to 344D, the blanking period is represented by B1 and the encoded-signal period is represented by C1.

The method for adjusting a B.L. control signal with an encoded signal superimposed thereon by using the second method can be classified into four cases illustrated in FIGS. 344A to 344D on the basis of the sum (time sum) of the adjustment period, the encoded-signal period, and the blanking period and the positive and negative relationship of the adjustment period. Each case is described hereinafter.

Adjustment Method in the Case of No Overlap Between Encoded-Signal Period and Blanking Period (Case 1)

FIG. 344A illustrates an example of a case where the adjustment period is greater than or equal to 0 and the length of (adjustment period+encoded-signal period+blanking period) is less than or equal to the length of one frame.

As illustrated in the upper portion of (b) in FIG. 344A, a portion of the adjustment period is set in a period starting at the end time P2 of the blanking period B1 and ending at the start time P3 of the encoded-signal period C1, and the remaining portion of the adjustment period is set after the encoded-signal period, preferably, immediately after the encoded-signal period (at time P5).

By providing the adjustment period illustrated in the upper portion of (b) in FIG. 344A, the second processing unit 1470 adjusts a B.L. control signal with an encoded signal superimposed thereon in the manner illustrated in the lower portion of (b) in FIG. 344A.

Accordingly, in accordance with the adjusted B.L. control signal, the second control unit 1480 turns off the backlight 1490 over a period even after the blanking period B1 until before the beginning of the encoded-signal period C1, and also turns off the backlight 1490 over the encoded-signal period C1 and a period obtained by subtracting the period from P2 to P3 from the adjustment period after the end of the encoded-signal period C1.

In the case where the adjustment period is shorter than the period from P2 to P3, the adjustment period may be provided only in the P2-P3 period. In the case of P2=P3, the whole adjustment period may be provided after the end of the encoded-signal period C.

Adjustment Method in the Case of No Overlap Between Encoded-Signal Period and Blanking Period (Case 2)

FIG. 344B illustrates an example of a case where the adjustment period is greater than or equal to 0 and the length of (adjustment period+encoded-signal period+blanking period) is longer than the length of one frame.

As illustrated in the upper portion of (c) in FIG. 344B, a portion of the adjustment period is set in a period starting at the end time P2 of the blanking period B1 and ending at time P3 at which the encoded-signal period C1 starts, and the remaining portion of the adjustment period is set in a period which is earlier than the end time P4 of the period of one frame.

By providing the adjustment period illustrated in the upper portion of (c) in FIG. 344B, the second processing unit 1470 adjusts a B.L. control signal with an encoded signal superimposed thereon in the manner illustrated in the lower portion of (c) in FIG. 344B.

Accordingly, in accordance with the adjusted B.L. control signal, the second control unit 1480 turns off the backlight 1490 over a period after the blanking period B1 until the start time P3 of the encoded-signal period C1, and also turns off the backlight 1490 over the period from time P5 before the end of the encoded-signal period C1 until time P4. That is, during the remaining portion of the adjustment period and the period from time P5 to end time P10 of the encoded-signal period C1, which overlaps the encoded-signal period C1, no encoded signal is superimposed on the adjusted B.L. control signal (or the signal is set to OFF) so that no encoded signal is transmitted.

In the case of P2=P3 (same time), the whole adjustment period is provided after the encoded-signal period.

Adjustment Method in the Case of No Overlap Between Encoded-Signal Period and Blanking Period (Case 3)

FIG. 344C illustrates an example of a case where the adjustment period is smaller than 0 and the length of (adjustment period+encoded-signal period+blanking period) is less than or equal to the length of one frame. The term "adjustment period smaller than 0", as used here, refers to an adjustment period during which the backlight 1490 is turned on.

As illustrated in the upper portion of (d) in FIG. 344C, the adjustment period is set in a period (the period from time P6 to time P2) which is earlier than the end time P2 of the blanking period B1 by an amount of time corresponding to the absolute value of the adjustment period.

By providing the adjustment period illustrated in the upper portion of (d) in FIG. 344C, the second processing unit 1470 adjusts a B.L. control signal with an encoded signal superimposed thereon in the manner illustrated in the lower portion of (d) in FIG. 344C.

Accordingly, in accordance with the adjusted B.L. control signal, the second control unit 1480 turns on the backlight 1490 over the period from time P6 to time P2 within the blanking period B1.

In the case of P2=P3, the whole adjustment period may be set after the encoded-signal period C1. In the case where the adjustment period is longer than the blanking period, in view of the duty ratio of encoded signal, no encoded signal may be superimposed and the backlight 1490 may be turned off over a period until an insufficient amount of the turn-on period can be reserved, which is earlier than the end time of the encoded-signal period C1.

Adjustment Method in the Case of No Overlap Between Encoded-Signal Period and Blanking Period (Case 4)

FIG. 344D illustrates an example of a case where the adjustment period is smaller than 0 and the length of (adjustment period+encoded-signal period+blanking period) is longer than the length of one frame.

As illustrated in the upper portion of (e) in FIG. 344D, the adjustment period is set in a period (the period from time P7 to time P2) which is earlier than time P2 at which the blanking period B1 ends by an amount of time corresponding to the absolute value of the adjustment period. Accordingly, the backlight 1490 is turned on over the period from time P7 to time P2 within the blanking period B1.

Considering that the blanking period and the encoded-signal period do not overlap and, additionally, the adjustment period is negative, the absolute value of the adjustment period may be longer than the blanking period. In this case, if the whole adjustment period is set in a period which is earlier than time P2 at which the blanking period B1 ends, time P7 will be set at time P1 or at a time ahead of time P1, resulting in no presence of the blanking period. If it is necessary to turn on the backlight 1490 during the whole blanking period and further turn on the backlight 1490 (or make the region brighter), the backlight 1490 may be turned on over the OFF period of the encoded signal within the encoded-signal period as the remaining period except for the blanking period within the adjustment period. That is, the remaining portion of the adjustment period may be set before a period (time P8) which is earlier than time P9, and the backlight 1490 may be continuously turned on without the encoded signal being superimposed.

The determination of time P8 needs to be based on the fact that the original blanking period B1 is equal to the total OFF period within a period obtained by subtracting the P8-P9 period from the encoded-signal period C1. Specifically, time P8 can be calculated on the basis of the relationship of blanking period B1=(encoded-signal period C1−(time P9−time P8))×(1−Duty).

Accordingly, the second processing unit 1470 can adjust the B.L. control signal so that the second control unit 1480 controls the backlight 1490 to be continuously turned on over, in addition to the blanking period B1, a period after time P8 until the beginning of the subsequent blanking period.

In the case of P2=P3, the whole adjustment period may be provided after the encoded-signal period C1.

Next, operation of the second processing unit 1470 for providing an adjustment period by using the second method when the encoded-signal period and the blanking period overlap each other will be described with reference to FIGS. 345A to 345D.

In FIGS. 345A to 345D, a B.L. control signal before an encoded signal is superimposed is illustrated in upper part (a), and a B.L. control signal with an encoded signal superimposed thereon and a B.L. control signal adjusted by using the second method are illustrated in lower parts (b) to (e). In FIGS. 345A to 345D, the blanking period is represented by B1, the encoded-signal period is represented by C1, and the period from time Q1 to time Q6 is represented by the period of one frame.

The method for adjusting a B.L. control signal with an encoded signal superimposed thereon by using the second method can be classified into four cases illustrated in FIGS. 345A to 345D on the basis of the sum of the adjustment period, the encoded-signal period, and the blanking period and the positive and negative relationship of the adjustment period. Each case is described hereinafter.

Adjustment Method in the Case of Overlap Between Encoded-Signal Period and Blanking Period (Case 1)

FIG. 345A illustrates an example of a case where the adjustment period is greater than or equal to 0 and the length of (adjustment period+encoded-signal period+blanking period) is less than or equal to the length of one frame.

As illustrated in the upper portion of (b) in FIG. 345A, the adjustment period is set in a period starting at time Q4 at which the encoded-signal period C1 ends.

By providing the adjustment period illustrated in the upper portion of (b) in FIG. 345A, the second processing unit 1470 adjusts the B.L. control signal so that, as illustrated in the lower portion of (b) in FIG. 345A, no encoded signal is superimposed during a period from time Q4 to time Q5, which is the adjustment period, and during a period from time Q2 to time Q3 that overlaps the blanking period B1.

Accordingly, in accordance with the adjusted B.L. control signal, the second control unit 1480 turns off the backlight 1490 over the period from time Q2 to time Q3 that overlaps the blanking period B1 and over the period from time Q4 to time Q5. During the period from time Q4 to time Q5, the backlight 1490 is turned off and no encoded signal is transmitted.

Adjustment Method in the Case of Overlap Between Encoded-Signal Period and Blanking Period (Case 2)

FIG. 345B illustrates an example of a case where the adjustment period is greater than or equal to 0 and the length of (adjustment period+encoded-signal period+blanking period) is greater than or equal to the length of one frame.

As illustrated in the upper portion of (c) in FIG. 345B, the adjustment period is set in a period which is earlier than time Q6 at which the encoded-signal period of the next frame starts and which corresponds to the adjustment period, namely, over a period from time Q8 to time Q6.

By providing the adjustment period illustrated in the upper portion of (c) in FIG. 345B, the second processing unit 1470 adjusts the B.L. control signal so that, as illustrated in the lower portion of (c) in FIG. 345B, no encoded signal is superimposed during the period from time Q8 to time Q6, which is the adjustment period, and during a period from time Q2 to time Q3 that overlaps the blanking period B1.

Accordingly, in accordance with the adjusted B.L. control signal, the second control unit 1480 turns off the backlight 1490 over the period from time Q2 to time Q3 that overlaps the blanking period B1 and over the period from time Q8 to time Q6. During the period from time Q8 to time Q6, the backlight 1490 is turned off and no encoded signal is transmitted.

Adjustment Method in the Case of Overlap Between Encoded-Signal Period and Blanking Period (Case 3)

FIG. 345C illustrates an example of a case where the adjustment period is smaller than 0 and the length of (adjustment period+encoded-signal period+blanking period) is greater than or equal to the length of one frame.

As illustrated in the upper portion of (d) in FIG. 345C, the adjustment period is set in a period which is earlier than the end time Q3 of the blanking period B1 by an amount of time corresponding to the absolute value of the adjustment period.

By providing the adjustment period illustrated in the upper portion of (d) in FIG. 345C, the second processing unit 1470 adjusts the B.L. control signal so that, as illustrated in the lower portion of (d) in FIG. 345C, the backlight 1490 is turned on during the period from time Q9 to time Q3, which is the adjustment period, and also adjusts the B.L. control signal so that no encoded signal is superimposed during the blanking period B1.

Accordingly, in accordance with the adjusted B.L. control signal, the second control unit 1480 turns on the backlight 1490 over the period from time Q9 to time Q3.

Note that the encoded signal may be superimposed during the adjustment period. In this case, the adjustment period may be increased by an amount corresponding to the total OFF period of the encoded signal. In the case where the adjustment period is longer than the blanking period, no encoded signal may be superimposed during a predetermined period which is earlier than the end time of the encoded-signal period C1 to reserve an insufficient amount of turn-on period within the adjustment period on the basis of the duty ratio of encoded signal, thereby turning on the backlight 1490.

Adjustment Method in the Case of Overlap Between Encoded-Signal Period and Blanking Period (Case 4)

FIG. 345D illustrates an example of a case where the adjustment period is smaller than 0 and the length of (adjustment period+encoded-signal period+blanking period) is longer than the length of one frame.

As illustrated in the upper portion of (e) in FIG. 345D, the adjustment period is set until time Q10 from the end time Q3 of the blanking period by an amount of time corresponding to the absolute value of the adjustment period.

Accordingly, the backlight 1490 is turned on over a period from time Q10 to time Q3 that overlaps the blanking period B1.

The adjustment period may be increased by an amount corresponding to the total OFF period of the encoded signal, and an encoded signal may be superimposed during the adjustment period.

As in the description with reference to (e) in FIG. 344D, in the case where the adjustment period is very long and the absolute value of the adjustment period is larger than the blanking period B1, the backlight 1490 may be turned on over the OFF period of the encoded signal within the encoded-signal period as the remaining period except for the blanking period B1 within the adjustment period.

The determination of time Q11 needs to be based on the fact that the original blanking period B1 is equal to the total OFF period within a period obtained by subtracting the Q11-Q12 period from the encoded-signal period C1. Specifically, time Q11 can be calculated on the basis of the relationship of blanking period B1=(encoded-signal period C1−(time Q12−time Q11))×(1−Duty).

Accordingly, the second processing unit 1470 can adjust the B.L. control signal so that the second control unit 1480 controls the backlight 1490 to be continuously turned on over, in addition to the blanking period B1, a period from time Q11 to the start time Q7 of the subsequent blanking period.

2.2.3. Advantageous Effects, Etc.

As described above, Example 2 enables a backlight control method for improving video characteristics, such as backlight scan, and the transmission of a visible light communication signal by using a backlight to be concurrently achieved by performing adjustment to make turn-off periods using an encoded signal for visible light communication uniform or to make the turn-off periods equivalent to those for the original video signal.

For example, in the display device according to Example 2, while superimposing the visible light communication signal on the backlight control signal, in the case where there is a region where an overlap occurs between a period of a signal indicating turning off of the backlight in the backlight control signal and a period of the visible light communication signal to be superimposed and the region is one of the plurality of regions, the signal processing unit (the second processing unit 1470) may provide, in the region where the overlap occurs, a turn-on adjustment period for adjusting the luminance of the region where the overlap occurs, and adjust the turning on or off of the backlight control signal during the turn-on adjustment period.

Accordingly, in a region where the visible light communication signal period and the turn-off period of the backlight overlap, an adjustment period enables a difference in luminance to be less noticeable on the display area when a visible light communication signal (encoded signal) is superimposed on a B.L. control signal.

In Example 2, the reference region has been described as a bright region. The reference region may be instead a region where the opening of the display panel 1450 is set to be large.

Example 3

2.3.1. Example of Operation of Second Processing Unit Using Second Method

In Example 2, an adjustment period during which the backlight 1490 is turned on or off is provided to make the luminance of the display surface 1410 (display area) of the display panel 1450 uniform, which is not limited thereto.

In Example 3, a method in which no adjustment period is provided will be described with reference to FIG. 346.

FIG. 346 is a timing chart for describing a method for superimposing a visible light communication signal on a B.L. control signal in Example 3 in Embodiment 18. In (a) in FIG. 346, a B.L. control signal for a certain region is illustrated. In Example 3, a description is given in which signal detection is performed using only the rising edges of a signal waveform.

As illustrated in FIG. 346, no adjustment period is provided and the luminance of a region may be adjusted by changing the duty ratio of a visible light communication signal, or changing the High period of the signal, by an amount corresponding to the adjustment period.

Specifically, for example, in the case where the adjustment period in Example 2 is positive, that is, in the case where adjustment is performed so that the backlight 1490 is turned off, as in (b) in FIG. 346, the High period of the B.L. control signal is shortened.

For example, in the case where the adjustment period in Example 2 is negative, that is, in the case where adjustment is performed so that the backlight 1490 is turned on, as in (c) in FIG. 346, the High period of the B.L. control signal is extended.

It may be that the duty ratio of the B.L. control signal may be changed for each region on the display area. In this case, an adjustment period in Example 2 which is calculated through re-calculation including a change in duty ratio, and a method of changing the High period of a visible light communication signal as in Example 3 may be used in combination for the in-plane driving of the B.L. control signal at a certain duty ratio.

In the foregoing description, luminance control is performed by using the control of the High period of the backlight 1490 (pulse width modulation (PWM) control), achieving in-plane uniformity to prevent degradation in image quality, which is not limited thereto. The second control unit 1480 configured to perform backlight control may control the current to be supplied to the backlight 1490 in the respective regions to make the luminance of a visible light communication area close to the luminance of a region other than the visible light communication area. The second control unit 1480 may further make the luminance of a visible light communication area close to the luminance of a region other than the visible light communication area by using a combination of PWM control and current control for the backlight 1490.

2.3.2. Advantageous Effects, Etc.

As described above, Example 3 enables a backlight control method for improving video characteristics, such as backlight scan, and the transmission of a visible light communication signal by using a backlight to be concurrently achieved by performing adjustment to make turn-off periods using an encoded signal for visible light communication uniform or to make the turn-off periods equivalent to those for the original video signal.

In Example 3, a description has been given in which signal detection is performed using only the rising edges of a signal, but is not limited thereto. In the case of a B.L. control signal that changes the rise positions while holding the fall positions, signal detection may be performed by using the falling edges of a signal. In this embodiment, an encoded signal is superimposed on the basis of the rise time of a B.L. control signal. Alternatively, the superimposition of an encoded signal may be based on any other characteristic timing of a B.L. control signal, such as the fall time, or may be based on a synchronous signal of the video signal. Alternatively, a signal delayed from a synchronous signal of video by a certain period of time may be created, and superimposition may be based on this signal.

3. Advantageous Effects

Accordingly, this embodiment can achieve a display device capable of outputting visible light communication signals without significantly degrading the quality of display images and also capable of reducing errors in reception of the output visible light communication signals.

Embodiment 19

Embodiment 18 describes operation of the display device 1400 in the case where an encoded-signal period is shorter than an ON period of a B.L. control signal. Embodiment 19 describes operation of the display device 1400 in the case where an encoded-signal period is longer than an ON period of a B.L. control signal.

1. Operation of Display Device

In the following, operation of the second processing unit 1470 will be mainly described.

FIG. 347 is a flowchart for describing operation of a second processing unit in Embodiment 19.

First, in step S1301, the second processing unit 1470 re-encodes a visible light communication signal. More specifically, the second processing unit 1470 encodes a visible light communication signal, and generates an encoded (or re-encoded) signal which is assigned with a header and the like. Furthermore, the second processing unit 1470 calculates a transmission time of the encoded signal on the basis of the carrier frequency of the encoded signal.

Then, in step S1302, the second processing unit 1470 determines whether or not the length of the encoded signal is larger than the ON period (turn-on period) of a B.L. control signal.

More specifically, the second processing unit 1470 compares the period during which the backlight 1490 is turned on (turn-on period) with the transmission time length of the encoded signal (encoded signal length) from the duty ratio of the B.L. control signal computed by the first processing unit 1430. When the second processing unit 1470 determines that the transmission time length of the encoded signal is shorter (NO in S1302), the process proceeds to step S1306. When the second processing unit 1470 determines that the transmission time length of the encoded signal is longer (YES in S1302), the process proceeds to step S1303.

In step S1303, the second processing unit 1470 determines whether or not to perform visible light communication. When the second processing unit 1470 determines that visible light communication is performed (YES in S1303), the process proceeds to step S1304. When the second processing unit 1470 determines that no visible light communication is performed (NO in S1303), the process proceeds to step S1309.

In step S1304, the second processing unit 1470 re-encodes the visible light communication signal. Specifically, if the header portion has been encoded with a sequence of signals that is unlikely to be used as normal data, the second processing unit 1470 re-creates (or re-encodes) the visible light communication signal so that the duty ratio of the signal of the header portion is substantially constituted by an OFF state. Thereafter, the second processing unit 1470 performs a process for speeding up the start of transmission of the encoded signal so that the last signal (the signal at the end and indicating the ON state) in the header portion is aligned with the rise time of the B.L. control signal. The details are described below.

Then, in step S1305, the second processing unit 1470 determines whether or not the length of the encoded signal is larger than the ON period (turn-on period) of the B.L. control signal.

More specifically, the second processing unit 1470 compares the turn-on period of the backlight 1490 with the transmission time length of the encoded signal by using the duty ratio of the B.L. control signal. When the second processing unit 1470 determines that the transmission time length of the encoded signal is shorter (NO in S1305), the process proceeds to step S1306. When the second processing unit 1470 determines that the transmission time length of the encoded signal is longer (YES in S1305), the process proceeds to step S1307.

In step S1306, the second processing unit 1470 superimposes the encoded signal on a portion of the B.L. control signal other than the blanking period (i.e., the ON period of the B.L. control signal), and outputs the B.L. control signal with the encoded signal superimposed to the second control unit 1480. Then, the process ends.

In step S1307, on the other hand, the second processing unit 1470 determines whether or not to divide the encoded signal. More specifically, first, the second processing unit 1470 compares the transmission time length of the encoded signal that has been re-encoded with the turn-on period of the backlight 1490. When the transmission time length of the encoded signal is longer, the second processing unit 1470 determines that the encoded signal is divided (YES in S1307), and then the process proceeds to step S1308. When the transmission time length of the encoded signal is shorter, the second processing unit 1470 determines that the encoded signal is not divided (NO in S1307), and then the process proceeds to step S1309.

In step S1308, the second processing unit 1470 divides the encoded signal into segments having lengths each within a data length that is contained in a backlight on period. Then, the second processing unit 1470 adjusts the encoded signal so as to superimpose the encoded signal on a portion of the backlight control signal other than the blanking period (i.e., the ON period of the B.L. control signal), and then the process ends.

In step S1309, the second processing unit 1470 does not transmit the encoded signal to the second control unit 1480. That is, the transmission of a visible light communication signal is canceled.

2. Details of Operation

Next, the details (specific example) of operation of the display device 1400 in Embodiment 19 will be described with reference to FIG. 348A to FIGS. 348D and 349.

2.1. Specific Example 1

FIGS. 348A to 348D are diagrams for describing a specific method for the superimposition of an encoded signal on a B.L. control signal in Embodiment 19.

In this embodiment, the second processing unit 1470 encodes a visible light communication signal by using a coding method such as 4 PPM or I-4 PPM. Encoding of a visible light communication signal by using 4 PPM or I-4 PPM can relatively mitigate a significant change in luminance depending on the signal, preventing luminance instability. A visible light communication signal may be encoded by using a coding method such as Manchester coding.

For example, as illustrated in FIG. 348A, an encoded signal is constituted by a header 1310 and a data section 1311 containing a codeword and the like. It is assumed that the header 1310 is implemented using a sequence of signals that is unlikely to be used as data signals. In I-4 PPM encoding, it is specified that the proportion of the High period in the signal period is basically 75%. Additionally, it is common that a header has three slots (which are the smallest unit of an encoded signal) or more of the ON state in continuous form. The header often ends with the OFF state to indicate the header boundary.

FIG. 348B illustrates a case where an encoded-signal period is shorter than an ON period of a B.L. control signal. That is, as illustrated in FIG. 348B, in the case where an entire encoded signal including a header is shorter than a period except for a blanking period within one frame of a B.L. control signal (i.e., shorter than an ON period of the B.L. control signal), the encoded signal can be superimposed over the ON period of the B.L. control signal without difficulty.

In the case where the encoded-signal period is longer than an ON period of a B.L. control signal, in contrast, it is difficult for the entire encoded signal including the header to be contained in an ON period of the B.L. control signal. Thus, as described above with reference to step S1307, the encoded signal is divided in order for the encoded signal to be contained in ON periods of the B.L. control signal.

FIG. 348C illustrates an example of a case where an encoded signal, the entirety of which, including the header, exceeds the length of one frame of a B.L. control signal, is divided to be superimposed over ON periods of the B.L. control signal. Specifically, the data section 1311 of the encoded signal is divided into a data section 1311-1 and a data section 1311-2 so that the data section 1311-1 and the data section 1311-2, respectively including a header 1310 and a header 92, are superimposed over ON periods of the B.L. control signal. The header 92 includes a discrimination signal indicating that the data section 1311-2 is a portion divided from the data section 1311 and is data subsequent to the data section 1311-1.

In the case where the encoded-signal period is longer than an ON period of a B.L. control signal, as illustrated in FIG. 348D, only portions of the header 1310 may be superimposed over blanking periods of the B.L. control signal and portions of the data section 1311 may be superimposed over ON periods of the B.L. control signal.

2.2. Specific Example 2

A form different from that in FIG. 348D will now be described. Specifically, a description will be given of a specific example in which, when an encoded-signal period is longer than an ON period of a B.L. control signal, only a header portion of an encoded signal is superimposed over a blanking period of the B.L. control signal.

FIG. 349 is a diagram for describing another specific method for the superimposition of an encoded signal on a B.L. control signal in Embodiment 19.

In (a) in FIG. 349, an encoded signal which is encoded by using I-4PRM is illustrated.

As illustrated in (b) in FIG. 349, only a header portion illustrated in (a) in FIG. 349 may be re-encoded by using a coding scheme changed from I-4 PPM to 4 PPM. In this case, as illustrated in (b) in FIG. 349, a header that maintains the ON state and finally transitions to the OFF state is changed to a header that maintains the OFF state and finally transitions to the ON state.

Then, as illustrated in (c) in FIG. 349, the encoded signal illustrated in (b) in FIG. 349 is superimposed on the B.L. control signal. In the example illustrated in (c) in FIG. 349, an encoded signal constituted by a header 1330 that is a signal in the OFF state, a header 1321, and data 1322, the header 1321 and the data 1322 being signals in the ON state, is superimposed on the B.L. control signal.

More specifically, the second processing unit 1470 encodes a visible light communication signal to generate an encoded signal, and superimposes the encoded signal on a backlight control signal as a visible light communication signal. While superimposing the encoded signal on the backlight control signal, in the case where there is a region where an overlap occurs between a period of a signal indicating turning off of the backlight 1490 in the backlight control signal and a period of the encoded signal to be superimposed and the region is one of a plurality of regions, the second processing unit 1470 superimposes a header portion in the encoded signal on the backlight control signal in the period of the signal indicating turning off of the backlight 1490, and superimposes a portion of the encoded signal other than the header portion on the backlight control signal in a period other than the period of the signal indicating turning off of the backlight 1490.

Accordingly, even in the case where an encoded-signal period is longer than an ON period of a B.L. control signal, a data section in the encoded signal can be superimposed over an ON period of the B.L. control signal.

That is, for example, as illustrated in (c) in FIG. 349, the superimposition of the header 1330, which is a signal in the OFF state, over a blanking period of the B.L. control signal can save (or reduce) the encoding time length.

In the case where the adjustment period described in Embodiment 18 is provided, for example, the header 1310 of the encoded signal in FIG. 348D is superimposed over the blanking period of the B.L. control signal so that the backlight 1490 is turned on over a period within the blanking period. In this case, it is necessary to subtract the period during which the backlight 1490 is turned on within the blanking period from the adjustment period.

In contrast, for example, as illustrated in (c) in FIG. 349, in the case where a phase is determined by aligning the end time of the header 1330 of the encoded signal (the time at which the last ON state begins) with the end time of the blanking period, the backlight 1490 is not turned on during the blanking period. Thus, there is no need for the subtraction from the adjustment period.

3. Advantageous Effects, Etc.

Accordingly, this embodiment can achieve a display device capable of outputting visible light communication signals without significantly degrading the quality of display images and also capable of reducing errors in reception of the output visible light communication signals.

While this embodiment describes an example that employs a header of an encoded signal which is encoded by using the typical 4 PPM coding scheme, this is not to be taken in a limiting sense. For example, in the case where an average duty ratio of headers of an encoded signal is high, a header in which the ON signal and the OFF signal are reversed may be superimposed over a blanking period. In this case, as described above, it is desirable to perform adjustment so that an adjustment period includes a reduced amount of time of the turn-off period within the blanking period.

Furthermore, in the case where an entire encoded signal including a header can be superimposed over an ON period of a B.L. control signal (a period during which the backlight 1490 is turned on), an encoding operation may be performed so that the header has a high duty ratio.

Even in the case where a header is superimposed over a blanking period, the header is not successfully included in the blanking period depending on the length of the blanking period. In this case, several kinds of headers may be prepared and any one of them may be used in accordance with the length of the blanking period.

Embodiment 20

This embodiment describes a method of dividing a plurality of regions on the display area into several groups and superimposing encoded signals so that all the encoded signals for an encoded-signal period can be superimposed over ON periods of B.L. control signals.

1. Operation of Second Processing Unit

In the following, a method for determining a timing when an encoded signal is superimposed on the basis of the brightness of the regions with reference to the brightest region will be described as an example.

FIG. 350 is a flowchart for describing a second processing unit in Embodiment 20.

First, in step S1311, the second processing unit 1470 encodes a visible light communication signal. More specifically, the second processing unit 1470 encodes a visible light communication signal, and generates an encoded signal which is assigned with a header and the like. Furthermore, the second processing unit 1470 calculates a transmission time of the encoded signal on the basis of the carrier frequency of the encoded signal.

Then, in step S1312, the second processing unit 1470 divides a display area into a plurality of regions.

Then, in step S1313, the second processing unit 1470 detects a region that is bright in display. More specifically, the second processing unit 1470 detects the brightness of each of the regions obtained as a result of division, and selects a region that is the brightest in display on the basis of the detected brightness. The term "region that is bright in display", as used here, refers to a region having a high signal level, the signal level indicating the light emission energy for an image, rather than a region corresponding to a B.L. control signal having a high duty ratio. The detection of a bright portion will be described in detail below.

Then, in step S1314, the second processing unit 1470 aligns the phase of the encoded signal with a region that is bright in display. More specifically, the second processing unit 1470 superimposes encoded signals having the same phase on the B.L. control signals for all the regions or some selected regions (a plurality of selected regions) at the timing of the B.L. control signal for the brightest region.

As in the other embodiments, no encoded signal is superimposed over the blanking period of a B.L. control signal. This procedure is equivalent to the operation of computing the AND of each B.L. control signal and an encoded signal. The operation of steps S1301 to S1309 in FIG. 347 may be performed, if necessary.

Then, in step S1315, the second processing unit 1470 determines whether or not the encoded-signal period and the blanking period overlap. More specifically, the second processing unit 1470 determines, for each region, whether or not there is an overlapping portion between the encoded-signal period and the blanking period of the B.L. control signal. When the encoded-signal period and the blanking period of the B.L. control signal do not overlap (NO in S1315), the process proceeds to step S1316. In step S1316, the second processing unit 1470 causes the encoded signal to be superimposed on the B.L. control signal, and then the process ends. If there is an overlapping portion (YES in S1315), on the other hand, the process proceeds to step S1317.

In step S1317, the second processing unit 1470 determines whether or not to perform visible light communication. If no visible light communication is performed (NO in S1317), the process proceeds to step S1318. If visible light communication signal is performed (YES in S1317), the process proceeds to step S1320. In step S1320, the second processing unit 1470 performs duty ratio adjustment so that no encoded signal is transmitted, and then the process ends.

In step S1318, the second processing unit 1470 changes the phase of the encoded signal, and superimposes the phase-changed encoded signal on the B.L. control signal.

Then, in step S1319, the second processing unit 1470 determines whether or not the blanking period overlaps the bright region. If there is no overlap (NO in S1319), the process proceeds to step S1320. If there is an overlap (YES in S1319), the process proceeds to step S1321.

In step S1321, the second processing unit 1470 determines whether or not the process has been completed for the respective regions. If the process has not been completed for all the regions (NO in S1321), the process returns to S1315. If the process has been completed for all the regions (YES in S1321), the process proceeds to step S1322.

In step S1322, the second processing unit 1470 determines whether or not there is a region where no encoded signal is superimposed. If there is a region where no encoded signal is superimposed (YES in S1322), the process returns to step S1313. If there is no region with no encoded signal superimposed (NO in S1322), the process ends.

2. Details of Operation

Next, the details (specific example) of the display device 1400 in Embodiment 20 will be described with reference to FIGS. 351 and 352.

FIG. 351 is a timing chart illustrating an example of the division of regions into groups in Embodiment 20, and FIG. 352 is a timing chart illustrating another example of the division of regions into groups in Embodiment 20. In FIGS. 351 and 352, the shaded portions (or hatched portions) indicate periods (encoded-signal periods) during which encoded signals are superimposed.

For example, as illustrated in FIG. 351, the plurality of regions on the display area are divided into three groups. Specifically, the regions A, B, and C are classified into a group G1, the regions F, G, and H into a group G2, and the regions D and E into a group G3. For each group, as illustrated in FIG. 351, encoded signals are superimposed at the same timing within the same period. For example, in the group G1, superimposition is performed on the basis of the region C, which is the brightest. In the group G2, superimposition is performed on the basis of the region H, which is the brightest in this group. In the group G3, superimposition is performed on the basis of the region E, which is the brightest in this group.

As illustrated in FIG. 352, the plurality of regions on the display area may be divided into two groups. That is, the regions A, B, C, and D may be classified into a group G1, and the regions E, F, G, and H into a group G2. For each group, encoded signals are superimposed at the same timing within the same period.

3. Advantageous Effects, Etc.

As described above, in the display device according to this embodiment, the signal processing unit (the second processing unit 1470) superimposes visible light communication signals on backlight control signals for each of a plurality of groups each including a plurality of neighboring regions among the plurality of regions, the visible light communication signals to be superimposed for each of the plurality of groups are in phase with each other, and all the corresponding visible light communication signals are superimposed on the backlight control signals for each of the plurality of groups over a period during which the backlight (1490) is subjected to light emission control.

This, the display device can superimpose all the encoded signals for an encoded-signal period over ON periods of B.L. control signals. This can reduce errors in reception of output visible light communication signals. In other words, visible light communication signals can be superimposed over ON periods of B.L. control signals without missing, enabling a reduction in errors in reception of output visible light communication signals.

In addition, the signal processing unit (the second processing unit 1470) may align phases of the visible light communication signals to be superimposed for each of the plurality of groups on the basis of a backlight control signal for a predetermined region among the plurality of regions included in the corresponding one of the plurality of groups.

Accordingly, the display device can output visible light communication signals without further missing for each selected one of the plurality of groups.

The predetermined region is the brightest region among the plurality of regions.

Accordingly, the display device 1400 can make a difference in luminance less noticeable on the display area.

In addition, the phases of the visible light communication signals to be superimposed for one group among the plurality of groups are different from the phases of the visible light communication signals to be superimposed for the other groups among the plurality of groups.

Accordingly, the display device 1400 can output visible light communication signals without further missing for each selected one of the plurality of groups.

In some cases, it may be difficult to divide regions into groups in the way described above. That is, even when regions are divided into groups, there may be regions on which encoded signals having the same phase are included. The operation for such a case will be described hereinafter.

FIG. 353 is a timing chart illustrating another example of the division of regions into groups in Embodiment 20. In FIG. 353, the shaded portions (or hatched portions) indicate periods (encoded-signal periods) during which encoded signals are superimposed.

For example, the example illustrated in FIG. 353 is a special example of FIGS. 351 and 352. As illustrated in FIG. 353, no encoded signal is transmitted for portions where encoded signals having the same phase are not included in the stage where regions are divided into groups.

Specifically, the regions A, B, C, and D are separated from the other regions, and encoded signals of the same phase are superimposed on the regions A, B, C, and D. For the region D, no encoded signal is superimposed over a period where the encoded-signal period overlaps the blanking period. In the example illustrated in FIG. 353, furthermore, no encoded signal is superimposed over the regions (i.e., the regions E to H) subsequent to the region D.

In the case where there are regions on which encoded signals having the same phase are not included even when regions are divided into groups, a reference region may be simply determined and encoded signals may be superimposed for only regions near the reference region (or neighboring regions of the reference region). In this case, the range over which encoded signals are superimposed may be based on the flowchart described above, or may be limited to a range determined in advance.

In addition, the adjustment period described above may be provided to prevent the occurrence of a difference in luminance between a region for which an encoded signal is superimposed and a region for which no encoded signal is superimposed and a difference in luminance within a region for which an encoded signal is superimposed.

In this embodiment, superimposition is performed based on the rise time of a B.L. control signal. Alternatively, the superimposition may be based on any other characteristic timing of a B.L. control signal, such as the fall time, or may be based on a synchronous signal of the video signal. Alternatively, a signal delayed from a synchronous signal of video by a certain period of time may be created, and superimposition may be based on this signal.

It is very difficult to search for a non-blanking period for each of the plurality of regions on the display area. Furthermore, such a period would be very short. In the present disclosure, even in the case of the superimposition of an encoded signal on a B.L. control signal, the blanking period is prioritized as much as possible to suppress the turn on of the backlight during the blanking period to avoid degradation in image quality.

However, it is common that the blanking period and the encoded-signal period do not overlap in some regions, whereas the blanking period and the encoded-signal period overlap in other regions.

To address such an inconvenience, this embodiment discloses a method for preventing an overlap between the blanking period and the encoded-signal period for regions as many as possible among the plurality of regions on the display area. Specifically, in this embodiment, the plurality of regions are divided into several groups, and encoded signals of a certain phase are superimposed for each group. This can reduce overlap between the blanking period and the encoded-signal period for the group in question.

In this embodiment, the description has been given of an example in which the plurality of regions are divided into two or three groups, which is not limited thereto.

Desirably, the plurality of regions are divided into groups by separating the regions into several groups in advance, and how the phase is shifted is set in advance.

In this embodiment, furthermore, the plurality of regions are divided into groups so that the superimposition of the encoded signal length (all the encoded-signal periods) is based on a bright region, which is not limited thereto. It may be that the regions may be divided into a large number of groups on the basis of this criterion. Thus, the number of groups may be restrictive. Not all the encoded-signal periods may be necessarily superimposable for regions divided into groups.

The encoded signals to be superimposed on regions in each group may be the same or different. If an encoded signal obtained by the receiver includes two or more signals, the probability of the occurrence of a recognition failure or an error increases. The term “two or more signals” refers to different encoded signals that can be received by the same receiver at the same time, two or more signals that are the same encoded signal but have different phases, which can be received by the same receiver at the same time, or a combination of the above cases. The configuration described above can reduce the probability of the occurrence of a recognition failure or an error.

Furthermore, groups into which regions are divided on the basis of a certain criterion are not limited to those in the example described above. The division of regions into groups may be based on the result of signal processing performed by the second processing unit 1470 in accordance with the relationship between a video signal and an encoded signal.

An LED-based backlight or the like has a light source as small as a point source, and uses a light guide plate, a diffuser plate, or the like to expand a region in order to achieve surface emission as in LCD backlighting. For the control of an LED in each region, the backlight is designed such that adjacent regions overlap, leading to a certain amount or more of light leakage.

In an LED-based backlight or the like, accordingly, light leaking from at least an adjacent region causes another signal to appear as noise even when regions are divided into several groups. It is therefore desirable to avoid encoded signals in regions including adjacent blocks from overlapping in time. To this end, the following configuration may be used. For example, no encoded signal for the frame in question is transmitted at the portion in question or temporally consecutive or overlapping encoded signals are transmitted from regions at distant locations.

In the case where no encoded signal for the frame in question is transmitted at the portion in question, from which region an encoded signal is output may be determined for each frame and the encoded signal may be separated. Alternatively, an encoded signal for a specific portion (which may be linked to a video signal) may be transmitted preferentially.

Also in the case where the transmission periods of encoded signals having different phases for different regions overlap, it may be sufficient that the regions not be continuous or spaced apart by a certain distance. The reason for this is that signals are receivable in the case where, for example, signals are received from limited regions. The distance between regions having different phases needs to be determined by determining over what range light leakage from the backlight occurs, and is thus a value based on the performance of the display device used.

Alternatively, the method described above may be applied to each of a plurality of blocks into which respective regions are divided.

Embodiment 21

When an encoded signal is received by using a light intensity sensor with a high response speed such as a photodiode, a phase difference between an image and an encoded signal does not cause a major problem.

On the other hand, in the case where an encoded signal is obtained by imaging using an image sensor in a camera such as a digital still camera or a camera incorporated in a smartphone or a mobile phone, a slight phase difference can cause the exposure timing and the turn-on or off edge portion of a signal or the timing of the start or/and end of a series of encoded-signal periods to occur simultaneously or with a very short time difference, resulting in the signal failing to be obtained as an effective signal. An image sensor typically has an imaging period of 30 fps, and, for example, a video signal with 60 fps is synchronous with an encoded signal. In this case, unless the timing is out of the imaging time of the image sensor, a timing mismatch may continue between the imaging period of the image sensor and the period of the encoded signal.

Accordingly, this embodiment describes a method for shifting the phase of an encoded signal to address the issue described above.

1. Operation of Display Device

In the following, operation of the second processing unit 1470 will be mainly described.

FIG. 354 is a flowchart for describing operation of a second processing unit in Embodiment 21.

First, in step S1331, the second processing unit 1470 shifts synchronization of a signal. More specifically, in the case where the synchronization between the display panel 1450 and the backlight 1490 is not fixed, the second processing unit 1470 shifts synchronization of an encoded signal. This is effective to increase the probability of imaging of the smartphone 1350.

Then, in step S1332, the second processing unit 1470 calculates the AND of a B.L. control signal and an encoded signal from a duty ratio based on a video signal output from the first processing unit 1430.

Then, in step S1333, the second processing unit 1470 performs duty ratio adjustment based on the video signal and/or a visible light communication signal.

More specifically, as described in Embodiment 18, the second processing unit 1470 checks whether or not the encoded-signal period and the blanking period overlap each other, and provides an adjustment period in accordance with the situation. When the duty ratio of a B.L. control signal for the frame in question and the duty ratio of the B.L. control signal which is based on the original video signal are different by an amount corresponding to the adjustment period, the second processing unit 1470 performs duty ratio adjustment by using, for example, a period during which the transmission of an encoded signal is stopped. For example, the second processing unit 1470 performs duty ratio adjustment by setting a period during which the backlight 1490 is turned off (an OFF period of the B.L. control signal) in a period separate from the blanking period. Then, the second processing unit 1470 outputs a B.L. control signal on which an encoded signal adjusted by using the adjustment period is superimposed to the second control unit 1480.

In the case where the phase relationship between the encoded signal and the video signal is returned to the original for a certain period, these signals may be corrected so as to have a predetermined phase difference.

Additionally, in the case where the encoded signal and the video signal have a relationship in which the phase of the encoded signal and the phase of the video signal change over time at a frequency different from the frequency of the video signal, that is, one of the phases is not substantially an integer multiple of the other, the encoded signal and the video signal may not necessarily be controlled to make the phases match. This is because the phase relationship between these signals is returned to the original when a certain period of time elapses without the alignment of both phases, thus ensuring that a time period during which a signal is difficult to receive and a time period during which a signal is easily receivable are present somewhere.

FIGS. 355A and 355B are diagrams for describing the phase relationship between a B.L. control signal and a visible light communication signal in Embodiment 21.

For example, in the illustration of FIG. 355A, an encoded signal based on a visible light communication signal and a B.L. control signal X are in phase at certain intervals with reference to the B.L. control signal X. In FIG. 355A, the portions shaded with oblique lines indicate periods during which an encoded signal is actually transmitted. In the illustration, by way of example, the encoded signal is output for a short period at intervals longer than that for the B.L. control signal. However, as described above, either of the signal lengths may be larger than the other. In practical use, either of the encoded signal transmission period and the length of the B.L. control signal may be longer than the other; preferably, the encoded signal transmission period is shorter than the length of the B.L. control signal. In the illustrated example, the encoded signal is repeated seven times while the B.L. control signal X is repeated twelve times. For example, when the B.L. control signal runs at 60 fps, both signals are in phase at intervals of 0.2 seconds. In FIG. 355B, on the other hand, there is no particular relation between the B.L. control signal X and the encoded signal; the relationship between the phases at the beginning of the encoded signal transmission period and the beginning of the B.L. control signal changes for each frame, such as at the first half part of the B.L. control signal at f1, the second half at f2, and substantially the intermediate position at f3. While the phase relationship between both signals is not returned to the original by using least common multiple, sequential phase shifts can overcome the timing mismatch of imaging at some point in time. Furthermore, even at f2 when an encoded signal is being transmitted in a period corresponding to an interval of the B.L. control signal or at a time starting at f5, the encoded signal is interrupted in the region X, which will not cause a problem since the encoded signal can be transmitted in any other region with certainty. The relation between video and communication information may be stored in a buffer memory or the like, and the immediately previously stored relation may be retrieved and encoded as a communication signal for use. In the case where it takes a long time, for example, several seconds or more, to return the phase relationship between both signals to the original, the phase relationship may be forcibly returned to the original. For example, after the encoded signal is completed at f8 in FIG. 355B, the phases of the B.L. control signal and the encoded signal may be again aligned with each other at f9, or may not be aligned with each other. Phase alignment may be performed at intervals of, for example, 1 second, or no phase alignment may be performed.

2. Details of Operation

Next, the details (specific example) of operation of the display device 1400 in Embodiment 20 will be described with reference to FIGS. 356A, 356B, and 356C.

FIGS. 356A, 356B, and 356C are timing charts for describing operation of the second processing unit in Embodiment 21. The shaded portions (or hatched portions) indicate regions where an encoded signal is present. FIG. 356A is a timing chart of a B.L. control signal before an encoded signal is superimposed, and FIG. 356B is a timing chart of a B.L. control signal after an encoded signal has been superimposed. FIG. 356C illustrates an example of a temporal change in the relationship between the phase of a backlight control signal and the phase of a visible light communication signal as a result of setting a delay time from the rise or fall time of the backlight control signal and superimposing an encoded signal.

For example, the synchronization between the encoded signal and the B.L. control signal is shifted in the manner illustrated in FIG. 356A. This ensures that a timing at which the receiver such as the smartphone 1350 can receive the encoded signal occurs. The adjustment period described above may be computed for each phase difference in each frame and may be provided.

As in FIG. 356C, for example, the region A may be used as a reference, and a time difference β1 between a rise U2 of the backlight control signal and a start V2 of the visible light communication signal may be set as a delay time in advance and an encoded signal may be superimposed. A time difference β2 between a rise U3 of the next frame and a start V3 of the visible light communication signal may be the same as or different from β1. In the example illustrated in FIG. 356C, β denotes a delay expressed by a positive value (time). Alternatively, β may denote an advance expressed by a negative value (time).

Alternatively, a frame with β being 0 may be included. Any region may be used as a reference, or a region may be selected on the basis of the criterion described above. In the foregoing description, the rise time of a backlight control signal is used as the reference time. Alternatively, any other characteristic criterion regarding the waveform of a signal, such as the fall time, may be used. The reference time may be based on, instead of a characteristic portion of a backlight control signal in a predetermined region, a synchronous signal of the video signal, or a signal delayed from a synchronous signal of video by a certain period of time may be created and the reference time may be based on this signal.

In this embodiment, video signals and encoded signals are not in one-to-one correspondence. Thus, some pieces of encoded data and image data may be buffered in advance in an internal memory (not illustrated) or the like of the display device 1400 before the processing described above is performed.

Desirably, the period (one frame length) of a video signal and a period in which an encoded signal is superimposed have a least common multiple within, preferably, one second, more preferably, 0.5 seconds. In addition, tracking may be performed for a period that is the least common multiple from the timing when these two periods are synchronized and for each of the periods that are integer multiples of the least common multiple from the timing when these two periods are synchronized, and a fine time shift (phase difference) caused by an error produced for each period may be corrected.

Additionally, as described above, in the case where the period or/and frequency of a video signal and the period or/and frequency of an encoded signal have a relationship in which a temporal change in phase occurs, the relationship between two phases may not necessarily controlled, even without the need for the respective period to have a least common multiple within 1 second, when the rate of change is fast, for example, when a more significant change than a repetition of the same phase relationship occurs within a second. The rate of change is preferably that described above, but is not limited thereto.

3. Advantageous Effects, Etc.

As described above, in the display device according to this embodiment, the signal processing unit (the second processing unit 1470) temporally changes delay times after which a visible light communication signal (encoded signal) is encoded for backlight control signals for the plurality of regions, on the basis of one of the backlight control signals for the plurality of regions.

This configuration can ensure that a timing at which the receiver such as the smartphone 1350 can receive an encoded signal occurs.

The signal processing unit (the second processing unit 1470) may superimpose a visible light communication signal (encoded signal) on the plurality of backlight control signals in a period different from the periods of the backlight control signals, and change relationships between phases of the backlight control signals and a phase of the visible light communication signal in accordance with frames for each of the plurality of regions.

The periods in which the visible light communication signals are superimposed, which are different from the periods of the backlight control signal, may change with time.

Furthermore, the phases of visible light communication signals to be superimposed on the plurality of backlight control signals may be identical for all the regions for which a visible light communication signal is superimposed.

Furthermore, a period in which each of the phases of the visible light communication signals to be superimposed on the plurality of regions is shifted and the period of one frame of the backlight control signals may have a least common multiple within 1 sec.

This can ensure that a timing at which the receiver such as the smartphone 1350 can receive an encoded signal occurs within a relatively short period.

In addition, the signal processing unit (the second processing unit 1470) may correct the starting point of the period in which each of the phases of the visible light communication signals (encoded signals) to be superimposed on the plurality of regions is shifted to the period of one frame of the backlight control signals, for a period that is a least common multiple of the period in which each of the phases of the visible light communication signals (encoded signals) to be superimposed on the plurality of regions is shifted and the period of one frame of the backlight control signals or for each of periods that are integer multiples of the least common multiple.

Accordingly, correcting a phase shift can prevent the timing at which the receiver such as the smartphone 1350 can receive an encoded signal from being extended over a long time.

A period of time indicated by a least common multiple of the two types of periods is typically a number (period of time) at least during which a communication signal can be received as long as a positional relationship or environment in which the communication signal can be received is obtained and within which a person who wishes to receive signals can wait while holding a receiver over a terminal. Typically, it is recommended that a receiver be held over a terminal based on NFC or the like for a second, which is an estimated waiting time. It is desirable to set a period of time less than or equal to this waiting time. More desirably, the least common multiple is less than or equal to 0.5 seconds as a mentally less stressful time.

Embodiment 22

In Embodiments 18 to 21, sequential control of respective regions by the speed of scanning driven at a normal speed to display an image signal has been described. Additionally, sequential control of respective regions by the speed of scanning driven at a double speed faster than a normal speed to display an image signal may also be available.

In this embodiment, sequential control of respective regions by the speed of scanning driven at a 4× speed to display a double-speed image signal will be described as an example. In the following, the blanking period will be basically described in the context of the time for double-speed driving.

1. Operation of Display Device

In the following, operation of the second processing unit 1470 will be mainly described.

FIGS. 357A and 357B are timing charts for describing operation of a second processing unit in Embodiment 22. The shaded portions (or hatched portions) indicate regions where an encoded signal is present. FIG. 357A is a timing chart of a B.L. control signal before an encoded signal is superimposed, and FIG. 357B is a timing chart of a B.L. control signal after an encoded signal has been superimposed.

For example, as illustrated in FIG. 357A, there is no period for B.L. control signals A to H during which the backlight is simultaneously turned on. That is, it is not possible for encoded signals to be simultaneously superimposed for all the regions on the display area.

In this embodiment, for example, as illustrated in FIG. 357B, a period of scanning of regions during a blanking period is set to one half the normal value. Then, the region H, which is a region for which the blanking period of the B.L. control signal begins latest among a plurality of regions (or among all the regions), is selected.

The second processing unit 1470 superimposes an encoded signal on the selected region H in accordance with the timing (the time at which the B.L. control signal H is turned on) when the blanking period for the region H ends and when the turning on of the backlight 1490 is started.

In the example illustrated in FIG. 357B, the second processing unit 1470 superimposes encoded signals for all the regions on the display area at the timing when the blanking period of the B.L. control signal H ends and when the B.L. control signal H is turned on.

Accordingly, the second processing unit 1470 can set a period during which an encoded signal is superimposed for any region to a period that is half a frame at the maximum on the display area.

2. Advantageous Effects, Etc.

As described above, in the display device according to this embodiment, the display control unit (the first control unit 1440) controls the display panel (1450) to display video on the display surface of the display panel in accordance with a high scanning speed that is higher than a scanning speed indicated by the video signal.

Accordingly, the display device can take a longer period to output an encoded signal.

In the case where the length of an encoded signal (encoded-signal period) is long so that the encoded signal may not be superimposed over only the ON period of a B.L. control signal (a period other than the blanking period) and there is a region for which the encoded-signal period overlaps the blanking period, no encoded signal is superimposed for this region during the blanking period.

In addition, an adjustment period during which the backlight 1490 is turned on within the blanking period and which corresponds to a turn-off period of time based on an encoded signal superimposed on an ON period of a B.L. control signal may be provided. The adjustment period may be created by using the method described above in the foregoing embodiments, or the header of the encoded signal may be superimposed in the blanking period. Additionally, the plurality of regions on the display area may be divided into several groups to superimpose an encoded signal.

A similar operation may also be performed for a region (another region) other than the region in question described above, or no signal may be output. In this case, an adjustment period for the turn-off period of time may be provided by using the method described above in the foregoing embodiment so that the duty ratio based on the visible light communication signal or/and the video signal is identical across the entire screen. As in Embodiment 20, the brightest region may be selected and an encoded signal may be superimposed at the timing of the selected region. In this embodiment, superimposition is performed based on the rise time of a B.L. control signal. Alternatively, the superimposition may be based on any other characteristic timing of a B.L. control signal, such as the fall time, or may be based on a synchronous signal of the video signal. Alternatively, a signal delayed from a synchronous signal of video by a certain period of time may be created, and superimposition may be based on this signal.

In this embodiment, the description has been given of an example in which a double-speed scanning speed is changed to a 4× scanning speed, which is not limited thereto. Only the scanning speed may be increased while the number of frames remains unchanged.

In this embodiment, furthermore, it is anticipated that the form described above is prepared in advance before the transmission of a signal. Alternatively, a method may be adopted in which the second processing unit transmits a signal according to this embodiment from the relationship between a video signal and an encoded signal. In this case, in FIG. 340, the transmission of a signal from the second processing unit 1470 to the first processing unit 1430 is involved, and thus the two blocks are connected by a double-headed arrow.

Embodiment 23

In Embodiments 18 to 22, a control method for providing a period during which a plurality of regions are controlled to be turned off at different timings has been described in the context of backlight scan, but is not limited thereto. Local dimming may be used.

This embodiment describes operation when local dimming is applied.

Local dimming is a backlight control method in which a display area (screen) is divided into several regions and the transmittance of the liquid crystals in a certain region is made higher than the normal value while the luminance of the backlight is reduced (the duty is reduced) accordingly to save power. Power saving using this control method is available when there is room for increasing the transmittance at a pixel having the highest luminance within the region in question (i.e., when the highest luminance has a relatively low value). Additionally, reducing the duty of the backlight reduces the turn-on period, resulting in advantageously improving contrast.

1. Backlight Control with Local Dimming

Next, a B.L. control signal controlled by using local dimming will be described.

FIG. 358 is a timing chart illustrating backlight control in Embodiment 23 when local dimming is applied.

When backlight control is performed by applying local dimming, for example, as illustrated in FIG. 358, an interval T between the timings of the start of the blanking periods is uniform for adjacent regions, whereas the lengths of the blanking periods are not uniform.

In this embodiment, accordingly, it is desirable for the display device 1400 to store in a memory the blanking period of a B.L. control signal which is defined based on a video signal provided in advance for each region on the display area, and to perform a process (operation) described below.

2. Operation of Display Device

In the following, operation of the second processing unit 1470 will be mainly described. This embodiment illustrates signal control in the case where the OFF period per frame is made uniform across the respective regions on the display area.

2.1. Example of Operation of Second Processing Unit

FIG. 359 is a flowchart for describing an example of operation of the second processing unit in Embodiment 23.

First, in step S1341, the second processing unit 1470 calculates an adjustment period. Specifically, an adjustment period N is given by the relation of N=N2−N1, where N1 denotes the turn-off period of time for the encoded signal and N2 denotes the turn-off period of time for a B.L. control signal input from the first processing unit 1430. Accordingly, the second processing unit 1470 can calculate (or determine) an adjustment period.

Then, in step S1342, the second processing unit 1470 determines whether or not the sum (N+C) of the adjustment period N and an encoded-signal period C is less than or equal to the period of one frame.

When the second processing unit 1470 determines that the sum (N+C) is less than or equal to the period of one frame (YES in S1342), the process proceeds to step S1343. When the second processing unit 1470 determines that the sum (N+C) is larger than the period of one frame (NO in S1342), on the other hand, the process proceeds to step S1346. In step S1346, the second processing unit 1470 does not output an encoded signal, and then the process ends.

In step S1343, the second processing unit 1470 determines whether or not the adjustment period N is greater than or equal to 0.

When the adjustment period N is greater than or equal to 0 (YES in S1343), the process proceeds to step S1344. In step S1344, the second processing unit 1470 provides a turn-off period at a position that is earlier than the start of the next encoded signal by an amount corresponding to the adjustment period N. In addition, no encoded signal is output during this period. Then, the process ends.

When the adjustment period N is smaller than 0 (NO in S1343), on the other hand, the process proceeds to step S1345. In step S1345, the second processing unit 1470 provides a turn-on period (ON period) that ends at the end of the blanking period of the B.L. control signal and that corresponds to the adjustment period N within the blanking period of the B.L. control signal. In addition, no encoded signal is output during this adjustment period.

FIG. 360 is a timing chart for describing an example of operation of a second processing unit in Embodiment 23. In FIG. 360, the bold lines indicate ON and OFF periods of B.L. control signals, and, in the following description, the region A is used as a reference region. In the drawings, a region controlled by a B.L. control signal X (where X is any of A to H) is referred to as a "region X".

For example, as illustrated in FIG. 360, the second processing unit 1470 superimposes encoded signals that are in phase with one another on the respective regions from the timing of the beginning of a frame for the region A serving as a reference region, and further provides an adjustment period. The adjustment period can be provided in accordance with the second method in Embodiment 18. The second method has been described above, and thus is not described here.

In this embodiment, as in Embodiments 18 to 22, basically, no encoded signal is superimposed while a B.L. control signal is in the OFF period (i.e., the blanking period), and an encoded signal is superimposed while a B.L. control signal is in the ON period. The adjustment period may be converted by taking into account the duty ratio of the encoded signal. In this case, an encoded signal may be superimposed and output in a period which is an adjustment period and during which an encoded signal is output.

2.2. Example of Operation of Second Processing Unit

Even in local dimming, as in normal backlight scan control, blanking periods may be sequentially provided as priority. A process in this case will now be described.

FIG. 361 is a flowchart for describing an example of operation of the second processing unit in Embodiment 23.

First, in step S1351, the second processing unit 1470 calculates an adjustment period. Specifically, an adjustment period N is given by the relation of N=N1−N2−N3, where N1 denotes the blanking period for a predetermined region, N2 denotes the turn-off period of time for the encoded signal, and N3 denotes the blanking period for the region in question. Accordingly, the second processing unit 1470 can calculate (or determine) an adjustment period.

Then, in step S1352, the second processing unit 1470 determines whether or not the sum (N+C+N3) of the adjustment period N, an encoded-signal period C, and a blanking period N3 for the region in question is less than or equal to the period of one frame, and stores the determination result.

Then, in step S1353, the second processing unit 1470 determines whether or not the adjustment period N is greater than or equal to 0, and stores the determination result.

Through the steps described above, the second processing unit 1470 provides an adjustment period on the basis of the values N1 to N3 stored for each region and the determination results in steps S1352 and S1353, and performs visible light communication simultaneously with video display.

The adjustment period may be created by using the second method in Embodiment 18 or by using the second method in Embodiment 18 in combination with the methods described in Embodiments 19 to 22 and the like.

FIG. 362 is a timing chart for describing an example of operation of the second processing unit in Embodiment 23. In FIG. 362, an adjustment period is provided by using the second method described in Embodiment 18. The bold lines indicate the ON period and OFF period of each B.L. control signal, and, in the following description, the region A is used as a reference region.

For example, as illustrated in FIG. 362, the second processing unit 1470 superimposes encoded signals that are in phase with one another on the respective regions over a period from time P to time Q after a certain period of time has elapsed since the timing of the beginning of a frame for the region A serving as a reference region, and further provides an adjustment period. The adjustment period can be provided in accordance with the second method in Embodiment 18. The second method has been described above, and thus is not described here.

In this embodiment, as in Embodiments 18 to 22, basically, no encoded signal is superimposed while a B.L. control signal is in the OFF period (i.e., the blanking period), and an encoded signal is superimposed while a B.L. control signal is in the ON period. For example, for the region A, a certain period after time P is a blanking period during which the B.L. control signal A is OFF, and no encoded signal is superimposed. After the encoded-signal period C, an adjustment period is provided.

The adjustment period may be converted by taking into account the duty ratio of the encoded signal. In this case, an encoded signal may be superimposed and output in a period which is an adjustment period and during which an encoded signal is output.

2.3. Example of Operation of Second Processing Unit

FIG. 363 is a timing chart for describing an example of operation of the second processing unit in Embodiment 23.

In backlight control using local dimming, the blanking periods of B.L. control signals basically differ from frame to frame and from region to region. Thus, a provisional blanking period (referred to as a "specified blanking period") is defined, for convenience of calculation. Then, an adjustment period can be calculated in accordance with the second method in Embodiment 18 by using the specified blanking period, the encoded-signal period, the phase difference therebetween, and the original blanking period. In the following, an example of this case will be described with reference to FIG. 363. In FIG. 363, the bold lines indicate waveforms indicating the original blanking period.

The specified blanking period is determined based on the average length of the blanking periods across the screen and the shortest period. The specified blanking period is defined as a turn-off period over which no encoded signal is superimposed. The encoded-signal period is a period during which an encoded signal is superimposed.

The adjustment period may be provided by using the second method in Embodiment 18. When the adjustment period is positive, the B.L. control signal may be adjusted so that the backlight 1490 is turned off during this period. When the adjustment period is negative, the B.L. control signal may be adjusted so that the backlight 1490 is turned on. In the case where the adjustment period is provided in the previous blanking period, the B.L. control signal may be adjusted so that the backlight 1490 is turned on even during the blanking period. When the adjustment period is negative, in order to superimpose an encoded signal on a B.L. control signal in the adjustment period, the adjustment period may be adjusted based on the duty ratio.

3. Advantageous Effects, Etc.

As described above, in the display device according to this embodiment, the backlight control unit (the second control unit 1480) provides a period during which light emission control is performed for each of the plurality of regions and turn-off control is performed for each of the plurality of regions at a different timing in accordance with an amount of light emitted from the backlight based on each video signal in accordance with the backlight control signal output by the signal processing unit (the second processing unit 1470), and also changes the duty of the backlight based on the video signal and the visible light communication signal for each of the plurality of regions.

In this embodiment, superimposition is performed based on the rise time of a B.L. control signal. Alternatively, the superimposition may be based on any other characteristic timing of a B.L. control signal, such as the fall time, or may be based on a synchronous signal of the video signal. Alternatively, a signal delayed from a synchronous signal of video by a certain period of time may be created, and superimposition may be based on this signal.

In this embodiment, the description has been given of the application of local dimming. In local dimming, an area is two-dimensionally divided, and a video signal may be subjected to scanning and writing simultaneously in a certain direction. Thus, a combination of areas having the same phase in the blanking periods but having different lengths of the blanking periods may occur. The technique described in this embodiment is applicable to the occurrence of such areas.

As described above, embodiments have been described as illustrative examples of technique in the present disclosure. For this purpose, the accompanying drawings and the detailed description are provided.

As such, elements illustrated in the accompanying drawings and the detailed description may include not only essential elements for solving the problems, but also non-essential elements for solving the problems in order to illustrate such techniques. Thus, the mere fact that those non-essential elements are illustrated in the accompanying drawings and the detailed description should not be interpreted as requiring that such elements be essential.

Since the embodiments described above are intended to illustrate the technique in the present disclosure, the technique in the present disclosure is not limited to these embodiments and a variety of modifications, replacements, additions, omissions, and others can be made while remaining within the scope of the claims and equivalents thereof.

For example, in the embodiments described above, superimposition is performed based on the rise time of a B.L. control signal, by way of example, but not limited thereto. The superimposition may be based on any other characteristic timing of a B.L. control signal, such as the fall time, or may be based on a synchronous signal of the video signal. Alternatively, a signal delayed from a synchronous signal of video by a certain period of time may be created, and superimposition may be based on this signal.

The present disclosure is applicable to a display device capable of outputting visible light communication signals without significantly degrading the quality of display images and also capable of reducing errors in reception of the output visible light communication signals. Specifically, a display device according to an exemplary embodiment of the present disclosure is capable of safely and actively obtaining information other than images, and is thus applicable to various purposes such as transferring image-attached information and transmitting information for any situations, in a sense that a signage from the road, an information terminal, or an information display device, as well as a home device such as a television set, a PC, or a tablet, can safely obtain necessary information as much as desired due to their active characteristics.

In addition, for example, the display device according to Embodiments 18 to 23 may be a display device capable of outputting a visible light communication signal, including a display panel having a display surface to display video, a display control unit that controls the display panel to display video on the display surface of the display panel in accordance with a video signal, a backlight having a light emitting surface to illuminate the display surface of the display panel from the back of the display surface, a signal processing unit that superimposes the visible light communication signal on a backlight control signal generated based on the video signal, and a backlight control unit that divides the light emitting surface of the backlight into a plurality of regions and that provides a period during which light emission control is performed for each of the plurality of regions and turn-off control is performed for each of the plurality of regions at a different timing in accordance with the backlight control signal output by the signal processing unit. While superimposing the visible light communication signal on the backlight control signal, the signal processing unit may not superimpose the visible light communication signal on a signal indicating turning off of the backlight in the backlight control signal.

In addition, for example, the signal processing unit may superimpose the visible light communication signal on each of the backlight control signals for the plurality of regions, and the visible light communication signals superimposed on the plurality of regions are in phase with each other. In the display device according to Embodiments 18 to 23, for example, the signal processing unit may align the phases of the visible light communication signals to be superimposed for the plurality of regions with each other by using as a reference a backlight control signal for a predetermined region among the plurality of regions.

For example, the predetermined region may be the brightest region among the plurality of regions. Alternatively, the predetermined region may be a region corresponding to an end of the display surface among the plurality of regions.

In addition, for example, the signal processing unit may superimpose visible light communication signals on backlight control signals for each of a plurality of groups each including a plurality of neighboring regions among the plurality of regions, the visible light communication signals to be superimposed for each of the plurality of groups may be in phase with each other, and all the corresponding visible light communication signals may be superimposed on the backlight control signals for each of the plurality of groups over a period during which the backlight is subjected to light emission control.

For example, the signal processing unit may align phases of the visible light communication signals to be superimposed for each of the plurality of groups on the basis of a backlight control signal for a predetermined region among the plurality of regions included in the corresponding one of the plurality of groups. The predetermined region may be the brightest region among the plurality of regions.

In addition, for example, the phases of the visible light communication signals to be superimposed for one group among the plurality of groups may be different from the phases of the visible light communication signals to be superimposed for the other groups among the plurality of groups.

For example, while superimposing the visible light communication signal on the backlight control signal, in the case where there is a region where an overlap occurs between a period of a signal indicating turning off of the backlight in the backlight control signal and a period of the visible light communication signal to be superimposed and the region is one of the plurality of regions, the signal processing unit may provide, in the region where the overlap occurs, a turn-on adjustment period for adjusting the luminance of the region where the overlap occurs, and adjust the turning on or off of the backlight control signal during the turn-on adjustment period.

For example, the signal processing unit may encode the visible light communication signal to generate an encoded signal, and superimpose the encoded signal on the backlight control signal as the visible light communication signal. While superimposing the encoded signal on the backlight control signal, in the case where there is a region where an overlap occurs between a period of a signal indicating turning off of the backlight in the backlight control signal and a period of the encoded signal to be superimposed and the region is one of the plurality of regions, the signal processing unit may superimpose a header portion in the encoded signal on the backlight control signal in the period of the signal indicating turning off of the backlight, and superimpose a portion of the encoded signal other than the header portion on the backlight control signal in a period other than the period of the signal indicating turning off of the backlight.

In addition, for example, the signal processing unit may superimpose a visible light communication signal on the plurality of backlight control signals in a period different from the periods of the backlight control signals, and change relationships between phases of the backlight control signals and a phase of the visible light communication signal in accordance with frames for each of the plurality of regions. The period in which the visible light communication signal is superimposed, which is different from the periods of the backlight control signals, may change with time.

In addition, for example, the signal processing unit may temporally change delay times after which a visible light communication signal is encoded for backlight control signals for the plurality of regions, on the basis of one of the backlight control signals for the plurality of regions.

In addition, for example, the phases of visible light communication signals to be superimposed on the plurality of backlight control signals may be identical for all the regions for which a visible light communication signal is superimposed.

For example, a period in which each of the phases of the visible light communication signals to be superimposed on the plurality of regions is shifted and the period of one frame of the backlight control signals may have a least common multiple within 1 sec.

In addition, for example, the signal processing unit may correct the starting point of the period in which each of the phases of the visible light communication signals to be superimposed on the plurality of regions is shifted to the period of one frame of the backlight control signals, for a period that is a least common multiple of the period in which each of the phases of the visible light communication signals to be superimposed on the plurality of regions is shifted and the period of one frame of the backlight control signals or for each of periods that are integer multiples of the least common multiple.

For example, the display control unit may be configured to control the display panel to display video on the display surface of the display panel in accordance with a high scanning speed that is higher than a scanning speed indicated by the video signal.

In addition, the backlight control unit may provide a period during which light emission control is performed for each of the plurality of regions and turn-off control is performed for each of the plurality of regions at a different timing in accordance with an amount of light emitted from the backlight based on each video signal, in accordance with the backlight control signal output by the signal processing unit, and may also change the duty of the backlight based on the video signal and the visible light communication signal for each of the plurality of regions.

In addition, a method for controlling the display device according to Embodiments 18 to 23 is a method for controlling a display device capable of outputting a visible light communication signal, the display device including a display panel having a display surface to display video, and a backlight having a light emitting surface to illuminate the display surface of the display panel from the back of the display surface. The control method includes a display control step of controlling the display panel to display video on the display surface of the display panel in accordance with a video signal, a signal processing step of superimposing the visible light communication signal on a backlight control signal generated based on the video signal, and a backlight control step of dividing the light emitting surface of the backlight into a plurality of regions and providing a period during which light emission control is performed for each of the plurality of regions and turn-off control is performed for each of the plurality of regions at a different timing in accordance with the backlight control signal output in the signal processing step. In the signal processing step, while the visible light communication signal is superimposed on the backlight control signal, the visible light communication signal is not superimposed on a signal indicating turning off of the backlight in the backlight control signal.

Embodiments 18 to 23 is applicable to a display device capable of outputting visible light communication signals without significantly degrading the quality of display images and also capable of reducing errors in reception of the output visible light communication signals. Specifically, a display device according to Embodiments 18 to 23 is capable of safely and actively obtaining information other than images, and is thus applicable to various purposes such as transferring image-attached information and transmitting information for any situations, in a sense that a signage from the road, an information terminal, or an information display device, as well as a home device such as a television set, a PC, or a tablet, can safely obtain necessary information as much as desired due to their active characteristics.

Embodiment 24

An embodiment of the present disclosure relates to a display device capable of outputting a visible light communication signal.

Japanese Unexamined Patent Application Publication No. 2007-43706 and Japanese Unexamined Patent Application Publication No. 2009-212768 disclose a communication technique using visible light. Japanese Unexamined Patent Application Publication No. 2007-43706 and Japanese Unexamined Patent Application Publication No. 2009-212768 disclose a communication technique for a video display device, examples of which include a display and a projector, for superimposing visible light communication information on normal video to be displayed to display the video with the visible light communication information superimposed.

An embodiment of the present disclosure provides a display device capable of outputting visible light communication signals without significantly degrading the quality of display images and also capable of reducing errors in reception of the output visible light communication signals.

A display device in an aspect of the present disclosure is a display device capable of outputting a visible light communication signal, including a display panel having a display surface to display video based on a video signal, a backlight having a light emitting surface to illuminate the display surface of the display panel from the back of the display surface, and a visible light communication processing unit that divides a visible light communication signal into a predetermined number of segments for each signal unit having a predetermined length, encodes the segments of the visible light communication signal to generate blocks, and determines a transmission order of blocks to be transmitted within a transmission frame that is a period during which blocks, the number of which is equal to the predetermined number, are transmitted. The visible light communication processing unit makes a transmission order of blocks to be transmitted within a transmission frame different from a transmission order of blocks to be transmitted within an adjacent transmission frame.

A display device according to an embodiment of the present disclosure can output visible light communication signals without significantly degrading the quality of display images, and can also reduce errors in reception of the output visible light communication signals.

Hereinafter, embodiments will be described in detail with reference to the drawings as appropriate. However, detailed description more than necessary may be omitted. For example, the detailed description of well-known matters or repeated description of substantially the same configuration may be omitted. This is for preventing the following description from being unnecessarily redundant, thus facilitating the understanding by those skilled in the art.

The accompanying drawings and the following description are provided to help those skilled in the art fully understand the present disclosure, and are not intended to limit the scope of the subject matters as defined in the claims.

Embodiment 24 will be described hereinafter with reference to FIGS. 364 to 372.

1. Configuration

FIG. 364 is a schematic diagram illustrating an example of a visible light communication system according to an embodiment.

1.1. Configuration of Visible Light Communication System

A visible light communication system 10 illustrated in FIG. 364 includes a display device 1500 and a smartphone 1501.

The display device 1500 is, for example, a display, and is capable of displaying video on a display surface 1510. The display device 1500 is also capable of superimposing a visible light communication signal on the display surface 1510.

The smartphone 1501 is an example of an electronic device that receives a visible light communication signal, and is capable of receiving a visible light communication signal transmitted from the display device 1500. This allows the user of the smartphone 1501 to receive information related to the video displayed on the display device 1500, for example.

In this embodiment, the display device 1500 will be described in the context of a display configured to display video for purposes of illustration but not of limitation. The display device 1500 may be a device configured to project video, such as a projector. While the smartphone 1501 is used as an electronic device that receives a visible light communication signal output from the display device 1500 as an example, any electronic device, other than a smartphone, capable of receiving a visible light communication signal may be used. For example, the electronic device may be a reception device conforming to the JEITA CP-1222 standard. Alternatively, the electronic device may be a general mobile terminal. The electronic device may also be configured to receive a visible light communication signal and to decode the received visible light communication signal to obtain information.

The information transmission scheme for transmitting a visible light communication signal may conform to a standard such as JEITA CP-1223, which is being developed into an international standard, or IEEE P802.15, which has been standardized. In other words, the electronic device may be implemented by using a reception device supporting any of the standards described above.

1.2. Configuration of Display Device

FIG. 365 is a block diagram illustrating a schematic configuration of a display device according to this embodiment.

The display device 1500 illustrated in FIG. 365 is a display device capable of outputting a visible light communication signal. The display device 1500 includes a video signal input unit 1520, a video processing unit 1530, a display control unit 1540, a display panel 1550, a visible light communication signal input unit 1560, a visible light communication signal processing unit 1570, a backlight control unit 1580, and a backlight 1590.

The video signal input unit 1520 receives input of a video signal related to video to be displayed on the display panel 1550. The video signal input unit 1520 transmits the input video signal to the video processing unit 1530.

The video processing unit 1530 performs general image processing, such as processing for enhancing image quality, on the video signal. The video processing unit 1530 transmits the video signal subjected to the image processing to the display control unit 1540 and the visible light communication signal processing unit 1570. The video signal includes information on the brightness and the like of the video. The display panel 1550 is a liquid crystal panel, for example, and has the display surface 1510 to display video.

The display control unit 1540 controls the display panel 1550 to display video on the display surface 1510 of the display panel 1550 in accordance with a video signal. In this embodiment, the display control unit 1540 performs control to display video on the display panel 1550 in accordance with the video signal transmitted from the video processing unit 1530. More specifically, the display control unit 1540 controls the opening and the like of the liquid crystals of the display panel 1550 in accordance with the video signal transmitted from the video processing unit 1530.

The visible light communication signal input unit 1560 receives input of a signal for use in visible light communication (hereinafter referred to as a "visible light communication signal"). The visible light communication signal input unit 1560 transmits the input visible light communication signal to the visible light communication signal processing unit 1570.

The visible light communication signal processing unit 1570 performs processing such as encoding the received visible light communication signal and determining the transmission order of visible light communication signals. Further, the visible light communication signal processing unit 1570 receives a video signal from the video processing unit 1530.

The visible light communication signal processing unit 1570 converts the encoded visible light communication signal into a signal for backlight control. The visible light communication signal processing unit 1570 transmits the generated signal for backlight control and the video signal to the backlight control unit 1580.

The backlight control unit 1580 divides a light emitting surface of the backlight 1590 into a plurality of regions, and performs control to provide a period during which light emission control is performed for each of the plurality of regions and turn-off control is performed for each of the plurality of regions on the light emitting surface at a different timing in accordance with the video signal.

In this embodiment, the backlight control unit 1580 controls the luminance and timing of the backlight 1590 in accordance with a backlight control signal generated based on the video signal transmitted from the video processing unit 1530 or the visible light communication signal processing unit 1570. The backlight control unit 1580 further controls light emission of the backlight 1590 in accordance with the signal for backlight control transmitted from the visible light communication signal processing unit 1570.

The backlight 1590 irradiates the display panel 1550 with light from the back of the display panel 1550. More specifically, the backlight 1590 has a light emitting surface to illuminate the display surface 1510 of the display panel 1550 from the back of the display surface 1510. This enables a viewer to view the video displayed on the display panel 1550.

In some cases, the light emitting surface of the backlight 1590 may be subjected to sequential light emission control to improve image quality. In this embodiment, the display surface 1510 is used as a visible light communication area. In the visible light communication area, it is difficult to continuously transmit a signal over a long period since there is a period during which no light emission is performed based on a video signal. Accordingly, an error in signal reception may occur when a signal having a long data length is transmitted.

FIG. 366 is a schematic diagram illustrating an example of the generation of a visible light communication signal of the related art.

In this embodiment, as illustrated in FIG. 366, control is performed to divide each signal unit having a predetermined length into a predetermined number of segments and to transmit each segment. In this embodiment, each signal unit is divided into four segments. The number of segments may be determined by using the carrier frequency of the visible light communication signal, the data length of the signal, and the period during which the backlight 1590 does not emit light in accordance with a video signal. In this embodiment, furthermore, each signal unit is divided into equal segments. However, each signal unit may not necessarily be divided into equal segments, and one segment may have a larger size than the other segments.

The term "one frame", as used herein, refers to a period from when the first line is scanned until the first line is again scanned. One frame in the display device 1500 is hereinafter referred to as a "video frame". If there is a period during which the backlight 1590 is not turned on for each video frame because the video frame is short, the video frame may have the same length as a block period necessary to transmit data of one block or the block period may be shorter than the video frame. In this embodiment, the description will be given taking as an example the case where the video frame and the block period have the same length, for simplicity. The description will be made assuming that the period of one block includes the stop period of the backlight 1590, which is present in every video signal frame.

First, as illustrated in (a) in FIG. 366, a video signal is divided into signal units of a predetermined length. As illustrated in (b) in FIG. 366, each signal unit is divided into four data segments 1 to 4 ("data 1", "data 2", "data 3", and "data 4"). The data segments 1 to 4 are each encoded and then assigned a header unit, and thus blocks 1 to 4 are generated, as illustrated in (c) in FIG. 366. The blocks in each of the signal units are numbered in a predetermined transmission order. In (c) in FIG. 366, the transmission numbers are in the order of the blocks 1, 2, 3, and 4.

As illustrated in (d) in FIG. 366, the header unit is constituted by "preamble", "address", "parity", and "data". The preamble is a signal including an identifier indicating a visible light communication signal, and may be represented by an ON/OFF sequence (combination) that falls outside the coding rules, as in, for example, 4 PPM or i-4 PPM. The address is a portion indicating a place of the corresponding block in the order of the blocks in the divided signal unit, and is encoded and transmitted in a manner similar to that for the data segment. The parity is a portion used for the determination of whether or not the received data segment is incorrect, and is also unencoded data. In general, the duty of the signal is not constant; however, unlike the preamble, the parity may not necessarily be incompliant with the coding rules. The parity may be a sequence of signals conforming to the coding rules.

In the following description, the minimum period necessary to transmit blocks generated from one signal unit in sequence, that is, a period necessary to transmit blocks, the number of which is equal to the number of blocks into which one signal unit is divided, is referred to as a "transmission frame". In this embodiment, the description will be given taking as an example the case where one signal unit is divided into four blocks. In this embodiment, therefore, the transmission period of four blocks corresponds to one transmission frame.

The video to be displayed in the visible light communication area is illuminated by light based on a visible light communication signal, and the video is not displayed with an appropriate luminance indicated by a video signal. This may result in only the visible light communication area being darker than the other regions.

To address this issue, in the case where the display panel 1550 is a liquid crystal panel, the opening of the liquid crystals can be controlled to adjust the luminance, and this feature may be utilized. That is, the display control unit 1540 may control the display panel 1550 so that the visible light communication area has a higher luminance than that when a video signal is input. More specifically, the display control unit 1540 may control the display panel 1550 so that, in a period during which the display device 1500 outputs a visible light communication signal, an area (visible light communication area) on the display surface 1510 corresponding to the visible light communication area has a higher luminance than the luminance with which video is displayed based on a video signal.

The ratio of two types of intensities of an encoded signal is referred to as "percent modulation". In general, when the percent modulation is 100%, the highest S/N is achieved. Visible light communication and the like, in particular, may cause a problem in that flicker is more noticeable to the human eye. An encoded visible light communication signal is described herein as an ON/OFF (turn-on/turn-off) signal with a percent modulation of 100%. However, High/Low modulation, which is not 100% percent modulation, may be used. There is no specific limitation on the relationship between High and Low, for example, 100%/10% or 80%/30%. It is sufficient to satisfy the relationship of High>Low. In the following description, ON/OFF (turn-on/turn-off) may be replaced with High/Low or the like. In addition, the duty ratio of the visible light communication signal is handled merely as a value in which the ON (turn-on) period is normalized for the entire signal transmission period but may be read concurrently as (High level×High period+Low level×Low period)/(signal transmission period×High level).

1-3. Operation

Basic operation in which a visible light communication signal transmitted from the display device 1500 having the configuration described above is received by the smartphone 1501 including an image sensor (not illustrated) will now be described.

FIG. 367 is a schematic diagram for describing the turning on of a display device for visible light communication, exposure performed in the smartphone 1501, and a captured image.

An image sensor used in a smartphone or the like adopts sequential exposure, and is exposed to light with a temporal scan on a line-by-line basis. In this embodiment, the description is given of the case where a total of eight lines are used as exposure elements, for ease of understanding. In this embodiment, the exposure lines are shaped into vertically oriented strips on the smartphone 1501 side. As illustrated in FIG. 367, the first to eighth lines are sequentially exposed. When the lines up to the eighth line are sequentially exposed, exposure information on all the lines is simultaneously sent to the display device, and a captured image is displayed in accordance with the exposure information. Exposure scan is performed in such a manner that after the exposure of the eighth line is completed, exposure is sequentially started again from the first line. An interval for the time within which data is stored in a memory or the like may exist in a period from when the exposure of all the lines is completed to when the exposure of the first line is started, and the above duration includes a period during which no image is captured.

In this case, if the smartphone 1501 captures an image of the display device 1500 that is transmitting visible light communication signals, the display device 1500 rapidly blinks and thus repeatedly blinks many times during the period of one frame of the smartphone 1501. In the following, one frame of the smartphone 1501 is referred to as a "received frame" to distinguish it from the video frame of the display device and the transmission frame.

For instance, attention is placed on a received frame L of the captured image. Since the first line for exposure of the smartphone 1501 corresponds to the turning on of the display device 1500 and the second line also corresponds to the turn-on state, the captured images are in bright illumination. The third line and the fourth line correspond to the turn-off state of the display device 1500, and thus the captured images are dark lines. The fifth line and the sixth line correspond to the turning on of the display device 1500, and thus the captured images are bright lines. The seventh line corresponds to the turning off of the display device 1500, and thus the captured image is a dark line. The eighth line corresponds to the turning on of the display device 1500, and thus the captured image is a bright line. The pieces of image information on the captured images are put together to form a single image. The visible light communication signal is reproduced in such a manner that a temporal blink of the visible light communication signal is reproduced as an image in an exposure scan direction on the image sensor on the received side. The captured image is subjected to image processing or the like to restore a signal to obtain a visible light communication signal.

Likewise, in a received frame L+1, the first to third lines correspond to the turn-on state, the fourth to sixth lines correspond to the turn-off state, and the seventh and eighth lines correspond to the turn-on state. Thus, bright lines appear for the first to third lines and the seventh to eighth lines, and dark lines appear for the fourth to sixth lines. In the following, the visible light communication signal is referred to as the "transmission signal".

FIG. 368 is a schematic diagram for describing a transmission signal, exposure performed in the smartphone 1501, and a captured image.

In FIG. 368, a case is illustrated in which the display device 1500 divides a transmission signal into four segments to generate blocks 1 to 4 and the block 1, the block 2, the block 3, and the block 4 are transmitted in carousel fashion in this order within a transmission frame. As illustrated in FIG. 368, for a received frame L, signal 1 has been transmitted for the first and second lines at the exposure timing of the smartphone 1501, and signal 2 has been transmitted at the timing of the third and fourth lines. Further, signal 3 has been transmitted for the fifth and sixth lines, and signal 4 has been transmitted for the seventh and eighth lines. In the captured image on the smartphone 1501, the signals 1 to 4 are sequentially exposed in the order of the exposure lines, resulting in captured images of the signals 1 to 4 appearing from left to right on the screen. Also for a received frame L+1, the display device 1500 has transmitted signals 1 to 4 in carousel fashion. Thus, as in the received frame L, signal 1 is exposed for the first and second lines for exposure of the smartphone 1501, and similar operation is performed on the subsequent lines so that signal 4 is exposed for the seventh and eighth lines for exposure. In the captured image, captured images of signals 1 to 4 appear from left to right on the screen. In this manner, when the transmission timing of the display device 1500 and the exposure timing of the smartphone 1501 have the same period, transmitted signals and received captured images are identical in position. Accordingly, the signal 1 is always displayed in the left portion of the captured image and the signal 4 in the right portion of the captured image.

1-3-1. Division of Transmission Block

As illustrated in FIG. 368, transmission signal according to this embodiment is continuously transmitted using a carousel scheme. Thus, even if any reception failure occurs in a transmission signal due to a blank in video or the like, any block which is missing due to the reception failure can be received in the subsequent transmission signal. As illustrated in FIG. 368, furthermore, a transmission signal is divided into a plurality of blocks which are then transmitted. The reception of one block is completed when the whole from the preamble to the data is received, and all the blocks into which a signal unit is divided are received to enable the transmission signal of the signal unit to be restored. For example, the receiver accumulates, based on the received address, data associated with the address in a buffer, and sequentially updates received data. When new data is received for a block whose data has been received, the old data may be overwritten, or may not be overwritten if the old data and the new data are identical as a result of comparison. When both pieces of data are different, the old data may be deleted. That is, the old data may be used to check reception. Furthermore, when data of a block whose data has been received is received again, no operation may be performed on the buffer. The accumulation of data in the buffer is repeatedly performed in the way described above, and when the data of all the blocks is collected, a transmission signal may be restored.

1-3-2. Reset Operation

Next, the reset timing of a transmission signal will be described. In the case where the same transmission signal is transmitted using a carousel scheme, a transmitted block may not be received at a certain timing. In this case, the same transmission signal has been transmitted in carousel fashion. Thus, it may be sufficient to receive the unreceived block when the subsequent transmission signal is transmitted. In the carousel scheme, all the necessary blocks are received by the reception of a plurality of identical signals, and a transmission signal can be restored when all the blocks are successfully received. Since each block is received a plurality of times, when a transmission signal is changed and a different transmission signal is transmitted, it is difficult to determine whether a received block is a block generated from the preceding signal unit or a block generated from the subsequent signal unit.

Accordingly, the display device 1500 according to this embodiment transmits a reset signal when transmission signals are switched. Through this reset operation, a block which has been successfully received by the receiver and which is accumulated in the buffer is discarded. The reset signal is designed so as to be transmitted periodically, and is transmitted at a timing of once or less for several seconds.

The reset signal is a signal specific to resetting, and thus a sequence of preamble and data signals having any feature may be used as a reset signal. For example, in the case where the 4 PPM or i-4 PPM scheme is used as a coding scheme, the average duty ratio in the address and data transmission period, that is, a period during which the ON state is maintained, is constant. A signal in which the average duty ratio or the period during which the ON state is maintained described above is different, for example, a signal having a sequence that falls outside the coding rules, as in, for example, 4 PPM or i-4 PPM, may be transmitted. For example, an ON signal and an OFF signal may be repeatedly and successively transmitted, or an ON signal or an OFF signal may be continuously transmitted. The transmission of such a signal is limited only to the transmission of the data section, and a signal that falls outside the normal rules may also be transmitted in the parity or preamble period. In an extreme example, a reset signal may be implemented by continuously transmitting an ON signal for all the periods or by continuously transmitting an OFF signal for all the periods. The latter method may be implemented by, as a result, providing a no-signal period during which no transmission signal is transmitted. Alternatively, a certain ID in a signal may be used as a reset signal.

The reset signal needs to be transmitted within several seconds, and is transmitted for a longer period than that for the periodical reset described above, thus ensuring that the reset signal can be received. Meanwhile, the transmission and reception of a transmission signal is not possible during the transmission of the reset signal. The transmission of the reset signal for too long a period causes the reception of no signal to extend over a long period, which may result in a recipient of a transmission signal experiencing mental stress. Accordingly, the reset signal may be transmitted within a second at the longest, preferably, for approximately 0.5 seconds.

The frequency with which a reset signal is transmitted will now be described. As can be anticipated, a reset signal needs to be transmitted each time a transmission signal is modified synchronously with a video signal. In addition, even in the case where no transmission signal is modified, a reset signal may be included at certain intervals or randomly to take measures against failure to obtain all the transmission blocks due to the occurrence of consecutive reception errors. In this case, a reset signal can be transmitted with a frequency of several times a minute, desirably approximately every 20 seconds or less, more desirably approximately every 10 seconds, thus allowing the recipient to be notified of inability of reception when a signal is not receivable. This can reduce the mental stress experienced by the recipient.

1-3-3. Operation of Visible Light Communication Signal Processing Unit

FIG. 369 is a flowchart describing processing operation of the visible light communication signal processing unit 1570 of the display device 1500 according to Embodiment 24. The operation of dividing a signal into blocks, which is performed by the visible light communication signal processing unit 1570, will now be described with reference to FIG. 369.

When a transmission signal is input from the visible light communication signal input unit 1560, the visible light communication signal processing unit 1570 reads a transmission signal corresponding to one signal unit, divides the transmission signal into a predetermined number of segments, encodes each segment, and assigns a header unit to each segment to generate a predetermined number of blocks (steps S1501 to S1503).

The visible light communication signal processing unit 1570 determines the transmission order of the generated blocks by referring to the block transmission order in the immediately preceding transmission frame. A method for determining a block transmission order will be described below (step S1504).

The visible light communication signal processing unit 1570 converts the signals of the respective blocks into signals for backlight control (step S1505).

The visible light communication signal processing unit 1570 outputs the converted signals for backlight control to the backlight control unit 1580 in the transmission order determined in step S1504 (step S1506).

When there is any unprocessed transmission signal, the visible light communication signal processing unit 1570 returns to step S1502. When there is no unprocessed transmission signal, the process ends (step S1507).

1-3-4. Determination Method of Transmission Block Order

FIG. 370 is a diagram describing a relationship between the frequency of the display device 1500 and the frequency of the smartphone 1501. In the drawings, numbers in transmission blocks and received blocks indicate the numbers of the blocks. That is, "1", "2", "3", and "4" respectively denote block 1, block 2, block 3, and block 4.

Typically, a liquid crystal display used in the display device 1500 operates at 60 Hz. A display operates at 120 Hz or 240 Hz, and an image sensor in a camera of the smartphone 1501 operates at 30 fps. One of the frequencies of the display and the image sensor is an integer multiple or integer submultiple of the other. A transmission signal is transmitted synchronously with the frequency of the display by subjecting the transmission of blocks of a signal from the backlight 1590 of the display device 1500 to luminance control or the control of video resolution and the like, allowing the frequency of the display to be an integer multiple of the frequency of the image sensor. In this case, exposure positions (display lines) of the image sensor and the positions of blocks whose signals can be received may always be aligned. In this way, the frequencies match, thereby causing the positions of receivable blocks in a transmission frame to be fixed. This results in a situation where only a specific block among a plurality of blocks can be received whereas the other blocks are not receivable.

FIG. 370 illustrates a case where the display device 1500 operates with a video frame running at 120 Hz and the camera of the smartphone 1501 operates at 30 fps. In FIG. 370, an example is illustrated in which one signal unit is divided into four segments and blocks in each of a transmission frame n, a transmission frame n+1, and a transmission frame n+2 are transmitted in the order of block 1, block 2, block 3, and block 4. As illustrated in FIG. 370, in general, an image sensor configured to capture an image by using sequential exposure may have a blanking period, as well as an imaging period, during which, for example, data of each exposure line which subjected to sequential exposure is stored in a memory. In FIG. 370, each of received frames L to L+2 includes an imaging period and a blanking period. In the case illustrated in FIG. 370, the receivable period in the imaging period of the smartphone 1501 corresponds to the screen range of the display device 1500. In this case, as can be seen from FIG. 370, the smartphone 1501 can receive the transmission signals of the blocks 2 and 3 without missing during the receivable period while the transmission signals of the blocks 1 and 4 are missing.

To avoid such missing of signals, the display device 1500 according to this embodiment compares adjacent signal units of a signal transmitted using a carousel scheme, and changes the transmission order of blocks in a transmission frame so that the place of one block in the transmission order is not the same as that of the other blocks. The place of a certain block in the order of transmitting blocks in a transmission frame is referred to as a transmission subframe. For example, when a block x is transmitted in the m-th place in the n-th transmission frame, the block x is referred to as the "transmission subframe m" of the transmission frame n.

FIG. 371 is a diagram for describing an example of a transmission method by a display device according to Embodiment 24. FIG. 371 illustrates blocks allocated to four transmission subframes in transmission frames. In (a) to (e) in FIG. 371, "1", "2", "3", and "4" respectively denote block 1, block 2, block 3, and block 4. In FIG. 371, the transmission orders of blocks in three consecutive transmission frames are illustrated.

In the case where the display device 1500 transmits signals in a certain period by using a carousel scheme, each of the signals is divided into a plurality of blocks and each of the resulting blocks is assigned an address corresponding to data.

In (a) in FIG. 371, the block 1, the block 2, the block 3, and the block 4 are transmitted in the transmission frame n in this order. In the transmission frame n+1, the transmission order is changed to the order of the block 2, the block 3, the block 4, and the block 1. In this case, the order has a feature in that the positions of blocks in the orders for adjacent transmission frames are different from each other by at least one or more. For example, as the transmission subframe 1, the block 1 is transmitted in the transmission frame n and the block 2 is transmitted in the transmission frame n+1. In the transmission frame n+2, as the transmission subframe 1, a block other than the block 2 needs to be transmitted since the transmission subframe 1 in the transmission frame n+1 is the block 2. In (a) in FIG. 371, the block 3 is transmitted, followed by the block 4, the block 1, and the block 2 in this order. In (a) in FIG. 371, the block at the position of the transmission subframe 1 in the immediately preceding transmission frame is moved to the transmission subframe 4 at the end of the current transmission frame, and the remaining blocks are sequentially moved to the immediately preceding transmission subframes.

In (b) in FIG. 371, blocks in transmission subframes are transmitted alternately in ascending order (1, 2, 3, 4) and descending order (4, 3, 2, 1). This transmission order enables lost blocks to be quickly collected, improving the reception speed.

In (c) in FIG. 371, not all the blocks into which one signal unit is divided are transmitted but one of them is omitted, achieving the effect of pseudo-modification of the transmission period. In the transmission frame n, the block 4 is omitted and the blocks 1, 2, and 3 are transmitted. Then, the block 1 is omitted and the block 2 is transmitted. In the transmission frame n+1, the remaining blocks 3 and 4 are transmitted. Then, the block 2 is omitted and the blocks 1 and 3 are transmitted. In the transmission frame n+2, the remaining block 4 is transmitted. Then, the block 3 is omitted and the blocks 1, 2, and 4 are transmitted. In this way, the transmission order can be changed using a plurality of transmission frames, and all the blocks can be transmitted the same number of times.

In (d) in FIG. 371, instead of each of all the blocks into which one signal unit is divided being transmitted once, addition of one block can achieve the effect of pseudo-modification of the transmission period. In the transmission frame n, the block 1 is added. Thus, the block 1, the block 1, the block 2, and the block 3 are transmitted. In the transmission frame n+1, the remaining block 4 in the transmission frame n is transmitted and the block 2 is added. Thus, the block 4, the block 1, the block 2, and the block 2 are transmitted. In the transmission frame n+2, the remaining blocks 3 and 4 are transmitted. In this way, the transmission order can be changed using a plurality of transmission frames.

In (e) in FIG. 371, the transmission orders in transmission subframes are changed randomly. The transmission of blocks in a random order eliminates the need for the estimation of which block has failed to be received, enabling transmission not depending on the receiver.

The transmission order can be rearranged by changing the number of transmissions of a block.

FIG. 372 is a diagram for describing another example of a transmission method by a display device according to Embodiment 24.

FIG. 372 illustrates blocks received by the smartphone 1501 when the display device 1500 transmits the same block successively twice in a transmission frame. In FIG. 372, each block is transmitted twice. In FIG. 372, the transmission of four blocks is completed in the transmission of two transmission frames. In FIG. 372, the receivable period of the smartphone 1501 extends from the middle of transmission subframe 1 to the middle of transmission subframe 4 in a transmission frame. Accordingly, blocks transmitted as transmission subframes 2 and 3 can be received without missing.

As illustrated in FIG. 372, in the case where the display device 1500 transmits the same block successively twice, the blocks 1 and 2 can be received in a transmission frame n, and the blocks 3 and 4 can be received in a transmission frame n+1. In the display device 1500 according to Embodiment 24, a signal unit is divided into four blocks. Thus, as illustrated in FIG. 372, a transmission signal of one signal unit extends over two transmission frames, as indicated by the transmission frame n and the transmission frame n+1, enabling the signal to be restored.

1-3-5. Advantageous Effects, Etc.

As described above, in this embodiment, a display device 1500 includes a display panel 1550 having a display surface to display video based on a video signal, a backlight 1590 having a light emitting surface to illuminate the display surface 1510 of the display panel 1550 from the back of the display surface 1510, and a visible light communication signal processing unit 1570 that divides a visible light communication signal into a predetermined number of segments for each signal unit having a predetermined length, encodes the segments of the visible light communication signal to generate blocks, and determines a transmission order of blocks to be transmitted within a transmission frame that is a period during which blocks, the number of which is equal to the predetermined number, are transmitted. The visible light communication signal processing unit 1570 makes the transmission order of the blocks to be transmitted within the transmission frame different from a transmission order of blocks to be transmitted within an adjacent transmission frame.

With this configuration, in the case where the smartphone 1501 can receive only one fixed transmission subframe, a plurality of transmission frames are received, thereby enabling all the blocks constituting one signal unit to be received.

Accordingly, compared with the case where data segments obtained by dividing a visible light communication signal (transmission signal) are transmitted in a normal order, the reception probability of such data segments can be improved or the probability of occurrence of a situation where the data segments are not continuously receivable can be reduced. This can reduce mental load for a recipient who receives signals, and provide a comfortable reception environment.

In this embodiment, the number of successive transmissions is two. The number of successive transmissions is not limited to two.

In this embodiment, furthermore, as illustrated in FIG. 371, the order of transmission subframes is changed in rotation in such a manner that the place of a transmission subframe in the order is shifted by one to prevent the same block from being located at the position of the corresponding transmission subframe in an adjacent transmission frame. This implies that, focusing on the n-th frame, even when only a block at a fixed transmission subframe position is received, the respective blocks can be received by using a number of received frames equal to the number of blocks into which the n-th frame is divided.

In addition, intentional losing or addition of one or more blocks in the transmission of blocks obtained as a result of division can provide an effect of pseudo-shifting of the transmission period, increasing the efficiency of receiving blocks over a plurality of frames.

Additionally, transmission subframes are transmitted in a random order, achieving transmission without taking into account the conditions of the receiver (e.g., the exposure period, the position on the screen, etc.).

Blocks are allocated to transmission subframes in a state where all the blocks obtained as a result of division are present in a transmission frame, thereby improving reception performance.

Embodiment 25

Embodiment 25 will be described hereinafter with reference to FIGS. 373 to 375.

2-1. Relationship Between Display Video and Transmission Blocks

When displaying normal video, a liquid crystal display device that is a display device according to an embodiment of the present disclosure typically controls a display panel by opening or closing a shutter of liquid crystals of a display surface or providing gradation, and also controls a backlight to make video visible to the human eye. Accordingly, even at a point in time when the backlight is set to be very bright, some portions on a display area may display a dark image. In a portion where a dark image is displayed, light from the backlight is blocked by the shutter of the display panel, resulting in a darker image being displayed. Thus, when a visible light communication signal (transmission signal) is transmitted during the display of a dark image, due to the low brightness (or luminance) of this area, the S/N of the signal of the captured image may be reduced, resulting in the signal not being received as a signal. A solution to this situation will be described.

As described above, the number of blocks which can be received by the smartphone 1501 configured to receive a transmission signal is different in accordance with the content displayed on the display device 1500. When a region having a certain level of brightness or more (hereinafter referred to as a “high-luminance region”) in the video displayed on the display device 1500 is large, the high-luminance region in an image captured by the smartphone 1501 is large. In this case, a large number of blocks transmitted from the display device 1500 are displayed. Thus, a larger number of blocks transmitted from the display device 1500 than that when the high-luminance region is small can be received.

When the high-luminance region in displayed video is small, on the other hand, the high-luminance region in an image captured by the smartphone 1501 is small. In this case, fewer blocks are displayed on the display device 1500, resulting in fewer blocks being received. In the case where the high-luminance region is small and the number of blocks which can be received is small, for example, in the case where only one block can be received, the transmission of a plurality of blocks in a single transmission frame results in unclearness of which block can be received. In addition, in the case where the blocks are transmitted in a normal order, the same block will be redundantly received in a plurality of transmission frames. As a result, pieces of data of all the blocks of one signal unit are not collected, which may degrade the efficiency of reception.

Accordingly, when the high-luminance region is small and it is anticipated that the number of received blocks in one transmission frame will be small, the display device 1500 illustrated in this embodiment transmits the same block within one transmission frame a plurality of times, ensuring that the block can be received.

When the high-luminance region is large and it is anticipated that blocks will probably be received, control is performed to reduce the number of transmissions of the same block to be transmitted within one transmission frame or to prevent the same block in one transmission frame from being transmitted a plurality of times.

2-2. Operation

2-2-1. Operation of Visible Light Communication Signal Processing Unit

In Embodiment 25, only the process of the visible light communication signal processing unit 1570 in Embodiment 24 is different. Here, only operation of the visible light communication signal processing unit 1570 will be described.

FIG. 373 is a flowchart describing processing operation of the visible light communication signal processing unit 1570 of the display device 1500 according to Embodiment 25. In the following, operation of the visible light communication signal processing unit 1570 will be described with reference to FIG. 373.

When a transmission signal is input from the visible light communication signal input unit 1560, the visible light communication signal processing unit 1570 reads a transmission signal corresponding to one signal unit, divides the transmission signal into a predetermined number of segments, encodes each segment, and assigns a header unit to each segment to generate a predetermined number of blocks (steps S1511 to S1513).

The visible light communication signal processing unit 1570 detects a bright region in a video signal input from the video processing unit 1530, and determines the number of successive transmissions of a block (step S1514). The determination of the number of successive transmissions of a block will be described below.

The visible light communication signal processing unit 1570 determines the transmission order of the generated blocks in accordance with the number of successive transmissions of the block (step S1515). The determination of the transmission order will be described below.

The visible light communication signal processing unit 1570 converts the visible light communication signals of the respective blocks into signals for backlight control (step S1516).

The visible light communication signal processing unit 1570 outputs the converted signals for backlight control to the backlight control unit 1580 in the transmission order determined in step S1515 (step S1517).

When there is any unprocessed transmission signal, the visible light communication signal processing unit 1570 returns to step S1512. When there is no unprocessed transmission signal, the process ends (step S1518).

2-2-2. Number of Successive Transmissions of Block

FIG. 374 is a diagram for describing an example of a method for determining the number of successive transmissions in one transmission frame.

FIG. 374 illustrates the relationship between a high-luminance region in an image displayed on the display device 1500 and the number of transmissions of the same block within one transmission frame.

In the case where the display area of the display panel 1550 is large, the display device 1500 can prioritize the transmission speed, and can thus reduce the number of transmissions. In FIG. 374, if the proportion of the high-luminance region on the display panel 1550 is greater than or equal to approximately 80%, it is considered that a single transmission of the same block in one frame can ensure a certain degree of reception probability as a block, and the transfer rate (the number of pieces of transmission data) is ensured.

In the case where the high-luminance region is small, on the other hand, an increase in the number of transmissions of the same block within one frame can ensure that at least one block can be received regardless of which portion on an image sensor of a smartphone used for capturing an image a signal is present. In Embodiment 25, the number of transmissions of the same block within one frame is increased by one at a rate of approximately 15% from a proportion of approximately 80% or less. This rate can be changed as desired. In the present disclosure, in the case where the high-luminance region is the smallest, it is designed that the same block is successively transmitted up to six times to allow the reception of all the blocks of one communication unit to be completed by signal transmission using six transmission frames at the minimum.

2-2-3. Order of Transmission Blocks

FIG. 375 is a diagram for describing an example of a transmission method by a display device according to Embodiment 25.

As illustrated in FIG. 375, a transmission signal is divided into six segments, and each segment is encoded and assigned a header to generate blocks 1 to 6. In FIG. 375, the number of transmissions of the same block within one transmission frame is changed in accordance with the size of the high-luminance region. A solid black region in a captured image represents a region that is not a high-luminance region and that has a low probability that a transmission signal can be received as a signal.

A transmission frame n in which a high-luminance region occupies substantially the entirety of the display surface 1510 is a transmission frame with a high-luminance region greater than or equal to 80% in FIG. 374 (e.g., A % in FIG. 374), and the number of transmissions of the same block within one transmission frame is one. Accordingly, the display device 1500 sequentially transmits each of the blocks 1 to 6 once. A transmission frame n+1 in which a high-luminance region occupies substantially half of the screen is a transmission frame with a high-luminance region of approximately 50% in FIG. 374 (e.g., B % in FIG. 374), and the number of transmissions of the same block within one transmission frame is three. In FIG. 375, the blocks 1 and 2 are repeatedly transmitted so that the number of transmissions of each of the blocks 1 and 2 within one transmission frame is three. A transmission frame n+2 in which a high-luminance region is small is a transmission frame with a high-luminance region less than or equal to 20% in FIG. 374 (e.g., C % in FIG. 374), and the number of transmissions of the same block within one transmission frame is six. In FIG. 375, the block 6 is successively transmitted six times.

This enables the block 6 to be received with high probability within the transmission frame n+2 with a small high-luminance region. As illustrated in FIG. 375, furthermore, in the transmission frame n with a large high-luminance region, four different blocks, namely, the blocks 2 to 5, can be received within one received frame. In the transmission frame n+1 with a high-luminance region occupying substantially half the size of the screen, a plurality of blocks which have been transmitted, namely, the blocks 1 and 2, can be received with high probability. In the example in FIG. 375, it is considered that signals of one signal unit can be received with high probability by using three transmission frames.

2-3. Advantageous Effects, Etc.

In Embodiment 25, the visible light communication signal processing unit 1570 detects a region having a predetermined level of brightness or more in a video signal, and determines the number of successive transmissions of the same block to be transmitted within a transmission frame in accordance with the size of the region on the display surface 1510.

This configuration enables the visible light communication signal processing unit 1570 to predict the proportion of a high-luminance region in an image displayed on the display panel 1550 and the positions where blocks can be received on the smartphone 1501, and to determine the transmission order of blocks by using a method such as not repeatedly transmitting a block considered to have high reception probability.

Accordingly, the smartphone 1501 can receive a plurality of different blocks by using one received frame. Furthermore, depending on the situation, the display device 1500 transmits a block a plurality of times within one transmission frame, thereby enabling the smartphone 1501 to receive the block with high probability. Consequently, the reduction in speed can be minimized.

In Embodiment 25, exposure positions on the image sensor of the smartphone 1501 can be received in the blocks 2 to 5 within the transmission frame n. In practical use, in which transmission subframe of the transmission frame the imaging period is included is unknown. Thus, the combination of three transmission frames described above is changed sequentially in rotation in such a manner that the combination of three transmission frames may be sequentially changed regardless of the relationship between the transmission frame and the imaging period.

Alternatively, for example, instead of the rotation in which the transmission frame n+3 starts with the block 2 in place of the block 1 at the position of the transmission subframe 1 of the transmission frame n+3, the blocks 2 and 3 are transmitted in the transmission frame n+4, and the block 1 is repeatedly transmitted in the transmission frame n+5, the following rotation may be used. For example, a combination may be used in which the transmission subframe 1 of the transmission frame n+3 starts with the block 4, which is at an end next to the block 1, the block 3, which is skipped by one transmission subframe, or the block 5, which is skipped backward by one transmission subframe. Accordingly, the number of transmission frames for which a signal unit estimated by using a predicted reception probability can be received with high probability may be used as one unit, and the contents may be sequentially replaced or changed, thereby performing control with a larger period.

In this embodiment, furthermore, when two blocks are transmitted a plurality of times, for example, sequential transmission of the block 1 and the block 2 is repeatedly performed three times. The order in which blocks are transmitted a plurality of times is not limited to this order. For example, the block 1 may be successively transmitted three times and the block 2 may be successively transmitted three times. That is, the same block may be transmitted successively. Alternatively, the same block may be successively transmitted only a certain number of times which is included in the number of transmissions of the same block.

In this embodiment, furthermore, when two blocks are transmitted a plurality of times, the block 1 and the block 2 are transmitted the same number of times, namely, three times. The numbers of times of transmission of blocks may not be the same. For example, each block may be transmitted a number of times different from that of another block in such a manner that the block 1 is transmitted four times and the block 2 is transmitted twice. Particularly when the number of blocks obtained as a result of division is an odd number such as seven, a certain block may be transmitted four times and another block may be transmitted three times.

Embodiment 26

Embodiment 26 will be described hereinafter with reference to FIGS. 376 to 379.

3-1. Relationship Between Reception Distance and Transmission Blocks

If the distance (hereinafter referred to as the "reception distance") between the display device 1500 and the smartphone 1501 is short, the proportion of the display device 1500 in an image captured by the smartphone 1501 is relatively large. In this case, the smartphone 1501 can capture images of many transmitted blocks, and it is thus expectable that a larger number of blocks can be received than that when the reception distance is long. When the reception distance is long, on the other hand, the proportion of the display device 1500 in an image captured by the smartphone 1501 is relatively small. It is thus considered that fewer transmitted blocks are displayed in a captured image and fewer blocks can be received. When the reception distance is long and the number of blocks which can be received is small (e.g., only one block can be received), the transmission of a plurality of blocks within one transmission frame results in non-unique determination of which block corresponds to the period of imaging. Accordingly, the display device 1500 does not know how many blocks the smartphone 1501 can receive. In addition, the smartphone 1501 may redundantly receive the same block over a plurality of transmission frames, which may degrade the efficiency of reception.

Accordingly, when the reception distance which can be estimated (hereinafter referred to as the "estimated reception distance") is long and the number of received blocks within one frame is small, transmitting the same block a plurality of times within one frame enables the display device 1500 illustrated in this embodiment to reliably receive a specific block. When the estimated reception distance is short and a plurality of blocks can be received, the number of identical blocks to be transmitted within one transmission frame is reduced or an identical block is not transmitted a plurality of times within one transmission frame.

3-2. Operation

3-2-1. Operation of Visible Light Communication Signal Processing Unit

FIG. 376 is a flowchart describing processing operation of the visible light communication signal processing unit 1570 of the display device 1500 according to Embodiment 26. The operation of dividing a signal into blocks, which is performed by the visible light communication signal processing unit 1570, will now be described with reference to FIG. 376.

When a visible light communication signal is input from the visible light communication signal input unit 1560, the visible light communication signal processing unit 1570 reads a visible light communication signal corresponding to one signal unit, divides the visible light communication signal into a predetermined number of segments, encodes each segment, and adds a header unit to each segment to generate blocks (steps S1521 to S1523).

The visible light communication signal processing unit 1570 determines the number of successive transmissions of a block in accordance with an estimated reception distance which is set in advance (step S1524).

The visible light communication signal processing unit 1570 determines the transmission order of the generated blocks in accordance with the number of successive transmissions of a block (step S1525). A method for determining the transmission order has been described above.

The visible light communication signal processing unit 1570 converts the visible light communication signals of the respective blocks into signals for backlight control in the transmission order determined in step S905 (step S1526).

The visible light communication signal processing unit 1570 outputs the signals for backlight control converted in the transmission order to the backlight control unit 1580 (step S1527).

When there are transmission signals in the next frame, the visible light communication signal processing unit 1570 returns to step S1522. When the processing for all the transmission signals has been completed, the process ends (step S1528).

3-2-2. Estimated Reception Distance and Number of Transmissions of Block

FIG. 377 is a diagram for describing an example of a method for determining the number of successive transmissions of a block within one transmission frame.

As illustrated in FIG. 377, when the estimated reception distance is short, the number of transmissions of the same block within one transmission frame can be reduced since the transmission speed can be prioritized. In FIG. 377, when the estimated reception distance is less than or equal to 3 m, the same block is transmitted once within one transmission frame to ensure a transfer rate.

When the estimated reception distance is long, on the other hand, the number of transmissions of the same block within one frame is increased to ensure that at least one block can be received regardless of which portion on the image sensor of the smartphone 1501 the signal corresponds to. In FIG. 377, the number of transmissions of the same block within one transmission frame is increased by one at a rate of 2 m from an estimated reception distance of 3 m or more. This rate can be changed as desired.

3-2-3. Order of Transmission Blocks

FIG. 378 is a diagram for describing an example of a transmission method by a display device according to Embodiment 26. FIG. 378 illustrates an example of a transmission method when the estimated reception distance is short.

As illustrated in FIG. 378, a transmission signal is divided into four segments, and each segment is encoded and assigned a header to generate blocks 1 to 4. When the estimated reception distance is short, for example, when the estimated reception distance is less than or equal to 3 m in FIG. 377, the number of transmissions of the same block within one transmission frame is two. Thus, as illustrated in FIG. 378, each block is transmitted twice within one transmission frame. In this case, one block among two blocks can be received within a received frame. In FIG. 378, two different blocks can be received using one received frame, ensuring that signals of one signal unit can be received using two received frames.

FIG. 379 is a diagram for describing another example of a transmission method by a display device according to Embodiment 26. FIG. 379 illustrates an example of a transmission method when the estimated reception distance is long. When the estimated reception distance is long, for example, when the estimated reception distance is 8 m in FIG. 377, the number of transmissions of the same block within one transmission frame is four. Thus, as illustrated in FIG. 379, each block is transmitted four times within one transmission frame. In this case, one block among four blocks is receivable within a received frame. In FIG. 379, one block can be received using one received frame, ensuring that transmission signals of one signal unit can be received using four received frames.

3-3. Advantageous Effects, Etc.

In Embodiment 26, the visible light communication signal processing unit 1570 determines the number of transmissions of a block within one transmission frame in accordance with estimated reception distance between the display device 1500 and the smartphone 1501.

This configuration can concurrently provide the speeding-up characteristic using the reception of a plurality of different blocks when the estimated reception distance is short and the reliability in which blocks can be reliably received when the estimated reception distance is long.

In addition, a plurality of different blocks can be received by using one received frame, thus minimizing the reduction in speed due to a block being constantly transmitted a plurality of times within one frame.

The estimated reception distance is a reception distance set in the display device 1500 in advance, and is preferably modified as desired depending on the application or installation conditions. Alternatively, the estimated reception distance may be determined by predicting how distant a viewer a viewer who is viewing the video is on the basis of the content, fineness, and the like of the video.

Alternatively, a reception distance may be inferred from, for example, the size of the display device 1500 whose image is captured by the smartphone 1501, and information on the inferred reception distance may be transmitted to the display device 1500 via a mobile radio network according to a standard such as WiFi, Bluetooth (registered trademark), or Long Term Evolution (LTE), so that the display device 1500 can determine an estimated reception distance on the basis of the information.

The reception distance may be inferred from the size of the display device 1500 or the like not only by the smartphone 1501 but also by a server or the like which acts as a relay between the display device 1500 and the smartphone 1501.

Alternatively, a captured image itself may be transmitted to the display device 1500, and the display device 1500 may infer a reception distance.

Alternatively, the positions of both the display device 1500 and the smartphone 1501 or the position of either the display device 1500 or the smartphone 1501 may be detected by using visible light communication based on WiFi, Bluetooth (registered trademark), GPS, or lighting, a reception distance may be inferred, and reception distance information may be communicated between the display device 1500 and the smartphone 1501 via a mobile radio network according to a standard such as WiFi, Bluetooth (registered trademark), or LTE to set an estimated reception distance.

In the present disclosure, when two blocks are transmitted a plurality of times, the two different blocks are each successively transmitted twice. The order in which blocks are transmitted a plurality of times is not limited to this order. For example, a certain block and a different block may be repeatedly transmitted.

In the present disclosure, furthermore, when two blocks are transmitted a plurality of times, the blocks are transmitted the same number of times. However, the numbers of transmissions of blocks may not be the same. For example, when the number of blocks is seven, a certain block may be transmitted four times and a different block may be transmitted three times.

In the present disclosure, furthermore, the number of successive transmissions of the same block to be transmitted within a transmission frame is determined. As an alternative, the number of transmissions of the same block within a transmission frame may be determined. In this case, the same block may not necessarily be arranged successively. For example, in the transmission frame n illustrated in FIG. 378, blocks may be transmitted in the order of the block 1, the block 2, the block 1, and the block 2.

Modifications

As described above, Embodiments 24 to 26 have been described as illustrative examples of the technique disclosed herein. However, the technique in the present disclosure is not limited to these embodiments, and is also applicable to other embodiments including modifications, replacements, additions, omissions, and others as desired. In addition, the constituent elements described in Embodiments 24 to 26 described above may be used in combination to construct a different embodiment.

In the present disclosure, the visible light communication signal processing unit 1570 converts a block into a signal for backlight control. Alternatively, the backlight control unit 1580 may convert a block into a signal for backlight control.

A display device according to an exemplary embodiment of the present disclosure is capable of safely and actively obtaining information other than images. Thus, a signage from the road, an information terminal, or an information display device, as well as a home device such as a television set, a PC, or a tablet, is also capable of transmitting necessary information as much as desired due to their active characteristics, and is applicable to various purposes such as transferring image-attached information and transmitting information for any settings.

Summary of Embodiment

A display device according to an aspect of the present disclosure is a display device capable of outputting a visible light communication signal, including a display panel having a display surface to display video based on a video signal, a backlight having a light emitting surface to illuminate the display surface of the display panel from the back of the display surface, and a visible light communication processing unit that divides the visible light communication signal into a predetermined number of segments for each signal unit having a predetermined length, encodes the segments of the visible light communication signal to generate blocks, and determines a transmission order of blocks to be transmitted within a transmission frame that is a period during which blocks, the number of which is equal to the predetermined number, are transmitted. The visible light communication processing unit makes the transmission order of the blocks to be transmitted within the transmission frame different from a transmission order of blocks to be transmitted within an adjacent transmission frame.

In addition, the visible light communication processing unit may perform control to determine the number of successive transmissions of the same block within the transmission frame and to transmit all the blocks in the signal unit over a plurality of transmission frames.

In addition, the visible light communication processing unit may detect a region having a predetermined level of brightness or more in the video signal, and determine the number of successive transmissions of the same block to be transmitted within the transmission frame in accordance with the size of the region on the display surface.

In addition, the visible light communication processing unit may estimate a distance between the display device and an electronic device that receives the visible light communication signal, and determine the number of successive transmissions of the same block to be transmitted within the transmission frame in accordance with the estimated distance.

In summary, an aspect of the present disclosure provides a display device capable of outputting visible light communication signals without significantly degrading the quality of display images and also capable of reducing errors in reception of the output visible light communication signals. That is, the visible light communication signal processing unit 1570 divides a visible light communication signal into a predetermined number of segments for each signal unit having a predetermined length, encodes the segments of the visible light communication signal to generate blocks, and determines a transmission order of blocks to be transmitted within a transmission frame that is a period during which blocks, the number of which is equal to the predetermined number, are transmitted. The visible light communication signal processing unit 1570 determines the transmission order of blocks to be transmitted within the transmission frame so as to make the transmission order different from a transmission order of blocks to be transmitted within an adjacent transmission frame.

Embodiment 27

FIG. 380 is a diagram for describing switching control of visible light communication (VLC) in the case where a transmission device is a moving-image display device such as a television set.

Specifically, (a) in FIG. 380 illustrates a moving image constituted by a plurality of pictures, (b) in FIG. 380 illustrates ON/OFF control of a backlight of a moving-image display device when visible light communication is OFF, and (c) in FIG. 380 illustrates ON/OFF control of the backlight of the moving-image display device when visible light communication is ON.

As illustrated in (a) in FIG. 380, in the case where a moving image 1600 constituted by a plurality of pictures P1601, P1602, P1603, P1604, P1605, P1606, etc. is reproduced, the plurality of pictures P1601, P1602, P1603, P1604, P1605, P1606, etc. are displayed on the moving-image display device at times t1601, t1603, t1605, t1607, t1609, t1611, etc., respectively. The time t1601 is the display start time of the moving image 1600, and may be an absolute time or a time specified by a user. The times t1603, t1605, t1607, t1609, t1611, etc. are times that are spaced apart at intervals of a predetermined time Δt1600 from the time t1601. That is, the times t1603, t1605, t1607, t1609, t1611, etc. are times determined for a certain period (with intervals of the predetermined time Δt1600).

In the case where the moving image 1600 is reproduced, some displays, in particular, a liquid crystal display, perform control to insert a black picture between adjacent pictures in order to reduce blurred reproduction of the moving image 1600. Such a moving-image display device performs control to turn off the backlight of the moving-image display device due to black pictures inserted at times t1602, t1604, t1606, t1608, t1610, t1612, etc. between the times t1601, t1603, t1605, t1607, t1609, t1611, etc. at which the plurality of pictures P1601, P1602, P1603, P1604, P1605, P1606, etc. are respectively displayed, as in (b) in FIG. 380. That is, the moving-image display device performs control to turn on the backlight at the times t1601, t1603, t1605, t1607, t1609, t1611, etc. at which the plurality of pictures P1601, P1602, P1603, P1604, P1605, P1606, etc. are respectively displayed and to turn off the backlight at the times t1602, t1604, t1606, t1608, t1610, t1612, etc.

However, the turning off of the backlight during visible light communication results in an interruption of communication for a period during which the backlight is OFF. To address such communication interruption, as illustrated in (c) in FIG. 380, the backlight is controlled to be continuously turned on while visible light communication is performed (i.e., while VLC is ON) even when the reproduction of the moving image 1600 is in progress. In this way, a transmission device in this case switches between the control to continuously turn on the backlight while visible light communication is performed, as in (c) in FIG. 380, and the control to repeatedly turn on and off the backlight while visible light communication is not performed, as in (b) in FIG. 380. This can prevent an interruption of communication while visible light communication is performed, and can reduce blurred reproduction of the moving image 1600 while visible light communication is not performed.

FIG. 381 is a diagram illustrating processing operation of a reception device (an imaging device). Specifically, FIG. 381 is a diagram for describing an example of a process of switching between a normal imaging mode and a macro imaging mode in the case of reception in visible light communication.

A reception device 1610 receives visible light emitted by a transmission device including a plurality of light sources (four light sources in FIG. 381).

First, when shifted to a mode for visible light communication, the reception device 1610 starts an imaging unit in the normal imaging mode (S1601). Note that when shifted to the mode for visible light communication, the reception device 1610 displays, on a screen, a box 1611 for capturing images of the light sources.

After a predetermined time, the reception device 1610 switches an imaging mode of the imaging unit to the macro imaging mode (S1602). Note that the timing of switching from step S1601 to step S1602 may be, instead of when a predetermined time has elapsed after step S1601, when the reception device 1610 determines that images of the light sources have been captured in such a way that they are included within the box 1611. Such switching to the macro imaging mode allows a user to include the light sources into the box 1611 in a clear image in the normal imaging mode before shifted to the macro imaging mode in which the image is blurred, and thus it is possible to easily include the light sources into the box 1611.

Next, the reception device 1610 determines whether or not a signal from the light source has been received (S1603). When it is determined that a signal from the light source has been received (YES in S1603), the processing returns to the normal imaging mode in step S1601, and when it is determined that a signal from the light sources has not been received (NO in S1603), the macro imaging mode in step S1602 continues. Note that when YES in step S1603, a process based on the received signal (e.g., a process of displaying an image represented by the received signal) may be performed.

With the reception device 1610, a user can switch from the normal imaging mode to the macro imaging mode by touching, with a finger, a display unit of a smartphone where light sources 1611 appear, to capture an image of the light sources that appear blurred. Thus, an image captured in the macro imaging mode includes a larger number of bright regions than an image captured in the normal imaging mode. In particular, light beams from two adjacent light sources among the plurality of light sources cannot be received as continuous signals because striped images are separate from each other as illustrated in the left view in (a) in FIG. 381. However, this problem can be solved when the light beams from the two light sources overlap each other, allowing the light beams to be handled upon demodulation as continuously received signals that are to be continuous striped images as illustrated in the right view in (a) in FIG. 381. Since a long code can be received at a time, this produces an advantageous effect of shortening response time. As illustrated in (b) in FIG. 381, an image is captured with a normal shutter and a normal focal point first, resulting in a normal image which is clear. However, when the light sources are separate from each other like characters, even an increase in shutter speed cannot result in continuous data, leading to a demodulation failure. Next, the shutter speed is increased, and a driver for lens focus is set to close-up (macro), with the result that the four light sources are blurred and expanded to be connected to each other so that the data can be received. Thereafter, the focus is set back to the original one, and the shutter speed is set back to normal, to capture a clear image. Clear images are recorded in a memory and are displayed on the display unit as illustrated in (c). This produces an advantageous effect in that only clear images are displayed on the display unit. As compared to an image captured in the normal imaging mode, an image captured in the macro imaging mode includes a larger number of regions brighter than predetermined brightness. Thus, in the macro imaging mode, it is possible to increase the number of exposure lines that can generate bright lines for the subject.

FIG. 382 is a diagram illustrating processing operation of a reception device (an imaging device). Specifically, FIG. 382 is a diagram for describing another example of the process of switching between the normal imaging mode and the macro imaging mode in the case of reception in the visible light communication.

A reception device 1620 receives visible light emitted by a transmission device including a plurality of light sources (four light sources in FIG. 382).

First, when shifted to a mode for visible light communication, the reception device 1620 starts an imaging unit in the normal imaging mode and captures an image 1623 of a wider range than an image 1622 displayed on a screen of the reception device 1620. Image data and orientation information are held in a memory (S1611). The image data represents the image 1623 captured. The orientation information indicates an orientation of the reception device 1620 detected by a gyroscope, a geomagnetic sensor, and an accelerometer included in the reception device 1620 when the image 1623 is captured. The image 1623 captured is an image, the range of which is greater by a predetermined width in the vertical direction or the horizontal direction with reference to the image 1622 displayed on the screen of the reception device 1620. When shifted to the mode for visible light communication, the reception device 1620 displays, on the screen, a box 1621 for capturing images of the light sources.

After a predetermined time, the reception device 1620 switches an imaging mode of the imaging unit to the macro imaging mode (S1612). Note that the timing of switching from step S1611 to step S1612 may be, instead of when a predetermined time has elapsed after step S1611, when the image 1623 is captured and it is determined that image data representing the image 1623 captured has been held in the memory. At this time, the reception device 1620 displays, out of the image 1623, an image 1624 having a size corresponding to the size of the screen of the reception device 1620 based on the image data held in the memory.

Note that the image 1624 displayed on the reception device 1620 at this time is a part of the image 1623 that corresponds to a region predicted to be currently captured by the reception device 1620, based on a difference between an orientation of the reception device 1620 represented by the orientation information obtained in step S1611 (a position indicated by a white broken line) and a current orientation of the reception device 1620. In short, the image 1624 is an image that is a part of the image 1623 and is of a region corresponding to an imaging target of an image 1625 actually captured in the macro imaging mode. Specifically, in step S1612, an orientation (an imaging direction) changed from that in step S1611 is obtained, an imaging target predicted to be currently captured is identified based on the obtained current orientation (imaging direction), the image 1624 that corresponds to the current orientation (imaging direction) is identified based on the image 1623 captured in advance, and a process of displaying the image 1624 is performed. Therefore, when the reception device 1620 moves in a direction of a void arrow from the position indicated by the white broken line as illustrated in the image 1623 in FIG. 382, the reception device 1620 can determine, according to an amount of the movement, a region of the image 1623 that is to be clipped out as the image 1624, and display the image 1624 that is a determined region of the image 1623.

By doing so, even when capturing an image in the macro imaging mode, the reception device 1620 can display, without displaying the image 1625 captured in the macro imaging mode, the image 1624 clipped out of a clearer image, i.e., the image 1623 captured in the normal imaging mode, according to a current orientation of the reception device 1620. In a method in the present disclosure in which, using a blurred image, continuous pieces of visible light information are obtained from a plurality of light sources distant from each other, and at the same time, a stored normal image is displayed on the display unit, the following problem is expected to occur: when a user captures an image using a smartphone, a hand shake may result in an actually captured image and a still image displayed from the memory being different in direction, making it impossible for the user to adjust the direction toward target light sources. In this case, data from the light sources cannot be received. Therefore, a measure is necessary. With an improved technique in the present disclosure, even when a hand shake occurs, an oscillation detection unit such as an image oscillation detection unit or an oscillation gyroscope detects the hand shake, and a target image in a still image is shifted in a predetermined direction so that a user can view a difference from a direction of the camera. This display allows a user to direct the camera to the target light sources, making it possible to capture an optically connected image of separated light sources while displaying a normal image, and thus it is possible to continuously receive signals. With this, signals from separated light sources can be received while a normal image is displayed. In this case, it is easy to adjust an orientation of the reception device 1620 in such a way that images of the plurality of light sources can be included in the box 1621. Note that defocusing means light source dispersion, causing a reduction in luminance to an equivalent degree, and therefore, sensitivity of a camera such as ISO is increased to produce an advantageous effect in that visible light data can be more reliably received.

Next, the reception device 1620 determines whether or not a signal from the light sources has been received (S1613). When it is determined that a signal from the light sources has been received (YES in S1613), the processing returns to the normal imaging mode in step S1611, and when it is determined that a signal from the light sources has not been received (NO in S1613), the macro imaging mode in step S1612 continues. Note that when YES in step S1613, a process based on the received signal (e.g., a process of displaying an image represented by the received signal) may be performed.

As in the case of the reception device 1610, the reception device 1620 can also capture an image including a brighter region in the macro imaging mode. Thus, in the macro imaging mode, it is possible to increase the number of exposure lines that can generate bright lines for the subject.

FIG. 383 is a diagram illustrating processing operation of a reception device (or an imaging device).

A transmission device 1630 is a display device such as a television set, and transmits different transmission IDs at intervals of a predetermined time Δt1630 via visible light communication. Specifically, the transmission device 1630 respectively transmits IDs 1631, 1632, 1633, and 1634 that are transmission IDs respectively associated with data corresponding to images 1631, 1632, 1633, and 1634 respectively displayed at times t1631, t1632, t1633, and t1634. That is, the IDs 1631 to 1634 are transmitted from the transmission device 1630 at intervals of the predetermined time Δt1630.

A reception device 1640 requests a server 1650 to transmit data associated with the respective transmission IDs received via visible light communication on the basis of the transmission IDs, receives the data from the server 1650, and displays images corresponding to the data. Specifically, images 1641, 1642, 1643, and 1644 respectively corresponding to the IDs 1631, 1632, ID 1633, and 1634 are displayed at the times t1631, t1632, t1633, and t1634, respectively.

In the case of obtaining the ID 1631 received at the time t1631, the reception device 1640 may obtain from the server 1650 ID information indicating the transmission IDs scheduled to be transmitted from the transmission device 1630 at the subsequent times t1632 to t1634. In this case, using the obtained ID information, the reception device 1640 can request the server 1650 to transmit the data associated with the IDs 1632 to 1634 at the times t1632 to t1634 and display received data at the respective times t1632 to t1634 without receiving the respective transmission IDs from the transmission device 1630 at the respective times.

Alternatively, the reception device 1640 may only be required to make a request for the data corresponding to the ID 1631 at the time t1631, without obtaining from the server 1650 information indicating the transmission IDs scheduled to be transmitted from the transmission device 1630 at the times t1632 to t1634, to receive the data associated with the transmission IDs corresponding to the times t1632 to t1634 from the server 1650, and may display the received data at the respective times t1632 to t1634. That is, upon receiving a request for the data associated with the ID 1631 transmitted at the time t1631 from the reception device 1640, the server 1650 transmits the data associated with the transmission IDs corresponding to the subsequent times t1632 to t1634 to the reception device 1640 at the respective times t1632 to t1634 even if no request is sent from the reception device 1640. That is, in this case, the server 1650 holds association information in which the times t1631 to t1634 are associated with the data associated with the transmission IDs corresponding to the respective times t1631 to t1634, and transmits, at a predetermined time, predetermined data associated with the predetermined time in accordance with the association information.

In this way, once the reception device 1640 can obtain the transmission ID 1631 at the time t1631 via visible light communication, the reception device 1640 can receive the data corresponding to the respective times t1632 to t1634 from the server 1650 without performing visible light communication at the subsequent times t1632 to t1634. This does not require the user to continuously direct the reception device 1640 to the transmission device 1630 in order to obtain transmission IDs via visible light communication, facilitating the display of data obtained from the server 1650 on the reception device 1640. In this case, if the reception device 1640 obtains data corresponding to IDs from the server 1650 at required times, a time delay occurs due to communication with the server 1650, leading to a prolonged response time. In order to speed up the response, data corresponding to IDs is obtained from a server or the like in advance and stored in a storage unit of a receiver. Displaying the data corresponding to the IDs stored in the storage unit can speed up the response. In this scheme, merely by inserting time information on the times when the subsequent IDs are output into a transmission signal from a visible light transmitter, a receiver can know the transmission time of the subsequent ID when a certain time comes, without successively receiving visible light signals. This achieves the advantage of eliminating the need to continuously direct a reception device to a light source. This scheme has an advantageous effect in that, once the receiver synchronizes time information (clock) on the receiver side with time information (clock) on the transmitter side upon receiving visible light, the receiver can successively display screens synchronous to those on the transmitter after synchronization without receiving data from the transmitter.

Next, in the case of a smartphone including two cameras, left and right cameras, for stereoscopic imaging as illustrated in (b) in FIG. 381, the left-eye camera displays an image of normal quality with a normal shutter speed and a normal focal point, and at the same time, the right-eye camera uses a higher shutter speed and/or a closer focal point or a macro imaging mode, as compared to the left-eye camera, to obtain striped bright lines according to the present disclosure and demodulates data. This has an advantageous effect in that an image of normal quality is displayed on the display unit while the right-eye camera can receive light communication data from a plurality of separate light sources that are distant from each other.

Embodiment 28

This embodiment describes a protocol transmission scheme for visible light communication.

FIGS. 384 and 385 are diagrams illustrating a procedure when logical data (e.g., an ID, etc.) to be used in the application layer is transmitted via visible light communication.

First, a logical data error correction code assignment unit 1701 assigns a logical data correction code 1712 that is an error correction code to logical data 1711 used for the application layer.

Then, a logical data dividing unit 1702 divides the logical data 1711 and the logical data correction code 1712 by a data size that can be transmitted to generate a plurality of logical data segments 1713. Further, the logical data dividing unit 1702 assigns a segment type 1714 and an address 1715 to each of the logical data segments 1713.

A data modulation unit 1703 converts the data generated by the logical data dividing unit 1702 into a data string that can be transmitted to generate physical data 1716 for transmission.

The logical data error correction code assignment unit 1701 uses a coding technique such as CRC or Reed-Solomon coding in accordance with the size of the logical data 1711 or the state of a transmission path. The logical data correction code 1712 may be inserted at the beginning of the logical data 1711, at the end of the logical data 1711, or at a specific position of the logical data 1711.

The logical data dividing unit 1702 can change the size of the segments obtained as a result of division to determine the limit distance and reception speed within which reception is possible in visible light communication. Furthermore, the logical data dividing unit 1702 can change the division method to improve the resistance to burst error, in addition to error tolerance with the logical data correction code 1712 and a physical data correction code 1717, and also to improve confidentiality at the time of decoding data.

The data modulation unit 1703 provides brightness control or percent modulation control by fluctuating the quantization quantity or sample value per bit of logical data in accordance with the device characteristics of a visible light communication transmission unit (e.g., the need for maintaining brightness as long as possible in the case of a lighting device, the need for supporting both moving images and still images in the case of a display, etc.) regardless of the modulation type such as PPM modulation or Manchester modulation. For example, the data modulation unit 1703 can switch between the use of binary values, for example, physical data “1” for light emission and physical data “0” for no light emission, and the use of settings of “2” when the percentage of brightness for light emission is 100%, “1” when the percentage of brightness for light emission is 50%, and “0” when the percentage of brightness for light emission is 0%, thereby making brightness control feasible. Furthermore, the data modulation unit 1703 can set physical data “1” for light emission and physical data “0” for no light emission, and then switch between the modulation of logical data “01” to physical data “0100” and the modulation of logical data “01” to “11001111”, thereby controlling the average brightness level for a physical data transmission size.

Then, a physical data error correction code assignment unit 1704 assigns the physical data correction code 1717, which is an error correction code, to the physical data 1716 generated by the data modulation unit 1703.

Then, a physical data header insertion unit 1705 assigns to the physical data 1716*a* header 1718 for indicating the start position of the physical data 1716. The obtained data is transmitted by the visible light communication transmission unit as visible light communication data.

The physical data error correction code assignment unit 1704 uses a coding technique such as CRC or Reed-Solomon coding in accordance with the size of the physical data 1716 or the state of a transmission path. The physical data correction code 1717 may be inserted at the beginning of the physical data 1716, at the end of the physical data 1716, or at a specific position of the physical data 1716.

The physical data header insertion unit 1705 inserts, as a header, preamble data which enables a visible light communication receiving unit to identify the top of physical data of visible light communication data. The inserted preamble data is a data string that does not appear in data formed by combining the physical data 1716 and the physical data correction code 1717 to be transmitted. The physical data header insertion unit 1705 can change the size of the preamble data and the preamble data string to control the degree of flicker on the visible light communication transmission unit and the brightness which is necessary. The preamble data is also available for the visible light communication receiving unit to identify the device type. For example, the preamble data is set so as to minimize the difference between the brightness during the transmission of the data formed by combining the physical data 1716 and the physical data correction code 1717 and the brightness during the transmission of the preamble data, enabling a reduction in flicker. Additionally, the period of light emission in the preamble is reduced, thereby enabling the brightness of the preamble data to be adjusted to low.

The logical data dividing unit 1702 can use a typical interleaving scheme for division. FIG. 386 illustrates diagrams for describing a division process performed by the logical data dividing unit 1702.

FIG. 386 is a diagram illustrating an example of division of logical data “010011000111010” when the number of segments is three. For example, as illustrated in (a) in FIG. 386, the logical data dividing unit 1702 segments the logical data 1711 and the logical data correction code 1712 by 5 bits from the beginning to generate a plurality of logical data segments 1713. Alternatively, as illustrated in (b) in FIG. 386, the logical data dividing unit 1702 generates a plurality of logical data segments 1713 by allocating the logical data 1711 and the logical data correction code 1712 to the logical data segments 1713 in units of 1 bit from the beginning.

Alternatively, as illustrated in FIG. 387, the logical data dividing unit 1702 may define the number of skips necessary for the division of logical data, and generate a plurality of logical data segments 1713 by allocating the logical data 1711 and the logical data correction code 1712 to the logical data segments 1713 in units of bits, the number of which is equal to the number of skips, from the beginning.

In this case, the logical data dividing unit 1702 can specify the number of skips as desired, making it possible to provide confidentiality so that the visible light communication receiving unit, which does not know the set number of skips, may not be able to restore logical data. The logical data dividing unit 1702 may use a hash value output by the application of a hash function based on an arbitrary value to perform division, or may use any arithmetic expression that uniquely identifies a bit specifying division by using an arbitrary value.

In addition, the logical data dividing unit 1702 can use a time as an arbitrary value to ensure confidentiality so that reception is available only for a specific period of time. The logical data dividing unit 1702 can further set a television channel number to an arbitrary value to extend to a service that can be received on a specific channel only. The logical data dividing unit 1702 can further set a value related to a location to an arbitrary value to make the data available only for this location.

The present invention may include the following aspects.

A transmitter includes a visible light transmission unit and a human detection sensor unit. The human detection sensor unit detects the presence of a person, and transmission is started. The transmitter performs transmission in a direction in which a person is detected to be present by the human detection sensor unit. This can reduce power consumption.

A receiver receives the ID of the transmitter, and adds address information or current position information to the ID before transmitting the ID to a server. The server transmits to the receiver a code for performing setting that is optimum to the received address or position. The receiver displays the code received from the server on a screen, and presents the code to the user to set the code in the transmitter. This can make the settings on, for example, a rice cooker or a washing machine suitable for the quality of water in a residential district.

The receiver changes the setting of the exposure time for each imaging frame. For a frame with a short exposure time, the receiver receives a visible light signal. For a frame with a long exposure time, the receiver receives any other signal or a marker, for example, a two-dimensional barcode, or performs object recognition or image recognition. This enables the reception of visible light and the reception of any other signal or a marker to be performed simultaneously.

The receiver captures an image while slightly varying the exposure time for each frame. Accordingly, even if the modulation frequency of a transmission signal is unknown, an image of any frame is captured with an appropriate exposure time, and a signal can be demodulated. In addition, an image for the same signal is captured with a plurality of exposure times, enabling more efficient demodulation of a received signal.

Upon receiving an ID in a predetermined range, the receiver passes the received ID directly to another processing unit without inquiring of a server. Thus, quick response can be obtained. In addition, even when the receiver is not able to access the server, the receiver can perform processing. Furthermore, the receiver can check the operation before setting content in the server.

The transmitter represents a transmission signal by using amplitude modulation. In this case, the durations for a plurality of symbols representing different signals during which either a low-luminance state or a high-luminance state is maintained are made equal. Thus, a signal can be represented even at a low control clock.

The transmitter registers a transmission ID and content in the server when the transmitter is started. This enables desired content to be transmitted from the server to the receiver.

A portion of an ID can be set as desired by the transmitter. This enables an ID to include a code indicating the state of the transmitter. This portion may be used by the receiver and the server to change the content to be displayed, or may be ignored.

Multivalued Amplitude Pulse Signal

FIGS. 388, 389, and 390 are diagrams illustrating an example of a transmission signal in this embodiment.

Making the amplitude of a pulse implicate meaning allows the representation of more information per unit time. For example, the amplitude is classified into three stages. In this case, as in FIG. 388, it is possible to represent three values with a transmission time of two time slots while maintaining the average luminance at 50%. Note that the consecutive transmission of a pattern illustrated in (c) in FIG. 388 results in no change in luminance, and makes it difficult to identify the presence of a signal. Additionally, three values are more difficult to handle in digital processing.

Accordingly, with the use of four types of symbols illustrated in (a) to (d) in FIG. 389, it is possible to represent four values with a transmission time of three time slots on average while maintaining the average luminance at 50%. The transmission time differs depending on the symbol. The last state of a symbol is set to the low-luminance state, enabling the recognition of the end time of the symbol. Similar advantageous effects can be achieved when a high-luminance state and a low-luminance state are replaced by each other. The pattern illustrated in (e) in FIG. 389 is not suitable since the pattern illustrated in (e) in FIG. 389 is difficult to distinguish from the double transmission of the pattern illustrated in (a) in FIG. 389. The patterns illustrated in (f) and (g) in FIG. 389 can also be used although they are less likely to be recognized since intermediate luminance values are continued.

The use of the pattern illustrated in (a) or (b) in FIG. 390 as a header is considered. Since these patterns strongly have a specific frequency component in frequency analysis, these patterns are used as headers, enabling signal detection through frequency analysis.

As in (c) in FIG. 390, a transmission packet is configured by using patterns illustrated in (a) and (b) in FIG. 390. A pattern having a specific length is used as the header of the entire packet, and patterns having different lengths are used as separators. This enables data to be partitioned. In addition, such patterns are included in the middle, facilitating signal detection. Thus, even when one packet is longer than the imaging time of an image of one frame, the receiver can connect and decode pieces of data. Accordingly, adjusting the number of separators can make the length of a packet variable. The length of the entire packet may be expressed by the length of the pattern of the packet header. In addition, separators are used as packet headers and the lengths of the separators are used as addresses of data, thereby enabling the receiver to combine partially received pieces of data.

The transmitter repeatedly transmits a packet having the configuration described above. In (c) in FIG. 390, all the packets 1 to 4 may have the same content, or may be different pieces of data which are combined by the receiver.

The present invention is applicable to an information communication device and the like, and in particular to an information communication device and the like used for a method of communication between a mobile terminal such as a smartphone, a tablet, a mobile phone, a smartwatch, or a head-mounted display and a home electric appliance such as an air conditioner, a lighting device, a rice cooker, a television, a recorder, or a projector.

What is claimed is:

1. A non-transitory computer-readable recording medium storing a computer program, the computer program causing a processor to execute operations comprising:
- encoding a visible light communication information to generate an encoded signal;
- dividing the encoded signal into four signal parts in a case where the encoded signal has a number of bits within a range of 24 bits to 64 bits, wherein each of the four signal parts has address data and physical data, the address data indicating a location of the physical data within the encoded signal; and
- sequentially outputting the four signal parts to be transmitted by changing luminance of a light transmitter,
- wherein the encoded signal has a predetermined length of data array, each data has a value of 0, 1, or 2, the value of 0 to be transmitted by light brightness being 0% of the light transmitter, the value of 1 to be transmitted by light brightness being 50% of the light transmitter, and the value of 2 to be transmitted by light brightness being 100% of the light transmitter.

2. The non-transitory computer-readable recording medium according to claim 1,
- wherein the outputting includes outputting the four signal parts in a first order and further outputting the four signal parts in a second order different from the first order.

3. The non-transitory computer-readable recording medium according to claim 1,
- wherein the outputting includes outputting the four signal parts, each being assigned a notification operation identifier, and the notification operation identifier is an identifier for identifying an operation of a receiver by which a user of the receiver is notified that the four signal parts have been received when the four signal parts have been transmitted by changing luminance and received by the receiver.

4. The non-transitory computer-readable recording medium according to claim 3,
- wherein the outputting further includes outputting the four signal parts, each being assigned with a priority identifier for identifying a priority of the notification operation identifier.

5. A non-transitory computer-readable recording medium storing a reception program for receiving information from a light emitter changing in luminance in accordance with a signal output in accordance with the information processing program stored in the non-transitory computer-readable recording medium according to claim 1, the reception program including instructions that, when executed, cause the computer to perform operations comprising:
- setting an exposure time of an image sensor by using automatic exposure;
- obtaining a bright line image which is an image including bright lines each corresponding to one of a plurality of exposure lines included in the image sensor, by causing the image sensor to capture an image of a subject including the light emitter changing in luminance over the set exposure time; and
- obtaining information by decoding a pattern of the plurality of bright lines included in the obtained bright line image,
- wherein the setting includes setting a sensitivity of the image sensor to a maximum value within a range determined in advance for the image sensor, and setting an exposure time corresponding to the sensitivity set to the maximum value by using the automatic exposure.

6. The non-transitory computer-readable recording medium according to claim 5,
- wherein the setting further includes setting a value indicating an exposure compensation level of the image sensor to a minimum value within a range set in advance for the image sensor, and setting an exposure time corresponding to the sensitivity set to the maximum value and the exposure compensation level set to the minimum value by using the automatic exposure.

7. The non-transitory computer-readable recording medium according to claim 5,
- wherein the setting further includes
  - specifying a part that is brighter than any other part in a first image, captured by the image sensor, of the subject including the light emitter,
  - enlarging a portion of the subject corresponding to the brighter part by using optical zoom, and
  - setting the exposure time by using, as input of the automatic exposure, a second image obtained by capturing an image of the enlarged portion of the subject by using the image sensor, and
- wherein the obtaining of the bright line image includes
  - obtaining the bright line image by causing the image sensor to capture an image of the enlarged portion of the subject over the set exposure time.

8. The non-transitory computer-readable recording medium according to claim 5,
- wherein the setting further includes
  - determining whether or not a central part of a first image, captured by the image sensor, of the subject including the light emitter is brighter than an average brightness of a plurality of positions in the first image,
  - enlarging a portion of the subject corresponding to the central part by using optical zoom in a case where it is determined that the central part is brighter, and
  - setting the exposure time by using, as input of the automatic exposure, a second image obtained by capturing an image of the enlarged portion of the subject by using the image sensor, and
- wherein the obtaining of the bright line image includes
  - obtaining the bright line image by causing the image sensor to capture an image of the enlarged portion of the subject over the set exposure time.

9. The non-transitory computer-readable recording medium according to claim 5,
- wherein the setting further includes
  - specifying a part that is brighter than any other part in a first image, captured by the image sensor, of the subject including the light emitter, by using, among K imaging elements included in the image sensor, where K is an integer greater than or equal to 3, only N imaging elements evenly dispersed in the image sensor, where N is an integer less than K and greater than or equal to 2, and
  - setting the exposure time by using, as input of the automatic exposure, a second image captured by using, among the K imaging elements included in the image sensor, only N densely arranged imaging elements corresponding to the brighter part, and
- wherein the obtaining of the bright line image includes
  - obtaining the bright line image by causing only the N densely arranged imaging elements included in the image sensor to capture an image over the set exposure time.

10. The non-transitory computer-readable recording medium according to claim 5, wherein the setting further includes setting a metering position in an image, captured by the image sensor, of the subject, and setting an exposure time corresponding to brightness at the set metering position by using the automatic exposure.

11. The non-transitory computer-readable recording medium according to claim 5, wherein the operations further comprise:

switching an imaging mode of the image sensor from a color imaging mode for obtaining a color image by imaging to a monochrome imaging mode for obtaining a monochrome image by imaging, and wherein the setting further includes setting the exposure time by using, as input of the automatic exposure, an image obtained in the monochrome imaging mode.

12. The non-transitory computer-readable recording medium according to claim 5, wherein the setting further includes updating the exposure time of the image sensor, every time an image is obtained by capturing an image of the light emitter by using the image sensor, by using the obtained image as input of the automatic exposure, and setting the exposure time by bringing the updating of the exposure time by using the automatic exposure to an end when a fluctuation range of the exposure time that is updated as needed falls below a predetermined range.

13. An information processing apparatus, comprising:

a processor; and a memory storing a computer program, the computer program causing the processor to execute operations including encoding a visible light communication information to generate an encoded signal;

dividing the encoded signal into four signal parts in a case where the encoded signal has a number of bits within a range of 24 bits to 64 bits, wherein each of four signal parts has address data and physical data, the address data indicating a location of the physical data within the encoded signal; and sequentially outputting the four signal parts to be transmitted by changing luminance of a light transmitter, wherein the encoded signal has a predetermined length of data array, each data has a value of 0, 1, or 2, the value of 0 to be transmitted by light brightness being 0% of the light transmitter, the value of 1 to be transmitted by light brightness being 50% of the light transmitter, and the value of 2 to be transmitted by light brightness being 100% of the light transmitter.

14. An information processing method, comprising:

encoding a visible light communication information to generate an encoded signal by using a processor;

dividing the encoded signal into four signal parts in a case where the encoded signal has a number of bits within a range of 24 bits to 64 bits, wherein each of four signal parts has address data and physical data, the address data indicating a location of the physical data within the encoded signal by using the processor; and sequentially outputting the four signal parts to be transmitted by changing luminance of a light transmitter by using the processor, wherein the encoded signal has a predetermined length of data array, each data has a value of 0, 1, or 2, the value of 0 to be transmitted by light brightness being 0% of the light transmitter, the value of 1 to be transmitted by light brightness being 50% of the light transmitter, and the value of 2 to be transmitted by light brightness being 100% of the light transmitter.

* * * * *